United States Patent [19]

Dechant et al.

[11] 4,068,298

[45] Jan. 10, 1978

[54] INFORMATION STORAGE AND RETRIEVAL SYSTEM

[75] Inventors: Thomas Edward Dechant, Burton; Edward Lewis Glaser, Cleveland Heights, both of Ohio; Paul Eldred Pitt, Malibu, Calif.; Frederick Way, III, Cleveland Heights, Ohio

[73] Assignee: Systems Development Corporation, Santa Monica, Calif.

[21] Appl. No.: 637,511

[22] Filed: Dec. 3, 1975

[51] Int. Cl.[2] ........................ G06F 7/00; G06F 15/40; G06F 9/06; H03K 13/00

[52] U.S. Cl. .................................... 364/200; 364/300; 340/347 DD

[58] Field of Search ................ 340/347 DD; 364/200, 364/300

[56] References Cited

U.S. PATENT DOCUMENTS

| | | | |
|---|---|---|---|
| 3,576,534 | 4/1971 | Steinberger | 340/146.3 |
| 3,603,937 | 9/1971 | Loizides et al. | 340/172.5 |
| 3,612,660 | 10/1971 | Miller | 340/347 DD |
| 3,618,027 | 11/1971 | Feng | 364/900 |
| 3,643,226 | 2/1972 | Loizides et al. | 340/172.5 |
| 3,651,483 | 3/1972 | Clark et al. | 340/172.5 |
| 3,689,915 | 9/1972 | DeClerck et al. | 340/347 DD |
| 3,697,950 | 10/1972 | Low et al. | 340/146.1 AQ |
| 3,697,951 | 10/1972 | Bartholomew et al. | 340/146.3 Q |
| 3,793,513 | 2/1974 | Kaneko | 235/152 |
| 3,821,711 | 6/1974 | Elam et al. | 340/347 DD |
| 3,938,105 | 2/1976 | Lechner | 340/172.5 |

OTHER PUBLICATIONS

James L. Massey, "Shift-Register Synthesis and BCH Decoding", IEEE Transactions on Information Theory, vol. IT-15, No. 1, Jan. 1969, pp. 122-126.

Lawrence T. Fisher, "Unateness Properties of AND-Exclusive-OR Logic Circuits", IEEE Transactions on Computers, vol. C-23, No. 2, Feb. 1974, pp. 166-172.

E. Henry Beitz, "A Set-Theoretic View of Data-Base Representation", ACM Sigmod Workshop on Data Description, Access and Control, ACM Sigfidet, Apr. 1974, pp. 478-494.

E. Henry Beitz, "Sets as A Model for Data Base Representation; Much Ado About Something", ACM Regional Conference, Pacific, 1975, pp. 80-84.

B. A. Marron and P. A. D. DeMaine, "Automatic Data Compression", Communications of the ACM, vol. 10, No. 11, Nov. 1967, pp. 711-715.

P. A. D. DeMaine, K. Kloss, B. A. Marron, "The Solid System. II. Numeric Compression, and the Solid System. III. Alphanumeric Compression", pp. 1-25, 27-42, NBS Technical Note 413, Superintendent of Documents, U.S. Government Printing Office, Washington, D. C. 20402, Aug. 15, 1967.

W. D. Hagamen, D. J. Linden, H. S. Long, J. C. Weber, "Encoding Verbal Information as Unique Numbers", IBM Syst. J, No. 4, 1972, pp. 278-315.

Jon Louis Bentley, "Multidimensional Binary Search Trees Used for Associative Searching", 1975 ACM Student Award Paper, Communications of the ACM, vol. 18, No. 9, Sept. 1975, pp. 509-517.

Bryant et al., "GIS and File Management", Proceedings of the 21st National Conference of the ACM, 1966, pp. 97-107, L71400874, 444/1.

H. Ling, F. P. Palermo, "Block-Oriented Information Compression", IBM J Res. Develop., Mar. 1975, pp. 141-145.

P. A. D. DeMaine and B. A. Marron, "The Solid System. I. A Method For Organizing and Searching Files, and the Solid System. II. Alphanumeric Compression", pp. 243-282, George Schecter (ed.) Information Retrieval-A Critical View, Thompson Book Company, Washington, D. C., 1967.

*Primary Examiner*—Raulfe B. Zache
*Attorney, Agent, or Firm*—Christie, Parker & Hale

[57] ABSTRACT

Data processing information storage and retrieval system having a memory. A number of modules are interconnected with the memory. Encode and decode modules operate in conjunction with the memory for compacting and expanding data. A revolve module in association with a delta module and a memory enable coded signals to be transferred into a number of unique but equivalent and related signals. A seed module enables the shortest of the equivalent signals to be located. A change module enables any one of the equivalent signals to be updated. An output module causes an equivalent signal to be converted back to the original signal representation. Pipe and brightness modules perform a discrimination function on stored information. The data processor includes programs which by unique means and methods structure and retrieve data from the data base. The retrieval may be based on an inexact match between events and entries of a request and the structured data base.

393 Claims, 160 Drawing Figures

DPM 1 SYSTEM

ENCODE MODULE

ENCODE MODULE

ENCODE MODULE

ENCODE MODULE FLOW

ENCODE MODULE FLOW (CON'T)

DECODE I MODULE

DECODE I MODULE

DECODE I FLOW

DECODE II MODULE

DECODE II MODULE

DELTA MODULE
FIG_15

DELTA MODULE FLOW

* DELI ← INPUT SHOWN HERE TO INDICATE DELI IS LOADED WITH PROPER INPUT. THE SEED, CHANGE & OUTPUT MODULES CAUSE THE LOADING.

REVOLVE MODULE

REVOLVE MODULE FLOW

REVOLVE MODULE FLOW

INTERNAL CONTROL/DATA FLOW
FOR THE ISO-ENTROPICGRAM REVOLVER

——— DATA FLOW
– – – CONTROL FLOW

SEED MODULE

SEED MODULE

SEED MODULE FLOW

INTERNAL CONTROL/DATA FLOW
FOR THE ISO-ENTROPICGRAM SEED FINDER

CHANGE MODULE

CHANGE MODULE FLOW

INTERNAL CONTROL/DATA FLOW FOR THE INFORMATION OUTPUT MACHINE

OUTPUT MODULE

OUTPUT MODULE

OUTPUT MODULE

OUTPUT MODULE

OUTPUT MODULE FLOW

OUTPUT MODULE FLOW

INTERNAL CONTROL/DATA FLOW FOR THE DATA COMPACTION AND RETRIEVAL MACHINE

—— DATA FLOW
– – – CONTROL FLOW

PIPE MODULE
FIG_35

PIPE MODULE

PIPE MODULE

PIPE MODULE

PIPE MODULE FLOW

FIG_39

PIPE MODULE FLOW

PIPE MODULE FLOW

BRIGHTNESS MODULE

BRIGHTNESS MODULE

BRIGHTNESS MODULE

BRIGHTNESS MODULE

BRIGHTNESS MODULE FLOW

BRIGHTNESS MODULE

BRIGHTNESS MODULE

BRIGHTNESS MODULE

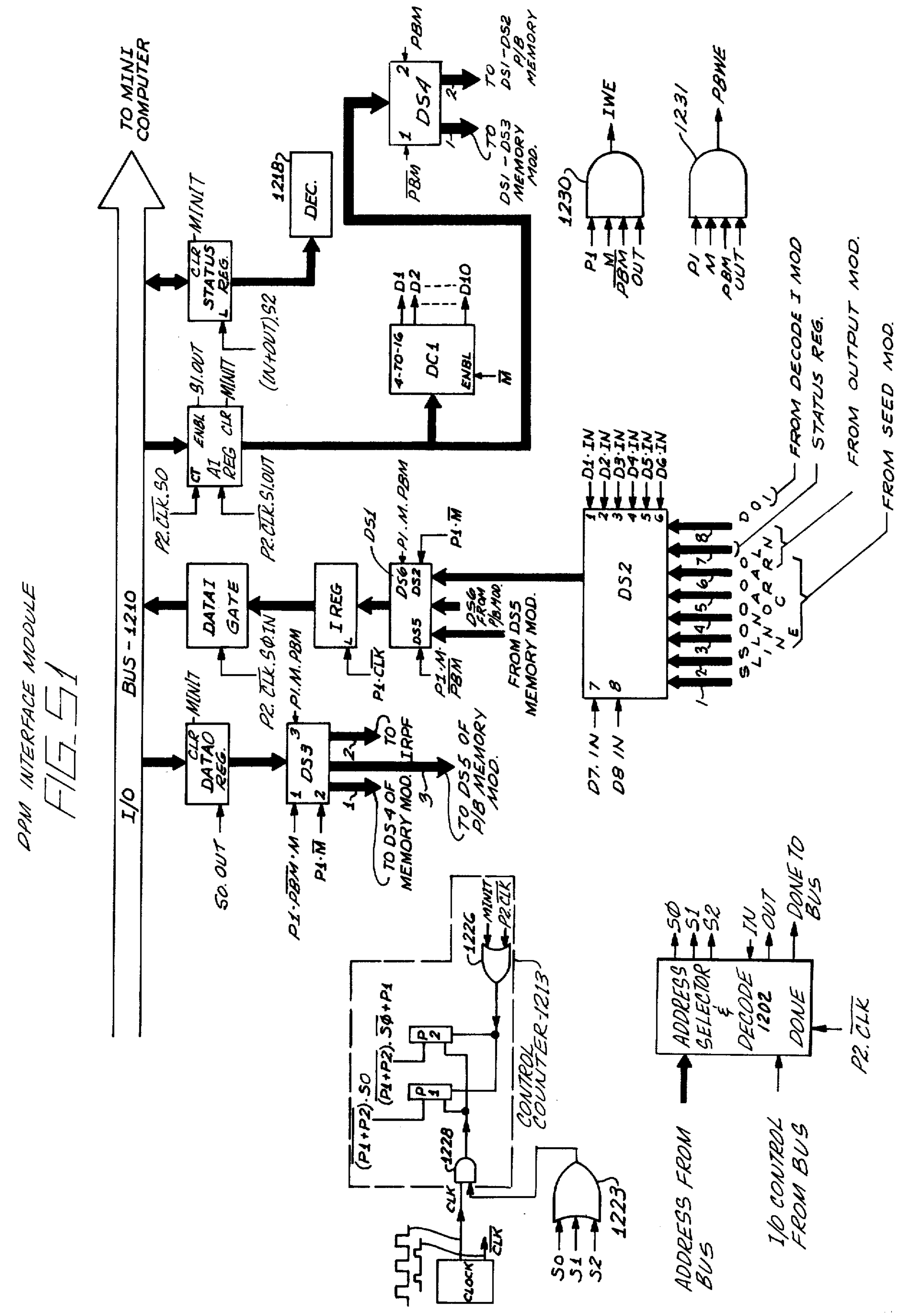
DPM INTERFACE MODULE
FIG. 51
TO MINI COMPUTER
I/O BUS - 1210
DATAO REG.
DATAI GATE
I REG
A1 REG
STATUS REG.
DEC.
1218
DC1
4-TO-16
DS1
DS2
DS3
DS4
1230
IWE
1231
PBWE
CONTROL COUNTER 1213
1226
1228
1223
CLOCK
ADDRESS SELECTOR & DECODE 1202
DONE
ADDRESS FROM BUS
I/O CONTROL FROM BUS
DONE TO BUS
FROM DECODE I MOD
STATUS REG.
FROM OUTPUT MOD.
FROM SEED MOD.
FROM DS5 MEMORY MOD.
TO DS4 OF MEMORY MOD.
TO DS5 OF P/B MEMORY MOD.
TO IRPF
TO DS1-DS3 MEMORY MOD.
TO DS1-DS2 P/B MEMORY

DPM INTERFACE MODULE

FIG. 52

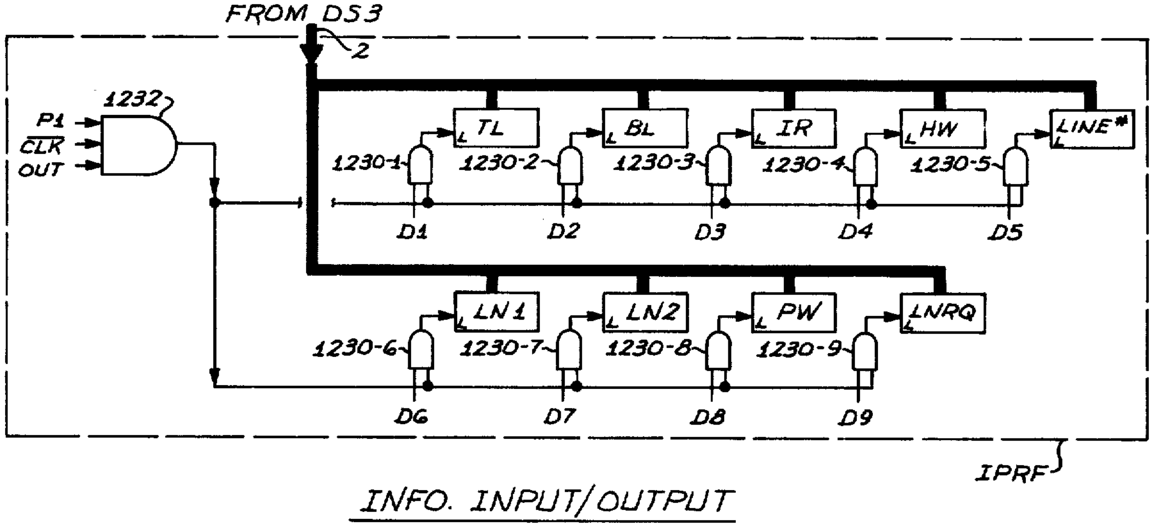

INFO. INPUT/OUTPUT

TL → ETL (ENCODE MOD)
BL → EBL (ENCODE MOD)
IR → EIR (ENCODE MOD)
HW → EHW(ENCODE)/SMHW(SEED)/OHW(OUTPUT)
LINE# → SMLI(SEED)/CLINE(CHANGE)/OLINE(OUTPUT)
LN1 → MLN1(DECODE I)/MLN2(DECODE II)
LN2 → CLN(CHANGE)/ORT3(OUTPUT)/PSAU(PIPE)/BSAV(BRIGHTNESS)
PW → PW(PIPE MOD.)
LNRQ → LNRQ(PIPE)/LNRQ(BRIGHTNESS MOD.)
AI → DS1-DS3 (MEMORY MOD.)
DS3 → DS4 (MEMORY MOD. & DS5 OF P/B MEMORY)
← SLINE (SEED MOD. FIG. 22)
← SLN (SEED MOD. FIG. 22)
← ONOC (SEED MOD. FIG. 22)
← OAR (SEED MOD. FIG. 22)
← OAR (FROM OUTPUT MOD. FIG. 31)
← OLN (FROM OUTPUT MOD. FIG. 31)
← DS5 (MEMORY MOD. FIG. 58)
← DO1 (DECODE I MOD. FIG. 9)

DPM INTERFACE MODULE

INPUT/OUTPUT CONTROL LINES

- DIGO → DECODE I & SWITCH MATRIX (IM1)
- SMGO → SEED MOD.
- CMGO → CHANGE MOD
- OMGO → OUTPUT MOD
- PMGO → PIPE MOD
- BMGO → BRIGHTNESS MOD
- MINIT → TO ALL MODULES
- IWE → WRITE ENABLE TO MEM. MOD.
- PBWE → WRITE ENABLE TO P/B MEMORY
- D1INIT → D1I
- FIRST, LAST → TO BRIGHTNESS/PIPE MOD
- DELOP → OUTPUT MOD

TIMING DIAGRAM FOR AN I/O BUS OUTPUT OPERATION FROM MINI COMPUTER TO DPM INTERFACE MODULE

TIMING DIAGRAM FOR AN I/O BUS INPUT OPERATION TO MINI COMPUTER FROM DPM INTERFACE MODULE

MEMORY MODULE

WRITE ENABLE PULSE DIAGRAM

SWITCH MATRIX

P/B MEMORY

DPM 2 SYSTEM

ENCODE MODULE

ENCODE MODULE

ALTERNATE SYSTEM 2
ENCODE MODULE

ALTERNATE SYSTEM 2
DECODE I MODULE

ALTERNATE SYSTEM 2
DECODE II MODULE

ALTERNATE SYSTEM 2
DECODE II MODULE

FIG_61H
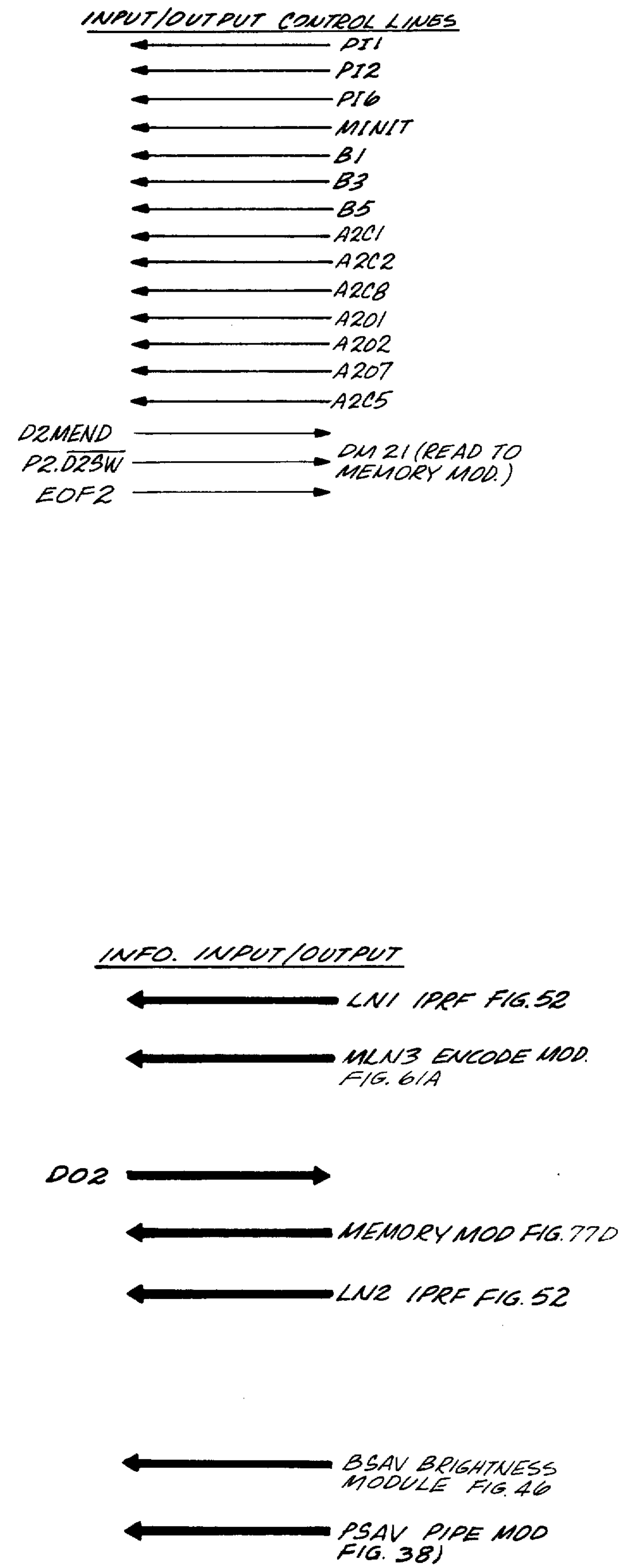

DELTA 2 MODULE

DELTA 2 MODULE FLOW DIAGRAM

DELTA 2 MODULE

REVOLVE 2 MODULE

REVOLVE 2 MODULE

REVOLVE 2 MODULE FLOW DIAGRAM

REVOLVE 3 MODULE

REVOLVE 3 MODULE

REVOLVE 3 MODULE

SEED 2 MODULE

SEED 2 MODULE

SEED 2 MODULE

OUTPUT 2 MODULE

OUTPUT 2 MODULE

OUTPUT 2 MODULE FLOW

OUTPUT 2 MODULE FLOW

CHANGE 2 MODULE

CHANGE 2 FLOW DIAGRAM

CHANGE 2 MODULE EXAMPLE

MEMORY 2 MODULE

SWITCH MATRIX 2

AUXILIARY MEMORY II

GENERALIZED DESIGN OF DATA BASE SOFTWARE

GENERALIZED DATA STRUCTURE FOR LAYERS

GENERALIZED DATA STRUCTURE FOR LAYER 0

GENERALIZED DATA STRUCTURE FOR LAYER 1

* IN WORDS

EXAMPLE FOR PARSER DATA STRUCTURE, LAYER Φ

EXAMPLE FOR PARSER DATA STRUCTURE, LAYER 1

PARSER PROGRAM FLOW

PARSER PROGRAM FLOW

PIPE PROGRAM FLOW

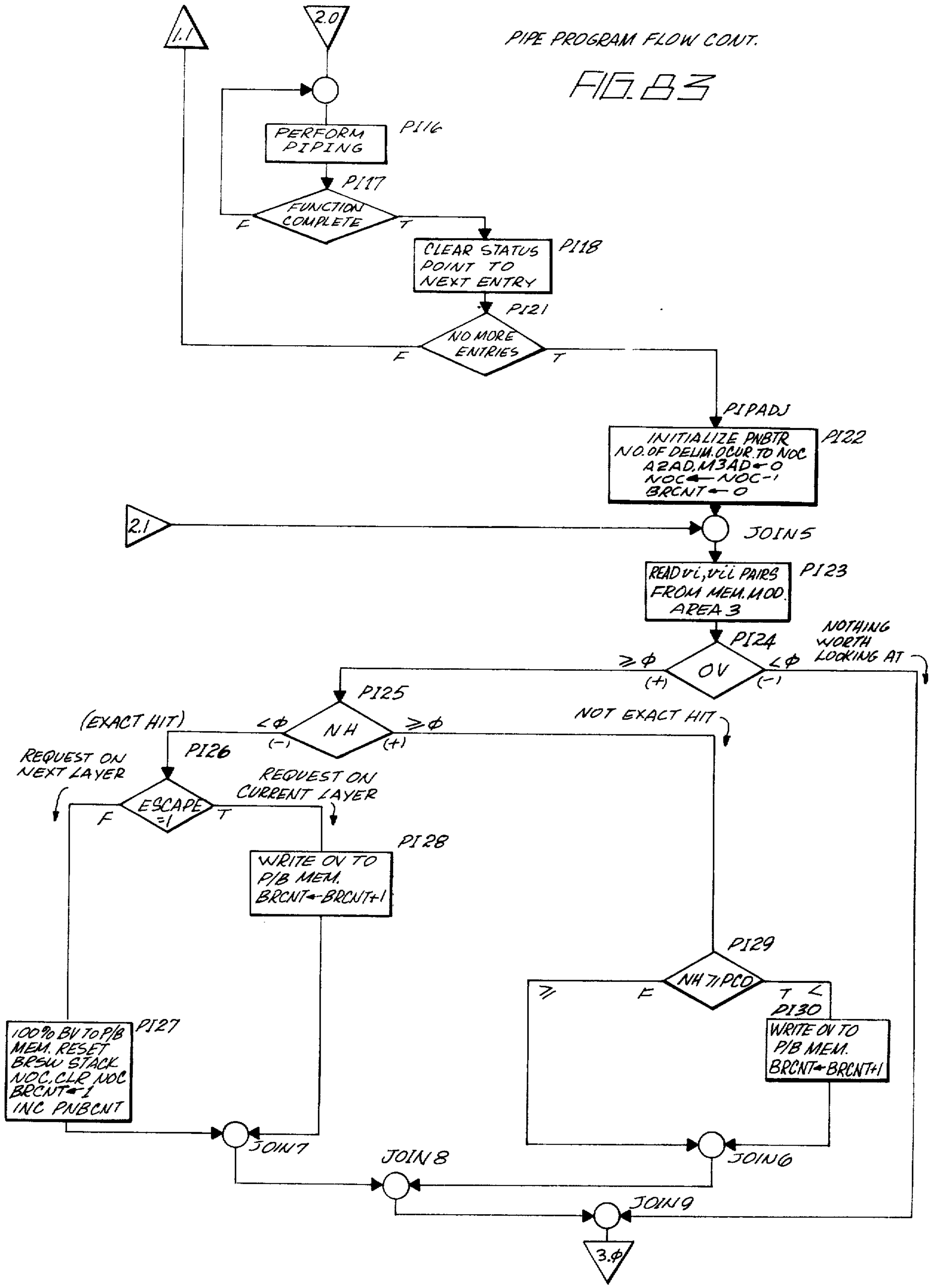

PIPE PROGRAM FLOW CONT.
FIG. 83
1.1
2.0
PERFORM PIPING
P116
P117
FUNCTION COMPLETE
F
T
CLEAR STATUS POINT TO NEXT ENTRY
P118
P121
NO MORE ENTRIES
F
T
PIPADJ
INITIALIZE PNBTR NO. OF DELIM. OCUR. TO NOC A2AD, M3AD ← 0 NOC ← NOC-1 BRCNT ← 0
P122
2.1
JOIN5
READ vi, vii PAIRS FROM MEM. MOD. AREA 3
P123
P124
NOTHING WORTH LOOKING AT
≥ϕ (+)
OV
<ϕ (-)
P125
(EXACT HIT)
<ϕ (-)
NH
≥ϕ (+)
NOT EXACT HIT
P126
REQUEST ON NEXT LAYER
REQUEST ON CURRENT LAYER
ESCAPE =1
F
T
P128
WRITE OV TO P/B MEM. BRCNT ← BRCNT+1
P129
NH ≥ PCO
≥
F
T <
P130
WRITE OV TO P/B MEM. BRCNT ← BRCNT+1
100% BV TO P/B MEM. RESET BRSW STACK NOC, CLR NOC BRCNT ← 1 INC PNBCNT
P127
JOIN7
JOIN8
JOIN6
JOIN9
3.ϕ

PIPE PROGRAM FLOW CON'T

ADDRESS LINKAGE DURING PI 22 ET REFERENCE OF PIPE PROGRAM

ADDRESS LINKAGE DURING PI 7 OF PIPE PROGRAM

ADDRESS LINKAGE DURING PI 11 OF PIPE PROGRAM

PIPE PROGRAM UP TO PI 22

PIPE PROGRAM FROM PI22 TO END

EXAMPLE

SINGLE PASS FOR PROCESSING A LAYER 1 REQUEST (OF 3 WORDS) AND PROCESS GOING FROM A 4 LETTER REQUEST TO STACKING THE BEST RESPONSE ON ESTAK FOR LAYER 1

EXAMPLE OF FIG. 91 AFTER SECOND PASS ASSUMING AN EXACT HIT ON ENTRY 3.

EXAMPLE OF FIG 91 AFTER PASS 3

BRIGHT PROGRAM FLOW

BRIGHT PROGRAM FLOW CON'T.

BRIGHT PROGRAM FLOW CON'T.

OUTPUT SUBROUTINE FLOW

MEMDPM SUBROUTINE FLOW

DPMMEM SUBROUTINE FLOW

DECODE I SUBROUTINE FLOW

FIG_100

INSERT SUBROUTINE FLOW

LAYER Φ REQUEST

LAYER 1 REQUEST

FORMATER PROGRAM FLOW

COMMAND SUBROUTINE FLOW

GET INTEGER FLOW

GET FLOATING POINT FLOW

REQUEST SUBROUTINE FLOW

PROCOUT (PROCESS OUTPUT) SUBROUTINE FLOW

Ɛ - EVENT NUMBER ON LAYER 0

SETUP SUBROUTINE FLOW

GENERATE SUBROUTINE FLOW

GENERATE SUBROUTINE FLOW CON'T.

SORT SUBROUTINE FLOW

PRINTR (PRINTER) SUBROUTINE FLOW

CONCEPTUAL VIEW OF PRIOR ART DATABASE SYSTEM

CONCEPTUAL VIEW OF LAYERED DATABASE SYSTEM ACCORDING TO PRESENT INVENTION

LAYERING DATA STRUCTURE OF THE DATA BASE

FIG_116

CONVERSION TABLES

AVAILABLE SPACE

FREE SPACE POINTER LIST

ADDING AN ENTRY TO FREE SPACE LIST

GARBAGE COLLECTION

DATA STRUCTURES AFTER INITIALIZATION

DATABASE PROGRAM FLOW

LAYER INITIALIZATION FLOW

LAYER BUILDING PROGRAM FLOW

PROCESS ENTRY PROGRAM FLOW

PROCESS A LAYER 0 ENTRY SUBROUTINE FLOW (PL0E)

ADD N EVENTS
SUBROUTINE LEVEL 1 FLOW (ADDNE)

PUT NEW SEED IN STORAGE PROGRAM
LEVEL 2 FLOW

SEARCH FREE SPACE PROGRAM FLOW

RELEASE SPACE
SUBROUTINE FLOW

GARBAGE COLLECTION PROGRAM FLOW

ADJUST SEED HEADER SUBROUTINE FLOW

INFORMATION STORAGE AND RETRIEVAL SYSTEM

BACKGROUND OF THE INVENTION

This invention relates to information storage and retrieval systems.

Distinguishing the present invention from the prior art there are certain characteristics that are generally applicable to prior art information storage and retrieval systems in existence today. These features are as follows:

1. As the size of a stored data base increases, the average time required to retrieve data therefrom increases.

2. Data compressed in a storage and retrieval system must be expanded before it can be operated on.

3. If another element is added to a data base (for example, a record is added to a file), the amount of space required to store the updated base always increases.

4. Some inquiries will be rejected by a retrieval system because they are not stated or formated correctly.

5. As the size of a random access data base increases, the efficiency of storage decreases (due to the requirements for indexing tables, pointers, etc.).

An embodiment of the present invention does not have any of the above features.

An embodiment of the present invention involves a method and apparatus of restructuring digital information to produce iso-entropicgrams and seeds. Iso-entropicgrams and seeds are defined hereinafter. To be explained in more detail, a seed is an optimum way of representing a particular piece of information with minimum storage. Stored information is retrieved, not by searching the data base, but by a generation process. During the generation process a data request, along with stored iso-entropicgram seeds, are fed as parameters to an output generator.

In summary, some of the advantages gained from using the techniques according to the present invention may be achieved as follows: (1) less physical storage is required, (2) fast retrieval time, (3) ease of restructuring and updating a data base, (4) ease of specifying a new retrieval criteria, and (5) ease of specifying and carrying out a process.

The information storage and retrieval system described in the present patent application is a new class of machine, based on an entirely new technology. Since it is based on a new technology, a new word has been coined to describe this technology, the word being "holotropic".

The holotropic information storage and retrieval system is not based upon a new component nor merely upon a rearrangement of existing components, but instead is based upon new methods and apparatus for building a whole new class of information processing machines.

Some superficial similarities will be found between presently available techniques and the class of new machines disclosed herein. However, the differences are much more significant than the similarities, making it awkward to describe the new technology in existing terms. For example, one aspect of the invention resembles holography in the sense that information pertaining to an item is not stored in one place. However, to use the word "holograhic" to describe this new technology would convey the totally incorrect impression that it is optical in nature and, at the same time, the term fails to refer to this technology's other characteristics. By way of further example, this aspect of the invention may behave in some respects like an associative memory. However, here again, the differences outweigh the similarities and the use of a descriptor like "associative" generates more confusion that it does clarification. For this reason, the term holotropic is used to identify the technology involved.

One application of the holotropic method and apparatus is for information storage and retrieval. However, in describing the functioning of a holotropic memory system, care must be taken in using the terms used for previous techniques. The mechanisms by which holotropic memory systems store and retrieve information are totally different from the mechanisms associated with terms like "search", "scan", "match", "point", "link", or "thread". Thus, according to an embodiment of the present invention, instead of searching for the presence of stored data on the basis of matching an inquiry, the holotropic memory system uses the inquiry to invoke parameters which define both the applicable pieces and any relations between these pieces and the rest of the information. Those parameters then produce the information requested in the inquiry, not by reading it out of storage, but by recomposing it. In a holotropic memory system, the information itself is not found, it is generated.

From the user's point of view, there are two characteristics of holotropic techniques which profoundly change conventional modes of dealing with an information storage and retrieval system. One characteristic concerns the absence of the need for descriptors, and another concerns file compression.

Attention will now be directed to descriptors and exactness as it applies to an embodiment of the present invention. The data which is to be entered into the holotropic system for later retrieval need not be categorized, indexed, described, or even formated for the purpose of retrieval. Should the user wish to set up a structure of categories containing descriptors or indices because it makes it easier for him, he may of course do so. An important distinction here is that a holotropic memory system never imposes such structures upon the process. Even though the holotropic memory system can accommodate such structures, it does not require them.

The same flexibilities characterize the making of inquiries of a holotropic memory system. The inquirer can simply ask questions in whatever form, using whatever words occur to him. Usually the person attempting to use an information storage and retrieval system has no trouble stating his inquiry in such a way that he understands it, and in such a way that other people understand it. The difficulty arises when he tries to translate his inquiry into an equivalent question which meets the acceptance requirements imposed by conventional information storage and retrieval systems.

By prior information storage and retrieval systems, limits have to be set on the inquiry process. Since a holotropic memory system does not impose any requirements on the inquiry process, necessary control is vested where it belongs, namely, with the user. The most important control the user exercises concerns the degree of exactness of the match between his inquiry and the contents of the data base. The maximum setting on his "degree of exactness" control would be that for an exact match. Should an exact match not be found, the holotropic memory system enables it to tell the user that the situation exists and indicates that change must be made in the exactness setting so that the inquiry will retrieve at least one relevant item.

The exactness control setting has no effect whatsoever on the search time of the holotropic memory system. However, since it indirectly controls the amount of data retrieved, it does affect the total respone time in the sense that more retrieved data will take longer to display in print.

Because of the differences in the techniques of the inquiry process in traditional and in holotropic information storage and retrieval systems, the structure of the latter may be vastly different. In traditional retrieval information storage and retrieval systems, an inquiry can be rejected because it contains an unallowable descriptor, or because something is misspelled, or because the parts are ordered improperly, or because the inquiry is not framed according to the specifications. Thus, an inquiry can be rejected regardless of whether the information it asked for is actually in the data base. In a holotropic data storage and retrieval system, no inquiry need ever be rejected for such reasons. The only sense in which an inquiry needs to be "rejected" at all by a holotropic information storage and retrieval system is that it fails to retrieve. In other words, the data base does not contain anything which matches the inquiry at the specified level of exactness. If this happens, the user is told whether or not a change in exactness will retrieve an item, and if so, the setting.

Another consideration for holotropic information storage and retrieval method and apparatus is file compression. The nature of the holotropic system is such that the stored data is compressed into less space than would be used to store the data with presently available techniques. This is true even if it were entered as a linear string, that is, as a single record. The degree to which any particular data sample is compressed in a holotropic system is a function of two independent processes.

The first process is fairly easily described, and its effects are relatively predictable. The holotropic storage and retrieval system compresses input data by automatically taking advantage of any redundancy. In one test, a 10,000-word sample of ordinary English prose was compressed to approximately one-half the space which would have been required had the sample (without any index tables, pointers, or other artifacts) been stored as a single record in a traditional information storage and retrieval system. The exploitation of these redundancies occurs at all levels. Once a character, a word, a sentence, a paragraph, or any other arbitrarily specified input element has been encountered, no subsequent occurrences of that same element need be stored in their original form. Instead, the holotropic system notes that a previously encountered element has occurred again, in a manner which permits reconstitution of any or every one of the multiple input elements in its original context.

The second process contributing to data compression in a holotropic memory system is more difficult to predict. It is more difficult to predict as it is a function of the relatedness of elements which are part of a data base.

As each new input element is added to the data base, it is automatically correlated with every other appropriate element already stored. Since this process operates on the data base in its compressed form, it does not adversely affect storage time. One possible result of this correlation is that the content and structure of a new input element may reveal a relationship between itself and a number of already stored elements which permits all of the related elements to be treated as a single entity and stored together. Thus, a number of elements which at one time were stored separately, can be collapsed on the basis if their relationship with a subsequent input element, with results that the updated file can require less total storage space than it did prior to the addition of the new input element.

Another characteristic which is also very different in a holotropic system from traditional information storage and retrieval systems is that in a holotropic system both the degree of compression and the relative speed of retrieval may increase as the size of the data base increases.

A derivative feature of compression in a holotropic system is that certain processing or manipulation of the stored data is done in its compressed form, thus permitting higher processing speeds than systems which must first expand the data.

Although the above discussion has been directed primarily to holotropic information storage and retrieval systems, specific holotropic method and apparatus techniques may be applied in other areas.

One area is in digital communications, where band width limitations place an upper bound on speed of transmission. Here, a holotropic system can be used to encode the digitized data, and the speed of transmission of any message will be increased as a function of the degree of compression as discussed with respect to information storage and retrieval applications. It is important to remember that the information thus compressed and transmitted can represent anything whatsoever, from a payroll file to a digitized pictorial image. Significantly, other systems can be used to efficiently compress and transmit data. However, one thing which makes the holotropic approach unique is that, since holotropic compression is a function of the redundancy of the message, compression and error correction are one and the same mechanism.

Significantly, holotropic techniques can be implemented in software, but some or all are much more efficient when implemented in microcode, and are maximally efficient when implemented directly in hardware. However, even where holotropic techniques are implemented in software or microcode, holotropic memory systems can perform more efficiently in terms of storage, speed, etc. than presently known techniques. At the hardware level, holotropic technology can take full advantage of the unique properties of the latest components, such as, charge couple devices, magnetic-bubble logic, and memory, etc.

The technology described herein is applicable alike to large computers (for example, information storage and retrieval systems), to subsystems (for example, intelligent disk storage devices), or to very small stand-alone machines (for example, battery-driven calculators).

SUMMARY OF THE INVENTION

One aspect of the present invention concerns novel method and means involving a digital data processor for creating or structuring a unique digital coded data base in a memory of the data processor. Briefly, a method is disclosed for forming, in a desired order of occurrence, and as input, a plurality of coded event signals. At least some of the event signals represent the same event and at least one signal represents a different event. The event signals together represent plural entries. An event-time indication is formed for each event signal representing the order of occurrence thereof. In the memory, a stored data base is formed which comprises a separately retrievable event vector signal for each different event and includes the step of forming in each retrievable event vector signal a representation of those event-time indications which represent the order of occurrence of the corresponding event. Preferably, the event-time indications are formed by counting the event signals as they are formed.

The vector signals are referred to herein as being retrievable because the vector signals need not be stored in separate memory locations as separate signals but may be in a special form called a seed or may be combined with other seeds which may be retrieved to separate vector signals as required.

Also disclosed is a method and means utilizing a data processor having a memory for creating or structuring a multiple layered data base in the memory. The method involves the steps of forming, in a desired order of occurrence, and as input, a plurality of coded event signals; at least some event signals represent the same event and at least one event signal represents an event which is different from another one. The event signals, together, represent a sequence of entries. Some of the entries are the same and at least one is different. A first event-time indication is formed for each of the event signals. A second event-time indication is formed for each of the entries. The event-times represent the order of occurrence of the respective events and entries, representing the input. The first data base layer is entered in the memory and involves the steps of storing in the memory a retrievable first layer vector signal corresponding to each different valued event signal and the step of forming in each of the first layer vector signals a representation of those first event-time indications which represent the order of occurrence of the corresponding valued event signals. The second data base layer is entered in the memory and involves the step of storing in the memory a plurality of retrievable second layer vector signals. Those entries which are the same have a corresponding second layer vector signal and those entries which are different each have a different second layer vector signal. Also included in the step of forming the second layer is the step of forming in each second layer vector signal a representation of those second event-time indications which represent the order of occurrence of the corresponding entries.

Preferably, redundancy is eliminated in the first data base layer. According to a preferred method, a test is made to determine if a newly formed input entry is already represented in the first data base layer. If the entry is not represented, the newly formed entry is added to the first data base layer, utilizing the step of storing. If the entry is already represented, then it is not added to the first layer a second time. However, the entry is added on the second layer.

According to a further preferred embodiment of the invention, method and means are provided for storing delimiter events in one or the other or both of the layers. Briefly, a method is disclosed wherein the event signals of the input comprise at least one representing a delimiter. At least one such delimiter event signal is formed in each of the entries and in the order of occurrence of the entries so as to define the boundaries of the entries. The first event-time indications also identify the order of occurrence of each delimiter. A separately retrievable vector signal is provided for the first event-time indications which represent the order of occurrence of the delimiter event signals. A similar method is provided for forming a delimiter event signal in the second layer identifying the bounds of entries in the input.

Method and means involving a data process are disclosed for retrieving data from the stored data base. Briefly, the disclosed method retrieves, from a memory, data which is contained in a stored data base. The data base represents a sequence of events in which some events are the same and at least one event is different. The stored data base is represented by a plurality of separately retrievable vector signals one for each different event. Each retrievable vector signal represents at least one event-time value which represents the order of occurrence of the corresponding event. The method includes the steps of interrogating a selected vector signal to selectively form at least one event-time identification signal, and generating a unique event signal corresponding to a vector signal which represents an event-time value corresponding to the event-time identification signal. By selecting only those vector signals for interrogation which are of interest the necessity of interrogating all vector signals of the data base is avoided.

Method and means involving the data processor are also disclosed for retrieving from a memory, data which is contained in the multiple layered data base. Each layer represents an ordered sequence of entries and events. One or more events represent each entry. In each layer some events are the same and at least one is different. Some entries are the same and at least one is different. Each layer has a plurality of separately retrievable vector signals, one for each different event for such layer. Each retrievable vector signal represents an event-time value for each occurrence of the corresponding event and the event-time values identify the order or occurrence of the corresponding events. The data base comprises at least first and second layers. At least some of the events in the second layer have a corresponding entry in the first layer. The method disclosed includes the steps of generating a first layer entry identification signal designating a first layer entry which corresponds to a second layer vector signal. The second layer vector signal represents at least one event-time value in a selected second layer entry. Also included is the step of generating a first layer event signal corresponding to the first layer vector signal which represents an event-time value in the designated first layer entry.

The multi-layer system, preferably involves method and means for interrogating on each layer and generating signals from each layer. Briefly, the method involves the step of interrogating a selected first layer vector signal to form at least one first layer entry identification signal which, in turn, designates at least one second layer vector signal. The designated second layer vector signal is interrogated to form at least one second layer entry identification signal. The step of generating includes the generation of a first layer entry identification signal designating the first layer entry which corresponds to a second layer vector signal which represents at least one event-time value in the designated second layer entry. A first layer event signal is generated corresponding to the first layer vector signal which represents an event-time value in the designated first layer entry.

Preferably the retrieval involves an initial step of forming a request comprising a series of coded event signals representing the events of an entry. The step of interrogating on the first layer includes the step of interrogating selected vector signals, which correspond to the events of the request, to locate an entry containing event-time values which represents events having a predetermined degree of match with the events represented by the event signals of the request. Preferably a signal is formed which identifies different allowable degrees of match between the events of the request and the events of an entry in the data base. The step of locating involves the step of locating a data base entry which has the allowable degree of match. In this manner it is possible to locate a data base entry in the first layer which may not exactly match the events of the request.

Also disclosed is a concept generally referred to as piping. Briefly, a preferred method of piping is disclosed which involves the step of locating a data base entry which has at least a predetermined number of event-time values representing events positioned within a preselected number of event positions relative to events in the request. Preferably an alterable pipe cutoff signal represents such predetermined number of events. The pipe cutoff signal preferably represents the predetermined number of events as a function of the number of events in an entry of the request and computations are made to determine the actual number of events to be used in the step of interrogating based on the length of various parts of the request.

According to a still preferred embodiment the preselected number of event-time values is specified by a pipe width value which may be altered as desired.

In addition, the concept of brightness is disclosed. A preferred method is disclosed wherein piping forms an intermediate entry identification signal. Further interrogation is performed according to brightness in order to locate a data base entry which has at least a preselected degree of match as to order and presence of events, with an entry of the request.

In summary then it will now be seen that the piping feature locates entries which meet certain piping criteria and these entries are then used by the brighteness feature to locate data base entries which have the desired preselected degree of match as to order and presence of events with the entry of the request (i.e., brightness). Preferably the preselected degree of match is specified by a brightness value cutoff signal which is alterable by the user.

In a preferred method according to the invention, a length discrimination feature is provided in order to only locate those data base entries which have a preselected degree of match, as to number of events, as well as order and presence of events.

Preferred methods are disclosed which utilize delimiters for locating entries during the interrogation and generation steps. Although the aforegoing description of the pipe and brightness features deals in large with interrogation and generation on a single layer, it should be understood that the same features may be applied on one or more layers in a multiple layer system. Method and means are disclosed herein for interrogating on one layer to locate entries on the first layer which in turn identify events on the second layer. It will be recalled that each second layer event will have a corresponding vector signal. By interrogating such vector signals on the second layer, second layer entries are located by using pipe and/or brightness, and it is possible to locate portions of the data base which do not exactly match the request. For example, the request may be composed of letter events which in turn represent word entries which in turn represent a sentence entry. By interrogating the first layer using the pipe and/or brightness, it is possible to locate for each word of the request a word in the data base which most closely matches the word of the request. These best words, represented by first layer entry signals, (second layer event signals), are then used to interrogate the second layer of the data base by using pipe and/or brightness. It is then possible to find a word in the data base which, although it does not exactly match the request word, is the best one represented in the data base. The same is true of a sentence and the words which make up a sentence.

Although the foregoing description has been primarily directed to methods, it will be understood that data processing means are disclosed which include both hardware and programming for effecting the methods described.

Also disclosed are various ways of compacting data which will be described in more detail. One form is referred to herein as revolving. Briefly, an electronic data processor is disclosed for converting coded signals as follows. The combination of a given line value signal and a given line number signal is formed which together represent a given value. Additionally a number of lines value signal is formed. Significantly, means is provided for converting such combination of given line value signal and given line number signal representing each different given value to any combination of equivalent line value signal and line number signal in a unique set thereof which includes the given signals. Each line value signal represents at least one digitally coded actual occurrence value out of a set of monotonically ordered possible occurrence values. Each line value signal is related to another in the same set by an exclusive OR of the actual occurrence values thereof and the actual occurrence values thereof relativly shifted. Also provided is means for responding to each different value represented by the number of lines signal for causing the converting means to form a different predetermined one of the equivalent combination of line signal and line number signal within the set which corresponds to the combination of given line signal and given line number signal. Such an arrangement has particular application to systems such as the present one involving vector signals which may have an extremely large number of event-time values, as it permits the values to be compacted down to a small fraction of the fully expanded form. This is particularly applicable to vector signals which can be quite long. Significantly, as more values are added to a given line value the shortest equivalent line may actually become smaller.

In a preferred embodiment of the foregoing processor, means is provided for causing those relatively shifted occurrence values which are not within the group of possible occurrence values to be eliminated from the equivalent line value signal, contributing to the compaction feature. According to a further preferred embodiment the number of lines value signal is represented by one or more signals representing component powers of two thereby representing increments by which the given signal is moved through the equivalent signals.

According to a further preferred embodiment the operation of forming incremental number of lines value signals can be done very fast and conveniently. In such an embodiment, means are provided for determining the larger of the difference between the values of the largest two actual occurrence value signals in the given line and of the difference between the values of the largest possible occurrence value and the largest actual occurrence value in the given line value. Preferably means is also provided for forming one or more incremental number of lines value signals representative of the largest difference.

According to a still further preferred embodiment, a data processing compactor for coded signals is disclosed. That is referred to herein generally as seed finding. In accordance with one such embodiment of the invention the forementioned data processing converting means is provided with means for forming a plurality of incremental number of lines value signals causing the given line to be moved through successive equivalent signals. Means are provided for interrogating the formed equivalent line value signals for one of selected length, preferably the shortest. A signal indicative of the one of selected length is stored. Preferably, both the equivalent line value signal and the equivalent line number signal are stored as the indicative signal.

Generally it is important to minimize required memory space and accordingly length of data must be minimized. Therefore, redundancies such as "o"s are preferably squeezed out of data to be stored by means such as an encoder. The compaction operation is preferably arranged to minimize the length of data as it exists after encoding and before storage in memory.

According to a preferred embodiment of the invention, data processing means is provided for outputting signals represented by the line value signal and the line number signal. This feature is generally referred to herein as output. In this connection the data processing converting means disclosed above is provided with means for forming a signal having a value representing the number of possible occurrence values in the set thereof, means for determining a value related to the difference between the number of possible occurrence value signals and the given line number signal. This value is then used by the converting means to form the corresponding equivalent line signal which is the input/output line.

Also disclosed is an electronic data processing coded signal changing means which is capable of changing signals represented by a line value signal and a line number signal. Significantly the changes need not be made at the level of the given signals but can be made in the line value signal of one of the other equivalent signals in the corresponding set of equivalent signals. Briefly, to this end there is disclosed means for storing at least the combination of a given line value signal and a given line number signal which represent a given value. Means are provided for forming a change signal representing at least one change occurrence value. Additions and deletions are indicated in the change signal. Additional means form a number of lines value signal. Means similar to that disclosed above converts the combination of given line value signal and given line number signal to one of the equivalent signals in the corresponding set. The equivalent signal is identified by the number of lines signal. Means is provided for exclusive ORing the values represented by the equivalent line value signal and the change signal for forming a change line value signal. Preferably the number of lines value signal represents the difference between the values represented by the given line number signal and the change line number signal. In this way the given line signal is rotated back to what is referred to as an input line in the equivalent sets and then the input line is exclusive ORed with the change signal.

Also disclosed is an electronic data processing method for checking for the presence of an actual occurrence value represented by a given line value in the equivalent sets. This has been referred to generally as the DEL function. Significantly, the presence of an actual occurrence value is to be checked not in the given line but in one of the other equivalent lines. To this end a method is disclosed which utilizes the value represented by the given line number signal for forming a signal representing the number of lines of displacement between the given line and a desired line value of the equivalent set of line values. A test signal is formed representing the desired possible occurrence value to be checked for presence in the desired line value. The values represented by the test signal and the number of lines signal are combined to form a further test signal identifying a further possible occurrence value for test. The values represented by the test signal and the given line signal are compared for a predetermined relation. The values represented by the further test signal and the given line signal are also compared for a predetermined relation. Responding to the results of both comparing steps, a predetermined signal is formed indicating the presence of an actual occurrence value, in the desired line value, equal in value to that represented by the test signal. In addition to the method, means are provided for checking for presence.

In the compacting method and means, preferably the vector signals are encoded from a compact code to an expanded code before conversion to an equivalent signal. Also preferably the equivalent line value is converted from an expanded code back to a compact code before length is checked using encoding techniques. A preferred encoder is disclosed for converting to hybrid form a received series of absolute coded words in decreasing value order which represent the vector signals. In such encoder, means is responsive to received previous and current absolute words for forming an output signal indicative of the difference. Absolute or bit string form of hybrid output is indicated. To this end, means is provided for indicating a preselected minimum difference between successively received absolute words for absolute form of output, and means is provided for comparing the minimum difference indication and the previous and current difference signal for indicating the value of the first being greater than, or less than or equal to the latter. Absolute form outputs are provided. To this end, means is operative in response to the less than or equal to indication for outputting the stored current absolute word and an absolute flag. Bit string form outputs are also provided. To this end, there is means which is responsive to the greater than indication for forming a set of ordered signals comprising a binary bit of one value (i.e., "1") separated by the number of binary bits of a second value (i.e., "0") corresponding to the value of the previous and current difference signal. Additionally, means selectively outputs the set of signals in association with a bit string flag and in a predetermined relation to an outputted absolute word. In this manner, absolute words are converted to a hybrid form of encoding.

A preferred form of the decoder converts hybrid coded signals to absolute coded signals. In the system this decode operation is performed on hybrid coded vector signals coming from memory. The hybrid signals represent a series of occurrence values of decreasing value order. The hybrid signals comprise a series of received binary coded word signals including at least one absolute coded word and a bit string word. The bit string word represents an occurrence by the number of bits of displacement of a bit of predetermined value from an absolute word in the series of hybrid words. The hybrid word also has a flag indicating the type of word. The decoder includes an absolute word outputting arrangement that includes means responsive to an absolute word flag signal of a received hybrid word for outputting the received word signal. Also provided is an absolute word outputting arrangement that includes means responsive to an absolute word signal and each bit of predetermined value in a following bit string word signal for forming an absolute word signal for output indicative of the actual value of each said bit of predetermined value. In this manner retrieved vector signals are converted from hybrid form to absolute word form, each absolute word representing an actual occurrence value.

BRIEF DESCRIPTION OF THE DRAWINGS

FIGS. 47, 48, 49 and 50 form a flow diagram illustrating the sequence of operation of the BRIGHTNESS MODULE;

FIGS. 51, 52 and 53 form a schematic and block diagram of the DPM INTERFACE MODULE which includes the IPRF;

FIG. 28 is a write enable pulse diagram for the MEMORY MODULE;

FIGS. 61F, 61G and 61H form a schematic and block diagram of the DECODE II MODULE for the DPM 2 system;

FIGS. 82–84 form a PIPE program flow diagram;

FIGS. 119A–E are sketches illustrating available used space management for the seed lines;

INDEX

Contents

Figure 1:
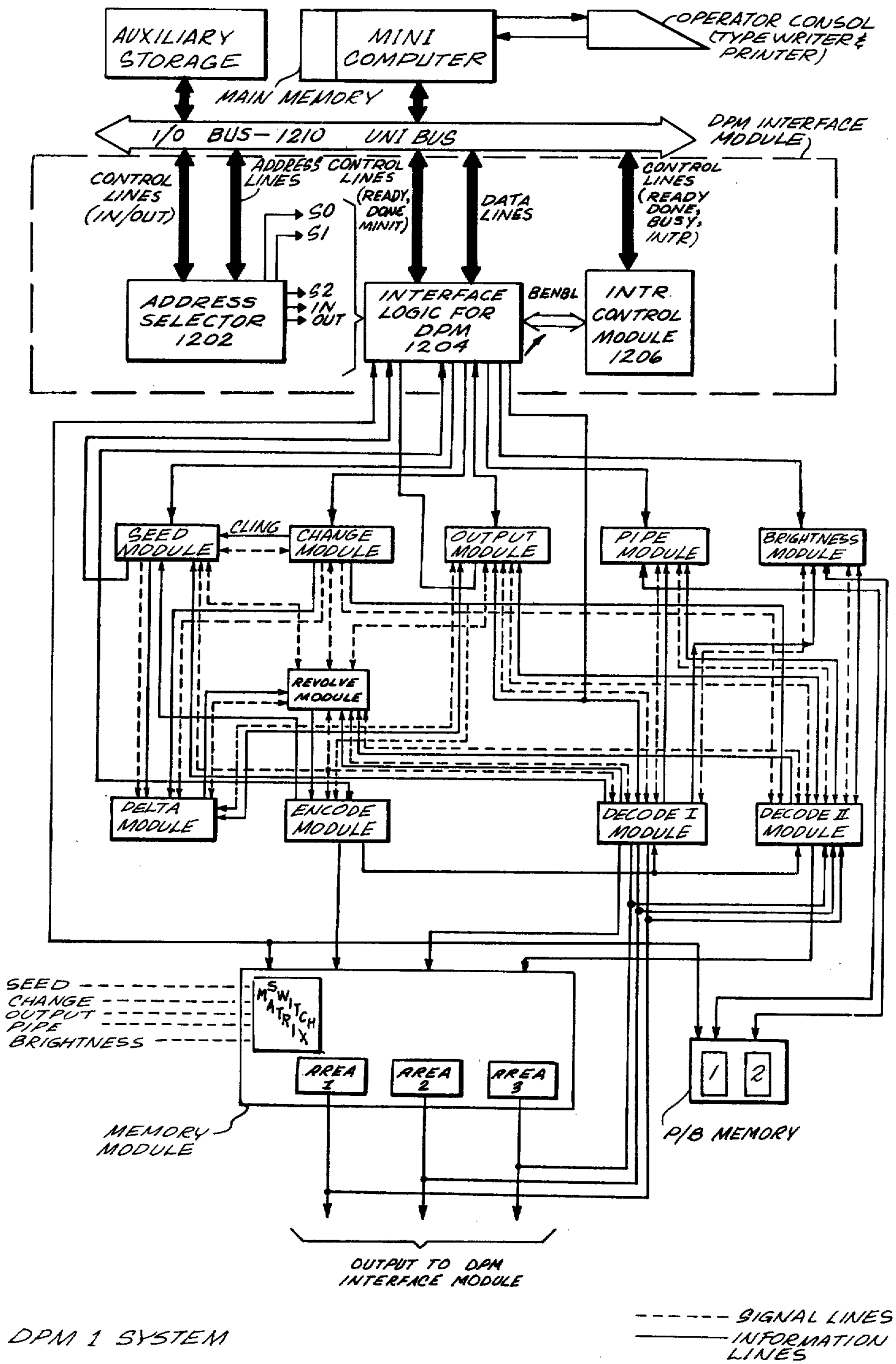
FIG. 1 is a general block diagram of the data processing machine (DPM)

I. GENERAL DESCRIPTION OF DPM SYSTEMS
- A. Data Base Structure
- B. Iso-Entropicgram Techniques
- C. Changes
- D. Verifying Presence of an Occurrence Value at Input Line
- E. Hybrid Coding
- F. Conventions and Components Used in the Figures

I-A. GENERAL ORGANIZATION OF DPM SYSTEM OF FIGS. 1–34

II. ENCODE MODULE
- A. General Description
- B. Components
- C. Detailed Description
- D. Example of Operation III. DECODE I MODULE
- A. General Description
- B. Components
- C. Detailed Description
- D. Example of Operation

IV. DECODE II MODULE

V. DELTA MODULE
- A. General Description
- B. Components
- C. Detailed Description
- D. Example of Operation VI. REVOLVE MODULE
- A. General Description B. Components
C. Detailed Description
D. Example of Operation
VII. REVOLVER
VIII. SEED MODULE
A. General Description
B. Components
C. Detailed Description
D. Example of Operation
IX. SEED FINDER
X. CHANGE MODULE
A. General Description
B. Components
C. Detailed Description
D. Example of Operation
XI. SEED LINE CHANGER
XII. GENERALIZED CLOCK CONTROL
XIII. OUTPUT MODULE
A. General Description
B. Components
C. Detailed Description
D. Example of Operation
XIV. DATA COMPACTION AND RETRIEVAL MACHINE
XV. PIPE MODULE
A. General Description
B. Components
C. Detailed Description
XVI. BRIGHTNESS MODULE
A. General Description
B. Components
C. Detailed Description
XVII. DPM INTERFACE MODULE
XVIII. MEMORY MODULE
XIX. SWITCH MATRIX
XX. P/B MEMORY
XXI. GENERAL ORGANIZATION OF ALTERNATE DPM SYSTEM 2
A. General Discussion
B. Revised ENCODE MODULE
C. Revised DECODE I MODULE
D. Revised DECODE II MODULE
E. PIPE and BRIGHTNESS MODULES
XXII. DELTA 2 MODULE
A. General Description
B. Components
C. Detailed Description
D. Example of Operation
XXIII. REVOLVE 2 MODULE
A. General Description
B. Components
C. Detailed Description
D. Example of Operation
XXIV. REVOLVE 3 MODULE
A. General Description
B. Components
C. Detailed Description
D. Example of Operation
XXV. SEED 2 MODULE
A. General Description
B. Components
C. Detailed Description
D. Example of Operation
XXVI. OUTPUT 2 MODULE
A. General Description
B. Components
C. Detailed Description
D. Example of Operation
XXVII. CHANGE 2 MODULE
A. General Description
B. Components
C. Detailed Description
D. Example of Operation
XXVIII. MEMORY 2 MODULE
XXIX. SWITCH MATRIX 2
XXX. AUXILIARY MEMORY MODULE II
XXXI. COMPUTER, DATA BASE & SOFTWARE ORGANIZATION
A. MINI COMPUTER
B. General Description of Data Base Structure
C. General Description of Software
1. Data Base Initialization
2. Layer Building
XXXII. INQUIRY AND RETRIEVAL HARDWARE/SOFTWARE ORGANIZATION
A. General Description of Inquiry and Retrieval Software
B. FORMATER program
C. PARSER program
D. PIPE program
E. BRIGHT program
F. OUTPUT subroutine
G. MEMDPM subroutine
H. DPMMEM subroutine
I. DECODE I subroutine
J. INSERT subroutine
K. COMMAND subroutine
L. GET INTEGER program
M. GET FLOATING POINT program
N. REQUEST subroutine
O. PROCOUT (Process Output) subroutine
P. SETUP subroutine
Q. GENERATE subroutine
R. SORT subroutine
S. PRINTR (Printer) subroutine
T. PRNTC (Print a Character) subroutine
U. GETC (Get a Character) subroutine
XXXIII. HARDWARE/SOFTWARE ORGANIZATION FOR BUILDING LAYERED DATA BASE
A. LAYERED DATA BASE STRUCTURE
B. DATA BASE program, Level 1
C. LAYER INITIALIZATION program, Level 2
D. LAYER BUILDING program, Level 2
E. PROCESS ENTRY program, Level 3
F. PROCESS A LAYER 0 ENTRY subroutine
G. ADD N EVENTS subroutine, Level 1
H. PUT NEW SEED IN STORAGE program, Level 2
I. SEARCH FREE SPACE program, Level 3
J. RELEASE SPACE SUBROUTINE FLOW, Level 3
K. GARBAGE COLLECTION program, Level 3
L. ADJUST SEED HEADER subroutine
APPENDIX A
Index of Tables
Tables
APPENDIX B
Index of Program Listings
Program Listings

I. GENERAL DESCRIPTION OF DPM SYSTEMS

A. Data Base Structure

FIG. 1 depicts a general diagram of an information storage and retrieval system and embodies the present invention. The system of FIG. 1 is referred to herein as a data base management (DPM) system. The DPM system is designed to perform certain general data base management functions, as follows. First is the "enter" function which is the ability to enter information into the data base. Second is the "update" function which is the ability to change or delete information in the data base. Third is the "retrieval" function which is the ability to retrieve information from the data base, and the fourth is the "discrimination" function which enables the user to discriminate upon the information in the data base. The discrimination function is referred to herein as the "piping and brightness" function.

In order to understand the above four functions, it is imperative that one first understands the structure of the data base and the technique of storage for the data base.

All incoming information to the DPM system is restructured by the MINI COMPUTER into a layered data base in its main memory. Each layer is a logical entity or a group of entities called "events". Each of these events is separated by a delimiter from a set of delimiters for the layer. The group of events between two subsequent delimiters is referred to as an "entry". Layering is hierarchical in that the higher level layers encompass the lower level layers. For example, if one were to structure contextual data base, the following levels may exist: layer 3 consisting of sentences; layer 2 consisting of phrases; layer 1 consisting of words; and layer 0 consisting of letters. Each layer has appropriate and distinct delimiters. However for purposes of illustration only a two layer system is specifically disclosed. One layer is for words and the second for sentences.

Table 1 is an example of the word layer 0. Each occurrence of an event is represented by a 1 whereas an 0 represents the lack of an event. As depicted, the layer may be visualized as having two dimensions referred to as lines (or rows) and columns. The number of lines is equal to the number of events in the layer. The number of columns is equal to the number of possible occurrence values for each event.

Entries are viewed as a series of events occurring in time. Each column is assigned an event-time, or possible occurrence value, from left to right in increasing monotonical value order. Table 1 depicts layer 0 for the sentence "THIS IS A TEST". Layer 0 of layer 0 contains the delimiter ƀ (representing a textual blank) which actually separates the words of the sentence. Line 1 designates the T events. Line 2 designates the H events. Line 3 designates the I events. Line 4 designates the S events. Line 5 designates the A events. Line 6 designates the E events.

Since the events can be considered as a series of chronologically occurring event-times, each event is represented in the layer by a binary 1 in the appropriate line and column. Thus, if the event-times can be considered as being represented by an occurrence clock, each time a 1 is entered in the layer corresponding to an event the occurrence clock is increased by 1. This is depicted in Table 2A. Thus a delimiter ƀ occurs at event-time 0, the letters T-H-I-S occur at event-times 1, 2, 3 and 4. A second delimiter ƀ occurs at event-time 5. The letters I-S appear at event-times 6 and 7. Another delimiter ƀ appears at event-time 8. The letter A appears at event-time 9. Another delimiter ƀ appears at event-time 10 and the letters T-E-S-T appear at event-times 11, 12, 13 and 14. The ending delimiter ƀ appears at event-time 15.

All of the events in any one line are represented by an occurrence vector. The occurrence vector is represented by the occurrence values of an event shown at any particular line. Occurrence vectors are shown in Table 2B, for each line of Table 1, as a series of decimal occurrence values. Thus, for example, a "delimiter occurrence vector" for the delimiter ƀ event is depicted in the first line of Table 2B. Similarly, the event occurrence vector for the letter T is depicted at the second row of Table 2B, etc.

Table 3 depicts a sentence layer 1 for the sentence "THIS IS A TEST". The symbol "." is used as the delimiter symbol to delimit phrases. The first occurrence of "." is implied, forming the initial leading delimiter for the word layer. A number of different types of delimiters may be assigned to each layer (e.g., "."; ","; ";"; etc.) and can be selected as desired by the user. The possible occurrence value at which each delimiter occurs in layer 0 is used as an implied line pointer to layer 1. The line pointer is formed by assigning a value corresponding to the relative position of the events in line 0 of Table 1 and adding thereto a bias. The implied pointers of 1, 2, 3, 4 and 5 are depicted at the bottom of Table 3.

Consider now an example of the sequence of operation required in layering the phrase ƀ THIS ƀ IS ƀ A ƀ TEST. Considering the examples of Tables 1 and 3, in an actual example of the system, the first delimiter ƀ is implied and not physically present in the input stream. A line or event counter is used to keep track of each new event for each different layer. In addition, an event-time clock for each layer is provided for identifying event-times, or possible occurrence values.

Initially, the line and event-time clocks for each layer are initialized by setting them to 0. The lowest layer, layer 0, is tagged with event names, in this case the binary representation of the character assigned to the line. This is not done with higher layers.

The implied delimiter ƀ is the first possible occurrence value encountered in the input phrase. Since this is not present in layer 0, the ƀ is assigned to the next available line, line 0, by the line counter. The first delimiter occurrence is marked by placing a binary in column 0, line 0 corresponding to the state of the event-time clock and the line counter. The line counter and the event-time clock are then incremented by 1. The event-time clock now identifies event-time 1, and the line counter identifies line 1.

For each event line, zeroes are used to fill in the positions in which a 1 is not entered.

The next event to be encountered is the T in the word "THIS". Accordingly, a 1 is entered at line 1, column 1, corresponding to the 1 states of both the event-time clock and the line counter. The event-time clock and the line counter are then incremented by 1. This operation continues until the "ƀ THIS" has been entered in layer 0. The next event to be encountered is the end delimiter ƀ. The line counter is then reset to 0 and at this time the event-time clock is at 5. Accordingly, a 1 is entered at line 0, column 5. The complete word event ƀ THIS ƀ has now been entered on layer 0 and is to be processed on word layer 1. The first occurrence of the "." phrase delimiter is implied and is therefore entered at line 0, column 0, corresponding to the event-time clock and line counter for layer 1. The event-time clock and line counter for layer 1 are incremented by 1 and a 1 is entered at column 1, line 1, corresponding to the word THIS.

Next the series of input "IS ƀ" are encountered. First letter layer 0 is checked to see if there is an event line in existence for each of the characters IS ƀ. Since the events, I, S, Ɓ have previously occurred, but not in that order, only the event-time clock is incremented for each of these events and the line counter is appropriately positioned to identify the lines corresponding to each of these events.

A new event line is not added to layer 1 if the event has already occurred. Rather, only an occurrence mark is added at the appropriate column of the line corresponding to the event. A sequence of events between two delimiters is not added to the same event layer a second time if an implied pointer exists to a higher layer. Instead, the series of events between the two delimiters will be represented and entered in the layered system as an occurrence mark on the next higher layer, and nothing needs to be done on the lower layer.

To be explained in more detail hereinafter, the DPM system of FIG. 1 implements the layering concept by representing data, not in lines and columns, but by occurrence vectors which represent event-time by actual occurrence values.

B. Iso-entropicgram Techniques

Information is not stored in the DPM system directly in the event-time form shown on Tables 1 and 3, but is translated into a special compacted form. The compaction is referred to herein as iso-entropic compaction. Specifically, an occurrence vector or a word of information is repesented by a given line value and a given line number. Each given line value and line number has a set of equivalent line values and line number values which include the given line value and line number. Each equivalent representation has the same information content. Each line value represents at least one digitally coded actual occurrence value out of a set of possible ones. Each line value is related to another in the same set by an exclusive OR of the values thereof and the values thereof relatively shifted. The set of equivalent line values form an iso-entropicgram.

The representations in the set are of various lengths when leading 0's are disregarded. The shortest one is referred to as the "seed". Most retrieval operations from the DPM system, along with the operations that change or modify the data base, are carried out directly on the seed and therefore are very efficient compared to conventional data base techniques.

Table 4-A gives an example of an iso-entropicgram using binary 1's and 0's. Each line represents one of the representations of the complete set. The input line is depicted at the top of line 0. Referring to the input line, it will be seen that there are actual occurrence values 0, 1, 2, 4 and 6. Each line, moving down in the iso-entropicgram, is formed by shifting the binary bits of the preceding line in the iso-entropicgram by 1 bit position to the right and exclusive ORing the bits (or values) of the unshifted line with the shifted line. The "exclusive OR" is referred to herein as an XOR. An XOR operation on binary coded information is a bit by bit half-add with a deletion or truncation of those resultant bits which, as a result of the shift, exceed the number of bits in the original unshifted line. In this case, the binary bits that are truncated are those to the right of the largest event-time or possible occurrence value 7.

Refer now to Table 5 and consider in detail the way in which line 1 is formed from line 0 of Table 4-A. The top two lines of Table 5 depict line 0 unshifted and line 0 shifted to the right by 1 binary bit. The vertical line indicates the point at which truncation occurs. The remaining bits of the shifted and unshifted line 0 are XOR'd resulting in line 1 of the iso-entropicgram. This process is repeated, using line 1 to form line 2, and using line 2 to form line 3, etc. It will be seen that after a number of lines equal in number to the number of bits in the input line have been generated, the next line to be generated is the input line, also referred to as the output line. Note for example that lines 0 through 7 of Table 4-A are each different, whereas line 8 is the same as line 0, the input line. The iso-entropicram is closed on itself, lines 0 and 8 being identical.

The process of going from one line to another in the same iso-entropicgram is referred to herein as "revolving".

One limitation imposed on the iso-entropicgram is that the number of bit positions, i.e., the width, must be an integral power of 2 (e.g., 1,2,4,8,16, etc.). It will also be found that in an iso-entropicgram, one can look down through the columns and pick any number of columns which are an integral power of 2 and the bits in these columns will repeat every integral power of 2 lines. By way of example, columns 0 and 1 repeat at line 2; columns 0, 1, 2 and 3 repeat at line 4; columns 0, 1, 2, 3, 4, 5, 6, and 7 repeat at line 8; etc.

It will further be seen that as the lines of an iso-entropicgram are formed, past occurrence information appears to progressively sweep across the iso-entropicgram, influencing representation of later information. The sweeping in the iso-entropicgram of Table 4-A appears to sweep to the right. For example, at line 7, the information in line 0, column 0, has interacted with every column to the right and, in fact, all columns have interacted with columns to their right.

Table 6 illustrates this point by using, as the input line, the basic iso-entropicgram pattern created by a single binary coded bit of occurrence information. The basic pattern depicted in Table 6 has been named the "delta" pattern, partly because of its rough similarity to delta modulation and partly because the physical shape outlined by the 1's appears like the delta symbol. The iso-entropicgram produced in Table 6 is actually a result of the interacting patterns produced by the delta's position at the input line.

Another example of the delta interaction is depicted in Table 7 which shows an iso-entropicgram with the 0's left out for clarity. Here it will be seen that the deltas are outlined; therefore their interference occurs at line 4. The interference pattern produced by the interaction of these deltas has similar properties as those of an optical halogram. Thus, in an optical hologram, each point is the combined result of a reflected beam whose intensity and path distance is a function of the scene reflecting the beam. The recorded intensity at each point is a result of the combined intensities of the two beams and the phase displacement between them caused by the reflected beam's path length.

Similarly, the information at each point in the iso-entropicgram of Tables 6 and 7 is the result of two information intensities (binary 0 and binary 1) and the phasing between them. At each point, past information is analogous to the optical hologram's reflected beam, and the present information to its direct beam.

Information stored in the iso-entropicgram is highly redundant. Thus each line of te iso-entropicgram forms one representation of a complete set of equivalent representations. All lines form the complete set. Each line represents a new encoding or transformation of the input line. Additionally, it has been found that large sections of the iso-entropicgram can be eliminated but the entire iso-entropicgram can be reconstructed from the remaining bits and pieces, using the interrelations of the lines and columns.

As discussed above, lines 0 and 8 of the iso-entropicgram of Table 4 are identical in form. One can generalize by saying that if line 0 is the input line, line 0 + 2N is the output line which is identical to form to the input line, where 0 + 2N is equal to the number of bits in the input line.

The purpose of utilizing the iso-entropicgram techniques is to replace the input line with another representation (line) which is equal to but preferably shorter in length than the input line. The seed line is the one which can be represented with the minimum number of bits eliminating leading 0's. Referring to Table 4-A, it will be seen that the seed is line 2, where only four occurrence values, namely, 0 through 3, are needed to represent the information since the rest of the bits to the right ar 0. The seed than represents a minimal encoding for the iso-entropicgram. In the iso-entropicgram, the seed then is the one with the least number of possible occurrence value positions required to represent all occurrence values.

If all binary positions in a line are called the possible occurrence values and each 1 is called an actual occurrence value, it can be said that the iso-entropicgram involves:

1. Grouping strings of actual occurrence values into lines and grouping the lines into a set. All lines in the set are equivalent and interrelated. According to the preferred embodiment of the present invention, each line in the set is related to another by shifting the occurrence values of the line one place and XORing the shifted and unshifted lines, deleting those shifted values which go beyond the width of the iso-entropicgram;
2. All lines of the set are unique, that is, no line is repeated;
3. The set of lines is closed upon itself in the sense that by manipulating any one line, the entire set of lines can be repeated, and the set size (number of lines in the set) is predetermined.

The set size or number of lines for a given length of lines can be specified as follows:

N (number) = number of possible occurrence values per line and the number of lines per set. The $\log_2 N$ is an integer.

General techniques are disclosed herein whereby any line of an iso-entropicgram set can be generated from any other line by knowing the line to be used as the reference and, secondly, the number of lines between the line to be used and the input line.

Since the transmission of any line of the iso-entropicgram set before eliminating leading 0's carries the same information and requires the same number of bits, the set is iso-entropic. In terms of information theory each line has the same entropy. Using seed finding techniques disclosed herein, it is possible to select a line that will represent the input line with fewer occurrence values and hence the entropy is reduced. As a result, information representation may be stored or transmitted more efficiently.

The lines in an iso-entropicgram can be derived from any other line without resort to a line by line revolve. Using for example, the line by line revolve, the seed line is revolved to the input line by revolving the seed through the number of lines of the iso-entropicgram which are necessary to generate the input line. For example, in Table 4-B, a revolve of 9 lines from the seed line 7 will generate the input line 16.

According to one preferred embodiment of the invention, means is provided for generating the input line without generating each of the lines in between the seed line and the input line. According to the preferred embodiment of the present invention, this is done by determining the number of lines required to generate the input line and breaking this number down into its component powers of 2, going from the largest possible to the smallest possible component power of 2. One XOR operation is then performed using each of the component powers of 2 to move from the seed line to the input line. In each XOR operation a given line is shifted to the right by the number of bit positions (possible occurrence positions) identified by the corresponding component power of 2. The shifted given line is then XOR'd with the unshifted given line.

The example of Table 4-B requires a revolve of nine lines to rotate the seed line to the input line. Breaking 9 into its component powers of 2, going from the largest to the smallest, the component powers are 8 and 1. Table 4-D top line shows he seed line unshifted. The next line of Table 4-D shows the seed line shifted with respect to the first line by 8 bits. The third line shows the XOR of the first two lines. In this step, then, the seed line has been revolved from line 7 to line 15. (CF line 15 of Table 4-D). The remaining component power of 2 is 1. Accordingly, the third line of Table 4-D, line 15 of the iso-entropicgram, is right shifted one bit position and XOR'd with itself to generate the input line 16.

Another revolve technique is disclosed herein for generating any line of an iso-entropicgram directly from any other line of the same iso-entropicgram without generating the intervening lines. This may be done by a process of revolving which involves a shift and XOR of the given line of an iso-entropicgram. The number of positions of shift is determined by one of the lines of the delta of Table 6. Basically the process involves:

1. Determining the number of lines in the corresponding iso-entropicgram by which the given line is to be revolved;
2. Generating the line of the delta whose number is equal to that of the number of lines to be revolved;
3. For each occurrence value in the selected delta forming at least partially an individual representation of the given line and aligning the representations of the given line with one end aligned with the corresponding occurrence value of the selected line of the delta;
4. XORing the thus aligned occurrence values of the given line eliminating those shifted occurrence values outside of the iso-entropicgram.

Tables 46 and 47 depict such an example. Referring to Table 47, assume that the given line is line 0. It will be seen that the sixth line in the iso-entropicgram from the given line is line 6. Referring to Table 6, delta line 6 contains occurrence valus 0, 2, 4 and 6. Taking the given line depicted at line 0 of Table 47 forming a representation of that line for each of the occurrence values of the delta line 6 and aligning the left hand end with the corresponding occurrence values of the delta line 6 results in the pattern depicted at 0, 2, 4 and 6 in Table 46. XORing the aligned bits together results in line 6 of Table 47. In other words, there are occurrence values at 0, 2, 4, and 6 of delta line 6. The given line is reproduced four times and separate ones of the reproduced lines as shifted 0, 2, 4 and 6 possible occurrence values. The resulting lines are XOR'd together to generate line 6 of the iso-entropicgram, eliminating any shifted occurrence values to the right of the edge of the iso-entropicgram.

Any line can be used as the given line of the iso-entropicgram. The relative distance, i.e., number of lines by which the revolve is to take place, is equal to the desired line number minus the given line number. This difference determines the line of the delta to be used for the process of shifting and XORing. If the desired line is lower in number than the given line, for example a given line of 5 and a desired line of 3, the relative distance is negative. In that event, the width of the iso-entropicgram is added to the negative difference and the result designates the line of the delta to be used. For example, using a given line of 5 and a desired line of 3, one would compute the delta line as follows:

$$3-5=-2;\ -2+8=6.$$

Figure 61:
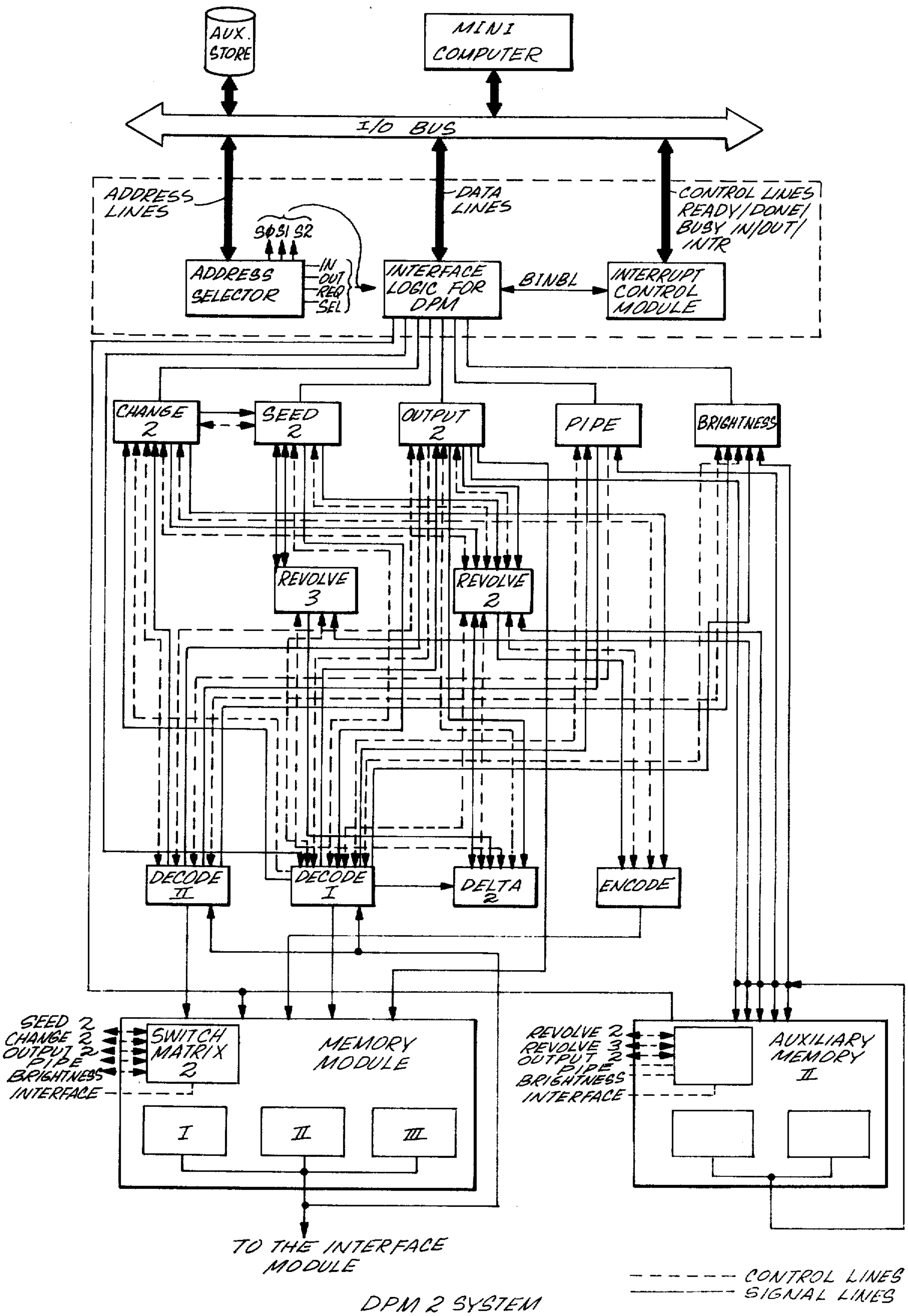
FIG. 61 is a block diagram of an alternate data processing machine (DPM 2)

This general concept is implemented in the alternate DPM system of FIG. 61. However, to facilitate implementation, the process involves a shift and XOR of the delta line rather than the given line which is to be revolved. The process implemented in the DELTA 2 MODULE and the DPM system of FIG. 61 is as follows:

1. Determining the number of lines in the corresponding iso-entropicgram by which the given line is to be revolved;
2. Generating the line of the delta whose number is equal to that of the number of lines to be revolved, one such delta line at least partially being generated for each occurrence value of the given line, and aligning each generated delta line with one end of the delta line in alignment with the corresponding occurrence value of the given line;
3. XORing the thus aligned occurrence values of the generated delta line, eliminating those shifted occurrence values outside of the iso-entropicgram.

A more detailed description of the DELTA 2 MODULE implementation is given in the sections of the DELTA 2 MODULE and the REVOLVE 2 MODULE.

To be explained in more detail herein, any line of an iso-entropicgram is completely identified by a line number, a line value and a width (or length) value. The line number is the line number in the iso-entropicgram. The line value represents the actual occurrence values, exclusing 0's to the right of the last 1. The width is the width of the corresponding iso-entropicgram which in turn is the length of any line of the iso-entropicgram including 0's on the right.

For example, using this form of expression, the seed line of Table 4-A can be represented as line number of 2, line value of 1101 and width of 8. To be explained in more detail, the actual embodiment of this invention operates an actual occurrence value expressed in binary coded decimal rather than lines and columns of 1's and 0's. Using this form of expression the above line value becomes 0, 1, 3.

C. Changes

Changes to a data base consist of insertions, deletions and the addition of new information. Deletions remove actual occurrence values from event occurrence vectors. An insertion adds an actual occurrence value to one or more event occurrence vectors and, if necessary, actual occurrence valus are shifted to allow for insertion. New additions to a data base add new actual occurrence values to existing event occurrence vectors or add entire new event occurrence vectors.

In accordance with a preferred embodiment of the present invention described hereinafter in connection with the CHANGE MODULE, changes in the event occurrence vectors are made directly to the seed line of an event occurrence vector. In other words, it is not necessary to revolve an event occurrence vector back from its seed line to the input line of its iso-entropicgram. Tables 9-A and 9-B illustrate the sequence of operation for changing a hypothetical event X. Line a of Table 9-A depicts the occurrences of X in absolute decimal coded form. Lines *b* and *c*, respectively, depict deletions and insertions. Thus, occurrence values 6 and 12 are to be deleted and occurrence values 1, 3, 8, 9 and 11 are to be added to the event X depicted at line *a*. The change vector incorporating all the insertions and deletions is depicted at line *d* of Table 9-A. The change vector includes all of the occurrence values for the deletions and insertions sorted in an increasing incremental order from left to right. A change operation takes place by XORing the change vector and the event occurrence vector to be changed. If lines *a* and *d* to Table 9-A are XORed the result is as depicted at line *e*. It will be seen that line *e* includes all of the actual occurrence values depicted at lines *a* and *d* with the common occurrence values 6 and 12 deleted. It will be recognized that the XOR just described was described with both the event X and the change vector at their 0 or input line for their corresponding iso-entropicgrams.

Assume now that the vector X is at its seed line as depicted at *g* in Table 9-A. The seed of X is at line 6 of its iso-entropicgram. According to the preferred embodiment of the present invention, the change vector is revolved through its iso-entropicgram until it is also at line 6 in its iso-entropicgram. Line *h* of Table 9-A depicts the change vector at line 6 of its iso-entropicgram. According to the present invention the line values of X and the change vector depicted at *g* and *h* are then XORed providing the result indicated at line *i*. Referring to *i* of Table 9-A. the XOR results in the same line number, namely, line 6, with a line value of 0,1. Table 9-B shows the iso-entropicgram for the input line depicted at *e* of Table 9-A. It will be seen that when the input line (line 0) of Table 9-B has been revolved to its line 6, its actual occurrence values are indeed 0 and 1 which is the same as that depicted at line *i* in Table 9-A. Using the revolve techniques described hereinabove, the resultant value depicted at *i*, according to the present invention, is then revolved until its seed line is found.

With reference to Table 9-B, it will be seen that the seed is at line 5. Accordingly, line 6 depicted at *i* of Table 9-A and 6 of Table 9-B, is revolved forward 15 times until it arrives back at line 5 of the same iso-entropicgram, as depicted at the bottom of Table 9-B. Line 6 plus 15 additional lines is line 21. Subtracting out of 16 (the total lines in the iso-entropicgram) leaves line 5 which is the seed line. Thus, the new seed line number 5 has a line value of 0.

Significant to the present invention, it should be noted that in the aforegoing example the changes involve five insertions and only two deletions. Even though the insertions and hence information content increased, it resulted in a net reduction in the seed. In other words, the seed event X contains three occurrence values in its line value whereas the line value for the final seed contains only one occurrence value. This occurs because the seed is a representation formed by information interference patterns which are not controlled by the quantity or the number of occurrence values. The patterns are only influenced by the relationship between the occurrence values. As a result it is possible for a data base to shrink in size with added information.

D. Verifying Presence of Occurrence Value at Input Line

As described above, Table 6 depicts a delta. The delta of Table 6 is the same width as the iso-entropicgram of Table 4-A. A delta is formed by placing a 1 at possible occurrence value 0 as the input line and revolving it until the original input line is formed using the desired iso-entropicgram width.

The delta can be used to verify the presence of an occurrence value (i.e., a 1) at the input line of an iso-entropicgram without actually generating the input line.

The verification process may be accomplished using pencil and paper by physically inverting the delta from top to bottom aand from side to side. Thus, the delta of Table 6 inverted becomes that depicted in Table 9-C. Next, the lower right-hand tip of the delta is positioned over the possible occurrence value column of interest at the output line. Next, the line of the inverted delta that coincides with the line of the iso-entropicgram which is going to be used for the test are ANDed together. The resultant line is then XORed. If the result of the XOR is a 1, an actual occurrence value is present at the input line in the possible occurrence value column of interest. If the result is 0, an occurrence value is not present.

Although the foregoing method is accurate and useful using paper and pencil, the present invention embodies concepts similar to the foregoing in a more practical embodiment. In the actual embodiment of the invention it is possible to have a seed expressed as a line number, a line value, and an iso-entropicgram width to determine whether the input line of the corresponding iso-entropicgram has any particular desired occurrence value and this can be done without revolving the seed back to the input line. Usually the line to be used for the checking process is the seed line. Therefore, the description of the embodiment of the invention will be described assuming that the line to be used as a basis for the test is the seed line.

Referring to the inverted delta, it will be seen that the numbers of positions between adjacent "1's" is an integral power of 2 for lines 0, 2, 4 and 6. For example, line 2 has 1's separated by two positions, whereas line 4 has 1's separated by four positions. Because of this characteristic of the delta, it is quite easy to generate occurrence values representing the occurrence values which are present in the lines of the delta which are component powers of 2. To this end, the seed line which is to be used as a basis for a test is first revolved in its iso-entropicgram until it is at the line which is an integral power of two lines away from the input line. Using Table 4-A by way of example, seed line 2 when revolved two lines to line 4 is an integral power of 2 (namely, 4) away from the input line.

Referring to the inverted delta of Table 9-C, it will be seen that line 4 contains occurrence values at 3 and 7. Thus it should be evident that the number of possible occurrence values separating the actual occurrence values in the delta (for those lines which are integral powers of 2) is equal to the line number. Thus, applying the inverted delt of Table 9-C to the iso-entropicgram of Table 4-A, assume that it is desired to determine whether occurrence value 6 is present in the input line. Applying line 4 of the inverted delta of Table 9-C to line 4 of the iso-entropicgram of Table 4-A, occurrence value 6 is present in the inverted delta line of Table 9-C, whereas it is absent in the iso-entropicgram line of Table 4-A, whereas four places to the left of the occurrence value 6 (of interest), the inverted delta contains an occurrence value aand so does the iso-entropicgram of Table 4-A. Tables 9-D and 9-E depict these operations.

The foregoing method for determining the presence of an occurrence value at the input line using one of the non-input lines of the iso-entropicgram is referred to herein as the DEL function. The actual method whereby the embodiment of the present invention carries out the DEL function is describe in more detail in connection with the section describing the OUTPUT MODULE.

E. Hybrid Coding

The disclosed embodiment of the present invention involves a further compaction technique in which the occurrence vectors are represented in a hybrid encoded form. Information is stored in the MEMORY MODULE in hybrid encoded form. Thus, considering the iso-entropicgram technique used to represent a particular occurrence vector, the present invention involves a technique which picks the line of the iso-entropicgram which in hybrid coded form is the shortest, not necessarily the one which is shortest in the unencoded form.

The reason for selecting the shortest hybrid coded iso-entropicgram representation for the seed is to enable the shortest or smallest memory space to be used for storage. Referring now to Table 8, the possible occurrence values are depicted, and immediately below, the corresponding binary bits representing an occurrence vector are depicted at 1.

Up to this point, the occurrence vectors have been primarily described in what will be termed bit string form. In other words, a binary 1 or a binary 0 is used to represent the presence or absence of actual occurrence values. This form of representation is depicted at line 1 in Table 8. Line 2 of Table 8 depicts the same information in a binary coded decimal form called absolute code form. Thus, bit string form for the information of Table 8 requires 8 digits, each with 1 binary bit, for storage, whereas absolute code form requires five digits, each with 3 binary bits, for storage.

Each digit in bit string form requires only one binary bit for storage, whereas each of the digits in absolute form requires three binary coded bits. However, if the number of blanks or 0's between two binary ones (occurrences) becomes large, it will be seen that a point will be reached where it will be shorter and save memory space to represent the information in absolute form. Stating it differently, the distance between the binary 1's in the bit string form determines whether bit string encoding or absolute encoding will give the best compaction and hence the shortest length of information to be stored.

By way of example, in a very wide iso-entropicgram, the distance between two event-times or occurrences may be great. For example, one occurrence value may be 5 and the next 2,673. In this case, absolute encoding should be used since it requires much fewer binary coded bits of information for storage. If the distance between event-times is short, and the number of occurrences is therefore frequent, bit string encoding will be better.

Accordingly, the present invention involves a technique where a hybrid encoding is used. A brief description of the hybrid encoding will now be given since it is an integral part of a preferred embodiment of the seed determination process.

Table 9 depicts in hybrid code an example of the most significant six words of storage for an occurrence vector containing occurrences at event times 87, 88, 90, 93, 100, 114, 116 119, 123 and 125. Each word contains a bit or "flag" at the left-hand end which identifies whether it is a bit string word or an absolute word. A binary 1 indicates an absolute word whereas a binary 0 indicates a bit string word. Disregarding the bit string/absolute form bit at the left-hand of each word, each binary bit string word contains the largest occurrence value at the right-hand end and the smallest at the left hand.

Word 1 is in absolute form and represents 125 with the most significant binary bit at the left and the least significant binary bit at the right (disregarding the bit string/absolute form bit at the left end of the word). Word 2 is in bit string form and has seven binary bit positions representing possible occurrence values 118 through 124 but it only contains actual occurrence values depicted by binary 1's for occurrence values 119 and 123.

During the process of encoding to hybrid code, an occurrence vector in bit string form is scanned backward from the right-hand end as depicted in Table 4-A to the left-hand end from the latest event time or largest occurrence value to the earliest event time or smallest occurrence value, assigning absolute and bit string form to the words for storage in memory. Memories are normally organized so that information is stored in words. As the occurrence values are scanned from the largest to the smallest, absolute and binary form words are assigned so as to give the maximum compaction. Thus, word 1 is in absolute coded form and represents the occurrence value 125. Word 2 is in bit string form and has binary 1's at the second and sixth position in the word, indicating occurrence values of 123 and 119. Word 3 is in bit string form with binary 1 bits at the second and fourth positions, representing occurrence values of 116 and 114. Encoding is changed from absolute to binary coded form when more than seven bits can be saved by switching from bit string form to absolute form. The occurrence value 100 is 14 possible occurrence values away from the occurrence value 114. In the encoding procedure, it is necessary to check the efficiency of changing the forms of representation by calculating the number of bits that are saved. Since there are three possible occurrence values to the left of occurrence value 114 in word 3, three bits are potentially wasted by switching to absolute form, plus, it will require a full word of seven binary coded bits to represent the information in absolute form. Thus a total of 10 (7+3) bits are required for changing to absolute coded form, producing a saving of 4 bits. Therefore, it is desirable to switch from binary form to absolute form. Thus, as depicted in Table 8, word 4 is in absolute form and represents the occurrence value 100.

Occurrence value 93 is seven possible occurrence values from the occurrence value 100. Since seven bits are potentially saved (not more than 7) the form of encoding is not changed and the encoding for the next word 4 will remain in absolute form.

Occurrence value 90 is only three bits away from occurrence value 93. Accordingly, bit string encoding is more efficient and word 6 is in binary string form.

Hybrid encoding is used to store all occurrence vectors in the DPM system. Therefore, although one particular line in an iso-entropicgram may produce the shortest length of occurrences in bit string form, it may be found that another line of the same iso-entropicgram will actually produce the shortest length when converted to hybrid form.

Hybrid encoding is used to encode all of the occurrence vectors sent back to the auxiliary memory for storage and all occurrence vectors read from the auxiliary memory for processing by the rest of the DPM SYSTEM.

Decoding of the occurrence vectors read from the auxiliary memory and processed in the DPM INTERFACE MODULE is accomplished by entering the hybrid coded string of words largest occurrence value first. Information is processed in the DPM SYSTEM in absolute coded form. Accordingly, the DECODE I and DECODE II MODULES depicted in FIG. 1 translate all hybrid coded information transferred from the auxiliary memory into the MEMORY MODULE into absolute coded form for processing by the DPM SYSTEM. Similarly, the ENCODE MODULE translates all processed information in the DPM SYSTEM from absolute form back to hybrid coded form for storage in the MEMORY MODULE and subsequent transfer back to the auxiliary memory. The details for performing encoding and decoding in the ENCODE and DECODE MODULES will be described hereinafter with respect to each of these modules.

F. Conventions and Components Used in the Figures

Each of the modules has control input/output lines (narrow lines) and information input/output lines (heavy lines). By way of example, the ENCODE MODULE shows these lines along the right hand side of FIG. 3. The narrow lines used to represent each control input/output line represent a single conductor. Each heavy line represents 8 conductors for carrying 8 binary coded bits of information in parallel. Arrows to the left indicate incoming signals to the corresponding module whereas arrows to the right indicate outgoing signals.

Symbols are shown at the tail of each arrow representing each incoming control input/output line. Each of these symbols not only uniquely identifies each line, but identifies the source of module from which the signal for that line originates.

The convention employed is to use one or two letters followed by one or more numbers. The letters identify the originating module and the number gives a unique identification to the line. For example, FIG. 3 of the ENCODE MODULE shows the symbol SM2 for the top line. The signal for that line originates in the SEED MODULE. Table 10 gives a list of the letter symbols and the corresponding module. Some control input/output lines have identifying symbols which do not follow this convention and the originating module is identified.

Outgoing control input/output lines (arrows to right) are also labeled. They symbols on the left (tail of arrow) are logic representing the logical equations for gates used in generating the signal on the outgoing line. A symbol is used at the arrowhead to identify the line as it leaves and enters other modules. For example, in the ENCODE MODULE, the logic P9 represents a gate used to generate a logic signal on the line EW1.

Gating is shown in block diagram in some instances and in others, logical equations are used to represent the gating for simplification. Standard symbols are used in the logical equations. Thus, a "+" represents an "OR" condition; a "." represents an AND condition; and symbols representing the outputs from flip flops, gates, register, counters, etc. are used as the terms in the equations. By way of example, logical gating is depicted in the ENCODE MODULE, FIG. 4 to reset the flip flop EFRST to 0. The logic is: P5.G.EFRST.$\overline{CLK}$. The gate represented by this logic is true when true signals are formed at each of the outputs indicated in the equation. This, of course, illustrates an AND gate with each of the indicated outputs as inputs to an AND gate. The logic P10.G+P7.GE+P11.Co for flip flop P2 represents three AND gating conditions combined by two OR gating conditions.

Flip flops are extensively used throughout this patent application. One type of flip flop used extensively employs a type SN7474 positive edge triggered D-type flip flop disclosed at page 121 of the book entitled *The TTL Data Book for Design Engineers,* published 1973 by The Texas Instruments Co. Each of these flip flops is identified by a rectangular box with a line in the upper left hand corner, such as that shown for flip flop P12 of FIG. 4. Each of these flip flops is characterized in that an input exists at the top side and one at the bottom side and two inputs exist at the left hand side. Also, each has a pair of complementary outputs at the right hand side, the upper one of which has the same symbol as the flip flop (i.e., P12) and the lower one of which has a line over the top referred to as prime (i.e., $\overline{P12}$). These flip flops operate as follows. A true signal applied at the top side (without clock) sets the flip flop to a 1 state, causing true and false signals at the unprimed and primed outputs, respectively (i.e., P12 and $\overline{P12}$). A true signal applied at the bottom side sets the flip flop (without clock) to a 0 state causing false and true signals at the unprimed and primed outputs, respectively (i.e., P12 and $\overline{P12}$). The lower left side input of these flip flops is for clock, and the upper left side input is for control of the state into which the flip flop is set responsive to clock at the lower left hand side input. A true signal at the upper left side input causes the corresponding flip flop to be set to a true state responsive to a simultaneously applied true clock pulse at the lower left side input, and a false signal at the upper left side input causes the corresponding flip flop to be set to a false state responsive to a simultaneously applied true clock pulse at the lower left side input.

To simplify the drawings, the outputs on the right side of flip flops are not always shown as they are for flip flop P12. For example, see flip flop P1 of the ENCODE MODULE. However, the unprimed and primed outputs are always implied and will be used at various places in the system. For example, the P1 output of flip flop P1 is not shown on the right of flip flop P1, but it is shown in the logical equation P1 GE for controlling the upper left side input to flip flop P1.

Similar to the control input/output lines and the information input/output lines, heavy connecting lines are used throughout to designate multiple signal conductors whereas a thin line represents a single conductor.

Selection circuits are used throughout the system. By way of example, the ENCODE MODULE has selection circuits EDS1–EDS7. The selection circuits each have two or more labeled multi-bit information input circuits, each input circuit for receiving multiple binary coded bits of information, and one multi-bit output for receiving the same number of bits as an information input. The information input circuits are labeled directly on the outside of the box such as EDS1–EDS7 of the ENCODE MODULE. In some cases, the labels are implied such as for selection circuit DS1 of the DPM INTERFACE MODULE where the label is implied to be the same as the originating circuit of the information signals. Also, each selection circuit has a control input corresponding to each of the information inputs which is correspondingly labeled inside of the box. A true signal at the correspondingly labeled control input causes the selection circuit to couple only those signals at the correspondingly labeled information input to the output circuit. By way of example, in the ENCODE MODULE, a true signal at the 1 side control input of selection circuit EDS1 causes the output of register 104 to be coupled through EDS1 to the left input of the ALU.

Various modules also have an arithmetic logic unit ALU of the type SN74181 disclosed at page 381 of the above TTL book. An ALU is shown by way of example in the ENCODE MODULE, FIG. 2. The arithmetic unit ALU is characterized in that 8 bit signals coded in the 1, 2, 4, 8 binary coded number system applied at the inputs #1 and #2 enable ALU to form 8 bit signals, coded in the same number system, at an output OP. A true signal applied at the ADD input causes a signal at the output OP representing the sum of the two coded signals applied at #1 and #2. Whereas, a control signal applied at the SUB input causes a signal at OP, representing the difference between the signals at #1 and #2 in 2's complement form.

The arithmetic unit ALU has additional outputs G, L and E. A true signal is formed at the G, L and E outputs, respectively, when the number represented by the coded signal at #1 is "greater than" (>), "less than" (<), and "equal to" (=) than at #2.

The ALU design shown here is for a 4 bit chip. However, it could be generalized into larger groupings. In all likelihood, larger capacity ALU's (e.g., 24 or 32 bits) would make use of type SN74182, look ahead carry generators, of the above TTL book. However, these are not necessary for an 8 bit wide ALU.

Figure 6:
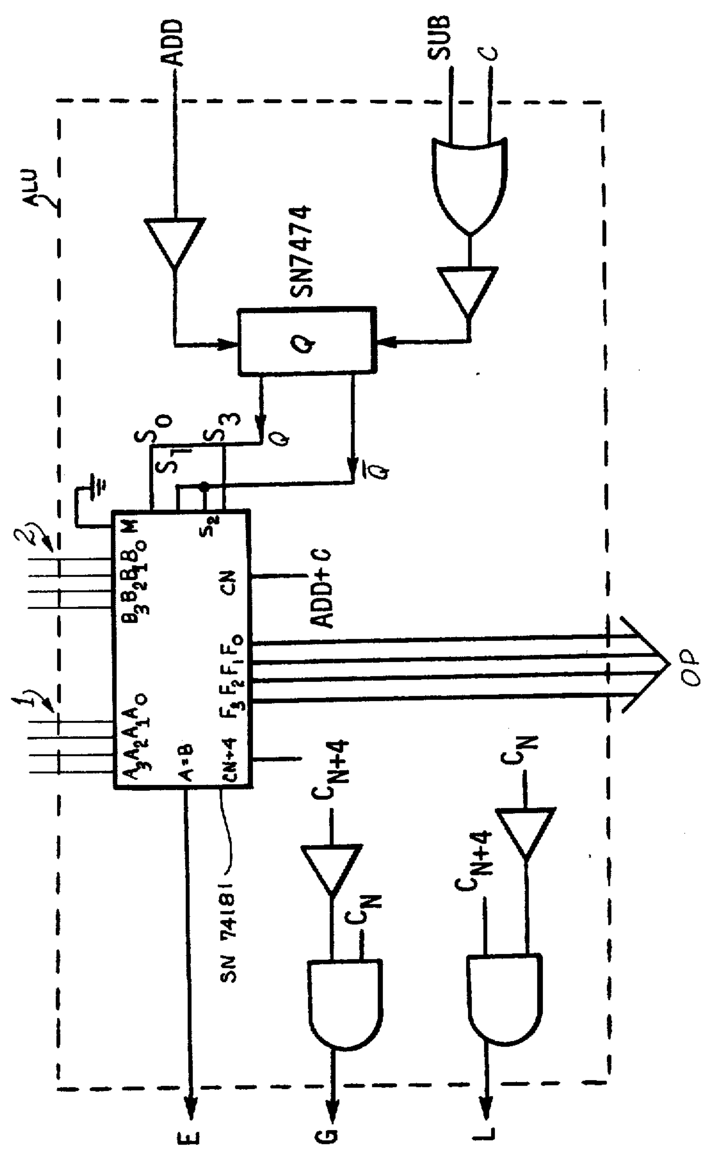
FIG. 6 is a schematic and block diagram of the ALU used in various modules in the DPM SYSTEM.

It will be obvious to those skilled in the art that minor circuitry peripheral to the SN74181 is required to receive the true signals and provide the output signals shown and described with reference to the ALU and these circuits are depicted in the block diagram of FIG. 6.

Some modules have unprimed inputs (i.e., EOFI of FIG. 17), whereas a primed form (i.e., $\overline{EOFI}$) is used in the module. The prime form (i.e., $\overline{EOFI}$) merely indicates the logical inverse of the unprimed form which is formed by conventional signal inverter circuits. Signal inverter circuits are not always shown but are implied in some instances (as for example, $\overline{EOFI}$ in FIG. 17).

Although specific hardware is disclosed for various modules in the DPM system, it should be noted that the modules might also be implemented using micro programmed mini computers with appropriate firmware programs.

I-A. GENERAL ORGANIZATION OF DPM SYSTEM OF FIGS. 1-34

Reference should be made to FIG. 1 in the following discussion.

The DPM SYSTEM has a MINI COMPUTER and a DPM INTERFACE MODULE. The MINI COMPUTER may be any one of a number of mini computers well known in the art, a micro-programmed computer or a specially designed computer. For purposes of illustration the PDP 11/45 with floating point arithmetic units is disclosed by way of example. Included therein is a MAIN MEMORY and an OPERATOR CONSOLE with typewriter and printer input and output. The MINI COMPUTER contains a user program which supervises and sequences the operations of the entire DPM SYSTEM. The DPM INTERFACE MODULE provides the interface between the MINI COMPUTER, an auxiliary memory for the MINI COMPUTER and the rest of the DPM SYSTEM. The DPM contains an IPRF which is a set of registers in which the MINI COMPUTER stores parameters to be used as input by the other modules in the system as discussed more fully in connection with each module. The MINI COMPUTER through the DPM INTERFACE MODULE also stores information in the MEMORY MODULE for processing by the rest of the modules. The information stored in the MEMORY MODULE is in the form of hybrid coded occurrence vectors. The DECODE I and II MODULES decode all hybrid coded signals from the MEMORY MODULE to absolute coded value signals and the ENCODE MODULE encodes all signals being stored in the MEMORY MODULE from absolute coded value signals to hybrid code. The exception is with respect to information signals transferred between the MINI COMPUTER or the DPM INTERFACE MODULE and the MEMORY MODULE.

The MINI COMPUTER causes an occurrence vector, in the form of a given line value of an iso-entropicgram, to be sent from the MAIN MEMORY to the MEMORY MODULE via the DPM INTERFACE MODULE. A REVOLVE MODULE reading from the MEMORY MODULE through the DECODE I and II MODULES writes into the MEMORY MODULE through the ENCODE MODULE and causes the given line value and line number to be revolved through various lines in the corresponding iso-entropicgram. The seed is formed using the SEED MODULE. Specifically, the REVOLVE MODULE revolves a given line, under control of the SEED MODULE, through its iso-entropicgram. The ENCODE MODULE determines the physical length of each encoded line of the iso-entropicgram as it is stored in the MEMORY MODULE. The SEED MODULE keeps track of the length of the shortest line and identifies the area in the MEMORY MODULE that stores the shortest line.

The SEED MODULE during the seed finding process forms signals representing the number of line revolves which must take place to locate the seed line. This signal, called the total number of lines signal, is sent to the DELTA MODULE which forms one or more signals representing the component powers of 2 of the total number of lines signal. The component powers of 2 signals are provided one by one to the REVOLVE MODULE which in turn revolves the given line by that number of lines. The input line of an iso-entropicgram is retrieved from the seed line, or any other line, in a reverse sequence of operation. More specifically, the REVOLVE MODULE under control of the OUTPUT MODULE revolves the seed line until the input line is formed. In this case the OUTPUT MODULE forms a signal representing the total number of lines required to revolve the seed to the input line. The DELTA MODULE receives the total number of lines signal and forms one or more signals representing its component powers of 2. The REVOLVE MODULE again revolves the seed line by the amount specified by each component power of 2 signal until the input line is reached.

Data is entered in the existing data base by adding, changing or deleting. This is generally referred to as the update function. The update function is taken care of by the CHANGE MODULE.

When a seed is to be updated, the MINI COMPUTER enters the changes, etc. into a word referred to as the "change vector". The CHANGE MODULE first gets the occurrence vector in seed form from the data base. Using the DECODE I and II and ENCODE MODULES for communication with the MEMORY MODULE, the REVOLVE MODULE revolves the change vector seed back to the same line of its iso-entropicgram as the seed. The change vector is then merged with the seed using the XOR operation discussed above.

The OUTPUT MODULE is provided primarily for the retrieval process of revolving a seed or other line to the input line of its iso-entropicgram. However, the OUTPUT MODULE also causes the DEL function to take place. The purpose of the DEL function, as discussed above, is to determine if a particular occurrence value exists at the input line of an iso-entropicgram given the seed line. Significantly, the DEL function allows this to be checked very rapidly without having to revolve the seed line back to the input line.

The OUTPUT MODULE has a special clipping function which allows the DPM SYSTEM to recall an occurrence vector from the data base and retrieve just a specified portion of the occurrence vector. For example, one might want to know how many times the word "help" occurred between occurrence event times 2,000 and 2,832. To be explained in more detail, the numbers 2,000 and 2,832 would be entered into the OUTPUT MODULE as lower and upper clipping bounds, allowing the event "help" to be retrieved only for those occurrences which lay between 2,000 and 2,832.

The PIPE MODULE and BRIGHTNESS MODULE perform a discrimination function in the DPM SYSTEM. This does not have anything to do with the data base managing functions. Significantly, the PIPE and BRIGHTNESS MODULES allow near miss retrievals. In other words, they allow inexact retrieval of information from the data base.

Both the piping and brightness functions of the PIPE and BRIGHTNESS MODULES work on a sequence of events between delimiters. These delimiters could be any level delimiters. The PIPE MODULE is presented with a sequence of events which make up the user request. Each event is retrieved from the data base and compared against the others in the request. The object is to find if the same sequence of events has occurred between any two delimiters in the layer in question. The output of the PIPE MODULE consists of two values for each logical entity in the layer as follows:

1. A starting value, and

2. A numerical value which gives the number of occurrences of events that appeared in the data base from the request.

If the sign bit of the numerical value is "1" (true), this indicates that the request occurred exactly somewhere between the specified delimiters. The aforegoing is primarily the piping function.

The brightness function improves on the piping function. For example, the piping function chooses the best candidate for brightness. The brightness function then chooses the best possible candidate.

Essentially, the brightness function takes the starting value within a logical entity which is received from the PIPE MODULE and then takes each event from the input request and finds the closest occurrence of the event to this starting value, if one exists. The brightness function then finds this occurrence for each event in the request and the process is repeated for each logical entity which is to be checked. After all the events in the request have been processed, a calculation is made to find the brightness value for the request.

The brightness value can be described considering the following example. Picture the logical entity from the data base and immediately to its left the request. The request is then shifted right, one event at a time, over the data base entries and a value is computed for each shift. The value indicates how close the request lines up with that of the data base. The best value is then passed as an output to the user at the OPERATOR CONSOLE. This value is computed for each logical entity whih has been requested.

The exact way in which the piping and brightness functions work are best understood in connection with each module. Accordingly, reference should be made to the sections XV. PIPE and XVI. BRIGHTNESS MODULE and the software sections XXXII for a more complete description and understanding of these features.

II. ENCODE MODULE

A. General Description

Section I GENERAL DESCRIPTION OF DPM SYSTEM describes hybrid form of coding of the information, with respect to the example in Table 9. The ENCODE MODULE is provided in the DPM SYSTEM of FIG. 1 for the purpose of converting absolute coded occurrence vectors to hybrid coded form and controlling the writing of the hybrid coded occurrence vectors into the MEMORY MODULE.

At the outset, it should be kept in mind that occurrence vectors represent a series of occurrence values out of a larger set of incrementally ordered possible occurrence values or event-times. Occurrence vectors are stored, retrieved and processed such that the highest numbered occurrence value is first. The highest numbered occurrence value identifies the most recent occurrence in the event-time domain. The lowest numbered entry, and hence the entry farthest back in event-time, is stored, retrieved and processed last. Examples of delimiter and event occurrence vectors (in absolute coded form) are shown at "Ђ" and "T" of Table 2. This form of information representation is quite important to an understanding of the ENCODE MODULE embodiment about to be described and with respect to each of the other module embodiments about to be described.

The MEMORY MODULE reads and writes information a word at a time. A word has 8 binary bits of information.

The ENCODE MODULE, in the encoding process, processes each occurrence vector as follows:

The ENCODE MODULE is called each time an absolute occurrence is to be encoded by either the REVOLVE MODULE or the OUTPUT MODULE. The module which calls the ENCODE MODULE is hereinafter called the calling module.

The ENCODE MODULE receives the absolute occurrence values of an absolute coded occurrence vector in decreasing value order. A currently received absolute word and a previously received word in the series are held and compared. The difference between the current and previous absolute values represent the number of binary bits of displacement between them. If the difference is greater than some "specified number of bits" (in this case, 7 bits), then the previous absolute value is outputted in the hybrid word series as an "absolute" word (see word O of Table 9). If the difference is less than this "specified number of bits", the present absolute value is entered as an occurrence into a bit string word (see word 2 of Table 9) of the hybrid series. The latter is accomplished by shifting the bit string word under formation the number of bit positions designated by the difference and entering a bit of predetermined value, i.e., "1", into the bit string word, and the ENCODE MODULE is "exited" by terminating its operation. When a bit string word under formation is complete, it is also outputted. It should be noted that binary bit at the most significant end of each word being outputted is reserved as a type or flag bit to indicate the form of the hybrid word. A "1" bit flag indicates an absolute word whereas an "0" bit flag indicates a bit string word.

The hybrid form to which the absolute occurrence values are encoded is a series of absolute and bit string words starting with an absolute word. An absolute word in itself represents the value of one occurrence by a combination of binary coded signals. A bit string word represents an occurrence value by the number of possible occurrence values of displacement of an occurrence of predetermined value, i.e., "1", from the previous absolute word or from the previous occurrence of predetermined value in the hybrid word series. The first word of each hybrid word series is always an absolute word and therefore in itself, identifies the value of the first and largest occurrence. However, it should be understood that within the broader concepts of the invention, the invention may be employed in a system which is not bound by words, in which case the bit string portion of the hybrid form would not be confined to words.

Another purpose of the ENCODE MODULE is to perform "clipping" and "clipping" by "interval". Clipping is the operation of determining if each absolute word occurrence value lies between a top limit (TL) and a bottom limit (BL). This operation is performed by comparing each absolute word with TL and BL. If the input entry is $<$TL and $\geqq$BL, the absolute word is within desired bounds, and encoding continues and, if not, a corresponding indication is formed.

If "clipping" by "interval" is to be performed, an "interval" value (EI) is provided to the ENCODE MODULE. If the absolute word is not $<$TL and $\geqq$BL, then EI is subtracted from TL and BL, and the same absolute word is again compared with the modified TL and BL values. This continues until BL goes below 0 at which time a corresponding signal is formed or the absolute word is found within the bounds of the modified TL and BL, according to the above criteria, at which time the absolute word is converted to hybrid form, as discussed above. The "clipping" by "interval" function is important under certain conditions when it is needed to know if the input entry is within certain regular intervals, i.e., 45–40 or 25–20, 10–5. The values TL, BL and EI are read by the ENCODE MODULE from the corresponding registers of the IPRF.

B. Components

The ENCODE MODULE includes registers ET, EIR, EI, ER, EO, EHW, ETL, EBL and EOP. Each of these registers contains 8 bits of storage. With the exception of EOP and ER, each register is of type SN74100 disclosed at page 259 of the above *TTL* book and are characterized in that a true signal applied at the L input at the side thereof causes the binary coded signals applied at the upper side input to be applied to the lower output. When the signal at the L input goes false, the information is retained in the register even though the information input signals change thereafter.

The EIR register is shown with two special outputs E*o* and $\overline{Eo}$. True signals are formed at these outputs when the content of the EIR register is 0 and not 0, respectively. It will be understood that an appropriate circuit (not shown) is connected to the SN74100 register for forming these signals. Preferably, the circuit has the "1" output of each bit position connected to the input of a common "OR" gate. The output of the "OR" gate is the $\overline{Eo}$ output, whereas the output of the "OR" gate is connected through an inverter to the E*o* output.

The ER register is a data latch of type SN74116 of the above TTL book and is similar to the SN74100, except that it has a "CLEAR" line which provides a one step clearing operation.

Register EOP consists of a flip flop MSB and a seven bit parallel-in/parallel-out shift register 114 of type SN74199 as disclosed at page 456 of the above *TTL* book. Register 114 is a 7 bit register and is characterized in that parallel loading is accomplished by applying the 7 bits of data at its upper side and making the shift/load (S/L) control input low or false when the CLOCK input is not inhibited, i.e., receives a true signal. A true signal at S/L causes a shift to the right by register 114 responsive to the leading edge of a true pulse at the CLOCK input. A false signal at S/L causes the 7 bits applied at its upper input to appear at the output of the register 114 and be stored therein responsive to the leading edge of a true pulse at the CLOCK input.

Considering register EOP in more detail, a false signal at $\overline{P9}$ causes register 114 to load the input signals applied at the upper side. Typically, a true signal is simultaneously formed at P9·$\overline{BSW}$ to the MSB flip flop. When $\overline{CLK}$ goes true, P9·$\overline{BSW}$·$\overline{CLK}$ becomes true and, being applied to the CLOCK input of the MSB flip flop and the register 114, causes the MSB flip flop to be set true and load 7 bits of information from register EO.

In addition, the ENCODE MODULE has counters MAR3, MLN3, CTR and NOC. CTR has eight states, NOC, MAR3 and MLN3 each have 256 states and are of type SN74161 disclosed at page 325 of the above *TTL* book.

CTR is a 3 bit up/down counter of type SN74191 disclosed at page 417 of the above *TTL* book and is characterized in that a false signal at U/D causes the counter to count up when a true signal is applied to the CT input and a true signal at U/D causes the counter to count down when a true signal is applied to the CT input. The counter can be preset to a value corresponding to the signals applied at its input at the upper side while applying a true signal to the L input. The block indicating CTR contains a circuit not shown, similar to that described for the ER register for forming true signals at the $\overline{Co}$ and C*o* outputs when the state of CTR is 0 and not 0, respectively. The counter CTR counts through its prefixed sequence of eight states and automatically resets to its initial or 0 state.

Each of the MAR3, MLN3 and NOC counters are of type SN74161 of the above TTL book and are controlled to always count upwards. Not shown but included within each box is a logical signal inverter to invert the signal at CLR before it reaches the SN74161. A true signal applied at the CLR (CLEAR) inputs of MAR3, MLN3 and NOC causes them to be cleared or reset to a "0" state. A true signal at the CT input causes the counters MAR3, MLN3 and NOC to count up.

The ENCODE MODULE also has flip flops EFRST, ELAST, BSW, ECE, U/D and MSB. In addition, a control counter 113 has flip flops P1 to P12.

The ENCODE MODULE also has a source of recurring clock pulses 102. The source of clock pulses 102 forms a series of equally spaced (not essential) recurring true clock pulses at its output. The output of source 102 is connected to one input of an AND gate 112 which forms clock signals at CLK whenever the other input to gate 112 is true in coincidence with a clock pulse. A signal inverter 117 inverts the signal at CLK to form pulses at $\overline{CLK}$.

The ENCODE MODULE also has an arithmetic logic unit ALU at #1 and #2 in 2's complement form. Conventional OR gates 108 and 110 are connected to G, L and E so that true signals are formed at a GE output of 108 and a LE output of 110, respectively, when the values of the signals at #1 are "equal to or greater than" (≧) that at #2, and "equal to or less than" (≦) that at #2.

The ENCODE MODULE also has selection circuits EDS1–EDS7 of the type disclosed above. The ENCODE MODULE also includes conventional logical OR gates 104–110, 118 and 119 and an AND gate 112.

C. Detailed Description

Figure 2:
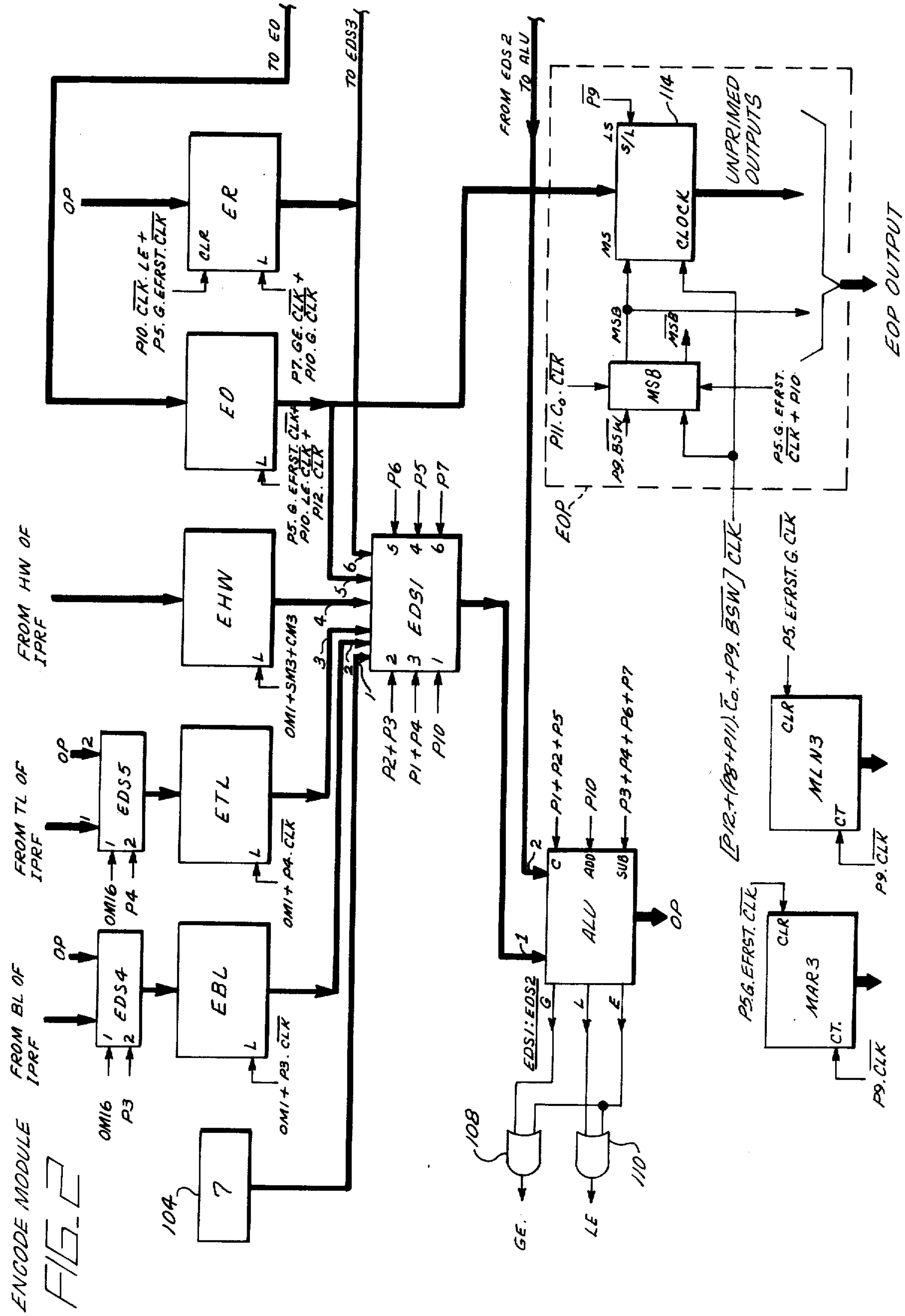
FIGS. 2, 3 and 4 form a schematic and block diagram of the ENCODE MODULE.
Figure 3:
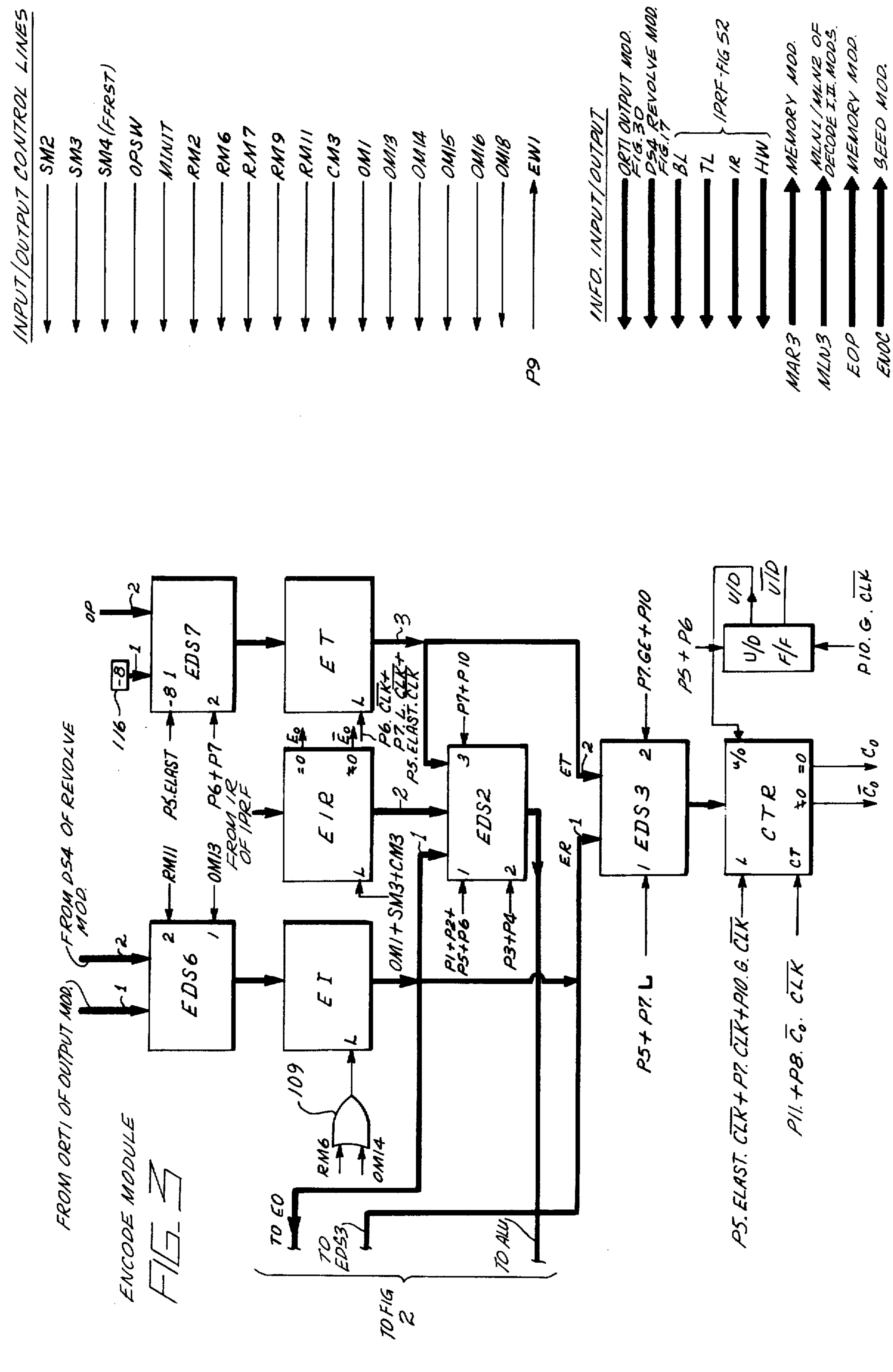
Figures 2, 3, 4, 5:
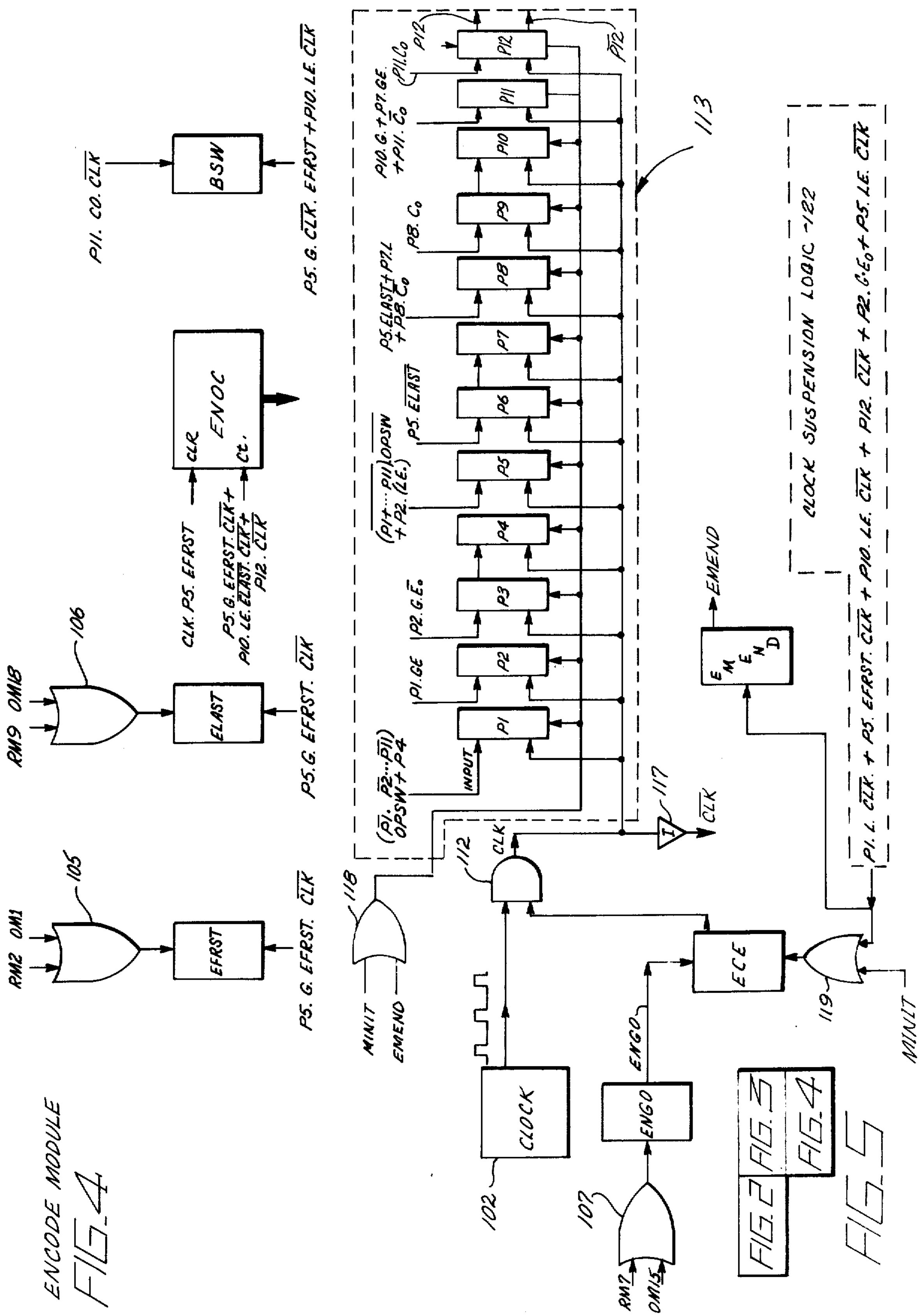
FIG. 5 is a diagram showing the relationship of FIGS. 2, 3 and 4.
Figure 7:
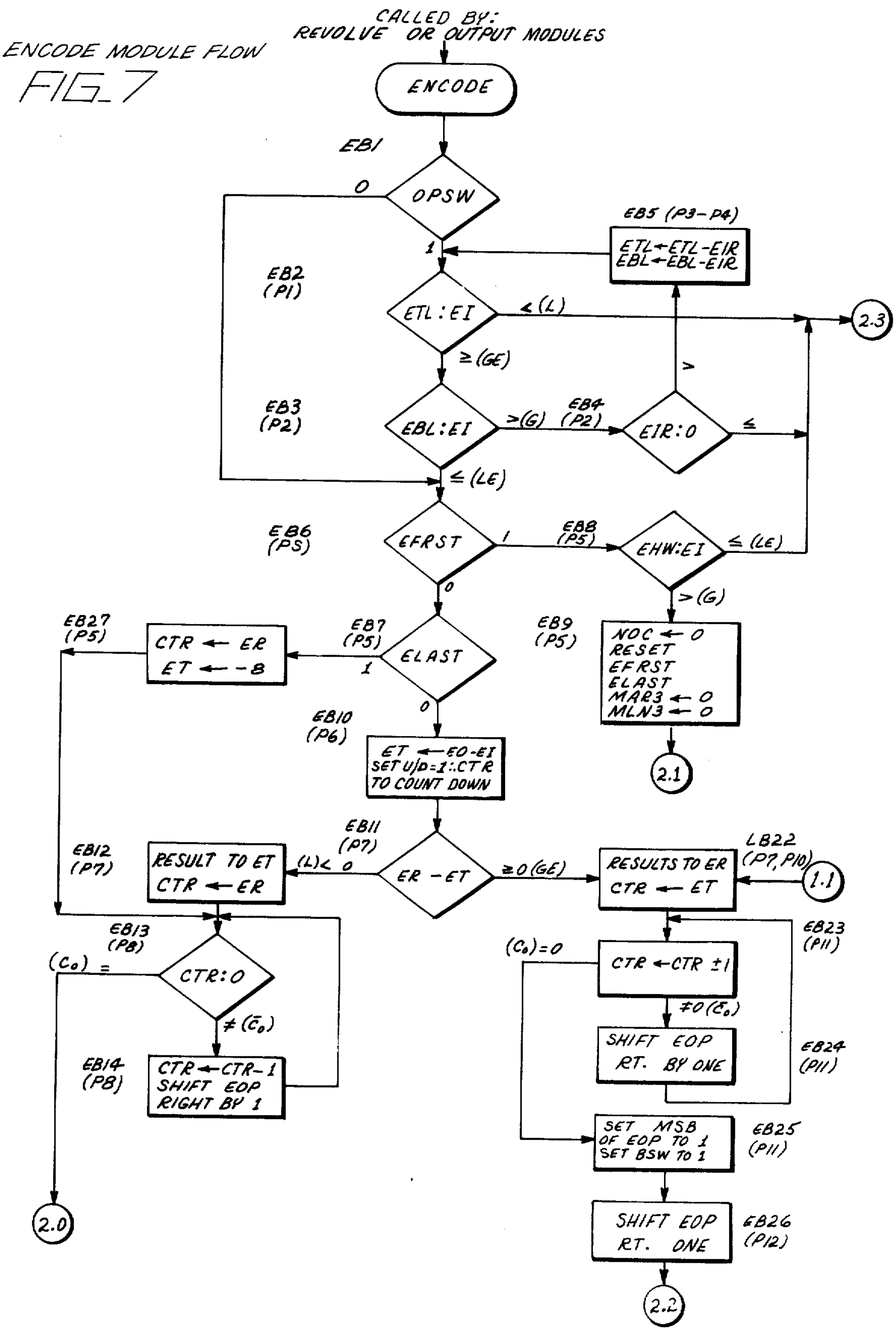
FIGS. 7 and 8 form a flow diagram illustrating the sequence of operation of the ENCODE MODULE.
Figure 8:
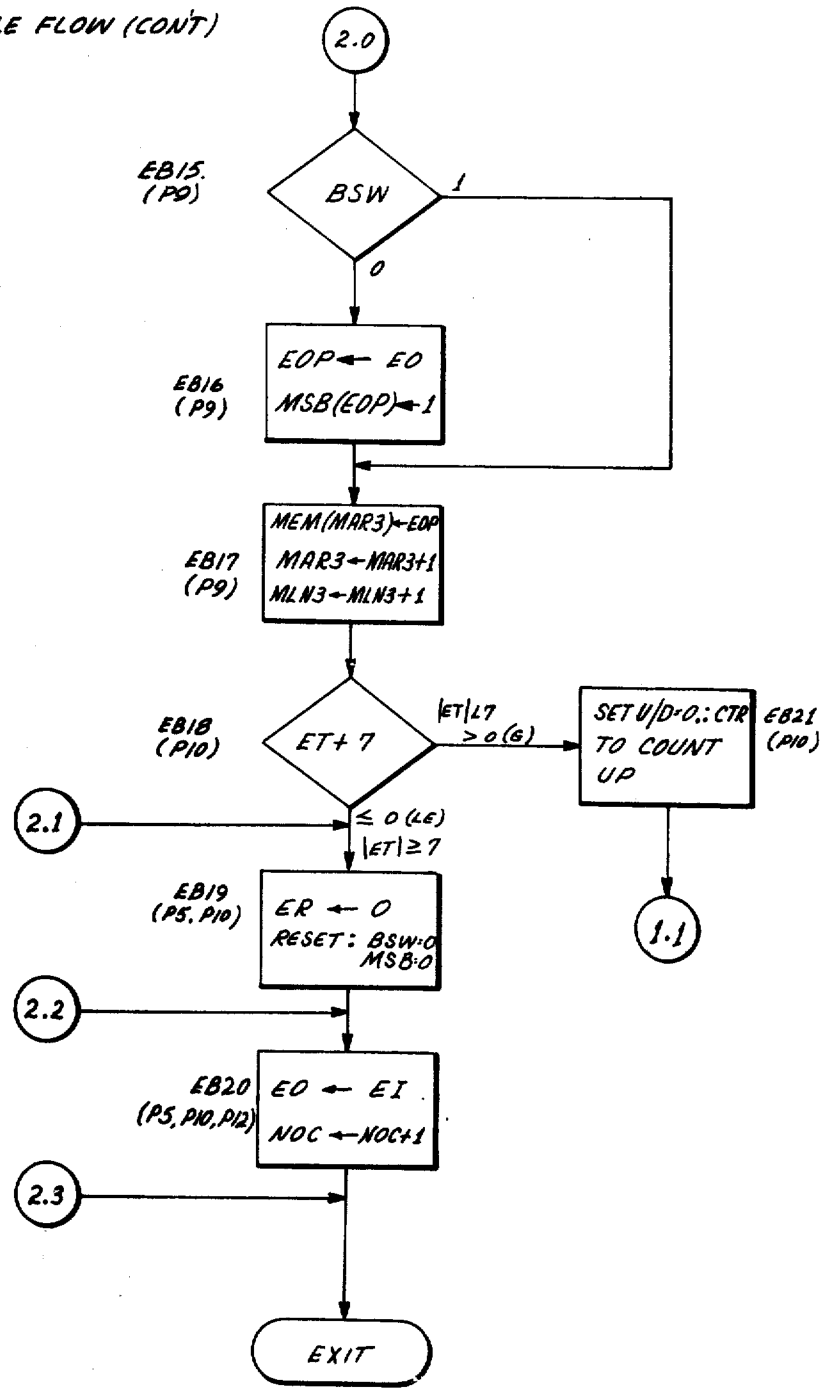

The ENCODE MODULE can be most readily understood with reference to the description in connection with the block diagram, FIGS. 2–4, and the corresponding flow diagram, FIGS. 7–8. As an aid, Table 11 contains symbols used to identify the counters, registers, flip flops, and one-shot multivibrators, together with the mnemonic meaning of the symbols used. Also as an aid, the flow diagram contains P numbers adjacent to the various blocks, i.e., (P1), (P2), etc. These P numbers correspond to the outputs of the control counter 113 and thereby indicate the state of the control counter during which the indicated action shown in the flow diagram takes place. However, the same P number appears for more than one box. Therefore, for added ease in making reference to the flow diagram, symbols EB1 through EB26 are used to identify each box in the flow.

Table 11 shows the principal information inputs and outputs and the input control for the ENCODE MODULE. Top clipping limit, bottom clipping limit, interval and isoentropicgram width are each 8 bits long and are loaded into registers of the ENCODE MODULE by the modules indicated in Table 11.

Assume initially that clipping is not to be performed in which case OPSW, ETL, EBL and EIR are all initially 0. Also assume that the ENCODE MODULE is about to be called for its encoding function for the first time. Preliminary to calling the module, the current absolute word is received by the EDS 6 selection circuit either from the DS4 output of the REVOLVE MODULE or from the ORT1 register of the OUTPUT MODULE. The first current absolute word to be received is the first or largest absolute coded word (8 bits in length) of an occurrence vector. After the REVOLVE MODULE supplies the current absolute word, true signals are formed at RM11 and RM6 by the REVOLVE MODULE. When the current absolute word is being supplied by the OUTPUT MODULE, true signals are formed at OM13 and OM14 by the OUTPUT MODULE. A true signal at RM11 causes the EDS6 selection circuit to couple the current absolute word at DS4 to the information input of register EI. The true signal at RM6 enables the OR gate 109 to activate the load (L) input of EI and load the current absolute word into EI. Similarly, a true signal at OM13 causes EDS6 to route the information input from the ORT1 output to the information input of EI and the true signal at OM14 enables the OR gate 109 to activate the load (L) input of EI and load the current absolute word into EI. It should be noted that all current absolute words for one occurrence vector are supplied in sequence largest to smallest by the same calling module.

The iso-entropicgram width (HW) is stored in the input parameter register file IPRF. Loading of the iso-entropicgram width into EHW is enabled by true signals at any one of the following outputs: OM1 output of the OUTPUT MODULE; SM3 output of the SEED MODULE; and the CM3 outlet of the CHANGE MODULE.

OPSW is an output circuit of the OPSW flip flop in the OUTPUT MODULE. $\overline{OPSW}$ is the logical inversion of OPSW. Only the OUTPUT MODULE determines if clipping is to take place and, if it is to take place, the OPSW flip flop is in a 1 state, otherwise it is in an 0 state. Since it is assumed for the following explanation that no clipping is to take place, a true signal appears at $\overline{OPSW}$.

The EFRST flip flop is set to a 1 state whenever the present call on the ENCODE MODULE is for converting the first absolute word in a particular occurrence vector. EFRST is set by the calling module. In the case of the REVOLVE MODULE, a true signal is formed at the RM2 output, whereas, in the case of the OUTPUT MODULE, a true signal is formed at the OM1 output, and enables the OR gate 105 to set the EFRST flip flop to a 1 state.

The ELAST flip flop indicates if the current absolute word is the last one of an occurrence vector. A 1 state of ELAST indicates the last one, whereas the 0 state indicates it is not the last one. ELAST is set by the calling module. In the case of the REVOLVE MODULE, a true signal is formed at RM9 and in the case of the OUTPUT MODULE, a true signal is formed at OM18, either of which causes the OR gate 106 to set ELAST to a 1 state.

Assume initially that ELAST is in an 0 state. Initially the MINI COMPUTER forms a true signal at MINIT which causes gates 118 and 117 to set all of control counters 113 and flip flop ECE to 0. To be explained hereafter, true signals at EMEND thereafter set these elements to 0. The ENCODE MODULE is called by the REVOLVE MODULE by forming a true signal at RM7 and by the OUTPUT MODULE by forming a true signal at OM15. Either of these true signals enables the OR gate 107 to trigger the ENGO one-shot multi vibrator which, in turn, causes a true signal at the ENGO output. The true signal at the ENGO output causes the ECE flip flop to be set to a 1 state. The 1 state of the ECE flip flop causes a true signal at the ECE output which, in turn, causes the AND gate 112 to couple the CLK output of the clock 102 to the clock input of each of the control counter 113 flip flops P1-P12. Clock signals now being formed at the output of the AND gate 112 cause the ENCODE MODULE to commence its sequence of operation by virtue of the control action of control counter 113. All flip flops P1-P11 being in an 0 state and a true signal being formed at $\overline{OPSW}$ cause flip flop P5 to be set to a 1 state, forming a true signal at the P5 output.

One form of clipping is caused by the OPSW flip flop in a 1 state. An alternate form of clipping is automatically done by the ENCODE MODULE. Specifically, in the alternate clipping, the absolute words of an occurrence vector are received by the ENCODE MODULE in decreasing order of magnitude. The ENCODE MODULE automatically clips or discards all of those absolute words which are larger than the iso-entropicgram width and hence lie outside of the iso-entropicgram. The alternate form of clipping is very useful in connection with the REVOLVE MODULE where the result of an exclusive OR is clipped to keep only the lower ordered values which are within the iso-entropicgram width. The ENCODE MODULE will automatically perform this clipping, using flow chart blocks EB6 and EB8.

Considering the alternate clipping function in more detail, EFRST is set to 1 when the ENCODE MODULE is called for the first time to encode an occurrence vector. This is done to insure that the alternate clipping function is performed. Thus at EB6, flip flop EFRST being in a 1 state, causes EB8 to be entered where the iso-entropicgram width in register EHW is compared with the input current absolute word in register EI. If the content of EHW ≦ EI, the operation of the ENCODE MODULE is exited by forming a true signal at EMEND, thereby indicating to the calling module (i.e., REVOLVE) that it has processed one absolute word. Actually, the absolute word is just discarded by the ENCODE MODULE. When the calling module again calls the ENCODE MODULE to cause another absolute word of the same occurrence vector to be processed, flip flop EFRST will still be in a 1 state, causing EB8 to again be entered. If the current absolute word is larger in value than the iso-entropicgram width, an exit is again taken. This is repeated until at EB8 the current absolute word is smaller than the iso-entropicgram width (e.g. EHW > EI) at which time EB9 is entered to reset flip flop EFRST to 0. Thereafter when called, the ENCODE MODULE does not perform clipping because the ENCODE MODULE goes from EB6 to EB7.

Consider now the operation during EB8 and EB9 in detail.

Assume EB1 and EB6 of the ENCODE MODULE flow have been traversed, and assume EB8 is now entered during which the iso-entropicgram width in EHW is compared with the current absolute word in EI. If the current absolute word is larger than the iso-entropicgram width, it is outside of the iso-entropicgram and therefore a "don't care" condition exists. To perform the comparison, the true signal at P5 causes EDS1 and EDS2 to couple the contents of EHW and EI to the arithmetic unit ALU. ALU, together with the OR gates 108 and 110, in turn form true signals at outputs LE and G whenever the content of EHW is, respectively, ≧ than and ≦ than the content of EI. If the ≦ condition is sensed, true signals are now formed at the P5, LE and EFRST outputs and the true signal at $\overline{CLK}$ causes the CLOCK SUSPENSION LOGIC -122 (i.e., P5·LE·$\overline{CLK}$) to reset the ECE flip flop to an 0 state which, in turn, removes the true signal at ECE and thereby causes the AND gate 112 to stop forming clock signals at the input of the control counter 113. The same signal causes the one-shot EMEND to fire and form a true signal at EMEND. This signal notifies the caller that the ENCODE function has been completed. It also resets control counter 113 through OR gate 112. This, then, in effect causes an EXIT to be taken from the ENCODE MODULE where no action is taken until the next request is made to the ENCODE MODULE from the REVOLVE or OUTPUT MODULE.

If, on the other hand, the content of EHW is > than the content of EI (true signal at G), EB9 is entered, Assume during EB8 the content of EHW is > than that of EI and a true signal is formed at G, causing EB9 to be entered. The BSW flip flop states of 0 and 1 indicate the previous absolute word has been entered in the hybrid coded output in bit string form and absolute word form, respectively. Since the first hybrid word is always in absolute word form, BSW is to be set to 0, indicating that the corresponding output is in absolute word form and the MAR3 and MLN3 registers are cleared to initial or 0 states, ready for the first hybrid word to be stored in the MEMORY MODULE.

During EB9, true signals are formed at the following outputs: G, EFRST, and P5. Hence, at the following pulse at $\overline{CLK}$, the counters and registers NOC, MAR3 and MLN3 and flip flops EFRST and ELAST are all reset to 0.

EB19 is then entered and the same signals cause ER to be reset to 0 and the reset logic resets BSW and MSB of register EOP to 0.

Following EB19, EB20 is entered during which the same true signals are also present which causes load logic to load the current absolute word into EO. The current absolute word in EO now forms the previous absolute word for the next call on the ENCODE MODULE. The same logic also causes NOC to count up one state, indicating that one absolute word has now been provided to the ENCODE MODULE.

At this point, a true signal is formed at the outputs P5, EFRST. Therefore, the next pulse at $\overline{CLK}$, the ECE flip flop is reset to 0, thereby disabling the gate 112 from applying clock signals to the control counter 113 as described above.

Subsequently, the calling module again calls the ENCODE MODULE and provide the next current absolute word at which time a true signal is applied at either the RM7 or OM15 output (of the REVOLVE or OUTPUT MODULES) causing the OR gate 107 to trigger the one shot multi vibrator circuit ENGO, thereby setting the ECE flip flop back to a 1 state and enabling the AND gate 112 to apply clock signals to the control counter 113.

At this point, it is assumed that the next current absolute word is not the last one in the occurrence vector and hence the ELAST flip flop is an 0 state, forming a true signal at $\overline{ELAST}$. This causes the next clock pulse from gate 112 to reset flip flop P5 and set flip flop P6 to a 1 state, thereby enabling EB10 to be entered.

During EB10, a true signal is formed at the P6 output which causes EDS1 and EDS2 to couple the previous absolute word contained in EO and the current absolute word contained in EI to the ALU which forms an output at OP corresponding to the difference. This difference is referred to as the previous and current difference signal. Additionally, the signal at EDS7 causes the selection circuit EDS7 to gate the previous and current difference signal to the information input of the ET into which the signal is loaded by the subsequent clock signal at $\overline{CLK}$. Thus, ET now contains the previous and current difference signal which is the number of bits of displacement (either in event time or in possible occurrence values) between the current absolute word in EI and the previous absolute word in EO. Additionally, the true signal at P5 causes the U/D flip flop to be reset to a 1 state, asserting its true signal at the U/D ouput, thereby causing CTR to be set so that it counts down. The P6 output of the P6 flip flop is connected directly to the input of the P7 flip flop, thus the following clock coming out of the gate 112 causes the P7 flip flop to be set to a 1 state, thereby entering EB11

During EB11, the previous and current difference signal contained in ET is subtracted from the remaining binary bit signal contained in ER. The remaining binary bit signals represent the remaining binary bits to be filled in the bit string word being formed in EOP. The subtraction results in a difference signal during EB11 which indicates one of two values and these will now be explained. If the content of ER is larger than or equal to ET, the difference is ≧ than 0, meaning that the difference represents the remaining available bits in the bit string word (now under formation in EOP) after current absolute word is entered. If the content of ER is < than ET, the difference is less than 0 (or −), meaning that the difference represents the number of bits needed in the next bit string word (to be formed) to enter the current absolute word. An example of these two conditions is now given: the bit string word has a maximum of seven available bits (see register 114 in EOP having 8 bits, less 1 flag bit = 7). Assume the remaining available binary bits signal in ER = 5 and the previous and current difference signal in ET = 3, giving a positive difference of 2. The difference of +2 represents the remaining available bits in the bit string word after the current absolute word. If the values are reversed (ER = 3 and ET = 5), then the difference is −2 and represents the number of bits needed in the next bit string word to enter the current absolute word. In other words, the current absolute word will require all remaining available bits (Er) in the current bit string word under formation in EOP plus two additional bits in the next bit string word to be formed.

When on a previous call to the ENCODE MODULE it was found (during EB18) that the current absolute word was to be outputted in absolute word form, ER was reset to 0 at EB18 and hence is 0 at the next entry to EB11. Under these conditions, a difference less than 0 is formed during EB11. However, the difference is the negative of ET (0−ET = ET).

Consider now the details of operation. Assume that the ENCODE MODULE is at EB11, and a true control signal is being formed at the P7 output. This causes EDS1 and EDS2 to couple the content of ER and ET to ALU which, in turn, forms an output representing ER-ET. Assume the result is <0. A control signal is formed at the L output of ALU, indicating that there are insufficient bits in EOP for the current absolute word. EB12 is entered.

During EB12, the control signal at P7 and L causes EDS7 and the load logic for ET to store the number of bits needed in the next bit string word signal being formed at EOP into ET at the following pulse at $\overline{CLK}$. Additionally, the same true signals cause EDS3 and the load logic of CTR to store the content of ER into the counter, setting it to a state corresponding to the content of ER. If ER contains 0, as occurs when this is only the second call on the ENCODE MODULE and hence is the second time through the flow, the true signals at P7 and L also cause the flip flop P8 to be set into a 1 state, thereby causing EB13 to be entered. If ER contains 0, CTR is set to 0, causing a true signal at the Co output. The true signals at P8 and Co cause the P9 flip flop to be set to a 1 state and EB15 is entered, thereby skipping EB14.

To be explained in more detail, EB14 causes the bit string word being formed in EOP to be filled out with leading 0's. This operation, and hence EB14, is skipped when ER is 0 since no remaining bits need to be filled in the bit string word under formation.

Return now to EB11 and consider the operation when ER is not 0 and ER-ET is <0 causing a true signal at the L output of ALU. Note that ER is not 0 when a bit string word is being formed in EOP and available bits exist in EOP in the bit string word under formation. EB12 and 13 are entered as discussed above and CTR is set to a state corresponding to the number of binary bits remaining to be filled value contained in ER. During EB14, a true signal exists at P8 and $\overline{Co}$ (CTR is not 0) and each pulse at $\overline{CLK}$ counts CTR down one and causes the EOP shift logic to shift the bit string word one bit position in the direction of the least significant bit thereof until CTR reaches 0, at which time the true signal at $\overline{Co}$ is removed and one is formed at *Co*. This causes CTR and EOP to stop counting and shifting and EB15 is entered as discussed above.

Assume that during EB15 the BSW flip flop is in an 0 state, having previously been set there during EB19 thereby indicating that the next event in the hybrid output from the previous event is to be in the form of an absolute word. With BSW in an 0 state, EB16 is entered. During EB16, the false signal at $\overline{\textbf{P9}}$ causes the load logic of register 114 to load the previous absolute word contained in EO into the register 114 of EOP and true signals at P9 and $\overline{BSW}$ cause the logic P9·$\overline{BSW}$ to set the MSB flip flop to a 1 state, indicating that the word in EOP is an absolute word. Subsequently, EB17 is entered.

During EB17, the P9 output (see right hand of ENCODE MODULE schematic) causes a Write Enable signal (EWI) to be formed in the MEMORY MODULE, causing it to store the absolute word contained in EOP into the storage location designated by the content of MAR3.

The true signals at P9 and the pulse at $\overline{CLK}$ cause the content of MAR3 and MLN3 to count up one state. In this manner, the counter MLN3 always indicates the number of memory writes and hybrid coded words written in the MEMORY MODULE. Thus, an absolute word is outputted by the formation of the true signal at the P9 output which, in turn, causes the MEMORY MODULE to read the absolute word from EOP.

Return now to EB11 and consider the situation where a previous absolute word is contained in EO, a current absolute word is contained in EI, and ER is ≧ ET. ALU forms the difference between ER and ET (i.e., ER − ET) and ALU and gate 108 form a true signal. The difference signal at the output OP of ALU represents the remaining available bits in the bit string word now under formation in EOP after entry of the current absolute word in EI. Under these conditions, the bit string word being formed in EOP is shifted by the number of bit positions indicated by ET and the current absolute word is entered into EOP.

To this end, EB22 is entered from EB11. The true signals formed at P7 and GE cause the load logic of ER to store the difference signal being formed at the OP output of ALU into ER at the occurrence of the following pulse at $\overline{CLK}$. Thus, ER now contains the new number of bits remaining to be filled in the bit string word under formation which will exist after the current absolute word is entered. Additionally, the same signals cause EDS3 and the load logic to store in CTR the previous and current difference signal in ET. The true signals at P7 and GE cause the P11 flip flop to be set to a 1 state at the next clock signal from gate 112 and thereby enter EB23.

During EB23, and the subsequent state EB24, CTR is enabled to count through a sequence of states corresponding in number to the previous and current difference signal which was set into CTR from ET. To this end, the true signal at P11 and at $\overline{CLK}$, together with the true signal at U/D, cause CTR to count down 1 state responsive to each true signal at $\overline{CLK}$. Additionally, in the absence of an 0 state of CTR, a true signal is formed at the $\overline{Co}$ output. The true signals at P11, $\overline{Co}$ cause the register EOP to be shifted 1 bit position to the right in the direction of the least significant bit. This operation continues until the counter reaches 0 and a true signal is formed at the *Co* output. When a true signal is formed at the *Co* output, counting and shifting of CTR and EOP is complete and the ENCODE MODULE is ready to enter the value of the current absolute word in EI into the shifted bit string word in EOP. EB25 is entered.

During EB25, a true signal is formed at the *Co* output and the subsequent true signal at $\overline{CLK}$ causes the flip flops MSB of EOP and BSW to be set to a 1 state. To be explained, the 1 bit stored in MSB is subsequently shifted into register 114 of EOP during EB26, thereby causing a bit of predetermined value, i.e., a 1 bit, the bit string word being formed in EOP. The number of bit positions existing between the currently formed 1 bit and the previously formed 1 bit or between the currently formed 1 bit and the previous absolute word in the series of hybrid word outputs indicates the value of the current absolute word. The 1 state of BSW indicates that a bit string word is now being formed in EOP.

The true signal at P11 and Co cause the flip flop P12 to be set to a 1 state at the following clock signal from gate 112 and EB26 is thereby entered.

During EB26, a true signal is formed at the P12 output and the subsequent pulse at $\overline{CLK}$ causes the content of EOP, including the content of MSB and register 114, to be shifted 1 bit position toward the right toward the least significant end, thereby placing the 1 bit into the register 114 portion of EOP.

EB20 is now entered. During EB20, a control signal is now formed at the P12 output and the BSW flip flop is in a 1 state. The subsequent pulse at $\overline{CLK}$ causes load logic to store the current absolute word contained in EI into EO thereby forming a new previous absolute word and causes NOC to count up one state, thereby indicating that another absolute word has been encoded into hybrid form. NOC counts, and thereby indicates, the number of 1 bits processed in any given seed. Additionally, the true signal at P12 causes the ECE flip flop to be set to an 0 state at the pulse at $\overline{CLK}$, disabling clock signals at the output of gate 112, causing the EMEND monostable to fire and thereby form a true signal at the EMEND output. This causes counter 113 to be reset and the ENCODE MODULE operation to EXIT.

A very important operation in the ENCODE MODULE is depicted at EB18. This is the condition under which previous and current difference signal contained in ET is compared with a predetermined threshold value. This is the heart of the decision which enables a change, in hybrid output, from bit string word form to absolute word form and the operation is accomplished as follows. During EB18, the P10 flip flop is in a 1 state, causing a true signal at the P10 output. This causes EDS1 and EDS2 to couple the switches 104 and the output of ET to ALU. The ALU compares the applied signals and adds the content of ET to the value 7 represented by the switches 104 and forms a result at OP. It should be noted that when EB18 is entered, the content of the ET is always a negative number, the number being stored in 2's complement form. The reason for this situation is that ET at this point in the operation always indicates the number of bits needed in the next bit string word to enter the current absolute word which is a situation where at EB11, ET was larger than ER resulting in a negative value. Thus, at EB18 when ALU combines the content of ET with the value 7 from 104, a difference signal is formed. If the difference signal is >0, i.e., the value 7 is > the absolute value in ET, a control signal is formed at G and EB21 is entered. If the value 7 is ≦ the absolute value in ET, the difference signal will be ≦0, causing a control signal at the LE output of OR gate 110, which in turn causes EB19 to be entered. The result of the comparison of the value 7 and the absolute value in ET is quite important in determining subsequent operations.

If the absolute value in ET is <7 (the value 7 is greater), a control signal is formed at G and the criteria is not met for switching from bit string word to absolute word in the hybrid output because 7 is greater than the absolute value in ET. Accordingly, EB21–26 are entered where the current absolute word in EI is entered in the bit string word under formation in EOP. To this end, EOP is shifted right by the number of bits indicated by the absolute value of the previous and current difference signal contained in ET and then a "1" bit entry is made into the bit string word being formed in EOP.

If, on the other hand, the absolute value in ET is ≦ than the threshold value 7, it would be a saving in memory space to switch from bit string word form to absolute word form. EB19–20 is entered. During EB19–20, as discussed above, logic resets flip flop BSW to 0, indicating an absolute word form in the hybrid output for the current absolute word.

The operation during EB19 and EB26 has already been discussed hereinabove. Therefore consider EB21. During EB21, true signals are formed at the following outputs: P10, G and at the following pulse at $\overline{CLK}$, the U/D flip flop is reset to an 0 state, causing the counter to be set to count up and EB2 is entered. The least significant 4 bits of the 2's complement value in ET are set in CTR. Therefore as CTR is couned up it will return to 0 after the number of counts represented by the absolute value of ET.

During EB22, the content of ET is transferred to CTR and subsequently during EB23 and 24, CTR is counted up until it finally is recycled to an 0 state, causing a control signal at *Co*. For each state of CTR, the content of EOP is shifted right by one. When CTR reaches 0, the control signal at *Co* causes the MSB flip flop of EOP to be set to 1, thereby providing another occurrence in the bit string word output and subsequently during EB26, the 1 bit is shifted into the register 114 of EOP, all as described above.

Thus, it should now be clearly understood that at EB18, determining whether the value in ET (the number of bits needed in the next bit string word to enter the current absolute word) is >7, also determines whether the ENCODE MODULE switches from bit string word to absolute string form of output.

There is at least one occurrence held within the ENCODE MODULE that needs to be written out at the end of its operation. Therefore, after the calling module has finished using the ENCODE MODULE, the occurrence being held must be outputted. The calling module outputs the remaining occurrence by setting flip flop ELAST. Flip flop ELAST is set by the REVOLVE MODULE by forming a signal at RM9 and by the OUTPUT MODULE by forming a signal at OM18, either of which causes the OR gate 106 to set ELAST to a 1 state. The 1 state of ELAST causes a true signal at the ELAST output, thereby indicating this is the last call on the ENCODE MODULE for the occurrence vector currently being converted to hybrid form. The control signal at the ELAST output occurs when the ENCODE MODULE EXITS during the 1 state of P5. After the control signal at the ELAST output is formed, a control signal is formed by the REVOLVE or OUTPUT MODULE at RM7 or OM15, thereby causing the OR gate 107 to trigger the ENGO shot multi-vibrator, thereby causing the ECE flip flop to be set to a 1 state and hence the AND 112 to start providing clock pulses where EB27 is entered.

During EB27, the true control signals at P5 and ELAST enable signals being formed at the output of switches 116, representing the 2's complement of 8, to be gated through the EDS7 selection circuit and allows the following signal at $\overline{CLK}$ to load the 2's complement of 8 (i.e., a −8) into ET. Additionally, the true control signal at P5 enables the signal in ER, representing the number of binary bits remaining to be filled (in the bit string word under formation in EOP), to be gated through EDS3 to the input of CTR enabling the same pulse at CLK to load this value into CTR. The true signals at outputs P5 and ELAST cause the P8 flip flop to be set to a 1 state, thereby causing EB13 to be entered. During EB13 and 14, the bit string word in EOP is filled out with leading 0's and right justified by shifting the bit string word in EOP and counting CTR down until CTR = 0. Subsequently, EB15 and 17 are entered where the resultant bit string word is outputted. Of course, should ER be 0 and hence the CTR is set to 0, right shifting is skipped, and outputting is done immediately.

The foregoing description of the ENCODE MODULE was made assuming that no clipping was to take place. Only the OUTPUT MODULE enables clipping to take place. If clipping is to take place, the OUTPUT MODULE initially forms true signals which enable the bottom limit register EBL, the top limit register ETL, and interval registers EIR to be loaded. To this end, the OUTPUT MODULE forms a true signal at OM16 and then a true signal at OM1. The input of selection circuits EDS4 and EDS5 and register EIR are connected to the BL, TL and IR registers of IPRF (FIG. 52). Thus, the true signals at OM16 and OM1 cause the bottom limit, top limit and interval value (if an interval value exists) to be strobed from IPRF into EBL, ETL and EIR via the load logic contained in each of these registers. The interval value is only used and, hence, an interval value stored in the interval register EIR if the user wishes to ascertain if the output lies in certain intervals. For example, if the user were to check the intervals between 35 and 25, and then again between 15 and 5 of an occurrence vector, he specifies an interval value of 10. The clipping function in general forces the output to lie between certain values set by the user. Thus, the operation of the ENCODE MODULE is to compare the very first absolute word of an occurrence vector, which of course is the highest one, with the content of ETL and EBL. If the interval value is 0, i.e., it is not desired to check between different intervals, and if the current entry lies outside of either limit, the ENCODE MODULE operation EXITS since the value lies outside of the prescribed limits. If, on the other hand, the interval value contained in EIR is other than 0, this means that it is desired to check between different limits and the limits contained in ETL and EBL are reduced to new limits by the interval value in EIR. Then the comparison between EI and ETL and EBL is repeated using the new reduced limits. It should be noted that in the example of the ENCODE MODULE included herewith, it is only desired to check for increments in a downward direction. Therefore, if the current absolute word contained in EI is above ETL, the ENCODE MODULE operation automatically EXITS without decrementing.

Consider now the actual clipping and interval function in the ENCODE MODULE. The OUTPUT MODULE sets OPSW flip flop, contained therein, to a 1 state. When flip flops P1–P11 of the control counter 113 are in an 0 state causing true control signals at the $\overline{P1}, \overline{P2} \ldots \overline{P11}$ outputs and the OPSW output has a true signal, the next clock causes the P1 flip flop to be set to a 1 state. During EBS2, the control signal at the P1 output causes the EDS1 and EDS2 selection circuits to couple the content of ETL and EIR to ALU. If the top limit in ETL is < the current absolute word in EI, the current absolute word is out of limit and a control signal is formed at the L output of ALU and at the following clock pulse at $\overline{CLK}$, the ECE flip flop is reset to 0, disabling the clock to the control counter 113, resetting counter 113 to 0, causing the ENCODE MODULE to EXIT and firing one-shot EMEND.

If the top limit in ETL is ≦ the current absolute word in EI, a control signal is formed at the GE output of the OR gate 108. A true signal is also being formed at the P1 output and the combination of true signals at P1 and GE causes the P2 flip flop to be set to a 1 state, thereby causing EB3 to be entered.

During EB3, the content of EBL is compared with the content of E1. To this end, the true signal at P2 causes EDS1 and EDS2 to couple the content of EBL and EIR to ALU. If the bottom limit in EBL is > the current absolute word in EI, a control signal is formed at the G output of ALU and EB4 is entered. If, on the other hand, the bottom limit in EBL is ≦, the current absolute word in EI gate 110 forms a control signal at LE, causing EB6 to be entered. The operation following EB6 is the same as that described above and need not be reconsidered here.

However, assume that the bottom limit in EBL is greater than the current absolute word in EI and a control signal is formed at the G output, causing EB4 to be entered. EB4 is only shown in the ENCODE MODULE flow in order to indicate that a decision is made based on whether the interval value contained in EIR is 0 or >0. If, at the time, true signals are formed at P2 and G, the content of EIR is not 0, a control signal is formed at the $\overline{Eo}$ output of EIR. The true signal at $\overline{Eo}$ in coincidence with the control signal at P2 and G enables the P3 flip flop to be set to a 1 state at the following clock signal from gate 112, thereby entering EB5.

During EB5, the top limit in ETL and bottom limit in EBL are decremented by the interval value contained in EIR. To this end, a true signal is now formed at the P3 output, causing EDS1 and EDS2 to couple the values contained in EBL and EIR to the input of ALU, thereby causing ALU to form a decremented bottom limit corresponding to the difference (EBL − EIR). The true signal at P3 also causes EDS4 to couple the decremented bottom limit at OP to the input of EBL. The subsequent signal at $\overline{CLK}$ causes the load logic of EBL to store the decremented bottom limit into EBL. Thus, EBL now contains the previous bottom limit value decremented by the interval value contained in EIR. The true signal at the P3 output causes the P4 flip flop to be set to a 1 state at the following clock signal from gate 112. The control signal at P4 causes EDS1 and EDS2 to couple the content of the top limit in ETL and the interval value in EIR to ALU, causing ALU to form a decremented top limit at OP representing the difference (ETL − EIR). The control signal at the P4 output causes EDS5 to couple the decremented top limit from OP to ETL and the following signal at $\overline{CLK}$ causes the decremented top limit to be stored in ETL. Thus, ETL now contains the previous top limit value decremented by the interval value contained in EIR. EB2 and EB3 are again entered where the input value is again compared, this time with the decremented top and decremented bottom limit values as described hereinabove.

D. Example of Operation

A better understanding of the operation of the ENCODE MODULE will be had with reference to the following ENCODE MODULE example. During this example, it is assumed that the ENCODE MODULE is called six times to convert the following input entries from one occurrence vector and coded in absolute form to hybrid form: 125, 123, 119, 116, 114, 100. To further aid in understanding of the invention, it is assumed that no clipping is to take place. Although the clipping function is an important feature in one aspect of the invention. Rather than give a complete word description of the following operation, the operation is indicated in symbolic form.

Input on the initial call:
OPSW = 0 ∴ ETL = EBL = EIR = $\phi$
EFRST = 1; EHW = 128
EI = 125
The sequence followed is:
EB1, EB6, EB8 - EB9, EB19 - EB20

-continued

| | | |
|---|---|---|
| EB1 : | OPSW = 0 ∴ control goes to EB6 | |
| EB6 : | EFRST = 1 ∴ control goes to EB8 | |
| EB8 : | EI (125) < EHW (128) | The input is less than the iso-entropicgram width. Therefore, control goes to EB9; |
| EB9 : | EFRST = ELAST = 0 | reset flip flops; |
| | NOC = 0 | clear number of occurrences; |
| | MAR3 = MLN3 = 0 | clear output memory area address register and length register; |
| EB19 : | ER = 0 | indicates there are no remaining bits left in output register EOP - Here used to force an absolute ones index form (AOI) output on the next cal; |
| | BSW = 0 | indicates we are in absolute ones index form; |
| EB20 : | EO(125) = EI(125) | current input becomes previous input; |
| | NOC(1) = NOC(0) + 1 | up the number of occurrences by one; |
| HALT | | |
| Output: | EOP = 0 MLN3 = 0 NOC = 1 | Memory area blank |

Second call: EI = 123
EFRST = 0 — Other parameters remain as for first call;

Sequence of control: EB1, EB6-EB7, EB10-EB13, EB15-EB18, EB21-EB24, EB23, EB25-EB26, EB20

| | | |
|---|---|---|
| EB1 | OPSW = 0 ∴ control of EB6 | |
| EB6 | EFRST = 0 ∴ control to EB7 | |
| EB7 | ELAST = 0 ∴ control to EB10 | |
| EB10 | ET (2) = EO(125) - EI(123) | bit distance between previous and absolute word; |
| | set U/D = 1 ∴ CTR to count down | |
| EB11 | ER(0) - ET(2) < 0 | the current absolute word cannot be placed in the remaining number of bits in EOP ∴ control to EB12; |
| EB12 | ET = −2 | kept in 2's complement form; i.e., ET = 11111110; |
| | CTR (0) = ER (0) | the amount the output register must be shifted if in bit string form, to keep alignment; |
| EB13 | CTR = 0 ∴ control to EB15 | |
| EB15 | BSW = 0 ∴ control to EB16 | |
| EB16 | EOP(125) = ED(125) | set output equal to previous input; |
| | MSB (EOP) = 1 | set sign bit to indicate absolute word form (AOI); |
| EB17 | Memory write of EOP | |
| | MAR3(1) = MAR3(0) + 1 | pointer to next memory area address; |
| | MLN3(1) = MLN3(0) + 1 | current physical length of output; |
| EB18 | ET(−2) + 7 > 0 ∴ | control to EB21 |
| EB21 | Set counter to count-up U/D = φ | since the number to be clocked to CTR is < 0, must count up to reach 0; |
| EB22 | ER(5) = ET(−2) + 7 | number of remaining bits that can be used in EOP; |
| | CTR(6) ← ET(−2) | the counter is loaded from the rightmost 3 bits of the 2's complement of −2, i.e. 11111[110] |
| EB23 | CTR(7) = CTR(6) + 1 (≠0) ∴ control to EB24 | |
| EB24 | EOP = 0XXXXXXX | shift EOP right; |
| EB23 | CTR(0) = CTR(7) + 1 (=0) ∴ control to EB25 | since CTR is 3 bit register, adding a 1 to the 7 causes wraparound to occur; |
| EB25 | EOP = 10000000 | turn on sign bit; |
| | BSW = 1 | indicates bit string form; |
| EB26 | EOP = 010XXXXX | shift EOP right one since sign bit position is used to indicate type; |
| EB20 | EO(123) = EI(123) | current absolute word becomes previous |
| | NOC(2) = NOC(1) + 1 | number of occurrences is bumped; |
| HALT | | |

Output EOP = 010XXXXX MLN3 = 1 NOC = 2 — Memory Area 11111101

X = remaining bits to be used

Third Call EI = 119 — other paramaters remain the same;

Sequence of control: EB1, EB6-EB7, EB10-EB11, EB22-EB24, EB23-EB24, EB23-24, EB23, EB25-EB26, EB20

| | | |
|---|---|---|
| EB1 | OPSW = 0 ∴ control to EB6 | |
| EB6 | EFRST = 0 ∴ control to EB7 | |
| EB7 | ELAST = 0 ∴ control to EB10 | |
| EB10 | ET(4) = EO(123) - EI(119) | ET = bit distance to be considered; |
| EB11 | ER(5) − ET(4) > 0 | control to EB22 |
| EB22 | ER(1) = ER(5) - ET(4) | ER = number of bits left in EOP after current absolute word process; |
| | CTR(4) = ET(4) | number of positions EOP must be right shifted before the sign bit |

-continued is set;
EB23 CTR(3) ← CTR(4) − 1 (≠0) ∴ control to EB24
EB24 EOP = 0010XXXX
EB23 CTR(2) ← CTR(3) − 1 (≠0) ∴ control to EB24
EB24 EOP = 00010XXX
EB23 CTR(1) = CTR(2) − 1 (≠0) ∴ control to EB24
EB24 EOP = 000010XX
EB23 CTR(0) = CTR(1) − 1 (≠0) ∴ control ot EB25
EB25 EOP = 100010XX — set on the most significant bit;
BSW = 1 — indicate bit string;
EB26 EOP = 0100010X — shift EOP right;
EB20 EO(119) = EI(119) — current absolute word becomes previous
NOC(3) ← NOC(2) + 1 — bump the number of occurrences;
HALT OUT EOP = 0100010X MLN3 = 1 NOC = 3 Memory Area 11111101

Fourth Call EI = 116 — All other parameters remain the same;

Sequence of control — EB1, EB6-EB7, EB10-EB14, EB13, EB15, EB17-EB18, EB21-EB24, EB23 EB25-EB26, EB20;

EB1, EB6, EB7 — same as before;
EB10 ET(3) ← EO(119) - EI(116) — obtain bit distance;
EB11 ER(1) - ET(3) (< 0) control to EB12 — there are not enough bits to peocess this entry using current information in EOP;
EB12 ET(−2) ← ER(1) - ET(3) — ET = 11111110 in 2's complement form;
CTR(1) ← ER(1) — number of positions that EOP must be shifted to keep alignment;
EB13 CTR(1) ≠ 0 ∴ control to EB 14
EB14 CTR(0) = CTR(1) − 1
EOP = 00100010 — right shift EOP;
EB13 CTR(0) = 0 ∴ control to EB15
EB15 BSW = 1 ∴ control to EB17
EB17 write EOP to memory
MAR3-(2) ← MAR3-(1) + 1 next memory address;
MLN3-(2) ← MLN3-(1) + 1 physical length of memory area;
EB18 ET(−2) + 7 (> 0) ∴ control to EB21
EB21 set U/D = φ ∴ CTR to count up
EB22 ET(5) = ET(−2) + 7
CTR(6) ← ET(−2) — CTR = rightmost 3 bits of 2's complement ET = 1 1 1 1 1 [1 1 0]

EB23 CTR(7) = CTR(6) + 1 (≠0) ∴ control to EB24
EB24 EOP = 00XXXXXX — shift EOP X = remaining usable bits for EOP;
EB23 CTR(0) = CTR(7) + 1 (=0) control to EB25 — 3 bit register - therefore wraparound on the add;
EB25 EOP = 10XXXXXX — set sign bit in EOP;
BSW = 1 — indicate bit string form;
EB26 EOP = 010XXXXX — shift EOP since sign bit indicates type;
EB20 EO(116) = EI(116) — previous input is replaced by the current;
NOC(4) ← NOC(3) + 1
HALT Output EOP = 010XXXXX MLN2 = 2 NOC = 4 Memory Area 11111101

00100010

Fifth Call EI = 114 — remaining parameters remain the same;

sequence of control — EB1, EB6, EB7, EB10-EB11, EB22-EB24, EB23, EB25-EB26, EB20;

EB1, EB6, EB7 — same as before;
EB10 ET(2) ← EO(116) - EI(114) — bit distance;
set the counter to down
EB11 ER(5) - ET(2) > 0 ∴ control to EB22
EB22 ER(3) = ER(5) - ET(2) — update the remaining;
CTR(2) ← ET(2) — number of bits;
EB23 CTR(1) = CTR(2) − 1 (≠0) ∴ control to EB24
EB24 EOP = 0010XXXX — shift EOP right;
EB23 CTR(0) ← CTR(1) − 1 (=0) ∴ control to EB25
EB25 EOP = 1010XXXX — set sign bit of EOP;
BSW = 1 — indicate bit string form;
EB26 EOP = 01010XXX — shift EOP;
EB20 EO(114) = EI(114)
NOC(5) ← NOC(4) + 1
HALT Output EOP = 01010XXX MLN3 = 2 NOC = 5 Memory Area 11111101 00100010

Sixth Call EI = 100 — all other parameters remain

-continued

| | | |
|---|---|---|
| | the same; | |
| sequence of control | | EB1, EB6-EB7, EB10-EB14, EB13-EB14, EB13-EB14, EB13, EB15, EB17-EB20; |
| EB1, EB6, EB7 | | same as before; |
| EB10 | ET(14) ← EO(114) - EI(100) | |
| | set U/D = 1 ∴ CTR to count down | |
| EB11 | ET(3) - ET(14) (<0) ∴ control to EB12 | |
| EB12 | ET(−11) ← ER(3) - ET(14) | ET in 2's complement form; |
| | CTR(3) = ER(3) | number of positions EOP must be shifted to keep alignment; |
| EB13 | CTR(8) ≠ 0 ∴ control to EB14 | |
| EB14 | CTR(2) = CTR(3) − 1 | |
| | EOP = 001010XX | |
| EB13 | CTR(2) ≠ 0 ∴ control to EB14 | |
| EB14 | CTR(1) = CTR(2) − 1 | |
| | EOP = 0001010X | |
| EB13 | CTR(1) ≠ 0 ∴ control to EB14 | |
| EB14 | CTR(O) = CTR(1) − 1 | |
| | EOP = 00001010 | |
| EB13 | CTR(O) = 0 ∴ control to EB15 | |
| EB15 | BSW = 1 ∴ control to EB17 | |
| EB17 | write memory EOP | |
| | MAR3(3) = MAR3(2) + 1 | |
| MLN3(3) = MLN3(3) + 1 | | |
| EB18 | ET(−11) + 7 < 0 ∴ control to EB19 | |
| EB19 | ER = O | assure next call will write; |
| | BSW = O | current absolute word to be in absolute word form; |
| EB20 | EO(100) = EI(100) | |
| | NOC(6) ← NOC(5) + 1 | |
| HALT | | |
| | | Memory area |
| Output EOP = O | MLN = 3 NOC = 6 | 11111101 |
| | | 00100010 |
| | | 00001010 |
| Seventh call | set ELAST = 1 | all other parameters remain |
| | the same; | |
| sequence of operation | | EB1, EB6-EB7, EB27, EB13, EB15-EB20; |
| EB1, EB6 | | same as before; |
| EB7 | ELAST = 1 ∴ control to EB27 | |
| EB27 | CTR(0) = ER(0) | in case we are in bit string; |
| | ET = −8 | assure proper balance at EB18; |
| EB13 | CTR(0) = 0 ∴ control to EB15 | |
| EB15 | BSW = 0 ∴ control to EB16 | |
| EB16 | EOP(100) = EO(100) | prepare the output; |
| | set sign bit of EOP | indicates absolute word type; |
| EB17 | write EOP | |
| | MAR3(4) MAR3(3) + 1 | next address; |
| | MLN3(4) MLN3(4) + 1 | length; |
| EB18 | ET(−8) + 7 < 0 ∴ control to EB19 | |
| EB19 | ER = 0 | these are meaningless |
| | BSW = 0 | steps on the last time |
| EB20 | EO(100) = EI(100) | through - note that NOC is not incremented this time; |
| HALT | | |
| | | Memory area |
| EOP = 0 | MLN3 = 4 NOC = 6 | 11111101 |
| | | 00100010 |
| | | 00001010 |
| | | 11100100 |

In summary, what has been disclosed is an encoder for converting to hybrid form a received series of absolute word signals of decreasing value order. The hybrid form has a series of at least one absolute word signal and bit string word signal. An absolute word signal represents the value of one occurrence by the combination of binary coded bit signals. A bit string word signal represents one occurrence by the number of bits of displacement of a bit of predetermined value therein from an absolute word signal in the hybrid word series. Means include the ALU, EDS2, EDS1 and control counter 113 operative during EB18 in response to received previous and current absolute word signals for forming an output signal indicative of the difference in value therebetween. The previous and current different signal is formed at the OP output of ALU and is stored in ET. Additionally, there is means including ET and the control counter 113 for retaining the previous and current difference signal. This occurs at EB10.

The encoder also includes means for indicating absolute or bit string word form of hybrid output and includes means, including the switches 104, for indicating a preselected minimum permitted difference (e.g. 7) between successively received word signals. Such means includes ALU, EDS1, EDS2 and the control counter 113 for comparing the minimum difference indication and the retained previous and current difference signal and for indicating the first being > than or ≦ to the latter.

The encoder also has means for providing absolute form outputs such means including the EOP load and shift logic, the BSW and its set and reset logic and the control counter 113 operative in response to the ≦ indication for outputting the stored current absolute word and an absolute flag. This operation takes place during EB18–20, 10–17.

The encoder also includes means for providing bit string form outputs and has means including the EOP, CTR and its load and control logic, EDS2, ER, EOP shift logic, MSB set logic and the control counter 113 which are responsive to the > indication for forming a set of ordered signals comprising a binary bit of one value (e.g., 1) associated with the number of binary bits of second value (e.g., 0) corresponding to the value of the retained previous and current difference signal. It will be seen that the operation is depicted by EB21-25. The means for providing bit string form outputs also includes means including the clock and the control counter 113 for selectively outputting the set of signals in association with a bit string flag. The binary bit of one value in the bit string form output is in a predetermined relation to the outputted absolute word. In this regard, the number of bits of displacement between a bit of the one value and an absolute word indicates the value of the one bit.

A preferred embodiment of the encoder has a current such as register EI for storing a currently received absolute word. Means including EDS6 control logic stores received absolute words into the current register EI. A previous register EO is provided for storing a previously received absolute word. Means including the EO control logic and the control counter 113 transfers the current absolute word from the current register to the previous register, forming therein the previous absolute word. This is accomplished at EB20.

A further preferred embodiment of the encoder provides hybrid form output in a series of words. The means for forming a set of ordered signals includes counter means CTR. CTR has output *Co* for indicating completion of counting. A bit string word forming register EOP is provided and means including CTR load and control logic and EDS2 is operative during EB21-24 in response to the > indication for enabling the counter means to count through a sequence of states corresponding in number to the retained current and previous difference signal contained in ET.

The indication at output *Co* from CTR indicates completion of the last-mentioned counting. Additionally included is means including EOP and its shift logic and control counter 113 operative during ED21-25 for shifting the content of the bit string forming register one bit position in the direction of the most significant bit thereof for each of the last-mentioned counter means states. Additionally included is means including the MSB flip flop and its set logic and the control counter 113 which is operative during EB25 in response to the last-mentioned completion indication at *Co* for inserting a binary bit signal of predetermined value (e.g., 1) at the least significant end of the content of the bit storing register EO. By this means, occurrence is entered in the hybrid form word output. The means for outputting additionally comprises means including the P9 logic and the control counter 113 operative during EB17 for selectively outputting the content of the bit string word forming register by forming a signal at the P9 output, indicating that the word in EOP is now ready for output.

An additional preferred embodiment of the encoder, according to the invention, is a bit string forming means which has means for entering a first occurrence in a new bit string word under formation. Included in the last-mentioned means is means (ER) for storing a signal representing the number of binary bits remaining to be filled in the bit string word forming register EOP. Also included is combining means including the ALU, EDS1, EDS2 and the control counter 113 operative during EB11 for forming a signal representing the difference between the values of the remaining number of binary bits to be filled signal and the previous and current difference signal. Additionally included is means including the ALU, EDS1, EDS2 and gates 108 and 110, and the control counter 113 operative during EB11 for comparing the values of the previous and current difference signal and the remaining binary bits to be filled signal for indicating that the value of the first signal is ≧ (GE) than or < (L) than the latter signal. Additionally included is means including FT, EDS7 and the control counter 113 operative during EB12 in response to the < than indication at L for retaining the difference signal in ET from the combining means as the number off bits needs in the next bit string word to enter a current absolute word.

Means including the CTR load and control logic and EDS2 is operative during EB11, 22-24 in response to the ≧ than indication at GE for enabling the counter means to count through a sequence of states corresponding in number to the retained number of bits needed in the next bit string word signal contained in ET. It should be noted that the foregoing operation occurs when, during EB11, the retained number of bits needed in the next bit string word contained in ER is ≧ than the previous and current difference signal contained in ET. Also included is the EOP shift control logic, the control counter 113 for shifting the content of the bit string forming register EOP one bit position in the direction of the most significant bit contained therein for each of the last mentioned counter means states. Means including MSB and its set logic and the control counter 113 are operative during EB25 responsive to the completion signal at *Co* for inserting bit signal of predetermined value (e.g., 1) at the least significant end of the content of the bit string register EOP.

A further preferred embodiment of the encoder has a bit string forming means which includes means for filling out the bits of a bit string word being formed when no further occurrences can be entered therein. Included therein is means ER for storing a signal representing the number of binary bits remaining to be filled in the bit string word being formed. Combining means including ALU, EDS1, EDS2 and the contol counter 113 is operative during EB11 for forming a signal representing the differences between the value of the remaining number of binary bits to be filled signal, contained in ER, and the previous and current difference signal, contained in ET. Additionally, there is means including ALU, EDS1, EDS2, gates 108 and 110 and the control counter 113 operative during EB11 for comparing the value of the previous and current difference signal and the remaining binary bits to be filled signal for indicating that the first is ≧ than or < than the later.

Means including the CTR load and control logic EDS and EDS2 is operative during EB12-14 in response to the < than indication for enabling the counter means CTR to count through a sequence of states corresponding in number to that indicated by the value of the stored remaining binary bits to be filled signal contained in ER. Also included is means including the EOP shift control logic, the control counter 113 operative during EB13-14 for shifting the content of the bit string forming register EOP one bit position in the direction of the most significant bit thereof for each of the last mentioned counter means states.

According to a preferred embodiment of the encoder, clipping means is provided. Included therein is means including ETL and EBL for storing an upper limit value and a lower limit value. Means including ALU, EDS1, EDS2 and gates 108 and 110 are operative during EB2–4 for comparing a current absolute word with the upper and lower limit values and for indicating if it is out of the bounds defined by the limit values.

According to a further preferred embodiment of the encoder, an interval adjusting means is provided along with the clipping means. Included is means EIR for storing an interval value. means including the ALU, EDS1, EDS2, EDS5, gates 108 and 110, and control counter 113 is operative during EB5 in response to the indication that the current absolute word is out of bounds for incrementally changing the stored upper and lower limit values in EBL and ETL by the stored interval value in EIR. In the specific example shown, the incremental changing is a decrementing action. Also included is means for enabling the comparing means to repeat the comparing, using the incrementally changed upper and lower limit values and current absolute word.

III. DECODE I MODULE

A. General Description

The DECODE I and II MODULES are internally similar. The difference lies mainly in the input and output signals. This section is devoted to the DECODE I MODULE. The next section will discuss the differences in the DECODE II MODULE.

The purpose of the DECODE I MODULE is to convert to absolute word form a series of received occurrences in a hybrid word. The occurrences are of decreasing value and are coded in hybrid form. Thus, the DECODE I MODULE converts information in the opposite direction from that of the ENCODE MODULE. The hybrid coded form comprises a series of binary coded words, including at least one absolute coded word followed by one or more bit string words and/or absolute words. Each absolute word represents an occurrence directly in coded form. Each bit string word represents an occurrence by the number of bits of displacement of a bit of a predetermined value from either an absolute word or another one of such bits of predetermined value in the series of hybrid words. Additionally, each hybrid word has a flag indicating whether it is an absolute or bit string type of word.

The DECODE I MODULE operates in response to a call by a calling module. The possible calling modules for the DECODE I MODULE are: PIPE, SEED, REVOLVE, BRIGHTNESS, OUTPUT MODULES and the DPM INTERFACE MODULE. In general terms, the DECODE I MODULE decodes a hybrid word by reading it from the MEMORY MODULE and if the flag bit indicates the word is an absolute word, the DECODE I MODULE outputs the word, passing it directly to the calling module. The DECODE I MODULE saves the absolute word which has been outputted and then reads another hybrid word from the MEMORY MODULE. If the flag bit indicates that the new word is a bit string word, then the bit string word is stored in a shift register and shifted until a "1" bit (bit of predetermined value) is shifted out of the register. With every shift, the previous absolute word value is counted down and each time a "1" bit is shifted out of the shift register, the state of the counter is outputted as the absolute word.

B. Components

The DECODE I MODULE includes counters MAR1, MLN1, DOl, and BCTR1. Counter MAR1 is a 256 state counter of type SN74161 in the above *TTL* book. Counter MLM1 is formed of an SN74191 type counter disclosed at page 417 of the above *TTL* book and counts up responsive to each true signal applied at the C*t* input. The MLN1 counter is also set to a state corresponding to the input signals applied at its upper side responsive to a true signal at the L or load input. Internal gating (not shown) forms a true signal at Mo when the MLN1 counter is at state 0. Counter BCTR is an 8 state counter. Counter DO1 is an 8 bit 128 state counter. Both counters BCTR and DO1 are formed of an SN74191 type counter disclosed at page 427 of the above *TTL* book. These counters operate as follows: a true signal at the CLR input resets the counters to state 0, a true signal at the L input causes the counters to be set to a state represented by the information input signals applied at its upper input. Each true signal at the C*t* input causes the counter to count up one state. Counter BCTR has logic (not shown) for forming a true output signal at $\overline{Bo}$ and B*o* when the counter is at state 0 and not at state 0, respectively.

Also included in the DECODE I MODULE is an INR1 register. Contained therein is a shift register 202. The shift register 202 is a 7 binary bit storage register formed of the type SN74199 disclosed at page 456 of the above *TTL* book.

The DECODE I MODULE also includes flip flops P1 through P5, forming a control counter 213, and flip flops D1FST, EOF1, D1SW, D1END, MSB1, S1FF and DCE. Each of these flip flops is formed of type SN7474 disclosed herein in section I.F, Conventions Used in the Figures.

One-shot multi-vibrators D1GO, D1MEND are also provided. Each of these one-shot multi-vibrators is characterized whereby a true signal applied at its input causes the indicated output to receive a true signal for a time period equal in length to the time period between the beginning of one clock pulse and the beginning of the next clock pulse at CLK. The DECODE I MODULE includes a source of equally spaced recurring clock pulses 240.

The DECODE I MODULE also includes the necessary logic to control the various registers, flip flops and counters as indicated by logical equations using the notation indicated hereinabove with respect to the ENCODE MODULE. In addition, specific AND gates 216, 218, 220, 222 are shown and OR gates 224, 226, 228, 230, 234 and 235 are shown. The AND gates 218, 220, and 222 are actually indicated schematically and comprise eight individual AND gates (not shown) for gating eight bits of information through to the corresponding outputs from the indicated source of information along the heavy line inputs. The second input to each of the eight AND gates within AND gates 218, 220 and 222 is connected to the indicated control logic indicated by logical equations. The output of the AND gates within each of the AND gates 218, 220 and 222 are OR'd together by the OR gate 226 and provided as an eight binary bit information input to the MLN1 counter.

The rest of the AND and OR gates are also conventional gates well known in the computer art and need no further explanation other than that provided in the following detailed description.

The output of AND gate 216 is indicated by the symbol CLK corresponding to clock. The output of an inverter 232 is indicated by the symbol $\overline{CLK}$ corresponding to the logical inverse of the clock signal CLK similar to the ENCODE MODULE.

Figure 9:
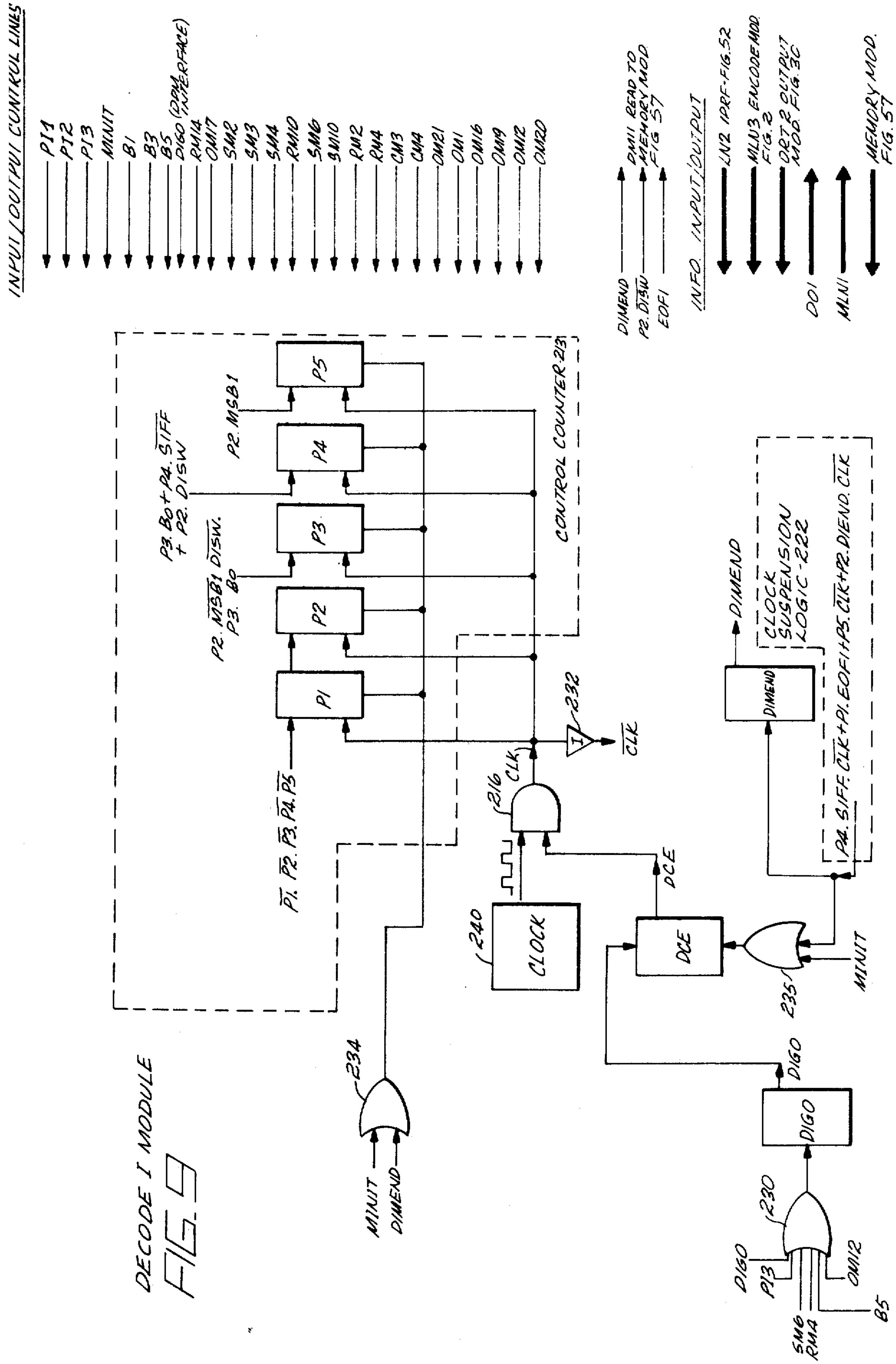
FIGS. 9 and 10 form a schematic and block diagram of the DECODE I MODULE.

The required input and output control lines to the DECODE I MODULE are indicated along the right hand side of FIG. 9; also indicated along the right hand side of FIG. 9 are the information input and output circuits using the system of notation described hereinabove.

Referring to the right hand side of the DECODE I MODULE figure, the information inputs to the DECODE I MODULE are shown in heavy lines and are LN1 from IPREF, MLN3 from the ENCODE MODULE and ORT2 from the OUTPUT MODULE. The output from the DECODE I MODULE is from the DO1 counter (heavy line), the EOF1 output of the EOF1 flip flop, the D1MEND output of the one-shot multi-vibrator D1MEND, and the output of a gate represented by the logical equation P2·D1SW. The information output from the DO1 counter is the absolute words that have been decoded from hybrid form. The signal at D1MEND indicates the completion of each resultant absolute word in the DO1 counter, thereby indicating to the calling module that it can read the absolute word from DO1. A true signal at the EOF1 output indicates that the number of hybrid words, and hence the length of the memory area, indicated by the words stored in the MLN1 counter, have been converted and therefore the hybrid occurrence vector has been completely decoded.

C. Detailed Description

Figure 10:
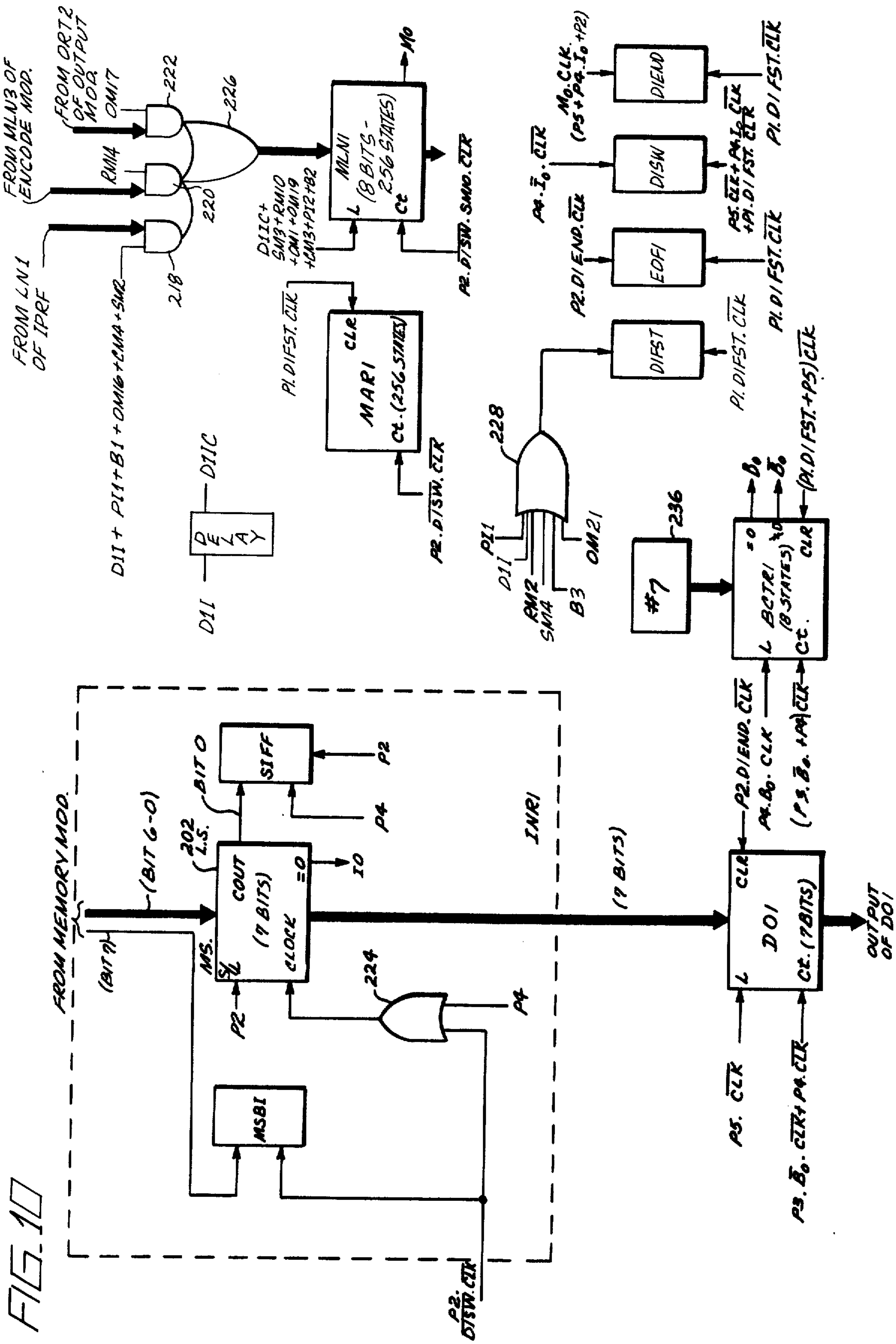
Figure 11:
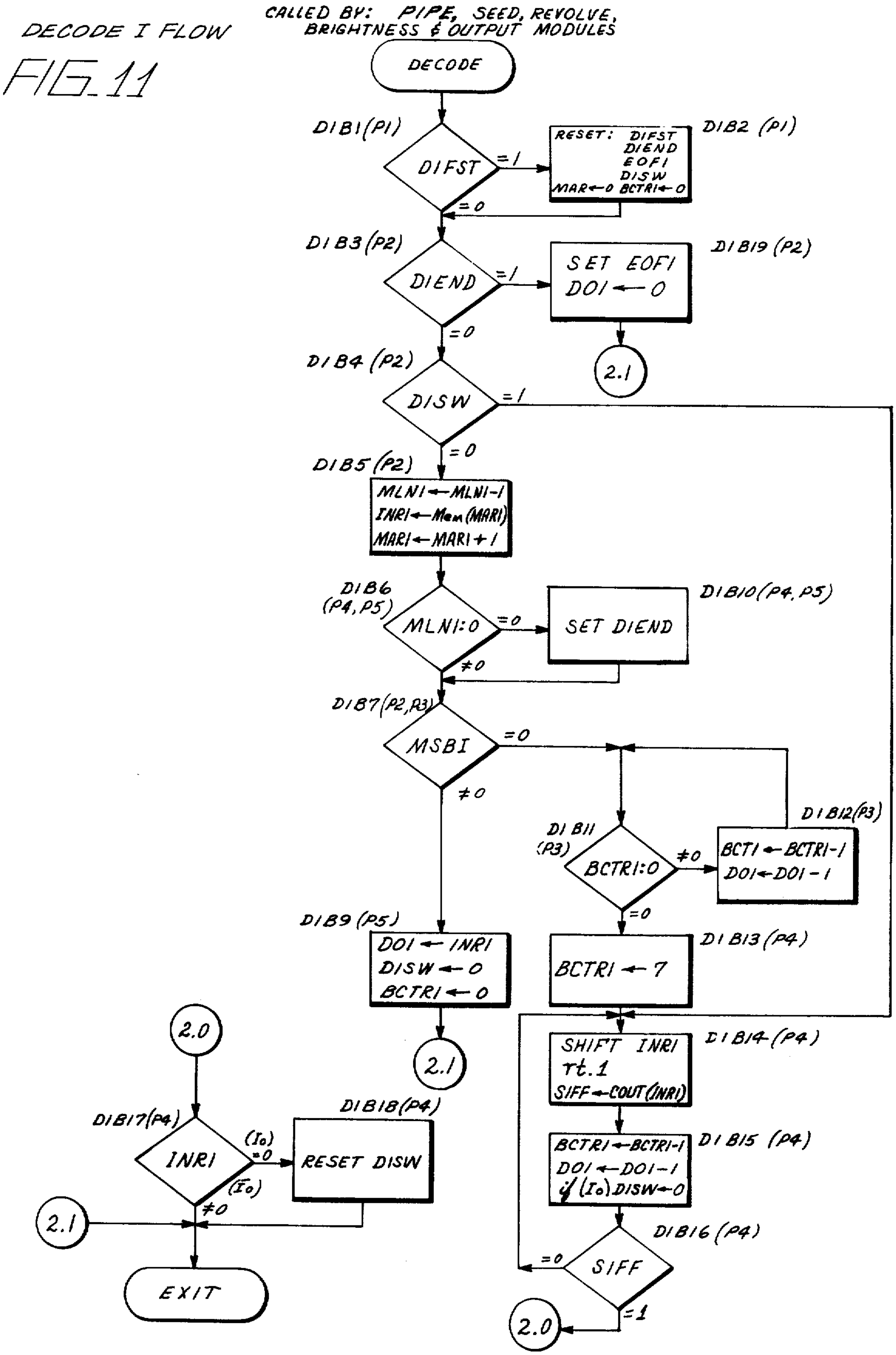
FIG. 11 is a flow diagram illustrating the sequence of operation of the DECODE I MODULE.

Table 13 gives the symbols for the important counters, registers and flip flops in the DECODE I MODULE of FIGS. 9 and 10 and indicates the length thereof and the primary output of the DECODE I MODULE. Table 11 shows the primary inputs. FIG. 11 is a flow chart indicating the sequence of operation of the DECODE I MODULE using similar notation to that described hereinabove with respect to the ENCODE MODULE. Reference to the DECODE I MODULE flow diagram should be made in reading the following description to aid in a complete understanding of the present invention.

Similar to the ENCODE MODULE, the OR gate 234 is responsive to an initial signal applied at MINIT by the MINI COMPUTER to apply a true signal to the resetting input of each o the flip flops P1–P5, resetting them to 0. Also, OR gate 235 responds to the MINIT signal for initially resetting the DCE flip flop to 0.

The DECODE I MODULE, as mentioned above, is called by any one of the following modules: PIPE, SEED, REVOLVE, BRIGHTNESS, OUTPUT and INTERFACE. The MINI COMPUTER, as later described, through the DPM INTERFACE MODULE or one of the other modules stores into one area of the MEMORy MODULE a hybrid coded occurrence vector. This hybrid coded occurrence vector is to be converted to absolute coded occurrence words using the DECODE I MODULE (and/or DECODE II MODULE). A calling module initializes the DECODE I MODULE by placing the number of words (length) of the hybrid form occurrence vector to be converted into the MLN1 counter and by setting the D1FST flip flop to a 1 state, indicating that the first call to the DECODE I MODULE is occurring.

The length of the occurrence vector is provided to the DECODE I MODULE from different sources according to the calling module a follows: PIPE MODULE — LN1 from IPRF; SEED MODULE — LN1 from IPRF; REVOLVE MODULE — MLN3 counter from ENCODE MODULE; BRIGHTNESS MODULE — LN1 from IPRF; OUTPUT MODULE — LN1 from IPRF or ORT2 register in OUTPUT MODULE; CHANGE MODULE — LN1 from IPRF; INTERFACE MODULE — LN1 from IPRF. loading MLN1 is as follows: a true signal applied by the OUTPUT MODULE at OM16 or OM17 causes AND gates 218 and 222 and OR gate 226 to couple the length value from LN1 of IPRF and ORT2, respectively, to the information input of the MLN1 counter. The CHANGE MODULE loads the MLM1 counter and the SEED MDULE calls the DECODE I MODULE. To this end, the CHANGE MODULE applies a true signal at the CM4 output, causing the AND gate 218 and the OR gate 226 to couple the length value from LN1 of IPRF to the information input of the MLN1 counter. The SEED MODULE applies a true signal atthe SM2 output which causes the AND gate 218 and OR gate 226 to couple the length of occurrence value from LN1 or IPRF to the information input of the MLM1 counter. The REVOLVE MODULE applies a true signal at RM14 to cause gates 220 and 226 to couple the length of occurrence value from counter MLN3 of the ENCODE MODULE to the information input of counter MLN1. One of the REVOLVE, SEED, OUTPUT, PIPE, BRIGHTNESS, and DPM INTERFACE MODULES then sets the D1FST flip flop to a 1 state via OR gate 228 by applying a true signal, respectively, at the corresponding output P11, RM2, SM4, B3, OM21, and D1I which, as indicated above, indicates that the first call of the DECODE I MODULE is occurring.

Subsequently, the calling module triggers the D1GO one-shot multi-vibrator, causing it to apply a control pulse at its D1GO output. D1GO is triggered by the gate 230 which receives its control pulse from one of outputs P13, SM6, RM4, B5, and D1GO.

A true signal at output D1GO sets the DCE flip flop to a 1 state, causing a true signal at the DCE output which, in turn, enables AND gate 216 to couple clock signals from the clock 240 to the CLK output. Similar to the ENCODE MODULE, the inverter 232 forms the logical inverse of the clock formed at CLK at its output at $\overline{CLK}$.

Since all of the flip flops of the control counter 213 are initially reset to zero, true signals are now formed at the outputs $\overline{P1}$, $\overline{P2}$, $\overline{P3}$, $\overline{P4}$ and $\overline{P5}$ and the clock pulse at CLK causes flip flop P1 to be set to a 1 state and D1B1 of the DECODE flow is entered.

During D1B1, the state of the D1FST flip flop is checked, assuming that this is the first call on the DECODE I MODULE. The D1FST flip flop is in a 1 state, causing a true signal at the D1FST output. Additionally, the P1 flip flop is in a 1 state. Accordingly, D1B2 of the DECODE I MODULE flow is entered where the true signals at P1, D1FST and $\overline{CLK}$ cause the D1SW flip flop to be reset to a O state. The clock pulse at $\overline{CLK}$ in combination with the true signals at the P1 and D1FST outputs causes each of the D1END, D1FST and EOF1 flip flops to be reset to an 0 state and cause the MAR1 and BCTR1 counters to be reset to an 0 state. Additionally, the clock at CLK in coincidence with the true signal at output P1 causes flip flop P2 to be set to a 1 state and flip flop P1 is reset to an 0 state.

The D1FST, EOF1, D1SW and D1END flip flops have been reset at this time for the following reasons. The D1FST flip flop is reset at this time to indicate that the resetting operation during D1B2 has been completed. This is the only function of the D1FST flip flop.

EOF1 is reset at this time to indicate that the hybrid words in the occurrence vector have not been completely converted. The D1SW flip flop is used to indicate within the DECODE I MODULE that a MEMORY MODULE read is necessary. The 0 state of the D1SW flip flop indicates that a read from MEMORY MODULE is necessary to obtain a hybrid word. This will subsequently take place during D1B5. A 1 state of the D1SW flip flop is used to indicate that a read is unnecessary and, as will be explained subsequently, D1B6 is skipped when D1SW is in a 1 state. The D1END flip flop is an internal flip flop and, when set into a 1 state, indicates to the DECODE I MODULE that after conversion of a hybrid coded occurrence vector the last absolute word has been outputted or passed to the calling module. To be explained in more detail, when the D1END flip flop is set to a 1 state, any subsequent call on the DECODE I MODULE by the calling module will force the DECODE I MODULE to form an end of file indication by setting the EOF1 flip flop to a 1 state.

Following D1B2, D1B3 is entered. During D1B3, the P2 flip flop is in a 1 state and the D1END flip flop is checked. If during D1B3 the D1END flip flop is in a 1 state, which, as discussed above, occurs when the calling module provides the last word of a hybrid occurrence vector, D1B19 of the DECODE I MODULE flow is entered.

The action of the clock suspension logic should now be noted. The true signals at p2, D1END and $\overline{CLK}$ reset the DO1 counter to 0 and cause the clock suspension logic 222 to form a true signal at the OR gate 235 causing it to reset the DCE flip flop to 0 and trigger the one-shot D1MEND. Resetting of the DCE flip flop to an 0 state removes the true signal at output DCE and causes the AND gate 216 to remove the clock signals at CLK, thereby causing the DECODE I MODULE operation to EXIT and await the next call on the DECODE I MODULE. The one-shot D1MEND then forms a true signal at output D1MEND which causes OR gate 234 to reset flip flops P1–P5 to 0. The subsequent operation caused by the D1END flip flop being in a 1 state will be further described hereinafter.

The above action of the clock suspension logic 222 is important and should be kept in mind as a similar action is enabled by the clock suspension logic when any one of the other logic conditions indicated for the clock suspension logic 222 becomes true.

Assume that during D1B3 the last word of a hybrid occurrence vector has not been provided, and the D1END flip flop is in an 0 state, causing a true signal at the $\overline{D1END}$ output. D1B4 is entered where the state of the D1SW flip flop is checked. It will be recalled that the D1SW flip flop in a 1 state indicates that the MEMORy MODULE read operation is to be skipped, whereas if in an 0 state, causes a MEMORY MODULE read. Assume that the D1SW flip flop is in an 0 state. D1B5 is entered where the memory read actually takes place.

An input to the DECODE I MODULE is the SM10 output of the SEED MODULE. To be explained in more detail, the SEED MODULE uses the DECODE I MODULE when computing the number of lines to be skipped in an iso-entropicgram. However, the SEED MODULE when computing the lines to be skipped, does not require the length value in counter MLN1 to be decremented. Accordingly, the SEED MODULE normally forms a true signal at output SM10 but removes the true signal when computing the number of lines to be skipped, thereby inhibiting counter MLN1 from being decremented.

However, for the present description, assume that a true signal is formed at SM10. True signals are also formed at P2 and $\overline{D1SW}$. Therefore, the MLN1 counter receives a true signal at its Ct input, causing MLN1 to be counted down one state reflecting the fact that one word of the hybrid occurrence vector is being read from the MEMORY MODULE. The logic P·$\overline{D1SW}$·$\overline{CLK}$ being true causes a true signal at the Ct input of MAR1, causing MAR1 to be counted up one state, reflecting the fact that the next word of the hybrid occurrence vector is to be addressed in the MEMORY MODULE. The true signals at P2 and $\overline{D1SW}$ cause a true signal to be formed at the DM11 output of the DECODE I MODULE, thereby signalling the MEMORY MODULE, causing it to read out the content of the proper memory area specified by the SWITCH MATRIX at the memory location specified in the MAR1 counter prior to its being counted up.

The control signal at P2 enables the 8 bit word readout of the MEMORY MODULE to be stored into the INR1 register. The true signal at P2 causes the most significant bit (8 bit) of the word read from the memory to be stored in the MSB1 flip flop. The true signal at P2 also goes to the S/L input circuit for the shift register 202 causing the remaining 7 bits of the word from the MEMORY MODULE to be loaded into the register 202 when the clock signal is applied from logic P2·$\overline{D1SW}$·$\overline{CLK}$. Accordingly, at the end of D1B5 of the DECODE I MODULE flow a hybrid word has been read from the MEMORY MODULE from the appropriate memory area and has been stored in the INR1 register and the MLN1 counter has been decreased by one so that the length of occurrence vector contained therein indicates the remaining words to be read from the MEMORY MODULE.

Assume now that the word stored in the INR1 register is an absolute hybrid word. It will be recalled that the first word of every hybrid occurrence vector string will always be an absolute word. When the word stored in INR1 is an absolute word, the flag bit, the most significant bit of the hybrid word, is stored in the MSB1 flip flop and causes the MSB1 flip flop to be in a 1 state. With the MSB1 flip flop in a 1 state, true signals are formed at the MSB1 and P2 outputs. Accordingly, the P5 flip flop is set to a 1 state and D1B8 is entered.

A true signal is formed at the P5 output and the following pulse at $\overline{CLK}$ causes a true signal at the L input of the DO1 counter, causing the 7 bits in the shift register 202 of the INR1 register to be loaded into the DO1 counter. The true signal at P5 in coincidence with the pulse at $\overline{CLK}$ enables the clock suspension logic −222 to reset the DCE flip flop to an 0 state, thereby disabling the clock at CLK out of the gate 216 and resetting counter 213. An EXIT is taken to await the next call. The next call is initited by a control signal, as described above at one of the inputs to OR gate 230.

If, during the true signal at P2 the word in the INR1 register read from memory is a bit string word, the MSB1 flip flop is in an 0 state and true signals are formed at the $\overline{MSB1}$ and $\overline{D1SW}$ outputs and the P3 flip flop is set to a 1 state, thereby causing D1B11 of the DECODE I MODULE flow to be entered.

At the beginning of processing of each bit string word of a hybrid occurrence vector, the BCTR1 counter is in an 0 state having been set there at D1B2.

Therefore, during the first entry into D1B11 of the DECODE I MODULE flow, the DCTR1 counter is in an 0 state. Accordingly, a true signal is formed at the Bo output of the BCTR1 counter so indicating. The true signal at Bo in combination with the true signal at P2 causes the P4 flip flop to be set to a 1 state and D1B13 is entered.

During D1B13, the BCTR1 counter is loaded with a signal representing the maximum number of bits in a hybrid word to be processed. To this end, true signals are now formed at the P4 and Bo outputs and the following pulse at CLK causes the L input of the BCTR1 counter to be energized and the value 7, represented by the setting of the switches 236, is loaded into the BCTR1 counter, and D1B14 is entered.

During D1B14 of the DECODE I MODULE flow a true signal is formed at the P4 output. Accordingly, the shift register 202 is repeatedly shifted one bit to the right until a one bit indicating an occurrence is shifted out of register 202 into the S1FF flip flop. Each bit shifted out of the least significant end of the register 202 is stored in the sign flip flop S1FF. During D1B15 of the flow a true signal is formed at the P4 output and the pulse at $\overline{CLK}$ causes the Ct input of the BCTR1 counter to be energized and count the counter down one state. The same signals cause the CT input of the DO1 counter to be energized and the counter DO1 to count down one state. For each right bit shift of the register 202, the number of bits left to be processed in the INR1 register identified by the state of the BCTR1 counter is counted down one and the absolute word value indicated by the DO1 counter is counted down one state. This operation continues until a 1 bit is shifted out of the shift register 202 into the sign flip flop S1FF thereby causing a true signal at the S1FF output. The state of the DO1 counter at this time is an absolute word representing the actual value of the occurrence represented by the 1 bit shifted out of register 202 into the S1FF flip flop and accordingly, the state of the DO1 counter is to be outputted to the calling module.

To this end, signals are formed at the P4 and S1FF outputs and the following signal at $\overline{CLK}$ causes the DCE flip flop to be reset to an 0 state and fires the D1MEND one-shot causing a true signal at the D1MEND output signalling the calling module that an absolute word is completed and contained in the DO1 counter. The D1MEND signal resets the control counter 213 to 0. The formation of the signal at D1MEND indicates completion of an absolute word and is referred to herein as outputting the absolute word.

Several important special conditions should be noted. If, during D1B15 and the 1 state of the P4 flip flop, the content of shift register 202 is not 0, it means that there is a remaining 1 bit (representing an ocurrence) yet to be converted to absolute form in a bit string word. Accordingly, a true signal is formed by register 202 at $\overline{IO}$ causing the D1SW flip flop to be set to a 1 state at the following pulse at $\overline{CLK}$. The 1 state of the D1SW flip flop is used during the following entry into D1B4 of the flow to bypass the reading of another word from the MEMORY MODULE. The reason for this action is that with the D1SW flip flop in a 1 state, a new hybrid word will not be read from the MEMORY MODULE following D1B14, as there is still at least a portion of a bit string word remaining in the shift register 202 to be converted to absolute form.

Referring to D1B17 of the flow, whenever the bit string word contained in register 202 of the INR1 register goes to zero by virtue of the fact that all of the 1 bit (or occurrence) of the bit string word has been shifted out thereof, a control signal is formed at the IO output of the shift register 202. When this occurs another hybrid word must be read from the MEMORY MODULE during D1B5. A true signal is formed at the outputs P4 and IO causing the D1SW flip flop to be reset to a 1 state at the next pulse at $\overline{CLK}$. The 0 state of the D1SW flip flop, during the following entry into D1B4, causes D1B5 of the flow to be next entered where a new hybrid word is read from MEMORY MODULE into the DECODE I MODULE for conversion. When the last word of a hybrid occurrence vector has been read from the MEMORY MODULE, the length of occurrence vector value contained in the MLN1 counter will have been counted down to 0, and a control signal is formed at the Mo output of the MLN1 counter. A true signal at Mo and a true signal at the P5, the P4 and IO outputs causes the D1END flip flop to be set to a 1 state at the next pulse at $\overline{CLK}$ thereby indicating that the last absolute word has been outputted to the calling module. With the D1END flip flop in a 1 state, the following call on the DECODE I MODULE flow will cause the EOF1 flip flop to be set to a 1 state responsive to true signals at the P2 and D1END outputs at the occurrence of the pulse at $\overline{CLK}$.

One further special situation with respect to the DECODE I MODULE should be noted. If, during the 1 state of the P3 flip flop, the BCTR1 counter is not in an 0 state, then D1B12 and D1B11 of the flow are utilized to insure that the proper alignment is made from one bit string word to another. This is necessary when the last 1 bit of a bit string word has been converted to absolute word form and outputted, and leading 0 bits remain in the bit string word under conversion in the shift register 202. These leading 0 bits must be taken into account in forming the next absolute work for output.

Referring to D1B11 and D1B12 of the flow and the corresponding action, a true signal at the P3 output in coincidence with a true signal at the $\overline{Bo}$ output causes the BCTR1 counter, as well as the D01 counter, to be counted down one state responsive to each pulse at $\overline{CLK}$. As a result, the absolute word being formed in D01 is adjusted downward by the number of leading 0's remaining in shift register 202 which are indicated by the state of BCTR1. Finally, when the BCTR1 counter reaches an 0 state, a control signal is formed at the Bo output and the true signal is removed at the $\overline{Bo}$ output terminating the counting of the BCTR1 and DO1 counters and causing D1B13 of the flow to be entered as explained above.

D. Example of Operation

Consider now an example of the operation of the DECODE I MODULE. Assume that four words, making up a hybrid occurrence vector, are contained in the memory area 1 of the MEMORY MODULE and are to be converted from hybrid to absolute word form.

EXAMPLE

Assume the following is in the memory area 1 of the MEMORY MODULE:

| | |
|---|---|
| 1 1 1 1 1 1 0 1 | (125) |
| 0 0 1 0 0 0 1 0 | (123, 119) |
| 0 0 0 0 1 0 1 0 | (116, 114) |

-continued

| | |
|---|---|
| 11100100 | (100) |

The physical length in words is 4. Therefore it is the calling program's responsibility to load MLN1←4 and set the initialize flip flop D1FST to 1.

```
First call     MLN1 = 4
               D1FST = 1
sequence of control ∴ D1B1 - D1B9
D1B1   D1FST = 1 ∴ control to D1B2
D1B2   D1FST = D1END = EOF1 = D1SW = 0          reset these flip flops;
       MAR1 = 0, BCTR1 = 0                       initialize these registers
D1B3   D1END = 0 ∴ control to D1B4
D1B4   D1SW = 0 ∴ control to D1B5
D1B5   read memory into INR1                     do the read;
                                                 the result;
       INR1 = 11111101 (125)
       MAR1 (1) = MAR1 (0) + 1                   memory address to next
                                                 position;
       MLN1 (3) = MLN1(4) - 1                    decrease the number of words
D1B6   MLN1 (3) ≠ 0 ∴ control to D1B7;
D1B7   MSB(INR1) = 1 ∴ control to DIB8 AOI form
D1B9   Dol (125) = INR1 (125)                    input becomes the output;
       D1SW = 0                                  assure a read on the
       BCTR1 = 0                                 next call and set BCTR1 to
                                                 zero;
EXIT
output Dol = 125 EOF1 = 0
Second Call    initial conditions: D1FST = 0
               MLN1 is not clocked
Sequence of control                              D1B1, D1B3-D1B7, D1B11, D1B13-
                                                 D1B16, D1B14 - D1B17
D1B1   D1FST = 0 ∴ control to D1B3
D1B3   D1END = 0 ∴ control to D1B4
D1B4   D1SW = 0 ∴ control to D1B5
D1B5   read memory                               do the read to INR1;
       INR1 = 00100010
       MAR1(2) =MAR1(1) + 1                      increase address pointer;
       MLN1(2) = MLN1(3) - 1                     decrease length register;
D1B6   MLN1 ≠ 0 ∴ control to D1B7
D1B7   MSB(INR1) = 0 ∴ control to D1B11
D1B11  BCTR1 = 0 ∴ control to D1B13
D1B13  BCTR1 = 7                                 this counter monitors how
                                                 much of the input register
                                                 remains to be processed;
D1B14  INR1 00010001
       S1FF = 0
D1B15  BCTR1(6) = BCTR(7) - 1                    reduce the number of bits
       Dol(124) = Dol(125) - 1                   to be processed & reduce
       D1SW = 1                                  the previous output - set
                                                 D1SW to indicate no read
                                                 is necessary on the next
                                                 call;
D1B16  S1FF = 0 ∴ control to D1B14
D1B14  INR1 = 00001000                           shift INR1;
       S1FF = 1                                  S1FF = 1 because of the
                                                 shift output from INR1
D1B15  BCTR1(5) = BCTR1(6) - 1                   decrement bits remaining;
       Dol(123) = Dol(124) - 1                   decrement previous output;
D1B16  S1FF = 1 ∴ control to D1B17
D1B17  INR1 ≠ 0 ∴ HALT
Output Dol = 123 EOF1 = 0
EXIT
Third Call     just assert D1GO
sequence of control                              D1B1, D1B3-D1B4, D1B14-D1B16,
                                                 D1B14-D1B16, D1B14-D1B16, D1B14-D1B18
D1B1 }
     } same as before
D1B3 }
D1B4   D1SW = 1 ∴ control to D1B14
D1B14  INR1 = 00000100                           shift INR1 right;
       S1FF = 0                                  S1FF = 0 since "shift out"
                                                 from INR1 = 0
D1B15  BCTR1(4) = BCTR1(5) - 1
       Dol(122) = Dol(123) - 1
       D1SW = 1
D1B16  S1FF = 0 ∴ control to D1B14
D1B14  INR1 = 00000010
       S1FF = 0
D1B15  BCTR1(3) = BCTR1(4) - 1
       Dol(121) = Dol(122) - 1
D1B16  S1FF = 0 ∴ control to D1B14
D1B14  INR1 = 00000001
       S1FF = 0
D1B15  BCTR1(2) = BCTR1(3) - 1
       Dol(120) = Dol(121) - 1
D1B16  S1FF = 0 control to D1B14
D1B14  INR1 = 00000000
       S1FF = 1
D1B15  BCTR1(1) = BCTR1(2) - 1
       Dol(119) = Dol(120) - 1
D1B16  S1FF = 1 ∴ control to D1B17
D1B17  INR1 = 0 ∴ control to D1B18
```

-continued

| | | |
|---|---|---|
| D1B18 | D1SW = 0 | assure a read on the next call; |
| EXIT | | |
| output Dol = 119 EOF1 = 0 | | |
| Fourth call ___ D1GO to 1 | | |
| sequence of control | | D1B1, D1B3-D1B7, D1B11-D1B12, D1B11, D1B13-D1B16, D1B14-D1B17 |
| D1B1 } D1B3 } | same as above | |
| D1B4 | D1SW = 0 ∴ control to D1B5 | |
| D1B5 | read memory | read into INR1; |
| | INR1 = 00001010 | |
| | MAR1(3) ← MAR1(2) + 1 | bump the memory address; |
| | MLN(1) ← MLN1(2) − 1 | decrement the length |
| D1B6 | MLN1 ≠ 0 ∴ control to D1B7 | |
| D1B7 | MSB(INR1) = 0 ∴ control to D1B11 | |
| D1B11 | BCTR1(1) ≠ 0 ∴ control to D1B12 | |
| D1B12 | BCTR1(0) = BCTR1(1) − 1 | the value in BCTR1 is a measure of the unshifted bits from the previous read, Dol must be decremented by this unit; |
| | Dol(118) = Dol(119) − 1 | |
| D1B11 | BCTR1(0) = 0 ∴ control to D1B13 | |
| D1B13 | BCTR1 = 7 | bits to be processed in this word; |
| D1B14 | INR1 = 00000101 | |
| | S1FF = 0 | |
| D1B15 | BCTR(6) = BCTR(7) − 1 | |
| | Dol(117) = Dol(118) − 1 | |
| | D1SW = 1 | no read necessary next time; |
| D1B16 | S1FF = 0 ∴ control to D1B14 | |
| D1B14 | INR1 = 00000010 | |
| | S1FF = 1 | |
| D1B15 | BCTR1(5) = BCTR1(6) − 1 | |
| | Dol(116) = Dol(117) − 1 | |
| D1B16 | S1FF = 1 ∴ control to D1B17 | |
| D1B17 | INR1 ≠ 0 | |
| EXIT | | |
| output Dol = 116 EOF1 = 0 | | |
| Fifth call ___ set D1GO | | |
| sequence of control | | D1B1, D1B3-D1B4, D1B14-D1B16, D1B14-D1B18 |
| D1B1 } D1B3 } | same as above | |
| D1B4 | D1SW = 1 ∴ . to D1B14 | |
| D1B14 | INR1 = 00000001 | shift INR1 right; |
| | S1FF = 0 | |
| D1B15 | BCTR1(4) = BCTR1(5) − 1 | |
| | Dol(115) = Dol(116) − 1 | |
| | D1SW = 1 | |
| D1B16 | S1FF = 0 ∴ control to D1B14 | |
| D1B14 | INR1 = 00000000 | |
| | S1FF = 1 | |
| D1B15 | BCTR1(3) = BCTR1(4) − 1 | |
| | Dol(114) = Dol(115) − 1 | |
| D1B16 | S1FF = 1 ∴ control to D1B17 | |
| D1B17 | INR1 = 0 ∴ control to D1B18 | |
| D1B18 | D1SW = 0 | read next time; |
| EXIT | | |
| output Dol = 114 EOF1 = 0 | | |
| Sixth call ___ set D1GO | | |
| sequence of control | | D1B1, D1B3-D1B6, D1B10, D1B7-D1B9 |
| D1B1 } D1B3 } | same as before | |
| D1B4 | D1SW = 0 ∴ control to D1B15 | |
| D1B15 | Memory read | |
| | INR1 = 11100100 | |
| | MAR1(4) = MAR1(3) + 1 | |
| | MLN1(0) = MLN1(0) − 1 | |
| D1B16 | MLN1 = 0 ∴ control to D1B10 | |
| D1B10 | D1END = 1 | assures an EOF1 on next call; |
| D1B7 | MSB(INR1) = 1 ∴ control to D1B8 | |
| D19 | BCTR1 = 0 | reset the sign bit; |
| | D1SW = 0 | |
| | Dol = 100 (01100100) | |
| EXIT | | |
| output Dol = 100 EOF1 = 0 | | |
| Seventh call ___ set D1GO | | |
| sequence of control | | D1B1, D1B3, D1B19 |
| D1B1 | same as above | |
| D1B3 | D1END = 1 ∴ control to D1B19 | |
| D1B19 | EOF1 = 1 | |
| | Dol = 0 | |
| EXIT | | |
| output Dol = 0 EOF1 = 1 | | |

note the output retrieved was 125, 123, 119, 116, 114, 100 - the same as was encoded before In summary, it will be seen that what has been disclosed is a decoder for converting hybrid coded signals to absolute coded word signals. The hybrid signals represent a series of occurrence values of decreasing value. The hybrid signals have a series of received binary coded word signals including at least one absolute coded word and a bit string word. The bit string word represents an occurrence by the number of bits of displacement of a bit of predetermined value (i.e., 1) from an absolute word in the series of hybrid words. A hybrid word also includes a flag signal indicating the type of word. The decoder includes an absolute word outputting means including the D1MEND one-shot multivibrator and its logic and the MSB1 flip flop and a control counter 213 operative during D1B9 of the flow in response to an absolute word flat signal of a received hybrid word signal for outputting the received word signal. In other words, the outputting means is responsive to the absolute word flag signal for directly outputting the corresponding hybrid word since it is already in absolute word form.

The decoder also includes absolute word signal forming and outputting means. The means includes the INR1 register and its shift control logic, the S1FF flip flop, the D01 and BCTR1 counters and their load and count control logic and the control counter 213 which are operative during D1B14, 16, 7-9 in response to an absolute word signal and each bit of predetermined value in a subsequently received bit string word for forming an absolute word signal indicative of the actual value of the bit of predetermined value. Also included is means such as the D1MEND one-shot multi-vibrator and its control logic operative during D1B16 for outputting each of the absolute word signals formed thereby. The true signal at D1MEND outputs the absolute word signal represented by the state of the counter DO1.

In a preferred embodiment, the means for forming and outputting the absolute word signal includes the shift register 202 in register INR1 for storing a received bit string word signal. Also included is means including the INR1 register and its shift control logic and the control counter 213 operative during D1B14 for repeatedly enabling the shifting of the content of the shift register 202, 1 bit position in the direction of the least significant bit of the bit string word. Also included is means including the S1FF flip flop and the control counter 213 operative during D1B16 for providing an indication when a bit of predetermined value arrives at the output of the shift register 202. Also included is the counter DO1 and means including the DO1 load control logic and the control counter 213 operative during D1B7-9 responsive to an absolute word flag signal of a hybrid word for setting the counter DO1 to a state, relative to the reference (0) state thereof, which corresponds to the value of the absolute word signal. Means including the DO1 count control logic and the control counter 213 is operative during D1B15 for enabling the counter to count one state towards its reference state for each shift of the shift register 202. Means including the D1MEND one-shot multi-vibrator and its control logic and the control counter 213 is operative during D1B16 in response to the bit of predetermined value in the S1FF flip flop for outputting the state of the counter by forming a true signal at D1MEND.

In a further preferred embodiment there is means for adjusting the counter DO1 for bits which are not of the predetermined value (e.g.. 0) which remain in the shift register 202 after decoding the last bit of predetermined value in a hybrid word. Included is an additional counter means such as the BCTR1. Means including the switches 236 indicate the maximum number of bits in an absolute word for output. Means including the BCTR1 load control logic and control counter 213 is operative during D1B11-13 for selectively setting the additional counter means BCTR1 to a state relative to a reference state (e.g., 0), which corresponds to the indication of the maximum number of bits in an absolute word signal. Means including the BCTR1 count control logic and control counter 213 are operative during D1B15 for enabling the additional counter means BCTR1 to count one state, relative to the set state thereof towards the $\phi$ reference state for each shift of the shift register means 202. The $\overline{Bo}$ output of the BCTR1 counter indicates the occurrence of the reference state of BCTR1. Means including the count control logic of BCTR1 and control counter 213 is operative during D1B12 in response to the flag signal of a bit string word signal stored in MSB1 and the indication at $\overline{Bo}$ indicating the lack of a reference state of BCTR1 for further enabling the counting of the counter DO1 and BCTR1, one count for each shift of the shift register means 202. By this arrangement the high order $\phi$ bits which are not of the predetermined value which are left in the shift register 202, after all bits of predetermined value are shifted out, are reflected into the absolute word signal under formation in shift register 202.

IV. DECODE II MODULE

Figure 12:
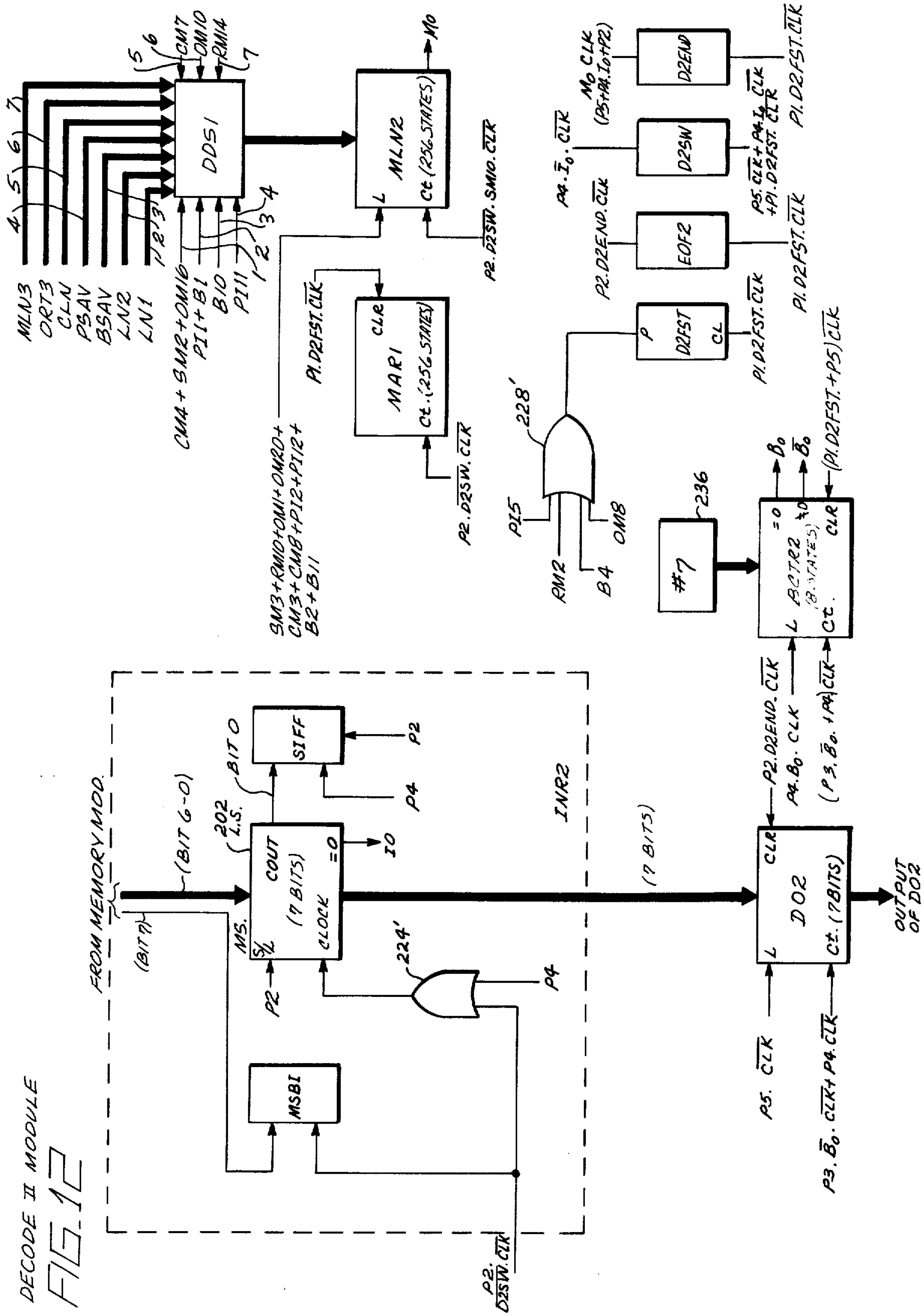
FIGS. 12, 13 and 14 form a schematic and block diagram of the DECODE II MODULE.
Figure 13:
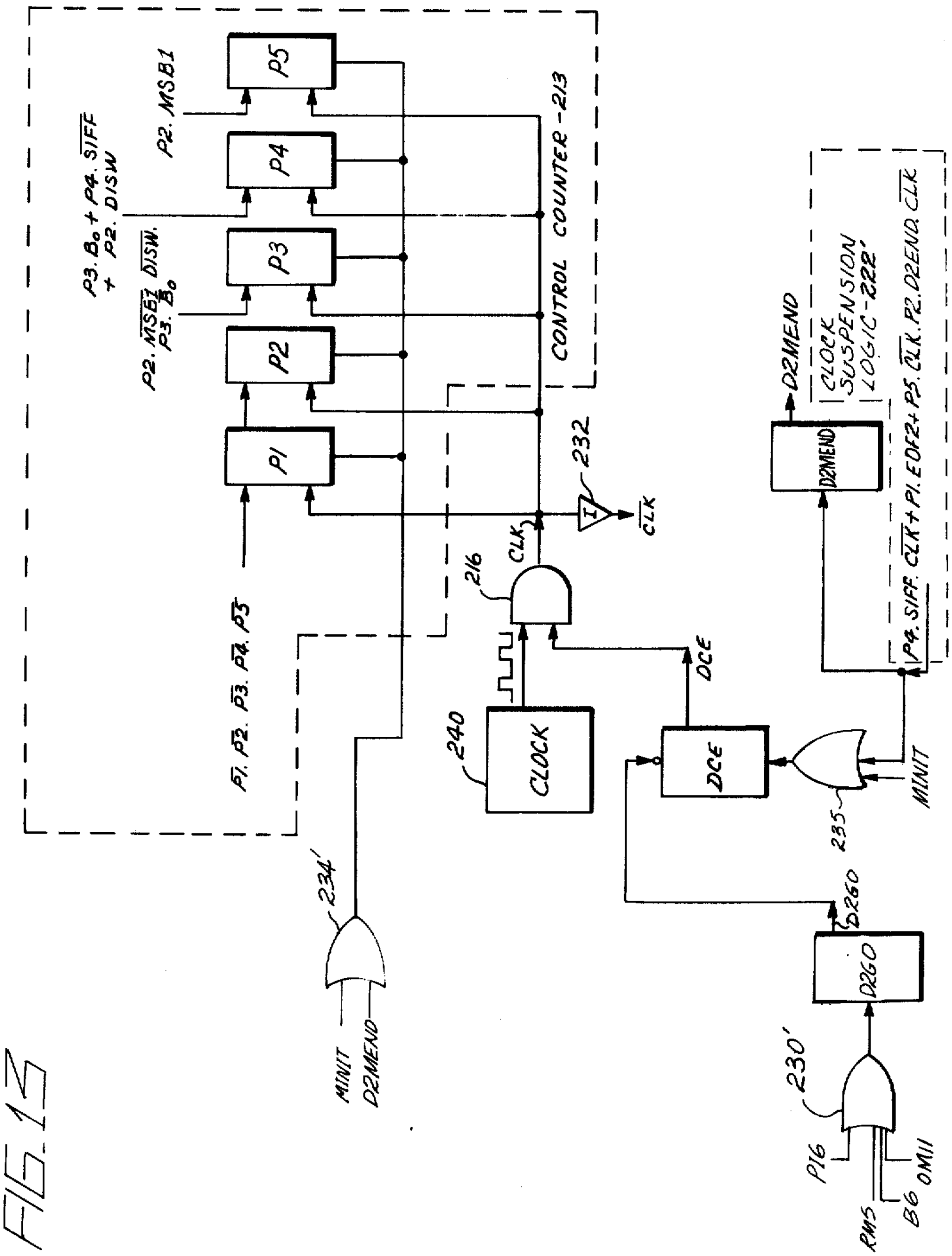
Figure 14:
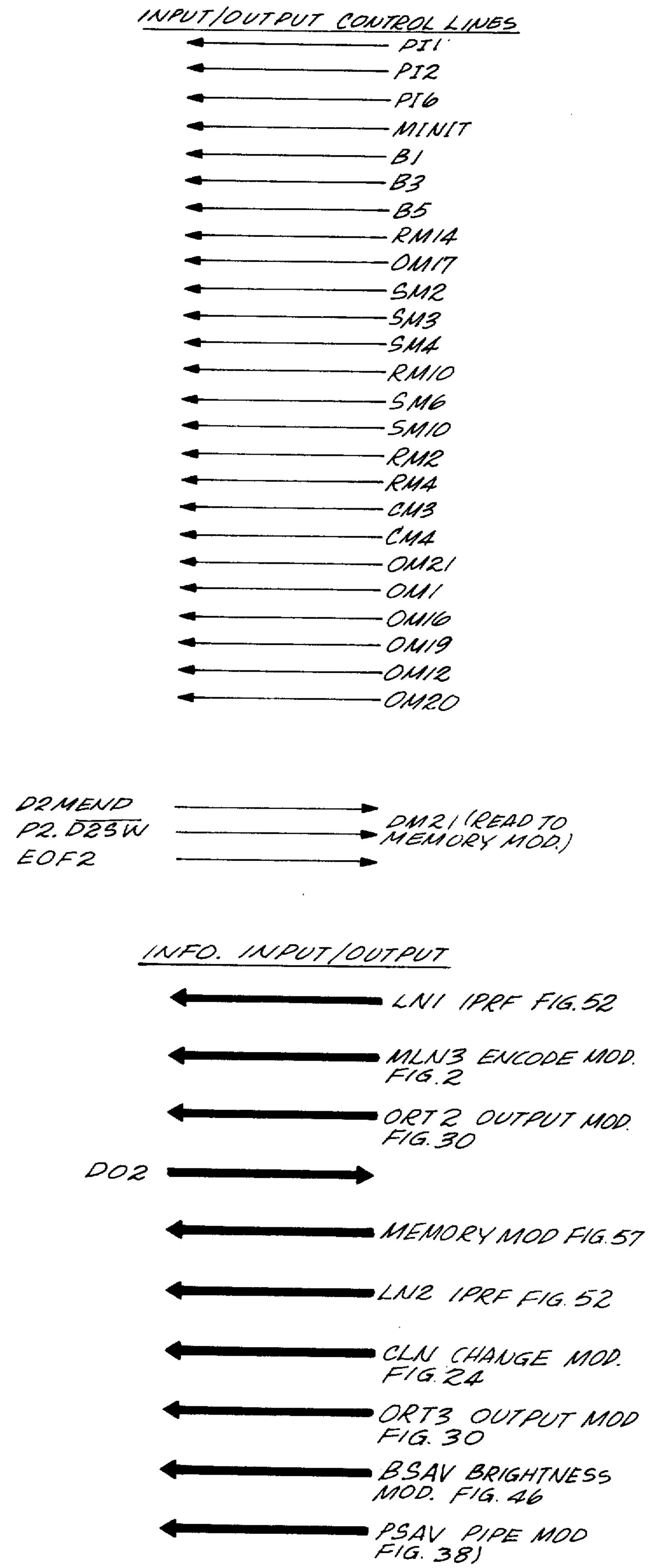

FIGS. 12-14 form a schematic and block diagram of the DECODE II MODULE. The DECODE II MODULE is basically constructed the same as the DECODE I MODULE except as described below. Two decode modules, DECODE I MODULE and DECODE II MODULE, are needed in the system in order to decode the occurrences of an occurrence vector from hybrid to absolute coded words and provide the resultant absolute coded words in two streams at different rates. DECODE I MODULE and DECODE II MODULE provide their respective streams of absolute coded words, one word (or occurrence) at a time when called.

The DECODE II MODULE is virtually identical to the DECODE I MODULE as mentioned above. In keeping with the virtual identical structure, the same symbols are used to denote the various parts of the DECODE II MODULE as are used for the DECODE I MODULE. However, in some instances a 1 in a symbol for the DECODE I MODULE is changed to a 2 in the DECODE II MODULE to help simplify the description or distinguish between lines going between modules. The components whose identity and symbols have been changed in the DECODE II MODULE by changing a 1 to a 2 are identified below.

| DECODE I | DECODE II |
|---|---|
| BCTR1 | BCTR2 |
| DO1 | DO2 |
| INR1 | INR2 |
| MAR1 | MAR2 |
| MLN1 | MLN2 |
| D1FST | D2FST |
| EOF1 | EOF2 |
| D1GO | D2GO |
| D1MEND | D2MEND |

A data selector DDS1 similar to that described above replaces the gates 218-226 of the DECODE I MODULE for gating the occurrence vector length into counter MLN2. However, a gating circuit similar to the DECODE I MODULE could be used. The occurrence vector length is coupled from the information source indicated along the top of DDS1 to the MLN2 counter responsive to true signals at the control lines indicated along the sides of the DDS1. Additionally, the gating conditions indicated for the load or L input of MLN2 differs from that of the DECODE I MODULE and should be noted.

The input control lines connected to gates 224', 228', 230' and 234', and the clock suspension logic 222', differ in minor respects from that of gates 224, 228, 230 and 234 and suspension logic 222 of the DECODE I MODULE and the primes are affixed to these symbols to so indicate

V. DELTA MODULE

A. General Description

The DELTA MODULE breaks the number of lines to be revolved (in an iso-entropicgram) from a calling module and breaks the number into smaller increments. The implementation now to be described breaks the number of lines to be revolved into its largest possible component powers of 2 in decreasing value order which, in turn, corresponds to the number of lines to be revolved. This feature is described in the General Description with reference to Table 4-C and is of importance because the lines in the iso-entropicgram can be derived with a minimum of XOR operations. Also, by revolving from one line to another in an iso-entropicgram where the second line is away from the first by a number of lines equal to a component power of 2, the revolve to the second line is accomplished by a single shift and XOR operation.

The DELTA MODULE, in operation, receives a binary coded number in the 1, 2, 4, 8 number code (from the calling module) representing the total number of lines to be revolved, and breaks the number into its largest possible component powers of 2. The largest component power of 2 is formed first, followed by the other largest powers of 2 in decreasing order of magnitude. Although the invention is not limited thereto, the DELTA MODULE about to be described operates on 8 bit words.

The DELTA MODULE converts a number by storing it into a first register and then shifting the number towards the most significant bit position, repeatedly, one bit position at a time. A second register with the same number of bits as the first register has a "1" bit that is shifted towards the least significant bit position, one bit position each time the first register is shifted. Since the two registers are shifted in opposite directions by the same amount whenever a "1" arrives at the output of the first register, the "1" bit in the second register indicates directly the corresponding power of 2 of the 1 bit shifted out of the first register.

Table 14 is a DELTA MODULE example illustrating how the above operation takes place. The binary coded number to be converted represents the decimal number 13 and is stored in the first register in binary coded form, whereas the second register is initially set to 0. Eight shifts are depicted, one for each bit of the number to be converted. On the first shift, the first register is shifted 1 bit towards the most significant bit, whereas the second register has a 1 bit stored in the most significant end where it represents the binary coded number 128. With each subsequent shift of the first register towards the most significant bit, the second register is shifted towards the least significant bit. Following shift 5, a 1 bit for the first time is shifted out of the first register. This indicates that the content of the second register, which now represents 8, can be read as it now contains the largest component power of 2. Also, 1 bits are shifted out following shifts 6 and 8 and the second register at these times represents the numbers 4 and 1, respectively. Adding 8, 4 and 1 results in 13 which is the binary coded number originally stored in the first register.

B. Components

Figure 15:
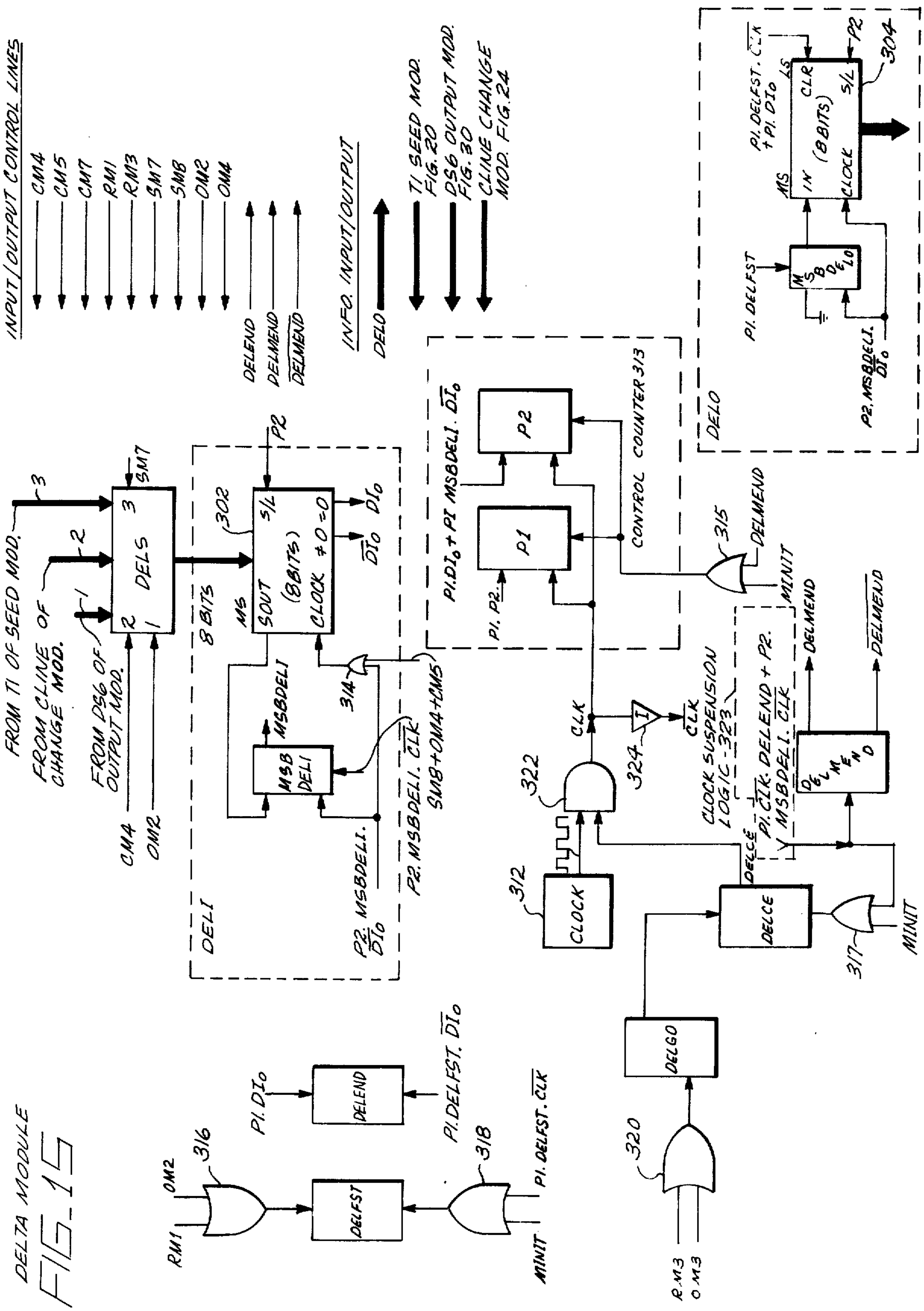
FIG. 15 is a schematic and block diagram of the DELTA MODULE.
Figure 16:
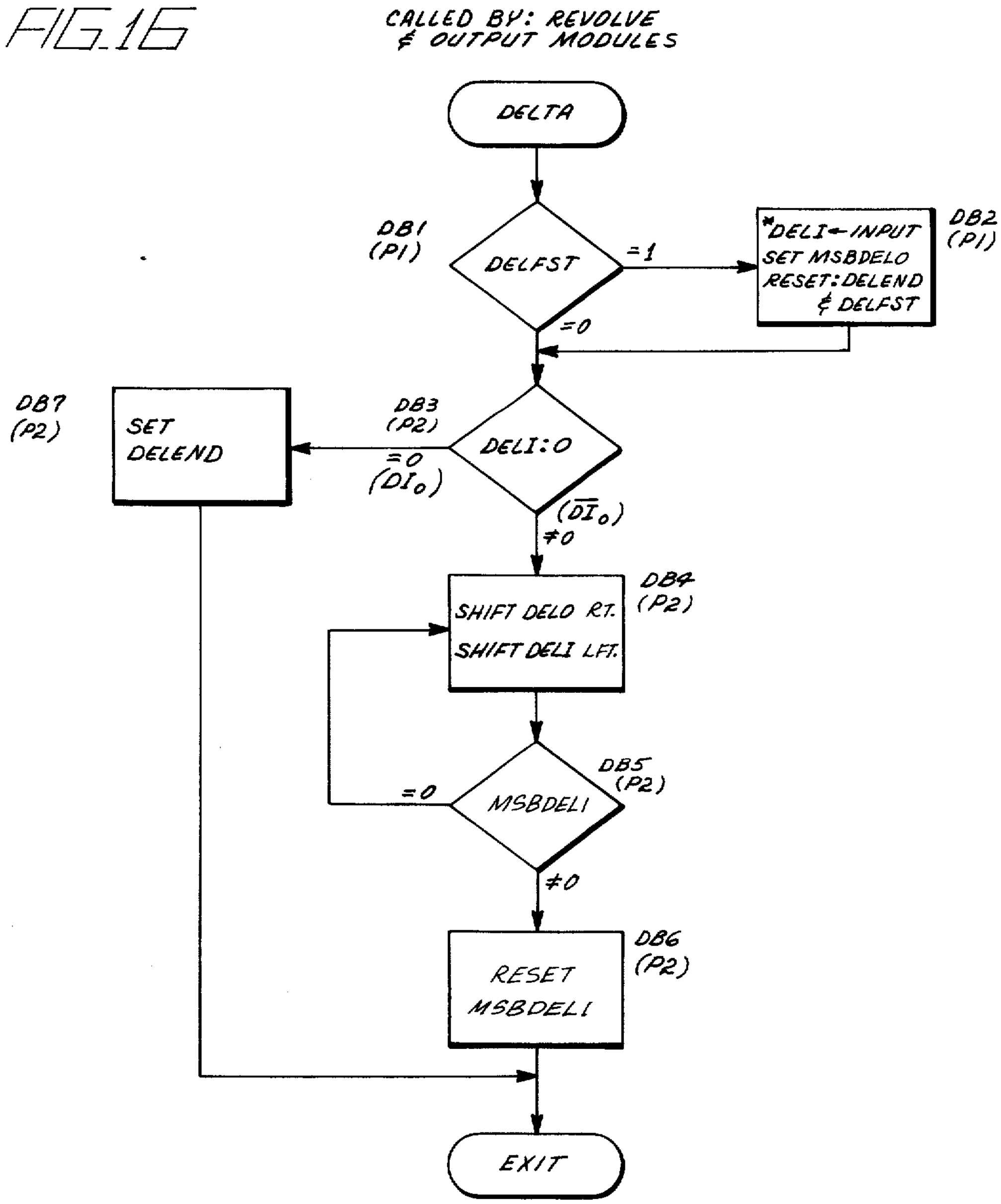
FIG. 16 is a flow diagram illustrating the sequence of operation of the DELTA MODULE.

The DELTA MODULE, FIG. 15, contains inputs and output control lines indicated along the right hand side. The system of notation described above in section I.F, Conventions Used in Figures, is used. Additionally, there are information input and output lines. These input and output lines carry multiple bits of information and are indicated by heavy lines.

Two registers DELI and DELO are provided. Register DELI includes an 8 flip flop shift register 302 and the register DELO includes an 8 flip flop shift register 304. Both of the registers DELI and DELO include a most significant bit flip flop, DELI containing MSBDELI and DELO containing MSBDELO. MSBDELI has its input for setting it to a 1 state connected to the output SOUT of shift register 302. The output SOUT of register 302 is the unprimed output from the most significant flip flop in register 302. The MSBDELO flip flop in DELO has its MSBDELO (or unprimed) output connected to the "IN" input of register 304 which is the set to 1 input of the most significant flip flop in register 304. Logic (not shown) in register 302 applies true signals at DI*o* and $\overline{\text{DI}o}$ when the register is 0 and not 0, respectively. The operating characteristics of shift registers 302 and 304 are the same as shift register 114 of the ENCODE MODULE. Register 304 also has a CLR input which is responsive to a true signal at CLR to reset register 304 to 0. Shift registers 302 and 304 are of type SN74198 disclosed at page 456 of the above *TTL* book.

A control counter 313 has two flip flops P1 and P2. Additionally, control flip flops DELFST, DELEND and DELCE are provided. The DELFST flip flop, when a a 1 state, indicates that the first call is occurring to the DELTA MODULE. The DELEND flip flop in a 1 state indicates that the word stored in DELI has been completely converted in to its component powers of 2. Thus, the 1 state of DELEND is an indication that the DELTA MODULE has completed its operation. The flip flop DELCE controls the formation of clock pulses at CLK. Each of the flip flops in the DELTA MODULE are of type SN7474 described in section I.F. Conventions Used in Figures.

One-shot multi-vibrators DELGO and DELMEND are contained in the DELTA MODULE. One-shot multi-vibrator DELGO is set to a 1 state pursuant to each cell on the DELTA MODULE. One-shot multi-vibrator DELMEND indicates each exit from the DELTA MODULE operation by a true signal at the DELMEND output and resets the module. The one-shot DELGO and DELMEND have the same characteristics as the one-shot of the ENCODE MODULE.

A source of clock signals formed by a clock 312 forms a series of regular recurring true pulses as depicted.

The DELTA MODULE also includes OR gates 314, 315, 316, 317, 318 and 320, and an AND gate 322. These gates are conventional gating circuits well known in the computer art. The output of AND gate 322 is designated CLK. The inverter 324 is a conventional logical inversion circuit which forms the logical inverse of the signal at CLK, and the inverted signal is designated $\overline{CLK}$.

A selection circuit DELS is a conventional selection circuit of the same type disclosed in the section I-B above. Selector circuit DELS couples 8 bits of information from any one of the designated three 8 bit inputs to a single 8 bit output which is the information input into register 302.

C. Detailed Description

The purpose of the DELTA MODULE is to receive a number representing the number of lines to be revolved and convert the number into its largest possible component powers of 2 in decreasing value order.

The DELTA MODULE is called by either the REVOLVE MODULE or the OUTPUT MODULE. The DELTA MODULE is called by the REVOLVE and OUTPUT MODULES by first setting the DELFST flip flop to a 1 state. The OR gate 316 sets the DELFST flip flop to a 1 state and has inputs RM1 and OM2 from the REVOLVE and OUTPUT MODULES, respectively. A control signal at either the RM1 output of the REVOLVE MODULE or the OM2 output of the OUTPUT MODULE enables OR gate 316 to trigger the DELFST flip flop to a 1 state. Following the signals at either RM1 or OM2, the REVOLVE and OUTPUT MODULES, respectively, provide signals at the RM3 and OM3 outputs. A control signal at either the RM3 and OM3 output energizes the OR gate 320, causing a true signal to be applied to the one-shot DELGO, causing it to apply a true signal to the input of the DELCE flip flop. This causes the flip flop DELCE to be set to a 1 state and causes the flip flops P1 and P2 to be reset to an 0 state.

The 1 state of flip flop of DELCE causes a true signal at the DELCE output which, in turn, enables the AND gate 322 to couple the clock signals from clock 312 to the CLK output. The resulting true signals at the P1 and P2 outputs of flip flops $\overline{P1}$ and $\overline{P2}$ cause flip flop P1 to be set to a 1 state at the following pulse at CLK. As a result, D1B1 of the DELTA MODULE flow is entered.

The source of the number to be converted is determined by control signals at the OM2, CM4 and SM7 outputs of the OUTPUT, CHANGE and SEED MODULES, respectively. A true signal of OM2, CM4 or SM7, respectively, causes the DELS selection circuit to gate the 8 bits of information from DS6 of the OUTPUT MODULE from CLINE of the CHANGE MODULE or from T1 of the SEED MODULE, respectively, to the information input of the shift register 302. The signal at P2 is now false, causing register 302 to be in a load mode of operation and the true signal at SM8 (SEED MODULE), OM4 (OUTPUT MODULE), or CM5 (CHANGE MODULE) enables the OR gate 314 to cause register 302 to store the 8 bit information signal from DELS.

During the 1 state of flip flop P1, control signals are formed at the P1 and DELFST outputs of flip flops P1 and DELFST, causing the MSBDELO flip flop to be set to a 1 state. To be explained in more detail, the 1 state of the MSBDELO flip flop is used to enable a 1 bit to be shifted into the most significant bit position of the shift register 304 during the following shifts of register 302.

The true signals at P1 and DELFST additionally cause the OR gate 318 to reset the DELFST flip flop to an 0 state and reset the DELEND flip flop to an 0 state.

Register 302 no longer contains all 0's, a number to be converted having been stored therein, therefore a true signal is formed at the $\overline{DIo}$ output indicating that the register is not 0. This signal, in coincidence with the true signal at P1, causes the P2 flip flop to be set to a 1 state and DB3 is entered.

The conversion is made by shifting register 302 containing the number to be converted towards the most significant bit and by shifting the register 304 towards the least significant bit. The first shift shifts a 1 bit into the most significant bit position of register 304 from flip flop MSBDELO. During DEB3 of the flow, whenever the register 302 does not contain all 0's, a control signal is formed at the DIo output in coincidence with the true signals at P2 and MSBDELI. Coincidence of these true signals cause the register 302 to be shifted one bit towards the most significant bit position, causing the most significant bit in register 302 to be stored in the MSBDELI flip flop and causing the register 304 to be shifted 1 bit position towards the least significant bit position. During the first shift, the MSBDELO flip flop is in a 1 state, causing a 1 bit to be stored in the most significant bit position or flip flop of the register 304. It will be noted that the DELTA MODULE flow indicates a "SHIFT DELO rt" and "SHIFT DELO lft". "SHIFT DELO rt" indicates a shift right towards the least significant bit position of register 304 whereas "SHIFT DELI lft" indicates a shift left towards the most significant bit position of the register 302.

Following DB4, DB5 of the flow is entered where the MSBDELI flip flop is checked. If the MDBDELI flip flop is not in a 1 state, i.e., a 1 bit having been shifted there from register 302, DB4 of the flow is again entered where the above shift is repeated in the same manner as described above. The shifting process continues until a 1 bit is stored into the MSBDELI flip flop. When this occurs, DDB6 of the flow is entered.

The 1 state of the MSBDELI flip flop causes a true signal at the MSBDELI output. The true signals at P2, MSBDELI and $\overline{CLK}$ trigger the one-shot DELMEND to a 1 state, causing a true signal at the DELMENT output from the DELTA MODULE and additionally resetting the DELCE flip flop to a 0 state, thereby preventing the AND gate 322 from applying additional clock pulses at CLK and causing the shifting to terminate and operation of the DELTA MODULE flow to EXIT. The true signal at the DELMEND output indicates to the calling module that it has finished processing and that the word contained in register 304 of DELO may be read as it now contains one of the component power of 2 of the input number originally stored in register 302. The true signal at output DELMEND also enables OR gates 315 to reset control counter 313 to 0 (i.e. P1, P2 = 0). The true signals at P2, MSBDELI and $\overline{CLK}$ reset the MSBDELI flip flop to a 0 state.

The DELTA MODULE is again called by either the REVOLVE MODULE or the OUTPUT MODULE by applying control signals at either the RM3 or OM3 outputs. Either of these signals cause the OR gate 320 to again trigger the one-shot DELGO which, in turn, sets the DELCE flip flop to a 1 state, enabling the AND gate 322 to form pulses at the CLK output. Both the P1 and P2 flip flops are in 0 states, accordingly, flip flop P1 is set to a 1 state at the following pulse at CLK. After the first call (signal at RM3 or OM3), the DELFST flip flop is in a 0 state, accordingly, DN3 of the flow is entered, followed by DN4–6, as described above. During each entry into DB4 and DB5, the shift registers in DELI and DELO are shifted until another 1 bit is stored in MSBDELI, causing another true signal at the output DELMEND, indicating to the calling module that a new component power of 2 is now in register 304 for output.

Finally, when the last 1 bit of the input member contained in register 302 is shifted into the MSBDELI flip flop, the content of register 302 is 0, causing a true signal at the DI*o* output. If this occurs while the P1 flip flop is in a 1 state, the following pulse at CLK sets the DELEND flip flop to a 1 state. If it occurs while the P2 flip flop is in a 1 state, the DELEND flip flop is set to a 1 state, irrespective of the clock. The 1 state of the DELEND flip flop and resulting control signal at DELEND signals the calling module that the last and least significant power of 2 of the input number has been formed (e.g. entire number has been converted). A true signal at the DELEND output or the DI*o* output in combination with the true signals at P1 and $\overline{CLK}$ cause the DELMEND one-shot to be set to a 1 state and the DELCE flip flop to be reset to a 0 state, inhibiting the gate from providing further pulses at CLK.

DELMEND clock circuit becomes P1·DELEND·$\overline{CLK}$ + $\overline{CLK}$ P2·MSBDELI. These changes permit the DELTA MODULE to convert the number set in DELI to its component powers of 2. After this has been done, DI*o* will be asserted. Then any further call on the DELTA MODULE will cause DELEND to be set during P1 and the module will terminate upon the assertion of the $\overline{CLK}$ signal during pulse P1. Note that DELO is cleared in this case.

D. Example of Operation

With the foregoing detailed organization in mind, consider an actual example of the operation of the DELTA MODULE. For the example, assume initially that the number 13, which in binary coded form is 00001101, is to be converted and the DELTA MODULE is called by control signals at RM1 and RM3 and OM2 and OM3 from the REVOLVE and OUTPUT MODULES, respectively, as described above. The binary coded number 00001101 is loaded into the register 302 as described above. The sequence of operation thereafter is as follows.

| | | |
|---|---|---|
| sequence of control | | DB1-DB5, DB4-DB5, DB4-DB5, DB4-DB5, DB4-DB6; |
| DB1 | DELFST = 1 ∴ control to DB2 | |
| DB2 | DELFST = DELEND = 0 | reset these flip flops; set MSBDELO of DELO (10000000φ); |
| DB3 | DELI (13) ≠ 0 ∴ control to DB4 | |
| DB4 | DELI = 00011010 | shift DELI left; |
| | DELO = 10000000 | shift DELO right; |
| DB5 | MSB (DELI) = 0 ∴ control to DB4 | |
| DB4 | DELI = 00110100 | |
| | DELO = 01000000 | |
| DB5 | MSB(DELI) ≠ 0 ∴ control to DB4 | |
| DB4 | DELI = 01101000 | |
| | DELO = 00100000 | |
| DB5 | MSB (DELI) ≠ 0 ∴ control to DB4 | |
| DB4 | DELI = 11010000 | |
| | DELO = 00010000 | |
| DB5 | MSBDELI = 0 ∴ control to DB4 | |
| DB4 | DELI = 10100000 | |
| | DELO = 00001000 | |
| DB5 | MSBDELI = 1 ∴ control to DB6 | |
| DB6 | MSBDELI = 0 | DELI = 10100000 |
| HALT | | |
| OUTPUT | DELO = 8 (highest component power of 2 in 13) | |
| | DELEND = 0 | |
| Second call | DELI is unaltered | |
| | DELFST = 0 | |
| sequence of control | | DB1, DB3-DB6 |
| DB1 | DELEST = 0 ∴ control to DB3 | |
| DB3 | DELI ≠ 0 ∴ control to DB4 | |
| DB4 | DELI = 01000000 | |
| | DELO = 00000100 | |
| DB5 | MSBDELI = 1 ∴ control to DB6 | DELO = 4 - next component power of 2 |
| DB6 | MSBDELI = 0 | DELI = 01000000 |
| HALT | | |
| OUTPUT | DELO = 4 DELEND = 0 | |
| Third call | all parameters are unaltered on input | |
| sequence of control | | DB1, DB3-DB5, DB4-DB6 |
| DB1 / DB3 | } as explained above | |
| DB4 | DELI = 10000000 | |
| | DELO = 00000010 | |
| DB5 | MSB(DELI) = 0 ∴ control to DB4 | |
| DB4 | DELI = 0000000 | |
| | DELO = 00000001 | |
| DB5 | MSB(DELI) = 1 ∴ control to DB6 | |
| DB6 | MSB(DELI) = 0 | DELI = 0000000; |
| HALT | | |
| OUTPUT | DELO = 1 DELEND = 0 | |
| Fourth call | | |
| sequence of control | | DB1, DB3, DB7; |
| DB1 | as before | |
| DB3 | DELI = 0 ∴ control to DB7 | |
| DB7 | DELEND = 1 DELO = φ | HALT |
| OUTPUT | DELO = φDELEND = 1 | |

VI. REVOLVE MODULE

A. General Description

As disclosed and described herein above with respect to Table 5, a line in an iso-entropicgram represented by 1's and 0's can be generated simply by shifting the preceding line 1 bit position to the right and XORing the unshifted and shifted preceding line together, truncating above the most significant bit to the right. Also, lines of an iso-entropicgram can be skipped to generate a second line in an iso-entropicgram from a first line. This is done by breaking the number of lines, between the first line and the second line, into its component powers of 2, going from largest to smallest power of 2. If the component powers of 2 are used to determine the increment in which revolve takes place from the first to the second line, each increment is a simple shift and XOR operation. This has been described above in connection with Table 4-C.

However, each occurrence making up a line of an iso-entropicgram is represented in absolute coded form rather than by binary 1's and 0's, to facilitate implementation. As a result, the shift and XOR operation are accomplished according to the embodiment of the invention using absolute coded occurrence values rather than 1's and 0's. Table 4-E illustrates this process for the revolve operation disclosed and described in connection with Table 4-D. Thus, the 1's only need be represented and are represented by absolute decimal numbers. Line 7 is shifted by 8 places to the right simply by adding 8 to the absolute decimal value of line 7. XORing takes place simply by sorting the unshifted and shifted values in order of magnitude, deleting those absolute occurrence values which are the same and those values which go beyond the end of the iso-entropicgram. In this manner the result of the first XOR results in Line 15 of the iso-entropicgram of Table 4-B which is a simple sort of the unshifted and shifted values. Note, however, that the shift of line 15 by 1 results in a value 16. Since 16 exceeds the width of the iso-entropicgram, it is discarded. Also during the subsequent XOR the values 3, 7, 8, 11 and 15 are discarded. The sort of the remaining numbers results in a sequence of decimal values representing Line 16.

Turning now to the REVOLVE MODULE, the revolve operation is performed principally under control of the REVOLVE MODULE with assistance of the MEMORY, ENCODE, DECODE I and II, and DELTA MODULES.

Figure 18:
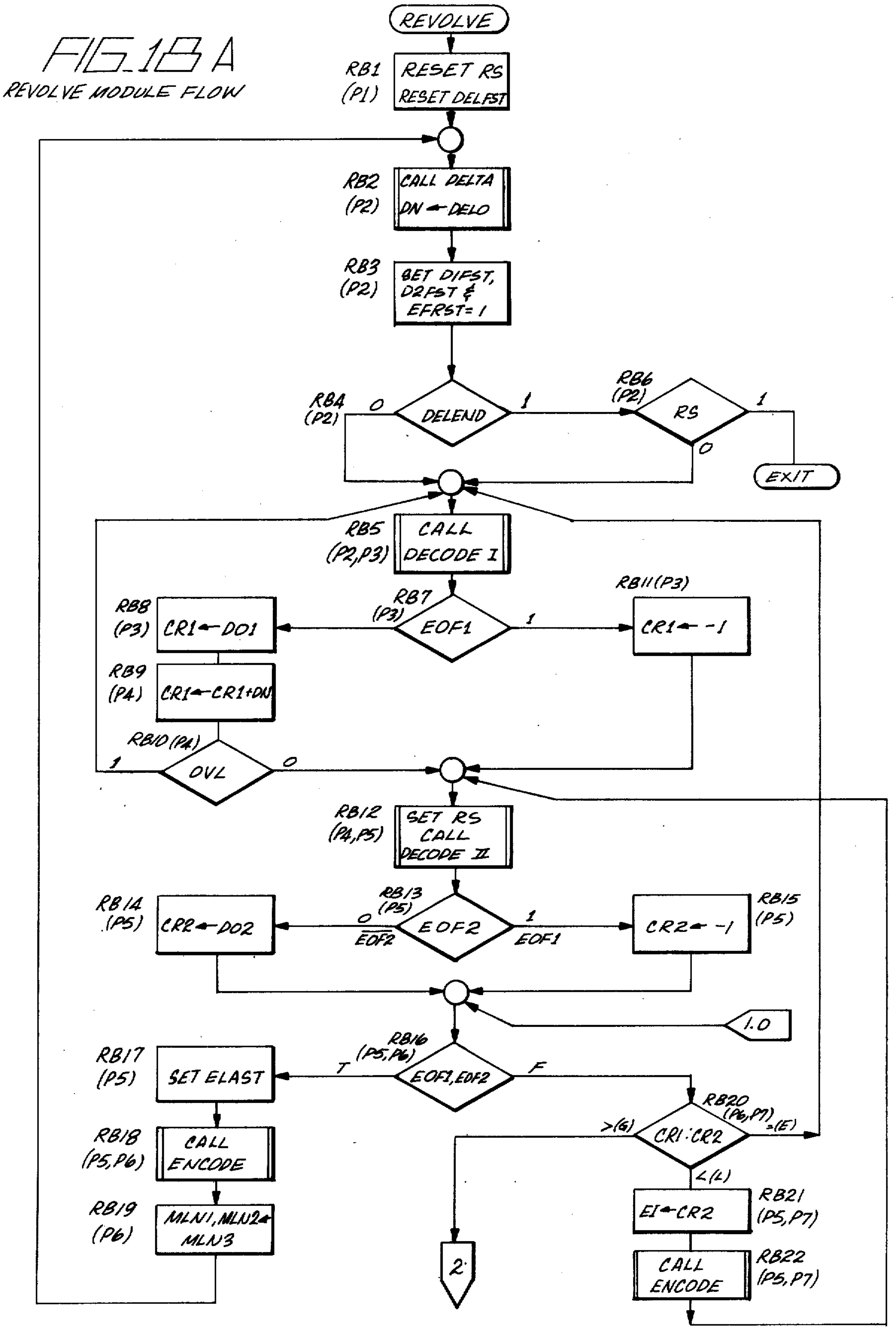
FIGS. 18A and 18B form a flow diagram illustrating the sequence of operation of the REVOLVE MODULE.
Figure 18B:
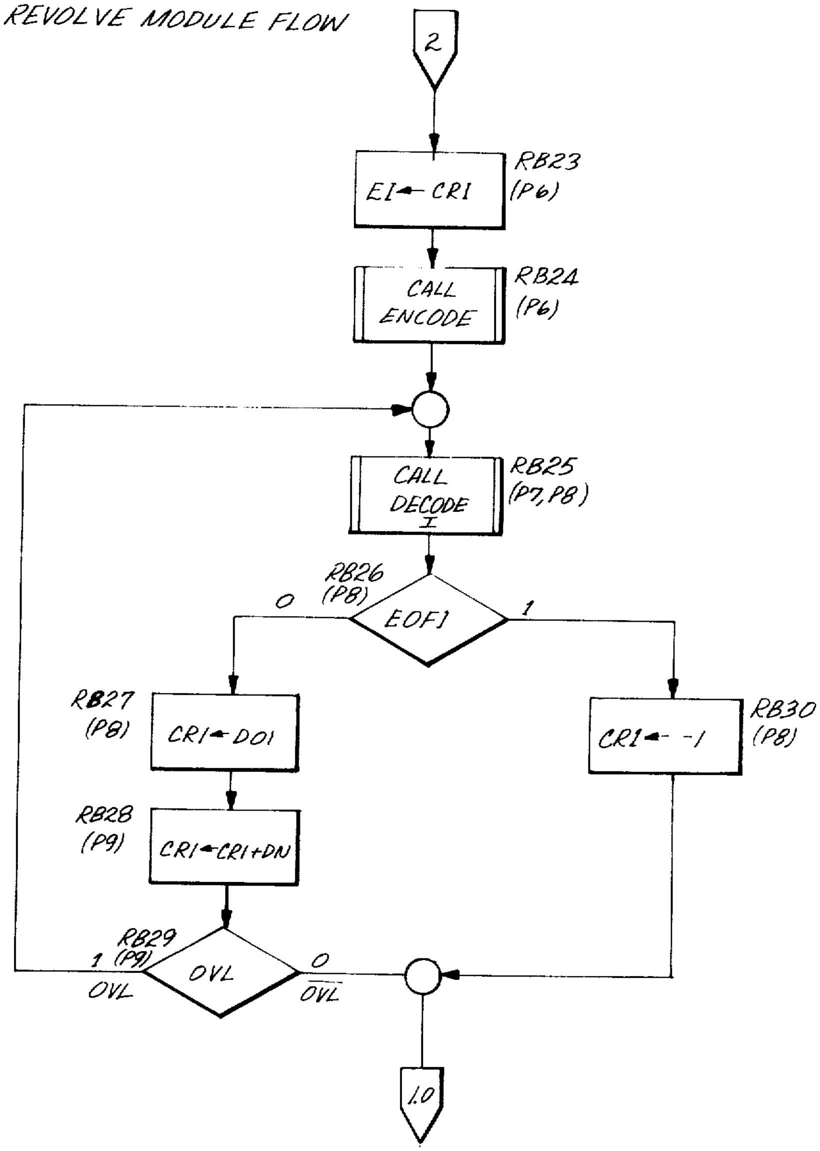

FIG. 18 shows a flow chart which illustrates the sequence of operation of the REVOLVE MODULE. The symbol RB followed by a number identifies each box in the flow and the symbol P followed by a number identifies the flip flop(s) of the control counter 413 which is (are) in a 1 state for the corresponding flow blocks.

The REVOLVE MODULE serves the following two functions:

1 It revolves a line of an iso-entropicgram down the number of lines which the calling module has set into the DELI register of the DELTA MODULE.
2. It merges two lines (i.e., XOR's two lines) of an iso-entropicgram together without any revolve. This function is accomplished by the calling module's placing an $\phi$ in the DELI register of the DELTA MODULE.

The purpose of the first function is to find the "seed" line or the output line of the iso-entropicgram. The second function is used in connection with the CHANGE MODULE where the CHANGE MODULE uses the REVOLVE MODULE to revolve the changes down to the seed line and then uses the REVOLVE MODULE to merge these changes with the seed line. Thereafter, the REVOLVE MODULE performs its first function of revolving the merged line to the seed line.

The REVOLVE MODULE receives as input actual absolute coded occurrence values provided by the DECODE I and II MODULES. DECODE I and II MODULES act independently in the sense that they select in order all occurrence values of a common input line from the MEMORY MODULE at different rates. The rate at which DECODE I and II MODULES select the occurrence values from a common input line is determined by the REVOLVE MODULE which calls or requests occurrences as required.

The REVOLVE ODULE also receives absolute coded values representing the component powers of 2 formed by the DELTA MODULE. These values each represent a number of lines in the iso-entropicgram to be revolved. Each component power of 2 signal is combined with each occurrence value provided by the DECODE I MODULE to form the shifted occurrence values. The actual received (unshifted) occurrence values provided by the DECODE I MODULE and the shifted values are then XOR'd and the result is the new line in the iso-entropicgram.

The most important function of the REVOLVE MODULE is the XOR (exclusive OR) function. To this end, the REVOLVE MODULE compares all of the shifted values with the unshifted values and sorts these two series of values in decreasing order of magnitude. Significantly, when a shifted value and an unshifted occurrence value are found to be equal, the two values are deleted. As a result, the exclusive ORing (XOR) function is provided. The resultant series of values are provided from the RDS4 selection circuit as output of the REVOLVE MODULE to the EI register of the ENCODE MODULE. The ENCODE MODULE in turn, by use of one of its two clipping functions(described for ENCODE MODULE), clips off those high order occurrence values from the resultant series which are larger than the width of the iso-entropicgram, i.e., larger than the width of the original input line.

The resultant series of occurrence values provided by the REVOLVE MODULE to the ENCODE MODULE are in absolute coded form and the ENCODE MODULE converts these occurrence values to hybrid form for storage in the MEMORY MODULE as described above.

B. Components

Figure 17:
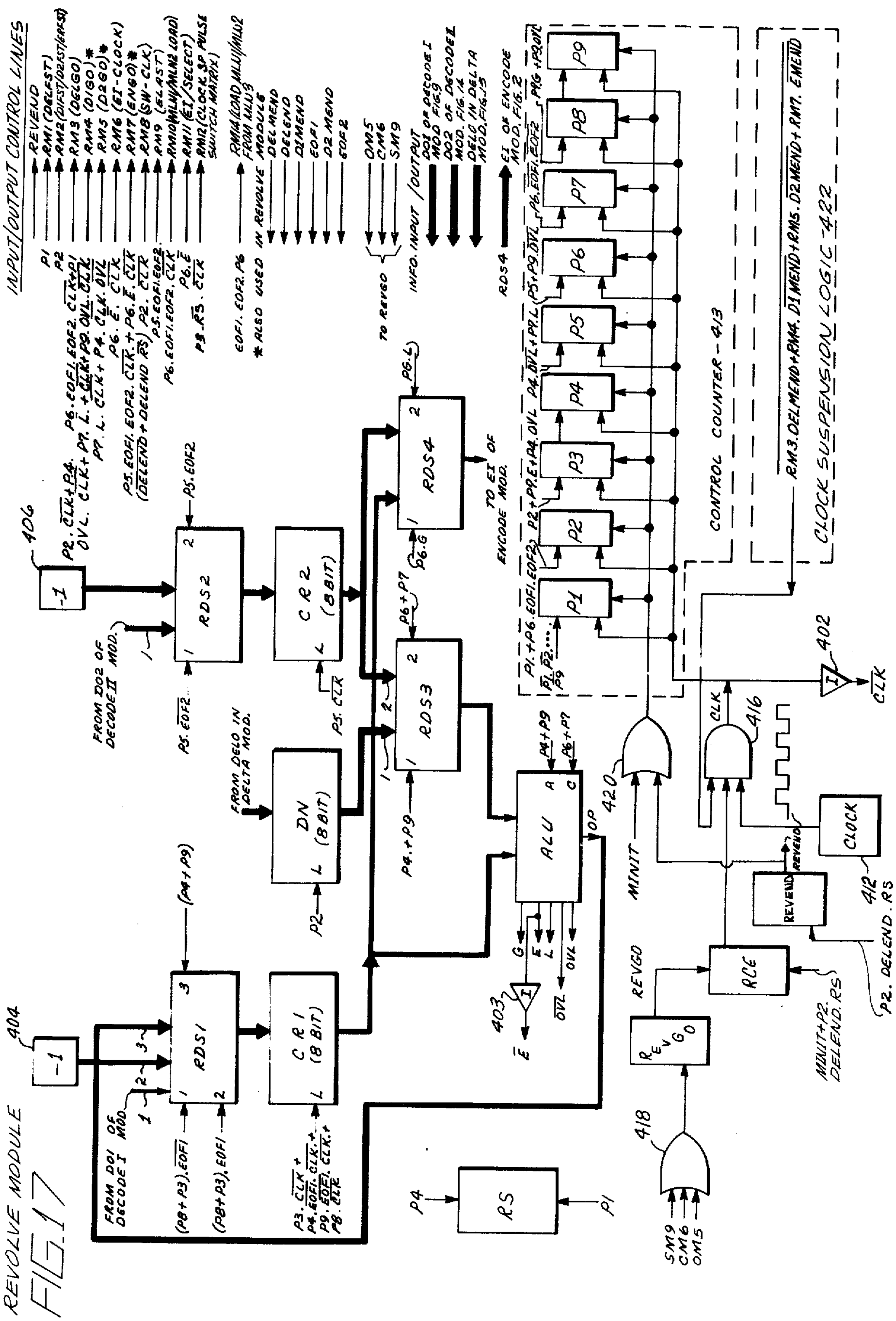
FIG. 17 is a schematic and block diagram of the REVOLVE MODULE.

The REVOLVE MODULE of FIG. 17 includes 8 bit or 8 flip flop registers CR1, CR2 and DN. Each of these registers is formed of register type SN74100 disclosed at page 259 in the above *TTL* book. Each has load circuitry which, responsive to a control signal at the L input along the side of the registers, causes the 8 bit information signals applied at the upper side to be stored into the corresponding register.

Selection circuits RDS1–RDS4 are provided. The selection circuits are of the same type disclosed above which, responsive to a control signal at the numbered inputs along the side of the selection circuits, couple the 8 bit inputs indicated along the upper side of each selection circuit through to an 8 bit output circuit.

In addition, an arithmetic ALU is provided of the same type disclosed above. Additionally, logical signal inverters 402 and 403 are provided for forming the logical inversion of the signal at E and CLK, respectively, and for providing corresponding outputs at $\overline{E}$ and $\overline{CLK}$.

A clock 412 is a source of regular occurring, equally spaced clock pulses. Flip flops RCE, RS and P1 through P9 are provided, flip flops P1–P9 forming the control counter 413. One-shot multi-vibrators REVGO and REVEND are provided. One-shot multi-vibrators REVGO and REVEND normally form a false signal at outputs REVGO and REVEND but respond to a control signal applied to their inputs for setting to a 1 state wherein true signals are formed at outputs REVGO and REVEND for a time interval equal to that between the beginnings of two successive clock pulses from the clock 412. REVEND when forming a true signal at output REVEND signals the calling module that the revolve operation is complete.

Switches 404 and 406 are provided, each providing at its output a continuous 8 bit binary coded signal, representing the 2's complement of 1, thereby representing −1.

AND gate 416 and OR gates 418 and 420 are conventional AND and OR gates well known in the computer art and need no further explanation. Boolean logical equations are used to indicate various logical gates in the system as discussed above. Clock suspension logic 422 suspends operation of the REVOLVE MODULE by terminating the CLK and $\overline{CLK}$ pulse while one of the other modules completes its operation.

Along the right side of the REVOLVE MODULE schematic are shown the input and output control lines for the REVOLVE MODULE, and the information input and output lines using the same system of notation described hereinabove.

C. Detailed Description

The REVOLVE MODULE during its revolve function cooperates with the MEMORY, ENCODE, DECODE I and II, and DELTA MODULES. Normally the DELTA MODULE provides the component powers of 2 of the number of lines to be revolved and the DECODE I and II MODULES each read and decode the same event occurrence vector from the MEMORY MODULE. The DECODE I and II MODULES provide the absolute coded occurrence values, making up the event occurrence vector, one at a time as requested by the REVOLVE MODULE. Both the DECODE I and II MODULES provide the absolute coded occurrence values in the same order but one decode module may be requested to provide several occurrence values before the other decode module provides an occurrence value. To be explained in more detail, this operation is required in carrying out the exclusive XORing operation. The result formed by the REVOLVE MODULE is a sequence of absolute coded occurrence values which are encoded by the ENCODE MODULE back to hybrid form and written into the MEMORY MODULE.

To be explained in more detail, a simple merge of the occurrence values may be effected by the REVOLVE MODULE without XORing simply by providing a value of 0 to the DELTA MODULE as the number of lines to be revolved.

To obtain a better overall view of the REVOLVE MODULE; refer now to the REVOLVE MODULE flow, FIG. 18 and the REVOLVE MODULE schematic and block diagram, FIG. 17, and consider in general the sequence of operation. As indicated in Table 11, the REVOLVE MODULE does not have a formal set of input and output values. However, the inputs and outputs indicated for the ENCODE, DECODE I and II and DELTA MODULES are present. The result of the revolve function is a line of an iso-entropicgram which is stored in the MEMORY MODULE. During RB1 and RB2 of the REVOLVE MODULE flow, the DELTA MODULE is called by the REVOLVE MODULE, causing the DELTA MODULE to provide its first component power of 2 making up the number of lines to be revolved. The first and subsequent component powers of 2 are stored in the register DN in the REVOLVE MODULE. During RB2, the DECODE I and DECODE II MODULES and the ENCODE MODULE (the latter not indicated on flow) are initialized by setting the appropriate initial conditions therein preceding the first call on these modules.

During RB4, flip flop DELEND is checked and if in an 0 state, the value of the number of lines to be revolved contained in DELI of the DELTA MODULE has not be completely broken into all of its component powers of 2 and, regardless of the state of flip flop RS, control goes to RB5 for further processing. If, during RB4 and RB5, flip flops DELEND and RS are in 1 and 0 states, respectively, the flip flop DELEND indicates that the value of the number of lines to be revolved contained in DELI has not been completely broken down into its component powers of 2, and the flip flop RS indicates that a non zero value is stored in DELI and RB5 is also entered for further processing. However, if, during RB4 and RB6, flip flops DELEND and RS are both in a 1 state, flip flop RS indicates a simple merge operation and that an 0 value has been stored in DELI by the calling module. DELEND indicates that the two series of occurrences from the DECODE I and II MODULES have already been merged. Accordingly, the REVOLVE MODULE operation is EXITED.

During RB5 the DECODE I MODULE is called by the REVOLVE MODULE by setting the D1GO multi-vibrator to a 1 state and, the first time in RB5, the first and highest numbered occurrence from the input line to be revolved is provided by the DECODE I MODULE and stored in the CR1 register of the REVOLVE MODULE. Typically, the next operation is in RB8 through RB9, combining the highest component power of 2 of the number of lines to be revolved contained in the DN register with the occurrence value contained in the CR1 register and the result is stored back into the CR1 register. Since the occurrence value provided by the DECODE I MODULE is in absolute binary coded form, the sum results in a value simulating the right shift of "DN" places of the occurrence value provided by DECODE I.

Overflow is checked during RB10. If overflow has occurred, this means that the resultant shifted value in CR1 is larger than the DPM can handle. Thus, the content of CR1 is larger than the current iso-entropicgram width. This is so since the width is constrained to lie within the bounds of the machine. Therefore, when overflow occurs, control returns to RB5 and the DECODE I MODULE is again called, so that it reads the next smaller occurrence value which is then combined with the content of DN and stored into CR1. Therefore, the result previously formed during RB9 and stored in CR1 is ignored. On the other hand, if overflow did not occur or if flip flop EOF1 (end of file for DECODE I MODULE) is true, control goes to RB12.

During RB12-15, the DECODE II MODULE is called by setting the D2GO multi-vibrator into a 1 state. Initially, the DECODE II MODULE provides the largest occurrence value and this value is stored in register CR2. If there is nothing to read (i.e., end of file has been reached for DECODE II MODULE), flip flop EOF2 is true and RB15 is entered where CR2 is loaded with a value of −1.

During RB16, outputs EOF1 and EOF2 are checked to see if both are true and if so, this indicates the end of file for both DECODE I and DECODE II MODULES. If end of file has been reached, control goes to RB17-RB19 because this portion of the revolve or merge is complete. Accordingly, flip flop ELAST is set and the ENCODE MODULE is instructed to write out its final value. MLN3 in the ENCODE MODULE contains the physical length of the line which was just generated. This value is clocked into MLN1 and MLN2 of the DECODE I and II MODULES. This is done in case another revolve is needed.

If either or both of the flip flops EOP1 or EOF2 are in a 1 state, the end of one or both of the files being read by DECODE I and II MODULES has been reached and RB20 is entered following RB16. During RB20, the shifted occurrence value in register CR1 is compared with the unshifted occurrence value in CR2. If the shifted value contained in CR1 is larger, then it is necessary to write out this value and accordingly, RB23-24 are entered where the ENCODE MODULE is called by setting the ENGO multi-vibrator to 1, causing the content of register CR1 to be sent to the EI register of the ENCODE MODULE where it is subsequently encoded and written out in a preselected area of the MEMORY MODULE. During RB25-RB28, the DECODE I MODULE is again called by setting D1GO to 1; the next lower occurrence value is read from the same input line; the next lower occurrence value is combined with the same component power of 2 value contained in the DN register; and the result (shifted occurrence value) is stored in the CR1 register. Subsequently, RB20 of the REVOLVE MODULE flow is again entered where the content of registers CR1 and CR2 is again compared. This operation occurs and is repeated as long as the shifted value stored in register CR1 is larger than the unshifted value in register CR2.

If, during RB20 of the ENCODE MODULE flow, it is found that the unshifted occurrence value contained in CR2 is larger than the shifted occurrence value in CR1, RB21-RB23 are entered where the ENCODE MODULE is called and the unshifted occurrence value contained in the CR2 register is sent via the RDS4 selection circuit to the EI register of the ENCODE MODULE for encoding and writing out in the same preselected area of the MEMORY MODULE. RB12 is re-entered where the DECODE II MODULE is again called, causing the next lower occurrence value to be read out by the DECODE II MODULE and stored in register CR2. This operation also occurs and is repeated until an unshifted occurrence value is stored in CR2 that is larger than the shifted occurrence value in the CR1 register.

If during RB20 of the REVOLVE MODULE flow it is found that the shifted occurrence value contained in CR1 is equal to the unshifted occurrence value contained in CR2, then RB5-RB19 of the REVOLVE MODULE flow are again entered where the action of the ENCODE MODULE of storing a value in the iso-entropicgram is skipped, and two new occurrence values are read from the same input line by the DECODE I and DECODE II MODULES.

When the end of file of both the DECODE I and II MODULES are reached (i.e., no further occurrence values remain to be read by either the DECODE I or the DECODE II MODULE), RB17-19 are entered where the ENCODE MODULE is signaled to write out the last occurrence value being formed in the preselected area of the MEMORY MODULE.

It should be noted that during a revolve operation the MAR1 register of the DECODE I MODULE and the MAR2 register of the DECODE II MODULE form pointers for the respective modules which indicate which occurrence value of the common input line is next to be read by the corresponding decode module. In this manner, the DECODE I and DECODE II MODULES can provide a string of occurrence values from the same input line at different rates, the occurrence values being provided one by one by the respective decode modules, as called by the REVOLVE MODULE. During a CHANGE operation the MAR1 register and the MAR2 register form pointers for the respective modules which indicate occurrence values from different memory areas that are to be read by the corresponding decode module.

Refer now in more detail to the organization of the REVOLVE MODULE, referring to the schematic diagram of FIG. 17 and the flow diagram of FIG. 18. Initially, the MINI COMPUTER forms a true signal at the output MINIT causing the circuits to which it is connected, including control counter 413, flip flops P1-P9, to be reset to 0. The REVOLVE MODULE is called by any one of the following modules: SEED, CHANGE and OUTPUT, by forming a true signal at the respective outputs SM9, CM6 and OM5, any one of which causes the OR gate 418 to trigger the one-shot multi-vibrator REVGO to a 1 state, causing a true signal at the REVGO output. The true signal at REVGO causes the RCE flip flop to be set to a 1 state. The 1 state of the RCE flip flop enables the AND gate 416 to start coupling the clock pulses from the clock 413 to the output CLK and through the inverter 403 to CLK.

The one-shot multi-vibrator REVGO returns to a 0 state. Since flip flops Pl . . . P9 are all 0, the following pulse at CLK causes the flip flop P1 to be set to a 1 state, thereby causing RB1 of the REVOLVE MODULE flow to be entered. The 1 state of the P1 flip flop causes a control signal at the output P1 of the P1 flip flop. The control signal at output P1 in turn resets flip flop RS to 0; causes a true signal at the RM1 output of the input and output control lines from the REVOLVE MODULE causing the DELFST flip flop in the DELTA MODULE to be set to a 1 state; and also causes a true signal at the RM3 output from the REVOLVE MODULE, setting the DELGO multi-vibrator in the DELTA MODULE to a 1 state, thereby calling the operation of the DELTA MODULE as described hereinabove.

The DELTA MODULE then converts a number representing the number of lines in the iso-entropicgram to be revolved to its component powers of 2 starting with the largest power of 2, all as described in connection with the DELTA MODULE. At this point in time, the DELIMEND one-shot multi-vibrator in the DELTA MODULE is in an 0 state forming a false signal at the DELMEND output while a true signal is concurrently being formed at the RM3 output from the REVOLVE MODULE. Accordingly, logic RM3.DELMEND of the clock suspension logic 422 become false, causing a false signal at the input to the AND gate 416, disabling further clock signals from being applied at the CLK and $\overline{CLK}$ outputs, thereby disabling further operation in the REVOLVE MODULE. The DELTA MODULE independently completes the formation of the component power of 2 of the number representing the lines to be revolved and then sets the DELMEND one-shot multi-vibrator to a 1 state, applying a true signal at the DELMEND output. The term RM3.DELMEND then goes true, causing the clock suspension logic 422 to again apply a true signal to the AND gate 416, again causing clock pulses to be formed at the CLK and $\overline{CLK}$ output. The true signal at output P1 at the following pulse of CLK sets the P2 flip flop to a 1 state, causing a true signal at the P2 output thereof and resets flip flop P1 to 0. The true signal at the P2 output causes a true signal at the L input to the DN register, which in turn causes the DN register to store the largest power of 2 signal formed in the DELO register of the DELTA MODULE, and RB3 of the REVOLVE MODULE flow is entered. The true signal at the P2 output of the P2 flip flop causes the DECODE I and DECODE II MODULES and the ENCODE MODULE to be initialized. Initialization is a process whereby a true signal at the P2 output of control counter 413 causes a true signal at the RM2 output of the REVOLVE MODULE, which in turn causes the D1FST flip flop in DECODE I MODULE, the D2FST flip flop in the DECODE II MODULE, and the EFRST flip flop in the ENCODE MODULE, all to be set to a 1 state. RB4 of the REVOLVE MODULE flow is now entered where the state of the DELEND monostable of the DELTA MODULE is checked and if in a 1 state, control goes to RB5. If, however, the DELEND is in a 1 state, then control goes to RB6. Here the RS flip flop of the REVOLVE MODULE is checked. If in a 1 state, flip flop RS signals a merge operation. The logic P2.DELEND is true, resetting flip flop RCE and monostable REVEND to 0, causing the clock signals from gate 416 to be disabled and the operation to EXIT. The REVEND monostable applies a true signal to OR gate 420 causing it to reset counter 413 to zero. At the same time, the true REVEND signal is applied back to the calling module indicating that the REVOLVE MODULE has completed its function.

Assume now that during RB4 the DELEND monostable in the DELTA MODULE is in a 1 state forming a true signal at the DELEND output, this signal, in coincidence with the true signals at $\overline{RS}$, the P2 output of control counter 413, and the pulse at $\overline{CLK}$, causes a true signal at the RM8 output which goes to the SWITCH MATRIX, causing the SWITCH MATRIX to be activated to perform its reading and writing operation in the prescribed MEMORY MODULE area in the manner to be described hereinafter. The true signals at the P2 and $\overline{CLK}$ outputs in the REVOLVE MODULE additionally cause a true signal at the RM4 output of the REVOLVE MODULE which in turn sets the D1GO monostable of the DECODE MODULE to a 1 state, thereby calling and causing the DECODE I MODULE to provide the next smaller occurrence in the input line from the MEMORY MODULE and provide it as an absolute binary coded occurrence value at the DO1 output of the DECODE I MODULE. The true signal at the RM4 output of the REVOLVE MODULE in coincidence with a true signal at the $\overline{DIMEND}$ output from the DECODE I MODULE causes the clock suspension logic 422 to again form a false signal and disable the gate 416, preventing further clock signals from being formed at the CLK and $\overline{CLK}$ outputs, thereby disabling the operation of the REVOLVE MODULE. When the DECODE I MODULE completes its operation, the true signal is removed at the $\overline{DIMEND}$ output, thereby causing the clock disable logic 422 to again enable the gate 416 and clock pulses to be formed at the CLK and $\overline{CLK}$ outputs. The true signal at the P2 output of control counter 413 in coincidence with the pulse at CLK causes the P3 flip flop to be set to a 1 state, thereby forming a true signal at the P3 output and the P2 flip flop is reset to 0. The true signal at the P3 output of the control counter 413 and at the $\overline{EOF1}$ output of the ENCODE MODULE (indicating that the end of file has not yet been reached), causes the logic P3.EOF1 to be true and the value of the input line provided by the DECODE I MODULE is coupled through the RDS1 selection circuit to the information input of the CR1 register. The true signals at P3 and the signal at $\overline{CLK}$ cause the load circuitry in CR1 to store the occurrence value from the DO1 output of the DECODE I MODULE into the CR1 register.

During RB7, if the end of file had been reached and the DECODE I MODULE was forming a true signal at the EOF1 output, RDS1 would not have coupled the output DO1 from the DECODE I MODULE to register CR1 but, instead, would have coupled the signal representing the 2's complement of 1 (−1) formed by switches 404 to the information input of CR1 causing the corresponding value to be stored in register CR1. This occurs during RB11 of the flow after the end of file is reached by the DECODE I MODULE where no further occurrences are to be provided by DECODE I MODULE and a −1 insures that further occurrences will not be obtained from DECODE I MODULE nor outputted from register CR1. All further occurrences, if any, are taken from CR2.

The true signals at the P3 output of control counter 413 and the $\overline{RS}$, and $\overline{CLK}$ outputs also cause a true signal at the RM12 output of the REVOLVE MODULE, which in turn sets the special flip flop SP in the SWITCH MATRIX. To be explained in more detail, the SEED MODULE forms a true signal at SM5, causing the SP flip flop to be set to a 1 state only if a current output is considered to be the best seed. This will be discussed in more detail in connection with the SEED MODULE.

The true signal at the P3 output also causes the P4 flip flop to be set to a 1 state and flip flop P3 is reset to an 0 state at the following pulse at CLK, and RB9, RB10, RB12 of the REVOLVE MODULE is entered. The true signal at the P4 output of the P4 flip flop causes the RS flip flop to be set to a 1 state. As explained before, this is done so that after the first pass the REVOLVE MODULE will EXIT when DELEND (DELTA MODULE) is in a 1 state.

The true signal at the P4 output causes the RDS3 selection circuit to couple the power of 2 signal in the DN register to the ALU and causes the ALU to add the content of the registers CR1 and DN and form an output signal at OP corresponding to the sum. This signal represents the occurence value shifted towards the most significant position by the number of possible occurrence values indicated by the power of 2 value in register DN. This signal is called the shifted occurrence value.

The ALU forms a true signal at the $\overline{OVL}$ output, causing the RDS1 selection circuit to couple the shifted occurrence value from the OP output back to the information input of the CR1 register. Additionally, the true signal at P4 and $\overline{EOF1}$ in coincidence with the pulse at $\overline{CLK}$ causes the load circuit of the CR1 register to store the value back into the CR1 register.

If overflow occurred from the sum of the CR1 and DN registers, the result is larger than the width of the iso-entropicgram and there is formed a true signal at the OVL output which in conjunction with the $\overline{CLK}$ pulse causes the output RM4 to be true. In addition, the true signals at the P4 output from counter 413 and the OVL output from the ALU cause the input to flip flop P3 in counter 413 to be set to a 1 state. In the flow diagram this is equivalent to going from RB10 to RB5. The reason for this flow is that if overflow occurs in the addition of CR1 and DN, this indicates that the simulated right shift has generated an iso-entropicgram column value which cannot be represented by the DPM. If this is the case, we know the number is larger than the current iso-entropicgram width (which obviously is represented in the machine) and thus the above value would have been clipped by the ENCODE MODULE. Going from RB10 to RB5 eliminates the call to the ENCODE MODULE and nothing is written in the MEMORY MODULE.

RM4 sets the D1GO monostable in the DECODE I MODULE. As a result the next lower occurrence value is provided by the DECODE I MODULE. In addition, the logic RM4.$\overline{D1MEND}$ is true, causing the clock suspension logic 422 to suspend the clock until the DECODE I MODULE is finished. When finished, the next lower occurrence value in DO1 of the DECODE I MODULE is stored into the CR1 register and hence over-writes the overflow value previously stored in CR1.

Assume RB12 of the REVOLVE MODULE flow is now entered following RB10. The true signal at the P4 output of the P4 flip flop in coincidence with the true signals at the $\overline{CLK}$ output and the $\overline{OVL}$ output causes a true signal at the RM5 output of the REVOLVE MODULE which sets the D2GO multivibrator in the DECODE II MODULE to a 1 state, thereby calling the DECODE II MODULE so that it too reads an occurrence value from the same input line as the DECODE I MODULE obtained its occurrence value. If this is a merge operation initiated by the CHANGE MODULE, DECODE II will be reading a line which is different from the line being read by the DECODE I MODULE.

The D2MEND monostable in the DECODE II MODULE is in state 0 causing a true signal at the $\overline{D2MEND}$ output. The true signal at the RM5 output of the REVOLVE MODULE in coincidence with the true signal at the $\overline{D2MEND}$ output indicates that the decoded occurrence value is not ready in the DECODE II MODULE for the REVOLVE MODULE and causes the clock suspension logic 422 to again apply a false signal to and disable the gate 416 from supplying clock pulses and the operation of the REVOLVE MODULE is suspended. After the DECODE II MODULE provides the occurrence value, it returns control to the REVOLVE MODULE by removing the true signal at the $\overline{D2MEND}$ output of the D2MEND monostable. This enables the gate 416, allowing clock pulses to again be formed at the CLK and $\overline{CLK}$ output, enables the P5 flip flop to be set to a 1 state, and enables flip flop P4 to be reset to 0.

The true signal at the P5 output of the P5 flip flop in coincidence with a true signal at the $\overline{EOP2}$ output of the EOF2 flip flop in the DECODE II MODULE causes the selection circuit RDS2 to couple the occurence value from the DECODE II MODULE to the information input of the CR2 register. The true signal at the P5 output in coincidence with the following pulse at $\overline{CLK}$ causes the value to be stored into the CR2 register. It should be noted that if this is not a merge operation, the value obtained from DECODE II MODULE is an actual occurrence value in the same input line of the iso-entropicgram and constitutes the unshifted occurrence value which will be compared with the shifted value now contained in the CR1 register. It should be noted that should the EOF2 flip flop in the DECODE II MODULE be in a 1 state, the end of file has been reached by DECODE II MODULE and therefore no occurrence value is being provided by DECODE II MODULE. Accordingly, the RDS2 selection circuit, responsive to the true signals at P5 and EOF2, couples the output of the switches 406 to the input of the CR2 register, causing the 2's complement of $-1$ to be stored in the CR2 register.

The checking of flip flop EOF2 and placing a $-1$ in CR2 if EOF2 is in a 1 state is necessitated by the following. If in a merge operation, the DECODE I and DECODE II MODULES are reading different lines from different MEMORY MODULE areas. In case the DECODE II MODULE finishes reading first, the $-1$ in CR2 will force the DECODE I MODULE to pass the remainder of its occurrence value to the ENCODE MODULE via RB20, RB23, RB24.

RB16 of the REVOLVE MODULE flow is now entered where the states of the EOF1 and EOF2 flip flops of the DECODE I and DECODE II MODULES are checked. If both flip flops are in a 1 state, indicating that both DECODE I and DECODE II MODULES have reached the end of file (i.e., the end of the input line of the iso-entropicgram), RB17 of the REVOLVE MODULE flow is entered and the true signals at the outputs P5, EOF1 and EOF2 cause a true signal at the RM9 output which sets the ELAST flip flop in the ENCODE MODULE to a 1 state. Additionally, the following pulse at $\overline{CLK}$ in coincidence with the true signals at P5, EOF1 and EOF2 cause a true signal at the RM7 output which in turn sets the ENGO one-shot multi-vibrator to a 1 state, thereby calling the operation of the ENCODE MODULE. This causes the ENCODE MODULE to encode and store the last of the occurrence values of the new iso-entropicgram line into the MEMORY MODULE.

Assuming that either the EOF1 or the EOF2 flip flop in the DECODE I and DECODE II MODULES is 0, thereby indicating that either DECODE I or DECODE II MODULE has reached the end of file, RB20 of the REVOLVE MODULE flow is entered where the shifted occurrence value in CR1 is compared with the unshifted value in CR2. It should be noted that the registers CR1 and CR2 contain absolute binary coded values, indicating directly the shifted and unshifted occurrence values. This comparison operation is an important part of the REVOLVE MODULE operation as it is a key part of the exclusive ORing process. To this end, the shifted and unshifted occurrence values of the input line must be sorted into descending order of magnitude. Those shifted and unshifted occurrence values which are equal are dropped. This then exclusive OR's the shifted and unshifted occurrence values and causes a revolve from one line to the next in the iso-entropicgram.

Referring to RB20 to the REVOLVE MODULE flow, the true signal at the P6 output causes the RDS3 selection circuit to couple the CR2 register to the ALU and causes the ALU to compare the content of the CR1 and CR2 registers. If the shifted value contained in CR1 is greater, a true signal is formed at the G output. This causes RB23–RB30 of the REVOLVE MODULE flow to be entered where the shifted value contained in CR1 is encoded and stored into the MEMORY MODULE by the ENCODE MODULE and the DECODE I MODULE reads its next occurrence value from the same input line, the next occurrence value is combined with the content of register DN to form a shifted occurrence value, and the shifted occurrence value is stored in register CR1.

Consider in more detail the operation during RB23 and RB24. The true signals at the G output of ALU and at the P6 output causes the RDS4 selection circuit to couple the shifted occurrence value contained in the CR1 register to the output thereof, which goes to the input of the EI register of the ENCODE MODULE. A signal is formed at the $\overline{E}$ output of the inverter circuit 403 when the values compared are not equal. The true signals at outputs P6 and $\overline{E}$ cause a true signal at the RM11 output of the REVOLVE MODULE which, in turn, causes the EDS6 selection circuit in the ENCODE MODULE to couple the output from RDS4 to the EI register. The true signals at P6, $\overline{E}$ and $\overline{CLK}$ energize the L input of the EI register of the ENCODE MODULE, causing the occurrence value contained in CR2 of the REVOLVE MODULE to be loaded into the EI register. The true signal at the outputs P6, $\overline{E}$ and $\overline{CLK}$ also cause a true signal at the RM7 output of the REVOLVE MODULE which, in turn, sets the ENGO multi-vibrator to a 1 state, thereby calling the operation of the ENCODE MODULE as described above. Once called, the ENCODE MODULE converts the shifted value obtained from the CR1 register to hybrid form and stores it in the MEMORY MODULE.

If, during the true signal at the P6 output both the EOF1 and EOF2 flip flops from the DECODE I and DECODE II MODULES are in a 1 state, a true signal is formed at the RM14 output of the REVOLVE MODULE which, in turn, causes the MLN1 and MLN2 registers of the DECODE I and DECODE II MODULES to be loaded with the value contained in the MLN3 register of the ENCODE MODULE. This is done since the complete input line have been processed by the REVOLVE MODULE and the new iso-entropicgram line which is now in the area designated by the MLN3 register of the ENCODE MODULE forms the new input line and is next to be processed by the DECODE I and DECODE II MODULES in order to revolve to the next line of the iso-entropicgram. This operation allows subsequent lines in the iso-entropicgram to be formed from the new iso-entropicgram line just formed by the REVOLVE MODULE.

Continuing with RB24 of the REVOLVE MODULE flow, the true signal at the RM7 output in coincidence with the true signal at the $\overline{EMEND}$ output of the ENCODE MODULE causes suspension logic 422 to suspend the operation of the REVOLVE MODULE similar to that discussed above until the ENCODE MODULE has completed its encode function and removes the true signal at the $\overline{EMEND}$ output. After the suspension has ended and the gate 416 is again enabled by the clock suspension logic 422, the following pulse at CLK causes flip flop P7 to be set to a 1 state and flip flop P6 is reset to 0. The 1 state of the P7 flip flop is used as a time delay in the system. A time delay is needed in order to allow the ENCODE MODULE to complete its operation before the decode modules are called. This is needed in this system since all the modules operate serially. However, this need not necessarily be the case as the system could be designed so that all the modules operate in parallel.

RB25–28 are now entered. A true signal at the P7 output again causes the selection circuit RDS3 and the ALU to compare the shifted and unshifted values, respectively, contained in registers CR1 and CR2. Since the values have not changed, the shifted value contained in register CR1 is the larger and hence a true signal is again formed at the G output of ALU. The true signal at the P7 and G outputs causes the flip flop P8 to be set to a 1 state at the following pulse at CLK. Additionally, the true signal at the P7, G and $\overline{CLK}$ outputs causes a true signal at the RM4 output, thereby again calling the DECODE I MODULE, causing it to read out the next lower actual occurrence value in the same input line from the MEMORY MODULE. As before, the true signal at the RM4 output in coincidence with the true signal at $\overline{D1MEND}$ from the DECODE MODULE causes the clock suspension logic 422 to disable the gate 416 and suspend the operation of the REVOLVE MODULE until DECODE II MODULE removes the true signal at $\overline{D1MEND}$, indicating that it has now completed its decode operation and is now providing its next lower actual occurrence value of the input line. During RB27 the true signal at the P8 and $\overline{EOF1}$ outputs causes the RDS1 selection circuit to couple the next lower occurrence value from register DO1 of the DECODE I MODULE to the information input of CR1 and the following pulse at CLK causes the CR1 load circuit to store the value into the CR1 register. Similar to that described above, in connection with the true signal at P3, should the EOF1 flip flop of the DECODE I MODULE be in a 1 state, providing a true signal at the EOF1 output, the DECODE I MODULE would have reached the end of file, RB30 would be entered and hence the 2's complement of a −1 represented by the switches 404 would be stored in register CR1 rather than the output from the DECODE I MODULE.

Continuing with the operation during RB27–RB28, the true signal at the P8 output causes the P9 flip flop of the control counter 413 to be set to a 1 state and RB28 of the REVOLVE MODULE is entered. The true signal at the P9 output causes the RDS3 selection circuit to couple the power of 2 value contained in the DN register to the ALU and causes the ALU to add the content of the CR1 and DN registers and form a new shifted occurrence value at the output OP.

As explained with pulse P4, if overflow occurs during the addition of CR1 and DN, a signal is formed at OVL indicating a right shift to an iso-entropicgram column value which cannot be represented by the DPM. The value is therefore ignored. Accordingly, if output OVL is true, the logic P9.OVL is true, causing flip flop P8 and P9 to be set to 1 and 0 states, respectively, at the following CLK pulse and a signal is to be formed at output RM4 during the $\overline{CLK}$ pulse P9, and D1GO of the DECODE I MODULE is set. The DECODE I MODULE reads the next lower occurrence value as explained above. However, if the addition does not produce overflow, $\overline{OVL}$ is true, causing logic P9.$\overline{OVL}$ to become true and the following CLK pulse sets flip flops P6 and P9 to 1 and 0, respectively, and control returns to RB16.

With the new occurrence value from the input line now read from the MEMORY MODULE and the shifted value contained in the CR1 register, RB16 and RB20 of the REVOLVE MODULE flow are reentered. The true state at the P6 output of the P6 flip flop again causes the content of registers CR1 and CR2 to be compared, as discussed above, to determine which is the larger. If the new shifted occurrence value contained in register CR1 is the larger, RB23–RB30 are again entered where the larger value contained in CR1 is sent to the ENCODE MODULE for conversion to hybrid form and writing in the MEMORY MODULE and the DECODE I MODULE is again called, causing the next lower value occurrence value of the same input line to be read from the MEMORY MODULE, combined with the value in DN to form a shifted occurrence value and stored in register CR1.

Assume that during RB20, during the true signal at the P6 output, the ALU detects that the content of the unshifted occurrence value at CR2 is larger than that of the shifted occurrence value contained in register CR1. The ALU now forms a true signal at the L output causing RB21-RB22 to be entered.

During RB21-RB22 the true signal at the P6 and L outputs causes the RDS4 selection circuit to couple the unshifted occurrence value contained in register CR2 to the ENCODE MODULE and the true signals at the P6, $\overline{E}$ and $\overline{CLK}$ outputs cause a true signal at the RM6 and RM7 outputs which, in turn, cause the unshifted occurrence value in CR2 to be stored into the EI register of the ENCODE MODULE and cause the ENCODE MODULE to be called. Thus called, the ENCODE MODULE encodes the unshifted occurrence value from register CR2 to hybrid form and causes it to be stored into the MEMORY MODULE in the new isoentropicgram line being formed there.

As discussed above, the true signal at the RM7 and $\overline{EMEND}$ outputs again cause the clock suspension logic 422 to suspend the operation of the REVOLVE MODULE. When the ENCODE MODULE indicates that it has ended its operation by removing the true signal at the $\overline{EMEND}$ output, the suspension ends and the clock causes the P7 flip flop to again be set to a 1 state, forming a true signal at the P7 output which again causes the RDS3 selection circuit and the ALU unit to again compare the shifted and unshifted occurrence values contained in the CR1 and CR2 registers. Since the value in CR1 is still smaller, a true signal is again formed at the L output and RB12 is entered.

During RB12 the true signals at the P7, L and $\overline{CLK}$ outputs cause true signals to be formed at the RM5 output which, in turn, sets the D2GO one-shot to a 1 state thereby calling the operation of the DECODE II MODULE, causing it to read the next lower occurrence value from that which it originally read from the MEMORY MODULE and provides it for storage into the CR2 register.

The true signal at the $\overline{D2MEND}$ output from the DECODE II MODULE again causes the operation of the REVOLVE MODULE to be suspended until the DECODE II MODULE provides the next occurrence value. Once the next occurrence value is provided by the DECODE II MODULE and the true signal is removed at the $\overline{D2MEND}$ output, the clock suspension logic 422 again terminates the suspension of operation of the REVOLVE MODULE and the following pulse at CLK in coincidence with the true signals at P7 and L cause the P5 flip flop to again be set to a 1 state where during RB14 the next lower occurrence value from the DECODE I MODULE is stored into the CR2 register, as described above.

Assume now that RB20 of the REVOLVE MODULE flow occurs and the P6 flip flop is in a 1 state and the shifted occurrence value contained in CR1 is equal to the unshifted occurrence value contained in CR2, thereby causing the ALU to form a truue signal at the E output thereof and inverter 403 forms a false signal at $\overline{E}$. According to the exclusive ORing procedure, it is necessary to delete both the shifted and unshifted occurrence values in the CR1 and CR2 registers from the new iso-entropicgram line being formed. Accordingly, the ALU forms a false signal at the E output in coincidence with the true signal at the P6 output. The logic P6.$\overline{E}$.$\overline{CLK}$ is now false and therefore the pulse at $\overline{CLK}$ does not cause a true signal at RM7 and hence does not cause the ENGO multi-vibrator in the ENCODE MODULE to be set. The true signal at the P6 output, however, causes the P7 flip flop to be set to a 1 state where the ALU again compares the content of registers CR1 and CR2 as discussed. Since the values in CR1 and CR2 are still equal, the ALU forms a true signal at the E output. The true signal at the E output in coincidence with the true signal at P7 sets the P3 flip flop to a 1 state, thereby causing RB7 through RB20 of the REVOLVE MODULE flow to again be entered where both the DECODE I and DECODE II MODULES are called, causing respective new occurrence values of the same input line to be provided to the REVOLVE MODULE.

This process continues until during RB16 it is detected that both the EOF1 and EOF2 flip flops of the DECODE I and DECODE II MODULES are true, indicating that both DECODE I and DECODE II MODULES have reached the end of the input line. When this occurs, true signals are formed at the EOF1, EOF 2 and P5 outputs, causing a true signal to be formed at the RM9 output which in turn sets the ELAST flip flop in the ENCODE MODULE which, in turn, causes the ENCODE MODULE to store any remaining occurrence values in hybrid form in the MEMORY MODULE as described in connection with the ENCODE MODULE.

D. Example of Operation

Consider now an actual example of operation for the REVOLVE MODULE. Table 4-B herein gives an example of the way in which one revolves from one line to another in an isoentropicgram. Using this same example, consider the way in which the present embodiment of the invention revolves from line 2 to line 7. Before the REVOLVE MODULE is called, the following preliminary steps are taken:

1. The MLN1 register of the DECODE MODULE and the MLN2 register of the DECODE II MODULE are stored with the physical length of line 2 of the example which physical length is normally obtained from the IPRF.
2. Line 2 of the example, namely, event occurrence vector 0, 1, 3, 8, 9, 10, 11, is stored in hybrid coded form in one of the memory areas of the MEMORY MODULE.

3. The number of lines to be revolved, i.e., 5, is loaded into the DELI register of the DELTA MODULE as described above.

The sequence of operation following these initial conditions is as follows:

| | | |
|---|---|---|
| RB1 | RS = 0 | |
| | DELFST = 0 | ; initialize DELTA MODULE |
| RB2 | DELGO = 1 | ; get largest component power of 2 |
| | DN = DELO = 4 | |
| RB3 | D1FST = D2FST = 1 | |
| | ERFST = 1 | ; initialize DECODE AND ENCODE MODULES |
| RB4-RB5 | DELEND = 0 ∴ D1GO = 1 | ; get first value from DECODE I MODULE |
| | DO1 = 11 | |
| RB7-RB11 | CR1 = DO1 = 11 | ; load value from DECODE MODS into CR1 |
| | CR1(15) = CR1(11) + DN(4) | ; simulate the right shift |
| | OVL = 0 ∴ RB12 | |
| RB12-RB14 | RS = 1 | ; set merge indicator |
| | D2GO = 1, EOF2 = 0 | ; call DECODE II MODULE |
| | CR2 = DO 2 = 11 | ; load the output into CR2 |
| RB16 | EOF1(0).EOF2(0) = 0 ∴ RB20 | ; REVOLVE process not finished yet |
| RB20, RB23, RB24 | CR1(15)>CR2(11) ∴ RB23 | |
| | EI = CR1 = 15 | ; transfer CR1 to ENCODE MODULE |
| | ENGO = 1 | ; call the ENCODE MODULE |
| RB25-RB29 | D1GO = 1 | ; call DECODE I MODULE |
| | CR1 = DO1 = 10; | |
| | EOF1 = 0 | ; get next value |
| | CR1(14)←CR1(10) + ND(4) | ; simulate the right shift |
| | OVL = 0 ∴ go to RB16 | ; |
| RB16 | EOF1.EOF2 = 0 ∴ RB20 | |
| RB20,RB23, RB24 | CR1(14)<CR2(1) ∴ | |
| | EI = CR1 = 14 | ; write out through 14 |
| | call ENCODE | |
| RB25-RB29 | D1GO = 1 | ; call DECODE I MODULE |
| | CR1 = DO1 = 9, EOF1 = 0 | |
| | CR(13) = CR1(9) + DN | ; simulate the shift |
| | OVL = 0 ∴ RB16 | |
| RB16 | EOF1.EOF2 = 0 ∴ RB20 | |
| RB20, RB23, RB24 | CR1(13)>CR2(11) ∴ | |
| | EI = CR1 = 13 | ; CR1 sent to ENCODE MODULE |
| | call ENCODE (ENGO = 1) | |
| RB25-RB29 | set D1GO = 1 | ; call DECODE I MODULE |
| | CR1 = D01 = 8, EOF1 = 0 | ; get next value |
| | CR1(12) = CR1(8) + DN(4) | ; simulate the right shift |
| | OVL = 0 ∴ RB16 | |
| RB16 | EOF1.EOF2 = 0 ∴ RB20 | |
| RB20, RB23, RB24 | CR1(12)>CR2(11) ∴ | ; simulate the XOR |
| | EI = CR1 = 12 | ; CR1 sent to ENCODE MODULE |
| | ENGO = 1 | ; call ENCODE MODULE |
| RB25-RB29 | D1GO = 1 | ; call DECODE I MODULE |
| | CR1 = DO1 = 3, EOF1 = 0 | ; |
| | CR1(7) = CR1(3) + DN(4) | ; simulate the shift |
| | OVL = 0 ∴ RB16 | |
| RB16 | EOF1.EOF2 = 0 ∴ | |
| RB20 | CR2(11)>CR1(7) | ; XOR |
| RB21, RB22 | EI = CR2 = 11 | ; send CR2 to ENCODE MODULE |
| | call ENCODE (ENGO = 1) | ; activate ENCODE MODULE |
| RB12-RB14 | call DECODE II | ; activate DECODE II MODULE |
| | CR2 = DO2 = 10, EOF2 = 0 | ; store result in CR2 |
| RB16 | EOF1.EOF2 = 0 ∴ | |
| RB20 | CR2(10)>CR1(7) | ; simulate XOR |
| RB21, RB22 | EI = CR2 = 10 | ; output CR2 |
| | call ENCODE | ; |
| RB12-RB14 | call DECODE II | ; get next value |
| | CR2 = DO2 = 9, EOF2 = 0 | ; |
| RB16 | EOF1.EOF2 = 0 | |
| RB20 | CR2(9)>CR1(7) | |
| RB21, RB22 | EI = CR2 = 9 | ; output CR2 |
| | call ENCODE | ; |
| RB12-RB14 | call DECODE II | ; get next value |
| | CR2 = DO2 = 8, EOF2 = 0 | ; |
| RB16 | EOF1. EOF2 = 0 | |
| RB20 | CR2(8)>CR1(7) | ; XOR |
| RB21, RB22 | EI = CR2 = 8 | ; output CR2 |
| | call ENCODE | ; |
| RB12-RB14 | call DECODE II | ; read next value |
| | CR2 = DO2 = 3, EOF2 = 0 | ; from DECODE II MODULE |
| RB16 | EOF1.EOF2 = 0 | |
| RB20 | CR1(7)>CR2(3) ∴ | ; simulate XOR |
| RB23, RB24 | EI = CR1 = 7 | ; output CR1 |
| | call ENCODE | ; |

-continued

| | | |
|---|---|---|
| RB25-RB29 | call DECODE I | |
| | CR1 = DO1 = 1, EOF1 = 0 | ; |
| | CR1(5) = CR1(1) + DN(4) | ; simulate shift |
| | OVL = 0 ∴ | |
| RB16 | EOF1.EOF2 = 0 ∴ | |
| RB20 | CR1(5)>CR2(3) | ; simulate XOR |
| RB23, RB24 | EI = CR1 = 5 | ; output CR1 |
| | call ENCODE | |
| RB25-RB29 | call DECODE I | ; read next value |
| | CR1 = DO1 = 0, EOF1 = 0 | |
| | CR1(4) = CR1(0) + DN(4) | ; simulate shift |
| | OVL = 0 ∴ | |
| RB16 | EOF1.EOF2 = 0 ∴ | |
| RB20 | CR1(4)>CR2(3) | ; simulate XOR |
| RB23, RB24 | EI = CR1 = 4 | ; output CR1 |
| | call ENCODE | ; |
| RB25, RB26, RB30 | call DECODE I | ; end of file reached |
| | CR1 = −1, EOF1 = 1 | ; |
| RB16 | EOF1.EOF2 = 0 | ; revolve not done |
| RB20 | CR2(3)>CR1(−1) | ; XOR |
| RB21, RB22 | EI = CR2 = 3 | ; output CR2 |
| | call ENCODE | ; |
| RB12-RB14 | call DECODE II | ; get next value |
| | CR2 = DO2 = 1, EOF2 = 0 | ; |
| RB16 | EOF1.EOF2 = 0 | |
| RB20 | CR2(1)>CR1(−1) | ; keep outputting CR2 until EOF2 = 1 |
| RB21, RB22 | EI = CR2 = 1 | |
| | call ENCODE | ; |
| RB12-RB14 | call DEcODE II | ; read in next value |
| | CR2 = DO2 = φ | ; |
| RB16 | EOF1.EOF2 = 0 | ; not finished yet |
| RB20 | CR2(φ)>CR1(−1) | |
| RB21, RB22 | EI = CR2 = φ | ; output CR2 |
| | call ENCODE | |
| RB12, RB13, RB15 | call DECODE II | ; end of file reached |
| | CR2 = −1, EOF2 = 1 | ; |
| RB16-RB19 | EOF1.EOF2 = 1 ∴ | |
| | set ELAST | ; write out last value |
| | call ENCODE | ; to MEMORY MOD |
| | MLN1, MLN2 = MLN3 | ; length of new line ; stored in DECODE I and DECODE II MODS |

At this point the revolve operation is not complete. Line 6 in the iso-entropicgram has been formed and stored in hybrid coded form in the MEMORY MODULE. The decimal occurrence values of line 6 are 15, 14, 13, 12, 11, 10, 9, 8, 7, 5, 4, 3, 1, φ. This line is next revolved down one line to line 7 as follows:

| | | |
|---|---|---|
| RB2 | call DELTA | ; get next component power of 2 from DELTA MOD |
| | DN = DELO = 1, DELEND = 0 | |
| RB5, RB7-RB10 | call DECODE I | ; read the first value |
| | CR1 = DO1 = 15, EOF1 | ; |
| | CR1 (16) = CR1(15) +1 | ; simulate the shift |
| | OVL = 0 ∴ | |
| RB12-RB14 | call DECODE II | ; get unshifted version |
| | CR2 = DO2 = 15, EOF2 = 0 | ; |
| RB16 | EOF1.EOF2 = 0 ∴ | |
| RB20 | CR1(16)>CR2(15) | ; XOR |
| RB23, RB24 | EI = CR1 = 16 | ; this value (16) will be clipped by ENCODE MODULE |
| | call ENCODE MODULE | ; |
| RB25-RB29 | call DECODE I MODULE | ; read next value |
| | CR1 = DO1 = 14, EOF1 = 0 | ; |
| | CR1(15) = CR1(14) + 1 | ; simulate the shift |
| | OVL = 0 ∴ | |
| RB16 | EOF1.EOF2 = 0 ∴ | |
| RB20 | CR1 = CR2 = 15 ∴ | |
| RB5, RB7-RB10 | call DECODE I MODULE | ; read another value |
| | CR1 = DO1 = 13, EOF1 = 0 | ; |
| | CR1(14) = CR1(13) + DN(1) | ; simulate the shift |
| | OVL = 0 ∴ | |
| RB12-RB14 | call DECODE II MODULE | ; |
| | CR2 = DO2 = 14, EOF2 = 0 | ; |
| RB16 | EOF1.EOF2 = 0 ∴ | |
| RB20 | CR1 = CR2 = 14 ∴ | ; XOR |
| RB5, RB7-RB10 | call DECODE I MODULE | |
| | CR1 = DO1 = 12, EOF1 = 0 | ; |
| | CR1(13) = CR1(12) + DN(1) | ; shift |
| | OVL = 0 ∴ | |
| RB12-RB14 | call DECODE II MODULE | ; read DECODE II MODULE |
| | CR2 = DO2 = 13, EOF2 = 0 | ; |
| RB16 | EOF1.EOF2 = 0 ∴ | |
| RB20 | CR1 = CR2 = 13 ∴ | ; XOR |
| RB5, RB7-RB10 | call DECODE I MODULE | ; |
| | CR1 = DO1 = 11, EOF1 = 0 | ; read DECODE I MODULE |
| | CR1(12) = CR1(11) + DN(1) | ; shift |
| | OVL = 0 ∴ | |

-continued

| | | |
|---|---|---|
| RB12-RB14 | call DECODE II MODULE | |
| | CR2 = DO2 = 12, EOF2 = 0 | |
| RB16 | EOF1.EOF2 = 0 | |
| RB20 | CR1 = CR2 = 12 | ; XOR |
| RB5, RB7-RB9 | call DECODE I MODULE | ; read |
| | CR1 = DO1 = 10, EOF1 = 0 | |
| | CR1(11) = CR1(10) + DN(1) | ; shift |
| | OVL = 0 ∴ | |
| RB12-RB14 | call DECODE II MODULE | |
| | CR2 = DO2 = 11, EOF2 = 0 | |
| RB16 | EOF1 = EOF2 = 0 | |
| RB20 | CR1 = CR2 = 11 | ; XOR |
| RB5, RB7-RB9 | call DECODE I MODULE | |
| | CR1 = DO1 = 9, EOF1 = 0 | ; read |
| | CR1 (10) = CR1(9) + DN(1) | ; shift |
| | OVL = 0 ∴ | |
| RB12-RB14 | call DECODE II MODULE | ; read |
| | CR2 = DO2 = 10, EOF2 = 0 | |
| RB16 | EOF1.EOF2 = 0 ∴ | |
| RB20 | CR1 = CR2 = 10 ∴ | ; XOR |
| RB5, RB7-RB9 | call DECODE I MODULE | |
| | CR1 = DO1 = '8, EOF1 = 0 | |
| | CR1(9) = CR1(8) + DN(1) | |
| | OVL = 0 ∴ | |
| RB12-RB14 | call DECODE II MODULE | |
| | CR2 = DO2 = 9, EOF2 = 0 | |
| RB16 | EOF1.EOF2 = 0 ∴ | |
| RB20 | CR1 = CR2 =9 ∴ | ; XOR |
| RB5, RB7-RB10 | call DECODE I MODULE | |
| | CR1 = DO1 = 7, EOF1 = 0 | ; read |
| | CR1(8) = CR1(7) + DN(1) | |
| RB12-RB14 | call DECODE II MODULE | |
| | CR2 = DO2 = 8, EOF2 = 0 | |
| RB16 | EOF1.EOF2 =0 | |
| RB20 | CR1 = CR2 = 8 | ; XOR |
| RB5, RB7-RB10 | call DECODE I MODULE | |
| | CR1 = DO1 = 5, EOF1 = 0 | ; read |
| | CR1(6) = CR1(5) + DN(1) | ; shift |
| | OVL = 0 ∴ | |
| RB12-RB14 | call DECODE II MODULE | |
| | CR2 = DO2 = 7, EOF2 = 0 | ; |
| RB16 | EOF1.EOF2 = 0 | |
| RB20 | CR2(7)>CR1(6) ∴ | |
| RB21-RB22 | EI = CR2 = 7 | ; send CR2 to ENCODE MODULE |
| | call ENCODE MODULE | ; output it |
| RB12-RB14 | call DECODE II MODULE | ; read DECODE II MOD again |
| | CR2 = DO2 = 5, EOF2 = 0 | |
| RB16 | EOF1.EOF2 = 0 | |
| RB20 | CR1(6)>CR2(5) ∴ | |
| RB23-RB24 | EI = CR1 =06 | ; send CR1 to ENCODE MODULE |
| | call ENCODE MODULE | |
| RB25-RB29 | call DECODE I MODULE | ; read |
| | CR1 = DO1 = 4, EOF1 = 0 | ; |
| | CR1(5) = CR1(4) + DN(1) | ; shift |
| | OVL = 0 ∴ | |
| RB16 | EOF1.EOF2 =0 ∴ | |
| RB20 | CR1 = CR2 = 5 ∴ | ; XOR |
| RB5, RB7-RB10 | call DECODE I MODULE | |
| | CR1 = DO1 = 3, EOF1 = 0 | ; read |
| | CR1(4) = CR1(3) + DN(1) | |
| | OVL = 0 ∴ | |
| RB12-RB14 | call DEcODE II MOD | |
| | CR2 = DO2 = 4, EOF2 = 0 | |
| RB16 | EOF1.EOF2 = 0 | |
| RB20 | CR1 = CR2 = 4 ∴ | ; XOR |
| RB5, RB7-RB19 | call DECODE I MODULE | ; read |
| | CR1 = DO1 = 1, EOF1 =0 | ; |
| | CR1(2) = CR1(1) + DN(1) | |
| | OVL = 0 | |
| RB12-RB14 | call DECODE II MODULE | ; |
| | CR2 = DO2 = 3, EOF2 = 0 | ; |
| RB16 | EOF1.EOF2 = 0 | |
| RB20 | CR2(3)>CR1(2) ∴ | ; XOR |
| RB21-RB22 | EI = CR2 = 3 | ; output CR2 |
| | call ENCODE MODULE | ; |
| RB12-RB15 | call DECODE II MODULE | ; read DECODE II MOD again |
| | CR2 = DO2 = 1, EOF2 = 0 | ; |
| RB16 | EOF1.EOF2 = 0 | |
| RB20 | CR1(2)>CR2(1) | ;XOR |
| RB23-RB24 | EI = CR1 = 2 | ; output CR1 |
| | call ENCODE MODULE | ; |
| RB25-RB29 | call DECODE I MODULE | |
| | CR1 = DO1 = 0, EOF1 = 0 | ; read DECODE I MODULE |
| | CR1(1) ;32 CR1(φ) + DN(1) | ; shift |
| | OVL = 0 ∴ | |
| RB16 | EOF1.EOF2 = 0 ∴ | |
| RB20 | CR1 = CR2 = 1 ∴ | ; XOR |
| RB5, RB7, RB11 | call DECODE I MODULE | ; read |
| | CR1 = −1, EOF1 = 1 | ; EOF reached DECODE I MOD |
| RB12-RB14 | call DECODE II MODULE | |
| | CR2 = DO2 = 0, EOF2 = 0 | ; |
| RB16 | EOF1.EOF2 = 0 ∴ | |
| RB20 | CR2(φ) >CR1(−1) ∴ | ; XOR |
| RB21-RB22 | EI = CR2 = φ | ; output CR2 |

-continued

| | | |
|---|---|---|
| | call ENCODE MODULE | |
| RB12, RB13, RB15 | call DECODE II MODULE | ; |
| | CR2 = −1, EOF2 = 0 | ; EOF reached DECODE II MODULE |
| RB16 | EOF1.EOF2 = 1 ∴ | |
| Rb17-RB19 | set ELAST | ; output last value from ENCODE MODULE |
| | call ENCODE MODULE | |
| | MLN1, MLN2 = MLN3 | ; reset lengths |
| RB2-RB5 | call DELTA MODULE | ; get next DELTA value |
| | DN = DELEND = 1 | |
| | reset DECODE I and II, ENcODE MODULES | |
| | DELEND = 1 | |
| RB6 | RS = 1 ∴ EXIT | |

Upon EXIT the MEMORY MODULE contains line 7 of the iso-entropicgram of Table 4-B which in absolute decimal occurrence values is 7, 6, 3, 2, 0.

VII. REVOLVER

Figure 19:
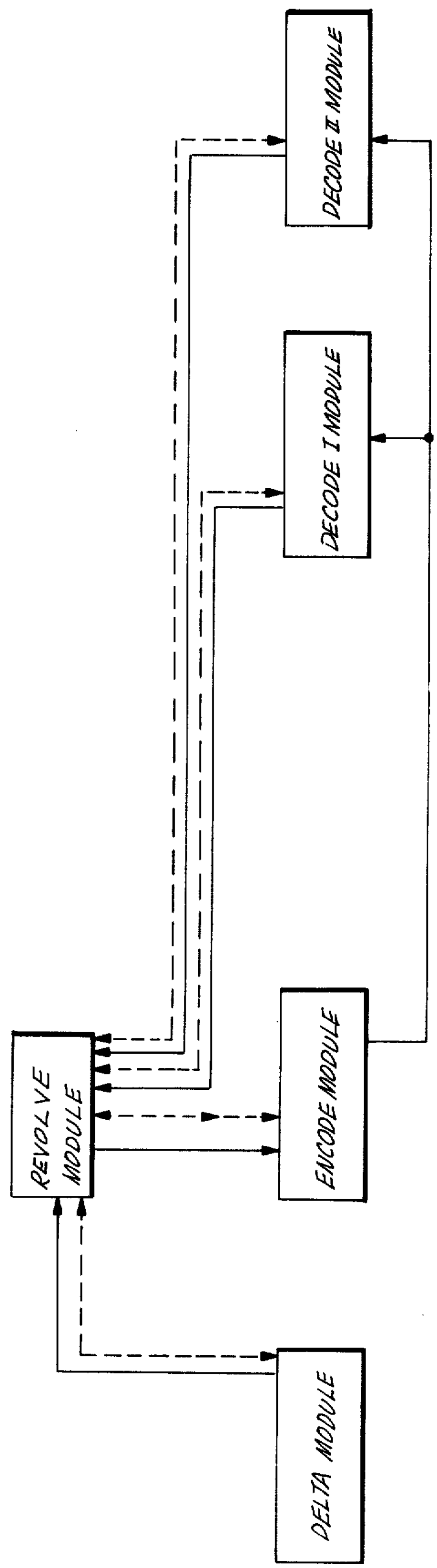
FIG. 19 is a block diagram of an iso-entropicgram revolver employing the REVOLVE MODULE.

The portion of the DPM SYSTEM including the MEMORY, ENCODE, DECODE I and II, DELTA, and REVOLVE MODULES forms an iso-entropicgram revolver. FIG. 19 is a block diagram of the iso-entropicgram revolver.

The iso-entropicgram revolver revolves a received binary coded input line signal to a new line signal in the iso-entropicgram for the input line. The MEMORY MODULE forms a means for storing a received input line. As explained above, the MINI COMPUTER with user program causes an event occurrence vector, or some other binary coded number, to be stored into an area of the MEMORY MODULE. Though not essential to the present invention, in the disclosed embodiment the number is stored in the MEMORY MODULE in hybrid code. The number which forms the input line comprises a binary coded signal representing one or more actual occurrence values from a group of decreasing monotonically ordered possible occurrence values. The actual occurrence values correspond to what has been referred to as event-times and the possible occurrence values are all of the event-times which are within the width of the iso-entropicgram.

The DELTA MODULE forms a means for forming a signal indicating the number of lines the received input line signal is to be revolved.

The REVOLVE MODULE forms a new line signal forming means and includes means such as the CR1 and CR2 registers, the DN register, the RDS2 selection circuit, the ALU, and the control counter depicted in FIG. 17 which is responsive to the number of lines signal indication provided in the DELO register by the DELTA MODULE and the input line signal stored in the MEMORY MODULE for forming a binary coded signal corresponding to the received input line shifted relative to itself by the number of possible occurrence values identified by the number of lines indication signal.

The new line signal forming means also includes means such as the CR1, CR2 and DN registers, the RDS3 selection circuit, the ALU and the control counter of the REVOLVE MODULE, the ENCODE, DECODE I and II and the MEMORY MODULES for exclusive ORing (XORing) the occurrence values represented by the received input line signal and the shifted input line signal for forming a resultant signal representing one or more occurrence values in monotonical value order.

By way of example, the resultant signal is coupled through the RDS4 selection circuit to register EI of the ENCODE MODULE which then converts the absolute coded value of the occurrence values in the result back to hydric code for storage in the MEMORY MODULE. The new line signal forming means also includes means such as the ALU and its OVL and OVL output circuits and the related portions of the REVOLVE MODULE which are operative during RB5, RB8, RB9, RB10, RB25, RB27, RB28 and RB29 for eliminating the shifted occurrence values from the resultant series of occurrence values which are not within the group of possible occurrence values making up the width of the iso-entropicgram.

According to a preferred embodiment of the invention, the DELTA MODULE receives a signal representing the total number of lines to be revolved and contains internal means for converting such representation into one or more equals representing one or more of its component powers of 2.

Also preferably, the means for shifting includes means such as the ALU, the CR1, CR2 and DN registers and the DECODE I and II MODULES which are operative during RB5, RB8, RB9, RB10 and RB25-RB28, for responding to a component power of 2 signal, received as input to the DN register for forming a shifted line signal corresponding to one of the input line signals. The occurrence values represented by the shifted line signal represent the occurrence values of the line signal received as input shifted by the number of possible occurrence values designated by the component power of 2 signals stored in the DN register. The exclusive ORing means includes means such as the CR1 and CR2 registers and the ALU operative during such flow boxes as RB20, RB21, RB5 and RB23 for exclusive ORing the occurrence values represented by a line signal received as input by the shifting means and the corresponding shifted line signal for forming a corresponding resultant line signal.

In this connection it will be noted that the unshifted and shifted values successively stored in the CR1 and CR2 registers are ordered into monotonical value order and those values which are found to be equal (indicated by a true signal at the E output of the ALU) are dropped or eliminated.

In order to revolve from one line across successive lines in an iso-entropicgram, the switching matrix (yet to be described) forms a means for coupling the input line signal and the resultant line signal, formed as a result of the exclusive ORing, as an input to the means for shifting described above. Additionally, the connection from the DELO register in the DELTA MODULE to the DN register in the REVOLVE MODULE and the load control for the DN register forms a means for coupling, as input, to the means for shifting one of the component powers of 2 signals for operation on each one of the line signals which are received as input by the shifting means.

Preferably, the means for shifting includes the ALU and the RDS3 selection circuit of the REVOLVE MODULE for combining the value of each component power of 2 signal stored in the DN register with each actual occurrence value stored in the CR1 register.

According to a preferred embodiment of the invention, the input line signals are stored in a composite code such as the hybrid code and first and second decoders such as the DECODE I and II MODULES are operable independently for separately providing an individual actual occurrence value signal representative of each occurrence value of the input line signal. The decoders each provide the actual occurrence value signals in the order of the values in the input line signal.

Also preferably, the resultant signals are encoded by means such as the ENCODE MODULE from the actual occurrence value code back to the composite code before the result is stored in the MEMORY MODULE.

VIII. SEED MODULE

A. General Description

The SEED MODULE takes an occurrence vector and locates the shortest line of the occurrence vector in its iso-entropicgram. The shortest line is referred to as the seed line.

Though the seed line can be located by revolving the occurrence vector line by line through its iso-entropicgram, noting the length of each line and looking for the shortest line, such an approach would be time consuming. Therefore it is desirable to minimize the seed finding time in data processing equipment.

Additionally, as discussed above, information is actually stored in memory in encoded or hybrid coded form which further reduces the size of the stored information.

Generally speaking then the disclosed embodiment of the invention locates seeds as follows. An event occurrence vector, to be converted to seed form, is stored in the MEMORY MODULE and is presented to a seed finding machine which includes the SEED, ENCODE, DECODE I and II, DELTA and REVOLVE MODULES.

The revolves, including the ENCODE, DECODE I and II, DELTA and REVOLVE MODULES, revolve the input line down through the lines of the iso-entropicgram and as this is done each line is presented to the ENCODE MODULE for encoding to hybrid form. The physical length of each line is noted and the encoded or hybrid coded line that is physically shortest in length is the one selected as the seed line.

According to a preferred embodiment of the invention, seed finding employs the SEED MODULE which receives as input, primarily, an event occurrence vector signal forming an input line signal of an iso-entropicgram and a signal that represents the iso-entropicgram width for such input line. The event occurrence vector or input line signal represents actual occurrence values out of a group of possible occurrence values arranged in a decreasing incremental value order from a largest to a smallest value. The SEED MODULE computes the difference between the largest two occurrence values represented by the input line and computes the difference between the value represented by the width signal and the largest occurrence value in the input line. The largest of the two differences indicates the number of lines to be revolved in the iso-entropicgram. The SEED MODULE calls the REVOLVE MODULE, causing it to revolve the input line signal down the number of lines indicated by the largest difference. The new line signal (in hybrid code) is then checked against the original input line signal and the shorter is kept as the possible seed line. The above procedure is then repeated using the possible seed line signal as the input line signal. The newly revolved line signal is compared against the retained possible seed line signal and the shorter is again retained as the possible shortest line. This operation is repeated until the REVOLVE MODULE has revolved over all possible lines in the iso-entropicgram. At that time, the possible seed line is retained in the ENCODED MODULE as the seed line.

The right hand side of Table 4-B indicates an example of this implementation of the SEED MODULE.

B. Components

Figure 20:
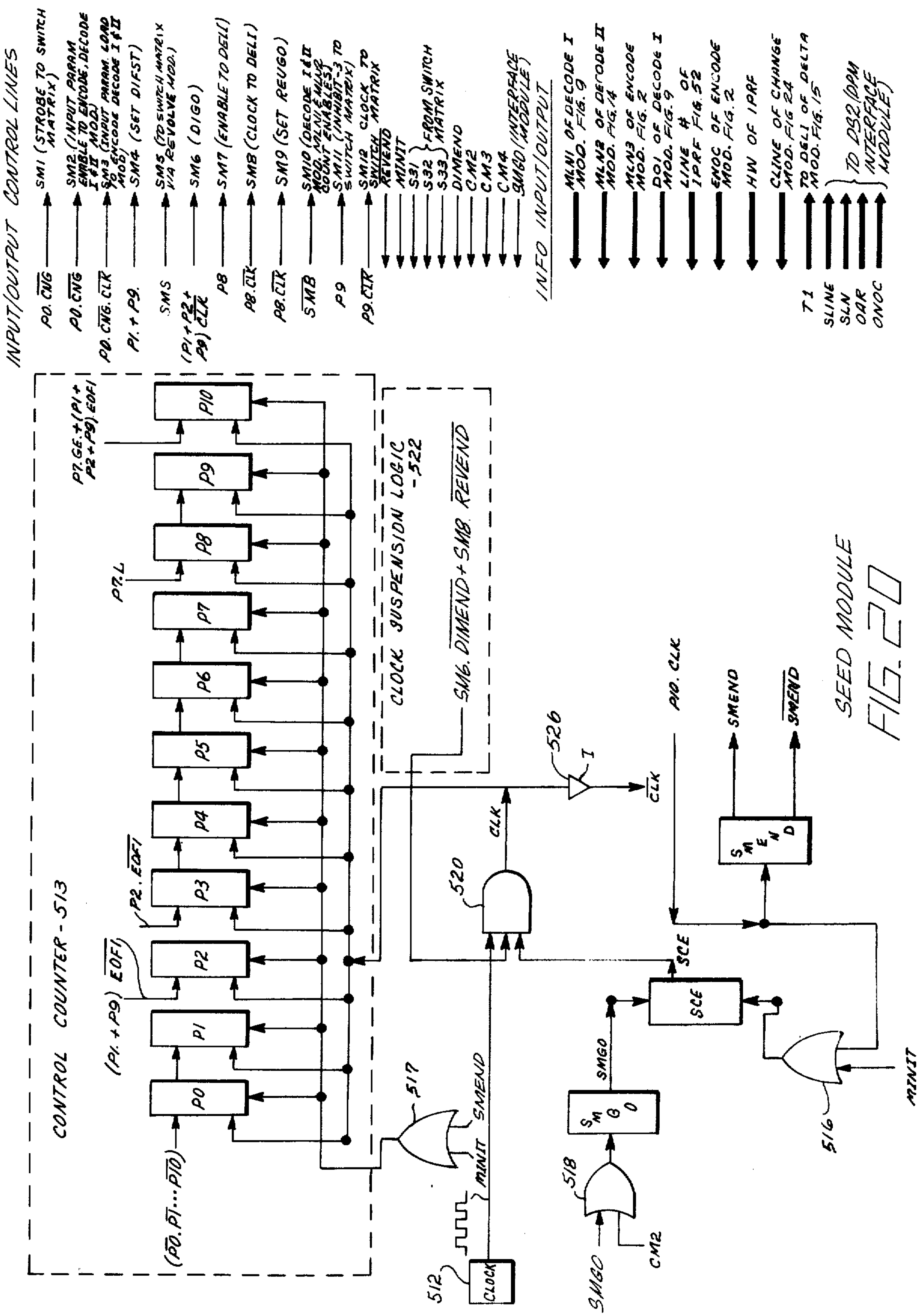
FIGS. 20 and 21 form a schematic and block diagram of the SEED MODULE.
Figure 21:
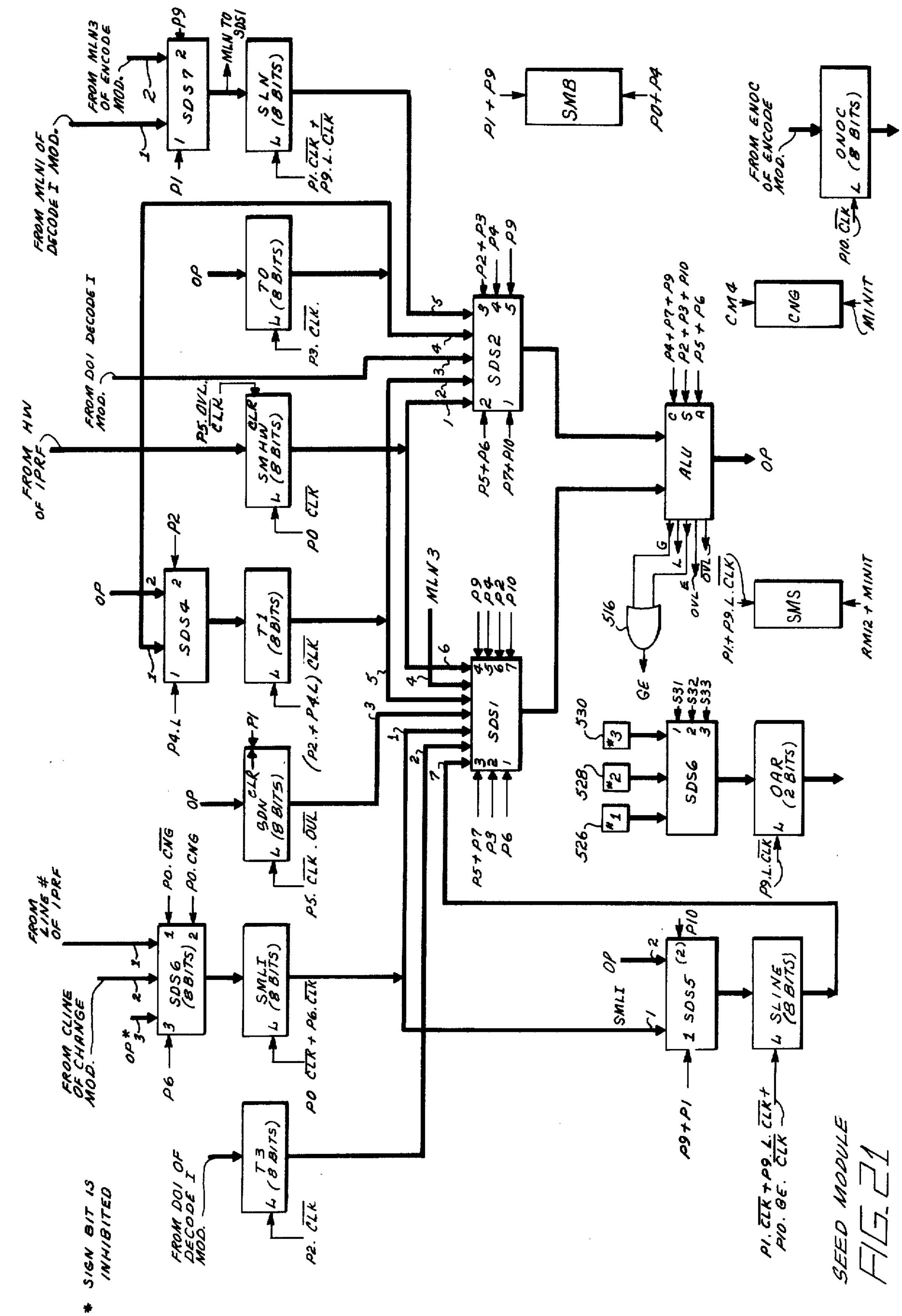

Refer now to FIGS. 20 and 21. The SEED MODULE has the following input registers, each containing eight flip flops for storing 8 binary coded bits: ONOC, SDN, SLINE, SLN, SMHW, SMLI, TO, T1 and T3. Additionally, a 2 bit, two flip flop register OAR is provided. The registers ONOC, SLINE, SLN, SMLI, TO and T1 are formed of register type SN74100 disclosed at page 259 of the above *TTL* book and the registers SMHW and SDN are formed of registers of type SN74116 disclosed at page 261 of the above *TTL* book where a true signal at the L input causes the 8 bits of information at the upper input to be stored therein. Additionally, the SMHW and SDN registers are responsive to a true signal at the CLR input for resetting or clearing to 0. The other registers in the system are characterized in that all registers in the SEED MODULE are of the type that the output signal follows or reproduces the information input signals during the presence of a true clock signal at the clock or lead (L) input. The register retains at its output and stores the signals being applied at its information input when the true signal at the clock or load input terminates. The T3 register is formed of an SN4174 type register disclosed in the above *TTL* book where the leading edge or true excursion of the pulse at L loads and retains the then existing information input signals even though the information input signals change before the true pulse at L terminates. This is done since during the true signal at P2 it is only desired to strobe in the initial signals from DO1 into register T3. The register OAR is formed of two flip flops of the same type as the reset of the flip flops whose lower left side clock input is connected to designated L input and whose inputs are connected to upper left side information inputs.

The SEED MODULE also has flip flops SCE, CNG, SMB and a control counter 513 having flip flops P0 to P10. Each of these flip flops are of the same type SN7474 disclosed above under Conventions and Components Used in the FIGS.

Selection circuits SDS1–SDS6 are provided for gating any one of the information input signals indicated along the upper side of each selection circuit to the output responsive to a true signal applied to one of the control inputs at the side of the selection circuits. These selection circuits are of the same type as that disclosed above in the section Conventions and Components Used In the FIGS.

An arithmetic unit ALU is provided for adding, subtracting and comparing the information signals applied at the two information inputs indicated along the upper side of the ALU. The arithmetic unit ALU is of the same type as that disclosed above in the Section Conventions and Components Used in the FIGS. An OR gate 516 has itsinputs connected to the G and E outputs of the ALU and forms a true signal at the GE output when a true signal is formed in either the G or E output. In addition, the SEED MODULE has conventional OR gating circuits 516, 517 and 518 and a conventional AND gating circuit 520. Additionally, the SEED MODULE has logical gating circuits which form true and false signals enabling the operation of many of the circuits shown in the SEED MODULE. These gating circuits are indicated by logical equation for simplicity. A logical signal inverter 526 is connected between the clock CLK output of AND gate 520 and the input to the CLK output for forming pulses between CLK pulses.

The SEED MODULE also has one-shot multi-vibrators SMGO and SMEND as well as a clock 512. The clock 512 is a source or regularly recurring true clock pulses as indicated. The one-shot multi-vibrators are responsive to a true signal applied at the input indicated along the left hand side for triggering to a 1 state where a true signal is formed at an unprimed output. The one-shots remain in a 1 state for a time interval equal to that between the beginning of two successive clock pulses from the clock 512 and then returns to an 0.

The SEED MODULE has three sets of switches 526, 528 and 530. The switches 526, 528 and 530 are mechanical or electronic switches which represent, respectively, the decimal values 1, 2 and 3 in binary coded form as 01, 10 and 11, respectively. Table 16 lists the primary registers, flip flops and one-shots and identifies their primary purpose.

Similar to other modules, the control inputs and outputs are indicated along the right hand side of FIG. 20 and the information inputs and outputs are indicated by large solid lines also along the right hand side.

C. Detailed Description

Figure 22:
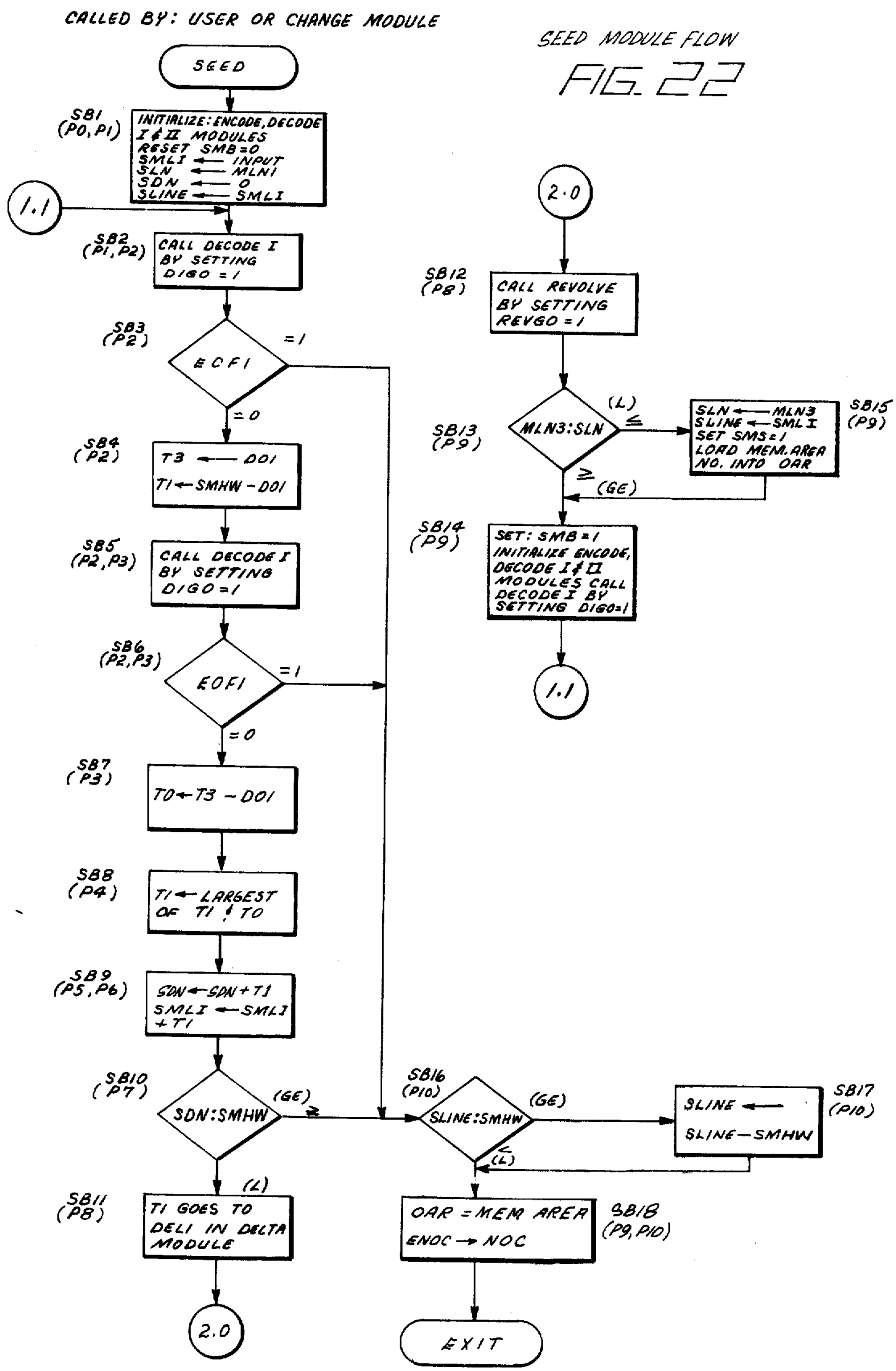
FIG. 22 is a flow diagram illustrating the sequence of operation of the SEED MODULE.

Consider now the details of organization of the SEED MODULE, making particular reference to the schematic and block diagram of FIGS. 20 and 21, and the SEED MODULE flow diagram of FIG. 22. The flow diagram contains blocks indicating the sequence of operation. The symbols SB1 through SB18, shown next to the blocks, are used to identify the boxes in the flow diagram. The symbols designating the various flip flops of the control counter 513 are also shown in parentheses adjacent the various blocks to help relate the operation indicated in each box of the flow with the state of the control counter 513.

Initially, the OR gates 516 and 517 receive true signals from the MINIT output of the MINI COMPUTER which causes flip flops P0–P10 and SCE to be reset to 0 states. Subsequent true signals formed at SMEND by one-shot SMEND cause OR gate 517 to reset flip flops P0-P10 to 0.

Table 11 shows the primary inputs to the SEED MODULE as well as the inputs to the ENCODE, DECODE I and II, DELTA and REVOLVE MODULES making up the seed finder. The initial inputs come principally from the IPRF (FIG. 52) and the MEMORY MODULE. Accordingly, the MINI COMPUTER, in the manner described hereinafter, first loads the IPRF and the MEMORY MODULE with the required initial input information. To this end the MINI COMPUTER initially stores an event occurrence vector, in hybrid code, into MEMORY MODULE area 1. This event occurrence vector is the input line for an iso-entropicgram and at the beginning of the operation of the seed finder forms what is currently assumed to be the seed line.

To be explained in more detail, the input or current line may not necessarily be line 0 of its iso-entropicgram and accordingly the number of the input line as well as the width value for the iso-entropicgram are initially stored by the MINI COMPUTER into registers LINE # and HW of the IPRF (FIG. 52). The length of the imput line is variable and hence a length value specifying the number of words in this input line is stored in register LINE # of the IPRF.

After the IPRF and MEMORY MODULE area 1 are loaded, the SEED MODULE is called by the MINI COMPUTER or the CHANGE MODULE by forming signals at the USER and CM2 outputs, respectively. A true signal at either of these outputs causes the OR gate 518 to apply a true signal to the one-shot SMGO, triggering it to a 1 state causing a true signal at the SMGO output. The true signal at the SMGO output sets the SCE flip flop to a 1 state. The output from clock suspension logic 522 is initially true. Therefore, the true signal at the SCE output of the SCE flip flop enables and AND gate 520 to couple clock pulses from the clock 512 to the CLK output, which in turn causes an inverter 526 to form pulses at the $\overline{CLK}$ output. The 0 state of the flip flops P0 to P10 causes true signals at the $\overline{P0}$, $\overline{P1}$ . . . $\overline{P10}$ outputs, thereby causing the flip flop PO to be set to a1 state at the following pulse at CLK, thereby causing SB1 of the SEED MODULE flow to be entered.

During SB1 of the flow during the true signal at PO output, the input parameters for the SEED MODULE are stored into their proper registers. During the true signal at the PO output of the SEED MODULE, the initial input parameters for SEED MODULE are also enabled and clocked into their proper registers. Additionally, the SWITCH MATRIX is set so that the REVOLVE MODULE when called for the first time will cause the DECODE I and II MODULES to read the input line from the MEMORY MODULE area 1 and cause the ENCODE MODULE to write the revolved or new line into the MEMORY MODULE area 2.

It should be noted that the CHANGE MODULE forms a true signal at the CM4 output, thereby setting the CNG flip flop to a 1 state only when the CHANGE MODULE is the calling module. Referring to the right hand side of FIG. 20, true signals at the PO, $\overline{CNG}$ and $\overline{CLK}$ outputs cause true signals at the SM1, SM2 and SM3 outputs to the SWITCH MATRIX and also cause input parameters to be loaded into the ENCODE, DECODE I and II, and DELTA MODULES in the manner and from the sources discussed above for each of these modules.

A true signal is only formed at the outputs SM1, SM2 and SM3 when the MINI COMPUTER is the calling module. Thus, assuming that the MINI COMPUTER is the calling module, true signals are formed at the SM1, SM2 and SM3 outputs. The true signal at SM1 causes flip flops S11, S22, and S31 to be set to 1 in the SWITCH MATRIX. The true signal at SM2 causes the length value LN1 in IPRF to be gated to registers MLN1 and MLN2 of the DECODE I and II MODULES and the pulse at SM3 actually causes the length value to be loaded into registers MLN1 and MLN2 and into register EHW of the ENCODE MODULE. Additionally, the true signal at output PO resets the SMB flip flop to an 0 state. The true signals at PO, $\overline{CNG}$ (CHANGE MODULE is not the calling module) cause the SDS6 selection matrix to couple the line number in the LINE # register of the IPRF to the information input of the SML1 register. Note that if the CHANGE MODULE were the calling module, the true signals at CNG and PO would cause the switching circuit SDS6 to couple the line number from the CLINE register of the CHANGE MODULE to the register SML1. During the true signal at the PO output, the pulse at $\overline{CLK}$ causes the line number from SDS6 to be stored into register SML1 and causes the SMHW register to store the iso-entropicgram width signal from the HW register of the IPRF (FIG. 52 ).

Thus, the SMLI register contains the line number of the inut line (stored in MEMORY MODULE area 1) and the SMHW register contains the iso-entropicgram width value.

The true signal at PO causes flip flop P1 to be set to a 1 state. Therefore, also during SB1 of the SEED MODULE flow, the true signal at the P1 output causes the selection circuit SDS7 to couple the length value from register MLN1 of the DECODE I MODULE to the information input of register SLN. Additionally, the true signal at P1 causes the SDN register to be reset or cleared to 0 and causes the SMB flip flop to be set to a 1 state. The 1 state of the SMB flip flop causes a true signal at the $\overline{SMB}$ output to be removed and thereby remove the true signal at the SM10 output. As explained above, the signal SM10 goes to the DECODE I MODULE, and when false, inhibits the count down of the physical length of the input line in MLN1. The SEED MODULE is about to become operative during SB2 through SB5 for causing the DECODE I MODULE to do a read on the input line from the MEMORY MODULE only for the purpose of reading the largest two occurrence values of the input line and the count downof MLN1 is inhibited during this operation because the DECODE I MODULE will later be called to go back to the beginning of the same input line to again read the same occurrence values.

At this point in time, the input line is retained as the current possible seed line since this is the only line considered to this point. The register SLINE stores the number of the current possible seed line. Accordingly, the true signal at the P1 output causes the SDS5 selection circuit to couple the input line number from register SML1 to the information input of register SLINE and the true signal at the $\overline{CLK}$ output causes the line number to be loaded into register SLINE.

Additionally, it is necessary to prevent the SWITCH MATRIX from allowing the MEMORY MODULE area 1 containing the input line to be overwritten since line is to be retained as the current possible seed line. In order to insure that the SWITCH MATRIX retains the input line in MEMORY MODULE area 1, the true signal at the P1 output causes the SMS flip flop to be set to a 1 state which in turn causes a true signal to be formed at the SM5 output of the SEED MODULE. The SM5 output in turn is connected to the SWITCH MATRIX and a true signal at SM5 in conjunction with RM12 from the REVOLVE MODULE causes the SWITCH MATRIX to prevent overwriting of MEMORY MODULE area 1.

During SB1, SB2 of the SEED MODULE flow is entered. During SB2, the true signal at the P1 and $\overline{CLK}$ outputs causes a true signal at the SM6 output which in turn calls the DECODE I MODULE by setting the D1GO one-shot to a 1 state. The DECODE I MODULE then commences its operation of obtaining the largest occurrence value from the input line in MEMORY MODULE area 1. The true signals at the outputs at the outputs P1, $\overline{CLK}$ and $\overline{D1MEND}$ (from the DECODE I MODULE) causes SM6 to be true and the clock suspension logic 522 removes the true signal at the corresponding input of gate 520 and stops clock pulses from being formed at the CLK and $\overline{CLK}$ outputs, thereby suspending operation of the SEED MODULE while the DECODE I MODULE completes its operation and provides a decode occurrence value.

After the DECODE I MODULE provides the largest occurrence value from the input line stored in MEMORY MODULE area 1, the true signal of $\overline{D1MEND}$ is removed, thereby causing the clock suspension logic 522 to again apply a true signal at the corresponding input of gate 522 enabling pulses to be formed at the CLK and $\overline{CLK}$ outputs.

The true signal at the P1 output, together with the true signal at the $\overline{EOF1}$ outputs, causes the flip flop P2 to be set to a 1 state. The true signal thus formed at the P2 output in coincidence with a true clock signal at output $\overline{CLK}$ causes this largest occurrence value from register DO1 of the DECODE I MODULE to be stored into the T3 register. Note that should a true signal be formed at the EOF1 output, a false signal is formed at the $\overline{EOF1}$ output and, hence, the flip flop P10 would be set to a 1 state rather than the P2 flip flop. If EOF1 is set, there is no meaningful output from DECODE I MODULE. As a result, the output from the DECODE I MODULE would not have been stored into register T3. Hence, state SB16 of the SEED MODULE flow would be entered from SB3. During SB4 of the flow, the true signal at the P2 output also causes the SDS1 and SDS2 selection circuits to couple the iso-entropicgram width value from register SMHW and the largest occurrence value from the DO1 register of the DECODE I MODULE to the inputs of the ALU and causes the ALU to subtract the largest occurrence value from the width value. The resultant difference formed at the OP output of the ALU is coupled to the information input of register T1 by the SDS4 selection circuit, under control of output P2, and the true signal at the P2 output causes the difference signal formed at the OP output to be stored into register T1 at the following pulse at $\overline{CLK}$. Thus, following SB4 of the SEED MODULE flow, the largest occurrence value is contained in register T3 and the register T1 contains the difference between the iso-entropicgram width value and the largest occurrence value of the input line.

SB5 of the SEED MODULE flow is then entered and true signals are formed at the outputs P2 and $\overline{CLK}$ thereby forming a true signal at the SM6 output which again calls the DECODE I MODULE by setting D1GO to a 1 state. The MAR1 register of the DECODE I MODULE has now been counted up by 1 address, thereby forming the address of the next to the largest occurrence value of the input line contained in MEMORY MODULE area 1. Thus, the DECODE I MODULE now reads out the next to the largest occurrence value and stores it in its DO1 register. While this takes place, the true signals at the P2, $\overline{CLK}$ and $\overline{D1MEND}$ outputs again cause the clock suspension logic 522 to disable the AND gate 520 thereby terminating the pulse at CLK. When the DECODE I MODULE has completed its operation thereby providing the next to the largest occurrence value in its register DO1, the true signal is removed at the $\overline{D1MEND}$ output thereby causing the clock suspension logic 522 to enable the AND gate 520 to start causing pulses at CLK and $\overline{CLK}$.

The true signal at the P2 and $\overline{EOF1}$ output also causes the flip flop P3 to be set to a 1 state at the following pulse at CLK. If EOF1 is set, then flip flop P10 is set to 1. The signal at the P3 output causes the SDS1 and SDS2 selection circuits to couple the largest occurrence value in register T3 and the next to the largest occurrence value from register DO1 (DECODE I MODULE) to the information input of the ALU and causes the ALU to subtract the next to the largest occurrence value from the largest occurrence value and form a corresponding difference signal at the OP output.

SB7 of the SEED MODULE flow is now entered. The true signal at the outputs P3 and $\overline{CLK}$ causes the register TO to store the difference signal. Thus, at this point in time, the register TO contains the difference between the largest two occurrence values of the input line, and the register T1 contains the difference signal representing the difference between the width value and the largest occurrence value.

Again, note that should the DECODE I MODULE be at the end of a file and a true signal be formed at the EOF1 output, a true signal is not formed at the $\overline{EOF1}$ output. Hence, the flip flop P3 would not have been set and instead the flip flop P10 would have been set to a 1 state, causing SD16 of the SEED MODULE flow to be entered.

Assume now that true signals are formed at the output P3. The P4 flip flop is set to a 1 state causing SB8 of the SEED MODULE flow to be entered. During SB8, a true signal is formed at the P4 output. The true signal at the P4 output causes the difference between the largest two occurrence values of the input line, contained in register TO, and the difference between the width value and the largest occurrence value, contained in register T1, to be coupled through selection circuits SDS1 and SDS2, respectively, to the information inputs of ALU and causes the ALU to compare the two difference values. Note carefully that should the difference between the largest two occurrence values contained in register T1 be greater, a true signal is formed at the G output of ALU and the contents of register T1 remain unchanged. However, should the difference between the width value and the largest occurrence value in register TO be larger, a true signal is formed at the L output of ALU. A true signal at the P4 and L outputs causes the selection circuit SDS4 to couple the content of the register TO to the information input of register T1 and the true signals at the P4, L and CLK outputs cause the content of register TO to be stored into register T1. Thus, it now can be seen that register T1 stores the larger of the difference between the largest two occurrence values of the input line and the difference between the iso-entropicgram width value and the largest occurrence value. Note that the larger of the difference values now contained in T1 is the number of iso-entropicgram lines by which the input line stored in the MEMORY MODULE is now to be revolved.

The true signal at the P4 output causes the P5 flip flop to be set to a 1 state at the following pulse at CLK, thereby causing the SB9 of the SEED MODULE flow to be entered.

The register SDN is used to accumulate and keep track of the total number of sio-entropicgram lines revolved by the REVOLVE MODULE. Thus, during SB9, the number of lines next to be revolved (the largest difference signal) contained in register T1 is added to the content of register SDN. The first time through SB9 the register SDN contains 0. To be explained in more detail, during SB10 the total lines revolved contained in register SDN is compared with the iso-entropicgram width value contained in register SMHW to determine when the number of lines revolved exceeds the width value for the iso-entropicgram.

To this end, the true signal at the P5 output causes selection circuits SDS1 and SDS2 to couple the content of registers SDN and T1 to the information inputs of the ALU, and causes the ALU to add the values together and form a sum. If no overflow occurs, OVL is true and the logic P5.CLK.OVL becomes true and stores the sum into register SDN. Note that if an overflow occurs, the signal at OVL will be false, preventing the result at the output of OP being stored back into SDN. Also if overflow occurs, it is necessary to clear the width value in register SMHW to 0 so that the subsequent compare during P7 will cause a GE condition which will in turn cause P10 to be set to 1 and terminate the operation. It is desired to terminate because if overflow occurs, an attempt is being made to revolve to a line which is not within the iso-entropicgram for the input line.

The true signal at the P5 output causes the flip flop P6 to be set to a 1 state at the following pulse at CLK. The true signal at the P6 output causes the SDS1 and SDS2 selection circuits to couple the line number value contained in register SML1 and the number of lines to be revolved value contained in register T1 to the information inputs of the ALU and causes the ALU to add the values together and form the sum at the OP output. The true signals at the outputs P6 and CLK cause the SDS6 selection circuit to couple the sum to the information input of SML1 and to store the sum into register SML1. Thus, register SML1 now contains the number of lines revolved relative to the number of the input line. Note that should overflow have occurred, the sign bit at the output of ALU is disregarded because this amounts to an additional module of the iso-entropicgram length.

The true signal at the P6 output causes the P7 flip flop to be set to a 1 state responsive to the following pulse at CLK and causes SB10 of the SEED MODULE flow to be entered. During SB10, the number of lines revolved value is compared with the width value as described in connection with SB9. If the number of lines revolved value contained in register SDN is greater than the iso-entropicgram width value contained in register SMHW, the SEED MODULE goes to Sb16–18 following which the operation of the SEED MODULE exits. An exit is taken at this point in the operation since the REVOLVE MODULE will have revolved across all lines in the iso-entropicgram. If the number of lines revolved value contained in register SDN is less than the iso-entropicgram width value contained in register SMHW, meaning that the SEED MODULE has not revolved across all lines of the iso-entropicgram, SB11 through SB14 of the SEED MODULE flow are entered.

Assume during SB10 that the number of lines revolved value contained in register SDN is less than the width value contained in register SMHW, the true signal at the P7 output causes the SDS1 and SDS2 selection circuits to couple the number of lines revolved value (register SDN) and the width value (register SMHW) to the information inputs of the ALU and causes the ALU to compare the two values forming a true signal at the L output. The true signal at the L output of the ALU in coincidence with the true signal at the P7 output causes the P8 flip flop to be set to a 1 state at the following CLK pulse and SB11 of the SEED MODULE flow is entered.

During SB11, the number of lines to be revolved value contained in register T1 is sent to the DELTA MODULE which in turn forms the component powers of 2 of this value. beginning with the largest component power of 2 as discussed above in connection with the DELTA MODULE. To this end, the true signal at the P8 output causes a true signal at the SM7 output which in turn causes the DELS selection circuit in the DELTA MODULE to couple the largest difference value from register T1 to the information input of the register 302 in DELI. A true signal at the P8 output of the SEED MODULE in coincidence with the true signal at the $\overline{CLK}$ output causes a true signal at the SM8 output which in turn causes the load circuitry of register 302 in DELI to store the larger difference value from register T1 into register 302 of DELI.

SB12 of the SEED MODULE is now entered. The true signals at the outputs P8 and $\overline{CLK}$ also cause a true signal at the SM9 output which in turn calls the REVOLVE MODULE by setting the REVGO one-shot to a 1 state. The REVOLVE MODULE in turn calls the DELTA MODULE as discussed above and the REVOLVE MODULE and DELTA MODULE in conjunction with the DECODE I, DECODE II and ENCODE MODULES revolve the input line, contained in MEMORY MODULE area 1, down the number of lines indicated by the largest difference value sent to the DELTA MODULE. During this operation, the true signal at the P8 and $\overline{REVEND}$ output causes the clock suspension logic 522 to again disable gate 520 and thereby suspend the operation of the SEED MODULE. After the designated number of lines have been revolved by the REVOLVE MODULE, the true signal is removed at the $\overline{REVEND}$ output, thereby causing the clock suspension logic 522 to again enable gate 520, thereby enabling a clock pulse to again be formed at the CLK and $\overline{CLK}$ outputs in the SEED MODULE. The following pulse at CLK causes the flip flop P9 to be set to a 1 state, thereby causing SB13 of the SEED MODULE flow to be entered. The true signal at the P9 output of the control counter 513 in the SEED MODULE causes the SDS1 and SDS2 selection circuits to couple the length value (number of words in the hybrid coded line written into the MEMORY MODULE by the ENCODE MODULE) contained in register MLN3 of the ENCODE MODULE to be gated to one input of the ALU and causes the length of the original input line which length value is contained in register SLN to be gated to the other input of ALU and causing the ALU to compare the two values. If the length of the new line as indicated by register MLN3 is smaller than the current seed line as indicated by register SLN, the ALU forms a true signal at the L output indicating that MLN3 is less. This causes SB15 of the SEED MODULE flow to be entered where the content of register MLN3 (which is smaller) is stored into the SLN register. If, on the other hand, the length value for the new line (in register MLN3) is equal to or greater than the length value of the original input line (in register SLN), true signals are formed at the G or E outputs ofthe ALU, causing the OR gate 516 to form a true signal at the GE output. This causes SB14 of the SEED MODULE flow to be entered. In this manner, the smallest of the length values for the original input (current possible seed) line (register SLN) or for the new line (register SLN3) is retained in register SLN.

Consider now the actual operation in this regard. Assume that the length of the new seed line is smaller and hence a true signal is formed at the L output of the ALU during the true signal at P9. The SDS7 selection circuit couples the length value from register MLN3 of the ENCODE MODULE to the information input of register SLN and the following pulse at $\overline{CLK}$ in coincidence with the true signals at P9 and L cause the load circuit of register SLN to store the length value from register MLN3 into register SLN. Additionally, since the new line is now shorter, it is necessary to store the line number of the new line into register SLINE. Accordingly, the true signal at P9 causes the SDS5 selection circuit to couple the line number value for the new line from register SML1 to the information input of register SLINE and the true signals at the P9, L and $\overline{CLK}$ outputs cause the load circuit of register SLINE to store the line number value. Additionally, the true signals at the outputs P9, L and $\overline{CLK}$ cause the SMS flip flop to be set to a 1 state which, as discussed above, causes a true signal at the SM5 output thereby indicating to the SWITCH MATRIX that the new line stored into the MEMORY MODULE area 2 should be retained as the possible seed line. Following SB15, SB14 of the SEED MODULE flow is entered and the true signal at the P9 output causes the SMB flip flop to be set to a 1 state, thereby removing the true signal at the $\overline{SMB}$ output. This is required since the DECODE I MODULE is going to read the new line for computing the larger of the difference between the largest two occurrence values of the new line and the difference between the width value and the largest occurrence value. The lack of a true signal at the output $\overline{SMB}$ and hence at the output SM10, causes the DECODE I MODULE to prevent the MLN1 register of the DECODE I MODULE from being counted down.

Return to SB13 of the SEED MODULE flow and assume that a control signal is formed at the GE output of OR gate 516, indicating that the length value of the new line is equal to or larger than the current possible seed line contained in register SLN. This causes SB14 of the SEED MODULE flow to be entered, skipping SB15 and accordingly, the current seed length value register SLN and its current seed line number value in register SLINE remain unchanged. Likewise, flip flop SMS remains unchanged, thereby causing a false signal at the SMS output and, hence, at the SM5 output of the SEED MODULE, thereby signalling the SWITCH MATRIX that the new line contained in MEMORY MODULE area 2 can be overwritten and need not be saved. The true signals at the P9 and P9.$\overline{CLK}$ outputs cause true signals at the SM11 and SM12 outputs.

At this stage the first revolve has just been completed and the new line is in the MEMORY MODULE area designated by the S31 flip flop in the SWITCH MATRIX. Though the description has been made up to this point for only the first or input line stored in the MEMORY MODULE, the same general operation takes place if a new current seed line is formed. In this latter case, during SB13 the new seed line may be stored in any one of the MEMORY MODULE areas. The area will be specified by the true state of one of flip flops S31, S32 and S33 as more fully described in connection with the MEMORY MODULE and the SWITCH MATRIX.

The S31 signal has to be relayed to the S11, S12, S13 flip flops of the SWITCH MATRIX before the DECODE I MODULE can read the new current seed line. At the same time existing information must not be modified in the MEMORY MODULE areas designated by the S21, S22, S23, or S31, S32 or S33 flip flops. Thus, a true signal is formed at the SM11 output. This inhibits the clock signal to flip flops S21, S22, S23, S31, S32 and S33. The true signal at SM12 then clocks the proper information from S31, S32, S33 to S11, S12, S13 in the SWITCH MATRIX. When all is done, S2*i*, S3*i* (= 1,2,3) in the SWITCH MATRIX are unaltered, whereas S1*i* (= 1,2,3) is able to gate the information from the new line to the DECODE I MODULE. Also since the rest of the system remains unchanged, when REVOLVE is called and a true signal is formed at RM8, the operation proceeds as normal. True signals at the P9 and $\overline{CLK}$ outputs cause a true signal at the SM4 output which causes the gate 228 to set flip flop D1FST to a 1 state in the DECODE I MODULE and cause a true signal at the SM6 output which calls the DECODE I MODULE by setting the D1GO one-shot to a 1 state.

Following SB14, SB2 of the SEED MODULE flow is again entered. The true signals at the P9, $\overline{CLK}$ and $\overline{D1MEND}$ outputs again cause the clock suspension logic 522 to suspend the operation of the SEED MODULE until the DECODE I MODULE has completed its operation and provides the largest occurrence value in register DO1. Note that the DECODE I MODULE now reads the current possible seed line which is contained in the MEMORY MODULE area and which was found by the SEED MODULE during SB13 to be the shortest. After the DECODE I MODULE has completed its operation and is forming the largest occurrence value of the current possible seed line, the true signal is removed at the $\overline{D1MEND}$ output, and the clock suspension logic 522 again enables the gate 520, allowing a pulse to be formed at the CLK output. The true signal at the P9 and $\overline{EOF1}$ output in coincidence with the true signal at the CLK output causes flip flop P2 to again be set to a 1 state. The resulting true signal at the P2 output causes the SB2 of the SEED MODULE flow to again be entered where the largest occurrence value is stored in register T3 and the difference between the width value and the largest occurrence value is stored via the SDS4 selection circuit into register T1. The operation during SB3 through SB15 is again repeated as discussed above, this time utilizing the current possible seed line which was previously determined during SB13.

Assume now that during SB10 it is found that the total number of lines revolved value contained in register SDN is equal to or greater than the iso-entropicgram width contained in register SMHW. The ALU then forms a true signal at either the G or the E output, causing the OR gate 516 to form a true signal at the GE output. The true signals at the P7 and GE outputs in turn cause the flip flop P10 to be set to a true state, thereby causing SB16 of the SEED MODULE flow to be entered.

During SB16, the number of the current possible seed line contained in register SMHW. If the number of the current possible seed line value in register SLINE is larger, then SB17 is entered, whereas if it is less, SB18 is entered.

Consider now the details of the above operation. The true signal at the P10 output causes the SDS1 and SDS2 selection circuits to couple the current possible seed line number value contained in register SLINE and the width value contained in register SMHW to the information input of the ALU for comparison. Assume that the current possible seed line value is larger. The ALU forms a true signal at the G or E outpt which in turn causes the OR gate 516 to form a true signal at the GE output and SB17 is entered. Additionally, the true signal at the P10 output causes the ALU to form the difference between the current possible seed line value contained in SLINE and the width value contained in register SMHW and forms a difference value at the OP output. The true signal at the P10 output also causes selection circuit SDS5 to couple the difference value from ALU to the information input of the register SLINE. The true signal at the P10, GE and $\overline{CLK}$ outputs causes a load circuit to store the difference value into the register SLINE. Note that the current line number value stored in register SLINE during SB17 is the seed line number less the iso-entropicgram width value. That is, the current possible seed line contained in SLINE is greater than the iso-entropicgram width value, the REVOLVE MODULE has revolved past the end of the iso-entropicgram and it is therefore necessary to subtract the width value from the current possible seed line value in order to determine the actual number of the seed line. This operation is taken to insure that the current possible seed line value contained in register SLINE lies within the bounds of the iso-entropicgram. If a revolve has taken place past the end of the iso-entropicgram, then line values are contained in register SLINE which are greater than the iso-entropicgram width. However, these values would be inaccurate and to find the value of the actual seed line value it is necessary to subtract the width value from the line value to arrive at the true number of the seed line.

Following SB16 or SB17 of the SEED MODULE flow, SB18 is entered. The true signals at the P10 and $\overline{CLK}$ outputs cause the load circuit for the ONOC register to be activated and store the number of occurrences that have appeared in the possible seed line from register ENOC of the ENCODE MODULE into register ONOC.

It should be noted that true signals occur at the P9, L and $\overline{CLK}$ outputs during SB15 when the new iso-entropicgram line is found to be shorter than the current possible seed line. The true signals at the P9, L and $\overline{CLK}$ outputs cause the register OAR to load values corresponding to MEMORY MODULE areas 1, 2 and 3, respectively, from switches 526, 528 and 530. The one which is selected is determined by the outputs S31, S32 and S33 of the corresponding flip flops in the SWITCH MATRIX which indicate the output area in the MEMORY MODULE currently being used for the new line.

D. Example of Operation

Consider now an example of operation of the SEED MODULE and related portions of the DPM forming the SEED MODULE. Assuming that the SEED MODULE is to revolve down through the iso-entropicgram shown in Table 4-B discussed above in I.GENERAL DESCRIPTION. Assume that the input line to be revolved is line 0; thus the revolve will revolve from line 0 to line 2 and then to line 7.Lines 0, 2 and 7 broken down into 7 bit words with a 0 bit indicating absolute word code and a 1 bit indicating hybrid word code at the lefthand end are as follows:

-continued

| | |
|---|---|
| 10001110 00011010 01110101 | hybrid line 0 length = 3 |
| 10001011 00000111 00011010 | hybrid encoding of line 2 length = 3 words |
| 10000111 01011001 | hybrid encoding of line 7 length = 2. |

The subsequent sequence of operation of the seed finder is as follows:

| | | |
|---|---|---|
| Input to the SEED MODULE is from "LINE NO" of IPRF | | line # of the seed (φ) to SMLI |
| from HW of IPRF | | iso-entropicgram width (16) to SMHW |
| from MLNl of DECODE 1 MODULE | | length of input line (3) to SLN |
| from DOI of DECODE I MODULE | | line (0) in MEMORY MODULE area 1 |
| sequence of control | | SB1-SB14, SB2-SB13, SB15,SB14, SB2-SB10, SB16-SB17 |
| SB1 | SDN = 0 SMLI = φ SLINE (0) = SMLI (0) | assume beginning line # and length are SEED and initialize modules; |
| | SLN = 3 D1FST = 1 | |
| SB2 | call DECODE I MODULE CR1 = DO1 = 14 EOF1 = 0 | |
| SB3 | EOF1 = 0 ∴ SB4 | |
| SB4 | T1 (2) = SMHW (16) − CR1 (14) | difference between iso-entropicgram width and largest occurrence value; |
| SB5 | call DECODE I MODULE DO1 = 12 EOF1 = 0 | |
| SB6 | EOF1 = 0 ∴ SB7 | |
| SB7 | Tφ(2) = CR1 (14) − DO1 (12) | diffrence between the two largest occurrence values; |
| SB8 | T1 (2) = MAX (T1 (2),Tφ) ) | the maximum of these differences; |
| SB9 | SDN (2) = SDN (0) + T1 (2) SMLI (2) = SMLI (0) + T1 (2) | how far revolved; line position in the iso-entropicgram |
| SB10 | SDN (2) < SMHW (16) ∴ go to SB11 | |
| SB11 | DELI (2) ←T1 (2) | largest to DELTA MODULE input; |
| SB12 | The REVOLVE MODULE is called and creates line No. 2 of the iso-entropicgram | |
| SB13 | SLN (3) = MLN3 (3) ∴ go to SB14 | the possible shortest seed line is not less than 2; therefore iso-entropicgram line 2 is not considered as a seed line; |
| go to SB2 | D1FST = 1 | reset the DECODE I and II MODULES: |
| SB2 | call DECODE I MODULE CR1 = DO1 = 11 EOF1 = 0 | read the largest occurrence; |
| SB3 | EOF1 = 0 ∴ go to SB4 | |
| SB4 | T1 (5) = SMHW (16) − CR1 (11) | difference between iso-entropicgram width and largest ocurrence; |
| SB5 | call DECODE I MODULE DO1 = 10 EOF1 = 0 | |
| SB6 | EOF1 = 0 go to SB7 | |
| SB7 | Tφ(1) ←CR1 (11) − DO1 (10) | difference between the two largest occurrences; |
| SB8 | T1(5) = MAX(T1(5), Tφ(1) ) | number of lines to be revolved; |
| SB9 | SDN(7) = SDN(2) + T1(5) SML1(7) = SMLI(2) + T1(5) | number of lines revolved; position of the seed line after the revolve; |
| SB10 | SDN(7) < SMHW(16) ∴ go to SB11 | |
| SB11 | DELI(5) = T1(5) | number of lines to be revolved to the DELTA MODULE; |
| SB12 | line 2 is now revolved down 5 lines to line 7 by the REVOLVE MODULE - the format and length of this line were given in the input discussion | |
| SB13 | SLN(3) > MLN3 (2) ∴ SB15 | |
| SB15 | SLN(2) = MLN3(2) SLINE(7) = SMLI(7) | save new iso-entropicgram line as possible shortest seed line; |
| SB14 | D1FST = 1 go to SB2 | reinitialize DECODE I and II MODULES - inhibit the overwriting of the seed line in the MEMORY MODULE area; |
| SB2 | call DECODE I MODULE CR1 = DO1 = 7 EOF1 = 0 | |

IX. SEED FINDER

Briefly, an electronic data processing SEED FINDER or data compactor has been disclosed. The compactor is for a coded occurrence signal, such as an event occurrence signal, which represents actual occurrence values out of a group of possible occurrence values. The possible and actual values are arranged in a monotonical, preferably decreasing, value order. Memory means such as the MEMORY MODULE stores such a coded occurrence signal. Means such as the DECODE I and DECODE II MODULES form a first signal representing the stored coded occurrence signal. Means such as the seed finder of FIG. 26 responds to the first signal for selectively forming, for each different first signal, any one of a set of equivalent signals, the set including such first signal. Each equivalent signal is related to another one by an exclusive OR of the values thereof and the values thereof relatively shifted. The means for forming equivalent signals further includes means for enabling one or more of the equivalent signals to be sequentially formed. In this connection the SEED MODULE, including its control counter, enables a coded occurrence signal such as an event occurrence signal to be revolved through its iso-entropicgram.

Means such as the SLN register of the SEED MODULE and the MLN3 register of the ENCODE MODULE store and form a signal indicative of the length of the occurrence signal and the equivalent signals. Means is provided for forming a signal identifying the equivalent signal which is associated with the shortest length signal. In this connection the SEED MODULE is operative during SB13 of its flow for comparing the length of the value stored in the MLN3 and SLN registers to determine which is the smallest. The signal in register SLN indicates the length of the shortest seed to that point and the content of register MLN3 indicates the length of the line value being stored in the MEMORY MODULE from the ENCODE MODULE.

The purpose of the seed finder is to locate the seed of an event occurrence vector. Stating it differently, an event occurrence vector signal is to be revolved through its corresponding iso-entropicgram until an equivalent signal is found that is shortest in length. The iso-entropicgram has a set of unique but equivalent signal sets which include the input or event occurrence vector. Each signal set is related to another one in the set by an XOR of the value thereof and the value thereof relatively shifted by one possible occurrence value. In a preferred embodiment of the invention the shortest length is that which is shortest when stored in hybrid coded form in the MEMORY MODULE.

Figure 23:
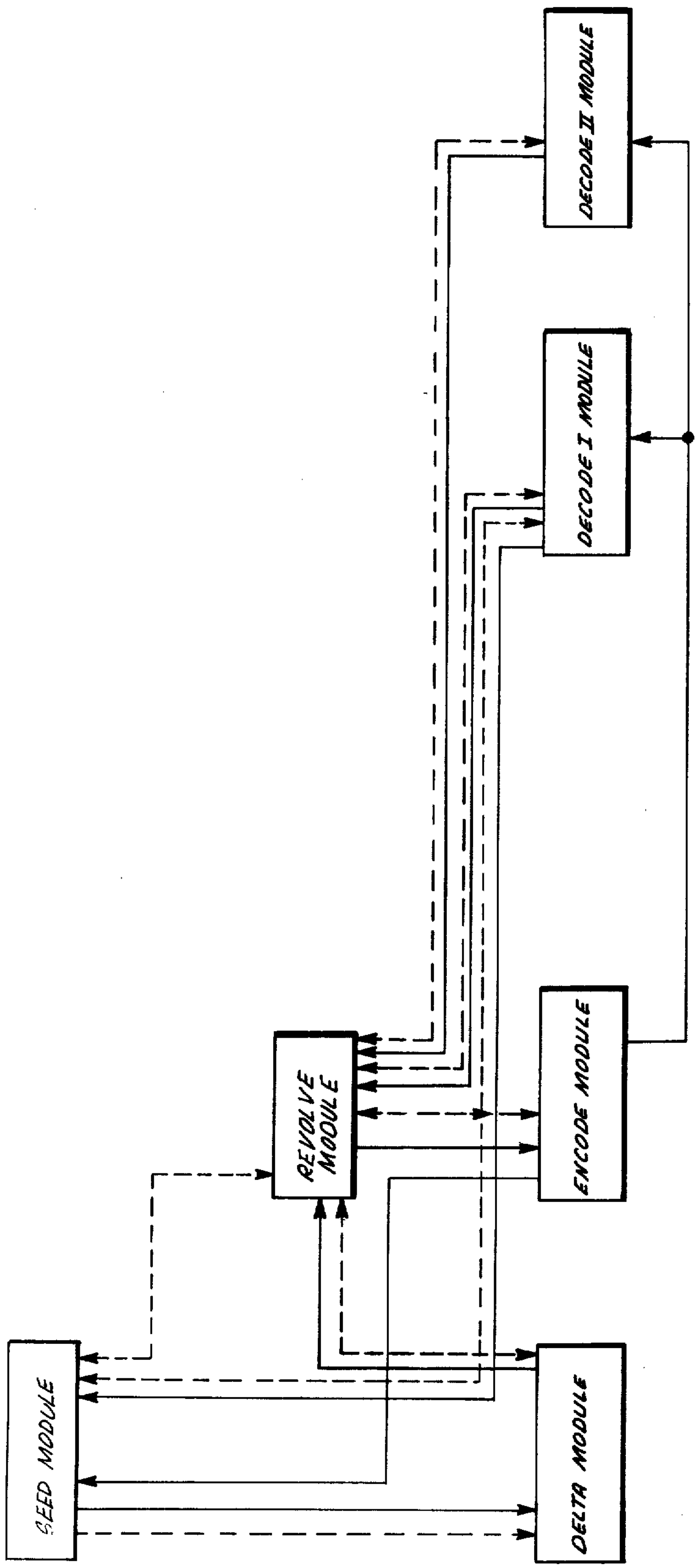
FIG. 23 is a block diagram of a seed finger and employing the SEED MODULE.

FIG. 23 is a block diagram showing the internal control/data flow for the seed finder. The ENCODE, DECODE I and II, REVOLVE, DELTA, and SEED MODULES shown in FIG. 23 in conjunction with the MEMORY MODULE and the SWITCH MATRIX (not shown) are a part of the DPM system depicted in FIG. 1 and function together as a data compactor.

What has been disclosed is a data processing method for compacting a line signal which represents actual occurrence values out of a group of possible occurrence values, the possible and actual occurrence values being arranged in monotonical value order. An example of the line signal in the disclosed embodiment of the invention is an event occurrence vector which is stored in memory in hybrid coded form (see Table 9). However, it will be understood the line signal might be in other codes within the concepts of the invention under consideration.

The steps are as follows. Such a line signal is stored in a memory, such as the MEMORY MODULE, as the possible shortest line signal. In this connection, the SEED MODULE applies a signal to the MEMORY MODULE which stores an event occurrence vector (whose seed is to be found) and the SEED MODULE applies a signal to the SWITCH MATRIX causing the appropriate switches to be set identifying area 1 as the one containing the current shortest line signal (i.e., the seed).

The SEED MODULE responds to the values of the possible shortest line signal for forming at least one signal representative of a total number of lines to be revolved. Such an operation takes place during SB8 when the largest of the two different signals contained in registers T1 and TO is transferred to register T1. In this connection, register TO contains the difference between the values represented by the last two occurrence values at one end (i.e., the largest end) of the shortest line signal and register T1 contains the difference between the values represented by the maximum length (iso-entropicgram width) signal stored in register SMHW and the occurrence value at one end (i.e., largest occurrence value) of the possible shortest line signal.

The steps include the step of responding to the total number of lines to be revolved signal for forming one or more incremental revolve signals representative of the incremental number of lines by which a revolve is to be effected. In this connection, the DELTA MODULE breaks the total number of lines to be revolved into its component powers of 2 thereby specifying the actual increments by which the revolve is to be effected.

Continuing with the method is the step of revolving the input line, which involves the step of forming a resultant incremental line signal representing the value of the possible shortest line signal exclusive OR'd with the value of the possible shortest line signal shifted by the number of occurrence values specified by one of the incremental revolve signals. This step is accomplished by the REVOLVE MODULE during the revolve portion of the operation disclosed in connection with SB12 of the SEED MODULE flow. The step of revolving further includes the step of enabling the resultant incremental line signal to be used in the preceeding step for exclusive ORing, using another one of the incremental revolve signals. In this connection, after each exclusive OR, the result is stored into the MEMORY MODULE and the DELTA MODULE provides the next component power of 2 signal which is then used for exclusive ORing the result formed by the REVOLVE MODULE. This operation is repeated until all of the incremental powers of 2 have been used in the revolve process by the REVOLVE MODULE. Further included in the step of revolving is the step of storing the final incremental line signal, after all of the incremental revolve signals have been used. In this connection, the final line signal stored in the MEMORY MODULE during the revolve process is identified by the OAR and the SWITCH MATRIX. The length of the stored possible shortest line signal (contained in register SLN) and the length of the new incremental line signal contained in register MLN3 of the ENCODE MODULE are compared and the ALU of the SEED MODULE forms a signal indicating the shortest one during SB13 of the SEED MODULE flow. Subsequently, the preceeding steps are repeated utilizing the line signal which is indicated to be the shortest one. In this connection, note that following SB13, SB14 and SB15 may then be entered following which SB2 is reentered where the repeat operation takes place.

Preferably, the steps also include that of combining values represented by a series of the total number of lines to be revolved signal to thereby form a further signal representing a line number value for the stored possible shortest line signal. This is accomplished using the ALU and registers SML1 and T1 of the SEED MODULE during SB9.

Preferably, the step of forming a resultant incremental line signal involves the step of combining the values represented by the possible shortest line signal in one of the incremental revolve signals to form a corresponding shifted signal. In this connection, the absolute occurrence values provided by the DECODE II MODULE are combined with the incremental power of 2 values from the DELTA MODULE to form a shifted value by the REVOLVE MODULE. The step of forming a resultant incremental line signal further comprises the step of exclusively ORing the values represented by the shifted and unshifted possible shortest line signals to form the resultant incremental line signal.

In terms of apparatus, there has also been disclosed a data compactor for an input line signal (i.e., event occurrence vector) which represents actual occurrence values out of a group of possible occurrence values. The possible and actual occurrence values are arranged in an incremental, preferably decreasing, value order. Included is memory means such as the MEMORY MODULE for storing the input line signal. Decoding means such as the DECODE I and II MODULES convert a line signal stored in the memory means including the stored input line signal from a first compact code (i.e., hybrid code) to a second expanded code (i.e., absolute code). Means including the SEED and DELTA MODULES are responsive to a converted line signal from the decoding means for forming one of a selected number of value signals. The number of value signals correspond to such signals as the component power of 2 signals provided from DELO in the DELTA MODULE. Means such as the REVOLVER is responsive to one of the number value signals and the corresponding converted line signal from the decoding means for further converting the converted line signal, as a function of the number value signal, to a modified but equivalent line signal. This process is effected in the REVOLVER through the exclusive ORing process. Encoding means, such as the ENCODE MODULE, converts the equivalent line signal from the second to the first code for storage in the memory means. Included is means such as the OAR, the ALU and SLN and MLN3 (ENCODE MODULE) for selecting one of the equivalent sets of signals. During SB13 the shortest one, in hybrid code, is selected. The ALU of the SEED MODULE in combination with the MLN3 register of the ENCODE MODULE and the SLN register of the SEED MODULE are operative during SB13 for forming a signal indicating the shorter of the original stored line signal and the equivalent line signal. The control counter of the SEED MODULE is operative following SB14 to enable the foregoing means such as the DECODE I and II, SEED, DELTA, and ENCODE MODULES and the REVOLVER to repeat their operation. However, means is responsive to the shorter indication signal for enabling the decoding means to decode the shorter one of the stored original line signal and the equivalent line signal during the repeat. In this connection, either SB14 is entered directly or SB15 is entered followed by SB14 depending on the result of the comparison by the ALU during SB13. During SB15 the memory area number in the OAR register is changed if necessary to identify the MEMORY MODULE area containing the possible shortest seed line before entering SB14 where the DECODE I and II MODULES are called to decode the possible shortest line signal. It will also be noted in connection with the SWITCH MATRIX that the flip flops of the SWITCH MATRIX are appropriately set to identify the MEMORY MODULE area containing the possible shortest seed line.

Preferably, the decoding means involves a first decoding means and a second decoding means (such as DECODE I and II MODUES) to enable the actual occurrence values of a line signal to be provided to the REVOLVER at different rates upon demand. It will be noted that the repeat operation enabled by the control counter of the SEED MODULE going from SB14 back to SB2, et seq, will be repeated until the original input line has been revolved completely through its iso-entropicgram, thereby insuring that the shortest equivalent new line signal (seed) has been formed. Means is provided for disabling the repeat enabling means after the shortest of the equivalent new line signals has been formed. To this end, the value of the current number of lines revolved relative to the input line is stored in register $SD^n$ and is compared with the iso-entropicgram width value contained in register SMHW by the ALU of the SEED MODULE, during SB10. If the current number of lines revolved relative to the input line contained in register SDN is the greater, then SB16 et seq. is entered where the operation of the SEED MODULE is subsequently exited.

It will also be noted that the DECODE I and II and MEMORY MODULES form a means for storing and retrieving the input line signal which is to be compacted.

It should also be noted that means is provided for combining the value of the successive number of lines to be revolved signal in such a way as to form a line number for the shortest line. This function is provided by means such as the ALU, the SMUL1, T1, and SMHW registers and the ALU during SB 7 and SB17 of the SEED MODULE flow.

X. CHANGE MODULE

A. General Description

Section I. GENERAL DESCRIPTION describes a method whereby changes may be made in an occurrence vector. These changes include insertions, deletions and the addition of new information. A deletion removes an occurrence value from an event occurrence vector. An insertion adds an occurrence value to an event occurrence vector. An addition of new information may be the addition of new occurrence values to an existing event occurrence vector or the addition of new event occurrence vectors.

According to a preferred embodiment of the invention changes may be made to an event occurrence vector at any line number of its iso-entropicgram. Preferably, the change is applied to the seed line and the resultant changed line is then revolved until the new seed is found.

Describing the change operation in more detail, a seed which is to be changed is defined in terms of a line number, a line value, and a length of line value. The change vector is composed at the input line for its iso-entropicgram (line 0) and includes an occurrence value for each insertion, for each deletion, anf for each new addition that is to be made in the seed.

Generally, the method followed is as follows:

1. rotate the change vector in its iso-entropicgram down to the line number corresponding to that of the seed which is to be changed. This will provide a revolved change vector having a line number the same as that of the seed, a change value and a length the same as that of the seed;

2. merge the occurrence values of the line values in the seed and change vector by exclusive ORing the two together.

More specifically, the operation involved is as follows. The line value of the change vector, in hybrid code, is placed in MEMORY MODULE area 1. The line value of the seed is placed in MEMORY MODULE area 2. The change vector is revolved down to the same line of the iso-entropicgram as that of the seed. At this point, the change vector is defined in terms of the line number of the seed, the line value for the change vector and the length of seed. The merge operation involves XORing the line value of the seed and the line value of the changed vector resulting in a changed line value. The changed seed is then defined in terms of the line number for the original seed, a changed line value and the length of the seed. The changed seeds is then revolved down to its seed.

Figure 24:
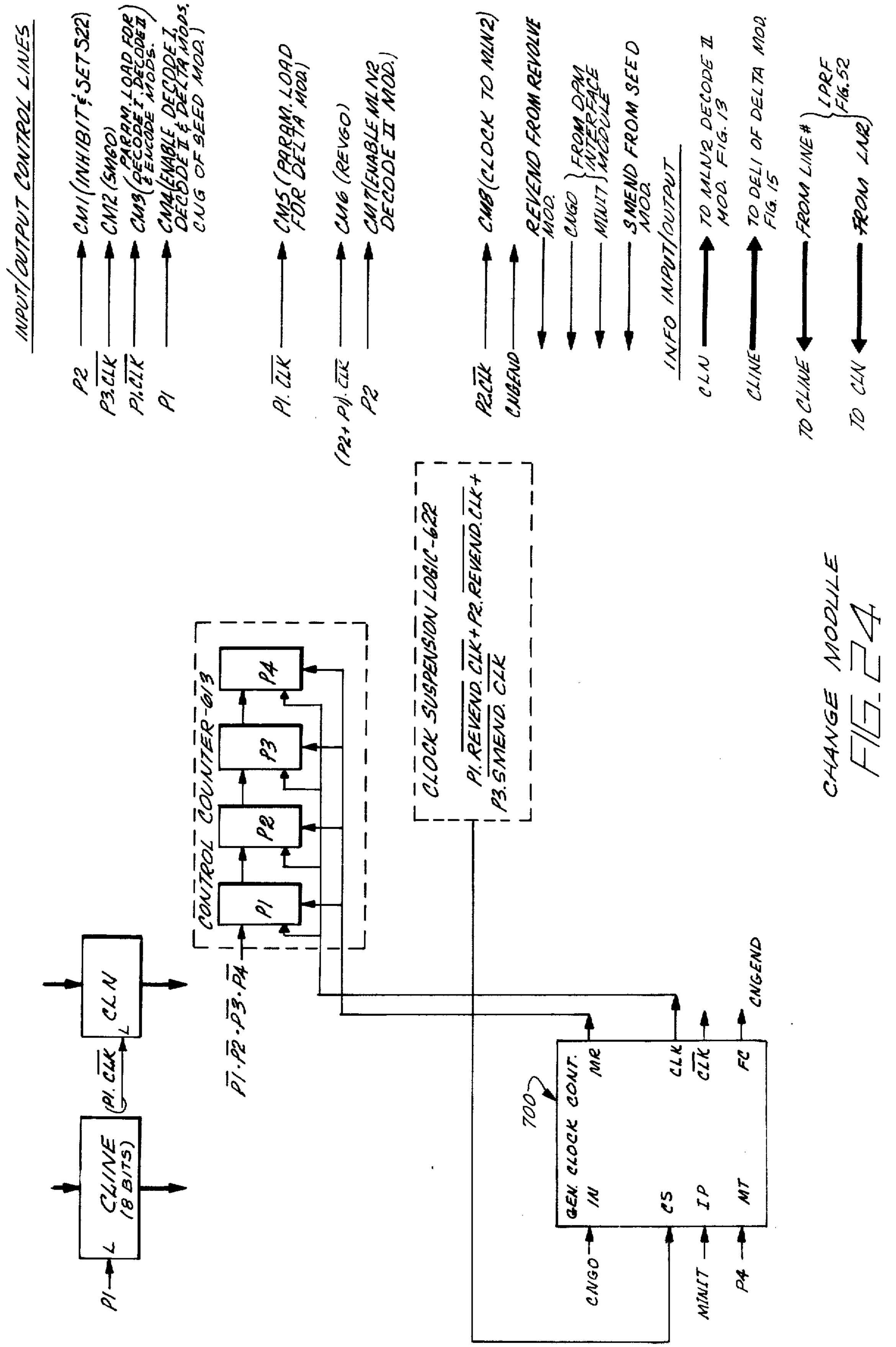
FIG. 24 is a schematic and block diagram of the CHANGE MODULE.
Figure 26:
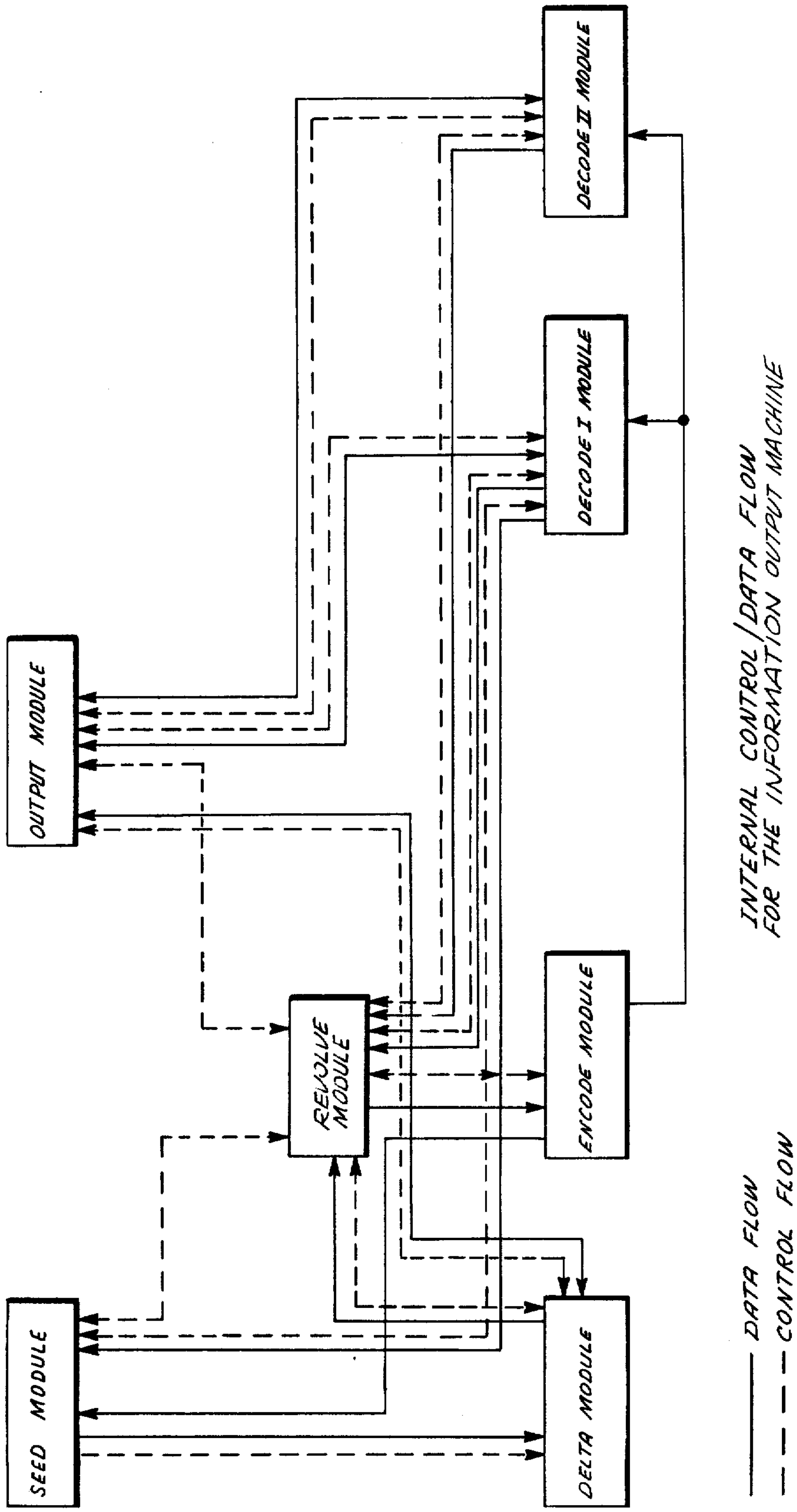
FIG. 26 is a block diagram of a seed line changer employing the CHANGE MODULE.

FIG. 24 is a schematic and block diagram of the CHANGE MODULE which enables the above operation. FIG. 26 is the internal control/data flow for the seed line changer, which is a portion of the overall DPM system. It will be seen from this figure that the CHANGE MODULE makes use of the ENCODE, DECODE I, DECODE II, DELTA, REVOLVE, and SEED MODULES as well as the MEMORY MODULE, the SWITCH MATRIX and IPRF in its operation.

B. Components

The CHANGE MODULE, FIG. 24 has two 8 bit eight flip flop registers CLINE and CLN. Both of these registers are of type SN7400 disclosed in the above *TTL* blook, having the same characteristics as those described above.

In addition, the CHANGE MODULE has a control counter 613 with flip flops P1–P4. Flip flops P1–P4 are the same type disclosed in Section I. GENERAL DESCRIPTION, F. Components.

The CHANGE MODULE has a generalized clock control circuit 700. The generalized clock control circuit 700 is described in more detail in the subsequent section entitled "Generalized Clock Control Circuit".

The CHANGE MODULE also has clock suspension logic 622 connected to the CS input of the clock control circuit 700.

As described with respect to the ENCODE MODULE, logical equations are used to indicate gating required to control various circuits and to generate various signals, all indicated in the CHANGE MODULE.

Depicted along the right hand side of the CHANGE MODULE FIG. 24 are input and output control lines and information inputs and outputs. The information inputs and outputs are depicteed by heavy lines.

C. Detailed Description

Figure 25:
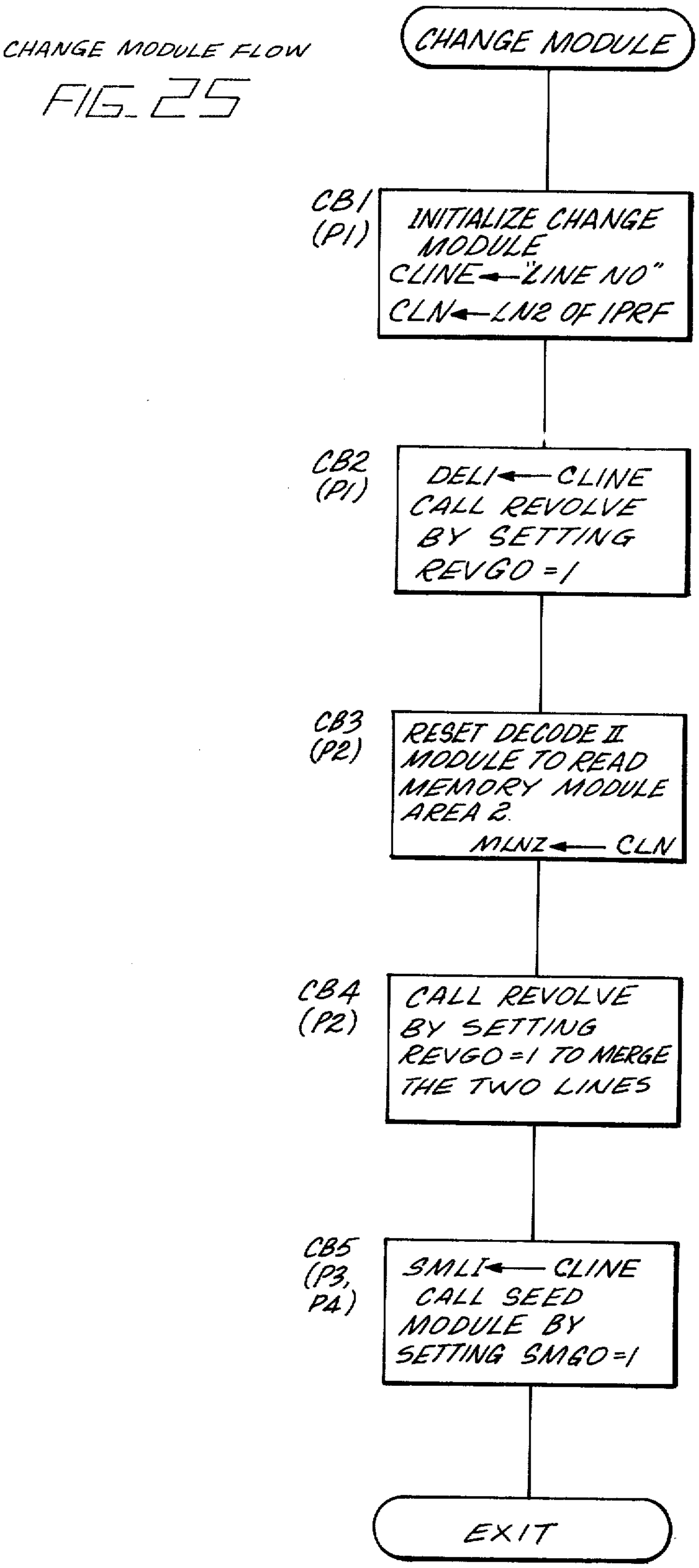
FIG. 25 is a flow diagram illustrating the sequence of operation of the CHANGE MODULE.

Reference should be made in the following discussion to the CHANGE MODULE schematic of FIG. 24 and the CHANGE MODULE flow diagram of FIG. 25. The following discussion will describe the CHANGE MODULE using an example of a specific seed line and change line in order to provide a better understanding of the system. The specific example is that given hereinabove in I. GENERAL DESCRIPTION with respect to Tables 9-A and 9-B.

As noted, the CHANGE MODULE when combined with the ENCODE, DECODE I, DECODE II, DELTA, SEED and MEMORY MODULES, the SWITCH MATRIX and IPRF, forms a seed line changer. The seed line changer sub-system of the DPM is depicted in the general block diagram of FIG. 26 (the MEMORY MODULE, SWITCH MATRIX and IPRF are not shown).

Initially, the MINI COMPUTER forms a true signal at the output MINIT, thereby applying a true signal to the IP input of the clock control 700. The true signal at the input IP causes a true signal at the MR output which resets flip flops P1–P4 of the control counter 613 to 0 without a clock pulse. The MEMORY MODULE areas 1 and 2 and LINE # and LN1 and LN2 of the IPRF initially are loaded by the MINI COMPUTER with the inputs illustrated in Table 11. Thus, the values for the examples of Tables 9-A and 9-B which are now stored are as follows:

| | |
|---|---|
| MEMORY MODULE area 1 | 3 6 8 9 11 12 |
| MEMORY MODULE area 2 | 0 6 12 |
| LINE # | 6 |
| LN2 | 8 |
| LN1 | 7 |

The MINI COMPUTER then forms a true signal at the CNGO output causing the clock control 700 to start forming its clock pulses at the CLK and $\overline{CLK}$ output.

At the first true pulse at the CLK output, the logic $\overline{P1}.\overline{P2}.\overline{P3}.\overline{P4}$ is true and the flip flop P1 is set to a 1 state, thereby forming a true signal at the P1 output. The true signal at the P1 output causes the CLINE register to couple the line number of the seed from LINE # of the IPRF to the output of the CLINE register.

The true signal at the P1 output also causes a true signal at the CM4 output of the CHANGE MODULE which in turn goes to the DECODE I, DECODE 11, SEED and DELTA MODULES, and the SWITCH MATRIX. The true signal at CM4 causes the CNG flip flop in the SEED MODULE to be set to a 1 state where gates 218 and 226 couple the length of line value for the change vector from LN1 of IPRF to the registers MLN1 and MLN2 in the DECODE I and DECODE II MODULES; causes the selection circuit DELS to couple the line number of the seed from the output of the CLINE register of the CHANGE MODULE to the input of register 302 in DELI of the DELTA MODULE; and causes flip flops S31 and S23 in the SWITCH MATRIX to be set to 1 states. The 1 states of flip flops S31 and S23 cause the DECODE I and DECODE II MODULES to read from MEMORY MODULE area 1 and the ENCODE MODULE to write into MEMORY MODULE area 3. To be explained, when the true signal at P1 terminates, the CLINE register stores the line number from LINE # of the IPRF.

Subsequently, a true signal is formed at the $\overline{CLK}$ output of the clock control 602, thereby causing the logic P1.$\overline{CLK}$ to be true, thereby forming true signals at the CM3, CM5 and CM6 outputs. The true signal at the CM3 output causes the length of line value from LN1 of IPRF to be stored into the MLN1 and MLN2 registers of the DECODE I and II MODULES; causes the length of seed line from LN2 of IPRF to be stored into the CLN register in the CHANGE MODULE; and causes the line number from the output of the CLINE register of the CHANGE MODULE to be stored into the register 302 of DELI in the DELTA MODULE; and causes the one-shot REVGO in the REVOLVE MODULE to be set, thereby calling the operation of the REVOLVE MODULE.

In addition, a true signal is now formed by the logic P1.$\overline{REVEND}$.$\overline{CLK}$ in the clock suspension logic 622, thereby causing a true signal at the CS input of the clock control 700. The true signal at input CS causes the clock control 700 to suspend the clock pulses at CLK and $\overline{CLK}$, thereby suspending operation in the CHANGE MODULE until the operation of the REVOLVE MODULE is complete and removes the true signal at REVEND so indicating.

Using the example shown in Tables 9-A, 9-B, the following conditions now exist:

1. register MLN1 (DECODE I) contains the length of the line value for the change vector (MLN1 = 7);
2. register MLN2 (DECODE II) contains the length of the line value for the change vector (MLN2 = 7);
3. register DELI (DELTA) contains the line number of the seed line value (DELI = 6);
4. CNG flip flop (SEED) is in a 1 state;
5. flip flops S31 and S23 (SWITCH MATRIX) are in a 1 state;
6. MEMORY MODULE area 1 contains the change line value signals (MEMORY MODULE area 1 = 1,3,6,8,9,11,12);
7. MEMORY MODULE area 2 contains the seed line value signal (MEMORY MODULE area 2 = 0,6,12);
8. register CLINE (CHANGE) contains the line number of the seed line value (CLINE = 6);
9. register CLN (CHANGE) contains the length of the line value of the seed (CLN = 2);
10. REVOLVE MODULE has been called.

Following its call, the REVOLVE MODULE forms a true signal at the RM8 output, thereby indicating that the SWITCH MATRIX has been clocked. Since flip flops S31 and S23 of the SWITCH MATRIX had been set previously, this results in the setting S11, S21 and S33 of the SWITCH MATRIX. Thus, the DECODE I and II MODULES will read from MEMORY MODULE area 1 and the ENCODE MODULE will write to MEMORY MODULE area 3. The true signal at the RM8 output of the REVOLVE MODULE sets the flip flops S11, S12 and S33 in the SWITCH MATRIX to a 1 state. Additionally, the input SM5 to the REVOLVE MODULE is false, indicating that the current line value in MEMORY MODULE area 1 is not to be kept as a possible seed. The signal at RM12 output of the REVOLVE MODULE causes the SP flip flop in the SWITCH MATRIX to be reset to 0. Therefore, the first pass of the REVOLVE MODULE causes the change vector to be revolved down four lines to line 4 of its iso-entropicgram and the revolved line value of the change vector is now stored in MEMORY MODULE area 3 as specified by the 1 state of flip flop S33. Thus, the revolved line value stored in MEMORY MODULE area 3 now contains the absolute values 1, 2, 5, 7, 9, 11, 12, 15 and the line value 4 is stored.

At this point, the register MLN3 of the ENCODE MODULE contains the length value for the revolved change line value now stored in MEMORY MODULE area 3 (i.e., a length of 8). The REVOLVE MODULE then forms true signals at the RM14 and RM10 outputs, thereby causing the length value contained in MLN3 of the ENCODE MODULE to be enabled to the input of the registers MLN1 and MLN2 of the DECODE I and II MODULES and stored.

The REVOLVE MODULE then embarks on a second pass through its flow. At this point in time, flip flops S33 and S21 in the SWITCH MATRIX are in a 1 state; therefore, when the REVOLVE MODULE forms a true signal at its RM8 output it causes the flip flops S13, S23 and S31 in the SWITCH MATRIX to be set to a 1 state. The 1 states of these flip flops cause the DECODE I and II MODULES to both read the revolved change line value contained at MEMORY MODULE area 3 and cause the ENCODE MODULE to write the resultant revolved line value into MEMORY MODULE area 1.

It should be carefully noted at this juncture that although reading and writing is taking place in MEMORY MODULE areas 3 and 1, MEMORY MODULE area 2 contains the original seed line value and it remains there unaltered at this point.

A true signal is subsequently formed at the RM12 output of the REVOLVE MODULE which causes the SP flip flop in the SWITCH MATRIX to be reset to an 0 state. The REVOLVE MODULE then revolves the revolved change line value (i.e., 1, , 5, 7, 9, 11, 12, 15) down two lines from iso-entropicgram line 4 to 6, and the ENCODE MODULE writes the new revolved change line value in MEMORY MODULE area 1. Thus at this point in time (conclusion of this second pass of the REVOLVE MODULE), MEMORY MODULE area 1 contains the revolved change line value 1, 6, 12 (see *h.* of Table 9A). Additionally, the length value of the new revolved change line value is contained in register MLN3 of the ENCODE MODULE. Subsequently, the REVOLVE MODULE forms a true signal at the RM14 and RM10 outputs, causing the value to be stored from register MLN3 into register MLN1 and MLN2 of the DECODE I and II MODULES.

The DELTA MODULE has now provided all of the component powers of 2 of the total number of lines to be revolved for the change line and therefore the REVOLVE MODULE terminates its operation and forms a false signal at its $\overline{REVEND}$ output. This causes logic P1.$\overline{REVEND}$ in clock suspension logic 622 to become false which causes the clock control 700 to again form pulses at CLK and $\overline{CLK}$.

The next true signal at the CLK output resets the P9 flip flop to a 0 state and sets the P2 flip flop to a 1 state in the control counter 613, thereby forming a true signal at the P2 output.

The true signal at output P2 causes a true signal at the CM2 output of the CHANGE MODULE which causes the length (2) of the seed line value in the CLN to be coupled to the input of MLN2 of the DECODE II MODULE.

The true signal at P2 also causes a true signal at the CM1 output of the SWITCH MATRIX thereby inhibiting any input to the S21, S22 or S23 flip flops.

When the pulse is formed at the $\overline{CLK}$ output, the logic P2.$\overline{CLK}$ becomes true, which in turn causes a true signal at the CM6 and CM8 outputs of the CHANGE MODULE.

The true signal at the CM8 output causes the MLN2 register in the DECODE II MODULE to be loaded with the content of the CLN register. Thus the length 2 of the seed line value (in MEMORY MODULE area 2) is stored in the MLN2 register of the DECODE II MODULE.

The true signal at CM6 causes the clock control 700 to suspend the clock in the CHANGE MODULE. It also causes the REVGO mono-stable to be fired in the REVOLVE MODULE thereby initiating the revolve process.

Note that nothing was loaded into DELI of the DELTA MODULE. This will cause the REVOLVE MODULE to merge or XOR the seed line value and the change line value.

The REVOLVE MODULE forms a true signal at the RM8 output causing S11 and S33 flip flops in the SWITCH MATRIX to be set to 1. Also the RM12.CM1 logic becomes true, causing the S22 flip flop in the SWITCH MATRIX to be set. This indicates that the DECODE I MODULE will be reading from MEMORY MODULE are 1, the DECODE II MODULE will be reading from MEMORY MODULE area 2, and the ENCODE MODULE will be writing to MEMORY MODULE area 3.

Upon completion of the merge operation, the REVOLVE MODULE forms a false signal at the $\overline{\text{REVEND}}$ output which causes the logic P2.$\overline{\text{REVEND}}$.$\overline{\text{CLK}}$ to go false which, in turn, causes the clock control 700 to again form pulses at the CLK and $\overline{\text{CLK}}$ outputs.

The next true signal at the CLK output resets the P2 flip flop to a 0 state and sets the P3 flip flop to a 1 state in the control counter 613, thereby forming a true signal at the P3 output.

When the pulse is formed at the $\overline{\text{CLK}}$ output, the logic P3.$\overline{\text{CLK}}$ becomes true, which in turn forms a true signal at the CM2 output of the CHANGE MODULE. The true signal at the CM2 output sets the SMGO one-shot in the SEED MODULE to a 1 state, thereby calling the operation of the SEED MODULE. The SEED MODULE then commences its operation of locating the seed in the manner described hereinabove with respect to the SEED MODULE.

To this end, the SEED MODULE causes the new seed line value contained in MEMORY MODULE area 3 to be revolved through its iso-entropicgram and locate the seed which, in the case of the disclosed embodiment, is the line from the ENCODE MODULE which has the fewest number of words. The SEED MODULE causes the line value of the seed value to be saved in the MEMORY MODULE in the area specified by OAR of the SEED MODULE. At the time the true signal is formed at the CM2 output, the logic P3.$\overline{\text{SMEND}}$.$\overline{\text{CLK}}$ becomes true, thereby forming a true signal at the CS input to the clock control 700 which again causes the clock control 700 to terminate its pulses at the CLK and $\overline{\text{CLK}}$ outputs and suspend the operation of the CHANGE MODULE.

When the SEED MODULE has completed its seed finding operation, its register OAR identifies the MEMORY MODULE area containing the line value of the new seed; its register SLN contains the length of such line value; its register SLINE contains the line number value of a such line value. and its reigster ONOC contains the number of occurrences in such line value. When the SPEED MODULE completes its operation, a true signal is formed at the SMEND output from the SEED MODULE, which in turn causes a false signal at the $\overline{\text{SMEND}}$ output. This causes logic P3.$\overline{\text{SMEND}}$.$\overline{\text{CLK}}$ to go false and causes the clock control 700 to start forming its pulses at CLK and $\overline{\text{CLK}}$.

The following pulse at CLK resets the P3 flip flop to a 0 state and sets the P4 flip flop to a 1 state in control counter 613.

The true signal at the P4 output causes a true signal at the MT input of the clock control 700 which, as discussed above, sets a one-shot in the generalized clock control 700 which in turn causes true signals to be formed at the MR and FC outputs. The true signals at the MR output of the clock control 700 cause all of the flip flops including T4 of control counter 613 to be reset to 0. The true signal at output FC causes the CNGEND output of the CHANGE MODULE to turn true and signals the calling module that the operation of the CHANGE MODULE is complete.

D. Example of Operation

An example of the operation of the CHANGE MODULE in the seed line changer will now be given in symbolic notation using the example depicted in Tables 9A and 9B. The corresponding blocks in the flow diagram are shown along the left hand side.

The following is expected as input:

| | | |
|---|---|---|
| CLINE = 6 | | Line number of the seed line value; |
| HW = 8 | | Iso-entropicgram width; |
| LN1 = 7 | | Length of line value for the change vector; |
| LN2 | | Length of the line value for the seed; |
| DELI = 6 | | Line number of the line value for the seed; |
| Change line value | | In MEMORY MODULE area 1; 1,3,6,8,9,11,12 where 6,12 re deletions; the remainder insertions; |
| Seed line value | | In MEMORY MODULE area 2; 0,6,12; |
| Sequence of control is CB1 - CB5; | | |
| CB1 | initialize | clock proper information into the proper registers; |
| | CLINE = LINE # =6 | seed line number; |
| | CLN = LN2 | length of seed line value; |
| CB2 | DELI (6) = CLINE (6) | number of lines to revolve to DELTA MODULE: |
| call REVOLVE MODULE | | revolve the change vector down to same line number as the seed line; |
| CB3 | MLN2 ← CLN | load the length register with the length of the line value of the seed; set DECODE II MODULE to read from MEMORY MODULE area 2; |
| reset DECODE II MODULE | | |
| CB4 | call REVOLVE MODULE | the change line value and the seed line value or XOR'd with the results as shown in h of Table 9-A; |
| CB5 | SMLI = CLINE | line number value clocked to SMLI |
| | CNG = 1 | of the SEED MODULE, CNG flip flop set |
| call SEED MODULE | | the new seed is located; |
| HALT | | |
| output | taken from the SEED MODULE | |
| | SLINE = 5 (seed line number) | |
| | OAR = MEMORY MODULE area which contains the seed | |
| | SLN = 1 (seed line value length) | |

-continued

| |
|---|
| ONOC = 1 (number of occurrences in seed line value) |

XI. SEED LINE CHANGER

From the foregoing description of the CHANGE MODULE it will be understood that the ENCODE, DECODE I and II, REVOLVE, DELTA and SPEED MODULES depicted in FIG. 26 in association with the MEMORY MODULE and the SWITCH MATRIX (not shown) form a Seed Line Changer which allows a seed to be changed without revolving it back to the zero or input line of the corresponding iso-entropicgram. The seed line changer forms an electronic data processing system for changing an occurrence value signal, such as a seed, utilizing a change value signal such as a change vector. The aforementioned occurrence and change value signals each represent an actual occurrence value out of a group of possible occurrence values, the possible and actual occurrence values being arranged in monotonical, preferably decreasing value order, as depicted in Tables 1 and 2. Means such as the MEMORY MODULE area 1 is provided for storing the occurrence value signal which is to be changed. Means such as the CLINE register of the CHANGE MODULE is provided for storing a line number signal in association with the stored occurrence value signal. The line number signal stored in register CLINE specifies the number of the line of the line value of the seed. Means such as the MEMORY MODULE area 2 stores the change occurrence signal (i.e., the change vector) which specifies the changes in the values of the stored occurrence value signal. Means such as the REVOLVER depicted in FIG. 19 forms a means for responding to the change occurrence value signal for selectively forming, for each different change value signal, any one of a set of equivalent signals, the set including such occurrence value signal. Each equivalent signal within each set is unique and is related to another one by an exclusive OR of the values thereof and the values thereof relatively shifted. Included in the foregoing means is means for forming any one of the equivalent signals in a set as specified by a received number of lines signal. Means such as the SEED and DELTA MODULES respond to the stored line number signal for applying a number of lines signal to the equivalent signal forming means. It will be recalled in connection with the DELTA MODULE that the DELTA MODULE forms a number of lines signal in the form of component powers of 2 of the total number of lines to be revolved.

Further included is means such as the REVOLVER for exclusive ORing the values represented by an equivalent signal and the occurrence value signal to thereby form the changed occurrence value signal.

XII. GENERALIZED CLOCK CONTROL

Figure 27:
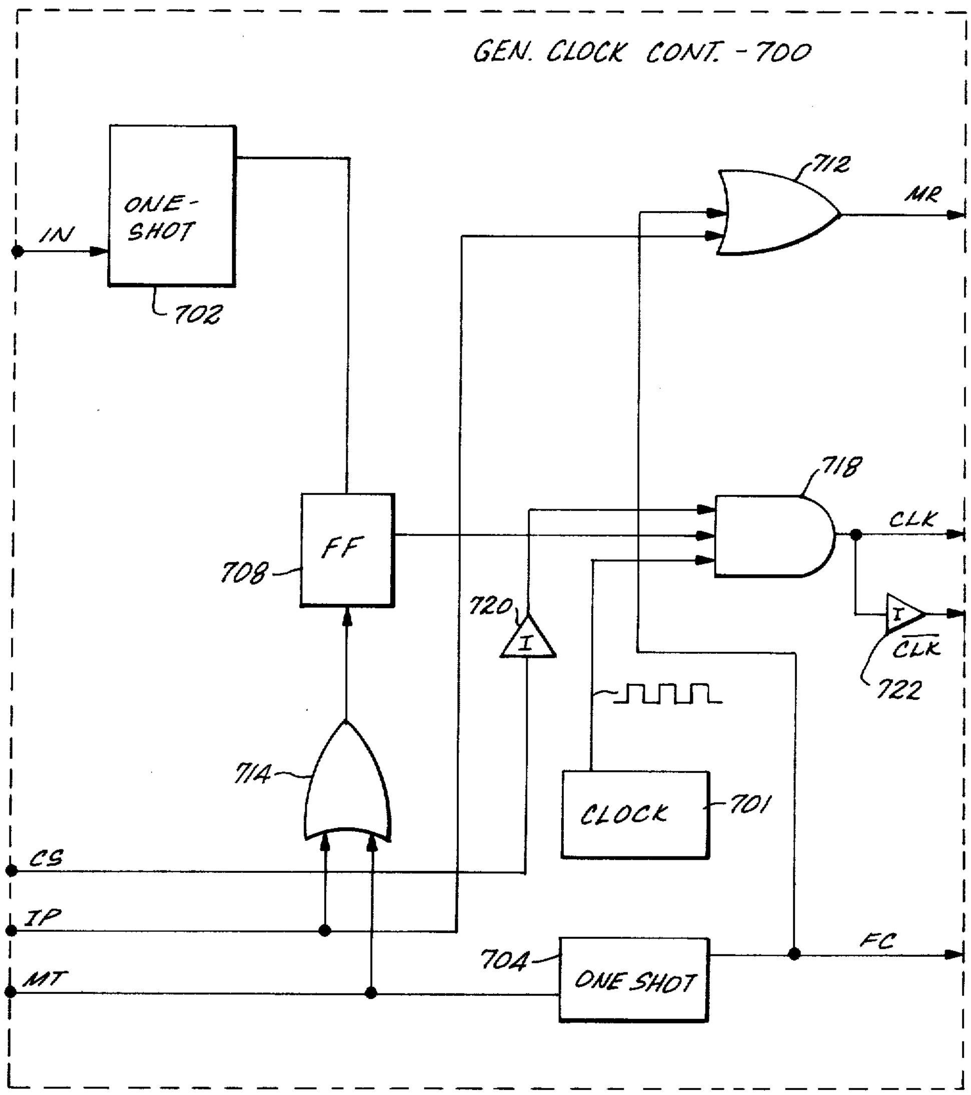
FIG. 27 is a schematic and block diagram of a generalized clock control unit for use in designated modules.
Figure 28:
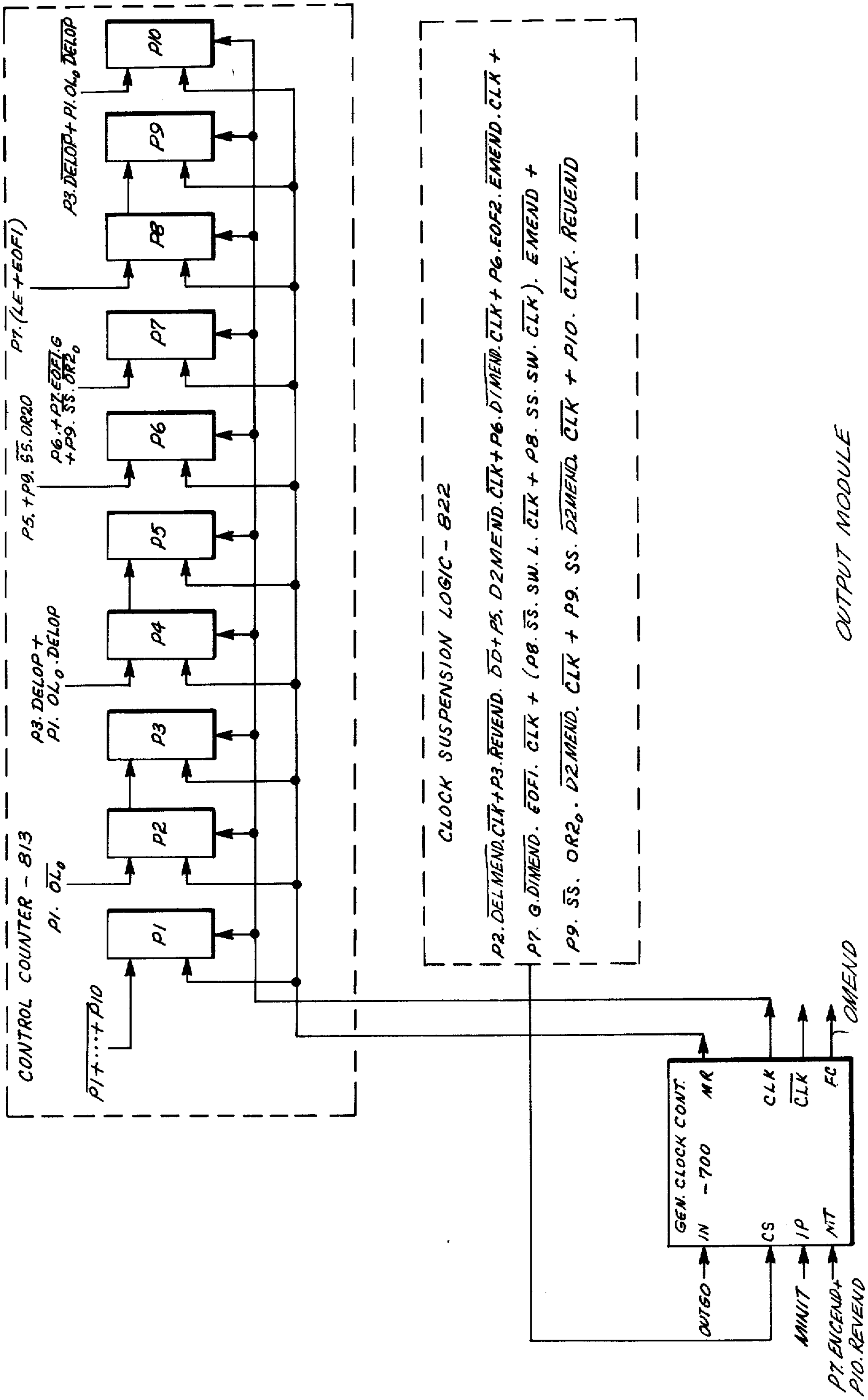
FIGS. 28, 29, 30 and 31 form a schematic and block diagram of the OUTPUT MODULE.
Figure 29:
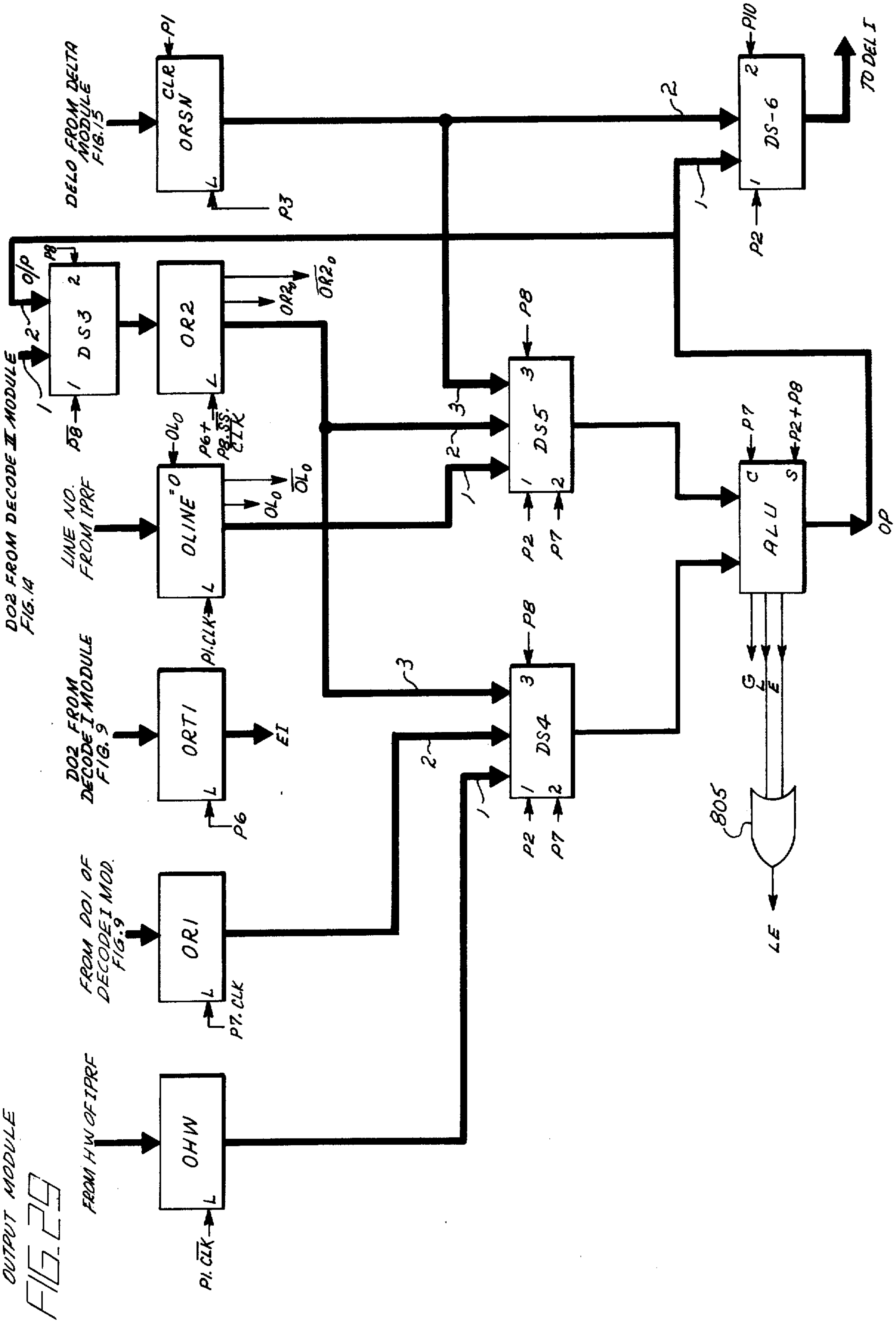

Individualized clock control circuits have been disclosed for the previously described ENCODE, DECODE I, DECODE II, REVOLVE, DELTA and SEED MODULES. However, it should be noted that a generalized clock control circuit may be employed. Therefore, with respect to the CHANGE MODULE just described and other modules subsequently to be disclosed in connection with the DPM SYSTEM, a generalized clock control 700 shown in FIG. 27 will be used.

Specifically, the generalized clock control circuit 700 includes one-shot multi-vibrators 702 and 704, a flip flop 708, OR gates 712 and 714, an AND gate 718 and logical signal inverters 720 and 722, all of the same types disclosed for the ENCODE MODULE. A source of regular recurring clock pulses 701 provides clock pulses to one input of the AND gate 718. The clock control 700 has input circuits IN, CS, IP and MT and has outputs MR, CLK, $\overline{CLK}$, and FC. Modules subsequently to be disclosed only disclose the clock control 700 in block form with the prior mentioned input and output circuits.

The one-shots 702 and 701 are of the same type disclosed for the ENCODE MODULE and, responsive to a true signal at the input at the left side, are triggered to a 1 state where a true signal is formed at the output indicated on the right hand side. The one-shot remains in a 1 state for a time interval equal to that between the beginning of two successive clock pulses from the source of clock signals 701 and then automatically resets to a 0 state where a false signal is formed at the corresponding output.

The flip flop 708 is a conventional flip flop of the same type disclosed hereinabove with respect to the ENCODE MODULE. The one-shot 702 has its input connected to the IN input and the IN input is the one which receives a true signal whenever the corresponding module is called. A true signal at the IN input triggers the one-shot to its 1 state, causing its output to go from a false to a true signal. The OR gate 712 also has inputs connected to the output of one-shot 704 and to the IP input. The IP input is the one which receives a true signal whenever it is desired to reset the control counter in the corresponding module. Additionally, the one-shot 704 has its input connected to the MT input of the clock control 700. The MT input receives true signals whenever the corresponding module has completed its function. Thus, a true signal at the MT input causes the one-shot 704 to be set to a 1 state which, in turn, applies a true signal at the FC output, thereby indicating that the function of the corresponding module is complete. The true signal at FC is also applied to the OR gate 712. Wenever any of the inputs to the OR gate 712 receives a true signal, a true signal is formed at the MR output. The MR output is connected to the control counter in the corresponding module and resets each of its flip flops to a 0 state when a true signal is applied.

The AND gate 718 is connected to the CLK output and is connected through the logical signal inverter 722 to the $\overline{CLK}$ output of the clock control 700. The gate 718 is an AND gate which has one input connected through the logical signal inverter 720 to the CS input, a second input to the unbored output of the flip flop 708, and a third input connected to the clock 701. The CS input is the one which receives true signals from the clock suspension logic of the corresponding module. The flip flip 708 is set to a 1 state which, in turn, applies a true signal to the gate 718 whenever a true signal is formed either at the control counter reset circuit IP or the end of function input MT. As a result, the AND gate 718 causes true clock pulses to be formed at the CLK and $\overline{CLK}$ outputs whenever the CS input is false (due to a false condition for the corresponding clock suspension logic) and the flip flop 708 has been set to a 1 state and a pulse occurs from the clock 701. The logical signal inverter 722 inverts the clock signals at CLK, forming the complement thereof at the CLK output.

XXIII. OUTPUT MODULE

A. General Description

Figure 34:
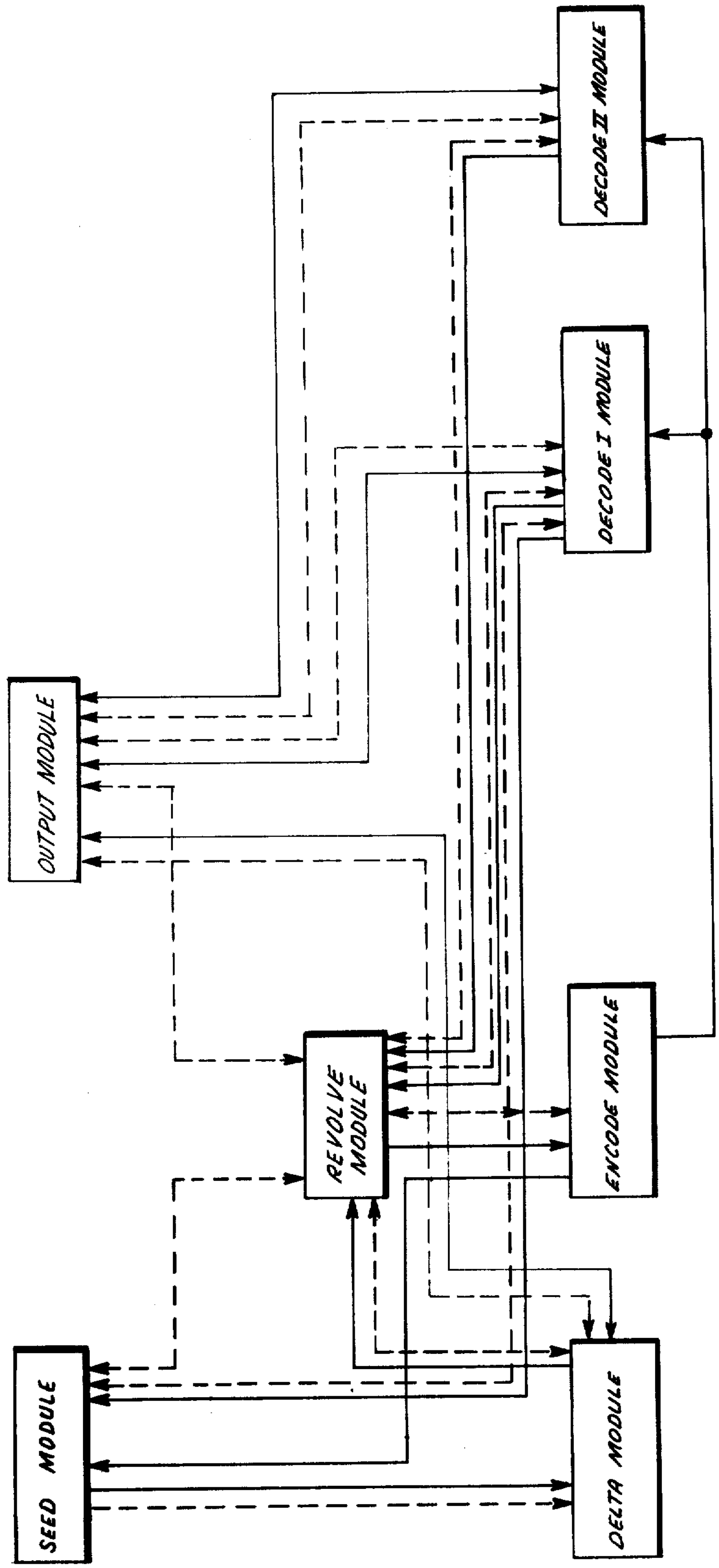
FIG. 34 is a block diagram of the compaction and retrieval machine employing the OUTPUT MODULE.

The OUTPUT MODULE operates in conjunction with other portions of the DPM SYSTEM generally depicted in FIG. 34 for performing two functions. The first is to cause a simple retrieval or decompaction type of operation wherein an event occurrence vector which is represented by one of the non-input lines (usually the seed) is revolved back to the input line of its iso-entropicgram. The second is called the DEL function and causes a check to determine if an event occurrence vector which is represented by a non-input line (usually a seed) contains particular actual occurrence values back at the input line of its iso-entropicgram. Significantly, the second function is done without revolving the non-input line clear back to the input line of its iso-entropicgram.

Briefly, the operation of the OUTPUT MODULE in carrying out the retrieval or decompaction function is as follows: an event occurrence vector, at one of the non-input lines of its iso-entropicram (usually the seed), is represeted by a line value signal and a line number signal. The OUTPUT MODULE determines the difference between the value of the line number signal and the width of the iso-entropicgram. The difference thus identifies the number of lines required to revolve the line value signal back to the input line of its iso-entropicgram. The difference is then provided to the DELTA MODULE which forms signals representing its component powers of 2 beginning with the largest (as discussed above). The REVOLVE MODULE then causes the line value signal to be revolved in its iso-entropicram by the specified number of lines back to the input line of the iso-entropicgram.

Consider now the operation for the DEL function. A reference line (in hybrid coded form) is stored in the MEMORY MODULE and represents one or more test values. Each test value identifies an actual occurrence value whose presence is to be checked in a line of an iso-entropicgram. However, the given line to which the test is to be applied is one of the non-input lines of its iso-entropicgram (usually the seed). Also the presence of an occurrence value is desired at the input line, not at the non-input line. The DEL function allows the presence of an occurrence value, at the input line, to be determined without revolving a given line (usually the seed) clear black from its non-input line to its input line.

The given line (usually a seed) is represented at its non-input line by a line value signal and a line number signal. The OUTPUT MODULE utilizes the same hardward and method described for the regular output and finds the difference between the values of the line number signal and the width of the iso-entropicgram. The DELTA MODULE then determines the integral powers of 2 of the difference beginning with the largest. The largest integral power of 2 is saved and the line value signal is revolved by the number of lines specified by the remaining integral power (or power) of 2 to form a revolved line value signal to determine if the occurrence value identified by the test signal is present. The revolved signal is examined and information as to the presence of an occurrence value, equal to the line value, is exclusive OR'd with information as to the presence of an occurrence value which is displaced from the one under test by the value of the saved signal. If either occurrence value exists in the revolved signal then the actual occurrence value under test exists at the input line. The checking and exclusive OR is performed by forming an absolute coded value representing each actual occurrence value of the revolved line value signal, from largest to smallest, until one is found that is equal to or less than the value of the test occurrence value. If equality exists, a signal is stored in a flip flop representing a 1. Otherwise a 0 is stored. The test occurrence value is then decreased by the largest component power of 2 signal which has been saved. The absolute coded values representing the actual occurrence values of the revolved line are then continued to be formed beginning with the next one in order until one is found whose value is equal to or less than the decreased test occurrence value. If equality exists the 1 or 0 signal previously stored in a flip flop is complemented. Otherwise the previously stored 1 or 0 signal is left unaltered. If the result of the last complement is a 1, the actual occurrence value under test exists at this input line. If the result is a 0, the actual occurrence value under test does not exist in the input line.

B. Components

FIGS. 28–31 show a schematic and block diagram of the OUTPUT MODULE. Included are registers OHW, OR1, ORT1, OLINE, OR2, ORSN, ORT2, ORT3, OLN and OAR, all 8 bit or eight flip flop registers of type SN74100 described hereinabove with respect to the ENCODE MODULE. The only exception as to size is register OAR which contains 2 bits or flip flops of storage.

Also included are selection circuits DS3, DS6 and DS7. These are conventional selection circuits of the type and operating in the manner discussed hereinabove in section I.F. CONVENTIONS AND COMPONENTS USED IN FIGURES.

Also included are switches 810 and 812. The switches 810 and 812 are conventional mechanical switches or other circuits whick form a 2 bit coded signal at the respective switch output representing a binary coded 1 and 3, respectively.

Also included are flip flops DELOP, SS, SW, and P1–P10. Flip flops P1–P10 are a part of the control counter 813 for the OUTPUT MODULE. The flip flops are of the same type and have the same characteristics as that described hereinabove in section I.F.

The OUTPUT MODULE includes an arithmetic unit ALU of the same type disclosed hereinabove with respect to section I-B.

The OUTPUT MODULE also has an AND gate 802, an exclusive OR gate 804, and a conventional OR gate 805. The exclusive OR gate 804 is of the type wherein a true signal is formed at its output whenever a true signal is formed at either one, but not at both, of its two inputs simultaneously.

The OUTPUT MODULE contains a generalized clock control 700. The generalized clock control is described in detail hereinabove in section X. GENERALIZED CLOCK CONTROL.

Similar to the ENCODE MODULE, the OUTPUT MODULE also has gating which is depicted by logical equation for controlling various input circuits and output circuits of the OUTPUT MODULE. Included among the logic gates is a clock suspension logic 822 for controlling the suspension of the clock formed by the clock control 700.

Figure 30:
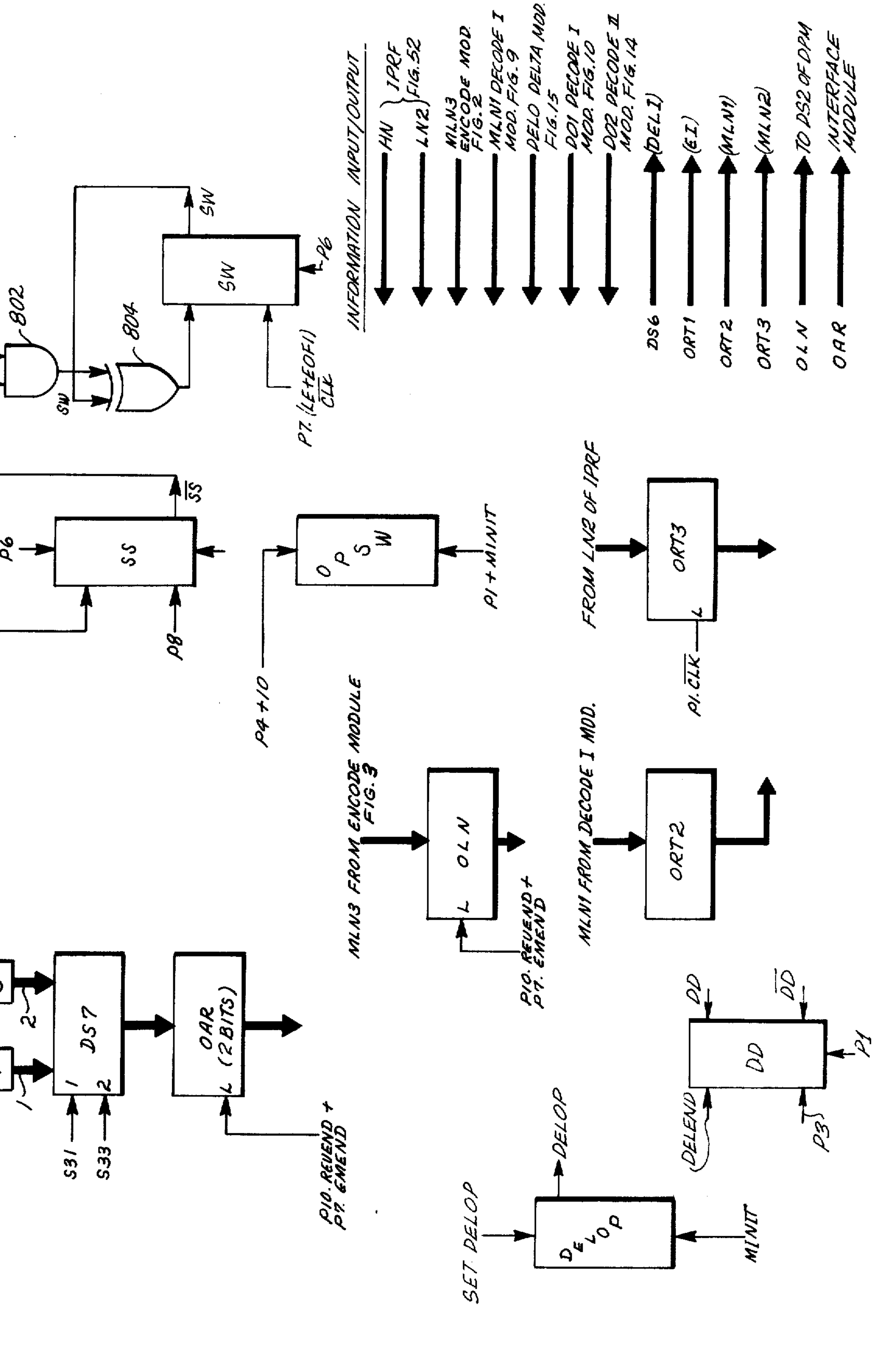
Figure 31:
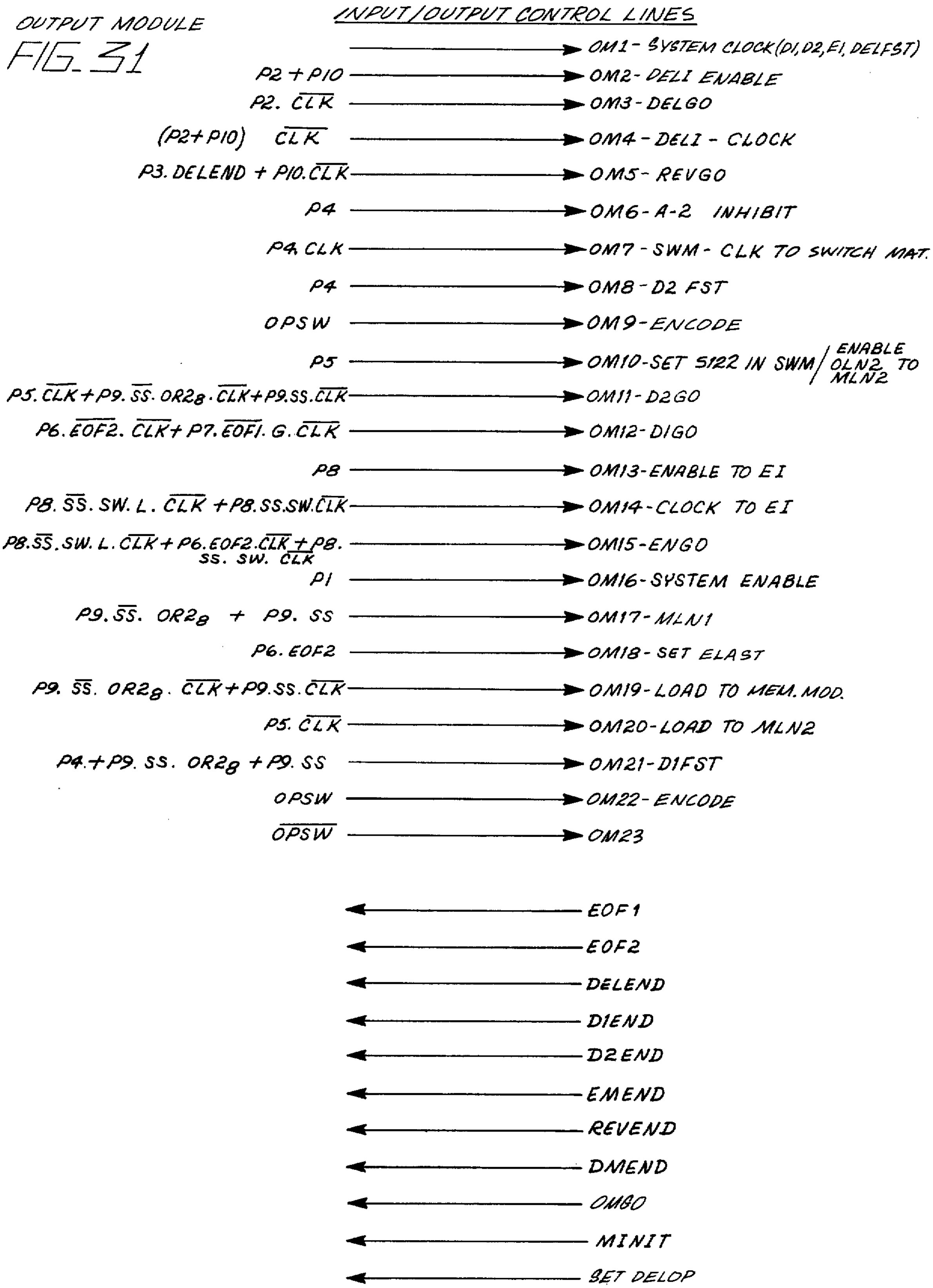

The input and output control lines and the information inputs and outputs of the OUTPUT MODULE are depicted along the right hand side of FIGS. 30 and 31.

Table 17 at the end of the specification lists the various registers and flip flops and gives the general purpose of each in the OUTPUT MODULE.

C. Detailed Description

Figure 32:
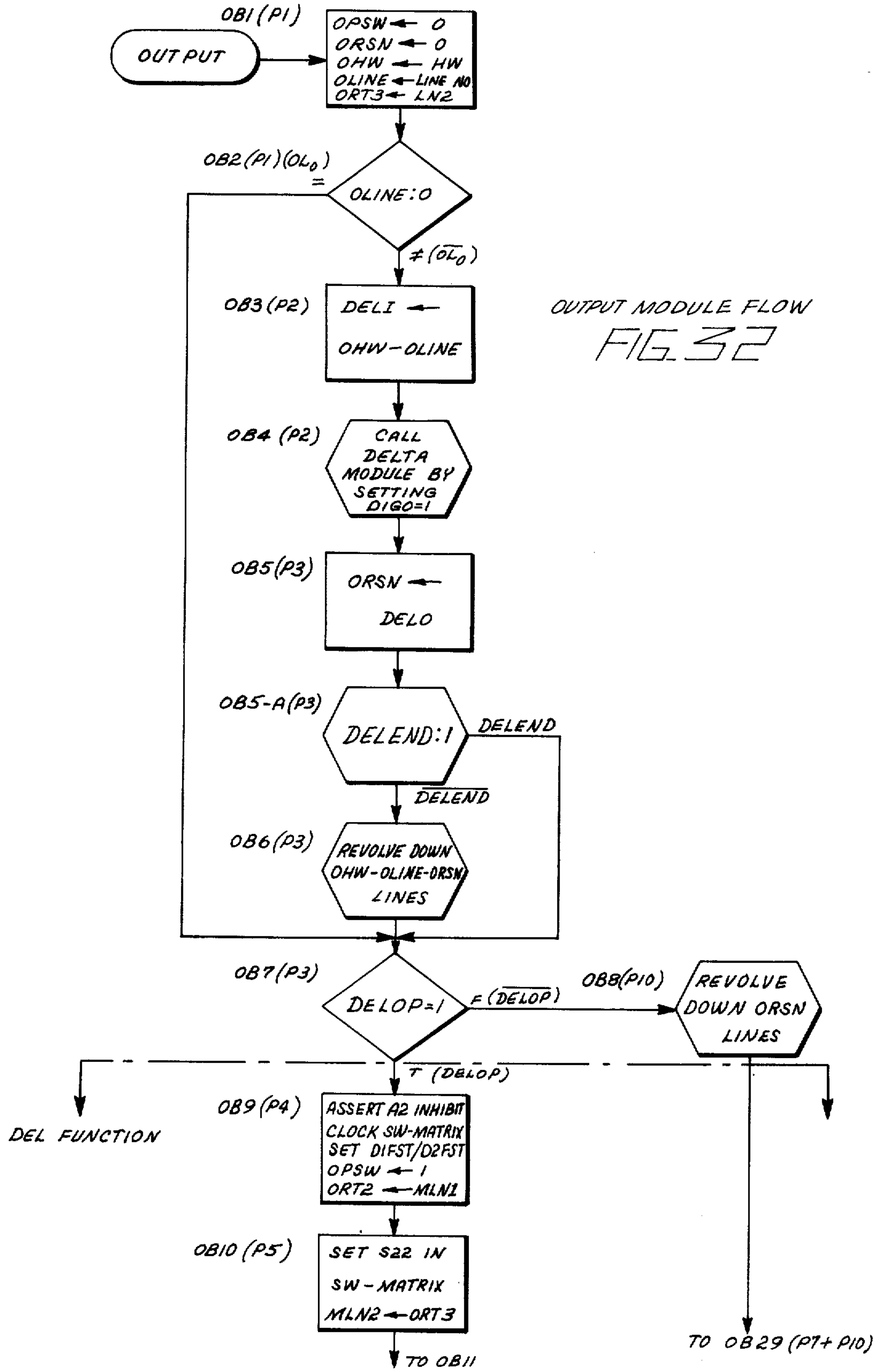
FIGS. 32 and 33 form a flow diagram illustrating the sequence of operation of the OUTPUT MODULE.
Figure 33:
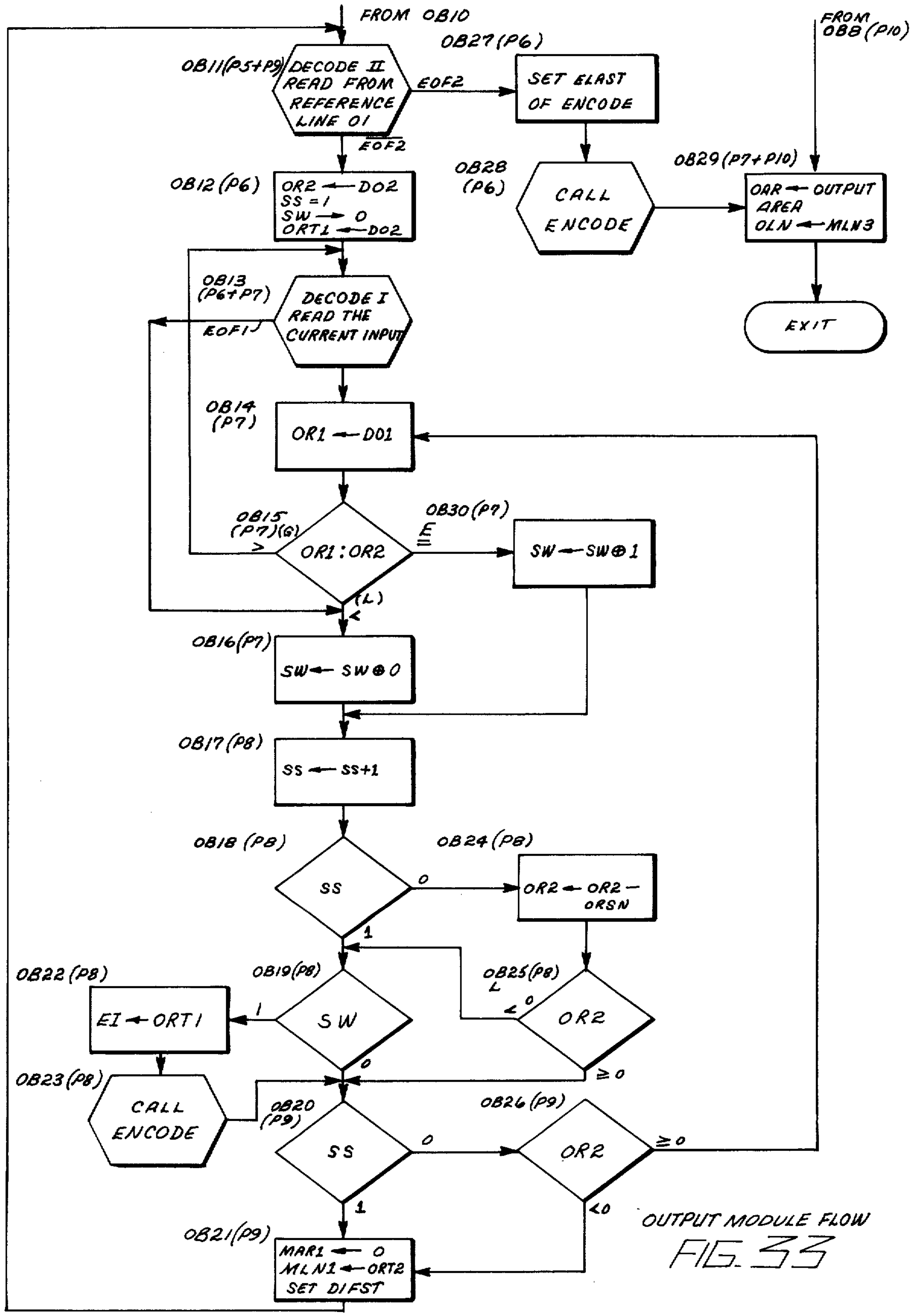

Reference should primarily be made in the following discussion to the OUTPUT MODULE schematic and block diagram of FIGS. 28–31 and the flow of FIG. 32. Consider now a detailed description of the OUTPUT MODULE during its "regular output" operation. The "regular output" operation of the OUTPUT MODULE is the retrieval or decompaction operation which is to revolve any line of an iso-entropicgram, preferably the seed, back to the 0 or input line.

Initially, a control signal is formed at the MINIT output of the MINI COMPUTER, thereby causing the following to be reset to 0: flip flops DELOP, OPSW and P1–P10. The MINI COMPUTER then loads MEMORY MODULE area 1 with the line value of the seed which is to be revolved back to its iso-entropicgram input line (or O line) and the IPRF is loaded as follows:

LN1 — with the length of the line value of the seed;

HW — with the width of the iso-entropicgram for the seed;

LINE # — with the line number of the line value for the seed

Also, flip flop DELOP of the DMP INTERFACE is set to 0 to indicate a "regular output". If set to 1, DELOP indicates a DEL function.

Since flip flop DELOP in the DPM INTERFACE MODULE is in a 0 state, a false signal is formed at the SET DELOP output and therefore flip flop DELOP in the OUTPUT MODULE remains in a 0 state. Flip flop DELOP being in a 0 state indicates a "regular output" operation. It will be noted that the generalized clock control circuit 700 has its input IP connected to output MINIT and is responsive to the true signal at MINIT for forming a true signal at the MR output which, in turn, resets the flip flops P1–P10 to 0.

Within the OUTPUT MODULE, the true signal at P1 causes the ORSN register to be cleared to 0. The true signal at the $\overline{CLK}$ output causes the logic P1.$\overline{CLK}$ to become true which causes the register OLINE to store the LINE NO (see line number from IPRF). Subsequently, the true signal at the $\overline{CLK}$ output causes the logic P1.$\overline{CLK}$ to become true which, in turn, causes the following: in the OUTPUT MODULE, register OHW stores the iso-entropicgram width from HW of the IPRF; and a true signal at the output OM1; also, register ORT3 stores the length of the line value of the change vector, if one exists, from LN2 of the IPRF. It should be noted that the length of reference line from LN2 is only of interest during the DEL operator function which will be discussed in more detail hereinafter.

The true signal at the OM1 output causes the registers MLN1 and MLN2 of DECODE I and II MODULES to store the length of the line value for the seed from LN1 of the IPRF and causes registers EBL and ETL and EIR to store the value from BL and TL and IR from the IPRF.

OB3-OB6 of the OUTPUT MODULE flow revoles the line value in MEMORY MODULE area 1 through its corresponding iso-entropicgram to its input or O line. The revolve is done in two steps to help implement the DEL function and for clipping, which will be explained in more detail after completing the description of the "regular output" function. The number of lines through which the line value must be revolved to reach the input line is the difference between the iso-entropicgram width in OHW and the line number of the line value in OLINE. This value is computed during OB3. Using the DELTA MODULE, the largest component power of 2 of that difference is determined and stored in register ORSN during OB5 and the remaining component powers of 2 are represented by the value left in DELI of the DELTA MODULE. It will be recalled that the number of lines equal to all component powers of 2 must be revolved before the input line will be reached. However, again to help implement the DEL function, the OUTPUT MODULE first causes the REVOLVE MODULE to revolve the line value through the remaining lines to be revolved designated by the value remaining in DELI of the DELTA MODULE (OB6) and later OB8 revolves the revolved line value through lines equal to the largest component power of 2. Return now to the actual operation.

OB3–OB6 of the OUTPUT MODULE flow is used for revolving the line value in MEMORY MODULE area 1 toward the input line of its iso-entropicgram and to determine the largest component power of 2 for storage in the register ORSN for use during the DEL function. OB2 of the OUTPUT MODULE flow is used to check the content of register OLINE to see if it is 0. Register OLINE contains the line number for the line value stored in the MEMORY MODULE. If the line number is 0, it is not necessary to revolve the line valve since it is already at the input row. Hence, OB3–OB6 can be skipped. Therefore, if the content of OLINE is 0, a true signal is formed at the output OL*o* of the OLINE register. Also, the DEL function is not being performed and flip flop DELOP is in state 0 and a signal is formed at output $\overline{DELOP}$. The logic P1.OL*o*.$\overline{DELOP}$ becomes true and the following pulse at $\overline{CLK}$ resets flip flop P2 to O and sets flip flop P-10 to 1, causing OB7 of the OUTPUT MODULE flow to be entered, thereby skipping the revolve steps of OB3–OB6.

However, return to OB2 and assume that the line value is not at 0 and hence register OLINE does not contain a line number of 0 and $\overline{OLo}$ is true. The true signal at CLK is formed while a true signal is formed at the P1 output. A true signal is formed at the $\overline{OLo}$ output of register OLINE (thereby indicating that its contents are not 0) and the logic P1.$\overline{OLo}$ is true and the pulse at $\overline{CLK}$ resets the P1 flip flop to 0 and sets the P2 flip flop to 1.

At this point, the OUTPUT MODULE forms a true signal at the P2 output and OB3 of the OUTPUT MODULE flow is entered. As mentioned, OB3–OB6 are used to partially revolve the line value of the seed toward the 0 or input line of its iso-entropicgram. During OB3, the difference between the seed line number contained in register OLINE and the iso-entropicgram width contained in register OHW is computed. This difference is the actual number of lines by which the seed's line value contained in MEMORY MODULE area 1 must be revolved in order to get its input line. Thus, in the OUTPUT MODULE, the true signal at the P2 output causes selection circuits DS4 and DS5 to couple the content of registers OHW and OLINE to the ALU and causes a true signal at the S input of ALU. The ALU forms a signal at its OP output, representing the difference between the iso-entropicgram width and the seed line number contained in registers OHW and OLINE. The true signal at P2 also causes the DS6 selection circuit to couple the difference signal from the OP output of ALU through to its output. The true signal at the P2 output also causes a true signal at the OM2 output of the OUTPUT MODULE. The true signal at OM2 causes the output from the DS6 selection circuit to be coupled in the DELTA MODULE through the DELS selection circuit to the DELI register. The true signal at $\overline{CLK}$ causes true signals to be formed at the OM3 and OM4 outputs of the OUTPUT MODULE. The true signal at the OM4 output causes the DELI register to store the difference value from selection circuits DS6 of the OUTPUT MODULE into its shift register 302. The true signal at OM3 calls the DELTA MODULE by triggering the DELGO multivibrator. The DELTA MODULE then computes the highest component power of 2 of the difference value (OHW − OLINE) and forms it in its register DELO in the manner described for the DELTA MODULE.

Before the DELTA MODULE completes its operation it forms a true signal at the $\overline{DELMEND}$ output. The true signal at the P2 output, together with true signals at the $\overline{DELMEND}$ and $\overline{CLK}$ outputs cause the logic P2.$\overline{DELMEND}$.$\overline{CLK}$ to become true in the clock suspension logic 822. This causes the CS input to the clock control 700 to become true and thereby suspend the pulses at the CLK and $\overline{CLK}$ outputs. The DELTA MODULE continues, as described hereinabove, to determine the largest component power of 2 of the difference value stored in the DELI register, and when this is complete, control is returned to the OUTPUT MODULE.

When the DELTA MODULE has finished, control is returned back to the OUTPUT MODULE by the DELTA MODULE by forming a true signal at the DELMEND output, thereby forming a false signal at the $\overline{DELMEND}$ output. The false signal at the $\overline{DELMEND}$ output causes the clock suspension logic 822 to form a false signal at the CS input to the clock control 700 which, in turn, causes clock pulses to be formed at the CLK and $\overline{CLK}$ outputs. The first pulse at CLK causes the flip flop P2 to be reset to 0 and causes flip flop P3 to be set to a 1 state.

At this point, OB5 of the OUTPUT MODULE flow is entered, output P3 being true. The true signal at P3 causes register ORSN to store the largest component power of 2 from register DELO in the DELTA MODULE. OB6 of the OUTPUT MODULE flow is now entered. After all component powers of 2 are formed, a true signal is formed at the output DELEND of the DELTA MODULE. The true signal formed at the DELEND output of the DELTA MODULE and the P3 output of flip flop P3 (OUTPUT MODULE) sets the DD flip flop in the OUTPUT MODULE to a 1 state. The logic P3.$\overline{DELEND}$ is true, causing a true signal at the OM5 output which, in turn, triggers the REVGO one-shot in the REVOLVE MODULE, causing the REVOLVE MODULE to revolve the value line contained in MEMORY MODULE area 1 through the number of lines of its iso-entropicgram specified by the remaining lines to be revolved signal contained in the DELI register of the DELTA MODULE after computing the largest component power of 2. As discussed above, the remaining lines to be revolved can be represented by the following: iso-entropicgram width (HW) − line number (OLINE) = largest component power of 2 (ORSN). During the operation of the REVOLVE MODULE, the true conditon of logic P3.$\overline{REVEND}$.$\overline{DD}$ causes the clock suspension logic 822 to form a true signal at the CS input of the clock control, thereby causing the clock control to disable further pulses at the CLK and $\overline{CLK}$ output. Finally, when the REVOLVE MODULE finishes its operation (i.e., revolved the line value through a number of lines equal to HW-OLINE-ORSN), the REVOLVE MODULE forms a false signal at the $\overline{REVEND}$ output, thereby causing the logic P3.$\overline{REVEND}$.$\overline{DD}$ of the clock suspension logic 822 to become false and enable clock pulses at CLK and $\overline{CLK}$. Additionally, the logic P3.$\overline{DELOP}$ is true, thereby setting flip flop P10 to a true state and resetting flip flop P3 to a 0 state at the following pulse at CLK.

At this point, true signals are formed at the P10 output and OB8 of the OUTPUT MODULE flow is entered. The true signal at P10 causes the OPSW flip flop to be set to a 1 state to indicate that clipping may take place, if required, in the ENCODE MODULE. Clipping may only take place during the production of the original occurrence vector and at no other time, otherwise errors may result during the revolve operation.

During the true signals at P10 and $\overline{CLK}$, true signals are formed by the logic P10, (P1 + P10) $\overline{CLK}$, P10.$\overline{CLK}$, causing true signals at the outputs OM2, OM4, OM5 of the OUTPUT MODULE. The true signal at P10 causes the selection circuit DS6 to couple the largest component power of 2 from register ORSN to register DELI in the DELTA MODULE. The true signal at OM5 calls the REVOLVE MODULE which, in turn, revolves the revolved line value contained in the MEMORY MODULE down the remaining number of lines specified by the largest component power of 2 stored in DELI of the DELTA MODULE.

The true condition of logic P10.$\overline{CLK}$.$\overline{REVEND}$ causes clock suspension logic to disable clock pulses at the CLK and $\overline{CLK}$ outputs of clock control 700. When the REVOLVE MODULE completes its operation, the signal at $\overline{REVEND}$ goes false and clock suspension logic 822 again causes clock control 700 to form pulses at CLK and $\overline{CLK}$. One of the lip flops S31 and S33 in the SWITCH MATRIX is true, indicating the MEMORY MODULE area containing the revolved line value and the selection circuit DS7 couples the coded signal from the corresponding switch to the information input of register OAR. The true condition of the logic P10.REVEND causes the register OAR to store the signal so that it will identify the MEMORY MODULE area containing the revolved line value. The revolved line value is now the input line of the iso-entropicgram. Note that the MLN3 register of the ENCODE MODULE now contains the length of the revolved line value. The true conditon of logic P10.REVEND also causes register OLN to store the length of the revolved line value from register MLN 3 of the ENCODE MODULE.

The true condition of logic P10.REVEND also causes a true signal at the MT imput of clock control 700 which in turn causes a true pulse at output OUTEND and at M7, thereby signalling an end of the OUTPUT MODULE operation and terminating further pulses at CLK and $\overline{CLK}$ and resetting control counter 813 to O.

With the detailed description of the "regular output" operation for the OUTPUT MODULE in mind, consider now the DEL function.

As discussed above, the DEL function is to check for the presence of an occurrence value in the input line using one of the non-input lines of the iso-entropicgram. The sequence of operation required for the DEL function is briefly set forth under section XI-A above.

Additionally, the MINI COMPUTER loads the MEMORY MODULE area 1 with the line value of the seed (non-input line) and loads MEMORY MODULE area 2 with the change vector. The change vector is in hybrid coded form and represents one or a plurality of occurrence values, each of which identifies an occurrence value in the input line for the seed which is to be checked for presence. In other words, if the change vector represents occurrence values 2, 6 and 8, each one of occurrence values 2, 6 and 8 in the input line for the seed is to be checked for presence. The DEL function allows this checking operation to be performed without revolving the non-input line value of the seed back to the input line of the iso-entropigram.

In addition, the IPRF is loaded as follows:

LN2—with the length of the line value of the change vector;

LN1—with the length of the line value of the seed;

HW—with the width of the iso-entropicgram for the seed;

LINE#—with the line number of the line value for the seed,

Also flop flops DELOP of the DPM INTERFACE MODULE is set to 1 to indicate a DEL function operation. This causes a true signal at the SET DELOP output of the DPM INTERFACE MODULE thereby setting the DELOP flip flop to a 1 state, indicating that the DEL function is to be performed.

The operation of the OUTPUT MODULE is then called by the MINI COMPUTER by forming a true signal at the OUTGO, thereby triggering the clock control 700, causing it to reset the control counter 813 and start forming pulses at the CLK and $\overline{\text{CLK}}$ outputs. The operation during OB1 through OB6 of the OUTPUT MODULE flow is identical to that described hereinabove with respect to the "regular output" operation and will not be repeated.

Assume now that the operation of the OUTPUT MODULE during the DEL function has progressed through OB6 of the OUTPUT MODULE flow similar to that described above, At this point the following has taken place: the difference between the iso-entropicgram width (OHW) and the line number (OLINE) has been computed and sent to DELI in the DELTA MODULE; the largest component power of 2 of this difference has been determined by the DELTA MODULE and the result has been stored in register ORSN of the OUTPUT MODULE; the REVOLVE MODULE has revolved the line value of the seed down a number of lines in its iso-entropicgram where the number of lines is equal to the remaining number of lines after the largest component power of 2 (e.g., OHW -OLINE-ORSN). In other words, the original seed line value has now been revolved through its iso-entropicgram until it is within a number of lines from the input line which equals the largest component power of 2 contained in ORSN.

However, in contrast to the operation during the regular output, the operation during the DEL function has flip flop DELOP in a 1 state and therefore, during OB7, when a true signal is formed at the P3 output of flip flop P3 of the control counter 813, the logic P3.DELOP is true and the following pulse CLK resets flip flop P3 to 0 and sets flip flop P4 to a 1 state.

The MINI COMPUTER forms a true signal at output OUTGO which causes a true signal at the IN input of the clock control 700. Subsequently, pulses are formed at the CLK and $\overline{\text{CLK}}$ outputs of the clock control 700.

The outputs P1–P10 are now in a 0 state, causing the logic $\overline{P1 + P2 \ldots + P10}$ to be true. The following pulse at CLK sets flip flop P1 to a 1 state, thereby forming a true signal at the P1 output. Block OB1 of the OUTPUT MODULE flow is now entered. During OB1, the ENCODE, DECODE I and II and DELTA MODULES and the SWTICH MATRIX are initialized, thereby gating information to the proper registers. To this end, the true signal at the output OM16. The true signal at the output OM16 causes the following action in the DECODE I and II MODULES: gates 218 and 220 of DECODE I and a data selector DDS1 of DECODE II couple the length value from LN2 of IPRF to registers MLN1 and MLN2, respectively; in the ENCODE MODULE BL (bottom limit) and TL (top limit) from IPRF are coupled through their respective data selectors to the input of registers EBL and ETL.

The logic P1.$\overline{\text{CLK}}$ becomes true, causing a true signal at output OM1 which in turn initializes the DELTA MODULE by setting DELFST. A true signal at P1 also initializes the SWITCH MATRIX.

OB9 of the OUTPUT MODULE flow is now entered and a true signal is formed at the P4 output, which in turn causes true signal at the following OUTPUT MODULE output circuits: OM6, OM8, OM21. The true signal at the OM6 output causes the inhibit signal from inverter 1444 in the SWITCH MATRIX while a clock signal is formed at the OM7 output of the OUTPUT MODULE. The reason for the inhibit signal will be explained in detail in connection with the SWITCH MATRIX. However, in general terms the current revolved line value is now stored in either area 1 or area 3 of the MEMORY MODULE and must now be read by the DECODE I MODULE during the subsequent operation by the OUTPUT MODULE. Also the SWITCH MATRIX remains set so that the DECODE II MODULE re-reads the change vector from MEMORY MODULE area 2 and the ENCÓDE MODULE writes into the other one of areas 1 and 3 where the revolved line value is not stored. Accordingly, the inhibit signal prevents the setting of the SWITCH MATRIX from being changed for the DECODE II MODULE but permits a change in setting for the DECODE I and ENCODE MODULES during the subsequent clock at the OM7 output of the OUTPUT MODULE.

The true signal at the OM21 and OM8 outputs initializes the DECODE I and II MODULES by setting the D1FST and D2FST flip flops therein to 1 states. Additionally, the true signal at P4 sets the OPSW flip flop to a 1 state, thereby indicating that the clipping function may now be performed by the ENCODE MODULE and causes the register ORT2 to store the length value from register MLN1 in the DECODE I MODULE into register ORT2 of the OUTPUT MODULE. Register MLN1 in the DECODE I MODULE now contains the length of the revolved line value and this value must now be saved in register ORT2 to enable a re-read of this line value.

The following pulse at the CLK output causes flip flop P4 to be reset to 0 and flip flop P5 to be set to a 1 state, thereby causing OB10 of the OUTPUT MODULE flow to be entered.

During OB10, a true signal is formed at the P5 output of the control counter 813. The true signal at the P5 output causes true signals at the OM10 output of the OUTPUT MODULE. The true signal at the OM10 output causes flip flop S22 in the SWITCH MATRIX to be set to a 1 state, thereby indicating that the DECODE II MODULE is to read from MEMORY MODULE area 2 (where the change vector is stored) and causes a selection circuit in the DECODE II MODULE to enable the length of the line value for the change vector contained in register ORT3 to be coupled through to the information input of register MLN2 in the DECODE II MODULE.

The following pulse at the $\overline{CLK}$ output causes the logic P5.$\overline{CLK}$ to become true and true signals are formed at the OM11 and OM20 outputs of the OUTPUT MODULE. The true signal at the OM11 output calls the DECODE II MODULE by setting its D2GO one-shot multi-vibrator and causes the register MLN2 in the DECODE II MODULE to store the length of reference line from register ORT3.

The true signal at P5 also causes OB11 of the OUTPUT MODULE flow to be entered. It is during this block that the DECODE II MODULE is called, thereby causing the first occurrence value from the change vector to be provided.

The logic P5.$\overline{D2END}$.$\overline{CLK}$ forms a true signal at the CS input of the clock suspension logic 822, thereby causing the clock control 700 to suspend further clock pulses. After the DECODE II MODULE has finished its operation of reading and decoding the first occurrence value from the change vector, the true signal at the $\overline{D2END}$ output of the DECODE II MODULE goes false, causing the clock suspension logic 822 to remove its signal from the CS input of the clock control 700, thereby enabling clock pulses to again be formed at the CLK and $\overline{CLK}$ outputs.

If, during the operation of the DECODE II MODULE, it was found that the last occurrence value from the change vector had previously been read and that no additional occurrence values could be provided, the DECODE II MODULE sets its EOF2 flip flop to a 1 stage, thereby causing a true signal at the EOF2 output. The true signal at P5 causes the flip flop P6 to be set to a 1 state and flip flop P5 is reset to a 0 state at the following pulse at $\overline{CLK}$ and OB27 is entered.

During OB27 of the OUTPUT MODULE flow, the true signal at the P6 output, together with true signals at the EOF2 and $\overline{CLK}$ outputs causes the logic P6.EOF2.$\overline{CLK}$ to become true, thereby forming a true signal at the OM15 output which in turn causes the ENGO one-shot to be set, thereby calling the operation of the ENCODE MODULE. In addition, the logic P6.EOF2 is true, forming a true signal at the OM18 output, thereby causing the ELAST flip flop in the ENCODE MODULE to be set to a 1 state indicating that this is the last call on the ENCODE MODULE and that the last entry from the input line, if any, is to be written out into a MEMORY MODULE area in hybrid coded form. To be explained in more detail the values so written out are in hybrid coded form and represent the occurrence values, identified by the change vector, which are present at the input line of the seed.

Continuing with the operation, the true signal at the P6 output causes the flip flop P7 tobe set to a 1 state and flip flop P6 is reset to a 0 state at the following pulse at $\overline{CLK}$, causing OB29 to be entered.

During OB29 of the OUTPUT MODULE flow, registers OAR and OLN contain values identifying the MEMORY MODULE area containing final output and the length of this area and the OUTPUT MODULE is exited.

However, consider now the operation assuming that the last occurrence value from the reference line has not been read and that the signal at the $\overline{EOF2}$ output is true and consider the operation following OB11 after the DECODE II MODULE has been called to provide the next occurrence value from the change vector.

The true signal at the P5 output at the CLK following the clock suspension causes flip flop P6 to be set to a 1 state and flip flop P5 to be reset to a 0 state, thereby causing OB12 to be entered.

The true signal at the P6 output causes the selection circuit DS3 to couple the occurrence value (from the change vector) in the DO2 register of the DECODE II MODULE to the information input of the OR2 register, and causes the register OR2 to store the occurrence value. Additionally, the true signal at P6 causes the ORT1 register to store the same occurrence value into register ORT1.

The true signal at the P6 output also causes the flip flop SS to be set to a 1 state and the flip flop SW to be reset to a 0 state. Flip flop SS is set to a 1 state and will subsequently be reset to 0 to indicate that the first pass through OB18 and OB20 is about to be undertaken. To be explained, the next time through OB18 and OB20, flip flop SS will be in a 1 state. The flip flop SW is used to indicate if an occurrence value, corresponding in value to the occurrence value from the change vector, is present at the input line corresponding to the revolved line. As previously explained, an occurrence value is present at the input line if the revolved line value in the MEMORY MODULE, being read by the DECODE I MODULE, has an occurrence value equal either to the occurrence value from the change vector or equal to the occurrence value from the change vector minus the largest component power of 2 in the register ORSN. In actual operation, the flip flop SW is used to exclusive OR the presence of an occurrence value in the revolved line value equal to the occurrence value from the change vector with the presence of an occurrence value in the revolved line which is equal to the same change vector occurrence value less the largest component power of 2. In order to cause the flip flop SW to perform its exclusive ORing function, it is initially set to a 0 state and, to be explained in more detail, the flip flop SW will end up in a 1 state if the exclusive OR results in a true condition, whereas it ends up in a 0 state if the exclusive OR is a false condition.

OB13 of the OUTPUT MODULE flow is now entered. The true signals at the P6 output and the $\overline{EOF2}$ output (the latter indicates that the DECODE II MODULE has not reached the end, or last occurrence value, of the change vector) and the true signal at the $\overline{CLK}$ output causes the logic P6.$\overline{EOF2}$.$\overline{CLK}$ to become true, thereby forming a true signal at the OM12 output. The true signal at the OM12 output of the OUTPUT MODULE causes the D1GO one-shot in the DECODE I MODULE to be set, thereby calling the operation of the DECODE I MODULE, causing it to read the first occurrence value from the revolved line value. The logic P6.$\overline{D1MEND}$.$\overline{CLK}$ is true, thereby causing the clock suspension logic 822 to disable the clock control thereby suspending further pulses at the CLK and $\overline{CLK}$ outputs. When the DECODE I MODULE has provided the occurrence value from the revolved line value, a false signal is formed at the $\overline{D1MEND}$ output from the DECODE I MODULE, thereby causing the logic P6.$\overline{D1MEND}$.$\overline{CLK}$ to become false, thereby causing the clock suspension logic to enable the clock control 700 to commence forming pulses at the CLK and $\overline{CLK}$ outputs, Assume that the DECODE I MODULE has not reached the end of the revolved line value and hence a true signal is not formed at the EOF1 output and a true signal is formed at the $\overline{EOF1}$ output. The true signal at the P6 output causes flip flop P7 to be set to a 1 state and P6 is reset to a 0 state at the following pulse at CLK, thereby causing OB14 of the OUTPUT MODULE flow to be entered.

During OB14, a true signal is formed at the P7.CLK output of the control counter 813 which causes the register OR1 to form at its output the occurrence value which was read from the revolved line value by the DECODE I MODULE. When the signal at P7 is removed, the register OR1 will retain and store the value, which is a characteristic of the register.

OB15 of the OUTPUT MODULE flow is entered. During OB15, the true signal is still formed at the P7 output. The true signal at the P7 output causes the selection circuits DS4 and DS5 to couple (1) the line value occurrence value from register OR1, and (2) the test occurrence value (from the reference vector) from register OR2 to the inputs of the ALU. Initially, the true signal at the P7 output causes the compare (C) input of the ALU to be activated, thereby causing the ALU to compare the two input values. It should be noted that three possible conditions may result from the compare. These possible conditions are as follows: (1) OR1 = OR2; (2) OR1 > OR2; and (3) OR1 < OR2. It will be recalled from the theoretical discussion that the revolved line value of the delta is to be aligned so that its rightmost or largest occurrence value, contained in OR1, is aligned with the rightmost occurrence value in the line of the iso-entropicgram to which it is applied. If the rightmost occurrence value is equal to the test occurrence value, the contents of OR1 = OR2 at this point, and the two lines are aligned and the state (0) of flip flop SW is exclusive OR'd with 1 and therefore is set to a 1 state. Thus, if the ALU forms a true signal at the E output, one input to the AND gate 802 is true. Additionally, at this point, output $\overline{EOF1}$ from the DECODE I MODULE is false. Hence, a true signal is formed by the logic P7.$\overline{EOF1}$ at the other input, causing AND gate 802 to form a true output. The flip flop SW forms a false signal at the SW output and hence the exclusive OR gate 804 forms a true signal at the upper side input of flip flop SW. Additionally, since the ALU forms a true signal at the E output, the OR gate 805 forms a true signal at the LE output. Therefore, the logic P7.(LE + EOF1).$\overline{CLK}$ is true and the exclusive ORing flip flop SW is set to a 1 state corresponding to the true input from exclusive OR gate 804.

Assume a non-aligned condition where the occurrence value (from the revolved line) contained in OR1 is greater than (>) the test occurrence value contained in register OR2. The ALU will form a true signal at the G output but will not form a true signal in either the L or E output. The gate 805 will therefore form a false signal at the LE output, causing the logic P7.(LE + EOF1) .$\overline{CLK}$ to be false and flip flop SW will remain unchanged. Additionally, if OR1 > OR2, a decision cannot be made and values must be read from the revolved input line until a decision can be made, i.e., OR1 ≦ OR2. Accordingly, the logic P7.$\overline{EOF1}$.G will be true and hence flip flop P7 will be reset to a 1 state, causing OB13, OB14 and OB15 of the OUTPUT MODULE flow to be re-entered where the DECODE I MODULE provides the next lower occurrence value from the revolved line value. It should be noted that the DECODE I MODULE provides the occurrence values from the revolved line value in decreasing value order. Accordingly, the DECODE I MODULE will be moving through the revolved line value in a direction toward the smaller values to bring the line value into alignment with the larger occurrence value contained in the OR2 register.

Assume that during OB15 the third condition is found where the occurrence value from the line value in OR1 is less than (<) the test occurrence value (from the reference line) contained in OR2. Under these conditions, the occurrence value from the line value is less than (<) the occurrence value from the reference line contained in OR2 and hence lies to the left of the position under test. This means that it is no longer necessary to look for the test occurrence value because the revolved line value does not contain this occurrence value. Therefore, the occurrence value in the revolved line value which is to the left of the one under test (OR2) by the number of occurrence value specified by the largest component power of 2 contained in register ORSN is next to be checked for presence. This is done by incrementally decrementing the value in register OR2 by the value in register ORSN and by causing the DECODE I MODULE to continue providing the occurrence values in the revolved line value in sequence.

To this end, OB16 of the OUTPUT MODULE flow is entered. The second time through the status of flip flop SW is not known but it is to remain unchanged. Therefore, its state is XOR'd with $\phi$. To this end, the output E from the ALU is false and the gate 802 forms a false input to the OR gate 804 causing the exclusive OR gate in turn to apply a false signal at the upper left side of the flip flop SW. Hence, during OB16, the exclusive OR flip flop remains unchanged. Following OB30, or following OB16, a true signal is formed at the P7 and LE outputs. This causes the logic P7.(LE + EOF1) to become true and the following pulse at CLK resets flip flop P7 to a false state and sets the flip flop P8 to a 1 state, thereby causing OB17 to be entered.

The true signal at the P8 output causes OB17 to be entered. The leading edge of the true pulse at P8 triggers the SS flip flop from a 1 to a 0 state. OB18 is now entered where the state of the SS flip flop is checked. Since the SS flip flop is now in a 0 state indicating that this is the first pass through OB18 et seq., for the particular test occurrence value from the reference line contained in OR2, OB24 and OB25 of the OUTPUT MODULE flow are entered.

During OB24 and OB25, the test occurrence value in register OR2 is modified to a test occurrence value which is to the left of the test occurrence by the number of occurrence values specified by the value in ORSN. In other words, it is necessary to form a test occurrence value signal which identifies the next occurrence value in the line of the delta iso-entropicgram which corresponds to the largest component power of 2 in register ORSN.

Considering the above operation in more detail, the true signal at the P8 output causes the selection circuits DS4 and DS5 to couple the test occurrence value from register OR2 through to the left input of the ALU and couple the largest component power of 2 from register ORSN to the right hand input of the ALU. The true signal at P8 also causes the ALU to subtract the content of ORSN from OR2 and form a difference value signal at its output OP. If the result is greater than or equal to 0, which is the usual case, the resultant difference signal has not resulted in a value which is to the left of or off the end of the iso-entropicgram. To be explained in more detail, should the difference signal have resulted in a value which is less than 0 (OR2<0), a position off the end of or to the left of the iso-entropicgram would result and OB19 would be entered.

Assume that the difference is equal to or greater than 0 (OR2≧0). The true signal at the P8 output causes flip flop P9 to be set to a 1 state and flip flop P8 to be reset to 0 at the following $\overline{CLK}$, thereby causing OB20 to be entered.

The true signal at the P8 output causes the difference signal formed at the output of ALU to be coupled through the DS3 selection circuit back to the input of register OR2 and the true condition of logic P8.$\overline{SS}$.$\overline{CLK}$ causes register OR2 to store the difference value. Thus, OR2 now contains the original test occurrence value decreased by the largest component power of 2 contained in register ORSN.

During OB20, true signals are formed at the P9 and $\overline{SS}$ outputs (i.e., flip flop SS is in a 0 state), thereby causing OB26 to be entered.

If during OB26 the content of register OR2 is equal to or greater than (≧) 0, meaning that it is still within the width of the iso-entropicgram, then it is necessary to reenter OB14 et seq. where the new test occurrence value contained in register OR2 is compared against the occurrence value from the revolved line value stored in OR1, to determine whether they are equal. To this end, a true signal is formed at the $\overline{OR20}$ output of the OR2 register, indicating that the OR2 register is not 0 and the logic P9.$\overline{SS}$.$\overline{OR20}$ becomes true and the following pulse at CLK triggers the P7 flip flop to a 1 state and resets the P9 flip flop to a false state,thereby causing OB14 of the OUTPUT MODULE flow to be entered.

During OB14, a true signal at the P7.CLK output again causes the register OR1 to store the next occurrence value from the revolved line value which is still stored in register DO1 of the DECODE I MODULE.

During OB15, register OR1 contains the occurrence value from the revolved line value and register OR2 contains the test occurrence value. As discussed above, should the values contained in OR1 and OR2 be equal, OB30 is entered. If flip flop SW is now in a 1 state, the AND gate 802 and the exclusive OR gate 804 will apply a true signal to the exclusive ORing flip flop SW, causing it to change to a $\phi$ state. A $\phi$ state of the SW flip flop at this point indicates that the revolved line value contains occurrence values equal to those designated by both the test occurrence value from the reference line and the calculated occurrence value which the ORSN positions to the left. This indicates that an occurrence value equal to the test occurrence value from the reference line is not present in the input line of the iso-entropicgram for the seed. If, on the other hand, the comparison during OB15 reveals that the occurrence value from the revolved line value contained in OR1 is greater than (>) the value contained in register OR2, the OUTPUT MODULE, through the DECODE I MODULE, has not yet reached the position in the revolved line value corresponding to that now specified by register OR2. Accordingly, OB13 is again entered where the DECODE I module is again called, causing the next occurrence value from the revolved line value to be provided and during OB14, stored in register OR1. It will be noted that OB13 is re-entered with flip flop P7 in a true state, the logic P7.$\overline{EOF1}$.G causing flip flop P7 to be reset at the pulse at CLK.

This operation continues causing occurrence value after occurrence value in the revolved line value to be provided by the DECODE I MODULE until one is stored in OR1 which is equal to or less than the computed test occurrence value stored in register OR2. If an equality is found, then OB30 is entered where, as discussed above, the exclusive OR flip flop is complemented. If an entry is stored in register OR1 that is less than the value in register OR2 before an equality is detected OB16 of the OUTPUT MODULE flow is entered where the SW flip flop remains in its previous state. The 0 state of the SW flip flop then indicates that the occurrence value under test is not present at the original input line. If SW flip flop is in a 1 state, the occurrence value under test is present.

If during OB15 it is found that the content of OR1 is equal to (E) or less than (L) that of register OR2, the OR gate 805 forms a control signal at the LE output. The true signal at the LE output causes the logic P7.(LE + EOP1) to become true and flip flop P8 is set to a 1 state and flip flop P7 is reset to a 0 state at the following pulse at CLK as described above.

OB17 is now entered for a second time. The true signal at the P8 output causes the SS flip flop to be reset from a 0 to a 1 state, thereby indicating that this is the second pass through OB18 et seq. The 1 state of the SS flip flop and the true signal at the SS output causes OB19 to be entered where the state of the SW flip flop is checked.

If the SW flip flop is in a 1 state, OB22 is entered. During OB22, the true signal at the P8 output causes the OM13 output of the OUTPUT MODULE to be true and thereby enable the appropriate circuits in the ENCODE MODULE in preparation for causing the ENCODE MODULE to write out the occurrence value contained in ORT1. The test occurrence value from the reference is still in register ORT1 where it was stored during OB12.

During OB23, true signals are formed at the SS and SW outputs and the following pulse at $\overline{CLK}$ causes the logic P8.SS.SW.$\overline{CLK}$ to become true which in turn forms a true signal at the OM14 output, thereby calling the ENCODE MODULE.

The true signal at the P8 output causes the flip flop P9 to be set to a 1 state and flip flop P8 is reset to a 0 state at the following pulse at CLK and OB20 is entered.

Assuming that the flip flop SS is in a 1 state, a true signal is now formed by the logic P9.SS causing the output circuits OM17 and OM21 from the OUTPUT MODULE to be true. The true signal at the OM17 output is applied to the DECODE I MODULE, causing its MLN1 counter to be set to the value contained in register ORT2 in the OUTPUT MODULE. (D1FST causes MAR1 to be reset on the first call to DECODE I). It will be recalled that ORT2 contains the length of the revolved line value. Additionally, the true signal at the OM21 output sets the D1FST flip flop in the DECODE I MODULE. Thus, the DECODE I MODULE has now been set so that its next call will cause it to again start reading the beginning of the revolved line value to use for a further test occurrence value from the reference line.

OB11 of the OUTPUT MODULE flow is now reentered and the true signal at the P9.SS.$\overline{CLK}$ logic causes a true signal at the OM11 output. The true signal at the OM11 output causes the DECODE II MODULE to again be called, this time reading out the next test occurrence value from the reference line designating the next occurrence value in the input line of the iso-entropicgram to be tested (if any). The value is stored in registers ORT1 and OR2 during OB12 as discussed above for the first test occurrence value from the reference line.

The sequence of operation discussed above is then repeated to determine whether there is an actual occurrence value in the input line of the iso-entropicgram specified by the test value contained in registers ORT1 and OR2. If so, the occurrence value is encoded by the ENCODE MODULE and stored in the MEMORY MODULE. This operation continues until the last test occurrence value of the reference line has been read by the DECODE II MODULE and processed. After this occurs, the operation of the OUTPUT MODULE returns from OB21 to OB11 at which time it is found that the EOF2 flip flop in the DECODE II MODULE is in a 1 state, indicating that the last test occurrence value from the reference line has been read. A true signal is now formed at the EOF2 output causing OB27 and OB28 to be entered where the true signal at P6 causes the ENCODE MODULE to be called for the last time and the last encoded value, if any, is stored in the MEMORY MODULE.

D. Example of Operation

The following is an example of the "regular output" operation of the OUTPUT MODULE, using the example of Table 4-B. Symbolic notation is used to indicate the sequence of operation.

The line value of the seed is assumed to be in MEMORY MODULE area 1 and in hybrid code is as follows:

| | | |
|---|---|---|
| | 10000111 } | |
| | 01011001 } | occurrence values 7, 6, 3, 2, 0, physical length = 2 |
| | The following is stored in the IPRF: | |
| | LINE = 7 | seed line number; |
| | HW = 16 | iso-entropicgram width; |
| | LN1 = 2 | physical length of seed line value; |
| | TL = 16 | top clipping limit; |
| | BL = 0 | bottom clipping limit; |
| | IR = 0 | interval value; |
| | DELOP = 0 | DEL function not requested. |
| | Sequence of control OB1-OB8: | |
| OB1 | OPSW = 0 | turn off clipping f/f; |
| | ORSN = 0 | clear; |
| | OHW = HW = 16 | iso-entropicgram width; |
| | OLINE = LINE = 7 | seed line number; |
| OB2 | OLINE ≠ 0 ∴ go to OB3 | |
| OB3 | DELI(9) = OHW(16) -OLINE (7) | DELI contains the number of lines seed line value must be revolved to get original input; |
| OB4 | call DELTA MODULE DELO = 8 | DELTA MODULE generates highest component power of 2 in 9 which is 8 and DELI contains the remainder of 1 upon return; |
| OB5 | ORSN = DELO = 8 | save the result in ORSN; |
| OB6 | call REVOLVE | revolve the seed line value down the number of lines remaining in DELI, in this case, generate line 8; |
| OB7 | DELOP = 0 ∴ go to OB8 | |
| OB8 | DELI = ORSN = 8 call REVOLVE OPSW = 1 | turn on the clipping; function and revolve down ORSN (8) lines; |
| OB9 | OAR = output area which contains the event's original occurrence vector; | |
| | OLN = 3 | the length of this area |
| HALT. | | |

The following is an example of the DEL operation of the OUTPUT MODULE using the example of Table 4-B. Symbolic notation is again used to indicate the sequence of operation. The content of IPRF is as follows:

| | |
|---|---|
| LINE = 7 | |
| HW = 16 | |
| TL = 16 | |
| BL = 0 | |
| IR = 0 | |
| LN1 = 2 | |
| LN2 = 4 | physical length of reference line |
| DELOP = 1 | to indicate the DEL function. |
| MEMORY MODULE area 2 contains the following hybrid coded representation of seed line value: | |
| 10000111 } | |
| 01011001 } | occurrence values 7, 6, 3, 2, 0, physical length = 2; |
| MEMORY MODULE area 1 contains the following hybrid coded representation of the reference line: | |
| 10001100 } | |
| 10001000 } | |
| 10000011 } | |
| 10000000 } | test occurrence values 12, 8, 3, 0 |

-continued

```
Intermediate seed line result line 8 of iso-entropicgram
(Table 4-B):
        10001000 \
        01101010  }                  occurrence values 8, 6, 4, 2, 1, 0
        00000001 /                   length = 3;
Sequence of control:
OB1-OB6  same as for example of regular output given above.
         At this point, line 8 of the iso-entropicgram has
         geen generated.
OB7    DELOP = 1 ∴ OB9
OB9    initialize DECODE I, II and ENCODE MODULES;
       D1FST = D2FST = 1
       ORT2 = MLN1 = 3
OB10   Set S22 in SWITCH MATRIX; assure DECODE II reads from
       proper area;
       MLN2 ← ORT3 = 4                length of reference line;
OB11   Call DECODE II                 read a column index;
       DO2 = 12 EOF1 = 0              to be checked;
       SS = 1 SW = 0
OB12   OR2 = ORT1 = 12                save the value read;
OB13   call DECODE I                  read a value from line 8 of the
       DO1 = 8 EOF1 = 0               iso-entropicgram;
OB14   OR1 = 8                        save it;
OB15   OR1(8) < OR2(12) ∴
       go to OB16                     stimulate XOR;
OB16   SW(0) = SW(0) XOR ⊕            φ
OB17   SS = 0
OB18   SS = 0 ∴ go to OB24
OB24   OR2(4) = OR2(12) - ORSN(8)
                                      next position to be checked;
OB25   OR2(4) > 0 ∴ go to OB20
OB20   SS = 0 ∴ go to OB26
OB26   OR2(4) > 0 ∴ go to OB14
OB14   OR1 = DO1 = 8
OB15   OR1(8) > OR2(4) ∴ go to OB13
OB13   call DECODE I
       DO1 = 6 EOF1 = 0
OB14   OR1 = DO1 = 6
OB15   OR1(6) > OR2(4) ∴ go to OB13
OB13   call DECODE I
       DO1 = 4 EOF1 = 0
OB14   OR1 = DO1 = 4
OB15   OR1 = OR2 = 4 ∴ go to OB30
OB30   SW(1) = SW(φ) ⊕ 1
OB17   SS = 1
OB18   SS = 1 ∴ go to OB19
OB19   SW = 1 ∴ go to OB22
OB22   EI(12) = ORT1(12)            . write out the test occurrence
                                      value;
OB23   call ENCODE
OB20   SS = 1 ∴ go to OB21
OB21   MLN1 = 3                       reset the DECODE I MODULE;
       D1FST = 1
OB11   call DECODE II
       DO2 = 8 EOF2 = 0
OB12   SW = 0 SS = 1
       OR2 = ORT1 = 8
OB13   set DECODE I
       DO1 = 8 EOF1 = 0
OB14   OR1 = DO1 = 8
OB15   OR1(8) = OR2(8) ∴ go to OB30
OB30   SW(1) = SW(φ) ⊕ 1
OB17   SS = 0
OB18   SS = 0 ∴ go to OB24
OB24   OR2(0) = OR2(8) - ORSN(8)
OB25   OR2 = 0 ∴ go to OB20
OB20   SS = 0 ∴ go to OB26
OB26   OR2 = 0 ∴ go to OB14
OB14   OR1 = 8
OB15   OR1(8) > OR2(0) ∴ go to OB13
OB13   DECODE I
       DO1 = 6 EOF1 = 0
OB14   OR1 = DO1 = 6
OB15   OR1(6) > OR2(0) ∴ go to OB13
OB13   call DECODE I
       DO1 = 4 EOF1 = 0
OB14   OR1 = DO1 = 4
OB15   OR1(4) > OR2(0) ∴ go to OB13
OB13   call DECODE I
       DO1 = 2 EOF1 = 0
OB14   OR1 = DO1 = 2
OB15   OR1(2) > OR2(0) ∴ go to OB13
OB13   call DECODE I
       DO1 = 1 EOF1 = 0
OB14   OR1 = DO1 = 1
OB15   OR1 > OR2 ∴ go to OB13
OB13   call DECODE I
       DO1 = 0 EOF1 = 0
OB14   OR1 = DO1 = 0
OB15   OR1 = OR2 ∴ go to OB30
OB30   SW(φ) = SW(1) ⊕ 1
OB17   SS = 1
OB18   SS = 1 ∴ go to OB19
OB19   SW = O ∴ go to OB20            8 does not appear as an
```

-continued

```
OB20   SS = 1 ∴ go to OB21                    occurrence in input line
OB21   MLN1 = ORT2 = 3                        reset decode to given point;
       D1FST = 1
OB11   call DECODE II
       DO2 = 3 EOF2 = 0
OB12   SS = 1 SW = 0
       OR2 = ORT1 = 3
OB13   call DECODE I
       DO1 = 8 EOF1 = 0
OB14   OR1 = DO1 = 8
OB15   OR1(8) > OR2(3) ∴ go to OB13
OB13 - OB14 - OB15                            loop repeats until the 2 is
                                              read from the iso-entropicgram
                                              line number 8;
OB14   OR1 = DO1 = 2
OB15   OR1(2) < OR2(3) ∴ go to OB16
OB16   SW(0) = SW(0) ⊕ φ
OB17   SS = 0
OB18   SS = 0 ∴ go to OB24
OB24   OR2(-5) = OR2(3) - ORSN(8)             if OR2 is negative, then
OB25   OR2(-5) < 0 ∴ go to OB19               we need not consider
OB19   SW = 0 ∴ go to OB20                    further;
OB20   SS = 0 ∴ go to OB26
OB26   OR2(-5) < 0 ∴ go to OB21
OB21   MLN1 = ORT2 = 3
OB11   call DECODE II
       DO2 = 0 EOF2 = 0
OB12   SS = 1 SW = 0
       OR2 = ORT1 = 0
OB13   call DECODE I
       DO1 = 8 EOF1 = 0
OB14   OR1 = DO1 = 8
OB15   OR1(8) > OR2(0) ∴ go to OB13
OB13-OB14-OB15                                the DECODE I loop repeats until the
                                              φ value is read
OB14   OR1 = DO1 = 0
OB15   OR1(0) = OR2(0) ∴ go to OB30
OB30   SW(1) = SW(0) ⊕ 1
OB17   SS = 0
OB18   SS = 0 ∴ go to OB24
OB24   OR2(-8) = OR2(0) - ORSN(8)
OB25   OR2(-8) < 0 ∴ go to OB19
OB19   SW = 1 ∴ go to OB22
OB22   EI = ORT1 = φ
OB23   call the ENCODE MODULE
OB20   SS = 0 ∴ go to OB26
OB26   OR2(-8) < 0 ∴ go to OB21
OB21   MLN1 = ORT2 = 3                        reset DECODE I;
       D1FST = 1
OB11   call DECODE II
       DO2 = 0 EOF2 = 1 ∴ go to OB27
OB27   set ELAST
OB28   call ENCODE
OB29   OAR = output area written by ENCODE
       OLN = length of this area
HALT
OUTPUT OAR \
            } as described above
       OLN /
       actual output   10001100  12
                       10000000  0
```

The test occurrence values stored in the MEMORY MODULE output area 1, in hybrid code, are now as follows:

10001100 (occurrence values of 12)

10000001 (occurrence value of 0)

This indicates that of test occurrence values 12, 8, 3 and 0, in the reference line, only 12 and 0 appeared in the original input line of the iso-entropicgram.

XIV. DATA COMPACTION AND RETRIEVAL MACHINE

It will be recognized from the foregoing description of the SEED MODULE and OUTPUT MODULE in conjunction with the REVOLVE, DELTA, ENCODE, DECODE I and II MODULES depicted in FIG. 34, that a data compaction and retrieval machine has been disclosed. The data compaction retrieval system forms a sub-part of the overall DPM SYSTEM. The data compaction and retrieval system has several features. Specifically, the OUTPUT MODULE in conjunction with the ENCODE, DECODE I, DECODE II, REVOLVE and DELTA MODULES, forms an output machine which retrieves compacted information that has been retrieved into iso-entropicgram form of representation.

Specifically, an electronic data processing system is disclosed for retrieving a desired coded signal from a representation in the form of a line value signal, a line number signal and a length signal. The line value signal represents a line of an iso-entropicgram, eliminating leading zeros. The line number designates the line in the iso-entropicgram for the line value signal. The length signal is equal to the width of the iso-entropicgram which in turn is equal to the length of the line value signal without excluding leading zeros. So as not to confuse the length with the storage space, the length signal would be equal to the total number of possible occurrence values in the line of the iso-entropicgram which in turn is equal to the largest possible occurrence value in a line of the iso-entropicgram. The data processing system includes a memory, such as the MEM- ORY MODULE, for storing the line value signal. Means such as the OLINE register of the OUTPUT MODULE stores the line number signal. Means such as the OHW register of the OUTPUT MODULE stores the length signal. Means such as the ALU of the OUTPUT MODULE forms a difference signal corresonding to the difference in values represented by the stored line number signal and the stored length signal. Means such as the REVOLVER, discussed hereinabove, responds to the provided line value signal and a provided number signal for forming any one of a set of equivalent signals. The set includes the line value signal. Each equivalent signal within a set is unique and is related to another one by an exclusive OR of the values thereof, and the values thereof relative shifted. The formed equivalent signal represents the desired coded signal. Means such as the DECODE I and II MODULES provides a line value signal to the means for forming an equivalent signal which corresponds in value to that stored in the memory means. Means such as the DELTA MODULE provides to the means for forming an equivalent signal a number value signal corresponding in value to that of the difference signal.

The ENCODE MODULE provides signals from the memory means (MEMORY MODULE) to the equivalent signal forming means (REVOLVER). The means for providing a number value signal, i.e., the DELTA MODULE, comprises means for forming as the number value signal one or more signals representative of the component powers of 2 of the difference signal.

Preferably, the equivalent signal forming means, i.e., the REVOLVER, includes means such as the ALU REVOLVE MODULE for combining the provided number signals with the provided line value signal to form a further signal which corresponds to the shifted signal formed by the REVOLVER. Additionally, the ALU and associated logic form a means for combining the line value signal and the further signal to form the equivalent signal. Preferably, the line value signal has one or more actual occurrence value signals out of a group of possible occurrence value signals. The possible and actual occurrence value signals are arranged in an incremental, preferably increasing incremental, value order. With such a signal representation the means for forming an equivalent signal includes means such as the ALU of the REVOLVE MODULE for combining the value represented by the provided number value signal with each of the values represented by the occurrence value signals of the line value to form a further signal, and the ALU and associated control and logic of the REVOLVE MODULE form a means for exclusive ORing the values represented by the provided line value signal and the further signal to form the equivalent signal.

It will be recalled that in the REVOLVER the means for exclusive ORing involves the ALU control and logic of the REVOLVE MODULE for sorting the occurrence value signals represented by the provided line value signal and the further signal into an incremental value order. Additionally, those occurrence value signals which are equal are deleted. The ALU control unit and associated logic of the REVOLVE MODULE sort the values representing the further signal and the occurrence value signals from the provided line value signal to form a series of occurrence value signals arranged incrementally in the order of the values thereof. During the process of sorting, those occurrence value signals which are outside of the width of the isoentropicgram, i.e., not among the possible occurrence values, are eliminated.

As indicated above, the SEED MODULE and OUTPUT MODULEin association with the other modules of FIG. 34 form a data compaction and retrieval system. The data compaction and retrieval system is actually an electronic data processing system for both compacting a coded signal and for retrieving a compacted signal. Included in this system is a memory means such as the MEMORY MODULE for storing and making available coded signals for compaction and retrieval. Means such as the REVOLVER of FIG. 19 responds to a coded signal and a provided number signal for forming any one of a set of equivalent signals. The set includes the coded signal. Each equivalent signal within a set is unique and related to another one by an exclusive OR of the values thereof and the values thereof relative shifted. Decode means such as the DECODE I and II MODULES decodes a coded signal for compaction or a coded signal for retrieval from the memory means from a first code to a second expanded code for the means for forming equivalent signals. In this connection it will be recalled that the DECODE MODULES decode occurrence vectors from hybrid code to the expanded absolute coded form representing occurrence values. Encode means, such as the ENCODE MODULE, encodes the equivalent signal from the second code to the first code for storage in the memory means. Means such as the SEED MODULE is responsive to at least a portion of the decoded signal for compaction for forming a total number value signal which represents a quantity of the equivalent signals. In this connection the larger of the largest and next largest occurrence value differences stored in the register T1 designates the total number of lines by which a revolve is to be taken.

Means such as the OLINE register of the OUTPUT MODULE stores a line number signal associated with a coded signal for retrieval. Means such as the OHW register of the OUTPUT MODULE stores a length signal associated with the stored line number signal. The OUTPUT MODULE forms a means for forming a different signal representing the difference in values of the stored line number signal and the stored length signal. Means such as the DELTA MODULE provides the number signal to the equivalent signal forming means (REVOLVER). Specifically, the DELTA MODULE forms a means which is responsive to either the total number value signal, for a compaction, or the difference signal, for a retrieval, for forming, corresponding thereto, the number signal. In this connection the number signal is one or more signals representing the component powers of 2 of the total number value signal or the difference signal.

Preferably, the compaction and expansion provided by the DECODE I and II and ENCODE MODULES are provided in the system. However, this further compaction would not be essential within the broader concepts of the present invention. In this connection then the DECODE I and II and ENCODE MODULES form, broadly, a means for providing coded signals coresonding to those available from the memory means and coresonding to those from the means for forming equivalent signals to the other.

The OUTPUT MODULE in conjunction with the REVOLVE, DECODE I and II, REVOLVER, DELTA and ENCODE MODULES, provide the DEL function described above. The DEL function allows a test to be made to determine whether an actual occurrence value is present in an input line of an iso-entropicgram given one of the non-input lines. Broadly, the steps include the steps of forming a line representing the non-input line. The formed line signal represents one or more actual occurrence values of the possible occurrence values making up each line of an iso-entropicgram. This step corresponds to OB6 of the OUTPUT MODULE flow. During OB5 of the OUTPUT MODULE flow a length signal is formed representing the number of lines of displacement in the iso-entropicgram between the non-input line and the input line. A test signal is formed during OB12 representing the value of an absolute occurrence value in the input line to be checked for presence. The test signal corresponds to an occurrence value in a test vector.

During OB24 the values represented by the test signal and the length signal are combined to form a further test signal identifying a further occurrence value for test. This step corresponds to forming a further one of the occurrence values in one of the lines of the inverted DEL (Table 9-C).

During OB15 in the first pass, the value of the test signal is compared with the values of the formed line signal for equality, i.e., a predetermined relation. During OB15 in the second pass the value of the further test signal is compared with the values of the formed line signal for equality, also a predetermined relation. A predetermined signal is formed during OB19 causing the flip flop SW to be in a 1 state responsive to the results of both of these tests of comparing. When the SW flip flop is in a 1 state following both comparisons, the occurrence value specified by the test signal is present in the input line. Due to the exclusive OR gating to the input of the SW flip flop detection of equality in one step of comparing and the detection of inequality in the other step of comparing is required for the flip flop SW to end up in a 1 state and thereby indicate the presence of the occurrence value at the input line. If both tests produce equality or inequality, the SW flip flop ends up in a 0 state, thereby indicating the lack of the presence of the occurrence value in the input line.

In terms of the system, involving the DEL function, an electronic data processing system is disclosed for checking for the presence of an actual occurrence value out of a series of possible occurrence values arranged in an incremental value order. The checking is for the presence of the actual occurrence value in the input value line of the iso-entropicgram utilizing one of the non-input lines of the same iso-entropicgram. There is disclosed memory means such as the MEMORY MODULE for storing a line value signal representative of a non-input line. Means such as the OLINE register stores a line number signal corresponding to the stored line value signal. Means such as the OHW register stores a length signal. Means such as the ALU of the OUTPUT MODULE forms a difference signal corresponding to the difference in values represented by the stored line number signal and the stored length signal. Means such as the REVOLVER responds to a provided line value signal and a provided number signal for forming any one of a set of equivalent signals. The set includes the line value signal. Each coded signal within a set is unique and related to another one by an exclusive OR of the values thereof and the values thereof relative shifted.

Means such as the DELTA MODULE responds to the difference signal for forming a first signal representing the largest component power of 2 of the difference and for forming a second signal representing the remaining component power of 2 of the difference. Means such as the ORSN register in the OUTPUT MODULE stores the largest component power of 2 signal. The DELTA MODULE provides the remaining component power of 2 signal and the line value signal to the means for forming an equivalent signal (REVOLVER) thereby causing an equivalent signal to be formed. Means such as the ORT1 register forms a means for storing a test signal representing the value of the absolute occurrence value in the input line to be checked for presence. Means such as the ALU of the OUTPUT MODULE forms a means for combining the values represented by the test signal and the length signal to form a further test signal identifying further occurrence value for test. Means such as the ALU of the OUTPUT MODULE compares the value of the test signal with the value of the formed equivalent signal for a predetermined relation. The ALU and the associated timing and logic additionally forms a means for comparing the value of the further test signal with the values of the formed equivalent signal for a predetermined relation. Means such as the SW flip flop is operative during OB19 and responsive to the results of both of the predetermined relations to thereby indicate the presence of an actual occurrence value in the input line corresponding to the test signal.

XV. PIPE MODULE

A. General Description

The general purpose of the PIPE MODULE is to help in the process of locating requests for data out of a large mass of data provided in the data base. The data base disclosed herein is arranged, by way of example, only, into paragraphs, each of which in turn contains sentences, each of which in turn contains words, each of which in turn contains characters. The request may be a word, a phrase, a sentence, or a paragraph.

If a request is always in the data base exactly, it is no problem to retrieve the requested information from the data base. The inexactness between the request and the data base may come about because of misspelling of words, transposing of words, or may be caused just by a lack of knowledge by the requestor as to the exact wording in the data base. For example, the request word "SIT" may be a misspelled word such as "THIS". Problems arise where there is an inexact relation between the request and the data base. The PIPE MODULE and the BRIGHTNESS MODULE cooperate in locating those requests which are exactly or inexactly contained in the data base.

The purpose of the PIPE MODULE then is to determine whether the request is located in the data base exactly or inexactly. To locate inexact requests from the data base, the PIPE MODULE requests or determines which entries (occurrences) in the data base could be used for further selection criteria employed by the BRIGHTNESS MODULE. Thus, the PIPE MODULE selects those entries in the data base which would be candidates for processing by the BRIGHTNESS MODULE. These candidates are then used by the BRIGHTNESS MODULE to select the best possible candidate for the request.

Before considering the theory of the PIPE MODULE, the following terminology should be carefully noted. An "event" is composed of primitive elements which lie between two "delimiters". For example, in the letter layer 0 of Table 1, the events are letters.

"Event time", also called "possible occurrence position", identifies a possible relative position or value in a data base for an event or delimiter occurrence value. An "event occurrence vector" represents event occurrence values, each of which identifies the event time at which an event has occurred. An "entry" is a series of primitive elements, i.e., letters which lie between two delimiters which identify the beginning of two successive entries. For example, in the letter layer 0 an entry such as "THIS" is a word composed of a series of letters between the two delimiters positioned at event times 0 and 5.

Considering the theory of the PIPE MODULE in more detail, the PIPE MODULE employs a selection criteria for indicating to the requestor those possible entries in the data base which might be a response to a request. Two selection criteria are employed by the PIPE MODULE and are as follows.

The first selection criteria is a "pipe width" (PW). The pipe width is an offset value which identifies how far to the right or to the left (above or below) each particular possible occurrence value an actual occurrence value may lie for purposes of the piping function. Those which fall within ± the "pipe width" (PW) are called "hits".

The second criteria is the relationship of the length of the request (LNRQ) to the number of hits within each entry in the data base. The second criteria is important in determining a meaningful number of hits in a data base entry before the entry should be considered as a candidate for the BRIGHTNESS MODULE function. The relationship between the length of the request (LNRQ) and the number of hits is determined by a "threshhold" value which represents the minimum number of hits before a data base entry is considered by the BRIGHTNESS MODULE for processing.

The importance of the second criteria becomes evident by considering the following example. Assume the data base contains the word "THIS" and the request word is "BIG". It is apparent that the I in BIG lies at a position within ± 1 of the position of the I in THIS. However, it is quite apparent that one would not select the word THIS to be sent to the BRIGHTNESS MODULE since there are four entries in the word THIS and only one hit.

The rest of the theory of the PIPE MODULE is best understood by reference to an actual example. Assume the data base depicted in Table 1. Also assume a request occurrence vector THIS. The first step is to pull out the event occurrence vectors for the events THIS from the data base of Table 1. Table 18 sets out the decimal values of the event occurrence values for each of the events THIS. Table 18 also shows the event occurrence vectors for THIS lifted out from the data base of Table 1 in columnar notation. Table 18 on the right side shows the actual occurrence values, in decimal form, of the event occurrence values in each event. The first step is to find out whether the request is in the data base exactly or inexactly. To this end, "bias" values are assigned to the event occurrence vectors identified by a request. Increasing valued bias values are assigned to the event occurrence vectors starting with the number 0. For example, in the request word THIS, the event occurrence vectors for the events T H I S are respectively assigned bias values 0, 1, 2 and 3. The bias values are then subtracted from event occurrence values in the corresponding event occurrence vector. The results are "biased event occurence values".

Table 19, in columnar notation, depicts each event occurrence value in the data base of Table 18, decreased by its bias value. Thus, the bias value for the event "*t*" is 0 and the corresponding event occurrence values remain unchanged. The bias value for the event "*h*" is 1 and the corresponding event occurrence values are decreased by 1 or moved left one place. The bias value for the event "*i*" is 2 and the corresponding event occurrence values are decreased by 2 or moved left two places. The bias value for the event "*s*" is 3 and the corresponding event occurrence values are decreased by 3 or shifted left three places.

It will now be apparent with reference to Table 19 that each of the event occurrence values between the delimiters for event time 0 and 5 will be shifted so that they line up at event time 1. This then gives four hits in event time 1 which is exactly the length of the request word "this". Therefore, an exact entry exists in the data base for the request word "this". It should also be noted that the biased occurrence values for the word "this" in the data base are all lined up at event time 1 which is just one event time away from the delimiter in event time 0 and are therefore associated with the beginning delimiter at event time 0. The resultant biased event occurrence values are depicted at the right of Table 19 in decimal form.

Consider now another example where there is an inexact match between the request and the data base. Assume that the request is the word "SIT". First, the event occurrence vectors for the delimiter and the events S, I and T are pulled out of the data base of Table 1 as depicted in Table 20. The right hand side of Table 20 depicts, in decimal form, the event occurrence values in the event occurrence vectors for the events S I T. Next, the bias values 0, 1 and 2 are assigned for the events S I T and the bias values are subtracted from each of the occurrences in the corresponding event occurrence vectors. Thus, the bias value for the event S is 0 and the corresponding event occurrence values remain unchanged. The bias value for the event I is 1, and the corresponding event occurrence values are decreased or shifted to the left by 1 and the bias value 2 for the next event is 2 and the corresponding event occurrence values are decreased or shifted to the left by 2. The resultant biased event occurrence values are depicted in decimal form on the right side of Table 21.

With respect to the event T, it should be noted that the circled occurrences were biased or shifted below the beginning delimiter for their entry. It is necessary to tag or somehow identify each event occurrence value which is shifted past the corresponding beginning delimiter and hence no longer represents the entry in which it originally appeared.

It is now necessary to satisfy the second criteria, that is, to relate the length of the request (LNRQ) to the number of hits in the data base. This is accomplished by assuming a "total pipe width" of twice the "pipe width" (PW) and associating the center of the "total pipe width" with the rightmost event time in the entry under consideration; counting the number of hits within the "total pipe width"; retaining the number of hits; and moving onto the lower event times to the left, one by one, and for each event time, counting the number of hits within the "total pipe width".

Using the biased event occurrence values of Tables 21 and 28, the first test is made on the biased event occurrence values appearing between event times 10 and 15. The test is depicted in Table 22. It is assumed that the "pipe width" (PW) is 1, and hence the "total pipe width" is 2. Thus, the test starts with event time 14 and the possible biased event occurrence values between ± 1 of 14 are checked. It will be noted that there is a biased event occurrence value at event time 13 for the event S, hence there is a hit value of 1 for event time 14. Event time 13 is then tested. Thus, in effect, the "total pipe width" is slid one place to the left so that it is now centered on event time 13. Again, the number of hits within the "total pipe width" are computed. There is a hit for the event S at 13 and a hit for the event T at 12 and hence the number of hits for event time 13 is 2. This same process is repeated for event times 12 and 11, resulting in hits of 2 and 1 for event times 12 and 11.

For simplicity, if two pipe centers are found with the same number of hits, the first one encountered is selected as the center. Thus, with reference to the lower part of Table 22, event time 13 is selected as the one with the largest number of hits. To be explained in more detail, these values are sent to the BRIGHTNESS MODULE for processing.

Event time 10, containing a delimiter, is skipped, and event time 9 is next selected as the next pipe center. Referring to Tables 1 and 23, it will be seen that this portion of the data base deals with the word "a" and there are no hits for the request S I T.

Referring to Tables 1 and 24, the pipe center is next slid over the delimiter 8 and tests are performed at event times 7 and 6. Two hits are found for the center at event time 6, whereas only 1 is found at event time 7. Event time 5 is skipped over and event times 4, 3, 2 and 1 are selected as centers. It will be noted that for the center at event time 3, 2 hits are again found. It should also be noted that for each of the tests depicted in Tables 22–25, the occurrence value in the ending delimiter had no effect on the rightmost pipe test. The reason for this will become clear when considering the operation of the PIPE MODULE. The three entries for the words "test", "is" and "this" are then passed to the BRIGHTNESS MODULE which makes a decision as to which is the best hit for the request S I T. Before considering the operation of the BRIGHTNESS MODULE, consider in more detail precisely how the PIPE MODULE carries out the foregoing operation.

Within the concepts of the present invention, it is possible to form a module that operates in parallel and looks vertically down across each entry in a data base array such as that in Table 1. The disclosed embodiment of the present inventin involves a PIPE MODULE which does not look down vertically across each entry but instead looks at the entries serially by occurrence value and entry. To this end, the PIPE MODULE is arranged to keep track of the left shifted or biased event occurrence values. This is accomplished by storing in the PIPE/BRIGHTNESS MEMORY (P/B MEMORY) each different biased occurrence value and a "hit count" equal to the number of times the biased event occurrence value occurs. In other words, in subtracting the bias value from each event occurrence value in the same event occurrence vector, the same biased occurrence value may occur more than once. By storing each different biased event occurrence value and its hit count, it is possible to keep track of the number of times it has occurred simply by upping the hit count by 1 whenever a further one is encountered.

Referring to the example shown in Table 19, the following will be noted. At event time 1, the biased event occurrence values for the entry "THIS" are all lined up at event time 1 and hence event time 1 can be assigned a maximum hit count of 4. It will also be noted that the length of the request (LNRQ) for "THIS" is 4and therefore is exactly the same as the hit count. This indicates that the entry appears exactly in the data base. Thus, instead of placing one row beneath the other as depicted in Table 19, the PIPE MODULE disclosed herein utilizes the approach where information is represented by biased actual event occurrence values and hit counts. One further condition should be noted. If the biased event occurrence value is less than or passes across a beginning delimiter for the corresponding entry, a decision is made as to whether it is included or is not included within the corresponding entry. For example, in Table 21, the biased event occurrence values −1 and 9 for the event T are less than the beginning delimiter values 0 and 10, respectively. A rule has been laid down that if a biased event occurrence value lies within the "pipe width" of the lowest event occurrence value in an entry and its value is less than the beginning delimiter for the corresponding entry, then use a biased occurrence value equal to the beginning delimiter for the entry. This is an artificial value which avoids computational problems relating to those biased event occurrence values which slide into another entry from their original entry.

Consider now how the PIPE MODULE handles an exact match between the request and the data base. Table 26 depicts the transformation of the columnar notation of Table 19 into linear notation. Four passes are required. The transformation is done serially by event and serially by event time (possible occurrence value position) within each event. Consider the example of Table 26 (corresponding to Table 19) for the request "THIS". The entry "THIS" is now linearized in four passes. During pass 1, the event occurrence vector for "T" is processed. Table 18 reveals that the "T" event occurrence vector, in decimal notation, is 1, 11, 14. Table 19 reveals that the bias value is 0 for the first event T. Therefore, the decimal form of the biased event occurrence values is 1, 11 and 14 directly. With reference to Table 26, the decimal biased event occurrence values 1, 11 and 14, along with a hit count of 1 for each, are stored in the P/B MEMORY.

During pass 2, the event occurrence vector for the event H is processed. According to Tables 19 and 20, for the second event H the bias value is 1 and the event occurrence vector is the decimal value 2.

Subtracting the biased value 1 from the occurrence value 2 results in a biased event occurrence value of 1. Accordingly, a biased event occurrence value of 1 and a hit count of 1 were stored in the auxiliary memory. Therefore it is only necessary to up the hit count from 1 to 2 for the previously stored biased event occurrence value 1.

During pass 3, the event I is processed. According to Tables 19 and 20, the bias value for the third event I is 2 and the decimal occurence vector is 3, 6. Subtracting the bias value 2 results in the biased event occurrence values 1 and 4. The biased occurrence value 1 and hit count of 2 are already present in the auxiliary memory from pass 2 and therefore the hit count of 2 is merely increased to 3 and the biased occurrence value of 4 with its hit count of 1 are added to the auxiliary memory.

During pass 4, the event S is processed. According to Tables 19 and 20, the fourth event S has a bias value of 3 and a decimal event occurrence vector of 4, 7, 13. Subtracting the bias value 3 results in the biased event occurrence values 1, 4 and 10. Referring to Table 26, pass 3, the auxiliary memory already contains biased occurrence values 1 and 4, hence it is only necessary to up the hit counts for biased occurrence values 1 and 4 from 3 to 4 and 1 to 2, and introduce the biased event occurrence value 10 with its hit count of 1. Thus, what has been disclosed above is a method for linearizing from the information layer depicted in Tables 1, 2 a request represented by the occurrence vector for "THIS". The linearization is represented by the biased event occurrence values and hit counts depicted at pass 4 of Table 26. This linearized result corresponds to that depicted in Table 19. Thus, the linearized result formed by the PIPE MODULE and stored in the P/B MEMORY is nothing more than a translation of the columnar array-type display depicted in Table 19.

Table 27 provides an example of how the columnized information of Table 21 may be converted into linearized form. Quite importantly, Table 27 involves an inexact match between the request and the data base array. The first event is S and its bias value is 0. Therefore, during pass 1, the decimal occurrence values 4, 7, 13 for the event occurrence vector of S are transferred directly to auxiliary memory, each associated with a hit count of 1. The second event is I and its bias value is 1. During pass 2, the decimal occurrence values 3 and 6 for the event occurrence vector of I are decreased by 1, resulting in biased event occurrence values 2 and 5. Since during pass 1 these biased event occurrence values were not formed, they are stored along with their corresponding hit counts of 1 in the P/B MEMORY. The third event is T and its bias value is 2. During pass 3, the decimal event occurrence values 1, 11 and 14 for the event occurrence vector of T are decreased by 2, resulting in biased event occurrence values of −1, 9 and 12. Assume a "pipe width" (PW) of ± 1. The lowest event occurrence value for the entry THIS is 1 and therefore the biased event occurrence value of −1 is outside of the pipe width. As a result, the biased event occurrence value of −1 is ignored. Similarly, the biased event occurrence value 9 is less than the delimiter 10 for the entry "TEST", and is more than the 1 below the lowest occurrence value and is likewise disregarded. Therefore, the biased event occurrence value of 12 with its hit count of 1 is added to the result depicted in pass 2 with the result depicted at pass 3 in Table 27. The linearized result depicted at pass 3 corresponds to the columnar result depicted in Table 21.

Steps are now taken to satisfy the second criteria, namely, to determine the relationship of the length of request (LNRQ) to the number of hits within each entry in the data base. More specifically, the number of biased event occurrence values within ± the pipe width of each possible event time is determined. The next step then is to perform the operation depicted in Tables 22–25 using the linearized results depicted as pass 3 of Table 27.

Table 28 depicts the linearized result depicted at pass 3 of Table 27. All of the possible event times 0 through 15 are depicted and immediately below event times 2, 4, 5, 7, 12 and 13 are shown the number of hit counts for the corresponding event time. Those event times which are underlined in Table 28 have no corresponding biased event occurrence value. The next step is to pass the total pipe width across the linearized result and transform it into the piping values. This step corresponds to the steps depicted in Tables 22 through 25. The procedure as outlined above is to select the total pipe width and count the total number of hits within the total pipe width, using each event time as a pipe center except for the event times corresponding to the delimiter occurrence values.

Table 29 depicts the operation where the pipe width is passed across the event between delimiters 15 and 10, centering the total pipe width at event times 14, 13, 12 and 11. At the right side of Table 29 the total number of hits for each pipe center is depicted. With the pipe centers at 13 and 12, maximum hit count of 2 is reached and therefore the first pipe center of 13 is selected for output along with its hit count of 2.

The next entry lies between the delimiters at event times 10 and 8. Therefore, the total pipe width is placed with its center at event time 9. No biased occurrence values are present at this pipe location and a −1 is outputted to indicate that there are no hits.

Referring to Table 31, the next tests are made for the event times 6 and 7 between the delimiters 8 and 5. With the pipe centers at 7 and 6, the number of hits depicted at the right of Table 31 are found, with the maximum number of hit count being 2 for the pipe center at event time 6. Therefore, the biased event time 6 and the hit count 2 are outputted as being the maximum hit count.

Similar tests are made for event times 4, 3, 2 and 1 between delimiters 5 and 0 as depicted in Table 32. Here it is found that the pipe center at event time 3 produces the maximum hit count of 2 and therefore the bias value 3 and hit count 2 are output.

B. Components

FIGS. 35–38 form a schematic and block diagram of the PIPE MODULE. Table 33 lists the various registers, counters and flip flops in the PIPE MODULE. The registers and counters are of the following types shown in the above TTL book and have the following states and/or bits (or flip flops) of storage: counters M1, M2, M3, N, BIAS are of type SN74161 and each has 8 bits of storage; registers OUT, PSAV, MAX, DI, T, RII, RI, S, PW, LNRQ, are of type SN74100 and each has 8 bits of storage (except MAX, which has 7 bits); counters CV, PWC are of type SN74191 and each has 8 bits of storage. The most significant flip flop (or bit) in register RII is for a sign bit. An output SRII is connected to this flip flop and receives a true signal when the sign is − (sign flip flop is in a 1 state) and a false signal when the sign is +.

Also included are switches 901–904. The switches are conventional mechanical switches or other electronic circuits which form an 8 bit binary coded signal at the information input of the corresponding selection circuit representing, in binary code, the decimal digit depicted inside each box.

The flip flops PFIRST, PLAST, PFLG, SM, SGN, ET and ET and control counter flip flops P1 through P35 are each of the same type and have the same characteristics as that described above. The flip flops P1 through P35 and the corresponding gating circuitry form the control counter 913.

The generalized clock control 700 is the same as that discussed above and is depicted here in block diagram.

The PIPE MODULE also includes an arithmetic unit (ALU). The ALU is the same type disclosed hereinabove with respect to the ENCODE MODULE.

The G output of the arithmetic unit ALU is connected to the $\bar{G}$ output through a logical signal inverter 918. The logical signal inverters 914, 916 and 918 are each a conventional logicl signal inverter which forms a complementary logical signal at its output corresponding to the signal at its input.

Figure 38:
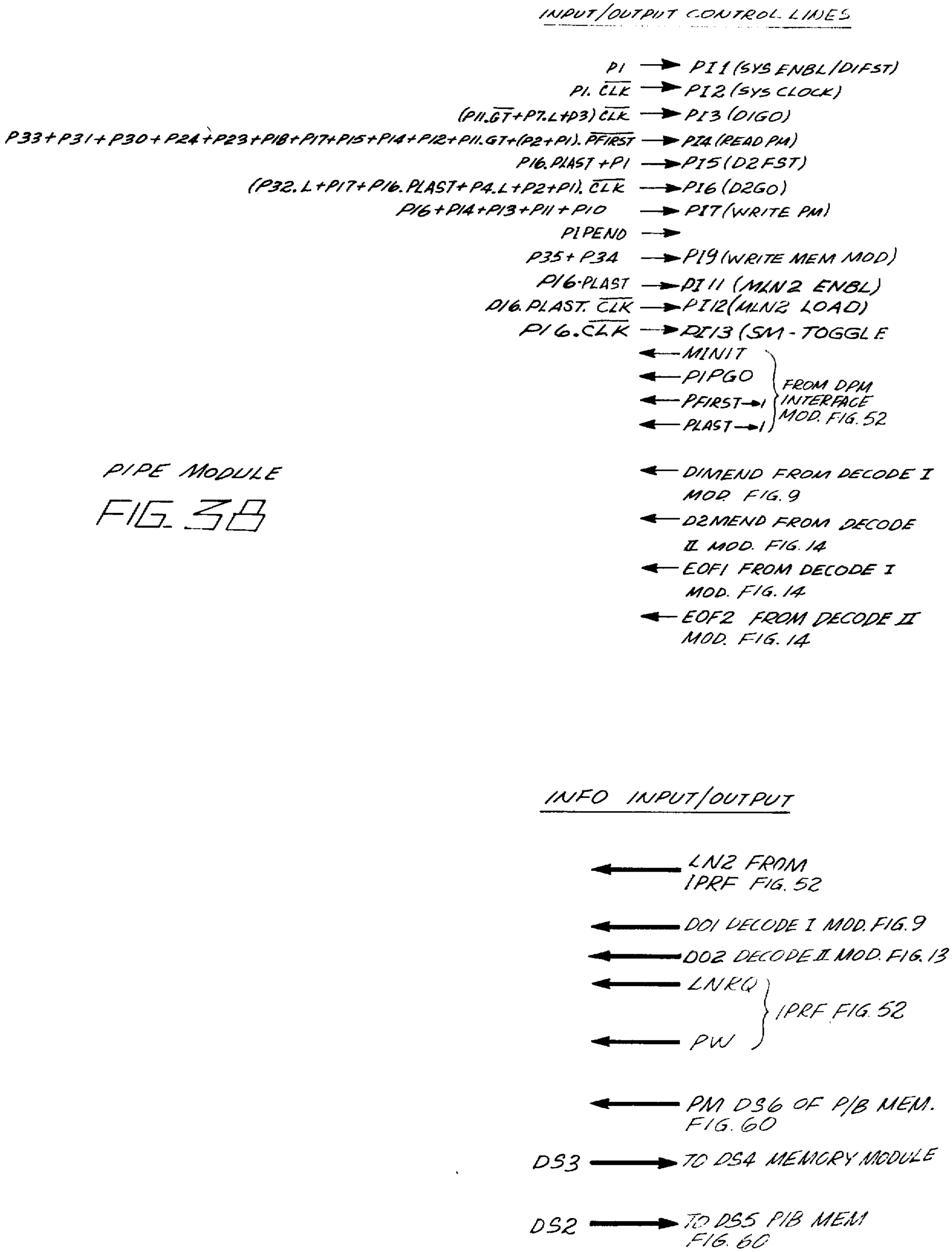

FIG. 38 depicts the input/output control lines and the information input/output circuits for the PIPE MODULE. The arrows to the right depict outgoing signals whereas arrows to the left depict incoming signals. The outgoing control input/output lines each have a symbol at the arrowhead identifying the line and, in parentheses following the symbol, symbols corresponding to the part of the rest of the system to which the control signal lines are primarily intended to go. Heavy lines depict multiple lines for carrying multiple bits of information in parallel throughout the PIPE MODULE and block diagram.

Logical equations are used to represent the required gating for operating the PIPE MODULE. Clock suspension logic 922 causes the clock generator 700 to suspend the pulses at CLK and thereby suspend operation of the PIPE MODULE under the conditions outlined in more detail hereinafter.

C. Detailed Description

Figure 39:
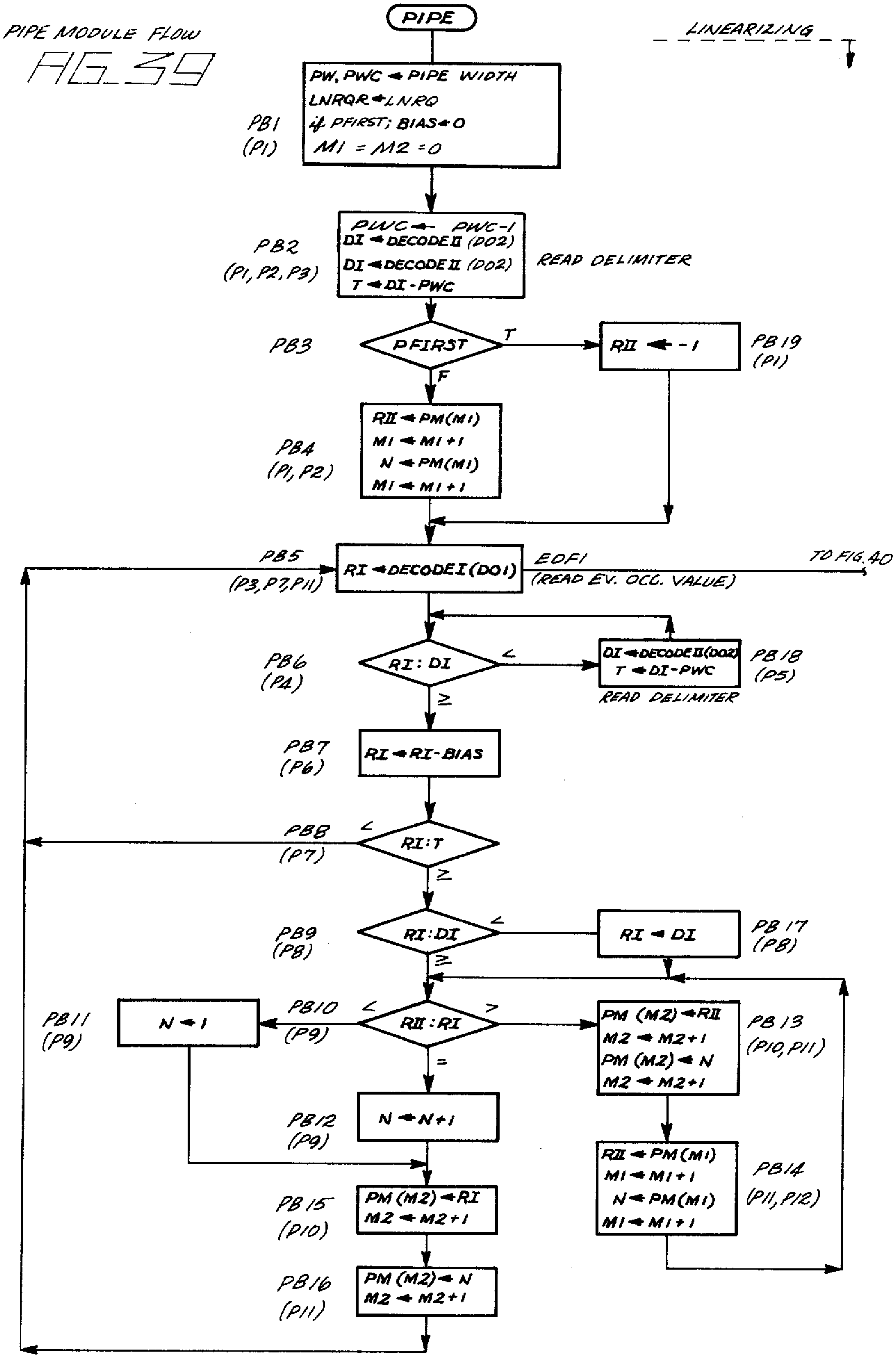
FIGS. 39, 40 and 41 form a flow diagram illustrating the sequence of operation of the PIPE MODULE.
Figure 40:
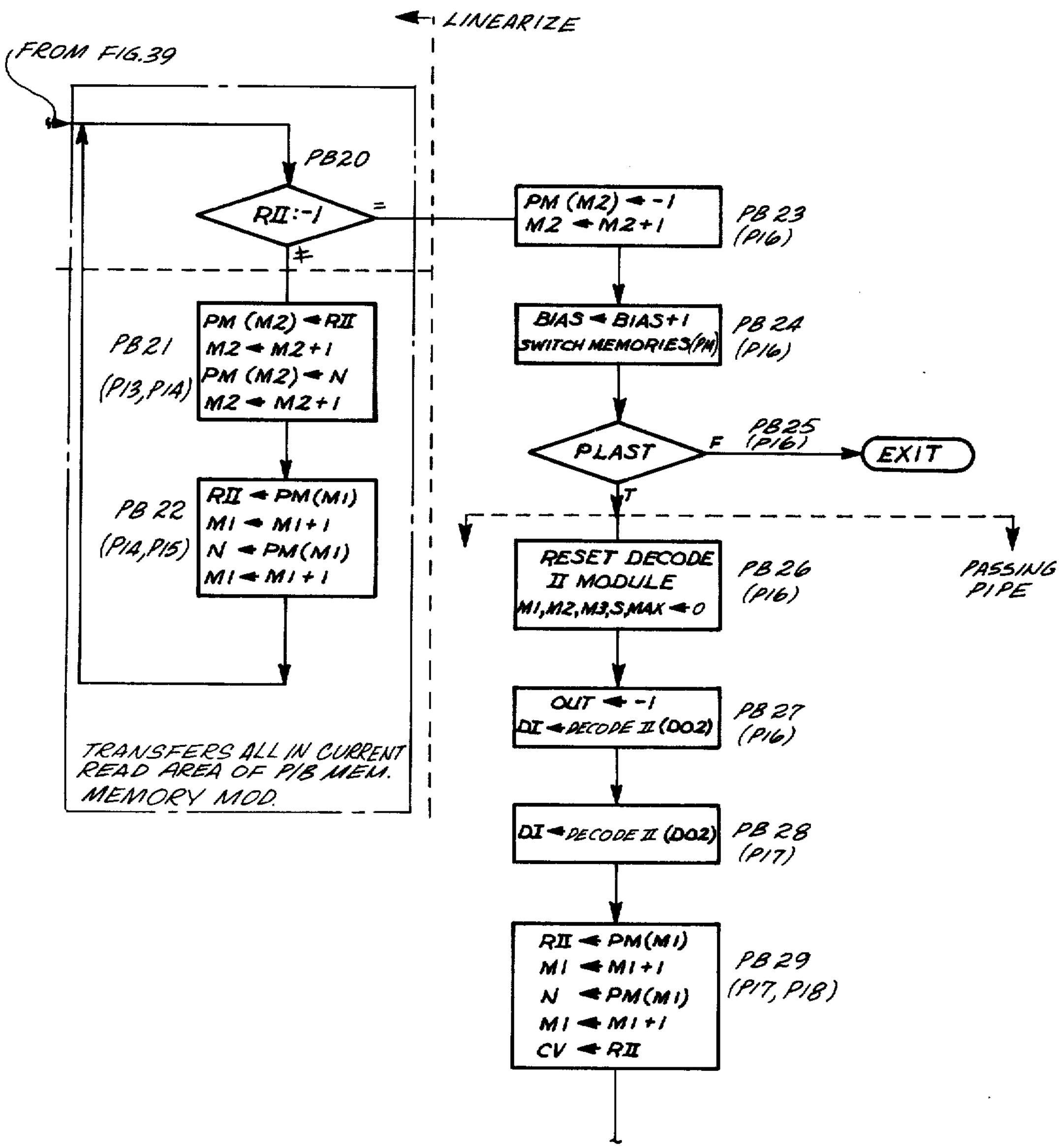
Figure 41:
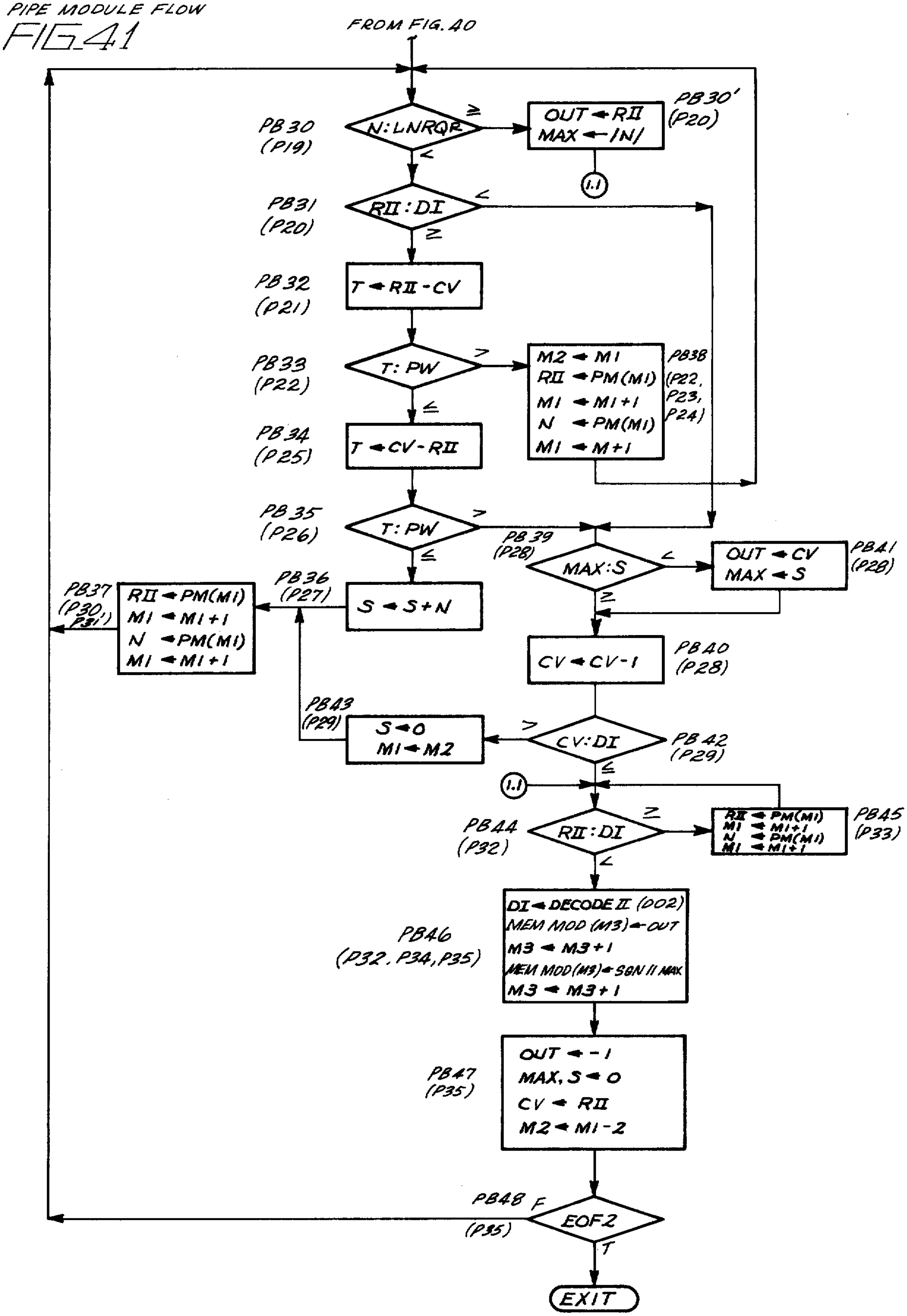

FIGS. 35–38 form a schematic diagram of the PIPE MODULE. FIGS. 39–41 form a flow diagram depicting the sequence of operation of the PIPE MODULE. Symbols are shown adjacent each of the boxes in the PIPE MODULE flow. A symbol PB followed by different numerals identifies the various boxes in the PIPE MODULE flow. In addition, the symbols P1–P35 are used to correlate the corresponding boxes to one of the flip flops P1–P35 of the control counter 913 which is in a 1 state.

In operation, the PIPE MODULE linearizes the event occurrence vectors for a corresponding request during PB1 through PB20 of the PIPE MODULE flow. A special loop is formed at PB20, PB22 of the PIPE MODULE flow to assure that everything has been written out to the P/B MEMORY at the appropriate point in operation of the module. The maximum number of hits within the pipe, for each pipe center, is determined during PB26–PB48 of the PIPI MODULE flow.

Consider now the details of the system, assuming that a pipe operation is about to take place. The MINI COMPUTER and its program perform the following operations:

First, a request is formed at the operator console of the MINI COMPUTER. Second, the MINI COMPUTER determines the layer in the data base contained in the auxiliary memory to which the request is to be applied. Third, the event occurrence vector for each event, which is stored in auxiliary memory, is retrieved using standard data processing techniques. The request events are used as indices into the data base. Fourth, the seed of the event occurrence vector for each event in the request is selected one by one by the MINI COMPUTER, stored in the MEMORY MODULE and passed to the OUTPUT MODULE for conversion from seed form to the input line of the corresponding iso-entropicgram (in hybrid coded form). Fifth, the hybrid coded event occurrence vector is passed to the PIPE MODULE. Each subsequent event occurrence vector is selected, converted and passed to the PIPE MODULE only after the previous event occurrence vector has been processed. Sixth, the MINI COMPUTER causes the pipe width (PW) and length of request (LNRQ) to be sent to the PIPE MODULE which, in turn, processes the event occurrence vectors one by one. Seventh, following the processing of each event occurrence vector, the PIPE MODULE notifies the MINI COMPUTER that it is ready for the next event occurrence vector. Eighth, the MINI COMPUTER responds by repeating the above procedure of obtaining the seed of the next event occurrence vector, passing it through the OUTPUT MODULE, thereby converting it to its input line form, storing the input line in the MEMORY MODULE, and calling the PIPE MODULE for processing. The foregoing operation continues until the PIPE MODULE processes the last event in the request, at which time the PLAST flip flop in the PIPE MODULE is set to a 1 state by the MINI COMPUTER, notifying the PIPE MODULE that the last event is being processed.

With the foregoing general operation in mind, consider now the example depicted at Tables 20, 21, 26–30. Table 11 illustrates the major input/outpt for the PIPE MODULE. Before each call on the PIPE MODULE, it is assumed that the event occurrence vector about to be processed has been passed through the OUTPUT MODULE and has therefore been converted from seed form to the input line (0) of its iso-entropicgram and stored, in hybrid code, in MEMORY MODULE area 1. Initially, the delimiter occurrence vector is also passed through the OUTPUT MODULE, converted from seed form to the input line of its iso-entropicgram, and stored, in hybrid code, in MEMORY MODULE area 2. Initially, all of the registers and flip flops in the PIPE MODULE are cleared or reset to 0, by a control signal at MINIT from DPM INTERFACE MODULE.

At this point the DPM INTERFACE MODULE forms a control signal at the output FIRST = 1, setting the PFIRST flip flop in the PIPE MODULE to a 1 state. The 1 state of flip flop PFIRST indicates that this is the first pass through the PIPE MODULE.

The inputs for operating the PIPE MODULE for the example depicted in Tables 20, 21, 26–30 are as follows: pipe width = 1; length of request (LNRQ) = 3; length of the first event occurrence vector (LN1) = 3; length of delimiter occurrence vector (LN2) = 4;

| | | |
|---|---|---|
| Memory Area 1 | 10001101 | event occurrence |
| of MEMORY | 00100000 | vector = 13, 7, 4 |
| MODULE | 00000010 | in hybrid code |
| Memory Area 2 | 10001111 | delimiter occurrence |
| of MEMORY | 01010000 | vector = |
| MODULES | 00000100 | 15, 10, 8, 5, 0 |
| | 00000001 | in hybrid code |

The MINI COMPUTER forms a control signal on the control line PIPGO, causing the clock control 700 to be activated and commence forming clock pulses at CLK and $\overline{CLK}$. Since all of the flip flops P1 through P35 have been reset to a 0 state, the upper left hand input of flip flop P1 is true and therefore the true pulse at CLK (hereinafter called pulse CLK) sets the P1 flip flop to a 1 state, causing PB1 of the PIPE MODULE flow to be entered.

During PB1, a true signal is formed at the P1 output of flip flop P1 and hence the control counter 913, causing the L input of register PW and the CLR inputs of address counters M1 and M2 to be true, which in turn causes the PIPE WIDTH in IPRF to be stored into register PW and address counters M1 and M2 to be cleared to 0. Additionally, the logic P1·PFIRST is true, causing the CLR input of the register BIAS to be true, thereby clearing the register BIAS to 0. The logic P1·PFIRST·$\overline{CLK}$ also comes true which, in turn causes a true signal at the L inputs of the PWC counter and LNRQR register, causing the PIPE WIDTH signal and the LNRQ signal fom the IPRF (FIG. 52) to be stored into the PWC counter and LNRQR register, respectively.

Additionally, during PB1, the control signal at P2.PFIRST causes the pipe width signal stored in the PWC register to be counted down 1. Since the pipe width is initially 1, the resultant signal in the PWC register is 0. Thus, at the end of PB1 of the PIPE MODULE flow, the PW register contains the pipe width value 1, the LNRQR register contains the request length of 3, and the PWC counter contains a 0.

In summary then, during PB1, the registers and various flip flops in the PIPE MODULE are initialized and since this is the first time through the PIPE MODULE, the PFIRST flip flop is in a 1 state.

Referring to the control input/output lines in FIG. 38, the true signal at the P1 output causes a true signal at the P11 output which, in turn, causes an ENABLE signal to be applied to the DECODE I MODULE, thereby resetting register MAR1 to 0, enabling LN1 through a data selector to the MLN1 register and setting D1FST to 1. The true signal at the P11 output is also applied to the DECODE II MODULE thereby resetting register MAR2 to 0, enabling the LN2 through a data selector to register MLN2 and to the SWITCH MATRI, thereby setting flip flops S11, S22 and S33 to 1. Additionally, logic P1.$\overline{CLK}$ is true, causing a true signal at the PI1 output which in turn causes a true signal to be applied at the L inputs of the MLN1 and MLN2 registers of the DECODE I and II MODULES, causing the LN1 and LN2, respectively, to be stored therein.

The true condition of logic P1.$\overline{CLK}$ also causes a true signal at output PI6 which sets the D2GO one-shot multi-vibrator in the DECODE II MODULE thereby calling the operation of DECODE II MODULE. This causes the last delimiter occurrence value 15 for the last entry to be read and discarded.

The true signal at the P1 output of flip flop P1 causes the P2 flip flop to be set to a 1 state and the P1 flip flop to be reset to a 0 state with the following CLK pulse and thus PB2 of the PIPE MODULE flow is entered.

It should be noted at the outset that the clock suspension logic 922 is depicted by the equation P13.$\overline{D1MEND}$ + P16.$\overline{D2MEND}$. PI3 and PI6 become true when the DECODE I and II MODULES, respectively, are called. Hence, the generalized clock 700 is disabled, thereby disabling the CLK and $\overline{CLK}$ pulses whenever the DECODE I and II MODULES are called. When the DECODE I and II MODULES complete decoding and providing an occurrence value to the PIPE MODULE, D1MEND and D2MEND become true and hence the suspension logic 922 goes false and the generalized clock control is enabled to provide its CLK and $\overline{CLK}$ pulses.

The DECODE II MODULE operates on the delimiter occurrence vector in the MEMORY MODULE area 2. During PB2, the DECODE II MODULE is called twice. On the first call, the ending delimiter 15 for the last entry in the data base is decoded and skipped. Thus, the second call causes the beginning delimiter 10 for the last entry to be decoded and formed in register DO2.

To this end, the true signal at the P2 output of flip flop P2 causes no action except that at the following CLK pulse, the P3 flip flop is set to a 1 state and the P2 flip flop is reset to a 0 state, thereby forming a true signal at the P3 output.

The true condition of logic P2·$\overline{CLK}$ again causes a true signal at the output PI6 and thereby sets the D2GO one-shot multivibrator in the DECODE II MODULE for a second time. This time the DECODE II MODULE reads the beginning delimiter 10 for the last entry and subsequently forms the delimiter signal at the DO2 output. The DI register is connected to the DO2 output from the DECODE II MODULE and the true signal at the P3 output causes the L input of the DI register to be true and hence couple the delimiter from DO2 to the output of the DI register. The true signal at the P3 output also causes the DS10 selection circuit to couple the delimiter 10 from the output of the DI register to one input of the ALU and causes the DS11 selection circuit to couple the decremented PIPE WIDTH 0 from the PWC counter to the other input of the ALU. The true signal at the P3 output also causes the S input to the ALU to be true and the ALU subtracts 0 from the delimiter 10, forming the result 10 at OP. When the true signal is formed at the $\overline{CLK}$ output, the logic $\overline{CLK}$.P3 becomes true, the L input of the T register receives a true signal and the T register stores the result 10 at OP. It should be noted that the value in T is equal to the delimiter 10 minus the decremented PIPE WIDTH in PWC. This value in T is the minimum occurrence value (or event time) that will be considered for a biased event occurrence value. Any biased event occurrence value for the entry between delimiter values 0 and 15 that is smaller will be ignored.

During PB3, the state of the PFIRST flip flop is checked. Since this is the first pass through the PIPE MODULE, thw PFRIST flip flop is in a 1 state and hence PB19 is entered.

During PB19 the following action takes place in response to the true signal at the P1 output. The logic P1.PFIRST is true, thereby causing the −1 (2's complement of 1) formed at the output of the switches 904 to be coupled through to the input of register RII by the DS7 selection circuit. The logic CLK.P1 causes the L input to the RII register to be true and hence the RII register is loaded with a −1. This is a forced value that is used during PB10 to insure that all event occurrence values are decoded and stored in the P/B MEMORY. Flip flops P2 and P3 are sequentially set to a 1 state and when P3 is 1, PB5 is entered.

During PB5, the logic P3.$\overline{CLK}$ is true and causes the output PI3 to be true which in turn sets the D1GO one-shot multivibrator in the DECODE I MODULE true. This in turn causes the DECODE I MODULE to be called so that it decodes and provides the first event occurrence value 13 from the event occurrence vector stored in hybrid form in MEMORY MODULE area 1.

The true signal at PI3 always calls the operation of the DECODE I MODULE and the operation of the PIPE MODULE is suspended until the DECODE I MODULE has decoded the next event occurrence value 13. The logic $\overline{P6 + P8}$ is true and hence the DS8 selection logic receives a true signal at the DI input, causing the event occurrence 13 from DO1 to be coupled through to the input of the RI register. The end of file has not been reached by the DECODE I MODULE and a true signal is formed at the $\overline{EOF1}$ output from the DECODE I MODULE. Therefore, logic $\overline{EOF1}$·P3 is true, causing the P4 flip flop to be set to a 1 state and the P3 flip flop to be reset to a 0 state at the following CLK pulse and PB5 is entered. During PB5, a true signal is now formed at the P4 output. The true signal at the P4 output of the flip flop P4 causes the L input of the RI register to be true and hence load the event occurrence value 13 from the event occurrence vector into the RI register. Though the flow shows DECODE I MODULE being called during PB5, the actual load into RI takes place during PB6.

The true signal at the P4 output also causes the control input for register R1 of the DS10 selection circuit and the control input for register DI of the DSII selection circuit to receive true signals and hence couple the output of the registers R1 and DI to the input of the ALU. The true signal at the P4 output also causes the compare input of the ALU to be activated and hence the first occurrence from the event occurrence value contained in register RI is compared with the delimiter 10 contained in the DI register. If the event occurrence value contained in register RI is ≧ the delimiter contained in register DI, PB7 is entered. However, should the event occurrence vector contained in register RI be < the delimiter contained in DI, the PIPE MODULE would have in register RI an event occurrence value which is less than the delimiter and hence would fall into the next lower entry and, under this situation, PB18 would be entered.

Since the event occurrence value is 13 and the delimiter is 10, the content of register RI will be the larger, hence the ALU will form a true signal at the G output which, in turn, causes the OR gate 910 to form a true signal at the GE output. A true signal is now formed by the logic P4·GE, causing the P6 flip flop to be set to a 1 state and the P4 flip flop to be reset to a 0 state at the following CLK pulse, thereby causing PB7 of the PIPE MODULE flow to be entered.

Since we are now dealing with the first entry in the request, or the first event occurrence vector, the bias is 0 and hence the BIAS register contains a 0. During PB7, the bias of 0 is subtracted from the event occurrence value contained in register RI and the result is stored back into register RI. To this end, the true signal at the P6 output of flip flop P6 causes true signals at the control inputs of the DS11 and DS10 selection circuits for registers BIAS and RI, respectively, thereby causing these registers to be coupled to the inputs of the ALU. Additionally, the true signal at the P6 output causes the S input of the ALU to be true and the control input of the DS8 selection circuit for OP to be true. Thus, the ALU subtracts the content 0 of the BIAS register from the content 13 of the RI register, forming a biased event occurrence value 13. The DS8 selection circuit couples the biased event occurrence value 13 to the input of the RI register. Additionally, the logic P6.$\overline{CLK}$ is true, causing the L input of the RI register to be true and the biased event occurrence 13 is stored back into register RI.

The true signal at the P6 output causes the flip flop P7 to be set to a 1 state and the flip flop P6 to be reset to a 0 state at the following CLK pulse, causing PB8 to be entered. During PB8, the biased event occurrence value 13 in register RI is compared with the lower occurrence value limit 10 contained in register T. To this end, the true signal at the P7 output causes true signals at the control input of selection circuits DS10 and DS11 for the RI and T registers, respectively, thereby causing these registers to be coupled to the inputs of the ALU. Additionally, the true signal at P7 causes the C input of the ALU to be true. The biased event occurrence value in register RI is > the lower occurrence value limit in register T, causing the ALU to form a true signal at the G output which in turn causes the OR gate 910 to form a true signal at the GE output. The logic P7.GE now becomes true and at the following CLK pulse, the P8 flip flop is set to a 1 state and the P7 flip flop is reset to a 0 state, causing PB9 to be entered. Note that if the biased event occurrence value in register RI were smaller, a true signal would have been formed at the L output of the ALU and PB5 would be re-entered where the next to lower event occurrence value would be read.

During PB9, the biased event occurrence value in register RI is compared with the delimiter, of the entry now under consideration, in register DI. To this end, the true signal at the P8 output causes a true signal at the control input of registers DS10 and DS11 for the registers RI and DI, in turn, couples these registers to the input of the ALU. The true signal at P8 also causes the C input of the ALU to be true and hence the ALU compares the content of RI with that of DI. The biased event occurrence value 13 in register RI is > the delimiter 10 in register DI and hence a true signal is formed at the GE output of gate 910, causing PB10 to be entered.

It should be noted that should the biased event occurrence value in register RI be < the delimiter of DI, the PIPE MODULE would be operating on a biased occurrence value which is below the delimiter for the entry under consideration. Therefore, according to the rules laid down above, the delimiter in register DI would be transferred to register RI for subsequent storage in the P/B MEMORY.

Return now to the example. During PB9, the biased occurrence value in register RI is > the delimiter in register DI and hence a true signal is formed at the P8 output and the following CLK pulse causes the P9 flip flop to be set to a 1 state and the P8 flip flop to be reset to a 0 state, thereby causing PB10 to be entered.

Register RII was forced to store a value −1 during PB19. Register RI contains the biased event occurrence value 13. During PB10, content of these registers are compared. Since the biased event occurrence value 13 in register RI is the larger, PB11, PB15 and PB16 is entered where biased occurrence value 13 is stored in the P/B MEMORY along with a hit count of 1. In operation, the true signal at the P9 output causes a true signal at the control input of the DS10 and DS11 selection circuits corresponding to registers RII and RI, causing the content of these registers to be coupled to the input of the ALU. The true signal at the output P9 also causes the C input of the ALU to be true, causing the ALU to compare the content of registers RI and RI. Since register RII contains a −1, it is the smaller, and a control signal is formed at the L output of the ALU.

A true signal is formed by the logic P9·L·$\overline{CLK}$ hence PB11 is entered. Also, the control input of the DS6 selection circuit corresponding to the switches 903 receives a control signal and the Ct input of the N counter receives a true signal. Thus, the DS6 selection circuit couples the signals representing a 1 from the switches 903 to the input of the N counter and the true signal at the L input causes the 1 to be stored into the N counter. The true signal at the P9 output also causes the P10 flip flop to be set to a 1 state and the P9 flip flop to be reset to a 0 state at the following CLK pulse, thereby causing PB15 to be entered.

During PB15 and PB16, the biased event occurrence value 13 in register RI and its hit count of 1 now in the N counter are stored into the P/B MEMORY. To this end, the CLK pulse, in combination with the true signal at the P9 output, causes the flip flop P10 to be set to a 1 state and the P9 flip flop to be reset to a 0 state, thereby causing PB15 to be entered. At this time, the GT flip flop is in a 0 state, causing a true signal at the $\overline{GT}$ output. Hence, the logic P10.$\overline{GT}$ is true, causing a true signal at the control input of the DS2 selection circuit, corresponding to the RI register. This causes the DS2 selection circuit to couple the biased event occurrence value register RI to the P/B MEMORY. The true signal at the P10 output causes a true signal at the P17 output of the input/output control signal lines going to the P/B MEMORY. This then causes the P/B MEMORY to store the biased event occurrence value contained in register RI into the location specified by the address contained in address counter M2. Additionally, when the $\overline{CLK}$ pulse occurs, the logic P17.$\overline{CLK}$ is true, causing the Ct input of the address counter M2 to receive a true signal and the address therein is increased by 1. Thus, the M2 address counter now stores the address 1. The true signal at the P10 output at the following CLK pulse causes the flip flop P11 to be set to a 1 state and flip flop P10 to be reset to a 0 state, thereby causing PB16 of the PIPE MODULE flow to be entered.

During PB16, a true signal is formed at the P11 output. The true signal at the P11 output causes the control input of the DS2 selection circuit corresponding to the N counter to receive a true signal and hence the DS2 selection circuit couples the output of the N counter to the input of the P/B MEMORY. Additionally, the true signal at P11 causes the input/output control signal line PI7 to receive a true signal and enable the write operation of the P/B MEMORY. Thus, the hit count of 1 contained in the N counter is stored into the P/B MEMORY at the location immediately following the location of the biased event occurrence value. Additionally, the true signal at P18 output causes the C*t* input of the M2 address counter to again receive a true signal which, in turn, causes the address to be counted up to address 2.

Following PB16, PB5 is again entered where the next event occurrence value 7 in the event occurrence vector is obtained by the DECODE I MODULE from MEMORY MODULE area 1. Referring to the input-/output control signals, the logic P11.$\overline{GT}$.$\overline{CLK}$ is now true, thereby causing a true signal at the P13 output which in turn sets the DIGO one-shot multi-vibrator in the DECODE I MODULE to a true state, calling the operation of the DECODE I MODULE, causing the event occurrence 7 to be read and stored into the RI register as discussed above.

PB6 is now entered where the next event occurrence value 7 in register RI is compared with the delimiter 10 in register DI. This time it is found that the event occurence value 7 contained in register RI is < the delimiter 10 in register DI. Therefore, a true signal is formed at the L output of the ALU. Returning to PB6, a true signal is now formed at the P4 output and the logic P4.L is true. Therefore, at the following CLK pulse, the flip flop P5 is set to a 1 state and the flip-flop P4 is reset, causing PB18 of the PIPE MODULE flow to be entered.

During PB18, the next lower delimiter 8 is read from MEMORY MODULE area 2 and the modified pipe width value of 0 contained in PWC is subtracted therefrom to form a new lower event occurrence value limit in the T register. To this end, the true condition of logic P4·L formed during PB6 causes the logic P4·L·$\overline{CLK}$ to be true and form a true signal at the PI6 output. The true signal at the PI6 output causes the D2GO one-shot multivibrator to be set true and the DECODE II MODULE to be called again, causing it to read the next lower delimiter occurrence value 8 from the delimiter occurrence vector contained in MEMORY MODULE area 2. The logic PI6·$\overline{D2MEND}$ is now true and the operation of the PIPE MODULE is suspended while the DECODE II MODULE decodes the next delimiter. After the DECODE II MODULE provides the next delimiter, the $\overline{D2MEND}$ output therefrom becomes false and hence the logic P16·$\overline{D2MEND}$ goes false, enabling generalized clock generator 700 to again provide the CLK pulses. The true signal at the P5 output enables a true signal at the L input of register DI and hence the delimiter occurrence value 8 formed at the DO2 output of the DECODE II MODULE is coupled through the DI register. As before, the 0 value contained in register PWC is subtracted from the newly provided delimiter occurrence value 8, causing a lower event occurrence value limit of 8 which is stored into the lower limit register T. During PB6, the event occurrence value 7 in register RI is compared with the new delimiter in register DI. The event occurrence value 7 is still smaller and therefore PB18 is again entered where the next lower delimiter occurrence 5 is read out, decremented by the content 0 of register PWC to form a new lower event occurrence value limit of 5 in lower limit register T.

Following PB18, PB6 is again entered where the event occurrence value 7 in register RI is compared against the new delimiter occurrence 5 in register DI. This time, the event occurrence value 7 is larger and the gate 910 forms a true signal at the GE output, causing the logic P4·GE to be true, thereby causing the P6 flip flip to be set to a 1 state and PB7 is entered.

During PB7, the bias value of 0 contained in the BIAS register is subtracted from the event occurrence value 7 in register RI and the resultant biased event occurrence value 7 is stored back into the RI register. Following PB7, PB8 is again entered.

During PB8, the biased event occurrence value 7 in register RI is compared against the lower event occurrence value limit 5 in register T. The biased event occurrence value 7 is the larger and therefore PB9 and PB10 are reentered. During PB10, the RII register still contains a −1 and therefore is the smaller, causing PB11, PB15 and PB16 to again be entered where the N counter is stored with a 1 and the biased event occurrence value 7, with its hit count of 1, are stored from register RI and counter N into the next two subsequent memory locations in the P/B MEMORY.

Following PB16, PB5 is again entered where the next event occurrence value 4 is provided by the DECODE I MODULE and stored in the RI register. PB6 is reentered where the new event occurrence value 4 in register RI is compared with the delimiter 5 in register DI. The event occurrence value in register RI is the smaller and therefore PB18 is re-entered where the next lower delimiter 0 is stored into the DI register. The content of 0 of PWC is subtracted from the delimiter 0 to form a new lower limit of 0 in lower limit register T. At this point, the DI register and the T register each contain 0.

PB6 is now re-entered where the event occurrence value 4 in register RI is compared with the new delimiter O in register DI. The event occurrence value 4 in register RI is the larger, and therefore PB7 is entered.

During PB7, the bias value 0 in register BIAS is subtracted from the event occurrence value 4 in register RI and the resultant biased event occurrence value 4 is stored back into the RI register.

During PB8, the biased event occurrence value 4 in register RI is compared with the delimiter 0 in register DI and since the biased event occurrence value 4 is the larger, PB10 is re-entered. Again, the −1 value contained in register RII is smaller and therefore PB11, PB15 and PB16 are re-entered where the biased event occurrence value 4 and its hit count of 1 in the RI register and the N counter are stored into the subsequent two available memory locations in the P/B MEMORY.

The sequence of operation from PB5 to PB16 and to PB23 and PB21 should be noted. If EOFI is true (last event occurrence read from MEMORY MODULE area 1) and the last entry (1 −1 to indicate end of entries) has been read from the P/B MEMORY and stored in register RII, a true signal will be formed at the SRII output of register RII which causes control to go from PB5 through PB20 to PB23. If, on the other hand, EOF1 is true and the last entry (−1) has not been read from P/B MEMORY and stored in register RII, a non-negative value will now be stored in register RII, causing a false signal at the SRII (true signal at $\overline{\text{SRII}}$) output of register RII. Under these conditions, control goes from PB5 through PB20 to PB21 (P13) where the loop involving PB20, PB21 and PB22 is entered. Control stays in PB20, PB21 and PB22, causing event occurrences and hit counts to be read out of the P/B MEMORY until the last entry (−1) is reached at which time control goes from PB20 to PB23.

Continuing with the example of operation, following PB16, PB5 of the PIPE MODULE flow is re-entered. The last event occurrence has now been read from the MEMORY MODULE area 1, hence the EOF1 flip flop in the DECODE I MODULE is in a 1 state, causing a true signal at the EOE1 output. The last entry (−1) from the P/B MEMORY has been read and stored in register RII and hence a true signal exists at output SRII. Flip flop P11 is in a 1 state, causing a true signal at the P11 output. As a result, the logic EOF1.P11.$\overline{\text{GT}}$.SRII is true. This causes the flip-flop P16 to be set to a 1 state and flip flop P11 is reset to a 0 state, thereby causing control to go through PB20 to PB23.

During PB23 and PB24, a forced value of −1 stored in the P/B MEMORY at the end of the field of biased event occurrence values and hit values identifies the end of the event occurrence. To this end, a true signal is formed at the P16 output of flip flop P16, causing a true signal at the input of the DS2 selection circuit which causes the −1 signal from the switches 901 to be coupled through to the input of the P/B MEMORY. The true signal at P16 also causes a true signal at the P17 input/output control signal lines which, in turn, causes the P/B MEMORY to store the −1 value from the DS2 selection circuit. The true signal at the PI18 output in turn causes a true signal at the C*t* input of address counter M2, causing it to count up by one address. Additionally, the true signal at P16 causes a true signal at the C*t* input of the bias counter. Significantly, this signal causes the BIAS counter to count up one bias value so that it now has a bias value of 1. Additionally, the logic P16.$\overline{\text{CLK}}$ is true, causing a true signal at the output PI13, thereby causing the P/B MEMORY to be switched.

The logic P16.$\overline{\text{CLK}}$ being true, causes the PFIRST flip flop to be reset to a 0 state. This is important since the first pass through the PIPE MODULE, wherein the first event occurrence vector is biased and stored into the P/B MEMORY, has been completed.

Following PB24, the PLAST flip flop is in a 0 state since this is not the last pass through the PIPE MODULE. Accordingly, the logic P16.$\overline{\text{PLAST}}$.$\overline{\text{CLK}}$ becomes true, resetting the generalized clock generator 700 which, in turn, stops further pulses at CLK and $\overline{\text{CLK}}$, causing the operation of the PIPE MODULE to exit or terminate.

The PIPE MODULE has now completed its first pass for the first entry "S" and is now ready for its second pass for the second entry "I". The P/B MEMORY contains the following pairs of biased event occurrence values and hit values: 13-1, 7-1, 4-1. At the end in the P/B MEMORY there is stored a −1 to identify the end of the field. This then is the linear representation of the row S depicted in Table 26 and in Table 27 at pass 1.

Next, the PIPE MODULE enters pass 2 where the results depicted at pass 2 of Table 27 are formed.

During pass 2, the I event occurrence value is processed. With reference to Table 20, it will be seen that the I occurrence vector has event occurrence values 6 and 3. With reference to Table 21 and pass 2 of Table 27, it will be seen that the bias number is 1 and therefore event occurrence values 6 and 3 are decreased by 1, resulting in biased occurrence values 5 and 2. Thus, during pass 2, biased occurrence values 5 and 2 with hit values of 1 are stored in proper numerical order among the results of pass 1 in the P/B MEMORY. To this end, initially the MINI COMPUTER causes the I event occurrence vector to be stored in MEMORY MODULE area 1 in hybrid coded form.

The hybrid coded I event occurrence vector stored in MEMORY MODULE area 1 is as follows:

| | |
|---|---|
| 10000110 | I = event occurrence vector 6, 3 |
| 00000100 | |

MEMORY MODULE area 2 still contains the delimiter occurrence vector 15, 10, 8, 5 and 0 in hybrid coded form. Additionally, the MINI COMPUTER stores the length 2 of the event occurrence vector into LN1 of the IPRF.

The MINI COMPUTER initiates the next pass by forming a true signal at the PIPGO output, enabling the generalized clock control 700 to again form CLK and $\overline{\text{CLK}}$ pulses and thereby enabling the operation of the PIPE MODULE as described hereinabove. Additionally, the address counters M1 and M2 are reset to 0 and register PSAV is again loaded with the length 4 of delimiter occurrence vector LN2 from the IPRF. Thus, the following all contain 0: M1, M2, M3. The content of the following can be disregarded: OUT, MAX, N, DI, T, RII, RI, CV, S. The content of the following are as follows: PSAV = 4; PW = 1; PWC = 0; BIAS = 1; and LNRQR = 3.

During PB2, the DECODE II MODULE again decodes and discards the end delimiter 15 of the event occurrence vector then decodes and provides the next to end delimiter 10. The ALU subtracts the 0 in register PWC from the delimiter 10 to determine the lowest or minimum event occurrence value 10 which is stored into the minimum event occurrence register T. The delimiter 10 is stored in register DI and the delimiter 10 less than 0 in PWC, namely 10, is stored into the minimum event occurrence register T.

During PB3, the state of the PFIRST flip flop is again checked and this time is found to be 0. Hence, PB4 is entered and PB19 is skipped because this is not the first pass through the PIPE MODULE.

During PB4, the largest stored biased event occurrence value and its hit count (i.e. 13 −1) are read from the P/B MEMORY and stored into register RII and counter N, respectively. This operation is as follows: Referring to the input/output control signals, the logic P1·$\overline{\textbf{PFIRST}}$ is now true, causing a true signal at the PI4 output. The true signal at the PI4 output enables the P/B MEMORY to read the biased event occurrence value 13 from address 0 specified by address counter M1. Additionally, the logic $\overline{\textbf{P1}}$.$\overline{\textbf{PFIRST}}$ is true, causing the selection circuit DS7 to couple the 13 from the P/B MEMORY through to the input of register RII. The logic P14.$\overline{\textbf{CLK}}$ causes a true signal at the Ct input of address counter M1 which causes the address therein to be counted up to 1, thereby forming the address of the corresponding hit count. The logic $\overline{\textbf{CLK}}$.P1 then becomes true, causing a true signal at the L input of register RII, causing the register RII to store the biased event occurrence value 13. Additionally, the true signal at the P1 output of flip flop P1 causes the flip flop P2 to be set to a 1 state and flip flop P1 to be reset to a 0 state at the occurrence of the CLK pulse.

Figure 35:
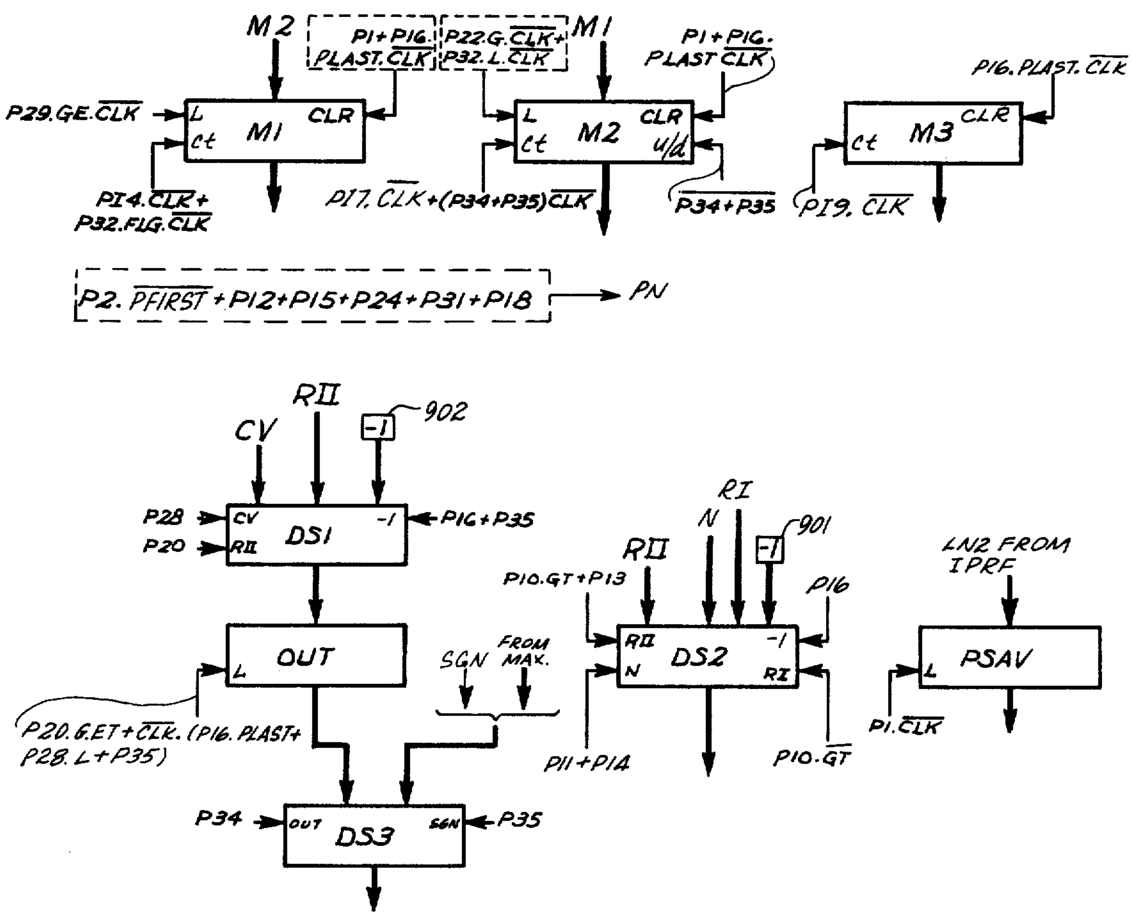
FIGS. 35, 36, 37 and 38 form a schematic and block diagram of the PIPE MODULE.
Figure 36:
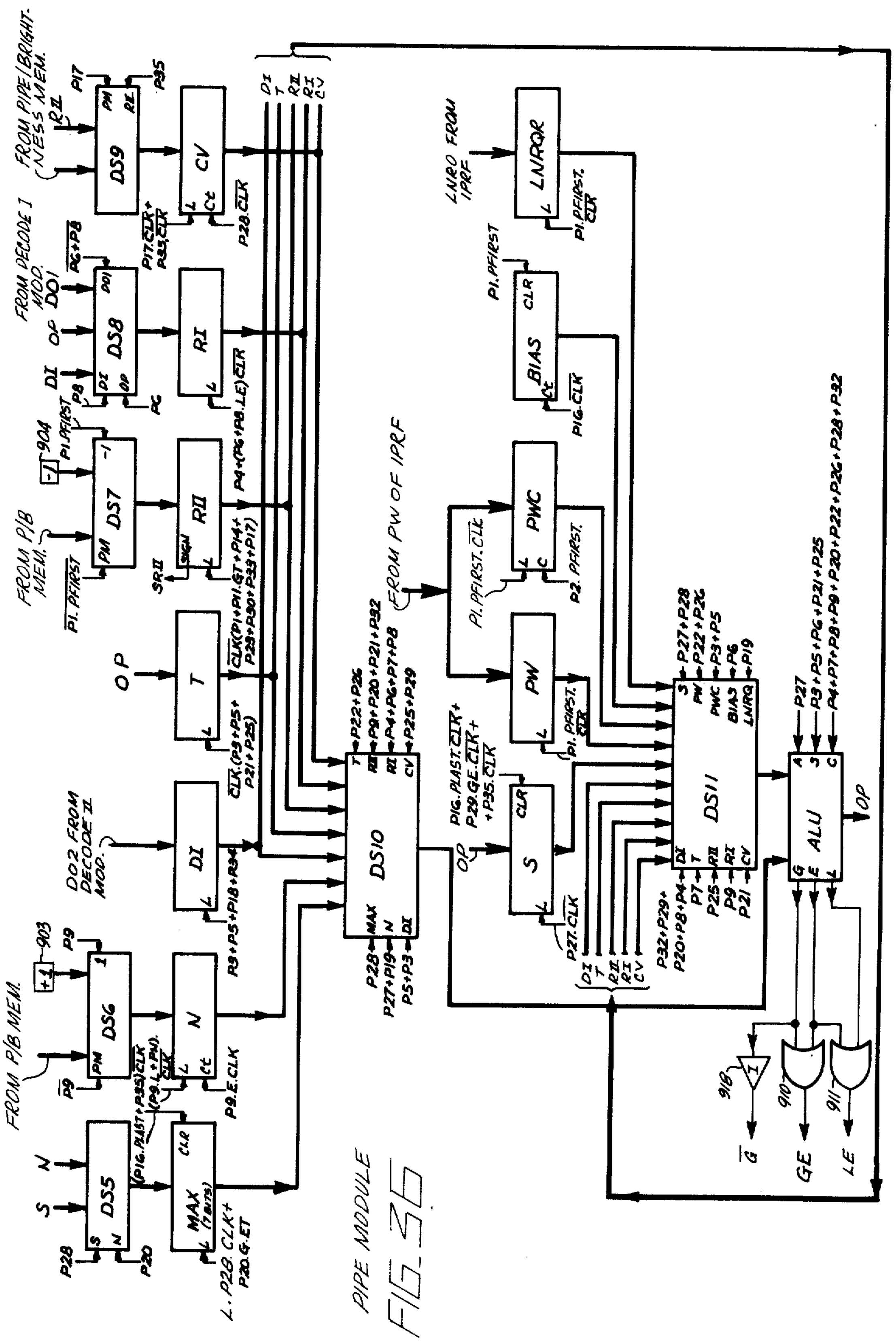
Figure 37:
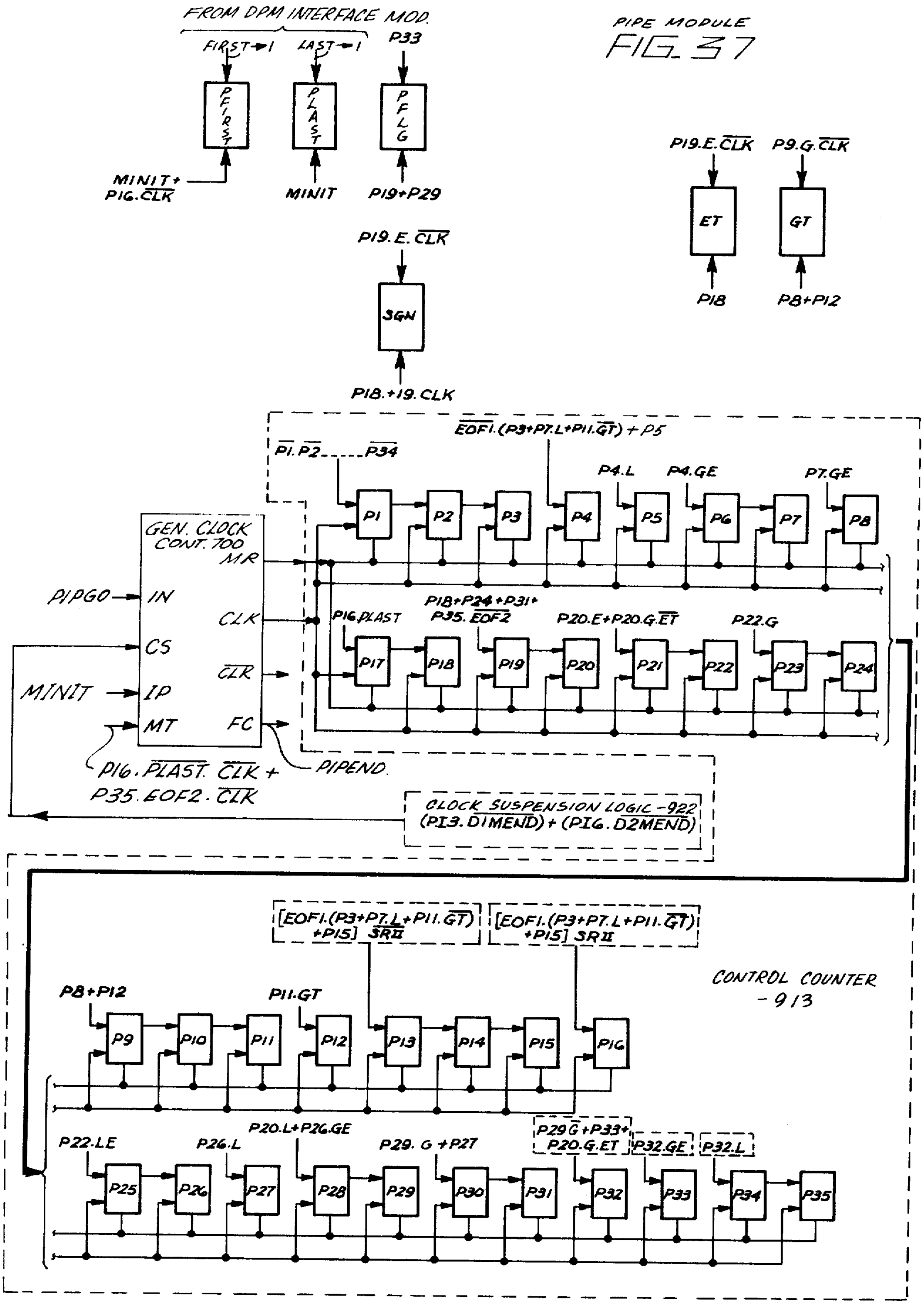

At this point, the logic P2.$\overline{\textbf{PFIRST}}$ is true, again causing a true signal at the PI4 output of the input/output control signal lines. The true signal at the PI4 output again causes the P/B MEMORY to read out the hit count of 1 from memory location 1 specified by the address counter M1. The logic $\overline{\textbf{P9}}$ is now true, causing the DS6 selection circuit to couple the output of the P/B MEMORY to the input of the N counter. FIG. 35 shows a logic equation representing the logical gates for forming a signal at PN. It will be noted that the logic P2.$\overline{\textbf{PFIRST}}$ is now true, causing a true signal at the PN output. The logic PN.$\overline{\textbf{CLK}}$ causes a true signal at the L input of the N counter, causing the N counter to store the hit count of 1 provided by the P/B MEMORY. Additionally, the true condition of logic PI4.$\overline{\textbf{CLK}}$ causes a true signal at the Ct input of the M1 address counter, causing it to count up to address 2, pointing at the biased occurrence value 7 contained in the P/B MEMORY.

The true signal at P2 causes the flip flop P3 to be set to a 1 state and the flip flop P2 to be reset to a 0 state, thereby causing PB5 of the PIPE MODULE to flow to be entered.

During PB5, the DECODE I MODULE provides the largest event occurrence value 6 from the event occurrence vector for I and it is stored into register RI as described above.

PB6 of the PIPE MODULE flow is then entered where the event occurrence value 6 stored in register RI is compared with the delimiter 10 stored in register DI. Since the event occurrence 6 in register RI is less than (<) the delimiter 10 in register DI, PB18 is entered where the DECODE I MODULE is called, causing it to decode and provide the next lower delimiter 8 and the delimiter 8 (8-6) is stored back into register RI.

PB6 of the flow is re-entered where it is found that the event occurrence value 6 in register RI is again found less than the new delimiter 8 stored in register DI, causing PB18 to be reentered. During PB18, the DECODE I MODULE provides the next lower delimiter 5 and the delimiter 5 (5 −0) is stored back into register RI.

PB6 of the flow is reentered where the event occurrence value 6 in register RI is compared with the new delimiter 5 in register DI and is found to be the larger. Accordingly, the ALU and gate 910 form a true signal at GE, causing the logic P4·GE to be true causing the control counter 913 to set flip flop P6 to a 1 state and reset flip flop P4 to a 0 state. Thus PB7 is entered.

During PB7 of the flow, register BIAS contains a 1. Register RI contains the unbiased event occurrence value 6 and true signals are formed at the output P6. This causes the DS10 and DS11 selection circuits to couple the RI and BIAS registers to the ALU, causing the bias value of 1 to be subtracted from the unbiased event occurrence 6 and the resultant biased event occurrence 5 to be stored back into the register RI.

PB8 of the PIPE MODULE flow is now entered where the biased event occurrence value 5 contained in register RI is compared with the minimum occurrence value 8 in register T, and the biased event occurrence value 5 is the larger, therefore PB9 is entered.

During PB9, the biased event occurrence value 5 in register RI is compared with the delimiter 5 in register DI and is found equal. Therefore, PB10 is entered.

During PB10, the biased event occurrence 13 from the previous pass read from the P/B MEMORY and stored in register RII is compared with the newly biased event occurrence value 5 in register RI. The previous biased occurrence value 13 in register RII is the larger and therefore the ALU forms a true signal at the G output and PB13 is entered. To this end, the true signal at the P9 output causes flip flop P10 to be set to a 1 state and the flip flop P9 is reset to a 0 state.

The true signal at the P10 output causes the output PI7 to receive a true signal. The true signal at the PI7 output causes the P/B MEMORY to write the previous biased event occurrence value 13 from register RII into the memory location 0 specified by address counter M2 and the address counter M2 counts up one address to address 1. The true signal at the P10 output causes flip flop P11 to be set to a 1 state and flip flop P10 to be reset to a 0 state, again causing true signals at the PI7 output which, in turn, cause the hit count 1 in the N counter to be stored in the next P/B MEMORY address 1. Additionally, the address counter M2 is counted up to address 2.

The true signal at the G output of the ALU during PB10 causes the logic P9.G.$\overline{\textbf{CLK}}$ to be true and thereby set the GT flip flop to a 1 state, causing a true signal at the GT output. Thus, at PB14, the logic P11.GT is true, causing the output PI4 to receive a true signal. The true signal at PI4 causes the P/B MEMORY to read out the next previous biased event occurrence value 7 and its hit count of 1 for storage in register RII and counter N. PB10 is now re-entered.

During PB10, the previous biased event occurrence value 13 in register RII is compared with the newly formed biased event occurrence value 7 in register RI and the first is the larger. Therefore, PB13 and PB14 are re-entered where the previous biased event occurrence value 7 and its hit count 1 in register RII and counter N are stored in the next two memory locations, 2 and 3, of the P/B MEMORY and the next previous biased event occurrence value 4 and its hit 1 are read out of the P/B MEMORY from the memory locations, 5 and 6, specified by address counter M1·for storage in register RII and counter N, respectively. The address counter M2 is appropriately incremented.

PB10 is re-entered where the previous biased event occurrence value 4 is again compared with the newly formed biased event occurrence value 5 in register RI. The previous biased event occurrence value 4 in register RII is now smaller and therefore PB11, PB15 and PB16 are now entered where the newly formed biased event occurrence value 5 and its hit count of 1 are stored into the P/B MEMORY at locations 4 and 5 specified by the address counter M2 and the address counter M2 is appropriately incremented.

Following PB16, PB5 is re-entered where the next event occurrence value 3 for the event I is decoded and provided by the DECODE I MODULE and stored in register RI and the operation continues as discussed above until the MEMORY MODULE area 2 of the P/B MEMORY contains the biased event occurrence values and hit counts depicted at pass 2 of Table 19. At the end of pass 2, the PIPE MODULE exits from PB25 as discussed above after incrementing the BIAS register to a bias value of 2.

The MINI COMPUTER then obtains the event occurrence vector for the event T and stores it in MEMORY MODULE area 1. The hybrid coded event occurrence vector for the event T is as follows:

| | |
|---|---|
| 10001110<br>00000100<br>00100000 | T - event occurrence vector 14, 11, 1 |

The PIPE MODULE is initialized with appropriate information as discussed above and is again called, causing it to go through the third pass, resulting in the information depicted at pass 3 of Table 19.

One of the things which the MINI COMPUTER does when initializing the PIPE MODULE for the last event occurrence value is to form a true signal at the PLAST → 1 output, causing the PLAST flip flop to be set to a 1 state. Therefore, the logic P16·$\overline{\text{PLAST}}$·$\overline{\text{CLK}}$ does not become true and hence, the flip flop PCE is not reset to 0. As a result, the PIPE MODULE does not exit and PB26 is entered following PB25. Additionally, the logic P16·PLAST causes a true signal at the PI5 output which resets the DECODE II MODULE BY setting the flip flop D2FST in the DECODE II MODULE to a 1. Additionally, the true conditions of the logic PI6·PLAST·$\overline{\text{CLK}}$ causes a true signal at the PI6 output. The true condition of this logic causes the M1, M2, M3, S and MAX registers and counters to be reset to 0 and PB27 is entered.

The linearization process was completed during PB1 through PB25. The P/B MEMORY contains the biased event occurrence values and hit counts depicted at pass 3 of Table 27. The next step is to start at the rightmost or largest biased event occurrence value and its hit count and pass a pipe across the data to obtain the maximum number of hits at each pipe center. To this end, PB26 through PB48 is entered where the DECODE II MODULE is reset so that it starts redecoding the delimiter occurrence vector 15, 10, 8, 5, 0, starting at the largest one.

The true condition of logic P16 and the $\overline{\text{CLK}}$.P16.PLAST causes the DS1 selection circuit to couple the −1 signals at the output of switches 902 to the input of register OUT and causes the L input of register OUT to receive a true signal. This causes the register OUT to store the −1 signal. The true condition of logic P16.PLAST.$\overline{\text{CLK}}$ causes a true signal at the PI6 output which, in turn, calls the DECODE II MODULE, causing it to decode and discard the last delimiter 15 of the delimiter occurrence vector. The true signal at the PI6 output of the flip flop P16 causes the P16 flip flop to be reset to a 0 state and the logic P17.PLAST sets the flip flop P16 to a 1 state, thereby causing PB28 to be entered. During PB28, the next to the last delimiter 10 of the delimiter occurrence vector is read by the DECODE II MODULE. To this end, the logic P17.$\overline{\text{CLK}}$ forms a true signal at the PI6 output, setting the D2GO one-shot to a 1 state, calling the operation of the DECODE II MODULE, causing the delimiter 10 to be stored in the register DI.

The true condition of logic P17 causes a true signal at the PI4 output of the PIPE MODULE, causing the P/B MEMORY to read out the largest biased event occurrence value 13 and its hit count 1 (see Table 27). The logic $\overline{\text{PI}}$.$\overline{\text{PFIRST}}$ is now true, causing the DS7 selection circuit to couple the biased event occurrence value 13 to the input of register RII. Additionally, the logic $\overline{\text{CLK}}$.P17 becomes true, causing a true signal at the L input of register RII which in turn causes the biased event occurrence value 13 to be stored into register RII.

The logic PI4.$\overline{\text{CLK}}$ causes a true signal at the Ct input of address counter M1, causing it to count up to address 1, which is the address of hit count 1. The true signal at the P17 output of flip flop P17 causes flip flop P18 to be set to a 1 state and flip flop P17 to be reset to 0. The true condition of output P18 causes the output of the P/B MEMORY to be true, causing the P/B MEMORY to read out the hit count 1. Additionally, the logic $\overline{\text{CLK}}$ is true, causing the address counter M1 to count up to address 3, thereby pointing at the next lower biased event occurrence value 12 in the P/B MEMORY. The logic $\overline{\text{P9}}$ is now true, and therefore the selection circuit DS6 couples the hit count 1 from the P/B MEMORY to the input of the N counter. With reference to FIG. 35, the logic P18 is now true, causing a true signal at the PN output. The logic PN.$\overline{\text{CLK}}$ causes the N counter to be loaded with the hit count 1 from the P/B MEMORY.

The CV counter keeps track of the pipe center. The first pipe center will be the largest or rightmost biased event occurrence. To this end, the true signal at P17 causes the DS9 selection circuit to couple the largest biased event occurrence 13 to the input of the CV counter. Additionally, the logic P17.$\overline{\text{CLK}}$ causes the biased event occurrence 13 to be stored into the counter CV. The true signal at the P18 output causes the flip flop P19 to be set to a 1 state and the flip flop P18 is reset to a 0 state at the following CLK pulse, thereby causing PB30 to be entered.

During PB30, the hit count 1 in the N counter is compared with the length of request 4 contained in the LNRQR register. Since an inequality exists, PB31 is entered. If, however, an equality exists, the content of counter N equals that of register LNRQR and PB20 is entered where the biased event occurrence value in register RII is transferred to register OUT and the hit count in counter N is transferred to register MAX.

Continuing on with the example, the true signal at the P19 output of flip flop P19 causes flip flop P20 to be set to a 1 state and flip flop P19 to be reset to a 0 state at the following CLK pulse.

During PB31, the largest biased event occurrence value 13 in register RII is compared with the largest delimiter 10 in register DI. The purpose of PB31 is to determine whether the biased event occurrence value in register RII is within the event specified by the beginning delimiter in register DI. If the biased event occurrence value in register RI is the larger or equal to the delimiter, then it is within the event and PB32 is entered.

In the example, the true signal at the P20 output causes the DS10 and DS11 selection circuits to couple the content of register RII and DI to the inputs of the ALU and causes a true signal at the C input of the ALU. The ALU in turn compares the values. The biased event occurrence 13 in register RII is larger than the delimiter 10 in register DI, therefore a true signal is formed at the G output of the ALU. Flip flop ET is in a 0 state, hence, the logic P20·G·$\overline{ET}$ is true, causing the flip flop P21 to be set to a 1 state and the flip flop P20 is reset to a 0 state at the following CLK pulse, thereby causing PB32 to be entered.

During PB32, the pipe center value in counter CV is subtracted from the biased event occurrence value in register R2 to form a value which, during PB33 is compared with the pipe width to determine if the biased event occurrence value in register RII is inside or outside of the permissible pipe width on the + side of the pipe center. To this end, the true signal at the P21 output causes the DS10 and DS11 selection circuits to couple the 13 and 13 in register RII and counter CV to the input of the ALU. The true signal at P21 causes a true signal at the S input of the ALU which in turn subtracts the 13 in counter CV from the 13 in register RII, forming 0 output at OP. The logic $\overline{CLK}$·P21 causes the T register to load the 0 output at OP in the T register. Thus the T register now contains a 0.

The true signal at P21 causes flip flop P22 to be set to a 1 state and flip flop P21 is reset to a 0 state at the following CLK pulse, causing PB33 to be entered.

The content of register T and PW are now compared to determine whether the biased event in register RII is within or outside of the permissible pipe width on the + side of the pipe center. To this end, the true signal at P22 causes the DS10 and DS11 selection circuits to couple the 0 and 1, respectively, in registers T and PW to the input of the ALU. The true signal at P22 causes a true signal at the C input of the ALU, causing the 0 in register T to be compared with the 1 in register PW. The 0 of register T is the smaller and therefore PB34 is entered.

To this end the ALU forms a true signal at the L output which in turn causes the OR gate 911 to form a true signal at the LE output. The logic P22·LE is true, causing flip flop P25 to be set to a 1 state and flip flop P22 is reset to a 0 state at the following CLK pulse.

During PB34 the biased event occurrence value in register RII is checked to make sure it is not outside of the pipe width on the left or − side of pipe center. To this end, the true signal at the P25 output causes the DS10 and DS11 selection circuits to couple the 13 stored in registers CV and RII to the input of the ALU. The ALU subtracts the biased event occurrence value 13 in register RII from the pipe center 13 in register CV and the result 0 is formed at the output OP. The logic $\overline{CLK}$·P25 now is true, causing a true signal at the L input of register T, causing the 0 output at OP to be stored into the T register.

The true signal at the P25 output causes the flip flop P26 to be set to a 1 state and flip flop P25 to be reset to a 0 state at the following CLK pulse, causing PB35 to be entered. The true signal at the P26 output causes the DS10 and DS11 selection circuits to couple the 0 and 1, respectively, in the T and PW registers to the input of the ALU. Since the value 0 in register T is the lesser, the ALU forms a true signal at the L output. The logic P26·L is true, causing flip flop P27 to be set to a 1 state and flip flop P26 is reset to a 0 state at the following CLK pulse, and PB36 is entered.

During PB36, the hit count in counter N is added to the content of the S register. The S register keeps a running tally of the total number of hits within the "total pipe width". Since the S register is initially 0, and the N counter initially contains a 1 (the hit count for biased event occurrence value 13), the result formed in register S during PB36 is 1.

Considering the actual operation, the true signal at p27 causes the DS10 and DS11 selection circuits to couple the output of the N counter and the S register to the input of the ALU and causes a true signal at the A input. The true signal at the A input causes the 0 and 1 in the S counter and N register to be added, and the result 1 is formed at the OP output. The logic P27.$\overline{CLK}$ is true, causing a true signal at the L input of the S register, causing the S register to store the 1 at OP. The true signal at the P27 output causes the flip flop P30 to be set to a 1 state and the P27 flip flop to be reset to a 0 state at the following CLK pulse and PB37 is entered.

During PB37, the next biased event occurrence value 12 and its hit count 1 are read from the P/B MEMORY from the addresses specified by the M1 address counter. To this end, the true signal at P30 causes a true signal at the PI4 output of the PIPE MODULE, causing the P/B MEMORY to read out the biased event 12. The logic PI4.$\overline{CLK}$ is true, causing the M1 address counter to count up one address, pointing at the corresponding hit count of 1. Flip flop P31 is set to a 1 state and flip flop P30 is reset to a 0 state. The true signal at the P31 output again causes a true signal at the PI4 output and causes a true condition of logic PI4·$\overline{CLK}$, thereby causing the hit count of 1 to be read from the P/B MEMORY and the address counter M1 is counted up one address. Referring to the RII register and the N counter, the $\overline{PI}$·$\overline{P}$·$\overline{FIRST}$ logic causes the DS7 selection circuit to couple the biased event occurrence value 12 to the input of register RII and the true condition of logic $\overline{CLK}$.P30 causes the biased event occurrence value 12 to be stored in register RII. Similarly, the true condition at $\overline{P9}$ and, hence, the true condition of logic PN·$\overline{CLK}$ causes the hit count 1 formed at the OP output of the ALU to be stored into the N counter. The true signal at the P31 output of the flip flop P31, causes the flip flop P19 to be set to a 1 state and flip flop P31 to be reset to a 0 state at the following CLK pulse, thereby causing PB30 to be re-entered.

During the subsequent pass through PB30 and PB31, the hit count 1 in counter N and the length of request 4 in register LNRQR are agin compared and found not equal, causing PB31 to be entered. During PB31, the biased event occurrence value 12 in register RII is compared with the next to last delimiter 10 in register DI and found to be larger. Therefore, PB32 and PB33 are re-entered.

During PB32 and PB33, the biased event occurrence value 12 in register RII is checked and found within the pipe width on the + or right side of the pipe center, as discussed above. Therefore, PB34 and PB35 are reentered where the biased event occurrence 12 in register RII is found to be within the pipe width on the − or left side of the pipe center as discussed above, and therefore PB36 is reentered.

During PB36, the hit count of 1 for the biased event occurrence value 12 is added to the 1 already in the S register and the resultant hit count of 2 is stored back into the S register.

The next biased event occurrence value 7 and its hit count of 1 are read from the P/B MEMORY stored in register RII and the counter N and the M1 address counter are appropriately incremented.

PB30 through PB35 are now entered where the hit count in the N counter is compared with the length of request 4 in the LNRQR register and found to be the smaller. Hence, PB31 is reentered where the biased event occurrence value 7 in register RII is compared with the delimiter 10 in register DI and the former is found to be the smaller or outside of the event presently under consideration. Referring to the flow diagram, it will be seen that when this occurs, the PIPE MODULE branches from PB31 to PB39. To this end, the ALU forms a true signal at the L output, causing the logic P20·L to become true and at the following CLK pulse, the flip flop P28 is set to 1 and the flip flop P27 is reset to 0.

During PB39, the content of register MAX is compared against the S register. The register MAX is a temporary storage register to hold the current maximum number of hits within a total pipe width in one entry. The S register is keeping a running tally of the number of hits within a total pipe. The reason for the comparison during PB39 is to determine if the tally, being kept in the S register, has become larger than the current maximum contained in register MAX. If this occurs, then PB41 is entered where the pipe center contained in counter CV is transferred to register OUT and the content of register S is transferred to register MAX. To be explained in more detail, if the content of register MAX is the larger, PB40 is entered directly where the pipe center in register CV is decremented.

Returning to the example under consideration, register MAX was initially set to 0 and therefore its content is smaller than the hit count of 2 in the S register. Thus PB41 is next entered. To this end, the true signal at the output P28 causes the DS10 and DS11 selection circuit to couple registers MAX and S to the input of the ALU and the ALU in turn forms a true signal at the L output. The true signal at the output P28 causes the DS1 and DS5 selection circuit to couple the 13 and 2, respectively, from registers CV and S to the input of registers OUT and MAX. The true condition of logic P28·L causes a true signal at the input of register OUT, causing the pipe center 13 in counter CV to be stored in register OUT. The true condition of logic P28·$\overline{CLK}$ causes the L input of register MAX to be true, thereby causing register MAX to store the total hit count 2 in register S.

Following PB41, PB40 is entered where the pipe center in counter CV is decreased by one to 12, thereby moving the pipe one place to the left or down. To this end, the logic P28·$\overline{CLK}$ applies a true signal at the Ct input of counter CV, causing counter CV to count from 13 down to 12.

The true signal at the P28 output of the flip flop 28 causes flip flop P29 to be set to a 1 state and flip flop P28 to be reset to a 0 state at the following CLK pulse, thereby causing PB42 to be entered.

During PB42, a check is made to determine if the new pipe center in counter CV is above the lower delimiter contained in register DI and therefore still within the entry under consideration. If the pipe center stored in counter CV is equal to or larger, the pipe center in counter CV it is still within the entry and PB43 is next entered. However, if the pipe center in counter CV is less than the delimeter in register DI, then the pipe center has passed below the lower delimeter for the present entry and PB44 is entered.

Returning to the example, counter CV contains a 12 and register DI contains a 10. Therefore, the pipe center in counter CV is the larger. The true signal at the P29 output causes the DS10 and DS11 selection circuits to couple the 12 from counter CV and 10 from register DI to the input of the ALU and a true signal is applied at the C input of the ALU. Since the content of counter CV is the larger, a true signal is formed at the G output, causing PB43 to be entered. Since we are about to test the new pipe center 12, the number of hit counts in register S is reset to 0 and the M1 address counter is reset to the state of M2 which contains the address of the first event occurrence value 13 in the entries under test (see Table 29). Considering the actual operation, the true signal at the G output of the ALU causes the OR gate 610 to form a true signal at the GE output. This in turn causes the logic P29·GE·$\overline{CLK}$ to be true and clear or reset the S register to 0. The same logic causes a true signal at the L input to the M1 address counter and the address in counter M2 is stored into M1. Thus, the S register now contains 0 and the address counter M1 contains the address of the P/B MEMORY for the largest event occurrence 13. A true signal is now formed by the logic P29·G, causing the flip flop P30 to be set to a 1 state and flip flop P29 is reset to a 0 state at the following CLK pulse, causing PB37 to be entered.

During PB37 the largest event occurrence 13 and its hit count of 1 are read out by the P/B MEMORY and stored into register RII and counter N, respectively.

During PB30, it is found that the hit count in counter N is less than the length of request in register LNRQ and PB31 is entered. During PB31, it is found that the event occurrence value 13 in register RII is greater than the delimeter 10 in register DI and PB32 and PB33 are entered. During PB32 and PB33, it is found that the event occurrence value 13 is within the pipe width on the + side of the pipe center 12 in counter CV and, accordingly, PB34 and 35 are entered. During PB34 and PB35 it is found that the event occurrence value 13 in register RII is within the pipe width on the − side of the pipe center 12 and, accordingly, PB36 is entered. During PB36, the hit count contained in counter N is added to the 0 in register S so that the S register now contains a hit count of 1. PB37 is then entered where the next lower event occurrence value 12 and its hit count of 1 are read from the P/B MEMORY and stored into register RII and counter N and the address counter M1 is appropriately incremented.

PB30 through PB36 are re-entered with the same results found for the event occurrence 13 and thus during PB36, the hit count of 1 contained in counter N is added to the hit count of 1 already contained in the S register, causing a total hit count of 2 in the S counter. PB37 is again re-entered where the next lower event occurrence value 7 and its hit count of 1 are read from the P/B MEMORY and stored in register RII and counter N, and the M1 address counter is appropriately incremented.

PB30 and PB31 are then re-entered. During PB31 it is found that the event occurrence value 7 in register RII is smaller than the delimiter 10 in register DI, indicating that the event occurrence is not within the event presently under consideration as specified by the beginning delimiter 10 in register DI. Accordingly, PB39 is entered as discussed above.

During PB39, the maximum hit count of 2 in register MAX is compared with the total hit count of 2 in register S and found equal. Accordingly, PB40 is entered directly (bypassing PB41) where the pipe center 12 in the CV counter is decreased to 11.

It will now be noted that where, as just discussed, there is an equality between the previous stored maximum hit count in register MAX and the accumulated hit count in register S, that the previous maximum hit count and the corresponding pipe center in registers MAX and OUT are retained. Referring to Table 29, it is noted that the first pipe center with a hit count of 2 is 13 and it is the one which is used as the output from the PIPE MODULE.

During PB42, the comparison is made to determine if the pipe center in counter CV has passed below the beginning delimeter 10 in register DI. Since the pipe center 11 in counter CV is the larger PB43 is entered where the address counter M1 is reset to the address of the largest event occurrence 13, which address is contained in register M2 and the S register is reset to 0.

Following PB43, PB37 is entered where the largest event occurrence 13 and its hit count of 1 are reread, stored in the register RII and counter N and the M1 address counter appropriately incremented. During PB30, the hit count of 1 is not equal to the length of request of 3 contained in register LNRQR, accordingly, PB31 is entered. During PB31, the event occurrence value 13 is found greater than the delimeter 10. Accordingly, PB32 is entered.

The operation during PB32 through 35 should now be carefully considered. The event occurrence 13 in register RII is decreased by the pipe center of 11 contained in counter CV, and the difference of 2 is stored in the total register T. During PB33, the difference of 2 contained in register T is compared with the pipe width of 1 contained in register PW and the former is larger. Accordingly, the ALU forms a true signal at the G output and PB38 is entered directly from PB33. The reason for this change in operation at this point is that the event occurrence value 13 is now outside of the pipe width for the pipe center 11 in counter CV and therefore the PIPE MODULE no longer needs to consider the event occurrence value 13. Accordingly, the address of the next lower event occurrence value 12 is transferred to the M2 address counter and this value is read from the P/B MEMORY, stored into the register RII and its associated hit count of 1 is stored in counter N. To this end, the true signal at the P22 output, in combination with the true signal at the G output of the ALU, causes the logic $P22.G.\overline{CLK}$ to be true, causing a true signal at the L input of the address counter M2. Accordingly, the address of the event occurrence value 12 is loaded into the M2 address counter. The true signal at the P22 output causes a true signal by the logic P22.G and accordingly, the flip flop P23 is set to a 1 state and the flip flop P22 is reset to a 0 state, causing a true signal at the P23 output. The true signal at the P23 output, in turn, causes a true signal at the PI4 output of the PIPE MODULE, causing the P/B MEMORY to read out the event occurrence value 12 specified by the address counter and stored in register RII and the M1 address counter is incremented by 1, pointing at the hit count corresponding to event occurrence value 12. The true signal at the P23 output causes the flip flop P24 to be set to a 1 state, and flip flop P23 to be reset to a 0 state at the following CLK pulse, again causing a true signal at the PI4 output of the PIPE MODULE and causing the P/B MEMORY to read out the hit count of 1 for storage in counter N and the M1 address counter to be incremented by one additional address, pointing at the event occurrence value 7 in the P/B MEMORY. Following PB38, PB30 is re-entered. To this end, the true signal at the P24 output causes the input to the P19 flip flop to be true and accordingly at the following pulse at CLK, flip flop P19 is set to a 1 state and flip flop P24 is reset to a 0 state, causing PB30 to be re-entered, followed by PB31.

During PB31, it is found that the event occurrence value 12 in register RII is greater than the delimiter 10 in register DI, accordingly PB32 and 33 are entered. During PB32 and PB33, the comparison indicates that the event occurrence value 12 in register RII is within the pipe width on the + side of the pipe center in counter CV. Accordingly, PB34 is entered. During PB34 and PB35, it is found that the event occurrence value 12 in register RII is within the pipe width on the − side of the pipe center 11 in counter CV, accordingly PB36 is entered, where the hit count 1 in counter N is added to the 0 in register S, resulting in a total hit count of 1 in register S. PB37 is then entered where the next event occurrence value 7 and its hit count 1 are read out from P/B MEMORY stored in register RII and counters N and M1 appropriately incremented. PB30 and PB31 are then re-entered where it is found that the event occurrence value 7 in register RII is less than the beginning delimiter 10 in register DI. Accordingly, PB39 is directly entered where the maximum hit count 1 in register MAX is compared with the total hit count 1 in register S and found to be equal. Accordingly, PB40 is entered where the pipe center 11 in the CV counter is decreased by one to 10. During PB42, the pipe center 10 in counter CV is compared with the lower delimiter 10 and is found equal. A false signal is thus formed at the G output of the ALU, causing the inverter 918 to form a true signal at the $\overline{G}$ output. The signal at the $\overline{G}$ output indicates that the pipe center equal is less than the lower delimiter 10 for the present entry and hence the logic $P29 \cdot \overline{G}$ is true, causing flip flop P32 to be set to a 1 state, and flip flop P29 to be reset to a 0 state at the following CLK pulse. Accordingly, PB44 is entered where the event occurrence value 7 in register RII is compared with the beginning delimiter 10 in register DI. To this end, the true signal at the P32 output causes the DS10 and DS11 selection circuits to couple the output of registers RII and DI to the input of the ALU. The ALU detects that the biased event occurrence value 7 in register RII is smaller and, accordingly, forms a true signal at the L output, thereby causing logic P32.L to be true and flip flop P34 is set to a 1 state and PB32 is reset to a 0 state at the following CLK pulse, and PB46 is thereby entered. It should be noted that during PB44, should the event occurrence value in register RII have been found larger or equal to the beginning delimiter in register DI, PB45 would have been entered where the next lower biased event occurrence value and its hit count would be read from the P/B MEMORY.

Continuing with the example, during PB46 the DECODE II MODULE decodes and provides the new lower delimiter 8 for storage in the DI register. Additionally, the pipe center in register OUT along with the corresponding maximum hit count in register MAX, along with the sign represented by the SGN flip flop, are stored into the MEMORY MODULE at the address specified by the M3 address counter. Thus, the pipe center 13 and its corresponding hit count of 2 are stored into the MEMORY MODULE at the two consecutive memory locations specified by address counter M3. This then specifies the center of the best pipe for the event between delimiters 10 and 15.

Consider now the operation during PB46. The logic P32.L.$\overline{CLK}$ causes the output PI6 to receive a true signal, causing the DECODE II MODULE to decode and provide the next lower delimiter 5 for storage in the DI register. The true signal at the P34 output causes a true signal at the L input of the DI register, which in turn causes the DI register to store the delimiter 5. The true signal at P34 causes the DS3 selection circuit to couple the best pipe center of 13 from register OUT to the input of the MEMORY MODULE. The true signal at the PI9 output causes the MEMORY MODULE to write the best pipe center of 13 into the address of area 3 specified by the M3 address counter. The true signal at the output PI10 also causes the address counter M3 to count its address by one so that it now specifies the address of the next available address in MEMORY MODULE area 3. The true signal at the P34 output causes the flip flop P35 to be set to a 1 state and flip flop P34 to be reset to a 0 state at the following CLK pulse.

The true signal at the P35 output now causes new signals at the PI9 and PI10 outputs. Additionally, the true signal at P35 causes the DS3 selection circuit to couple the SIGN output of the SGN flip flop and the output from register MAX to the input of MEMORY MODULE area 3. The true signal at PI9 then causes the MEMORY MODULE to store the provided signals at the locations specified by the address counter M3. Additionally, the signal at PI10 causes the address counter M3 to be counted up to the next available memory location.

PB47 is now entered. The true signal at the P35 output causes the DS1 selection circuit to couple the signals representative of a −1 from switches 902 to the input of register OUT, the true condition of logic P35·$\overline{CLK}$ causes the register OUt to store the −1 signals. Additionally, the true condition of logic P35·$\overline{CLK}$ causes registers MAX and S to be cleared or reset to 0. Additionally, the new or next pipe center to be considered is that specified by the next event occurrence value stored in register RII. Accordingly, the event occurrence value is stored from register RII to register S. The true signals at P32 and L cause the logic P32·L·$\overline{CLK}$ to be true, transferring the content of counter M1 to M2. The logic $\overline{P34 + P35}$ is true during the true signals at P34 and P35. As a result, the countdown input of counter M2 receives a true signal causing counter M2 to count down 2 addresses.

Considering the actual operation, the true signal at the P35 output causes the DS9 selection circuit to couple the biased event occurrence value 7 in register RII to the input of counter CV and the true condition of logic P35·$\overline{CLK}$ causes the L input of counter CV to be true and hence the counter CV stores the biased event occurrence value 7 from register RII, thus creating the next pipe center for consideration.

Following PB47, PB48 is entered and since the end of file for the delimiter field has not been reached by the DECODE II MODULE, the EOF2 flip flop is in a 0 state. Accordingly, PB30 is re-entered.

Thus, at this point, PIPE MODULE has completed the phase of operation depicted in Table 29. The true signal at the P35 output causes the logic P35·$\overline{EOF2}$ to be true, accordingly, flip flop P19 is set to a 1 state and flip flop P35 is reset to a 0 state at the following CLK pulse. Hence, PB30 is re-entered. The operation of the PIPE MODULE drops down to PB31 where the event occurrence value 7 in register RII is found to be less than the delimiter 8 in register DI. Accordingly, PB39, 40 and 42 are entered where the pipe center in counter CV is decreased from 7 to 6 and the new pipe center of 6 is found less than the delimiter of 8 in register DI. Accordingly, PB44 is entered. During PB44, the biased event occurrence value 7 in register RII is compared with the delimiter 8 and found to be smaller. Accordingly, PB46 is re-entered.

Note at this point that register OUT contains a −1 and that register MAX contains a 0. Accordingly, during PB46, a −1 and 0 is written out into the next two available memory locations in MEMORY MODULE area 3. Also, the DECODE II MODULE reads out the next lower delimiter 5 for storage in register DI. The operation depicted in Table 15 has now been completed and the −1 stored in MEMORY MODULE area 3 indicates that there are no hits for the entry between delimiters 5 and 8.

Register OUT is again stored with a −1 and register MAX and the counter S are again reset to 0. The biased event occurrence value 7 contained in register RII is again transferred as the pipe center to counter CV and 2 is subtracted from the address in address counter M1 and the result is stored in address counter M2. The PIPE MODULE then goes through PB48 back to PB30.

Finally, the PIPE MODULE reaches a point during PB40 where the pipe center stored in counter CV is reduced to 0. At this point the beginning delimiter in register DI is 0 and the pipe center in counter CV is 0 and, accordingly, are equal, causing PB44 to be entered. Register RII contains the biased event occurrence −1, and since RII $<$ DI, control goes to PB46.

During PB46, the best possible pipe center of 3 contained in register OUT and its corresponding hit count of 2 are written out into MEMORY MODULE area 3 at the address specified by the M3 address counter. PB47 and PB48 are now entered and during PB48, the EOF2 flip flop is in a 1 state, indicating that the DECODE II MODULE has now completed all of the delimiter event occurrence vector. Accordingly, the DECODE II MODULE forms a true signal at the EOF2 output, causing the logic P35·EOF2·$\overline{CLK}$ to be true, resetting the generalized clock generator 700 so that it stops forming CLK and $\overline{CLK}$ pulses, thereby causing the PIPE MODULE to exit its operation.

In summary, PB1 through PB20 are used to linearize from an information layer a request represented by an event occurrence vector. A loop is formed around PB20, PB21 and PB22, which assures that a biased event occurrence and corresponding hit count are stored in the P/B MEMORY for each event occurrence value in the event occurrence vectors under consideration. PB26 through PB48 are used to determine the maximum number of hits within a total pipe width. This is accomplished by sliding the pipe across the entry positions or event times one by one, from right to left, until the maximum number of hits for a particular pipe center within each event is outputted or stored in the MEMORY MODULE area 3.

XVI. BRIGHTNESS MODULE

A. General Description

The PIPE and BRIGHTNESS MODULES cooperate together to select the best response out of a data base to a request. As discussed above, the PIPE MODULE forms a set of pipe center signals each of which identifies the beginning delimiter event for a possible response to the request.

The user programs the MINI COMPUTER to select from among the pipe centers those pipe centers which are to be sent to the BRIGHTNESS MODULE. The user selects pipe centers based on some prearranged criteria, such as the number of hits within a "total pipe width" computed by the PIPE MODULE. Thus, for example, the user may decide that all pipe centers associated within hit counts above some preselected value will be sent to the BRIGHTNESS MODULE. Alternatively, the user may select all pipe centers whose hit counts bear a certain relation to the length of the request, i.e., 90%.

The BRIGHTNESS MODULE receives the selected pipe centers from the MINI COMPUTER and develops data about each pipe center that can be used to select the "best response" from among the entries for each pipe center. The "best response" is used herein to indicate the closeness with which the events and their order in the response (from the data base) match that of the request.

"Scatter value" (S) is one value used to determine the best response. Scatter value is a measure of the closeness with which events of the request match the events of the response. By definition, a scatter value of unit 1 indicates a request that is contained exactly in the data base response. A scatter value of 0 indicates that the request is not contained in the data base. If some or all of the events of the request are scattered throughout the data base response, the scatter value is somewhere between zero (0) and one (1), reflecting the amount of scatter or mismatch.

Situations may arise where a second value will be helpful in determining the brightness value. This value is called the "length factor" (L) and relates to the length of the request to the length of the response. The L value also ranges between 0 and 1. The L value is desirable in locating misspelled words or where the response is desirably nearly an exact duplicate of the request. Thus, responses which have a much larger or smaller number of events than the request would get a much lower L value than those which have nearly the same number of events.

The following discussion is directed to the background for deveopment of the scatter value (S).

Table 34 gives an example of a data base response word of "POISSON" and a request word of "PRISON". The scatter value is determined by positioning the request word "PRISON" so that all of its events (letters) are to the left of the events in the response word "POISSON". Then the number of events of displacement or offset between each event in the request and the matching event in the response is determined and summed together. Next, the request word "POISSON" is shifted one event position to the right with respect to "POISSON" and the offsets are again summed. These steps are continued, right shifting the request as long as the sum of offsets is less than the previously determined sum. Eventually the sum of offsets will go through a minimum value and then start increasing. To be explained in more detail, the sum of these offsets provides desirable variables for use in computing the scatter value S.

Table 34 depicts the word "PRISON" shifted to the right, beginning with a 0 shift. A 0 shift is were the last event (N) of the request word "PRISON" is positioned immediately at the left of the first event (P) in the response "POISSON". This relation of the request to the response is desirable since it minimizes the displacement of the request. The sum of the offsets for the 0 shift is designated at $D_O$ in Table 35. Thus, the offsets for the events P O I S S O N are 6, 6, 6, 6, 7 and 7. It will immediately be noted that the event R of the request "PRISON" does not have a corresponding event in the response "POISSON". Under this condition where the event in the request does not have a match in the response, that event is arbitrarily given an offset value equal to the length of the request. This is important and will be explained subsequently. Thus, the sum of offsets $D_O$ is equal to 38.

Figure 42A:
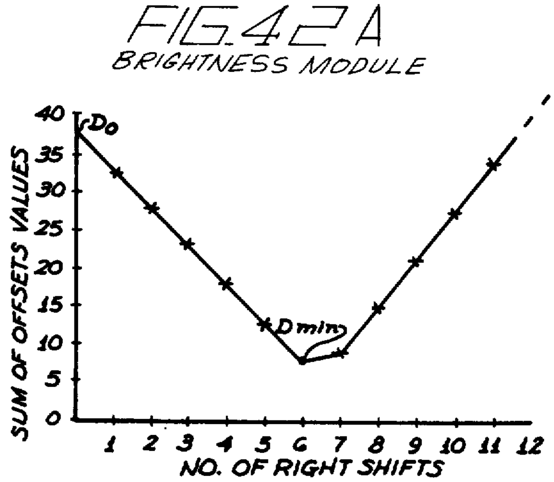
FIGS. 42A-D are graphs used to illustrate functions of the BRIGHTNESS MODULE.
Figure 42B:
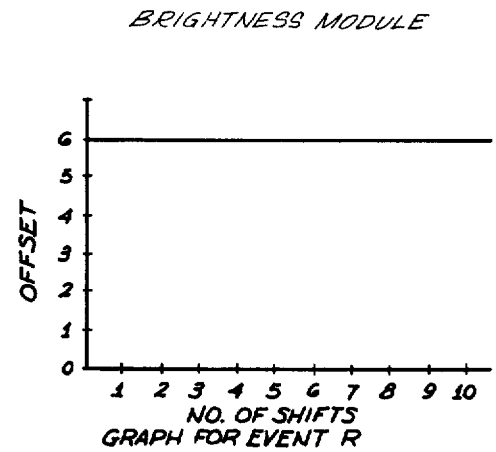
Figure 42C:
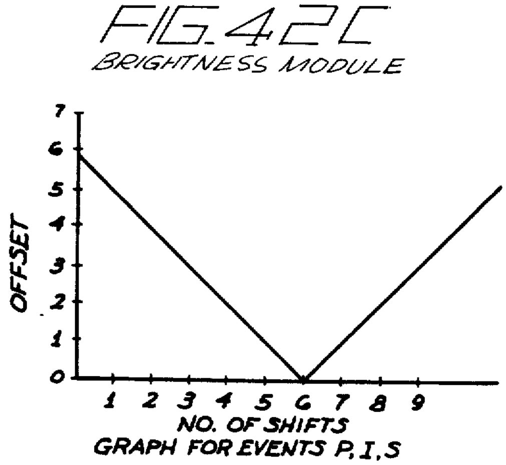
Figure 42D:
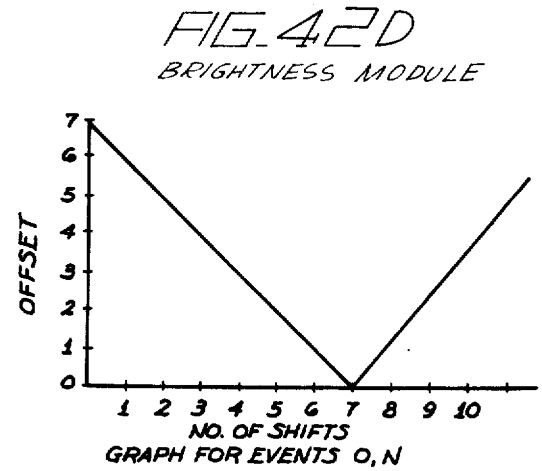
Figure 43:
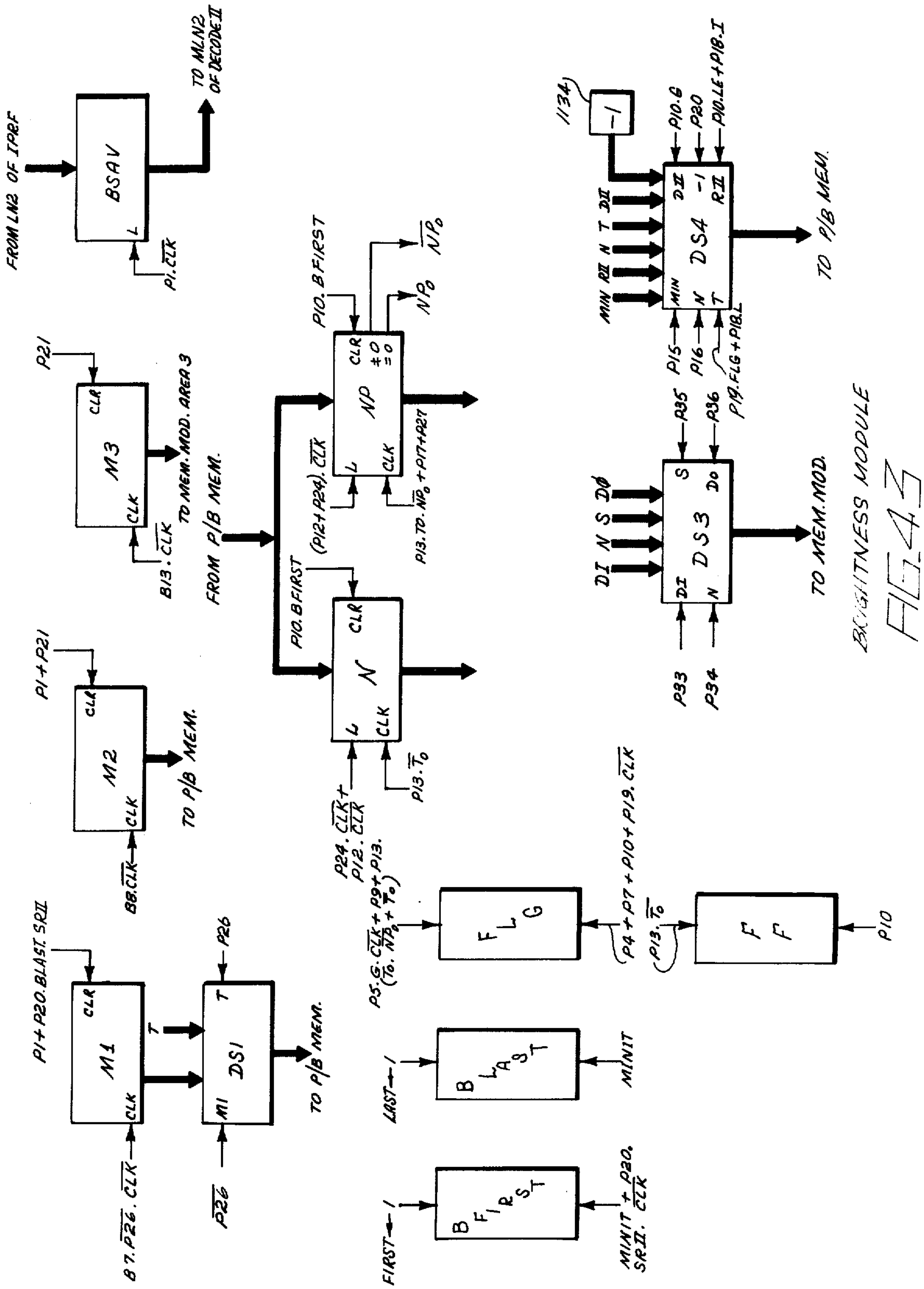
FIGS. 43, 44, 45 and 46 are schematic and block diagrams of the BRIGHTNESS MODULE.
Figure 44:
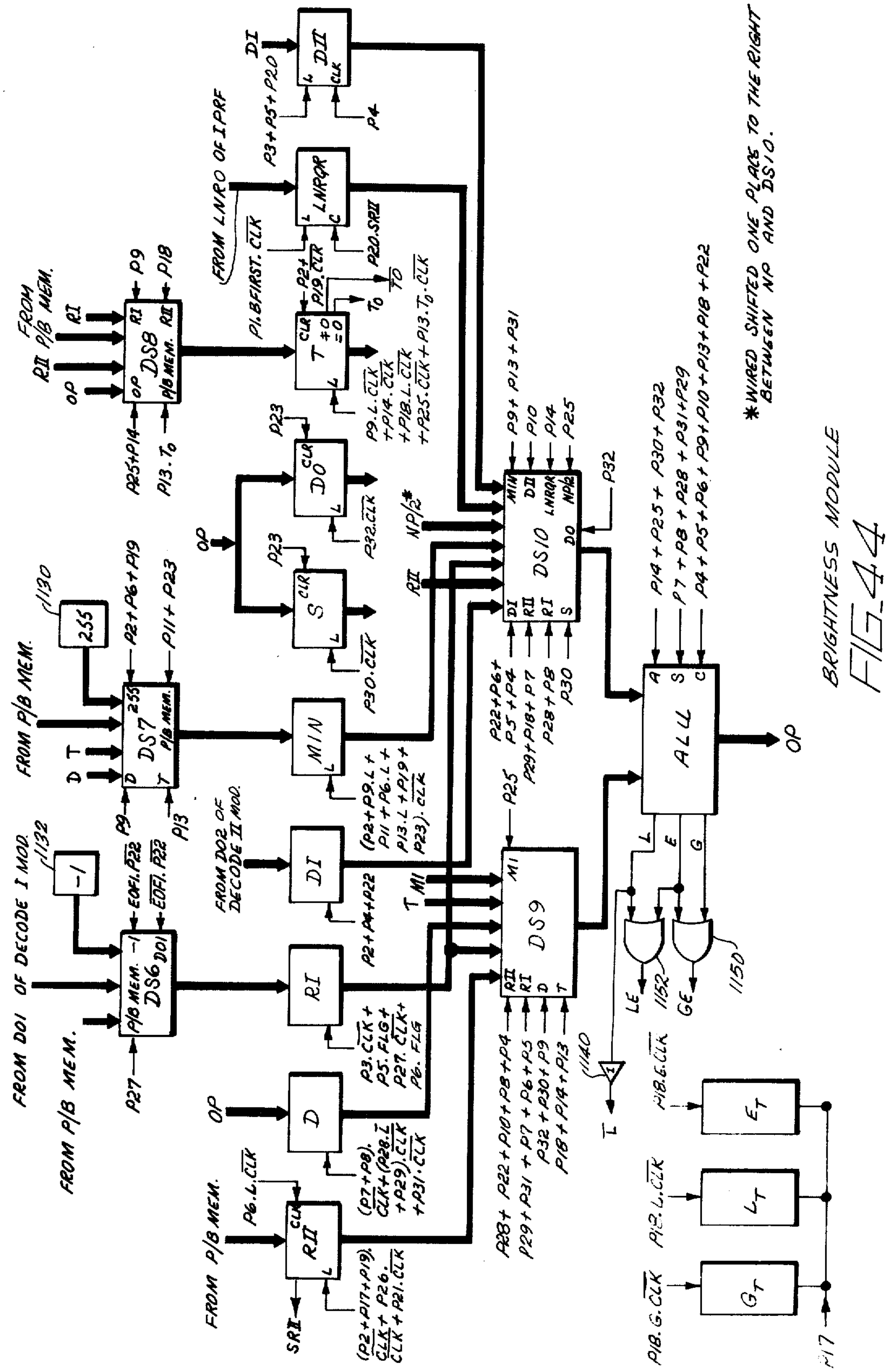
Figure 45:
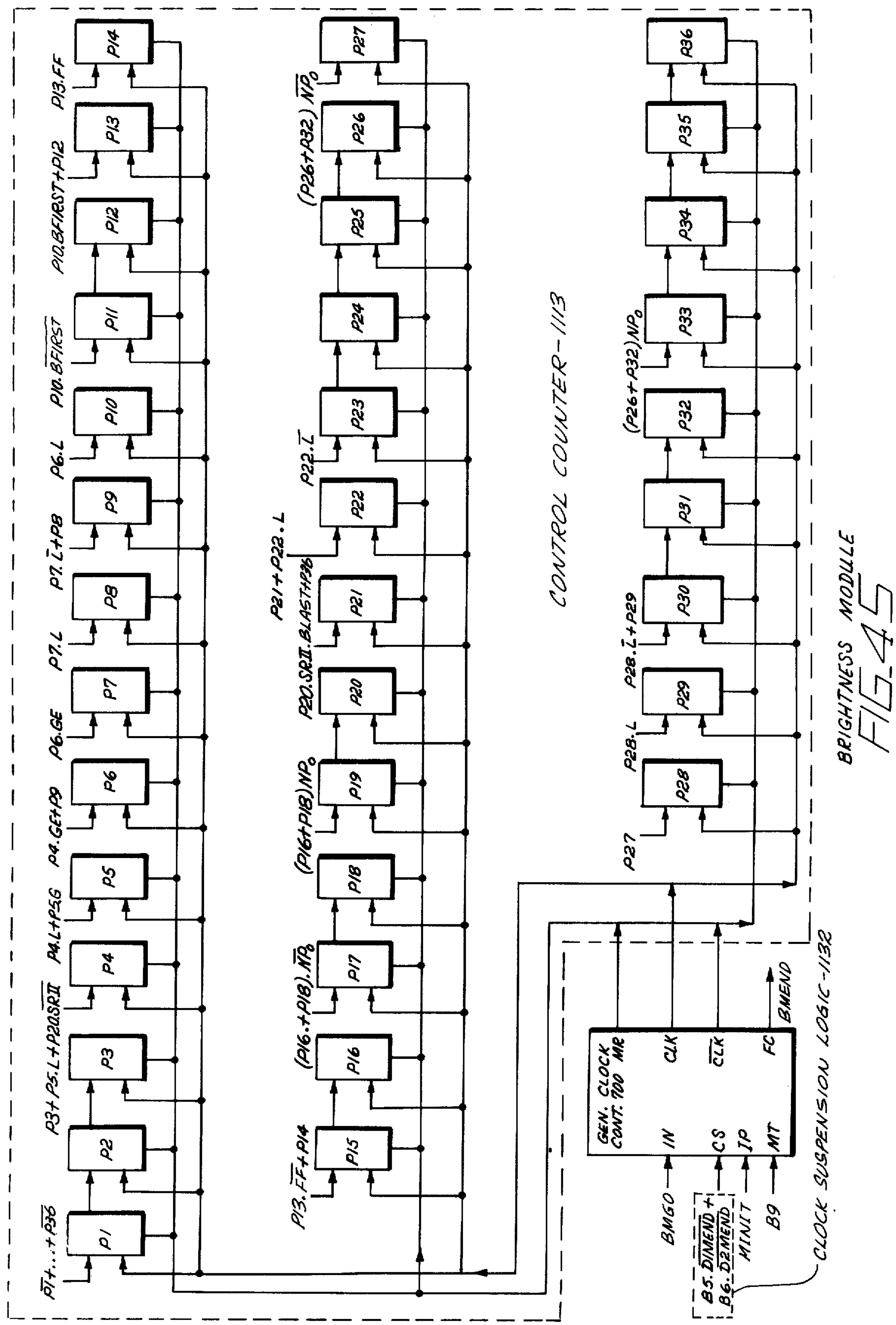

Note carefully that if the request were aligned farther to the left, then for the 0 shift position the sum of offsets would be larger. The sum of offsets would only remain the same regardless of shift position if none of the events in the request match an event in the response. A minimum sum of offsets can be determined as explained above by making a series of one event right shifts and computing the sum of offsets for each position until the minimum sum of offset values is determined. Tables 34 and 35 depict shifts of 0, 3, 6, 7, and 9. The sum of offset values is identified in Table 35 for these shifts as $D_0$, $D_3$, $D_6$, $D_7$, $D_9$, the number following the letter D indicating the number of event positions of shift. Each shift beginning with $D_0$ produces a sum of offsets value which is less than the sum of offsets for the previous position until the minimum sum of offsets value, 8, is reached. This condition is assured since the request is being shifted one position closer towards the match. A shift of 6 produces the minimum sum of offset value 8. Subsequent right shifts after the minimum sum of offset values increases the sum of offset values. FIG. 42A is a graph depicting a sum of offset values as a function of right shifts. The sum of offset values decreases so long as there are more request events to the left of their matching response events than there are on the right. As soon as half or more of the request events either match or lie to the right of the position of their matching response events, the minimum sum of offset values occurs on the graph.

From this information the following equation for scatter value has been derived:

$$S = (Do - Dmin/Do) \qquad \text{Eq. 1}$$

where $S$ = scatter value $Do$ = sum of offsets first response event $Dmin$ = smallest sum of offsets Where no match exists between an event in the request and an event in the response, use an offset equal to the legnth of request (LNRQ).

The significance of assigning an offset value equal to the length of the request will now be explained. FIG. 42-B illustrates the offset for the R event as a function of the number of shifts. Since the request event R does not have a corresponding response event R, the offset value is constant at 6 which is the length or number of events in the request word "PRISON". However, with reference to FIG. 42-C, it will be seen that offsets as a function of shifts for the events P, I, S, decrease from 6 to 0 and then start increasing following a shift of 6. FIG. 42-D depicts the offset as a function of shift for the events O, N. The offsets decrease to 0 and then start increasing at a shift of 7.

Considering Equation 1, if there is no match, $D_0$ will equal $D_{min}$. Therefore, the scatter will be 0. If, on the other hand, there is an exact match between the request and the response, the offset at $D_{min}$ will be 0 and therefore the scatter value will be 1. Thus, the above equation for scatter value produces the desired result of $S = 1$ for a complete match, and $S = 0$ for a complete mismatch.

The implementation of the BRIGHTNESS MODULE for determining the scatter value requires minor rearrangement of the above formula. This rearrangement can be best understood with reference to Table 36. Table 36 shows the request word "PRISON" and the response "PROMISE" in the word "COMPROMISE". Event times 11 through 20 are assigned to the events of the word "COMPROMISE". The offset for a particular request event is generally depicted by the following equations:

$$Offset = BIAS + (t_i - min) \quad \text{Eq. 2}$$

$$= (BIAS + t_i) - min \quad \text{Eq. 3}$$

where:

$BIAS$ = minimum displacement from a request event to the corresponding response event;

$t_i$ = event time in the response corresponding to the request event in question;

$min$ = minimum event time in response.

A value of importance in the implementation of the BRIGHTNESS MODULE is BIAS + $t_i$. Therefore, the following symbol is used to represent the equation:

$$\delta = BIAS + t_i \quad \text{Eq. 4}$$

$\delta$ is also referred to herein as the intermediate ( IV ) value. An equation for scatter value S can then be written as follows:

$$S = \frac{(d_0 + NM) - (d_{min} + NM)}{d_0 + NM} \quad \text{Equation 5}$$

$$\text{Where; } d_0 = \sum_{i=1}^{n} (\delta i - \text{min}) \text{ and} \quad \text{Equation 6}$$

$$d_{min} \sum_{i=1}^{n} (\delta i - \delta \text{ mid}) \quad \text{Equation 7}$$

$\delta i$ = intermediate value $\delta$ for the $i$-th event time;

$\delta$ mid = intermediate value $\delta$ closest to the mid $\delta$ value;

$n$ = no. of request events that are present in response;

$min$ = minimum event time (t) of response;

$NM$ = (LNRQ − $n$) LNRQ (Note: this value adds in the length of the request for each request event for which there is not a corresponding event in the response).

Equation 5 then reduces to $$S =: (d_0 - d_{min})/(d_0 + NM) \quad \text{Eq. 8}$$

The final scatter value equation then becomes;

$$S = \frac{\sum_{i=1}^{n} (\delta i - \text{min}) - \sum_{i=1}^{n} (\delta i - \delta\text{mid})}{\sum_{i=1}^{n} (\delta i - \text{min}) + NM} \quad \text{Equation 9}$$

where:

$\delta$i, $\delta$mid, $NM$ and $n$ are given under Equation 7.

Applying the final equation 9 to the example of Table 36 the values depicted in Table 37 can be derived. Taking the request event P by way of example, the BIAS from the beginning of the response word "PROMISE" is 6 events. The event time for the event "P" in the response "PROMISE" is 14. The $\delta$ value is 6 + 14 = 20. Along the right hand side of Table 37 the $\delta$ values are shown in ascending order of magnitude and this is the final order in which the 0 values are stored in the P/B MEMORY.

It should be noted from Table 37 that neither a $t$ value nor a $\delta$ value is shown for the request event "N". This is because the request event "N" does not have a corresponding event in the response word "COMPROMISE".

A number of intermediate arrays of data are stored in P/B MEMORY but the final intermediate array of data is depicted in Table 38. First, a pipe center (CP) value 18 is stored. This is the largest event time within the entry in question. Next is the "min" value which is defined above as the beginning (or smallest) event time in the response. Next are stored the $\delta$ values in ascending value order. The $\delta$ values shown are taken from the right hand side of Table 37.

The $d_O$ and $d_{min}$ values for the example of Table 38 are computed by the BRIGHTNESS MODULE as follows:

$$d_0 = \sum_{i=1}^{M} (\delta - \text{min})$$

$$= (18 - 14) + (20 - 14) + (20 - 14) + (22 - 14) + (22 - 14) = 4 + 6 + 6 + 8 + 8 = 32$$

$$d_{min} = \sum_{i=1}^{M} |\delta i - \delta\text{mid}|$$

$$= |18 - 20| + |20 - 20| + |20 - 20| + |22 - 20| + |22 - 20| = 2 + 0 + 0 + 2 + 2 = 6$$

where

M = the number of events which are concurrently in the request and the response.

The BRIGHTNESS MODULE then stores a final output into MEMORY MODULE area 3 as depicted in Table 39. The first value stored is the beginning delimiter for the response entry in question. In the example of Table 36, the delimiter would be located one event time to the left of the C in "COMPROMISE" and therefore is 10. Next in MEMORY MODULE area 3 is stored the number "$n$" of matching events between the request and the response. The number of matching events n is also referred to in connection with the BRIGHTNESS MODULE as the "# of hits" for brevity. In this case, "PRISON" has six events whereas only five match and hence the # of hits is 5. Next in MEMORY MODULE area 3 dmin is stored. The dmin value is 6 for the example of Table 36. Next $d_0$ is stored. As computed above, $d_0$ is 32 in the example of Table 36.

The second factor mentioned above for determining the quality of response is the length factor L. The length factor is concerned with the length of the request as compared to the length of the response. One preferable use of the length factor would be at the word layer of the data base to catch misspelling and cull out words which contain the request but which are obviously not the request desired. For example, the length factor would help eliminate the return of the word "FUNDAMENTAL" as a response to the request "MEN". The preferred length factor equation was derived empirically from the following considerations: (1) a function is needed which has a near unity so long as the lengths of the response and request are close; (2) after a definable difference in lengths, the curve should drop off sharply.

The equation for the length factor L is as follows:

Equation 11

$$L = \begin{cases} 1 - \left(\alpha \frac{\Delta}{LNRQ}\right)^3 & \Delta \leq LNRQ \\ \left(\frac{\Delta}{LNRQ}\right)^{-3} & \Delta > LNRQ \end{cases}$$

Where $LNRO$ = length of request $N$ = length of the response $\Delta = |LNRQ-N|$ $\alpha = 0.63$ — the value which maintains a relatively flat curve for L until $\Delta = 1$. At this point ($\Delta = 1$) has a value of 0.75. This value could be adjusted, depending upon user requirements.

If L is taken into account, the quality of the response (B) is defined as $$B = LS \qquad \text{Eq. 12}$$

where;

$S$ is scatter value, and $L$ is length factor

If length if not taken into account, then the quality of response is:

$$B = S \qquad \text{Eq. 13}$$

Table 40 is an example showing how the MINI COMPUTER and the BRIGHTNESS MODULE together would order a "piping set" as to the quality of their response.

B. Components

FIGS. 43–46 form a schematic and block diagram of the BRIGHTNESS MODULE. The registers and counters are of the following type shown in the above *TTL* book and have the following states or flip flops of storage: address counters M1, M2 and M3 have 256 states and are up-type counters with a clear input control and are of type SN74161; register BSAV has 8 flip flops and a load input control and is a data latch, type SN74100; then N and NP counters have 256 states and have load and clear input controls. The N counter is an up counter of type SN74161 and the NP counter is of type SN74191. The NP counter has an output $NP_0$ for indicating when its contents are not 0. Register RII is also a counter, has a load control and a count up input control (CLK) and is of type SN74161. Register RII has 8 flip flops of storage and as a counter has 256 states.

Registers RI, DI, MIN, S, DO and T each have 8 flip flops which are edge triggered and are of type SN74175; registers S, DO and T each have a clear input control (CLR). The register TO has an output $T_0$ for indicating when its contents are 0 and an output $\overline{T_0}$ for indicating when its contents are not 0; registers LNRQ and DII each have 8 flip flops and are down counters of the type SN74191.

DS1 through DS10 are data selectors (hereinafter referred to as selection circuits) and are represented by rectangular boxes with symbols on the inner sides of the boxes corresponding to the inputs. When a true signal is received at the input on the side of the selection circuit box, the correspondingly labeled data input circuit is coupled through to the output circuit of the selection circuit. For example, the DS1 selection circuit has control circuits along the side of the rectangular box labeled "M1 and T" and data inputs to the selection circuit DS1 are from the M1 address counter and the T register. A true signal at the M1 input causes the output of the M1 address counter to be coupled through to the output of the DS1 selection circuit and a true signal at the P input circuit causes the DS1 selection circuit to couple the T register through to the output.

The BRIGHTNESS MODULE also contains the following flip flops: BFIRST, BLAST, FLG, FF, P1 through P36, GT, LT and ET. Each of the flip flops is of the type identified above in the above TTL book. The flip flops P1 through P36 form a control counter 1113 which controls and sequences the operation of the BRIGHTNESS MODULE. In addition, the BRIGHTNESS MODULE includes a generalized clock control 700 of the same type as that discussed above. To be explained in more detail, the generalized clock control 700 has its operation controlled by clock suspension logic 1132.

The BRIGHTNESS MODULE also includes an arithmetic unit (ALU) which is of the same type disclosed hereinabove with respect to the ENCODE MODULE. The ALU forms a true signal at the G and L outputs when the value represented by the signal at the left data input is > and <, respectively, the value of the signal at the left hand data input. The E output receives a true signal when the value of the two data inputs is equal. An OR gate 1150 is connected to the G and E outputs of the ALU and forms a true signal when either the G or E output receives a true signal. An OR gate 1152 is connected to the L and E outputs of the ALU and forms a true signal at the LE output whenever true signals are formed at the L or E outputs. A signal inverter circuit 1140 inverts the signal at the L output and forms a true signal at the $\overline{L}$ output whenever a false signal is formed at the L output.

Figure 46:
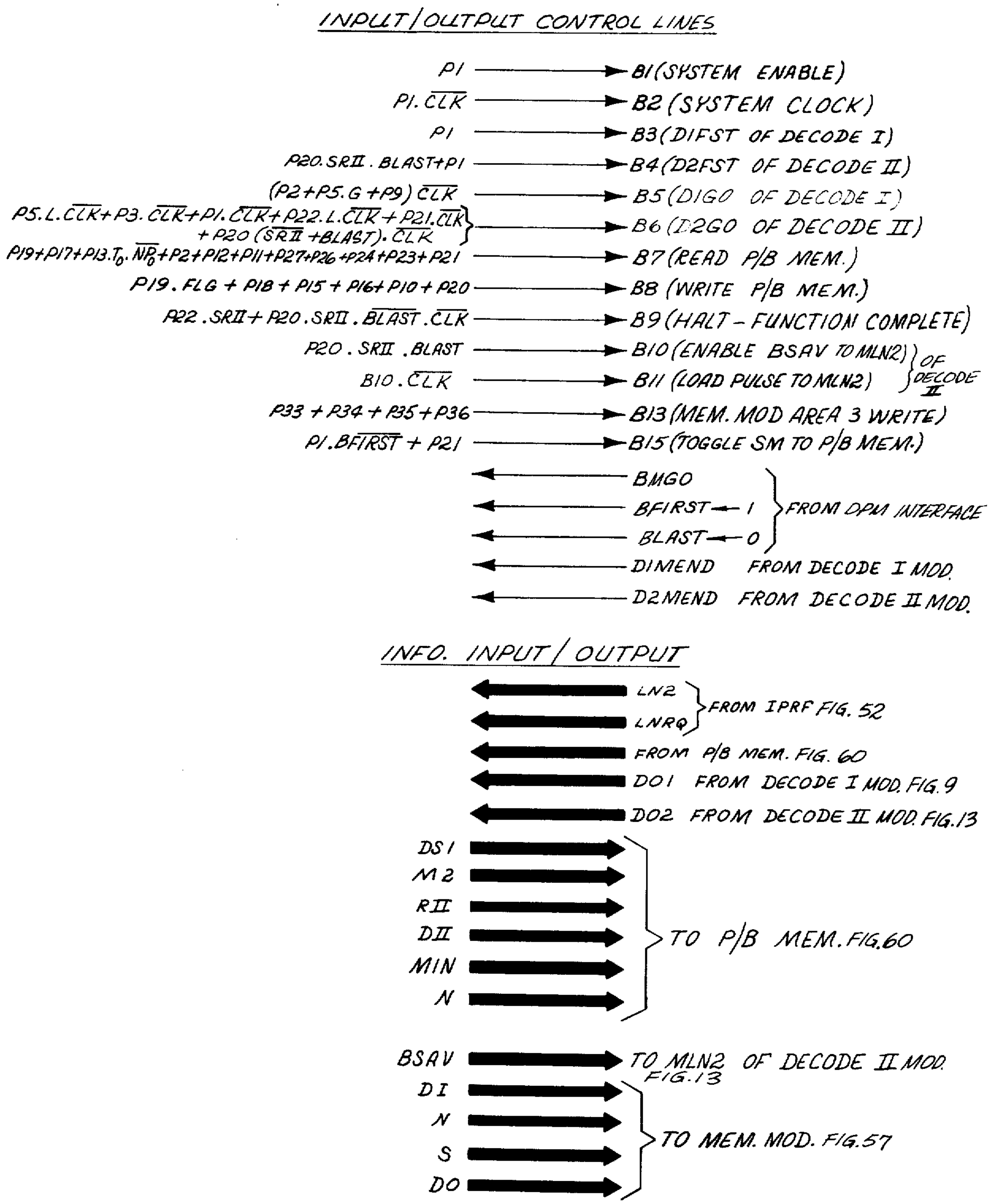
Figure 47:
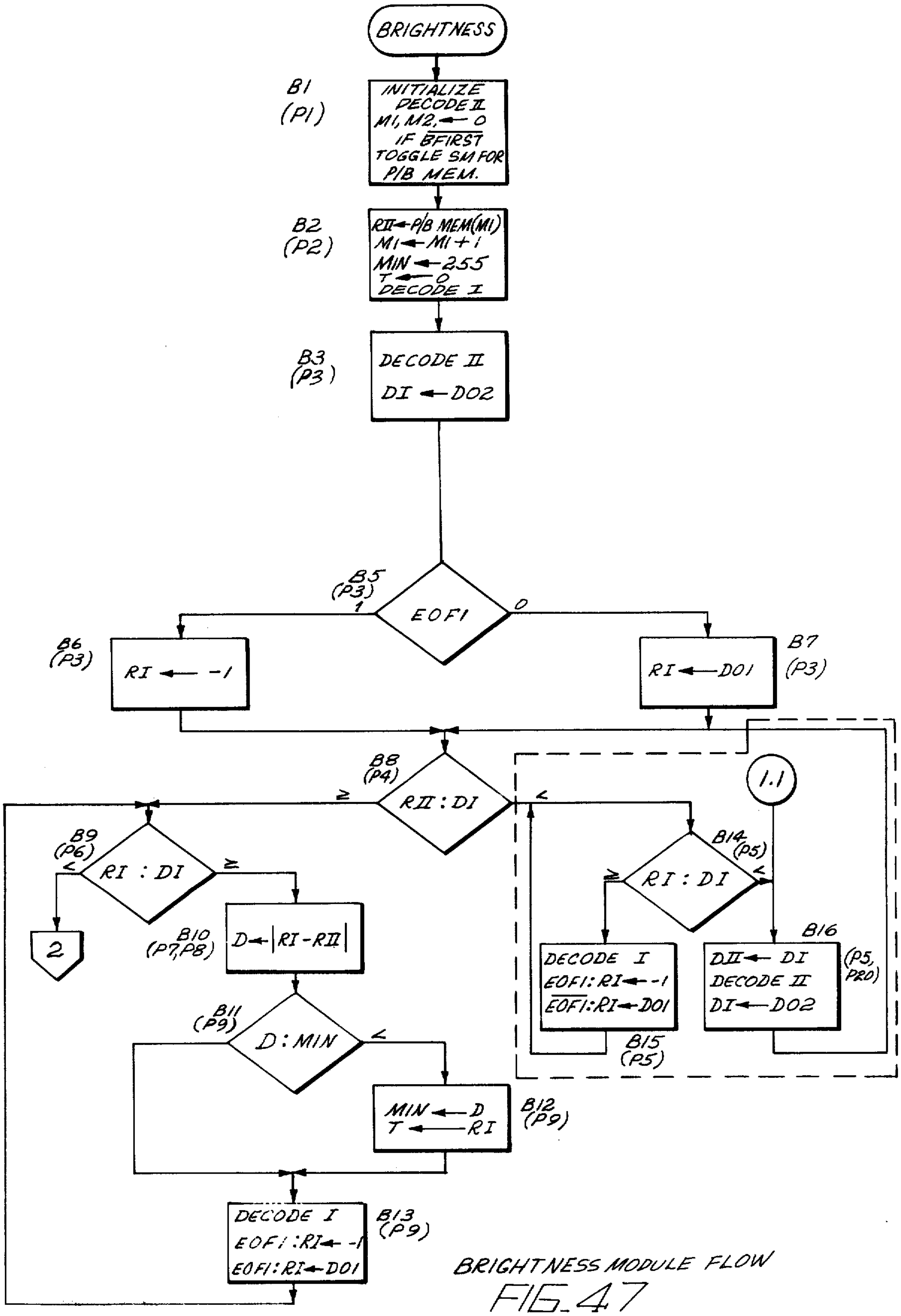
Figure 4B:
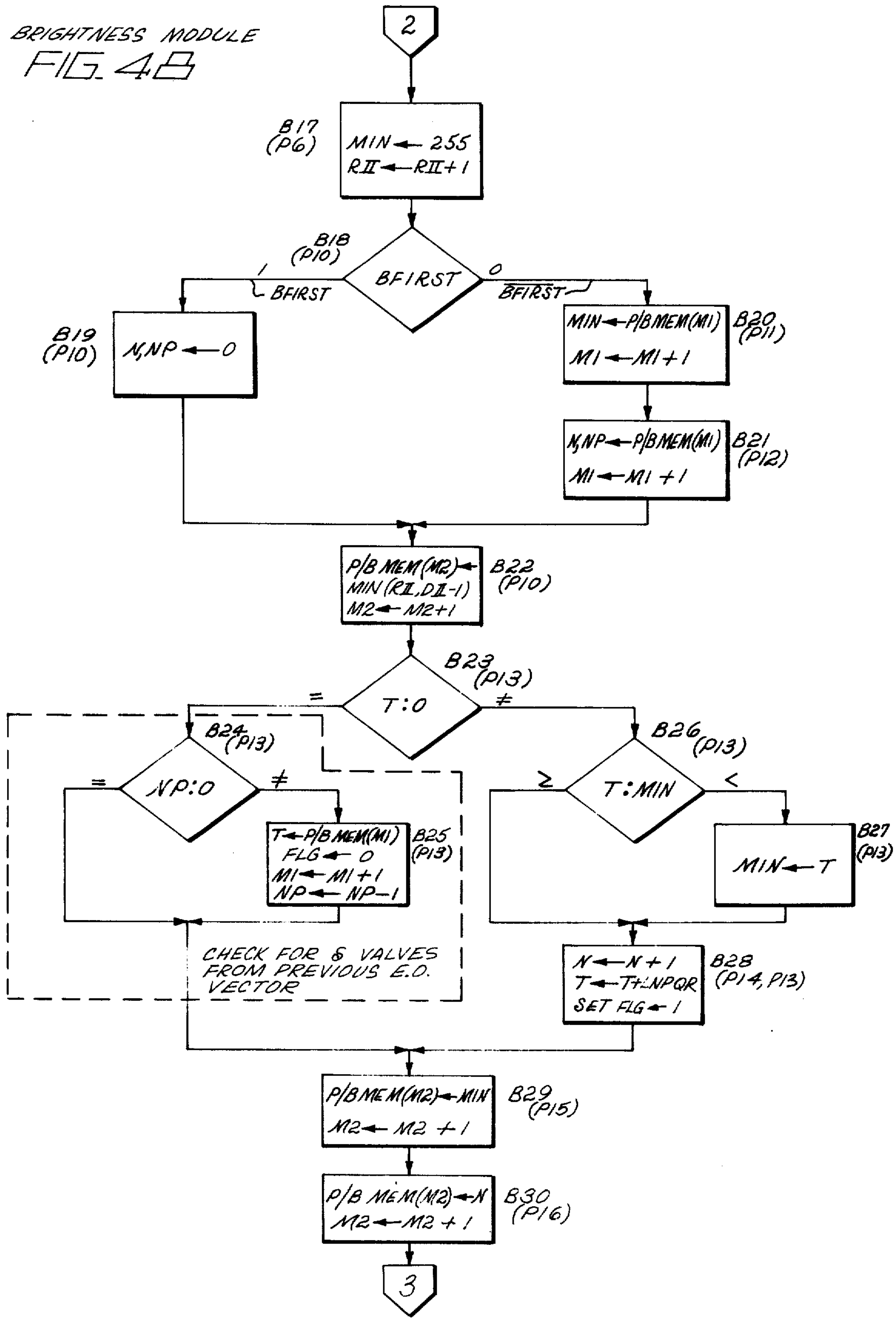
Figure 49:
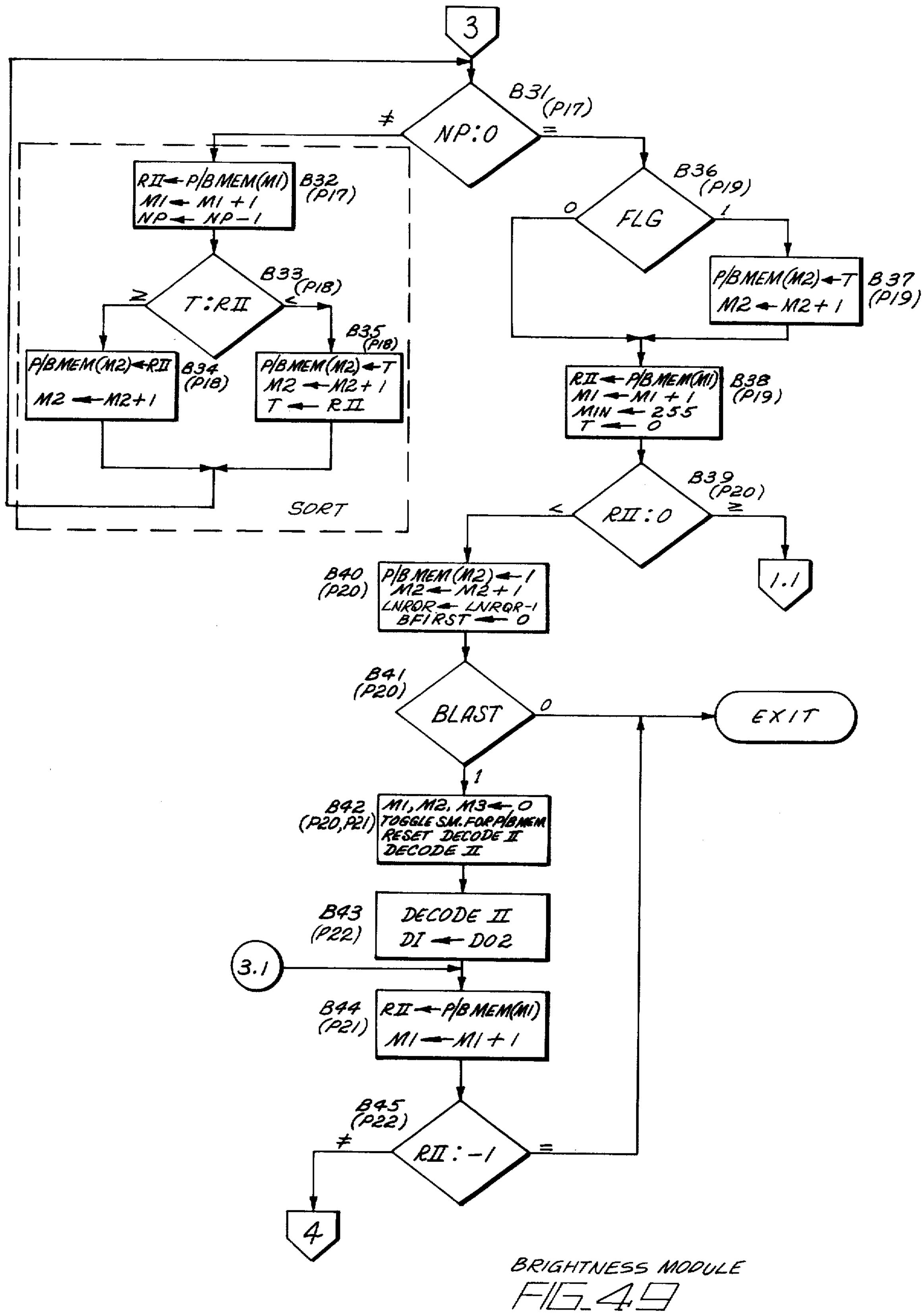
Figure 5D:
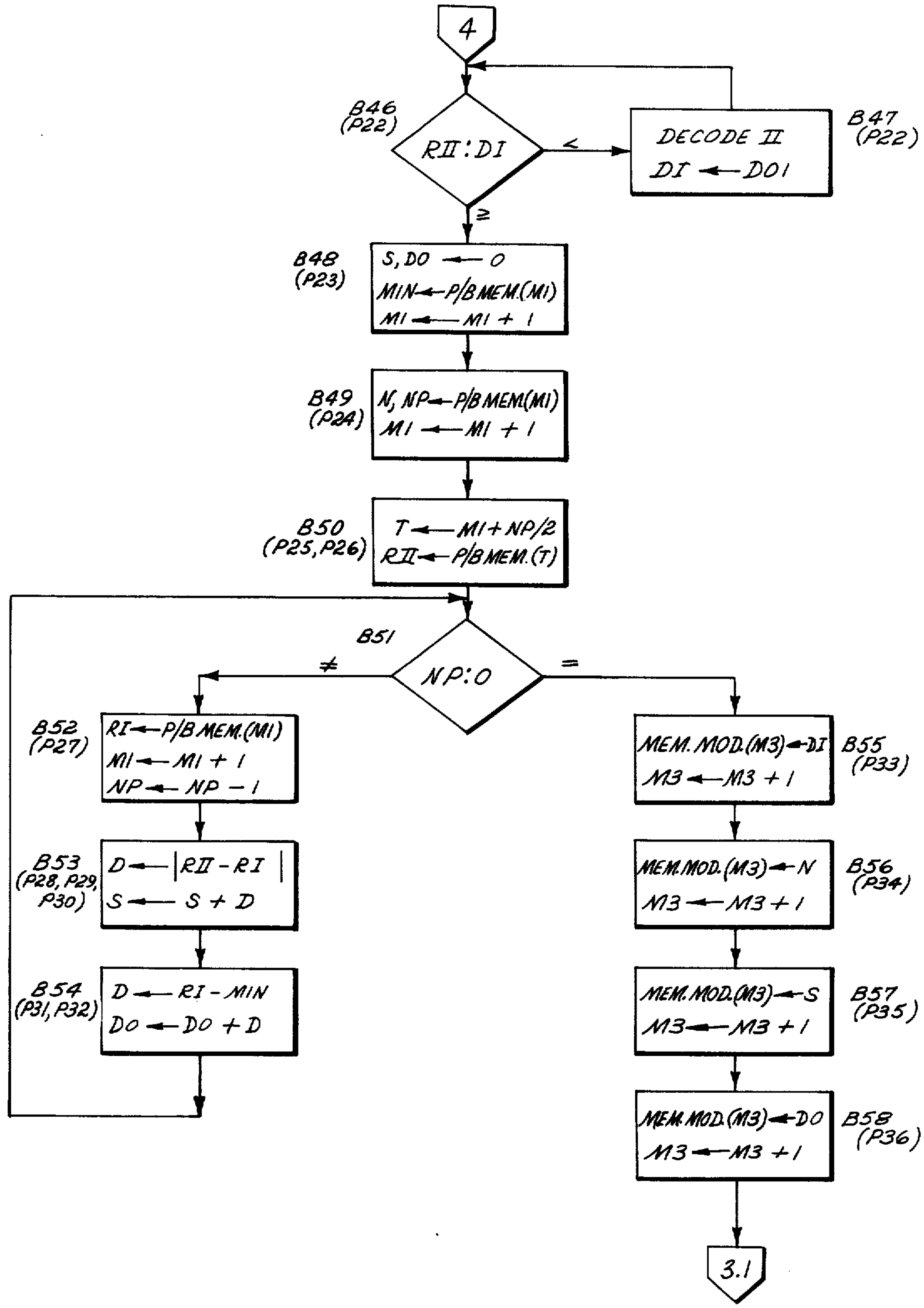

FIG. 46 depicts the control input/output lines and the information input/output for the BRIGHTNESS MODULE. The arrows to the right depict outgoing signals, whereas arrows to the left depict incoming signals. The outgoing control input/output lines each has a symbol at the arrowhead identifying the line and, in parentheses following the symbol, additional symbols corresponding to the part of the rest of the system to which the control lines go. Heavy lines depict multiple lines for carrying multiple bits of information in parallel throughout the BRIGHTNESS MODULE schematic and block diagram.

Also included are switches 1130, 1132 and 1134. The switches are conventional mechanical switches or other electronic circuits which form a continuous 8 bit binary coded signal at the output thereof. Switches 1132 and 1134 form signals representing a −1 whereas the switch 1130 forms signals representing the value 255.

Logical equations are used throughout the BRIGHTNESS MODULE schematic and block diagram to represent gates which in turn control the operation of the indicated circuits.

It should be noted that the outputs of all of the flip flops are not shown in the BRIGHTNESS MODULE but the same convention is used as described in the section I. F. CONVENTIONS AND COMPONENTS USED IN THE FIGURES.

C. Detailed Description

An abbreviated discussion of the general operation of the BRIGHTNESS MODULE is now given with reference to the BRIGHTNESS MODULE flow diagram of FIGS. 47-50. The BRIGHTNESS MODULE flow diagram generally depicts the brightness operation by a sequence of interconnected boxes labeled B1 through B58. Within the boxes are labels indicating actions within and between registers, flip flops, the DECODE I and II MODULES, the MEMORY MODULE and the P/B MEMORY. Also associated with the B designations are the letters P followed by numbers. These P numbers correspond to the flip flops of the control counter in the BRIGHTNESS MODULE which are in a 1 state at the particular points in the operation.

Considering the operation, initially, the MINI COMPUTER under program control obtains the "S" request event occurrence vector and the corresponding delimiter occurrence vector from auxiliary memory, in seed form, and causes the OUTPUT MODULE to revolve them back to the input line in their iso-entropicgrams. The "S" event occurrence vector and delimiter occurrence vector in hybrid code are stored in MEMORY MODULE areas 1 and 2, respectively, as depicted in Table 41. The MINI COMPUTER also loads the IPRF with the length of the request (LNRQ), the length of the first E.O. vector of the request (LN1), the length of the delimiter occurrence vector (LN2), and sets the FIRST and LAST flip flops to states 1 and 0, respectively. Also, the MINI COMPUTER selects pipe center values from among those stored by the PIPE MODULE in the P/B MEMORY which are to be used during the brightness operation and stores those in P/B MEMORY area 1. These conditions are depicted by way of example in Part 1 of Table 41.

During the subsequent operation, the DECODE II MODULE always reads and decodes from the delimiter occurrence vector in MEMORY MODULE area 2, going from the largest (end) to the smallest delimiter. Similarly, the DECODE I MODULE always reads and decodes from the event occurrence vector in MEMORY MODULE area 1 going from the beginning (largest) to last (smallest) event occurrence value. Likewise, the P/B MEMORY is read going from the beginning (largest) to the last (smallest) pipe center values.

B1 of the BRIGHTNESS MODULE flow is now entered where the BRIGHTNESS MODULE is initialized, the M1 read address counter and the M2 write address counter for the P/B MEMORY are reset to 0, the DECODE II MODULE provides a beginning delimiter from the delimiter vector into its register DO2. The beginning delimiter is also an end delimiter.

During B2, a pipe center value is read from the P/B MEMORY area 1 using the M1 address counter, the MIN register is set to 255 (a forced value equal to the largest possible pipe center value for an 8 bit word) and the T register is set to a minimum value of 0. During B3, the beginning delimiter is stored in register DI and the DECODE I MODULE provides an event occurrence value from the stored event occurrence vector. If this is not the last end of the event occurrence vector file (EOF1 $\neq$ 1), then B7 is entered where the event time value is stored into RI register.

During B8 of the BRIGHTNESS MODULE flow, the pipe center value contained in the RII register is checked against the beginning delimiter contained in the DI register to see if the pipe center lies between the beginning and end delimiters in registers DI and DII. By virtue of the sequence of operation and the fact that the first pipe center is never greater than the ending delimiter of a delimiter occurrence vector, it is only necessary to check the pipe center against the beginning delimiter in the DI register to see if the pipe center lies between the two delimiters. If the pipe center does not lie between the two delimiters, it is $<$ the beginning delimiter in the DI register. Under these circumstances, B14 through B16 are entered. If the pipe center does lie between the two delimiters, it is $>$ the beginning delimiter in the DI register. Then B9-14 B13 are entered.

During B14 and B15, the DECODE I MODULE is adjusted so that it passes over each of the event occurrence values in the event occurrence vector for the entry designated by the beginning delimiter in the register DI. However, the smallest event occurrence value is saved in register RI. To this end, at B14 the contents of the RI and DI registers are compared and if the event occurrence value in register RI is $\geq$ the beginning delimiter in register Di, then B15 is entered where the DECODE I MODULE provides the next event occurrence value from the event occurrence vector. This operation continues, reading the event occurrence values from largest to smallest value, until, during B14, the event occurrence value in register RI is smaller than the beginning delimiter in register DI. B16 is then entered.

During B16, the next lower valued delimiter is provided by the DECODE II MODULE and stored in the DI register and the lower delimiter previously stored in register DI is transferred to register DII. B8 is then reentered. This operation continues through B8, B14, B15 and B16 until the delimiter in register DI is smaller than the pipe center value in register RII. When this occurs, the DECODE II MODULE has been adjusted so that the pipe center in register RII lies in the proper event as specified by the delimiter in register DI and B9 is entered.

During B9, the event occurrence value for the event occurrence vector contained in register RI is compared against the beginning delimiter in register DI and if greater or equal to, there is an event occurrence value within the entry designated by the beginning delimiter in register DI. B10 through B13 is then entered.

During B10, the difference between the event occurrence value in register RI and the pipe center in RII is computed and the absolute value is stored in register D. During B11, the difference value contained in the D register is compared with the content of the MIN register and if the former is smaller, then B12 is entered where the difference value in register D is transferred to the MIN register, and the corresponding event occurrence value in register RI is transferred to the T register. In this manner, the event occurrence value of the event occurrence vector with the smallest displacement from the corresponding pipe center (in register RII) is stored into the T register for future use. It will be recognized that the smallest event occurrence value from all event occurrence vectors of a response that lies in one entry (i.e., between two adjacent delimiters) is the "min" value of Equation 9 above.

During B13, the DECODE I MODULE provides the next smaller event occurrence value for storage in the RI register. The loop through B9–B13 is then repeated until each event occurrence value in the entry lying above the delimiter in register DI has been processed and the one closest to the current pipe center has been found and stored in register T.

When an event occurrence value is found and stored in register RI that is smaller than the beginning delimiter in register DI, the last event occurrence from the entry specified by the delimiter in register DI has been processed. B17 of the BRIGHTNESS MODULE flow is then entered.

During B17, the register MIN is again initialized to the forced maximum value of 255 and the pipe center in register RII is increased by one so that it is equal to the event occurrence value for the next higher event in the response. The incremental value, to be explained in more detail, is stored in the P/B MEMORY and is subsequently read out for processing the next event occurrence vector in the response. Incrementing of the pipe center is similar to prejudicing or moving the request one event position to the right with respect to the response as discussed above.

During B18, the BFIRST flip flop is checked. the BFIRST flip flop is in a 1 state while processing the first event occurrence vector and is in a 0 state while processing the second and subsequent event occurrence vectors. Thus, for the first event occurrence vector, B19 is next entered where the N and NP registers are reset to 0 and subsequently B22 is entered.

If during B18 the BFIRST flip flop is in a 0 state indicating that the second or subsequent event occurrence vector of the response is being processed, B20 and B21 are entered where the current minimum event occurrence value and hit count, previously stored in P/B MEMORY, are read and stored into the MIN, N (and NP) registers, respectively. Thus, the MIN register contains the minimum event occurrence value up to this point for one particular entry (corresponding to one delimiter value in register DI) and the N and NP registers contain the # of hits which is equal to the number of δ values for such entry up to this point.

B22 of the BRIGHTNESS MODULE flow is now entered. Hence, the minimum of the pipe center (RII) and ending delimiter −1 (i.e., DII −1) is stored into the P/B MEMORY. The purpose for the choice is that a pipe center (CP) value is being stored into the P/B MEMORY at the beginning of a list of information for one particular entry. This value, as mentioned above, identifies the next higher event occurrence value next to be processed for the next event occurrence vector of the response. However, there is a limitation as to the possible event times and that limitation is the ending delimiter (DII −1) for the entry being processed. Thus, the next to end delimiter DII −1 is the highest event occurrence value that is obtainable within the entry and the highest event occurrence value stored during B22.

B23 of the BRIGHTNESS MODULE is now entered during which the register T is checked to see if it contains an event occurrence value. If an event occurrence value is contained in the T register (≠ 0), this indicates that there is an event occurrence value in the present entry designated by the beginning delimiter in DI and B26 and B27 are entered.

During B26, the new minimum event occurrence value in the T register is compared with the minimum event occurrence value read from P/B MEMORY from a previously processed event occurrence vector of the response. If the new minimum event occurrence value (T) is smaller, then B27 is entered where the new minimum event occurrence value (T) is stored into the MIN register, this becoming "min" of Equations 2 and 3 above. If formerly stored min in register MIN is smaller or equal, then B28 is entered directly, skipping B27, thereby saving the min value in register MIN.

During B28, the # of hits count in counter N corresponding to the total number of matching events counted to this point is incremented by one. Also, the length of request value, which corresponds to the BIAS above, is contained in the LNRQR register and is added to the new event occurrence value presently being processed in register T and the result is stored back into the T register. Returning to the theory, it will be recognized that this corresponds to $t_i + BIAS = \delta i$ in the scatter value (S) equation. Thus, at this point, a new δ value has been formed and stored into the T register and the total number of δ values in the present entry has been counted by the N counter.

Following B28, B29 is entered. If there are no event occurrence values in the present entry for the current event occurrence vector being processed (which lies between DI and DII), the T register will not contain a new minimum event occurrence value (T = 0) at B23, and B24 and B25 will then be entered following B23. During B24 and B25, a previously stored δ value, if one exists, for the entry specified by DI from previously processed event occurrence vectors, is read from the P/B MEMORY and stored in the T register. The NP counter keeps track of the number of δ values stored in the P/B MEMORY for the entry being processed. If there are δ values, the NP counter will not be 0 and B25 is entered following B24 where a δ value is read from the P/B MEMORY and stored into the T register and the NP counter is decremented by one. Following B25, B29 is entered. If the NP counter was 0, then B29 would have been entered directly from B24.

During B29 and B30, the minimum event occurrence value for the present entry specified by DI is stored from the MIN register into the P/B MEMORY and the # of hits count is stored from the N counter into the P/B MEMORY. Following B30, B31 of the BRIGHTNESS MODULE flow is entered.

During B31, the NP counter is checked to see if it is 0. If it is 0, then all of the δ values for the present entry (specified by DI) and contained in the P/B MEMORY are in sorted order. If, however, the NP counter is not 0, a δ value remains in the P/B MEMORY to be sorted into increasing value order as discussed hereinabove.

To this end, during B32, a δ value is read out of the read area of the P/B MEMORY, stored into the RII register and the NP counter is decreased by one. During B33, the magnitude of the δ value in register RII is compared with that of the δ value in the T register. If the δ value in T is larger, then B34 is entered where the smaller δ value in the RII register is stored into the P/B MEMORY. If the δ value in RII is larger, then B35 is entered where the δ value in the T register is stored in the P/B MEMORY and the larger δ value in RII register is transferred to the T register. In this manner, the δ values are stored in increasing value order in the write area of the P/B MEMORY.

After all the incremental values in the P/B MEMORY have been processed through B31 through B35, then the NP counter will be reduced to 0 and B36 through B38 will be entered.

If during B36 the FLG flip flop is in a 1 state, having been set there during B28, a new δ value will have been formed in the T register which is to be stored into the corresponding field of the P/B MEMORY. To this end, B37 is entered where the content of the T register is stored in the P/B MEMORY. If the FLG flip flop is in a 0 state, B37 is skipped as there is no δ value to be stored. During B38, the next pipe center value (CP) is read out of the P/B MEMORY into the RII register, the forced maximum value of 255 is stored in the MIN register and the T register is set to 0.

If during B39 the pipe center value contained in RII register is ≧0, it contains another pipe center value, (read during B38 from P/B MEMORY) to be processed. Accordingly, B16 is reentered where the DECODE I and II MODULES for the event occurrence vector and delimiter occurrence vector are repositioned for the next entry which corresponds to the pipe center (CP) in the RII register.

This operation continues, returning to B16, until after the last pipe center (CP) value has been read in from the P/B MEMORY. The end of field value −1 is then read from the P/B MEMORY and stored in RII register during B38. Subsequently, during B39, RII contains the −1 (end of field) value and B40 is entered.

During B40, a −1 is written into the P/B MEMORY at the end of the δ field, thereby indicating the end of field for the corresponding entry. Additionally, the length of request value contained in the LNRQR register is counted down one to reflect that one of the event occurrence vectors of the response has been processed. The LNRQR register now contains the BIAS value for the next event occurrence vector of the response.

During B41, the BLAST flip flop is checked. The BLAST flip flop indicates when the last event occurrence vector of the response has been processed. If the BLAST flip flop is a 0, the last event occurrence vector has not been processed and the BRIGHTNESS MODULE exits. If the BLAST flip flop is a 1, the last event occurrence vector has been processed and B42 is entered. B1–B41 sets up phase I in which the $S_u$ and min are computed. B42–B58 are entered only after all entries have been processed and it does the summing to compute D*o* and Dmin.

At this point, the P/B MEMORY contains an array of data such as that depicted at Part 6, Table 41.

Consider now the second half of the operation of the BRIGHTNESS MODULE commencing with B42. When the last event occurrence vector of the response has been processed and the BLAST flip flop is set to a 1 state by the MINI COMPUTER, B42 is entered following B41. During B41, the switching flip flop (SM) for the P/B MEMORY is toggled, thereby interchanging the read and write areas. In other words, the BRIGHTNESS MODULE will now read from the area 2 in which it originally wrote and will write into area 1, from which it was originally reading. Additionally, the M1, M2 and M3 address counters are reset to 0 and the DECODE II MODULE is reset so that it starts reading at the largest or end delimiter of the delimiter occurrence vector. Also during B42, the DECODE II MODULE reads and discards the end delimiter.

During B43, the DECODE II MODULE reads the next to end delimiter which is the beginning delimiter of the last entry and the delimiter is stored into the DI register.

B44 through B58 are then entered repeatedly until each of the CP values and their associated min values (# of hits) and δ values have been processed. More specifically, the purpose of B44 through B58 is to process each CP and associated field of values and store back in MEMORY MODULE area 3 the delimiter for the beginning of the corresponding entry followed by the number of matching events between the request and the response (# of hits) and the $d_{min}$ and $d_0$ values which go into the computation of the scatter value (S).

To this end, during B44 the CP value for an entry is read from the P/B MEMORY and stored into the RII register. During B45, the content of the RII register is checked to see if the end of field (−1) value has been reached. If an end of field value has been reached, the BRIGHTNESS MODULE exits. If the end of field has not been reached, then B46 is entered.

During B46 and B47, the DECODE II MODULE is adjusted so that it provides to the register DI the beginning delimiter for the CP value now stored in the RII register. When this has been accomplished, the CP value in RII is ≧ the delimiter in the DI register and B48 is entered. During B48 and B49, the S and $D_0$ registers are set to 0, the P/B MEMORY reads out the mimimum event time value (MIN) for storage in the MIN register and the P/B MEMORY reads out the # of hits value for storage in the N and NP counters.

During B50, the binary value represented by the content of the NP register is right shifted with respect to the corresponding ALU inputs by one binary bit, thereby dividing the number by two and the result is added to the address in the address counter M1 with the result being stored in the T register. The right shift is done by a wiring connection between the NP register and DS10 selection circuit. In this manner, the address of the midpoint of the δ values in the P/B MEMORY is computed and stored in the T register. The δ value specified by the address in the T register is now read out of the P/B MEMORY and stored in the RII register. The δ value in the RII register is the δ mid value discussed above.

During B51, a check is made to see if the P/B MEMORY contains any δ values left for processing for the entry presently being processed. If the NP counter is 0, there are no δ values left to be processed and B55 is next entered. If, however, the NP counter is not 0, then there is one or more remaining δ values in the P/B MEMORY for the present entry and B52 through B54 are entered.

During B52, the δ value is read out of the P/B MEMORY and stored in the RI register and the NP counter is decreased by one to reflect that one of the δ values has been removed. During B53, the absolute value of the difference between the δ mid value in RII and the δ value in RI is formed and stored in the D register. Also during B53, the S register is used as an accumulator to store the source of the present and previous difference values stored into the D register. Thus, the S register contains the sum of the difference values which corresponds to the $d_{min}$ value.

During B54, the difference between each δ value and the min value stored in the RI and MIN registers is taken and the result is stored in the D register. The $D_0$ register is used as an accumulator for accumulating the present and previous difference values stored into the D register during B54. Thus, the $D_0$ register contains the sum of δ -min difference values which corresponds to the $d_0$ value. The loop around B51 through B54 is repeated until all of the δ values have been processed. For each δ value read from the P/B MEMORY, the NP counter is reduced by 1 and when 0, B55 through B58 are entered.

During B55, the beginning delimiter of the current event stored in the DI register is first stored into the MEMORY MODULE area 3. During B56, the # of hits (number of matching request and response events) is stored from the N counter into the next location in MEMORY MODULE area 3. During B57, the $d_{min}$ value is stored from the S register into the next location of MEMORY MODULE area 3. During B58, the $d_0$ value in register $D_0$ is stored into the next location of MEMORY MODULE area 3.

Following B58, B44 is reentered where the CP value, min value, # of hits value, and δ values for the next entry are processed.

Finally, when the values for the last entry have been processed, a −1 end of field value is stored into the RII register during B50 and is detected upon reentering B45, causing the BRIGHTNESS MODULE to exit.

After the last exit by the BRIGHTNESS MODULE, the MEMORY MODULE area 3 contains a field of information such as that shown in Part 7 of Table 41. The field of information is then read by the MINI COMPUTER which computes the scatter value, using the formula discussed above.

The following discussion makes reference to the calls upon the DECODE I and II MODULES wherein these modules decode a value from the hybrid code to absolute code. Time is required for the module to perform its conversion. Accordingly, the clock suspension logic 1132 forms a true signal at the CS input of the generalized clock control 700 whenever a call is made on the DECODE I and II MODULES and this causes a suspension of the CLK and $\overline{CLK}$ pulses and hence a suspension of the BRIGHTNESS MODULE operation until the called module completes its decode operation. The $\overline{D1MEND}$ and $\overline{D2MEND}$ outputs from the DECODE I and II MODULES are normally true and go false momentarily when the corresponding decode module finishes a decode operation. Thus, when the DECODE I MODULE is called by the BRIGHTNESS MODULE, the BRIGHTNESS MODULE output B5 is true, causing a true condition of logic B5.$\overline{D1MEND}$ and hence a true condition of the clock suspension logic 1132. This true condition causes the CS input to be true and hence the generalized clock control 700 terminates the CLK and $\overline{CLK}$ pulses.

When the DECODE I MODULE finishes its decode operation and has the decoded value in register DO1 ready to be read, $\overline{D1MEND}$ becomes false, causing a false condition of logic B5.$\overline{D1MEND}$ and hence of the clock suspension logic 1132. This causes the CLK and $\overline{CLK}$ pulses to resume and operation of the BRIGHTNESS MODULE resumes at P6 of the control counter 1113.

The B6 output of the BRIGHTNESS MODULE receives a true signal whenever the DECODE II MODULE is called. Thus the B6.$\overline{D2MEND}$ logic performs a similar function for the DECODE II MODULE as logic B5.$\overline{D1MEND}$ does for the DECODE I MODULE.

Consider now an actual operation of the BRIGHTNESS MODULE taking the example used in the PIPE MODULE. The data base reply is the sentence "THIS IS A TEST" depicted in the PIPE MODULE Table 1. The request is the word "SIT".

Initially, the DPM INTERFACE MODULE forms a control signal at the MINIT output and MINIT is fed to the general clock control circuit 700 which causes MR to become high thus resetting control counter 1113 to 0.

Table 41 depicts the data stored in the MEMORY MODULE, the P/B MEMORY, and the IPRF during the operation of the BRIGHTNESS MODULE. Part 1 of Table 41 depicts the information stored into the IPRF and MEMORY MODULE to process the event "S" from the request word "SIT". Thus, the MINI COMPUTER, under program control, initially stores 3, the number of events in the request (length of request) into the LNRQ of IPRF; stores 3, the number of physical words in the event occurrence vector (length of event occurrence vector) into LN1 of IPRF; and stores 4, the number of physical words needed to store the delimiter event occurrence vector (delimiter occurrence vector length) into LN2 of IPRF. All are depicted in Part 1 of Table 41. Also, the MINI COMPUTER initially stores the "S" event occurrence vector, in hybrid coded form, into MEMORY MODULE area 1; stores the delimiter occurrence vector for the response "THIS IS A TEST" into MEMORY MODULE area 2; and stores the pipe center values (selected from among those provided by the PIPE MODULE) into P/B MEMORY area 1, all as depicted in Part 1 of Table 41. Additionally, as depicted in Part 1 of Table 41, the FIRST and LAST flip flops are set to 1 and 0, respectively. The 1 state of flip flop FIRST indicates that the first event occurrence vector of the request is being processed and the 0 state of flip flop LAST indicates that the last event occurrence vector is not being processed.

THE DPM INTERFACE MODULE then forms a true signal at the BMGO output to the IN input to the generalized clock control 700, causing it to commence applying CLK and $\overline{CLK}$ clock pulses. Since all the P1 flip flops in the control counter 1113 are initially in a 0 state, the first CLK pulse sets the P1 flip flop to a 1 state, causing B1 of the BRIGHTNESS MODULE flow to be entered.

During B1, a true signal is formed at the P1 output of the P1 flip flop, causing the M1 and M2 P/B MEMORY read and write address counters to be reset to 0 and causing true signals at the B3 and B4 outputs of the BRIGHTNESS MODULE (see FIG. 50). The true signal at the B3 and B4 outputs causes the D1FST flip flop in the DECODE I MODULE and the D2FST flip flop in the DECODE II MODULE to be set to 1, thereby indicating that the first call is about to occur on the corresponding decoders. The true signal at the P1 output also causes the logic P1.$\overline{CLK}$ to be true, thereby causing a true signal at the B6 output of the BRIGHTNESS MODULE. The true signal at the B6 output causes the D2GO multi-vibrator to be set to a 1 state, thereby calling the operation of the DECODE II MODULE. The DECODE II MODULE then reads in the beginning delimiter 15 for the work "TEST" from MEMORY MODULE area 2 (see Part 1 of Table 41) into its register DO1. Subsequently the true signal at P2 stores the value from register DO1 into DI. The subsequent true signal at P3 causes the value to be stored from DI into the DII register.

The true signal at the P1 output causes the P2 flip flop to be set to a 1 state and the P1 flip flop is reset to a 0 state at the following CLK pulse, thereby causing B2 of the flow to be entered.

The true signal at output P1 also causes a true signal at the B1 output of the BRIGHTNESS MODULE which goes to various modules in the system thereby enabling values to the following modules: SWITCH MATRIX, DECODE I MODULE and DECODE II MODULE. The true condition of the logic $P1.\overline{CLK}$ also causes a true signal at the B2 output of the BRIGHTNESS MODULE, thereby applying a system clock to the modules in the system, causing the above values enabled by the output B1 to be stored in the respective modules.

During B2 of the flow, the true signal at the P2 output of the P2 flip flop causes true signals at the B5 and B6 outputs of the BRIGHTNESS MODULE which, in turn, call the operation of the DECODE I MODULE. The DECODE I MODULE is now operating on the entry "TEST" (see PIPE MODULE, Table 1). Calling of the DECODE I MODULE causes it to provide the largest event occurrence value 13 from the "S" E.O. vector stored in MEMORY MODULE area 1 (see Part 1 of Table 41). Additionally, the true signal at the P2 output causes the DS7 selection circuit to couple the signals representing the forced maximum value of 255 from the switches 1030 to the input of the MIN register. The DS1 selection circuit receives a true signal at the $\overline{P25}$ output, causing the output of the M1 register to be coupled to the address input of the P/B MEMORY. The true signal at the B7 output causes the P/B MEMORY to read out the fist pipe center value 13 (see Part 1 of Table 41) using the address 0 in the read address counter M1. The true condition of logic $P2.\overline{CLK}$ causes the RII register to store the pipe center value 13 from P/B MEMORY and causes the MIN register to store the forced maximum value 255. The true signal at the P2 output also causes the P3 flip flop to be set to a 1 state, and the P2 flip flop to be reset to a 0 state at the following CLK pulse, thereby causing B3 of the flow to be entered.

During B3 of the flow, true signals are formed at the P3 and $\overline{P22}$ outputs of flip flops P3 and P22, respectively. The logic $P3.\overline{CLK}$ becomes true, thereby forming a true signal at the B6 output of the BRIGHTNESS MODULE, causing the D2GO flip flop in the DECODE II MODULE to be set, thereby calling the operation of the DECODE II MODULE, causing it to read out the beginning delimiter 10 for the response word "TEST". The logic P4 causes the beginning delimiter 10 to be stored into the register DI.

The EOF1 flip flop in the DECODE I MODULE is now in a 0 state because the end of the "S" E.O. vector field has not been reached. The P22 flip flop is in a 0 state and B7 of the flow is entered. The P22 flip flop is a 0 state and B7 of the flow is entered. Accordingly, the logic $\overline{EOF1}.\overline{P22}$ is true, causing the DS6 selection circuit to couple the event occurrence value 13 in register DO1 of the DECODE I MODULE to the input of the RI register. Additionally, the logic $P3.\overline{CLK}$ causes the RI register to store the "S" E.O. value 13 from the DECODE I MODULE. The true signal at the P3 output of flip flop P3 also causes the P4 flip flop to be set to a 1 state and the P3 flip flop is reset to a 0 state at the following CLK pulse, thereby causing B8 of the BRIGHTNESS MODULE flow to be entered.

During B8 of the flow, a true signal is formed at the P4 output of flip flop P4. The true signal at the P4 output causes the DS9 and DS10 selection circuits to couple the output of the RII (13) and the DI (10) registers to the input of the ALU and also to form a true signal at the C (compare) input of the ALU. In the preceding sentence and in the following discussion, a parenthesis ( ) following a register label indicates the value contained therein. Thus register RII contains a value 13 and register DI contains a value 10. The ALU detects that the content of register RII (13) is larger than that of register DI (10), and is therefore within the event determined by the delimiter in register DI. Accordingly, the ALU forms a true signal at the output G, causing the OR gate 1150 to form a true signal at the GE output. The true signal at the GE output causes the logic P4.GE to be true and the following pulse at the CLK output causes the P6 flip flop to be set to a 1 state, and the P5 flip flop to be reset to a 0 state, causing B9 of the flow to be entered.

During B9 of the flow, the true signal at the P6 output causes the register RI (13) and the register DI (10) to be coupled through the DS9 and DS10 selection circuits to the two inputs of the ALU and causes a true signal at the C input of the ALU. The ALU compares the two values and finds that the event time value 13 in register RI is the larger and hence is within the entry designated by the delimiter 10 in register DI and forms a true signal at the G output, causing the OR gate 1150 to form a true signal at the GE output. THe logic P6.GE then becomes true and the following pulse at the CLK output causes the P7 flip flop to be set to a 1 state, and the flip flop P6 to be reset to a 0 state.

B10 is now entered. The true signal at the P7 output causes the event time 13 in register RI to be coupled thrugh the DS9 selection circuit to one input of the ALU and the pipe center value 13 in register RII to be coupled through the DS10 selection circuit to the other input of the ALU. Additionally, the S (subtract) input of the ALU receives a true signal and the ALU subtracts the two values, resulting in signals representing a 0 at the OP output. The logic $P7.\overline{CLK}$ becomes true, causing the D register to store the 0 output at OP. It should be noted at this point that should the subtraction have resulted in a negative value, such as when the contents of RI is < that of RII, a true signal would be formed at the L output of the ALU during the subtraction process, causing the logic P7.L to become true, thereby causing the P8 flip flop to be set to a 1 state and the P7 flip flop to be reset to a 0 state. What will happen under these circumstances is that the DS9 and DS10 selection circuits will recouple the RI and RII registers to the ALU again, but this time reversed, so that a positive number will result and the positive number will be restored into the D register. In this manner, a positive or absolute value result always ends up in the D register as indicated in B10 of the flow.

In the example where the difference is 0, a true signal is formed at the $\overline{L}$ output of the signal inverter 1140 and accordingly, the logic $P7.\overline{L}$ is true, causing the P9 flip flop to be set to a 1 state.

Note carefully now what has happened during B10. The difference between the pipe center 13 and the first event occurrence value 13 has been computed and found to be 0. Therefore, the displacement therebetween is the smallest possible, namely, 0. The event occurrence value 13 is then the value min for the entry "TEST" designated by the delimiter 10 in register DI.

B11 is now entered where the true signal at the P9 output causes the DS9 and DS10 selection circuits to couple the difference of 0 from the D register and the forced maximum value 255 from the MIN register to the two inputs of the ALU and a true signal at the C input causes the ALU to compare the two values. Since the displacement value 0 in the D register is the smaller, a true signal is formed at the L output. The true signal at P9 causes the DS7 selection circuit to couple the output of the D register to the input of the MIN register and the logic P9.L is true, causing the MIN register to store the 0 value. Additionally, the true signal at P9 causes the DS8 selection circuit to couple the output of register RI to the input of the temporary storage register, T, and the logic P9.L.$\overline{CLK}$ causes the T register to store the minimum event occurrence value 13 from register RI.

B13 of the flow is now entered. The true signal at the P9 output causes a true signal at the B5 output of the BRIGHTNESS MODULE, thereby setting the D1GO multi-vibrator in the DECODE I MODULE, calling the operation of the DECODE I MODULE. The DECODE I MODULE then decodes the next event occurrence value 7 from the "S" E.O. vector (see Part 1 of Table 41) and stores it into its DO1 register. Also, the EOF1 flip flop is in a 0 state. Accordingly, the DS6 selection circuit couples the output of register DO1 of the DECODE I MODULE to the input of the RI register and the logic P6.FLG causes the event occurrence value 7 to be stored into the RI register. The true signal at the P9 output causes the P6 flip flp to be set to a 1 state and the P9 flip flop to be reset to a 0 state at the following CLK pulse, thereby causing B9 of the flow to be reentered.

With reference to the PIPE MODULE, Table 1, event occurrence value 7 of the "S" E.O. vector is in the entry "IS", not the entry "TEST" specified by the delimiter 10. During B9, the RI and DI registers are again coupled to the input of the ALU and this time it is found that the event occurrence value 7 contained in register RI is smaller than the delimiter 10 in register DI and is therefore not in the same entry designated by DI. Accordingly, a true signal is formed at the L output of the ALU and B17 of the flow is entered. The true signal at the P6 output causes the forced maximum value 255 from the switches 1030 to be coupled to the input of the MIn register. The logic P6.L.$\overline{CLK}$ is true, thereby causing the MIN register to again store the value 255. Additionally, the logic P6.L.$\overline{CLK}$ is true, causing the initial pipe center value of 13 to be counted up to a CP value of 14 in register RII.

The true condition of logic P6.L causes the P10 flip flop to be set to a 1 state and the P6 flip flop to be reset to a 0 state at the following CLK pulse thereby causing B18 to be entered. The "S" E.O vector is the first to be processed and the BFIRST flip flop is in a 1 state. Accordingly, B19 of the flow is entered.

During B19, the logic P10.BFIRST is true, causing the N and NP counters to be cleared to 0. B22 of the flow is then entered.

During B22 is the only time that the content of register DII is used. Also DII is clocked down by one during pulse P4. Thus when the compare is done in pulse P10, it is a compare of RII and DII $-1$.

The true signal at the P10 output causes the DS9 and DS10 selection circuits to couple the center pipe value 14 in register RII and the upper delimiter value 14 in register DII to the input of the ALU and a true signal is formed at the C input. The ALU compares the two values and determines that center pipe value 14 in register RII is equal and forms a true signal at the E output.

This in turn causes the gate 1152 to form a true signal at the LE output, causing the logic P10.LE to be true. Responsive thereto, the DS4 selection circuit couples the output of the RII register to the input of the P/B MEMORY. Additionally, the true signal at P10 causes a true signal at the B8 output of the BRIGHTNESS MODULE, causing the P/B MEMORY to write the center pipe value 14 from the DS4 selection circuit into its memory location, 0, specified by the M2 write address counter. The logic B8.$\overline{CLK}$ increments the address in register M2 up one address to address 1. The true condition of the P10 flip flop causes the logic P10.BFIRST to be true and the following CLK pulse sets the P13 flip flop to a 1 state and resets the P10 flip flop to a 0 state, thereby causing B23 of the flow to be entered.

During B23, the content of the T register is checked to see if it is 0. It is not 0, since a minimum event occurrence value of 13 was stored there during B12 and accordingly a true signal is formed at the $\overline{T_0}$ output of the T register. This causes the logic P13.$\overline{T_0}$ to be true and causes the FF flip flop to be set to a 1 state. B26 of the flow is now entered.

During B26, a true signal is formed at the P13 output of flip flop P13, causing the DS9 and DS10 selection circuits to couple the T and MIN registers through the DS9 and DS10 selection circuits to the ALU and causes a true signal at the C input of the ALU. The T register now contains the minimum event occurrence value 13 which is $<$ the value 255 in register MIN. Accordingly, the ALU forms a true signal at the L output. The true signal at P13 causes the DS7 selection circuit to couple the minimum event occurrence value 13 from register T to the input of register MIN and the logic P13.L.$\overline{CLK}$ becomes true, causing the register MIN to store the event occurrence value 13. B28 of the flow is now entered.

During B28, the true condition of logic P13.$\overline{T_0}$ also causes the N counter to count up 1 state to reflect the fact that one $\delta$ value is about to be formed for the "S" E.O. vector being processed. The N counter was set to 0 during B19, accordingly the N counter is now in state 1, indicating there has been one hit or entry. Also, the NP counter is now in state 0 and a true signal is formed at the $\overline{NP_0}$ output. The logic P13.$\overline{T_0}$ is true, causing the FLG flip flop to be set to a 1 state. The FF flip flop is now true, accordingly the logic P13.FF becomes true and the following CLK pulse sets the P14 flip flop to a 1 state and resets the P13 flip flop to a 0 state.

The true signal at the P14 output of flip flop P14 causes the DS9 and DS10 selection circuits to couple the content of the T and LNRQR registers to the input of the ALU and causes a true signal at the A input of the ALU. The T register now contains the minimum event occurrence value 13 and the LNRQR register contains the actual length of the request, 3. This value 3 is in the BIAS value discussed above. Accordingly, the sum at the output of OP is now 16 (13 + 3). The true signal at P14 causes the DS8 selection circuit to couple the value 16 at OP to the input of the T register and the logic P14.$\overline{CLK}$ subsequently becomes true, causing the value 16 to be stored into the T register. The true signal at P14 additionally causes the flip flop P15 to be set to a 1 state and the flip flop P14 to be reset to a 0 state. Accordingly, B29 is entered.

During B29, the minimum occurrence value for the event corresponding to the CP value 14 written during B22 is now contained in register MIN and is written into the P/B MEMORY. To this end, the true signal at P15 causes a true signal at the B8 output circuit of the BRIGHTNESS MODULE causing a write operation in the P/B MEMORY area 2 at the location specified by the write address in counter M2. The true signal at the P15 output causes the DS4 selection circuit to couple the minimum event occurrence value 13 (min) from the MIN register to the input of the P/B MEMORY allowing it to be written at address 1 following the CP value written during B22. Additionally, the true condition of logic B8.$\overline{CLK}$ causes the M2 address counter to count up by one address to address 2. The content of addresses 0 and 1 of P/B MEMORY area 2 is depicted in Part 2 of Table 41.

The true signal at the P15 output causes the P15 flip flop to be reset to a 0 state and the P16 flip flop to be set to a 1 state at the following CLK pulse, thereby causing B30 of the flow to be entered.

During B30, the # of hits stored in address counter N is stored into the P/B MEMORY at the next subsequent location following the min value. To this end, the true signal at P16 causes the DS4 selection circuit to couple the # of hits value from the N counter to the input of the P/B MEMORY and causes the B8 output of the BRIGHTNESS MODULE to receive a true signal. Additionally, logic B8.$\overline{CLK}$ is again true. As a result, the P/B MEMORY stores the # of hits value 1 from counter N at address 2 (as specified by the M2 address counter) and the address counter M2 is counted up by one so that it now contains address 3.

Addresses 0–2 of the P/B MEMORY area 1 now contain the values depicted in Part 2 of Table 41. During B31, the NP counter is at 0, causing a true signal at the $NP_O$ output of the NP counter. Accordingly, the logic P16.$NP_0$ is true, causing the flip flop P19 to be set to a 1 state and the flip flop P16 is reset to a 0 state at the following CLK pulse, causing B36 of the flow to be entered.

During B36, the FLG flip flop is in a 1 state, having been set there during B28, and accordingly B37 is now entered. During B37, the logic P19.FLG is true, causing the DS4 selection circuit to couple the δ value contained in the T register to the input of the P/B MEMORY causing a true signal at the B8 output of the BRIGHTNESS MODULE. This causes the P/B MEMORY to write the δ value 16 at address 3 as specified by the address counter M2. The true condition of logic B8.$\overline{CLK}$ again causes the M2 address counter to count up one address to address 4. Thus addresses 0 through 3 of the P/B MEMORY area 1 contain the values indicated in Part 2 of Table 41.

During B38, true signals are formed at P19 and $\overline{P26}$ outputs of the P19 and P26 flip flops. Accordingly, the true signal at the $\overline{P26}$ output causes the DS1 selection circuit to couple the address 1 contained in the M1 address counter to the input of the P/B MEMORY and causes the B7 output of the BRIGHTNESS MODULE to receive a true signal. As a result, the P.B MEMORY reads out the second pipe center value 6, contained at address 1 of P/B MEMORY area 1 (see Part 1 of Table 41). The true condition of logic P19.$\overline{CLK}$ causes the RII register to store the second pipe center value 6 read from the P/B MEMORY. With reference to the PIPE MODULE, Table 1, it will be seen that the pipe center value 6 corresponds to the entry "IS". Additionally, the logic B7.$\overline{P26}$.$\overline{CLK}$ become true, causing the M1 address counter to count up to address 2. The true signal at the P19 output also causes the DS7 selection circuit to couple the signals representing the value 255 from the switches 1030 to the input of the MIN register. The true condition of logic P19.$\overline{CLK}$ causes the value 255 to be stored into the MIN register and causes the T register to be reset to 0. The true signal at the P19 output of the P19 flip flip causes the flip flop P20 to be set to a 1 state and the P19 flip flop to be reset to a 0 state at the following CLK pulse, thereby causing B39 of the flow to be entered.

During B39, a true signal is formed at the P20 output and register RII now contains the new pipe center value 6 and hence does not contain a minus quantity. SRII is the sign bit of the RII register. (SRII = 0XXXXXXX → positive # or φ, SRII = 1XXXXXXX → negative #). Accordingly, a true signal is formed at the $\overline{SRII}$ output of the RII register, causing the logic P20.$\overline{SRII}$ to be true and at the following CLK pulse, flip flop P4 is set to a 1 state and flip flop P20 is reset to a 0 state.

During B16, the true condition of the P20 output of flip flop P20 causes the DII register to store, as the new upper delimiter, the lower delimiter 10 from the lower delimiter register DI. Additionally, the true condition of the logic P20.$\overline{SRII}$.$\overline{CLK}$ causes the output B6 of the BRIGHTNESS MODULE to become true, set D2GO to 1, and call the operaion of the DECODE II MODULE, thereby causing the next lower delimiter value 8 (see Part 1 of Table 41) to be provided to the lower delimiter register DI. The logic B26.$\overline{D2MEND}$ is true in the clock suspension logic 1132 and the operation of the BRIGHTNESS MODULE is suspended until the DECODE II MODULE is finished and reactivates the BRIGHTNESS MODULE by forming a false signal at the D2MEND output. The logic P20. $\overline{SRII}$ is now true and flip flop P4 is set to 1.

The logic P4 causes the register DI to store the new lower delimiter value 8. Following B16, the logic P20.$\overline{SRII}$ causes the BRIGHTNESS MODULE flow to go from B16 back to B8. The lower delimiter 8 in register DI is for the entry "A" (see Table 1). Accordingly, the "S" E.O. vector does not contain any event occurrence values for this entry.

During B8 of the flow, the true signal is again formed at the P4 output of the P4 flip flop. Accordingly, as described above, the ALU compares the new pipe center value 6 contained in the RII register with the new lower delimiter value 8 contained in the DI register and finds the former to be smaller. This indicates that pipe center in register RII is for a lower entry than the entry "A" specified by the lower delimiter 8. Accordingly, the next lower delimiter needs to be read by the DECODE II MODULE. To this end, B14 and B16 are reentered where the lower delimiter 8 in register DI is transferred to the upper delimiter register DII and the DECODE II MODULE provides the next lower delimiter 5 (see Part 2 of Table 41). The lower delimiter 5 is for the entry "IS" (see PIPE MODULE Table 1).

Following B16, B8 of the flow is reentered where the pipe center value 6 in register RII is again compared with the new lower delimiter 5 in register DI. This time the pipe center 6 is formed to be the larger, indicating it lies in the entry specified by register DI and accordingly B9 is entered.

During B9, the event time 7 from the "S" E.O. vector (which is stored in register RI during the preceding pass through B10) is compared with the lower delimiter 5 in register DI and the former is found to be larger. Accordingly, B10 of the ENCODE MODULE flow is entered. During B10, the ALU computes the absolute value of the difference between the event occurrence value 7 in register RI and the pipe center 6 contained in register RII. The absolute value of the difference is 1 and is stored in the D register. Note carefully that this difference value is for the entry "IS", whereas the difference previously formed during B10 is for the entry "TEST".

During B11, the difference stored in the D register is compared with the content of register MIN. Register MIN contains the forced maximum value of 255. Accordingly, the difference value 1 in the D register is the smaller, causing B12 to be entered.

During B12, the new difference value 1 is transferred from register D to register MIN and the new event occurrence value 7 is transferred from the RI register to the T register as a potential min value.

During B13, the DECODE I MODULE is again called, causing the next lower event occurrence value 4 from the "S" E.O. vector to be decoded and stored into the RI register (see Part 1 of Table 41). This is not the end of the "S" E.O. vector. Accordingly, the EOF1 flip flip is in a 0 state.

During B9, the event occurrence value 4 in register RI is for the entry "THIS" (see Pipe MODULE Table 1) and therefore is found to be smaller than the beginning delimiter value 5 in register DI. Accordingly, B17 is entered. During B17, the maximum forced value of 255 is stored into register MIn and the pipe center value 6 in register RII is counted up by 1, forming a CP value of 7.

During B18, the flip flop BFIRST is in a 1 state since the BRIGHTNESS MODULE is still operating on the first or "S" E.O. vector. Accordingly, B19 is entered where the N and NP counters are reset to 0. During B22, the test CP value 7 is written into the P/B MEMORY at address 4 as specified by the address counter M2 and the M2 address counter is counted up to address 5. The content of addresses 0 through 4 of the P/B MEMORY area 2 is depicted in Part 2 of Table 41.

During B23, the T register does not contain a 0 but contains the minimum event occurrence value 7. Therefore B26 is entered. During B26, the minimum event occurrence value 7 in register T is compared with the forced maximum value 255 in register MIN and is found to be smaller. Accordingly, B27 is entered where the minimum event occurrence value 7 in register T is transferred to register MIN. During B28, the counter N is increased by 1 to reflect that a new δ value is about to be formed. Additionally, the minimum event occurrence value 7 in register T is added to the length of request value 3 contained in the LNRQR register, forming a δ value of 10, which is stored back into the T register. Additionally, the FLG flip flop is set to a 1 state.

During the subsequent B29 and B30, the minimum even occurrence value 7 in register MIN is written into address 5 of P/B MEMORY area 1 (see Part 2, Table 41) and # of hits value 1 in counter N is stored into address 6 of P/B MEMORY area 1 (see Part 2, Table 41). Additionally, the address counter M2 is counted up one for each write so that it now contains address 7.

Following B30, B31 of the flow is entered. The NP counter is now 0, and accordingly B36 and B37 are entered. The FLG flip flop is in a 1 state and accordingly the δ value 10 in register T is stored at address 7 of the P/B MEMORY area 1 (see Part 2, Table 41) and the address counter M2 is counted up to address 8.

During B38, the P/B MEMORY reads out the next lower pipe center value 3 from area 1 and it is stored in register RII. With reference to PIPE MODULE Table 1, pipe center value 3 is associated with the response word "THIS". Also, during B38 the MIN register is set to the forced maximum value of 255 and the T register is reset to 0.

During B39 of the flow, the register RII contains the new pipe center 3 and is therefore not −1, and accordingly B16 is reentered. The operation continues now through B16, B8, B9, B10, B11 and B12 of the flow, similar to that described above. This operation is depicted below in symbolic form.

| | | |
|---|---|---|
| B16 | DI(5) → DII | ; set new end delimiter from DECODE II MODULE; |
| | call DECODE II MODULE | |
| | DO 2(0) → DI | ; get new beginning delimiter; |
| B8,B9 | RII(3) > DI(0) | ; pipe center lies in the current entry of "S " E.O. vector |
| | RI(4) > DI(0) | ; pipe center lies in the current entry of "S" E.O. vector; |
| B10 | D = \| RI(4)-RII (3) \| = 1 | ; calculate absolute value of difference; |
| B11,B12 | D(1) < MIN (255) ; | |
| | MIN ← D | ; save content of D as new minimum |
| | T ← 4 | ; save the corresponding event time; |

Following B12 above, B13 is again entered where the DECODE I MODULE is again called. However, this time it is found that the last event occurrence value 4 has been read and the EOF1 flip flop in the DECODE I MODULE has been set to 1 to indicate end of the "S" E.O. vector. At this point, the P9 flip flop is in a 1 state, causing the P9 output to be true and the $\overline{\textbf{P22}}$ output is true. Accordingly, the logic EOF1.$\overline{\textbf{P22}}$ is true, causing the DS6 selection circuit to couple the −1 end of field value from the switches 1032 to the input of the RI register. The logic P6.FLG causes the register RI to store the −1 value signals from the switches 1032.

B9 is then reentered where it is found that the −1 end of field value in register RI is < the delimiter 0 contained in register DI. The subsequent operation during B18 through B37 is similar to that described hereinabove as indicated below in symbolic notation.

| | | |
|---|---|---|
| B18 | FIRST = 1 | |
| B19 | N, NP ← 0 ∴ | ; initialize # of hits to 0; |
| B22 | write RII(4) to P/B MEMORY | ; MIN (RII, DII −1) = MIN (4,4) = 4; |
| B23 | T(4) ≠ 0 | |
| B26 | T(4) < MIN (255) | |
| B27 | T(4) → MIN | |
| B28 | N(0) + 1 | ; update # of hits |
| | T(4) + LNRQR (3) → T(7) | ; compute E.O. value + BIAS |
| | FLG ← 0 | |
| B29,B30 | write MIN=4 & DI = 1 to P/B MEMORY | ; output current minimum and current # of hits; |
| B31 | NP = 0 | |
| | FLG ← 1 | |
| B37 | write T = 7 to P/B MEMORY | ; output last value |

During the next B38 of the flow, the end of field value −1 is read out of the P/B MEMORY and stored in the register RII and the read address counter M1 is counted up one address, the MIN register is set to the forced maximum value 255, and the T register is reset to 0.

During the subsequent B39 of the flow, it is found that the content of the RII register is < 0, causing a true signal at the L output of the ALU, causing the B40 to be entered.

During B40 of the flow, a true signal is formed at the P20 output of the P20 flip flop causing a true signal at the B8 output of the BRIGHTNESS MODULE. The true signal at the P20 output causes the DS4 selection circuit to couple the −1 value from the switches 1134 to the input of the P/B MEMORY. The true signal at the B8 output of the BRIGHTNESS MODULE causes the P/B MEMORY to write the −1 end of field value at address 12 of the P/B MEMORY area 2. At this point in time, the contents of address 0 through 12 of the P/B MEMORY area 2 are as indicated in Part 2 of Table 41. The logic B8.$\overline{CLK}$ becomes true, causing the write address counter M2 to count up on address. The 31 1 stored in register RII causes its sign bit to be true which in turn causes a true signal at the SRII output of register RII. Thus, logic P20.SRII is true, causing the LNRQR register to count down one address, reducing the BIAS value from 3.

B41 of the flow is now entered. The BLAST flip flop is now in a 0 state, indicating that this is not the last E.O. vector of the response and accordingly the BRIGHTNESS MODULE exits its operation.

The example of operation being given herein assumes a request of "SIT" and the response "THIS IS A TEST". The "S" E.O. vector has been processed and the MINI COMPUTER now sets up the conditions for the second call on the BRIGHTNESS MODULE for the "I" event of "SIT" as indicated in Part 3 of Table 41. To this end, the MINI COMPUTER stores in IPRF the following: length of "I" E.O. vector (value 2) in LN1, and length of delimiter occurrence vector (value 4) in LN2. LNRQR is loaded only for the first E.O. vector. Therefore, the LNRQ resiter in IPRF need not be refilled. The MINI COMPUTER also stores the "I" E.O. vector (6,3) into MEMORY MODULE area 1 and sets flip flop BLAST to 0 to indicate this is not the last E.O. vector being processed. MEMORY MODULE area 2 contains the same delimiter occurrence vector indicated in Part 1 of Table 41 and the P/B MEMORY area 2 contains the information stored by the BRIGHTNESS MODULE during the first call on the BRIGHTNESS MODULE. During the second call on the BRIGHTNESS MODULE, reading will take place at area 2 of the P/B MEMORY and writing will take place at area 1.

Part 4 of Table 41 shows the content of the P/B MEMORY area 1 after the second call and exit from the BRIGHTNESS MODULE and should be noted in the following discussion.

The BRIGHTNESS MODULE is called for the second time by the MINI COMPUTER and DPM INTERFACE MODULE as described above, causing B1 to be entered.

During B1, the BRIGHTNESS MODULE causes the DECODE I and II MODULES to be initialized by resetting them so that they commence decoding at the beginning, or largest, value in the corresponding event occurrence vectors. Additionally, the M1 and M2 address counters are reset to 0 so that reading and writing take place, starting at address 0 of the P/B MEMORY areas, and the switching matrix (SM) for the P/B MEMORY is toggled, causing the read and write areas in the P/B MEMORY to be reversed. This causes writing to take place in P/B MEMORY area 1 using address counter M2, whereas reading takes place in the P/B MEMORY area 2 using address counter M1. The way in which the switching matrix for the P/B MEMORY is toggled or switches areas will be discussed in more detail hereinafter.

Additionally, the DECODE II MODULE is called, causing it to read out the end delimiter 15 for storage in register DII.

During B2, the address 0 of the P/B MEMORY area 2 is read, using address counter M1, causing the CP value 14 (see Part 2, Table 41) to be read and stored in register RII. This is the incremented pipe center value stored during the first call. Additionally, the M1 register is incremented to address 1, the forced maximum value of 255 is stored in the MIN register and the T register is reset to 0. Additionally, the DECODE I MODULE is called, causing the first event occurrence value 6 from the "I" E.O. vector to be read and stored in the DO1 register of the DECODE I MODULE.

During B3, the DECODE II MODULE is called, causing the beginning delimiter 10 to be read and stored in the DI register. During B5, the EOF1 flip flop in the DECODE I MODULE is 0 because the last event occurrence value has not been decoded. Accordingly, B7 is entered.

During B7, the event occurrence value 6 from the "I" E.O. vector is transferred from the DOI register into register RI. During B8, it is found that the pipe center value 14 in register RII is larger than the beginning delimiter value 10 in register DI. Hence, the pipe center is within the delimiter designated by the content of register DI and B9 is entered.

During B9, the event occurrence value 6 in register RI is compared with the beginning delimiter 10 in register DI and the latter is found to be the larger. Accordingly, B17 is entered.

During B17, the forced maximum value 255 is stored into register MIN and the pipe center value in register RII is incremented from 14 to 15.

During B18, the BFIRST flip flop is found to be in a 0 state, and accordingly B20 and B21 are entered. Considering the operation in detail, during B18 the P10 flip flop is in a 1 state and the BFIRST flip flop is in a 0 state, causing the logic P10.$\overline{BFIRST}$ to be true. This causes the P11 flip flop to be set to a 1 state and the P10 flip flop to be reset to a 0 state at the following CLK pulse, thereby causing B20 of the BRIGHTNESS MODULE flow to be entered.

A true condition at the P11 output of the P11 flip flop causes the B7 output of the BRIGHTNESS MODULE to receive a true signal. Additionally, the flip flop P26 is now in a 0 state and the true condition of the $\overline{P26}$ output of the P26 flip flop causes the DS1 selection circuit to couple the address 1 contained in the M1 address couner to the P/B MEMORY. The true signal at the B7 output causes the P/B MEMORY to read the min value 13 from address 1 of P/B MEMORY area 2 (see Part 2 of Table 41). The true signal at output P11 causes the DS7 selection circuit to couple the min value 13 from the P/B MEMORY to the input of register MIN and the logic P11.$\overline{CLK}$ causes the MIN register to store the min value 13. Additionally, the logic B7.$\overline{P26}$.$\overline{CLK}$ causes the M1 address counter to count up to address 2. The following CLK pulse causes the P12 flip flop to be set to a 1 state and the P11 flip flop to be reset to a 0 state, causing B21 of the flow to be entered.

During B21, a true signal is formed at the P12 output causing another true signal at the B7 output of the BRIGHTNESS MODULE, again causing the P/B MEMORY to read out, this time from address 2. Referring to Part 2 of Table 41, the # of hits value 1 is read out to the input of the N and NP counters. The logic $P12.\overline{CLK}$ becomes true, causing the # of hits value 1 to be stored into the N and NP counters. Additionally, the M1 address counter is counted up to address 3. A true signal being formed at the P12 output causes the P13 flip flop to be set to a 1 state and the P12 flip flop to be reset to a 0 state at the following CLK pulse, thereby causing B22 of the flow to be entered.

During B22, an updated or incremented pipe center value of 15 is contained in register RII whereas the upper delimiter mins 1 (15 −1 = 14) is contained in register DII. DII was decremented by one during the true signal at P4. Since the incremented pipe value is not allowed to cross the upper delimiter 15, the upper delimiter 15 −1, or 14, is now stored into the P/B MEMORY using address counter M2. Thus, address 0 of P/B MEMORY area 1 now contains the CP value 14 indicated in Part 4 of Table 41. Following B22, B23 is entered.

During B23, the content of the T register is checked and it now contains a 0. The reason it contains a 0 is that no event occurrence values from the "I" E.O. vector are present in the entry "TEST" (see PIPE MODULE, Table 1). defined by the beginning delimiter 10 in register DI. Accordingly, B24 is entered. B24 and B25 are used for checking the δ values stored in the P/B MEMORY while processing the previous "S" E.O. vector.

During B25, the NP counter contains a value 1 and hence does not contain a 0. Accordingly, its output $\overline{NP_0}$ is true. Additionally, the T register contains a 0 and accordingly its output $T_0$ is true. Thus, the logic $P13.T_0.\overline{NP_0}$ is now true, causing a true signal at the B7 output. Also, the output $\overline{P26}$ of flip flop P26 is still true, causing the DS1 selection circuit to couple the address 2 from the M1 address counter to the P/B MEMORY. The true signal at B7 causes the P/B MEMORY to read out the δ value 16 from the address 3 (see Part 2 of of Table 41). The logic $P13.T_0$ causes the DS8 selection circuit to couple the δ value 16 to the input of the T register and the true condition of logic $P13.T_0.\overline{CLK}$ causes the δ value 16 to be stored into register T. Additionally, the M1 address counter is counted up to address 4 and the true condition of logic $P13.T_O.\overline{NP_O}$ causes the NP counter to count down to 0. It should be noted that the NP counter keeps track of the number δ values in the corresponding CP field in the P/B MEMORY which have been processed. Additionally, during B25 of the flow, the logic $P13.T_O.\overline{NP_O}$ causes the FLG flip flop to be set to a 1 state.

Following B25, B29 and B30 of the flow are again entered where the minimum δ value 13 contained in the MIN register is stored into address 1 of the P/B MEMORY area 1, # of hits value 1 in counter N is stored into address 2 of the P/B MEMORY area 1 (see Part 4 of Table 41) and the address counter M2 is incremented to address 3.

B31, B36 and B37 of the flow are now entered where the Δ value 16 contained in register T is written into address 3 of the P/B MEMORY area 1 and the M2 address counter is incremented to address 4.

During B38, the next pipe center value of 7 (see Part 3, Table 41) is read from address 4 of the P/B MEMORY area 2 and stored in the register RII, and the M1 address counter is incremented to address 5. The forced maximum value of 255 is stored into the MIN register and the T register is reset to 0. During B39, the δ CP value in register RII is not 0, and accordingly B16 of the flow is reentered.

This operation depicted by the flow continues until the end of field marker −1 in the P/B MEMORY area 2 is detected. This occurs when during B39 it is found that register RII contains a −1 (less than0), causing B40 to be reentered. The operation for the example being described from the point where the above description leaves off to the entry into B40 is depicted symbolically below.

| | | |
|---|---|---|
| B16 | DII ← DI (10) | ; get a new end delimiter |
| | call DECODE II MODULE | |
| | DI ← DO2 (8) | ; read a new beginning delimiter; |
| B8 | RII (7) < DI (8) | |
| B14 | RI (6) < DI (8) | |
| B16 | DII ← DI (8) | ; get new end delimiter |
| | Call DECODE II MODULE | |
| | DI ← DO2 (5) | ; get new end delimiter |
| B8 | RII (7) > DI (5) | |
| B9 | RI (6) > DI (5) | |
| B10 | D = \|RI (6) -RII (7)\| | |
| | D = 1 | |
| B11, B12 | D (1) < MIN (255) | ; D is less |
| | MIN ← DI (1) | ; save D and |
| | T ← RI (6) | ; save position in T |
| B13 | Call DECODE I MODULE | |
| | EOF1 = 0 ∴ RI ← DO1 (3) | |
| B9 | RI (3) < DI (5) | |
| B17 | MIN ← 255 | ; reset MIN |
| | RII = 8 | ; update RII |
| B18 | BFIRST = 0 ∴ | |
| B20, B21 | MIN ← P/B MEM (7) | |
| | N, NP ← P/B MEM (1) | |
| B22 | Write DII - 1 (7) to | ; write out center pipe - do not |
| | P/B MEM | ; allow it to cross definite |
| | | ; boundaries |
| B23 | T ≠ ∴ | |
| B24 | T (6) < MIN (7) | |
| B27 | MIN ← T (6) | |
| B28 | N (1) = N + 1 = 2 | |
| | T (6) + LNRQR (2) = T (8) | |
| | FLG ← 1 | |
| B29, B30 | Write MIN (6) | ; write out the current minimum |
| | N (2) to P/B MEM | ; and # of hits |
| B31 | NP = 1 ≠ 0 ∴ | ; NP is not 0 |
| B32 | Read RII ← P/B MEMORY (10) | ; read in the next value |

-continued

```
         NP(1) ← NP − 1 = NP (0)        ; decrement # of hits
B33      T (8) < RII (10)               ; T < new value
B35      write 8 to P/B MEMORY          ; output T
         T ← RII (10)                   ; set T = to new value
B31,B36  NP = 0 & FLG = 1               ; no more to be read
B37      write T (10) to                ; write T
         P/B MEMORY
B38      Read RII ← P/B MEMORY (4)      ; read the next center pipe
         MIN ← 255
         T ← 0
B39      RII (4) > 0     B16
B16      DII ← DI (5)                   ; get new end delimiter
         call DECODE II MODULE
         DI ← DO2 (0)                   ; get new beginning delimiter
B8       RII (4) > DI (0)
B9       RI (3) > DI (0)
B10      D = |RI - RII|                 ; compute offset
         = | 3 - 4| = 1
B11, B12 D (1) < MIN (255)              ; its minimum
         MIN ← D (1)                    ; save value
         T ← RI(3)                      ; save position
B13      Call DECODE I MODULE
         EOF1 = 1     RI ← −1           ; done
B9       RI < DI
B17      MIN ←255                       ; reset MIN
         RII (4) + 1 = RII(5)           ; shift the center pipe
B18      FIRST ← 0                      ; not the first time
                                        read MIN
B20, 21  Read MIN = 4                   ; and # of hits from AM-II
         & N = 1 from P/B MEMORY
B22      Write DII - 1 (4) to           ; write adjusted center pipe-
         P/B MEMORY                     do not allow to cross
                                        boundary
B23      T ≠ 0
B26      T (3) < MIN (4)
B27      MIN ← T (3)
B28      N (1) N + 1 = N (2)            ; update the number of hits
         T = T (3) + LNRQR (2) =        ; add BIAS to the position
         T (5)
         Set flag FLG ← 1
B29, B30 Write MIN (3)                  ; write out the new minimum
         & N (2) to P/B MEMORY          ; and # of hits
B31      NP ≠ O.∴
B32      Read RII ← P/B MEMORY (7)      ; read in new value
         NP (0) ← N P-1 = NP (0)        ; decrement count
B33      T (5) < RII (7)
B35      Write out T = 5 to
         P/B MEMORY
         T (7) to P/B MEMORY
B31,B34  NP = 0∴   FLG = 1∴
B37      Write out T (7) to P/B MEMORY
B38      Read RII −1                    ; read end of field
         MIN ← 255
         T ← 0
B39      RII < 0∴                       ; end of data
B40      Write −1 as end of data
         to AM-II
         LNRQ (2) = LNRQ −1 =           ; lower the bias count
         LNRQ (1)
B41      BLAST = 0∴   EXIT
```

Following B41 of the flow, the addresses 0 through 14 of the P/B MEMORY area 1 are as depicted in Part 4 of Table 41.

The "I" E.O. vector has been processed and the MINI COMPUTER now sets up the conditions depicted in Part 3 of Table 41 for the third call on the BRIGHTNESS MODULE for the "T" event of the request word "SIT". To this end, the MINI COMPUTER stores in IPRF the following: length of "T" E.O. vector (value 3) in LN1; length of delimiter occurrence vector (value 4) in LN2. LNRQ is not changed. The MINI COMPUTER also stores the "T" E.O. vector (14, 11, 1) into MEMORY MODULE area 1. MEMORY MODULE area 2 contains the same delimiter occurrence vector indicated in Part 1 of Table 41 and the P/B MEMORY area contains the information stored by the BRIGHTNESS MODULE during the second call on the BRIGHTNESS MODULE as depicted at Part 4 of Table 41. Additionally, the DPM INTERFACE MODULE forms a true signal at the BLAST ← 1 output causing the BLAST flip flop in the BRIGHTNESS MODULE to be set to a 1 state, indicating that the last E.O. vector for the last request event is about to be processed.

The operation of the BRIGHTNESS MODULE is again called by forming a signal at BMGO causing the operation of B1 through B40 of the flow to be reentered. However, it should be noted that at B1, the switching matrix for the P/B MEMORY is again toggled, causing the read and write areas to reverse.

Hence writing now takes place in P/B MEMORY area 2, whereas reading takes place in the P/B MEMORY area 1. The operation of the BRIGHTNESS MODULE is similar to that described above and will not be repeated in detail, but instead is indicated in symbolic notation below.

```
B1       initialize DECODE I & II MODULES
         call DECODE II MODULE
         DII ← D02 (15)                 ; get end delimiter
B2       Read RII ← P/B                 ; read pipe center (CP) value
```

-continued

| | | |
|---|---|---|
| | MEM (14) | |
| | MIN ← 255 | ; reset MIN & T to 0 |
| | T ← 0 | |
| | Call DECODE I | |
| B3 | Call DECODE II MODULE | ; get a beginning delimiter value |
| | DI ← D02 (10) | |
| B5-B7 | EOF1 = O ∴ RI ← D01 (14) | ; read in a "T" event time |
| B8 | RII (14) > DI (10) | ; CP value lies within entry designated by delimiter in DI |
| B9 | RI (14) > DI (10) | ; event time lies within entry designated by delimiter in DI |
| B10 | D = \| RI (14) - RII (14)\| = 0 | |
| B11,B12 | D < MIN (255) ∴ | |
| | MIN ← D (O) | ; save MIN |
| | T ← RI (14) | ; sve event time |
| B13 | Call DECODE I MODULE | |
| | EOF1 = 0 ∴ RI ← D01 (11) | |
| B9 | RI (11) > DI (10) | |
| B10 | D ← \|RI(11) - RII(14)\| = D(3) | |
| B11 | D(3) > MIN(0)∴ | |
| B13 | Call DECODE I MODULE | |
| | EOF1 = 0 RI ← D01 (1) | |
| B9 | RI(1) < DI(10)∴ | |
| B17 | MIN ← 255 ' reset MIN | |
| | RII RII(14) + 1 = RII (15) | ; shift pipe center |
| B18 | BFIRST = 0 ∴ | |
| B20, B21 | Read MIN ← P/B MEMORY (13) | |
| | Read N, NP ← P/B MEMORY (1) | |
| B22 | Write DII −1 (14)→ P/B MEMORY | ; write out the shifted pipe center |
| B23 | T ≠ 0∴ | |
| B26 | T(14) > MIN(13) | |
| B28 | N ← N(1) + 1 = N(2) | ; adjust N |
| | T ← T(14) + LNRQR(1) = T (15) | ; add BIAS |
| | Set FLG ← 1 | |
| B29,B30 | Write out MIN(13) → P/B MEMORY | |
| | Write out N(2) → P/B MEMORY | |
| B31 | NP ≠ 0 ∴ | |
| B32 | Read RII ← P/B MEMORY (16) | ; read in new value |
| | NP ← NP(1)−1=NP(0) | |
| B33 | T(15) < RII(16) | |
| B35 | Write T(15) → P/B MEMORY | |
| | T ← RII(16) | |
| B31 | NP = O ∴ | |
| B36 | FLG = 1 ∴ | |
| B37 | Write out T(16) → P/B MEMORY | |
| B38 | Read RII ← P/B MEMORY | ; read in next pipe center value |
| | MIN ← 255 | |
| | T ← 0 | |
| B39 | RII (7) > ∴B16 | |
| B16 | DII ← DI(10) | ; get new end delimiter |
| | Call DECODE II MODULE | |
| | DI ← D02 (8) | ; get new beginning delimiter |
| B8 | RII(8) < RI(8) | |
| B14 | RI(1) < DI(8) | |
| B16 | DII ← DI(8) | |
| | Call DECODE II MODULE | |
| | DI ← D02 (5) | |
| B8 | RII (7) > DI(5) | |
| B9 | RI (1) < DI(5) | |
| B17 | MIN ← 255 | |
| | RII ← RII(7) + 1 = RII (8) | |
| B18 | BFIRST = 0 ∴ | |
| B20 | Read MIN ← P/B MEMORY (6) | |
| B21 | Read N, NP ← P/B MEMORY (2) | |
| B22 | Write DII − 1 (7) → P/B MEMORY | ; write adjusted pipe center |
| B23 | T = 0 ∴ | |
| B24 | NP ≠ 0 ∴ | |
| B25 | Read T ← P/B MEMORY (8) | |
| | NP ← NP(2) − 1 = NP(1) | |
| | Set FLG ← 1 | |
| B29,B30 | Write MIN (6) → P/B MEMORY | |
| | Write N(2) → P/B MEMORY | |
| B31 | NP ≠ 0 ∴ | |
| B32 | Read RII ← P/B MEMORY (10) | |
| | NP ← NP(1) − 1 = 0 | |
| B33 | T(8) < RII (10) ∴ | |
| B35 | Write T(8) → P/B MEMORY; | |
| | T = RII (10) | |
| B31 | NP = 0 ∴ | |
| B36 | FLG = 1 ∴ | |
| B37 | Write T(10) → P/B MEMORY | |
| B38 | Read RII ← P/B MEMORY (4) | ; read a new pipe center |
| | MIN ← 255 | ; reset min |
| | T ← 0 | ; reset T |
| B39 | RII (4) > 0 ∴ | |

-continued

```
B16       DII ← DI (5)                          ; get new beginning delimiter
          Call DECODE II MODULE                 ; delimiters
          DI ← DO2 (0)
B8        RII (4) > DI (0)                      ; CP lies in entry designated
                                                by beginning delimiter in
                                                DI
B9        RI (1) > DI (0)                       ; event time
B10       D ← |RI (1) - RII (4)| = D(3)
B11, B12  D(3) < MIN (255)
          MIN ← D(3)                            ; save min value
          T ← RII (1)                           ; save δ value
B13       Call DECODE I MODULE
          EOF1 = 1 ∴ ← −1
B8        RI (−1) < DI (0)
B17       MIN ← 255
          RII ← RII (4) + 1 = RII (5)
B18       BFIRST = 0 ∴
B20, B21  Read MIN ← P/B MEMORY (3)
          Read N, NP ← P/B MEMORY (2)
B22       Write DII −1 (4) → P/B MEMORY         ; write out adjusted
                                                pipe center
B23       T ≠ 0 ∴
B26       T(1) < MIN (3) ∴
B27       MIN ← T(1)                            save new min δ
B28       N ← N(2) + 1 = N(3)                   ; update # of hits
          T ← T(1) + LNRQR(1) =T(2)             ; add the BIAS
B29, B30  Write MIN(1) → P/B MEMORY
          N(3) → P/B MEMORY
B31       NP ≠ 0 ∴
B32       Read RII ← P/B MEMORY (5)
          NP < NP(2)−1=NP(1)
B33       T(2) < RII (5)
B35       Write T(2) → P/B MEMORY
          T ← RII (5)
B31       NP ≠ 0 . ∴
B32       Read RII ← P/B MEMORY (7)
          NP ← NP(1) −1 = NP(O)
B33       T(5) < RII (7)
B35       Write → P/B MEMORY (5)
          T ← RII (7)
B31       NP = 0 ∴
B36       FLG = 1 ∴
B37       Write T(7) → P/B MEMORY
B38       Read RII ← P/B MEMORY (−1)            ; read end of field
                                                value
          MIN ← 255
          T ← 0
B39       RII (−1) < 0
B40       Write −1 → P/B MEMORY
          LNRQR ← LNRQR (1) −1 = LNRQR (o)
B41       BLAST = 1
```

It should be noted that at B41 of the operation depicted in symbolic form above, the BLAST flip flop is in a 1 state (see Part 5 of Table 41). Accordingly, B42 is entered. At this point, the P20 flip flop is in a 1 state, causing a true signal at the P20 output. Accordingly, the logic P20.BLAST is true, causing a true signal at the B4 output of the BRIGHTNESS MODULE which in turn resets the DECODE II MODULE so that it will commence reading at the beginning of the delimiter occurrence vector depicted in Part 1 of Table 41. Additionally, the register RII now contains the end of field marker −1 causing the sign bit of the register RII to be true, thereby causing a true signal at the SRII output. The logic P20.BLAST.SRII is now true, thereby causing the M2 address counter to be reset to 0. The logic P20.BLAST.$\overline{CLK}$ is true, thereby causing a true signal at the B6 output of the BRIGHTNESS MODULE which in turn calls the operation of the DECODE II MODULE, causing it to read the end delimiter 15. The end delimiter 15 is merely read and discarded as it is not needed in the subsequent operation.

The true condition of the logic P20.BLAST.SRII also causes, at the following CLK pulse, the flip flop P21 to be set to a 1 state and the flip flop P20 to be reset to a 0 state. The true condition of the output P21 of the flip flop P21 causes the M2 and M3 address counters to be reset to 0. During B1 of the flow, the true condition of logic P1.$\overline{CLK}$ causes the length of the delimiter event occurrence vector to be transferred from LN2 of the IPRF to the BSAV register of the BRIGHTNESS MODULE. The length 3 is retained for resetting of the DECODE II MODULE. During B42 of the flow, the true condition of the logic P20.SRII.BLAST causes a true signal at the B10 output of the BRIGHTNESS MODULE, which in turn enables the length 3 in register BSAV to the input of register MLN2 of the DECODE II MODULE. The logic B10.$\overline{CLK}$ causes a true signal at the B11 output of the BRIGHTNESS MODULE which in turn causes the length 3 to be stored into register MLN2 from the BSAV register.

B43 is now entered. The true condition of logic P21.$\overline{CLK}$ causes a true signal at the B6 output of the BRIGHTNESS MODULE, which in turn again calls the operation of the DECODE II MODULE, causing it to read out the beginning delimiter 10 (see Part 1 of Table 41). The logic P22 causes the delimiter 10 contained in register DO2 of the DECODE II MODULE to be stored into the DI register.

During B44 of the flow, a true signal is formed at the output P21 of flip flop P21 which in turn causes a true signal at the B7 output of the BRIGHTNESS MODULE. The true signal at the B7 output causes the content of address 0 of P/B MEMORY area 2 to be read out as specified by address counter M1. With reference to Part 6 of Table 41, address 0 contains the first CP value 14. Logic P21.$\overline{CLK}$ becomes true, causing the CP value 14 to be stored into register RII. Additionally, the logic B7.$\overline{P26}$.$\overline{CLK}$ is true, causing the address counter M1 to be counted up to address 1.

The true signal at the output P21 causes the flip flop P22 to be set to a 1 state and the flip flop P21 to be reset to a 0 state at the following CLK pulse, thereby causing B45 of the flow to be entered.

During B45 of the flow, register RII does not contain the end of field value (−1). Accordingly, B46 is entered.

During B46 the output P22 is true, causing the DS9 and DS10 selection circuits to couple the content of registers RII and DI to the input of the ALU and causing a true signal at the C input of the ALU. The CP (14) value in register RII is larger than the beginning delimiter 10 in register DI and accordingly a true signal is formed at the $\overline{L}$ output of the signal inverter 1140. The logic P22.$\overline{L}$ is now true, causing the P23 flip flop to be set to a 1 state, and flip flop P22 is reset to a 0 state at the following CLK pulse, thereby causing B48 of the flow to be entered.

During B48, a true signal is formed at the output P23 of flip flop P23. The true signal at the output P23 causes the DO and S counters to be reset to 0. These registers, it will be recalled, store the $d_0$ and $d_{min}$ values. The true signal at the output P23 also causes a true signal at the B7 output from the BRIGHTNESS MODULE. The true signal at the B7 output causes the content of address 1 of P/B MEMORY area 2 to be read out, using address register M1. With reference to Part 6 of Table 41 address 1 contains the min value 13. Accordingly, the min value 13 is read out of the P/B MEMORY and the DS7 selection circuit couples it through to the input of the MIN register. The true condition of logic P23·$\overline{CLK}$ causes the min value 13 to be stored into the MIN register and causes the M1 address counter to be counted up to address 2. The true signal at the P23 output causes the flip flop P23 to be reset to a 0 state and the flip flop P24 to be set to a 1 state at the following CLK pulse, thereby causing B49 of the flow to be entered.

During B49 of the flow, a true signal is formed at the P24 output of flip flop P24, causing a true signal at the B7 output of the BRIGHTNESS MODULE. This causes the content of address 2 of P/B MEMORY area 1 to read out using address counter M1. With reference to Part 6 of Table 41, address 2 contains the # of hits value 1. Accordingly, the # of hits value 1 is read out to the input of the N and NP counters. The logic P24·$\overline{CLK}$ is now true, causing the # of hits value 1 to be stored into the N and NP counters. The M1 counter is then incremented to address 3. The true condition of the P24 output causes the flip flop P25 to be set to a 1 state, and the P24 flip flop to be reset to a 0 state at the following CLK pulse, thereby causing B50 of the flow to be entered.

During B50 of the flow, the mid δ (δ mid) value is read from the P/B MEMORY area 1 and stored into the T register. The address of the δ mid value is located by adding to the address in M1 the number of δ values to reach the mid δ value in the field of δ values. The NP counter at this point contains the # of hit values 2 which is the total number of δ values in the field. One half of the # of hits gives the number of addresses over from the beginning of the δ field where the δ mid lies. In order to divide in half the # of hits value in NP, the NP is connected to the DS10 selection circuit so as to provide a one digit shift to the right, discarding the bit shifted past the decimal point. It will be understood that in binary notation, a one binary bit shift to the right is the same as dividing the number by 2. Thus the P25 output causes the DS10 selection circuit to couple the output of the NP counter, with a 1 bit wired in right shift, to the input of the ALU and causes the DS9 selection circuit to couple the M1 address counter to the other input of the ALU. The NP counter at this point contains the value 2 and the M1 address counter contains the address 3. One-half of the value 2 is 1. Accordingly, the ALU now forms at the OP output signals representing the value 4 ( 2/2 + 3). The true signal at the P25 output causes the address of the δ mid to be coupled through the DS8 selection circuit to the input of the T register. The true condition of logic P25·$\overline{CLK}$ causes the address 4 to be stored into the T register. The true signal at the P25 output causes the flip flop P26 to be set to a 1 state and the P25 flip flop to be reset to a 0 state at the following CLK pulse.

The true signal at P26 causes the DS1 selection circuit to couple the address 4 of the δ mid from the T register to the input of the P/B MEMORY and causes the output B7 to receive a true signal. The true signal at output B7 causes the P/B MEMORY to read out the δ mid value 16 (see Part 6 of Table L). The true condition of the logic P26·$\overline{CLK}$ causes the RII register to store the δ mid value 16.

B51 of the flow is now entered where the content of the NP counter is checked to see if it is 0. The NP counter now contains the value 2 corresponding to the # of hits value and a true signal is formed at the $\overline{NP_0}$ output. The logic P26·$\overline{NP_0}$ is now true, causing the P27 flip flop to be set to a 1 state and the P26 flip flop to be reset to a 0 state at the following CLK pulse, thereby causing B52 of the flow to be entered.

Also during B52, the true signal at the P27 output causes the output B7 of the BRIGHTNESS MODULE to receive a true signal, thereby causing the P/B MEMORY area 2 to read out the δ value 15 from address 3, using the address counter M1. The δ value 15 is coupled through the DS6 selection circuit to the input of the RI register. The true condition of logic P27·$\overline{CLK}$ causes the δ value 15 to be stored into register RI and the address counter M1 is counted up to address 4. Additionally, the true signal at the P27 output of flip flop P27 causes the NP counter to count down from 2 to 1, thereby indicating that there is one δ value left to be processed in area 2 of the P/B MEMORY. The true signal at the P27 output causes flip flop P28 to be set to a 1 state, and flip flop P27 to be reset to a 0 state at the following CLK pulse thereby causing B53 to be entered.

During B53, the true signal at the P28 output causes the DS9 and DS10 selection circuits to couple the RII and RI registers to the inputs of the ALU. That causes a true signal at the S input of the ALU. Register RII now contains the δ mid value 16 whereas the register RI contains the smallest δ value 15. Therefore the ALU forms at OP the difference of 1 between the two values. Since the content of register RII is the larger, a true signal is formed at the $\overline{L}$ output of the signal inverter 1140 and the logic P28·$\overline{L}$·$\overline{CLK}$ is true, causing the register D to store the difference value of 1. Register D now contains one of the offset values to be used in forming $d_{min}$.

The true signal at the P30 output causes the DS9 and DS10 selection circuits to couple the D and S registers to the inputs of the ALU, and causes the A input of the ALU to receive a true signal. The D register contains the difference value of 1 whereas the S register contains a 0. Accordingly, the ALU forms the sum of the two values namely, a 1 at the output OP. The logic P30·$\overline{CLK}$ becomes true, causing the sum value of 1 at the output OP to be stored into the S register. Additionally, flip flop P31 is set to a 1 state and the flip flop P30 is reset to a 0 state at the following CLK pulse. It should now be noted that the $d_{min}$ value is being formed in the S register by the action during B53.

Should the δ mid value in register RII be smaller than the δ value in register RI, there would have been a negative result. Since the absolute value is desired, flip flop P29 would have been set to 1 rather than P30 and the difference value at the OP output therefore would not be stored into the D register. The true signal at P29 would cause the registers RII and RI to be coupled to the ALU reversed from that during P28 and therefore would result in a positive value at the OP output which would then be stored into the D register and subsequently summed with the S register during the true signal at P30.

Assume now that the P31 flip flop has been set to a true state and that B54 is entered.

During B54, a true signal is formed at the P31 output. Accordingly, the RI and MIN registers are coupled through the DS9 and DS10 selection circuits to the input of the ALU. The register RI contains the smallest δ value 15 whereas register MIN contains the min occurrence value 13. The true signal at the P31 output causes a true signal at the S input of the ALU, causing the ALU to subtract the min value 13 from δ value 15, resulting in a difference value of 2 at the OP output. The logic P31·$\overline{CLK}$ becomes true, causing the value 2 at the OP output to be stored into the D register. The true signal at the P31 output causes the flip flop P32 to be set to a 1 state and the flip flop P31 is reset to a 0 state at the following CLK pulse. Thus, at this point, the D register now contains the offset between the smallest event time of the request and the first δ value, making up the first offset value making up $d_0$. The true signal formed at the P32 output causes the difference value 2 in register D and the 0 content of register $D_0$ to be coupled through the DS9 and DS10 selection circuits to the inputs of the ALU and causes a true signal at the A input of the ALU. The D register contains the difference 2 whereas the $D_0$ register contains a 0. Accordingly, the ALU forms the value 2 at its output OP. The following pulse at P32·$\overline{CLK}$ causes the difference value 2 at the OP output to be stored back into the $D_0$ register. Thus, register $D_0$ now contains the first sum of offsets value $d_0$.

The NP counter now contains a 1 and accordingly is not 0. Thus a true signal is formed at the $\overline{NP_0}$ output of the NP counter. The logic P32 $\overline{NP_0}$ is now true, accordingly, the following CLK pulse sets the P32 flip flop to a 0 state and sets the P27 flip flop to a 1 state, causing B51 of the flow to be reentered.

During B51 of the flow, the NP register counter stores a 1 and accordingly is not 0, and B52 is entered.

During B52 of the flow, the next δ value 16 is read from address 4 of the P/B MEMORY area 2 (see Part 6 of Table L) and the value is stored in register RI. The M1 address counter is counted up to address 5 and the NP counter is counted down to 0.

B53 of the flow is now entered. The δ mid value 16 is still stored in register RII and, as explained above, the ALU forms the difference between the contents of registers RI and RII (16 − 16) and the difference a 0, is stored into the D register and subsequently added to the 1 contained in the S register. Thus the S register now contains $d_{min}$, the sum of offsets.

During B54, the ALU subtracts the difference between the δ value 16 in register RI and the min event time value 13 in register MIN. The difference value, 3, is subsequently stored in the D register and is subsequently added to the value 2 already contains in the $D_0$ register, causing the value 5 to be stored in the $D_0$ register. Thus the $D_0$ register at this time contains the sum of offsets value $d_0$ for the CP value 14 stored in address 0 of P/B MEMORY area 2 (see Part 6, Table 41).

At this point, B51 of the flow is reentered. The NP counter has been counted down to 0, indicating that all of the δ values for the entry in addresses 0 through 4 have been processed. Accordingly, a true signal is now formed at the $\overline{NP_0}$ output of counter NP and a true signal is formed at the P32 output. At the following CLK pulse, the logic P32·$\overline{NP_0}$ is true, causing the P33 flip flop to be set to a 1 state and the P32 flip flop is reset to a 0 state, causing B55 to be entered.

The beginning delimiter 10 is now stored in register DI. The true signal at the P33 output causes a true signal at the B13 output of the BRIGHTNESS MODULE which in turn calls the operation of the MEMORY MODULE. The MEMORY MODULE writes the beginning delimiter 10 in area 3 at the location specified by address 0 in the M3 address counter as indicated in Part 7 of Table L. A true signal is now formed at the B13·$\overline{CLK}$ output, causing the M3 address counter to count up to address 1. The true signal at the P33 output also causes the P34 flip flop to be set to a 1 state and the P33 flip flop to be reset to a 0 state at the following CLK pulse.

During B56, the # of hits value, 2. is contained in the N counter. The true signal of the P34 output causes another true signal at the B13 output of the BRIGHTNESS MODULE, thereby causing the MEMORY MODULE to again be called and write the # of hits value 2 at address 1 of area 3 as specified by the address counter M3. The true condition of logic B13·$\overline{CLK}$ again causes the M3 address counter to be counted to address 2. The true signal at the P34 output of the P34 flip flop causes flip flop P35 to be set to a 1 state and flip flop P34 to be reset to a 0 state at the following CLK pulse, thereby causing B57 of the flow to be entered.

The S register now contains the sum of offsets to δ mid, referred to as the $d_{min}$ value, a value of 1. The true signal at the P35 output causes a true signal at the B13 output of the BRIGHTNESS MODULE, causing the MEMORY MODULE to write the $d_{min}$ value 2 in address 2 of area 3 (using the M3 address counter) and the M3 address counter is counted up to address 3. The true signal at the P35 output of the flip flop P35 causes the P36 flip flop to be set to a 1 state and flip flop P35 to be reset to a 0 state at the following CLK pulse, thereby causing B58 of the flow to be entered. The sum of offsets to the first event of the response, $d_0$, is now stored in the $D_0$ register. The true signal at the P36 output again causes a true signal at the B13 output, causing the MEMORY MODULE to write the $d_0$ value 5 at address 3 using the M3 register and the M3 address counter is counted to address 4. At this point, the MEMORY MODULE area 3 contains the values indicated for addresses 0 through 3 depicted in Part 7, Table 41.

During B44, in the manner described above, the P/B MEMORY area 2 reads out of address 5 (using the M1 address counter) and the new CP value 7 is stored into register RII. Additionally, the address counter M1 is incremented to address 6.

During B45, the register RII does not contain the end of field value −1, accordingly, B46 is entered. During this pass through B46, the CP value 7 in register RII is found to be < the beginning delimiter value 10 in register DI. Accordingly, a true signal is formed at the L output of the ALU. This causes B47 of the flow to be entered.

During B47 of the flow, the logic P22·L·$\overline{CLK}$ becomes true, causing a true signal at the B6 output of the BRIGHTNESS MODULE. This in turn causes the DECODE II MODULE to read out the next lower beginning delimiter value 8. The true signal at the P22 output causes the delimiter value 8 to be coupled through the DI register to its output.

B6 of the flow is reentered where the CP value 7 in register RII is compared with the beginning delimiter value 5 in register DI and the former is found to be the larger. Accordingly, the ALU causes a true signal at the $\overline{L}$ output of inverter 1140 causing the logic P22·$\overline{L}$ to become true as discussed above, thereby causing B48 of the BRIGHTNESS MODULE flow to be reentered.

The operation of the BRIGHTNESS MODULE continues similar to that described above as depicted below in symbolic notation.

```
B48      S, D0 ←0
         Read MIN←P/B MEMORY (6)
B49      Read N, NP←P/B MEMORY (2)
B50      T←M1(8) + NP/2 (1) = T(9)          ; compute δ midpoint address
         Read RII←P/B MEMORY (10)           ; read midpoint δ value
B51      NP ≠ 0 ∴
B52      Read RI←P/B MEMORY (8)
         NP←NP(2) − 1 = NP(1)
B53      D = |RII (10) − RI(8)| = D(2)
         S = S(0) + D(2) = S(2)
B54      D ←RI(8) − MIN (6) = D(2)
         DO = DO(0) + D(2) = DO(2)
B51      NP ≠ 0 ∴
B52      Read RII ←P/B MEMORY (10)
         NP ←NP(1) − 1 = NP(0)
B53      D = |RII (10) − RI (10)| = D(0)
         S←S(2) + D(0) = S(2)
B54 .    D←RI (10) − MIN (6) = D(4)
         DO = DO(2) + D(4) = DO(6)
B51      NP = 0
B55-B58 Write following in addresses 4–7 of MEMORY MODULE area 3:
         DI = 5
         N = 2
         S = 2
B5       D0 = 6
B44      Read RII ←P/B MEMORY (4)
B45      RII (4) > 1 ∴
B46      RII (4) <DI (5)
B47      Call DECODE II MODULE
         DI←DO2(0)                          ; read beginning delimiter
                                              of last entry in response
B46      RII (4) ≧ DI (5)
B48      S, DO←0
         Read MIN←P/B MEMORY (1)
B49      Read N, NP← P/B MEMORY (3)
B50      T←M1(13) + NP/2 (1) = T(14)
         Read RII←P/B MEMORY (5)            ; read δ MID
B51      NP ≠ 0
B52      Read RI ←P/B MEMORY (2)
         NP←NP(1)−1 = NP(2)
B53      D ←|RII (5) − RI (2)|
         S ←S(0) + D(3) = S(3)
B54      D(1)←RI(2) − MIN (1) = D(1)
         DO←DO(0) + D(1) = DO(1)
B51      NP ≠ 0
B52      Read RI ←P/B MEMORY (5)
         NP←NP(2) −1 = NP (1)
B53      D =←|RII(5) − RI(5)| = D(0)
         S ← S(3) + D(0) = S(3)
B54      D ← RI(5) − MIN (1) = D(4)
         DO ← DO(1) + D(4) = D0(5)
B51      NP ≠ 0
         Read RI ←P/B MEMORY (7)
         NP ← NP(1) − 1 = NP(0)
B53      D ←|RII(5) − RI(7)| =D(2)
         S ← S(3) + D(2) = S(5)
B54      D ← RI(7) − MIN (1) = D(6)
         D0← DO(5) + D(6) = D(11)
second cycle      OB6 -OB9, OB-11, OB12, OB10, OB12, OB10, OB12,
                  OB10, OB13, OB15, OB16, OB17 - OB20, OB22,
                  OB24, OB22, OB23, OB18, OB20, OB22, OB24, OB22
                  OB23, OB18 - OB20, OB22, OB24, OB22, OB23,
                  OB18, OB19, OB21, OB22, OB24 - OB27, OB6
   OB6    call Decode II returns DO2 = 2, EOF2 =0
   OB7    RI − DO2 = 2
         R2 = RI(2) − N(3) = −1
          DELV = R2 = −1 (minus indicated left shift)
  OB8, 0B9 OB11 EFF = 0 = EOF1 =0
            RII = DO1 = 2
            (no write takes place since EFF = 0)
 OB12, OB10 R2(−1) <RII(2) EFF = 1
          call Decode I returns DO1 = 1, EOF1 = 0
          RII = DO1 = 1
          write RII to AM-II MEM WP = WP + 1 = 2
 OB12, OB10 R2 < RII EFF = 1
          call Decode I returns DO1 = 0, EOF1 =0
```

-continued

| | |
|---|---|
| | RII = DO1 = 0 |
| | write RII to AM-II MEM WP = WP + = 3 |
| OB12, OB10 | R2 < RII EFF = 1 |
| | call Decode 1 returns EOF1 = 1 |
| OB13 | EFF = 0 |
| OB15 | WT = WP = 3 |
| | T = 0 |
| OB16, OB17 | call Delta 2 returns DELO = −1 |
| | D0 = DELO = −1 |
| OB18 | WT = WT − 1 = 2 |
| OB19, OB20 | WB(0) < WT (2) |
| | Read RII = 0 from AM-II MEMORY at address WT |
| OB22, OB24 | RII (0) > DO(−) |
| | Call DELTA 2 returns DELO = 0 |
| | D0 = DELO = 0 |
| OB22, OB23 | RII = D0 = 0 |
| | T = 1 |
| OB18 | WT = WT − 1 = 1 |
| OB19, OB20 | WB(0) < WT(1) |
| | Read RII (1) from AM-II MEM at address WT |
| OB22, OB24 | RII(1) > D0(0) |
| | call DELTA 2 returns DELO = 1 |
| | D0 = DELO = 1 |
| OB22, OB23, OB18 | RII = D0 = 1 |
| | T = 0 |
| | WT = WT − 1 = 0 |
| OB19, OB20 | WB = WT = 0 |
| | Read RII (2) from AM-II MEM at address WT |
| SB22, OB24 | RII> D0 |
| | Call DELTA 2 returns DELO = 2 |
| | D0 = DELO = 2 |
| OB22, OB23, OB18 | RII = D0 = 2 |
| | T = 1 |
| | WT = WT − 1 = −1 |
| OB19, ON21 | WB(0) > WT (−1) |
| | RI = 255 |
| OB22, OB24 | RII > DO |
| | call DELTA 2 returns DELEND |
| OB25, OB26 | write RI = 2 to memory area 3 |
| | M3 = M3 + 1 |
| OB27 | WB = WT + 1 = 0 |
| OB6 | call Decode 2 returns EOF2 = 1 |
| | EXIT |
| B51 | NP = 0 |
| B55–B48 | Write following in addresses 8-11 of MEMORY MODULE area 3 |
| | DI = 0 |
| | N = 3 |
| | S = 5 |
| | $D_0 = 11$ |
| B44 | read RII←P/B MEMORY (−1); end of field |

After B44 of the flow, B45 is entered. During B45, the register RII contains the end of field delimiter −1. Accordingly, the logic B9 (P22.SRII) causes the BRIGHTNESS MODULE to exit.

At this point, the MEMORY MODULE area 3 contains the field of information depicted at addresses 0 through 11, Part 7 of Table 41. The BRIGHTNESS MODULE forms a true signal at the FC (BMEND) output, signaling to the MINI COMPUTER that it has completed its brightness function. The MINI COMPUTER then takes the field of information depicted at Part 7, Table 41, and computes the following scatter values for each entry as illustrated below in equation form.

$$S\,\text{entry 1 (TEST)} = \frac{d_0 - d_{min}}{d_0 + (LNRQ - N)\,LNRQ} = \frac{5 - 1}{5 + (3 - 2)\,3} = .50$$

$$S\,\text{entry 2 (IS)} = \frac{6 - 2}{6 + (3 - 2)\,3} = .444$$

$$S\,\text{entry 3 (THIS)} = \frac{11 - 5}{11 + (3 - 3)\,3} = .5454$$

From the above, it will be seen that the scatter value for entry 3 corresponding to the word "THIS" is closest to unity and accordingly would most likely be selected as the response for the request word "SIT". The MINI COMPUTER also computes the length factor L, using the equation given above, together with the length of request LNRQ stored in IPRF and the length of the response for each entry as follows:

$$L\,\text{entry 1 (TEST)} = 1 - \left(< \frac{LNRQ - N}{LNRQ}\right)^3 = 1 - \left(.63\,\frac{(3-4)}{3}\right)^3 = 1 - \left(.63\,\frac{\phi}{3}\right) = .99$$

-continued $$L \text{ entry } 2 = 1 - \left(.63\ \frac{3-2}{3}\right)^3$$

$$(\text{IS}) \quad = 1 - \left(.63 - \frac{1}{3}\right)$$

$$= .99$$

$$L \text{ entry } 3 = 1 - \left(.63\ \frac{3-4}{3_3}\right)^3$$

$$(\text{THIS}) = 1 - \left(.63\ \frac{\phi}{3}\right)$$

$$= .99$$

The MINI COMPUTER under program control then computes the brightness value B for each of the entries as follows:

| |
|---|
| $B_1 = L_1S_1 = .99 \times .50 = .495$ (TEST) |
| $B_2 = L_2S_2 = .99 \times .444 = .437$ (IS) |
| $B_3 = L_3S_3 = .99 \times .5454 = .5499$ (THIS) |

From the above example it will be seen that the word "THIS" has the highest brightness value B of 0.5499 and based thereon, would be selected as the best word from the data base which is a response to the request word "SIT".

XVII. DPM INTERFACE MODULE

The DPM INTERFACE MODULE of FIG. 1 acts similar to a conventional I/O peripheral to the MINI COMPUTER. The DPM INTERFACE MODULE is initialized by the MINI COMPUTER. The DPM INTERFACE MODULE then stores information from the MINI COMPUTER or, upon completion of a desired function by the delta processing machine (DPM), the results are read by the MINI COMPUTER from the DPM INTERFACE MODULE.

Three groups of information are necessary to run the DPM as follows: (1) input information such as the isoentropicgram width (HW); length of data in memory areas (i.e., LN1, LN2), length of request (LNRQ); line number (LINE #); top limit (TL), and bottom limit (BL), internal (IR) and pipe width (PW). The input information is placed into the IPRF shown in FIG. 52 by the MINI COMPUTER. (2) Output information such as new line number of seed, seed length, etc., all of which have been pointed out in connection with each module. (3) Memory information which is written and read in the MEMORY MODULE or the P/B MEMORY by the MINI COMPUTER.

Figure 53:
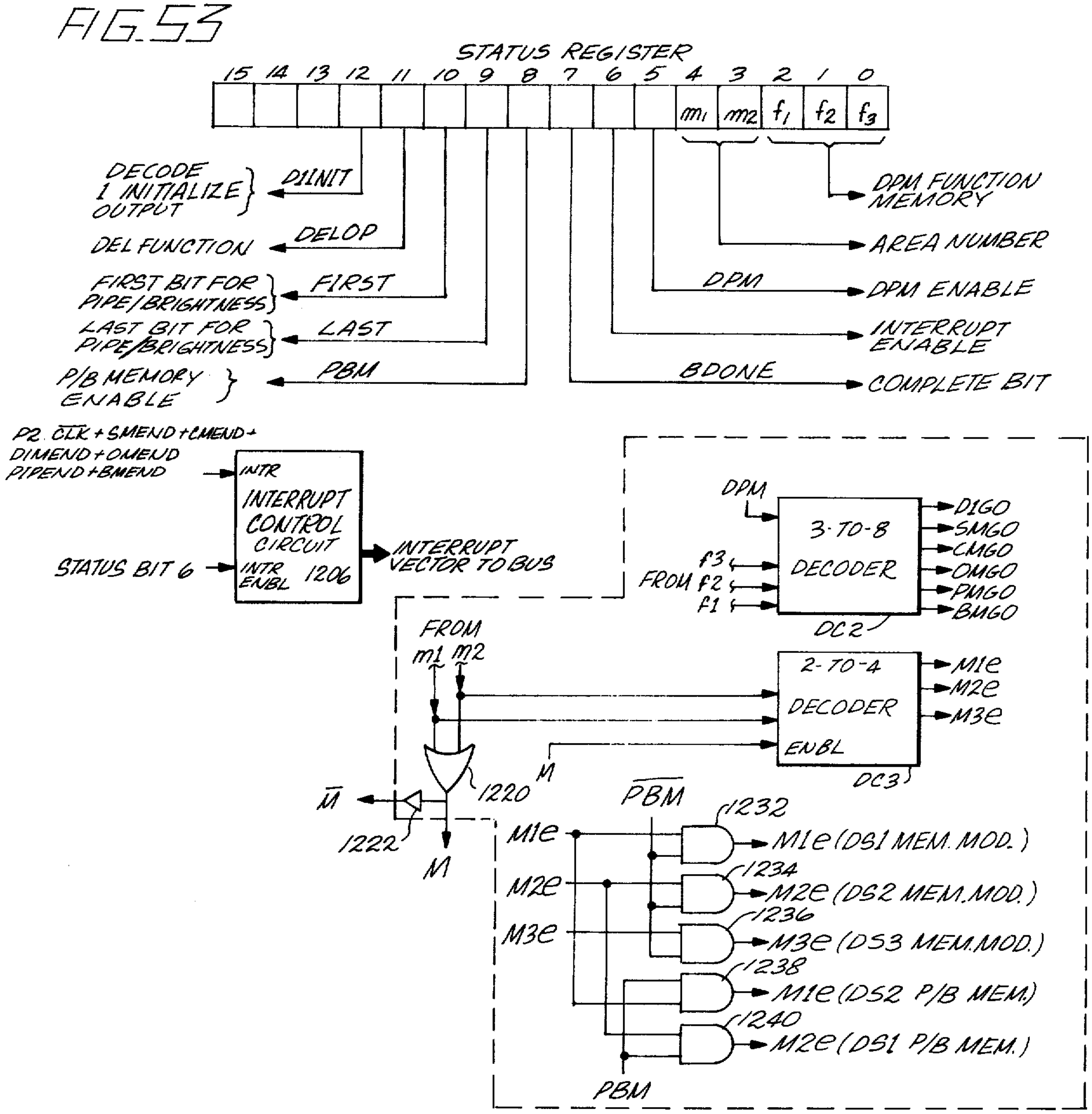

The DPM INTERFACE MODULE provides the necessary circuitry to handle the input/output interface in between the MINI COMPUTER and the DPM. Reference is now made to FIG. 51 through FIG. 53, showing block and schematic diagrams of the DPM INTERFACE MODULE. Heavy lines are used to depict multiple lines for carrying multiple bits of data in parallel. Logical equations are used to represent gates used to control the operation of the system. A parallel I/O bus 1210 provides the interconnection between the MINI COMPUTER and the rest of the circuitry in the DPM INTERFACE MODULE. As the module is disclosed, the necessary connections will be presented to show how this INTERFACE MODULE would be set up as an interface to a Digital Equipment Corporation PDP-11 computer.

Figure 54:
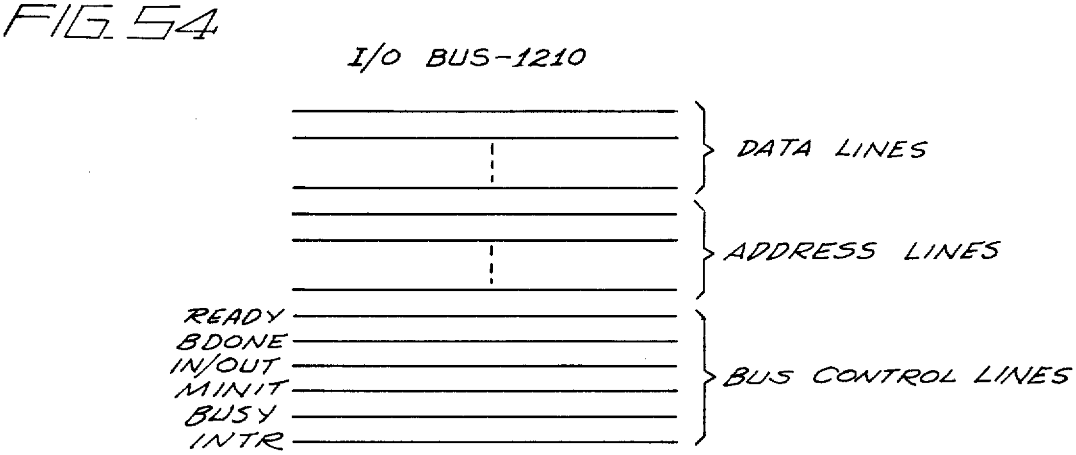
FIG. 54 shows the I/O bus 1220 structure.

The I/O bus 1210, as depicted in FIG. 54, is made up of three groups of lines referred to as the "data lines", the "address lines" and the "bus control lines". Considering first the address lines, the MINI COMPUTER places addresses on the address lines. The address signals are the addresses of peripheral units external to the MINI COMPUTER with which the MINI COMPUTER is to communicate. The addresses for the INTERFACE MODULE are of the following type:

X X X X X Y Y Y where X X X X X uniquely identifies the desired peripheral with which the MINI COMPUTER is to communicate, the Y Y Y identifies the register within the peripheral with which the MINI COMPUTER is to communicate.

Referring to FIG. 1, the DPM INTERFACE MODULE contains interface logic unit 1204. The details of this unit which are of importance to the present invention are disclosed in connection with FIGS. 51 through 53. Generally speaking, the interface logic 1204 is responsible for gating data to and from the I/O bus 1210. The unit 1204 also handles the handshaking steps of forming the signals at the READY and BDONE lines of the bus control lines as discussed in more detail hereinabove. Additionally, the unit 1204 monitors a STATUS register depicted in FIG. 53 and depending on the status of various flip flops in FIG. 53 and depending on the status of various flip flops in the STATUS register, notifies an interrupt control module 1206 when interrupt operations are to be handled.

In the present system, the only peripheral of interest is the DPM INTERFACE MODULE. The specific registers within the DPM INTERFACE MODULE with which communication takes place are disclosed in more detail in connection with FIG. 51.

The data lines carry the data which is being communicated between the MINI COMPUTER and the DPM INTERFACE MODULE. Data may be placed on the lines, either by the MINI COMPUTER or the DPM INTERFACE MODULE. The bus control lines carry control signals for controlling the transfer of information in between the MINI COMPUTER and the DPM INTERFACE MODULE.

Figure 55:
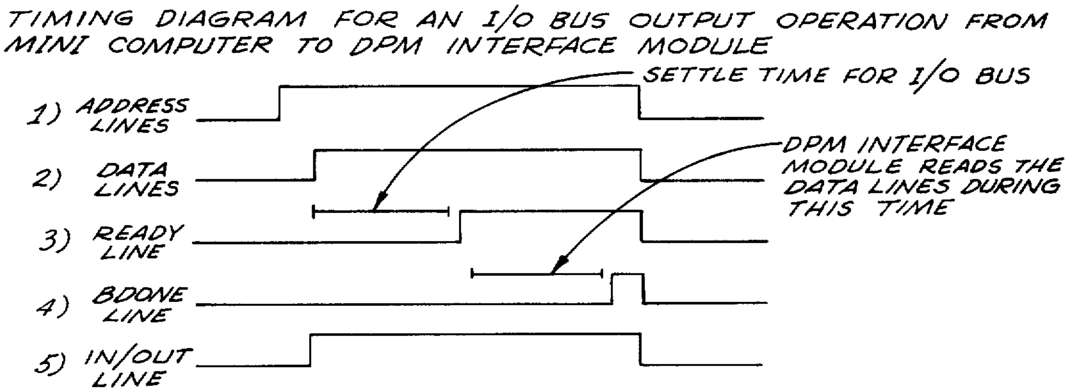
FIGS. 55 and 56 form timing diagrams representing the sequence of operation of I/O bus output and input operations.

Consider now the sequence of operation and timing for an I/O bus "output" operation from the MINI COMPUTER to the DPM INTERFACE MODULE. FIG. 55 contains a timing diagram illustrating the sequence of operation. First, the MINI COMPUTER applies address signals on the address lines as indicated at 1. Next, the MINI COMPUTER applies data signals on the data lines as depicted at 2. After transient conditions have settled on the address and data lines (such as after a predetermined time delay), the MINI COMPUTER forms a true signal on the READY line in the bus control lines. A true signal on the IN/OUT line indicates an output transfer from the MINI COMPUTER to the DPM INTERFACE MODULE, whereas a false signal indicates an input transfer to the MINI COMPUTER. Around the same time that data is applied on the data lines, the MINI COMPUTER applies a true signal on the IN/OUT line indicating that this is to be an output transfer. After the true signal at the READY control line, the DPM INTERFACE MODULE reads the data applied on the data lines. After the DPM INTERFACE MODULE completes its reading operation, the DPM INTERFACE MODULE applies a true signal on the BDONE line of the bus control lines. The true signal on the BDONE line signals the MINI COMPUTER that the output operation is complete, and therefore the MINI COMPUTER then removes the signals it applied to the READY line, the address line, the data lines, and the IN/OUT line. Subsequently, the DPM INTERFACE MODULE removes the true signal on the BDONE line. This cooperative signalling of ready and done on the READY and BDONE lines is referred to in the computer art as handshaking and is a well known technique requiring no further explanation.

Figure 56:
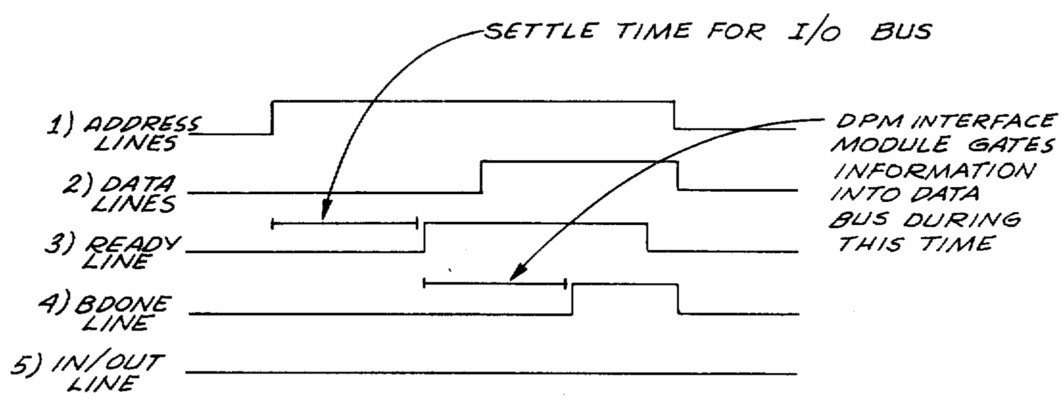

Consider now the sequence of operation and timing for an I/O bus "input" operation to the MINI COMPUTER from the DPM INTERFACE MODULE, as depicted by the timing diagram of FIG. 56. Initially, as indicated at 1, the MINI COMPUTER applies addresses on the address lines of the bus 1210. Also, the MINI COMPUTER maintains the signal on the IN/OUT line false, indicating that this is an input operation to the MINI COMPUTER from the DPM INTERFACE MODULE. The MINI COMPUTER then forms a true signal at the READY line of the bus control lines after the signals on the address lines have settled (such as after a prefixed delay). The DPM INTERFACE MODULE then responds by applying data signals onto the data lines as indicated at 2. The DPM INTERFACE MODULE then forms a true signal at the BDONE line of the bus control lines, signalling that the operation is complete. Subsequently, after a prefixed delay, the MINI COMPUTER reads the data on the data lines. The MINI COMPUTER responds to the true signal at the BDONE line by removing the signals on the READY and the address lines, as indicated at 1, 2, and 3. Subsequently, the DPM INTERFACE MODULE removes the true signal at the BDONE line and the data lines, completing the intput operation.

The foregoing input and output sequences are repeated for each transfer of data in between the MINI COMPUTER and the DPM INTERFACE MODULE.

Refer now to the general block diagram of FIG. 1. The DPM INTERFACE MODULE contains an address selector 1202. The address selector 1202 has inputs connected to the address lines and the IN/OUT control line of the I/O bus 1210. The address selector 1202 contains address recognition circuits (not shown), well known in the computer art, for recognizing the X X X X X portion of the address signal on the address lines which designate the DPM INTERFACE MODULE. In addition, an address decoder (not shown) is contained in the address selectors 1202 for converting the coded signals in the Y Y Y portion of the address on the address lines to a true signal on one of the output lines S0, S1 and S2. To be explained in more detail, with respect to FIG. 51, true signals at the S0 output selector either a DATAO output gate or a DATAI input register, and true signals at the S1 and S2 outputs select the AI and STATUS registers, respectively (see FIG. 51). Thus, the address decoder (not shown) in the address selector 1202 forms a true signal at one, and only one, of the output lines S0, S1 and S2, depending on the coded signal in the address portion Y Y Y of the signals on the address lines.

The address selector 1202 also contains a decoder (not shown) which is responsive to a true signal on the IN/OUT bus control line for forming a true signal on an IN output line and is responsive to a false signal on the IN/OUT bus control line for forming a true signal at an OUT line. The IN line and the OUT line are outputs depicted for the address selector 1202.

It will be understood that the address selector 1202 will contain other logic, timing, and control which are not important to an understanding of the present invention and therefore need not be described for a complete understanding thereof.

Refer now in more detail to the portions of the circuitry of the address selector 1202 and the interface logic 1204 depicted in FIGS. 51 through 53. In FIG. 51 there are depicted three registers that are addressable by the MINI COMPUTER. These registers and their functions are as follows.

DATAO register is an output register responsive to the logic S0.OUT to store 8 bits of information from the data lines of the I/O bus 1210. Register DATAO handles the transfer of information from the MINI COMPUTER to the IPRF, the MEMORY MODULE, or the P/B MEMORY.

The DATAO register can be represented as a PDP-11 interface register by using a M1502 bus output interface as disclosed on page 198 of the Digital Equipment Corporation manual PDP-11 INTERFACE MANUAL. The following connections must be made. Note only low order 8 bits of UNIBUS are used. Bus signal B00–B07 are connected to M1502 pines BE1, BF2, BH2, BD2, BE2, BF1, BH1, and BD1 respectively to form the connection from the I/O bus to the register. To get from the register to data selector DS3 the M1502 pins BU1, BR2, BS2, BS1, BR1, BM1, BL1, and BL2 are connected to bits 0–7 of the data selector DS3. Additionally, bus signal INIT is connected to M1502 pin AE1 while pin AP1 is grounded. INTERFACE signal S0 is attached to AM1 and out to AA1 forming the clock input for DATAO.

AI register is an output register that is responsive to the logic PS.$\overline{CLK}$.S1 for storing an 8 bit address from the data lines of the I/O bus 1210 provided by the MINI COMPUTER.

This register is used only as an output register and is designed as disclosed below. The register picks only the low-order 8 bits from the UNIBUS and is clocked when the signals S1.OUT are asserted by the address selector. The register can be reset by asserting the INIT control line on the UNIBUS. Note that the AI register is a counter. Therefore, loading AI is normally a two step process. During the first step the information is clocked from the bus into a register. This is shown on the design as an enable pulse. Secondly, after the information settles in the registry it is loaded into the co-nter AI. This is shown as the load pulse. The signal which clocks the interface register is delayed to allow the outputs of the M1502 register to settle out. Then the AI counter is loaded with the value in the M1502 register. The rest of the operation is as described in the DPM interface module. The UNIBUS input connections to M1502 module in the AI register are the same as disclosed for the DATAO register. The output pin connections on the M1502 register only now they are attached to bits 0–7 of the AI counter. Additionally, the INIT signal from the UNIBUS is applied to pin AE1 of the M1502 while pin AP1 is grounded. The signal S1 is applied to pin AA1 while the OUT signal is applied to the AM1 pin. These form the strobe pulse that strobes information into the M1502. This signal is delayed until the lines in the M1501 settle out. Then the contents of the 1502 are loaded into the counter AI. The AI register is an address register used to select particular register in the DPM to address in the MEMORY MODULE or to address in the P/B MEMORY where information is to be written or from which information is to be read. To this end, the AI register is connected to a decoder DC1 and to a data selector DS4. From DS4, the information is gated to data selectors DS1–DS3 of the MEMORY MODULE or to data selectors DS1–DS2 of the P/B MEMORY.

The action of the AI register in controlling the DS1 to DS3 selection circuits in the MEMORY MODULE or selection circuits DS1–DS2 of P/B MEMORY will be explained in more detail in connection with the MEMORY MODULE description. The decoder DC1 is a conventional decoder that is responsive to the rightmost 4 bits of binary coded address information in register AI and forms an output signal on one of ten output lines designated D1 through D10, responsive to a true enable signal at $\overline{M}$. Although the 4 bits give 16 possible combinations, only 10 combinations are used. In this manner, the register AI selects and causes a true signal on one of the output lines D1 through D10. Also, at a different time, the signals on the lines D1 through D6 are used for controlling a DS2 selection circuit which couples the output of registers in the SEED MODULE and the OUTPUT MODULE into the DPM INTERFACE MODULE. Also, at still a different time, the outputs D1 through D9 from the DC1 decoder are operative to select one of the registers of the IPRF into which information is to be stored from the DATAO register.

The STATUS register is an input/output register that is responsive to the logic (IN+OUT).S2 for storing control information applied on the data lines of the I/O bus 1210 by the MINI COMPUTER. The information stored in the STATUS register performs a number of functions, including initiation or setting of certain flip flop conditions needed in execution of the various DPM modules and the selection of modules to be used for various operations.

The STATUS register in an INPUT/OUTPUT register and thus to convert it to the UNIBUS of a PDP-11 would require a M1501/M1502 register pair. The M1502 would be used as the input portion of the register and the M1502 is used as the output portion of the register. The full 16 data bits of the UNIBUS are used. The connection of pins would be done as below indicated.

M1502 OUTPUT portion

Bus bit B00 is connected to pins BE1
Bus bit B01 is connected to pins BF2
Bus bit B02 is connected to pins BH2
Bus bit B03 is connected to pins BD2
Bus bit B04 is connected to pins BE2
Bus bit B05 is connected to pins BF1
Bus bit B06 is connected to pins BH1
Bus bit B07 is connected to pins H1 of the M1502
Bus bit B08 is connected to pins BK1
Bus bit B09 is connected to pins BJ1
Bus bit B10 is connected to pins BC1
Bus bit B11 is connected to pins BB1
Bus bit B12 is connected to pins BV1
Bus bit B13 is connected to pins AC1
Bus bit B14 is connected to pins AD1
Bus bit B15 is connected to pins BT2

Additionally the INIT signal from the UNIBUS is connected to the AE1 pin of the M1502 module while pin AP1 is grounded. The signal S2 from the address selector is applied to pins AA1 and AB1 while the OUT signal is applied to pin AM1 forming the load strobe for the M1502 register. Note that bus bit B07 was connected to input pin H1 of the input module M1501. This bit (BDONE) to be explained later must have the capability that it can be asynchronously set and reset.

The in put portion of the STATUS register is designed for the UNIBUS of the PDP-11 by using an M1501 Bus Input Interface as disclosed on Pages 196 and 196 of the above referenced manual. The UNIBUS connection needed to complete this design would be as follows:

| Pin | of STATUS register bit | is connected to the UNIBUS bit |
|---|---|---|
| P2 | 0 | B00 |
| N2 | 1 | B01 |
| M1 | 2 | B02 |
| L1 | 3 | B03 |
| K1 | 4 | B04 |
| J1 | 5 | B05 |
| L2 | 6 | B06 |
| M2 | 7 | B07 |
| S1 | 8 | B08 |
| R1 | 9 | B09 |
| U2 | 10 | B10 |
| Pin | of STATUS register bit | is connected to the UNIBUS bit |
| T2 | 11 | B11 |
| S2 | 12 | B12 |
| R2 | 13 | B13 |
| N1 | 14 | B14 |
| P1 | 15 | B15 |

Additionally the signals S2 and IN from the address selector are connected to pins K2 and J2 respectively and form gating signals which gate the information in the STATUS register onto the UNIBUS. Again bit 7 must be handled specially in that it feeds from pin AI of the M1501 module to pin DD and from there onto the UNIBUS.

FIG. 53 shows a schematic and block diagram of the STATUS register as well as a block diagram of the decoder 1218 which is connected to the output of the STATUS register. The STATUS register includes three flip flops labelled *f*1, *f*2 and *f*3 which are connected to the input of a decoder DC2. The decoder DC2, responsive to the combination of bits stored in flip flops *f*1, *f*2 and *f*3, forms, at any one time, a control signal at one and only one of the output circuits DIGO, SMGO, CMGO, OMGO, PMGO, and BMGO. It will be recognized that the foregoing outputs are the control lines which call the operation of the DECODE I, SEED, CHANGE, OUTPUT, PIPE and BRIGHTNESS MODULES.

The STATUS register has two flip flops identified as $m_1$ and $m_2$ which are connected to the input of a decoder DC3 and the input of an OR gate 1220. The flip flops $m_1$ and $m_2$ have a total of four possible combinations of states. When either flip flop $m_1$ or $m_2$ is in a 1 state, the OR gate 1220 forms a true signal at the M output. This indicates that the area in the MEMORY MODULE or P/B MEMORY is being selected by the $m_1$ and $m_2$ flip flops. The STATUS register also has a flip flop PBM and when in a 0 state, the outputs of decoder DC3 are used to address the MEMORY MODULE, and when in a 1 state, the outputs of the decoder DC3 are used to address the P/B MEMORY.

Table 42 depicts the state of the flip flops $m_1$ and $m_2$ and the corresponding outputs M1*e*, M2*e*, and M3*e* which receive a true signal when the PBM flip flop is 0. Table 43 depicts the state of the $m_1$ and $m_2$ flips flops and the corresponding outputs M1*e* and M2*e* receiving true signals when the PBM flip flop is a 1. AND gates 1232, 1234 and 1236 have one input coupled to the outputs of the decoder DC3 to the input of the MEMORY MODULE when the flip flop PBM is in a 0 state. AND gates 1238 and 1240 couple only the outputs M1*e* and M2*e* to the P/B MEMORY when the flip flop PBM is a 1. The outputs M1*e*, M2*e*, and M3*e*, in turn, control the DS1, DS2 and DS3 selection circuits in the MEMORY MODULE for areas 1, 2 and 3, respectively, or DS1 or DS2 of the P/B MEMORY. The decoder DC3 has an enable input which is connected to the M output of the OR gate 1220. The decoder DC3 only forms a true signal at one of its three outputs when the signal at the M output is true. The OR gate 1220 also has its output connected through a logical signal inverter 1222 to the $\overline{M}$ output. The $\overline{M}$ output has a signal which is complementary to that of the signal at the M output.

The STATUS register also has five flip flops identified as DELOP, FIRST, LAST, PBM, D1INIT and DPM. The aforementioned five flip flops are used to provide control signals from the DPM INTERFACE MODULE to other modules in the DPM. Using the same system of notation described above, the primed and unprimed outputs of the flip flops are shown as outputs at the bottom of FIG. 53. Looking more specifically at these flip flops, flip flops FIRST and LAST are used to control the 1 and 0 states of flip flops BFIRST and PFIRST in the BRIGHTNESS and PIPE MODULES. The unprimed output of the PBM flip flop is used as one input to an AND gate 1231 for forming the PBWE signal, a write enable signal to the P/B MEMORY. If the PBM flip flip is in a 1 state, a read operation takes place to the P/B MEMORY. If the PBM flip flop is in state 0, no operation takes place in the P/B MEMORY.

The DELOP flip flop has its unprimed output connected to the OUTPUT MODULE. The OUTPUT MODULE also has a DELOP flip flop. The DELOP flip flop is used to set the DELOP flip flop in the OUTPUT MODULE.

The D1INIT flip flop has its unprimed output connected to the DECODE I MODULE. This flip flop is used to prime the DECODE I MODULE prior to calling said module from the DPM INTERFACE MODULE. The DPM flip flop has its unprimed output connected as a control input to the decoder DC2 (FIG. 53) as explained in more detail hereinafter.

Figure 56A:
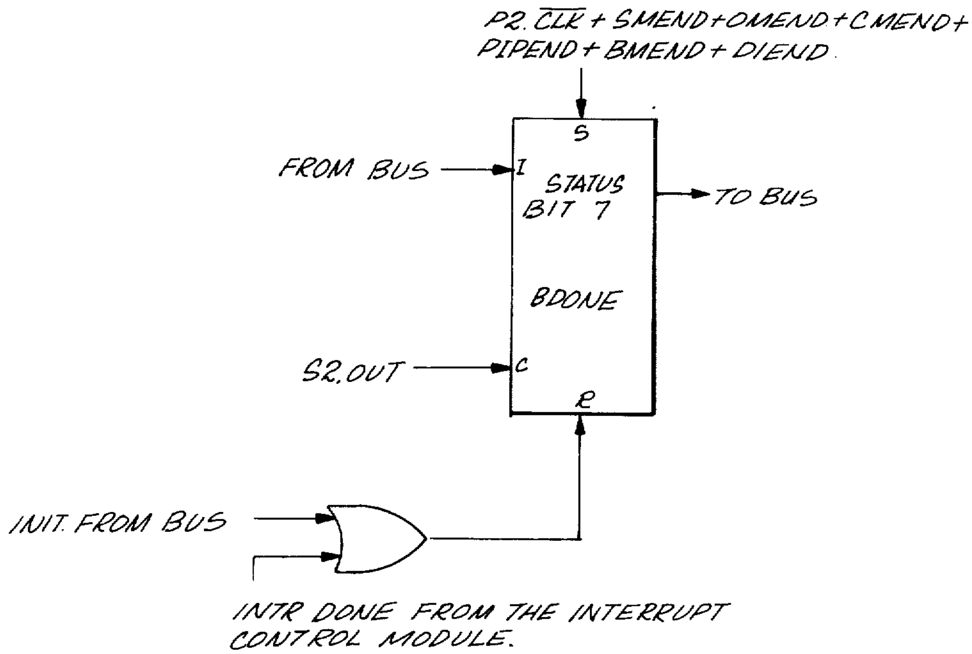
FIG. 56A is a schematic and block diagram showing the control for the BDONE flip flop in the DPM INTERFACE MODULE.

Two flip flops are contained in the STATUS register to control the movement of information across the I/O bus 1210 and will now be described. The interrupt enable flip flop (bit 6 of the output portion of the STATUS REGISTER) is set to a true (or one) state is upon completion of the called module, an interrupt is to be generated. If an interrupt is not desired, then the completion of the called module can be monitored by testing the second flip flop, the BDONE flip flop (STATUS REGISTER bit 7). As long as BDONE is set to 0 this indicates that the called module has not completed. Upon completion the called module sets the BDONE flip flop to a value 1, thus indicating to the MINI COMPUTER that the operation is complete. The BDONE flip flop can be designed for a PDP-11 interface by considering the design of FIG. 56A.

BDONE is affected in the above described PDP-11 interface modules by attaching UNIBUS data line B07 to M1501 pin H1; the synchronous set (S) input is attached to pin b1; the clock input, to pin D2; the asynchronous reset (R) to pins C1 and F1; and attaching output A1 to pin DD. All the pins mentioned above deal with the flip flop labeled RQE in the M1501 module.

Logic and control circuit 1252 are provided for controlling the state of the BDONE flip flop and for the generation of interrupts. If the circuit P2.$\overline{CLK}$ + SMEND + CMEND + OMEND + D1END + BMEND + PIPEND is set to 1, and the interrupt enable bit is set module 1252 will generate an interrupt to the MINI computer. The interrupt control module can be made to interface with a PDP-11 by using the module M782 Interrupt Control Module as disclosed on pages 317 and 318 of the above referenced manual. In FIG. 53 this would mean that the completion circuit would be attached to pin U1 of the module while the interrupt enable signal would attach to pin U1. The M782 module would then proceed to obtain control of the UNIBUS and generate an interrupt from pin M1. The interrupt vector address in the M782 module would be gated onto the UNIBUS through pins E2, L1, N2, F1, F2, and H1.

Referring back to FIG. 51, and I register is connected to the output of a DS1 selection circuit which in turn has three data inputs connected to the output of the DS5 selection circuit in the MEMORY MODULE, the DS2 selection circuit in the DPM INTERFACE MODULE, and the DS6 selection circuit in the P/B MEMORY. The DS 2 selection circuit in turn has six data input circuits connected to the outputs of the registers SLINE, SLN, ONOC, and OAR of the SEED MODULE, the registers OAR and OLN of the OUTPUT MODULE, register DO1 in the DECODE I MODULE, and the STATUS register. The DS2 selection circuit is of the same type described hereinabove in connection with the ENCODE MODULE and has six control circuits with the corresponding numbers to those used for the DATA input circuits. When one of the control input circuits (i.e., 1) receives a true signal, the correspondingly numbered data input circuit (i.e., 1) is connected through the DS2 selection circuit to the input of the DS2 selection circuit. The DS1 selection circuit is of the same type as the DS2 selection circuit and has control inputs at the sides thereof, labeled the same as the corresponding data inputs. The DS1 selection circuit couples a data input to its output when the corresponding control input, shown along its side, receives a true signal.

The address selector 1202 is shown in the left hand corner of FIG. 51. As shown the address of a desired DPM register is gated from the bus into the address selector. The selector decodes the address and asserts one of the three signals S0, S1, or S2. Additionally the control lines from bus are also gated into the address selector. They are decoded into an IN signal if data are to be input into the MINI; an OUT signal is generated if data are to be output from the MINI to the DPM. Finally the P2.CLK pulse is used to generate the DONE signal to the I/O bus 1210 indicating that the requested operation is complete.

The address selector 1202 shown in FIG. 51 can be interfaced to a PDP-11 by using an M105 address selector as disclosed in pages 311 and 312 of the above referenced manual. Bus lines A01–A017 are attached to pins H2, H1, F1, V2, U2, U1, U1, P2, N2, R1, P1, L1, C1, K2, K1, D2, E2, and D1 respectively. Additionally control ines C0, C1 from the UNIBUS are attached to pins F2, J2 of the M105 module. Pins M2, and N1 are OR'ed together to give the OUT signal while pin M1 gives the IN signal. Also, pins S2, T2, and R2 give the signals S0, S1, and S2 respectively. The SSYN signal on the M105 is grounded and the P2.$\overline{CLK}$ supplies the SSYN signal (DONE) to the UNIBUS.

A control counter 1213 has two flip flops P1 and P2. These flip flops are also edge trigger flip flops of the type disclosed above. An OR gate 1226 is connected to the unclocked reset to 0 inputs of the flip flops P1 and P2. The OR gate 1226 has its inputs connected to MINIT and the circuit P2.$\overline{CLK}$.

The control counter 1213 also has an AND gate 1228. The AND gate 1228 has one input connected to the $\overline{DPM}$ output of the $\overline{DPM}$ flip flop and another input connected to the output CLK of a source of clock pulses CLK and $\overline{CLK}$. A source of clock pulses forms a series of recurring true pulses at the CLK and $\overline{CLK}$ output thereof as depicted in FIG. 51.

FIG. 52 is a block diagram of the IPRF. The IPRF includes a group of nine registers, each of which has 8 flip flops for storing 8 binary bits of coded information. The registers in the IPRF each have a data input connected together in parallel to the data output of the DS3 selection circuit of FIG. 51. Each of the registers of the IPRF is of type SN74175 disclosed in the above *TTL* book and has an L input connected to one of gates 1230-1 to 1230-9. When one of the L inputs receives a true signal, the corresponding register stores the binary coded data from the output of the DS3 selection circuit. The gates 1230-1 and 1320-9 are AND gates with one input connected to the output of an AND gate 1232 and the other input connected to one of the outputs D1 through D9 of the decoder DC1 of FIG. 51. The AND gate 1232 has three inputs connected to the outputs P1 of the P1 flip flop, $\overline{CLK}$ of the source of clock pulses, and OUT of the I/O control 1216, all of which are shown in FIG. 51. Table 43 depicts the five outputs from the I/O control 1216 along with the indication of the meaning of a true signal at the corresponding output.

With the above general discussion of the DPM INTERFACE MODULE in mind, consider the actual operation. The control counter 1213 has three states. When the DPM INTERFACE MODULE is not in operation, both the P1 and P2 flip flops are in 0 states. Both of the flip flops P1 and P2 become true, sequentially, when data is being stored into the DATAO register from the I/O bus 1210, or when data is being read out of the I register onto the I/O bus 1210. Otherwise, only flip flop P2 becomes true. The control counter 1213 is always reset to 0 whenever an operation completes after the interface of the DPM INTERFACE MODULE has been selected by the MINI COMPUTER or a MINIT signal has been formed indicating system initiation. The output of OR gate 1223 is set to a 1 state whenever the DPM INTERFACE MODULE is requested, i.e., S0, S1 or S2 is set. It should be noted that the output of the OR gate 1223 is the control for gate 1228 which allows the clock pulses to be applied through the gate 1228 to the P1 and P2 flip flops of the control counter 1213.

Following is an example of the sequence of an output operation for writing a word of information from the MINI COMPUTER into the IPRF.

The sequence of operation similar to that depicted in FIG. 55 is followed. Consider the operation of writing a status word into the STATUS register. To this end, the MINI COMPUTER forms an address on the address lines of the I/O bus 1210 and the status word is applied on the data lines. As discussed above, a true signal is subsequently formed at the output of gate 1223 causing the clock to be enabled. The proper address is decoded by the address selector 1202 which forms a true signal at the S2 output. The logic (IN+OUT).S2 is now true, causing a true signal at the load input of the STATUS register to store the control word applied on the data lines of the I/O bus 1210 by the MINI COMPUTER.

The true signal at the output 1223 causes the gate 1228 to couple the CLK pulses to the clock inputs of the P1 and P2 flip flops. Since both of flip flops P1 and P2 are in a 0 state, the signals at the P1 and P2 outputs are false. Also, since a true signal is not formed at the S0 output, a true signal is formed at the $\overline{S0}$ output. As a result, the logic $\overline{P1 + P2}$).$\overline{S0}$ is true, causing the P2 flip flop to be set to a 1 state at the following CLK pulse. The logic P2.$\overline{CLK}$ becomes true which in turn is applied to the logic and control circuit 1206, causing it to set the BDONE flip flop (bit 7 of STATUS) to a 1 state, causing a true signal on the BDONE line. The P2.$\overline{CLK}$ also is applied to address selector 1202 thereby causing the bus to be freed for other operations. When P2.$\overline{CLK}$ is set to a 1 state, gate 1226 forms a true signal and flip flops P1 and P2 reset.

Next consider the sequence of opertion that allows for the outputing of information to the AI register. The sequence of operation is somewhat similar to that described for the STATUS register.

Initially the address of the AI register is put onto the bus 1210 by the MINI COMPUTER. This address is received and decoded by the address selector 1202 and as a result the S1 and OUT lines of the circuit are asserted. The S1 signal causes gate 1223 to fire thereby initializing the clock enable gate 1228. Since S1 is asserted, the circuit ($\overline{P1 + P2}$).$\overline{S0}$ is true and on the first CLK pulse the P2 flip flop is set to a 1 state.

Initially, recall that lines S1 and OUT were asserted. These are OR'ed together and form a true pulse at the enable input of the AI register. Recall that this enable pulse clocks the information from the bus into a storage register. The pulse P2.S1.OUT.$\overline{CLK}$ loads the information from this register into the counter AI. The P2.$\overline{CLK}$ signal causes control counter 1213 to be reset to 0. Additionally the P2.$\overline{CLK}$ pulse is applied to 1202 address selector which in turn supplies a done signal to the bus. The MINI COMPUTER responds by freeing the bus for future operations.

It should be noted here that the output of the AI register is used as an address into the IPRF, the DPM MEMORY MODULE, or the P/B MEMORY MODULE. Once the AI register is loaded initially all subsequent output operations to the DATAO register cause the AI counter to be counted up by one. This is so since the circuit P2.$\overline{CLK}$.S0 would then be true. This design is simply a means whereby a sequence of consecutive memory locations can be filled by placing a starting address into AI and then repeatedly writing to the DATAO register.

Next, the MINI COMPUTER provides a data word which is to be stored into the DATAO register and subsequently transferred to the IPRF. To this end, the MINI COMPUTER again follows the sequence of operation depicted in FIG. 55. Thus, the MINI COMPUTER applies an address on the address lines and a data word on the data lines and a true signal on the IN/OUT line, indicating that an output operation is taking place by the MINI COMPUTER. The address on the address lines causes the address selector 1202 to form a true signal at the SO output and the true signal on the IN/OUT line causes a true signal at the OUT output of the address selector 1202. Therefore, the logic ($\overline{P1 + P2}$).SO becomes true. Thus, during the operation of the control counter 1213, the P1 flip flop is set to a 1 state rather than the P2 flip flop. The logic SO.OUT also becomes true, causing the DATAO register to store the data word applied on the I/O bus 1210 by the MINI COMPUTER.

Referring now to the STATUS register, both the $m_1$ and $m_2$ flip flops are 0 since information is not being written into the MEMORY MODULE or P/B MEMORY. Accordingly, a true signal is formed at the $\overline{M}$ output of the inverter 1222. Accordingly, the logic P1.$\overline{M}$ is now true, causing the DS3 selection circuit to couple the content of register DATAO through to the input of the IPRF registers shown in FIG. 52. The address word stored in register AI causes the decoder DC1 to form a true signal at one of the outputs D1 through D9 which in turn selects the one of the registers in the IPRF into which the word contained in register DATAO is to be stored. Assume for purposes of explanation that the address in register AI causes a true signal at the D1 output corresponding to the TL register. A true signal is being formed at the OUT output and the source of clock signals forms a true signal at the $\overline{CLK}$ output. True signals are now formed at the outputs P1, $\overline{CLK}$ and OUT, causing the AND gate 1232 to form a true signal. The true signal at the output of AND gate 1232 in combination with the true signal at the D1 output of the decoder DC1 causes AND gate 1230-1 to apply a true signal to the TL register, causing the contents of DATAO to be loaded into the TL register. On the next CLK pulse flip flop P1 is reset to 0 and flip flop P2 is set to 1. When the P2.$\overline{CLK}$ pulse is formed the address selector send a DONE pulse to the bus indicating to the MINI COMPUTER that the operation of the DPM INTERFACE MODULE is complete. The MINI COMPUTER responds to the ture signal at the DONE control line and drops control of the bus.

An input operation for reading information from the DPM to the MINI COMPUTER will now be described.

Information is read from one of the registers SLINE, SLN, ONOC, OAR of the SEED MODULE or one of the registers OAR and OLN of the OUTPUT MODULE D01 from the DECODE 1 MODULE, or from the STATUS register. Initially, the MINI COMPUTER stores a control word in the status register as described above. Also, an address word is stored in register AI as described above.

Next a word is to be sent over the data lines of the I/O bus 1210 from the DPM INTERFACE MODULE to the MINI COMPUTER. Following the operation depicted in FIG. 56, the MINI COMPUTER initially applies an address on the address lines and after the signals have settled, forms a true signal on the IN line and on the S0 line. The true signal at S0 causes OR gate 1223 to fire which causes the AND gate 1228 to apply CLK pulses to the clock input of the P1 and P2 flip flops. The logic ($\overline{P1 + P2}$). SO is true, causing the P1 flip flop to be set to a 1 state, thereby forming a true signal at the P1 output. The control word stored in the STATUS register causes both $m_1$ and $m_2$ flip flops to be in a 0 state and accordingly a true signal is formed by the inverter 1222 at the $\overline{M}$ output. The true signal at the $\overline{M}$ output enables the decoder DC1 to form a true signal at one of the outputs D1 through D6 corresponding to the address contained in register AI. Additionally, the address selector 1202 forms a true signal at the IN output. The true signal at the IN output in combination with the true signal of one of the outputs D1 through D7 causes the DS2 selection circuit to couple one of the registers from the SEED MODULE or the OUTPUT MODULE or the DECODE 1 MODULE or the STATUS register through to the input of the DS1 selection circuit. Additionally, the logic P1.$\overline{M}$ is true, causing the DS1 selection circuit to couple the same register through to the input of the I register.

The logic P1.$\overline{CLK}$ becomes true, causing the I register to load the data from the selected register into the I register. The true signal now formed at the P1 output of the P1 flip flop and the following CLK pulse causes the P2 flip flop to be set to a 1 state and the P1 flip flop to be reset to a 0 state, causing a true signal at the P2 output. The true signal at the P2 output causes the logic P2.$\overline{CLK}$ to become true. The logic SO.P2.$\overline{CLK}$.IN is now true, causing the DATAI gate to gate the data in the I register onto data lines of the I/O bus 1210. Additionally, the logic and control circuits 1206 set the BDONE flip flop to a 1 state, causing a true signal on the BDONE control line of the I/O bus 1210, thereby signalling the MINI COMPUTER that a data word is available for reading. The true signal at the P2.$\overline{CLK}$ output causes the OR gate 1226 to reset the P1 and P2 flip flops to a 0 state, thereby terminating the operation of the DPM INTERFACE MODULE.

Consider now the way in which the information is written to the MEMORY MODULE by the MINI COMPUTER. In the manner discussed above, the MINI COMPUTER causes a control word to be stored in the STATUS register, an address word to be stored in the AI register, and a data word to be stored in the DATAO register. It should be noted that the control word now stored in the STATUS register causes the DMP flip flop to be in a 0 state, the PBM flip flop to be in a 0 state (selecting the MEMORY MODULE), and either or both of the $m_1$ or $m_2$ flip flops to be in a 1 state (selecting memory area 1, 2, or 3 in the MEMORY MODULE). As a result, the OR gate 1220 forms a true signal at the M output. The true signal at the M output causes the decoder DC3 to be enabled and it forms a true signal at one of the outputs M1*e*, M2*e*, or M3*e*, depending upon the states of flip flops $m_1$ and $m_2$ as depicted in Table 42.

After the MINI COMPUTER has stored a data word into the DATAO register, the P1 flip flop is set to a 1 state in the manner discussed above, causing a true signal at the P1 output. The logic P1.M.$\overline{\text{PBM}}$ is now true, causing the DS3 selection circuit to couple the DATAO register to the input of the DS4 selection circuit of the MEMORY MODULE. Additionally, the MINI COMPUTER applies a true signal on the IN/-OUT line on the I/O bus, causing a true signal at the OUT output. Thus, each of the signals P1, M. $\overline{\text{PBM}}$ and OUT are now true, causing the AND gate 1230 to form a true signal at the IWE output. The true signal at the IWE output is a write enable pulse for the MEMORY MODULE. The true signal at the IWE output causes the data word in the DATAO register to be written into the address and the memory area of the MEMORY MODULE specified by the AI register.

The P2 flip flop is subsequently set to a 1 state in the manner discussed above which again causes the AI register to be incremented, thus allowing the next memory location in the MEMORY MODULE to be selected for writing. In this manner, it is possible to write into consecutively addressed addresses in one of the memory areas of the MEMORY MODULE with one write to the AI register and a series of writes to the DATA register.

Consider now the way in which an input operation takes place from the MEMORY MODULE to the MINI COMPUTER. The sequence of operation is as depicted in FIG. 56. The STATUS register and AI register are loaded with a control word and an address word, respectively, as discussed above. One or both of the flip flops $m_1$ and $m_2$ is now true, causing a true signal at the M output of the OR gate 1220. Thus, the decoder DC3 and associated circuitry (FIG. 52) are also enabled to form a true signal at one of the outputs M1*e* (DS1 MEMORY MODULE), M2*e* (DS2 MEMORY MODULE), and M3*e* (DS3 MEMORY MODULE), selecting DS1, DS2 or DS3 for memory areas 1, 2 and 3 of the MEMORY MODULE. It should be noted that should a read be taking place from the P/B MEMORY, a true signal would be formed at PBM and a signal would be formed instead at one of the outputs M1*e* (DS2 P/B MEMORY) or M2*e* (DS1 P/B MEMORY).

Returning to the example, once enabled, the MEMORY MODULE reads out from the memory location specified by the address contained in the register AI. The logic P1.M.$\overline{\text{PBM}}$ is now true, causing the DS1 selection circuit to complete the information read out from the addressed location in the MEMORY MODULE to the input of the I register. The logic P1.$\overline{\text{CLK}}$ becomes true, causing the I register to store the word from the MEMORY MODULE.

The true signal at the P1 output causes the P2 flip flop to be set to a 1 state and the P1 flip flop to be reset to a 0 state at the following CLK pulse, causing a true signal at the P2 output. The logic P2.$\overline{\text{CLK}}$ again becomes true, causing true signals at output BDONE and causing the input operation to terminate.

The address selector is forming a true signal at the S0 output, causing the logic S0.P2.$\overline{\text{CLK}}$.IN to become true and causing the DATAI gate to gate the data stored in the I register onto the data lines of the I/O bus 1210. The true signal at the BDONE control line causes the data to be read by the MINI COMPUTER. Subsequently, the P2, BDONE, and P1 flip flops are reset as discussed above, causing the operation to terminate.

Again, consecutive memory locations may be read from the MEMORY MODULE, usng only one write into the AI register, simply by incrementing the address as discussed above.

Specific DPM functions such as the operation of the SEED MODULE, the CHANGE MODULE, the OUTPUT MODULE, the DECODE 1 MODULE, the PIPE MODULE, and the BRIGHTNESS MODULE are also initiated and controlled by the DPM INTERFACE MODULE. These operations are initiated by (1) writing the proper information into the MEMORY MODULE; (2) writing appropriate information into the registers of the IPRF; and (3) writing a control word into the STATUS register, thereby setting the proper combination of function flip flops *f*1, *f*2, and *f*3, and setting the DPM flip flop to a 1 state, enabling the decoder DC2 to form a true signal at one of the outputs SMGO, CMGO, D1GO, OMGO, PMGO, and BMGO, thereby calling the operation of the corresponding SEED, CHANGE, OUTPUT, PIPE and BRIGHTNESS MODULES. This then starts the proper function and operation in the DPM. The MINI COMPUTER monitors the operation waiting for a "finished" signal to be formed at one of the outputs SMEND, CMEND, D1MEND, OMEND, PIPEND, or BMEND by the SEED, CHANGE, DECODE 1, OUTPUT, PIPE and BRIGHTNESS MODULES, respectively.

With reference to the I/O control 1216, it will be seen that a true signal at any one of these outputs causes the I/O control 1215 to apply a true signal to the MINI COMPUTER via the I/O bus 1210 which in turn causes the MINI COMPUTER to interrupt its operation and subsequently read the appropriate results from the DPM. Reading of the results from the DPM involves reading the data from the registers SLINE, SLN, ONOC and OAR of the SEED MODULE or registers OAR and OLN from the OUTPUT MODULE as discussed above. Alternatively, or in addition, information may be read from the proper MEMORY MODULE area.

It should be emphasized that the DPM INTERFACE MODULE shown hereinabove is not the only way in which the interface module might be constructed, but is shown by way of example.

XVIII. MEMORY MODULE

Figure 57:
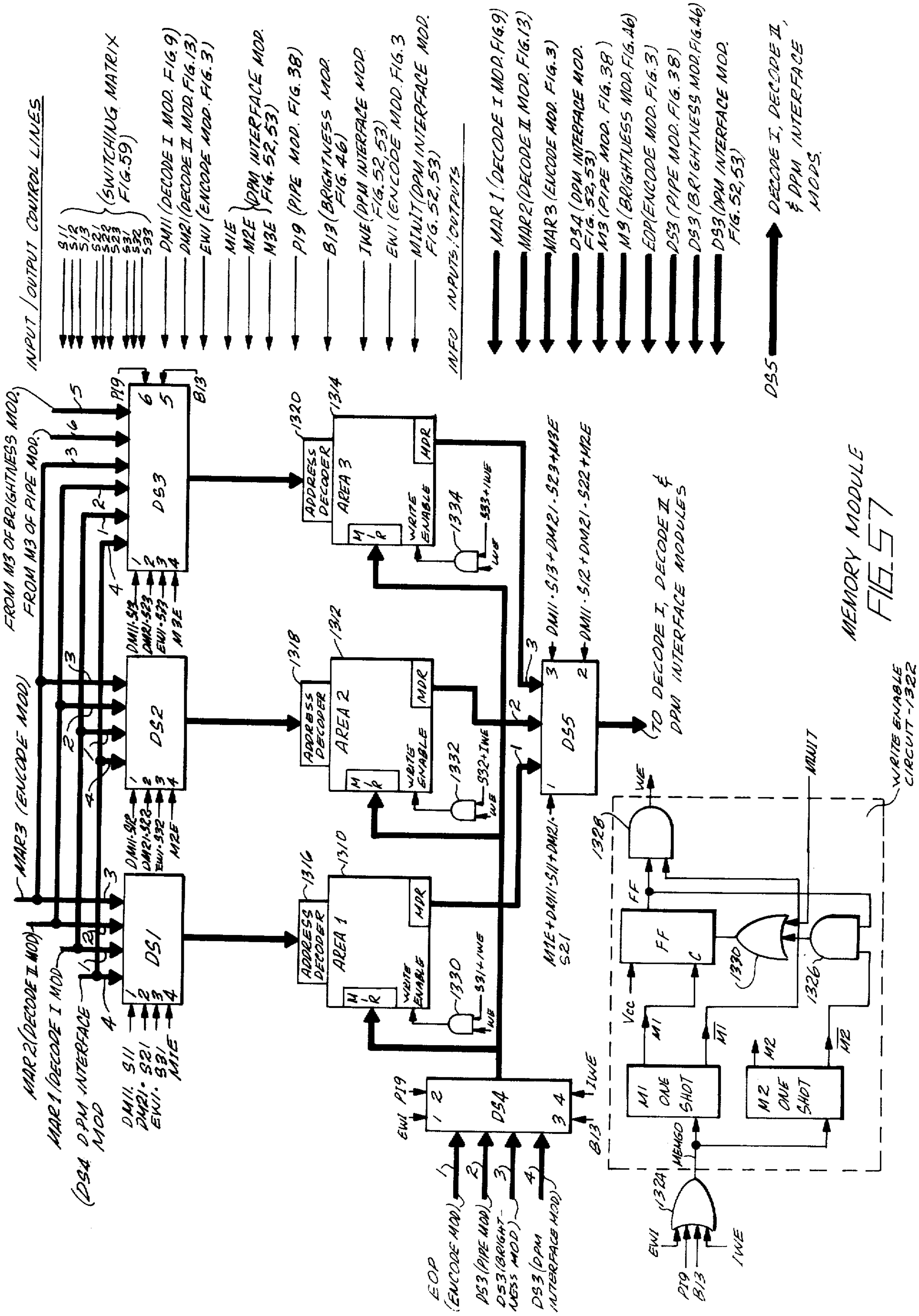
FIG. 57 is a schematic and block diagram of the MEMORY MODULE.
Figure 5B:
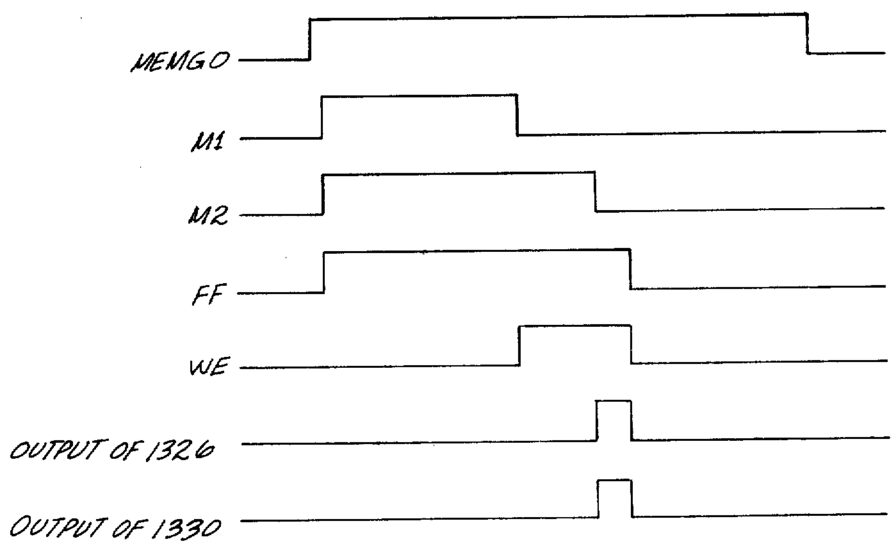

FIG. 57 is a schematic diagram of the MEMORY MODULE. On the right of FIG. 57 are shown the input/output control lines used for controlling the MEMORY MODULE and the information input/output lines. Heavy lines are used to designate multiple signal data lines.

The MEMORY MODULE includes three random access memories 1310, 1312 and 1314 forming MEMORY MODULE areas 1, 2 and 3, respectively. The MEMORY MODULE areas 1, 2 and 3 are TTL RAM type SN7489, disclosed at page 220 of the above TTL book. Each memory has 256 memory locations, each of which contains 8 binary coded bits. The aforementioned type of memory is only used herein by way of example and, within the scope of the present invention, may be of different sizes and types, depending upon the particular application. In most applications it may be desirable to replace the TTL RAM memories with one or more disc files to give greater storage capacity.

Associated with each of the memories 1310, 1312 and 1314 are address decoders 1316, 1318 and 1320, respectively. Each address decoder receives a composite binary coded signal and decodes it into signals suitable for addressing memories 1310, 1312 and 1314.

Also within each of the memories 1310, 1312 and 1314 is a memory information register (MIR). Each memory information register has its input connected to the output of a DS4 selection circuit from which it receives 8 binary bits of information for storage in one of the memory locations of the corresponding RAM memory. Each of the MIR registers forms a part of the RAM memory disclosed in the above TTL book. Also included in each of the memories 1310, 1312 and 1314 is an MDR which forms the information output for the corresponding RAM memory. 8 binary coded bits are applied as output at each of the MDR circuits when information is being read out of the corresponding memory.

Writing takes place in one of the memories 1310, 1312 and 1314 by applying an information word to the corresponding MIR and an address word to the corresponding address decoder. After the signals have stabilized at the foregoing inputs, a true write enable signal is applied at the WRITE ENABLE input to the memory, causing it to write the information word applied at the MIR input to the address specified by the address word applied to the address decoder. Reading takes place in a memory merely by applying the address of the desired location to the address decoder for the memory, thereby causing the word at the corresponding address to be read out and applied at the MDR output of the memory.

Selection circuits DS1 through DS5 are used for gating address and data into and out of the MEMORY MODULE. The selection circuits DS1 through DS5 are data selectors of the type disclosed above. Connected to each data selector are heavy lines to designate information lines and thin lines to designate control signal lines. Each heavy (information) line is numbered and has a correspondingly numbered thin (control) line. A true signal at the control input line causes signals applied at the corresponding information lines to be coupled through to the output of the data selector. Thus, for example, selection circuit DS1 couples information input 1 to its output responsive to a true control signal at the control input 1 shown on the left side.

A WRITE ENABLE circuit 1322 generates write enable signals at its WE output. The WRITE ENABLE circuit 1322 has a control input line MEMGO connected to an OR gating circuit 1324 and another input connected to the MINIT output of the MINI COMPUTER. One-shot multi-vibrators M1 and M2 have outputs using the same symbols as the corresponding multi-vibrator. The primed output receives a true signal when the one-shot multi-vibrator is in a 0 state and the unprimed output receives a true signal when the multi-vibrator is in a 1 state. The one-shot multi-vibrators are normally in a 0 state and when a true signal is applied on the line MEMGO, the multi-vibrators are triggered to a 1 state where the true signal is removed at the primed output and a true signal is applied at the unprimed output. To be explained in more detail, the one-shot multi-vibrators automatically reset to a 0 state a prefixed time interval after being triggered to a 1 state. The delay time for the one-shot multi-vibrator M2 is longer than that of the M1 for the reasons explained hereinafter. Also included in the WRITE ENABLE circuit 1322 is a flip flop FF. The flip flop FF is of type SN7474 disclosed in the above TTL book. The flip flop FF has 1 and 0 states with outputs FF and FF' (the latter not shown) which receive true signals when the flip flop is in 1 and 0 states, respectively. The flip flop FF has two inputs for controlling the setting and resetting thereof, and a clock input. The clock input is shown on the lower left hand side of flip flop FF. The upper left hand input of the flip flop FF is connected to a source of voltage (Vcc), not shown, which always applies a true signal at the corresponding input at all times. The upper left hand input of the flip flop FF causes the flip flop to be set to a 1 state when a clock signal is applied at the lower left hand side input of the flip flop. The input shown along the bottom side of flip flop FF resets the flip flop FF to a 0 state without clock.

Also included in the WRITE ENABLE circuit 1322 are AND gates 1326 and 1328 and an OR gate 1330. AND gates 1330, 1332 and 1334 apply the control signals to the WRITE ENABLE input on the memories 1310, 1312 and 1314, respectively.

The modules which communicate with the MEMORY MODULE of FIG. 57 and whether information is read out from the MEMORY MODULE and/or written into the MEMORY MODULE, are summarized as follows:

DECODE I MODULE— read
DECODE II MODULE— read
ENCODE MODULE— write (EWI)
PIPE MODULE— write (P19)
BRIGHTNESS MODULE— write (B13)
DPM INTERFACE MODULE— read and write (IWE)

Gating circuits are depicted by logical equations using the outputs of other modules, flip flops, etc., as to designate terms in the equations.

The sequence of operation of the MEMORY MODULE during a write operation in one of the memories 1310, 1312 and 1314 will now be described with reference to the timing diagram of FIG. 58. A write operation is initiated or called by the DPM INTERFACE MODULE or the PIPE MODULE or the BRIGHTNESS MODULE or the ENCODE MODULE. The calling signal is applied on the output control line shown in parentheses after the name of each module above and being shown as input to the OR gate 1324. The calling module applies a calling signal to the OR gate 1324. It in turn applies a true signal at the MEMGO output which triggers the one-shot multi-vibrators M1 and M2 to a 1 state. In addition, the true signal at the M1 output of the M1 multi-vibrator causes a true signal to be applied at the clock input of the FF flip flop, acting as a clock, causing the FF flip flop to be set to a 1 state. The time delay built into the M1 multi-vibrator is sufficient to allow the signals on the address lines to the DS1–DS3 selection circuits and on the information lines to the DS4 selection circuit to settle out. After the one-shot multi-vibrator M1 resets to a 0 state, a true signal is formed at the $\overline{M1}$ output thereof. Additionally, the FF flip flop is still in a 1 state, and therefore both inputs to the AND gate 1328 receive a true signal and form a true signal at the WE output. The true signal at the WE output is applied to the inputs of AND gates 1330–1334. Each of the AND gates 1330–1334 has a second input which controls the particular one of the memory areas 1, 2 and 3 into which information is to be written from the selection circuit DS4. To be explained in more detail, the signals from the SWITCH MATRIX of FIG. 59 or from the DPM INTERFACE MODULE determine which of the RAM areas into which information is to be written.

Thus, a true signal at the IWE output of the DPM INTERFACE MODULE causes the second input of each of the AND gates 1330–1334 to be true, thereby causing each of the AND gates to apply a WRITE ENABLE signal to the corresponding RAM memory. Thus, the word of information applied at the output of the DS4 selection circuit is written into each of the memory areas 1, 2 and 3.

Normally, writing into the memory areas 1, 2 and 3 is controlled by the SWITCH MATRIX. To be explained in more detail, the area into which writing is to take place from the ENCODE MODULE is determined by true signals at the S31, S32 and S33 outputs of the correspondingly labeled flip flops of the SWITCH MATRIX. Thus, a true signal at the S31 output causes AND gate 1330 to receive true signals at both inputs and thereby apply a WRITE ENABLE circuit to the memory area 1, causing a write operation only in that memory area. Similarly, true signals at the S32 and S33 outputs of the SWITCH MATRIX cause writing to take place in the memory areas 2 and 3, respectively. However, it should be noted that a write operation from the interface module does not use the SWITCH MATRIX. This is shown by the addition of IWE to the WRITE ENABLE gates 1330, 1332 and 1334.

In summary then it should now be understood that the outputs of EOP from the ENCODE MODULE of DS3 from the PIPE MODULE, of DS3 from the BRIGHTNESS MODULE, and of DS3 from the DPM INTERFACE MODULE, are coupled to the inputs of the DS4 selection circuit. A true signal at the EW1, P19, B13, or IWE outputs from the ENCODE, PIPE, BRIGHTNESS, and DPM INTERFACE MODULES, respectively, causes the DS4 selection circuit to couple outputs from the corresponding modules through to the MIR input of the memory areas 1, 2 and 3, respectively. The DS1, 2 and 3 selection circuits couple the addresses to the inputs of the corresponding address decoders 1316, 1318 and 1320. By way of example, a true signal at the DM11 output of the DECODE I MODULE, and a true signal at the S11 output of the SWITCH MATRIX cause the DS1 selection circuit to couple the output of register MAR1 of DECODE I MODULE to the input of address decoder 1316.

The DS5 selection circuit couples the information being read out of the memory areas 1, 2 and 3 to the inputs of the DECODE I, II and DPM INTERFACE MODULES. By way of example, a true signal from the M1E output of the DPM INTERFACE MODULE or from the output DM11 from the DECODE I MODULE, in combination with a true signal at the S11 output of the SWITCH MATRIX, or a true signal at the DS21 output of the DECODE II MODULE, in combination with a true signal at the S21 output of the SWITCH MATRIX, will cause the information from MDR of memory area 1 to be coupled through the output of the DS5 selection circuit.

After sufficient time for the signals to be applied at the output of the DS5 selection circuit are stabilized to the input of the modules receiving the signals, the M2 multi-vibrator automatically resets to a 0 state, causing a true signal at the $\overline{M2}$ output, which in turn causes both inputs of the AND gate 1326 to be true and thereby apply a true signal to one input of the OR gate 1330. The OR gate 1330 in turn applies a true signal to the reset input of the flip flop FF causing it to be reset to a 0 state, thereby removing the true signal at the FF output. This, in turn, causes the AND gate 1328 to terminate its true signal at the WE output, terminating the WRITE ENABLE signal to the memory areas 1, 2 and 3.

XIX. SWITCH MATRIX

Figure 59:
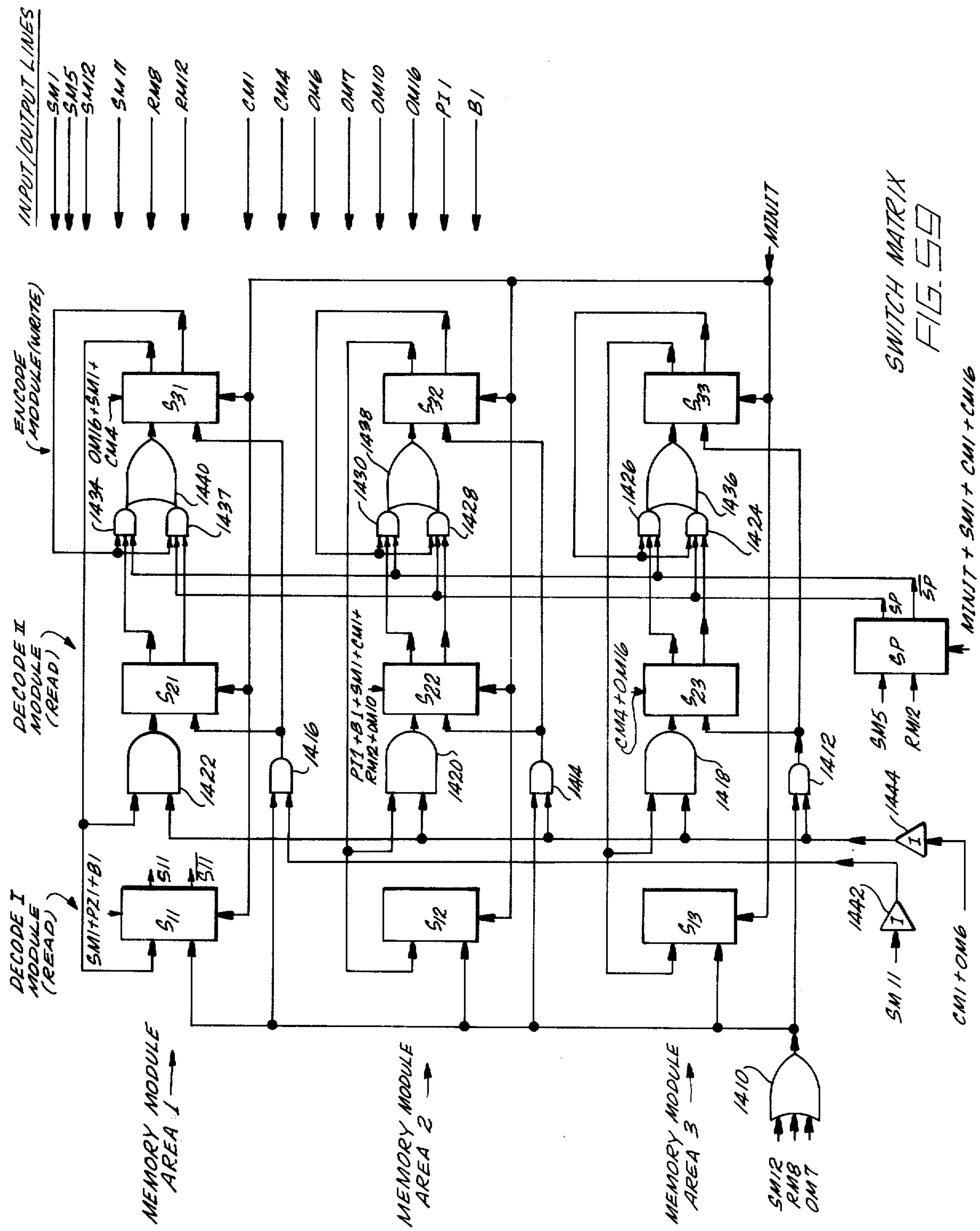
FIG. 59 is a schematic and block diagram of the SWITCH MATRIX.

The SWITCH MATRIX of FIG. 59 has nine flip flops designated S11–S13, S21–S23, and S31–S33. The flip flops are set to allow the DECODE I, DECODE II and ENCODE MODULES to read and write in the proper MEMORY MODULE areas (FIG. 57). The flip flops are labeled as follows: Sij where $i = 1$ designates DECODE I; $i = 2$ designates DECODE II; $i = 3$ designates ENCODE, and where $j = 1$ identifies MEMORY MODULE area 1; $j = 2$ designates MEMORY MODULE area 2, and $j = 3$ designates MEMORY MODULE area 3. With reference to the SWITCH MATRIX of FIG. 59, and the description of the DECODE I, DECODE II and ENCODE MODULES, it will be recalled that the DECODE I and II MODULES always read from memory, whereas the ENCODE MODULE always writes in memory. Thus, when flip flop S11 is in a 1 state, it designates that DECODE I MODULE is to read from MEMORY MODULE area 1. If flip flop S21 is in a 1 state, it designates that the DECODE II MODULE is to read from MEMORY MODULE area 1, and if the S31 flip flop is in a 1 state, it designates that the ENCODE MODULE is to write in MEMORY MODULE area 1. In addition to the flip flops, the SWITCH MATRIX has gates 1410 through 1440, signal inverters 1442 and 1444, and an SP flip flop which controls the setting and resetting of the above-mentioned flip flops responsive to control signals from the rest of the system. The input/output control signals for controlling the operation of the SWITCH MATRIX are shown along the right hand side of FIG. 59, along with the modules from which the signals originate.

The flip flops are all of type SN7474 having the characteristics disclosed above. Consider now generally the operation of the SWITCH MATRIX. As mentioned above, the SWITCH MATRIX is used for controlling the operation of the MEMORY MODULE. Normally the MEMORY MODULE will be used in manipulation of seeds. A seed must be read, acted upon, and written out since there is no guarantee that the output length of a new seed will be less than the input length of the current seed. There must be at least two memory areas for reading and writing the seeds. Additionally, in accordance with preferred embodiment of the present invention, the "best seed" (i.e., the one with the shortest physical length) is always retained during the course of locating the seed. This is advantageous since it saves regneration time upon completion of the seed finding process. By virtue of the last mentioned feature, a third memory area was added to the MEMORY MODULE system. During the operation of the DPM SYSTEM, the normal method of reading and writing in the memory area is through the DECODE I and DECODE II MODULES and the ENCODE MODULE. The routing of these modules to the proper memory areas is accomplished under control of the SWITCH MATRIX.

Turning now more specifically to the SWITCH MATRIX but still speaking generally of its operation, initially the proper flip flops S11–S13, S21–S23, and S31–S33 are set by the calling modules (SEED, CHANGE, OUTPUT, PIPE, REVOLVE, and BRIGHTNESS MODULES). The SWITCH MATRIX is set up so that when it is locked (by a signal through gates 1410 and 1412–1416), the MEMORY MODULE are a last written into from the ENCODE MODULE will be enabled for reading out information to the DECODE I and DECODE II MODULES. This is done by setting the proper one of the flip flops S11–S13, S21–S23, and S31–S33. The flip flops S31, S32 and S33 which control writing from the ENCODE MODULE, have control circuitry for appropriately setting these flip flops so that if the current write area contains the best seed, it is not overwritten at a later time.

The SP flip flop indicates whether the area just read contains the seed. If in a 0 state it indicates that the area just read does not contain the seed and can be overwritten. If the SP flip flop is in a 1 state, it indicates that the area just read contains the seed and can not be overwritten. For example, assume flip flop SP is in a 0 state and reading is taking place in area 2 and writing in area 1 of the MEMORY MODULE. Flip flops S31, S12 and S22 are in a 1 state. The following clock from gate 1410 causes flip flops S32, S11 and S21 to be set to 1 and flip flops S31, S12 and S22 to be reset to 0), causing a read from area 1 and a write in area 2 of the MEMORY MODULE. Assume now for example that the SP flip flop is in a 1 state and reading is taking place in area 2 and writing in area 1 of the MEMORY MODULE. Flip flops S31, S12 and S22 are again still in a 1 state. The following pulse from gate 1410 now does not reach flip flop S32, it being blocked by gates 1430 and 1438 due to the false signal at $\overline{SP}$. Instead, the pulse from gate 1410 in combination with true signals at outputs SP, $\overline{S33}$ and $\overline{S23}$ causes the gates 1426 and 1436 to set flip flop S33 to a 1 state, causing writing, not in area 2, but area 3 of the MEMORY MODULE. Additionally, flip flops S11 and S21 are set to 1 states, again causing reading in area 1. As a result, writing takes place in area 3 and the seed in MEMORY MODULE area 2 is not overwritten but is saved.

In summary then, the DECODE I and II MODULES read from MEMORY MODULE area (e.g., area 2); the ENCODE MODULE writes to some other MEMORY MODULE area (e.g., area 1) and the area in which reading and writing takes place is determined by the states of the flip fops S11–S31, S12–S32, S13–S33.

Gating circuits are depicted by logical equations using the outputs of other modules, flip flops, etc., as to designate terms in the equations.

Consider now an actual example of the operation of the SWITCH MATRIX of FIG. 59 and the MEMORY MODULE of FIG. 57. Table 44 shows an example of an iso-entropicgram and will be used in illustrate the operation of the system. Table 45 indicates the sequence of operation while performing the revolve operation indicated along the right hand side of Table 44.

Initially, the MINI COMPUTER and DPM INTERFACE MODULE store line 0 of the iso-entropicgram in MEMORY MODULE area 1 as described above. Line 0 is depicted at the beginning of Table 44. The SEED MODULE is then called by the MINI COMPUTER. A true signal is formed at the SM1 output of the SEED MODULE, causing the flip flops S11, S31 and S22 of the SWITCH MATRIX to be set to a 1 state. The SEED MODULE then calls the operation of the DECODE I MODULE. The DECODE I MODULE forms a true signal at the DM11 output, causing the logic DM11.S11 to become true, thereby causing the DS1 selection circuit to couple the output of the DS4 selection circuit to the input of the address decoder 1316 and causing the DS5 selection circuit to couple the output MDR in MEMORY MODULE area 1 to its output. Thus, the DS1 selection circuit gates the address in the MAR1 register of the DECODE I MODULE to the address decoder of MEMORY MODULE area 1 and the DS5 selection circuit gates out from MEMORY MODULE area 1 back to the calling module (the DECODE I MODULE). Since a one line revolve operation takes place, the SEED MODULE forms a true signal at the SM5 output (asserts SM5), thereby indicating that MEMORY MODULE area 1 contains the best seed so far and then calls the operation of the REVOLVE MODULE.

The REVOLVE MODULE then forms a true signal at the RM8 output thereof, causing gates 1410 and 1412–1416 in the SWITCH MATRIX to form a clock pulse which sets flip flops S11, S21 and S32 to a true state and resets flip flops S22 and S31 to a 0 state. The REVOLVE MODULE then forms a true signal at the RM12 output while the true signal is still formed at the SM5 output. This causes the SP flip flop to be set to a 1 state. The REVOLVE MODULE then forms line 1 of the iso-entropicgram as depicted in Table 44 during which the DECODE I MODULE and the DECODE II MODULE both read from MEMORY MODULE area 1, under control of SWITCH MATRIX flip flops S11 and S21 and the ENCODE MODULE writes into MEMORY MODULE area 2, under control of the S32 flip flop. Upon completion of this operation, control returns to the SEED MODULE.

The SEED MODULE then forms a true signal at the SM11 output, which causes the signal inverter 1442 in the SWITCH MATRIX to apply a false or inhibit signal to the clock gates 1412–1416. The SEED MODULE also forms a true signal at the SM12 output, causing the OR gate 1410 to apply its clock signal to the gates 1412–1416 but it is ineffective because of the inhibit signal from inverter 1442. Since line 1 of the iso-entropicgram (Table 44) is shorter than line 0, the SEED MODULE again forms a true signal at the SM5 ooutput, indicating that line 1 in MEMORY MODULE area 2 is to be saved.

The SEED MODULE now forms a true signal at the SM12 output but since the gates 1412–1416 are inhibited, only the flip flops S11, S12 and S13 receive a clock signal. Also, since the flip flop S32 is in a 1 state, the clock signal causes the flip flop S12 to be set to a 1 state and the flip flop S11 is reset to a 0 state. Thus, at this juncture the flip flops S12, S21 and S32, as well as the flip flop SP, are in a 1 state as indicated in Table 45.

The SEED MODULE now reads, using the DECODE I MODULE from MEMORY MODULE area 2 and determines that the system is to revolve down two lines in the iso-entropicgram and therefore calls the REVOLVE MODULE. The REVOLVE MODULE now forms a true signal at the RM8 output, causing the gate 1410 to apply a clock signal to the flip flops S11, S12 and S13 and to the gates 1412–1416. At this point the SP flip flop is still in a 1 state because in this last cycle it was established that area 1 was not to be overwritten. A true signal is now formed at SM5 because line 1 in area 2 is the shortest and now the possible seed and is not to be overwritten. Therefore the clock signal causes the flip flops S12, S22 and S33 to be set to a 1 state.

The REVOLVE MODULE now forms another signal at the RM12 output and since a true signal is still formed at the SM5 output, flip flop SP still remains in a 1 state. This time the 1 state of the SP flip flop indicates that MEMORY MODULE area 2 containing line 1 is to be saved as the best seed line to this point. The REVOLVE MOUDLE then proceeds to revolve down two lines in the iso-entropicgram. After the revolve is complete, MEMORY MODULE area 3 contains line 3 of the iso-entropicgram. Control now returns to the SEED MODULE. The SEED MODULE now forms true signals at the SM11 and SM12 output, causing the gates 1412–1416 to be inhibited and therefore only flip flops S11, S12 and S13 receive clock signals. This causes flip flop S13 to be set to a 1 state. The SEED MODULE then determines that a revolve of two lines is to take place. It also determines that line 3 of the iso-entropicgram now contained in MEMORY MODULE area 3 is not shorter than line 1 and therefore the true signal at the SM5 output is removed by the SEED MODULE. The REVOLVE MODULE is then called, causing the revolve operation to take place.

The REVOLVE MODULE forms a true signal at the RM8 output, causing OR gate 1410 to provide clock signals to all of the flip flops in the SWITCH MATRIX. As a result, the flip flops S13, S23 and S31 are set to a 1 state and flip flops S22 and S33 are reset to a 0 state. Thus, MEMORY MODULE area 2 containing line 1 of the iso-entropicgram is saved. The REVOLVE MODULE also forms a true signal at the RM12 output and since a true signal is not being formed at the SM5 output, the flip flop SP is reset to a 0 state. The REVOLVE MODULE now revolves line 3 down to line 5 of the iso-entropicgram and line 5 is stored into MEMORY MODULE area 1. During this revolve process, the REVOLVE MODULE calls the DECODE I MODULE, which in turn calls the MEMORY MODULE, and forms a true signal at the DM11 output. Since the flip flop S13 is in a 1 state, the logic S13.DM11 is true, thereby causing the DS3 and DS5 selection circuits to couple the address to the MEMORY MODULE area 3 and couple the information read out of MEMORY MODULE area 3 via the DS5 selection circuit back to the calling module. Additionally, the REVOLVE MODULE calls the DECODE II MODULE which in turn forms a true signal at the DM21 output. Since the flip flop S23 is in a 1 state, the logic S23.DM21 is true, causing the gate DS3 to couple the address from the MAR2 register of the DECODE II MODULE to the MEMORY MODULE area 3 and causing the information read out of the address location to be coupled through the DS5 selection circuit back to the DECODE II MODULE.

Finally in its output operation, the REVOLVE MODULE calls the ENCODE MODULE which writes into MEMORY MODULE area 1. To this end, the ENCODE MODULE forms a true signal at the EWI output, and since the flip flop S31 of the SWITCH MATRIX is in a 1 state, the logic S31.EWI is now true, causing the DS1 selection circuit to couple the address in register MAR3 of the ENCODE MODULE through to the MEMORY MODULE area 1. Additionally, the true signal at EWI causes the DS4 selection circuit to couple the output from the ENCODE MODULE through the DS4 selection circuit to the MIR input to the MEMORY MODULE area 2. The write enable circuit 1322 forms a true signal at the WE output as described above, and true signals at WE and IWE cause the AND gate 1330 to apply a write enable signal to MEMORY MODULE area 1, causing it to write the output from the ENCODE MODULE. Control then returns to the SEED MODULE.

The rest of the operation, while revolving through the iso-entropicgram of Table 44, may be followed with reference to Table 45.

XX. P/B MEMORY

Figure 60:
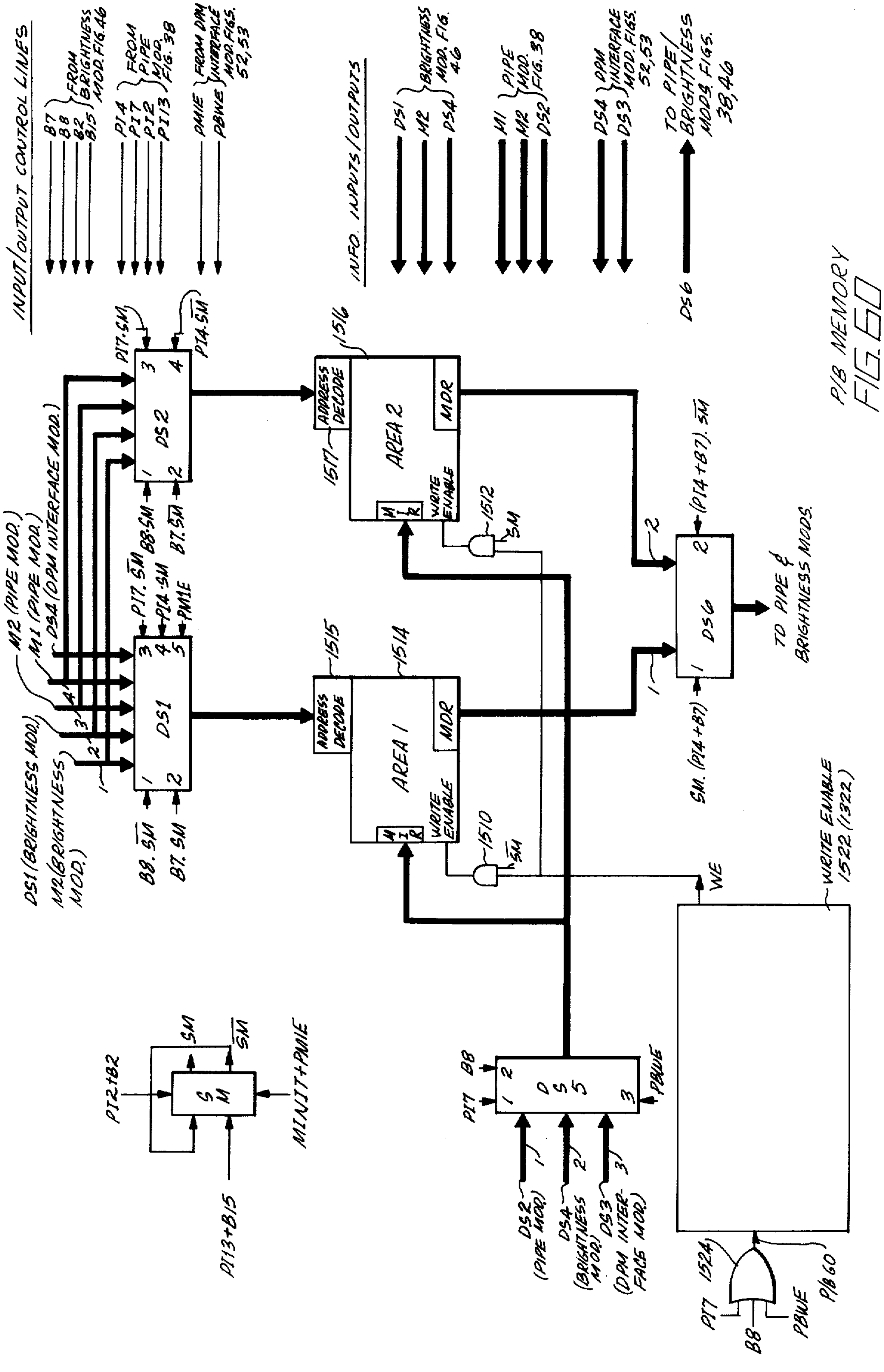
FIG. 60 is a schematic and block diagram of the P/B MEMORY.

The P/B MEMORY depicted in FIG. 60 has two memory areas 1 and 2 identified at 1541 and 1516, respectively. These memory areas are RAM type memories of the same type as that disclosed hereinabove with respect to the MEMORY MODULE. The memory areas are used as a read/write scratch pad while executing the PIPE and BRIGHTNESS MODULE functions. The only modules in the system with which the P/B MEMORY must interface are the PIPE, BRIGHTNESS, and DPM INTERFACE MODULES.

The P/B MEMORY has a switching flip flop SM which designates the proper read/write areas between area 1 and area 2. Thus when flip flop SM is in a 1 state, a read takes place from area 1 and a write takes place in area 2.

Gating circuits are depicted by logical equations using the outputs of other modules, flip flops, etc., as to designate terms in the equations.

DS1 and DS2 selection circuits are data selectors of the same type as that described above with respect to the MEMORY MODULE which route the signals from the PIPE and BRIGHTNESS MODULES to the proper memory address decoders 1515 and 1517. Referring to the DS1 and DS2 selection circuits, it will be noted that each of the logic indicated contains a term from either the PIPE MODULE or BRIGHTNESS MODULE and each of the control inputs, except for control input 5 of the DS1 selection circuit, has a second term from one of the outputs from the SM flip flop. In this manner, the SM flip flop is able to switch the areas being used between area 1 and area 2, depending on its state. If flop flop SM is in a 1 state, OR gates 1510 and 1512 cause the PIPE and BRIGHTNESS MODULES to read from P/B MEMORY area 1 and write to P/B MEMORY area 2. If flip flop SM is in a 0 state, OR gates 1510 and 1512 cause the PIPE and BRIGHTNESS MODULES to write in P/B MEMORY area 1 and read from P/B MEMORY area 2. In this connection, the addresses for reading are coupled by DS1 and DS2 from the DS1 selection circuit in the BRIGHTNESS memory and from the M1 register in the PIPE MODULE, whereas, the addresses for writing are received from the M2 register in the BRIGHTNESS MODULE and register M2 in the PIPE MODULE and the DS4 selection circuit in the DPM INTERFACE MODULE.

The data selector DS5 gates the data to be written into the MIR of the P/B MEMORY areas 1 and 2.

The data selector DS6 in the P/B MEMORY gates the information read out of memory areas 1 and 2 to the PIPE and BRIGHTNESS MODULES.

The write enable circuit 1522 is identical to the write enable circuit 1322 described hereinabove for the MEMORY MODULE FIG. 58. Similar to the MEMORy MODULE, the write enable circuit 1522 has an OR gate 1524 (corresponding to gate 1324) which forms a true signal at the P/B GO input to the write enable circuit 1522. The P/B GO input corresponds to input labeled MEMGO in the MEMORY MODULE. The OR gate 1524 has the designated inputs from the PIPE, BRIGHTNESS and DPM INTERFACE MODULES, which call the operation of the P/B MEMORY, similar to that described hereinabove with respect to gate 1324 of the MEMORY MODULE.

The operation of the P/B MEMORY is similar to that described hereinabove for the MEMORY MODULE and need not be set out in detail for a complete understanding of the invention.

The input and output control signals used to control the operation of the P/B MEMORY, as well as the information inputs/outputs (designated by heavy lines) are shown along the right hand side of FIG. 60. Arrows to the left indicate incoming signals and arrows to the right indicate outgoing signals with respect to the P/B MEMORY.

XXI. GENERAL ORGANIZATION OF ALTERNATE DPM SYSTEM 2

A. General Discussion

The general organization of the alternate DPM SYSTEM of FIG. 61 involves the fast seed finding method described hereinabove. The alternate DPM SYSTEM of FIG. 61 includes the MINI COMPUTER, the DPM INTERFACE MODULE, the DECODER I and II MODULES, and the ENCODE MODULE, all of which have been disclosed and described hereinabove.

Especially provided for this preferred embodiment of the invention are the following new modules: DELTA 2 MODULE, REVOLVE 2 MODULE, REVOLVE 3 MODULE, SEED 2 MODULE, OUTPUT 2 MODULE, MEMORY 2 MODULE, AUXILIARY MEMORY II MODULE, and SWITCH MATRIX 2 MODULE. The REVOLVE 2 MODULE in conjunction with the other portions of the system depicted in FIG. 61 forms a revolver for generating various lines of an iso-entropicgram, given an input line, without generating the intermediate lines of the iso-entropicgram. The REVOLVE 3 MODULE is a modified version of the REVOLVE 2 MODULE which only generates the largest two or last two actual occurrence values for a line of the iso-entropicgram. It will be recalled that the largest two occurrence values are the ones needed to determine the next line in the iso-entropicgram which is to be generated in the process of locating the seed. To be explained in more detail, the DELTA 2 MODULE differs from the DELTA MODULE in that the DELTA 2 MODULE generates any line of the Delta depicted, by way of example, in Table 6. The DELTA MODULE also right-shifts lines of the Delta causing shifted Delta values to be formed. These shifted Delta values are provided as inputs to the REVOLVE 2 MODULE and the REVOLVE 3 MODULE and are used by these modules in their process of generating subsequent lines of the iso-entropicgram. The specific implementation of these modules will be described in more detail in connection with each module.

However, the method of operation of the fast seed finding implementation can be briefly summarized as follows:

1. Read the largest two actual occurrence valus (N1, N2).
2. Compute $T = MAX\,(HW - N_1, N1 - N_2)$ where $HW =$ the iso-entropicgram width.
3. If the system has completely revolved through the iso-entropicgram then go to Step 6 below; otherwise go to Step 4 below.
4. Call REVOLVE 3 MODULE causing it to return $N_1$, $N_2$ of the next line in the iso-entropicgram. The REVOLVE 3 MODULE revolves a line of an iso-entropicgram by the number of lines specified by the value T but only returns N1 and N2 of that line, not the entire line.
5. If N1 is less than the largest occurrence value of the current seed line, store an identification of the current seed line and return to Step 2.
6. Call REVOLVE 2 MODULE causing a revolve by the number of lines specified by T and generate the entire resultant seed line.
7. Halt.

A more complete understanding of the present invention will be had with reference to the following discussion.

The DECODE I and II MODULES and the ENCODE MODULE used for this alternate implementation are essentially identical in design to the DECODE and ENCODE MODULES of the first disclosure. However, due to the nature of the second design, the calling sequences to these modules differ. Hence the altered version of these modules appear in FIGS. 61A–61H.

As mentioned above this alternate implementation forces a different calling sequence on the DECODE and ENCODE MODULES. It can be stated that this alternate implementation generates lines of the iso-entropicgram directly as the expense of using auxiliary storage while the first implementation generated a new line by revolving down by component powers of 2 while not using any auxiliary storage. Because the new lines are generated directly, there is no switching back and forth of control to the DECODE I and II MODULES. Hence the loading or initializing circuits of these modules are somewhat shortened. Also the CHANGE 2 MODULE must perform the merging of the revolved change line with the seed line. This necessitates its calling on all three modules. Additionally, the OUTPUT 2 MODULE writes its output directly to the MEMORY MODULE area 3. It, therefore, does not call ENCODE. Finally, it should be noted that in this implementation the situation does not exit in which both DECODE I and DECODE II read from the same DPM MEMORY MODULE area. What follows is a brief description of these three modules and the circuit changes that are necessitated.

B. Revised ENCODE MODULE

In the previous system the ENCODE MODULE was called by the SEED, REVOLVE, and OUTPUT MODULES. In the revised ENCODE MODULE for the alternate implementation only the REVOLVE 2 and CHANGE 2 MODULES call the ENCODE MODULE. REVOLVE 2 must call the ENCODE MODULE when it is generating a line of the isoentropicgram; CHANGE 2 calls ENCODE during the process which merges the revolved change line and the seed line.

Figure 61A:
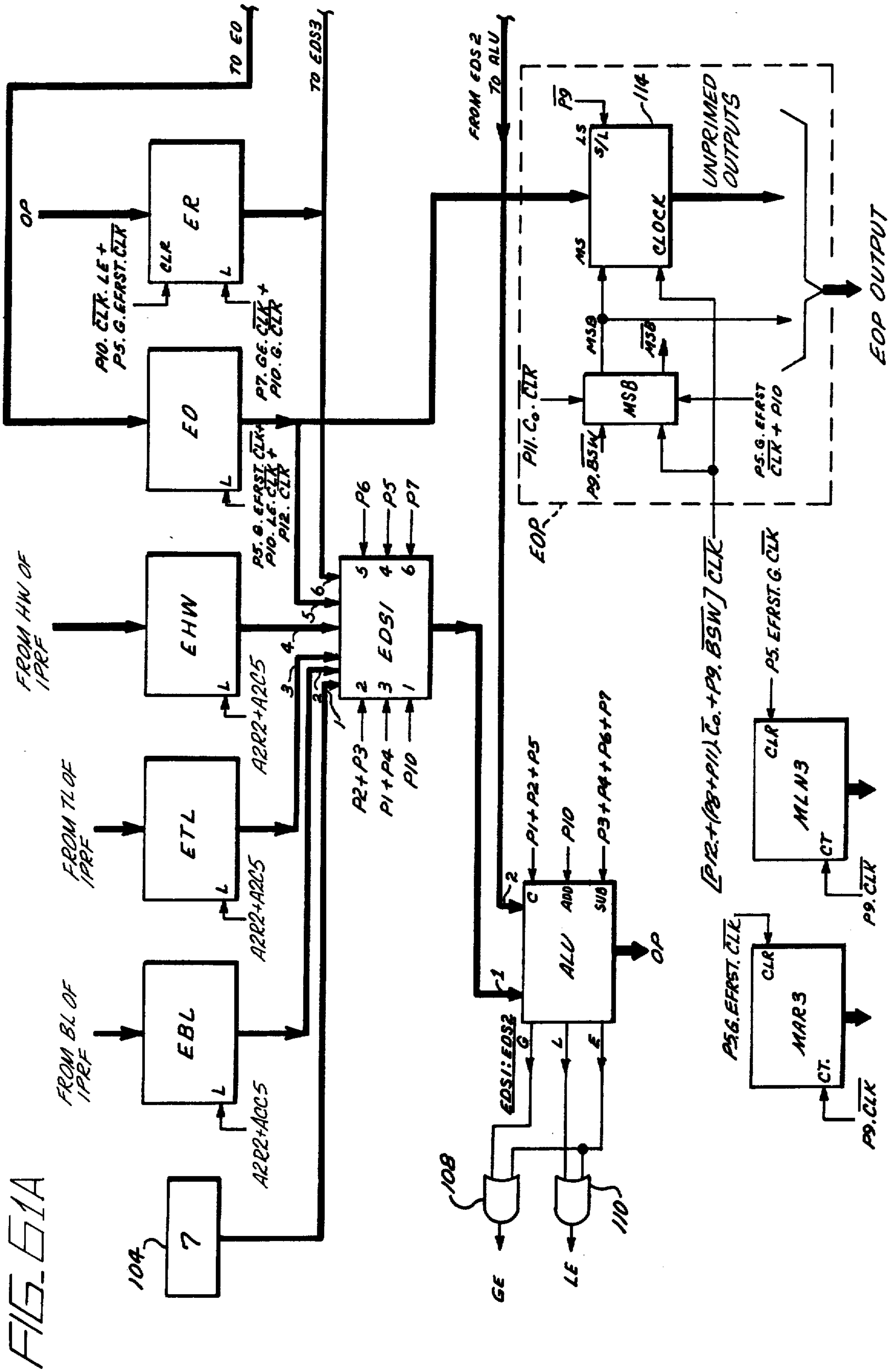
FIGS. 61A, 61B and 61C form a schematic and block diagram of the ENCODE MODULE for the DPM 2 system.

Since the OUTPUT 2 MODULE does not call the ENCODE MODULE, the clipping function is not performed. Hence, there is no need for data selectors EDS4 and EDS5. As can be seen in FIG. 61A they have been omitted. Now the appropriate IPRF registers are fed directly to EBL and ETL. Note that the initial loading circuits of the registers EBL, ETL, and EHW have been changed to A2R2 + A2C5. These pulses originate in the REVOLVE 2 and CHANGE 2 MODULES respectively.

Figure 61B:
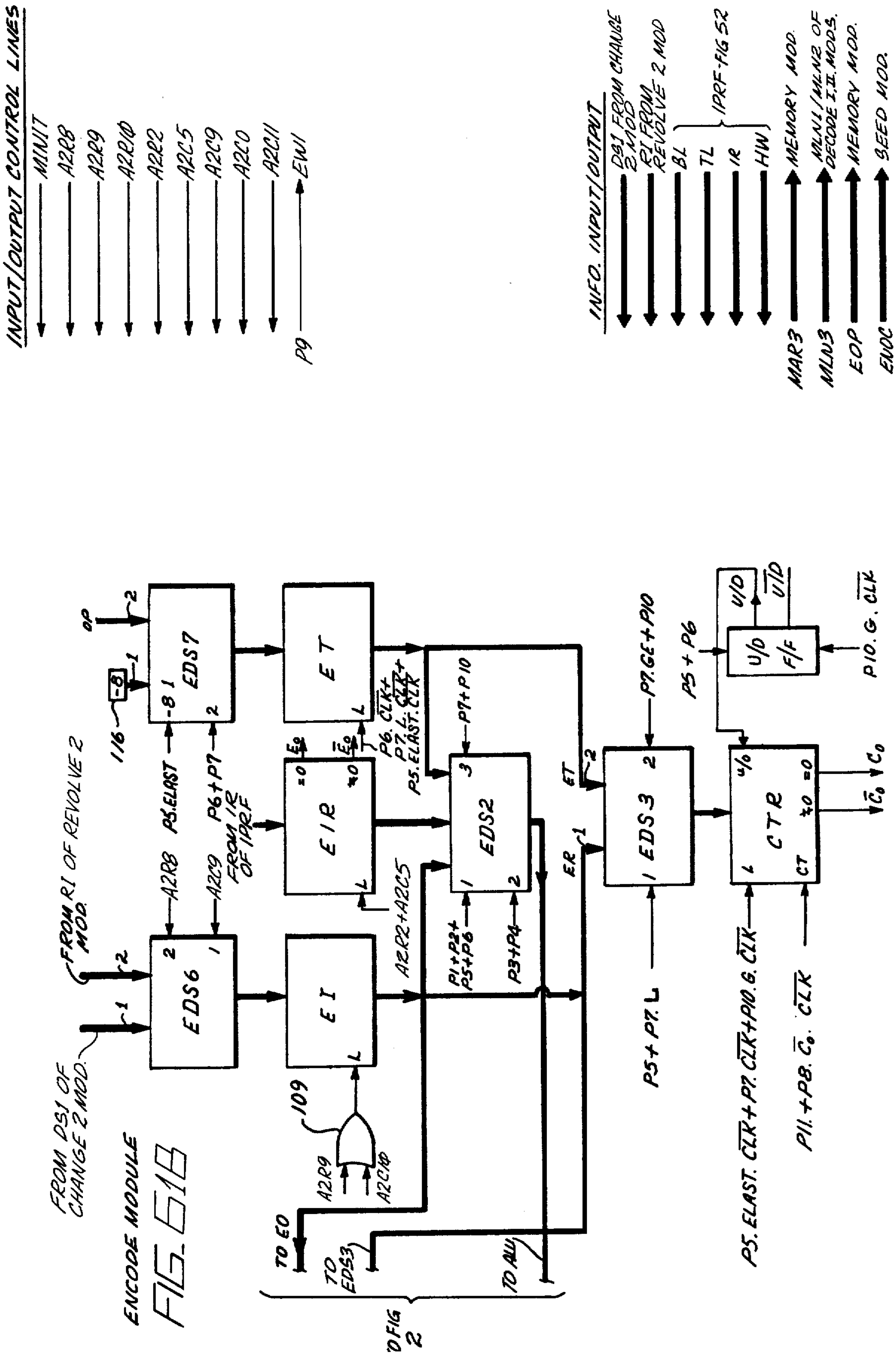

In FIG. 61B it can be seen that the first input to data selector EDS6 has been changed from the OUTPUT MODULE to the DS1 output of the CHANGE 2 MODULE. The second input now comes from RI of the REVOLVE 2 MODULE. The enabling lins of EDS6 have been changed to A2R8 and A2C9. Likewise the inputs to OR gate 109 has been changed to reflect clocking pulses from the REVOLVE 2 and CHANGE 2 MODULES. The load (L) input of the EIR register has been changed to A2R2 + A2C5. Additionally on FIG. 61B the input/output signals have been changed to reflect only those control and data signals that are needed. Note that these signals come only from the REVOLVE 2 and CHANGE 2 MODULES.

Figure 61C:
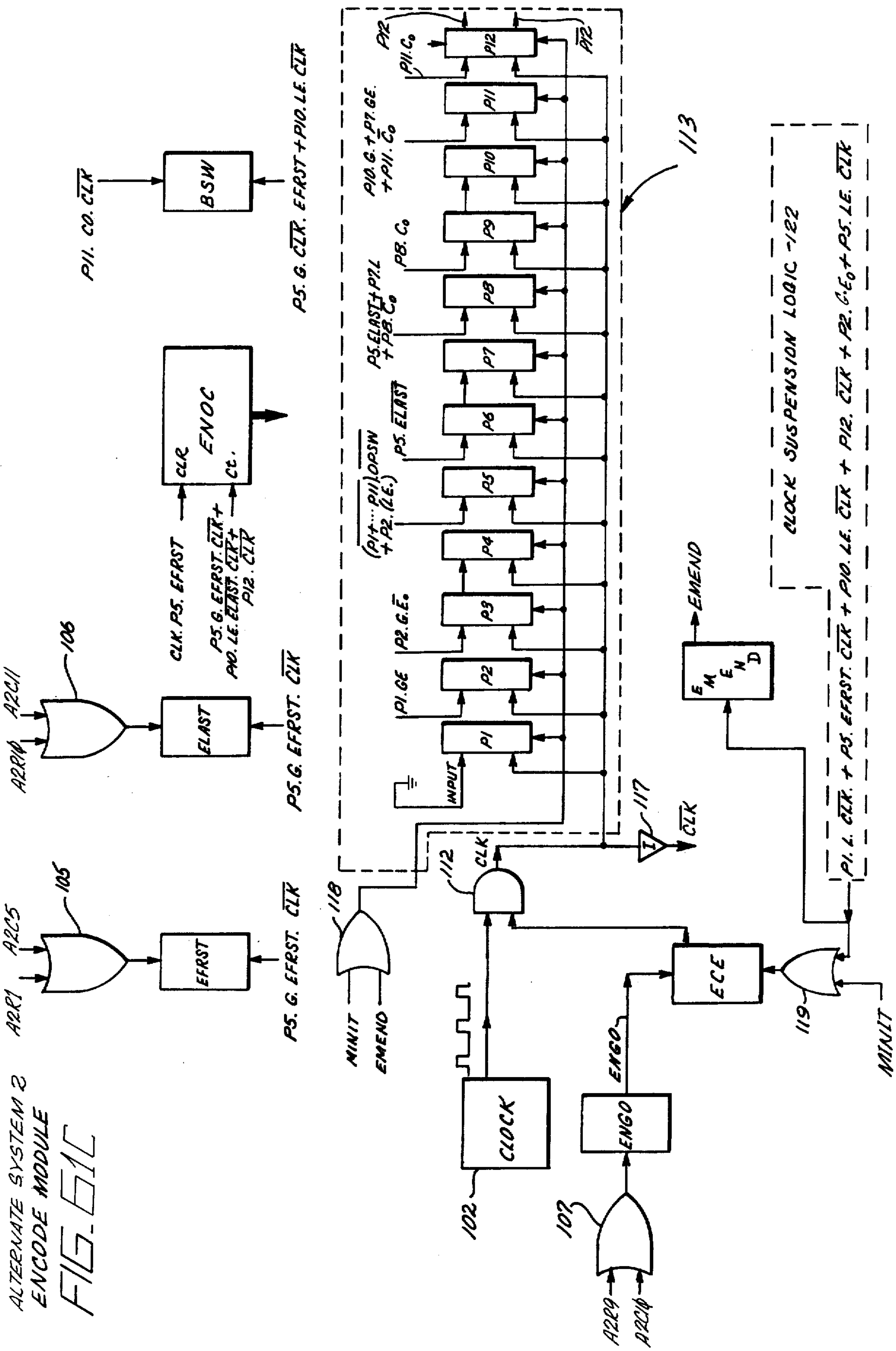
Figure 61D:
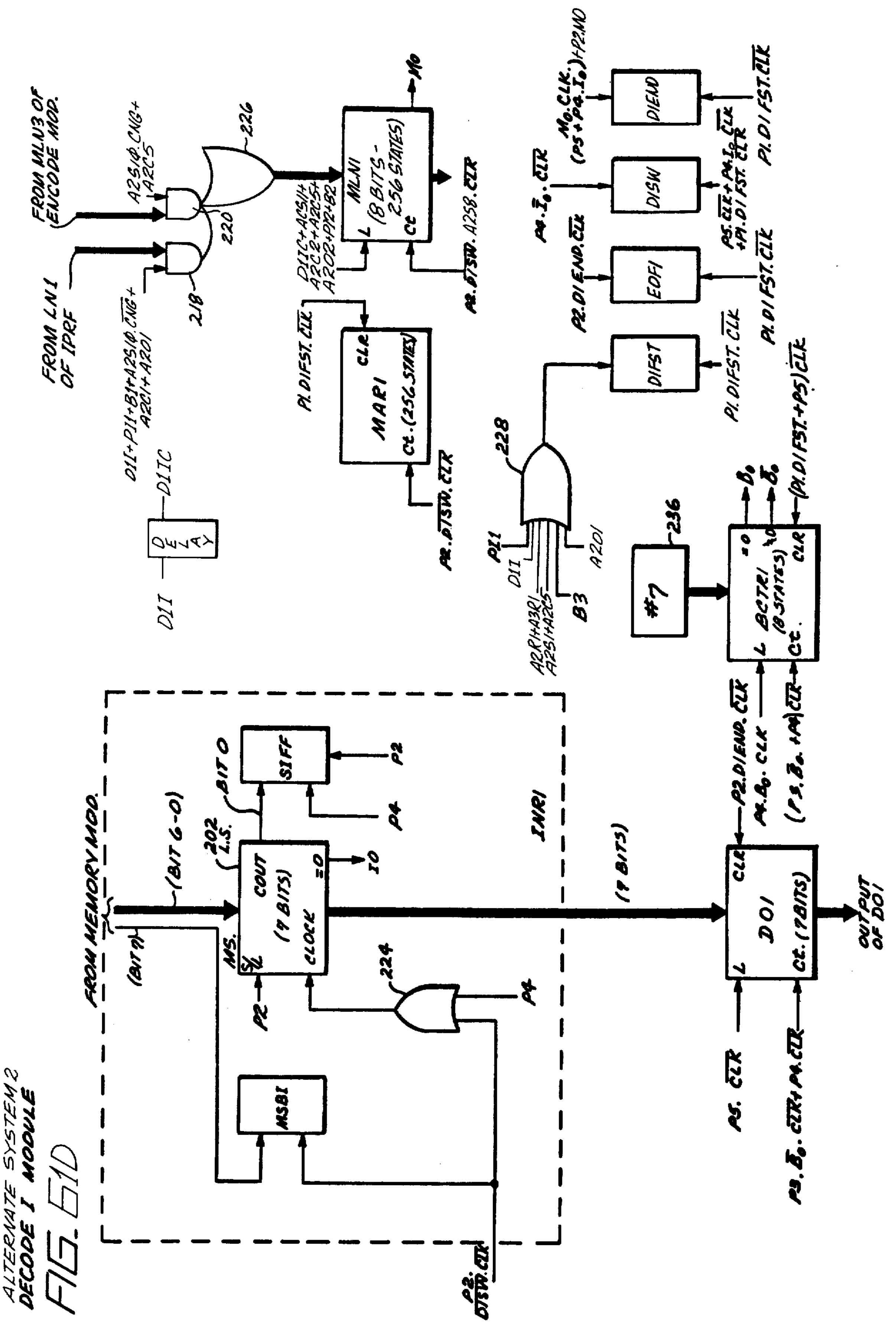
FIGS. 61D and 61E form a schematic and block diagram of the DECODE I MODULE for the DPM 2 system.

In FIG. 61C the following circuits of the ENCODE MODULE have had their input circuits revised: OR gate 105, 106, and 107 have been altered to reflect the proper signals from the REVOLVE 2 and CHANGE 2 MODULES. Additionally the input to flip flop P1 is grounded. This indicates that the P1–P4 portion of the counter is not used. Flip flops P1–P4 had performed the clipping function for OUTPUT MODULE. This function is not needed for the alternate implementation.

This completes a discussion of the revised ENCODE MODULE for the alternate implementation. The above revisions pertain to the NECODE MODULE as it is called from the REVOLVE 2 and CHANGE 2 MODULES.

c. Revised DECODE I MODULE

The revised DECODE I MODULE is called by the DPM INTERFACE, REVOLVE 2, REVOLVE 3, SPEED 2, CHANGE 2, and OUTPUT 2 MODULES. Only the initialization circuits have been changed to reflect the control and data signals from these alternate modules.

The input selection circuit to register MLN1 has been revised to reflect the fact that the switching back and forth of MEMORY MODULE areas is only done in this implementation in connection with the CHANGE MODULE. Therefore, AND gate 222 is omitted from the design. The enabling circuit on AND gate 220 which enables MLN3 from ENCODE to MLN1 consists of the circuit A2S10. CNG + A2V5. The A2C5 signal is from the CHANGE 2 MODULE and is used to enable the length of the revolved change line into MLN1. The A2S10.CNG comes from the SEED 2 MODULE when that module is called from the CHANGE 2 MODULE. AND gate still gates information from IPRF to MLN1. The enable circuit is essentially the same as for the original DECODE 1 MODULE; only the names of the signal have changed. NOTE that if the SEED 2 MODULE is called directly the signal $A2S10.\overline{CNG}$ gates the information from the OPRF to MLN1 rather than from MLN3.

OR gate 228 whose output initializes the D1FST flip flop has as input signals from the alternate modules in addition to those signals from the INTERFACE, PIPE, and BRIGHTNESS MODULES.

Figure 61E:
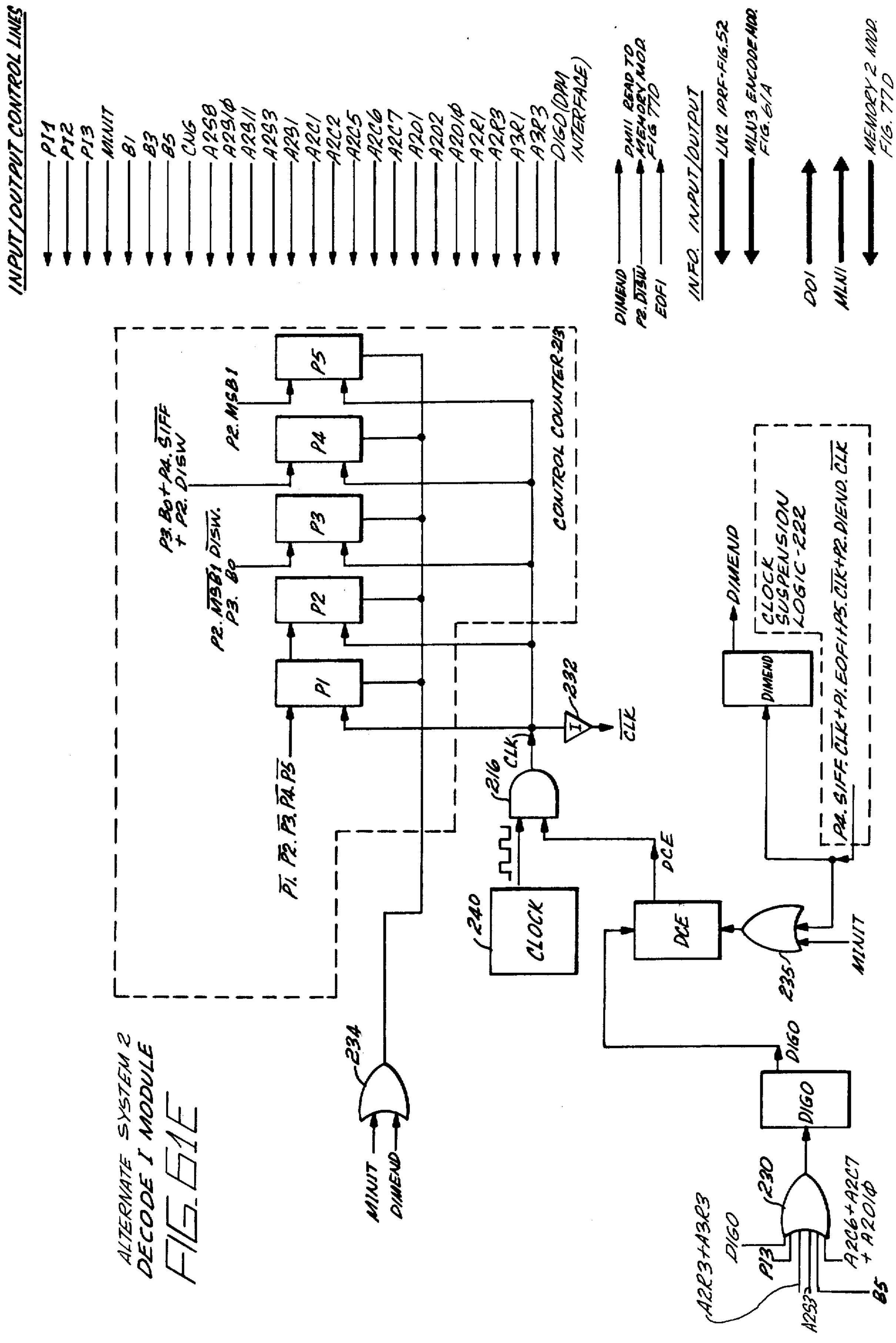

ON FIG. 61E the input/output signals have been modified to reflect the signals from the alternate implementations of the new modules. In addition the activating gate 230 has had its inputs changed to reflect the calls from the new modules.

D. Revised DECODE II MODULE

Figure 61F:
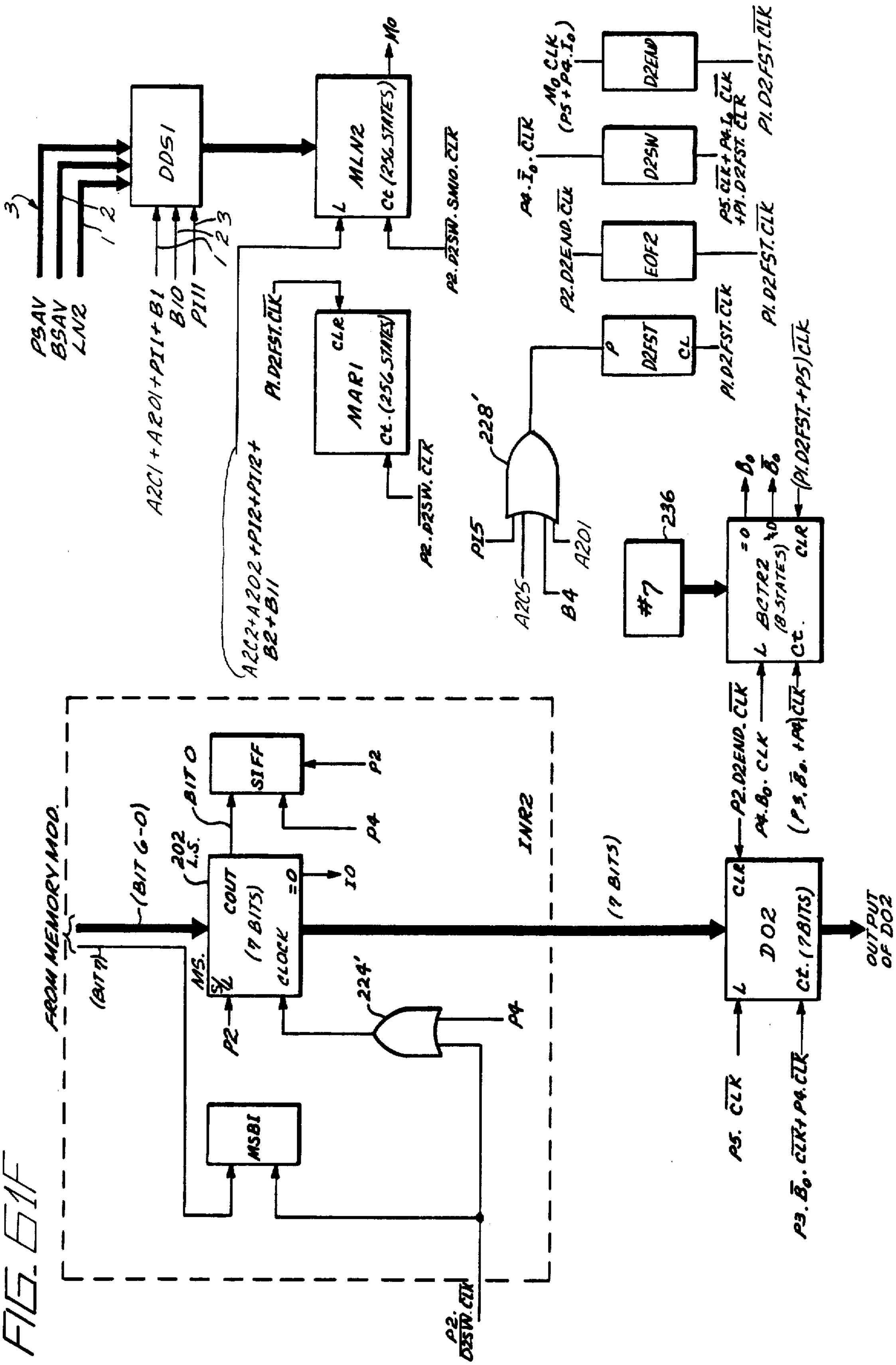
Figure 61G:
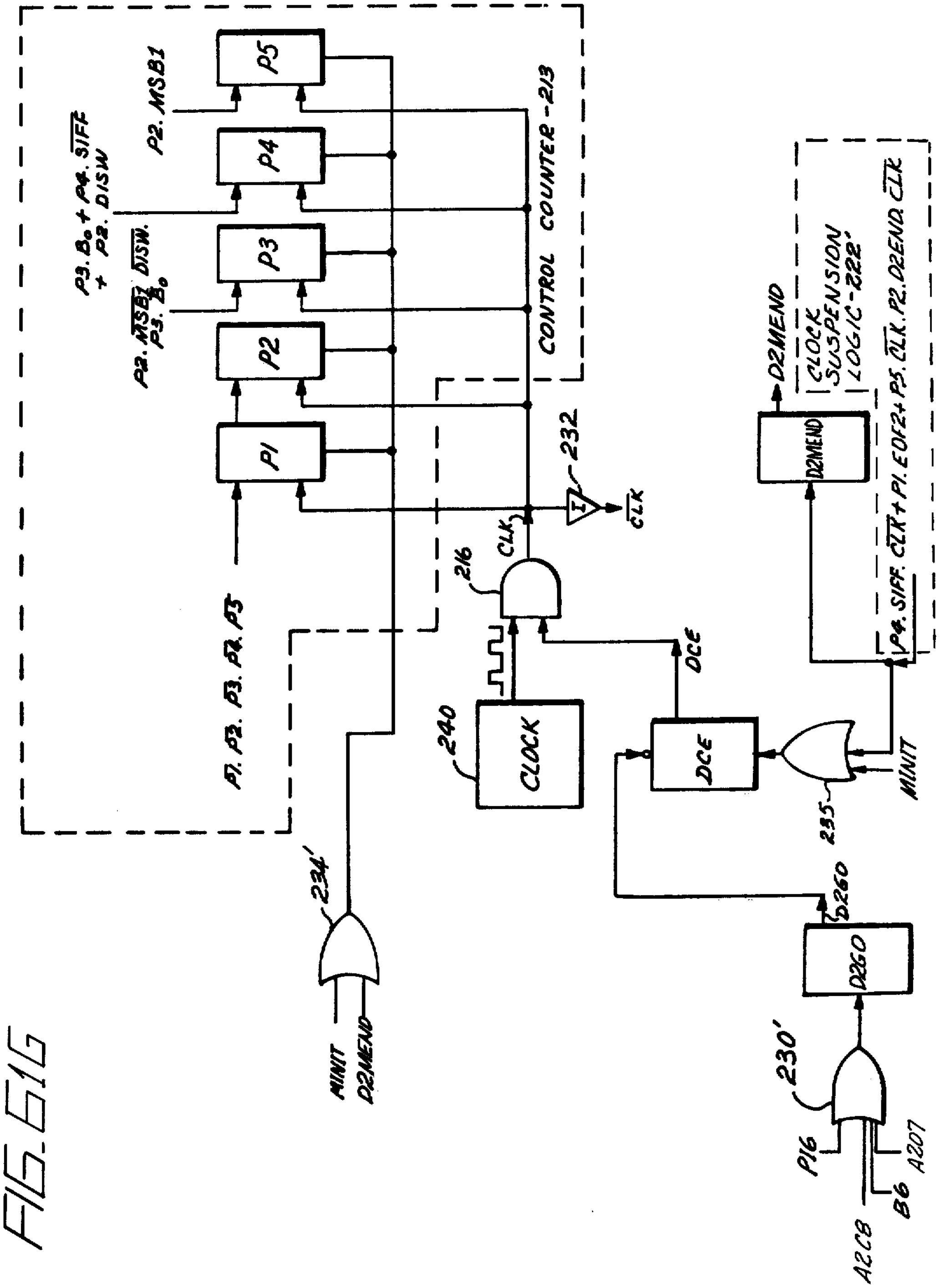

The revised DECODE II MODULE shown in FIGS. 61F–61H reflects the fact that in the alternate implementation DECODE II is called only by the CHANGE 2, OUTPUT 2, PIPE, and BRIGHTNESS MODULES. As a result portions of its initializing circuits have been considerably reduced.

In FIG. 61F the input to data selector DDS1 has been reduced from seven inputs TO three inputs. In the revised module only the inputs from the OPRF, PIPE, and BRIGHTNESS are needed. The enabling circuits have been similarly modified to reflect these changes. Likewise, the load circuit has been modified to reflect the fact that the CHANGE 2 and OUTPUT 2 MODULES are the only alternate modules which call DECODE II. Additionally, on FIG. 61F the input to the D2FST flip flop asynchronoies set circuit have been modified, i.e., the inputs to OR gate 228' have been changed.

In FIG. 61G only the module activating signals input to gate 230' are changed. Finally, on FIG. 61H the input control and data signals have been modified to reflect the signals and data originating from the alternate modules, CHANGE 2 and OUTPUT 2.

These are the revisions that must be made to the DECODE I and II and ENCODE MODULES in order to incorporate them into the alternate implementation. It should be noted that the circuits changed dealt mainly with initializing and activating circuits, i.e., those circuits which interface directly with the calling modules.

E. PIPE and BRIGHTNESS MODULES

The PIPE and BRIGHTNESS MODULES are incorporated into the alternate implementation but they are revised slightly. They must be revised in that the signals that now are used between the PIPE and BRIGHTNESS MODULES and the P/B MEMORY MODULE are now connected to the AUXILIARY MEMORY MODULE II. The P/B MEMORY MODULE Is not used in this alternate implementation. Note also that the changed signals represent a 1-to-1 change. Signals are neither added nor dropped from the modules in question.

XXII. DELTA 2 MODULE

A. General Description

The DELTA 2 MODULE differs from the DELTA MODULE in the DPM SYSTEM of FIG. 1–60. The DELTA MODULE merely breaks a number provided thereto designating the number of lines to be revolved, into its component powers of 2. The DELTA 2 MODULE differs from the DELTA MODULE In that the DELTA 2 MODULE generates any line of the delta, depicted by way of example in Table 6. The DELTA 2 MODULE is also capable of right shifting any line of the delta any specified number of possible occurrence values. These two features of the DELTA 2 MODULE enable any line of the iso-entropicgram for a given line to be generated without being required to generate the intermediate lines of the iso-entropicgram. This technique has been generally discussed hereinabove under I. B. Iso-Entropicgram Techniques.

In addition, the DELTA 2 MODULE utilizes a special technique for generating any row of the delta. Note that a delta of the same width as the iso-entropicgram for the given line is required. Table 6 depicts a delta of 8 possible occurrence values. The special technique is as follows: If an iso-entropicgram has a width of N, any line M of the delta can be generated utilizing the implies function for the column (possible occurrence values) going from O to N and the like number M. This function is depicted by the following:

$F = C$ implies $R$ is the same as $(C \rightarrow R)$.

$F = \overline{C}$ or $R$.

The implies function is therefore applied between any column (possible occurrence value) value C and any line value R, where C is the number of the column (or possible occurrence value) of the delta and R is the number of the line of the delta which is to be generated. The result of the equation $F = \overline{C}$ or $R$ is taken and the bits are serially ANDed together. If the result is a 1, then there is an occurrence value in the column (possible occurrence value) of interest and the line of interest of the delta. If on the other hand the result is 0, the column of interest in the line of interest in the delta does not contain an occurrence value.

The above concept can be more easily understood with reference to the example of Table 48. To be explained in more detail in connection with the DELTA 2 MODULE, the possible occurrence value of interest is stored in a register DELCOL whereas the line number value of interest is stored in the register DELRO. For purposes of illustration, the iso-entropicgram is assumed to be 8 values wide and it is assumed that it is desired to generate delta line 5. Referring to Table 48, the line number value is constant at 5 (101) whereas the possible occurrence value varies between 0 (000) and 5 (101). Considering the implies function for possible occurrence value 0 (000) using the $F = \overline{C} + R$ implies function results in the following: $F = \overline{000} + 101 = 111 + 101 = 111$ The foregoing is depicted at 0 of Table 48. Repeating the implies function for each of possible occurrence values 1 through 5 results in the binary equivalent of decimal values 775577 depicted in Table 48. Doing a bit wise AND, as explained above, on the binary equivalent results in 110011 as depicted in the next to last column of Table 48. This represents possible occurrence values 0, 1, 4 and 5 which is delta line 5 (see Table 6).

In summary then and of importance to this implementation of the DELTA 2 MODULE, whenever the result of the bit wise AND is a 1, then the corresponding possible occurrence value is outputted since it designates the presence of that occurrence value in the desired line of the delta. If the result is a 0, then the possible occurrence value is not outputted since there is no occurrence value in that column. It will also become apparent in the following discussion of the DELTA 2 MODULE that it is necessary to shift the possible occurrence values of the delta values to the right by some specified number N. This is simply done by adding the value N to the possible occurrence value and outputting that result. For example, the right hand list of occurrence values depicted in Table 48 is shifted to the right by three merely by adding three to each value.

Several additional features of the alternate DELTA 2 MODULE should be noted. First, it is not necessary to form the values of the delta moving from left to right beyond the point where the remaining values to the edge of the iso-entropicgram ar 0's. For example, if the iso-entropicgram width is 256 occurrence values wide and line 2 of the delta is being generated, there is no need to generate values beyond possible occurrence value 2 because all values beyond possible occurrence value 2 ar 0's. In this regard, once the possible occurrence value has exceeded the line number of interest, all succeeding values are 0. Thus, it is possible at this point to merely form an indication that the entire line of the delta has been generated.

Additionally, the DELTA 2 MODULE shifts lines of the delta a specified number of places to the right. As a result, it is possible that the shifted line may extend beyond the iso-entropicgram width. Those values beyond the edge of the iso-entropicgram need not be generated. To this end, an overflow indication is generated, whenever a value is formed, in the process of shifting, beyond the iso-entropicgram width.

B. Components

Figure 62:
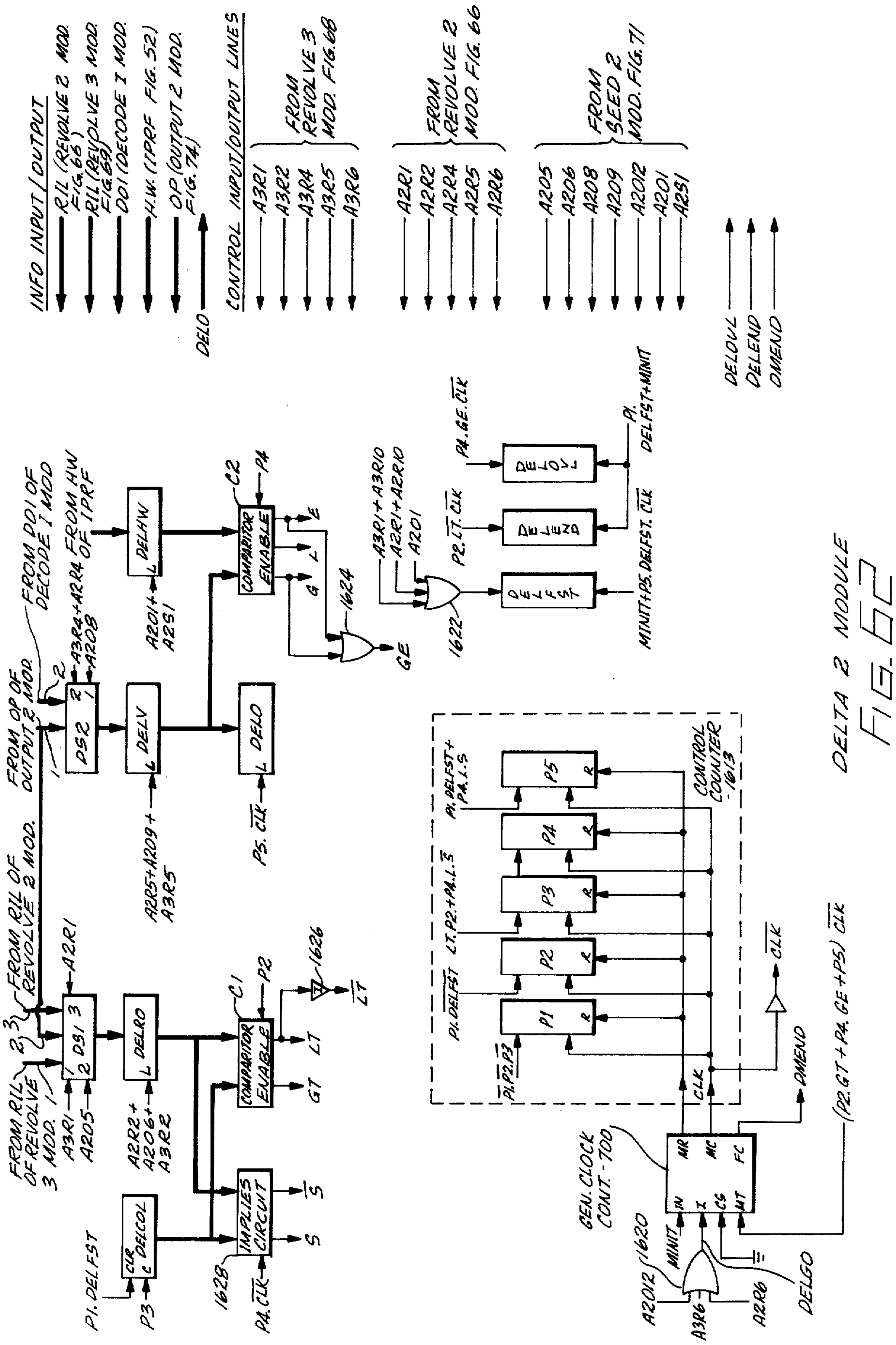
FIG. 62 is a schematic and block diagram of the DELTA 2 MODULE for use in the alternate machine of FIG. 61.

The DELTA 2 MODULE Is depicted in FIG. 62 and contains registers DELCOL, DELRO, DELV and DELHW. The purpose of each of these registers is depicted in Table 49. Each of the registers has eight bits for storage and are of the following type:

A true signal applied at the L input of the DELRO and DELHW and DELRO registers causes each of these registers to store the eight binary bits applied at the input thereof. The DELCOL and DELV registers count up one state responsive to each true signal applied at the C input thereof. The register DELCOL is reset to 0 responsive to a true signal at the CLR input.

In addition, the DELTA 2 MODULE has DS1, DS2 selection circuits. The selection circuits are of the same type disclosed hereinabove.

Also provided are flip flops, P1 through P5 which form a control counter 1613. Flag flops DELFST, DELEND and DELOVL are present and their purpose is set forth in Table 49. The flip flops are each of the leading edge trigger type disclosed hereinabove.

In addition, conventional OR gating circuits 1620, 1622 and 1624 are provided. A conventional logical signal inverter circuit 1626 forms the logical inversion at $\overline{LT}$ of the signal at the LT output.

Figure 64:
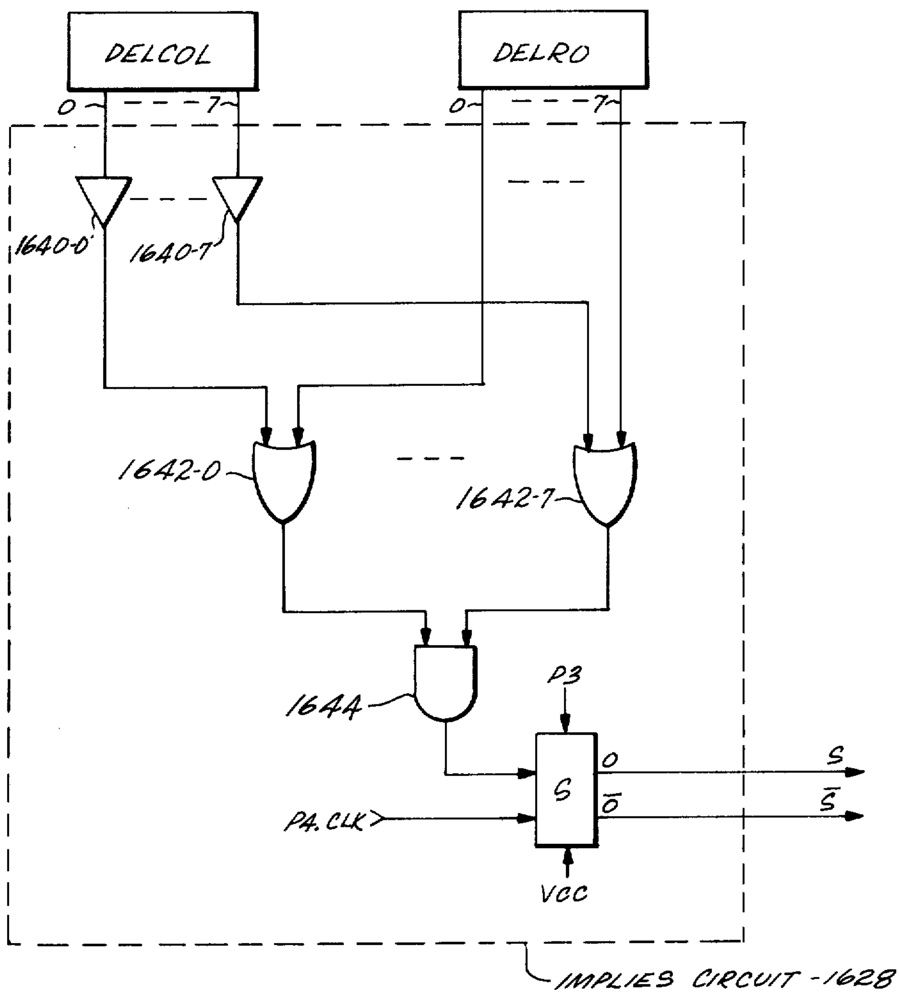
FIG. 64 is a schematic diagram of the implies circuit of FIG. 62.

The unprimed outputs of the eight flip flops in each of the DELCOL and DELRO registers are depicted in FIG. 64 by lines labeled 0 through 7. Only lines 0 and 7 depicting the least significant and most significant flip flops are shown in FIG. 64, the rest being indicated by dashed line.

Eight logical signal inverter circuit 1640 are connected to the unprimed outputs 0 through 7 of the register DELCOL. The inverter circuits 1640-0 through 1640-7 (only 1640-0 and 1640-7 are shown) are connected to the outputs 0 through 7 of the DELCOL register. Seven OR gating circuits 1642 labeled 1642-0 through 1642-7 (only 1642-0 and 1642-7 being shown) are associated with the correspondingly numbered outputs of the DELCOL and DELRO registers. Thus, OR gate 1642-0 has one input connected to the output of the signal inverter 1640-0 which in turn is connected to the 0 output of the DELCOL register and a second input is connected directly to the 0 output of the DELRO register. Each of the other OR gates 1642-1 through 1642-7 also have two inputs, one of which is connected through one of the correspondingly numbered inverter circuit 1640 to the correspondingly numbered output of the DELCOL register and the other of which is connected directly to the correspondingly numbered output of the DELRO register. The outputs of each of the OR gating circuits 1642-0 through 1642-7 are all connected as an input to the AND gate 44. The outputof the AND gate 44 is connected to the clocked input at the upper side of the S flip flop.

The S flip flop has its clocked input at the lower portion of the left hand side connected to a gate represented by the logic P4.CLK. Also, the reset input is connected to the VCC output of the DPM INTERFACE MODULE and the upper unclocked set to one input is connected to the P3 output of the P3 flip flop in the control counter 1613 (FIG. 62).

The clock control for the DELTA 2 MODULE is the generalized clock control 700 disclosed hereinabove. It should be noted that the CS input is connected to ground thereby providing a permanent false input the CS input which disables the clock suspension feature.

Also provided are comparitors, C-1 and C-2. The comparitor C-1 compares the content of the registers DELCOL and DELRO and forms true signals at the GT and LT outputs responsive to the content of register DELCOL being the larger and the smaller respectively. The comparitor C-2 compares the content of registers DELV and DELHW and forms true signals at the G, L and E outputs responsive to the content of register DELV being the larger, the smaller and equal respectively.

Circuit 1628 forms an implies circuit. The implies circuit is a logical gating circuit which OR's corresponding bits in registers DELCOL and DELRO and then does a bit wise AND on the result to produce a true signal at the S and $\overline{S}$ outputs responsive to the result being 1 and 0 respectively.

FIG. 64 shows the details of the implies circuit 1628 shown generally in FIG. 62. As indicated, there are logical signal inverters 1640-0 through 1640-7, OR gates 1642-0 through 1642-7 and an AND gate 1644. A leading edge type trigger flip flop S is also included and is of the same type disclosed hereinabove.

The information input/output lines are depicted by heavy line and the control input/output lines are depicted by thin line along the right hand side by FIG. 62.

C. Detailed Description

Figure 63:
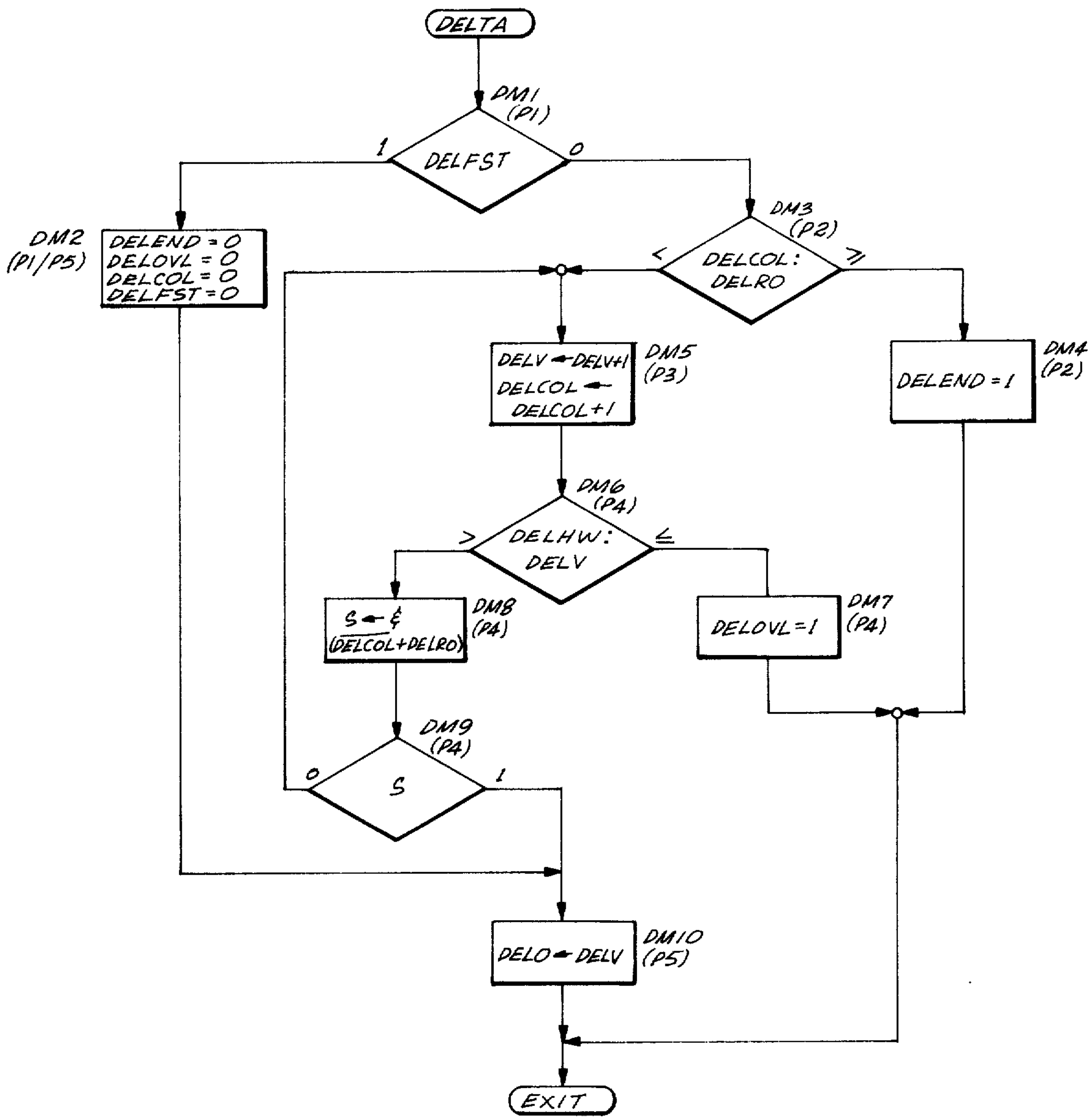
FIG. 63 is a flow diagram for the DELTA 2 MODULE.

Consider first the general sequence of operation of the DELTA 2 MODULE with reference to the flow diagram of FIG. 63. Various blocks of flow diagram are identified by the symbols DM followed by a number (i.e. DM1) and the corresponding state of the control counter 1613 is indicated by a P followed by a numeral (i.e. P1) identifying the one of the flop flops of the control counter 1613 then in a one state. Initially each of the flag flip flops DELFST, DELEND and DELOVL are reset to 0 as are the control counter 1613 flip flops and then the DELTA 2 MODULE is called. Initially, a true signal is formed at one of the outputs A201 by the SEED 2 MODULE or the output A2S1 of the SEED 2 MODULE causing a width value for the iso-entropicgram to be stored from the HW register of the IPRF into register DELHW. Additionally, a true signal is formed at the output A2R4 or A3R4 by the REVOLVE 2 MODULE causing a shift value to be applied to the input of the register DELV from the DO1 output of the DECODE 1 MODULE or a true signal is formed at the A208 output of the OUTPUT 2 MODULE causing a shift value formed at its OP output to be applied at the input of the DELV register by the DS2 selection circuit. Subsequently, a true signal is formed at the C input of the DELV register at one of the following outputs: A2R5 and A3R5 from the REVOLVE 2 MODULE or the A209 of the OUTPUT 2 MODULE. The true signal at the C input of the DELV register causes the shift value to be stored into the DELV register. Also, initially a true signal is formed at one of the following outputs: A3R1 and A2R1 of the REVOLVE 2 MODULE and the A205 output of the OUTPUT 2 MODULE causing a true signal at the 1, 3 and 2 inputs of the DS1 selection circuit. True signals at the 1, 3 and 2 inputs of the DS1 selection circuit cause the line value to be applied from the RIL output of the REVOLVE 3 MODULE, the RIL output of the REVOLVE 2 MODULE and the OP output of the OUTPUT 2 MODULE, respectively, to the input of the DELRO register. A true signal at the A2R2 output of the REVOLVE 2 MODULE or the A206 output of the OUTPUT 2 MODULE or the A3R2 output of the REVOLVE 3 MODULE causes the DELRO register to store the line value.

The OR gate 1622 triggers the DELFST flip flop into a one state on the first call to the DELTA 2 MODULE responsive to a true signal of any one of the following outputs: A3R1, A3R1 of the REVOLVE 3 MODULE. A2R1 and A2R1 from the REVOLVE 2 MODULE and A201 from the OUTPUT 2 MODULE.

With the storage of the aforegoing information, the DELTA 2 MODULE has now been initialized. The DELTA 2 MODULE is incalled by forming a true signal at one of the following outputs: A2012 from the OUTPUT 2 MODULE; A3R5 of the REVOLVE 3 MODULE and the A2R6 output of the REVOLVE 2 MODULE. A true signal at any one of these outputs causes the OR gate 1620 in the DELTA 2 MODULE to form a true signal at the output thereby triggering the generalized clock control 700 into operation causing clock pulses to be applied at CLK and $\overline{CLK}$ to the DELTA 2 MODULE to thereby sequence its operation.

With the DELFST flip flop in a one state, the call on the DELTA 2 MODULE causes DM2 to be entered following DM1.

During DM2 the following takes place: The DELFST flip flop is reset to 0. Additionally, the DELEND flip flop is reset to 0.

DM10 is entered following DM2. During DM10 the occurrence value (possibly a shifted occurrence value) is to be stored from the DELV into the DELRO register for output.

Following DM10, the operation of the DELTA 2 MODULE is exited awaiting a subsequent call. All future calls to the DELTA 2 MODULE, simply call the module and the module uses those values previously placed therein as described above.

The second call to the DELTA 2 MODULE occurs with the DELFST flip flop in a zero state. Accordingly, DME is entered following DM1. During DM3, a check is made to determine whether the module has generated a complete desired line of the delta. To this end, the current possible occurrence value contained in register DELCOL is checked to see whether it is greater than or equal to (≧) the line value initially stored in register DELRO. If greater, flip flop DELEND is set to a one state to indicate that the module has completed its operation and clock control 700 ceases operation exiting to the calling module.

If the current possible occurrence value in register DELCOL is less than (L) the line number value in register DELRO, DM5 is entered. During DM5 the current possible occurrence value in DELCOL and the possible occurrence value in register DELV are incremented by 1. Following DM5, DM6 is entered where a check is made to see whether the shift repesented by counting up the possible occurence value in register DELV has resulted in a value which is beyond the width of the iso-entropicgram. To this end, the iso-entropicgram width value contained in register DELHW is compared with the content of register DELV. If the possible occurrence value is DELV is greater than the iso-entropicgram width, DM7 is entered where the DELOVL flip flop is set to a one state and the operation of the block control 700 is to exit to the caller.

If on the other hand the comparison during DM6 reveals that the possible occurrence value in register DELV is less than the iso-entropicgram width value in register DELHW, DM8 is entered.

During DM8, the implies function is applied to the content o the DELCOL and DELRO registers. The relationship set forth above is $F = \overline{C} + R$ and in terms of the possible occurrence value in register DELCOL and the line value in register DELRO, the relation can be rewritten as $F = S = \overline{DELCOL} + DELRO$. If the implies function results is a 0, then following DM9, DM5 is re-entered and the possible occurrence value in registers DELCOL and DELV are increased by one value as discussed above. The loop through DM6 and DM8 is repeated until the possible occurrence value in register DELV is larger than the iso-entropicgram width value in register DELHW or until the implies function performed during DM8 results in a 1 ($S = 1$). When this occurs, a true signal is formed at output S and DM10 is entered where the possible occurrence value in register DELV is transferred to the output register DELO for output to the caller.

Summarizing then, possible occurrence value (or column) has been shifted along. Register DELV monitors the shifting process by incrementing its value by 1 for each shift. Whenever a 1 is encountered ($S = 1$) in the implies function, the possible occurrence value in DELV is loaded into the register DELO for output.

With the general description of the flow diagram of FIG. 63 in mind, consider in more detail the DELTA 2 MODULE as depicted in FIG. 62. Assume that the DELTA 2 MODULE has been initialized as discussed above. The control counter 1613 including all of flip flops P1 through P5 are reset to 0 by a true signal at the MR output of the generalized clock control 700. Clock signals are then formed at CLK by the generalized clock control 700. Since the flip flops P1 through P5 are initially all in a 0 state, the logic $\overline{P1}.\overline{P2}.\overline{P3}$ is true. Therefore, the first upswing of the pulse at CLK causes flip flop P1 to be set to a 1 state thereby causing DM1 of the flow to be entered. At this point, the flip flops P1 and DELFST are both in a one state causing a true signal at the P1.DELFST logic. Accordingly, the following CLK pulse causes the flip flop P5 to be set to a one state and flip flop P1 to be reset to a 0 state. The logic P5.DELFST.$\overline{CLK}$ is now true since the P5 flip flop is in a one state and therefore at the $\overline{CLK}$ pulse flip flop DELFST is reset to a 0 state. Additionally, the true conditions of logic P5.$\overline{CLK}$ causes the possible occurrence value contained in register DELV to be stored into the DELO register. This same logic causes a true signal at the MT input of the generalized clock control 700 causing a true signal to be formed at the FC output of the generalized clock control 700 which in turn causes a true signal at the DMEND output of the DELTA 2 MODULE thereby terminating further operation of the DELTA 2 MODULE thereby causing an exit.

On the next call to the DELTA MODULE, i.e., the next true signal formed by the OR gate 1620, flip flop P1 is again set to a 1 state. However, since DELFST has been reset to a 0 state, nothing takes place during the one state of flip flop P1. The following CLK pulse causes flip flop P2 to be set to a 1 state and flip flop P1 to be reset to a 0 state thereby enabling DM3 of the flow to be entered. The one state of flip flop P2 causes true signal at the P2 output causing the comparitor C-1 to be enabled and thereby compare the content of the possible occurrence value in register DELCOL against the line number contained in register DELRO. If the possible occurrence value in register value DELCOL is not less than the line number in register DELRO, the comparitor C-1 forms a false signal to the LT output causing the inverter 1626 to form a true signal at the $\overline{LT}$ output. Accordingly, at the following CLK pulse, the logic P2.$\overline{LT}$.$\overline{CLK}$ becomes true setting the DELEND flip flop to a 1 state to indicate that the entire desired line of the delta has been generated by the DELTA 2 MODULE. Additionally, the comparitor C-1 forms a true signal at the GT output and the logic P2.GT is true causing a true signal at the MT input of the generalized thought control 700 which forms a true signal at the DMEND output signalling that the operation of the DELTA 2 MODULE has been completed and is being exited.

If on the other hand the possible occurrence value in the DELCOL counter is less than the line number in register DELRO, the comparitor C-1 forms a true signal at the LT output causing the logic LT.P2 to be true which causes flip flop P3 to be set to a 1 state and flip flop P2 to be reset to a 0 state at the following CLK pulse. This causes DM5 of the DELTA 2 MODULE flow to be entered. The true signal at the P3 output causes the DELCOL and DELV counters to count the possible occurrence values therein up one. The true signal at the P3 output of the P3 flip flop causes flip flop P4 to be set to a 1 state and flip flop P3 is reset to a 0 state at the following CLK pulse thereby causing DM6 of the flow to be entered. A true signal is now formed at the P4 output of the P4 flip flop causing the comparitor C-2 to compare the possible occurrence value in counter DELV with the iso-entropicgram width value in register DELHW. If the possible occurrence value in DELV is the greater or is equal to the width value, the comparitor C-2 forms true signals at the G and E output respectively, either of which causes the OR gate 1624 to form a true signal at the GE output. At the following $\overline{CLK}$ pulse, the logic P4.GE.$\overline{CLK}$ then becomes true causing the DELOVL flip flop to be set at a 1 state and causing a true signal at the MT input of the generalized clock control 700 which terminates the operation of the DELTA 2 MODULE causing a true signal at the DMEND output.

If on the other hand the width value in register DELHW is larger than the content of DELV, the comparitor C-2 forms a true signal at the L output at the following $\overline{CLK}$ pulse. The logic P4.$\overline{CLK}$ becomes true, causing the implies circuit 1628 to perform its function. If the implies function as applied to the DELCOL and DELRO registers results in a one ($s = 1$), a true signal is formed at the S output whereas if it is a 0, a true signal is formed at the $\bar{S}$ output. A true signal at the $\bar{S}$ output causes the logic P4.L.$\bar{S}$. to become true thereby setting flip flop P3 to a one state and allowing flip flop P5 to be reset to a 0 state at the following CLK pulse thereby causing DM5 of the flow to be entered. If on the other hand the S output of the implies circuit 1628 receives a true signal, the logic P4.L.S becomes true causing flip flop P5 to be set to a one state and flip flop P4 is reset to a 0 state at the following CLK pulse thereby causing DM10 of the flow to be entered.

During DM10, a true signal is formed at the P5 output. Therefore, the following pulse at $\overline{CLK}$ causes the logic P5.$\overline{CLK}$ to become true. The true condition of this logic causes the register DELO to store the possible occurrence value from DELV as the output and causes the generalized thought control 700 to terminate the operation of the module and form a true signal at the DMEND output returning control back to the calling module.

D. Example of Operation.

Consider now an actual example of the operation of the DELTA 2 MODULE making reference to the flow diagram of FIG. 63 and the schematic and block diagram of FIG. 62.

As a first example, assume that line 5 of the delta is to be generated. Also assume that there is to be a 0 shift. Since there is a 0 shift, a shift number value of 0 is stored in the DELV register and a line number value of 5 is stored in the DELRO register.

Also, initially the DELEND flip flop is set to a one state indicating that this is about to be the first call on the DELTA 2 MODULE.

The first call on the DELTA 2 MODULE causes DM1 and DM2 of the flow to be entered. During DM2, the DELEND and DELOVL flip flops and reset to 0. Additionally, register DELCOL is set to 0 corresponding to a possible occurrene value (column) of 0.

DM10 of the flow is entered and the possible occurrence value of 0 in register DELV is transferred to the DELO register for output and the DELTA 2 MODULE exits its operation.

On the second call to the DELTA 2 MODULE, control goes from DM1 to DM3 of the flow since the DELEND flip flop is now in a 0 state. During DM3 the possible occurrence value of 0 contained in register DELCOL is compared with the line number value of 5 in register DELRO by the comparitor C-1. Since the content of register DELCOL is less than that of register DELRO, DM5 of the flow is entered.

During DM5 the possible occurrence values of 0 stored in registers DELV and DELCOL are counted up to 1.

During DM6 of the flow, the iso-entropicgram width of 8 stored in register DELHW is compared with the possible occurrence value of one stored in register DELV. Since the iso-entropicgram width in register DELHW is the larger, DM8 of the flow is entered.

During DM8 of the flow the implies function now takes place on the content of register DELCOL and DELRO. Considering the relation $S = \overline{DELCOL} + DELRO = \bar{1} + 5 = 6 + 5 = 7$ doing a bit wise and of the binary equivalent of the decimal number 7, the result is a 1. Therefore $S = 1$. Therefore, the DELTA 2 MODULE goes from DM9 to DM10. During DM10 the possible occurrence value of one in register DELV is transferred to the DELO register for output and again the operation of the module is exited.

On the third call to the DELTA 2 MODULE, DM1 through DM3 is entered. The possible occurrence value in register DELCOL is still less than the line number value in register DELRO and therefore DM5 is entered. During DM5, the possible occurrence values of one in registers DELV and DELCOL are both counted up by one to values of 2. DM6 of the flow is then entered where the possible occurrence value of 2 in the DELV register as compared with the width value of 8 in the DELHW register and the former is formed to be the smaller. Accordingly, DM8 is entered where the implies function is repeated causing the following computation: $\bar{2} + 5 = 6 + 5$ results in a 0 ($S = 0$). Accordingly, control returns to DM5. During DM5 the DELV and DELCOL registers are both incremented by 1 to possible occurrence values of 3. DM8 is re-entered where the implies function is applied to the values of 3 and 5 in the DELCOL and DELRO registers resulting in $S = 0$. Accordingly, DM5 is re-entered. The possible occurrence values in the DELV and DELCOL counters are counted up from 3 to 4.

During DM8 the implies function is again applied to the values of 4 and 5 in the DELCOL and DELRO registers resulting in $S = 1$. Accordingly, DM10 is entered where the possible occurrence value of 4 in register DELV is shifted to the DELO register for output.

On the fourth call to the DELTA 2 MODULE, DM1 and DM3 are entered. The possible occurrence value of 4 in register DELCOL is still smaller than the line number 5 in register DELRO. Accordingly, DM5 is entered. During DM5, the possible occurrence values in register DELV and DELCOL are counted up from 4 to b 5.

During DM6 the width value of 8 in the DELHW register is still greater than the possible occurrence value of 5 in register DELV. Accordingly, DM8 is re-entered where the implies function is performed and results in $S = 1$. DM10 is accordingly re-entered where the possible occurrence value of 5 in DELV is transferred to the DELO register for output and an exit is taken.

On the 5th call to the DELTA 2 MODULE, DM1 to DM3 are entered. During DM3 the possible occurrence value of 5 in register DELCOL is found equal to the line value of 5 in register DELRO. Accordingly, DM4 is entered where the DELEND flip flop is set to a one state and the operation of the DELTA 2 MODULE is exited.

It should now be noted that the values that have been outputted in the DELRO register have been the possible occurrence values of 0, 1, 4 and 5. These are the possible occurrence values (or columns) in which an occurrence appears in line 5 of the delta (Table 6).

Consider a second example of the operation for the DELTA 2 MODULE. In this example, assume that it is desired to shift the delta line 3 places to the right. Again, assume that the line of the delta to be generated is 5. Under these conditions, preliminary to calling the DELTA MODULE, register DELFST is set to a one state. Register DELRO is loaded with line number value 5 and the register DELV is loaded with the shift value of 3.

On the first call, DELFST is in a 1 state. Accordingly, DM2 is entered where DELFST, DELEND and DELOVL are all reset to 0. Additionally, the register DELCOL is reset so that it represents a possible occurrence value of 0. DM10 is next entered where the DELO register is loaded with the possible occurrence value (equal to shift value) of 3 in register DELV. Accordingly, the possible occurrence value of 3 is outputted in register DELO and the DELTA 2 MODULE operation is exited.

On the second call to the DELTA 2 MODULE the DELFST register is in a 0 state. Accordingly, DM1 to DM3 are entered. During DM3, the possible occurrence value of 0 in the DELCOL register is compared to the line number 5 in the DELRO register and the former is found not to be greater. Therefore, DM5 of the flow is entered.

During DM5 the DELV register is incremented from occurrence value 3 to 4 while the DELCOL register is incremented from possible occurrence value 0 to 1.

During DM6 of the flow, the width value in the DELHW register is compared to the possible occurrence value of 4 in the DELV register and the former is found to be the greater. Therefore, DM8 is entered where the implies function is performed resulting in *S 32* 1. Accordingly, a true signal is formed at the S output causing DM10 to be entered. During DM10 the incremented occurrence value of 4 is loaded in the DELO register for output and an exit is taken.

The third call to the DELTA 2 MODULE causes DM1 to DM3 to again be entered. During DM3, the occurrence value of 1 in the DELCOL register is compared to the line number 5 in the DELRO register and the first is found to be less. Therefore, DM5 is entered. During DM5, the occurrence value of 1 in the DELCOL register is incremented by 1 to 2 and the possible occurrence value of 4 in the DELV register is incremented by 1 to 5. During DM6, the incremented possible occurrence value of 5 in the DELV register is found less than the width value in DELHW. Accordingly, DM6 through DM8 is entered where the implies function is performed resulting in $S = 0$. Accordingly, DM5 is re-entered where the possible occurrence values of 5 and 2 in the DELV and DELCOL registers are incremented to 6 and 3 respectively. The possible occurrence value of 3 in the DELCOL register is not greater than the width value in the DELHW register. Accordingly, DM8 is entered. During DM8, the implies function is applied on the values of 3 and 5 in the DELCOL and DELRO registers resulting in $S = 0$. Accordingly, DM5 is re-entered. During DM5, the occurrence values in the DELV and DELCOL registers are increased from 6 to 7 and 3 to 4 respectively. During DM6, it is found that the width value 8 in the DELHW register is greater than the occurrence value 7 in the DELV register. Therefore, DM8 is re-entered where the implies function is again applied to the values 4 and 5 in the DELCOL and DELRO registers resulting in S = 1 causing DM10 to be entered. The occurrence value 7 in the DELV register is loaded into the DELO register for output and the operation of the module is exited.

The fourth call on the DELTA 2 MODULE causes DM1 through DM3 to be entered. The occurrence value of 4 in the DELCOL register is compared to the line number value 5 in the DELRO register and is found to be less. Accordingly, DM5 is entered. During DM5, the occurrence values 7 and 4 in the DELV and DELCOL registers are increased to 8 and 5 respectively and DM6 is entered. During DM7, the occurrence value 8 in the DELV register is found equal to the width value in the DELHW register. Accordingly, DM7 is entered where the DELOVL flip flop is set to 1 indicating that there is no need to generate further shifted occurrence values in the DELV register since the reset would be beyond the edge of the iso-entropicgram and therefore meaningless.

Accordingly, what has been generated out of the output register DELO are the occurrence values 3, 4 and 7. With reference to Table 6, it would be seen that line 5 of the delta shifted three places to the right would be occurrence values 3, 4 and 7.

XXIII. REVOLVE 2 MODULE

A. General Description

The REVOLVE 2 MODULE in conjunction with the other portion of the systems depicted in FIG. 61 depict a revolver for generating various lines of an iso-entropicgram, given an input line, without generating the intermediate lines of the iso-entropictram. Generally the operation, in binary values, involves the following:

1. Determining the number of lines N separating the given line (called input line) from the desired line in the iso-entropicgram;
2. At least partially generate line N of the delta once for each actual occurrence value in the input line;
3. Shift the values of each generated delta line N by the amount designated by the value of the corresponding actual occurrence value in the input line and exclusive OR the resultant shifted occurrence values.

Table 51 gives an example of an iso-entropicgram for the given line depicted at line O. Thus, there are occurrence values (or 1's in columns 1, 2, 3, 5). Assume it is desired to generate line 3 of the iso-entropicgram of Table 51. Following the aforegoing method will result in a sequence of operation as depicted in Tab*e 52.

It should be noted that although the values of the occurrence value are selected from right to left in the embodiment of the invention disclosed herein, and that this is a preferred order for selecting the occurrence values, the process could be reversed and the occurrence values selected in the opposite order from smallest to largest within the broader scopes of the present invention.

Several features involving implementation of the present invention should be noted in connection with the example of Tables 51 and 52 and therefore this example will now be examined in more detail in connection with these features. First, as indicated above, the occurrence values of the input line are scanned and selected from largest to smallest, i.e., right to left in Table 52. The first occurrence value selected is five, the DELTA 2 MODULE is then called causing it to generate line 3 of the delta shifted (or incremented) five places to the right resulting in an intermediate result consisting of possible occurrence values 5, 6 and 7. The remaining possible shifted occurrence value is the 8, but it is equal to the width of the iso-entropicgram and is disregarded. Thus, only values 5, 6 and 7 form the first intermediate value and are stored in an AM II MEMORY area II. The next step is to pick up occurrence value 3 from the input line and subsequently generate line 3 of the delta offset by 3 resulting in occurrence values 3, 4, 5 and 6. The next step is to XOR the stored line and the newly generated line 3 of the delta offset resulting in a second intermediate value with occurrence values of 3, 4 and 7. The second intermediate result is stored in AM II MEMORY area 1. Subsequently, the next occurrence value in the input line, namely, occurrence value 2, is picked up and line 3 of the delta right shifted by 3 is generated and XORed forming the third intermediate results 34 and 7 resulting in an intermedial result of 2, 5 and 7. The third intermediate result is stored in AM II MEMORY area 2. Finally, delta line 3 unshifted in XORed with the third intermedial result resulting in the final line 3 of the iso-entropicgram as depicted at the bottom of Table 52.

Returning again to the first step depicted in Table 52, once all of the occurence values to the right of possible occurrence 6 have been processed, those occurrence values to the right of possible occurrence 6 can be output. Thus, occurrence value 7 can be output which in the present embodiment is an output to the ENCODE MODULE which in turn encoded the value to hybrid form for storage in the MEMORY MODULE. Therefore, the intermediate results that are stored in the AM II MEMORY can be minimized by storing the occurrence values that have been completely processed in permanent storage in the MEMORY MODULE, without need of storing them in the intermediate storage in AM II MEMORY. In this same connection, it will be noted that in cycle III all occurrence values to the right of possible occurrence value 3 has been completely processed and therefore can be stored into the permanent storage of the MEMORY MODULE without need of storing into the intermediate storage of the AM II MEMORY.

This concept can generally be defined by saying that once it is determined that the shifted delta line does not extend beyond the iso-entropicgram width, all those possible occurrence values which lie between the end of the occurrence value from the DELTA 2 MODULE and the end of the previous intermediate results are "passed to the calling module" or more specifically sent to the MEMORY MODULE for permanent storage, via the ENCODE MODULE.

B. Components

Figure 65:
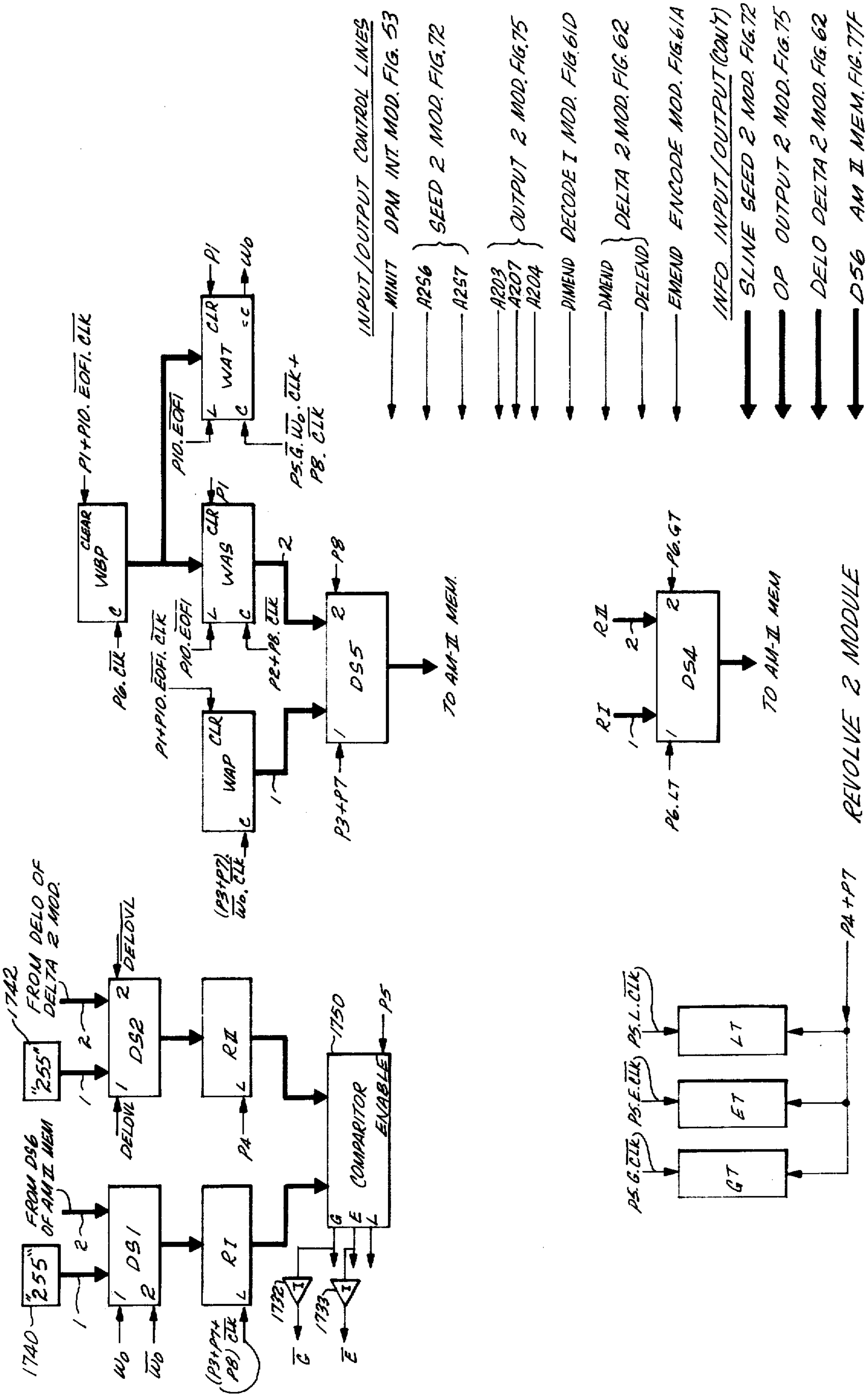
FIGS. 65 and 66 form a schematic and block diagram of the REVOLVE 2 MODULE.
Figure 66:
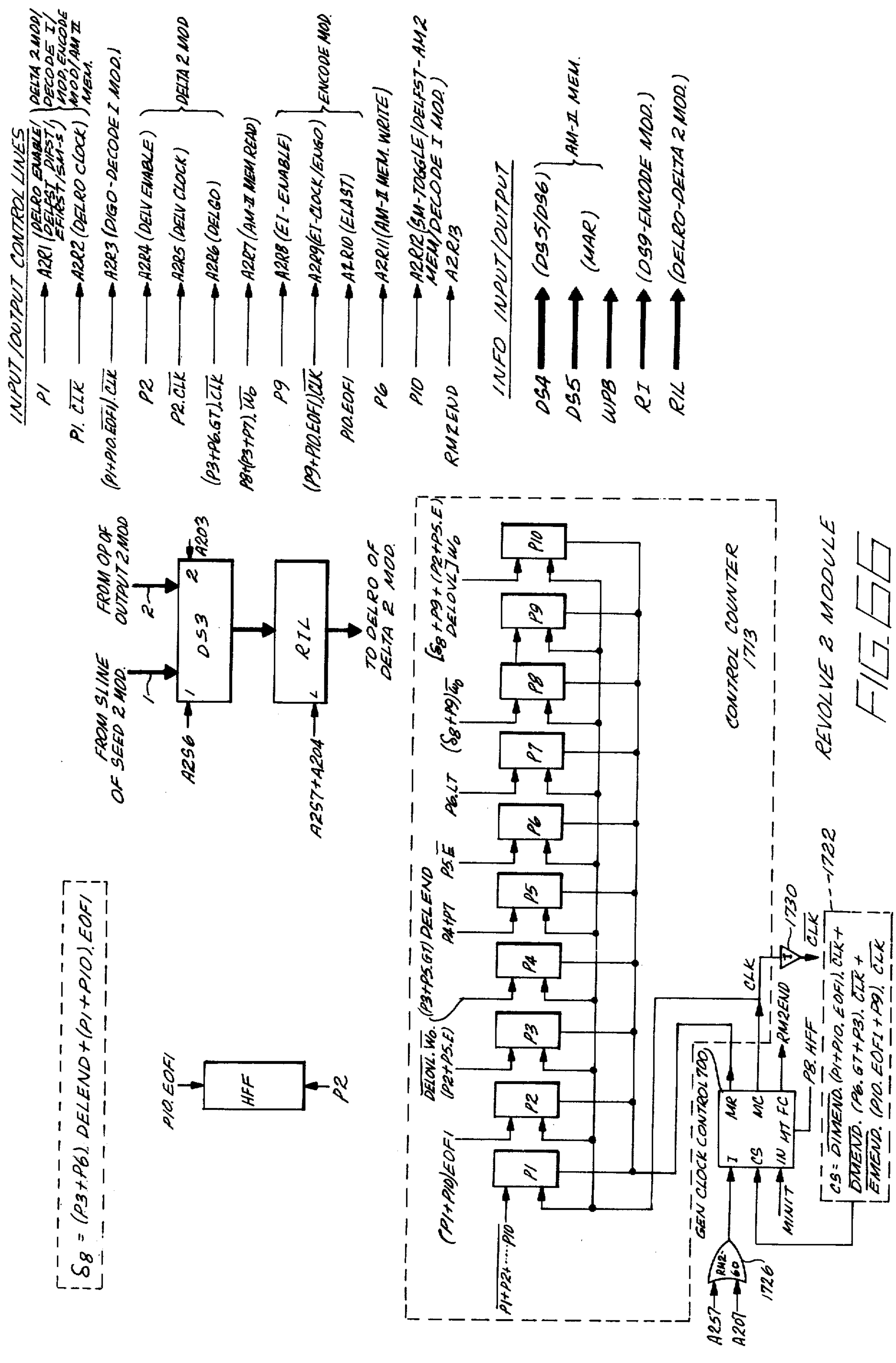

Referring to FIGS. 65 and 66, the REVOLVE 2 MODULE contains the following eight bit registers, RI, RII, WAP, WAS, WAT and RIL. In addition, the REVOLVE 2 MODULE contains the following flip flops, GT, ET, LT, HFF and P1 through P10. Each of these flip flops are of the leading edge triggered type discussed above. The purpose of the flip flops and registers listed above are set forth in Table 53 and should be referred to for a better understanding of the purpose of registers and flip flops.

Selection circuit DS1 through DS5 are provided for gating eight binary coded bits of information from the inputs shown along the upper side to a single 8 binary bit output along the lower side. The selection circuits are of the same type discussed hereinabove and need not be considered in more detail at this point.

A conventional OR gating circuit 1726 is provided. In addition, logic is used to represent logical gating circuits as discussed in more detail hereinabove. A clock suspension logic circuit 1722 provides signals to the CS input of a generalized clock control 700 for suspending the operation in the manner discussed in more detail hereinbelow.

Switches 1740 and 1742 are provided for forming binary code of signals representing the value 255. The switches 1740 and 1742 may be conventional, mechanical or electronic switches which permanently provide these signals at their output or other circuitry well-known in the computer art for this purpose. Input/output control lines and information input/outputs are shown along the right hand side of FIGS. 65 and 66. Single lines are depicted by the thin line whereas multiple lines for carrying eight binary bits of information are depicted by solid line.

C. Detailed Description

Figure 67:
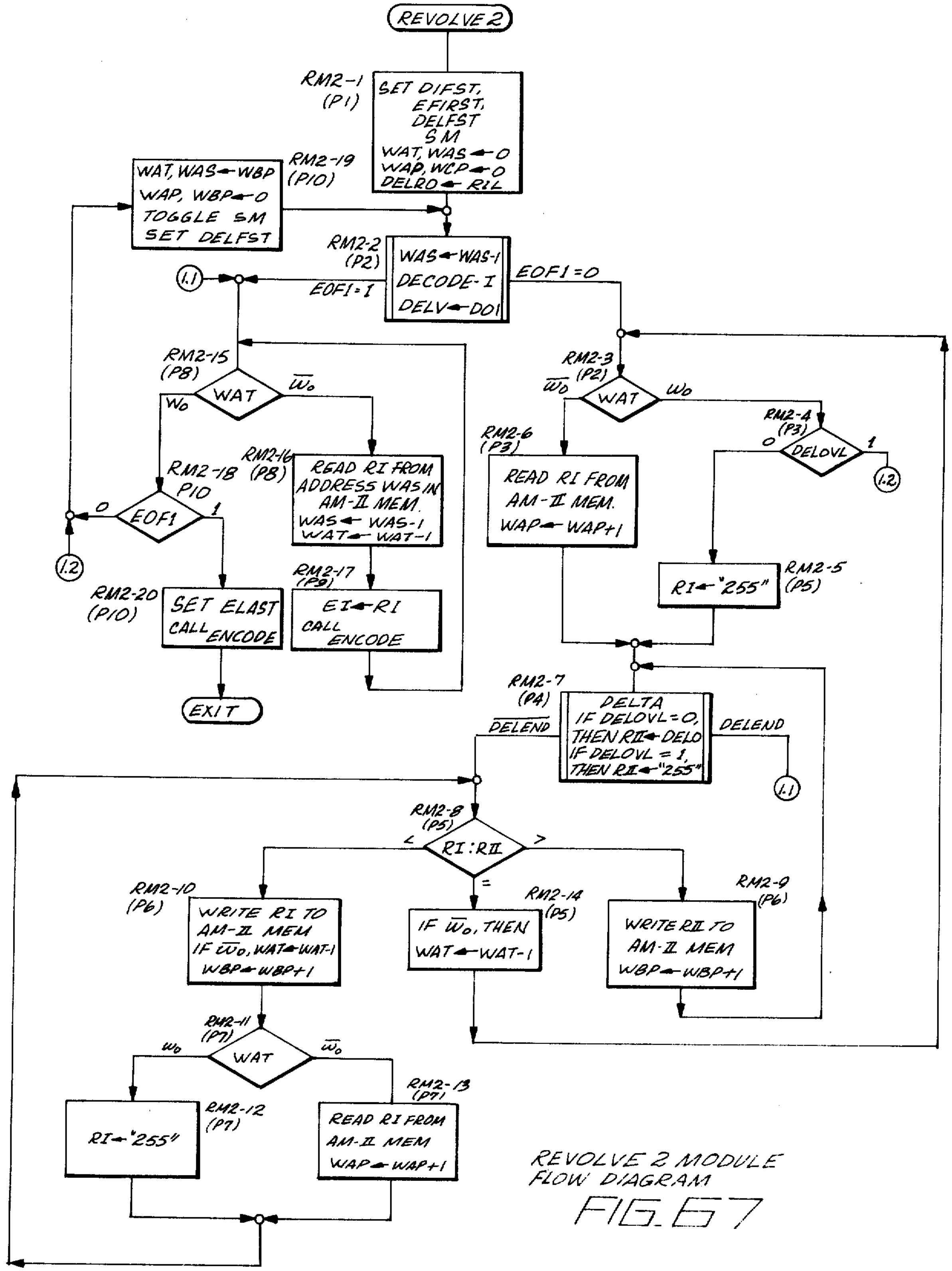
FIG. 67 is a flow diagram for the REVOLVE 2 MODULE.

Consider now the REVOLVE 2 MODULE in more detail making reference to the schematic and block diagram of FIG. 65 and FIG. 66 and a flow diagram of FIG. 67. A better understanding of the REVOLVE 2 MODULE can also be obtained by making reference to Tables 53 and 54 which give the principal registers, counters and flip flops and the principal inputs and outputs of the REVOLVE 2 MODULE. At the outset, it sould be noted that the system, in general processes event occurrence vectors from largest to smallest values therein. However, it should be noted that the DELTA 2 MODULE provides the occurrence values from lines of the delta in reverse order from smallest to largest value, i.e., from left to right. Also, the intermediate results referred to in connection with Table 52 are stored in order from lowest to largest value. However, when writing out the occurrence values representing the new line of the iso-entropicgram, the occurrence values are desirably written out to the MEMORY MODULE, via the ENCODE MODULE, largest to smallest value to be consistent with the rest of the system.

In this connection, the REVOLVE 2 MODULE has two registers, WAP and WBP, which are the read and write pointers respectively for the AM II MEMORY. A reverse read register WAS is provided for storing the address of the largest occurrence value written into the AM II MEMORY after one complete line for the delta has been provided by the DELTA 2 MODULE. Additionally, a register WAT is provided for storing the number of entries, i.e., occurrence values, in the corresponding area of the AM II MEMORY. On the subsequent cycle, the occurrence values from the intermediate result contained in the AM II MEMORY are read from smallest to largest occurrence (left to right), and each time the WAT register is counted down by one value as the DELTA 2 MODULE provides its value to the REVOLVE 2 MODULE. When the DELTA 2 MODULE reaches the occurrence value for a delta line, it forms a true signal at the DELEND output which is an input to the REVOLVE 2 MODULE. Using the WAS register as a pointer to the area of the AM II MEMORY containing the rest of the intermediate result, the previously stored intermediate result is read out moving from largest to smallest occurrence value. Each time a value is read out, the WAT counter is also counted down by one value until it reaches 0. Each occurrence value of the intermediate result read out is provided to the MEMORY MODULE for storage via the ENCODE MODULE. In this manner, the REVOLVE 2 MODULE provides the final occurrence values for the desired line of the iso-entropicgram to the MEMORY MODULE for storage in decreasing value order.

Refer now more specifically to the schematic and block diagram and flow diagram of the REVOLVE 2 MODULE shown in FIGS. 65, 66 and 67. Considering the general operation, initially one of the calling modules SEED 2 or OUTPUT 2 cause the number of lines to be revolved value to be stored into the input of the RIL register. The number of lines to be revolved value is received either from the SLINE register of the SEED 2 MODULE or the OP output from the OUTPUT 2 MODULE. During RM2-1 of the flow, register DELRO of the DELTA 2 MODULE stores the number of lines to be revolved value from the RIL register of the REVOLVE 2 MODULE. Additionally, during RM2-1 the pointer registers WAT, WBP, WAP and WS are all reset to 0 and the initialization flip flops for the DECODE 1 MODULE, the DELTA 2 MODULE and the ENCODE MODULE are all reset to 1. . In this connection, the D1FST flip flop of the DECODE 1 MODULE and the EFIRST flip flop of the ENCODE MODULE and the DELFST flip flop of the DELTA 2 MODULE are all set to 1 states. Additionally, the SM flip flop in the AM II MEMORY is set to 1 causing memory area II to be the initial area for writing in the AM II MEMORY.

During RM2-2, pointer register WAS is counted down by 1. The purpose of this step is now explained. The first time through the flow, this operation has no useful purpose. However, in later stages of the operation, register WAS is loaded with the content of the WBP write ponter register. The WBP write pointer register now is pointing to the next address in the AM II MEMORY to be written following the end of writing one of the intermediate results in the AM II MEMORY. Therefore, it is necessary to decrease the value therein by 1 so that it actually contains the address of the last occurrence value written into the AM II memory of an intermediate result.

Also during RM2-2, the DECODE 1 MODULE is called causing it to provide the next occurrence value, in order from largest to smallest, of the event occurrence vector representing the input line which is to be revolved. The DECODE 1 MODULE provides the occurrence value in absolute code and it is first stored in the DO1 register of the DECODE 1 MODULE and then transferred to the DELV register of the DELTA 2 MODULE. This value is DELV then becomes the shift value specifying the number of occurrence values by which each of the occurrence values from the line of the delta are to be incremented or shifted. The EOF1 flip flop when in a 0 state indicates that the DECODE 1 MODULE has not reached the end of the field of the input line. Assuming the E0F1 flip flop is in a 0 state, RM2-3 through RM2-6 are then entered.

During RM2-3 through RM2-6 a determination is made as to whether there is anything in the current read area of the AM II MEMORY to be read. If the WAT pointer register, which is an indication of the number of occurrence values remaining to be read is 0 ($W_0$), as it is the first time through the REVOLVE 2 MODULE, RM2-4 is entered. If WAT pointer is not 0 ($W_0$), RM2-6 is entered where the occurrence value of the intermediate result contained in AM II MEMORY at the location specified by the read pointer register WAP is read out and stored into the RI register and the read pointer register WAP is decreased by 1 address, RM2-7 of the flow is then entered.

If the WAT pointer is 0 indicating that all occurrence values have been read from the intermediate value and RM2-4 is entered, the DELOVL flip flop is checked to see whether an overflow has occurred in the DELTA 2 MODULE. If an overflow has occurred, i.e., a shifted occurrence value has been formed which is beyond the width of the iso-entropicgram, the DELOVL flip flop will be in a 1 state and RM2-19 of the flow will be entered which states another cycle of operation. Another cycle of operation is started by entering the RM2-19 whenever all of the intermediate values stored in a read area of the AM II MODULE have been read and all of the shifted values (within the width of the iso-entropicgram) have been provided from the DELTA 2 MODULE.

Returning back to RM2-4, if the overflow flip flop DELOVL is in a 0 state indicating an overflow has not occurred in the DELTA 2 MODULE, RM2-5 is entered where the maximum possible occurrence value for the eight bit wide register structure of the machine is stored into the RI register. To be explained in more detail in the subsequent operation, the maximum value of 255 is used to properly sequence the operation of the machine. RM2-7 is now entered.

During RM2-7, the DELTA 2 MODULE is called by the REVOLVE 2 MODULE during which the operation of the REVOLVE 2 MODULE is suspended. If the DELTA 2 MODULE detects an overflow condition and sets the DELOVL flip flop, the maximum value of 255 is stored into the register RII. If no overflow condition is detected and flip flop DELOVL is not in a 1 state, and if the last occurrence value of the delta line being formed by the DELTA 2 MODULE is not presently being formed, the DELEND flip flop will be in a 0 state causing a true signal at the $\overline{\text{DELEND}}$ output and causing the next occurrence value of the delta line being formed in DELO by the DELTA 2 MODULE to be transferred into register RII of the REVOLVE 2 MODULE and RM2-8 of the flow is entered.

During RM2-8 through RM2-13 of the flow, the exclusive or (XOR) operation is performed by the REVOLVE 2 MODULE. To this end, during RM2-8, the content of the RI and RII registers are compared. Register RI at this point stores the intermediate occurrence value from the AM II MEMORY whereas the register RII normally stores the delta line occurrence value from the DELTA 2 MODULE. If the intermediate occurrence value in register RI is greater, since information is being read in increasing order, RM2-9 of the flow is entered where the delta line occurrence value from the RII register is stored into the write area of the AM II MEMORY, at the location specified by write pointer register, and the WBP register is incremented by one address. Then following RM2-9, RM2-7 of the flow is re-entered where the DELTA 2 MODULE is again called causing it to provide the next higher occurrence value from the delta line.

Returning to RM2-8, assume that the comparison indicates that the contents of registers RI and RII are equal. It will be recalled that under these conditions, the exclusive OR function requires that both values be deleted from the result. To this end, RM2-14 of the flow is entered where the pointer register WAT is counted down one to reflect that there has been one value read from the AM II MEMORY and RM2-3 of the flow is entered repeating the subsequent process of the flow.

Returning to RM2-8, assume that the content of register RI is smaller than that of register RII. This indicates that the occurrence value from the intermediate result in AM II MEMORY is less than the new occurrence value obtained from the delta line and accordingly the occurrence value in register RI is written into the write area of the AM II MEMORY and the write pointer register WBP is increased by one so that its points to the next memory location in the write area of the AM II MEMORY into which an occurrence value is to be written.

RM2-11 of the flow is now entered where the state of the WAT pointer register is checked to see if there are any more entries to be read from the AM II MEMORY read area. If the WAT pointer register is not in a 0 state, a true signal is formed at the $\overline{W_0}$ output thereof causing RM2—of the flow to be entered where the next larger occurrence value from the AM II MEMORY read area is read and the WAP pointer register is increased by one.

Returning to RM2-11, if the WAT pointer is 0, a true signal is formed at the $W_0$ output, indicating that all occurrence values of the intermediate result have been read from the read area of the AM II MEMORY and RM2-12 of the flow is entered where the maximum value of 255 is stored into the RI register. Following either RM2-12 or RM2-13, RM2-8 of the flow is re-entered where the exclusive OR process is repeated. The loop through RM2-3 to RM2-14 is repeated until one of two possible exits from the loop occur.

The first possible exit is at RM2-4. If there are no further occurrence values in the delta line which fall within the width of the iso-entropicgram, an overflow condition exists, the DELOVL flip flop is in a 1 state and under these conditions, RM2-19 of the flow is entered where the current state of the write pointer WBP is transferred to the WAS and WAT pointer registers for the purpose discussed above. Also, the content of the WAP and WBP pointer registers are reset to 0 and the SM flip flop in the AM II MEMORY is complemented so that the previous read area becomes the current read area. Subsequently, RM2-2 of the flow is re-entered.

Returning to a point made at the beginning of the present discussion, during RM2-2 the WAS pointer is now decreased or counted down 1 so that it contains the actual address of the last occurrence value written into the previous write area of the AM II MEMORY.

Consider now the other exit from the loop RM2-3 through RM2-14. The second exit occurs from RM2-7 when the DELTA 2 MODULE has formed its last shifted occurrence value of a delta line. When this occurs, a true signal is formed at the DELEND output of the DELEND flip flop causing RM2-15 of the flow to be entered where a check is made to determine whether there are any values of an intermediate result remaining to be read from the read area of the AM II MEMORY. If values remain to be read, these values then lie above, or to the right of the last occurrence value generated by the DELTA 2 MODULE, and as discussed above are to be sent as output to the MEMORY MODULE via the ENCODE MODULE. To this end, if the WAT pointer register is not 0, RM2-16 of the flow is entered and the occurrence value in the AM II MEMORY specified by the WAS pointer register is read out and stored into the RI register. Additionally, the number of entries remaining to be read specified by the WAT pointer is decreased by 1 and the reverse read pointer register WAS is decreased by 1 pointing to the next lower occurrence value of the intermediate result which is to be read from the AM II MEMORY. The ENCODE MODULE takes the occurrence value that has been output and converts it into hybrid coded form for storage in the MEMORY MODULE AS discussed hereinabove in connection with the DPM system. The loop from RM2-15 to RM2-17 is repeated as long as there are values from the intermediate result in AM II MEMORY remaining to be read (i.e. the WAT register is not 0).

When all of the values of the intermediate result from the read area of the AM II MEMORY have been read, the WAT pointer register is 0 and a true signal is formed at the $W_O$ output. This causes RM2-18 to be entered following RM2-15 where a check is made to determine whether the DECODE 1 MODULE has reached the last occurrence value in the event occurrence value representing the input line. If the last occurrence value has been reached, the EOF1 flip flop is in a 1 state causing a true signal at the EOF1 output and flip flop ELAST in the ENCODE MODULE is set to a 1 state indicating this is the last occurrence value to be encoded following which the ENCODE MODULE is called causing it to write the last occurrence value of the result into the MEMORY MODULE in hybrid coded form. Subsequently, the operation of the REVOLVE 2 MODULE is exited.

However, if during RM2-18 the EOF1 flip flop is not in a 1 state indicating that the occurrence value of the event occurrence vector representing the input line has not been provided by the ENCODE MODULE, RM2-19 of the flow is reentered for another cycle.

With the aforegoing general description of the operation for the REVOLVE 2 MODULE, consider the details of the system depicted in FIGS. 65 and 66 making reference to the flow diagram of FIG. 67. Initially, before operation starts, the DPM INTERFACE MODULE forms a true signal at the MINIT output causing a true signal at the input IN to the generalized clock control 700. This in turn causes a true signal at the MR output of the generalized clock control 700 resetting each of the flip flops P1 through P10 of the control counter 1713 to 0.

Also initially, MEMORY MODULE area 1 is loaded with an event occurrence vector, in hybrid coded form, representing the input line which is to be revolved.

The REVOLVE 2 MODULE operation is then called by the SEED 2 MODULE or the OUTPUT 2 MODULE by forming a true signal at the A2S6 or A2O7 output, respectively. Either causes the OR gate 1720 to form a true signal at the IN input of the generalized clock control 700 which in turn causes the clock signals to commence at the CLK and $\overline{CLK}$ outputs of the clock control 700 and the inverter 1730 respectively. Since all of the flip flops P1 through P10 are in a 0 state, the logic $\overline{P1} + \overline{P2} + - \overline{P10}$ causes the P1 flip flop to be set to a 1 state at the following CLK pulse thereby causing RM2-1 of the flow to be entered. In addition, the SEED 2 MODULE or OUTPUT 2 MODULE forms a true signal at the A2S6 or A2O3 output causing the DS3 selection circuit to couple the number of lines to be revolved value from the SLINE register of the SEED 2 MODULE or from the OP output of the OUTPUT 2 MODULE to the input of the RIL register. The true signal at the A2S7 and A2O4 outputs of the SEED 2 MODULE and the OUTPUT 2 MODULE respectively caused the RIL register to store the number of lines to be revolved value from the SEED 2 MODULE and the OUTPUT 2 MODULE respectively. The true signal at the P1 output causes a true signal at the A2R1 output of the input/output control lines which in turn sets the D1FST flip flop in the DECODE 1 MODULE and the EFST flip flop in the ENCODE MODULE to 1 states, thereby indicating the first call on these modules. In addition, the true signal at A2R1 sets the SM flip flop in AM II MEMORY to a 1 state causing the following write to take place in area 2 of the AM II MEMORY. The true signal at the A2R1 output causes the selection circuit DS1 in the DELTA 2 MODULE to couple the number of lines to be revolved value from the RIL register of the REVOLVE 2 MODULE to the input of the DELRO register of DELTA 2 MODULE and at the following $\overline{CLK}$ pulse, the logic P1.$\overline{CLK}$ becomes true causing a true signal at the A2R2 output of the input/output control lines of the REVOLVE 2 MODULE which in turn causes the number of lines to be revolved valve to be stored from the RIL register into the DELRO register. In addition, the true condition of the logic P1.$\overline{CLK}$ causes a true signal at the A2R3 output of the REVOLVE 2 MODULE which in turn triggers the D1GO multivibrator in the DECODE 1 MODULE calling, for the first time, its operation.

Each time the DECODE 1 MODULE or the DELTA 2 MODULE or the ENCODE MODULE are called, clock suspension logic 1722 applies a true signal at the CS input of the generalized clock control 700 causing it to temporarily inhibit further clock pulses and thereby suspend the operation of the REVOLVE 2 MODULE until the called module has completed its operation.

To this end, the $\overline{D1MEND}$ signal from the DECODE 1 MODULE is now true and accordingly when the $\overline{CLK}$ pulse occurs, the logic $\overline{D1MEND}$.P1.$\overline{CLK}$ becomes true applying a true signal to the CS input of the generalized clock control 700 thereby suspending its operation until the DECODE 1 MODULE has provided the first occurrence value from the event occurrence vector of the input line which is being revolved. When the DECODE 1 MODULE has formed the first occurrence value in DO1 the $\overline{D1MEND}$ output from the DECODE 1 MODULE becomes false, thereby causing a false signal at the CS input to the generalized clock control 700 which in turn causes the clock pulses to be formed again at the CLK and $\overline{CLK}$ output.

In addition, the true signal at the P1 output of the P1 flip flop causes the CLR input of the WAP, WBP, WAS and WAT pointer registers to be true and thereby reset each to a 0 state.

If the $\overline{EOF1}$ output of the DECODE 1 MODULE is true, it indicates that the end of file has not yet been reached by the DECODE I MODULE. Under these conditions, the logic P1.$\overline{EOF1}$ is now true ant the following CLK pulse causes the flip flops P1 and P2 to be set to 0 and 1 states respectively. If on the other hand the end of file has been reached by the DECODE 1 MODULE, a true signal is formed at the EOF1 output thereof causing the logic P1.EOF1 to become true which in turn causes δ8 to be true which in turn causes the P8 or P10 flip flop to be set to a 1 state instead of the P2 flip flop depending upon whether the WAT register has been counted down to 0. However, this operation will be described in more detail subsequently.

Assuming that the P2 flip flop has been set to a 1 state and RM2-2 of the flow is entered, the true signal at the P2 output of the P2 flip flop causes a true signal at the C input of the WAS register causing the possible occurrence value (shift value) therein to be counted down by 1 and the HFF flip flop to be reset to 0. The true signal at the P2 output causes a true signal at the A2R4 output to the DS2 selection circuit of the DELTA 2 MODULE causing the possible occurrence value from DO1 output of the DECODE 1 MODULE to be coupled to the input of the DELV register. In addition, the $\overline{CLK}$ pulse causes the logic P2.$\overline{CLK}$ to become true which causes a true signal at the A2R5 output which in turn clocks the occurrence value into the DELV register of the DELTA 2 MODULE. The DELV register now contains the number specifying the number of shifts required in the delta which is subsequently to be formed. Assuming that overflow has not occurred in the DELTA 2 MODULE and the WAT read pointer register has not been counted down to 0, true signals are formed at the $\overline{DELOVL}$ and $\overline{W_0}$ outputs causing the logic $\overline{DELOVL}$.$\overline{W_O}$.P2 to become true and the following CLK pulse triggers the P2 and P3 flip flops to 0 and 1 states, respectively, thereby causing the actions depicted in RM2-3 and RM2-6 to take place. The logic P3.$\overline{W_O}$ now becomes true causing a true signal at the A2R7 output of the REVOLVE 2 MODULE causing a read operation. In addition, the true signal at the P3 output causes the DS5 selection circuit to couple the address pointer in the WAT pointer register through to the address input of the AM II MEMORY. In addition, the true condition of logic P3.$\overline{W_O}$.$\overline{CLK}$ causes the WAP read pointer register to be counted up by one address.

It should be noted, however, that if the WAT register were 0, it indicates that the last event occurrence value has been read from the AM II MEMORY read area and accordingly a false signal is formed at the $\overline{W_0}$ output. In this case, a read signal is not applied at the A2R7 output of the REVOLVE 2 MODULE, nor is the WAP address pointer counted up. RM2-7 of the REVOLVE 2 MODULE flow is entered. The true condition of logic P3.$\overline{CLK}$ also causes a true signal at the A2R6 output of the REVOLVE 2 MODULE calling the operation of the DELTA 2 MODULE.

The DELTA 2 MODULE at this time forms a true signal at the $\overline{DMEND}$ output causing the logic $\overline{DMEND}$.P3.$\overline{CLK}$ to become true in the clock suspension logic 1722 thereby suspending the operation of the REVOLVE 2 MODULE, as discussed above, until the DECODE 2 MODULE provides the next occurrence value corresponding to the line of the delta being formed. When the DELTA 2 MODULE provides the occurrence value the $\overline{DMEND}$ signal goes false causing the generalized clock control 700 to start forming its clock pulses at CLK and $\overline{CLK}$. Assuming that the end of the line of the delta is not being formed, the logic P3.$\overline{DELEND}$ becomes true causing the P4 flip flop to be set to a 1 state and the P3 flip flop is reset to a 0 state at the following CLK pulse. If the DELTA 2 MODULE has not detected an overflow, i.e., a shifted occurrence value greater than the iso-entropicgram width, a true signal is formed at the $\overline{DELOVL}$ output causing the DS2 selection circuit to couple the occurrence value from DELO of the DELTA 2 MODULE to the input of the RII register and the true signal at the P4 output causes the occurrence value to be loaded into the RII register. If on the other hand an overflow condition had occurred, the true signal is formed at the DELOVL output and the DS2 selection circuit couples the maximum value of 255 from the switches 1742 to the input of the RII register causing it to be stored instead.

Return now to RM2-4 and RM2-5 of the flow. If during the true signal at the P3 output of the control counter 1713 the WAT read pointer register contains a 0, a true signal is formed at the $W_O$ output indicating that there are no intermediate values remaining in the read area of the AM II MEMORY to be read. Accordingly, RM2-4 is entered. If the DECODE II MODULE does not detect an overflow and a true signal is formed at the $\overline{DELOVL}$ output, RM2-5 is entered following RM2-4 where in the manner discussed above, the maximum value 255 is stored from the switches 1742 into the RII register. If on the other hand during the true signal at the P3 output an overflow condition is detected in the DELTA 2 MODULE and a true signal is formed at the DELOVL output, the control counter sets the P10 flip flop to a 1 state causing RM2–19 to be entered.

Return now to the box RM2-7 of the REVOLVE 2 MODULE flow and assume that the end of the delta line has not been reached and accordingly RM2-8 of the flow is to be entered. During RM2-8 through RM2-14, the exclusive OR function is performed by the REVOLVE 2 MODULE. To this end, the true signal at the P4 output of the P4 flip flop in the control counter 1713 receives a true signal and the following CLK pulse sets the P4 and P5 flip flop into 0 and 1 states respectively. The true signal at the P5 output activates the comparitor 1750 causing it to compare the intermediate occurrence value from the AM II MEMORY and the delta occurrence value provided by the DELTA 2 MODULE which values are stored respectively in the RI and RII registers.

Depending on the outcome of the comparison, the GT, ET or LT flip flops are set. Thus, if the intermediate value contained in register RI is greater than, equal to or less than, the value in register RII, but signals are formed at the G, E or L ouputs respectively and at the following CLK pulse the GT, ET or LT flip flops, respectively, are set to a 1 state. Note that following RM2-8 whether RM2-10 or RM2-14 is entered, the WAT read pointer register is counted down by one if the intermediate value in RI is not greater than the value in register RII. Accordingly, the logic $P5.\overline{G}.\overline{W_O}.\overline{CLK}$ causes the WAT register to be counter down by one address.

If the content of registers RI and RII are not equal, a true signal is formed at the $\overline{E}$ output of the inverter 1733. The logic true sign $P5.\overline{E}$ is true and causes the P5 and P6 flip flops of the control counter 1713 to be set to 0 and 1 states respectively, thereby causing RM2-10 of the flow to be entered. The true signal at the P6 output causes the ouput A2R11 of the input/output control lines to be true causing a write operation of the AM II MEMORY.

However, in addition it should be noted that since during RM2-10 the content of register RI is smaller than that of RII, the content of RI is to be written into the AM II MEMORY and accordingly the LT flip flop is now in a 1 state, causing the logic P6.LT to be true. This in turn causes the DS4 selection circuit to couple the content of register RI to the input of the AM II MEMORY and accordingly the AM II MEMORY writes the intermediate occurrence value in register RI into the location specified by the WBP write pointer register. In addition, the true signal at $P6.\overline{CLK}$ causes the WBP write address register to be counted up one so that it now contains the address of the next available memory location for a write.

Returning to RM2-8, assume that the comparison indicated that the intermediate occurrence value in the register RI is greater than that in RII, the GT flip flop is in a 1 state during RM2-9 and accordingly the logic P6.GT is true causing the DS4 selection circuit to couple the occurrence value from the DELTA 2 MODULE out of the RII register to the AM II MEMORY for writing. Note that should the result of the comparison by the comparitor 1750 during RM2-8 result in a detection that the values in RI and RII are equal, then the values are to be deleted and hence are not to be written into the write area of the AM II MEMORY. Accordingly, the logic $\overline{DELOVL}.\overline{W_O}.P5.E$ is true causing the P3 and P5 flip flops to be set to 1 and 0 states, respectively, at the following CLK pulse thereby causing RM2-3 of the flow to be entered.

Returning now to RM2-9, note that after the occurrence value from the DELTA 2 MODULE has been transferred from the register RII to the AM II MEMORY, the logic $P5.GT.\overline{DELEND}$ is true ($\overline{DELEND}$ indicates that the end of line of delta has not been reached). Accordingly, the P4 flip flop is set to a 1 state and the P5 flip flop is reset to a 0 state at the following CLK pulse thereby causing RM2-7 to again be entered where the DELTA 2 MODULE is again called causing the next occurrence value in line to be provided by the DELTA 2 MODULE.

Consider now RM2-10 assuming the comparison during RM2-8 as indicated that the intermediate occurrence value in register RI is the smallest. The LT flip flop is now in a 1 state. Accordingly, the logic P6.LT is true causing the P6 and P7 flip flops to be set to 0 and 1 states respectively, thereby causing RM2-11 to be entered. During RM2-11, the state of the WAT register is checked to determine whether there is anything left in the read area of the AM II MEMORY. To this end, if the WAT pointer register is 0, nothing is left to be read and a true signal is formed at the $W_O$ output. If on the other hand the WAT register is not at 0, a true signal is formed at the $\overline{W_0}$ output. Assume that the WAT pointer register is not 0 and a true signal is formed at the $\overline{W_0}$ output and therefore there are additional intermediate occurrence values to be read from the read area of the AM II MEMORY. RM2-13 of the flow is entered, the logic $P7.\overline{W_0}$ is now true causing a true signal at the A2R7 output of the REVOLVE 2 MODULE thereby causing the AM II MEMORY to perform a read operation using the address contained in the WAP register. To this end, the true signal at the P7 output causes the DS5 selection circuit to couple the address from the WAP register to the address input of the AM II MEMORY. The logic $P7.\overline{W_0}.\overline{CLK}$ becomes true and causes the WAP pointer register to count up the address therein by 1 so that it identifies the next location from which a read is to be affected from the AM II MEMORY. At the same time, the true signal at the $\overline{W_0}$ output causes the DS1 selection circuit to couple the occurrence value read out of the AM II MEMORY to the input of the register RI and the true condition of logic $P7.\overline{CLK}$ causes the occurrence value to be stored into the register RI. If on the other hand the WAT pointer register were already at 0 and therefore no more occurrence values remained in the read area of AM II MEMORY, a true signal would be formed at the $W_0$ output causing the DS1 selection circuit to apply the signals representing the value 255 to the input of the register RI in place of the output from the AM II MEMORY and accordingly the maximum value 255 is stored into the register RI. The true signal at the P7 output causes the P5 flip flop to be set to a 1 state and the P7 flip flop is reset to a 0 state at the following CLK pulse thereby causing RM2-8 to be entered following either RM2-12 or RM2-13.

Consider now the operation during RM2-15 to RM2-16. Flip flop P8 is set to a 1 state during the 1 state of any one of the following flip flops of the control counter, P1, P3, P6, P9 or P10. The δ8 represents the logic end gating indicated at the upper left hand side of FIG. 66. Note that RM2-15 is entered and flip flop P8 is set to a 1 state if either the end of the line of the delta has been reached by the DELTA 2 MODULE, as indicated by a true signal at the DELEND output of the DELTA 2 MODULE, or the DECODE II MODULE has reached the end of field of the event occurrence vector representing the input line as indicated by a true signal at the EOF1 output.

The purpose of RM2-15 through RM2-20 is to determine whether there are remaining occurrence values in the read area of the AM II MEMORY to be encoded by the ENCODE MODULE and written out into the MEMORY MODULE. If the WAT read pointer register is not in a 0 state, a true signal is formed at the $\overline{W_0}$ output indicating there are additional occurrence values in the AM II MEMORY read area to be sent to the ENCODE MODULE. Under these conditions, RM2-16 is entered where a read from the AM II MEMORY read area is performed. To this end, the true signal at the P8 output causes a true signal at the A2R7 output of the REVOLVE 2 MODULE causing the AM II MEMORY to perform a read operation at the location specified by the WAS pointer register. In the connection the DS5 selection circuit responds to the true signal at the P8 output and couples the address in the WAS pointer register to the address input of the AM II MEMORY. Additionally, the logic P8.$\overline{CLK}$ becomes true causing the WAS pointer register to count the address therein down by one. Additionally, the same logic counts the WAT pointer register down by one indicating that one additional value has been read from the read area of the AM II MEMORY. As explained above, the DS1 selection circuit couples the intermediate occurrence value from the AM II MEMORY to the input of the RI register where it is stored.

The logic P9.$\overline{W_0}$ causes the P8 flip flop to be set to a 1 stte and the P7 flip flop is reset to a 0 state at the following CLK pulse thereby causing RM2-17 to be entered. The logic P9.$\overline{CLK}$ now becomes true causing a true signal at the A2R9 output of the REVOLVE 2 MODULE thereby setting the ENGO multi-vibrator to a 1 state, calling the operation of the ENCODE MODULE. Additionally, the occurrence value is coupled from register RI to the input of the ENCODE MODULE and the ENCODE MODULE converts the occurrence value to hybrid code for storage into the MEMORY MODULE.

Return now to RM2-15 and assume that the WAT pointer register is at 0 indicating that there are no remaining intermediate occurrence values in the AM II MEMORY read area. A true signal is now formed at the $W_0$ output. Accordingly, the logic P9.W0 sets the P10 flip flop to a 1 state and resets the P9 flip flop to a 0 state causing RM2-18 to be entered. If the EOF1 flip flop is in a 0 state indicating that the end of the event occurrennce vector representing the input line has not yet been reached, then RM2-19 is entered. During RM2-19, the logic P10.$\overline{EOF1}$.$\overline{CLK}$ is true causing a true signal at the A2R3 output of the REVOLVE 2 MODULE which in turn sets the D1GO multi-vibrtor to a 1 state in the DECODE I MODULE causing the next event occurrence value of the input line to be provided. Additionally, the true signal at the P10.$\overline{EOF1}$ output causes the WAS and WAT pointer registers to store the address contained in the write address register WBP. The logic P10.$\overline{EOF1}$.$\overline{CLK}$ becomes true causing the WBP and WAP write and read address registers to be reset to 0. The true signal at the P10 output also causes the state of the SM flip flop in the AM II MEMORY to be complemented causing the read and write areas of AM II MEMORY to be interchanged during the subsequent operation.

D. Example of Operation

Consider now the example of operation for the REVOLVE 2 MODULE depicted in Tables 51 and 52 and making reference to the schematic and block diagrams of FIGS. 65 and 66 and the flow diagram of FIG. 67. Assume initially that the event occurrence vector 0, 2, 3 and 5 depicted in Table 52 is stored into MEMORY MODULE area 1 by the MINI COMPUTER. In the manner described hereinabove, the true signal at either the A2S7 or the A204 outputs of the SEED 2 MODULE or the OUTPUT 2 MODULE causes the register RIL to store the number of lines to be revolved from the SLINE register of the SEED 2 MODULE or the OP output of the OUTPUT 2 MODLUE. The operation of the REVOLVE 2 MODULE is then called and flow block RM2-1 is initially entered where: the number of lines to be revolved value is stored from the RIL register of the REVOLVE 2 MODULE into the DELRO register of the DELTA 2 MODULE; the address pointer registers WAT, WAP, WBP and WAS are initialized to 0 and the DELFST, D1FST and EFIRST flip flops of the DELTA 2 MODULE, the DECODE 1 MODULE and the ENCODE MODULE are reset to 0; and the SM flip flop in the AM II MEMORY is set so that area 2 will be the write area and area 1 the read area.

RM2-1 of the flow is then entered where the DECODE 1 MODULE is called. Also, address register WAS is counted down one value, however, this is of no consequence at this point in the operation. The DECODE 1 MODULE then returns the first and largest occurrence value of the event occurrence vector. This is a value 5 and it is transferred from the DO1 register of the DECODE 1 MODULE to the DELV register of the DELTA 2 MODULE. It will be recalled that the value 5 stored into the DELV register of the DELTA 2 MODULE specifies a right shift of the delta line of 5.

RM3 is entered where the WAT register is found to contain 0. Accordingly, RM2-4 of the flow is entered.

During RM4, the DELTA 2 MODULE has not encountered an overflow and accordingly the DELOVL input is not true causing RM2-5 to be entered. During RM2-5, the maximum value of 255 is transferred through the DS1 selection circuit and stored into the RI register indicating that there is nothing to be read in the current read area of the AM II MEMORY. RM2-7 is entered where the DELTA 2 MODULE is called. The DELTA 2 MODULE computes the first value of the delta line 3 (see Table 6) shifted five places to the right. Referring to cycle 1 of Table 52, it will be seen that this will be an occurrence value of 5 and the occurrence value 5 is accordingly stored into the RII register. RM2-8 is now entered and the exclusive OR function is about to be performed. During RM2-8, the comparitor 1750 compares the content of registers RI and RII and it is found that the maximum value of 255 in register RI is the larger. Accordingly, RM2-9 is entered where the smaller delta line value of 5 is stored into the AM II MEMORY area 2 at location 0 as specified by the address in the WBP pointer register. Additionally, the address in the WBP register is counted up to address one.

RM2-7 is now entered where the operation of the DELTA 2 MODULE is called causing it to provide the second shifted delta occurrence value 6 for line 3. The value 6 is stored into register RII. RM2-8 et. sequence is again entered for the exclusive OR operation. Again, the comparitor 1750 detects that the maximum value 255 in register RI is larger than the value 6 in register RII. Accordingly, RM2-9 and RM2-7 are again entered where the occurrence value 6 is written out into address 1 of the AM II MEMORY area 2 at address one as specified by the WBP address register. Also, the WBP register is counted up to address 2. The DELTA 2 MODULE reads out the next shifted delta occurrence value 7 from the delta line 3. This value is stored into the register RII and subsequently RM2-8 and RM2-9 are entered where the value of 7 is written from the register RII into the AM II MEMORY and the WBP counter is counted up to address 3.

During RM2-7, the DELTA 2 MODULE detects the next occurrence value from the shifted delta line is 8 and is outside of the iso-entropicgram width. Accordingly, it forms a true or overflow signal at the DELOVL output which causes the DS2 selection circuit to couple the maximum value 255 from the switches 1742 to the input of the register RII where the maximum value is stored.

RM2-8 is now entered. Since a true signal exists at DELOVL register RII stores the maximum value 255 and the contents of registers RI and RII are found equal (both contain 255) causing RM2-14 and RM2-3 to be entered. Since the WAT register now contains a 0 indicating there is nothing to be read from the AM II MEMORY, the true signal at the $W_0$ output prevents the WAT counter from being counted down during RM2-14.

During RM2-4, the DELVOL output is still true. Accordingly, RM2-19 is entered.

During RM2-19, the address 3 contained in the WBP write address register is transferred into the WAT and WAS registers, the WBP and WAP registers are reset to 0 and the SM flip flop in the AM II MEMORY is complemented causing the read and write areas to interchange and the DELFST monostable in the DECODE 1 MODULE is set calling the operation of the DECODE 1 MODULE.

At this point in time, the AM II MEMORY contents, the WAS and WAT register contents and the output to the ENCODE MODULE are as follows:

| II MEM - area 2 | | | |
|---|---|---|---|
| Address | Contents | | Output to ENCODE MODULE |
| 0 | 5 | | |
| 1 | 6 | WAS = 3 | None |
| 2 | 7 | WAT = 3 | |

Thus, the WAS register now contains address 3 which is one above the last address in which a write occurred in the AM II MEMORY and the WAT register indicates that 3 intermediate values were written into the AM II MEMORY write area during the previous cycle. RM2-2 is now entered where the address in register WAS is counted down by 1 so that it now contains address 2 which is the last occurrence value of the intermediate values stored in the AM II MEMORY area. The memory area which was previously the write are is now the read area. The second cycle of operation is now entered.

During RM2-2 the DECODE 1 MODULE returns the next lower occurrence value of 3 from the event occurrence vector and the value of 3 is stored into register DELV of the DELTA 2 MODULE.

RM2-3 is entered and since the WAT register now contains a 3, it is not 0 and accordingly a true signal is formed at the $\overline{W_0}$ output. RM2-6 is now entered where a signal goes out to the AM II MEMORY causing it to read out the value 5 contained in address 0 specified by the address register WAP and subsequently the WAP register is counted up by 1 address to address 1. The value of 5 is stored into the register RI and subsequently RM2-7 of the flow is entered.

During RM2-7 the DELTA 2 MODULE is called and, with reference to Table 52, provides the shifted delta occurrence value of 3. The intermediate occurrence value of 5 in register RI from the read area of the AM II MEMORY is larger than the shifted delta line value of 3 in register RII. Accordingly, the flow goes through RM2-8 to RM2-9 where the smaller value 3 in register RII is written into address 0 of the write area in the AM II MEMORY.

RM2-7 is now re-entered where the occurrence value 4 from line 3 of the delta is provide by the DELTA 2 MODULE and stored into register RII. RM2-8 is re-entered and the exclusive OR function is reperformed. It is found that the intermediate occurrence value 5 in register RI is greater than the shifted delta line value of 4 in register RII. Accordingly, RM2-10 is entered where the smaller value 4 is written into the AM II MEMORY at address 1 as specified by the write address register WBP. Subsequently, the WBP write address register is incremented by 1 to address 2.

Following RM2-9, RM2-7 is re-entered where the DELTA 2 MODULE provides the next shifted delta occurrence value of 5 and the value is stored into the register RII.

This time during RM2-8, as the exclusive OR function is performed, it is found that the intermediate value 5 in register RI is equal to the shifted delta occurrence value 5 in register RII. Accordingly, RM2-14 is entered where these values are simply dropped by not writing them into the AM II MEMORY write area and by counting the WAT counter down by 1 value indicating that the number of entries has now been decreased by 1.

RM2-3 is now entered with WAT now containing address 2. Since WAT does not contain 0, a true signal is formed at the $W_0$ output causing RM2-6 to be entered. During RM2-6, the next intermediate value of 6 is read from address 1 of the AM II MEMORY as specified by the WAP counter and the WAP counter is incremented by 1 to address 2. The intermediate occurrence value of 6 is stored into the register RI. RM2-7 is now entered where the operation of the DELTA 2 MODULE is called causing the next higher shifted delta occurrence value 6 to be formed and stored into register RII.

RM2-8 et sequence is now entered where the exclusive OR function is again performed. Again, it is found that the occurrence values of 6 in registers in RI and RII are equal. Accordingly, RM2-14 is entered where these values are deleted and the WAT counter is counted down by 1 to indicate that only 1 value remains in the AM II MEMORY read area.

RM2-3 is re-entered and since WAT is not 0, a true signal is formed at the $W_0$ output causing RM2-6 to be re-entered where the last remaining intermediate value of 7 is read out from address 2 of the AM II MEMORY read area and the WAP register is counted up to address 3. The intermediate value of 7 is stored in the RI register.

RM2-7 is re-entered where the DELTA 2 MODULE is recalled. The DELTA 2 MODULE has provided the last shifted delta occurrence value of the delta line 3 and accordingly a true signal is now being formed at the DELEND output thereof, causing RM2-15 of the flow to be entered.

During RM2-15, the WAT register contains a 1 and is therefore not 0, indicating that there is 1 value left to be read from the AM II MEMORY. Accordingly, RM2-16 is entered where, using address 2 in the WAS address register, the AM II MEMORY read area is read. This address contains the value 7 and it is stored into the register RI temporarily before it is transferred to the ENCODE MODULE. Additionally, the WAS and WAT registers are counted down by 1 so that they contain a 1 and a 0 respectively. RM2-17 is now entered where the intermediate value 7 contained in register RI is transferred to register EI of the ENCODE MODULE and the ENCODE MODULE operation is called causing the intermediate occurrence value of 7 to be encoded into hybrid coded form for storage into the MEMORY MODULE.

RM2-15 is now re-entered. This time the WAT register is found to be 0. Accordingly, a true signal is formed at the $W_0$ output causing RM2-18 to be entered. Since the DECODE 1 MODULE has not reached the end of the event occurrence vector, a true signal is formed at the $\overline{EOF1}$ output causing RM2-19 to be re-entered. At this point, the address of 2 contained in the write address register WBP is stored into the WAS and WAT registers and the WAP and WBP registers are reset to 0. Additionally, the SM flip flop in the AM II MEMORY is complemented causing the read and write areas to interchange. Thus, the AM II MEMORY area 2 becomes the write area and area 1 becomes the read area. At this point, the AM II MEMORY, the WAS and WAT registers and the output to the ENCODE MODULE are as follows:

AM II MEM - area 2

| Address | Contents | | Output to ENCODE MODULE |
|---|---|---|---|
| 0 | 3 | WAS = 2 | 7 |
| 1 | 4 | WAT = 2 | |

The third cycle of operation back through RM2-19 and RM12-2 et sequence is now entered. During RM2-2, the WAS register is counted down so that it now contains address 1 which, with reference to the data shown above, is the address in the AM II MEMORY area 1 where the intermediate occurrence value of 4 is stored. Additionally, the DECODE 1 MODULE provides the next lower occurrence value of 2 and it is loaded into the DELV register of the DELTA 2 MODULE causing delta line 3 to be formed shifted this time by only 2 occurrence values.

RM2-3 is now entered and since the WAT register does not contain 0, the true signal at the $\overline{W_0}$ output causes RM2-6 to be entered. During RM2-6, the AM II MEMORY area 1 has its address 0 read out and stored into register RI. The value 3 is contained in address 0. Accordingly, register RI now contains the intermediate occurrence value of 3.

RM2-8 et sequence is now entered where the exclusive OR function is performed. During RM2-8, it is found that the shifted delta occurrence value of 3 contained in register RI is greater than the occurrence value of 2 provided from the event occurrence vector of the input line. Accordingly, RM2-9 is entered where the smaller value 2 is written out into the AM II MEMORY at address 0 and the WBP write address register is increased to 1.

RM2-7 is now re-entered causing the operation of the DELTA 2 MODULE to be called causing it to provide the next higher shifted delta occurrence value of 3 from the line 3 of the delta. RM2-8 et sequence is again entered for the exclusive OR operation. At this point, registers RI and RII both contain a 3 and are therefore equal. Accordingly, RM2-14 is entered where the value of 2 in the WAT register is decreased by 1 and thereby eliminating the occurrence value of 3 from the output. RM2-3 is re-entered. Register WAT now contains a 1. Accordingly, a true signal is formed at the $\overline{W_0}$ output causing RM2-6 to be entered. During RM2-6, the intermediate occurrence value 4 is read from the AM II MEMORY area 1 from address 1 and the value is stored into the register RI. Additionally, the WAP read address is counted up by 1 to address 2. RM2-7 is re-entered where the DELTA 2 MODULE is called causing the next shifted delta occurrence value of 4 to be provided and stored into register RII.

The exclusive OR function is now performed and during RM2-8 it is found that the values of 4 in registers RI and RII are equal. Accordingly, RM2-14 is re-entered where the WAT counter is counted down to 0.

RM2-3 of the flow is re-entered and there is found that the WAT register is 0. Accordingly, RM2-4 is entered. During RM2-4 an overflow conditions does not exist in the DELTA 2 MODULE and, accordingly, a true signal is formed at the $\overline{DELOVL}$ output. Accordingly, RM2-5 is entered where the maximum value of 255 is stored into the register RI. RM2-7 of the flow is now re-entered where the DELTA 2 MODULE is called causing the next higher shifted delta occurrence value of 5 to be provided and stored into the register RII.

During the exclusive OR function of RM2-8 et sequence, it is found that the value in register RI is larger and therefore RM2-9 is entered where the smaller value of 5 in register RII is stored into the AM II MEMORY write area at address 1.

RM2-7 is now entered where the DELTA 2 MODULE is called. Since the last shifted delta occurrence value has been provided, a true signal is formed at the DELEND output causing Rm2-15 of the flow to be re-entered.

During RM2-15, the register WAT contains a 0. Accordingly, a true signal is formed at the $W_0$ output causing RM2-18 to be entered. During RM2-18, the EOF1 flip flop is in a 0 state indicating that the DECODE 1 MODULE has not reached the end of the event occurrence vector for the input line. Accordingly, RM2-19 is re-entered.

During RM2-18, the WAT and WAS registers are loaded with the address 2 from the WBP register and the WAP and WBP registers are reset to 0; the SM flip flop is complemented in the AM II MEMORY causing the area 2 to be the new read area and area 1 to be the new write area. At this point in time, the AM II MEMORY and the WAS and WAT registers and the output provided to the ENCODE MODULE to this point are as follows:

AM II MEM - area 2

| Address | Contents | | Output to Encode Module |
|---|---|---|---|
| 0 | 2 | WAS = 2 | 7 |
| 1 | 5 | WAT = 2 | |

Cycle 4 is now entered.

During Rm2-2, the address in the WAS register is counted down by 1 so that it now contains address 1 which is the location of the last intermediate occurrence value contained in the read area 2. Additionally, the DECODE 1 MODULE is called causing it to provide the last occurrence value 0 from the event occurrence vector of the input line. The occurrence value 0 is stored into the DELV register of the DELTA 2 MODULE. Therefore, the DELTA 2 MODULE will provide line 3 of the delta unshifted. RM2-3 is now entered and because the WAT register contains a value of 2, a true signal is formed at the $W_0$ output causing RM2-6 to be entered. During RM2-6, the value of 2 is read from memory area 2 from address 0 (specified by the read address register WAP) and the WAP register is incremented to address 1.

During RM2-7, the DELTA 2 MODULE is called causing the occurrence value 0 from line 3 of the delta to be formed and stored into the register RII. The intermediate value 2 in register RI is greater than the value 0 in register RII. Accordingly, Rm2-9 is entered where the value 0 is written into the address 0 of the write address area 2 of the AM II MEMORY and the WBP register is counted up to address 1.

RM2-7 is re-entered causing the DELTA 2 MODULE to again be called. The DELTA 2 MODULE now provides the occurrence value 1 from line 3 of the delta and the value 1 is stored into register RII. During the XOR operation of RM2-8 et sequence, RI contains a value 2 and is therefore larger than the 1 contained in register RII causing RM2-9 to be re-entered. The value of 1 in register RII is now written out into the right area of the AM II MEMORY and the WBP register is increased by 1. The DELTA 2 MODULE is subsequently called again causing the next higher shifted delta occurrence value 3 of line 3 to be stored into the register RII. During the exclusive OR operation of RM2-8 et sequence, it is found that the content of registers RI and RII are both 2 and therefore must be dropped. Accordingly, the WAT counter is decreased from 2 to 1 and Rm2-3 is re-entered. Since the WAT register still is not 0, RM2-6 and 7 are re-entered where the intermediate value of 5 from address 1 of the AM II MEMORY is read and stored into the register RI and the DELTA 2 MODULE provides the next higher shifted delta occurrence value of 3 for storage in register RI.

During the exclusive OR operation of Rm2-8 et sequence, the value of 5 in register RI is the larger and therefore the value of 2 from register RII is stored into the AM II MEMORY and the WBP write counter is increased to address 2. RM2-7 is re-entered where the DELTA 2 MODULE is again called. However, at this point, the DELTA 2 MODULE has provided the complete line of shifted occurrence values from line 3 of the delta and a true signal is formed at the DELEND output of the DELTA 2 MODULE so indicated. This causes RM2-15 of the flow to be re-entered. The WAT register now contains a value of 2 and therefore is not 0 causing a true signal at the $\overline{W_0}$ output. This causes RM2-16 to be entered. The WAS register now contains address 1. Accordingly, address 1 of the AM II MEMORY area 2 is read. This address contains the value 5 and accordingly is stored into the register RII and subsequently during RM2-17 is provided to the ENCODE MODULE for encoding into hybrid form for storage into the MEMORY MODULE. Additionally, the WAS and WAT registers are decreased by 1 so that both now contain a 0. RM2-15 is now re-entered.

Since the WAT register now contains a 0, a true signal is formed at the $W_0$ output causing RM2-18 to be entered. During RM2-18, the EOF1 flip flop is in a 0 state indicating that the end of the event occurrence vector for the input line has not been read by the DECODE 1 MODULE. Accordingly, RM2-19 is entered. During RM2-19, the address 3 contained in the WBP write address register is stored into the WAS and WAT registers and the WAP and WBP registers are reset to 0. Additionally, the SM flip flop in the AM II MEMORY is complemented causing area 1 to become the new read area and area 2 to become the new write area. Thus, at this point, the AM II MEMORY, the WAS and WAT register contents and the output to the ENCODE MODULE are as follows:

AM II MEM - area 2

| Address | Contents | | Output to Encode Module |
|---|---|---|---|
| 0 | 0 | WAS = 3 | 7 |
| 1 | 1 | WAT = 3 | 5 |
| 2 | 3 | | |

During Rm2-2, the WAS register is reduced from 3 to 2 which is the address of the last intermediate value in the AM II MEMORY read area 1. The DECODE 1 MODULE now is called and since the last event occurrence vector has been provided, it returns a true signal at the EOF1 output indicating that the end of field of the event occurrence vector has been encountered. Accordingly, RM2-15 is entered. The WAT counter contains a 3 and therefore forms a true signal at the $\overline{W_0}$ output. Accordingly, Rm2-16 is entered where the value 3 identified by address register WAS is read from the AM II MEMORY and stored into the register RI and subsequently is transferred to the ENCODE MODULE for encoding in hybrid coded form. Additionally, the WAS address register is decreased from address 2 to 1 and the WAt register is decreased from 3 to 2.

RM2-15 is re-entered and a true signal is still formed at the $\overline{W_0}$ output causing RM2-16 and RM2-17 to be re-entered where the next lower intermediate value of 1 is read out, transferred to the ENCODE MODULE for encoding to hybrid coded form and the WAS and WT registers are decreased to 0 and 1 respectively. RM2-15 is entered at this point. A true signal is still formed at the $\overline{W_0}$ output. Therefore, RM2-16 and RM2-17 ae re-entered where the next lower intermediate value of 0 is read out from the AM II MEMORY read area 1 and transferred to the ENCODE MODULE for encoding to hybrid coded form. Additionally, the WAT register is decreased by 1 to 0.

RM2-15 is now re-entered where the WAT register is found to contain a 0 and a true signal is formed at the $W_0$ output causing RM2-18 to be entered. The ENCODE MODULE has reached the end of file. Accordingly, a true signal is being formed at the EOF1 output causing RM2-20 to be entered. During RM2-20, the logic P10.EOF1 is true, causing a true signal at the A2R10 output which in turn causes the flip flop ELAST in the ENCODE MODULE to be set to a 1 state thereby calling the operation of the ENCODE MODULE for the last time causing it to completely encode the last occurrence value and provide it to the MEMORY MODULE for storage in hybrid coded form.

At this point, the MEMORY MODULE contains the following occurrence values 7, 5, 3, 1, 0. The occurrence values of course are in hybrid coded form. With reference to Table 52, it will be seen that this is the event occurrence vector of the input line revolved down by 3 lines.

XXIV. REVOLVE 3 MODULE

A. General Description

Figure 69:
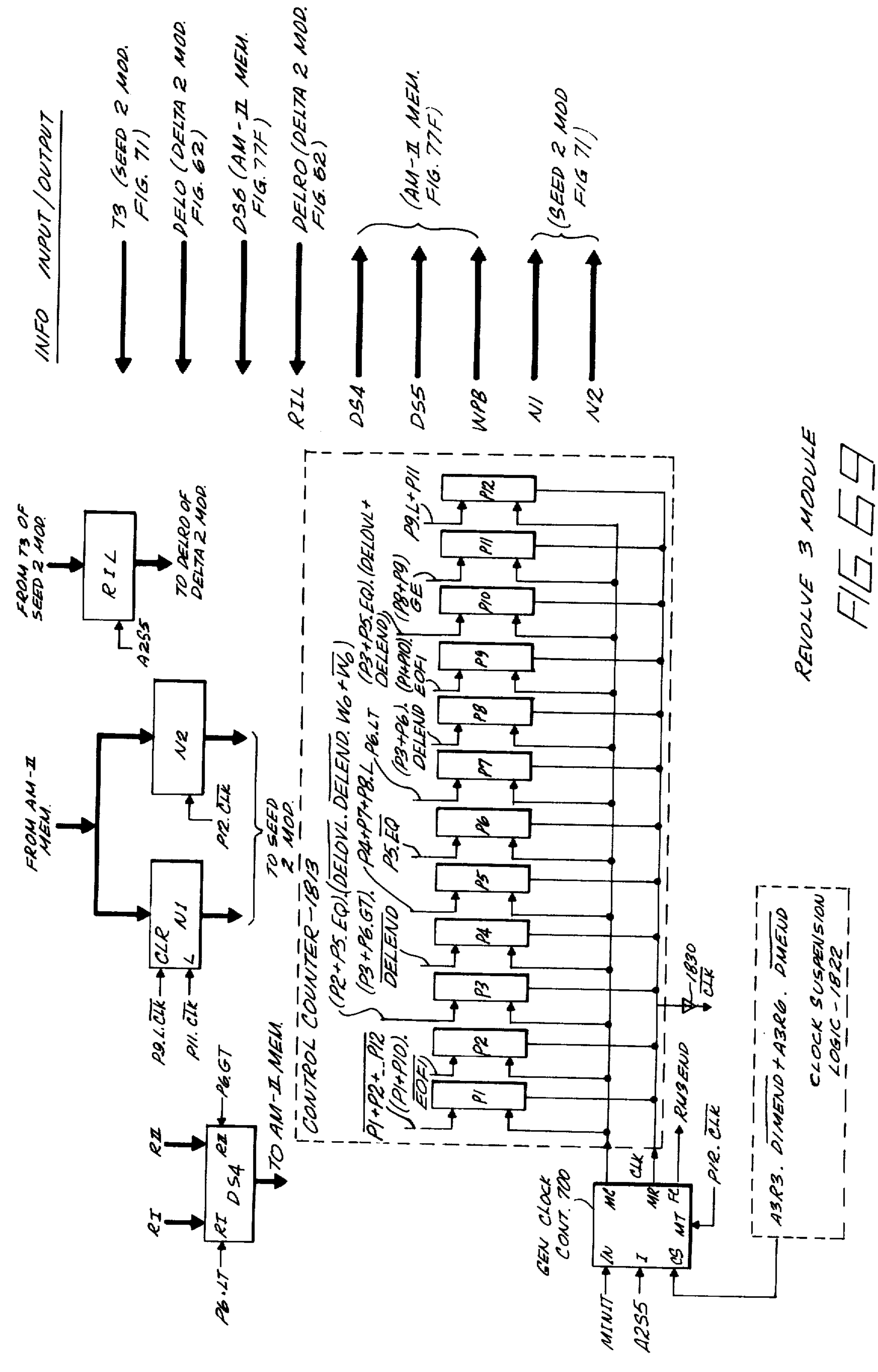
Figure 70:
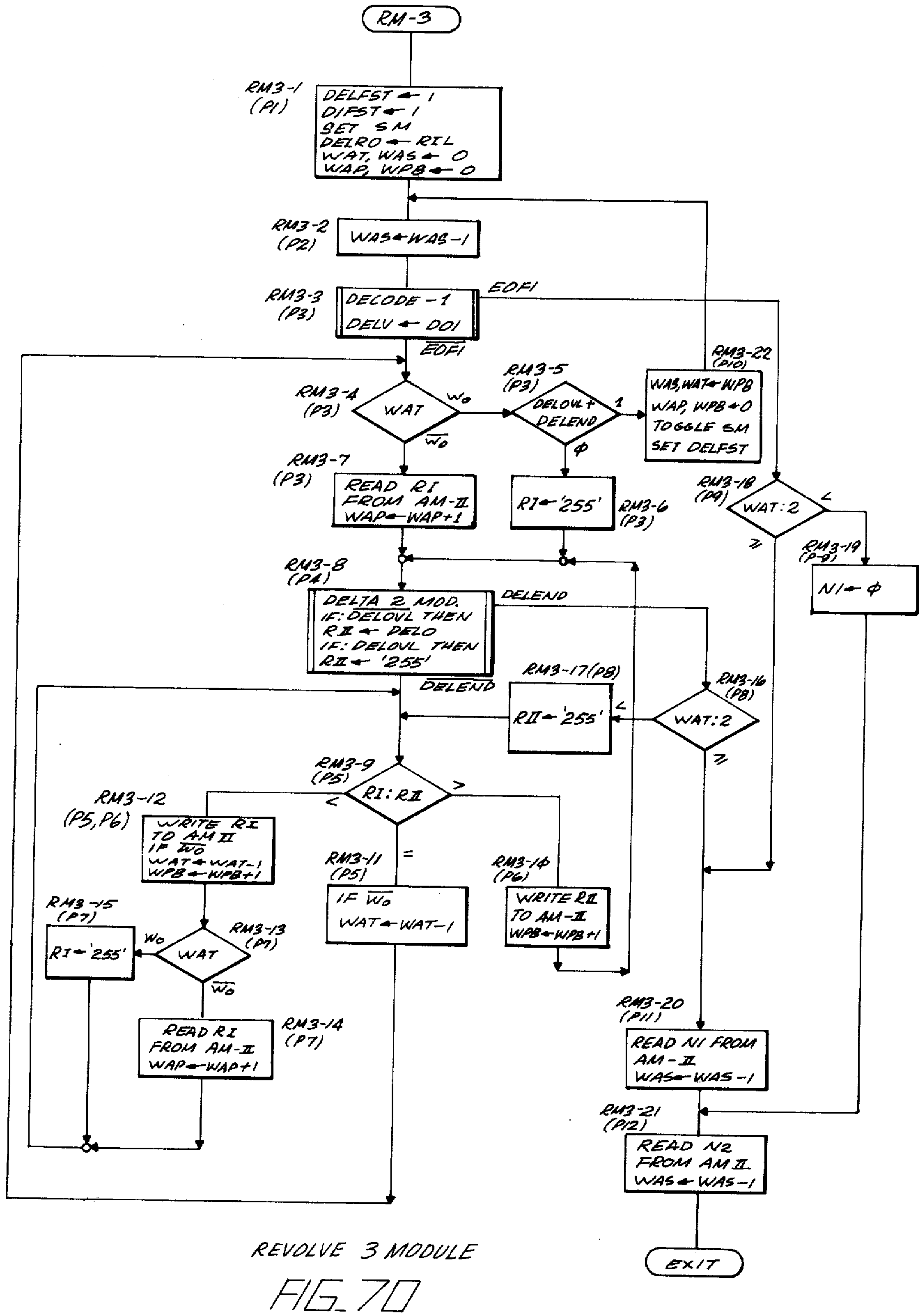
FIG. 70 is a flow diagram for the REVOLVE 3 MODULE.

The REVOLVE 3 MODULE depicted in the schematic and block diagram of FIGS. 68 and 69 and the flow diagram of FIG. 70 is quite similar to the REVOLVE 2 MODULE with the differences noted below. The purpose of the REVOLVE 3 MODULE is to facilitate the fast seed finding operation of the SEED 2 MODULE. The structure and sequence of the fast seed finding process is presented in greater detail in connection with the SEED 2 MODULE. However, for purposes of understanding the REVOLVE 3 MODULE, it should be noted that the SEED 2 MODULE has a fast seen finding procedure in which only the last two actual occurrence values in any line of an iso-entropicgram are used to determine the number of lines by which a revolve is to take place to locate the next line in the process of locating the seed. To this end the REVOLVE 3 MODULE starts generating a line specified by the SEED 2 MODULE until it has generated two actual occurrence values which will no longer be altered by XORing with a subsequent line provided by the DELTA 2 MODULE. It has been pointed out in connection with the REVOLVE 2 MODULE that the revolve takes place by generating a number of intermediate values and that the intermediate values are recorded into the AM-II MEMORY. Also those intermediate values to the right or at the largest end of the intermediate value are output to the ENCODE MODULE if they are such that they will no longer be altered during XORing with subsequent lines provided by the DELTA 2 MODULE. Once this condition is reached, the last two or largest two occurrence values in the line are sent to the calling module which is the SEED 3 MODULE. In contrast to the REVOLVE 2 MODULE, the values are not output to the ENCODE MODULE for hybrid coding and storage in the MEMORY MODULE.

The primary distinction between the REVOLVE 3 MODULE and the REVOLVE 2 MODULE will now be outlined. With reference to the REVOLVE 2 MODULE flow diagram of FIG. 67 it will be noted that following Rm3-8 and if a true signal is formed at output DELEND by the DELTA 2 MODULE (signaling the last delta line value or shifted Delta line value is being formed by the DELTA 2 MODULE), RM2-15 is entered. The purpose for which the REVOLVE 2 MODULE enters RM2-15 is to output to the ENCODE MODULE those occurrence values which will not be affected or changed in the exclusive OR operation by subsequent lines formed by the DELTA 2 MODULE. However, in the REVOLVE 3 MODULE, the values are not output to the ENCODE MODULE. Instead, the REVOLVE 3 MODULE determines whether the WAT pointer content is greater than 2. If greater than 2, it indicates that there are two values in the AM-II MEMORY and they are transferred to registers N1 and N2 and subsequently transferred to the SEED 2 MODULE. If there are less than two values, the maximum value of 255 is stored into register RII and the REVOLVE 3 MODULE goes back to the exclusive OR operation depicted at RM3-9 et seq. In this manner, the REVOLVE 3 MODULE insures that every value in the read area is transferred over to the write aea of the AM-II MEMORY before the SM flip flop is complemented to interchange the read and write areas.

Note in the REVOLVE 2 MODULE flow diagram of FIG. 67 that if the end of file is reached by the DECODE I MODULE, as indicated by the EOF1 flip flop in a 1 state, RM2-15 is entered for transferring occurrence values from the read area of the AM II MEMORY to the ENCODE MODULE for output. However, in the REVOLVE 3 MODULE, if the EOF1 flip flop is in a 1 state and the WAT pointer is not greater than 2, the N1 register is set to 0. By the nature of the REVOLVE 3 MODULE, there is at least one value. Therefore, if the WAT pointer is less than 2, it must be 1.

After register N1 is set to 0, RM3-21 is entered where an intermediate value is read from the AM II MEMORY and is stored into the N2 register. Exit is then taken.

B. Components

Figure 68:
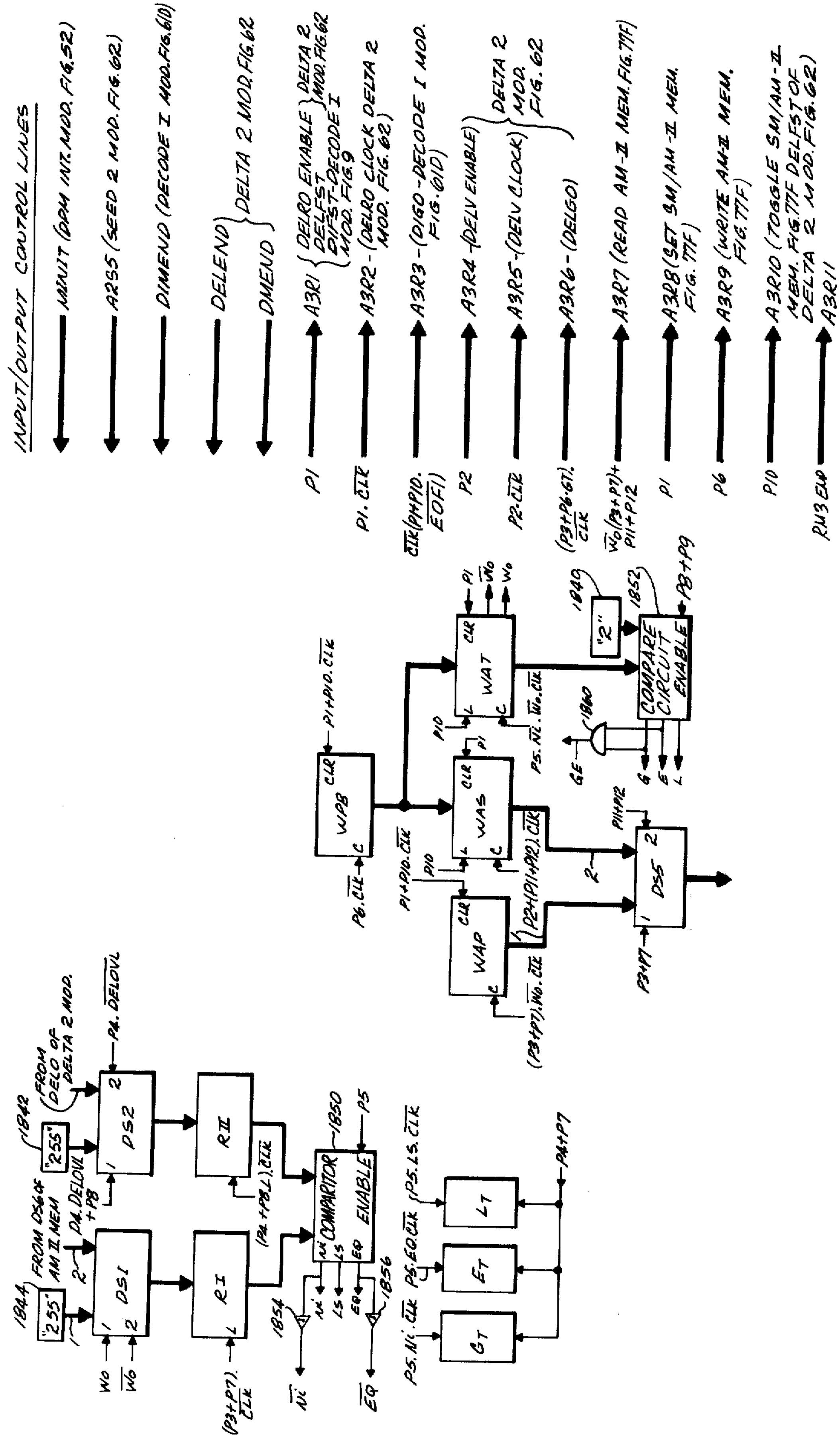
FIGS. 68 and 69 form a schematic and block diagram of the REVOLVE 3 MODULE.

Referring to FIGS. 68 and 69, the REVOLVE 3 MODULE contains the following 8 bit registers: RI, RII, N1, N2, preferably of type SN 74100 disclosed in the above referenced *TTL* book. WPB and WAP are up counters and form read pointers. WAS and WAT are respectively a read pointer and a counter to keep track of the number of items remaining to be read, and are both down counters.

In addition, the REVOLVE 3 MODULE contains the following flip flops: GT, ET, LT, and P1 through P12. Each of these flip flops is of the leading edge trigger type discussed above. The correspondingly labeled flip flops have generally the same purpose as that designated in Table 53 for the REVOLVE 3 MODULE and will not be repeated herein.

Selection circuits DS1–DS5 are provided for gating 8 binary coded bits of information from any one of the inputs shown along the upper side to a single 8 binary bit output shown along the lower side of each rectangular box. The selection circuits are of the same type discussed hereinabove and need not be considered in more detail at this point.

Switches 1840 form signals representing in binary code the decimal value 2. Switches 1842 and 1844 form signals representing, in binary code, the decimal value 255. The switches may be of conventional structure such as mechanical or electronic switches, which permanently provide signals at their outputs.

Conventional OR gating circuit 1860 is provided for ORing the signals at the G and E outputs of the compare circuit 1852. Conventional signal inverters 1856 and 1854 are provided for providing a logical signal inversion for the signal applied at their input.

Clock suspension logic circuit 1822 provides signals to the CS input of a generalized clock control 700 for suspending the operation of the clock control 700 in the manner discussed in more detail hereinbelow and as discussed with respect to the generalized clock control 700.

Input/output control lines and information input-/outputs are shown along the right-hand side of FIGS. 68 and 69. Single lines are depicted by thin lines, whereas multiple lines for carrying 8 binary bits of information are depicted by heavy solid lines.

C. Detailed Description

Consider now the general structure of the REVOLVE 3 MODULE as depicted in the schematic and block diagram of FIGS. 68 and 69 and the flow diagram of FIG. 70. Similar to RM2-1 of the REVOLVE 2 MODULE flow, during RM3-1 of the REVOLVE 3 MODULE flow the number of lines to be revolved value is transferred from the RII register to the DELRO register of the DELTA 2 MODULE and the WAP, WBP, WAS and WAT registers of the REVOLVE 3 MODULE are reset to 0. Additionally, the SM flip flop in the AM-II MEMORY is set so that a write takes place in area 2. Additionally, the DELFST and D1FST flip flops of the DELTA 2 and DECODE I MODULES are set to 1 to indicate that the first call is about to be made on these modules. It should be noted that the DECODE I MODULE, as for the REVOLVE 2 MODULE, will be decoding the event occurrence vector of the input line stored in the MEMORY MODULE. The ENCODE MODULE is not called by the REVOLVE 3 MODULE and therefore can be disregarded. During RM3-2 of the REVOLVE 3 MODULE flow, the reverse read pointer register WAS is reduced by 1. As for the previous module, this can be disregarded during the first call on the REVOLVE 3 MODULE. During RM3-3, the DECODE I MODULE is called and one of the occurrence values from the input line provided by the DECODE I MODULE to the DELV register in the DELTA 2 MODULE. It will be recalled that the DECODE I MODULE provides the occurrence values in order from largest to smallest value. The occurrence value stored in the DELV register becomes the shift value for the DELTA 2 MODULE.

During RM3-4, the content of the WAT register is checked to determine whether anything remains to be read from the read area of the AM-II MEMORY. If the WAT register is not 0, ($\overline{w_0}$ is true) then RM3-7 of the flow is entered. If the WAT register contains a 0, nothing remains to be read and RM3-5 of the flow is entered.

If RM3-5 of the flow is entered, the DELOVL (overflow) output and the DELEND output from the DELTA 2 MODULE are checked to see if either is true. If neither one is true, i.e., neither an overflow condition exists, nor has the end of the line been reached by the DELTA 2 MODULE, RM3-6 of the flow is entered where the maximum value 255 is stored into the RI register of the REVOLVE 3 MODULE which insures that during the exclusive OR operation, RM3-10 is entered following RM3-9. Following RM3-6, RM3-8 of the flow is entered.

Returning to RM3-5, if a true signal is formed at either the DELOVL or the DELEND output indicating that there is either an overflow or the end of the Delta line has been reached by the DELTA 2 MODULE, RM3-22 of the flow is entered where the highest address written in the AM-II MEMORY is stored into the WAS and WAT registers and the WAP and WBP registers are reset to 0 in a similar manner and for a similar purpose as that discussed in connection with RM2-19 of the REVOLVE 2 MODULE. Also, the AM-II MEMORY read write flip flop SM is complemented to interchange the read and write areas and the DELFST flip flop in the DELTA 2 MODULE is set to a 1 state to initialize for the next line requested from the DELTA 2 MODULE.

Assume now that RM3-8 of the REVOLVE 3 MODULE has been entered. During RM3-8, the DELTA 2 MODULE is called. If the end of line has not been reached by the DELTA 2 MODULE and hence a true signal is formed at the $\overline{\text{DELOVL}}$ output, then the Delta line or Delta shifted line value is stored into register RII of the REVOLVE 3 MODULE from register DELO of the DELTA 2 MODULE. If, on the other hand, an overflow condition has been sensed in the DELTA 2 MODULE and a true signal is formed at the DELOVL output, the maximum value 255 is stored into register RII.

RM3-9 through RM3-12 are provided for the exclusive OR operation similar to that depicted and explained for the REVOLVE 2 MODULE at RM2-8 through RM2-10. Thus, if the two values in the registers RI and RII are equal, RM3-11 and RM3-4 are entered where the WAT read pointer register is decreased by 1 and RM3-4 et seq. is repeated thereby deleting the identical values in the registers RI and RII. RM3-12 and RM3-10 innsure that the smaller of the values contained in registers RI and RII is written out to the write area of the AM-II MEMORY. Thus, during RM3-10, the content of register RII is written as it is the smaller, whereas during RM3-12, the content of register RI is written as it is the smaller. Following RM3-10, RM3-8 of the flow is reentered. During Rm3-12, the number in the read pointer register WAT is decreased by 1 unless it has already reached 0 (i.e. $\overline{w_0}$ is true). RM3-13 through RM3-15 are used to determined whether there is anything remaining to be read from the read area of the AM-II MEMORY and if so, during RM3-14 the value is read and stored into register RI and the read pointer register WAT is increased by 1. If the WAT register is 0 indicating that all values have been read from the read area of the AM-II MEMORY, then RM3-15 is entered following RM3-13 where the maximum value 255 is stored into register RI, insuring that either RM3-10 or Rm3-11 will be entered following the subsequent RM3-9.

The loop through RM3-8 can be terminated in one of two ways. One of the ways is when the DELEND output from the DELTA 2 MODULE is true indicating that the end of the DELTA line has been reached thereby. Under these conditions, RM3-16 is entered following RM3-8 of the flow. During RM3-16, a check is made to determine if the pointer register WAT contains a value less than 2. The value in register WAT can never be greater than 1. Therefore, if the value in register WAT is equal to 2, then RM3-20 and RM3-21 are entered. WAT containing a value of 2, indicates that there are 2 or more values in the AM-II MEMORY read area remaining to be read. This also means that these two values are sufficiently large in reference to the remaining Delta lines that there is no possibility of their being altered or modified by the subsequent Delta lines. Accordingly, during RM3°and RM3-21, these values are read from the AM-II MEMORY and stored in the N1 and N2 registers of the REVOLVE 3 MODULE and the WAS counter is decreased once for each value. The operation is then exited. The largest or rightmost occurrence value is stored in register N1 whereas the next largest is stored in register N2.

Consider RM3-16 again and assume that the value in register WAT is less than 2. If there are not at least two values remaining to be read from the read area of the AM-II MEMORY, RM3-17 is entered where the maximum value 255 is stored into register RII and the exclusive OR portion of the flow is reentered. By setting the maximum value 255 into the register RII, it insures that either RM3-11 or Rm3-12 will be entered. Hence, any remaining values in the AM-II MEMORY read area are read, stored in the register RII, and subsequently written into the write area thereof. Eventually, RM3-11 will be entered, causing a return to RM3-4. When this occurs, the content of register WAT will be 0 and the path RM3-5, RM3-22 to RM3-2 will be entered.

Return now to the loop through RM3-8 and consider the second way in which this loop is exited. This occurs if the DECODE I MODULE has reached the end of file of the event occurrence vector for the input line and hence a true signal is formed at the EOF1 output. A true signal at the EOF1 output of the DECODE I MODULE causes Rm3-18 to be entered following RM3-3. During RM3-18, the content of the pointer register WAT is checked to see whether it contains a 2 or a value less than 2. If the WAT register contains a 2, then it indicates that though the end of file for the input line has been reached by the DECODE I MODULE, that two occurrence values remain in the AM-II MEMORY read area and subsequently RM3-20 and RM3-21 are entered where the two values are stored in the N1 and N2 registers as discussed above. Subsequently, the REVOLVE 3 MODULE is exited.

If during RM3-18 the value in the WAT register is less than 2, then a 0 value must be stored in the N1 register. However, there must be at least one occurrence value in each line of an iso-entropicgram and the occurrence value must be stored in the N2 register. Accordingly, RM3-19 is entered where the 0 value is stored in register N1 and subsequently RM3-21 is entered where the occurrence value in the AM-II MEMORY read area is stored into the N2 register and an exit is taken.

Consider now in more detail the specific circuitry in the REVOLVE 3 MODULE. Making reference to the schematic and block diagrams of FIGS. 68 and 69, and the flow diagram of FIG. 70, initially the DPM INTERFACE MODULE forms a true signal at the MINIT output resetting the generalized clock control 700 causing each of the flip flops in the control counter 1813 to be reset to 0. Subsequently, the SEED 2 MODULE forms a true signal at the A2S5 output causing the number of lines to be revolved value to be stored from T3 of the SEED 2 MODULE into the RIL register. A true signal at the A2S5 output is also applied to the I input of the generalized clock control 700 causing it and invertor 1830 to commence forming clock pulses at the CLK and the $\overline{CLK}$ outputs.

All flip flops in the control counter 1813 are now in a 0 state causing the logic $\overline{P1 + P2 - P12}$ to be true. Accordingly, the first CLK pulse causes the P1 flip flop to be set to a 1 state. The true signal at the P1 output of the P1 flip flop causes the A3R1 output of the input/output control lines for the REVOLVE 3 MODULE to receive a true signal. The true signal at the A3R1 output sets the DELFST flip flop in the DELTA 2 MODULE to a 1 state and enables the number of lines to be revolved value to be coupled to the input of the DELRO register in the DELTA 2 MODULE. Additionally, the true signal at the A3R1 output causes the SM flip flop in the AM-II MEMORY to be set to a 1 state causing area 2 to be the write area. The true signal at the P1 output causes the WAP, WAS, WAT and WBP pointer registers to be cleared or reset to 0. At the following $\overline{CLK}$ pulse, the logic P1.$\overline{CLK}$ becomes true, causing true signals at the A3R2 and A3R3 outputs of the REVOLVE 3 MODULE. The true signal at the A3R2 output causes the number of lines to be revolved value to be stored from register RIL into register DELRO. The true signal at the A3R3 output causes the D1GO multi-vibrator in the DECODE I MODULE to be set, calling the operation of the DECODE I MODULE (see RM3-3 of the flow).

Assuming the end of file has not been reached by the DECODE I MODULE, a true signal is formed at the $\overline{EOF1}$ output causing the logic P1.$\overline{EOF1}$ to be true. The true condition of this logic causes the P2 flip flop of control counter 1813 to be set to a 1 state and the flip flop P1 is reset to a 0 state at the following CLK pulse, thereby causing RM3-2 of the flow to be entered. During RM3-2, the true signal at the P2 output causes the address contained in the WAS pointer register to be counted down by 1, in order to achieve the address of the highest value written into the write area of the AM-II MEMORY. However, the counting down of the WAS register has no purpose during the first time through the flow of the REVOLVE 3 MODULE. The true signal at the P2 output and the true condition of logic P2.$\overline{CLK}$ causes true signals at the A3R4 and A3R5 outputs of the input/output control lines for the REVOLVE 3 MODULE. The true signal at the A3R4 output enables the occurrence value from the input line provided by the DECODE I MODULE to be coupled as the shift value to the input of the DELV register in the DELTA 2 MODULE. The true signal at the A3R5 output causes this occurrence value (shift value) to be stored into the DELV register.

If an overflow condition has not been detected or the end of Delta line has not been reached in the DELTA 2 MODULE, true signals are formed at the $\overline{DELOVL}$ and $\overline{DELEND}$ outputs of the DELTA 2 MODULE. Also, if the WAT pointer register has reached a 0 state, a true signal is formed at the $w_0$ output. Under these conditions, the logic $\overline{DELOVL}.\overline{DELEND}.w_0$ is true (see input to P3 flip flop). If either the foregoing logic is true or the WAT counter is not 0, the logic P2.($\overline{DELOVL}.\overline{DELEND}.w_0 + \overline{w_0}$) is true and at the following CLK pulse the P3 flip flop is set to a 1 state. Referring to the flow, it will be noted that when the P3 flip flop is in a 1 state, either RM3-5 or RM3-7 is entered in the flow. RM3-7 is entered if the WAT pointer register is not 0 ($\overline{w_0}$).

During the first time through the flow, the WAT pointer register will contain a 0. Accordingly, RM3-5 is entered. If neither the DELOVL nor the DELEND is true, RM3-6 is entered after RM3-5 where the maximum value 255 is stored into the register RI.

Referring to FIG. 68, it will be noted that a true signal at the $w_0$ output causes the output of the switches 1844, which represent the maximum value 255, to be coupled through the DS1 selection circuit to the input of the RI register. Additionally, the logic P3.$\overline{CLK}$ becomes true and the maximum value 255 is stored into the register RI. Since the output $\overline{DELEND}$ Is true, the logic P3.$\overline{DELEND}$ is now true and at the following CLK pulse the P4 flip flop is set to a 1 state and the P3 flip flop is reset to a 0 state causing RM3-8 of the flow to be entered.

Returning to RM3-4 and assuming that the WAT register does not contain a 0, a true signal is formed at the $w_0$ output and at this time the P3 flip flop is in a 1 state. Thus the logic P3.$\overline{CLK}$ becomes true, causing a true signal at the A3R6 output which in turn calls the operation of the DELTA 2 MODULE. (Note that this action is actually depicted, for ease of explanation, during RM3-8 of the flow.) In addition, the true condition of the logic $\overline{w_0}$.P3 causes a true signal at the A3R7 output of the REVOLVE 3 MODULE which in turn causes a read operation in the AM-II MEMORY. Referring to the clock suspension logic 1822, the logic A3R6.$\overline{DMEND}$ now becomes true causing the generalized clock control 700 to suspend operation pending the completion of operation of the DELTA 2 MODULE.

If during the true signal at the P3 output the WAT register does not contain a 0, a true signal is formed at the $\overline{w_0}$ output causing the DS1 selection circuit to couple the output of the AM-II MEMORY through to the input of the RI register. The true signal at the P3 output causes the DS5 selection circuit to couple the address from the WAP pointer register to the address input of the AM-II MEMORY specifying the address from which the read for the RI register is made. The true condition of the logic P3.$\overline{CLK}$ thus causes the value read from the AM-II MEMORY to be stored into register RI. In addition, the logic P3.$\overline{w_0}$.$\overline{CLK}$ becomes true causing the WAP pointer register to be counted up one address so that it now contains the address of the next available location in the AM-II MEMORY write area.

The logic P3.$\overline{DELEND}$ is also true during RM3-7. After the DELTA 2 MODULE has completed its operation and the DMEND output thereof becomes true, and the logic A3R6.$\overline{DMEND}$ becomes false, the clock suspension logic 1822 removes the true signal at the CS input causing the generalized clock control to again form its CLK pulses. The following CLK pulse causes the P4 flip flop to be set to a 1 state and the P3 flip flop is reset to a 0 state causing RM3-8 of the flow to be entered.

Consider now the operation during RM2-8. If an overflow has not occurred in the DELTA 2 MODULE, the output $\overline{DELOVL}$ is true. Accordingly, the logic P4, $\overline{DELOVL}$ is true causing the DS2 selection circuit to couple the Delta line value from the DELO register of the DELTA 2 MODULE to the input of the RII register. The logic P4.$\overline{CLK}$ subsequently becomes true causing the Delta line value to be stored into register RII. However, if an overflow has occurred in the DELTA 2 MODULE, a true signal is formed at the DELOVL output thereof causing the logic P4.DELOVL to be true which in turn causes the maximum value 255 to be coupled from the switches 1842 to the input of the register RII where it is stored. The true signal at the P4 output causes the P5 flip flop to be set to a 1 state and the P4 flip flop to be reset to a 0 state at the following CLK pulse thereby causing RM3-9 of the flow to be entered. RM3-9 through RM3-12 carry out the exclusive OR operation similar to RM2-9 through RM2-12 of the REVOLVE 2 MODULE with a few exceptions.

Considering now in more detail the operation it will be noted that the lesser of the two values stored in the RI and RII registers is to be written out in the AM-II MEMORY. But if the two values are equal then neither is to be writtend to the AM-II MEMORY.

The true signal at the P5 output of the P5 flip flop causes the comparator 1850 to compare the contents of the registers RI and RII.

Assume that the comparator 1850 detects that the content of registers RI and RII are equal and therefore RM3-11 is entered. A true signal is formed at the EQ output and the logic P5.EQ.$\overline{CLK}$ becomes true, causing the ET flip flop to be set to a 1 state. If the WAT counter is not 0, $\overline{w_0}$ is true and the logic P5.$\overline{Ni}$.$w_0$.$\overline{CLK}$ becomes true, causing the WAT pointer to be counted down 1. The logic P5.EQ($\overline{DELOVL}$.$\overline{DELEND}$.$w_0$ + $\overline{w_0}$) now becomes true and at the following CLK pulse, flip flop P3 is set to a 1 state and flip flop P5 is reset to a 0 state, causing RM3-4 to be reentered. Thus, it will be seen that nothing is written into the AM-II MEMORY and the pointer register WAT is merely counted down by 1 during RM3-11 after an quality is detected between RI and RII.

Return now to RM3-9 and assume that the content of register RI is less than that of register RII. The comparator 1850 forms a true signal at the $\overline{EQ}$ output of the signal inverter 1856 and a true signal at the LS output. The logic P5.LS.$\overline{CLK}$ becomes true, causing the LT flip flop to be set to a 1 state and the logic P5.$\overline{EQ}$ becomes true, causing the P6 flip flop to be set to a 1 state, and the P5 flip flop is reset to a 0 state thereby causing RM3-12 of the flow to be entered. The logic P5.$\overline{Ni}$.$\overline{w_0}$.$\overline{CLK}$ is again true, causing the WAT pointer to be counted down by 1.

The logic PG.LT is true, causing the DS4 selection circuit to couple the output of register RI to the input of the AM-II MEMORY. The true signal at the P6 output also causes a true signal at the A3R9 output of the input-/output control lines, causing the AM-II MEMORY to write the value from register RI.

The logic P6.LT is true, and at the following CLK pulse, flip flop P7 is set to a 1 state and flip flop P6 is reset to a 0 state causing RM3-13 of the flow to be entered.

RM3-13, RM3-14 and RM3-15 are provided similar to the REVOLVE 2 MODULE to check to see if there is anything more to be read from the read area of the AM-II MEMORY and if so, to read the value for storage in register RI. If the WAT pointer has for some reason been counted down to 0, then during RM3-13 the maximum value 255 is stored into register RI to so indicate rather than a value from the AM-II MEMORY. Following either RM3-15 or RM3-14, RM3-9 of the flow is reentered. To this end, the true signal at the P7 output causes the flip flop P5 to be set to a 1 state and flip flop P7 to be reset to a 0 state at the following CLK pulse.

Similarly, if the content of register RII is less than that of register RI, during RM3-9 the comparator forms a true signal at the Ni output and the inverter 1856 forms a true signal at $\overline{EQ}$. Logic P5.Ni.$\overline{CLK}$ is true and the flip flop GT is set to a 1 state. The logic P5.$\overline{EQ}$ is again true, causing the P6 flip flop to be set to a 1 state, and flip flop P5 is reset to a 0 state at the following CLK pulse, causing RM3-10 of the flow to be entered.

During the signal at the P6 output, the logic P6.GT is true, causing the DS4 selection circuit to couple the lesser value in register RII to the input of the AM-II MEMORY. Additionally, the true signal at the P6 output causes a true signal at the A3R9 output of the input-/output control lines, causing the AM-II MEMORY to write the value from register RII.

Additionally, to logic P6.$\overline{CLK}$ becomes true, causing the WBP pointer to be counted down by 'so that it now contains the address of the next location in the AM-II MEMORY at which writing is to take place. Following RM3-10 RM3-8 is reentered. If there is still output to be provided by DELTA 2 the $\overline{\text{DELEND}}$ output of the DELTA 2 MODULE is true. Thus the circuit P6.GT.$\overline{\text{DELEND}}$ is true causing the P4 flip flop to be set to 1. Additionally the A3R6 signal becomes true causing the DELTA 2 MODULE to be activated. Meanwhile the A3R6.DMEND circuit becomes true causing the clock in the REVOLVE 3 MODULE to be disabled. When the DELTA 2 MODULE completes, the REVOLVE 3 MODULE clock is enabled and the next CLK pulse causes the P6 flip flop to be reset to 0 and the P4 flip flop to be set to 1.

The above sequence of operation for RM3-8 through RM3-15 continues until one of two exits occurs. One exit occurs during RM3-8 when the last shifted occurrence value is provided from a line of the Delta by the DELTA 2 MODULE. Under these conditions a true signal is formed at the DELEND output which causes RM3-16 to be entered. To this end, the true condition of logic P6.DELEND causes the P8 flip flop to be set to a 1 state, causing RM3-16 to be entered.

During RM3-16, the content of the WAT pointer is checked to determine if it is less than 2. The true signal at the P8 output causes the compare circuit 1852 to be enabled and forms a true signal at the GE and L outputs, respectively, if the content of the WAT pointer is greater than, equal to, or less than, value 2 (represented by the output signals from the switches 1840).

If the content of the WAT pointer is equal to or greater than 2, then the operation of the REVOLVE 3 MODULE is finished as there are at least two equal values in the AM-II MEMORY which will no longer be modified by future XOR's with occurrence values sent by the DELTA 2 MODULE. When this occurs, the compare circuit 1852 causes a true signal at the GE output of the OR gate 1860, causing the logic P8.GE to be true. At the following CLK pulse, the P11 flip flop is set to a 1 state, and the P8 flip flop is reset to a 0 state, causing RM3-20 to be entered.

The true signal at the P11 output causes the A3R7 output of the input/output control lines to be true, thereby causing the AM-II MEMORY to read the next value from the location specified by the WAS pointer. Additionally, the true condition of logic P11.$\overline{\text{CLK}}$ causes the WAS pointer to count down by 1 address. The logic P11.$\overline{\text{CLK}}$ also causes the value read from the AM II MEMORY to be stored into the N1 register.

The true condition of logic P11 causes the flip flop P11 to be reset to a 0 state and flip flop P12 to be set to a 1 state, thereby causing RM3-21 to be entered. The true condition of the P12 output again causes a true condition at the A3R7 output, causing the AM II MEMORY to read out the next value. The true condition of logic P12.$\overline{\text{CLK}}$ causes the N2 register to store the current value from the AM II MEMORY and the true condition of logic P12.$\overline{\text{CLK}}$ causes the WAS pointer to count down by 1 additional address. At this point in time the N1 and N2 registers contain the rightmost and next to the rightmost occurrence values in the line of the iso-entropicgram being generated. Subsequently the operation of the REVOLVE 3 MODULE is exited.

Returning to RM3-16, assume that the AM II MEMORY does not contain at least two values which will not remain unaltered. Under these conditions WAT will contain a value less than 2 and the compare circuit 1852 forms a true signal at the L output, indicating that the content of the WAT register is less than the value 2 provided by the switches 1840, causing RM3-17 to be entered. The true condition of the P8 output causes the DS2 selection circuit to couple the maximum value 255 from the switches 1842 to the input of register RII. Additionally, the logic P8.$\overline{\text{CLK}}$ becomes true, and the maximum value 255 is stored into the register RII. Subsequently, RM3-9 of the flow is reentered where the XOR operation is performed and pulse P5 is reentered. Since the maximum value 255 is contained in register RII, it will be the maximum value and accordingly RM3-12 through RM3-15 will be entered where the value in register RI is stored into the AM II MEMORY. The WAT pointer is counted down by 1, and the next value is read from the AM II MEMORY and stored into register RI. When the WAT pointer has been counted down to 0, a true signal is formed at the $w_0$ output, causing RM3-15 of the flow to be entered. Subsequently, RM3-9 of the flow is reentered where the maximum value 255 stored in both registers RI and RII is found to be equal and hence RM3-11 is entered, followed by RM3-4. Pulse P3 is in a 1 state. Since the WAT pointer now contains a 0, a true signal is formed at the $w_0$ output, causing RM3-5 of the flow to be entered. Since it is assumed that a true signal is formed at the DELEND output of the DELTA 2 MODULE, indicating the last of the shifted occurrence values from a line of the delta, RM3-22 is entered. To this end, the true condition of the logic P3.(DELEND+DELOVL) causes the flip flop P10 to be set to a 1 state, causing RM3-22 to be entered following RM3-5, where the content of the WPB pointed is transferred to the WAS and WAT pointers and the WAP and WPB pointers are reset to 0. Additionally, the SM flip flop in the AM II MEMORY is complemented, causing the read and write areas to interchange, and DELFST is triggered in the DECODE I MODULE, calling its operation, thereby causing the next actual occurrence value to be provided by the DECODE I MODULE from the original input line being processed.

The sequence of operation subsequent thereto is similar to that described above.

Assume now that during RM3-3, the last actual occurrence value of the original input line has been processed and the DECODE I MODULE provides a true signal at the EOF1 output so indicating. The flip flop P10 in the control counter 1813 is now true, and the logic P10.EOF1 is true, causing the flip flop P9 to be set to a 1 state, thereby causing the RM3-18 to be entered. During RM3-18, the WAT pointer is again compared with the value 2, to determine if it is greater than or equal to 2, in which case RM3-20 and RM3-21 are entered, where the two values are read from the AM-II MEMORY and stored into the N1 and N2 registers as discussed above. If, on the other hand, the content of the WAT pointer is less than 2, there are less than two values remaining to be read from the AM-II MEMORY. Under these conditions, WAT will always be 1 since there must be at least one actual occurrence value in any line of any iso-entropicgram. A true signal is formed at the P9 output thereby causing RM3-19 to be entered. During RM3-19 a true signal is formed at the P9 output. Since the content of the WAT pointer is less than 2, the compare circuit 1852 forms a true signal at the L output causing the logic P9.L.$\overline{\text{CLK}}$ to be true, which in turn causes the N1 register to be cleared to 0. The logic P9.L is also true and at the following CLK pulse to flip flop P12 is set to a 1 state and the P9 flip flop is reset to a 0 state, thereby causing RM3-21 to be entered where the one remaining occurrence value in the AM-II MEMORY is read and stored into N2 register as discussed above.

Under the conditions discussed above where the WAT pointer is less than 2, this indicates that the rightmost possible occurrence value is 0, while the next to the rightmost possible occurrence value is not 0. This is quite important, as mentioned above, since there is at least one occurrence value in any line of any iso-entropicgram. Setting N1 to 0 insures that the fast seed finding operation will halt. If WAT is greater than or equal to 2 then RM3-20 and RM3-21 are entered as described above.

D. Example of Operation

Assume now that the REVOLVE 3 MODULE is to revolve the input line of the iso-entropicgram depicted in Table 51, line 0, by three lines. According to the fast seed finding operation, the REVOLVE 3 MODULE operates so as to generate the desired line of the iso-entropicgram starting with the largest occurrence value until it has generated two occurrence values that will appear in the desired line. In other words, the sequence of operation depicted at Table 52 is performed until two occurrence values are formed which will no longer be altered by future shifted lines of the Delta provided by the DELTA 2 MODULE. Once the two occurrence values in the desired line are formed they are sent to the SEED 3 MODULE. If the desired line only has one occurrence value then, as mentioned above, there will only be one occurrence value and not two and the mechanism disclosed herein handles this condition.

Initially, T3 of the SEED 2 MODULE is loaded with the value 3 which is the number of lines to be revolved. The MEMORY MODULE area 1 is loaded with an event occurrence vector (EQ Vector) representative of the values 0, 2, 3, 5 which is the input line of the iso-entropicgram depicted in Table 51. Initially, the SEED 2 MODULE forms a true signal at the A2S5 output which causes the RIL register of the REVOLVE 3 MODULE to store the value 3 from register T3 in the SEED 2 MODULE. The EO Vector 0, 2, 3, 5 is stored in the MEMORY MODULE and accordingly the DECODE I MODULE is about to read and decode the EO Vector into absolute coded form. The initial conditions are depicted, under this heading, in Table 55.

During the subsequent operation which will be referred to as Cycle 1, the DELTA 2 MODULE will form the occurrence values 5, 6, 7 which will be stored into addresses 0, 1 and 2 of the AM-II MEMORY area 2, and at the end the WAS and WAT pointers will contain the value 3 as depicted under the heading Conditions After Cycle 1 (Table 55).

Considering the operation, initially a true signal is formed at the A2S5 output of the SEED 2 MODULE causing the generalized clock control 700 to commence providing clock pulses to the control counter 1813. Subsequently, a true signal is formed at the A3R1 output of the REVOLVE 3 MODULE, causing the DELFST flip flop in the DELTA 2 MODULE and the D1FST flip flop in the DECODE I MODULE to be set to 1 states, indicating that this is the first call on these modules. Additionally, the true signal at the A3R1 output enables the output of the RIL register to be coupled through to the input of the DELRO register in the DELTA 2 MODULE.

Subsequently, a true signal is formed at the A3R2 output which causes the DELRO register to store the value 3 from the RIL register of the REVOLVE 3 MODULE into the DELRO register of the DELTA 2 MODULE. Additionally, the true signal at the P1 output causes the WAT, WAS, WAP and WPB pointers to be reset to 0. Thus, all pointers are at 0. The true signal at P1 causes a true signal at the A3R8 output which in turn sets the SM flip flop in the AM-II MEMORY so that the first write takes place in area 2.

RM3-2 of the flow is now entered where a true signal is formed at the P2 output which in turn causes the WAS pointer to be counted down by 1 value. This has no particular meaning during this portion of the operation.

RM3-3 of the flow is entered. During the previous true signal at the P1 output the logic $\overline{\text{CLK}}$.P1 becomes true, causing a true signal at the A3R3 output. The true signal at the A3R3 output called the operation of the DECODE I MODULE causing it to provide the largest occurrence value from the EO Vector original input line. Additionally, the true signal at the A3R3 output causes the following logic to be true: A3R3.$\overline{\text{DIMEND}}$. This causes the clock suspension logic 1822 to apply a true signal to the CS input of the generalized clock control 700, suspending its operation until the DECODE I MODULE returns the value 5. DIMEND is now true re-enabling the block and, if EOF1 is not set, P1 is reset to 0 and P2 is set to 1. After the DECODE I MODULE has provided the value 5 from the input line, the DIMEND input becomes false, causing the clock suspension logic 1822 to apply a false signal at the CS input of the generalized clock control 700, enabling clock pulses to again be formed.

Subsequently, a true signal is formed at the P2 output and the logic P2.CLK becomes true, causing true signals at the A3R4 and A3R5 outputs of the REVOLVE 3 MODULE. The true signal from the output of the DECODE I MODULE to be applied to the input of the DELV register of the DECODE II MODULE and the A3R5 signal causes the value to be stored in the DELV register.

Since the end of the EO Vector original input line has not yet been reached by the DECODE I MODULE, the E0F1 flip flop of the DECODE I MODULE applies a true signal at the $\overline{\text{EOF1}}$ output. Thus, following RM3-3, RM3-4 is entered. Since the WAT pointer now contains a 0, RM3-5 is entered. Since the DECODE II MODULE has not reached the end of the Delta line nor has an overflow occurred, both of the outputs DELEND and DELOVL are false (i.e. $\overline{\text{DELEND}}$ and $\overline{\text{DELOVL}}$ are true). Accordingly, RM3-6 of the flow is entered. The true signal at the $w_0$ output and the true condition of logic P3.$\overline{\text{CLK}}$ causes the maximum value 255 to be stored from the switches 1844 into the register RI. RM3-8 of the flow is now entered. The logic P3.CLK being true causes a true signal at the A3R6 output. The true signal at the A3R6 output calls the operation of the DELTA 2 MODULE causing it to provide the first occurrence value from line 3 of the Delta, offset by 5 (the occurrence value of the input line received from the DECODE I MODULE). With reference to the discussion in the REVOLVE 2 MODULE, it will be recalled that the first value in line 3 of the Delta is 0 which, added to the offset 5, results in the shifted Delta value of 5. The true condition of logic P4.$\overline{\text{DELOVL}}$ and P4.$\overline{\text{CLK}}$ causes the shifted Delta value 5 in register DELO of the DELTA 2 MODULE to be stored into register RII of the REVOLVE 3 MODULE.

RM3-9 of the flow is now entered where the shifted Delta value 5 in register RII is compared with the maximum value 255 contained in register RI. Since the content of register RII (5) is the lesser, RM3-10 of the flow is entered.

During RM3-10, a true signal is formed at the P6 output which in turn causes a true signal at the A3R9 output of the REVOLVE 3 MODULE. The logic P6.GT is true, causing the shifted Delta value 5 to be coupled from register RII into the information input of the AM-II MEMORY and the true signal at the A3R9 output causes the AM-II MEMORY to write the shifted Delta value 5 into address 0 of the AM-II MEMORY area 2 as designated by the address register WPB. The logic P6.$\overline{CLK}$ also causes the WPB pointer to be counted up to address 1.

Following RM3-10, RM3-8 is reentered where the DELTA 2 MODULE is again called so that it generates the next shifted Delta value of 6 (see Table 52). RM3-9 is reentered where the shifted occurrence value of 6 in register RII is found to be less than the maximum value 255 in register RI. Accordingly, RM3-10 is reentered where the value of 6 is stored at address 1 of the AM-II MEMORY area 2 and the WPB pointer is again counted up by 1 address to address 2.

RM3-8, RM3-9 and RM3-10 are again reentered where the DECODE II MODULE provides the next shifted occurrence value of 7 which is stored in register RII and subsequently written into address 2 of the AM-II MEMORY area 2, and the WPB pointer is counted up by 1 to address 3. At this point the AM-II MEMORY area 2 is as depicted under Conditions After Cycle 1, Table 55.

RM3-8 is reentered. However, this time the isoentropicgram width (8) has been exceeded. Accordingly, the DELTA 2 MODULE forms a true signal at the DELOVL output. The true signal at the DELOVL output causes the logic P4.DELOVL to be true. Additionally, the logic P4.$\overline{CLK}$ is true. Therefore, during RM3-8 the maximum value 255 is stored from the switches 1842 into register RII.

During RM3-9, the comparator 1850 detects the same value, i.e., 255, in both registers RI and RII and accordingly RM3-11 is entered. However, since the WAT pointer is already 0, it is not counted down.

RM3-4 of the flow is reentered. Since the WAT pointer is at 0, RM3-5 is reentered. Since the DELOVl output of the DECODE II MODULE is true, RM3-22 of the flow is entered. At this time, a true signal is formed at the P10 output. Accordingly, the WAS and WAT pointers are loaded with the address 3 contained in the WPB pointer. The true signal at the P10 output also causes a true signal at the A3R10 output which toggles the SM flip flop in the AM-II MEMORY and sets the DELFST flip flop in the DELTA 2 MODULE to a 1 state.

At this point Cycle 1 of the REVOLVE 3 MODULE is completed and all of the conditions depicted under the heading Conditions After Cycle 1 in Table 55 exist in the system.

During the second cycle of operation, the conditions depicted under the heading Conditions After Cycle 2 are being generated.

RM3-2 of the flow is reentered where the true signal at the P2 output causes the WAS pointer to be counted down by 1 address to address 3.

RM3-4 of the flow is now entered where the WAT pointer is checked to determine if it is 0. Since the WAT pointer now contains the value 3, it is not 0, and accordingly RM3-7 of the flow is entered rather than RM3-5 as during Cycle 1. During RM3-7, the logic $\overline{w_0}$.P3 is true, causing a true signal at the A3R7 output. This causes the AM-II MEMORY to read the value 5 from AM-II MEMORY area 2 from address 0 as specified by the WAT pointer. The true condition of logic P3.$\overline{w_0}$.$\overline{CLK}$ causes the WAP pointer to be counted up to address 1, so that it now contains the address of the value 6 (see Conditions After Cycle 1, Table 55). The true signal at the P3 output causes the logic P3.CLK to become true which in turn causes a true signal at the A3R6 output. This in turn, as indicated during RM3-8 of the flow, causes the DELTA 2 MODULE to start providing the next shifted line 3 of the Delta offset by 3 as designated by the RIL register. Referring to Table 52, line 3 of the Delta offset by 3 results in the values 3, 4, 5, and 6. Accordingly, the first shifted value 3 is now provided by the DELTA 2 MODULE.

Subsequently, the logic P4.$\overline{DELOVL}$ becomes true, and the logic P4.$\overline{CLK}$ becomes true, causing the shifted Delta value 3 to be stored into the register RII.

RM3-9 is now entered where the shifted Delta line value 5 (from AM-II MEMORY area 2) stored in register RI is compared with the shifted line value 3 (from the DELTA 2 MODULE) contained in register RII.

The value 5 contained in RII is found to be the larger and accordingly RM3-10 is entered where the value 3 is stored in address 0 of the AM-II MEMORY area 1 as specified by the WPB pointer. The WPB pointer is then counted up 1 address to address 1.

RM3-8 is reentered where the DELTA 2 MODULE is again called, causing the next shifted Delta line value of 4 (see Table 52) to be provided and stored into register RII. RM3-9 is reentered where the shifted Delta value of 3 in register RI is found to be less than the shifted Delta line value of 4 in register RII. Accordingly RM3-10 is reentered where the shifted Delta line value 4 is stored in address 1 of the AM-II MEMORY area 1 and the WPB pointer is counted up to address 2.

RM3-8 is then reentered where the DELTA 2 MODULE is again called, causing the next shifted Delta line value of 5 to be read out and stored in register RII.

RM3-9 is then reentered. Registers RI and RII now both contain shifted Delta line values of 5, and accordingly the equality causes RM3-11 of the flow to be entered where the XOR operation takes place. To this end, neither of the values in register RI or RII is stored. Also, the logic P5.$\overline{Ni}$.$\overline{w_0}$.$\overline{CLK}$ becomes true, causing the WAT pointer to count 1 address from 3 to 2.

RM3-4 of the flow is reentered where the WAT pointer is checked. The WAT pointer at this point contains a 2, and is not 0; accordingly RM3-7 is reentered. During RM3-7, the AM-II MEMORY area 2 address 1 (specified by the WAP pointer) is read. With reference to Table 55 it will be noted that address 1 contains the value 6 and accordingly the value 6 is read and stored into register RI and the WAP pointer is counted up 1 address to address 2.

RM3-8 of the flow is reentered where the DELTA 2 MODULE is called causing the next shifted line value of 6 (see Table 52) to be provided and stored into register RII.

RM3-9 of the flow is reentered where registers RI and RII are found to be equal, causing RM3-11 to be reentered where the two values in registers RI and RII are discarded. During RM3-11 the WAT pointer is counted down to 1.

RM3-4 of the flow is reentered where the WAT pointer is found not to be 0 and accordingly RM3-7 is reentered. During RM3-7, the address of the AM-II MEMORY area 2 is read. With reference to Table 55 it will be noted that the value 7 is read. This value is stored into register RI. The WAP pointer is counted up 1 address to address 3.

RM3-8 is reentered. However, the DELTA 2 MODULE had previously provided the last shifted Delta line value and accordingly a true signal is formed at the DELEND output of the DELTA 2 MODULE. Accordingly, the DS2 selection circuit causes the register RII to store the maximum value 255 from the switches 1842 and RM3-16 is now entered rather than RM3-9.

During RM3-16 the WAT pointer contains a 1 and is therefore less than 2. Accordingly, the compare circuit 1852 forms a true signal at the L output and the true condition of the output P8 and the true condition of logic P8.L.$\overline{CLK}$ causes the register RII to store the maximum value 255 from the switches 1842.

RM3-9 of the flow is reentered where the value 7 in register RI is compared with the maximum value 255 in register RII. Since register RI contains the smaller value, RM3-12 is now entered. During RM3-12, the output P6 is true, and accordingly a true signal is formed at the A3R9 output of the REVOLVE 3 MODULE causing the AM-II MEMORY to write the value provided by the DS4 selection circuit. Additionally the logic P6.GT is true causing the DS4 selection circuit to couple the value 7 from register RI to the information input of the AM-II MEMORY. The address 2 contained in the WPB pointer causes the AM-II MEMORY to store the value 7 at address 2 as depicted under Conditions After Cycle 2, Table 55.

The WAT pointer is counted down by 1 from 1 to 0 and RM3-13 is entered. Since the WAT pointer is now 0, RM3-15 is entered where the true signal at the $ww_o$ output and the true signal at the P3.$\overline{CLK}$ output causes the maximum value 255 to be loaded into register RI from the switches 1844.

RM3-9 is now reentered where it is found that both registers RI and RII contain the maximum value 255 and therefore are equal. Accordingly RM3-11 and RM3-4 are reentered. Since the WAT pointer is at 0, no decrement takes place. During RM3-4 it is found that the WAT pointer contains a 0 and a true signal is being formed at the $w_0$ output. Accordingly, RM3-5 is entered.

During RM3-5 a true signal is still being formed at the DELEND output of the DELTA 2 MODULE, causing RM3-22 of the flow to be entered. In the same manner discussed above, the address 3 contained in the WPB pointer is now loaded into the WAS and WAT pointers and the WAP and WPB pointers are reset to 0. Additionally, the flip flop SM is complemented and the DELFST flip flop in the DELTA 2 MODULE is set to 0. With the complementing of the flip flop SM, AM-II MEMORY area 1 will now be the new read area and area 2 the write area. With reference to Conditions After Cycle 2, Table 55, the condition of the AM-II MEMORY area 1 and the WAS and WAT pointers will be found.

The third cycle of operation of the REVOLVE 3 MODULE is now entered where the information depicted under Conditions After Cycle 3, Table 55, are formed, starting with the initial conditions depicted under Conditions After Cycle 2.

To this end, RM3-2 is reentered where the value 3 in the WAS pointer is counted down to 2. During RM3-3 the DECODE I MODULE is again called, causing it to provide the next actual occurrence value 2 of the EO vector for the input line stored in the MEMORY MODULE (see Table 52). The occurrence value 2 provided by the DECODE I MODULE is stored into the DELV register of the DELTA 2 MODULE. During RM3-4 it is found that the WAT pointer does not contain a 0 and accordingly RM3-7 is entered, where the value 3 is read from address 0 (specified by the WAP pointer) and is stored in register RI.

RM3-8 of the flow is now entered where the DELTA 2 MODULE starts providing the shifted line values for line 3 of the Delta offset by 2, as indicated in Table 52. (With reference to Table 52 it will be seen that following Cycle 2, AM-II MEMORY area 1 contains the actual occurrence values depicted "After First XOR" in Table 52.) The first shifted Delta line value is a 2 (see Cycle 3 of Table 52), and the value is stored into register RII. RM3-9 is now entered where the value 2 in register RII is found to be less than the value 3 in register RI. Accordingly, RM3-10 is entered where the smaller value 2 from register RII is stored into address 0 of the AM-II MEMORY area 2, using address 0 contained in the WPB pointer. Also, the WPB pointer is counted up by 1 to address 1 and RM3-8 is reentered.

During RM3-8, the DELTA 2 MODULE provides the next shifted Delta line value of 3 (see Cycle 3, Table 52) and the value is stored into register RII. RM3-9 is reentered where the value 3 stored in both registers RI and RII is detected as being equal and accordingly RM3-11 is entered where both values are skipped over and the WAT pointer is counted down from 3 to 2. RM3-4 and RM3-7 are now reentered. During RM3-7 the next value, namely 4, is read from the AM-II MEMORY area 1 (see Conditions After Cycle 2, Table 55) and the value is stored into the register RI and the WAP pointer is counted up to address 2. RM3-8 is now entered where the DELTA 2 MODULE provides the next shifted Delta line value of 4. During RM3-9 the 4 in both of the registers RI and RII is detected as being equal and accordingly RM3-11 is entered where both values are lost and the WAT pointer is counted down by 1 so that it now contains the value 1.

RM3-4 is reentered and since the WAT pointer is not 0, RM3-7 is subsequently entered. During RM3-7, the value 7 is read from address 2 (specified by the WAP pointer) of the AM-11 MEMORY area 1 and is stored into the register RI and the WAP pointer is counted up by 1 to address 3.

RM3-8 is now entered where the DELTA 2 MODULE provides the next shifted Delta line value of 5 (see Cycle 3, Table 52). Subsequently, RM3-9 is entered where the value 5 in register RII is found to be smaller than the value 7 in register RI and accordingly RM3-10 is entered where the value 5 is stored from register RII into address 1 (specified by the WPB register) of the AM-II MEMORY area 2.

RM-8 is now reentered. However, since the DELTA 2 MODULE has reached the end of the shifted Delta line value, a true signal is now formed at the DELEND output so indicating. Accordingly, RM3-16 is now reentered where the value 1 contained in the WAT pointer is found to be less than 2 and accordingly RM3-17 is reentered where the maximum value 255 is stored into the register RII.

During RM3-9 the value 7 contained in register RI is found to be less than the maximum value 255 in register RII and accordingly RM3-12 is entered where the value 7 is written into address 2 (specified by the WPB pointer) of the AM-II MEMORY area 2. Also, the WAT pointer is counted down by 1 to 0 and the WPB pointer is counted up by 1 to address 3. With reference to Table 55 it wll be noted that the Conditions After Cycle 3 are now present.

RM3-13 is now entered where the WAT pointer is found to be 0 and accordingly RM3-15 is entered where the maximum value 255 is stored into register RI. RM3-9, RM3-11 and RM3-4 are now successively reentered since the registers RI and RII now both contain the maximum value 255. However, the WAT pointer contains a 0 and is unaltered. Since the WAT pointer is at 0, RM3-5 is entered following RM3-4. The true condition of the output DELEND from the DELTA 2 MODULE causes RM3-22 to be reentered where the value 3 contained in the WPB pointer is stored into the WAS and WAT pointers, where the WPB and WAP pointers are reset to 0, where the flip flop SM is complemented so that in the AM-II MEMORY, area 2 becomes the read area and area 1 becomes the write area, and the DELFST flip flop in the DELTA 2 MODULE is set to 1.

This then becomes the end of Cycle 3 and the AM-II MEMORY area 2 and the WAS and WAT pointers contain the values depicted under the heading Conditions After Cycle 3 in Table 55.

At the beginning of Cycle 4, the conditions depicted under the heading Conditions After Cycle 3, Table 55, are present.

RM3-2 is now entered where the WAS pointer is counted down from 3 to 2. During RM3-3 the DECODE I MODULE provides the next lower actual occurrence value of the input line, namely, the actual occurrence value 0 which is stored into the DELV register of the DELTA 2 MODULE. During RM3-4 the WAT pointer contains the value 3, and accordingly is not 0, and RM3-7 is entered. During RM3-7, the value 2 is read from address O (specified by the WAP pointer) of the AM-II MEMORY area 2, and the value 2 is stored into the register RI. The WAP pointer is counted up from address 0 to address 1. During RM3-8, the DELTA 2 MODULE provides the first value from the shifted Delta line, offset by O (see Cycles 4, 5, Table 52). The first shifted Delta line value is a 0 and this value is stored into register RII.

RM3-9 is now entered where the value 0 contained in register RII is found to be less than the value 2 contained in register RI, and accordingly RM3-10 is entered where the value 0 is stored into address O of the AM-II MEMORY area 1, and the WPB pointer is counted up from 0 to 1.

RM3-8 is reentered where the DELTA 2 MODULE provides the next shifted Delta line value of 1 (see Cycles 4, 5, Table 52). The value 1 is now stored into register RII. During RM3-9, the value 1 in register RII is found to be less than the value 2 contained in register RI and accordingly RM3-10 is reentered where the value 1 is written into the AM-II MEMORY area 1 at address 1 (specified by the WPB pointer) and the WPB pointer is counted up to address 2.

RM3-8 is reentered where the DELTA 2 MODULE provides the next shifted Delta line value of 2 for storage in the register RII. During RM3-9, the value 2 stored in both registers RI and RII is detected as being equal and accordingly RM3-11 is entered where these values are discarded and the WAT pointer is counted down by 1 from 3 to 2. RM3-4 is reentered where the WAT pointer is found not to be 0; accordingly, RM3-7 is reentered.

During RM3-7 the value contained at address 1 (specified by the WAP pointer) is read from the AM-II MEMORY area 2 and stored into register RI. The WAP pointer is counted up by 1 address 2. During RM3-8 the DELTA 2 MODULE provides the next shifted Delta line value of 3 for storage in register RII. During RM3-9, the value 3 in register RII is found to be the smaller and accordingly RM3-10 is reentered where the value 3 is written into address 2 (specified by the WPB pointer) of the AM-II MEMORY area 1, and the WPB pointer is counted up by 1.

RM3-8 is now reentered where the DELTA 2 MODULE is forming a true signal at the DELEND output indicating that the last of the shifted Delta line values has been provided. Accordingly, RM3-16 is entered.

At this time, during RM3-16 the content of the WAT pointer is found to be equal to 2 and accordingly the compare circuit 1852 forms a true signal at the E output, causing the OR gate 1860 to form a true signal at the GE output. The WAS pointer at this juncture contains the address 2, pointing at address 2 of the AM-11 MEMORY area 2 (see Conditions After Cycle 3, Table 55). During RM3-20, a true signal is formed at the P11 output which causes a true signal at the A3R7 output of the REVOLVE 3 MODULE. The true signal at the A3R7 output causes the AM-II MEMORY to read the value 7 from address 2 (specified by the WAS pointer) in the AM-II MEMORY area 2. The value 7 is provided at the input of the N1 register of the REVOLVE 3 MODULE and the true condition of logic $P11.\overline{CLK}$ causes the value 7 to be stored into register N1. The true condition of logic $P11.\overline{CLK}$ causes the WAS pointer to be counted down 1 to address 1, and RM3-21 is entered. During RM3-21, a true signal is formed at the P12 output again causing a true signal at the A3R7 output. The AM-II MEMORY reads out address 1 (specified by the WAS pointer) and the value 5 contained there is applied to the input of register N2 of the revolve 3 MODULE. The true condition of logic $P12.\overline{CLK}$ causes the register N2 to store the value 5 from the AM-II MEMORY. Additionally, the true condition of logic $P12.\overline{CLK}$ causes the WAS pointer to count down from address 1 to address 0. At this point the operation of the REVOLVE 3 MODULE is exited. At this point in time the N1 and N2 registers contain the values 7 and 5, respectively. With reference to Table 51 it will be noted that the values 7 and 5 correspond to the rightmost actual occurrence value and the nextmost actual occurrence value in line 3 of the iso-entropicgram.

XXV. SEED 2 MODULE

A. General Description

According to this preferred embodiment of the invention special data processing means is provided for locating the desired seed in the iso-entropicgram without the necessity of generating the entire line of each intermediate line used in locating the seed. Advantageously, this increases the speed with which the seed is located in an iso-entropicgram. Briefly, according to this preferred embodiment the data processing means goes from one line to a second line in the iso-entropicgram by determining the difference between the largest two actual occurrence values in the first line and the difference between the width of the iso-entropicgram and the largest of the actual occurrence values in the first line. The largest of these two differences indicates the number of lines by which the second line is displaced from the first line in the iso-entropicgram. Identification of the shortest line generated during this repeated process is retained. The process stops when any subsequent line is found to be past the bottom end of the iso-entropicgram.

The right hand side of Table 4B gives an abbreviated example of how this preferred embodiment of the present invention moves from one line to the next in the iso-entropicgram while locating the seed.

The SEED 2 MODULE is the principal control module in locating a seed. The method involved is referred to herein as the fast seed finding method. The SEED 2 MODULE in finding a seed calls the REVOLVE 2 MODULE and the REVOLVE 3 MODULE discussed hereinabove. Briefly, the method involved gains speed by generating only the largest two (or end two) actual occurrence values of any given line of an iso-entropicgram and based on these two values and the width of the iso-entropicgram determines whether a seed line has been reached. Once it has been determined that a seed line has been reached, the entire line is generated by the REVOLVE 2 MODULE.

In addition to the control function of the SEED 2 MODULE, the SEED 2 MODULE receives the largest two occurrence values of the given line or input line of an iso-entropicgram from the DECODE I MODULE and determines the differences between these two values and the difference between the width of the iso-entropicgram and the largest occurrence value. Subsequently the SEED 2 MODULE receives the largest two occurrence values provided by the REVOLVE 3 MODULE and determines the difference between these two values and the width of the iso-entropicgram in order to determine the number of lines by which a revolve must occur to locate the next line in the same iso-entropicgram in the process of locating the seed.

These and other functions of the SEED 2 MODULE become clear in the detailed description.

Figure 73:
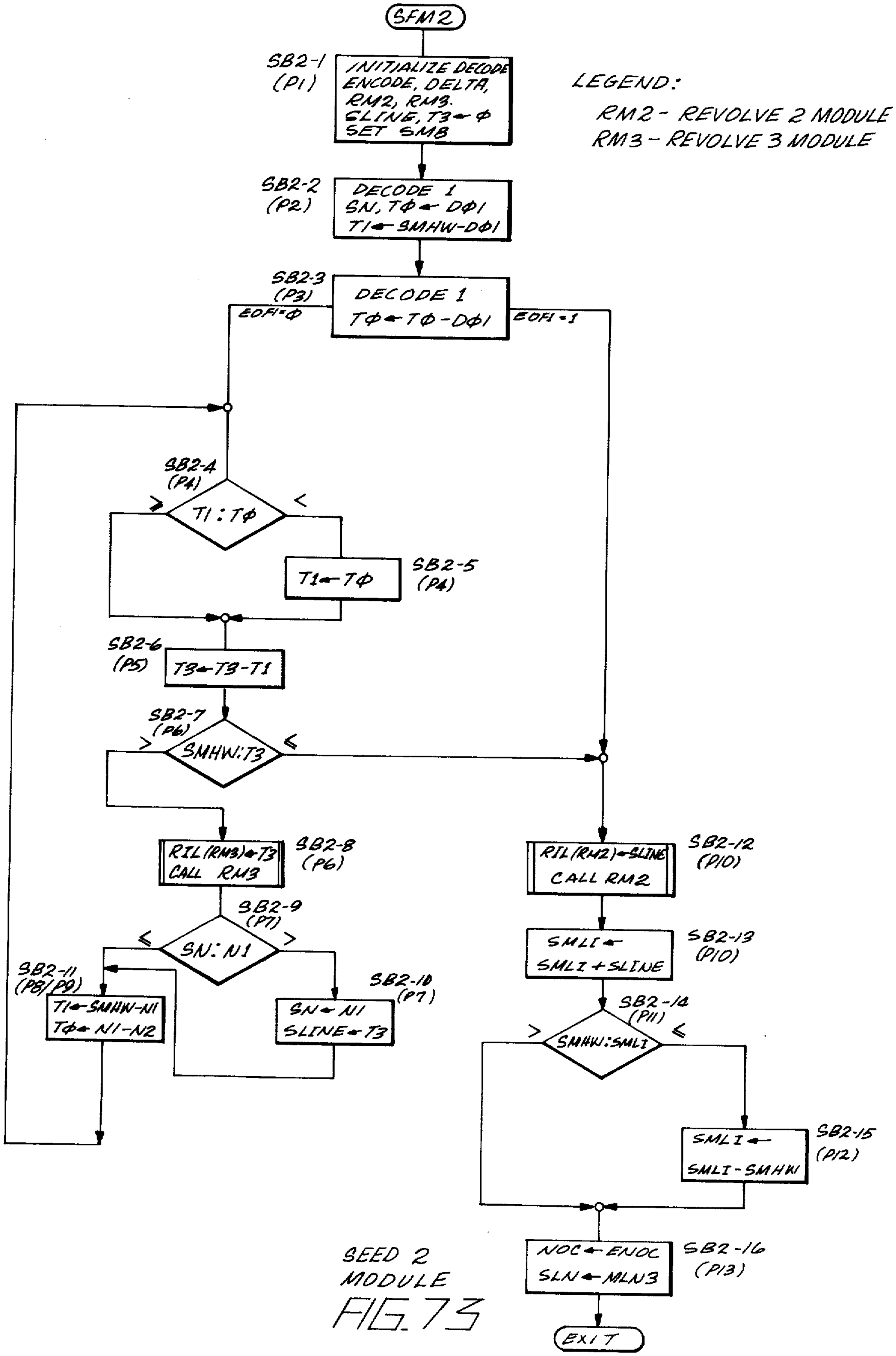
FIG. 73 is a flow diagram for the SEED 2 MODULE.

The following discussion makes reference to the SEED 2 MODULE flow diagram depicted in FIG. 73.

Briefly, the operation of the SEED 2 MODULE can be summarized as follows. Initially the following parameters are clocked from the IPRF to the respective modules and registers as follows: The length of the seed is clocked into MLN1 of DECODE I, line # is clocked into SMLI of SEED 2, iso-entropicgram width is clocked into SMHW of SEED 2 and EHW of ENCODE MODULES.

The SEED 2 MODULE initially enters SB2-1 responsive to a true signal at either of the outputs SM2GO or CM2 formed by the DPM INTERFACE AND CHANGE 2 MODULES, respectively.

Additionally, the seed line indicator register SLINE in the SEED 2 MODULE is reset to 0 and the T3 position indicator is reset to 0. To be explained in more detail, these two registers are reset to 0 since it is assumed that the SEED 2 MODULE is always starting from the 0 or input line of an iso-entropicgram in locating the seed line.

During SB2-2 the DECODE I MODULE is called. The DECODE I MODULE is now reading the given or input line of the iso-entropicgram starting with the largest occurrence value. Accordingly the DECODE I MODULE first provides the largest occurrence value from the EO vector and this value is stored in the SN and TO registers of the SEED 2 MODULE. Additionally, the SEED 2 MODULE, using the ALU, determines the difference between the iso-entropicgram width value contained in register SMHW and the largest occurrence value received from the DECODE I MODULE and the difference is stored in the T1 register. SB2-3 is then entered where the next to largest occurrence value is provided by the DECODE I MODULE to the SEED 2 MODULE and the ALU determines the difference between the largest (register TO) and the next to largest occurrence value and the result is stored in register TO. At this point in time the register T1 contains the difference between the iso-entropicgram width value and the largest occurrence value from the given line of the iso-entropicgram and the register TO contains the difference between the largest and next to largest occurrence values of the same given line. During SB2-4 and SB2-5, registers T1 and T0 are checked to see if register T1 contains the largest and if not, the largest is stored into register T1.

During SB2-6, the largest value contained in register T1 is added to the content of register T3 so that register T3 contains the number of the next line of the iso-entropicgram which is to be formed.

During SB2-7, the line number in register T3 is compared with the width of the iso-entropicgram contained in SMHW and if the content of register T3 is larger, the machine has revolved over the entire iso-entropicgram and accordingly, SB2-12 through SB2-16 are entered where the operation of the SEED 2 MODULE finally exits. Returning to SB2-7, if the content of register T3 is the smaller, then SB2-8 through SB2-11 are entered where the largest and next largest occurrence values of the next line in the iso-entropicgram are determined. To this end, the SEED 2 MODULE calls the operation of the REVOLVE 3 MODULE during SB2-8 and the desired line of the iso-entropicgram is transferred to register RIL of the REVOLVE 3 MODULE. The REVOLVE 3 MODULE in turn returns the largest and next largest occurrence values from the new line of the iso-entropicgram.

SB2-9 is used to determine whether the new line is shorter than the current seed line. Initially it is assumed that the input line is the seed line and hence register SN was set to 0 during SB2-2. For subsequent lines, the content of SN may not be 0 but will identify the line number of the shortest seed found to this point. During SB2-9 the SEED 2 MODULE determines whether the new line is shorter than the current seed line by comparing the largest occurrence value contained in register N1 of the REVOLVE 3 MODULE with the content of register SN. The seed line is defined as that line that has the largest number of 0's between the largest occurrence value and the edge of the iso-entropicgram. The smaller of the values contained in registers SN and N1 will indicate the shortest line or possible seed line. If the new line of the iso-entropicgram is the shorter, register N1 will contain the smaller value and SB2-10 will be entered where this length value will be stored into the SN register of the SEED 2 MODULE and the number of the new possible seed line now contained in register T3 will be transferred to the SLINE register.

If the presently assumed seed line is the smaller, then its largest occurrence value in register SN is smaller than the content of register N1 of the revolve 3 MODULE and SB2-11 is entered after SB2-9 where the difference between the iso-entropicgram width (SMHW)

and the largest occurrence value (N1) is determined and stored into register T1 and the difference between the largest and next largest occurrrence values in registers N1 and N2 of the REVOLVE 3 MODULE is determined and stored into registers TO. Subsequently, control returns to SB4 of the flow where the operation of SB2-4 et seq. is repeated. Finally, during one of the passes through SB2-7 it will be found that the number in register T3 of the new line is larger than the width of the iso-entropicgram stored in register SNHW and SB2-12 et seq. will be entered.

During SB2-12 the number of the seed line contained in register SLINE is transferred to the register RIL of the REVOLVE 2 MODULE and the operation of the REVOLVE 2 MODULE is called, causing the revolve 2 MODULE to generate the designated line of the iso-entropicgram which is the seed line.

During SB2-13 the line number of the input line contained in register SMLI is added to the seed line number contained in register SLINE. During SB2-14 the width of the iso-entropicgram contained in register SMHW is compared against the value in register SMLI to see if register SMLI contains the larger value. This may occur if the SEED 2 MODULE is called by the CHANGE MODULE. If the content of register SMLI is the larger, the iso-entropicgram width is subtracted from register SMLI during SB2-15. Following the operation of the ENCODE 3 MODULE the new seed line will have been converted to hybrid code and stored in the MEMORY MODULE area 3.

Following SB2-14 or SB2-15, SB2-16 is entered where the number of actual occurrence values in the seed line is transferred from register ENOC of the ENCODE MODULE to register NOC of the SEED 2 MODULE and the length of the seed line contained in register MLN3 of the ENCODE MODULE is transferred to register SLN of the SEED 2 MODULE.

The operation of the SEED 2 MODULE then exits leaving the seed line in MEMORY MODULE area 3.

B. Components

Figure 71:
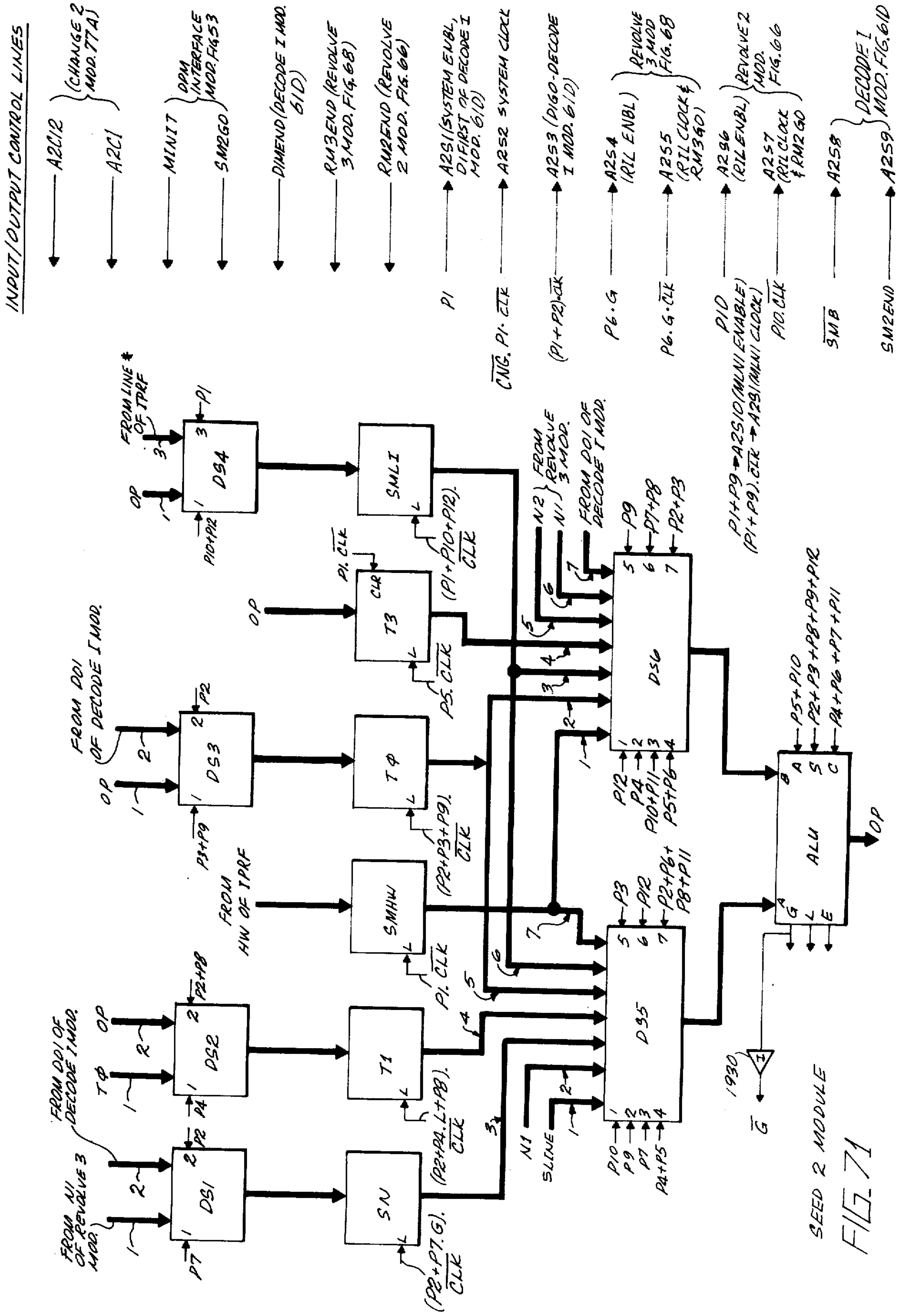
FIGS. 71 and 72 form a schematic and block diagram of the SEED 2 MODULE.
Figure 72:
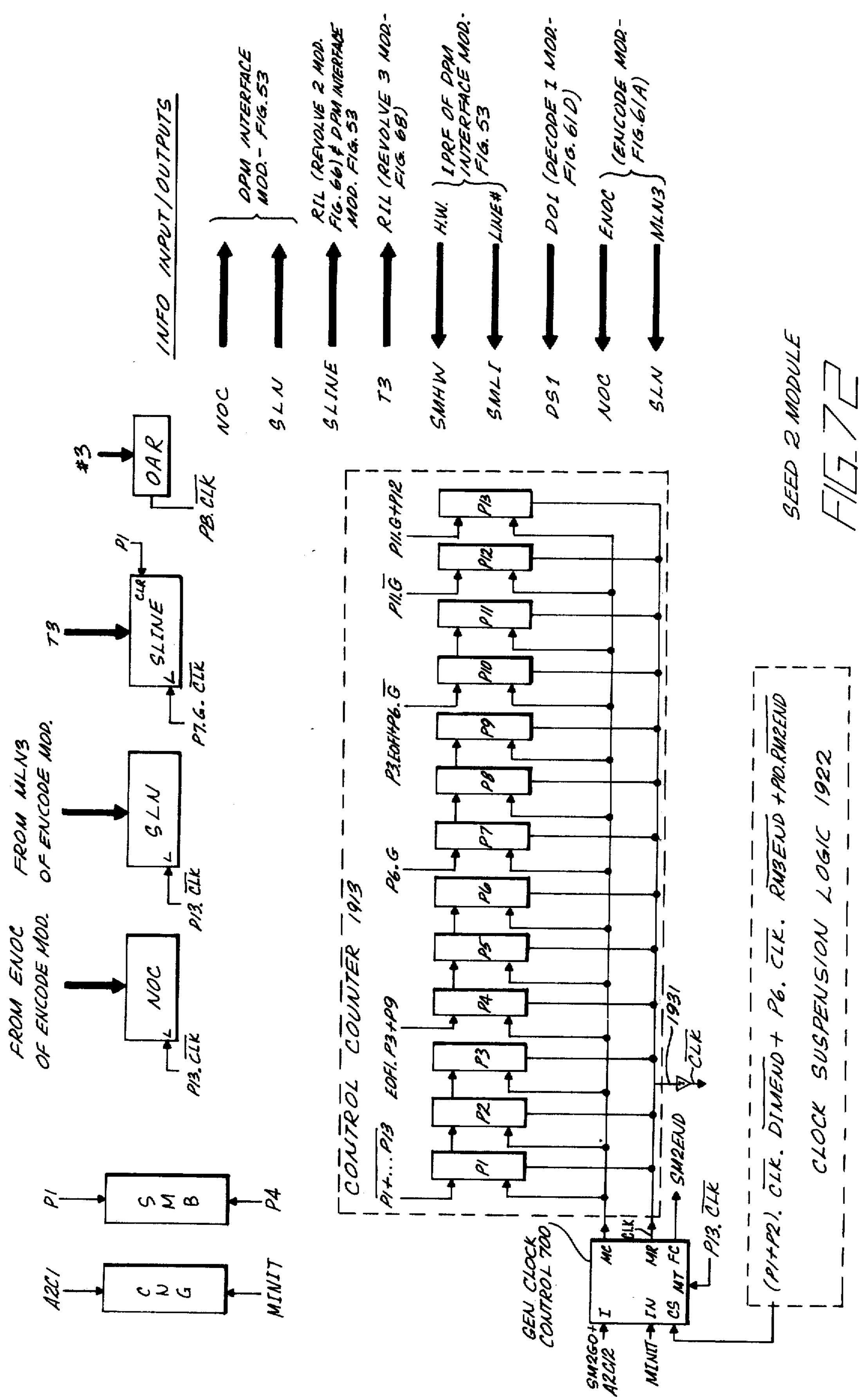

Referring to FIGS. 71 and 72, the SEED 2 MODULE contains the following 8 bit registers: SN, T1, SMHW, T0, T3, SMLI, NOC, SLN, and SLINE, all preferably of type SN7400 disclosed in the above reference TTL book. Also included are flip flops CNG, SMB, and P1 through P13. Each of these flip flops is of the leading edge trigger type discussed above. Flip flops P1 through P13 form a control counter 1913.

Selection circuits DS1 through DS6 are provided for gating 8 binary coded bits of information from any one of the inputs shown along the upper side to a single 8 binary bit output shown along the lower side of each rectangular box. The selection circuits are the same type discussed hereinabove and need not be considered in more detail at this point.

Conventional signal inverters 1930 and 1931 provide logical signal inversion for the signal applied at the respective inputs. Boolean equations are used as described hereinabove for depicting gating circuits required to control the various circuits of the SEED 2 MODULE.

Clock suspension logic 1922 is depicted using Boolean equations and provides signals to the CS input of the generalized clock control 700 for suspending the operation of the clock control 700 in the manner discussed in more detail hereinbelow and as discussed with respect to the generalized clock control 700 hereinabove.

An arithmetic logic unit (ALU) is provided for adding, subtracting and comparing the signals provided at the input shown along the upper side of the ALU. The ALU is of the same type discussed hereinabove.

Input/output control lines and information input/outputs are shown along the right hand side of FIGS. 71 and 72. Single lines are depicted by thin lines whereas multiple lines for carrying 8 binary bits of information are depicted in heavy solid lines.

C. Detailed Description

Consider now the details of the SEED 2 MODULE. The operation of the SEED 1 MODULE is called by the CHANGE 2 MODULE upon forming a true signal at the CM2GO output or by the DPM INTERFACE MODULE upon forming a true signal at the SM2GO output. Either of these signals causes a true signal at the I input of the generalized clock control 700 which in turn causes clock pulses to be formed at the CLK and $\overline{CLK}$ output. Prior thereto the P1 through P13 flip flops of the control counter 1913 were reset to 0 by a true signal at the MINIT output of the DPM INTERFACE MODULE and accordingly are now in a 0 state. Accordingly the logic $\overline{P1} + \ldots \overline{P13}$ is now true and the following CLK pulse causes the P1 flip flop to be set to a 1 state thereby causing SB2-1 of the flow to be entered. The true signal formed at the P1 output sets the SMB flip flop to a 1 state, and clears the SLINE register to 0. The output P1 becomes true, causing the line number of the input line to be gated through the DS4 selection circuit to the input of the SMLI register and the true condition of logic P1.$\overline{CLK}$ causes the value to be stored into the SMLI register. The true condition of the same logic P1.$\overline{CLK}$ causes the iso-entropicgram width to be stored into the SMHW register from the HW register of the IPRF and resets the T3 register to 0. The true signal at the P1 output and the true condition of logic P1.$\overline{CLK}$ also causes true signals at the A2S1 and A2S2 outputs. The true signal at the A2S1 output provides an enable signal to the following modules: DECODE I and II , ENCODE, SWITCH MATRIX 2 MODULES. and sets the D1FIRST flip flop of the DECODE I MODULE into a 1 state. The trùe signal at the A2S2 output causes the following to be stored into the indicated registers: IR, TL, BL, EÍR, ETL, EHW of ENCODE MODULE, LN1 to MLN1 of DECODE I MODULE.

SB2-2 of the flow is entered. The true condition of logic P1.$\overline{CLK}$ causes a true signal at the A2S3 output which in turn calls the operation of the DECODE I MODULE, causing it to provide an occurrence value from the EO vector, in MEMORY MODULE, representing the given line of the iso-entropicgram which is about to be revolved to its seed. During SB2-2, the occurrence value provided by the DECODE I MODULE is the largest occurrence value in the given or input line. By saving this value in register TO and by determining the difference between the iso-entropicgram width and the largest occurrence value, the given or input line is considered to be the current seed line.

The true condition of logic P1.$\overline{CLK}$.$\overline{D1MEND}$ causes a true signal at the CS input of the generalized clock control 700 thereby causing it to suspend further clock pulses until the DECODE I MODULE provides its occurrence value. When the DECODE I MODULE has provided its occurrence value in register D01, the output D1MEND of the DECODE I MODULE becomes false causing a false input at the CS input to the generalized clock control 700. The following CLK pulse sets the P2 flip flop to a 1 state and resets the P1 flip flop to a 0 state. The true signal at the P2 output causes the DS1 and DS3 selection circuits to gate the occurrence value in the D1 register of the DECODE I MODULE to the input of the SN and TO registers. Additionally, the true signal at P2 causes the DS5 and DS6 selection circuits to gate the iso-entropicgram width value from the SMHW register and the occurrence value from the D01 register of the DECODE I MODULE to the input of the ALU. The true signal at the P2 output causes the ALU to subtract the two values thereby forming, at the OP output thereof, the difference between the largest occurrence value of the given or input line and the width of the iso-entropicgram.

The true signal at the P2 output and the true condition of logic $P2.\overline{CLK}$ causes the DS2 selection circuit to couple the difference value from the OP output to the input of the T1 register and causes it to be stored in the T1 register.

The true signal at the $P2.\overline{CLK}$ logic causes a true signal at the A2S3 output causing the DECODE I MODULE to be called a second time, causing the next to largest occurrence value of the given or input line to be stored in the D01 register of the DECODE I MODULE. Similar to that described above, the logic $\overline{P2.\overline{CLK}.\overline{D1MEND}}$ causes the generalized clock control 700 to suspend its operation until after the DECODE I MODULE has provided the occurrence value to register D01. After the DECODE I MODULE has completed this operation, the following CLK pulse causes the P3 flip flop to be set to a 1 state and the P2 flip flop to be reset to a 0 state in the control counter 913.

The true signal at the P3 output causes the DS5 and DS6 selection circuits to couple the largest occurrence value in register TO and the next to largest occurrence value contained in register D01 of the DECODE I MODULE to the input of the ALU. The true signal at the P3 output also causes the ALU to form the difference between the two values at the OP output thereof. The true signal at the P3 output in turn causes the DS3 selection circuit to couple the difference value to the input of the register TO and the true condition of logic $P3.\overline{CLK}$ causes the difference value to be stored in register TO.

Accordingly, at this time the register T1 contains the difference between the iso-entropicgram width and the largest occurrence value, whereas the register TO contains the difference between the largest and next to largest occurrence value of the given or input line.

The true signal at the P3 output also causes the P3 flip flop to be set to a 1 state and the P3 flip flop is reset to a 0 state at the following CLK pulse.

Briefly, during SB2-4 and SB2-5, the content of registers T1 and T0 are compared and the larger of the two values is stored and ends up in register T1. During SB2-4, the true condition at the P4 output causes the DS5 and DS6 selection circuits to couple the content of registers T1 and T0 to the input of the ALU and causes the ALU to compare the values. The true signal at the P4 output causes the DS2 selection circuit to couple the T0 register to the input of register T1. If the ALU detects that the content of register T1 is less than that of register T0, a true signal is formed at the L output thereof causing the logic $P4.L.\overline{CLK}$ to become true which stores the content of register T0 into register T1. If the content of register T1 was originally the larger, or equal to that of register T0, SB2-5, is skipped.

The true signal at the P4 output causes the P5 flip flop to be set to a 1 state and the P4 flip flop is reset to a 0 state at the following CLK pulse, causing SB2-6 of the flow to be entered. The true signal at the P5 output causes the DS5 and DS6 selection circuits to couple the outputs of the T1 and T3 registers, respectively, to the input of the ALU. The true signal at the P5 output also causes the ALU to add the two values and form a sum at the output. The register T3 keeps a running tally of the number of lines by which the REVOLVE 3 MODULE has stepped through the iso-entropicgram. Since the larger difference value contained in register T1 specifies the number of lines by which the REVOLVE 3 MODULE is to revolve for the nest test, and the register T3 contains the number of lines revolved to this point, the output of register OP now contains the total of the lines revolved. The true signal at the P5 output causes the logic $P5.\overline{CLK}$ to become true and the output of the ALU is stored into register T3. The true signal at the P5 output causes the P6 flip flop to be set to a 1 state and the P5 flip flop is reset to a 0 state at the following CLK pulse, thereby causing SB2-7 to be entered.

During SB2-7 the iso-entropicgram width value contained in register SMHW is compared with the total number of lines revolved contained in register T3, and if the content of SMHW is the larger, indicating that the iso-entropicgram has been passed over, SB2-8 of the flow is entered. To this end the true signal at the P6 output causes the DS5 and DS6 selection circuits to couple the output of the registers SMHW and T3 to the input of the ALU and causes the ALU to compare the two values. If the content of register SMHW is the larger, a true signal is formed at the G output of the ALU. This causes the logic P6.G and $P6.G.\overline{CLK}$ to become true, thereby causing true signals at the A2S4 and A2S5 outputs. The true signal at the A2S4 output enables the content of register T3 to be applied to the input of register RIL in the REVOLVE 3 MODULE and the true signal at the A2S5 output causes the value in register T3 to be stored into register RIL. Thus register RIL now contains the new line number whose largest and next largest occurrence values are to be generated by the REVOLVE 3 MODULE. The true signal at the A2S5 output also calls the operation of the REVOLVE 3 MODULE.

The logic $P3.\overline{CLK}.RM3END$ is now true. After the REVOLVE 3 MODULE completes its operation, the RM3END output becomes false, causing the CS input of the generalized clock control 700 to become false, enabling the CLK and $\overline{CLK}$ pulses to resume in the SEED 2 MODULE.

If, during SB2-7, the content of register T3 is found to be equal to or greater than that of register SMHW, the ALU will form a false signal at the G output causing the signal inverter 1930 to form a true signal at the $\overline{G}$ output. This in turn causes the logic $P6.\overline{G}$ and $P6.\overline{G}.\overline{CLK}$ to become true which in turn forms true signals at the A2S6 and A2S7 outputs of the SEED 2 MODULE. The true signal at the A2S6 output causes the output of register SLINE (which now stores the length of the current seed line) to be stored into register RIL of the REVOLVE 2 MODULE (rather than the REVOLVE 3 MODULE) and calls the operation of the REVOLVE 2 MODULE. In this manner the REVOLVE 2 MODULE will form the actual seed line specified by the line number contained in register SLINE. Again, the true condition of logic P6.$\overline{CLK}$.RM2END causes the clock suspension logic 1922 to suspend its operation until completion of operation of the REVOLVE 2 MODULE.

Continuing with the operation following SB2-8, the true condition of logic P6.G causes the P7 flip flop to be set to a 1 state and the P6 flip flop to be reset to a 0 state, following the resumption of the CLK pulses following the end of the operation of the REVOLVE 3 MODULE. Thus, SB2-9 of the flow is entered.

During SB2-9, a comparison is made between the largest occurrence value for the seed line stored in register SN and the largest occurrence value provided by the REVOLVE 3 MODULE in register N1. To this end, a true signal is formed at the P7 output causing the DS5 and DS6 selection circuits to couple the SN register in the SEED 2 MODULE and the N1 register in the REVOLVE 3 MODULE to the input of the ALU and causes the ALU to compare the two values. Additionally, the true signal at the P7 output causes the DS1 selection circuit to couple the output from the N1 register to the REVOLVE 3 MODULE to the input of the SN register. If the occurrence value in register N1 is the larger, the ALU forms a true signal at the G output, causing the logic P7.G.$\overline{CLK}$ to become true, thereby causing the SN register to store the occurrence value from register N1. The true condition of logic P7.G.$\overline{CLK}$ also causes the SLINE register to store the total number of lines revolved from the T3 register.

The following CLK pulse causes the P8 flip flop to be set to a 1 state and the P7 flip flop to be reset to a 0 state. Assuming that the occurence value in register N1 is not larger than the largest occurrence value for the seed line contained in register SN, SB2-11 is entered. To this end, the true signal at the P8 output causes the DS5 and DS6 selection circuits to couple the width value in the SMHW register in the SEED 2 MODULE and the largest occurrence value in the N1 register in the REVOLVE 3 MODULE to the input of the ALU and also causes the ALU to subtract the content of register N1 from the content of the register SMHW. The true signal at the P8 output causes the DS2 selection circuit to couple the difference to the input of register T1 and the true condition of the logic P8.$\overline{CLK}$ causes the value to be stored in register T1. Note that this step is comparable to the one indicated during SB2-2 in that the largest occurrence value now being provided by the REVOLVE 3 MODULE is subtracted from the width of the iso-entropicgram and the value is stored in the register T1. The next CLK pulse causes the P9 flip flop to be set to a 1 state and the P8 flip flop to be reset to a 0 state.

The true signal at the P9 output causes the N1 and N2 registers to be coupled to the input of the ALU and the true signal at the P9 output causes the ALU to substract the two, thereby forming the difference of the largest and next largest occurrence values formed by the REVOLVE 3 MODULE. The true signal at the P9 output causes the DS3 selection circuit to couple the difference to the input of the register T0 and the true condition of logic P9.$\overline{CLK}$ causes the difference to be stored in register T0.

At this point in time then the register T1 contains the difference between the largest occurrence value and the width of the iso-entropicgram, whereas register T0 contains the difference between the largest and next largest occurrence values for the next line of the iso-entropicgram as determined by the REVOLVE 3 MODULE.

The true signal at the P9 output causes the P4 flip flop to be set to a 1 state and the P9 flip flop is reset to a 0 state thereby causing SB2-4 of the flow to be reentered.

Consider now SB2-13 which follows SB2-12. It will be recalled that SB2-12 et seq. is entered if the value in T3 is found to be larger than that in SMHW, indicating that the lower end of the iso-entropicgram has been passed (i.e., see path out of the right side of SB2-7), or that the end of file has been reached by the DECODE I MODULE (see path out of right side of SB2-3). It will also be recalled that during SB2-12, the REVOLVE 2 MODULE has been called and has revolved the seed line which is now stored in MEMORY MODULE area 2 via the ENCODE MODULE.

During SB2-13, a true signal is formed at the P10 output which causes the DS5 and DS6 selection circuits to couple the output of the registers SMLI and SLINE to the input of the ALU. The true signal at the P10 output also causes the ALU to add the two values. Thus the ALU now contains the line number for the seed line relative to the input line stored into the SMLI register. The true signal at the P10 output causes the DS4 selection circuit to couple the sum to the input of the SMLI register and the true condition of logic P10.$\overline{CLK}$ causes the sum to be stored in register SMLI.

The true signal at the P10 output causes the P11 flip flop to be set to a 1 state and the P10 flip flop to be reset to a 0 state at the following CLK pulse thereby causing SB2-14 to be entered.

During SB2-14, the sum value stored in register SMLI is compared with the iso-entropicgram width contained in SMHW. To this end, the true signal at the P11 output causes the DS5 and DS6 selection circuits to couple the SMHW and SMLI registers to the input of the ALU and causes the ALU to compare the two values. If the iso-entropicgram width in register SMHW is less than or equal to the sum value contained in register SMLI, SB2-15 is entered, where the iso-entropicgram width value contained in register SMHW is subtracted from the line value contained in register SMLI so as to form the line value modulo of the iso-entropicgram width. To this end, the ALU forms a false signal at the G output and the inverter 1930 forms a true signal at the $\overline{G}$ output. The true condition of logic P11.$\overline{G}$ causes the P12 flip flop to be set to a 1 state and the P11 flip flop to be reset to a 0 state at the following CLK pulse, causing SB2-15 to be entered.

During SB2-15, the true signal at the P11 output causes the DS5 and DS6 selection circuits to couple the SMLI and SMHW registers to the input of the ALU and the ALU subtracts the two values, forming the difference at the OP output. The true signal at the P12 output causes the DS4 selection circuit to couple the OP output to the input of the SMLI register, and the true condition of logic P12.$\overline{CLK}$ causes the difference value to be stored into register SMLI. Thus, register SMLI stores the number of the seed line.

Following SB2-15, the true signal at the P12 output causes the P13 flip flop to be set to a 1 state and the P12 flip flop is reset to a 0 state. Note that should the register SMHW have been the larger during SB2-14, a true signal would be formed at the G output of the ALU and the logic P11.G would be true, thereby causing P13 to be set directly following the true condition of flip flop P11. This would be equivalent to moving directly from SB2-14 to SB2-16.

During SB2-16, a true signal is formed at the P13 output and the number of occurrence values in the seed line now stored in register ENOC of the ENCODE MODULE is transferred to the NOC register of the SEED 2 MODULE and the length of the seed line in words contained in register MLN3 is transferred to the SLN register. To this end, the true signal at the P13 output causes the logic P13.$\overline{CLK}$ to be true, and the values from registers ENOC and MLN3 are stored into registers NOC and SML, respectively. The CNG flip flop is included here as an indicator to be set by the CHANGE 2 MODULE so that the proper signals are gated and clocked to the DECODE I, II and ENCODE MODULES. The SMB flip flop has been included so that during the first two reads from the DECODE I MODULE the MLN1 register is inhibited from clocking. This is so since these two values will be re-read when RM2 or RM3 is initialized.

D. Example of Operation

Consider now the example of operation depicted along the right side of the iso-entropicgram depicted in Table 51. Assume that the EO vector depicted at line 0 (0, 2, 3 and 5) has been stored in MEMORY MODULE area 1 as described above with respect to the other modules. Also assume it is desired to locate the seed line. An iso-entropicgram width value of 8 is stored into the HW of the IPRF.

The initial true signal at the SM2GO output of the DPM INTERFACE MODULE causes the SEED 2 MODULE to enter SB2-1 where the DECODE I, ENCODE, and DELTA 2 MODULES are initialized and the value 0 is stored into the SLINE and T3 registers and the SMB flip flop is set to a 1 state.

The system enable signals are formed at the A2S1 and the system clock is formed at the A2S2 outputs causing the iso-entropicgram width value to be transferred from HW of the IPRF into the following modules: DECODE I, ENCODE, and DELTA 2 MODULE. The other IPRF values are as described above.

SB2-2 is then entered where the DECODE I MODULE is called, causing the largest occurrence value 5 to be stored in registers SN and T0 of the SEED 2 MODULE. The largest occurrence value stored in D01 is subtracted from the iso-entropicgram width value of 8 contained in register SMHW and the difference value of 3 is stored into register T1.

SB2-3 is entered where the DECODE I MODULE is called for the second time, causing the next to be largest occurrence value of 3 to be provided by the DECODE I MODULE. Also during SB2-3, the next to largest occurrence value of 3 in register D01 (DECODE I MODULE) is substracted from the largest occurrence value 5 in register T0 and the difference value of 2 is stored into register T0.

Since the end of file has not been reached, the EOF1 flip flop in the DECODE I MODULE is in a 0 state and SB2-4 is entered after SB2-3.

The difference value of 3 contained in register T1 is larger than the difference value of 2 contained in register T0 and accordingly SB2-6 is entered where the 0 in register T3 is added to the larger difference value of 3 contained in register T1, and the resultant value of 3 is stored back into register T3.

SB2-7 is then entered where the RIL register of the REVOLVE 3 MODULE is loaded with the value 3 contained in register T3 and the REVOLVE 3 MODULE is called. During SB2-7 the iso-entropicgram width value of 8 in SMHW is compared with the difference value of 3 in T3 and the latter is found to be smaller; hence SB2-8 is entered.

During SB2-8 the REVOLVE 3 MODULE is called, using as the same inputs those inputs described as examples with respect to the REVOLVE 3 MODULE. The REVOLVE 3 MODULE then determines the largest occurrence value of line 3 of the iso-entropicgram (see Table 51). The largest value is the value 7 and is stored in register N1. The REVOLVE 3 MODULE then determines the next largest occurrence value of line 3, namely, a 5 and this value is stored into register N2 of the REVOLVE 3 MODULE. Subsequently, SB2-9 is entered where the largest occurrence value of the seed line (initially the given line), now stored in register SN, is compared with the largest occurrence value of the new line, now stored in register N1 of the REVOLVE 3 MODULE. Registers SN and N1 now contain the values 7 and 5, respectively, and since the value 5 in register SN is less, BS2-11 is entered where the value for register T1 is computed.

During SB2-11, the largest occurrence value 7 for the new line, in register N1, is subtracted from the iso-entropicgram width value 8 stored in register SMHW and the difference, 1, is stored back into register T1. Additionally, the difference between the largest occurrence value 7, in register N1, and the next largest occurrence value 5, in register N2, is determined and the difference, 2, is stored into register T0 and subsequently SB2-4 is reentered.

During SB2-4, it is found that the value of 1 in register T1 is less than the value 2 in register T0. Accordingly, SB2-5 is entered where the larger value 2 in register T0 is stored into register T1.

SB2-6 is entered where the current seed line value of 3, contained in register T3, is added to the new largest difference value of 2, contained in register T1, and the sum, 5, is stored into register T3. Thus register T3 now contains the number of the next line of the iso-entropicgram to be formed by the REVOLVE 3 MODULE, namely, line 5 of the iso-entropicgram depicted in Table 51.

During SB2-7, the iso-entropicgram width value of 8 contained in register SMHW is found to be larger than the new line number value of 5 contained in register T3 and accordingly SB2-8 is entered.

During SB2-8, the next line number value of 5 is stored into register RIL of the REVOLVE 3 MODULE and the REVOLVE 3 MODULE is called. From the foregoing discussion it will be seen that the REVOLVE 3 MODULE will return values of 2, in register N1, and 1, in register N2, as the largest and next largest occurrence values for line number 5.

During SB2-9, the register SN contains the value 5 which is the largest occurrence value of the given or input line. The given line, up to this time, has been considered to be the seed line, since it is shorter than line 3, the only intermediate line generated up to this point. During SB2-9, the value 5 stored in register SN is compared with the value 2, contained in register N1, and the latter is found to be smaller. Accordingly, SB2-10 is entered where the smaller occurrence value of 2, contained in register N1, is transferred to register SN, and the line number for the newly assumed seed, namely, 5, is transferred from register T3 to register SLINE.

Following SB2-10, SB2-11 is entered where the difference between the iso-entropicgram width value of 8 and the largest occurrence value of 2, contained in register N1, is determined and the resultant value of 6 is stored into register T1. Additionally, the difference between the largest and next largest occurrence value in registers N1 and N2 of the REVOLVE 3 MODULE is determined and stored into register T0. Registers N1 and N2 contain the values 2 and 1, respectively, and accordingly the difference is 1, and register T0 now contains a 1.

Following SB2-11, BS2-4 is reentered where the value of 6 in register T1 is found to be larger than the value of 1 contained in register T0. Accordingly, SB2-6 is entered where the difference value of 6 contained in register T1 is added to the current line value of 5 contained in register T3, and the resultant sum of 11 is stored into register T3.

SB2-7 is now entered where the value in T3 is found to be larger than the iso-entropicgram width value of 8 in register SMHW. Accordingly, SB2-12 is entered.

During SB2-12, the current line value of 5 contained in register SLINE is stored into register RIL of the REVOLVE 2 MODULE and the REVOLVE 2 MODULE is called, causing it to generate the entire line 5 of the iso-entropicgram depicted in Table 51 and the line is stored by the ENCODE MODULE into MEMORY MODULE area 2.

SB2-13 is then entered where the value of 0 in register SMLI is added to the line value of 5 in register SLINE and the resultant value of 5 is stored into register SMLI.

During SB2-14, the current seed line value of 5 stored in register SMLI is found to be smaller than the iso-entropicgram width value 8 in SMHW and accordingly SB2-16 is entered. During SB2-16, the number of occurrence values in the seed line stored in MEMORY MODULE area 2 is transferred from register ENOC of the ENCODE MODULE to NOC of the SEED 2 MODULE and the length of seed line in words, stored in register MLN3, is transferred to register SLN of the SEED 2 MODULE. The operation of the SEED 2 MODULE exits at this point.

Thus, upon exit, the SEED 2 MODULE has generated line 5 of the iso-entropicgram (see Table 51) and the line has been stored in MEMORY MODULE area 2. Register SMLI contains the seed line value of 5, and register NOC of the SEED 2 MODULE contains the word length value of 2.

XXVI. OUTPUT 2 MODULE

A. General Description

The OUTPUT 2 MODULE has two functions. The first is that it enables the original input line of an iso-entropicgram to be obtained from a given line representing any of the other lines of the same iso-entropicgram. To this end, the OUTPUT 2 MODULE is initialized and, in turn, initializes the DECODE I and II MODULES, the ENCODE MODULE and the REVOLVE 2 MODULE. The number of lines that the given line must revolve to obtain the input line of the same iso-entropicgram is determined and sent to the REVOLVE 2 MODULE causing it to generate the input line directly.

The second function of the OUTPUT 2 MODULE comprises an alternate arrangement for determining whether an actual occurrence value exists in an input line of an iso-entropicgram, given one of the other lines of the iso-entropicgram, also disclosed herein. This alternate embodiment is employed in the alternate DPM system of FIG. 61 and involves the OUTPUT 2 MODULE. This function was performed in the prior described embodiment of the invention in connection with the OUTPUT MODULE and is referred to herein as the DEL function.

Briefly, this alternate arrangement can be understood by making reference to Table 9-C and 9-F, and considering the principles involving the use of binary 1's and 0's. In this alternate embodiment a principle involving the inverted delta from Table 6 which is depicted in Table 9-C is also used. The given line, which is generally the seed line, of the iso-entropicgram, together with information from the inverted delta from Table 6, depicted in Table 9-C, is used to determine whether an actual occurrence value is present at the input line of the same iso-entropicgram. Initially the desired column (in the case of binary notation) or actual occurrence value (in the case of absolute coded notation) is given. The number of lines of displacement between the given line and the input line of the iso-entropicgram is determined. The number of lines of displacement is of course the number of lines by which the given line must be revolved before the input line is obtained. This difference value is then used as an index into the inverted delta depicted in Table 6.

Specifically, the line (see Table 9-C) corresponding to the difference value is obtained from the inverted delta and the right hand side is aligned over the column (in the case of binary notation) or the actual occurrence value (in the case of actual occurrence values) whose presence is to be determined. The overlaid 1's and 0's (in the case of binary notation) or the presence of actual occurrence values (in the case of absolute notation) are ANDed together, producing for each position a true condition if there is an actual occurrence value present in both the given line and the selected line of the delta. If there is an odd number of true conditions, i.e., an odd parity, then the corresponding column of the input line (in the case of binary notation) or the corresponding actual occurrence value, is present at the input line of the iso-entropicgram. If the number of true conditions is even, i.e., the parity is even, then a 0 (in the case of binary notation) is present, or the actual occurrence value is absent (in the case of actual notation) at the input line of the iso-entropicgram.

A better understanding of the foregoing principles of operation can be had with reference to the examples of Table 9-F.

Initially, the given (usually the seed of any event occurrence vector) line is stored in hybrid coded form in MEMORY MODULE area 1. Additionally, the MINI COMPUTER stores the actual occurrence values to be checked (i.e., a reference line) in MEMORY MODULE area 2. Additionally, the MINI COMPUTER stores in the IPRF the iso-entropicgram width (HW), the line # of the seed line, and the lengths of the seed line and the reference line (i.e., the number of physical words that comprise the seed). The OUTPUT 2 MODULE determines the number of lines of displacement between the given line and the input line of the iso-entropicgram, namely, the number of lines which must be revolved before the input line of the iso-entropicgram is obtained. The number of lines so determined is used as an index into the inverted delta depicted in Table 9-C. Specifically, the line of the inverted delta (depicted in Table 9-C) corresponding to the number of lines so determined, is obtained through the DELTA 2 MODULE. In this connection, the line of the inverted delta is aligned with its right hand side in the column (or occurrence value) of interest. In order to effect the shift, the OUTPUT 2 MODULE determines the difference between the occurrence value of interest and the iso-entropicgram width and this difference is then sent to the DELTA 2 MODULE. The representations of the presence and absence of occurrence values from the given and shifted delta lines, as represented by the respective occurrence values, are ANDed together to form a true representation if an occurrence value is true in both lines and a 0 if an occurrence value is absent from either one or both lines. An odd number of true conditions indicates the presence of the occurence value at the input line of the iso-entropicgram whereas an even number of true conditions indicates the absence of an occurrence value at the input line.

Since the EO vectors have been arranged in a monotonically decreasing sequence and the DELTA 2 MODULE generates its output in a monotonically increasing sequence, an intermediate storage step is necessary. This procedure was described in discussing the REVOLVE 2 MODULE above. The OUTPUT 2 MODULE computes from the current reference line value the minimum possible occurrence value that can be affected by the inverted "DEL" pattern. This minimum value is passed to the DELTA 2 MODULE as the starting column of its sequence.

A sequence of monotonically decreasing EO values are read from the seed line is DPM MEMORY MODULEA area I and placed in temporary storage (i.e., AUXILIARY MEMORY II). Next the DELTA 2 MODULE starts to generate a monotonically increasing representing a bit pattern in the delta corresponding to the number of lines to be revolved; the starting value in this sequence being the minimum valued column computed above. These shifted DELTA 2 values are ANDed to the seed line portion in temporary storage at AUXILIARY MEMORY II MODULE. The odd parity of the number of true output AND'S (i.e., the same value occurs in both the seed line segment and in the delta line pattern) is monitored by toggle flip flop T. If an odd number of true valued AND's are encountered, the reference line value read by the DECODE 2 MODULE and stored in RI is written directly to MEMORY MODULE area 3. If an even number of true valued AND's are encountered, the writing to the MEMORY MODULE area 3 is omitted. Seed line values in the seed line segment in temporary storage at AUXILIARY MEMORY II which are greater than the highest shifted value from the DELTA 2 MODULE need no longer be considered and accordingly the bottom memory pointer (WB) for AUXILIARY MEMORY II is set to reflect this situation. It should be noted here that the above described process whereby the seed line values larger than the largest generated shifted DELTA 2 MODULE value are ignored causes the current seed line segments to process through the AUXILIARY MEMORY II module area 1. When the end memory is reached, wrap around occurs.

The above stated process repeats for each value to be checked in the reference line. After all reference line values have been processed, exit is taken from the module with the values in MEMORY MODULE area 3 representing those values in the reference line which also appeared on the input line of the same iso-entropicgram that contains the seed line. It is important to note that the "DEL" function as described above allows the user of this system to make data dependent decisions without regenerating the entire input line of the iso-entropicgram that contains the seed.

B. Components

A list of the hardware components used in designing the OUTPUT 2 MODULE is given in Table 57 of this disclosure.

C. Detailed Description

Figure 74:
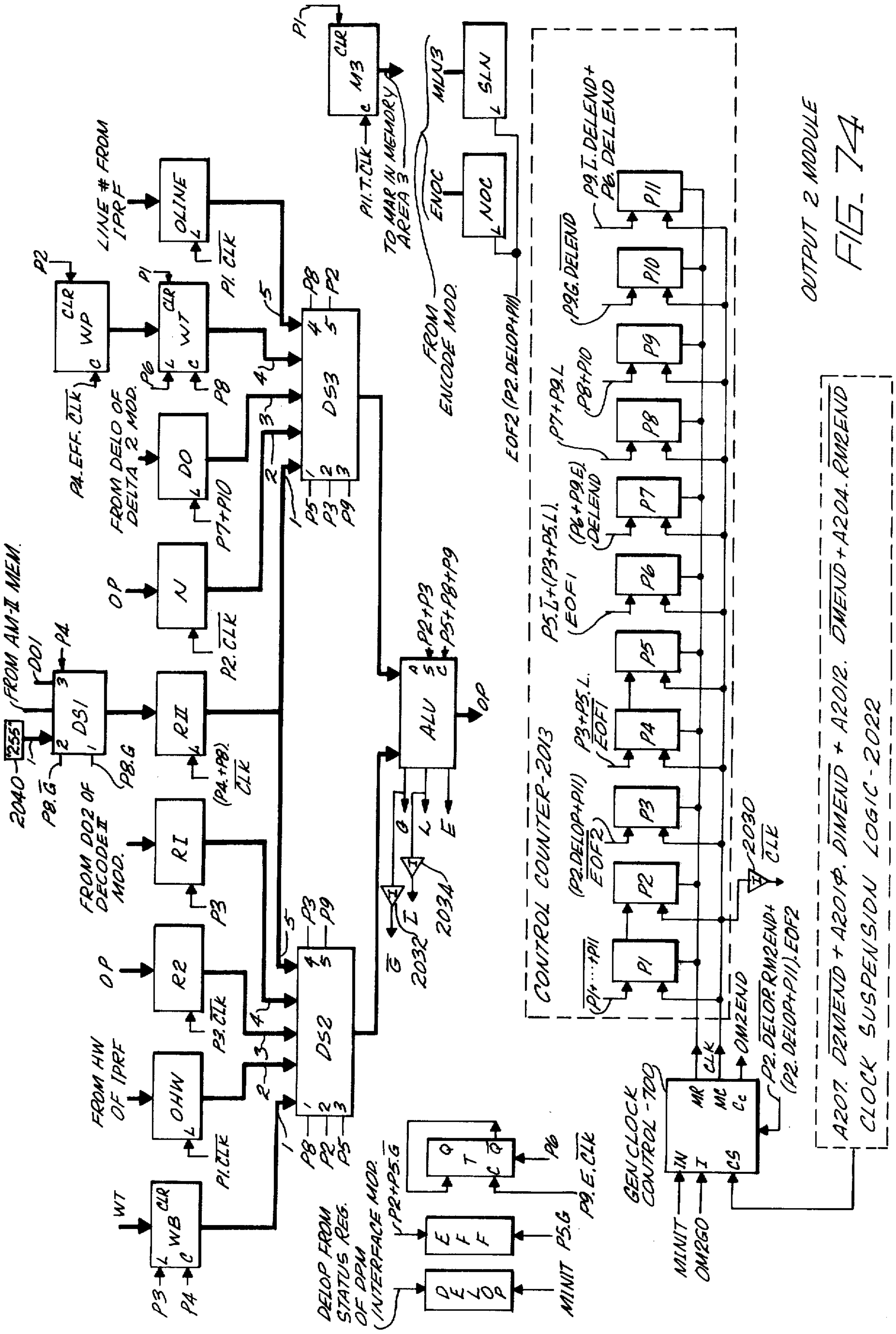
FIGS. 74 and 75 form a schematic and block diagram of the OUTPUT 2 MODULE.
Figure 75:
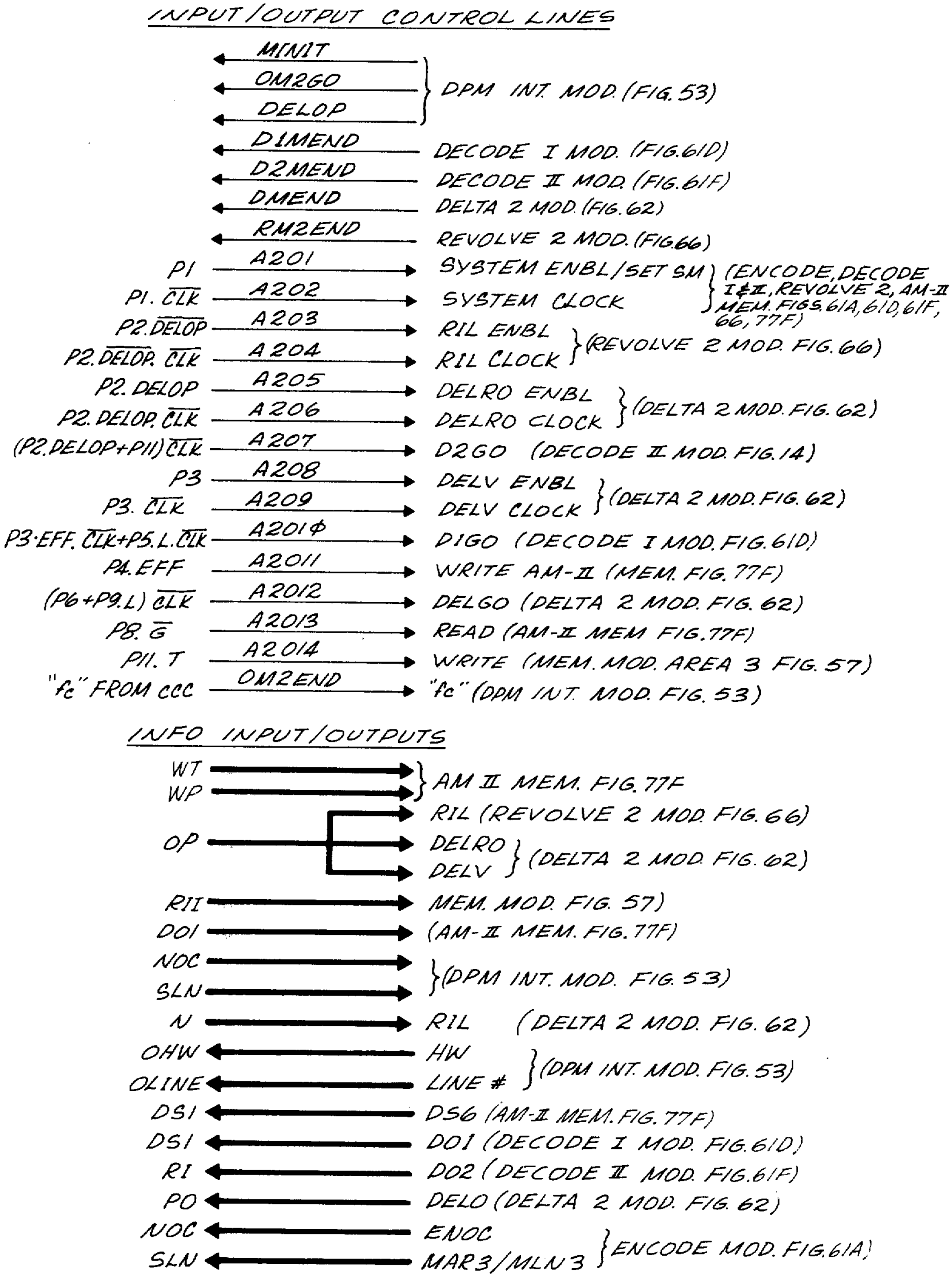
Figure 76:
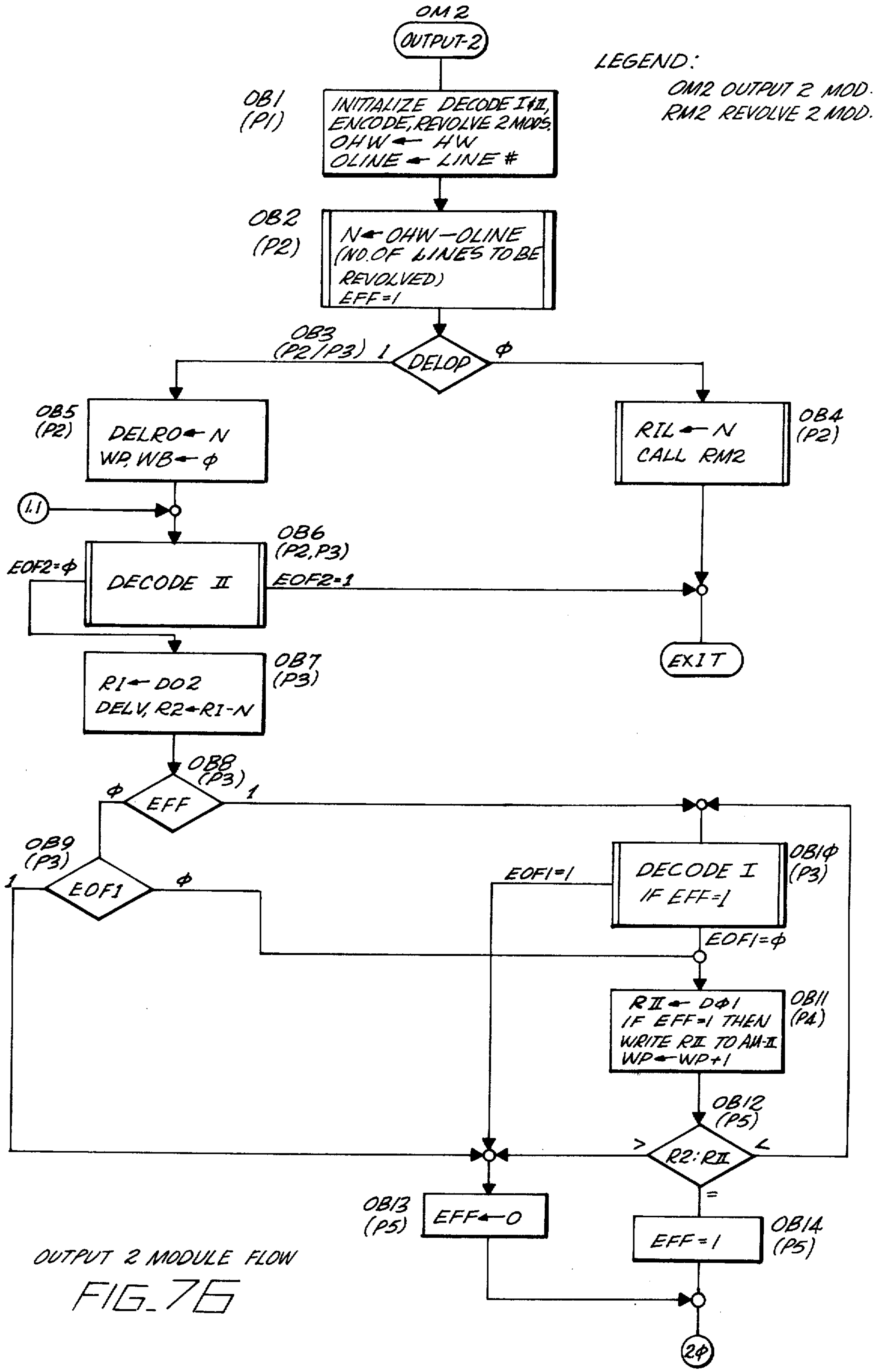
FIGS. 76 and 77 form a flow diagram for the OUTPUT 2 MODULE.

Refer now to the schematic and block diagram of FIG. 76 and the flow diagram of FIGS. 74 and 75 and consider the general structure of the OUTPUT 2 MODULE. The following description will make reference to the general operation as depicted in the flow diagram of FIGS. 74 and 75. Initially, the MINI COMPUTER stores the following into the IPRF of the DPM INTERFACE MODULE:

1. Iso-entropicgram width into HW
2. The line # of the seed into the line #
3. The length of the seed line is stored into LN1.

Additionally, if the DEL function is to be performed by the OUTPUT 2 MODULE, the length of the reference line is stored in IPRF register LN2, the DELOP flip flop in the status register of the DPM INTERFACE MODULE and hence the DELOP flip flop in the OUTPUT 2 MODULE, are set to a 1 state, whereas these flip flops are initially set to a 0 state if the regular output operation is to be performed.

In addition the MINI COMPUTER stores the following information into the indicated areas of the MEMORY MODULE:

Area 1 — given (seed) event occurrence (EO) vector
Area 2 — actual occurrence value to be checked (reference line) (only if the DEL operation is to be performed and flip flop DELOP is 1)
Area 3 — reserved for the regenerated input line or the actual occurrence values found to be present at the input line.

The MINI COMPUTER calls the OUTPUT 2 MODULE by forming a true signal at the OM2GO output in the case of a regular output, and a true signal at the outputs OM2GO causing OB1 of the flow to be entered. During OB1 of the flow, the OUTPUT 2 MODULE is initialized thereby storing the iso-entropicgram width (HW) into register OHW and the line number of the given line (line #) is stored into register OLINE of the OUTPUT 2 MODULE. Additionally, the OUTPUT 2 MODULE forms a true signal at the A201 output and the A202 output, initializing the operation of the DECODE I and II, ENCODE, and REVOLVE 2 MODULES.

OB2 of the flow is then entered where the OUTPUT 2 MODULE computes the number of lines required to revolve the given line to the original input line of the corresponding iso-entropicgram. To this end, the line # of the given line contained in register OLINE is subtracted from the width value of the iso-entropicgram stored in register OHW and the result is stored into register N of the OUTPUT 2 MODULE.

OB3 is then entered where the state of the DELOP flip flop in the OUTPUT 2 MODULE is checked. If the DELOP flip flop is in a 0 state, indicating that a regular output operation is to be performed, OB4 is then entered. During OB4 the number of lines to be revolved is fed from the N register of the OUTPUT 2 MODULE to register RIL of the REVOLVE 2 MODULE. The operation of the REVOLVE 2 MODULE is then called, causing the given line of the iso-entropicgram stored in MEMORY MODULE area 1 to be revolved back to the input line of its iso-entropicgram. The final input line so generated is stored into MEMORY MODULE area 3.

Return to OB3 of the flow and assume that the DELOP flip flop is in a 1 state, indicating that the DEL operation is to be performed. OB5 is entered following OB3. During OB5, DECODE I MODULE enable flip flop EFF is set to a 1 state in the OUTPUT 2 MODULE. The number of lines to be revolved value stored in register N is sent to register DELRO of the DELTA 2 MODULE thereby indicating the desired line of the inverted delta which is to be shifted and provided by the DELTA 2 MODULE. Additionally, the WP and WB pointer register in the OUTPUT 2 MODULE are reset to 0.

OB6 of the flow is entered following OB5. During OB6 the operation of the DECODE II MODULE is called causing it to provide one of the occurrence values to be checked from the EO vector stored in MEMORY MODULE area 2 (i.e. a reference line value). It will be recalled the DECODE II MODULE provides the occurrence values from the EO vector in decreasing value order. If the DECODE II MODULE has already provided the last or smallest occurrence value from the EO vector in MEMORY MODULE area 2, the EOF2 flip flop will be in a 1 state and the OUTPUT 2 MODULE exits, following OB6. However, if the DECODE II MODULE has not provided the last occurrence value, OB7 is entered following OB6.

OB7 stores and saves the occurrence value to be checked in the input line into register RI. Additionally the minimum occurrence value that can be effected by the shifted line of the delta is computed by subtracting the value in N from the value just read and the result is stored in register R2 of the OUTPUT 2 MODULE. The minimum value stored in register R2 is then transferred to register DELV of the DELTA 2 MODULE, causing the DELTA 2 MODULE to effect the corresponding offset or shift in the line of the inverted delta specified by the value now stored in register DELRO of the DELTA 2 MODULE.

OB8 of the flow is now entered. If during OB8 the DECODE I MODULE enable flip flop EFF is in a 1 state, OB10 of the flow is entered where the operation of the DECODE I MODULE is called, causing it to provide one of the occurrence values from the EO vector stored in MEMORY MODULE area 1. Again it will be noted that the DECODE I MODULE provides the occurrence values from the EO vector stored in MEMORY MODULE area 1 in decreasing value order starting with the largest value. If the DECODE I MODULE has not reached the end of the EO vector in MEMORY MODULE area 1, then OB11 is entered where the occurrence value from the DECODE I MODULE is stored into register RII of the OUTPUT 2 MODULE and if the EFF flip flop is in a 1 state, as is the case when OB10 has been entered, causing a value to be provided by the DECODE I MODULE, then the value stored in register RII is stored into the write area of the AM-II MEMORY at the location specified by the WP pointer, and the address contained in the WP pointer is counted up by 1. Note that the values are read from the EO vector for the given line in decreasing value order and are stored in that order in the AM-II MEMORY.

Following OB11, OB12 is entered. During OB12 the OUTPUT 2 MODULE checks to determine if sufficient values have been read from the given line to determine if the actual occurrence value stored in the register RI is present. The decision cannot be made if the minimum value stored in register R2 is less than the occurrence value of the EO vector for the given line stored in register RII. If this condition exists and hence the decision cannot be made, then OB10 and OB11 are reentered where the process depicted is repeated, causing another value from the EO vector of the given line to be read in and stored into register RII. This operation is repeated until the occurrence value stored in register RII is less than or equal to the minimum value in register R2. When the foregoing condition exists during OB12, the decision can be made and either OB13 or OB14 is entered depending on the relative values of the content of registers R2 and RII. If the minimum value in register R2 is equal to the occurrence value of the EO vector from the given line in register RII, the OB14 is entered where the EFF flip flop is set to a 1 state indicating that the DECODE I MODULE is to be called on the next cycle, causing the next lower occurrence value from the given line to be provided. If, on the other hand, the minimum value in register R2 is greater than the occurrence value from the given line stored in register RII, OB13 is entered where the EFF flip flop is set to a 0 state, indicating that the DECODE I MODULE is not to be called.

Returning to OB10, it will be noted that when the DECODE I MODULE has reached the end of file and the EOF1 flip flop is hence in a 1 state, the operation of OB11 and OB12 is shunted and OB13 is directly entered for all future entries into OB10.

Following OB13 or OB14, OB15–OB24 is entered. OB15 through OB24 performs the operation of ANDing an parity checking the indication of occurrence values from the given line and from the shifted line received from the DELTA 2 MODULE. The AND operation performed an occurrence value at a time while keeping track of the parity in the flip flop T. The DELTA 2 MODULE outputs the shifted delta line values from lowest to highest value, i.e., in inverse order to that in which the occurrence values are provided by the DECODE I and II MODULES. Advantage is taken of this order of reading since when OB14 through OB24 is completed, the AM-II MEMORY pointers WT, WB are in such a state that the higher values of the given line which are no longer needed are dropped. The memory address register WP is such as to cause the wraparound to occur when the highest memory location is reached in the AM-II MEMORY.

Referring specifically to OB15, here the pointer to the highest value so far recorded in the AM-II MEMORY, as indicated by the WP pointer, is stored into register WT and saved. Additionally, the parity flip flop T is set to 0. Following OB15, OB16 of the flow is entered where, if the end of the shifted line of the delta has not been reached, i.e., DELEND is in a 0 state, then the DELTA 2 MODULE is called, causing it to provide the next shifted occurrence value in the delta line being generated. OB17 is entered where the next shifted occurrence value is transferred from register DELO of the DELTA 2 MODULE to register D0 of the OUTPUT 2 MODULE. OB18 is next entered where the WT pointer is decreased by 1 so that it identifies the next address in the AM-II MEMORY for reading. OB19 is subsequently entered where the address in the current pointer WT is compared to the last allowable address which is stored in register WB. To be explained in more detail in connection with OB27, the content of pointer WT plus 1 is stored into pointer WB in order to denote that seed line values at addresses lower then WB are to be ignored. Thus during OB19, if the content of pointer WT is greater than or equal to the minimum value in pointer WB, OB20 is entered where a shifted occurrence value is read from the AM-II MEMORY and stored into register RII of the OUTPUT 2 MODULE. If the content of register WT is smaller, then OB21 is entered following OB19, causing a maximum value 255 to be stored into register RII. Maximum value 255 is the largest allowable positive number that can be stored into register RII in the configuration used here by way of example.

Following OB21 or OB20, OB22 is entered where the actual AND and parity check operation is performed. To this end, if during OB22 the value in register RII is smaller than the shifted delta value in register D0, the operation returns to OB18 and another seed line segment value is read from the AM-II MEMORY. If, during OB22, the content of register RII is found to be greater than the shifted delta value in register D0, then OB24 is entered where the next higher shifted delta line value is called from the DELTA 2 MODULE and stored into register D0. If the last shifted line value has not been provided by the DELTA 2 MODULE, then OB22 is reentered following OB24, causing the comparison during OB22 to be repeated. When, during OB22, the content of registers RII and D0 are found to be equal, OB23 is entered where the flip flop T is complemented, indicating equality has been detected, thereby indicating that the presence of the same valued occurrence values has been detected in both the shifted delta line and from the given line. In other words, the AND of the presence of an occurrence value from both the shifted delta line and from the given line, is true and, thus, the parity is toggled.

Following OB23, OB16 is reentered where the next shifted delta value is read from the DELTA 2 MODULE and subsequently during OB20, the next seed line segment value is read from the AM-II MEMORY.

When, during OB24, the last shifted line value has been provided by the DELTA 2 MODULE and the DELEND flip flop is in a 1 state, OB25 is next entered. During OB25 a decision is made whether the occurrence value under test is present and thus is to be outputted to MEMORY MODULE area 3. To this end, if the T flip flop is in a 1 state, OB26 is entered where the reference line occurrence value under test, stored in register RI, is sent into MEMORY MODULE area 3. In addition the M3 address register in the OUTPUT 2 MODULE is counted up by 1 so that it now contains the address of the next location in MEMORY MODULE area 3 for writing. If the T flop flop is in a 0 state, indicating that the number of true conditions detected by the AND an parity check operation is even, OB27 is entered where the occurrence value under test in register RI is ignored, and OB27 is entered directly. During OB27, the pointer WT is counted up by 1 and the result stored in pointer WB causing all seed line segment values in AM-II that addresses lower than WB to be ignored on future cycles. Following OB27, OB6 is reentered and the cycle of operation is repeated. Finally, when the last occurrence value to be checked is provided from the EO vector in MEMORY MODULE are 3, the EOF2 flip flop in the DECODE II MODULE is set to a 1 state and the machine exist following OB6.

Therefore, it should now be apparent that when the DEL function is complete, upon exit, that MEMORY MODULE area 3 will contain those and only those actual occurrence values from the reference line EO vector stored in MEMORY MODULE area 2 which exist at the input line of the iso-entropicgram corresponding to the given line represented by the EO vector stored in MEMORY MODULE area 1.

With the foregoing general description of the OUTPUT 2 MODULE in mind, consider now the OUTPUT 2 MODULE in more detail, again making reference to the flow chart of FIGS. 74 and 75 and the schematic and block diagram of FIG. 76.

The operation of the OUTPUT 2 MODULE is called by the MINI COMPUTER by applying a true signal at the OMGO output to cause a regular output operation and by applying the true signal at the OMGO output together with a true signal at the DELOP output of the DPM INTERFACE MODULE to cause the DEL operation to be performed.

The true signal at the OMGO output causes the generalized clock control 700 to start forming clock pulses at the CLK output. Initially, all of the flips P1 through P11 are in a 0 state (having been set there by a control signal at the MINIT output of the DPM INTERFACE MODULE). The true signal at the P1 output and the true condition of logic $P1.\overline{CLK}$ causes true signals to be formed at the A201 and the A202 output, the first signal causing a system enable signal to be sent to the ENCODE, DECODE I and II, and REVOLVE 2 MODULES and to the SM flip flop in the AM-II MEMORY and the latter signal providing a system clock to the same parts of the system.

The true condition of logic $P1.\overline{CLK}$ causes the OHW register to load the iso-entropicgram width from register HW in the IPRF and causes the OLINE register to store the line number of the given line from the line # from the IPRF register.

The true signal at the P1 output of the P1 flip flop causes the P2 flip flop to be set to a 1 state at the following CLK pulse.

OB2 is now entered. The iso-entropicgram width in register OHW and the given line number in register OLINE are subtracted and the result is stored into the N register. To this end the true signal formed at the P2 output causes the DS2 and DS3 selection circuits to couple the OHW and OLINE registers to the input of the ALU and causes the ALU to subtract the content of register OLINE from that of register OHW. The difference value formed by the ALU is applied to the input of the N register and the true condition of logic $P2.\overline{CLK}$ causes the N register to store the difference value. Thus, the N register now contains the number of lines to revolve the seed in order to obtain the original input. The true condition at the P2 output also causes the EFF flip flop to be set at a 1 state. Assuming that the regular output is to take place, the DELOP flip flop is now in a 0 state. Accordingly, OB4 is entered. During OB4 the true conditon of logic $P2.\overline{DELOP}$ and the true condition of logic $P2.\overline{DELOP}.\overline{CLK}$ causes the A203 and A204 outputs of the OUTPUT 2 MODULE to receive true signals, causing the RIL register in the REVOLVE 2 MODULE to receive the number of lines to be revolved value from register N in the OUTPUT 2 MODULE.

If during OB3 the DELOP flip flop is in a 1 state, indicating that the DEL function is to be performed, OB5 is entered rather than OB4. During OB5, the true signal at the P2 output causes the WP, and WT pointers to be reset to 0.

Logic P2.DELOP and the logic P2.DELOP.$\overline{CLK}$ now become true causing true signals at the A205, A206, and A207 outputs, causing the DELTA 2 MODULE to receive the number of lines to be revolved from the N register of the OUTPUT 2 MODULE and causing the value to be stored into register DELRO.

OB6 of the flow is now entered. The true signal at the P2.DELOP.$\overline{CLK}$ output causes a true signal at the A207 output which in turn calls the operation of the DECODE II MODULE. Additionally, in the clock suspension logic 2013 the logic A207.$\overline{D2MEND}$ becomes true, causing a true signal at the CS input of the generalized clock control 700 thereby causing the generalized clock control to terminate pulses at the CLK and $\overline{CLK}$ outputs. Thus, the OUTPUT 2 MODULE operation is momentarily suspended while the DECODE II MODULE provides an occurrence value from the EO vector designating the occurrence values to be checked, which EO vector is stored in MEMORY MODULE area 2.

After the DECODE II MODULE has completed its operation and provided an occurrence value, the true signal at the $\overline{D2MEND}$ output thereof becomes false, causing the CS input of the clock suspension logic 2013 to become false and the generalized clock control 700 starts providing CLK and $\overline{CLK}$ pulses.

Assuming that the DECODE II MODULE has not reached the end of the reference line EO vector field in MEMORY MODULE area 2, the EOF2 flip flop is now in a 0 state, and the logic P2.DELOP.$\overline{EOF2}$ is now true and the following CLK pulse causes the P3 flip flop to be set to a 1 state and the P2 flip flop is reset to a 0 state, causing OB7 of the flow to be entered.

During OB7 of the flow, a true signal is formed at the P3 output thereby causing register RI to store the reference line occurrence value to be checked from register DO2 of the DECODE II MODULE. Additionally, the true signal at the P3 output causes the DS2 and DS3 selection circuits to couple the RI and N register outputs to the input of the ALU and causes a true signal at the S input of the ALU which in turn causes the ALU to subtract the two values, forming the difference at the OP output. Additionally, the true signal at P3 causes the value in the WT register to be clocked into the WB register.

The logic P3.$\overline{CLK}$ becomes true and the difference is stored into register R2. The true condition of the output P3 and of the logic P3.$\overline{CLK}$ causes true signals at the A208 and A209 outputs of the OUTPUT 2 MODULE, thereby applying an enable signal to the DELV register of the DELTA 2 MODULE which in turn causes the difference at the OP output to be stored into the DELV register. Thus, the DELTA 2 MODULE now contains the difference value indicating the number of lines to be revolved in DELRO and the beginning occurrence value that will begin the shifted output values in DELV.

OB8 is now entered where the state of flip flop EFF is checked. Assuming that flip flop EFF is not in a 1 state, OB10 is entered. During OB10 the true condition of logic P3.EFF.$\overline{CLK}$ causes a true signal at the A2010 output of the OUTPUT 2 MODULE, which in turn calls the operation of the DECODE I MODULE. Additionally, the true condition of logic A2010.$\overline{D1MEND}$ causes a true signal at the CS input of the generalized clock control 700 which in turn stops providing CLK and $\overline{CLK}$ pulses, suspending the operation of the OUTPUT 2 MODULE.

The DECODE I MODULE then provides from MEMORY MODULE area 1 an occurrence value from the seed EO vector of the given line. The occurrence value is provided at the DO1 register of the DECODE I MODULE. When this occurs the true signal at the $\overline{D1MEND}$ output of the DECODE I MODULE becomes false, causing a false signal at the CS input of the generalized clock control which in turn commences the CLK and $\overline{CLK}$ pulses. The following CLK pulse causes the P4 flip flop to be set to a 1 state and the P3 flip flop is reset to a 0 state thereby causing OB11 to be entered.

The true signal at the P4 output causes the DO1 register from the DECODE I MODULE to be coupled through the DS1 selection circuit to the input of register RII. Additionally, the true signal at P4 causes the value in counter WB to be clocked up one. The true condition of logic P4.$\overline{CLK}$ causes the register RII to store the occurrence value from the EO vector of the given line. The true condition of logic P4.EFF causes the AO211 output of the OUTPUT 2 MODULE to be true which in turn causes the AM-II MEMORY to write the occurrence value from the given line stored in register RII into the location of the AM-II MEMORY specified by the WP pointer. Additionally, the true condition of logic P4.EFF.$\overline{CLK}$ causes the WP pointer to be counted up so that it now contains the address of the next location into which a write is to take place in the AM-II MEMORY.

The true signal at the P4 output of the P4 flip flop causes the P5 flip flop to be set to a 1 state and the P4 flip flop is reset to a 0 state at the following CLK pulse, thereby causing OB12 to be entered.

During OB12, the true signal at the P5 output causes the DS2 and DS3 selection circuits to couple the registers R2 and RII to the input of the ALU. The true signal at the P5 output causes the ALU to compare the two values and provide outputs indicating the result of the comparison. It will be recalled that register R2 contains the difference value indicating the minimum occurrence value that can be effected by shifted delta values. Thus, if the value in register R2 is equal to the occurrence value from the given line in register RII, a false signal is formed at the G output and hence a true signal is formed at the $\overline{G}$ output of the inverter 2032. The true signal at the $\overline{G}$ output causes the logic P5.$\overline{G}$ to become true, thereby setting the EFF flip flop to a 1 state, as indicated during OB14 of the flow. If, during OB12, the comparison indicates that the lower boundary value in register R2 is greater than the occurrence value from the given line stored in register RII, then the ALU forms a true signal at the G output causing the logic P5.G to become true. Thus, during OB13 the EFF flip flop is thereby set to a 0 state.

Note that OB15 is entered following either OB13 or OB14. To this end, whenever the minimum value contained in register R2 is not less than (i.e., equal to or greater than) the occurrence value in register RII, a false signal is formed at the L output of the ALU and a true signal is formed at the $\overline{L}$ output of the inverter 2034. Thus the logic P5.$\overline{L}$ is true, causing the P6 flip flop to be set to a 1 state at the following CLK pulse, causing OB15 to be entered. Additionally, if during OB10 of the flow, it is found that the EOF1 flip flop is in a 1 state, indicating that the DECODE I MODULE has reached the end of the given line, the logic P5.L.EOF1 will become true, also causing the P6 flip flop to be set to a 1 state at the CLK pulse.

During OB15, a true signal is formed at the P6 output causing the WT pointer to load the content of the WP pointer. Thus, both WT and WP now contain the address of or point to the next location in the AM-II MEMORY to be written. The true signal at the P6 output also resets the T flip flop to 0.

OB16 is now entered. During OB16 the logic P6.$\overline{CLK}$ is true, causing a true signal at the A2012 output causes the logic A2012.$\overline{DMEND}$ to become true, enabling the clock suspension logic 2013 to apply a true signal at the CS input of the generalized clock control 700, thereby suspending pulses at the CLK and $\overline{CLK}$ outputs. The DELTA 2 MODULE then provides the first shifted occurrence value. After the DELTA 2 MODULE has formed its shifted delta value in its register DELO, a false signal is formed at the DMEND output thereof, causing a false input to the CS input of the generalized clock control 700, causing pulses to again be formed at the CLK and $\overline{CLK}$ outputs.

Assuming that the DELTA 2 MODULE has not reached the last shifted occurrence value to be formed, the flip flop DELEND thereof is now in a 0 state. Therefore the logic P6.DELEND is not true and at the following CLK pulse, flip flop P7 is set to a 1 state and flip flop P6 is reset to a 0 state, causing OB17 to be entered.

During OB17 the true signal at the P7 output causes the DO1 register to store the shifted occurrence value from register DELO of the DELTA 2 MODULE. A true signal is now being formed at the P7 output and at the following CLK pulse the P8 flip flop is set to a 1 state and the P7 flip flop is reset to a 0 state, causing OB18 of the flow to be entered.

During OB18 a true signal is formed at the P8 output causing the WT (pointer) to count down the address therein to the next lower address. OB19 is now entered where the content of the WB and WT pointers are compared. The WT pointer now contains the last address of the AM-II MEMORY in which reading has occurred. The WB pointer contains the address of the location beyond which seed line values are to be ignored.

For comparison, the true signal at the P8 output causes the DS2 and DS3 selection circuits to couple the outputs of registers WB and WT to the input of the ALU and the true signal at the P8 causes the ALU to compare the values stored therein. If the content of the AM-II MEMORY area one pointer WT is now greater than or equal to the content of register WB. The content of register WB is not the larger value and accordingly the ALU forms a true signal at the G output. Under these conditions, OB20 is entered where the next value in the AM-II MEMORY specified by the WT pointer is read and stored in the RII register. To this end, the true condition of logic P8.$\overline{G}$ causes a true signal at the A2013 output which in turn causes the AM-II MEMORY to read out the content of the read memory area specified by the address in the read pointer WT. The true condition of logic P8.$\overline{G}$ causes the DS1 selection circuit to couple the seed line segment value read from the AM-II MEMORY to the input of register RII. The true condition of logic P8.$\overline{CLK}$ causes the value to be stored into register RII. At the following CLK pulse the true signal at P8 causes the P9 flip flop to be set to a 1 state and the P8 flip flop is reset to a 0 state, causing OB22 to be entered.

Return now to OB19 and consider the situation where the content of the WT read pointer is smaller than that of the WB pointer. Under these conditions the content of the WB pointer is the larger and accordingly a true signal is formed at the G output of the ALU. The true signal at the G output causes OB21 to be entered where the logic P8.G is true, causing the maximum value 255, represented by the switches 2040, to be coupled through the DS1 selection circuit to the input of register RII, and the logic P8.$\overline{CLK}$ is now true, causing the maximum value 255 to be stored in the register RII. As before, the P9 flip flop is set to a true state and the P8 flip flop is subsequently set to a 0 state, causing OB22 to be entered.

During OB22, a true signal is formed at the P9 output where the seed line segment value stored in register RII is compared with the shifted delta line value in register D0. To this end the true signal at the P9 output causes the DS2 and DS3 selection circuits to couple the output of registers RII and D0 to the input of the ALU and causes the ALU to compare the two values. If the seed line segment value in register RII is the smaller, a true signal is formed at the L output, causing the logic P9.L to become true which in turn causes the P8 flip flop to be set to a 1 state and the P9 flip flop is reset to a 0 state at the following CLK pulse, thereby causing OB18 of the flow to be reentered. This pass through OB18 through OB22 is repeated until the seed line segment value read from the AM-II MEMORY and stored in register RII becomes equal to or less than the shifted delta line value in register D0. If during OB22 the seed line segment value in register RII is equal to that of the shifted delta line value in register D0, a true signal is formed at the E output of the ALU, causing the logic P9.E.$\overline{CLK}$ to become true, which triggers the T flip flop to its complementary state. The true condition of logic P9.E.DELEND causes the P7 flip flop to be set to a 1 state at the following CLK pulse, and OB16 of the flow is reentered where the DELTA 2 MODULE is again called, causing the next higher shifted delta line value to be read and stored into the D0 register. In this regard, it will be noted that the logic P9.L.$\overline{CLK}$ causes the true signal at the A2012 output calls the operation of the DELTA 2 MODULE.

If during OB22, the seed line segment value stored in register RII is found to be larger than the shifted delta line value in register D0, the logic P9.L.$\overline{CLK}$ causes a true signal at the A2012 output which in turn calls the operation of the DELTA 2 MODULE. As before, the clock suspension logic 2013 causes the CLK and $\overline{CLK}$ pulses to be suspended until the DELTA 2 MODULE completes its operation and provides the next higher shited delta value to be stored in the DELO register. When this occurs, the clock suspension logic 2013 causes the generalized clock control 700 to again apply CLK and $\overline{CLK}$ pulses. The ALU also forms a true signal at the G output which causes the logic P9.G.$\overline{DELEND}$ to become true and thereby set the P10 flip flop to a 1 state at the following CLK pulse. The true signal at the P10 output causes the DO1 register to load the next shifted delta value from register DELO of the DELTA 2 MODULE.

Note that if, during OB24, the DELEND flip flop is in a 1 state, OB25 is next entered. However, if the DELEND flip flop is in a 0 state, OB22 is next entered.

Assume that OB25 has been entered. If the T flip flop is now in a 1 state, the logic (P9.$\overline{L}$. + P6) DELEND causes the P11 to be set to a 1 state, thereby causing OB26 to be entered. The true condition of logic P11.T causes a true signal at the A2014 output of the OUT- PUT 2 MODULE which in turn causes the MEMORY MODULE to write the reference line occurrence value to be checked, from register RI, into area 3 at the location specified by the address in register M3 in the OUTPUT 2 MODULE. Additionally, the true condition of logic P11.T.$\overline{\text{CLK}}$ causes the register M3 to be counted up by 1 address so that it now contains the address of the next available location in area 3. Note that if the T flip flop is in a 0 state, that OB27 is entered directly, bypassing OB26. During OB27 the true signal occurs at the P11 output.

The true condition of the logic P11.$\overline{\text{EOF2}}$ causes the P3 flip flop to be set to a 1 state and causes the P11 flip flop to be reset to a 0 state at the following CLK pulse, thereby causing OB6 to be entered. In this connection, the true condition of the logic P11.$\overline{\text{CLK}}$ causes a true condition at the A207 output of the OUTPUT 2 MODULE which in turn calls the operation of the DECODE II MODULE, causing it during OB6 to provide the next occurrence value to be checked, which value is subsequently stored in register RI during OB7.

D. Example of Operation (under OUTPUT 2 MODULE)

Consider now the example of operation of the OUTPUT 2 MODULE depicted in Table 58. The initial information stored in the IPRF is as follows:

Line #—5[Line number of given line]

HW—8(iso-entropicgram width)

LN1—12(length of given line).

The initial condition in the status register of the DPM INTERFACE MODULE is as follows:

*DELOP* = 0

The hybrid coded EO vectors stored in the MEMORY MODULE are as follows:

Area 1 — 2, 1, 0 (given line value in hybrid coded form)

Area 2 — *n/a*

Area 3 — *n/a*

Under these conditions the given line is actually a seed line and the OUTPUT 2 MODULE is now going to cause the EO vector to be rotated back to the input line of its iso-entropicgram.

To this end, the DELOP flip flop being in a 0 state in the DPM INTERFACE MODULE, causes the DELOP flip flop in the OUTPUT 2 MODULE to be set to a 1 state. OB1 is now entered where the DECODE I and II, ENCODE, and REVOLVE 2 MODULES are intialized. Additionally, the iso-entropicgram width value and line number value in registers HW and LINE # are transferred from the DPM INTERFACE MODULE to registers OHW and OLINE of the OUTPUT 2 MODULE. Additionally, the SWITCH MATRIX 2 for the AM-II MEMORY is initialized. During OB2, the line # 5 contained in register OLINE is substracted from the iso-entropicgram width value 8 stored in register OHW and the difference, 3, is stored into the N register. During OB3, the DELOP flip flop is in a 0 state and accordingly OB4 is entered. During OB4 the difference value in register N specifies the number of lines by which the revolve is to be effected in order to generate the input line of the iso-entropicgram. Accordingly, the difference value 3 in register N is transferred to register RIL of the OUTPUT 2 MODULE and the operation of the REVOLVE 2 MODULE is called, causing the REVOLVE 2 MODULE to revolve the given line in MEMORY MODULE area 1 back to the input line of its iso-entropicgram and the result is stored back in MEMORY MODULE area 3. Following OB4, the operation of the OUTPUT 2 MODULE is exited.

Consider now an alternate example of operation for the OUTPUT 2 MODULE as depicted in Table 58. By way of example, assume that the IPRF contains the following initial conditions:

LINE # — 5 (line number of the given line)

HW — 8 (iso-entropicgram width)

LN1 — 2 (physical length of the seed line in words)

LN2 — 2 (length of the request line specifying the occurrence values to be checked)

In addition, the state register in the DPM INTERFACE MODULE contains the following condition:

DELOP — 1 (indicating that the "DEL" operation is to be performed by the OUTPUT 2 MODULE)

The MEMORY MODULE contains the following in nybrid coded form:

Area 1 — 2, 1, 0 (given or seed line)

Area 2 — 6, 2 (request occurrence vector specifying the occurrence values to be checked)

Initially, the DELOP flip flop in the OUTPUT 2 MODULE is set to a 1 state corresponding to the state of the DELOP flip flop in the STATUS register of the DPM INTERFACE MODULE. The operation of the OUTPUT 2 MODULE during OB1 and OB2 is identical to that described hereinabove with respect to the first example.

The following is an example of the operation, using symbolic notation:

```
            Alternate Output Module
control sequence    OB1-OB3, OB5-OB8, OB10-OB13, OB15-OB20,
                    OB22, OB18, OB19, OB21, OB22, OB24, OB22, OB24, OB22,
                    OB24, OB22, OB24, OB25, OB27
OB1 perform the initialization
OB2 N(3) = OHW(8) - OLINE (5)
OB3, OB5 DELOP = 1        EFF = 1
                          DELRO = N = 3
                          WP, WT, WB = 0
OB6 call DECODE II returns 6, EOF2 = 0
OB7 RI - DO 2 = 6
        R2 (3) = RI (6) - N(3)
        DELV = R2 = 3
  OB8,  OB10 EFF = 1
          call DECODE I returns 2, EOF1 = 0
  OB11    RII = R01 = 2
          Write RII to AM-II M EM WP = WP+1 = 1
 OB12,  OB13 R2(3) > RII(2) EFF = 0
  OB15    WT = WP = 1
          T = 0
 OB16,  OB17 call DELTA 2 returns DELO = 3
          DO = DELO = 3
  OB18    WT = WT - 1 = 0
 OB19,  OB20 WB = ST = 0
```

-continued

```
OB19, OB20 WB = ST = 0
      Read RII = 2 from AM-II MEM at address WT
OB22, OB18 RII (2) < DO(3)
      WT = WT - 1 = 1
OB19, OB21 WB > WT RII = 255
OB22, OB24 RII(255) > DO(3)
      call Delta 2 returns DO = DELO = 4
PB22, OB24 RII > DO(4)
      call DELTA 2 returns DO = DELO = 5
OB22, OB24 RII > DO
      call DELTA 2 returns DELEND
OB25, OB27 T = 0 WB = WT + 1 = 0
      End of first cycle
      Note nothing has been written to MEMORY MODULE
      area 3 indicating that column 6 line 0 has a 0 value.
```

Note that upon return the only value in MEMORY MODULE area 3 is a 2. Thus, of the check occurrence values 6, 2 only 2 was present in the given line.

XXVII. CHANGE 2 MODULE

A. General Description

The CHANGE 2 MODULE has the function of modifying information contained in EO vectors. The module is initially presented with a seed line whose values are arranged in monotonically decreasing order. The seed line is the iso-entropic compressed version of the input line to be changed. Additionally, an input value representing the iso-entropicgram line number of the above seed is input. Additionally, a set of monotonically decreasing values representing values to be changed in the input line (i.e., a change line) whose seed was initially input, is entered. These values represent event occurrence values to be changed. Hence, if an event occurrence value exists both in the input line of the iso-entropicgram represented by the seed and the change line, it will be removed from the input line. However, if a value exists in the change line but not in the input line of the iso-entropicgram represented by the seed, then the change line value is added to the input line. The above process is accomplished by revolving the change line so that the change line representation and the seed line are on equivalent lines of their respective iso-entropicgrams. When this is the case, the two lines from their respective iso-entropicgrams are merged, forming a single line of a new iso-entropicgram which is not necessarily the seed line. This new representation contains as one of its lines the original input line of the seed with the appropriate changes made. This new representation is then passed to the alternate seed finding program.

A new seed line is obtained by the SEED 2 MODULE and the iso-entropic line number is adjusted to reflect this new seed. The CHANGE 2 MODULE exits with the new changed seed in MEMORY MODULE area 3 and its line number reflecting the relative distance of this seed from the changed input line.

B. Components

A list of the hardware components for the CHANGE 2 MODULE is given in Table 58A. All components shown therein have been disclosed elsewhere in this system and will not be repeated here. Similarly the comparator and the data selector have also been disclosed elsewhere. Table 50F lists the input/output requirements for the CHANGE 2 MODULE.

C. Detailed Description

Figure 77:
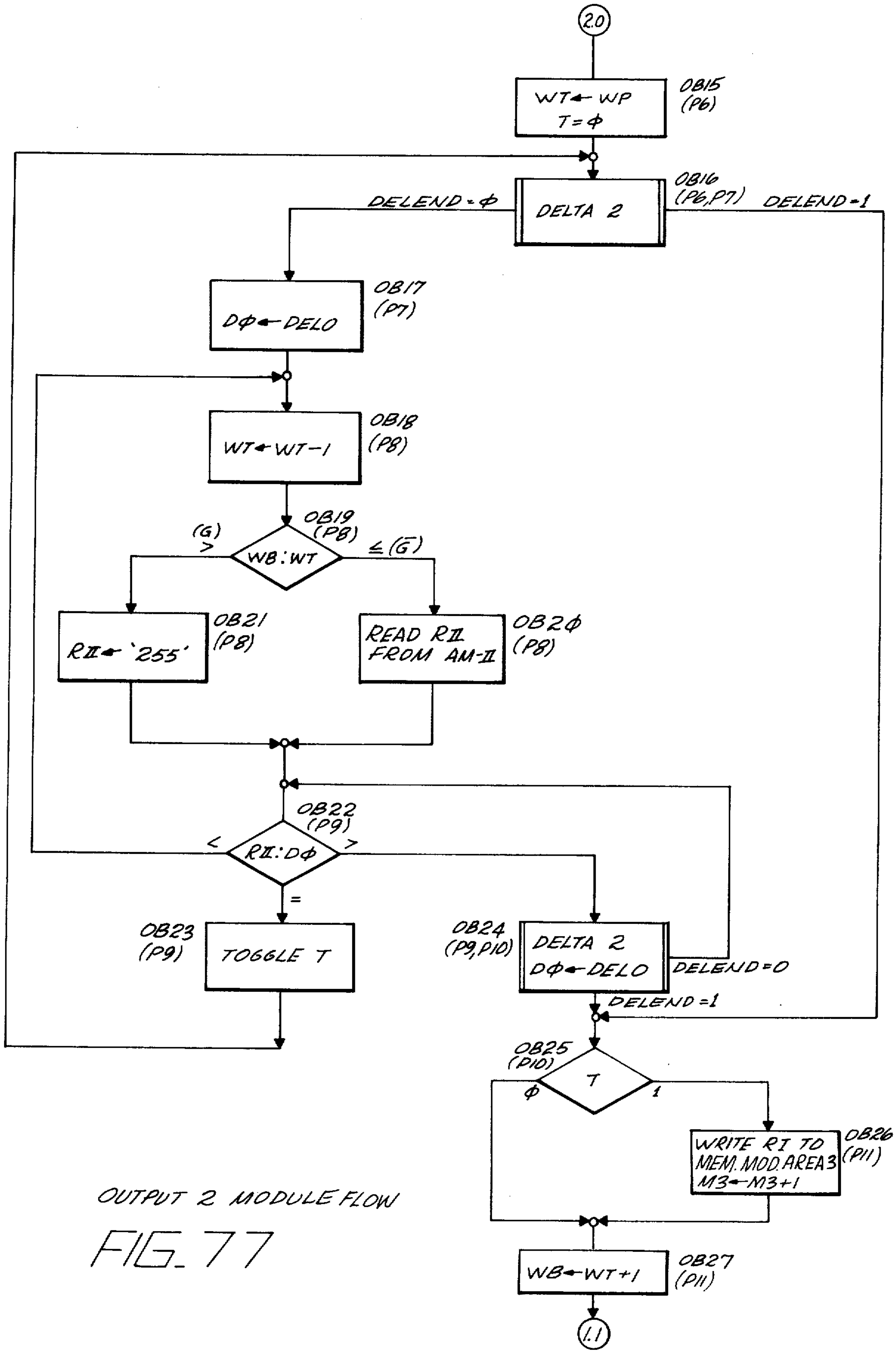
Figure 77A:
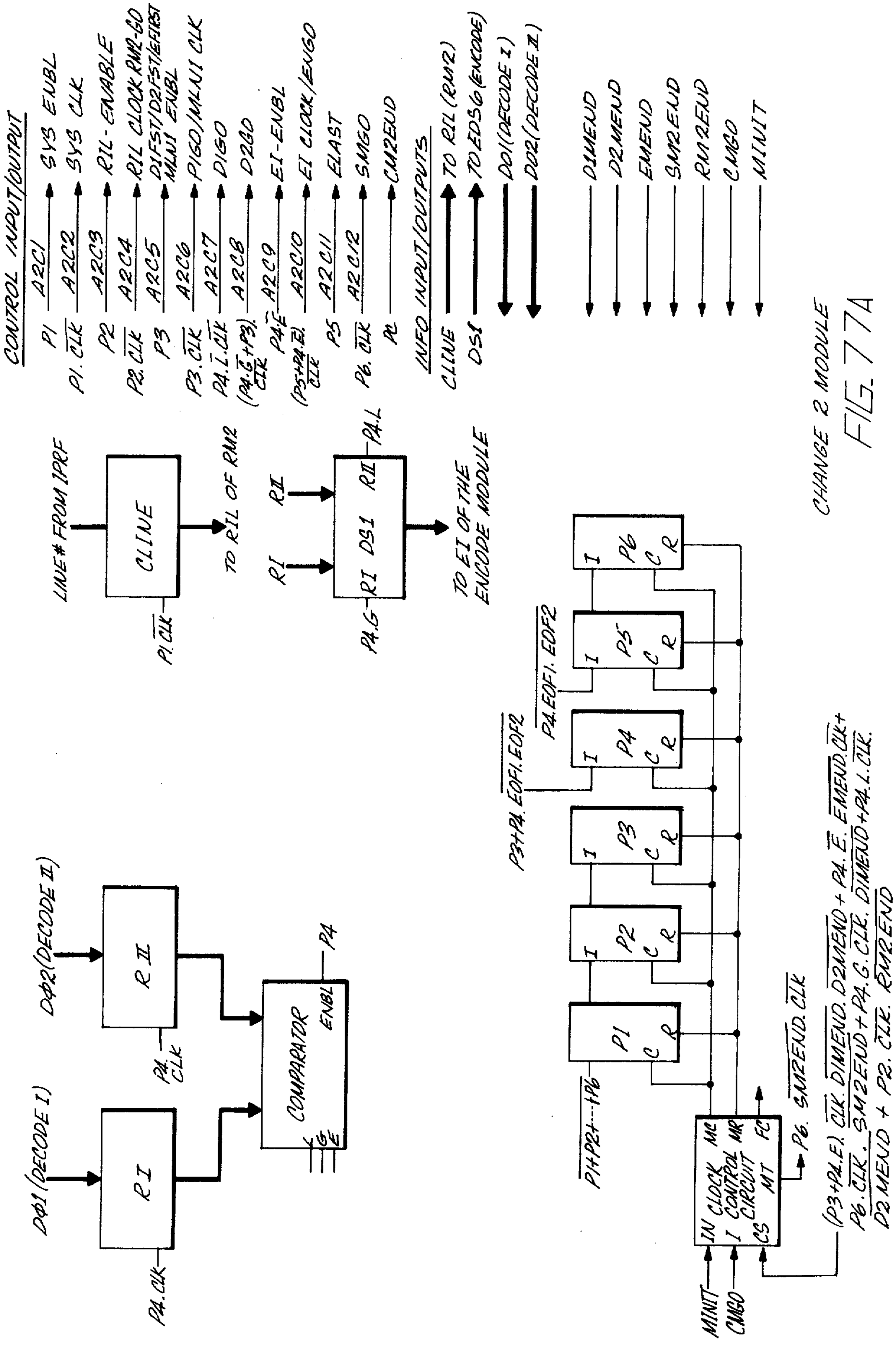
FIG. 77A is a schematic and block diagram of the CHANGE 2 MODULE.
Figure 77B:
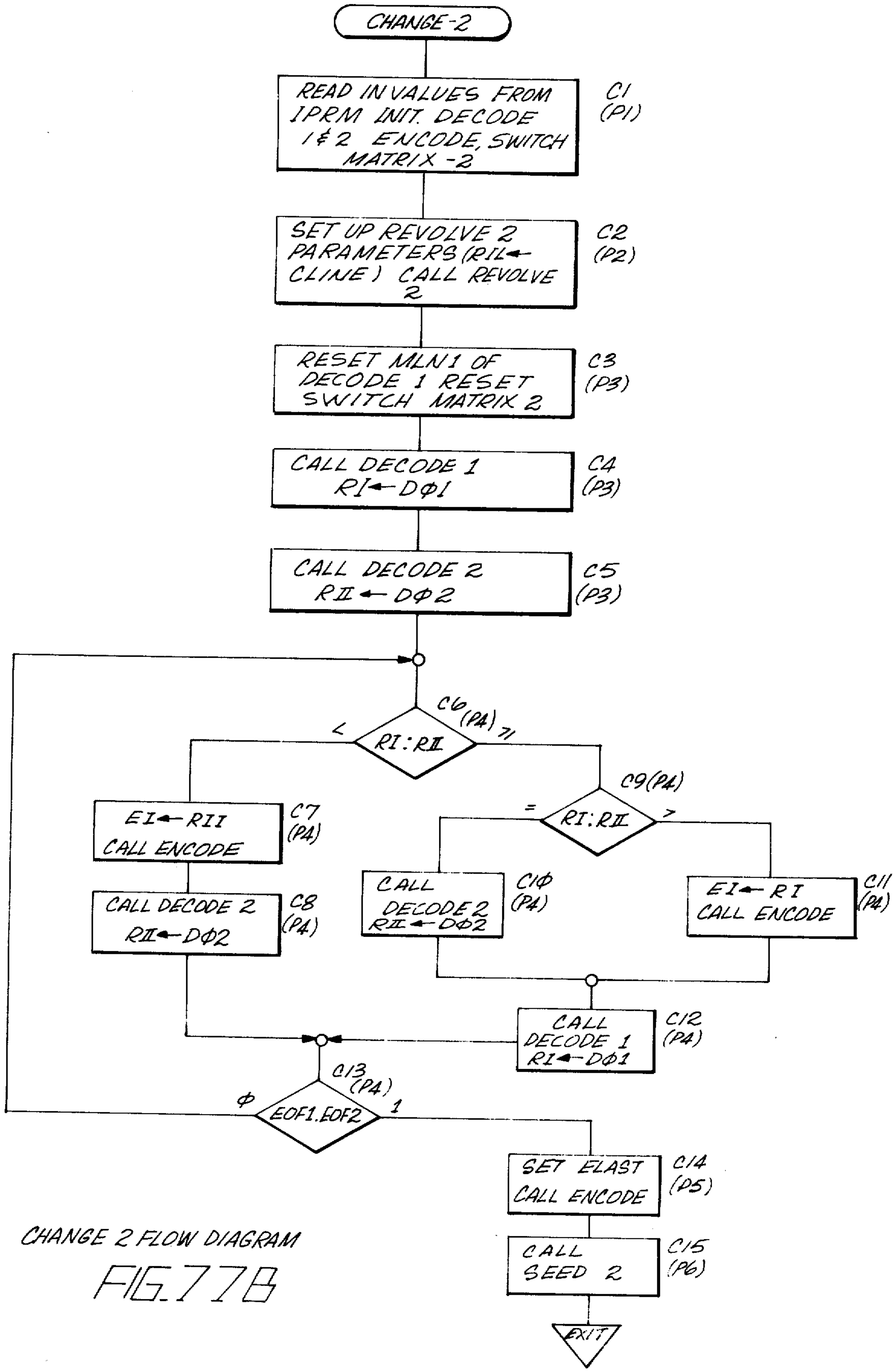
FIG. 77B is a flow diagram for the CHANGE 2 MODULE.

For the following discussion of the detailed description of the operation of the CHANGE 2 MODULE, refer to the flow diagram of FIG. 77B and the component design of FIG. 77A.

Prior to the calling of the CHANGE 2 MODULE, the seed line of the input EO vector to be changed in placed in DPM MEMORY MODULE area 2. The change line is placed into the MEMORY MODULE area 1. Additionally, information is placed in the DPM INTERFACE MODULE IPRF representing the line number of the seed line, the length of the seed line, and the length of the change line. Once the proper information is placed into the DPM the change module can be called.

At C1 the line number of the seed line is read from the IPRF into the CHANGE 2 MODULE. Additionally, during C1 the DECODE I, II, ENCODE, and SWITCH MATRIX 2 MODULES are initialized. At C2 the line number of the sed line is transferred to the REVOLVE 2 MODULE which is then initiated. The REVOLVE 2 MODULE then proceeds to revolve the change line which is in MEMORY MODULE area 1 to the same iso-entropicgram line number as the seed line. The resulting representation is then placed in MEMORY MODULE area 3. At C3 the length of this revolved representation of the change line is placed in the MLN1 register of the DECODE I MODULE. The SWITCH MATRIX 2 is then resetso that the DECODE I MODULE will read from MEMORY MODULE area 3 and DECODE II will read from MEMORY MODULE area 2.

Boxes C4 through C14 of the flow diagram perform the merging operation between the seed line and the revolved change line. Thus, at C4 the DECODE I MODULE is initiated and the resulting revolved change line value read is placed in hardware register RI. Similarly, at C5 the DECODE II MODULE is initiated and the resulting value read from the seed line is placed into hardware register RII. At C6 a comparison is made between RI and RII. If the value in register RI is less than the value in register RII, block C7 is entered. Recalling that both sequences being read by DECODE I and II are monotonicallydecreasing and the above definition of the merge operation, it can be seen that the seed line value contained is not to be changed and is thus written to MEMORY MODULE area 1 by the ENCODE MODULE. After RII has been written, the DECODE II MODULE is again activated to read a next value into RII. Control then goes to block C13.

Returning to block C6 assuming that the value in RI is greater than or equal to the value in register RII, control is passed to block C9 for further testing. An additional test is made on RI and RII. This time if RI is equal in value to RII, according to the merging rules defined above, the seed line value is not written out. Accordingly, at C10 the DECODE II MODULE is called and the results of the read are placed in RII. Control then goes to C12.

Returning to C9, if RI is greater than RII, this indicates that the value in RI must be written to MEMORY MODULE area I via the ENCODE MODULE. Control goes to C12 from both C10 and C11. Note that in either case the DECODE I MODULE has to be activated. Thus, at C12 the DECODE I MODULE is called and the resulting revolved seen line value read is placed into register RI.

Control from C8 and C12 comes to C13. Here a check is made to see whether both modules have finished reading, i.e., both EOF1 and EOF2 are set to one. If not, control loops back to box C6 and the merging process continued. If both EOF1 and EOF2 are set, control comes to C14 where the ELAST flip flop in the ENCODE MODULE is set and the ENCODE MODULE is activated so that the final value is written out to MEMORY MODULE area 1.

At this point the change line has been revolved down to the seed line and the two have been merged. The resultant merged line is now in MEMORY MODULE area 1. C15 activates a call on the SEED 2 MODULE. This module has been described in detail hereinabove. It locates a new seed for the now changed input line and places the results in MEMORY MODULE area 3. Control returns to the CHANGE 2 MODULE and exit is taken.

Having completed a detailed description of the flow diagram, a detailed description of the component design can now be given. The actual hardward component design is given in FIG. 77B along with all the input/output signals which are used to operate the module.

The CHANGE 2 MODULE is initiated at system start-up time when the MINI COMPUTER asserts its RESET condition to all of its peripherals. This RESET condition is received by the DPM INTERFACE MODULE and passed to the CHANGE 2 MODULE as the MINIT signal. MINIT enters the CLOCK control circuit, as described previously in this disclosure, causing the MR (Module Reset) pulse to go true and be applied to the asynchronous reset input of the pulse generator circuit P1 through P6. This causes each of the flip flops P1 through P6 to be set to the zero state.

To activate the CHANGE 2 MODULE, the CMGO signal is applied to the I input of the clock control circuit causing the clock to be enabled and causing the output of the clock to be applied to the MC line of the clock control circuit, thus causing the clock to be applied to the clock input of each of the flip flops P1 through P6. Since all the flip flops are reset, the input to the P1 flip flop is true and thus on the first CLK pulse from the clock control circuit the P1 output of the P1 flip flop is set to the true or one state. The true signal at P1 causes the signal A2C1 to become true thus sending the system enable pulse to the DECODE I, DECODE II, ENCODE, and SWITCH MATRIX 2 MODULES. On the complementary clock ($\overline{CLK}$) signal the circuit P1.$\overline{CLK}$ is asserted true causing the system clock A2C2 to be asserted to the system modules mentioned above. Additionally the P1.$\overline{CLK}$ signal causes the line number of the seed contained in MEMORY MODULE area 2 to be clocked into hardward register CLINE. Since the P1 flip flop is true, the next CLK pulse causes the P1 flip flopto be set to the 0 state and the P2 flip flop to be set to the 1 state.

During the P2 pulse the contents of the CLINE register are enabled to the RIL register in the REVOLVE 2 MODULE. During the $\overline{CLK}$ portion of the pulse, P2.$\overline{CLK}$ is asserted. This causes A2C4 to be asserted which clocks the value CLINE into RIL of the REVOLVE 2 MODULE. The RM2GO signal is also asserted activating the REVOLVE 2 MODULE. Additionally the circuit P2.$\overline{CLK}$.$\overline{RM2END}$ is true causing a true signal to be applied to the clock suspension (CS) input of the clock control circuit thereby causing cessation of the clock. The CHANGE 2 MODULE remains suspended until the REVOLVE 2 MODULE completes at which time the RM2END pulse is asserted. This, in turn, causes the clock suspension logic to be reset thus activaing the clock. On the next CLK pulse the flip flop P2 is set to the 0 state while the P3 flip flop is set to the 1 state.

The C2 box in the flow diagram has just been completed at this point causing the change line to be revolved down to the same iso-entropic line number as the seed line.

The true output at P3 causes a true signal at A2C5. This causes the DECODE I, DECODE II, and the ENCODE MODULES to be initialized. Additionally, A2C5 enables the MLN3 output from the ENCODE MODULE to be gated through AND gate 220 and OR gate 226 of the DECODE I MODULE to the counter MLN1. Flip flops S13 and S31 of the SWITCH MATRIX 2 are also set by the A2C5 line. During the $\overline{CLK}$ portion of the pulse, P3.$\overline{CLK}$ becomes true thus asserting A2C6. The true pulse at A2C6 causes the contents of MLN3 to be loaded into MLN1 of the DECODE I MODULE and the DECODE I MODULE is activated. The P3.$\overline{CLK}$ pulse also causes A2C8 to be asserted causing the DECODE II MODULE to be activated. $\overline{D1MEND}$ and $\overline{D2MEND}$ are both asserted by the respective DECODE modules. This causes the clock in the CHANGE 2 MODULE to be suspended. When both DECODE modules have completed, the next CLK pulse causes the P3 flip flop to be reset to 0 and the P4 flip flop to be set to 1. Pulse P3 has executed the functions shown in boxes C3, C4 and C5.

Boxes C6 through C14 are implemented during pulse P4. During P4 the values read by DECODE I and DECODE II are clocked into registers RI and RII, respectively. Additionally during P4 the RI and RII to be compared. If the value in RI is greater than RII, the contents of RI are gated through data selector DS1 to the data selector EDS6 of the ENCODE MODULE. However, if the contents of RI are smaller than RII, then the contents of RII are gated through data selector DS1 to the data selector EDS6 of the ENCODE MODULE. In either case the signal P4.$\overline{E}$ causes the signal A2C9 to be true thereby enabling the output of DS1 through to the EI register of the ENCODE MODULE. On the portion of the pulse the circuit P4.$\overline{CLK}$ becomes true. From C12 it is obvious that the DECODE I MODULE is activated whenever RI is not less than RII and from C8 and C10 it is obvious that the DECODE II MODULE is activated whenever RI is not greater than RII. Accordingly, if RI is greater than or equal to RII, the L output of the comparator is 0. Thus, its complement is 1 and P4.$\overline{L}$.$\overline{CLK}$ is true thereby asserting A2C7 and activating the DECODE I MODULE. Similarly, if RI is less than or equal to RII, the G output of the comparator is 0. Thus its complement is true thereby asserting A2C8 and activating the DECODE II MODULE. Additionally, if either RI is greter than RII or RI is less than RII, then the E output of the comparator is 0. Thus the complement of the E output ($\overline{E}$) is 1. This activates the circuit P4.E.$\overline{\text{CLK}}$ thereby asserting signal A2C10, causing the value gated through DS1 to be loaded into the EI register of the ENCODE MODULE and activating that module. While any of the above mentioned modules are active, the clock suspension circuits are true and the CHANGE 2 MODULE clock is disabled. When all the above modules complete, the CHANGE 2 MODULE clock is again enabled and, depending upon the DECODE module outputs, either P4 is reentered or P4 is reset and P5 is activated. Considering C13 of the flow diagram, if EOF1 and EOF2 are not both asserted, this indicates that the merging operation is not complete and that another series of compares is necessary. Thus if $\overline{\text{EOF1.EOF2}}$ is true the P4 flip flop is reactivated and the comparison is repeated. If both DECODE modules have completed, then EOF1.EOF2 is true thereby causing P4 to be reset on the next CLK pulse and P5 set to 1.

During pulse P5 the ELAST flip flop in the ENCODE MODULE is set via pulse A2C11. During P5.$\overline{\text{CLK}}$, A2C10 is asserted causing activation of the ENCODE MODULE. This forces the writing to MEMORY MODULE area 1 of the last value in the ENCODE MODULE. Additionally, the circuit P5.$\overline{\text{CLK}}$.$\overline{\text{EMEND}}$ is true causing the CHANGE 2MODULE clock to be disabled. The module remains dormant until EMEND is asserted by the ENCODE MODULE causing the clock suspension logic to be 0, thus enabling the CHANGE 2 MODULE clock. On the next CLK Pulse the P5 flip flop is reset and the P6 flip flop is set to a 1. During the $\overline{\text{CLK}}$ portion of the pulse, P6.$\overline{\text{CLK}}$ becomes true causing A2C12 to be asserted. This, in turn, activates the SEED 2 MODULE. Again the clock in the CHANGE 2 MODULE is suspended by the P6.$\overline{\text{CLK}}$.$\overline{\text{SM2END}}$. The SEED 2 MODULE proceeds to find the new seed and store it in MEMORY MODULE area 3. Upon completion, P6.$\overline{\text{CLK}}$.SM2END is asserted at the module terminate (MT) port of the clock control circuit. This causes the module to be reset and the function complete signal to be asserted. The function complete signal returns to the calling module as signal CM2END at which time all activity ceases in the CHANGE 2 MODULE while the new seed is located in MEMORY MODULE area 3.

D. Example of Operation

Figure 77C:
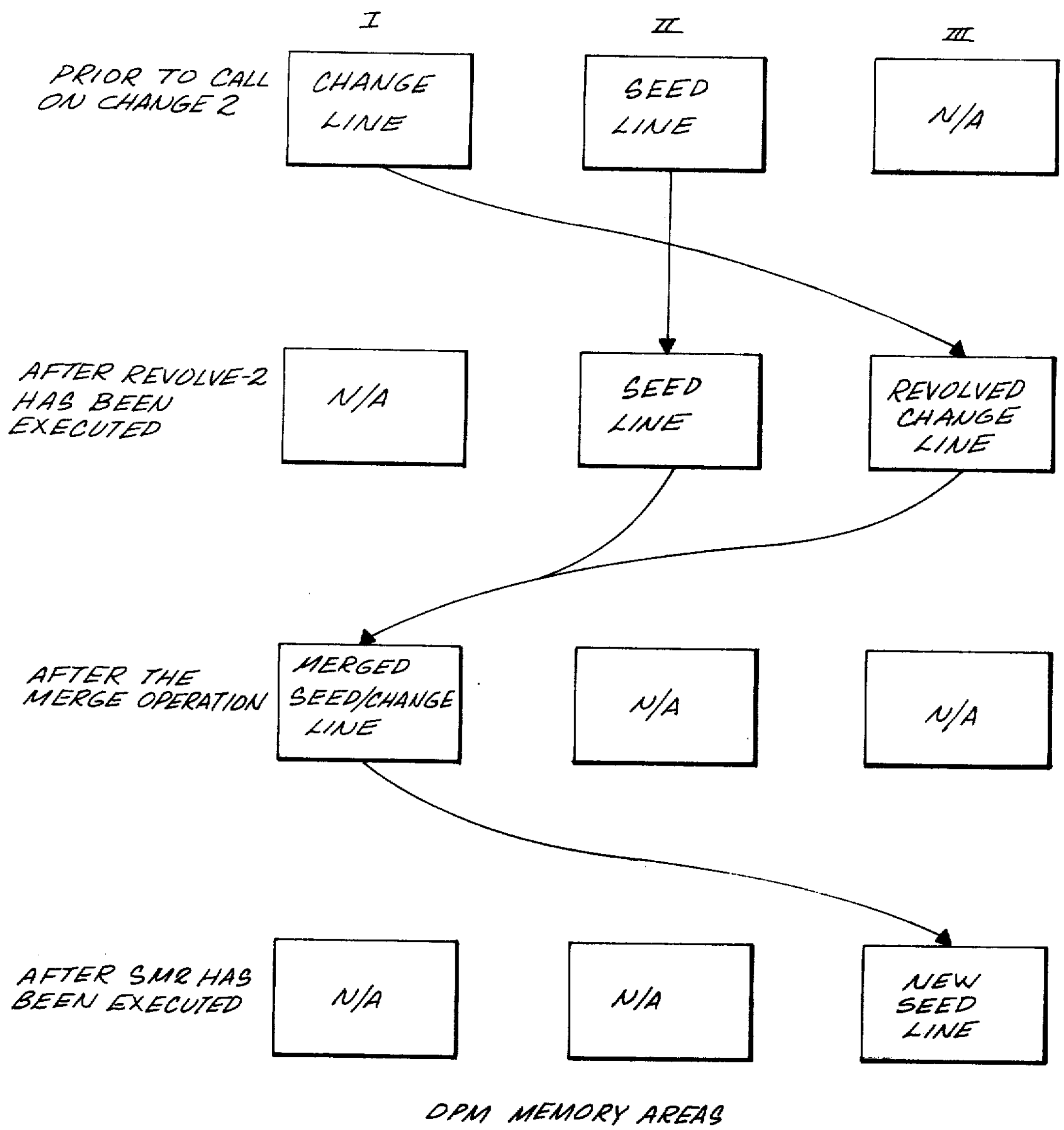
FIG. 77C is an example of how information is moved between areas of the MEMORY 2 MODULE during operation of the CHANGE 2 MODULE.

Since the majority of the data manipulation during the change process takes place, this example will depict the change process by showing the interrelationship of the MEMORY MODULE memory areas at various stages. Refer to FIG. 77C during the remainder of this discussion.

Initially, the change line, i.e., the occurrence values to be changed in the input line represented by the seed, is placed into MEMORY MODULE area 1. The seed line representing the input line under consideration is placed in MEMORY MODULE area 2. The length of the two lines just mentioned is placed in the IPRF of the DPM INTERFACE MODULE along with the iso-entropicgram line number of the seed.

The REVOLVE 2 MODULE is then activated by the CHANGE 2 MODULE. It proceeds to revolve the change line down to the same line of the iso-entropicgram as the seed line. The results are stored in MEMORY MODULE area 3.

Now that the seed and the requested changes are on equivalent lines of their iso-entropicgrams, they can be merged together. The CHANGE 2 MODULE performs that merge operation by reading the information in MEMORY MODULE areas 2 and 3, merging the two, and writing the results into MEMORY MODULE area 1.

Once the merging operation is complete, the result is a new line in the iso-entropicgram representing the input line merged with the change line. This new line is not necessarily the new seed line. Therefore, the SEED 2 MODULE has to be called to locate the new seed for this changed input line. It does so and in the process stores the new seed in MEMORY MODULE area 3. At this point the change operation is complete and exit is taken from the CHANGE 2 MODULE.

XXVIII. MEMORY 2 MODULE

Figure 77D:
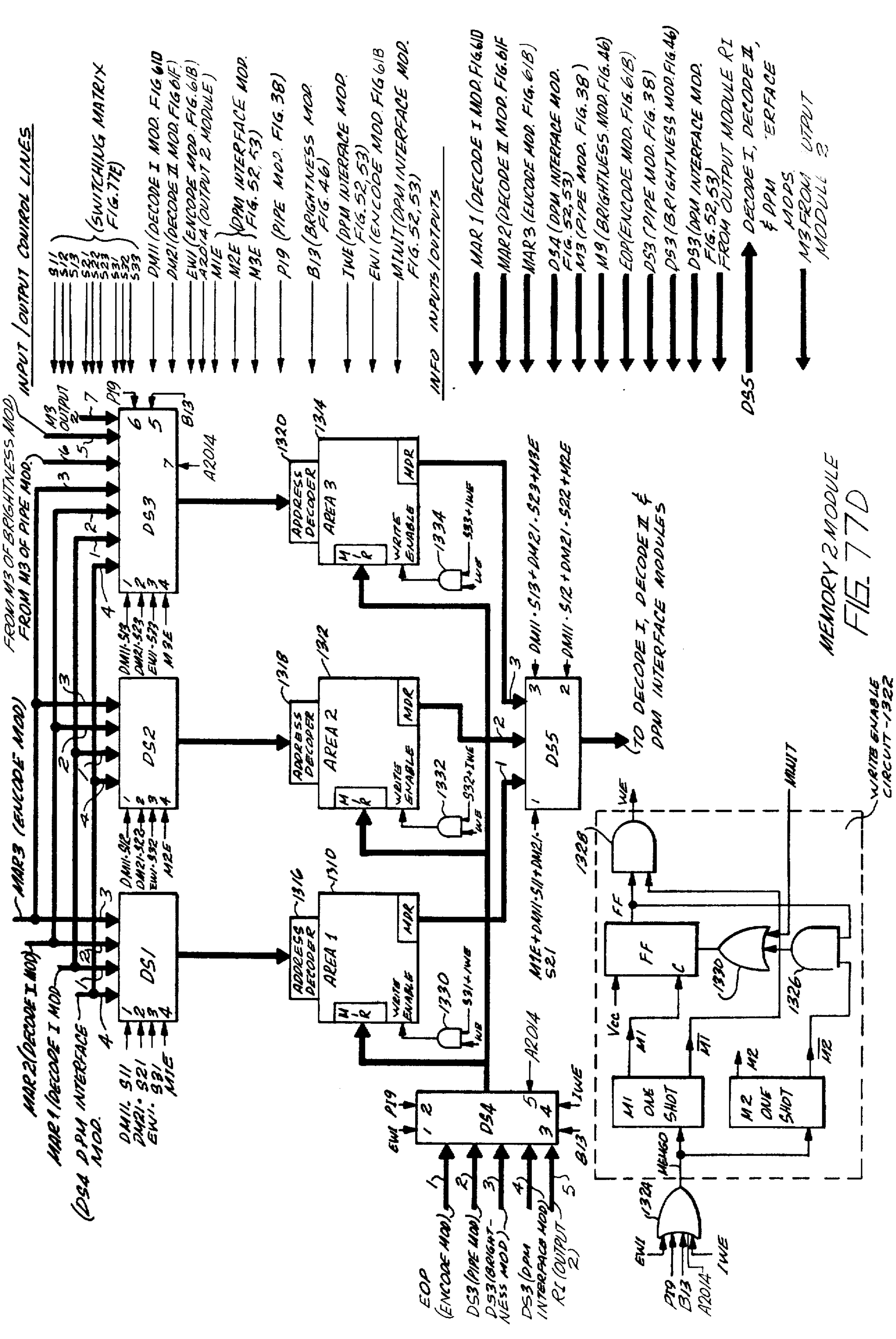
FIG. 77D is a schematic and block diagram of the MEMORY 2 MODULE.

The MEMORY 2 MODULE disclosed here and depicted in FIG. 77D is, for the most part, a duplicate of the first MEMORY MODULE disclosed. The module is included here for the sake of clarity in disclosing this alternate implementation. Since the MEMORY 2 MODULE is so similar to the MEMORY MODULE, no general disclosure will be given here. A detailed description of the operation of the MEMORY 2 MODULE can be obtained by referring to Section XVIII MEMORY MODULE. The MEMORY 2 MODULE operates as disclosed in the above mentioned section with the following additional capability. The OUTPUT 2 MODULE has the capability of writing to MEMORY MODULE area 3. To do this the data signal M3 is added as the seventh input to data selector DS3. Another data signal from register RI in OUTPUT 2 MODULE is added as the fifth signal to data selector DS4. The final signal added to the MEMORY 2 MODULE is the control signal A2014 from the OUTPUT 2 MODULE.

The write procedure from OUTPUT 2 MODULE into MEMORY 2 MODULE area 3 is as follows. The address is gated through DS3 to the address decoder of memory area 3. The address is gated through DS3 when the OUTPUT 2 MODULE asserts signal A2014. At the same time the RI register from OUTPUT 2 MODULE is gated through DS4 to the MIR port of memory area 3. The OUTPUT 2 signal is also added to the write enable circuit. The circuit responds by asserting WE which, in turn, enables the write enable port on memory area 3 thus writing RI into the memory. Throughout the description of this alternate disclosure, MEMORY 2 MODULE has been referred to as MEMORY MODULE.

XXIX. SWITCH MATRIX 2

Figure 77E:
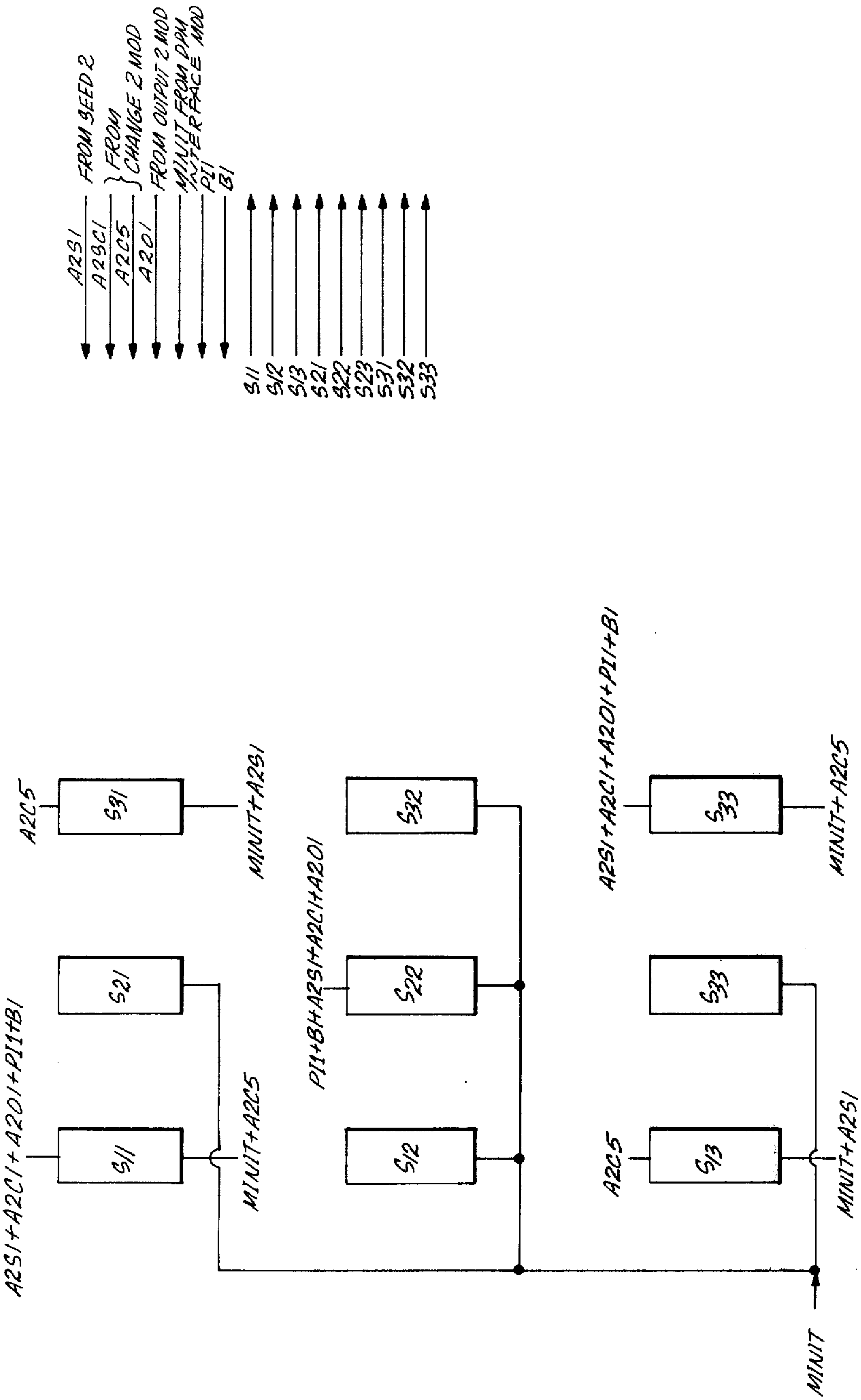
FIG. 77E is a schematic and block diagram of the SWITCH MATRIX 2.

The SWITCH MATRIX 2 of FIG.77E has 9 flip flops designated S11–S13, S21–S23, and S31–S33. The flip flops are set to allow the DECODE I, DECODE II, and ENCODE MODULES to read and write in the proper MEMORY MODULE areas. The flip flops are labeled as follows: S$ij$ where $i-1$ designates DECODE I; $i=2$ designates DECODE II, $i=3$ designates ENCODE, and where $j=1$ identifies MEMORY MODULE area 1; $j=2$ identifies MEMORY MODULE area 2; $j=3$ identifies MEMORY MODULE area 3. With reference to the SWITCH MATRIX 2 of FIG. 77E, and the descriptions of the DECODE I, DECODE II, and ENCODE MODULES, it will be recalled that the DECODE I and II MODULES always read from memory, whereas the ENCODE MODULE always writes in memory. Thus, when flip flop S11 is in a 1 state, it designates that the DECODE I MODULE is to read from MEMORY MODULE area 1. If flip flop S21 is in a 1 state, it designates that the DECODE II MODULE is to read from MEMORY MODULE area 1, and if the S31 flip flop is in the 1 state, it designates that the ENCODE MODULE is to write to MEMORY MODULE area 1. In addition to the flip flops the SWITCH MATRIX 2 has input/output signals for controlling the operation of the module along the right hand side of FIG. 77E, along with the modules from which the signals originate.

It will be noted that the SWITCH MATRIX 2 MODULE disclosed herein is much simpler in design than the originally disclosed SWITCH MATRIX. This is so since the method of finding a seed as disclosedin SEED FINDING 2 MODULE does not require that a copy of the current "best seed" be saved. As a result the seed line number is computed and then generated directly into MEMORY MODULE area 3.

The flip flops are all of type SN7474 having the characteristics disclosed above. Consider now generally the operation of the SWITCH MATRIX 2. As mentioned above, the SWITCH MATRIX 2 is used for controlling the operation of the MEMORY MODULE. Normally, the MEMORY MODULE will be used in the manipulation of seeds. A seed must be read, acted upon, and the possibly new line of the iso-entropicgram which is represented by the seed must be written out. During normal operation of the DPM SYSTEM the method of reading and writing in the memory area is through the DECODE I and II MODULES and the ENCODE MODULE. However, there are times when information will be written directly in a memory area without recourse to the ENCODE MODULE. The proper routing of all these read/write signals is handled by the SWITCH MATRIX 2.

Turning now more specifically to the SWITCH MATRIX 2, initially the flip flops S11-S13, S21-S23, and S31-S33 are set to 0 by the MINIT pulse from the DPM INTERFACE MODULE which resets the entire DPM SYSTEM. The flip flops are then set by the calling modules (SEED 2, OUTPUT 2, CHANGE 2, PIPE, and BRIGHTNESS). It will be noted that the SEED 2, PIPE, BRIGHTNESS, and OUTPUT 2 MODULES simply set the S11, S22, and S33 flip flops. Thus DECODE I will read from MEMORY MODULE area 1, DECODE II will read, if necessary, from MEMORY MODULE area 2, and ENCODE will write to MEMORY MODULE area 3. The CHANGE 2 MODULE initially sets these flip flops as do the other modules. However, A2C5 res ; S11 and S33 while setting S13 and S31. Recalling the description of the CHANGE 2 MODULE, this sets the SWITCH MATRIX 2 so that the merging phase of the CHANGE 2 MODULE can read from MEMORY MODULE areas 2 and 3 and write into MEMORY MODULE area 1. Since this is done, note also that the A2S1 pulse from the SEED 2 MODULE has to reset S13 and S31. This is so since the SEED 2 MODULE can be called from The CHANGE 2 MODULE.

XXX. AUXILIARY MEMORY MODULE II

Figure 77F:
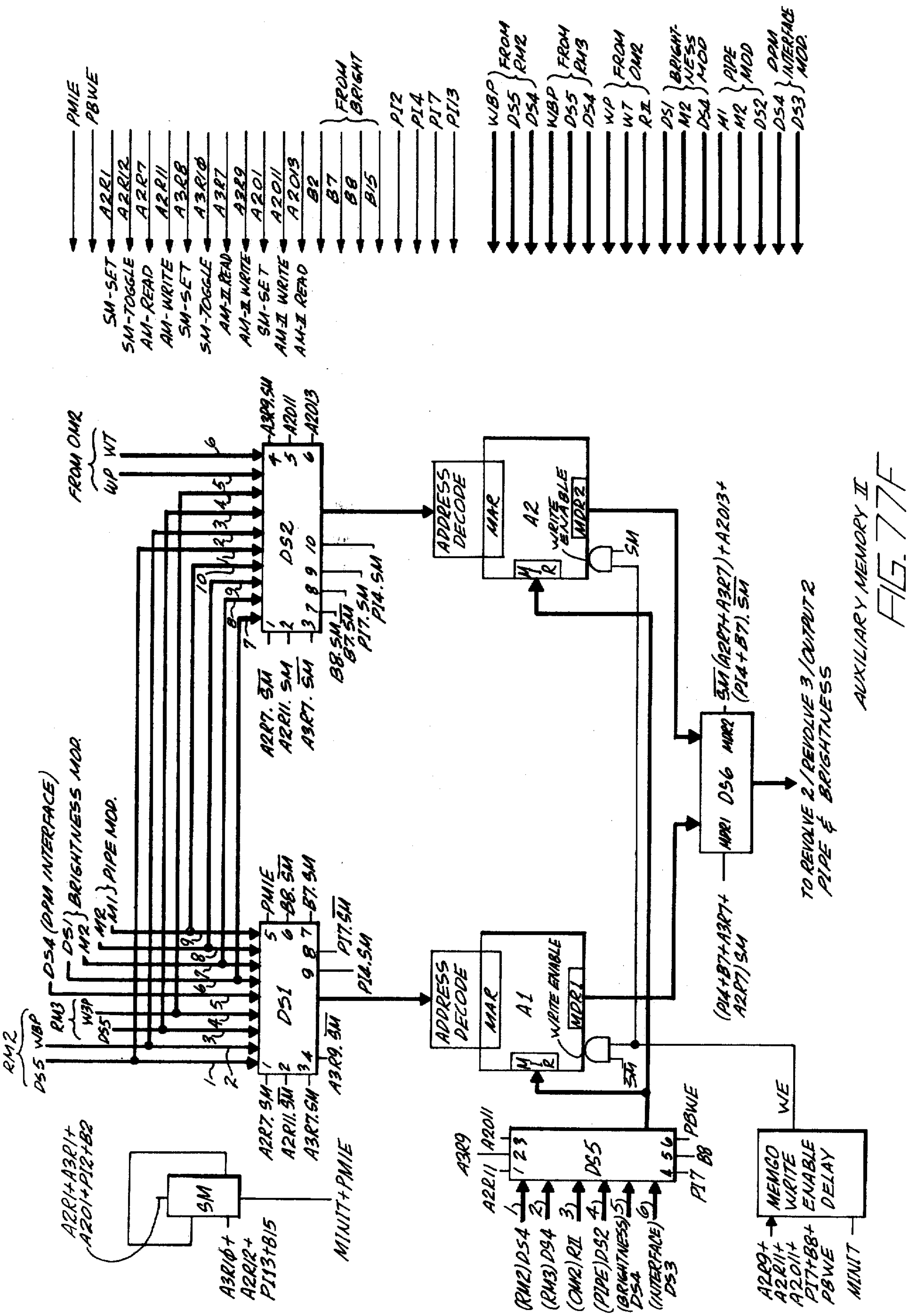
FIG. 77F is a schematic and block diagram of the AUXILIARY MEMORY 2.

FIG. 77F shows the AUXILIARY MEMORY MODULE II. On the right are shown the input/output control signals used for controlling the AUXILIARY MEMORY MODULE II and the information input/output lines. Double lines are used to designate multiple signal data lines.

The AUXILIARY MEMORY MODULE II (AM-II MODULE) includes two random access memories A1, A2. The memory module areas A1 and A2 are TTL RAM type SN7489, disclosed at page 220 of the above referenced book. Each memory has 256 memory locations, each of which contains 8 binary coded bits. The aforementioned type of memory is only used herein by way of example and, within the scope of the present invention, may be of different sizes and types, depending on the particular application. In most applications, it may be desirable to replace the TTL RAM memories with one or more disc files to give greater storage capacity.

Associated with each memory is an address decoder which decodes the binary signals into unique addresses.

Also with each of the memories is a Memory Information Register (MIR). Each MIR Is connected to the output of the data selector DS5 from which it receives 8 binary bits of information for storage in one of the memory locations of the corresponding RAM memory. Each MIR forms part of the RAM memory disclosed in the above TTL book. Also included in each of the memories is a memory data register (MDR) which forms the information output for the corresponding RAM memory. Eight binary coded bits are applied as output at each of the MDR circuits when information is being read out of the corresponding memory.

Writing takes place in one of the memories A1 or A2 by applying aninformation word to the corresonding MIR and an address word to the corresponding address decoder. After the signals have stabilized, a true write enable signal is applied at the WRITE ENABLE input to the memory causing it to write the information word at the MIR input to the address specified by the address word applied to the address decoder.

Reading takes place in a memory merely by applying the address of the desired location to the address decoder for the memory thereby causing the word at the corresponding address to be read out and applied at the MDR output of the memory.

Selection circuits DS1 through DS6 are data selectors as disclosed in the ENCODE MODULE. Connected to each data selector is a double line to designate information lines and single lines to indicate control signals. Each double line is numbered and has a correspondingly numbered signal line. A true signal at the control line causes the signals applied at the corresponding information lines to be coupled through to the output of the data selector.

The WRITE ENABLE circuit is the same as that described for the MEMORY MODULES. It has logic circuit A3R9+A2R11+A2011+P17+B8+PBWE applied to the MEMGO input line of the WRITE ENABLE circuit. The MINIT signal is also applied to the WRITE ENABLE circuit. The WE output from the WRITE ENABLE circuit is then applied to the input AND gates of the memories A1 and A2.

The modules which communicate with the AM-II MODULE and whether information is read out from the MEMORY MODULE or/and written into AM-II, is summarized as follows:

REVOLVE MODULE 2 — read and write
REVOLVE MODULE 3 — read and write
OUTPUT MODULE 2 — read and write
PIPE MODULE — read and write
BRIGHTNESS MODULE — read and write
INTERFACE MODULE — read and write.

Gating circuits are depicted by logical equations using the outputs of other modules, flip flops, etc. as to designate terms in the equations.

The sequence of operation of AM-II during a WRITE operation in one of the memories will now be described with reference to the timing diagram of FIG. 2. A WRITE operation is initiated by the REVOLVE 2, REVOLVE 3, OUTPUT 2, PIPE, BRIGHTNESS, or INTERFACE MODULES. The calling signal causes a true signal at the MEMGO input of the WRITE ENABLE CIRCUIT. The WRITE ENABLE circuit operates as disclosed in the MEMORY MODULE. Finally the WRITE ENABLE circuit forms a true signal at the WE output. The signal WE is applied to the AND gates at the WRITE ENABLE ports of the memory modules. The second input of these AND gates controls the particular one of the memories into which information is to be written from data selector DS5. The control flip flop SM will be explained. Initially, control signals from the three modules serviced will set the SM flip flop to a 1 state. This allows for reading from area A1 writing to area A2. To switch areas, a signal is applied to the clock input of SM causing it to toggle to the next state, i.e., the SM output will be reset to 0 and the $\overline{SM}$ output will be set to 1. This, in turn, allows for reading from memory area A2 and writing to memory area A1.

In summary then, it should now be understood that the outputs of DS4 from REVOLVE MODULE 2, DS4 of REVOLVE MODULE 3, RIi from OUTPUT MODULE 2, DS2 of PIPE MODULE, DS4 of BRIGHTNESS, and DS3 of the INTERFACE MODULE, are coupled to the inputs of data selector DS5. A true signal from the A2R11, A3R9, A2011, PI7, B8, PBWE outputs from REVOLVE 2, REVOLVE 3, OUTPUT 2, PIPE, BRIGHTNESS, and INTERFACE MODULES, respectively, cause DS5 to couple outputs from the corresponding modules through to the MIR input of memory areas A1, A2. The DS1, DS2 selection circuits couple the addresses of the inputs to the corresponding address decoders.

The DS6 selection circuit couples the information being read out of areas A1, A2 to the inputs of the REVOLVE 2, REVOLVE 3, OUTPUT 2, PIPE, and BRIGHTNESS MODULES. After sufficient time for the signals to be applied at the output of DS6 and stabilized to the input of the modules receiving the signals, the M2 multivibrator of the WRITE ENABLE circuit automatically resets to the 0 state, causing a true signal at the $\overline{M2}$ output, which in turn causes the WRITE ENABLE circuit to reset itself and terminate the WE signal applied to the memories.

XXXI. COMPUTER, DATA BASE, AND SOFTWARE ORGANIZATION

A. MINI COMPUTER

A softward package is provided for handling of the piping and brightness functions. The softward disclosed herein is for use in the DPM system of FIG. 1 and is employed on the PDP-11/45 computer manufactured by the Digital Equipment Corporation which is disclosed by way of example for the MINI COMPUTER.

The disclosure of the softward package is in terms of a computer program and subroutine listings in assembler language for the PDP-11/45 and flow charts each of which will be discussed in more detail hereinafter.

Appendix B contains an index of the program listings together with the actual listings. The actual assembler provided with the PDP-11/45 can be used for assembling the listings into machine code. The meaning of the terms used in the listings of Appendix B together with the corresponding operation within the PDP-11/45 can be understood with reference to the following manuals, incorporated by reference, and published by the Digital Equipment Corporation:

Processor Handbook PDP-11/45, published in 1971, Batch-11/DOS-11 Assembler (MARCO-11), published in 1971, and Peripherals and Interfacing Handbook, published in 1971.

The operator console has a typewriter which forms electrical coded signals in ASCII code representing the characters entered on the keyboard. The typewriter is of type LA30 (DECWRITER) manufactured by Digital Equipment Corporation.

The operator console also includes a printer for printing out and displaying on paper, characters represented by signals coded in ASCII code. The printer is part of the LA30 (DECWRITER).

B. General Description of Data Base Structure

The building of the layered data base is described in detail in the section HARDWARE/SOFTWARE ORGANIZATION FOR BUILDING LAYERED DATA BASE. For purposes of illustration, a simple two layer structure is assumed and disclosed.

Figure 78:
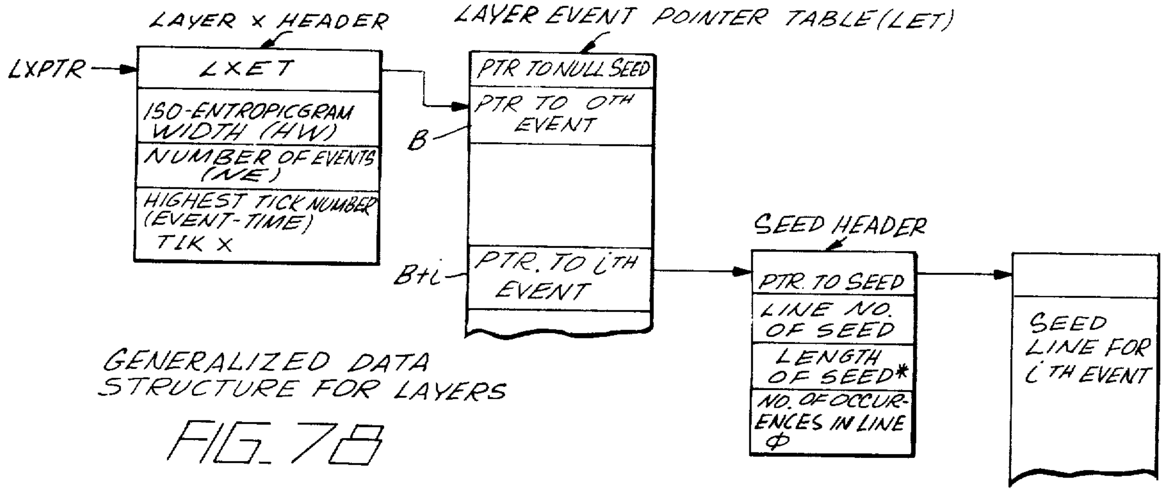
FIG. 78 is a generalized sketch showing the data structure for each layer.

Briefly, it is assumed that the two layer textual data base has a word layer 0 and a sentence layer 1. As discussed hereinabove, the word layer is for letters and other symbols. FIG. 78 shows a generalized representation of the data structure for the layers. As indicated, LXPTR (where X denotes the layer number) is the base address of a layer header that includes a base address pointer LXET to a layer event pointer table (LXET). The layer header contains four words of information. The first is the address LXET of the base of the table LXET. The second word is an iso-entropicgram width value (HW) which identifies the width of the iso-entropicgrqm in event-times or clock occurrence values for all associated seeds. The third word is a value NE specifying the number of events (seeds) associated with the corresponding LEPT. The fourth value TIKX is the current highest clock or event-time value associated with this layer.

The table LXET contains a series of sequentially addressable memory locations, one corresponding to each event (seed) associated with the LXET. The first memory location of this table is at address LXET. An entry is received as the base address of table −1 for a pointer to a null seed. This allows a common pointer to all those events which are unknown to the layer. Each memory location of the LXET contains a base address of a different seed header. Each seed header is associated with a memory area containing the seed line for the corresponding seed. Each seed header has four words. The first word is called pointer to seed and is a base address pointer to the first memory location of a memory area contained in the seed line of the corresponding seed. The second word in the seed header is the iso-entropicgram line number for the corresponding seed line. The third word is the value identifying the physical length (in 8 bit bytes). The fourth word is the number of event-times (actual occurrence values) contained in line 0 of the seed line.

Each seed header and corresponding seed line represents one event occurrence vector in the corresponding layer. The seed line is stored in a series of sequentially addressable memory locations starting with the pointer to the seed address in the corresponding seed header.

Figure 79A:
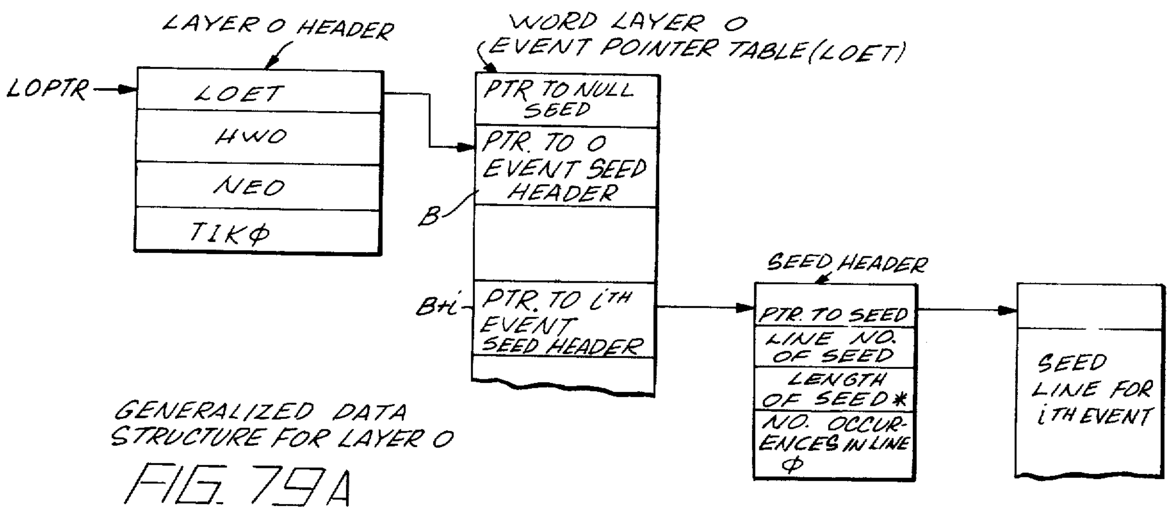
FIG. 79A is a sketch illustrating the generalized data structure for layer 0.
Figure 79B:
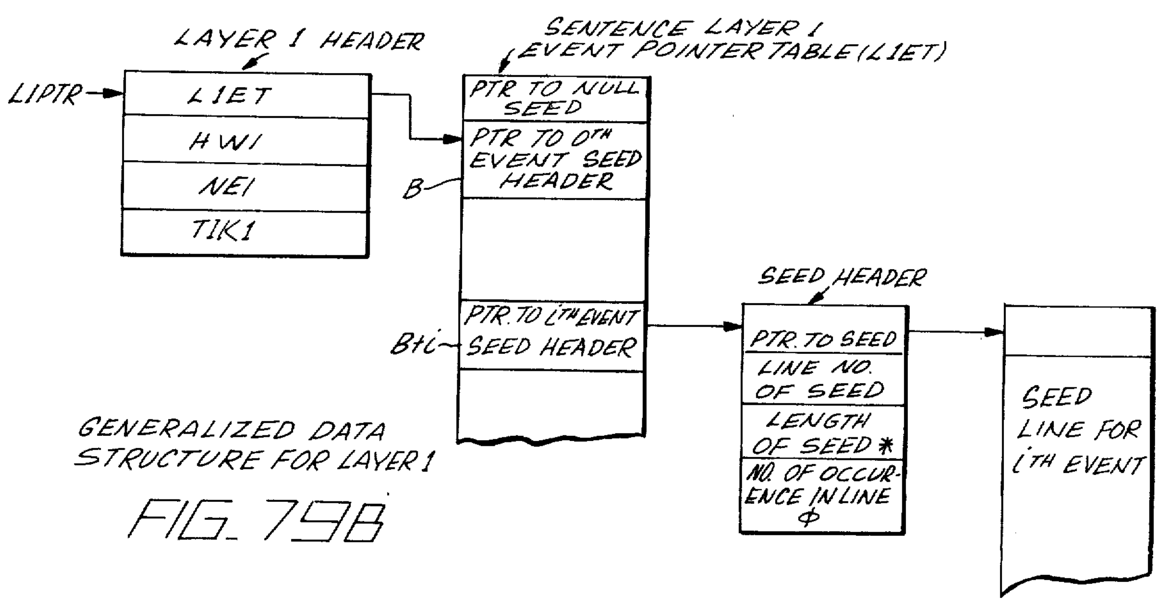
FIG. 79B is a sketch illustrating the generalized data structure for layer 1.

FIGS. 79A and 79B show data structure for layers 0 and 1, respectively, of the data base.

C. General Description of Softward

The general functions which must be performed by a data base system are:

1. Initialize the data structures;
2. Enter the data;
3. Manipulate the data.

The first two functions comprise what shall be called the layer building aspect of the data base system. A detailed description of the layer building function is given in section XXXIII HARDWARE/SOFTWARE ORGANIZATION FOR BUILDING A LAYERED DATA BASE. The third function is known as the retrieval aspect of the data base system. A detailed description of said retrieval aspect is disclosed in Section XXXII INQUIRY AND RETRIEVAL HARDWARE/SOFTWARE ORGANIZATION.

What follows is a general description of the data base system being disclosed here. The programs and subroutines required for operating the data base system are listed in the Index under Section XXXII INQUIRY AND RETRIEVAL HARDWARE/SOFTWARE ORGANIZATION and Section XXXIII HARDWARE/SOFTWARE ORGANIZATION FOR BUILDING A LAYERED DATA BASE.

Figure 79C:
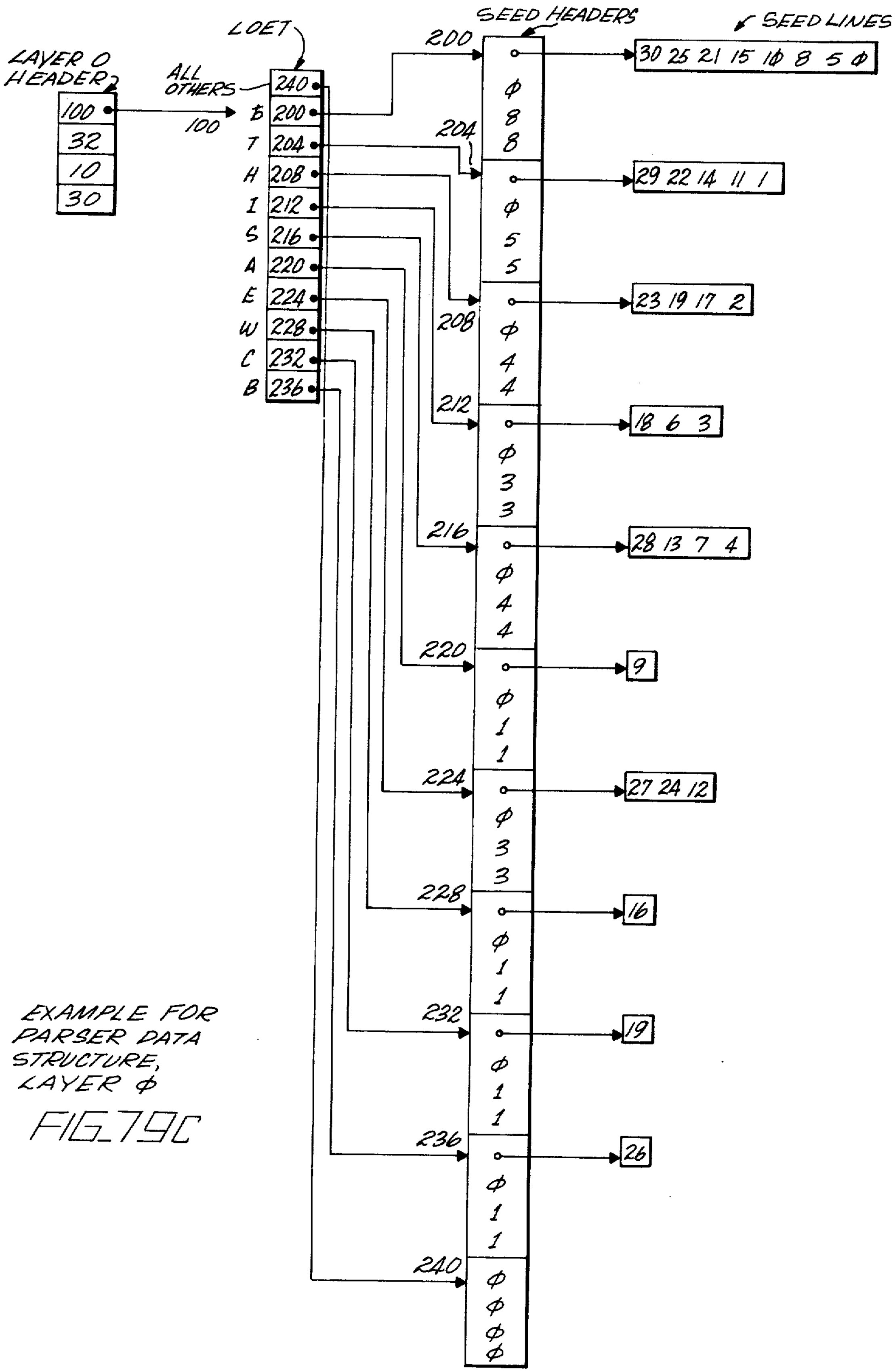
FIG. 79C is a sketch showing an example of the data structure for layer 0.
Figure 121:
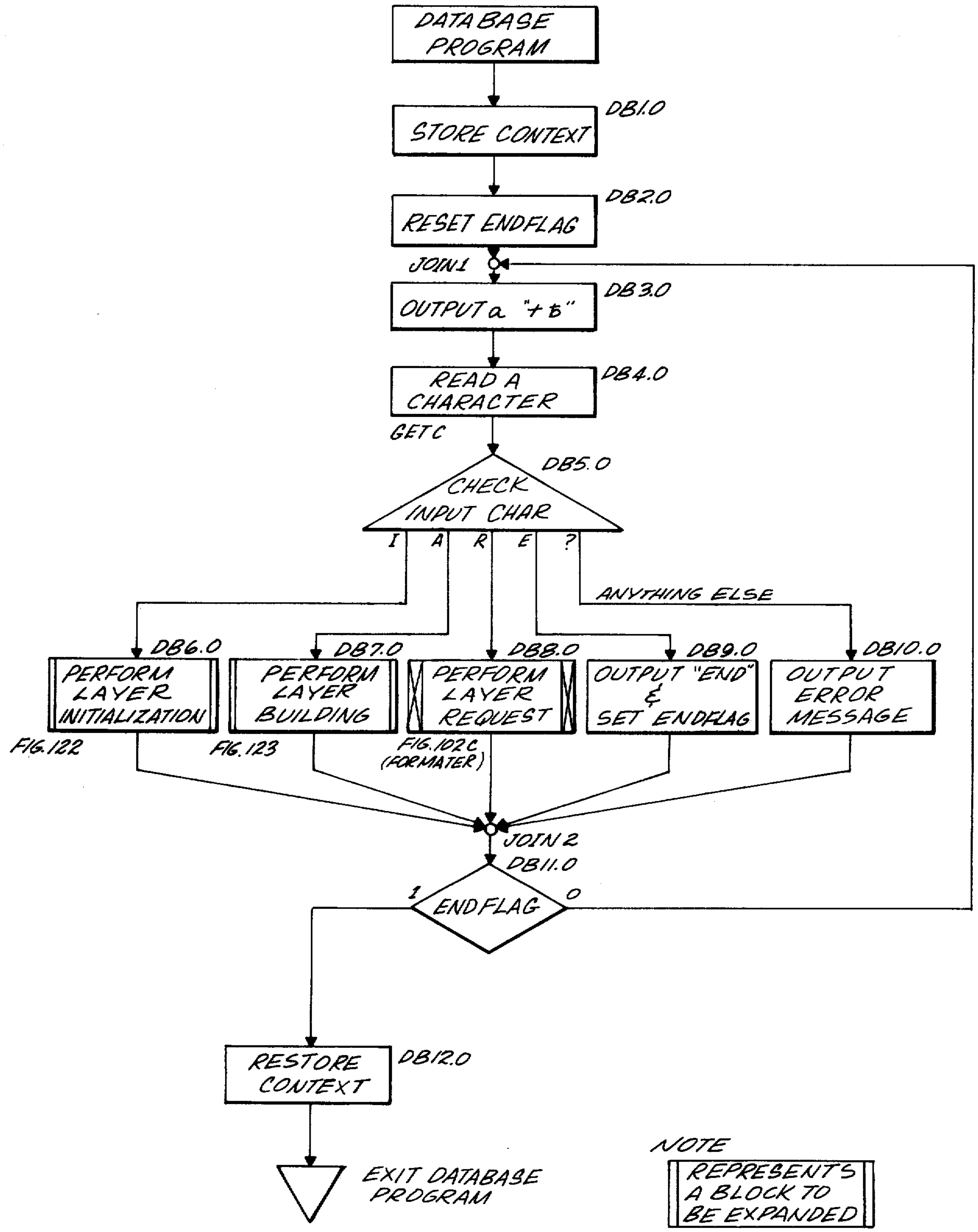
FIG. 121 is a DATA BASE program flow diagram.

FIG. 79C depicts the generalized operation of the disclosed data base which is shown in FIG. 121 and which is described in detail in Section XXXIII. FIG. 79C depicts the hierarchical arrangements of the programs and subroutines which comprise the data base system.

The manner in which the data base system is activated is to have the assembled code, which describes the system, loaded into main memory of the MINI COMPUTER. Program execution is initiated by directing the MINI COMPUTER to execute the first instruction in the system.

1. Data Base Initialization

It is obvious that before any meaningful manipulation of the data base can be performed that the system data structures must be initialized. Initialization is performed by the LAYER INITIALIZATION program. Layer initialization is depicted in block DB6.0 of FIG. 121 and expanded in FIG. 122. Layer initialization is described in detail in Section XXXIII.

Figure 117:
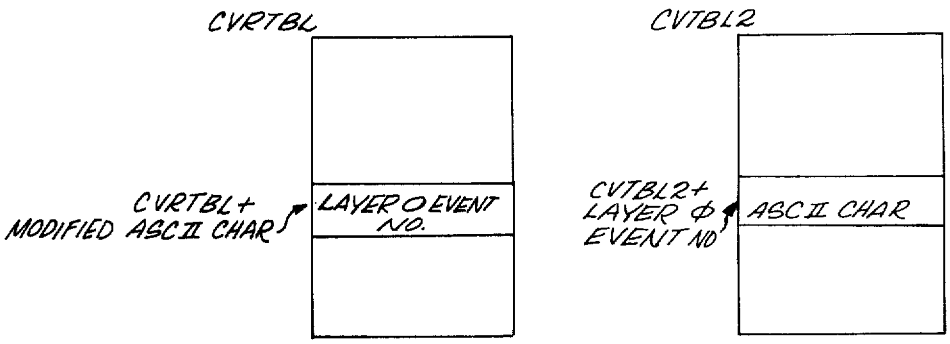
FIG. 117 is a sketch illustrating conversion tables CVRTBL and CVTBL2.

Data structure initialization begins by initializing the I/O conversion tables CVRTBL and CVTBL2 of FIG. 117. These tables are used to convert the characters input from some input device into internal event numbers. Event numbers bind the event occurrence vectors to original input characters.

Figure 120:
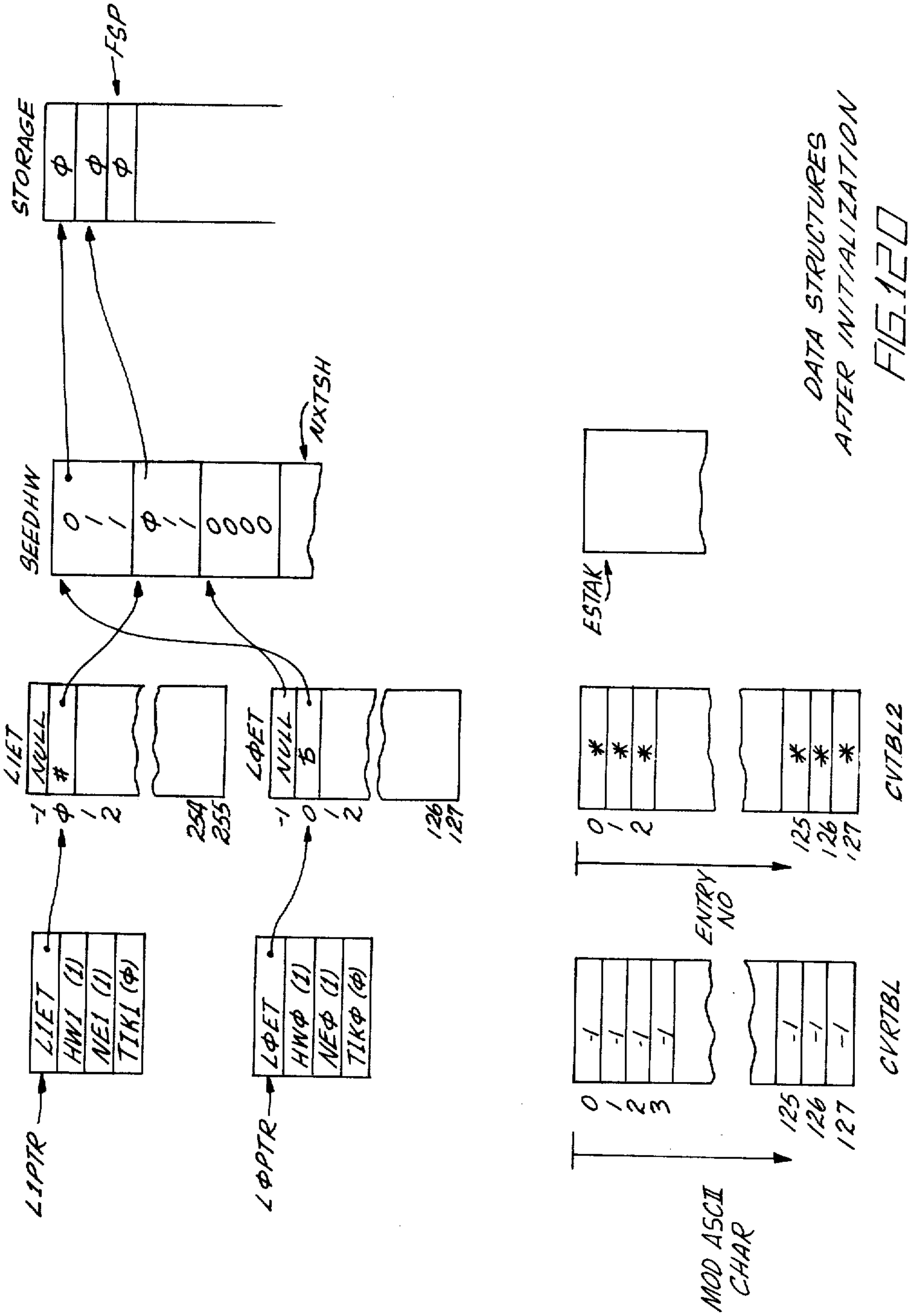
FIG. 120 is a sketch illustrating an example of the layered data structures after initialization.

Secondly, the main data structures depicted in FIG. 78 are initialized. Memory areas are set aside for layer headers, layer event pointer tables, seed headers, and seeds. Pointers and beginning value numbers are inserted wherever they are needed. When initialization is complete, the main data structures are as shown in FIG. 120.

2. Layer Building

The next function to be performed after initialization is the entering of the data base information. In entering information into the data base system, layers are constructed. The control would be given to the level one program in FIG. 79C LAYER BUILDING. The flow for this program is given in FIGS. 122-131. The program is described in detail in Section XXXIII. HARDWARE/SOFTWARE ORGANIZATION FOR BUILDING LAYERED DATA BASE.

Information is entered into the data base in layer one entries, i.e., sentences. Thus an input entry would consist of a sentence delimiter followed by a series of words each beginning and ending with a blank character. Finally, a sentence delimiter would complete the entry, e.g., # THIS IS A TYPICAL INPUT ENTRY #.

The LAYER BUILDING program processes each input entry and enters it into the data base. The method for doing this is as follows:

1. A sequence of events between blanks is obtained (i.e., a word).
2. A check is made as to whether this sequence is already in the data base on the lowest layer. If it is, it already points to an event on the next highest layer. If the entry does not exist on the lower layer, it is added to this layer and an event number on the next higher layer is created.
3. Steps 1 and 2 are repeated as long as there is another word in the input request to be processed.
4. When the ending sentence delimiter is recognized, the sequence of words (entries on layer 0, events on layer 1) is added to layer 1. Since the system disclosed is a two layer system, no redundancy is squeezed from layer 1.

Figure 77G:
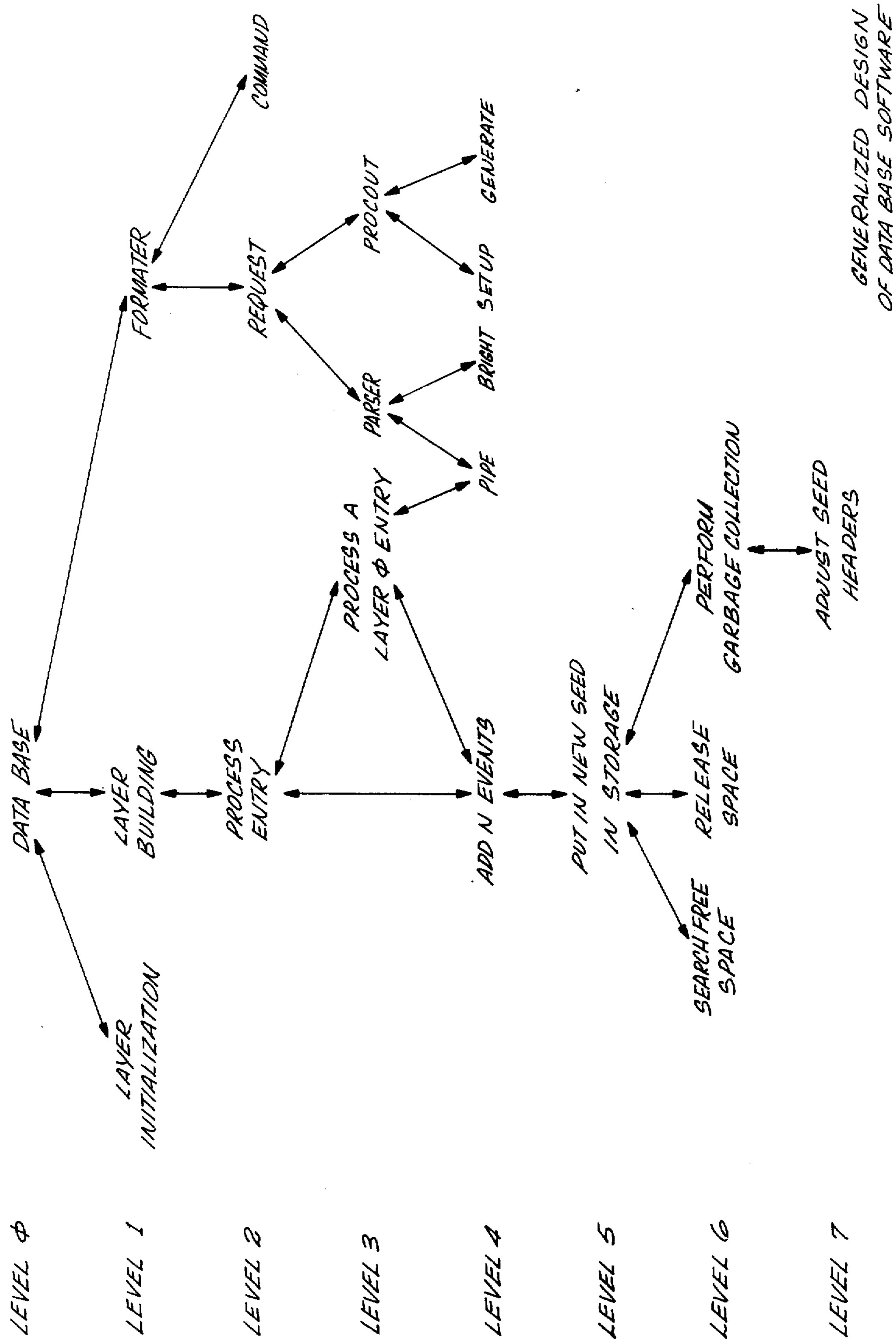
FIG. 77G is a sketch showing the generalized diagram of the software.

The control sequences on FIG. 77G for performing steps 1 through 4 are as follows:

The LAYER BUILDING program calls the level 2 PROCESS ENTRY program. The PROCESS ENTRY program starts to process the request by taking the events in the first word converting them from ASCII input code to internal code representing layer 0 event numbers. The event numbers are used to stack on ESTAK the corresponding L0ET entries. The process continues until a trailing blank is recognized.

Since a blank has just been recognized and hence a layer 0 entry is now being dealt with, control goes to the level 3 program PROCESS A LAYER 0 ENTRY. This program will process the word which is now represented on the top of ESTAK.

PL0E is entered with the top of ESTAK containing pointers to the seeds of the events which comprise the word being processed. PL0E passes the content of ESTAK to the level 4 program PIPE. The PIPE program performs piping on the events on ESTAK. IF the sequence of events on ESTAK are in the data base exactly, the number of the entry which caused the exact match is returned to PL0E. However, if the sequence did not match exactly, then this sequence must be added as an entry to level 0. Accordingly, the level 4 program ADD N EVENTS is called. This program will take the top of ESTAK elements which correspond to the word being processed and add the entry to the data base as a level 0 entry. This addition is performed by calling the hardware CHANGE MODULE. This procedure adds the next appropriate event occurrence time value to the event occurrence vectors of the events in question. This process creates new seeds for the events in question. The new seed has to be placed in storage by the level 5 program, PUT NEW SEED IN STORAGE program.

The PUT NEW SEED IN STORAGE program first calls the level 6 program SEARCH FREE SPACE. The SEARCH FREE SPACE program searches the storage area available for seeds until a slot is found which can accommodate the new seed. The address of this slot is passed back to PUT NEW SEED IN STORAGE. The program then transfers the new seed from a temporary area into the slot. The old seed must now be released since its values are no longer required. This is done by calling the level 6 program RELEASE SPACE. RELEASE SPACE returns the area occupied by the old seed into an available space pool.

Finally a check is made as to whether the seed storage area is too fragmented. If it is, control goes to the level 6 program, PERFORM GARBAGE COLLECTION. This program rearranges core so that all the seeds are located in a contiguous area of core. To do this some seeds must be physically moved from one area in storage to another. When this is done the seed headers for these seeds must be updated to reflect this change. This is done by the level 7 program ADJUST SEED HEADERS.

When the above completes, the PUT NEW SEED IN STORAGE program has also completed its task. Hence, control goes back to level 4 ADD N EVENTS. ADD N EVENTS returns to level 3 PL0E with the entry number of the entry just added. PL0E takes this entry number or the one obtained if an exact match was found and converts it to a level 1 event number. The current entry is cleared from ESTAK since it is no longer needed. The level 1 event number just computed is used to push a L1ET pointer onto ESTAK. This value on ESTAK represents the collapsing of the current word being processed into a single value representing a layer 1 event number. Control returns to PROCESS ENTRY.

The above process repeats as long as there is another word to be processed. When the ending sentence delimiter is recognized, control goes directly from the PROCESS ENTRY program to the level 4 program ADD N EVENTS. In this case the layer 1 events on ESTAK representing the words of the input entry are entered into layer 1 as a new entry. Note that PIPE was not called since redundancy is not squeezed from layer 1.

ADD N EVENTS operates as described hereinabove. New seeds are created and stored. GARBAGE COLLECTION is performed if necessary. Control finally returns to PROCESS ENTRY which passes it back to the LAYER BUILDING program. The above process repeats for each input entry to be added to the system.

Once the data base has been input, the system can be used to manipulate the information it contains. This is done by control passing from the DATA BASE program to the level 1 FORMATER program. The FORMATER program in turn passes control to one of the following level 2 programs: COMMAND or REQUEST.

The level two program COMMAND is entered if a change in control parameters is desired. The control parameters are mainly four:

1. Pipe width (PW)
2. Pipe cutoff (PCO)
3. Brightness cutoff (BVCO)
4. Length switch (LNGSW).

These parameters are used to control the quality of response. They are used in determining the closeness of match criterion by which possible output responses are discriminated.

The other level two program in the data manipulation area is the REQUEST program. This program will accept requests from an input terminal and output as responses those entries of the data base which pass the closeness-of-fit criterion imposed by the control parameters.

The first task of the REQUEST program is to preprocess the input request to assure an input entry format which is the same as that described in the LAYER BUILDING program description. This being done, control goes to the level 3 program PARSER.

The PARSER starts to process the input request. The initial delimiter in the request determines whether the response will be from level $\phi$ or level 1.

First, assume a level 0 response. This assures an input request as follows:

<blank> <letter> <letter> . . . <letter> <blank>

The PARSER strips off the input code and converts it to layer 0 event numbers. The event numbers are used to stack L0ET pointers on ESTAK of the layer 0 events which comprise the word being processed. When the trailing blank is recognized control goes to the level 4 program PIPE.

PIPE performs hardware piping on the word and returns to PARSER with the candidates for response prepared for the BRIGHT module. The level 4 program BRIGHT is called.

BRIGHT performs the hardware brightness function on the candidates selected by PIPE. Those which pass this final test are placed on an ordered list determined by their closeness-of-fit values. Control returns to PARSER which, in turn, passes control to the REQUEST program.

The REQUEST program passes the list obtained by the BRIGHT program to the level three program (PROCOUT). PROCOUT converts the entries on the ordered list into printed responses. It does this by first calling the program SETUP. SETUP computes the beginning and ending boundaries of the responses. GENERATE is then called which searches through all the event-occurrence vectors in this layer until all the events are found which lie between the beginning and ending boundaries established in SETUP. Control goes back to PROCOUT which converts the event numbers to output code and prints the response on the output device. PROCOUT continues calling SETUP and GENERATE until the list prepared by BRIGHT is exhausted or until the system requests that no more responses be output. In either case control returns to the REQUEST program.

A second kind of request can be a layer 1 request. In this case the operation is as follows:

The REQUEST program pre-processes the input request and control goes to the PARSER. The PARSER processes each word as described hereinabove. However when the list is returned from BRIGHT, only the best (i.e., the top) layer 0 entry (layer 1 event) is stacked on ESTAK. In this way the system is building a series of layer 1 events on ESTAK which represent a sequence of words which are as close as possible to the input request. Once this sequence is generated, PARSER again calls PIPE and BRIGHT. The difference here is that level 1 events are being used. BRIGHT still returns a list of best possible responses to PARSER and control finally returns to REQUEST.

At this point the REQUEST program contains an ordered list of layer 1 entries that are possible responses to the input request. The next step is to output and print out this response. To do this, PROCOUT is called.

PROCOUT, in turn, calls SETUP and GENERATE as described hereinabove. The difference here is that upon completion of GENERATE a list has been generated which represents the layer 0 words which must be generated in order to output a response. These words are then generated by calling SETUP and GENERATE a second time. The letters contained in the words are generated. Control goes back to PROCOUT and the response is printed on the output device.

The above sequence continues until the list is exhausted or until the system requests termination: Control returns to REQUEST and the process repeats.

Having constructed the data base, various types of requests and retrievals can be made with ease. The following section deals with this subject.

XXXII. INQUIRY AND RETRIEVAL HARDWARE/SOFTWARE ORGANIZATION

A. General Description of Inquiry and Retrieval Software

The primary supervisory program for inquiry and retrieval is the FORMATER program whose operation is initiated from the data base program when a requestor indicates that he wishes to do retrieval on the typewriter. This occurs, as will be explained, when the operator types an R on the typewriter during initial steps in the operation. The FORMATER program responds and in turn calls into operation others of the programs and subroutines which in turn call into operation others.

Figure 102A:
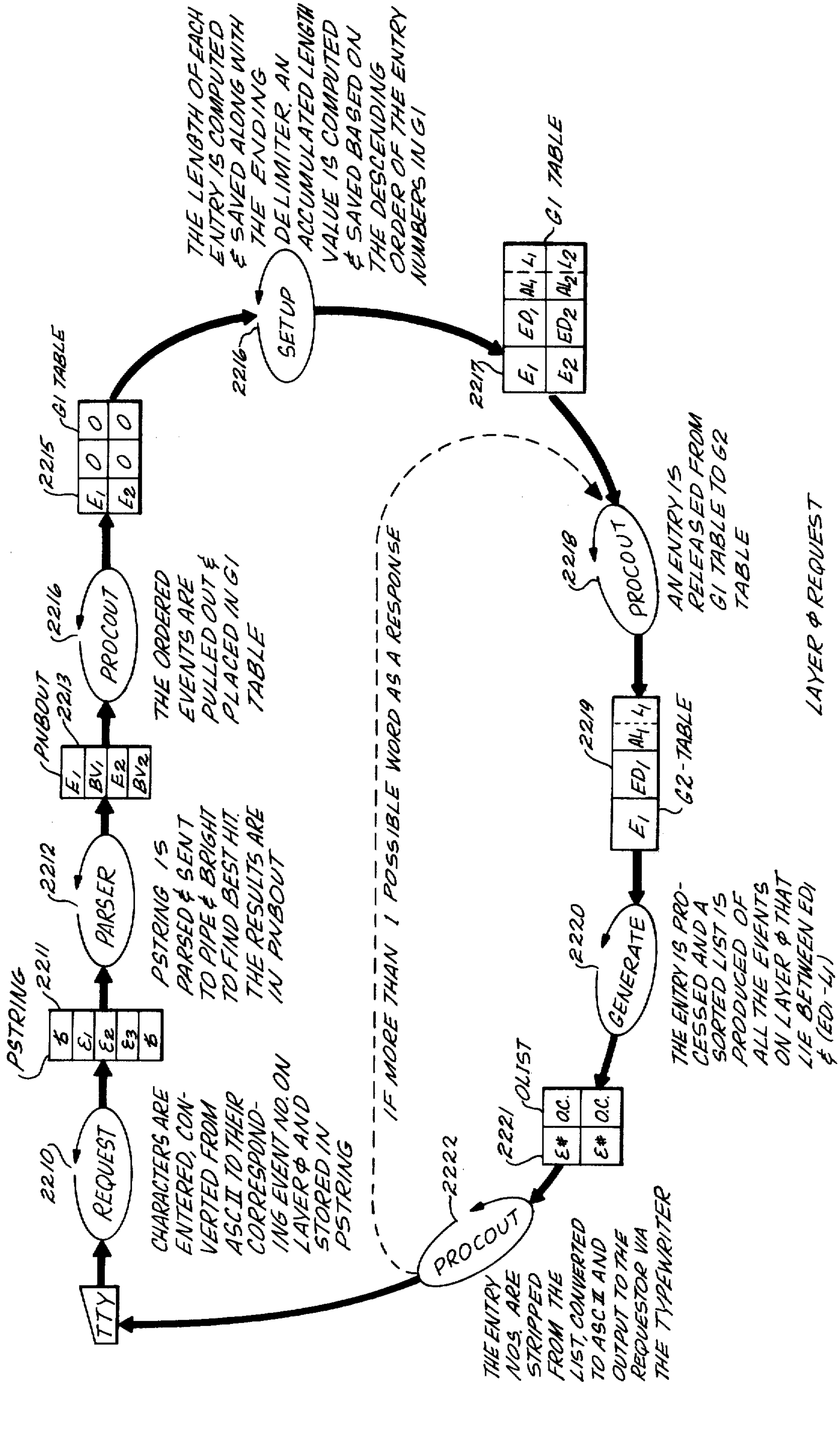
FIG. 102A is a pictorial flow diagram illustrating the operation of the FORMATER program during a layer 0 request.
Figure 102B:
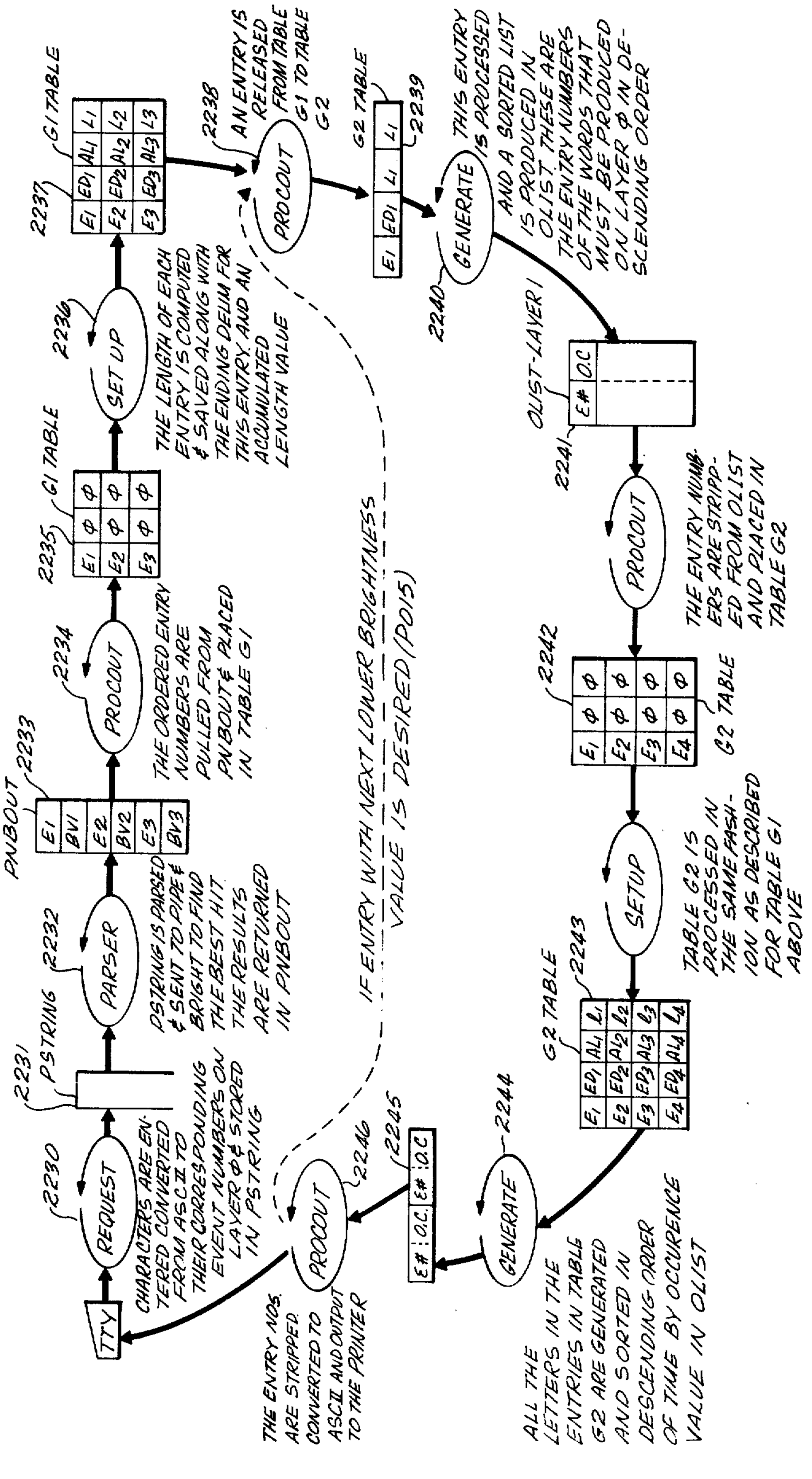
FIG. 102B is a pictorial flow diagram for the operation of the FORMATER program during a layer 1 request.

The general overall operation of the software system under control of the FORMATER program is depicted in FIG. 102A for a layer 0 request and FIG. 102B for a layer 1 request. Each of the new modules is presented with a flow diagram of operation and a computer program which will execute the flow. For ease of presentation and understanding the following standards have been adhered to in the flow diagrams.

1. A concise portion of the program is represented in the flow by a narrative description surrounded by a single lined box.
2. A broad portion of the code indicating a function to be performed but which is not to be treated as a subroutine in the code is presented as a narrative surrounded by a box whose vertical ends are double lined. This function will then be expanded in a later flow diagram; however the code will be presented in line.
3. A function to be called is a subroutine which has the same description as (2) above; however there is an "X" between the vertical lines (see FIG. 80). In this case both the flow for the box and the computer code will be expanded at a later time.

The FORMATER program accepts and processes entries presented by a requestor at the typewriter of the operator console. The entries can be either a request to the layered data base or can be a command which has to be executed.

Commands are of two types. One type of command is an "END" command which denotes an end to the particular request and causes an exit from the FORMATER PROGRAM. The second type of command is a "CHANGE" command which allows the operator to change one of the globals that are used in the piping and brightness computations. Globals are the $\alpha$ used in the Equation 11 for the length value L, LNGSW which is a flag which states whether or not the length of the request is to be used in making a response, the piping and brightness cutoff values PCO and BVCO, and the pipe width value PW.

Consider now the general operation of the FORMATER program for a data base request and assume that a requestor is making a layer 0 request. The general operation of the FORMATER program is depicted for a layer 0 request in FIG. 102A and should be referenced in the following discussion. As described above, the requestor enters a request at the keyboard of the typewriter with the following format:

$$b - - - b$$

where - - represents letters of a word and ƀ represents a typewriter blank and word delimiter. The FORMATER program first causes a carriage return line feed on the printer and causes an asterisk (*) to be printed out by the printer. The requestor then types the letters of the request word surrounded by the word delimiters ƀ. The typewriter presents ASCII coded electrical signals to the MINI COMPUTER. The FORMATER program responds to the ending delimiter ƀ and calls the operation of the REQUEST subroutine.

The REQUEST subroutine places the first word delimiter b into the parse string (PSTRING) shown at 2211. It then converts the ASCII coded letters of the request word using a table CVRTBL into corresponding layer 0 event number signals *e*1, *e*2, etc., and stores these event numbers into PSTRING. The ending word delimiter ƀ is then stored in PSTRING. The REQUEST subroutine then passes a pointer to the PSTRING over to the PARSER program. In this regard the MINI COMPUTER hardware register R4 receives an address pointer to PSTRING. A blank E is used herein to refer to an ASCII coded character. and the script e is used to refer to a layer even number.

The PARSER program causes an interrogation function in the data base. The interrogation function is performed by piping and brightness functions using the content of PSTRING and forms a list known as PNBOUT shown at 2213. PNBOUT contains a series of two value pairs the first of which is an entry number, i.e., E1, E2, et seq., and the second of which is a brightness value BV1, BV2, et seq., corresponding to the same numbered entry number. The entry numbers identify the number of the entries in layer 0 and the brightness values identify the brightness value for the corresponding entry as determined by the piping and brightness functions. The entries in PNBOUT at 2213 only include those whose brightness values are above the brightness cutoff value BVCO entered as a global by the requestor.

Having formed PNBOUT at 2213 it is now necessary to generate the outputs for the entries contained therein. To this end the PROCOUT subroutine is called which takes each layer 0 entry, i.e., E1, E2, et seq. from PNBOUT and moves it into a Table G1 shown at 2215. Table G1 contains a series of three word entries the first of which contains one of the entry numbers from PNBOUT and the second and third are initially set to 0.

The PROCOUT subroutine then calls the SETUP subroutine which goes through and, for each entry in Table G1, determines the ending delimiter for the corresponding entry, i.e., ED1, ED2, et seq., a length value for each entry, i.e., L1, L2, et seq., and an accumulated length value for each entry, i.e., AL1, AL2, et seq. The length value for each entry is the difference between the beginning and ending delimiters, less 1. The accumulated length value, as will be discussed in more detail, is used to select the beginning of each entry in an output string.

Having generated Table G1 as depicted at 2217 in FIG. 102A, each entry in Table G1 is now output. The entries are output to the operator console and printed, one entry at a time. To this end, the PROCOUT subroutine is again called and takes off one entry of Table G1 beginning with the top one. The entry is moved into a Table G2 as depicted at 2219. The GENERATE subroutine is then called and takes the ending delimiter for the entry in Table G2 and generates a reference line which includes all of the event-times which lie between the beginning and ending delimiters for the entry in Table G2. Having generated all event-times in the reference line the GENERATE subroutine then goes through all event occurrence vectors (each represented by a seed header and seed line) of the data base layer 0 and forms a series of layer 0 event numbers (*e#*) and occurrence value (OC) pairs representing the corresponding events in the stored data base. A layer 0 event number (*e#*) and occurrence value (OC) pair is formed for each event-time value in the reference line which is the same as any one of the event occurrence vectors making up the data base. The event number (*e#*) identifies the event occurrence vector in which the actual occurrence value is located. This series of pairs is stored in a main memory area called OLIST depicted at 2221. The GENERATE subroutine also causes OLIST to be sorted so that the pairs are arranged with the occurrence values in descending value order thereby representing the order of the events for output.

The PROCOUT subroutine is then called causing ASCII coded signals to be sent to the operator console for printing. This is accomplished by taking each entry number E, in order, using a table called CVTBL2, converting each to ASCII code and sending the result to the printer of the operator console for printing out and display.

Consider now the general operation for a layer 1 request. FIG. 102B is a pictorial flow diagram for the operation of the FORMATER program during a layer 1 request. Similar to a layer 0 request, the operator types in the request, using the typewriter at the operator console. The FORMATER first causes a carriage return and line feed on the printer and causes an asterisk (*) to be printed to alert the user that the system is ready to accept requests. The user then responds by typing the request. The requestor will type in a request of the following format:

*# b - - - b - - - b - - - #* where

- - - represents letters of a word, # represents a sentence delimiter, and

ƀ represents a word delimiter.

The typewriter presents ASCII electrically coded characters. The ASCII characters representing letters are converted to their corresponding layer 0 event numbers and placed in the PSTRING as at 2231 in between the beginning and ending sentence and word delimiters (in ASCII code) similar to that described with respect to layer 0 request of FIG. 102A.

The PARSER subroutine is then called which causes the piping and brightness functions to be applied to the content of the PSTRING and return the PNBOUT list as at 2233. PNBOUT contains the layer 1 entry numbers and corresponding brightness values with only brightness values greater than the brightness cutoff value (BVCO). Thus PNBOUT contains a series of layer 1 entry numbers, i.e., E1, E2, E3, et seq., followed by the corresponding brightness values BV1, BV2, BV3, et seq.

The PROCOUT subroutines takes the entry numbers from PNBOUT and sets up a table G1 as depicted at 2235. Similar to that described for FIG. 102A, the table G1 consists of a series of sets of three word entries, the first of which is the layer 1 entry number, i.e., E1, E2, E3, and the second two of which are initially set to 0.

The SETUP subroutine is then called which fills out the 0 values in the G1 table for each entry number to that depicted at 2237 in FIG. 102B. Specifically, for each entry number the SETUP subroutine fills in the corresponding ending delimiter ED1, ED2, ED3, et seq., the corresponding accumulated length AL, AL2, AL3, et seq., and the length of the corresponding entry L1, L2, L3 et seq.

The PROCOUT subroutine is again called which takes the values in G1 corresponding to the one entry (beginning with the first) and moves them into Table G2 as depicted at 2239.

The GENERATE subroutine is then called causing a reference line to be formed with all of the event-times between the beginning and end delimiters of the layer 1 entry stored in Table G2. The GENERATE subroutine then goes through each entry on layer 1 and forms in OLIST (see 2241) a series of event number and occurrence value pairs similar to that described at 2221 of FIG. 102A. An event number and an occurrence value pair is formed for each actual occurrence value in layer 1 which is the same as an event-time value in the reference line. The event number identifies the layer 1 event number in which the actual occurrence value is located. At this point OLIST is as depicted at 2241 with a series of two value pairs, the first of which is a layer 1 event number (layer 0 entry number) and the second of which is a corresponding occurrence value.

It should be noted that the event numbers in OLIST are event numbers on layer 1 and therefore identify words as opposed to letters. Also these event numbers on layer 1 are entry numbers on layer 0. It should also be understood that it is necessary to locate the corresponding letters or events in layer 0 of the data base in order to generate the letters of the word for output by the printer. Therefore, the PROCOUT subroutine is again called and takes all the layer 1 event numbers (hereinafter called layer 0 entry numbers) from OLIST at 2241 and arranges them in Table G2 as shown at 2242. Table G2 similar to that described with reference to FIG. 102A contains a series of sets of three word entries, the first one of which is the layer 0 entry number from OLIST and the second two of which are initially set to 0.

The SETUP subroutine is then called, filling in the corresponding ending delimiters, i.e., ED1, ED2, et seq., the corresponding accumulated length values, i.e., AL1, AL2, et seq., and corresponding length of entry values, i.e., L1, L2, et seq.

The GENERATE subroutine is again called at 2244 and generates a segment of a reference line for each layer 1 entry number in Table G2. To this end, for each layer 0 entry number in Table G2, the GENERATE subroutine sets up the list of event-time values that lie between the corresponding beginning and ending delimiters. The event-time values are then sorted into descending value order. The GENERATE subroutine then proceeds through layer 0 of the data base, setting up a layer 0 event number and an occurrence value pair for each event-time value in the reference line for which there is found an event number and corresponding occurrence value in layer 0 of the data base. These event number and occurrence value pairs are placed into OLIST. Subsequently OLIST is sorted so that the event number and occurrence value pairs are ordered in descending value order by occurrence value.

The PROCOUT subroutine is then called to start generating the ASCII coded characters for the printer of the operator console. To this end the layer 0 event numbers of the OLIST are stripped off, one by one, starting with the event at the beginning of the list and each is used as an index into Table CVRTBL2. To this end each event number is added to the base address of Table CVRTBL2 to get an address which address is used to read the corresponding ASCII coded character from Table CVRTBL2. The ASCII coded character is then transferred to the printer for printing and display.

A decision is made during PROCOUT at 2246 as to whether to print the "next best" entry if one exists. Note this allows the user to selectively print out possible responses to the request based on the brightness value of the entries.

This continues until the sentence corresponding to the layer 1 entry stripped off from Table G1 at 2238 has been completely printed. Upon completion the system returns over to 2238 where the PROCOUT subroutine is called and another layer 1 entry is stripped off from Table G1 and the process proceeding from there on is repeated.

Consider now more specifically the general operation of the PARSER program and those programs called by the PARSER program. The PARSER program is called, as discussed above, by the FORMATER program. The PARSER program causes the MINI COMPUTER to perform a number of retrieval functions and calls the operation of the PIPE and BRIGHT programs. Briefly, as depicted at A in Table 60, the PARSER program scans the letter events of the request after having been converted to base relative address by the FORMATER program and utilizing the layer header for the desired layer (see FIGS. 77, 78A and 78B), obtains the seed header pointers from the L0ET table and stacks (i.e., on a last-in-first-out basis) the L0ET pointers in the order scanned into a reserved area of main memory in the MINI COMPUTER referred to as ESTAK. In addition, the PARSER program stores a value representing the number of L0ET pointers contained in ESTAK into software register RLN0 for a layer 0 request or RLN1 for a layer 1 request in main memory of the MINI COMPUTER.

The relevant data produced by calls on the PIPE and BRIGHT programs are depicted at B through E of Table 60.

It should be noted tht the purpose of a request as applied to the PIPE and BRIGHT programs is to determine the "best" response in the data base contained in main memory for the word or sentence request. When a sentence request is made, then the "best response" is determined based on the actual words in the request sentence. The "best" response from the word layer 0 will provide actual sentence layer 1 events to be used in determining the sentence layer 1 response. These and other aspects of the PARSER, PIPE and BRIGHT software will be more fully described in connection with these programs.

Figure 88A:
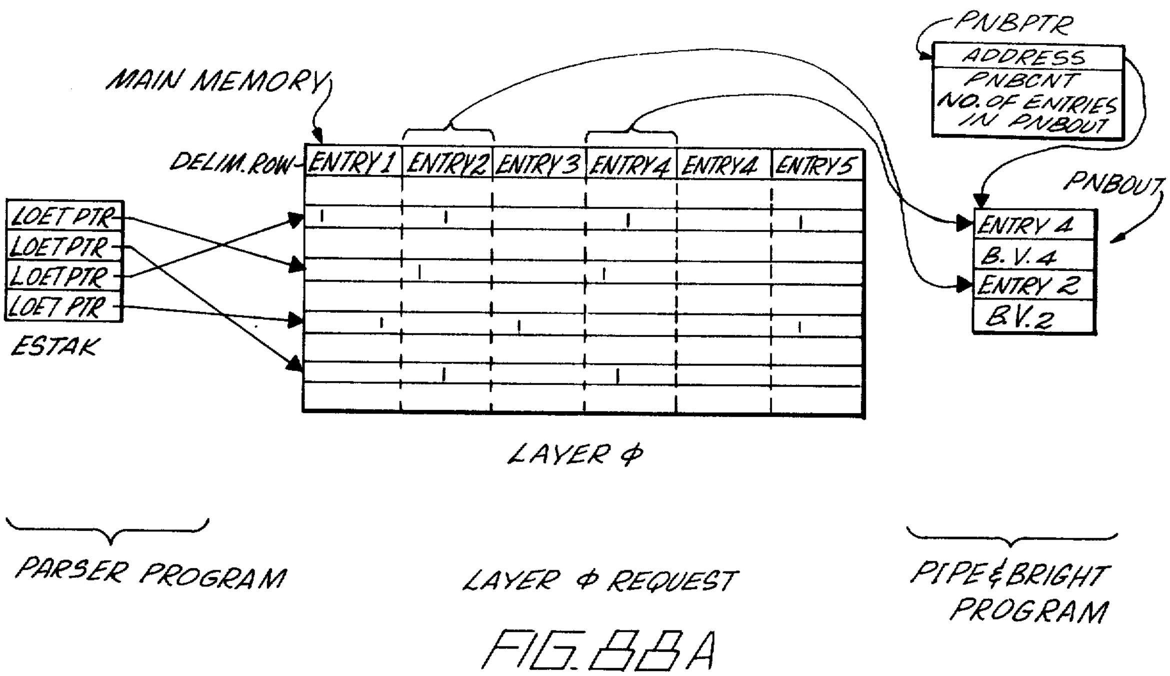
FIGS. 88–93 are sketches illustrating the sequence of operation and primary storage areas during the operation of the PARSER, PIPE and BRIGHT programs.
Figure 88B:
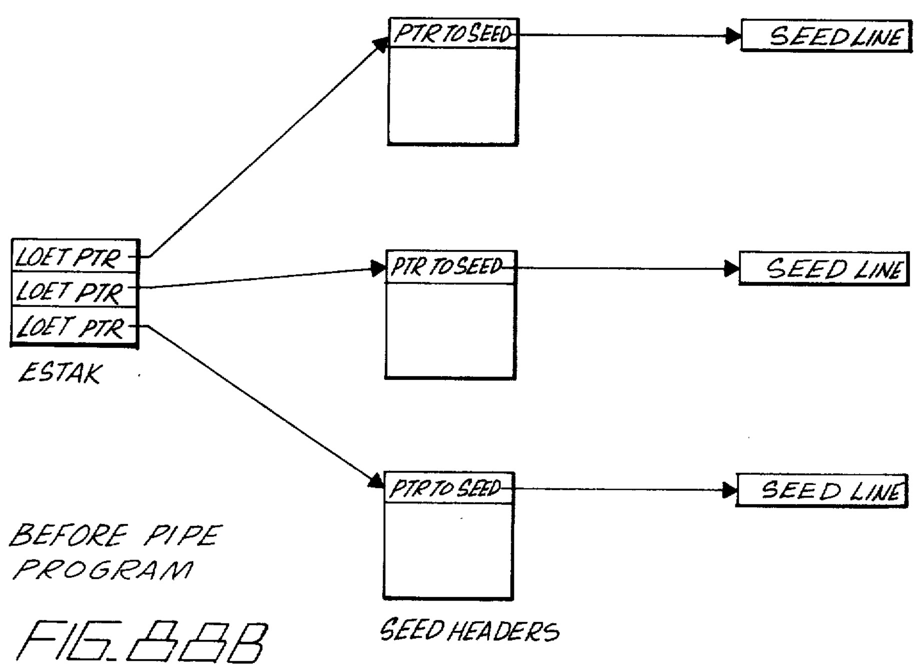

FIGS. 88A, 88B through 93 are sketches illustrating the sequence of operation and primary storage areas used during operation of the PARSER, PIPE AND BRIGHT programs. Consider in general the overall operation. FIG. 88 is a general diagram indicating how the PARSER program sets up a stack area in memory referred to as ESTAK and performs a layer 0 request. The PARSER program stores in ESTAK a layer event point LXET for each layer 0 event in the request and the LXET's are stored in the order presented by the request. Each LXET is the base address of a seed header for the corresponding event in the request. This configuration is generally depicted in FIG. 88A by the lines between ESTAK and an example of layer 0 of the data base.

The final output area for the PIPE and BRIGHT program is a main memory area referred to as PNBOUT (see FIG. 88A) whose base address is designated by the address in the first location of a two word area identified by the symbol PNBPTR. The base (or first) address of the area PNBPTR is known as address PNBPTR. The second location of PNBPTR contains a value identifying the number of entries in the area PNBOUT. As indicated, each entry in PNBOUT contains an entry number, i.e., ENTRY 4, ENTRY 2, identifying the number of the corresponding entries on layer 0. In this connection it will be recalled that an entry on layer 0 corresponds to an event on layer 1. PNBOUT contains in the memory locations immediately following each entry number the brightness value BV for the corresponding entry. To be explained in more detail, the BRIGHT program arranges the entry numbers and corresponding brightness values in descending order by brightness value.

FIG. 88 is a general figure depicting the base address LXET (FIG. 78) in ESTAK which points to the beginning of the corresponding seed headers. The first location of each seed header in turn contains the base address of the beginning of the corresponding main memory area containing the corresponding seed line.

Figure 89:
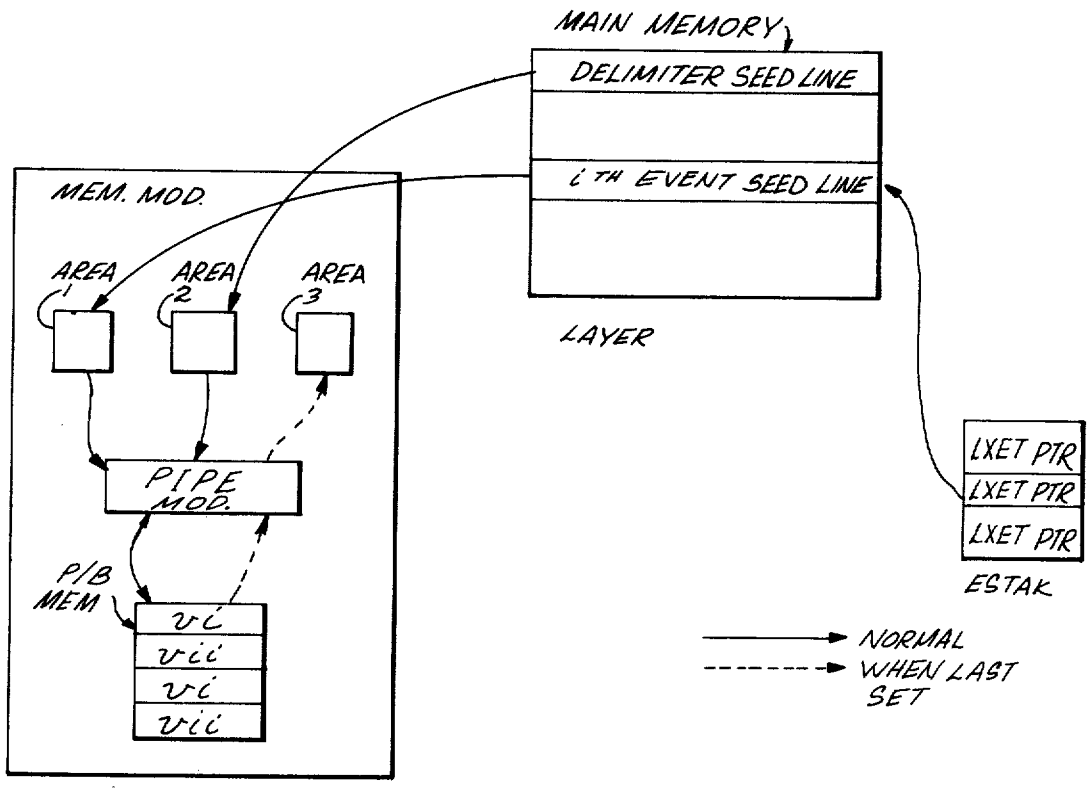

Referring to FIG. 89, the main memory of the MINI COMPUTER contains the delimiter seed line and the event seed line in separate memory areas. The PIPE program during PI1 through PI22 transfers the delimiter seed line to MEMORY MODULE area 1 and the event seed line to MEMORY MODULE area 2. The PIPE program causes the PIPE MODULE to process the delimiter seed line and event seed line from MEMORY MODULE areas 1 and 2 and the results are stored in the P/B MEMORY. With reference to FIG. 89 it will be seen that the P/B MEMORY contains a series of intermediate two value pairs (*vi*, *vii*). The first is an event-time (or occurrence) representing a center pipe value *vi* and the second is a number of hits value *vii*.

When the operation of the PIPE MODULE completes and the LAST flip flop in the STATUS register of the INTERFACE MODULE has been set, the PIPE MODULE modifies the two value pairs contained in the P/B MEMORY and causes them to be transferred to MEMORY MODULE area 3.

Figure 90:
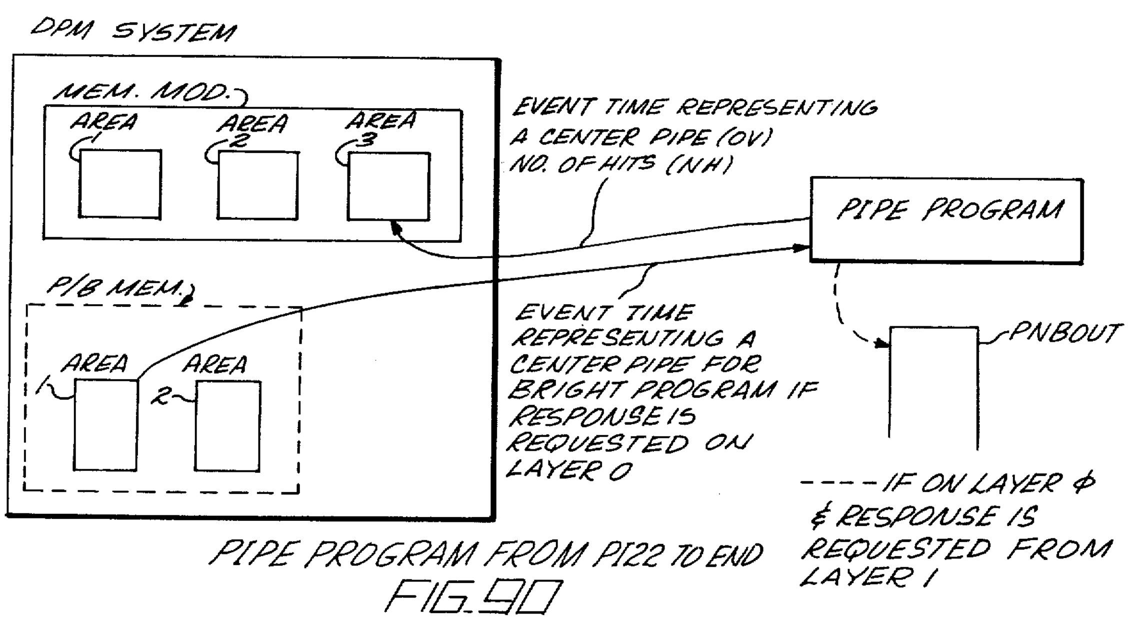

FIG. 90 depicts the general operation of the PIPE program from PI22 to the end of the PIPE program. The PIPE program causes the two value pairs *vi* and *vii* to be read out from MEMORY MODULE area 3 and the number of hits value, vii, for each of the two value pairs is compared against the pipe cutoff value PCO. Those event-time values vi whose number of hits values meet the pipe cutoff criteria, i.e., are equal to or greater than the PCO value, are then transferred to P/B MEMORY area 1. If the PIPE program is processing on layer 0 and a response is required from layer 1, the center pipe values are transferred to the area PNBOUT for processing by the BRIGHT program.

Figure 91:
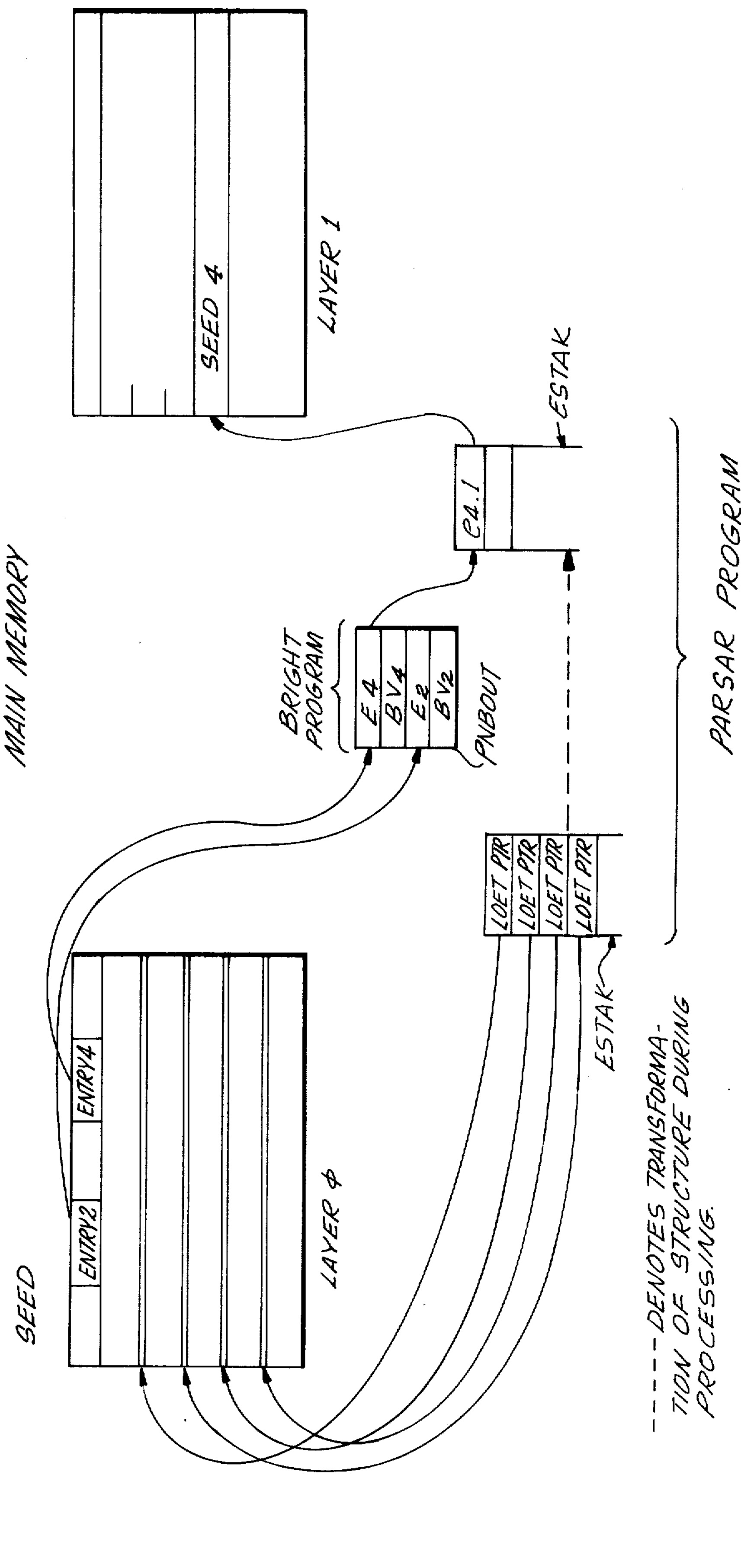

FIG. 91 shows an example of a single pass for processing a layer 1 request involving three words. As generally indicated, ESTAK contains the address pointers from LXET to the seed headers which in turn identify the beginning location of the corresponding seed lines in main memory. It is illustrated that entries 2 and 4 in layer 0 pass the pipe cutoff value test. Under these conditions the BRIGHT program generates a two value for each of entries 2 and 4 and the results are stored in PNBOUT. The two value pairs are a value E identifying the number of the corresponding layer 0 entry and a brightness value BV. As indicated above, the BRIGHT program causes the entries to be ordered in decreasing value order by brightness value. To be explained in more detail in connection with the PARSER program, the two value pair with the largest or best brightness value is transferred to the top of ESTAK as indicated at *e*4.1 (indicating event 4, layer 1). Since an entry on layer 0 corresponds to an event on layer 1, *e*4.1 is a pointer to event 4 on layer 1.

Figure 92:
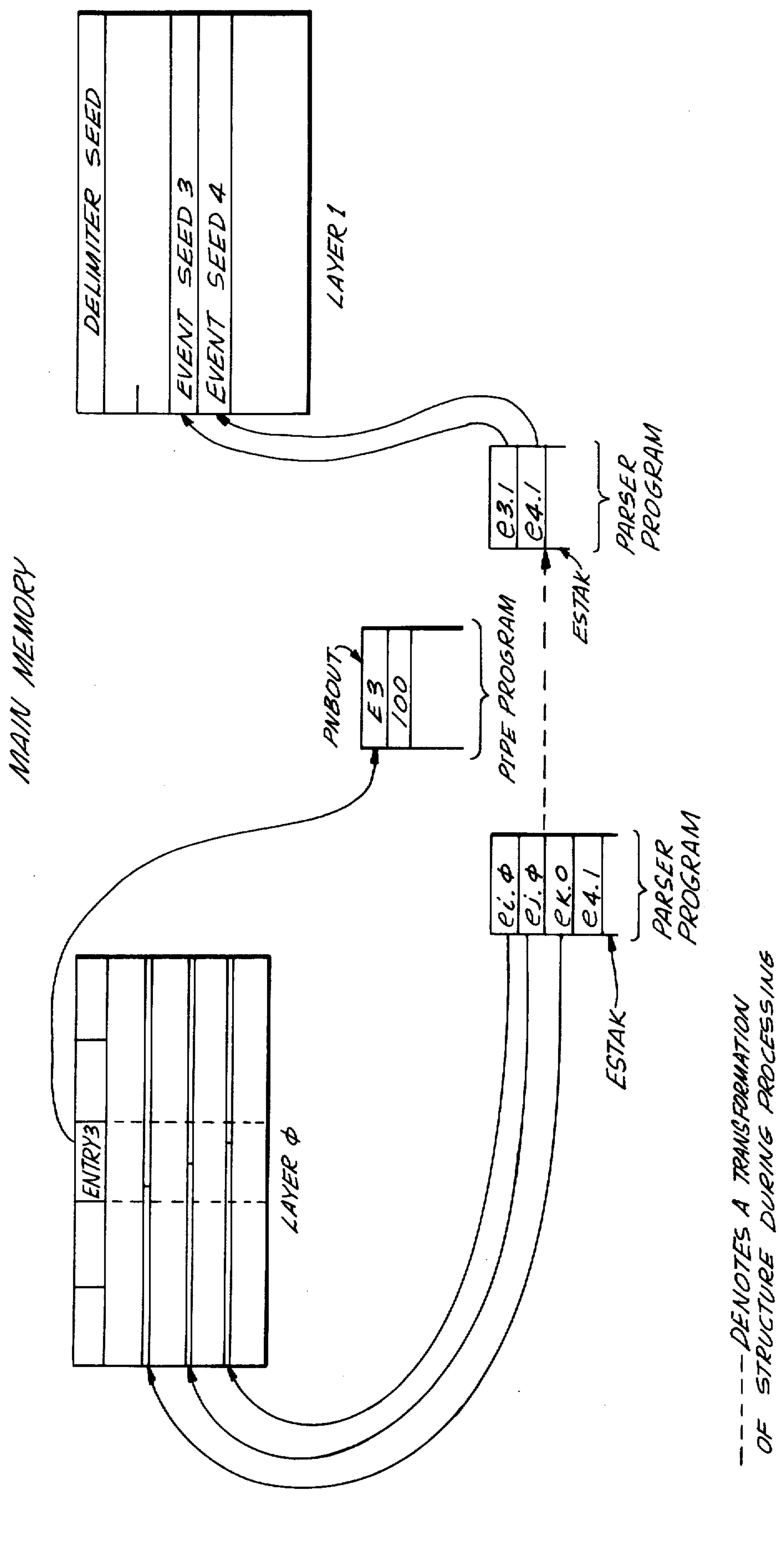
Figure 93:
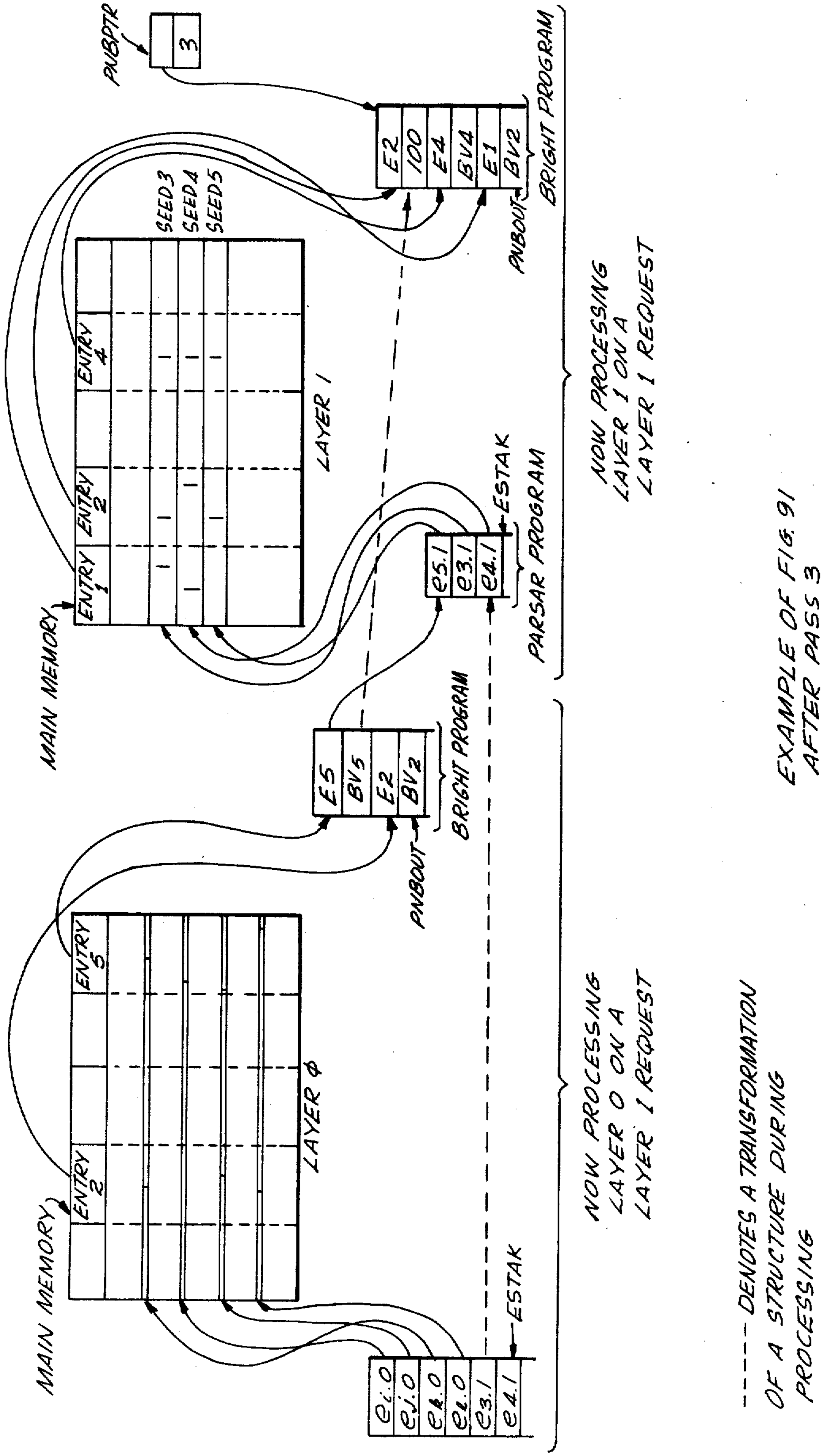

FIG. 92 depicts the same example as in FIG. 91 after the second pass through the PARSER program, assuming that an exact hit was found on entry 3. Under these conditions the PIPE program will transfer directly to PNBOUT the two value pair consisting of a value identifying the entry number 3 on layer 0 or event 3 on layer 1 followed by a forced value indicating a 100% brightness value. The PARSER program will leave in the top of ESTAK the L1ET address (*e*3.1) for event 3 on layer 1 and an L1ET address (*e*4.1) for event 4 on layer 1. Note that events 3 and 4 of layer 1 are for event seeds 3 and 4. FIG. 93 contains the example of FIG. 91 following pass 3. As indicated at the end of pass 3, the BRIGHT program leaves in PNBOUT the values indicated at the right side of FIG. 93.

The foregoing modules require five subroutines to call the OUTPUT and DECODE I MODULES, cause information to be transferred between the MINI COMPUTER main memory and the MEMORY MODULE and to order the results of the BRIGHT program in the right order in output area PNBOUT in main memory.

Figure 79D:
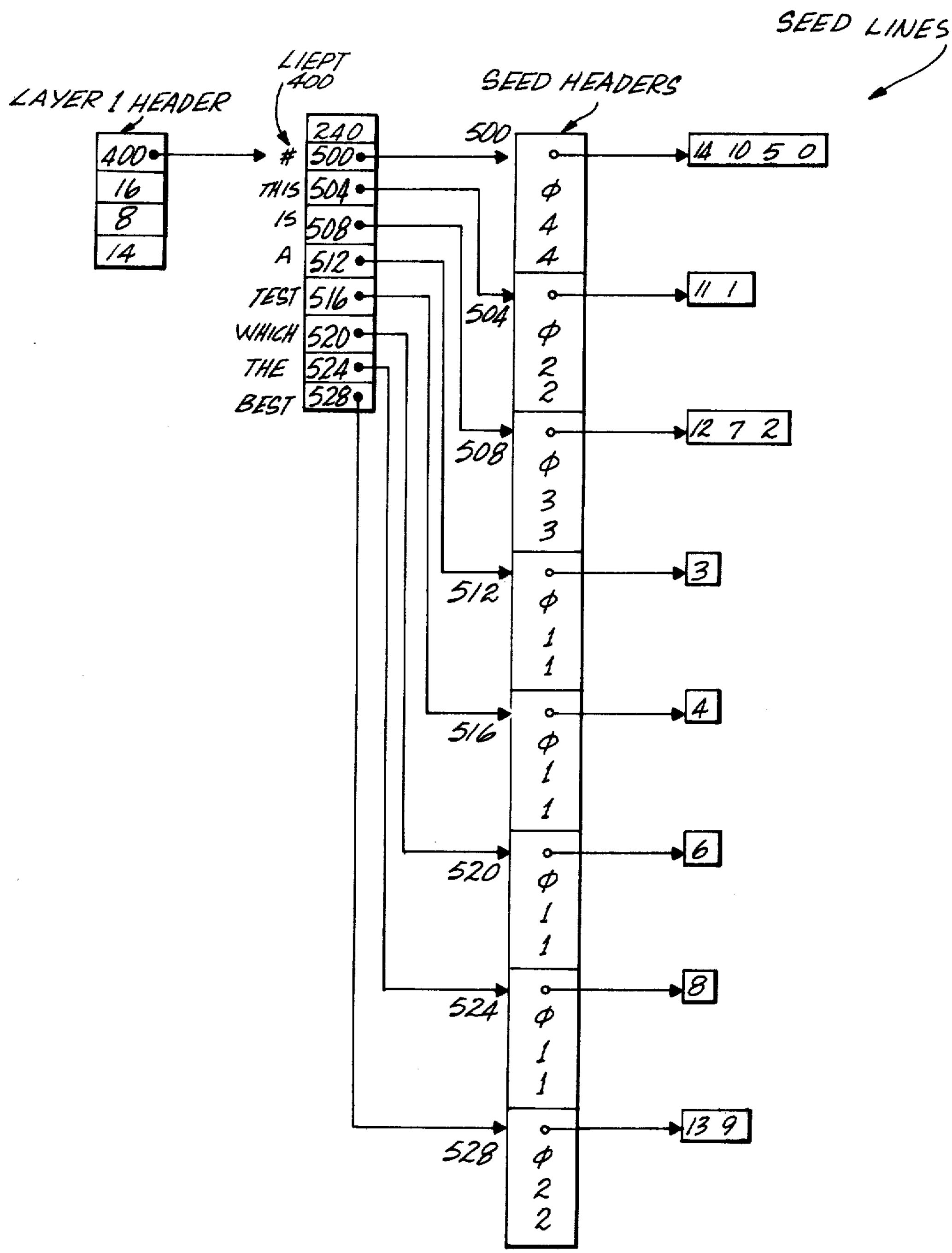
FIG. 79D is a sketch showing an example of the data structure for layer 1.

Consider now an actual example of the operation of the PARSER, PIPE and BRIGHT programs and their related subroutines. FIG. 79C shows an actual example of the address pointer information for the layer 0 header, the layer 0 event pointer table (L0EPT) as well as the corresponding seed headers and the corresponding seed lines. FIG. 79D shows the corresponding information for layer 1. Thus by way of example the layer 0 header contains four (4) words the first of which contains address 100 which is an address pointer to the layer 0 event pointer table (L0EPT), the second word of which is the value 32 representing the width (number of possible occurrence values or event-times) in layer 0, the third word of which is the value 10 representing the number of the events in layer 0, and the fourth word of which is the value 30 which represents the highest event-time (clock tick) for layer 0. The layer 0 event pointer table L0EPT has an address pointer for each of the 10 events in layer 0 and each such address pointer points to the corresponding event seed header. To be explained in more detail, while constructing the data base as each new event is encountered in a data base layer it is assigned an event number. Event numbers are assigned consecutive numbers in the order encountered. The event number is used to compute the offset into the L0ET. Thus, for example, the letter "I" has an event number value of 3 which when added to the base address 100 of the L0ET gives address 103 for the event "I". Location 103 in turn contains an address pointer to base address 212 which in turn is the base address for the seed header for event "I".

Looking at the seed header for the beginning delimiter *b*, the first word is the beginning address of the delimiter seed line, the second word is a value 0 identifying the line number of the iso-entropicgram for the corresponding seed line, the third word is a value 8 identifying the length in words of the delimiter seed line, and the fourth word is a value 8 identifying the number of actual occurrence values in line 0 of the seed line (which in this case is the same as the content of the preceding location since it is assumed for the example that all seed lines are at line 0). For ease of explanation it is assumed that the non delimiter seed lines as well as the delimiter seed line are at line 0 of their corresponding iso-entropicgram, which need not be the case.

Layers 0 and 1 of the data base, the example about to be explained, are depicted in Table 60B. It is assumed by way of example that layer 0 contains word entries 1 through 7 which are as follows: THIS IS A TEST, WHICH IS THE BEST, THIS IS BEST. The words are grouped according to sentences which they represent. Table 60B depicts the data base structure in binary form using a 1 to indicate the presence of actual occurrence values. Thus, by way of example, the T event number 1 in layer 0 contains the actual occurrence values 1, 11, 14, 22, and 29 which are the same as those occurrence values depicted for the seed line T in FIG. 79C. It should further be noted that the entries numbers 1, 2, 3, 4, 5, 6, and 7 on layer 0 are the same event numbers on layer 1 of the data base.

The following general description of operation will be made with reference to the PARSER, PIPE and BRIGHT flow diagrams of FIGS. 80, 82 and 94 in order to provide the reader with a better understanding of the operation.

In the following example it is assumed that the requestor has presented the word layer 0 request ƀ BETTER ƀ as depicted in Table 60C. Refer now to the PARSER program flow of FIG. 80 and consider the general sequence of operation for the example. Upon entry into the PARSER program flow of FIG. 80 it is assumed that the FORMATER program (to be described) has set the state of the machine as generally depicted, has stored values representing the request ƀ BETTER ƀ into main memory, and has set the input string pointer, R4, to point to the beginning delimiter ƀ of the request which has been stored in main memory and has set the main memory areas ESTAK and PNBOUT to null or 0, all as depicted in Table 60C. It is also assumed that the requestor has entered into the system a pipe width (PW) of 1, a pipe cutoff value (PCO) of 50% and a brightness cutoff value (BVCO) of 0.50.

During PA1 of the PARSER program flow the beginning delimited ƀ is stripped from the request during PA2 and it is detected that this is a beginning delimiter ƀ thereby indicating a word request. Control then goes to PA4 of the flow where the software length switch LNGSW is set to 1 to indicate that the actual word BETTER is desired and not some other word which contains that request word. In addition to ESCAPE flag is set to 1 in order to cause the PARSER program to terminate its operation after processing data base layer 0.

If the initial character had been a sentence delimiter # this would have indicated a sentence request in process and therefore control would have gone to PA3 following PA2 where the length of the request in software register RLN1 would have initialized to 0 and a word delimiter b̸, which always follows the sentence delimiter, would have been bypassed. Continuing with the example, JOIN1, JOIN2 and PA5 of the flow are entered following PA4. During PA5 the layer 0 request length in software register RLNO is initialized to 0 so that it can be used to count the length of the request word in characters. Operation then passes through JOIN3 to PA6 where the first non delimiter character "B" is obtained. During PA7 the current character "B" is checked to see whether it is a sentence delimiter #. Since it is not, PA8 is next entered where the same character is checked to see whether it is a word delimiter b̸. Since it is not, PA9 of the flow is entered where the layer 0 event number 9 for "B" (see Table 60B) is added to the base address 100 from the layer 0 header for access to the L0ET (see FIG. 79C). Address 109 of the L0ET contains the base address 236 of the seed header for event "B". Accordingly, during PA9 of the L0ET pointer 236 is stored in main memory area ESTAK. During PA10 the layer 0 request length RLNO is increased by 1 to the value 1 indicating that one non delimiter value of the request has now been stored in ESTAK.

The EXIT flag is used to indicate that the L0ET pointers for all events in the request have been stored into ESTAK. The 1 state of EXIT indicates this has occurred, whereas the 0 state indicates that it has not. At this point the EXIT flag is 0 and accordingly operation loops back to JOIN3 of the PARSER program and the operation from there on is repeated where the L0ET address pointer 224 for the event "E" is stored into the next sequential location in ESTAK. This same operation is repeated for the request events TTER, building up the L0ET pointers depicted for ESTAK in Table 60D.

Finally during PA6 the ending delimiter b̸ is obtained and hence during the subsequent entry to PA8 is detected, causing PA11 of the flow to be entered. During PA11 the EXIT flag is set to 1 and subsequently detected during PA13, causing PA14 of the PARSER program flow to be entered.

At this point in the operation the main memory locations and pointers in the system are as generally depicted in Table 60D. Thus ESTAK contains the L0ET pointers for the data base events BETTER, software register RLN0 contains the value 6 identifying the number of L0ET pointers in ESTAK and the PNBOUT is still null. Further, the input string pointer R4 is pointing at the ending delimiter b̸ of the request.

During PA14 of the PARSER program flow, the PIPE program is called. To be explained in more detail hereinafter, the PIPE program performs the piping function and forms results which are passed to the BRIGHT program. After the operation of the PIPE program has completed, the main memory and P/B MEMORY areas contain the information depicted at Table 60E.

The BRSW switch is set by the PIPE program if inexact retrieval is to be performed (i.e., if BRIGHT is to be scheduled). For the example being described, BRSW switch is now 1, indicating that the BRIGHT program is to be called to perform the brightness function. Accordingly PA17 of the flow is entered where the BRIGHT program is called. To be explained in more detail, the BRIGHT program calls the operation of the hardware BRIGHTNESS MODULE and generates a list of two value pairs in PNBOUT of the main memory. The first of each pair is an entry number (E) and the second is a brightness value (BV) corresponding to the entry number. Also to be explained in more detail, the two value pairs are ordered in the order of brightness value with the best or highest brightness value being given first. In the example being described, PNBOUT only contains a single entry since only one entry in layer 0 has met the brightness cutoff (BVCO) criteria. The address of area PNBOUT is contained in the first of a two word area called PNBPTR. The second of the two word area is referred to as PNBCNT and contains a value identifying the number of entries stored in PNBOUT during the BRIGHT program operation.

If the BRIGHT program is not to be called, BRSW will be 0 during PA15. This will occur when an exact hit has been found on layer 0 in a request string pertaining to layer 1. BRIGHT need not be called if an exact hit is found on layer 0 and the response is to be made from layer 1. This is so since only the "best" hit on layer 1 is taken as an event on layer 1 and it is known that one can do no better than an exact hit. When BRSW is 0 during PA15, PA16 is entered where the top of stack pointer for ESTAK, R3, is adjusted to point to the top of stack entry prior to the last entry processed. If BRIGHT is not called, the entires must be removed from ESTAK. In the particular example, the pointer R3 will be adjusted past the pointer to the seed header for the first event in the request "BETTER".

Continuing with the example, consider the operation during PA18. During PA18 the ESCAPE flag is found to be 1 and accordingly PA23 is entered where the context of the machine is returned to that existing when the PARSER program was called and the operation of the PARSER program is exited leaving the main memory area in the condition depicted in Table 60F. ESCAPE is set in PA4 if this is a word request. It is set in PA12 if this is a sentence request.

If during PA18 the ESCAPE flag has not been set to 1 and is therefore 0, it would indicate that entries in data base layer 0 were found that passed the brightness cutoff (BVCO) criteria but that a sentence layer 1 request had been made by the requestor. If this occurs an L1ET address pointer for the "best" event seed header is placed in ESTAK and the request length software register for layer 1 (RLN1) is incremented during PA19 through PA22. Control then returns to JOIN2 where the operation repeats.

If the response is to be from layer 1 the system checks word-by-word for the "best" events on layer 1. These events are the result of PIPE/BRIGHT on layer 0. Once all of the words in the request have been processed, there are a series of "best" words on layer 1. These are used to locate the best sentence request.

Figure 82:
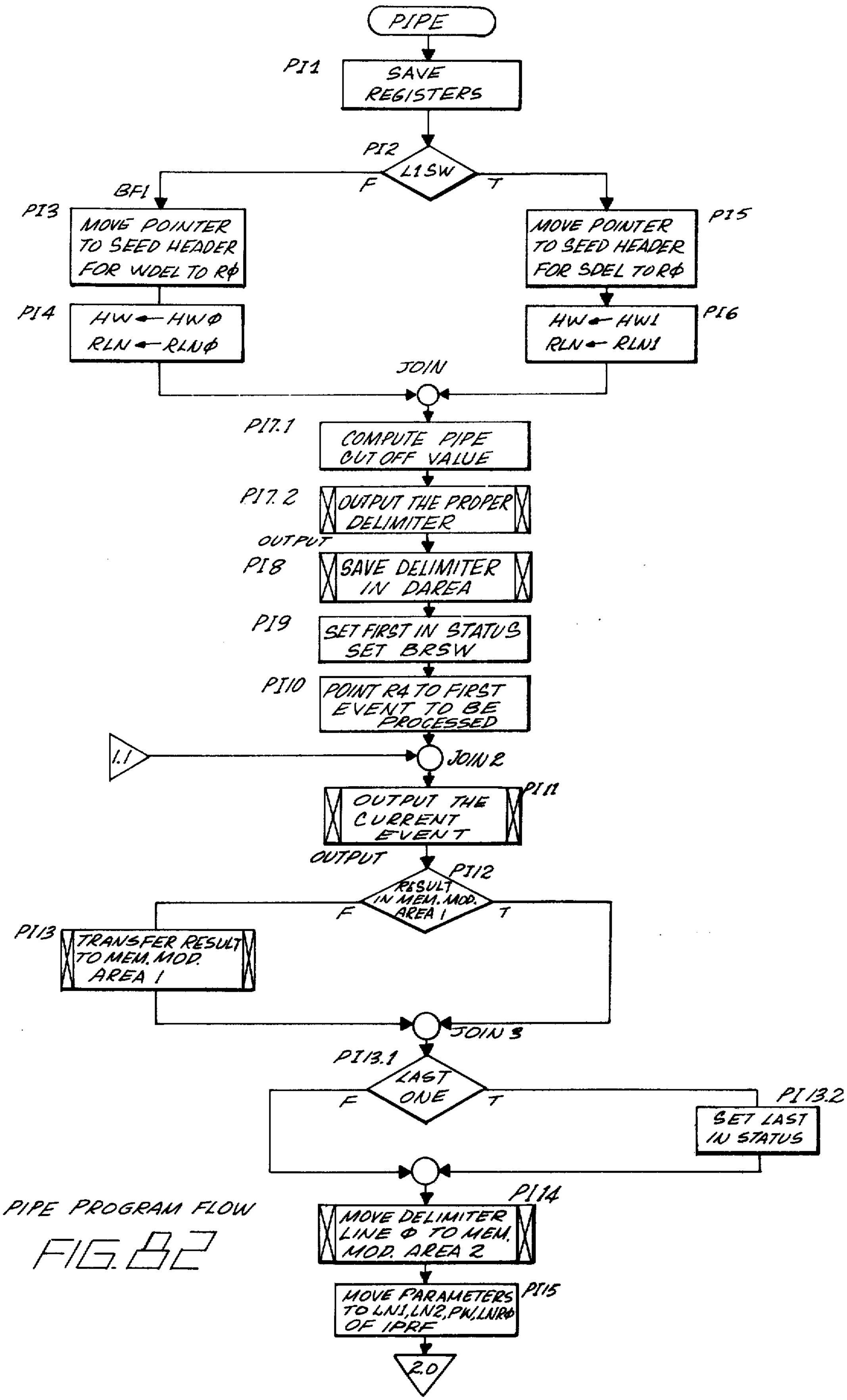

With the general operation of the PARSER program in mind, consider the operation of the PIPE PROGRAM making reference to the PIPE program flow of FIG. 82. The purpose of the PIPE program is to examine the proper layer in the data base to find candidates for a response to a request out of the data base. If an exact hit is found on layer 0, i.e., the request matches exactly an entry on layer 0, but a layer 1 request has been made, there is no need for the BRIGHT program to be called. The "best" response has already been found. With these general comments in mind, consider in more detail the operation of the PIPE program.

The configuration of the main memory prior to calling of the PIPE program is depicted in Table 60D for the example under discussion. The PIPE program begins during PI1 by saving the context of the registers in the MINI COMPUTER. At PI2 a check is made of the status of the layer 1 switch L1SW which will be set at PA12 of the PARSER program if an ending sentence delimiter has been detected, thereby indicating a layer 1 request is being processed. In the example under consideration a layer 0 request is being processed and accordingly L1SW is 0 and therefore control goes from PI2 to PI3 of the PIPE program flow. During PI3 and PI4 of the flow, the address pointer 200 to the seed header for the layer 0 delimiter is obtained and stored into register R0; the iso-entropicgram width value 32 of data base layer 0 is obtained and stored in storage area HW of main memory and the request length software register RLN is set to 6 which is the request length of layer 0 (RLN0).

It should be noted at this juncture that the operation at PI5 and PI6 is similar to that during PI3 and PI4 except that the corresponding information is stored for layer 1.

At PI7 the OUTPUT subroutine is called causing the seed line of the delimiter to be revolved back to its input line 0 and the resultant line 0 is stored into one of the three areas of the MEMORY MODULE. In the example given, the delimiter seed line is already at its input line 0 and accordingly the hybrid coded value representing the occurrence values 30, 25, 21, 15, 10, 8, 5, 0 are stored into one of the MEMORY MODULE areas. The area in which the line 0 of the delimiter is stored is identified by register OAR in the OUTPUT MODULE. During PI8 the delimiter line 0 is transferred from the MEMORY MODULE into main memory area DAREA. During PI9 the FIRST bit in the STATUS register of the DPM INTERFACE MODULE is set to 0 which will subsequently cause the hardware PIPE MODULE to initialize itself upon first call. During PI10 the MINI COMPUTER register R4 is set so that it points to the end of ESTAK which contains the L0ET pointer address 236 for the event "B". Register R4 will act as a pointer during processing of ESTAK moving from L0ET 236 ("B") to L0ET 240 ("R"). The top of stack pointer R3 will remain unchanged. The condition of ESTAK and the R4 pointers is depicted at Table 60G.

JOIN2 and PI11 are entered where the OUTPUT subroutine is again called this time causing the non delimiter seed line for the event identified by the pointer R4 (see Table 60G) to be revolved back to its line 0 and stored into one of the three MEMORY MODULE areas. Since each of the seed lines in the example is already at line 0, the line is unchanged. In the example, R4 is now pointing to the L0ET pointer 236 for event "B" and accordingly the MEMORY MODULE now contains the event occurrence vector for 26 in hybrid code.

During PI12 a check is made to see if line 0 of the event now being processed (current event) is in MEMORY MODULE area 1 and if so, PI13.1 is entered. To be explained in more detail the MEMORY MODULE area will be identified by the value in main memory area WOAR. If line 0 for the current event is not in MEMORY MODULE area 1, control goes to PI13 where line 0 of the current event seed is transferred to main memory area WAREA and then to MEMORY MODULE area 1. If this is the last event to be processed, the LAST bit is set in the DPM INTERFACE STATUS register (13.2).

Continuing with the example, during PI14 line 0 of the delimiter is transferred to MEMORY MODULE area 2 so that it can be read and decoded by the DECODE II MODULE as described above. This is one of the steps in initializing the hardware PIPE MODULE.

During PI15 the IPRF of the DPM INTERFACE MODULE is initialized by storing the physical 1 of the current event "B" into LN1; by storing the physical length 8 of the delimiter into LN2; by storing the value 1 representing the pipe width into PW; and by storing the length of the request 6 into LNRQ.

During PI16 the operation of the PIPE MODULE is called. When the operation is complete, the condition is detected during PI17 and PI18 is entered. For the example being discussed, the content of the MEMORY MODULE areas and the P/B MEMORY, upon completion for the event "B", is as detected in Table 60H. Thus MEMORY MODULE area 1 contains the biased occurrence value 26 and area 2 contains the occurrence value of the delimiter for layer 0, whereas the P/B MEMORY area 2 contains in sequence a biased occurrence value 26, a number of hits value 1 (for biased occurrence value 26), and an end of field marker −1. During PI18 the ESTAK pointer R4 is adjusted so that it points to the next to last L0ET as depicted in Table 60I. The "E" event on layer 0 of the data base is about to be processed.

During PI21 a check is made to determine if there are more entries in ESTAK to be processed, by comparing the top of ESTAK pointer R3 with the pointer R4. If they are equal, no more entries are to be processed and PI22 is subsequently entered. In the example they are unequal, as more entries are to be processed, and accordingly the false exit is taken back to JOIN 2 and PI11 of the flow. The loop from PI11 through PI21 is repeated for the event "E" in layer 0 of the data base. Upon completion, the content of the main memory and P/B MEMORY area 1 are as depicted in Table 60I. Thus the P/B MEMORY area 1 contains biased occurrence values 26, 23 and 11 each followed by its corresponding hit count. Additionally the ESTAK pointer R4 is adjusted to the L0ET pointer 224 for the event "T" and since this is not the last event, operation loops back to JOIN 2 and PI11 through PI21. This looping operation is repeated until each event in ESTAK has been processed. When during PI13.1 the last event in ESTAK is detected, PI13.2 is entered where the LAST flip flop in the STATUS register is set to 1. Subsequently during PI21 no more entries are detected and PI22 is entered. At this point the main memory and the MEMORY MODULE area 3 are as depicted in Table 60J.

As indicated in Table 60J there are seven entries in layer 0. MEMORY MODULE area 3 will contain a center pipe value for each entry which contains a hit along with an indication of the number of hits at the corresponding center pipe. For those entries in layer 0 which do not contain a hit, the center pipe value is replaced by −1 so indicating. Thus, with reference to Table 60J, center pipe hit values were found at center pipe 26 for entry 7, center pipe 21 for entry 6, center pipe 12 for entry 4, whereas the remaining entries do not contain hits for the request word "BETTER". Additionally the ESTAK pointer R4 now points to the address which is one above that of the first L0EPT pointer in ESTAK. If the number of hits value following the center pipe value is −1, it indicates that the request has been found exactly in layer 0 of the data base. This condition is not found in the example.

During the remainder of operation of the PIPE program a discrimination function will be applied to the information developed by the PIPE MODULE. To this end the possible responses which pass the piping cutoff value PCO will be formed and sent to the BRIGHTNESS MODULE.

During PI22 et seq. of the PIPE program, if a number of hits value (NH) is found which is negative, indicating that an exact match is found between the request and an entry in the data base, and a layer 1 request has been made, it is unnecessary to perform brightness since an exact match has been found. Consider this and other operations during the PIPE program operation that follows.

At PI22 the PNBPTR register is set so that the PNBOUT list is null or 0, and the MINI COMPUTER registers A2AD and M3AD, which are address pointers to the P/B MEMORY and MEMORY MODULE area 3 in the DPM system, are initialized to 0. In addition the value 8 representing the number of occurrence values in line 0 of the delimiter seed line is stored into register NOC and decremented by 1 so that it can be used as a pointer to the entries on layer 0 and hence to events on the next higher layer 1. Thus NOC now contains a pointer to the 7th entry in layer 0 and hence the 7th event on layer 1 which is for the word "BEST". Further, the BRCNT pointer is initialized to 0 so that it can be used to count the number of entries which subsequently need to be processed by the BRIGHT program.

Subsequently, JOIN 5 and PI23 are entered and the first center pipe value 26, the number of hits value 4 are read from MEMORY MODULE area 3 and stored into software registers OV and NH. During PI24 it was found that the center pipe value 24 is greater than 0 and therefore control goes to PI25. During PI25 the number of hits value is found to be greater than 0 and accordingly PI29 is entered. During PI29 the number of hits value 4 is compared with the pipe cutoff value of 3 and is found to be greater. Therefore PI30 is entered where the center pipe value 26 is stored into P/B MEMORY area 1. This occurs because the number of hits value 4 is greater than the pipe cutoff value 3, indicating that the word "BEST" in the data base is a possible candidate for a response to the request and therefore must be processed by the BRIGHT program.

Backing up to PI25 momentarily, if the number of hits value NH is negative (less than 0), indicating an exact hit, PI26 is entered where the ESCAPE flag is checked. If ESCAPE is 1, indicating that a response is expected from the layer currently being processed, all responses, exact and inexact, which are above the brightness cutoff value BVCO and are not being processed, are to be returned to the requestor. Thus PI28 is entered where the center pipe value (OV) is written to the P/B MEMORY and the BRCNT software register is incremented by 1 to keep track of the number of values stored into the P/B MEMORY. If the ESCAPE flag is 0, thereby indicating the response is expected from the next higher layer 1, it is unnecessary to call the BRIGHT program because the corresponding part of the request has been found exactly. If the response is from the next layer, all that is required from this layer is the "best" hit. An exact hit is the "best" hit.

Thus during PI28 and PI30, center pipe values are written into the P/B MEMORY which, as will be described, are passed to the BRIGHT program for processing. Subsequently, JOIN 9 and PI31 of the flow are entered. During PI31 the entry counter NOC is decremented from 7 to 6 to cause the next lower numbered entry "THE" on layer 0 to be processed. During PI32 the state of the entry counter NOC is checked and since it is not 0, the operation loops back to JOIN 5 et seq., causing the entry "THE" to be processed in the manner discussed above. To this end the next two values are read from MEMORY MODULE area 3. Thus the center pipe value 21 and the number of hits value 2 are read (see Table 60J). At PI24 the center pipe value 21 is greater than 0 and therefore PI25 is entered. During PI29 the number of hits value 2 is less than the pipe cutoff value 3 and therefore control goes directly to JOIN 6, JOIN 8 and JOIN 9 to PI31, bypassing PI30. This action is taken since the word "THE" in the data base does not pass the piping cutoff value 3 and therefore the corresponding center pipe value 21 is not sent to the BRIGHT program for processing. During PI31 the entry counter NOC is decremented by 1 to 5, corresponding to the entry 5 on layer 0.

With reference to Table 60J it will be seen that entry 5 contains a center pipe −1 and a number of hits value 0, indicating that the current entry word "WHICH" now being processed has no letters in common with the request. Therefore during PI24 the negative center pipe value is noted and JOIN 9 is entered, bypassing PI25 through PI30. Therefore the PIPE program does not cause anything to be stored in the P/B MEMORY corresponding to entry 5.

The PIPE program continues in the loop of JOIN 2 through PI32 until every entry in the layer being processed has been checked. Upon completion the entry pointer NOC will be counted down to 0 for the example under consideration. When this occurs the main memory and the P/B MEMORY will be as depicted in Table 60K. Thus the P/B MEMORY will contain the center pipe values 26 and 12 and end of field marker −1. The center pipe 26 and 12 corresponding to the data base words "BEST" and "TEST" will be the only ones to be processed by the BRIGHT program.

Consider now the general operation of the BRIGHT program for the example. The BRIGHT program calls the operation of the BRIGHTNESS MODULE. The BRIGHTNESS MODULE computes the brightness value for each entry which has been passed to it by the PIPE program. Those entries whose brightness values are higher than the brightness cutoff value (BVCO) are placed in an ordered list in main memory called PNBOUT along with the corresponding brightness value (BV) and then are returned to the requestor. The main memory and P/B MEMORY area configurations of interest prior to the call on the BRIGHT program are depicted in Table 60K.

Figure 94:
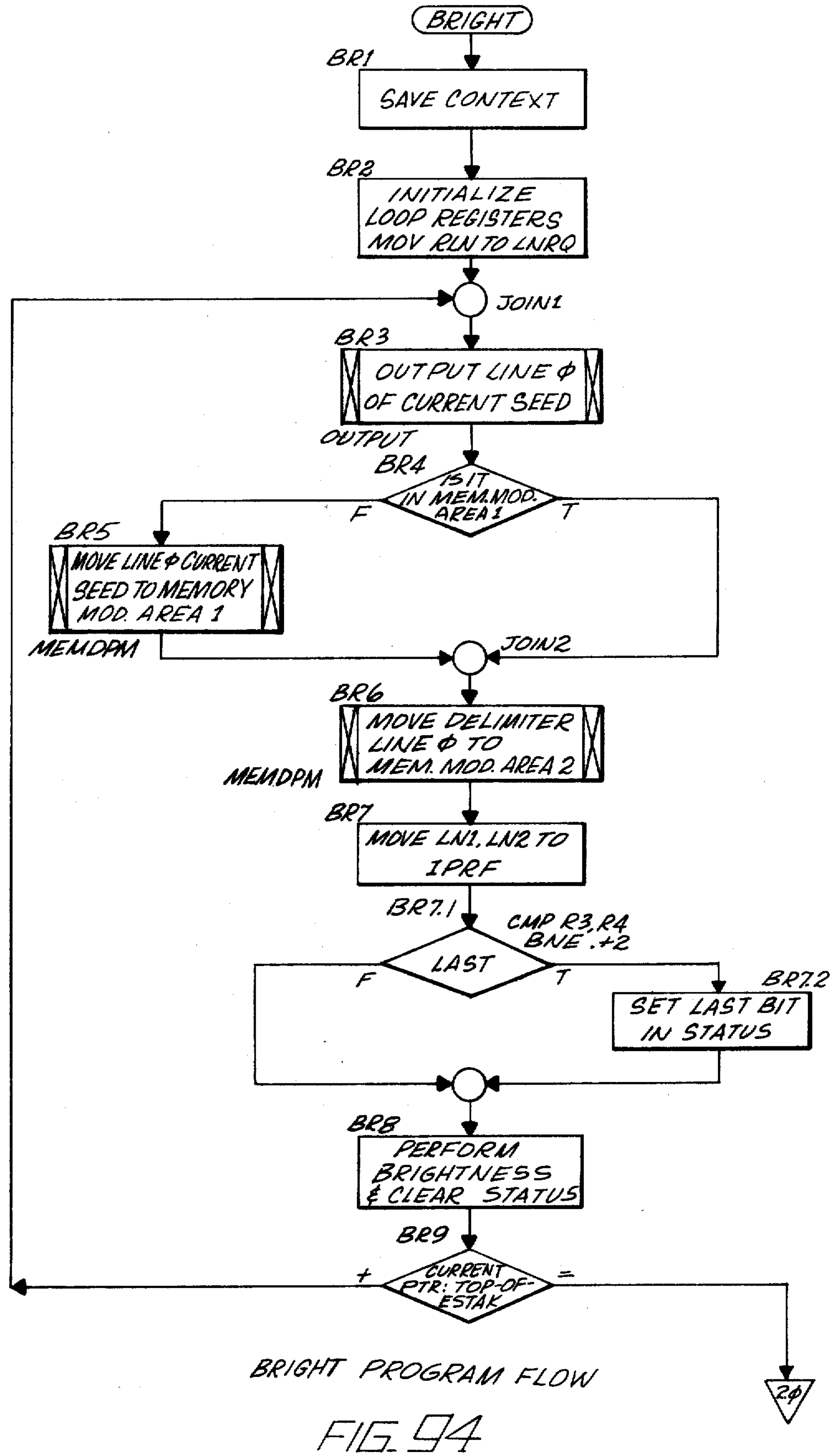
FIGS. 94–96 are BRIGHT program flow diagrams.

Consider now the operation of the BRIGHT program as depicted by the flow diagram of FIG. 94. During BR1 the context of the PARSER program is saved so that the PARSER program can be reentered following the BRIGHT program. During BR2, loop registers are initialized so that each event in the data base corresponding to the request will be processed. To this end the content of the software register RLN which contains the value 6, representing the number of entries 6 in the request, is stored into register LNRQ in the IPRF of the DPM INTERFACE MODULE. JOIN 1 and BR3 of the flow are entered where the software OUTPUT subroutine is called. The OUTPUT subroutine forms line 0 of the non delimiter event seed identified by the ESTAK pointer R4 (less 1). Initially the ESTAK pointer R4 identifies the L0EPT pointer 240 and hence when decreased by 1 identifies L0EPT pointer 224 corresponding to the event "B". Line 0 formed during BR3 will be referred to as the current seed.

Line 0 of the current seed then is formed by the OUTPUT subroutine in a MEMORY MODULE area. Thus, the MEMORY MODULE area will contain the occurrence value 26 corresponding to the event "B" on layer 0.

BR4 is entered where a check is made to make sure that the line 0 of the current seed has been stored into MEMORY MODULE area 1 and if it is not, BR5 is entered where it is transferred to area 1.

During BR6 the length of line 0 of the current seed for event "B" which is 1 is moved into LN1 of the IPRF in the DPM INTERFACE MODULE. Additionally, the value 8 representing the length of the word delimiter is moved to LN2 of the IPRF. Control then goes to BR7 where the line 0 of the word delimiter is moved to MEMORY MODULE area 2 from DAREA in main memory. During BR8 the hardware BRIGHTNESS MODULE is called for "B" entry 7. After the BRIGHTNESS MODULE completes its operation the P/B MEMORY area 2 contains the values indicated in Table 60L.

AT BR9 a check is made to determine if the operation is completed. If not, control returns to BR3.

To this end during BR9 the state of the ESTAK pointer R4 is compared with the top of stack pointer R3 and since all information in ESTAK has not yet been processed, they are unequal, causing control to return to JOIN 1. Similar to the description above for the event "B", the event "E" is processed during the repeat loop through JOIN 1 through BR9. Thus the line 0 representation of the seed line for event "E" is generated and stored in MEMORY MODULE area 1 during BR4 and BR5 and the length values 3 and 8 are moved into the IPRF during BR6. Line 0 of the delimiter is moved into MEMORY MODULE area 2 during BR7. During BR8 the BRIGHTNESS MODULE is again called causing the results depicted in Table 60M to be formed in the P/B MEMORY area 1. Since all entries in ESTAK have not been processed and R4 is not yet equal to the top of stack register R3, control again returns to JOIN 1. This operation continues with the loop being repeated until all entries in ESTAK have been processed. When all entries in ESTAK have been processed and the ESTAK pointer R4 is equal to the top of stack pointer R3, BR12 et seq. is entered. The contents of the P/B MEMORY area 3 are then as depicted in Table 60N. Thus the P/B MEMORY area 1 will contain delimiters 25 and 10 corresponding to the beginning delimiters for entries "BEST" and "TEST" in layer 0 of the data base. Following each beginning delimiter will be, in order, the number of hits for the corresponding entry (N), the δ(δ-min) value and $d_0$ value for the corresponding entry. The results of the hardware BRIGHTNESS MODULE now contained in the P/B MEMORY area 1 depicted in Table 60N are now used to compute a brightness value BV and to order the results of the brightness process.

The number of the entry corresponding to the first four brightness values in the P/B MEMORY area 1 is now determined. To this end during BR13 the event counter NOC is set to 7 indicating that the BRIGHT program is processing entry 7 on layer 0 corresponding to the entry "BEST". At BR14 the DECODE I MODULE is called causing it to load the ending delimiter occurrence valuve 30 into software register TD2. During BR15 the first four brightness values are read from P/B MEMORY area 1 and are stored into software registers in the MINI COMPUTER. These registers and the values now contained therein are as follows:

D1 = 25

N = 5

S = 5

DO = 28

During BR16 the beginning delimiter occurrence value (next in order) is read from line 0 of the delimiter seed and stored into software register TD1. At this juncture software register TD2 contains 30 and software register TD1 contains 25 and the length of the corresponding entry, entry 7, is now computed by taking the difference therebetween. The result, a value 4, is stored into the software register LS During BR17 the delimiter in register TD1 is compared to the beginning delimiter 25 stored in register D1 from the P/B MEMORY area 1 and found equal because they are for the same entry. Since they are equal, control goes to BR19 where the computer converts the values now stored in the software registers into floating point notation. During BR17 through BR22 the scatter value S depicted in equations 8 and 9 is computed as follows:

At BR20, V1 is computed:

$$V1 = (RLN-N)^{*} RLN + DO = (6\text{-}5)^{*}\ 6 + 28 = 34$$

BR21:

$$V2 = DO\text{-}S = 28\text{-}4 = 24$$

BR22:

$$V1 = V2/V1 = 24/34 = 0.706$$

Thus, following BR 22the scatter value S is as depicted at V1 above.

During BR23 the state of the LNGSW is checked. The length of the request is to taken into effect and since the LNGSW is 1, therefore the length factor L shown at equation 11 must be taken into account. Accordingly BR25 is entered where the DEL value corresponding to DELTA in equation 11 is found to be 2. With reference to equation 11 it will be seen that if the DELTA value is smaller than the length of request value LNRQ, the upper equation in equation 11 is to be used to determine the length factor L. Accordingly, BR27 is entered where the following computations take place:

$$L = 1 - (\alpha * (DEL/RLN))^3 = 1 - (0.63 * (2/6))^3 = 1 - (.2079)^3 = .991$$

Control then goes through JOIN 6 and JOIN 27 to BR29 where the final brightness value BV is determined as follows:

| | |
|---|---|
| BV | = L * VI |
| | = .706 * .991 |
| | = .699 |

The brightness cutoff value BVCO was set to 0.50 by the requestor. During BR30 the brightness value BV computed during BR29 is compared against the brightness value cutoff value BVCO and since the former is larger, the entry now being processed passes the brightness cutoff value. Therefore, BR31 is entered where the value 7 corresponding to the current entry (NOC = 7) is stored into main memory area PNBOUT followed by the brightness value 0.699. During BR32, BRCNT which identifies the number of entries in the P/B MEMORY area 1, is reduced from 1 to 0. Since BRCNT is 0 and not less than 0, control returns through 2.1 to JOIN 4 and the loop back through BR32 where the next four brightness values for beginning delimiter 10 are processed from P/B MEMORY area 1 in the manner described above. The brightness value BV for the entry corresponding to the beginning delimiter 10 in Table 60N is 0.4620. Hence during BR30 it is found that this value is less than the brightness value cutoff value BVCO and therefore BR31 is skipped, BR32 and BR33 entered directly. Thus an entry value corresponding to the beginning delimiter 10 (see Table 60M) is not stored into PNBOUT because its brightness value does not pass the brightness cutoff value originally set by the requestor. When BR33 is subsequently entered it is found that it has now been reduced to less than 0 and therefore BR34 is entered and the operation of the BRIGHT program is exited. At this point the contents of main memory are as depicted at Table 600.

B. FORMATER PROGRAM

Figure 102C:
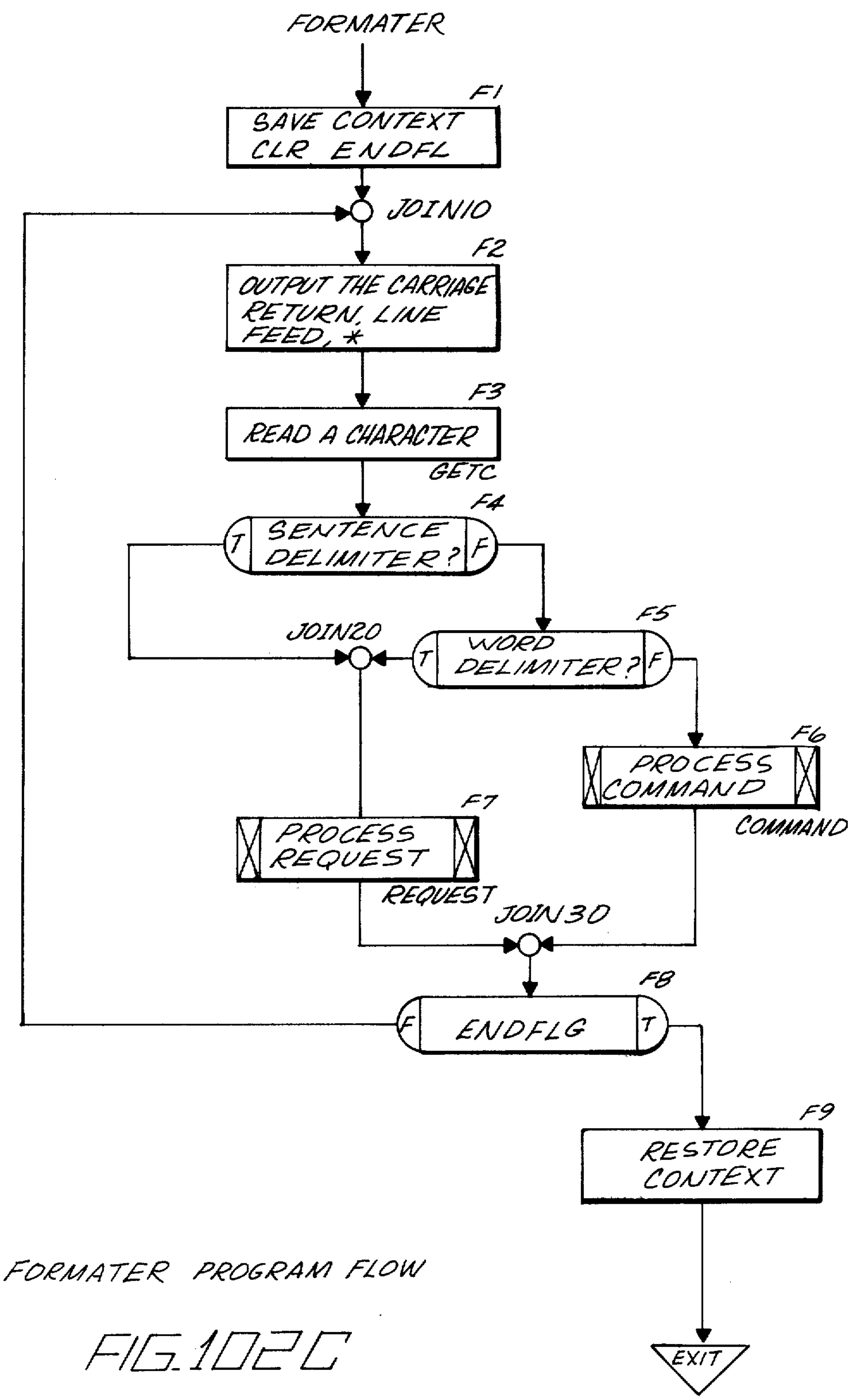
FIG. 102C is a FORMATER program flow diagram.

Appendix B-9 is a program listing for the FORMATER program. FIG. 102C is a flow diagram for the FORMATER program. The blocks of the flow diagram are identified by the symbols F1 to F9. The relationship between the flow diagram of FIG. 102C and Appendix B-9 is indicated in Appendix B-9 where, on the left hand side, the symbols F1 to F9 are shown alongside the corresponding listing.

Consider now the operation of the FORMATER program, with reference to the FORMATER program flow diagram of FIG. 102C. The Data Base program causes the FORMATER program to be called. First, F1 of the FORMATER program flow is entered where the context is saved similar to that described hereinabove and the software flat ENDFLG is cleared or reset to 0. Operation then passes through JOIN 10 to F2.

During F2 the FORMATER program calls the operation of the PRINTR subroutine which outputs to the printer a carriage return character, a line feed character, and an asterisk *. The carriage return causes the carriage to reset to the beginning of a line and the line feed causes the roller to set the paper to a new line. The asterisk is dislayed by the printer telling the requestor that the system is ready to accept the rest of the request (the blank is used simply to separate the asterisks from the requestor's request). CRLFA indicates to the PRINTR routine that it is a string of length four (CR)(LF)* (blank)

F3 is now entered and the requestor types the first request character at the operator console. During F3 the FORMATER program calls the operation of the GETC subroutine which in turn reads the character typed by the requestor at the typewriter.

During F4 a comparison is made to see whether the character just obtained from the typewriter is a sentence delimiter (#). If the comparison is false, i.e., the character is not a sentence delimiter, F5 is entered where the same character is compared to see if it is a word delimiter. If the comparison in F5 is false and therefore the character is not a word delimiter, F5 is entered. This sequence of steps through F4 and F5 indicates then that the character is not a sentence delimiter (#) nor a blank (ƀ) and therefore the request character identifies a commmand. To this end, F6 is entered.

During F6 the FORMATER program calls the operation of the COMMAND subroutine. The COMMAND subroutine determines whether a meaningful command is being presented or whether there is an error. Following F6, F8 is entered.

Return now to F4 and assume that the comparison was true, indicating a sentence delimiter (#) has been typed by the requestor. Under these conditions, JOIN 20 and F7 are entered.

During F7 the REQUEST subroutine is called. This occurs because, if the first character is a sentence delimiter (#), then the following characters which are to be typed by the requestor are the request characters. Note that if during F5 the comparison is true, and hence a word delimiter (ƀ) is detected, JOIN 20 and F7 are sequentially entered where again the characters entered on the typewriter following the word () delimiter are processed. Following F7, JOIN 20 and F8 are entered. During F8 a check is made to see whether the ENDFLG flag has not been set, i.e., the 0, indicating that the requestor has not been reached the end of his request. If ENDFLG is not set, it indicates that the user does not wish to end this session and therefore JOIN 10 and F2 are reentered and the operation continues as described above.

When the requestor reaches the end of his request he types aN "END" command. The END command causes the COMMAND subroutine (see F6) to set ENDFLG to a 1 state. When this occurs and the 1 state of the ENDFLG is detected during F8, F9 is entered where the context of the program is restored and the FORMATER program is exited.

C. PARSER PROGRAM

To be explained in more detail the REQUEST program forms coded signals in a main memory area PSTRING. The coded signals represent the request entered by the requestor on the typewriter and are in the form depicted in Table 60. The delimiters and # are in ASCII code. The letters in between delimiters have been converted to layer 0 event numbers depicted in Table 60B. PSTRING is processed by the PARSER program moving from the beginning delimiter to the end delimiter in PSTRING. The register R4 always contains the address of the layer 0 event in PSTRING which is to be processed by the PARSER.

The PARSER program converts the information in PSTRING to ESTAK. ESTAK is an area in main memory and the PARSER program stores a layer event pointer (LXET) (see FIGS. 77, 78A and 78B) in ESTAK for each of the non delimiter characters in PSTRING and also stores a value representing the number of LSETs in ESTAK into software register RLNO. The PIPE and BRIGHT programs are then called by the PARSER program causing PNBOUTto be formed. PNBOUT is depicted at 2211 for the layer 0 request of FIG. 102A and 2233 for the layer 1 request of FIG. 102B and contains a series of two value pairs, the first of which is an event number (E) and the second of which is a corresponding brightness value (BV). Only those two value pairs with a brightness value exceeding the brightness cutoff value (BVCO) are stored in PNBOUT.

Table 59 is a list of the hardware and software flags and registers and main memory areas used for the PARSER program.

Appendix B-1 is a program listing of the PARSER program. FIGS. 80 and 81 form a flow diagram of the PARSER program. The symbols PA1 through PA22 identify the boxes used in the flow diagram. The correspondence between the program listings and flow diagram is illustrated to the left in the program listings where the symbols for blocks of the PARSER PROGRAM flow are shown.

Figure 80:
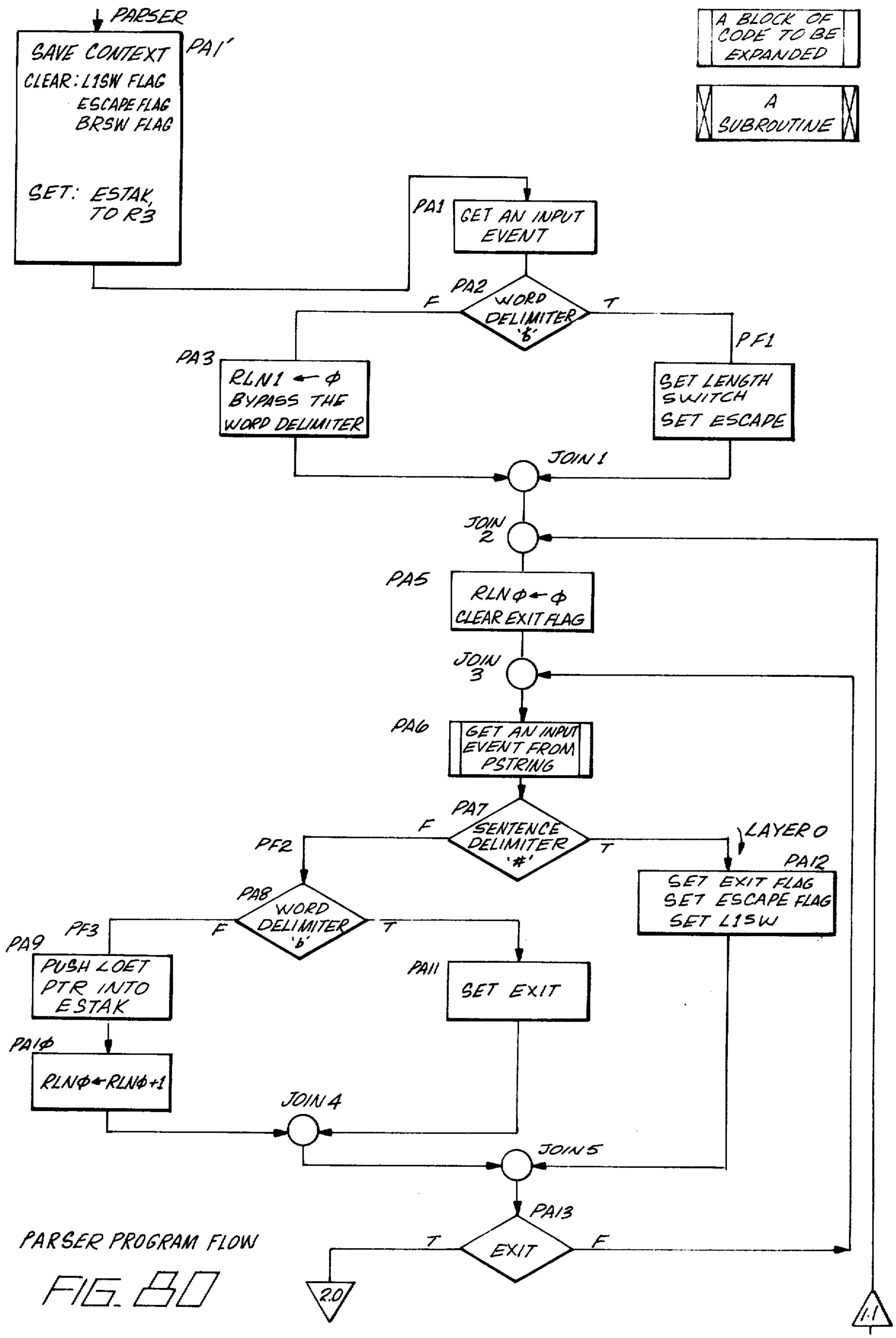
FIGS. 80 and 81 form a PARSER program flow diagram.
Figure 81:
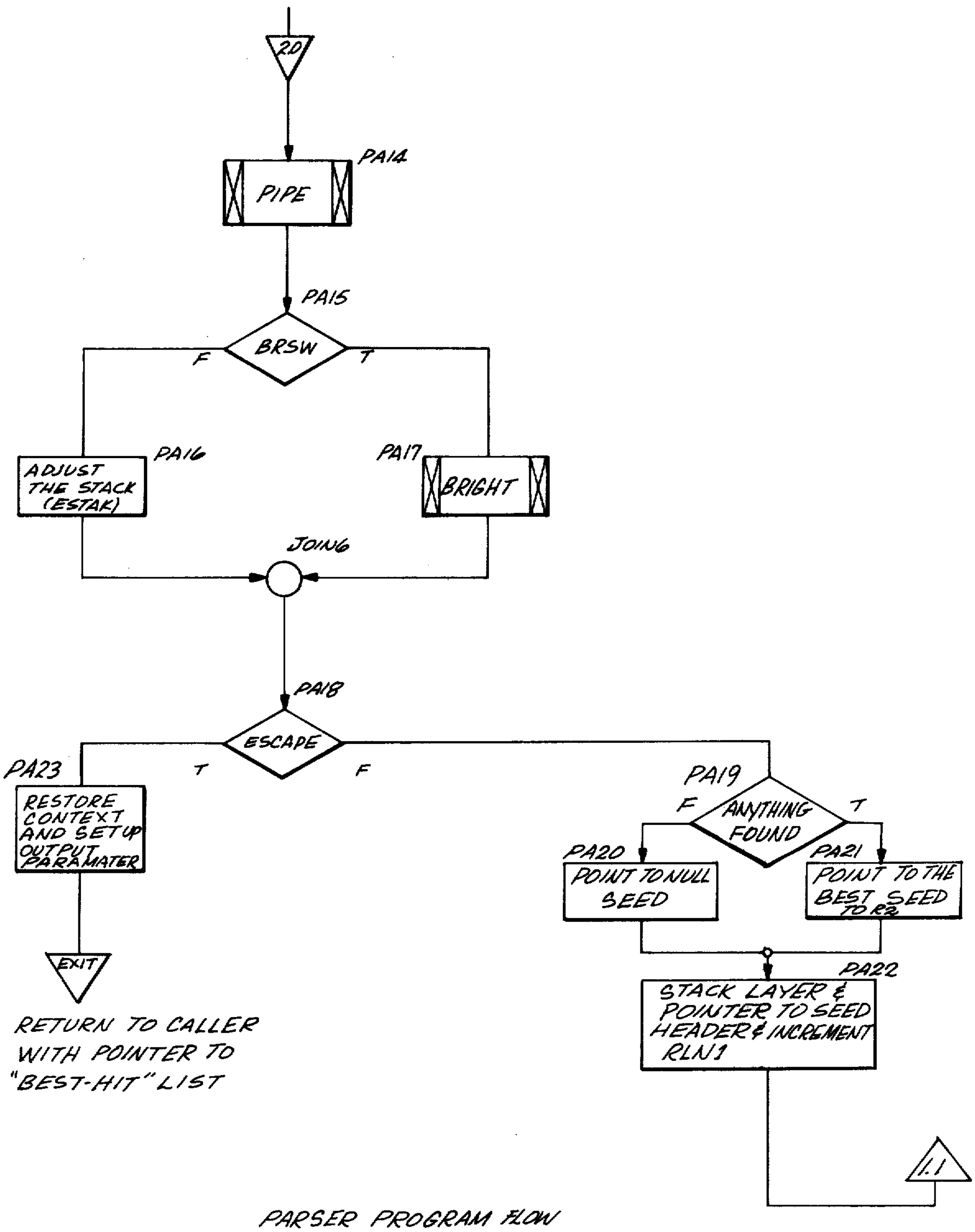

Consider now the organization of the PARSER program with reference to the flow diagram of FIGS. 80 and 81. Initially, the PARSER program is called by the REQUEST subroutine (see R27, FIG. 106) causing PA1' of the flow to be entered. During PA1' and the MOV instructions store the content of the hardware registers R0, R1, R2, R3 and R4 of the MINI COMPUTER Into reserved memory locations for future recall to these registers after the PARSER program operation completes. This is referred to at PA1' as SAVE CONTEXT. This enables the machine to return to the same place in the REQUEST from which the PARSER program was called. In addition, the software flags L1SW, ESCAPE, BRSW, are all reset to 0 as designated by the CLR instructions. Additionally, the MOV # ESTAK, R3 instruction causes the beginning address of ESTAK to be moved into hardware register R3.

During PA1, the MOV instruction causes the beginning delimiter of the request in PSTRING pointed to by the hardware register R4, to be placed in hardware register R2 and the address in register R4 is incremented one address to the address for the next request character in PSTRING.

During PA2, determination is made of whether the first request character in register R2 is a word delimiter ƀ. If so, PA4 of the flow is entered. If it is not a word delimiter , it must be a sentence delimiter #, and accordingly PA3 is entered. To this end, the CMP instruction causes the request character in register R2 to be compared with the ƀ value in software register WDEL and the instruction BEQ causes a branch on equal to PF1 of the PARSER program listing, which causes PA4 of the flow to be entered.

If a word delimiter, ƀ, is detected this means a word, layer 0, request is being made. If a sentence delimiter, #, is detected, this means a sentence, layer 1, request is being made.

Assume a sentence delimiter # is detected during PA2 and therefore PA3 is entered. This will occur when a sentence, layer 1, request is made. During PA3 the register RLN1 is reset to 0, responsive to the CLR instruction. Further the word delimiter ƀ, which always follows the sentence delimiter #, is bypassed, using the dummy instruction TST which in effect causes the request address counter to be counted up by 1, thereby skipping the word delimiter ƀ. Thus, the register R4 now contains the address of the first non delimiter character of the request in PSTRING. The branch instruction BR causes a branch to JOIN 1 of the PARSER program thereby causing JOIN 1, JOIN 2 and PA5 of the flow to be entered.

Returning to PA2, assume a word delimiter *b* is detected and therefore PA4 is entered following PA2. This will occur when a layer 0 or word request is made. Under these conditions the software length switch LNGSW is set to 1, to assure that the BRIGHT program will take the length of the request into effect when determining a brightness value. Specifically, setting the LNGSW to 1 will prohibit the BRIGHT program from retrieving words from the data base which contain the requested word as a part of a larger word. For example, "fundamental" contains the word "MEN" exactly and hence the brightness value for this word would be less than for the word "MEN" alone. To this end the first increment instruction INC causes the LNGSW flag to be set to 1. In addition, the second INC instruction causes the ESCAPE flag to be set to 1 to assure that an exit will be taken from the PARSER flow after one word has been retrieved from the request, as there is only one word in a word layer 0 request.

Note that JOIN 1 occurs immediately following PA4. During PA5, the CLR instruction causes the RLNO register to be reset to 0 thereby initializing it to its initial state. The CLR exit causes the loop flag to be reset to 0, i.e., closed. Following PA5, JOIN 3 and PA6 of the flow are sequentially entered.

During PA6 the MOV instruction causes the next layer 0 event number of the request in PSTRING specified by register R4 to be stored into hardware register R2 and the address in register R4 is incremented to the address of the next layer 0 event number in PSTRING. PA6 is next entered.

During PA7, a check is made to determine whether a sentence delimiter # is now contained in register R2. To this end the CMP instruction compares the value in register R2 with the sentence delimiter contained in software register SDEL and the "branch on not equal" instruction BNE causes a branch to PF2 of the PARSER program and hence PA8 of the flow, if not equal condition is detected. Otherwise PA12 of the flow is entered.

During PA8, since during PA7 a sentence delimiter # was not found, the value in register R2 is either a word delimiter , or one of the non delimiter layer 0 event numbers of the request. PA8 determines which is stored in register R2. To this end, the CMP instruction compares the value in register R2 with the word delimiter stored in software register WDEL and the BNE instruction causes a branch to PF3 of the PARSER program if a "not equal" condition is detected, whereas PA11 of the flow is entered if an equal condition is detected.

PA9 of the flow is entered if the current value in hardware register R2 is not a sentence delimiter # or a word delimiter (see PA7 and PA8). Hence, during PA9 the value in register R2 represents a non delimiter character of the request. The layer 0 event number in R2 is a base relative address pointer for the layer 0 event pointer table LOET (See FIG. 78). Hence the base relative address pointer in register R2 is added to the base address LOET to form an address in the layer 0 event pointer table LOET which contains the address pointer to the corresponding seed header. The address of the seed header is then placed in the first memory location of ESTAK whose address is specified by the hardware register R3. The value stored in ESTAK is later used by the PIPE and BRIGHT programs. To this end, during PA9 the move instructon MOV LOET (R2) ,-(R3) causes the MINI COMPUTER to subtract 1 from the ESTAK address in register R3 and then causes the value of the character in register R2 to be added to the base address LOET to form a address in the layer 0 event pointer table LOET from which the address of the corresponding seed header is obtained and stored in the memory location specified by the address in hardware register R3. Thus the first location in ESTAK now contains the address pointer for the base of the event seed header, which event corresponds to the first nondelimiter character of the request.

During PA10 the increment instruction INC causes the software register RLNO to be incremented by 1 to reflect the fact that one value is now stored in ESTAK.

JOIN 4, JOIN 5 and PA13 of the flow are now sequentially entered.

Return now to PA8 and assume that the value in R2 is a word delimiter ƀ. This will be an ending delimiter. PA11 of the flow is now entered. During PA11 the INC instruction causes the EXIT flag to be set to 1 and the JMP instruction causes a jump to JOIN 4 of the PARSER program. EXIT being set to a 1 state indicates that the PARSER program is about to call on the PIPE and BRIGHT programs to process the content of ESTAK.

Return now to PA7 and assume that the value in R2 is a sentence delimiter # indicating the end of a sentence layer 1 request. Under these conditions PA12 is entered where the EXIT flag is set to 1 to indicate that all non layer 0 event numbers in PSTRING have been converted to seed header address pointers and have been stored in ESTAK. The ESCAPE software flag is also set to 1 to indicate that all of the events on layer 0 have been processed through PA14-PA19. If the sentence delimiter is found, this means that all the words in the request have been processed through layer 0. Additionally the layer 1 decision switch L1SW is set to a 1 state which will subsequently cause the proper parameters to be moved into work registers when the PIPE program is called.

Following PA12, JOIN 5 and PA13 of the flow are sequentially entered.

During PA13, the software flag EXIT is checked to determine whether it has been set to 1 or is at 0. To this end, the test instruction TST checks the EXIT flag and a branch on non equal instruction BNE causes a branchto PA14 of the PARSER program if the EXIT flag is 1, whereas the JMP instruction causes a jump back to JOIN 3 if the EXIT flag is 0. Thus, PA14 of the flow is entered if the EXIT flag is 1. indicating that a complete request on layer 0 has been found and JOIN 3 is entered if the EXIT flag is 0, indicating that there are still more events in this request.

During PA14, the PIPE program is called by the PARSER program causing it to perform its piping function on the events specified by the seed header address pointers contained in ESTAK. To this end the JSR R5, PIPE instruction calls the PIPE program subroutine. The operation of the PIPE program and the related PIPE hardware operation is discussed subsequently.

Following PA14, PA15 is entered where the BRSW software switch is checked to determine if it is in a 1 state, indicating that the BRIGHTNESS MODULE is now to be called, or whether it is in a 0 state, indicating that the brightness operation is to be skipped. Note that BRSW is reset to 0 by the PIPE program during PI27 to indicate if a call on BRIGHT is not necessary. To this end, the test instruction TST checks the BRSW to see if it is 1. and if not, the instruction BEQ PA16 causes PA16 of the flow to be entered, whereas, if the BRSW switch is 1, PA17 of the flow is entered.

RLN is a work register which is filled in the PIPE program is (PI4, PI6). It contains the length of the current entry whether it be for layer 0 or layer 1. PA16 of the flow is entered when the BRSW switch is 0 and the "best hit" is already in the software list PNBOUT. The events for the current entry are "popped" from the stack, ESTAK. This operation is effected by the ADD RLN, R3 instruction which causes the number of events in this entry to be added to R3 which effectively erases them from ESTAK.

Following PA16, JOIN 6 and PA18 of the flow are sequentially entered.

Return now and assume that PA17 of the flow is entered. During PA17 the JSR R5, BRIGHT instruction calls the BRIGHT program. The branch instruction BR causes JOIN 6 of the PARSER program to be entered following the end of the BRIGHT program.

The BRIGHT program forms the information in PNBOUT depicted at 2213 of FIG. 102A for a word layer 0 request and depicted at 2233 of FIG. 102B for a sentence layer 1 request. Therefore when PA18 is entered and ESCAPE is 1, PNBOUT contains a series of two value pairs the first of which is an event number (E) and the second is a brightness value (BV). Only those events whose brightness values exceed the brightness cutoff value (BVCO) appear in PNBOUT.

During PA18 a test is made on the ESCAPE flag. To this end, the test instruction TST checks to determine whether the ESCAPE flag is a 1 or 0. If the ESCAPE flag is a 1, the result of the test is true and PA23 of the flow is entered. The ESCAPE flag will be set to a 1 in PA12 when an ending sentence delimiter has previously been detected in PA12, or when a layer 0 request has been made (in PA4). When this occurs the brightness value has been computed for the layer of the request. Thus if a layer 0 request, the brightness value will be on a layer 0 and if a layer 1 request, the brightness value will be on layer 1.

PA23 causes the context of the MINI COMPUTER to be restored to the REQUEST program and causes a set up of the output parameters. To this end the MOV instruction, associated with registers R0 through R4. causes the content of these registers, which was saved during PA1', to be restored to the same registers. The MOV #PNBTR,R0 instruction causes the beginning address of the two word memory area PNBTR to be stored into register R0. Subsequently the PARSER program exits.

Return to PA18 and assume that the branch on not equal instruction BNE detected that the ESCAPE flag is 0 and hence the test TST detected a false condition. Under these conditions PA19 -PA22 of the flow is entered. PA19 checks PNBCNT to see if it contains a non 0 value and hence whether an entry was computed above the brightness cutoff value (BVCO). If none was found, control goes to PA20 where an event number for the null seed is stored in R2. This is done since an entry was not found which corresponds closely to anything in the data base. However, to maintain the relative positions of the events in the request a null seed event number is entered into the request. If, however, a "best" entry has been found the event number is moved from PNBTR to R2 at PA21. At PA22 such event number (layer 0 entry number of layer 1 event number) is used to locate the corresponding layer 1 event header address from L1ET which is stacked on ESTAK. The length of the layer 1 request (RLN1) is incremented and control returns to JOIN3.

D. PIPE PROGRAM

At the time the PIPE program is called, ESTAK in main memory contains a layer event pointer (LXET, see FIG. 77) for each non delimiter character in the entry. Each LXET pointer is a base address to the corresponding seed header. The LXET pointers are arranged in the same order as the request was presented. In addition the software register RLN0 and RLN1 contains a value identifying the number of LXET pointers contained in ESTAK.

It will be recalled that the PIPE program is called at PA14 (see FIG. 81) of the PARSER program. Briefly, the PIPE program forms a two value pair in MEMORY MODULE area 3for each entry in the layer of the data base at which the request is made. With reference to final output for the hardware PIPE MODULE in Table 11 and Table 60J it will be seen that the two value pairs are (1) *vi* — a center pipe value or a minus if there are no hits in the entry, and (2) *vii* — the number of hits in the pipe or a minus if the request has been found to be present exactly.

When the requestor composes his request he not only types in the beginning and ending delimiters along with the non delimiter characters as depicted in Table 60, but in addition enters commands which set the pipe width value (PW), pipe cutoff value (PCO), and the brightness cutoff value (BVCO) used by the PIPE and BRIGHTNESS MODULES as described above. The pipe width (PW) is the one used by the PIPE MODULE in determining the number of hits within each pipe. The pipe cutoff value (PCO) is used by the PIPE program to determine those center pipes and hence entries which have hit counts meeting the criteria specified by the pipe cutoff value (PCO). In other words the PIPE program selects those data base entries which have hit counts which are equal to or greater than the pipe cutoff value (PCO) selected by the requestor. The center pipe values which have hit count values equal to or exceeding the pipe cutoff valve (PCO) are stored in the P/B MEMORY for future processing by the BRIGHT program.

The assembly language listing of the PIPE program is set forth in Appendix B-2. To aid in the understanding of the overall operation of the PIPE program, Table 61 includes a list of the hardware and software flags, registers and memory areas used for the PIPE program.

Figure 84:
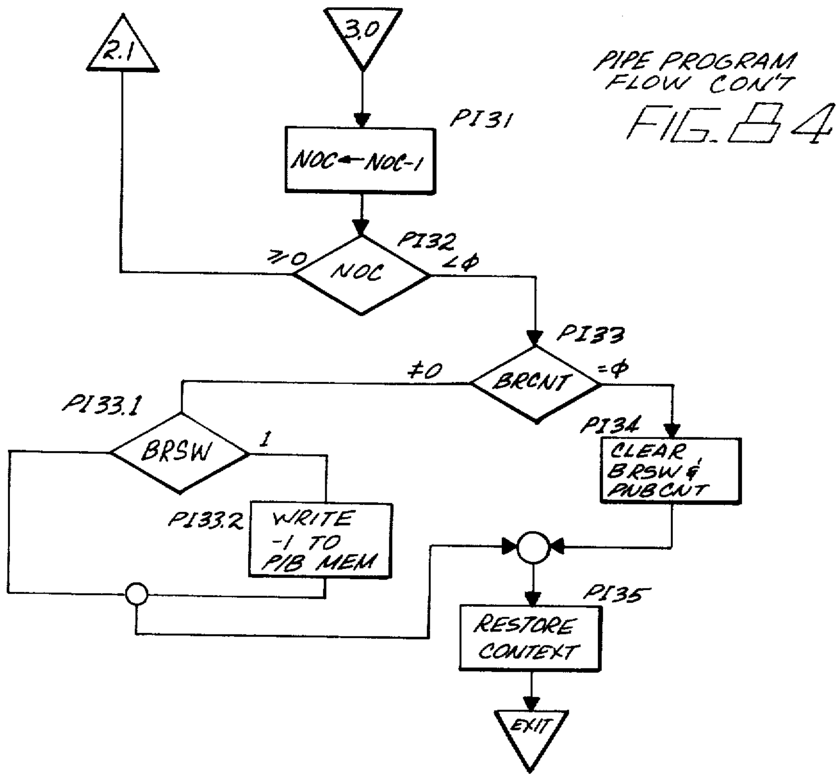
Figure 85:
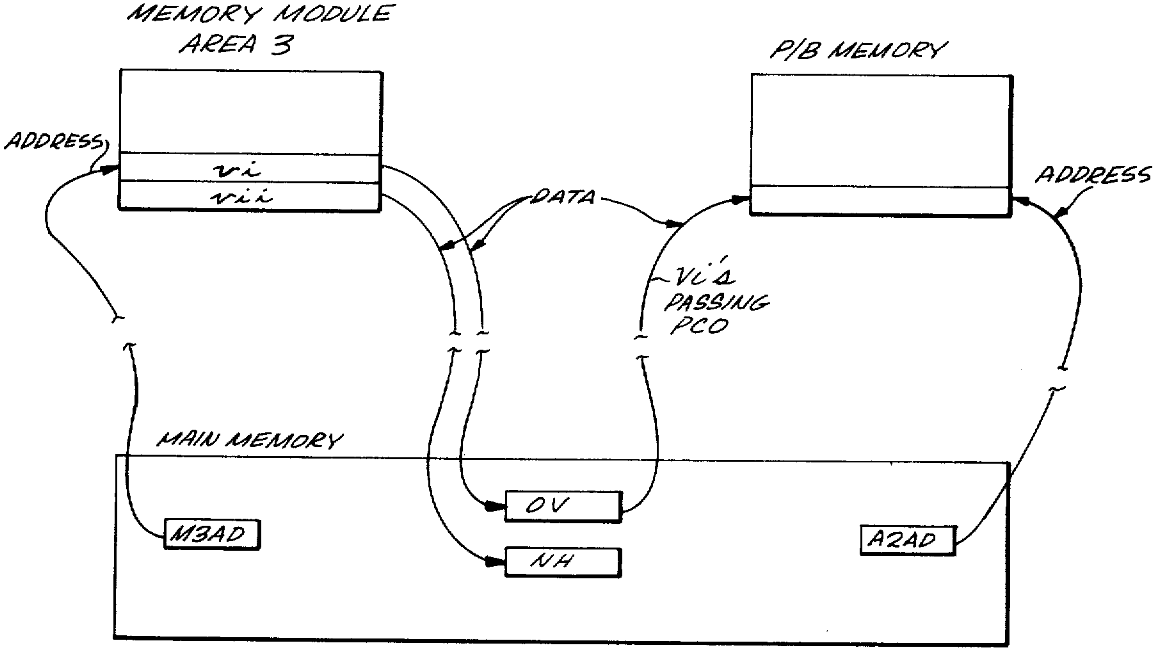
FIG. 85 is a sketch illustrating the address linkage during PI22 et seq. of the PIPE program.

Consider now the details of the PIPE program flow as set forth in FIGS. 82–84. FIGS. 82–84 contain a flow diagram for the PIPE program using symbols PI1–PI35 to identify the various flow blocks. Labels for the PIPE flow diagram are shown at the left hand side of the PIPE program listing to show the relationship therebetween.

The PIPE program is called during PA14 of the PARSER program flow (see FIG. 81). During PI1 of the PIPE program flow, the MOV instruction causes the context of the R0 to R4 registers to be saved so that they can be restored when the PIPE program exits back to the PARSER program.

During PI2, the state of the L1SW software flag is checked. If the L1SW flag is in a 0 state it indicates that the request on layer 0 is being processed and accordingly PI3 and PI4 are entered, whereas if the L1SW flag is in a 1 state it indicates that a layer 1 request is in process, and PI5 and PI6 are entered. L1SW is set during the PARSER program PA12 when the ending sentence delimiter is sensed.

The general purpose of PI3 through PI6 is to load the hardware and software registers R0, LPTR, HW and RLN with the values corresponding to the layer which will be processed during the rest of the operation of the PIPE program. To this end, if a layer 0 request is being processed and the L1SW flip flop is in a 0 state, PI3 is entered where the instruction MOV @ LOPTR,R0 causes the address located at the base of the layer 0 event table (address of base of delimiter seed header) to be stored in registerR0 and the instruction MOV LOPTR,LPTR causes the address LOET at LOPTR to be stored in software register LPTR. During PI14 the two MOV instructions cause the iso-entropicgram width valve (HW) contained in register HW0 to be stored into register HW and cause the value in RLN0 representing the number of LOET pointers, now contained in ESTAK, to be stored into software register RLN. The operation during PI5 and PI6 when a layer 1 request is processed causes the corresponding parameters for layer 1 to be loaded into registers RO, LPTR, HW, and RLN.

Following PI4 or PI6, JOIN1 is entered and a subsequent operation takes place using the initial parameters just loaded during PI3 and PI4, or PI5 and PI6.

Figure 86:
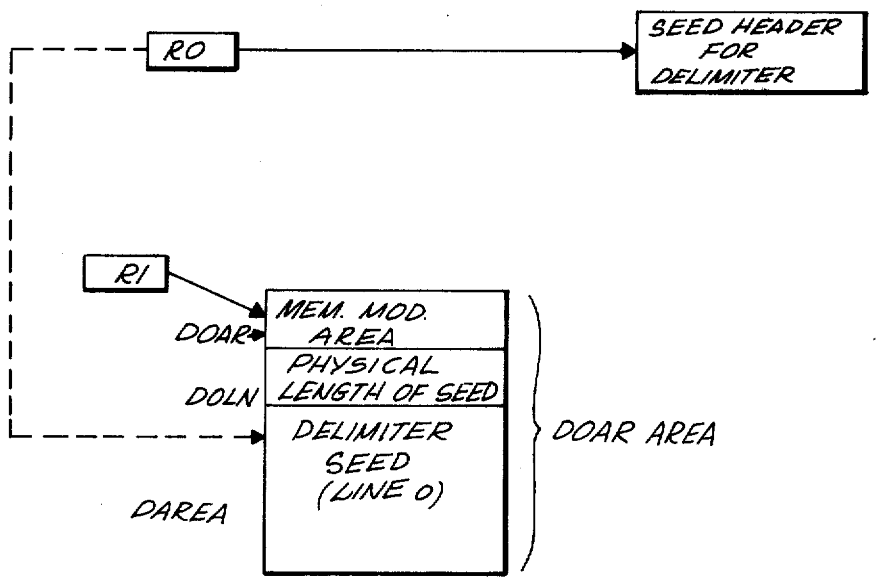
FIG. 86 is a sketch illustrating the address linkage during PI7 of the PIPE program.

During PI7, the PIPE program calls the operation of the OUTPUT program causing it to delimiter for the layer designated by the content of registers RO, LPTR, HWand RLN. The OUTPUT program revolves the delimiter from its seed line to line 0 of its iso-entropicgram. To this end the first MOV instruction causes the address DOAR (beginning of a memory area called DOAR) to be loaded into register R1. Referring to FIG. 86 the first word of memory area DOAR will store a number value identifying the MEMORY MODULE area which contains the outputted delimiter. The second word of DOAR will store a value identifying the physical length of the delimiter seed line in words. Note that register RO now contains the address of the base of the seed header for the delimiter. An area called DAREA of DOAR will receive line 0 if the revolved delimiter of the seed line.

The instruction JSR R5, OUTPUT calls the operation of the output program causing the seed line of the delimiter to be revolved back to the input or line 0 of its isoentropicgram. To be explained in more detail, the OUTPUT program calls the operation of the OUTPUT MODULE and when its operation is complete its register OAR contains the number of the MEMORY MODULE area containing the delimiter and its register OLN contains the physical length of the delimiter. The content of registers OAR and OLN are transferred by the OUTPUT program into software registers DOAR and DOLN.

The instruction MOV 6(RO), DNO causes the content of the fourth location in the delimiter seed header to be stored into software register DNOC. With reference to FIG. 77 the fourth location contains the number of occurrences (or 1's) in the delimiter line 0. The number of occurrences is saved in DNOC for future use in the PIPE program.

During PI8, line 0 of the delimiter is moved into DAREA (see FIG. 86). To this end, the first MOV instruction causes the address of the beginning of area DAREA to be storedinto register RO and the jump to subroutine instruction JSR R5, DPMMEM calls the operation of the DPMMEM program causing the content of the MEMORY MODULE area specified by DOAR (which contains line 0 of the delimiter) to be stored into DAREA of the main memory.

Briefly, when DPMEM is called the following values exist in registers R0, R1.

R0 — contain address of area to which transfer is to be made.

R1 — contain the address of a two word area containing
 i. the memory area containing line 0 of seed,
 ii. the number of words (physical) to be transferred.

The JSR routine transfer control to the DPMMEM routine which accomplishes the actual physical transfer.

During P19, the FIRST bit in the STATUS register of the DPM INTERFACE MODULE is set and this is accomplished by storing the literal FIRST which is the octal number $1000_8$ (see Appendix B-21 CONSTANTS DEFINED BY FORMATER PROGRAM), into the STATUS register, responsive to the first MOV instruction of P19. As a result the FIRST bit in the STATUS register is set to 1 and all of the rest of the bits in the STATUS register are set to 0. The MOV #1, BRSW instruction causes the BRSW software flag to be set to 1 thereby indicating that the BRIGHT program is to be called after the PIPE program has completed. To be explained in more detail hereinafter, the BRSW flag may be reset to 0 thereby preventing the call on the BRIGHT program depending on future conditions encountered during the PIPE program.

PI10 is a housekeeping operation during which the pointer register R4 is set to the address of the first LXET address pointer in ESTAK which is to be processed. ESTAK is formed on a last-in-first-out basis and therefore the register R3 contains the address of the last LXET pointer stored into ESTAK. The instruction MOV R3,R4 causes the top of stack pointer address to be copied from register R3 to register R4 so that register R4 now contains the address of the last LXET pointer stored in ESTAK. Due to the action during PI3 and PI4 or PI5 and PI6, software register RLN now contains the number of LXET pointers in ESTAK. Accordingly, the instruction ADD RLN,R4 causes the number of LXET pointers contained in register RLN to be added to the end of stack pointer in register R4, adjusting the value of the pointer in R4 so that it now contains an address which is one higher than the address containing the first LXET pointer stored in ESTAK.

Figure 87:
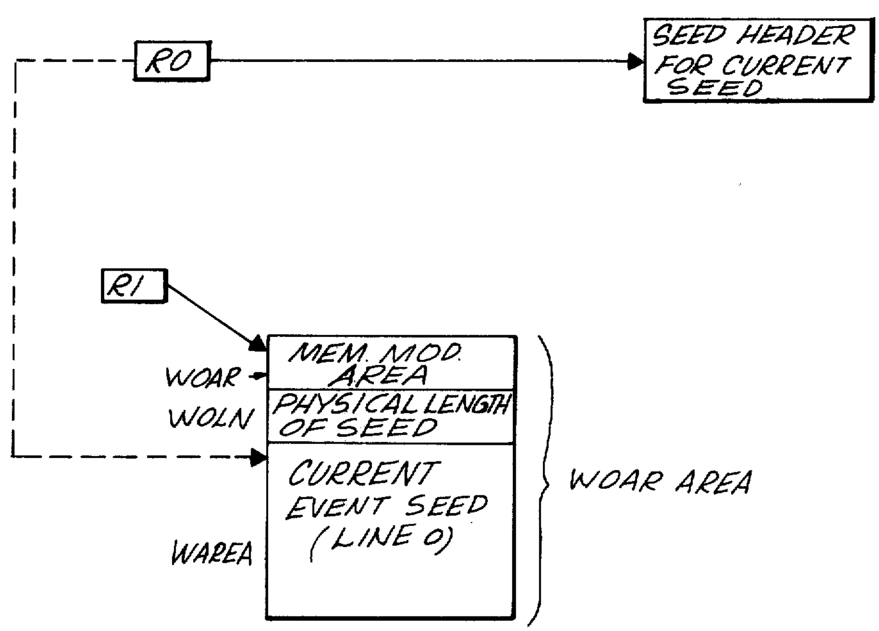
FIG. 87 is a sketch illustrating the address linkage during PI11 of the PIPE program.

Referring to FIG. 87 the main memory area WOAR is the base address of an area in main memory known as WOAR. Address WOAR will receive a value identifying the memory MODULE area where line 0 of an event seed is stored. The second address of WOAR will store the value identifying the physical length of the seed in words (computer) and WAREA is an area where line 0 of the event seed is to be stored. WOAR is set by the OUTPUT program.

The first LXET pointer in ESTAK is the pointer to the event seed header for the first non delimiter character of the request presented by the requestor. The purpose of PI11 is to revolve the event seed for the first LXET pointer, on ESTAK back to line 0 of its isoentropicgram which is referred to as outputting the current event. To this end the first MOV instruction depicted during PI11 causes the address in register R4 to be counted down 1 so that it now contains an address pointer to the first LXET pointer in ESTAK and the result is transferred to register R0. The second MOV instruction depicted during PI11 causes the address of WOAR (see FIG. 87) to be loaded into register R1. Similar to that described with reference to PI7, the jump to subroutine instruction JSR depicted during PI11 causes the OUTPUT subroutine to be called to revolve the event seed line identified by the LXET pointer in register R0 back to its line 0. Thus at the end of PI11, one of the MEMORY MODULE areas contains the line 0 of the event seed corresponding to the first LXET pointer in ESTAK.

PI12 and PI13 assure that line 0 corresponding to the first event seed is in MEMORY MODULE area 1 as is required for the operation of the PIPE MODULE. To this end, during PI12 a check is made to see if the resultant line 0 of the event seen is contained in MEMORY MODULE area 1. Specifically, the compare instruction CMP compares the literal 1 with the number of the MODULE area contained in WOAR (see FIG. 87). If the value in WOAR is 1, the result of the comparison is true and the branch on equal instruction BEQ causes a branch to JOIN3 of the flow. If, on the other hand, the result of the comparison is not true, and hence is false, PI13 of the flow is entered. During PI13, line 0 of the event seed line is transferred from whatever MEMORY MODULE area in which it is contained, to MEMORY MODULE area 1. To this end the first MOV instruction of PI13 causes the address pointer to WAREA to be transferred to register R0 and the jump to subroutine instruction JSR causes line 0 of the event seed to be transferred to WAREA of main memory. The second MOV instruction causes the literal value 1 to be stored into main memory location WOAR the address of which is contained in register R1. The final jump to subroutine instruction JSR causes line 0 of the event seed contained in main memory to be transferred back to MEMORY MODULE area 1.

PI13.1 and 13.2 of the flow are used to determine if the last entry of the request contained in ESTAK is about to be processed and if so, the LAST flip flop in the STATUS register of the DPM INTERFACE MODULE is set to 1 during PI13.2. To this end, during PI13.1, the compare instruction CMP causes the current stack pointer in R4 (which is being decremented during PI10) to be compared with the top of stack pointer in R3 and if the comparison is equal or true, the last event in ESTAK is about to be processed and PI13.2 is entered. During PI13.2 the literal LAST is stored into the STATUS register which in effect causes the LAST bit thereof to be set to 1 and all other bits to remain at 0. Following PI13.2, PI14 is entered. The purpose of setting the LAST bit in the STATUS register is to cause the hardware PIPE MODULE to complete its operation on the next call. If the result of the comparison during PI13.1 is not equal or false, then PI14 is entered directly.

During PI14, line 0 of the delimiter, which was stored in main memory area DAREA during PI18, is transferred to MEMORY MODULE area 2 as is required for the operation of the MEMORY MODULE. To this end, the first two MOV instructions duirng PI14 cause the addresses of areas DAREA and DOAR to be transferred to registers R0 and R1, respectively. The third MOV instruction causes the literal value 2 to be stored in the memory location DOAR (see FIG. 86) specified by the address in register R1. The jump to subroutine instruction JSR causes the MINI COMPUTER and MEMORY MODULE to move line 0 of the delimiter from DAREA to MEMORY MODULE area 2.

During PI15 the following values are moved from main memory into the indicated registers in IPRF of the DPM INTERFACE MODULE:

WOLN—(physical length of the seed of current event) to LN1 of the IPRF;

DOLN—(physical length of the seed of the delimiter) in LN2 of IPRF;

PW—(pipe width) to PW of IPRF;

RLN—(length of request) to LNRQ of IPRF.

It will be recalled in connection with the discussion of the DPM INTERACE MODULE that the register AI determines which one of the IPRF registers into which information is to be transferred from the DATAO register. It will also be recalled that the value 6 in register AI selects register LN1. Accordingly, the MOV #6, AI instruction causes the constant value 6 to be stored into register AI and the following MOV WOLN,DATAO instruction causes the content of WOLN to be stored into LN1 of the IPRF. It will also be recalled that the AI register increments itself after each instruction that references it. This will cause words sequentially stored in the DATAO register to be stored in the L1, L2, PW and LNRQ registers of the IPRF in the order presented in the DATAO register. Each subsequent MOV instruction causes the value in register AI to be incremented so that it selects the next register in IPRF.

Accordingly, the following MOV instructions during PI15 cause the contents of DOLN, PW and RLN to be stored into the LN2, PW and LNRQ registers of the IPRF.

During PI16, piping is performed by calling the operation of the PIPE MODULE in the manner discussed hereinabove. The MINI COMPUTER causes the operation of the PIPE MODULE to be called by storing the appropriate instructions into the STATUS register of the IPRF. To this end, the ADD DPM+PIPGO,-STATUS instruction causes the literals DPM and PIPGO (see Appendix B-21 CONSTANTS DEFINED BY FORMATER PROGRAM) to be added together resulting in the octal value 204 and the result is stored in the STATUS register. This causes the PIPE MODULE to be called, using line 0 of the delimiter stored in MEMORY MODULE area 2, line 0 of the event seed contained in MEMORY MODULE area 1, and the other necessary inputs depicted under the PIPE MODULE in Table 11. Finally the PIPE MODULE forms in MEMORY MODULE area 3 a series of two value pairs of the type noted under final output in Table 11. One set of two value pairs is formed for each event in the layer being processed.

During the operation of the PIPE MODULE the program causes the MINI COMPUTER to continue checking to see whether the PIPE MODULE function is complete. This is accomplished by the instruction BIT,BDONE,STATUS which causes the flag BDONE in main memory to be compared against the STATUS register for equality. When equality is detected, i.e., the PIPE MODULE has completed its operation and has set the DONE flip flop in the STATUS register, PI18 of the flow is entered.

During PI18 the MOV instruction causes the STATUS register to be reset to 0.

PI19 and PI20 do not occur in the PIPE program flow.

During PI21 a rest is made to see if there are any more entries left in ESTAK to be processed. Assume that only the first event or LXET pointer in ESTAK has been processed. Accordingly, if there is more than one LXET pointer in ESTAK, the test during PI21 will fail and the PIPE program will branch back to JOIN2 of the flow where the operation during PI11 through PI21 will repeat for the next LXET pointer in ESTAK.

The test during PI21 is performed responsive to the compare instruction CMP which causes the current stack pointer R4 to be compared with the top of stack pointer R3. If the result of the comparison is true, PI22 of the flow is then entered. If the result of the comparison is false, then the JMP instruction is executed, causing JOIN2 of the flow to be reentered.

JOIN5 et seq. of the flow is the analysis phase of the PIPE process. At this point in time MEMORY MODULE area 3 contains a two value pair for each entry in the layer of the data base being processed (see FIG. 60J). One of the two values is a center pipe value OV and the other is a hit value (NO. of hits) (NH). During the following analysis phase of the operation, the two value pairs are checked to see if the hit value of each pair passes (is equal to or greater than) the pipe cutoff value PCO. The first of the two values, namely the center pipe value, is stored in the P/B MEMORY area 1 if its hit value passes the pipe cutoff value.

The DPM INTERFACE MODULE will be reading and writing from different MEMORY MODULE and P/B MEMORY locations at different times. Therefore it is necessary to keep pointers of these memory locations. A pointer M3AD points to the addresses in MEMORY MODULE area 3 from which reading is to take place, whereas a pointer A2AD points to the addresses in the P/B MEMORY into which writing is to occur. The center pipe value and hit value for each entry are transferred out of the MEMORY MODULE area 3 from the locations specified by the pointer M3AD and only those center pipe values whose hit value passes the pipe cutoff value PCO are written back into the P/B MEMORY location specified by the address in A2AD. It should also be noted that PBBOUT is the area in main memory which contains the output list following the end of the BRIGHT program.

With reference to FIG. 88A, PNBPTR is a base address pointer to a two word area whose second location is PNBCNT. The first word in PNBPTR is a base address pointer to the area PNBOUT and the second word stores the number of entries in PNBOUT. Consider now the actual operation during PI22 in which the various address registers are initialized. The MOV #PNBOUT,R4 instruction causes the address of the area PNBOUT to be transferred from PNBPTR to register R4. The move instruction MOV@LPTR,R2 causes the content of the memory location specified by the address in LPTR to be moved to register R2. LPTR is a software register that contains the base address of the LXET layer pointer table. Accordingly, the pointer to the seed header for the corresponding delimiter is moved to register R2. The move instruction MOV 6(R2),NOC causes the number of occurrences in the delimiter line to be moved from the third word of the delimiter seed header to register NOC. NOC is a software counter that identifies the entry number of the layer being processed. The DEC instruction causes the pointer in NOC to be counted down by 1 so that it now effectively identifies the last (right most) entry in the layer. The clear instruction CLR causes the A2AD,-M3AD and BRCNT register to be reset to 0. To be explained in more detail, the BRCNT register keeps track of the number of entries written to the P/B MEMORY for future processing by the BRIGHT program.

During PI23, one of the two value pairs *vi, vii* is read from the MEMORY MODULE area 3 and stored into software registers OV and NH respectively in readiness for the subsequent test to determine if the corresponding hit value passes the pipe cutoff value. To this end the MOV #30,STATUS instruction causes the *m*1, *m*2 bits of the STATUS register in the DPM INTERFACE MODULE to be set to 1,1 causing a read from the MEMORY MODULE area 3. The MOV M3AD-,AI instruction causes the AI register in the DPM INTERFACE MODULE to be loaded with the address contained in the software register M3AD. In this connection it will be noted that M3AD will contain a 0 value if P123 directly follows PI22, whereas a non 0 value if PI23 is entered following PI32. The first value *vi* of the two value pair is read out of the MEMORY MODULE area 3 and stored into the DATAI register in the DPM INTERFACE MODULE. The instruction MOV DATAI,OV causes the value *vi* to be transferred from the DATAI register to the software register OV and causes the address in register AI to be incremented by 1. The MEMORY MODULE provides the next value *vii* of the pair, and this is stored into the DATAI register. The instruction MOV DATAI,NH causes the value *vii* to be transferred from the DATAI register to the software register NH in main memory and causes the address in register AI to be incremented by 1 so that it now contains the address of the *vii* value for the next two value pair in MEMORY MODULE area 3. The ADD #2,M3AD instruction causes the address in register M3AD to be incremented by 2 so that it now contains the address of the *vi* for the next entry in MEMORY MODULE area 3.

During PI24, the value *vi* contained in register OV is checked for a negative value. If negative (see Table 11 under Final Output of Pipe Module), it indicates that the entry is not worth looking at or passing to the BRIGHTNESS MODULE because there are no bits in the data base for this center pipe value. Under this condition, JOIN9 of the flow is next entered, skipping the intermediate boxes PI25 through PI30 of the flow. If, on the other hand, the value *vi* in OV is not negative, PI125 is next entered.

During PI25 the value *vii* contained in software register NH is tested to determine if it is a negative value. If it is a negative value it indicates that there is an exact hit for the entry in question and PI26, PI27 and PI28 of the flow are entered. If the value *vii* is not negative, PI29 and PI30 are entered.

Consider now the condition where during PI25, it has been detected that the number of hits value in NH is negative. During PI26 the ESCAPE flag is checked to see if it is 1 or 0. The ESCAPE flag is a 1 if the system is presently processing the data base layer for which the request was made. Assume that the machine is processing at the layer of the request and therefore the ESCAPE flag is 1. An exact hit has been found and therefore PI28 is entered. The value *vi* in OV is a center pipe value and is transferred to the P/B MEMORY where it is saved and the BRCNT counter, which tallies the number of writes made to P/B MEMORY area 1, is incremented by 1 and A2AD is incremented by 1 so it points to the next write address in P/B MEMORY.

To this end during PI28, the instruction MOV 10+PBM,STATUS causes the octal constant 10 to be added to the octal value PMB and the resultant value is stored in the STATUS register thereby causing a write to the P/B MEMORY. The subsequent two MOV instructions cause the address in register A2AD to be transferred to register AI of the DPM INTERFACE MODULE and the center pipe value to be transferred from the software register OV to the DATAO register of the DPM INTERFACE MODULE. The DPM INTERFACE MODULE in conjunction with the P/B MEMORY then causes the center pipe value in OV to be stored into the address in the P/B MEMORY specified by the register AI. The INC instructions cause the instructions in software registers A2AD and BRCNT to be incremented by 1.

Return now to PI26 and assume that during the test on the ESCAPE flag it was found to be 0 and therefore that layer 0 is being processed whereas the request is for layer 1 of the data base. PI27 is then entered.

PI25, PI26 and PI27 are entered when an exact hit has been detected. Under these conditions it is unnecessary to perform the brightness function on the corresponding entry. To this end, during PI27 the CLR BRSW instructions causes the software flag BRSW to be reset to 0, indicating that it is unnecessary to call the BRIGHT program. At this point the address in register R4 contains the address of a location in PNBOUT. The instruction MOV NOC, –(R4) causes the number of the entry now being processed to be transferred from register NOC to the main memory location specified by the address, less one, in register R4. F1 is a constant whose value is 1.0. The instruction MOVF F1, –(R4) is a floating point move instruction which causes the value at F1 to be stored into the next sequential location in PBBOUT indicating a 100% brightness factor. This is required since an exact hit has been detected at PI25.

The instruction MOV #1, BRCNT causes BRCNT to be loaded with the value 1. This indicates one hit has been found and that is all that is necessary.

The instruction INC PNBCNT causes the register PNBCNT to be incremented by 1 to indicate one additional entry has been stored in PNBOUT. Additionally the instruction CLR NOC causes the content of the software register NOC to be cleared to 0 to assure that there will be a loop exit at PI33.

Thus it will now be seen that if the value *vii* in NH is negative (an exact hit) and the data base layer corresponding to the layer of the request is being processed (ESCAPE = 1), the PIPE program will pass through PI25 and PI26 and to PI28 where the center pipe value is written from OV into the P/B MEMORY and the BRCNT software register is incremented by 1 to indicate a value has been written into the P/B MEMORY. If the value *vii* in NH is negative (exact hit) and the data base layer 0 is being processed, whereas a layer 1 request has been made (ESCAPE = 0), then PI27 is entered where the number of the event now being processed as designated by NOC and a 100% brightness value are stored in sequential memory locations of the main memory area PNBOUT.

Consider now the operation assuming that during PI25 it was found that the value *vii* was not negative. Under these conditions PI29 will be entered following PI25. During PI29 the value *vi*, which is the number of hits value, contained in software register NH is compared with the pipe cutoff value in software register PCO. If the number of hits in register NH is equal to or greater than the pipe cutoff value, PI30 is entered where the corresponding center pipe is transferred from software register OV to the P/B MEMORY in the manner discussed with respect to PI28 and the BRCNT register is incremented by 1 to indicate another value has been written into the P/B MEMORY area 1, all as discussed hereinabove with respect to PI28.

If during PI29 it was found that the number of hits in register NH is not equal to or greater than the pipe cutoff value, then PI30 is skipped and PI31 is entered directly.

Software register NOC, an entry pointer for layer 0, is also an index pointer to events on the layer 1. During PI31 the software register NOC is decremented to 1 so that it contains the value of the next lower value entry number on data base layer 0.

During PI32, a test is made to determine whether register NOC has been reduced to a negative value, indicating that all events on layer 1 have been processed. If the register NOC is not negative, indicating that all of the events on layer 1 have not been processed, then JOIN5 and the sequence of operations thereafter are repeated for the next entry on layer 0 and hence event on layer 1 and its corresponding two value pair *vi, vii* in MEMORY MODULE area 3. If during PI32 the test indicates that register NOC has been reduced to a negative value, indicating that all entries on layer 0 have been processed, PI33 et seq. are entered.

During PI33 the value in software register BRCNT is checked to see whether the number of writes to P/B MEMORY area 1 value is 0. If it is 0 it indicates that no values have been stored in the P/B MEMORY and therefore none is to be passed to the BRIGHTNESS MODULE and accordingly PI34 is entered where the BRSW software flag is reset to 0 to prevent the BRIGHT program from being called. Additionally, the address pointer PNBCNT to the PNBOUT memory area is reset to 0 and PI35 is next entered.

If during PI33 it is found that the pointer BRCNT is not 0, then there are values in the P/B MEMORY area 1 which are to be passed to the BRIGHTNESS MODULE. PI35 is entered directly. During PI35 the context of the hardware registers R0 through R4 are restored and the operation of the PIPE program is existed and returned to the PARSER program.

A layer 1 request is handled in much the same fashion as a layer 0 request, one difference being at PI27. Other than that the difference in operation is transparent. The way in which PIPE determines whether it is dealing with a layer 1 request as opposed to a layer 0 request is by testing the layer 1 switch. If L1SW is set, then the PIPE program initializes itself to point to the layer 1 descriptions, otherwise PIPE assumes it is dealing with a layer 0 request and so initializes itself.

Consider the operation during interrogation (pipe and brightness) and generation in a layer 1 request. Briefly, the pipe and brightness functions are performed on the data base for each word of the request. The purpose is to locate those word entries in layer 0 of the data base which either exactly or most closely match the words of the request. After piping and brightness has been performed for a particular word of the request, PNBOUT contains a series of layer 0 entry numbers and brightness values ordered in decreasing order of brightness value and indicates the word entries in layer 0 and the degree of match between such word entry and the corresponding request word. Subsequently, the LEPT corresponding to the best word entry (best brightness cutoff value) in PNBOUT, is stored in ESTAK. After piping and brightness have been performed for all words of the sentence request thereon, ESTAK will contain an LEPT corresponding to the best word entry on layer 0 for each word of the request. The LEPTs are in the same order as the corresponding request words.

Piping and brightness are then performed on data base layer 1. During this process those event vectors which correspond to the LEPTs in ESTAK are selected and interrogated using the piping and brightness processes. Afterwards, PNBOUT will contain a series of layer 1 entry numbers and brightness values ordered in decreasing order of brightness. The best layer 1 entry number (best brightness cutoff value) in PNBOUT is then selected for the generation in the process of output.

The bias operation is discussed in connection with the PIPE and BRIGHTNESS MODULES and is also used during the piping and brightness operations on layer 1. In this connection, ESTAK contains the best LEPT for each word entry of the request and the LEPTs are ordered in the same order in which the corresponding word entries occur in the request. Similar to the piping and brightness on layer 0, a bias signal is formed for each entry of the request and hence for each LEPT in ESTAK. As the layer 1 vector signal corresponding to each LEPT is read out for processing, the event-times in such vector signal are added to the corresponding bias value to form biased event-time values. As a result, piping and brightness operates on layer 1 in a much similar manner to that on layer 0 using the bias signals.

E. BRIGHT PROGRAM

The BRIGHTNESS MODULE operates on the event seeds which the PIPE program has just processed. Although the PIPE MODULE itself could determine those results of piping which pass the pipe cutoff value and then provide those values which pass to the BRIGHTNESS MODULE, the software performs this function as described above. The BRIGHT program determines those results found by the PIPE program to pass the pipe cutoff value and therefore to have been stored into the P/B MEMORY. As explained above in connection with Table 11 under BRIGHTNESS MODULE final outputs, the BRIGHTNESS MODULE forms in the P/B MEMORY a set of four values for each entry in the data base which has been passed by the pipe module, each of which in turn is used by the BRIGHT program software to determine a brightness value BV. Consider now the actual operation of the BRIGHT program with reference to FIG. 94. The status of the system is the same as it is at the end of the PIPE program (Table 60E). Which layer is being processed should be transparent to the BRIGHT program.

It should be kept in mind during the following discussion that only the PARSER program adds things into the top of ESTAK, whereas only the PIPE and BRIGHTNESS MODULES REMOVE information therefrom.

BR3–BR9 —Set up and perform the hardware BRIGHTNESS function.

BR12–BR23 —Analyze the results of hardward BRIGHTNESS and save all entries which surpass the brightness cutoff value (BVCO).

Figure 95:
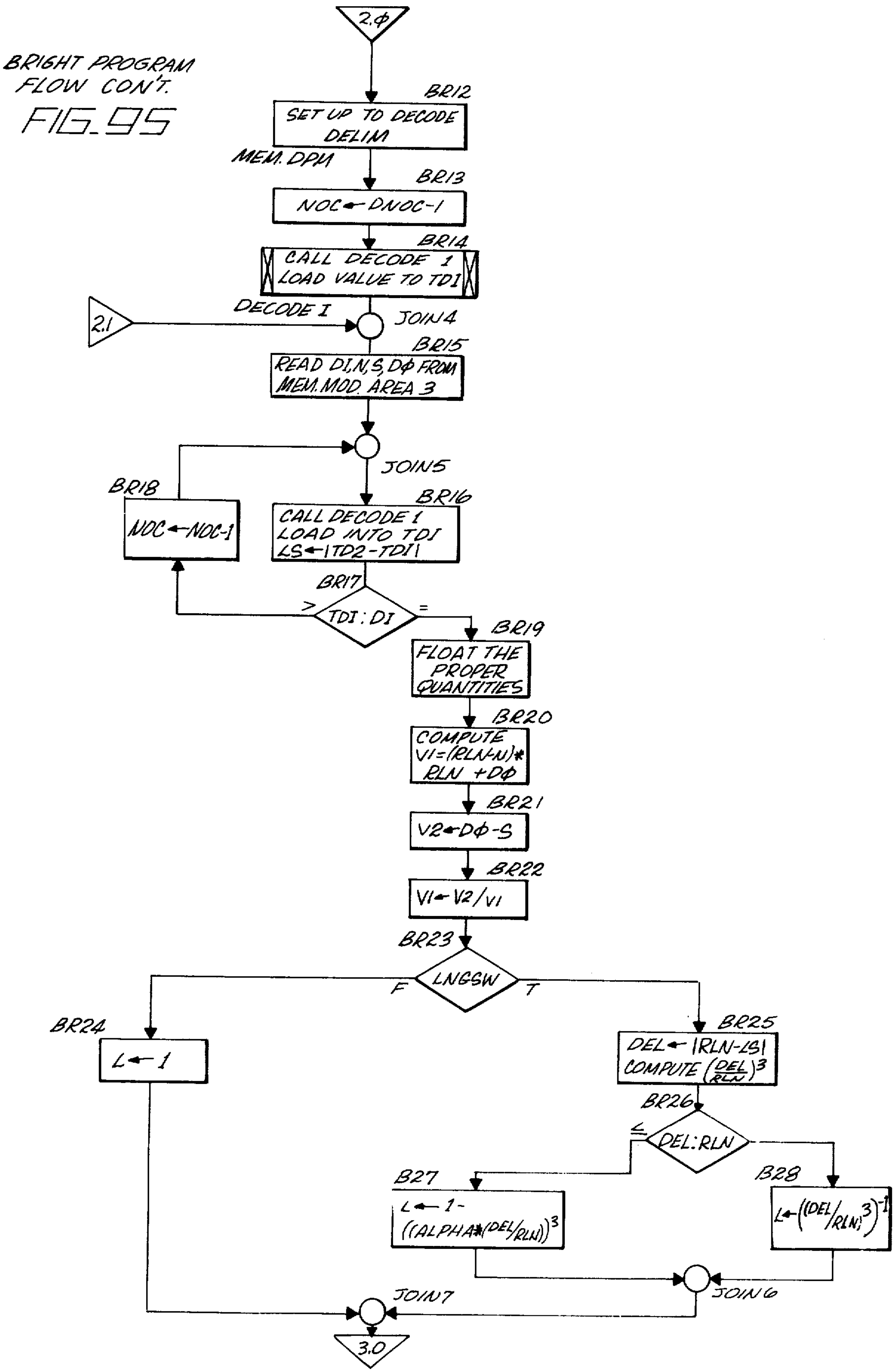
Figure 96:
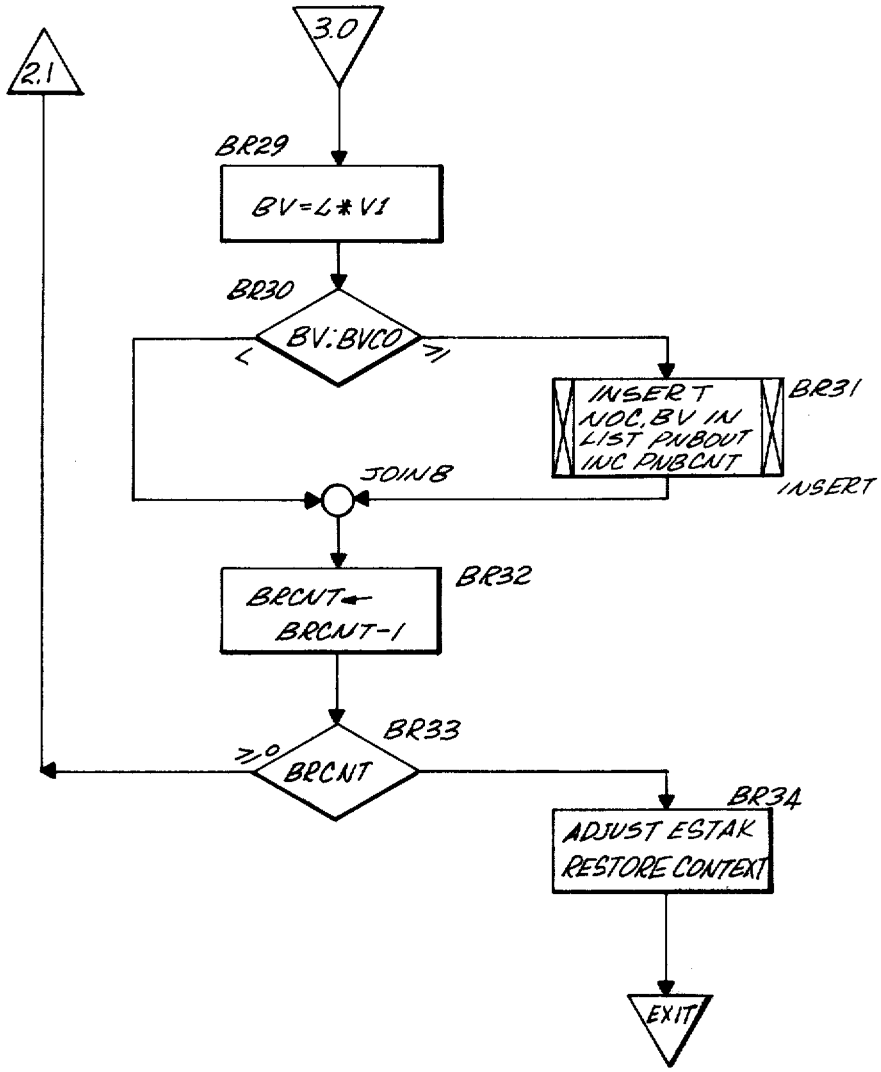

The following discussion will be given with reference to the BRIGHT program flow diagram of FIGS. 94, 95 and 96 which use BR1-BR34 to identify the various flow boxes. The correspondence between the actual program listings and the block of the flow is shown by the BRIGHT program block symbols shown along the left in the code.

The PARSER program calls the operation of the BRIGHT program during PA17 (see FIG. 81). When called, the BRIGHT program enters BR1 of the flow where the context of R0, R1, R2, R3 and R4 registers are saved for further reentry into the PARSER program.

During BR2 the bright program flow initializes the loop registers, and the request length (number of non delimiter characters) contained in software register RLN is moved into LNRQ of the IPRF. To this end, the instruction CLR resets the register PNBCNT to 0 so that it can be used in counting the number of entries made into PNBOUT during the BRIGHT program operation. The next MOV instruction sets the top of stack pointer from hardware register R3 and to R4. The next ADD instruction causes the length of the request stored in software register RLN to be added to register R4 so that R4 now points at one address above the beginning of ESTAK where the first LEPT of the request is stored. The last three MOV instructions cause the FIRST flip flop and the AI register in the DPM INTERFACE MODULE to be set to 1 and 9, respectively. A value 9 in register AI selects the register LNRQ of the IPRF in the DPM INTERFACE MODULE and the request length is transferred from software register RLN to LNRQ of the IPRF.

During BR3, the address in the stack pointer register R4 is decreased by 1 so that it now points at the first LXET in ESTAK and the resulting stack address is stored in register R0, responsive to the first MOV instruction and at the second MOV instruction the content of WOAR (see FIG. 87) is transferred to hardware register R1. The memory location WOAR stores the number of the MEMORY MODULE area where line 0 of an event seen (non delimiter seed) is stored. The JSR instruction causes the OUTPUT subroutine to be called where the seed line specified by the address LXET in register R0 is revolved back to its input line 0 and stored in one of the MEMORY MODULE areas. Line 0 formed during BR3 is referred to as the current seed line 0.

During BR4 a check is made to see if the current seed line 0 has been stored in MEMORY MODULE area 1. If it has, the value 1 will have been stored in software memory location WOAR and the CMP instruction will detect equality, causing BR6 to be entered. If some other MEMORY MODULE area number has been stored in WOAR, the result of the comparison is false, and BR5 will be entered where, as explained with reference to the PIPE program, line 0 of the current seed will be moved to MEMORY MODULE area 1. Thus, when BR6 is entered, the current seed line 0 will always be in MEMORY MODULE area 1.

During BR6, line 0 of the delimiter seed is already contained in DAREA and the physical length of the delimiter is contained in memory location DOLN (see FIG. 86). As explained with reference to the PIPE MODULE, the first three MOV instructions during BR6 cause a value representing MEMORY MODULE area 2 to be stored in memory location DOAR (see FIG. 86), the address of location DOAR is moved to hardware register R1, and the address of the beginning of memory area DAREA is moved to register RO. The JSR instruction causes a jump to the MEMDPM subroutine where the delimiter seed line 0 is moved to MEMORY MODULE area 2, under control of the content of DOAR, R1 and R0.

During BR7 the physical length of line 0 of the current seed is contained in WOLN (see FIG. 87) and the physical length of the delimiter seed is contained in register DOLN and are moved into registers LN1 and LN2 of the IPRF in the DPM INTERFACE MODULE.

BR7.1 and BR7.2 are provided to determine whether the seed for the last LXET stored in ESTAK is about to be processed. To this end, the content of top of ESTAK register R3 is compared with register R4 and if equal, i.e., a true comparison is detected, BR7.2 is entered where the LAST flip flop in the STATUS register of the DPM INTERFACE MODULE is set to 1 and BR8 is entered. If the result of the comparison is not equal, indicating that the top of ESTAK register R3 is not equal to R4, BR8 is entered directly.

During BR8 the BRIGHT program calls the operation of the BRIGHTNESS MODULE, causing the performance of brightness and causing the clearing of the STATUS register in the DPM INTERFACE MODULE. With reference to FIG. 89 and Table 11 under final output of PIPE MODULE, it will be seen that the P/B MEMORY now contains the two value pairs depicted in FIG. 89 and Table 11 under PIPE MODULE final output. In operation, during BR8 the ADD instruction causes the constants DPM and BRGO to be added and the result stored in the STATUS register of the DPM INTERFACE MODULE. This causes the flip flops DPM and BRGO to be set, calling the operation of the hardware BRIGHTNESS MODULE, causing it to perform brightness, using the delimiter seed line 0 now stored in MEMORY MODULE area 2, using the current event seed line 0 (from the data base) now stored in MEMORY MODULE area 1, and the two value pairs *vi, vii* stored in P/B MEMORY. The BRIGHT program then performs the brightness operation and generates the four value results depicted in Table 11 under final output for BRIGHTNESS MODULE which in turn are stored in the P/B MEMORY. In addition, during BR8 the instruction BIT, BDONE,-STATUS, causes the BDONE bit in the STATUS register to be monitored. When the operation of the BRIGHTNESS MODULE is complete, the BDONE flip flop is set to a 1 state indicating that the BRIGHTNESS MODULE has completed its operation . The BEQ .−1 instruction is a loop back instruction that causes a loop back to the BIT instruction until the BDONE bit is set. After the BDONE flip flop has been set, the MOV #0, STATUS instruction causes the STATUS register to be reset to 0.

During BR9 the CMP instruction causes the content of registers R4 and R3 to be compared and when equal, BR12 is entered. If they are not equal it indicates that the current LXET pointer register R4 has not yet been decremented to the top of stack address contained in register R3. As a result there are more LXET pointers in ESTAK to be processed and BR3 is reentered following BR9. The loop through BR3-BR9 continues until each LXET pointer in ESTAK and hence each of the corresponding event seeds has been processed, resulting in the sets of four values depicted under final output for BRIGHTNESS MODULE in Table 11.

When all LXET pointers in ESTAK have been processed and R4 is equal to R3, BR12 is entered. With BR12 the BRIGHT program starts the computation of the brightness value BV. This computation requires that the DECODE I MODULE provide the actual occurrence values from the delimiter line 0 contained in MEMORY MODULE area 1 (see FIG. 89). To this end the MOV #1,DOAR instruction transfers to DOAR (see FIG. 86) a value designating MEMORY MODULE area 1. The MOV # DOAR,R1 instruction causes the address of area DOAR to be transferred to register R1. The MOV # DAREA,R0 instruction causes the address of area DAREA to be transferred to register R0. The JSR instruction causes a jump to the MEMDPM subroutine which actually transfers the delimiter seed line 0 from main memory via the DPM INTERFACE MODULE to MEMORY MODULE area 1.

The following three MOV instructions cause the DPM INTERFACE register AI to be set to a 6, to select register LN1 and causing the physical length of seed in DOLN (see FIG. 86) to be transferred to register LN1. The instruction MOV D1INIT,STATUS causes the D1INIT flip flop in the STATUS register to be set to a 1 to thereby initialize the hardware DECODE I MODULE. The instruction CLR AICNT causes the address point to the MEMORY MODULE area 3 to be set to 0, thereby allowing the memory locations of this area to be read, commencing with address 0, when the results of the BRIGHTNESS MODULE are processed.

During BR13 the number of entries in the delimeter line 0 (DNOC) is moved by the move instruction to the software register NOC and is reduced by one by the DEC instruction. NOC now specifies the required number of calls to the DECODE I MODULE.

Durring BR14 the operation of the DECODE I MODULE is called causing it to load a delimiter occurrence value into the software register TDI. To this end the instruction JSR R5,DECODE I causes the DECODE I subroutine to be called and the resultant delimiter occurrence value is loaded into R0. The subsequent MOV R0,TDI instruction causes the result from the DECODE I subroutine, namely, the beginning delimeter occurrence value, to be moved from register R0 to TDI.

During BR15 the following operations take place which have generally been discussed above with reference to the previous programs:

1. A value identifying the MEMORY MODULE area 3 from which the results of the BRIGHT MODULE operation are to be read is transferred to $m1$, $m2$ of the STATUS register. 2. The address pointer to the current MEMORY MODULE area 3 address contained in AICNT is transferred to address register AI and is subsequently incremented to point to registers N, S, and D0. 3. A set of four values generated by the BRIGHTNESS MODULE and now stored in the MEMORY MODULE area 3 are transferred to register DI, N, S, and D0. 4. The software address pointer AICNT is incremented by 4 so that it now points at the beginning of the next set of four values in MEMORY MODULE area 3 which are to be read during a subsequent to BR15.

With reference to Table 11 under BRIGHTNESS MODULE final output, it will be seen that registers DI, N, S, and D0 now contain, respectively, the beginning delimiter of the corresponding entry, the number of hits N, Dmin, and $d0$.

It is now necessary to go through the delimiter occurrence vector in MEMORY MODULE area 1 and locate the delimiters defining the entry corresponding to the beginning delimiter in register DI. The length of that entry will then be determined and stored into register LS. To this end the MOV TD2,TDI instruction causes the beginning delimiter (if any) previously stored in TDI to be transferred from register TDI to TD2. The JSR instruction causes a jump to the DECODE I subroutine which in turn calls the operation of the DECODE I MODULE, causing it to provide the next beginning delimiter into register R0. The MOV R0,TDI instruction causes the next beginning delimiter to be moved to register TDI. The following SUB instruction causes the current and previous delimiters in registers TDI and TD2, respectively, to be subtracted and the result is stored in register TD2. The instruction MOV TD2,LS causes the difference to be stored in register LS and the following DEC LS instruction causes the difference in LS to be decremented by 1 to form the actual length of the entry.

During BR17 the current delimiter in register TDI and the beginning delimiter from the BRIGHTNESS MODULE contained in register DI are compared to determine if the DECODE I MODULE has reached (and hence the BRIGHT program is processing) the entry corresponding to the delimiter in register DI. Recall the hardware BRIGHTNESS MODULE has only outputted the set of four values (in registers DI, N, S and D0) for those entries that are of interest, as designated by the two value pairs from the PIPE MODULE.

The loop through BR16, BR17 and BR18 is to enable the DECODE I MODULE to spin down through the delimiter occurrence vector until the delimiter is found which is equal to the beginning delimiter in register DI which was stored during BR15. To this end, when the comparison indicates that the delimiter from the delimiter occurrence vector in register TDI is larger than the beginning delimiter from the BRIGHTNESS MODULE in register DI, BR18 is entered where the NOC counter is decreased by 1 so that it contains a value identifying the next current entry whose beginning delimiter will be obtained from the delimiter occurence vector.

When BR16 is reentered the next lower valued delimiter is provided from the delimiter occurrence vector by the DECODE I MODULE. This operation continues until a delimiter is provided by the DECODE I MODULE which is equal to or matches the beginning delimiter in register DI in which case BR19 is entered. At this time the value in NOC identifies the number of the entry for the beginning delimiter in TDI.

During BR19 the three floating point instructions LDCIF are executed. The MINI COMPUTER disclosed herein includes a floating point module. Registers AC0–AC4 are hardware registers in the floating point package.

The floating point instruction LDCIF AC0,RLN causes the length of request in register RLN to be converted to floating point form and transferred to hardware register AC0. Similarly, the following two LDCIF instructions cause the floating point form of the request length in register RLN to be stored in register AC1 and causes the number of hits value in register N to be converted to floating point notation and stored in software register AC2.

During BR20 the value shown in the denominator of equations 8 and 9 in Section XVI, BRIGHTNESS MODULE, is determined. To this end, the number of hits (N) in register AC2 is subtracted from the length of the request (RLN) in register AC0 and the difference is placed in register AC0. The floating point instruction MULF causes the length of request contained in register AC1 to be multiplied times the difference value in register AC0 and the result is stored into register AC0. Thus the value NM = (LNRQ − N) * LNRQ has now been formed in AC0. The floating point instruction LDCIF AC2,DO causes the $d0$ value (equation 8) to be transferred from hardware register D0 to software register AC2 and the following instruction ADDF AC0-,AC2 to be added together and the result stored into register AC0. Thus, register AC0 now contains the value shown in the denominator of equation 8.

During BR21 the term shown in the numerator of equation 8 is formed. To this end, the floating point instruction LDCIF AC3,S causes the dmin value formed by the BRIGHTNESS MODULE to be converted to floating point form and stored in register AC3. The next instruction SUBF AC2,AC3 causes the dmin value in register AC3 to be subtracted from the $d_0$ value in register AC2 and the difference is stored into register AC2. Thus, register AC2 now contains the value representing the numerator in equation 8.

During BR22 the value in register AC0 representing the denominator is divided into the value in register AC2 representing the numerator of equation 8 and the result is stored into register AC2. Thus, register AC2 now contains the actual scatter value S depicted in equation 8 in the BRIGHTNESS MODULE for the entry specified by register NOC whose beginning delimiter is stored in TDI.

During BR23 the length switch LNGSW is checked. The length switch LNGSW may be set to 1 during the PARSE program to indicate whether length is to be taken into account in determining the brightness value BV (see equation 12 under section XVI BRIGHTNESS MODULE). Thus the two instructions depicted adjacent BR23 cause the LNGSW switch to be checked for 1 and if 1, BR25 through BR28 are entered where the length factor L (see equation 12) is determined. If the LNGSW switch is 0, then BR24 is entered where the instruction BRX7:LDCIF AC1,#1 is executed causing a value representing a 1 to be stored into register AC1 so that during the subsequent BR29, a 1 is multiplied times the scatter value S in software register AC2.

When the L value for equation 8 stored in register AC1 is the value 1, the resulting BV value formed during BR27 is the same as scatter value S (see equation 8) stored in register AC2.

Assume that the LNGSW switch is in a 1 state and BR25 is entered. During BR25 the absolute value of the difference is taken between the actual length of the request (RLN) in register AC1 and the length of the data base entry (LS) stored in register AC0 and the result is saved into register AC0. This value then represents the absolute value of the difference LNRQ − N which is the Δ value in equation 11, section XVI BRIGHTNESS MODULE. The Δ value formed in register AC0 is then divided by the LNRQ value transferred from register RLN to AC1,$_3$ and the result is cubed, thereby forming the value $(\Delta/LNR)^3$ depicted in equation 11. To this end, the floating point instruction LDCIF AC0,LS causes the length of the data base entry contained in register LS to be converted to floating point form and stored in register AC0. The instruction SUBF causes the length of response (N) contained in register AC1 to be subtracted from the length of the request (LNRQ) contained in register AC0 and the result is stored into register AC0. Thus, register AC0 now contains the Δ (DEL value in program listing) depicted in equation 11. The instruction ABSF AC0 causes the absolute value of the Δ value in register AC0 to be converted to absolute form thereby converting to positive form any negative values in AC0. The instruction MOVF AC0,AC4 causes the Δ value to be moved from register AC0 to register AC4. The instruction DIVF AC0,AC1 causes the length of request value stored in register AC1 from RLN to be divided into the Δ value in register AC0 and the result stored into register AC0. The instruction MOVF AC0,AC3 causes the result in register AC0 to be copied into register AC3 and the following two MULF instructions cause the value to be cubed and the result stored in register AC0. Thus, at the end of BR25, the register AC0 contains the value $(\Delta/RLN)^3$ depicted in equation 11 in terms of the program listing $(DEL/RLN)^3$.

During BR26 the Δ value in register AC4 is compared with the LNRQ value of equation 11 (RLN in program listing) contained in register AC1. If the former is equal to or less than the latter, BR27 is entered where the value depicted at the top of equation 11 is computed. If the latter is larger, then BR28 is entered.

Consider now BR27 where Δ (DEL) is equal to or less than LNRQ (see upper equation 11). The LDF AC1,ALPHA instruction causes the $\alpha$ value, namely, 0.63, to be converted to floating point form and stored into register AC1. The following two MULF instructions cause the alpha value 0.63 to be cubed and the result is stored in AC1. The instruction MULF AC0-,AC1 causes the cubed alpha value in register AC1 to be multiplied times the $(\Delta/LNRQ)^3$ value contained in register AC0 and the result is stored into register AC0. The instruction LDCIF AC1, #1 causes the constant value 1 to be converted to floating point notation and stored into register AC1. The instruction SUBF AC1-,AC0 causes the value $\alpha^3(\Delta/LNRQ)^3$ to be subtracted from the value 1 in register AC1 and the result is stored into register AC1. Following BR27, BR29 of the flow is entered.

Consider now the operation during BR28 where the lower equation 11 is used ($\Delta > LNRQ$). The instruction LDCIF AC1, #1 causes a 1 to be stored into register AC1. The instruction DIVF AC1,AC0 causes the 1 in register AC1 to be divided by the value $(\Delta/RLN)^3$ in register AC0 and the result is stored back into register AC1. By this means the value L depicted for the lower equation 11 has been computed and stored into register AC1. Thus, at JOIN 7, register AC1 contains the value for the upper equation 11 if BR27 was entered, whereas register AC1 contains the value L for the lower equation 11 if BR28 is entered. During BR29 the final brightness value BV is computed. The equation for the value BV is depicted in equation 12 for section XVI of the BRIGHTNESS MODULE. To this end, the length factor (L) is now contained in register AC1 and the scatter value is contained in register AC2 (S). Accordingly, the instruction MULF AC1,AC2 causes the two values to be multiplied together and the result stored into register AC1. The register AC1 now contains the final brightness value BV.

During BR30 a comparison is made between the brightness value BV and the brightness cutoff value BVCO. If the brightness value is less than and hence below the brightness cutoff value BVCO, BR32 is directly entered without storing anything in the BRIGHT program output area PNBOUT. If, on the other hand, during BR30 if it found that the brightness value BV is equal to or greater than the brightness cutoff value BVCO, BR31 is entered where the corresponding entry number in software register NOC and the brightness value are transferred, in sequence, to the output area PNBOUT. To this end the instruction JSR R5,INSERT causes the INSERT subroutine to be entered which inserts the entry value (E) and brightness value (BV) contained in NOC and AC1 into sequentially addressable locations of the area PNBOUT, as generally depicted by FIG. 91.

Consider now the operation during BR32. The software register BRCNT was set by the PIPE program to identify the number of entries passed by the PIPE program to the BRIGHT program for processing. Thus BRCNT will contain a value identifying the number of four value entries stored in MEMORY MODULE area 3 by the BRIGHTNESS MODULE. Each time one of the four value entries in MEMORY MODULE area 3 is processed, the register BRCNT is decremented by 1 at BR32. To this end the instruction DEC BRCNT decrements the value in register BRCNT.

During BR33 a test is made to determine whether the value in register BRCNT has been decremented to 0 . If it is greater than or equal to 0 ; then the BRIGHT program jumps back to JOIN4 where BR15 et seq. is repeated for the next four value entry in MEMORY MODULE area 3. Finally, when during BR33, BRCNT is found to contain a negative value, BR34 is entered where the context of registers R0–R4 are reset to return to the PARSER program. Also the instruction ADD RLN,R3 causes the length of the request value stored in register RLN to be added to the content of the top of stack register R3 which effectively pops or removes the number of events from ESTAK which has just been processed. Following BR34 the operation of the BRIGHT program is exited.

F. OUTPUT SUBROUTINE

The OUTPUT subroutine is called by the PIPE program during P17 and PI11 and by BRIGHT program during BR3 and in turn calls the operation of the hardware OUTPUT MODULE. Generally, the OUTPUT subroutine requires, as input parameters:

1. an address pointer to the seed header which in turn contains the address of a seed line in MAIN MEMORY, which is to be revolved back to the 0 line of its iso-entropicgram;
2. a pointer to a main memory area referred to as area DOAR for a delimiter or a pointer to area WOAR for an event.

The contents of DOAR and WOAR are depicted in FIGS. 86 and 87.

Figure 97:
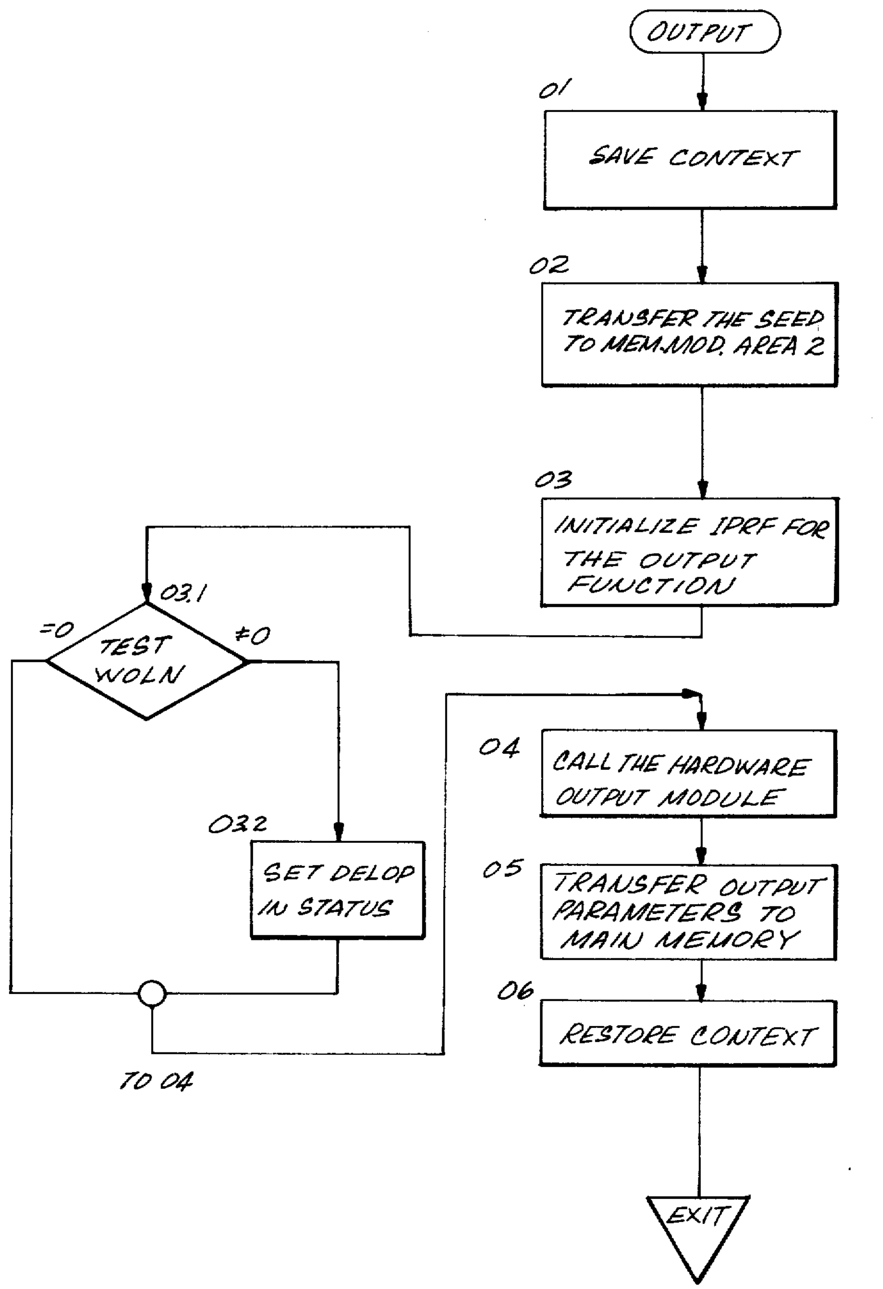
FIG. 97 is an OUTPUT subroutine flow diagram.

Appendix B-4 contains the program listing for the OUTPUT subroutine. FIG. 97 is a flow diagram illustrating the sequence of operation of the OUTPUT subroutine and should be referred to in the following discussion.

During O1 of the OUTPUT subroutine operation the context of hardware registers R0 through R4 of the MINI COMPUTER is saved for a return to the calling program.

During O2 the seed line (i.e., delimiter seed line or event seed line) is transferred to MEMORY MODULE area 1. When the OUTPUT subroutine is entered, hardware register R0 contains the beginning address of a seed header and R1 contains the beginning address of DOAR or WOAR depending on whether a delimiter seed line or non delimiter seed line is to be output. Accordingly, during O2, the MOV 2(R0),R2 instruction moves the third word in the seed header (namely the number of occurrences in the corresponding seed line) to register R2. The instruction MOV #10,STATUS causes the *m*1, *m*2 flip flops in the STATUS register of the DPM INTERFACE MODULE to be set to states 0,1 respectively, which designates that a write to MEMORY MODULE area 1 is about to take place. The instruction MOV #0,AI sets the address register AI in the DPM INTERFACE MODULE to 0, pointing to the first address in the MEMORY MODULE area 1, in which a write is to take place. The instruction MOV (R0)+,R3 moves the first word in the seed header (namely, the base address pointer to the seed line) to hardware register R3 and counts up the address in register R0 by 1. The instruction MOV (R3)+,DATAO, DEC R2 and BNE .−2 cause the DPM INTERFACE MODULE to transfer the seed line via register DATAO to MEMORY MODULE area 1 into the locations specified by the addresses as in register AI.

The register R2 contains the length of the seed in words. The instruction DEC R2 causes the value in register R2 to be counted down by 1 each time a word has been transferred from the seed to the main memory. The instruction BNE .−2 causes the MINI COMPUTER to branch back to the MOV instruction. As explained above, the address register AI is incremented by 1 each time a word is transferred so that it contains the address of the next location in main memory into which a word is to be stored. This is repeated until the length of the seed in register R2 has been counted down to 0 thereby indicating that all words have been transferred from the seed line in main memory to MEMORY MODULE area 1. When register R2 has been counted down to 0, O3 of the flow is entered.

During O3, the IPRF registers are initialized as follows:

TL←HW
BL←0
IR←0
HW←HW iso-entropicgram width
LINE#← seed line number
LN1← physical length of the seed
LN2← 0

To this end the instruction MOV #0,STATUS causes the STATUS register to be reset to 0 and the instruction MOV #0,AI causes the address register AI to be reset to 0 thereby causing the MEMORY MODULE to be addressing the IPRF starting with register TL. The following seven MOV instructions cause the information indicated above to be transferred to the indicated registers in the IPRF in sequence.

During 04 of the flow the hardware OUTPUT MODULE is called. To this end, the instruction MOV DPM + OMGO, causes the DPM flip flop to be set to 1 and the *f*1, *f*2, *f*3 flip flops to be set to a state selecting the DC2 decoder outline line OMGO. This in turn causes the hardware OUTPUT MODULE operation to be called as discussed in detail hereinabove. The instruction BIT BDONE,STATUS causes the MINI COMPUTER to monitor the BDONE flip flop in the STATUS register until it has been set to a 1, indicating that the output operation is complete, at which time O5 of the flow is entered. The instruction BEO .−1 causes the MINI COMPUTER to branch back to the BIT instruction until BDONE is found to be 0.

During O5 of the flow, the output parameters from registers OAR and OLN of the OUTPUT MODULE are transferred to the main memory of the MINI COMPUTER. It will be recalled that the registers OAR and OLN, respectively, identify the MEMORY MODULE area containing the seed and the length of the seed line in words which seed line is now contained in the MEMORY MODULE. Thus the CLR STATUS instruction clears the STATUS register to 0 and the MOV #6,AI instruction causes the address register AI to be set to 6, thereby causing the MEMORY MODULE area number in register OAR of the OUTPUT MODULE to be coupled through he DATAI gate to I/O bus 1210 to the MINI COMPUTER. The instruction MOV DATAI,(R1)+ causes the value applied to the I/O bus 1210 to be stored into the first of the two word memory area (of DOAR or WOAR) specified by register R1 and the content of register R1 is incremented by 1. The instruction MOV DATAI,(R1)+ causes the address in register AI to be incremented by 1 so that the length of the seed in register OLN of the OUTPUT MODULE is coupled through the DATAI gate to the I/O bus 1210 and the length of seed line value is stored into the second word of the two word area specified by register R1. The address in register R1 is then incremented.

During O6 the content of register R0 through R4 is then restored for reentry to the program which called the OUTPUT subroutine.

G. MEMDPM Subroutine

Figure 98:
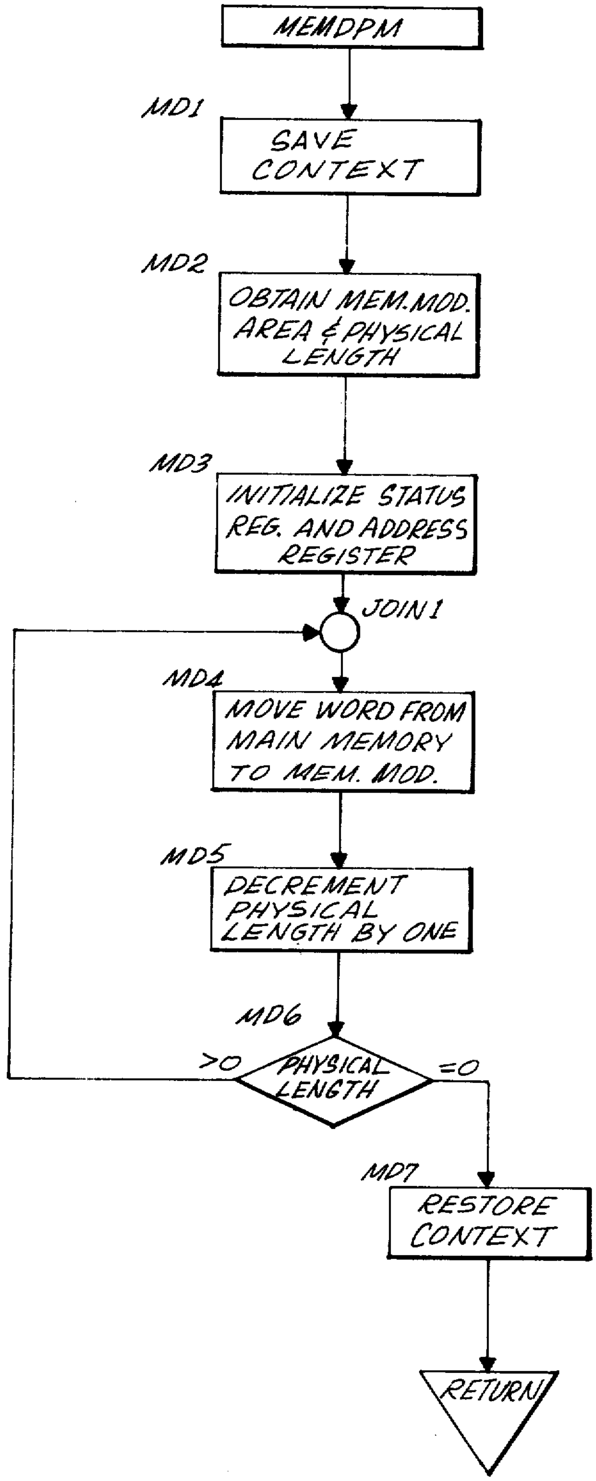
FIG. 98 is a MEMDPM subroutine flow diagram.

The MEMDPM subroutine transfers a seed line from the main memory of the MINI COMPUTER to a specified MEMORY MODULE. The program listing for the MEMDPM subroutine is shown in the appendix and FIG. 98 is a flow diagram illustrating the sequence of operation using flow boxes MD1–MD7. Upon entering the MEMDPM subroutine the input parameters provided are as follows:

1. Register R0 contains an address pointer to the main memory save area (DAREA for a delimiter seed or WAREA for an event seed) from which a transfer is to be made.

2. Register R1 contains an address pointer to a two word save area (DOAR for a delimiter seed or WOAR for an event seed).

FIGS. 86 and 87 depict these relationships. The PIPE (PI8, PI13, PI14) BRIGHT (BR5, BR6, BR12) programs call the MEMDPM subroutine. When called, MD1 is entered where the context of the MINI COMPUTER registers R0 through R4 is saved for a return to the calling program.

During MD2 the MEMORY MODULE area number and the physical length of the seed are obtained from either the DOAR or WOAR two word save areas. To this end the instruction MOV R0,R2 causes the address pointer to the main memory save area (DAREA or WAREA, FIGS. 86,87) to be transferred from register R0 to register R2. The instruction MOV(R1)+,R3 causes the content of the location in DOAR or WOAR specified by register R1 (namely, the MEMORY MODULE area) to be transferred to register R3 and the address pointer in register R1 is incremented by 1 so that it now points at the second of the two word store area (DOAR or WOAR). The instruction MOV(R1)+,R4 causes the content of the location specified by R1 (namely, the physical length of seed from DOLN or WOLN) to be transferred to register R4. The bits specifying the MEMORY MODULE area into which a transfer is to be made are stored at the least significant two bits of register R3, whereas, with reference to FIG. 53, it will be seen that the MEMORY MODULE area bits *m1*, *m2* are displaced three bits from the right hand end of the STATUS register. The following three left shift instructions ROL cause the content of the register R3 to be shifted three places to the left for alignment with the STATUS register.

During MD3 the STATUS register and the address register AI in the DPM INTERFACE MODULE are initialized. To this end the MOV R3,STATUS instruction causes the shifted word in register R3 to be stored into the STATUS register thereby setting the *m1*, *m2* bits to a state which selects the proper MEMORY MODULE area. Additionally the instruction MOV #0,AI causes a 0 to be stored into register AI thereby selecting address 0 of the MEMORY MODULE area specified by the STATUS register.

During MD4 a word is transferred from the main memory of the MINI COMPUTER to the MEMORY MODULE. The word is stored at the MEMORY MODULE area specified by bits *m1*, *m2* in the STATUS register and at the location specified by the address register AI, both in the DPM INTERFACE MODULE. The instruction MOV (R2)+, DATA0 causes the move to take place from the memory location of the seed area specified by register R2 and the content of register R2 is increased by 1 for the next read.

During MD5 the value representing the physical length of the seed contained in register R4 is decremented by 1, reflecting the fact that one word has been transferred to the MEMORY MODULE. During MD6, the instruction BNE .−2 causes a transfer back to JOIN 1 if the content of register R4 has not been decremented to 0. When the physical length in register R4 has been decremented to 0, MD7 is entered following MD6 where the context of registers R0 through R4 is restored for reentry to the calling program.

H. DPMMEM Subroutine

The DPMMEM subroutine is the complement of the MEMDPM subroutine. Specifically, the DPMMEM subroutine sets up and transfers data from a specified MEMORY MODULE area to a specified main memory area. The initial parameters for the DPMMEM subroutine are as follows:

1. Register R0 contains a base address pointer to the main memory save area (DAREA or WAREA) to which a transfer is to be made. 2. Register R1 contains a base address pointer to the two word area (DOAR or WOAR) containing in the first word the number of the MEMORY MODULE area from which the transfer is to be made, and in the second word, the physical length of the field to be transferred in words.

Figure 99:
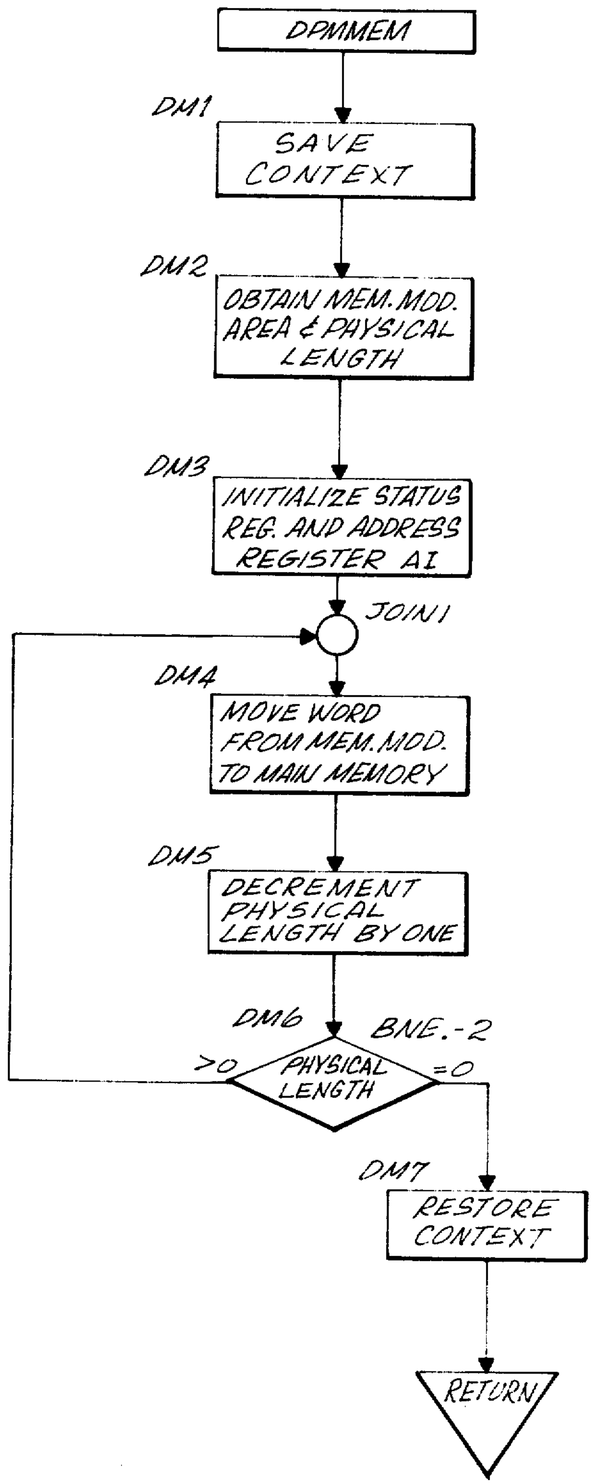
FIG. 99 is a DPMMEM subroutine flow diagram.

The Appendix B contains the program listing for the DPMMEM subroutine. FIG. 99 depicts the sequence of operation for the DPMMEM subroutine and identifies the flow blocks with the symbols DM1–DM7. It will be noted that the sequence of operation is basically the same as for the MEMDPM subroutine depicted in FIG. 98 except that during DM4 the instruction MOV DATAI,(R2)+ causes a word to be moved from the specified MEMORY MODULE to the main memory area specified by the address in register R2 rather than the reverse. Accordingly, the description will not be repeated.

I. DECODE I SUBROUTINE

The DECODE I subroutine calls the hardware DECODE I MODULE. The operation of the DECODE I subroutine assumes that the hardware module has been initialized prior to the first call. The output from the DECODE I MODULE includes seven bits from register DO1 and positionally located at the most significant end is the 8th bit which is always 0. The output of the end of file flip flop EOF1. Due to its simplicity the boxes of the flow are not labeled. As long as the end of file flip flop EOF1 is not set to 0, at least one more decoded occurrence value is to be provided by the DECODE I MODULE. However, as soon as nothing remains to be provided by the DECODE I MODULE, the EOF1 flip flop is set to a 1 state. The resulting 8 bit value is passed through the DPM INTERFACE MODULE to the MINI COMPUTER which interprets it as the end of the decoded data.

Figure 100:
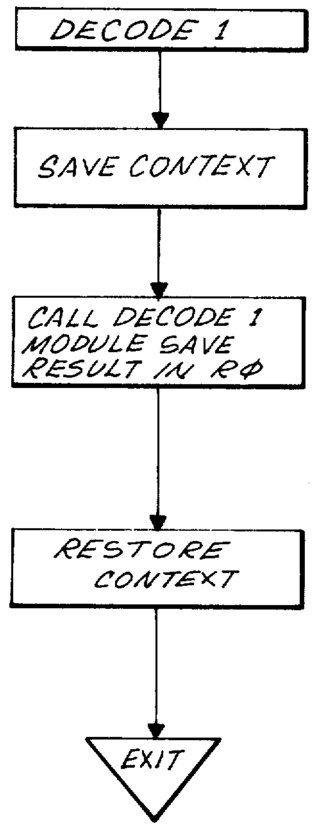
FIG. 100 is a DECODE I subroutine flow diagram.

Consider now the operation of the DECODE I subroutine. FIG. 100 depicts the flow diagram of operation for the DECODE I MODULE. Appendix B contains the program listing for the DECODE I subroutine.

Initially the context of registers R1 through R4 is saved for return to the calling module after exit from the DECODE I subroutine. Next the DECODE I MODULE is called and the absolute coded occurrence value provided by the DECODE I MODULE is saved in register R0. To this end, the instruction MOV DPM+D1GO,STATUS causes the DPM flip flop in the STATUS register to be set to a 1 state and the *f*1, *f*2, *f*3 flip flops in the STATUS register to be set which in turn causes the DC2 decoder to form a true signal at the D1GO output which in turn calls the operation of the DECODE I MODULE.

When the operation of the DECODE I MODULE is complete the BDONE flip flop in the STATUS register is set to a 1 state. The instruction BIT BDONE, STATUS causes the BDONE flip flop to be monitored for a 1 state. The instruction BEQ.−1 causes the MINI COMPUTER to branch back to the previous MOV instruction and repeat the call on the DECODE I MODULE until the BDONE flip flop is in a 1 state. When the BDONE flip flop is in a 1 state, the instruction CLR STATUS is executed causing the STATUS register to be cleared to 0. The instruction MOV #8,AI causes the value 8 to be stored into the address register AI which in turn causes the output of register DO1 in the DECODE I MODULE to be coupled through to the I/O bus 1210. The subsequent instruction MOV DATAI,R0 causes the actual occurrence value formed by the DECODE I MODULE in register DO1 to be stored into the register R0.

Finally, the DECODE I subroutine causes the context of registers R1 through R4 to be restored and the operation of the DECODE I subroutine exits.

J. INSERT SUBROUTINE

The INSERT subroutine is called by the programs at the points indicated as follows. The INSERT subroutine inserts a two value pair, which consists of an entry number (E) and a brightness value (BV), in sequential memory locations into the ordered list in the main memory area PNBOUT, see 2213 of FIG. 102A, and 223 of FIG. 102B. In general the operation involves inserting the two value pair into the ordered list PNBOUT and shifting the remainder of the list down one position. When the INSERT subroutine is called the following values have been set up:

1. The software register NOC contains an entry number (E).

2. The floating software register AC1 contains a brightness value (BV) which is to be stored into the output area PNBOUT immediately following the entry number (E).

Additionally, PNBPTR is the base address of a two word area PNBPTR containing the beginning address of PNBOUT and a value which identifies the number of entries now stored in the output area PNBOUT. PNCNT is the address of the second word of PNBPTR which contains the number of entries. The addresses PNBPTR and PNBCNT are generated by the assembler when assembling the program listing.

Figure 101:
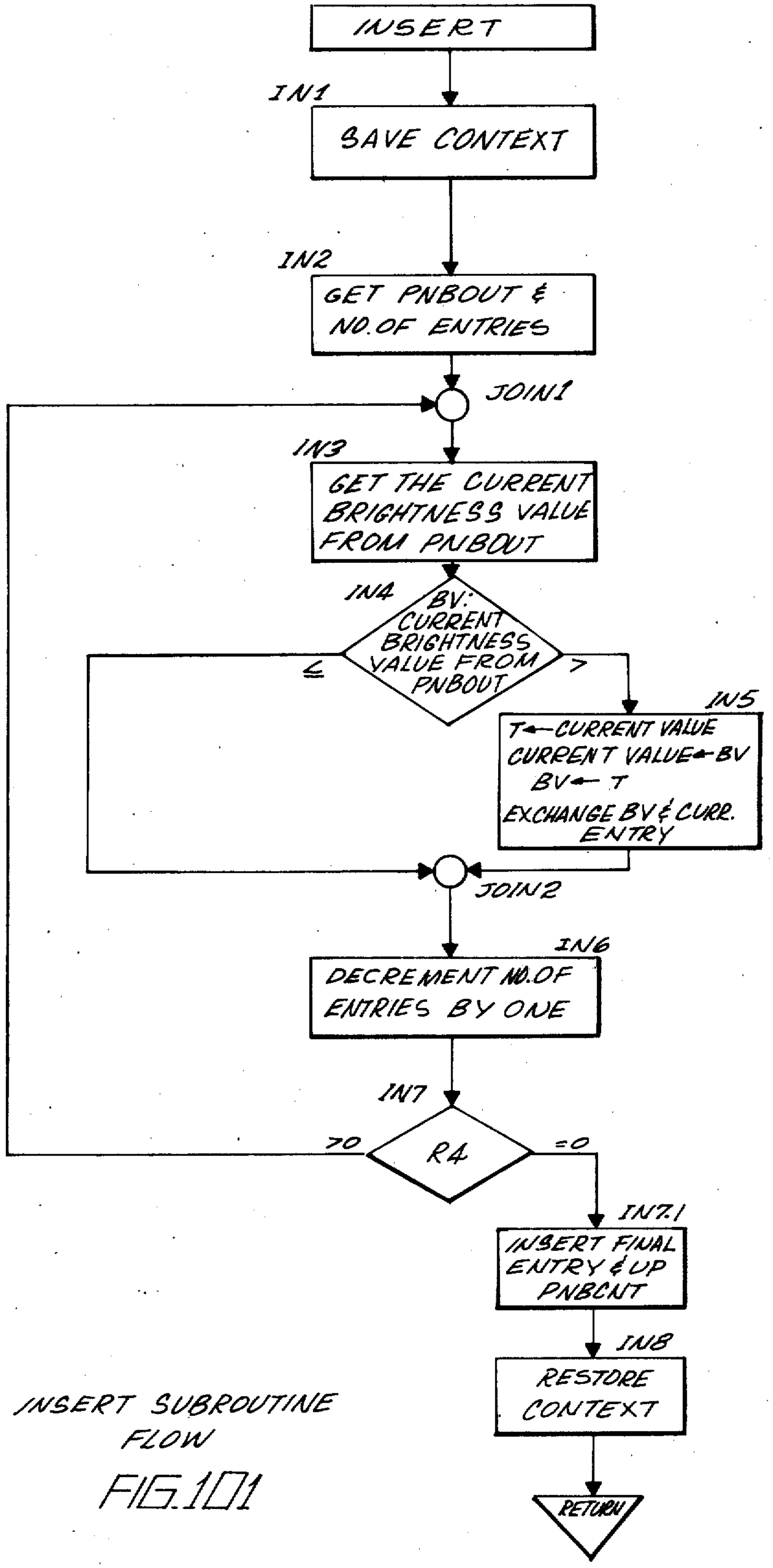
FIG. 101 is an INSERT subroutine flow diagram.

Appendix B contains the program listing for the INSERT subroutine and FIG. 101 contains the flow diagrams thereof whose flow boxes are identified by the symbols IN1-IN8.

Upon call of the INSERT subroutine, IN1 is entered. During IN1 the context of registers R0 through R4 is saved for a subsequent return to the calling program.

During IN2 the base address pointers PNBPTR and PNBCNT are obtained and stored into registers R3 and R4, respectively. The instruction MOV NOC,R2 causes the current entry number (E) contained in software register NOC to be stored into register R2. With registers R2, R3 and R4 loaded, IN3 through IN7 of the INSERT subroutine flow are ready to be carried out where the current entry number in register R2 and the brightness value BV in floating register AC1 are stored in PNBOUT. It should be noted that the two value pairs are stored as they are stored in PNBOUT so that the brightness values are in decreasing value order.

R3 points to the current (entry BV) pair to be processed. The floating point instruction LDF AC0,2(R3) causes the old brightness value in the address specified by R3 plus two addresses to be read out from PNBOUT and stored into floating point register AC0.

During IN4 the current brightness value stored in floating register AC1 is compared with the old brightness value in register AC0 using the floating point instruction CMPF. If the current brightness value (BV) in floating register AC1 is less than or equal to that of the old brightness value (BV) in register AC0, IN6 is entered directly where PNBOUT is left unaltered. If the current brightness value (BV) in register AC1 is greater than the old brightness value in register AC0, then the current one must be stored into the list in PNBOUT along with its entry number above the old brightness value (BV) in register AC0 (and the corresponding old entry number) and the list PNBOUT appropriately shifted. To this end, IN5 is entered.

During IN5 the MOV (R3), R1 causes the old entry number (E) to be read from PNBOUT and stored into register R1. The MOV R2,(R3)+ instruction causes the current entry number to be stored into the address specified by register R3 and register R3 is incremented. Thus the new entry number in register R2 (from NOC) has replaced the old entry number now contained in register R1. The instruction MOV R1, R2 causes the old entry number in register R1 to be transferred to register R2 and thereby become the current one. The floating point instruction LDF AC2,AC0 causes the old brightness value in floating register AC0 to be transferred to floating register AC2 where it is temporarily saved as the current brightness value. The floating instruction MOVF AC1,(R3)+ causes the current brightness value (BV) in floating register AC1 to be stored into the incremented address specified by register R3 at the memory location following the current entry number. Also the address in register R3 is incremented by the appropriate amount so that it now points to the next old entry number in PNBOUT. The floating instruction LDF AC1, AC2 then causes the old brightness value temporarily stored in register AC2 to be transferred to the floating register AC1.

Following IN5, IN6 of the flow is entered where the value representing the number of entries in PNBOUT is decremented by 1 to reflect that one entry number and associated brightness value in PNBOUT have been processed by the INSERT subroutine.

During IN7 the number of entries value in register R4 is checked and if greater than 0, indicating that there are more entry numbers and associated brightness values in PNBOUT to be processed, JOIN1 of the flow is reentered where the current entry number and brightness values stored in registers R2 and AC1, respectively, are processed. In this manner the entry numbers and brightness values are arranged in PNBOUT in decreasing value order by brightness value.

When the number of entries value in register R4 has been decremented to 0, IN7.1 is entered. At this point registers R2 and AC1 contain the remaining entry number and brightness value which is to be stored into PNBOUT. To this end, the MOV and MOVF instructions cause these values to be stored into PNBOUT under control of address register R3 and the INC instruction causes the number of entries value at the location specified by PNBCNT to be incremented to reflect that one additional entry number and associated brightness value has been added to PNBOUT. During IN8 the context of registers R0 through R4 is restored to allow a return to the calling program.

K. COMMAND Subroutine

Figure 103:
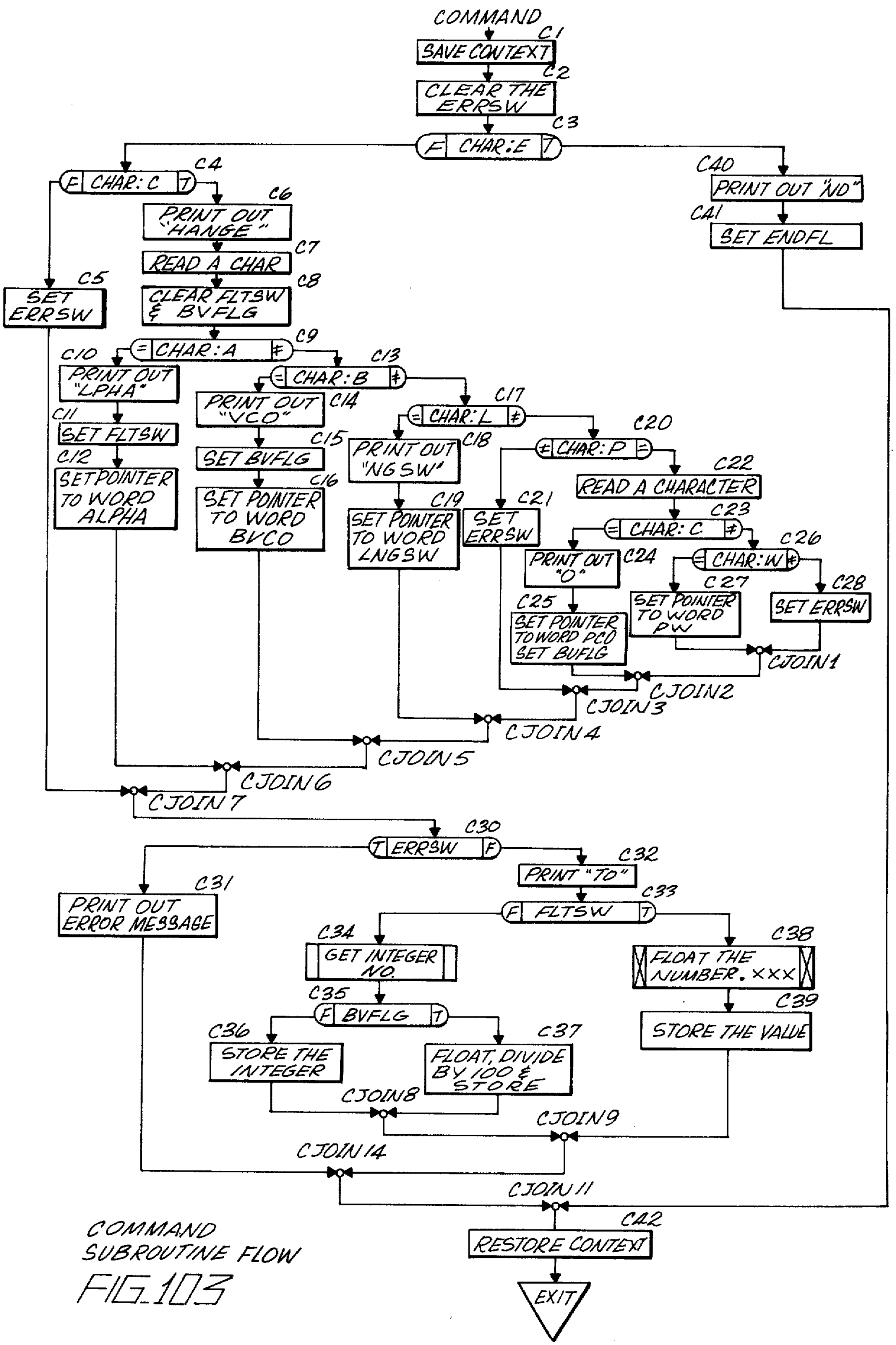
FIG. 103 is a COMMAND subroutine flow diagram.

Appendix B-10 shows the program listing for the COMMAND subroutine. FIG. 103 is a flow diagram illustrating the sequence of operation during execution of the COMMAND subroutine. FIG. 103 uses the symbols C1 through C42 to identify the various blocks in the flow diagram. Along the left hand side of Appendix B-10 the symbols C1-C42 are used to tie in the program listings to the blocks shown in FIG. 103.

Briefly, the COMMAND subroutine is provided for handling a number of housekeeping functions in connection with two commands which may be used by the requestor in presenting his request to the system. As noted above, these two commands are the "END" command and the "CHANGE" command. The items that can be changed by the CHANGE command are software globals and have been described above as $\alpha$ (alpha) used in computing length value L of Equation 11, brightness cutoff value BVCO, the length switch (LNGSW) which determines whether the length of the request is to be taken into account in determining a response, pipe width PW, and pipe cutoff value PCO.

The primary functions handled by the COMMAND subroutine are as follows: After the requestor has typed in the letter E, for the END command, the COMMAND subroutine causes the printer to type out the two additional letters ND so that the complete command word END is displayed; after the requester types the letter C, for the CHANGE command, the COMMAND subroutine causes the printer to print out the additional letters HANGE so that the complete command word CHANGE is displayed; after the complete command word CHANGE has been displayed and after the requestor types the letter A, for the word ALPHA ($\alpha$), the COMMAND subroutine causes the printer to print out the additional letters LPHA, displaying the complete word ALPHA; after the complete command word CHANGE has been displayed and after the letter B, for BVCO, has been typed, the COMMAND subroutine causes the printer to print out the additional letters VCO, displaying the complete word BVCO; after the complete word CHANGE has been displayed and the requestor has typed the letter L, for LNGSW, the COMMAND subroutine causes the printer to type out the letters NGSW, displaying the complete word LNGSW; after the complete word CHANGE has been displayed and if the requestor has typed the letters PC, the COMMAND subroutine causes the printer to type out the additional letter 0 so that the complete word PCO is displayed; after ALPHA or BVCO or LNGSW or PW (typed out in full by the requestor) or PCO has been typed by the requestor, the COMMAND subroutine automatically causes the printer to type out the message "TO"; subsequently, after the mesage "TO" has been printed out and the requestor has subsequently entered either an integer value (i.e., a percentage representing BVCO, LNGSW, PCO, PW, or a floating point value representing $\alpha$ (alpha) and the COMMAND subroutine stores them in the proper program global. These and other functions and operations of the COMMAND subroutine will be more fully explained in the following discussion.

Consider now the sequence of operation of the COMMAND subroutine, making reference to the flow diagram of FIG. 103. It will be recalled with reference to the FORMATER program flow diagram of FIG. 102C that when a requester types an E or a C, that this indicates that either the END command or CHANGE command is being entered by the requestor. It will also be recalled that such E or C is detected by the FORMATER program during F6 and calls the operation of the COMMAND subroutine.

Initially, during C1 of the COMMAND subroutine the context of the MINI COMPUTER is saved.

During C2 the switch ERRSW is cleared or reset to 0 so that it can be set to 1 later on in the event that an error is detected during the operation of the COMMAND subroutine.

During C3 et seq. the COMMAND subroutine determines whether or not an E, corresponding to an END command, or a C, corresponding to a CHANGE command, has been entered. To this end, during C3 the COMMAND subroutine reads the character typed on the typewriter and compares it with a stored representation of the character E. If the comparison results in an inequality or a false result, C4 of the COMMAND subroutine flow is entered.

During C4, the same character is compared with a stored representation of the character C and if the comparison results in an inequality, C5 is entered where the ERRSW switch is set to 1, indicating that a prohibitive condition exists, i.e., something other than an E or a C has been typed by the requestor following a beginning delimiter, since there are only two commands, namely, an END command and a CHANGE command. Following C5, JOIN 7 and C30 are entered the operation of which is discussed in more detail hereinafter.

Return now to C4 of the flow and assume that the character typed by the requestor is a C. The comparison during C4 is equal or true and C6 is entered. During C6 the PRINTR subroutine is called causing the letters HANGE to be automatically typed out by the printer so that the requestor sees the word CHANGE.

The COMMAND subroutine then waits until the requestor enters a character on the typewriter corresponding to the information that is to be changed. The item to be changed is stored in the software as a global. During C7 the GETC subroutine is called causing the next character entered by the requestor to be read. During C8 the FLTSW AND BVFLG software flags are cleared to 0 so that they can be set later on during the operation of the software. The FLTSW is a float switch which indicates if a floating point number is being read. The BVFLG is a software flag which, when a 1, indicates that a value for brightness cutoff has been entered on the typewriter and is being read.

During C9 a check is made to see whether the character read from the typewriter during C7 is an A. This is accomplished as discussed above by comparing A with a pre-stored value representing A. If the comparison results in an equality, indicating an A, C10 is entered where the PRINTR subroutine is called, causing the printer to type the additional letters LPHA, thereby displaying the complete word ALPHA. Thus far the printer has displayed the partial phrase "CHANGE ALPHA".

ALPHA is a floating point number; accordingly, during C11 the float switch FLTSW is set to 1. Subsequently, during C12 a software pointer is set to the storage location of the word ALPHA which has been reserved at the end of the FORMATER program. Following C12, CJOIN6, CJOIN7 and C30 are entered.

Returning back to C9, assume that the comparison resulted in an inequality and hence C13 is entered. During C13 the character is compared against a stored representation of the character B. If the comparison results in an equality, C14 is entered where the PRINTR subroutine is called and causes the printer to print out the letters VCO following the letter B, resulting in the displayed word BVCO. Thus at this point the words displayed by the printer are "CHANGE BVCO".

During C15 the BVFLG is set to 1, indicating that the requestor is about to enter a brightness cutoff value (BVCO). Subsequently, during C34, C35 and C37 the brightness cutoff value BVCO is read in and stored at a location BVCO reserved by the FORMATER program. During C16 a pointer is set to the memory location for the word BVCO. Following C16, CJOIN5, CJOIN6, CJOIN7 and C30 are entered.

Return now to C13 and assume that the comparison reslted in an inequality thereby indicating that the character just read is not a B. C17 is then entered where the character is compared against the stored designation for the letter L. If the comparison results in an equality, C18 is entered where the PRINTR subroutine is called causing the printer to type out the letters NGSW following the letter L, resulting in the displayed word LNGSW. At this point the operator console is displaying the words "CHANGE LNGSW".

C19 is then entered where a pointer is set to the memory location containing the word LNGSW which has been stored at the end of the FORMATER program. Space for all global variables has been reserved at assembly time at the end of the FORMATER program. Following C19, CJOIN4, CJOIN5, CJOIN6, CJOIN7 and C30 are entered.

Return now to C17 and assume that the comparison resulted in an inequality, indicating that the character is not the letter L. C20 is now entered where the character is compared aganst the stored designation of the letter P. If an inequality is detected, the character is not a P and C21 is entered where the ERRSW switch is set to 1. The ERRSW switch is set to indicate an error since the only permissible globals are A-ALPHA, B-BVCO, L-LNGSW, P-PW, or P-PCO and if an equality is not detected by C21 it indicates that some other character has been entered and hence the character entered is an error.

Following C21, CJOIN3, CJOIN4, CJOIN5, CJOIN6, CJOIN7, and C30 are entered.

Return now to C20 and assume that the comparison resulted in an equality, indicating that the character is indeed a P. It should be noted that the P might designate either a PW or a PCO global. Accordingly, C22 is entered where the GETC subroutine is called to await and read the next character entered by the requestor. During C23 the next character entered and read is compared against the stored designation of the letter C. If an equality is detected, C24 is entered where the PRINTR subroutine is called causing the printer to type out the letter O, following the letters PC. C25 is then entered, where a pointer is set to the memory location containing the word PCO which has been stored at the end of the FORMATER program. The flag BVFLG is set so that the number entered as PCO will be converted to floating point. Thus at this point the operator console displays the words "CHANGE PCO".

Following C25, CJOIN 2 through CJOIN7 and C30 are entered.

Return now to C23 and assume that the comparison resulted in an inequality, indicating that the character is not the letter C. This means that the character just read should be a W which is the next letter for PW. Accordingly, C26 is entered where a comparison is made between a stored designation for the letter W and the character which was just entered and read. If an equality is detected, C27 is entered where a pointer is set to the memory location for the word PW. At this point the printer displays the words CHANGE PW.

Return now to C26 and assume that the comparison resulted in an inequality. This means that the character typed following the letter P is something other than either a C or a W and is therefore in error. C28 is then entered where the ERRSW switch is set to 1. Following either C27 or C38,CJOIN 1 through CJOIN 7 and C30 are entered.

Drop down to C30 of the flow. During C30 the ERRSW switch is checked to see if it is a 1 or a 0. If it is a 1, a true condition exists indicating that there is an error and C31 is entered. During C31 the PRINTR subroutine is called causing the printer to type out the message "ERROR IN FORMAT". Following C31,CJOIN 14 and CJOIN11 and C 42 are entered.

Return now to C30 and assume that the ERRSW switch is in a 0 state and hence a false condition exists, indicating that the error switch has not been set and that no error exists. C32 is then entered where the PRINTR subroutine is called causing the printer to type out the word TO following the message now displayed on the printer. At this point the printer has displayed the words "CHANGE" followed by any one of the words "ALPHA" or "BVCO" or "LNGSW" or "PCO" or "PW" followed by the word "TO". The COMMAND subroutine must now read the new value to be entered on the typewriter by the requestor.

During C33 the FLTSW switch is checked to see whether it is a 1 or a 0. If it is a 0 a false condition exists and C34 is entered where the GET INTEGER subroutine is called causing an integer value to be read from the typewriter and converted from ASCII code to binary code. During C35 the BVFLG flag is checked to see if it is a 1, indicating that a BVCO value is being dealt with. If the BVFLG flag is 0, a false condition exists indicating that a BVCO value is not being dealt with, and C36 is entered where the integer which was just read is stored at the appropriate location by the software MOV command. Following C36,CJOIN 8, 9, and 11 and C42 are entered.

Return now to C35 and assume that the BVFLG flag is a 1, indicating a true condition and therefore that the entry by the requestor is a BVCO value. C37 is then entered where the BVCO value is floated and divided by 100 to convert it from a percentage value to decimal value between 0 and 1. This operation is effected by the software commands Following C37,CJOIN 8 through 11 and C42 are entered.

Return now to C33 and assume that the FLTSW flag is a 1 and accordingly a true condition exists indicating that the floating point number ALPHA ($\alpha$) has been entered on the typewriter by the requestor. C38 is entered where the GET FLOATING POINT subroutine causes the number entered by the requestor to be converted to floating point notation. It should be noted that the number will be a decimal number between 0 and 1 as are all ALPHA ($\alpha$) values. During C39 the ALPHA ($\alpha$) value, in floating point notation, is stored at location ALPHA and CJOIN9 through CJOIN11 and C42 are entered.

Return now to C3 and assume that the comparison with the character indicated that an E had actually been entered by the requestor on the typewriter and accordingly the result of the comparison was true, causing C40 to be entered. During C40 the PRINTR subroutine causes the letters ND to be typed out by the printer causing the word END to be displayed thereby indicating that an END command has been entered by the requestor on the typewriter. During C41 the ENDFL flag is set to 1, indicating that an END command has been entered and JOIN 11 is subsequently entered.

During C42 the context of the MINI COMPUTER is restored to that which existed when the COMMAND subroutine was called by the FORMATER program. Subsequently the operation of the COMMAND subroutine is exited.

L. GET INTEGER SUBROUTINE

Figure 104:
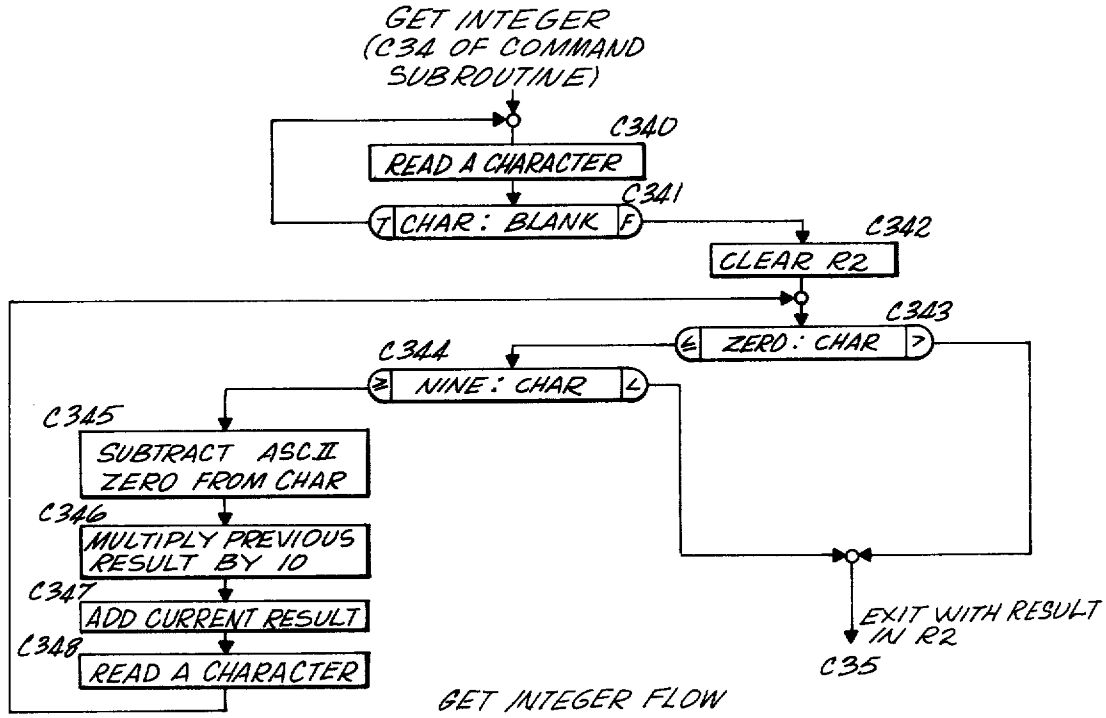
FIG. 104 is a GET INTEGER subroutine flow diagram.
Figure 105:
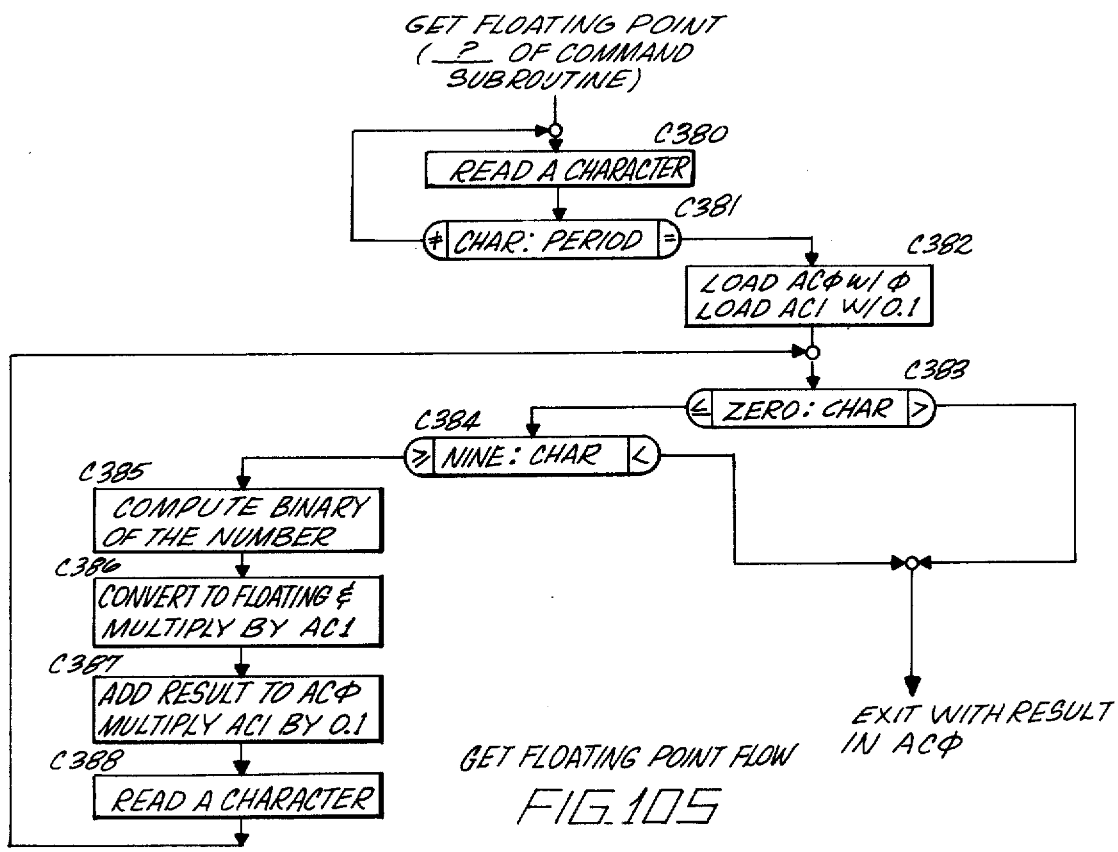
FIG. 105 is a GET FLOATING POINT subroutine flow diagram.

FIG. 104 shows a flow diagram of the GET INTEGER subroutine. FIG. 104 shows blocks C340 through C348 depicting the sequence of operation of the GET INTEGER subroutine. Towards the end of Appendix B-10, the symbols C340 through C348 are used to indicate the corresponding program listings for the GET INTEGER subroutine.

Consider now the GET INTEGER subroutine with reference to FIG. 104. The GET INTEGER subroutine is called during box C34 of the COMMAND subroutine depicted in FIG. 103. The GET INTEGER subroutine converts an ASCII coded number string into integer form. With reference to FIG. 104 during C340 the GET INTEGER subroutine reads a character from the typewriter. During C341 the character is checked against code representing a blank. If the character is a blank, nothing has been entered by the requester and C340 is reentered. This loop is continued until a non-blank character is detected during C341. When a non-blank character is detected during C341, a false condition exists causing C342 to be entered where the MINI COMPUTER register R2 is cleared ready to receive the result of the conversion of the ASCII coded number string.

During C343 the character read from the typewriter is compared with code representing 0 and if the character is less than or equal to 0, C344 is entered. During C344 the character is compared with code representing the decimal number nine and if the character is greater than or equal to 9, C345 is entered. This sequence during C343 and C344 is used to assure that the ASCII coded number character lies between zero and nine. If this condition exists, C345 will be reached; otherwise, the GET INTEGER subroutine depicted in FIG. 104 is exited back to C35 of the COMMAND subroutine (see FIG. 103) leaving a character in register R2.

During C345 et seq., the character is converted to its binary equivalent by subtracting the value representing an ASCII coded zero from the character. The ASCII coded zero is represented by the decimal number ASCII code is depicted at page B2–1 of the book entitled *Programming Languages,* published by Digital Equipment Corp., in 1972.

After the binary equivalent of the number is obtained, C346 is entered where the previous value which is stored in software register R2 is multiplied by 10 thereby shifting the value to the left one decimal position and then the current number is added to the resultant partial result.

During C347 the results of C346 are added to the result of the subtraction in C345 and the result is stored back into software register R2. During C348 the next ASC II character from the typewriter is read, the C343 through C348 are repeated in the manner discussed above. This loop is repeated as long as numbers are entered on the typewriter. As soon as a non-numeric quantity is entered, an exit will be taken from either C343 or C344 back to C35 of the COMMAND subroutine with the result of the computation in the register R2.

Summarizing, the GET INTEGER subroutine receives ASCII coded characters from the typewriter, converts the character to straight binary code by subtracting the binary code for an ASCII zero from each character to form a modified ASCII value, multiplying the modified ASCII value by 10 and adding the modified ASCII value to a previous result, if any, to form a new result. The process is described at p. 281, Vol. II of the book Seminumerical Algorithms by Knuth, published 1960 by Addison-Wisley Publishing Co.

M. GET FLOATING POINT Subroutine

FIG. 102 shows the GET FLOATING POINT subroutine flow diagram. Blocks C380 through C388 are used for depicting the sequence of operation of the GET FLOATING POINT subroutine.

Appendix B-10 has the symbol C381 depicted along the left hand side of the program listing towards the end of the COMMAND subroutine listing and identifies that portion of the COMMAND subroutine which forms the GET FLOATING POINT subroutine.

The GET FLOATING POINT subroutine is called during block C38 of the COMMAND subroutine (see FIG. 103). The GET FLOATING POINT subroutine converts an ASCII coded number string (representing a decimal number between 0 and 1) into a floating point number. When called, the GET FLOATING POINT subroutine first enters block C380 where a character is read from the typewriter of the printer. The character is compared against code representing a perod in C381. If the character is not a period, C380 is reentered. C380 and C381 are repeated until a period is detected indicating the beginning of the decimal number representing ALPHA (α). When an equality is detected during C381, C382 is entered.

During C382 floating point register AC0 is loaded with a value 0 and software register AC1 is loaded with a value representing .1. C383 and C384 of the GET FLOATING POINT subroutine are similar to C343 and C344 of the GET INTEGER subroutine in that they are provided to make sure that the ASCII character just read from the typewriter is a number and that it lies between 0 and 9. If true, i.e., the character lies between 0 and 9, C385 of the flow will be entered.

During C385 the binary equivalent of the character is computed by subtracting the ASCII code representing a 0 from the character.

During C386 the result obtained during C385 is converted to floating point and then multiplied by the value .1 contained in floating point register AC1. During C387, any partial result contained in register AC0 (first time through C387, register AC0 contains a 0) is added to the result of the multiplication during C386 and the result is stored into AC0. Also during C387, AC1 is multiplied by the value .1 contained in software register TENTH and the result is stored back into register AC1. As a result of these steps the next number processed by the GET FLOATING POINT subroutine will be, effectively, divided by 100.

During C388 the next charater is read in and C383 et seq. is repeated. This loop is repeated until the last character is read and an exit is taken from either C383 or C384 because the comparison indicates that the character just read is less than zero or greater than nine. When an exit is taken from C383 or C384, the floating point number is contained in register AC0 and block C38 of the COMMAND subroutine flow (FIG. 103) is reentered.

N. REQUEST SUBROUTINE

The REQUEST subroutine is called at F7 at the FORMATER program (FIG. 102C). F7 of the FORMATER program is entered and hence the REQUEST subroutine is called only if the first character received from the typewriter is either a sentence delimiter # or a word delimiter b̸. As a result, F7 is only entered if the FORMATER program is dealing with a request on a data base as opposed to a command.

Briefly, the REQUEST subroutine reads the characters from the typewriter and converts each character, following the delimiter, from ASCII code to absolute coded values representing the corresponding event numbers on layer 0, and stores the resultant absolute coded values into the PSTRING table in between the beginning and end delimiters (see 2211, FIG. 102A). In addition, the REQUEST subroutine calls the operation of the PARSER subroutine which performs the parsing operation, applies the piping and brightness function to the results, and stores in the output area PNBOUT (see 2213, FIG. 102A) those entries which are above the brightness cutoff value. The entries in PNBOUT are then converted one at a time into strings of numbers and words and are then printed out on the printer of the operator console.

Figure 106:
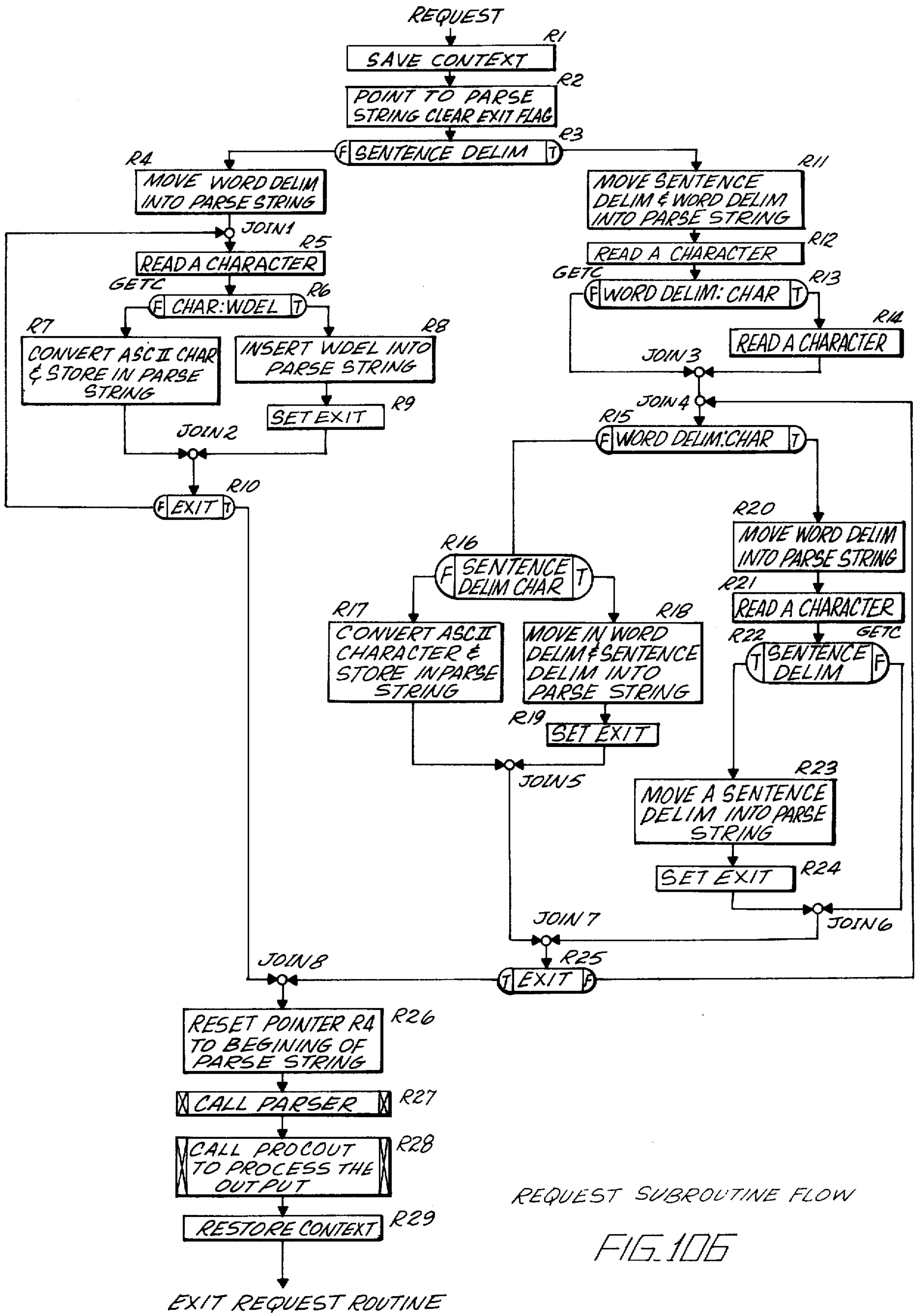
FIG. 106 is a REQUEST subroutine flow diagram.

Consider now the details of the REQUEST subroutine. Appendix B-11 is a listing of the REQUEST subroutine. FIG. 106 is a flow diagram for the REQUEST subroutine with boxes identified by the symbols R1 through R29. The relation between the program listing in Appendix B-11 and the flow diagram of FIG. 106 is indicated by the symbols R1-R29 shown along the left hand side of the program listing of Appendix B-11.

Consider now the sequence of operation with reference to FIG. 106. As discussed above, the FORMATER program calls the operation of the REQUEST subroutine during F7 (see FIG. 102C). After being called the REQUEST subroutine enters R1 of the flow. During R1 the context of the MINI COMPUTER is saved. Subsequently, R1 is entered where pointers are set up to the beginning of the parse string (PSTRING) where the values are going to be stored during operation of the REQUEST subroutine. Also during R1 the EXIT flag is reset to 0 so that it can be appropriately set to 1 to cause the REQUEST subroutine to enter R26 through R29 which are the ending steps for the REQUEST subroutine.

FIG. 117 depicts Table CVRTBL for layer 0 depicting the ASCII numbers and the corresponding layer event numbers used in the system. As indicated, all of the event numbers are located in Table CVRTBL. The coded value representing the ASCII character provided by the typewriter has the eighth bit set. This bit is stripped from the character by subtracting octal value 200 from the character converting the character to a true ASCII character.

Continuing with the flow diagram of FIG. 106, during R3 the first character obtained from the operator during F3 in the FORMATER program is checked to see whether it is a sentence delimiter. If the first character is not a sentence delimiter, then the requestor has presented a layer 0 request and R4 et seq. are entered. If the first character is a sentence delimiter, then the requestor has presented a layer 1 and R11 et seq. are entered.

Assume that a sentence delimiter is not detected, hence a false condition exists and therefore a layer 0 request is presented by the requestor at the printer. R4 is then entered. Since the first character is not a sentence delimiter, it must be a word delimiter. Therefore during R4 the word delimiter is moved into the PSTRING and R5 is entered.

During R5 the next character in sequence of the request is read from the keyboard. During R6 this character is compared with a coded value representing a word delimiter (WDEL) and if the character is not a word delimiter, R7 is entered where the character (in ASCII) is added to the base address of Table CVRTBL to find the address of the corresponding memory location which contains the corresponding layer 0 event number. In this manner the ASCII character is converted to its layer 0 event number. In addition, during R7 the layer 0 event number is stored at the next available location in the parse string (PSTRING).

Following R7, R10 is entered where the EXIT flag is checked to see if it is a 1. If it is not, a false condition exists and JOIN 1 and R5 are reentered where the next character is read from the keyboard. Following R5, R6 is again entered where the new character is compared against the stored word delimiter representation WDEL and if the character is not a word delimiter, R7 and R10 are again entered as discussed above. The loop through JOIN 1 through R10 is repeated until a word delimiter ƀ is read. When this occurs, the comparison during R6 is true and R8 and R9 are entered.

During R8 the stored word delimiter representation WDEL ƀ is stored into the parse string PSTRING as ƀ and R9 is entered where the EXIT flag is set to 1. Following R9, JOIN 2 and R10 are entered. During R10 the EXIT flag will then be found to be a 1 and therefore true, causing JOIN 8 and R26 through R29 is entered.

During R26 the pointer R4 is reset back to the beginning of the parse string PSTRING. During R27 the PARSER subroutine is called where all of the entries in the parse string which have a brightness value above that of the brightness cutoff value BVCO are stored in the output area PNBOUT. During R28 the PROCOUT subroutine is called which converts the entries in the area PNBOUT into strings of characters and words and prints out the words on the printer of the operator console. This continues until the list PNBOUT is exhausted or the requestor decides he has had enough and terminates the printout by so indicating his desire in response to the message "WANT ANOTHER ENTRY". In either case, R29 is next entered. During R29 the original context which was saved during R1 is restored and the operation of the REQUEST subroutine is exited.

Return now to R3 of the REQUEST subroutine flow and assume that the first character is a sentence delimiter, indicating a layer 1 request by the requestor. A true condition will occur and R11 et seq. will be entered.

A word delimiter ƀ always follows a sentence delimiter. Therefore, during R11 the sentence delimiter #detected during R3 and the next character in the request string, a word delimiter, are moved into sequential locations of the parse string PSTRING.

During R12 the next character in the request is read from the keyboard. The character may either be a word delimiter ƀ or a character representing a letter. Thus, R13 is entered where the character is compared with the stored representation of a word delimiter and if the comparison is true, i.e., the character is a word delimiter, then R14 is entered where the next character of the request is read from the keyboard. If the comparison is false, i.e., the character is not a word delimiter, then JOIN 3 is entered directly, skipping R14. R13 and R14 then take care of the situation where the requestor fails to enter a word delimiter following a sentence delimiter. During R11 a #ƀ are entered into PSTRING for PARSE. However, the requestor may have entered one of the following:

1. # ƀ <request>

2. # <request>

In either case by the time JOIN 4 is reached, PSTRING contains a #ƀ and R0 contains the first letter of the request.

JOIN 3, JOIN 4 and R15 are sequentially entered. During R15 the character just read from the request is compared against the stored representation of a word delimiter and if the character is not a word delimiter, a false condition exists and R16 is entered where the same character is compared against a stored representation of a sentence delimiter. If a sentence delimiter is not detected during R16, a false condition exists and this indicates that the character presently being processed is a character of the request rather than a delimiter and R17 is entered. R17 is similar to R7 in that the character, in ASCII code, is converted to the corresponding event number and is stored in the next sequentially available location in the parse string PSTRING. It should be noted that the character represents a letter no matter whether this is a word layer 0 or a sentence layer 1 request.

Following R17, JOIN 5, JOIN 7 and R25 are sequentially entered. During R25 the EXIT flag is checked to see if it is a 1. If it is, then R26 through R29 are entered. To be explained in more detail, if the EXIT flag is a 0, then a false condition exists during R25 and JOIN 4 and R15 et seq. are reentered.

Return now to R15 and assume that the comparison reveals that the character just read from the request is a word delimiter and a true condition exists. R20 is subsequently entered where the word delimiter is moved into the next sequential location of the parse string PSTRING. During R21 the next character of the request is read from the keyboard. During R22 a check is made to see whether the character just read is a sentence delimiter. If the character is not a sentence delimiter, then JOIN 6, JOIN 7 and R25 are entered. If the EXIT flag is a 0, the condition during R25 is false and JOIN 4 and R15 are then reentered. This occurs when the REQUEST subroutine has just processed one word and since this is a sentence or layer 1 request, there may be another word in the request.

Return now to R22 and assume that a sentence delimiter is detected, causing a true condition. Under these conditions R23 of the flow is entered where the sentence delimiter is moved into the parse string PSTRING. Subsequently during R24 the EXIT flag is set to a 1 indicating that the REQUEST subroutine has now detected the END character of a sentence layer 1 request. Subsequently, JOIN 6, JOIN 7 and R25 are entered. This time during R25 the EXIT flag is in a 1 state, causing a true condition and therefore R26 through R29 are entered.

Return now to R15. Assume that the comparison is false and therefore the character just obtained from the keyboard is not a word delimiter. R16 is then entered. Assume that during R16 the comparison is true, indicating that the character is a sentence delimiter. This condition will occur if the requestor has finished a request and, instead of placing a word delimiter at the end of the last word, he has placed only a sentence delimiter. Under these conditions, R18 is entered where a word delimiter and a sentence delimiter are moved into the parse string PSTRING. Following R18, R19 is entered where the EXIT flag is set to 1, indicating the end of the sentence layer 1 request. Following R19, JOIN 5, JOIN 7, R25, JOIN 8, and R26 through R29 will then be entered.

In summary, during R26 through R29, the PARSER subroutine is called which returns the results which are in the software area PNBOUT. The output area PNBOUT will contain a list of the entries in layer 1 if a sentence layer 1 request has been made, or a list of entries in layer 0 if a word layer 0 request has been made. The word or sentence entries in PNBOUT are possible responses to the request. It should also be noted that the possible responses to the request left in the area PNBOUT by the PARSER subroutine are ordered from highest brightness value to lowest brightness value.

During R28 the PROCOUT subroutine is called which ultimately causes the printer of the operator console to type out the results stored in PNBOUT. After the PROCOUT subroutine is complete, R29 is entered where the context of the MINI COMPUTER is restored and the REQUEST subroutine exits back to the FORMATER program where the next entry is requested.

O. PROCOUT (PROCESS OUTPUT) SUBROUTINE

The PROCOUT subroutine is called during R28 of the REQUEST subroutine (see FIG. 106). The PROCOUT subroutine takes the entries that have been placed in PNBOUT by the PARSER program and generates the response, which causes a response on the printer of the operator console.

The printer displays letters; therefore, a sequence of ASCII coded signals representing letters must be sent to the printer. Therefore, if a layer 0 request has been made by the requestor, the PROCOUT subroutine takes the entries in PNBOUT which represent words and signals are sent to the printer so as to print out words, a letter at a time. If a layer 1 request has been made, the entries in PNBOUT are sentences, the PROCOUT subroutine takes the entries in PNBOUT and generates signals representing a series of letters again for printing letter at a time.

Since the data is arranged in layers it is necessary to utilize a number of tables in order to regenerate the data from the layers. These and other aspects of the PROCOUT subroutine will become evident in the following discussion.

Referring now to FIGS. 102A and 102B, when the PROCOUT subroutine is called by the REQUEST subroutine, the PARSER subroutine has completed the area PNBOUT. PNBOUT contains the possible responses to the request in the form of entry value (E) and brightness value (BV) pairs ordered from highest brightness value to lowest brightness value.

PROCOUT then causes the rest of the steps depicted in FIGS. 102A and 102B following PNBOUT to take place. More specifically, the PROCOUT subroutine responds to a layer 0 request and outputs one entry, i.e., one word, at a time, serially by letters, until either the number of entries in PNBOUT is exhausted or until the requestor indicates that he does not want any further responses, by typing an "N" in response to the question: "WANT ANOTHER ENTRY?". The PROCOUT subroutine responds to a layer 1 request and outputs one entry at a time, i.e., one sentence at a time, serially by letters, until PNBOUT is exhausted or until the requestor again indicates that he does not want further responses.

Table G1 is a series of entries each containing three words, the first word containing the entry number (E), the second word containing the ending delimiter (ED) for the corresponding entry, and the third word containing two bytes. The first of the two bytes contains an accumulated length value (AL) which identifies the smallest occurrence value (event time) at the beginning of the corresponding entry, and the second byte containing the length or number of occurrence values (L) in the corresponding entry. Table G2 has a similar construction to that of Table G1.

Figure 108:
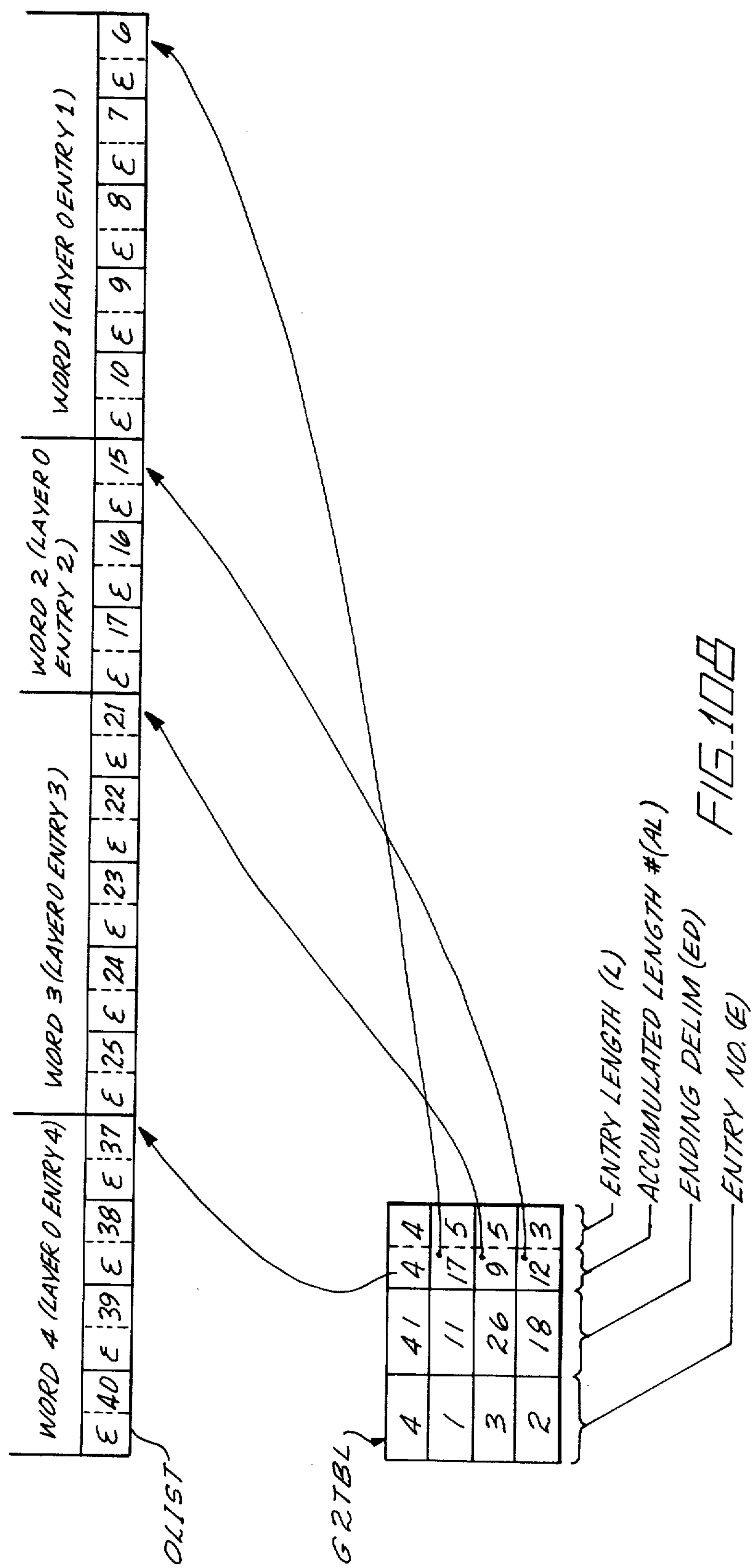
FIG. 108 is a sketch giving an example and illustrating the correspondence between G2TBL table and the OLIST list.

A better understanding of the construction of Tables G1 and G2 can be understood with reference to FIG. 108 for Table G2. FIG. 108 is a sketch giving an example and illustrating the correspondence between the G2 table and the OLIST list. OLIST is an area in MAIN MEMORY in which information is stored just prior to output by the PROCOUT subroutine. OLIST contains a series of two value pairs, the first value of the pair representing an event number on layer 0 and the second of which represents an occurrence value (event time). The two value pairs are arranged in descending value by occurrence value from left to right as seen in FIG. 108. Because of the sequence with which data is entered into the data base it is necessary to return the information from the data base in descending order by occurrence value.

Returning to the purpose of the table G2 the accumulated length value (AL) is a pointer to the two value pairs in OLIST. Specifically, each accumulated length value identifies the two value pair containing the smallest occurrence value within the corresponding entry or word. For example, entry 1 contains an accumulated length value 4 identifying the fourth two value pair from the left end of OLIST in FIG. 108. The entry length identifies the number of two value pairs contained in OLIST for the corresponding entry. Thus, it will be seen that entry 4 of OLIST contains four two value pairs.

Figure 107:
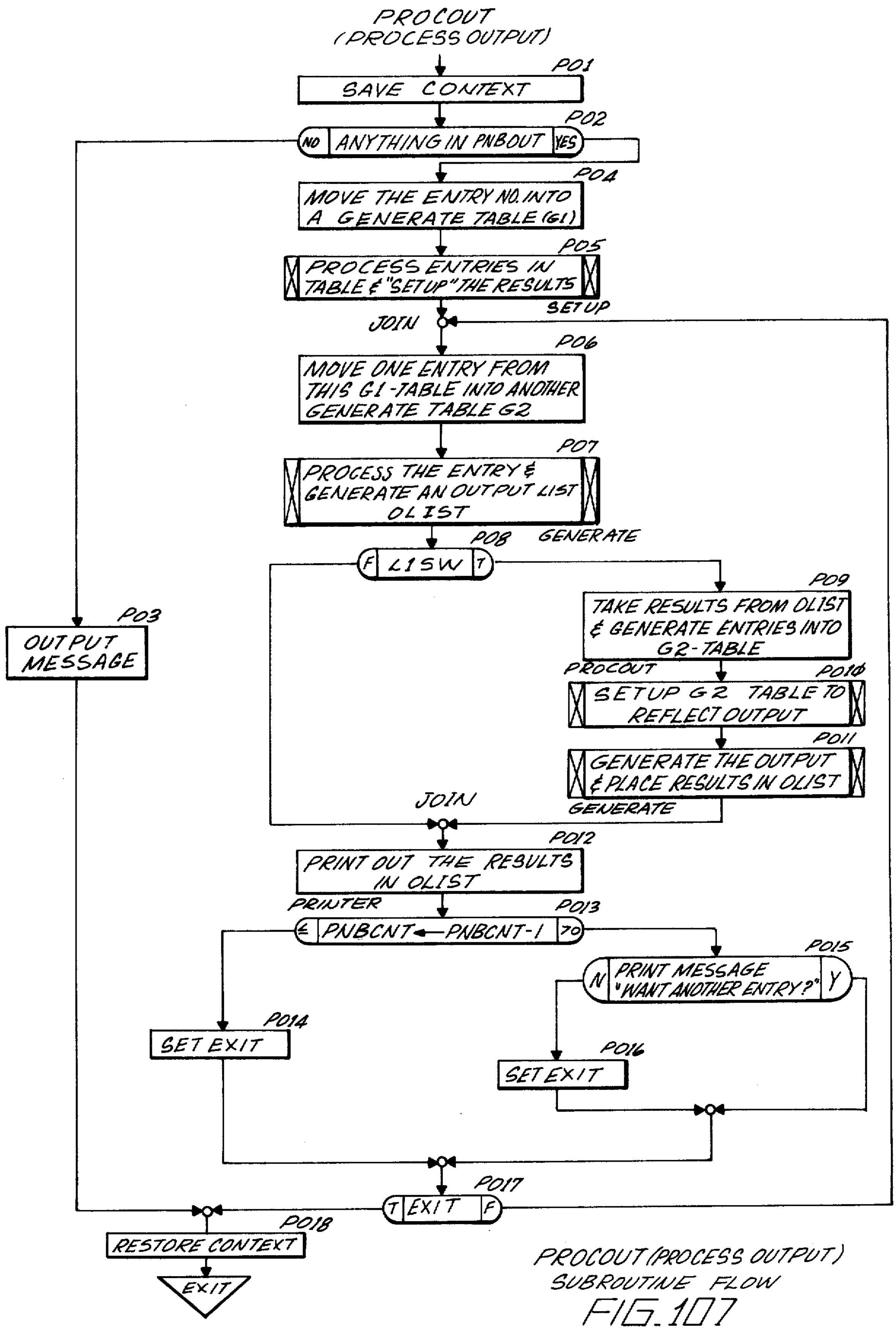
FIG. 107 is a PROCOUT (Process Output) subroutine flow diagram.

With the foregoing in mind consider the details of the PROCOUT subroutine. Appendix B-12 contains a program listing for the PROCOUT (PROCESS OUTPUT) subroutine. FIG. 107 contains a flow diagram illustrating the sequence of operation of the PROCOUT subroutine. FIG. 107 identifies the various boxes of the flow diagram by the symbols P01 through PO18. Correspondence between the program listing of Appendix B-12 and the flow diagram of FIG. 107 is shown along the left hand side of Appendix B-12 where the labels PO1-PO18 of FIG. 107 are shown.

Refer now to the sequence of operation with reference to FIG. 107. During PO1, the context of the MINI COMPUTER is saved in the manner described above so that it can return to the REQUEST subroutine. During PO2, the PROCOUT subroutine determines whether anything is contained in MAIN MEMORY area PNBOUT. If PNBOUT contains all 0's, and therefore is empty, PO3 is entered where the PRINTR subroutine is called causing the printer of the operator console to type out the message "NO HITS FOUNDS". Following PO3, the JOIN and PO18 are entered. During PO18 the context of the MINI COMPUTER is restored to that existing when the PROCOUT subroutine was called.

Return now to PO2 and assume that PNBOUT does not contain 0's and therefore there is something to be output by the PROCOUT subroutine.

Speaking generally the fist step is to take the entry numbers in PNBOUT and move them over to Table G1 and at the same time zero out the second and third words for each entry as indicated at 2202 in FIG. 102A.

During PO5 the SETUP subroutine is called by the PROCOUT subroutine. The SETUP subroutine goes through the data base delimiter line for the layer corresponding to the request, computes the length of each entry and determines the length accumulated from the beginning of OLIST to the first event of each entry. The SETUP subroutine also fills in the last two words for each entry in Table G1, utilizing the values determined for each entry.

Following PO5 the JOIN and PO6 are sequentially entered. During PO6 one of the three word entries is moved from Table G1 to Table G2. The PROCOUT subroutine marks the fact that Table G2 is only of length 1 by moving the value 1 to register R3, and PO7 is entered.

During PO7 the PROCOUT subroutine calls the GENERATE subroutine which forms OLIST in the manner described with reference to the FORMATER program.

During PO8 the L1SW software switch is checked. The L1SW switch, if 0, indicates a layer 0 request, and if 1, indicates a layer 1 request. If the L1SW switch is a 0, a false condition exists and the JOIN and PO12 are entered directly.

If the L1SW switch is a 1, and hence a true condition exists, PO9 is entered to process a layer 1 request. Reference should now be made to FIG. 102B which depicts the sequence of operation for a layer 1 request. The OLIST generated during PO7 for a layer 1 request is depicted at 2241. The OLIST contains event numbers for layer 1 identifying entries or words in layer 0. During PO9 the PROCOUT subroutine takes the layer 1 event numbers from OLIST and from this generates a new Table G2, depicted at 2242. The new table G2 will contain each of the entry numbers in layer 0 corresponding to the event selected from OLIST for processing. In addition the PROCOUT subroutine zeros out the second and third words for each of the 3 word entries.

PO10 is then entered where the SETUP subroutine is called. Similar to PO5, the SETUP subroutine goes through each event in the new Table G2, determines the ending delimiter (ED) for each event, determines the accumulated length (AL) to the smallest occurrence value for each entry, determines the length (L) of each entry, and places this information in association with each entry number in Table G2 as depicted at 2243.

PO11 is now entered where the GENERATE subroutine is again called. The GENERATE subroutine now goes through all of the entries in Table G2 and generates OLIST as depicted at 2245 which contains a series of layer 0 event number and occurrence value pairs, all as described with reference to the FORMATER program. The resultant OLIST is depicted at 2245. The relation between Table G2 at 2243 and OLIST at 2245 is similar to that depicted in FIG. 108.

Following PO11 the JOIN and PO12 are entered where the PRNTC (Print a character) is called repeatedly and the sentence is typed out by the printer at the operator console. Briefly, the PROCOUT subroutine goes through the OLIST depicted at 2245. It gets the character and calls subroutine PRNTC which sends the printer as ASCII coded character for each event in OLIST, 2245. To this end and with reference to FIG. 108 the first entry is 4, the accumulated length is 4, and its entry length is 4. Therefore the accumulated length value of 4 is added to the base address of OLIST and then the four events or characters in the entry are converted to ASCII code and printed out in descending value order of event, moving from right to left.

After having printed out the entire entry PO13 is entered.

PNBCNT is initially set with the number of entries in the list PNBOUT. During PO13 the value in PNBCNT is decreased by 1 to reflect that one of the entries in PNBOUT has been processed. When PNBCNT reaches 0, all of the entries in PNBOUT have been processed and PO14 is entered where the EXIT flag is set to 1 and PO17 is entered.

If PNBCNT is not 0, then PO15 is entered following P013, causing the PRINTR subroutine to be called which prints out the message "PRINT ANOTHER ENTRY". This is a signal to the requestor to either enter a Y for yes or a N for no further requests. If the requester enters a Y for yes, the two JOINs and PO17 are sequentially entered. If the resistor strikes an N for no, PO16 is entered where the EXIT flag is set and the two JOINs and PO17 are entered.

During PO17, the EXIT flag is checked and if 0, i.e., false, then the JOIN and PO6 are entered where the next layer 1 entry in Table G1 at 2237 is moved into Table G2 as depicted at 2239. If the EXIT flag is 1, indicating a true condition, then PO18 is entered where the context of the MINI COMPUTER is restored to that existing when PROCOUT was entered and the PROCOUT subroutine is exited.

P. SETUP SUBROUTINE

The SETUP subroutine is called by the PROCOUT subroutine during PO5 and PO10 (see FIG. 107). The SETUP subroutine takes the Tables G1 or G2 in the form depicted at 2215 of FIG. 102A and 2235 and 2242 of FIG. 102B and fills in the ending delimiter (ED), the accumulated length (AL), and the entry length (L) (see 2217, FIG. 102A and 2237, 2243 of FIG. 102B.

Figure 109:
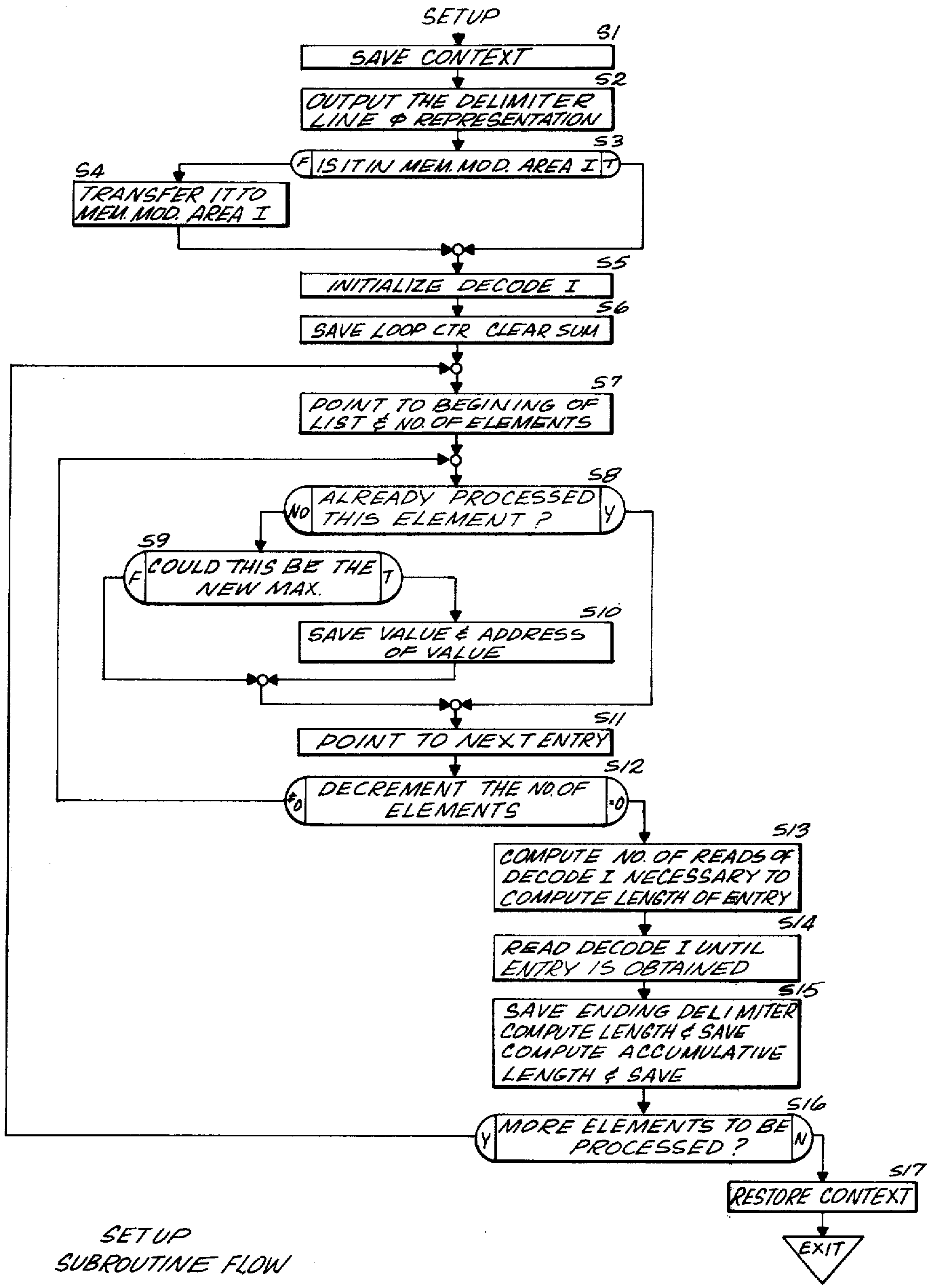
FIG. 109 is a SETUP subroutine flow diagram.

The program listing for the SETUP subroutine is depicted in Appendix B-13. FIG. 109 is a flow diagram for the SETUP subroutine showing boxes S1 through S17 to depict the sequence of operation. The correspondence between the listing of Appendix B-13 and the flow diagram of FIG. 109 is shown along the left hand side of Appendix B-13 using the symbols S1 through S17.

Consider now the sequence of operation with reference to the flow diagram of FIG. 109. During S1 the context of the MINI COMPUTER is saved so that it may return to the PROCOUT subroutine upon completion of the SETUP subroutine.

The beginning and ending delimiter for the entries in the Tables is determined from the delimiter for the layer being processed. Accordingly, it is necessary to generate the line 0 representation from the seed representing the delimiter.

To this end, S2 of the SETUP subroutine flow is entered where the OUTPUT subroutine is called, causing line 0 of the delimiter to be formed.

MEMORY MODULE area 1 is the area from which the DECODE I MODULE converts information from hybrid code to absolute coded occurrence values. Therefore it is necessary that the line 0 representation of the delimiter be stored in MEMORY MODULE area 1. To this end, S3 of the flow is provided to determine whether software register DOAR identifies MEMORY MODULE area 1. If it does, then the flow proceeds through the JOIN to S5 directly, bypassing S4. If DOAR contains a value identifying some other MEMORY MODULE area, then the condition during S3 is false, and S4 is entered.

During S4 the line 0 representation of the delimiter is transferred into MEMORY MODULE area 1. Following S4 the JOIN and S5 are entered.

During S5 the DECODE I MODULE is initialized. To this end the length of the delimiter stored in MEMORY MODULE area 1 is transferred from software register DOLN through the DATA0 of the DPM INTERFACE MODULE to register LN1 of the IPRF. In addition, D1NIT of the STATUS register is set to 1 and the DCOPDE 1 subroutine is called causing the DECODE I MODULE to provide the first occurrence value from the delimiter in MEMORY MODULE area 1 and the value is stored in software register TDI.

Previously during the PROCOUT program the length of the Table G1 or G2 is stored into hardward register R3 of the MINI COMPUTER. During S6 of the SETUP subroutine the length of the table is transferred from register R3 to software register WOLN where it is saved and a software register SUM is cleared or set to 0. To be explained in more detail, the software register SUM is used to keep the accumulated length value which is stored into the G1TBL and G2TBL.

During S8 through S12 the Table G1 or G2 is scanned for those entries which have not been processed as yet and therefore do not have an ending delimiter (ED), an accumulated length value (AL) and an entry length value (L). During the scanning process the missing values are filled into the table, one at a time moving from the largest entry value to the smallest entry value.

To this end, S8 is now entered where the first entry in the table is checked to see whether it has been processed. It will have been processed if the missing values have been filled in and this is determined by determining whether the ending delimiter value is present in the table. If the ending delimiter value is present in the entry of the table being checked, then a YES condition exists and the JOIN and S11 are entered from S8. If, on the other hand, the ending delimiter value is missing and therefore the entry has not been processed, S9 is entered.

Register R1 is cleared to 0 during S7 and is used to store the maximum entry value that has not yet been processed.

During S9 the entry number being scanned in the table is compared with the maximum entry number being saved in register R1. If the entry number from the table is greater, then a true condition exists and S10 is entered from S9. If the entry value from the table is not larger, a false condition exists and the SETUP routine goes through the two JOINs to S11. During S10 the table address of the new maximum entry number is saved from register R2 in register R4.

During S11 register R2 is set so it points to the next entry in the table. Also the value representing the number of elements processed contained in register R3 is decremented by one during S12. If the decremented number of elements value is not equal to 0, then the SETUP subroutine returns through the JOIN to S8 where the next entry value in the table is checked to see whether it is the maximum entry value. The loop through S8 through S12 is repeated until all of the elements in the table have been checked for maximum. When the number of elements value in register R3 has been decremented to 0, then S13 is entered following S12.

During S13 the table address containing the maximum entry is contained in register R4; the maximum entry value is contained in register R1. The SETUP subroutine now computes the number of reads necessary to reach the beginning and ending delimiters of the entry. Since every entry in the layer has an ending delimiter, the number of reads is equal to the number of occurrences in the delimiter line. Thus, for example, if there are four entries, as depicted for entry 4 in FIG. 108, there are five occurrences in the delimiter line. One delimiter identifies the beginning of the data base and the remaining four delimiters mark the beginning of the four entries in entry 4. Therefore the number of reads necessary is obtained by taking the difference between the entry numer and the number of occurrences in line 0 and the result is stored into software register DNOC during S13.

During S14 the DCODE1 subroutine and hence the DECODE I MODULE are repeatedly called, causing the DECODE I MODULE to provide the actual occurrence values from the delimiter contained in MEMORY MODULE area 1 and the number of elements value in register R3 is decremented for each call until the content of register R3 is 0. On each read the delimiter provided by the DECODE I MODULE is stored into software register TD1.

During S15 the ending delimiter is moved from register TD2 into the second word of the table corresponding to the entry being processed. This is actually done during S15 where the MOV TD1, TD2 instruction saves the previous beginning delimiter which becomes the current ending delimiter.

The length of the entry is then stored into the third word of the table corresponding to the entry being processed. Also during S15 the difference is taken between the content of software registers TD1 and TD2 and decrementing this by one, resulting in the length of the entry being processed. The accumulated length from the beginning of the entry being processed is determined by adding the computed length to the content of the SUM software register. The resultant content of the SUM register is then the accumulated length value and is moved into the third word of the table corresponding to the entry being processed. Thus during S15 the ending delimiter, the accumulated length value, and the entry length value are added to one of the entries in the table G1 or G2 (see FIG. 108).

S16 is now entered where the length of the table (stored in software register WOLN during S6) is checked to see whether it is 0. If it is not 0, indicating that there are more elements in the table to be processed, a YES condition exists and the SETUP subroutine goes back through the JOIN to S7 where the loop through S7 through S16 is repeated. The loop through S7 through S16 is repeated for each of the remaining entries in the table thereby filling out the table. When S16 is entered and WOLN has been decremented to 0, a NO condition exists and S17 is entered where the context of the MINI COMPUTER is restored back to that existing when the PROCOUT program called the SETUP subroutine and the operation of the SETUP subroutine is exited.

Q. GENERATE SUBROUTINE

Figure 110:
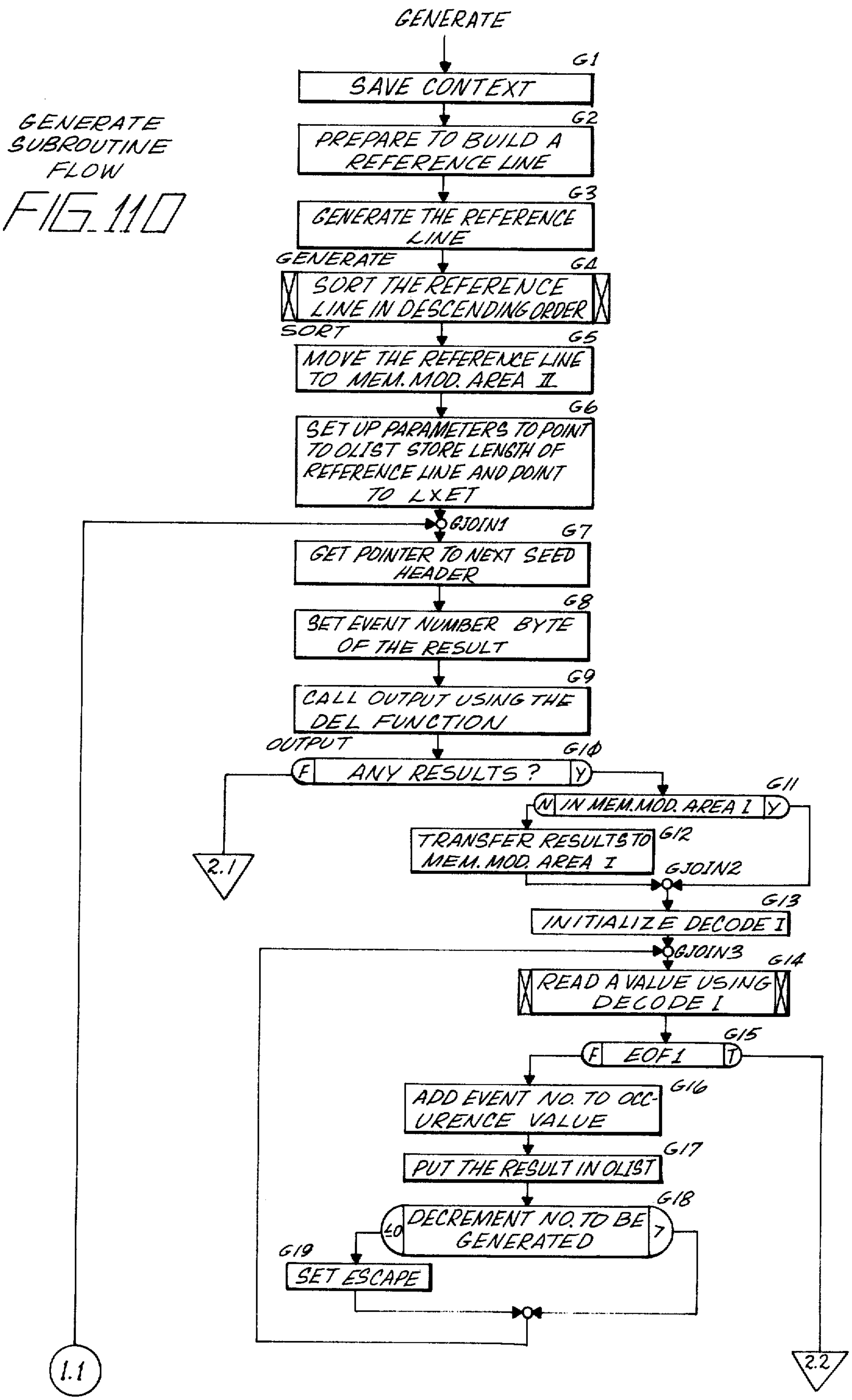
FIGS. 110 and 111 form a GENERATE subroutine flow diagram.
Figure 111:
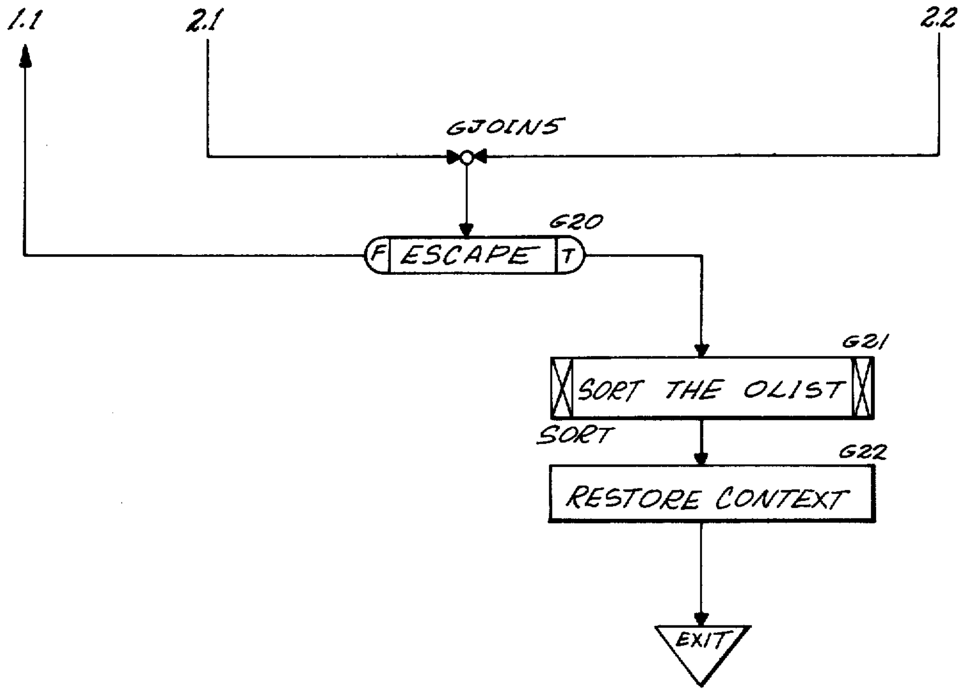

The PROCOUT subroutine calls the GENERATE subroutine during PO7 and PO11 (see FIG. 107). The GENERATE subroutine forms OLIST depicted at 2221 of FIG. 102A and 2241 and 2245 of FIG. 102B using table G2. The program listing for the GENERATE subroutine is shown in Appendix B-14. A flow diagram of the GENERATE subroutine is shown in FIG. 110. Boxes G1 through G22 depict the sequence of operation of the GENERATE subroutine. The correspondence between the program listing and the flow diagram is depicted along the left hand side of Appendix B-14 using the symbols G1 through G22 of FIG. 110.

Consider now the sequence of operation during the GENERATE subroutine operation. After being called, G1 of the flow is entered where the context of the MINI COMPUTER is saved so that it will return to the same state of the PRODOUT subroutine where entry to the GENERATE subroutine was made. During G2, preparation is made to form a reference line in the MAIN MEMORY area known as WAREA. The reference line in area WAREA is formed by taking the ending delimiter for a particular entry in table G1 or G2 minus 1 and sequentially decreasing the value, forming as many decreased values as designated by the entry length for the corresponding entry in the table G1 or G2. The series of decreased occurrence values are stored in WAREA. These occurrence values are the occurrence values in the data base for the entry being processed. Thus, for example, for entry 4 of FIG. 108 the beginning delimiter 41 is decremented to form decremented possible occurrence value 40 and is subsequently decremented three additional times, forming the actual occurrence values 40, 39, 38 and 37. These actual occurrence values are stored into WAREA. This same process is repeated for each of the other entries in Table G1 or G2. At this point the possible occurrence values are not in decreasing value order. For example, using FIG. 108 by way of example, possible occurrence values 40 through 37 would be followed by possible occurrence values 10 through 6 which would be followed by possible occurrence values 24 through 21 which would be followed by possible occurrence values 17 through 15.

Therefore, G4 of the flow is entered where the SORT subroutine is called and the possible occurrence values are sorted into a continuous string of occurrence values in descending order value.

During G5 the reference line is moved to DPM MEMORY MODULE area 2.

During G6 software registers ENUMB and ESCAPE are cleared. The address of OLIST is placed in register 2(R2) and the length of the reference line is moved to R3. R4 is set to point to LOET/L1ET depending upon whether this is a layer 0 or a layer 1 request. The TST instruction steps R4 past the pointer to the delimiter seed header.

G7 is next entered where the address of the seed header (LXET, i.e., LOET for layer 0 or L1ET for layer 1) is transferred to register R0 and the address of the beginning of memory area WOAR is stored into register R1.

At this point all occurrence values for the entries contained in Table G1 or G2are contained in WAREA. It is now necessary to find out which events have those occurrence values in the data base. This is done using each of the events in the layer. More specifically, this is accomplished by going down through the corresponding data base layer to find out if there is an actual occurrence value for each event in the data base (at its line 0 or input line) corresponding to each possible occurrence value in WAREA. The DEL function is utilized for accomplishing this task.

To this end, G7 of the flow is entered where the seed header address stored in R4 during G6 is incremented and stored into register R0.

During G7 the number of the MEMORY MODULE area containing the event seed is stored in register R1. During G8 the current event # is obtained in the left byte of ENUMB. During G9 the OUTPUT subroutine is called causing it to perform the DEL function wherein the actual occurrence value present for each event identified by the reference line is determined. The OUTPUT subroutine returns a two word value, the first word being the number of the MEMORY MODULE area containing the output seed and this is stored into WOAR and the length of the result which is stored into WOLN.

G10 is then entered where the length of the result stored in WOLN is checked. If 0, no actual occurrence values exist in the data base in the reference line for his event, causing JOIN 5 of the flow to be entered directly. If the length of the result is other than 0, such actual occurrence values do exist, and G11 of the flow is entered.

During G11 a check is made to see whether the results are stored in MEMORY MODULE area 1 (this is true when register R1 contains the value 1). Again it is necessary to have the results in MEMORY MODULE area 1 in order for the DECODE I MODULE to convert the hybrid coded form of the result to absolute coded form. If the result is not in MEMORY MODULE area 1, a NO condition exists and G12 of the flow is entered where the results are transferred to MRMORY MODULE area 1 and JOIN 2 an G13 are sequentially entered. If the results are already in MEMORY MODULE area 1, then a YES condition exists and JOIN 2 and G13 of the flow are sequentially entered.

During G13 the DECODE I MODULE is initialized by moving the length of the result from the address designated by register R1 to LN1 of th IPRF in the DPM INTERFACE MODULE and by setting D1INIT of the STATUS REGISTER to a 1 state.

During G14 through G19, the results of the DEL operation are stored in association with the corresponding event number into OLIST, forming a series of two value pairs as depicted in FIG. 108. During G14 of the DECODE I subroutine is called causing one absolute coded actual occurrence value to be provided from the hybrid coded result in MEMORY MODULE area 1. During G15, EOF1 in the DECODE I MODULE is checked to see whether it is 1, or true, thereby indicating that the end of the result field has been reached, or whether it is 0, or false, thereby indicating that the end has not been reached.

Assume that the end of the file for the results has not been reached by the DECODE I MODULE and therefore G16 is entered. During G16 the entry number is stored on the left side of and in association with the actual occurrence value obtained during G14. To this end, during G17 the pair of values is stored in OLIST in the address specified by register R2.

During G18 the content of R3, the total number of two value pairs to be stored in OLIST (originally stored in R3 during G6 (MOV WOLN, R3), is decremented by 1 to indicate that one event has now been stored in OLIST. Additionally a check is made to see whether the content of register R3 is equal to or less than 0. If the content of register R3 is equal to or less than 0, then G19 is entered where the ESCAPE flag is set to 1 and the flow passes through the two JOINS back to G14. If, on the other hand, the content of register R3 has not been decreased to 0, and is therefore greater than 0, G19 is bypassed so that G14 is entered directly. The loop through G14 through G18 is repeated until during G15, EOF1 is 1 and therefore the end of file is detected at which time JOIN 5 and G22 are entered.

During G20 the ESCAPE flag is checked and if it has not been set to 1, a false condition exists, causing JOIN 1 and G7 of the flow to be reentered. This causes the next event seed in the same layer to be obtained and processed as described above. This operation is repeated until, during G18, the content of R3 has been reduced to 0, indicating that all entries in OLIST have been processed, in which case G19 will be entered where the ESCAPE flag is set. The following pass through G20 will cause G21 to be entered where OLIST is again sorted so that the two value pairs are sorted in descending value order by event occurrence value. OLIST will then contain a series of two value pairs (or bytes) the left one of which contains the event number and the right one of which contains the corresponding event occurrence value.

Tables G1 or G2 in conjunction with OLIST are then used to cause OLIST to be printed out in the manner described hereinabove.

During G22, context is restored and control returns to PROCOUT.

R. SORT SUBROUTINE

The SORT subroutine is called during G4 and G21 of the GENERATE subroutine (see FIG. 110). The purpose of a SORT subroutine is to sort the content of OLIST so that the event occurrence values are ordered in descending value order. It will be recalled with reference to FIG. 108 that OLIST contains a series of word entries and each word entry contains a value pair (byte), the first of which is an event number and the second of which is an actual occurrence value from the corresponding layer of the data base.

Figure 112:
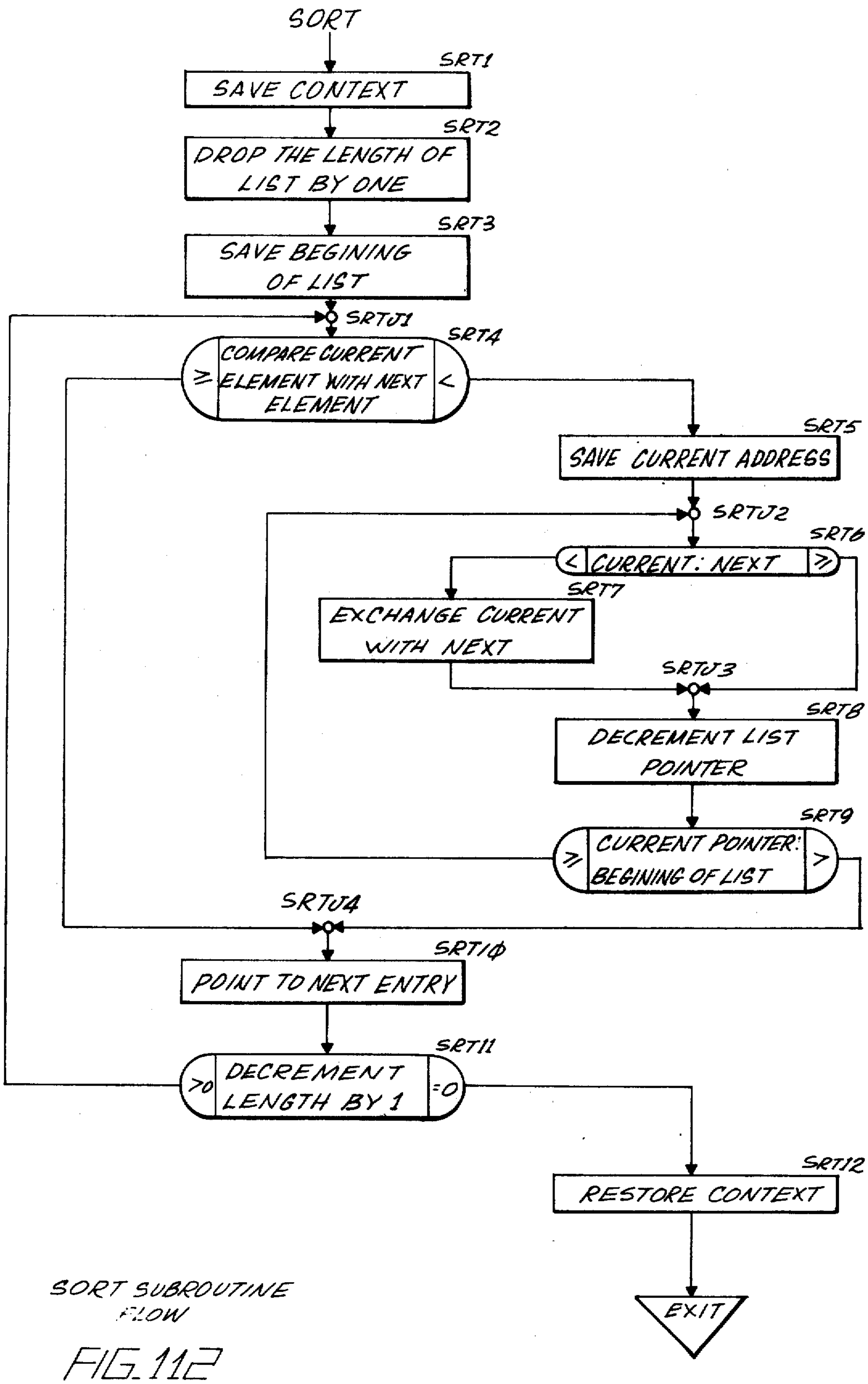
FIG. 112 is a SORT subroutine flow diagram.

The program listing for the SORT subroutine is shown in Appendix B-15. FIG. 112 shows a flow diagram of the SORT subroutine. Boxes SRT1–SRT12 are shown in FIG. 112 to identify the various steps in the SORT subroutine operation. The correspondence between the SORT subroutine program listing and the SORT subroutine flow diagram is shown along the left hand side of Appendix B-15 where by symbols corresponding to the boxes of FIG. 112 are shown.

The sort is a bubble type of sort in that the content of OLIST is scanned, a value pair at a time, and when an event occurrence value is found in a value pair which is larger than that of a preceding one, that value pair is moved up in OLIST to the appropriate relative position.

Referring now to the SORT subroutine flow diagram of FIG. 112, during SRT1 the context of the MINI COMPUTER is saved so that a return can be made to the GENERATE subroutine at the place where it is exited.

The GENERATE subroutine initially sets the register R0 to the number of value pairs contained in OLIST which are to be sorted. During the sort process the SORT subroutine will be comparing a current occurrence value from OLIST with the next occurrence value in OLIST and therefore it is necessary to have a pointer corresponding to the next value in OLIST which is being compared. To this end, during SRT2 the length value in R0 is decremented by 1.

The MINI COMPUTER register R1 contains the beginning address of OLIST (having been set there by the GENERATE subroutine) During SRT3, the beginning address of OLIST is moved from register R1 to R2 where it is saved.

Following SRT3 the JOIN SRTJ1 and SRT4 of the flow are entered. During SRT4 the instruction CMPB(R1), 2(R1) (see Appendix B-15) causes the current and next occurrence value to be obtained from OLIST and compared. If the current occurrence value is greater than or equal to the next occurrence value, then the current occurrence value is in the correct position in OLIST and STRTJ4 and SRT10 are entered. If, however, the current occurrence value is smaller than the next occurrence value, then the next occurrence value is to be bubbled up or moved up toward the beginning of OLIST to its appropriate position. Accordingly, SRT5 is entered where the address of the current occurrence value is moved from register R1 to register R3 where it is saved. Subsequently, SRTJ2 and SRT6 are entered. During SRT6 the CMPB(R3), 2(R3) instruction causes the current and next occurrence values to be read from OLIST and compared. It will be noted that when coming from SRT4 and SRT5 that the same two values will be compared during SRT6. If the current occurrence value is smaller, then SRT7 is entered where an exchange takes place. Specifically, the value pair including the current occurrence value and the value pair including the next occurrence value are interchanged in OLIST, subsequent to which SRTJ3 and SRT8 of the flow are sequentially entered. If during SRT6 the current occurrence value is equal to or greater than the next occurrence value, then SRTJ3 and SRT8 are entered directly, bypassing the exchange operation of SRT7.

During SRT8 th pointer to the two value pair containing the current occurrence value in register R3 is decremented by 1 and then SRT9 is entered where the beginning of the OLIST pointer R2 is compared with the decremented value in R3 to see if the sort has reached the top of OLIST. If the current pointer in R3 is equal to or greater than the beginning of OLIST pointer in register R2, then SRTJ2 and SRT6 are reentered where the loop through SRTJ2, SRT6 through SRT9 is repeated. This loop is repeated until it is found that the current pointer in register R3 is greater than the beginning of OLIST pointer in register R2 at which time SRTJ4 and SRT10 are sequentially entered.

During SRT10 the current occurrence value pointed to by register R1 is incremented by 1 to point to the next 1 in OLIST. During SRT11 the length value in register R0 is decremented by 1 and if the result is greater than 0, SRTJ1 and SRT4 are entered where the loop through SRTJ1, SRT4 through SRT11 is repeated until the length value in register R0 has been decremented to 0, indicating that every two value pair in OLIST has been processed. When this occurs, SRT12 is entered where the context of the MINI COMPUTER is restored to that existing in the GENERATE subroutine at the time the SORT subroutine was called.

S. PRINTR (PRINTER) Subroutine

Figure 113:
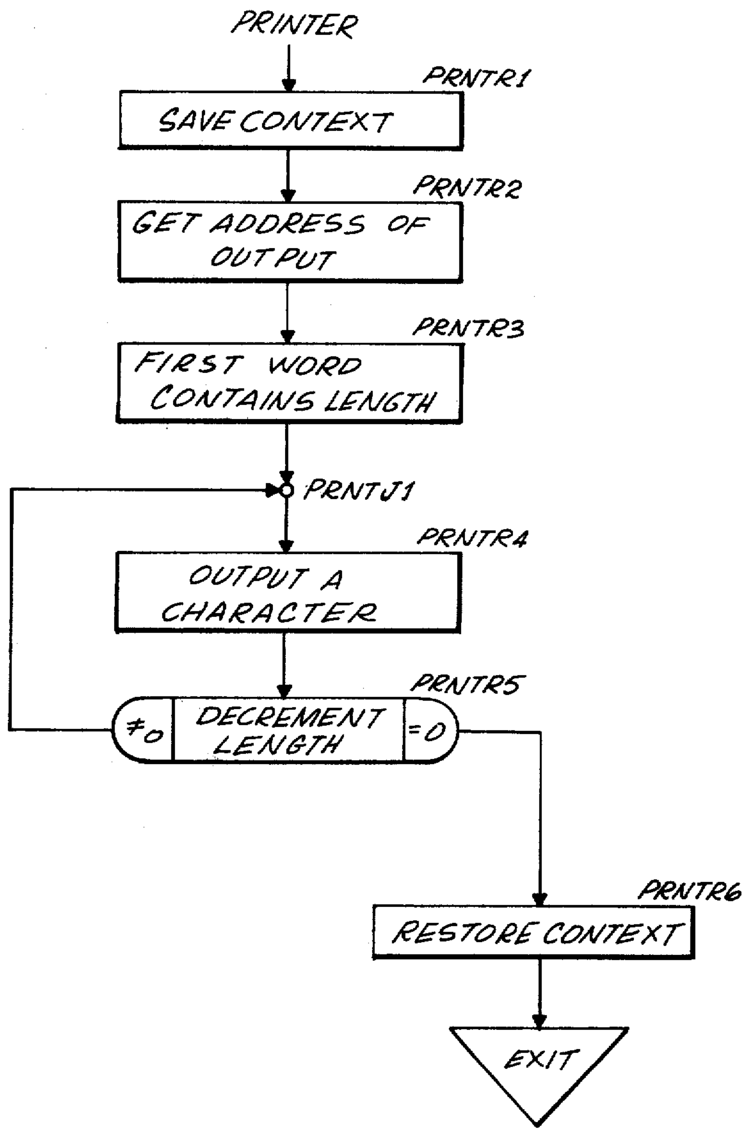
FIG. 113 is a PRINTR (Printer) subroutine flow diagram.

The PRINTR subroutine is called by any routine that requires an output to the printer. The program listing for the PRINTR subroutine is depicted in Appendix B-16. The flow diagram for depicting the sequence of operation is shown in FIG. 113. The symbols PRNTR1 through PRNTR6 are used to identify the boxes in the flow diagram of FIG. 113. Correspondence between the flow diagram and program listing is shown along the left hand side of the program listing of Appendix B-16 using the symbols for the PRINTR subroutine flow diagram of FIG. 113.

Refer now to FIG. 113 and the listing of Appendix B-16. As mentioned, the PRINTR subroutine is called during P012 of the PROCOUT subroutine. The PRINTR subroutine expects a parameter which is the address of the message to be printed. This parameter is stored immediately fllowing the PRINTR call instruction JSR R5 PRINTR. The address of the parameter is contained in register R5.

The parameter immediately following the above mentioned instruction is the address of a message. The message has two parts. The first part of the message is one word in length, providing the length of the message in numbers of characters and the second part of the message are those ASCII characters to be printed out. Initially, the context of the MINI COMPUTER is saved during PRNTR1, so that a return can be made to the PROCOUT subroutine.

During PRNTR 2 the instruction MOV(R5),+R1 causes the parameter (address of message) to be obtained and stored in register R1. The instruction MOV(R1)+, R2 causes the first word of the message, namely, the length of the message, to be read and stored in register R2.

During PRNTR 4 a character of the message is printed out utilizing the MOVB(R1)+,R0 and JSR R5,PRNTC instructions.

During PRNTR 5 the length of the message in register R2 is decremented by 1 and, if the decremented length value is not 0, the JOIN PRNTJ1 and PRNTR4 are reentered. The loop around PRNTJ1, PRNTR4 and PRNTR5 is repeated until the length value in register R2 is decremented to 0 and, thus, all characters in the message have been output. When this occurs the content of register R2 will be 0, causing PRNTR6 to be entered where the context of the MINI COMPUTER is restored to that existing in the PROCOUT subroutine at the time the PRINTR soubroutine is called.

The PRINTR subroutine is utilized by any module having a message to be output. In all cases here the message was known at assembly time and is contained at the end of the program. The PROCOUT procedure goes through OLIST and obtains a character to be output. Since it is a single character, P012 calls the PRNTC (print a character) subroutine directly.

T. PRNTC (PRINT A CHARACTER) Subroutine

The PRNTC subroutine is called during PRNTR4 of the PRINTR subroutine (FIG. 113) and P012 of PROCOUT subroutine and causes a character to be typed by the printer. The printer in the operator console has a STATUS register identified by the symbol TPS (Teleprinter Status) and another register known as the TPB (Teleprinter Buffer).

Appendix B-17 contains the program listing for the PRNTC subroutine. Since the subroutine is relatively simple, a flow chart is not shown and therefore reference should be made to Appendix B-17 for the following discussion.

Initially the MINI COMPUTER determines whether the printer is ready to receive a character for printing. To this end the instruction TSTB TPS causes the TPS register to be checked to see if it is ready to receive a character. The printer monitors its status asynchronously. When a character is placed in the TPB, the printer performs the mechanical task of printing the character. When it completes this task it sets the DONE bit in TPS.

The instruction BPL .−4 causes a branch back to the preceding instruction if the printer is not ready. The tight loop between the first two instructions is maintained until the DONE bit in TPS is set. When this occurs, the instruction MOVB R0, TPB is executed wherein a character is moved from the MINI COMPUTER register R0 to the TPB register in the printer, causing the character to be printed. The next instruction causes the PRNTC subroutine to be exited.

U. GETC (GET A CHARACTER) Subroutine

Appendix B-18 shows the program listing for the GETC (Get a Character) subroutine. Since the subroutine is quite simple, a flow diagram is not shown.

Briefly, the GETC subroutine is called by the REQUEST subroutine, the FORMATER subroutine, GET INTEGER, GET FLOATING subroutines (see FIG. 106). GETC is called whenever the program wants to obtain information from the keyboard. The GETC subroutine obtains a character in ASCII code from the typewriter of the operator console and causes the character to be printed by the printer for observation by the requestor and sends an ASCII coded value, representing the character, to the MINI COMPUTER.

With reference to Appendix B-18, the operation is as follows: The typewriter or keyboard of the operator console has a register known as TKS (Teletype Keyboard Status) and a register known as TKB (Teletype Keyboard Buffer). The instruction INC TKS readies the keyboard to receive a character from the requestor by unlocking the keyboard so the requestor can enter a character. The instructions TSTB TKS and BPL .−4 form a loop which causes the GETC subroutine to wait until the requestor has entered a character on the keyboard of the typewriter. Once a character has been entered the system drops through to the loop formed by instructions TSTB TKS and PBL. −4 where the system again waits until the printer is ready to receive a character. The waiting is done via the TSTB TBS and BPL .04 instruction loop. When the printer is ready, the instruction MOVB TKB, TPB is executed which moves the character just entered on the typewriter keyboard from register TKB to the printer register TPB where it is printed out and displayed. for the requestor. The following instruction MOVB TKP, R0 causes the same character to be transferred from register TKP in the typewriter keyboard to register R0 in the MINI COMPUTER. The instruction BICB #200, R0 clears off an extraneous bit which is always set in R0 but not used by the MINI COMPUTER. The last instruction causes the content of the MINI COMPUTER to be restored to the place in the REQUEST subroutine where it was left.

XXXIII. HARDWARE/SOFTWARE ORGANIZATION FOR BUILDING LAYERED DATA BASE

A. Layered Data Base Structure

Typically the problem of storing and retrieving data has been made complex by the opposite demands of technology and economics. Systems are typically structured with anticipated knowledge as to the structure of the retrieval request. Any major deviation from this defined strategy usually results in chaos or at best ambiguity. The solution to this problem is usually met with a costly and laborious task of restructuring the data base to meet current demands.

By way of contrast with prior solutions, a data base structure according to the present invention has the following advantages: (1) less required physical space; (2) faster retrieval times; (3) unanticipated retrieval is handled with the same ease as anticipated retrievals; (4) ease of restructuring and updating; (5) ease of specifying new retrieval criteria; and (6) ease of specifying and carrying out a process.

In order to provide a better understanding of the invention as it applies to the layered data base structure, consider a general overview as to how the present and prior art data base structures are derived.

As a working definition it may be stated: information retrieval deals with the structuring and storing of large amounts of data which are in some way related so that any or all of this data can be retrieved at any time it is needed, with accuracy and speed.

Figure 114:
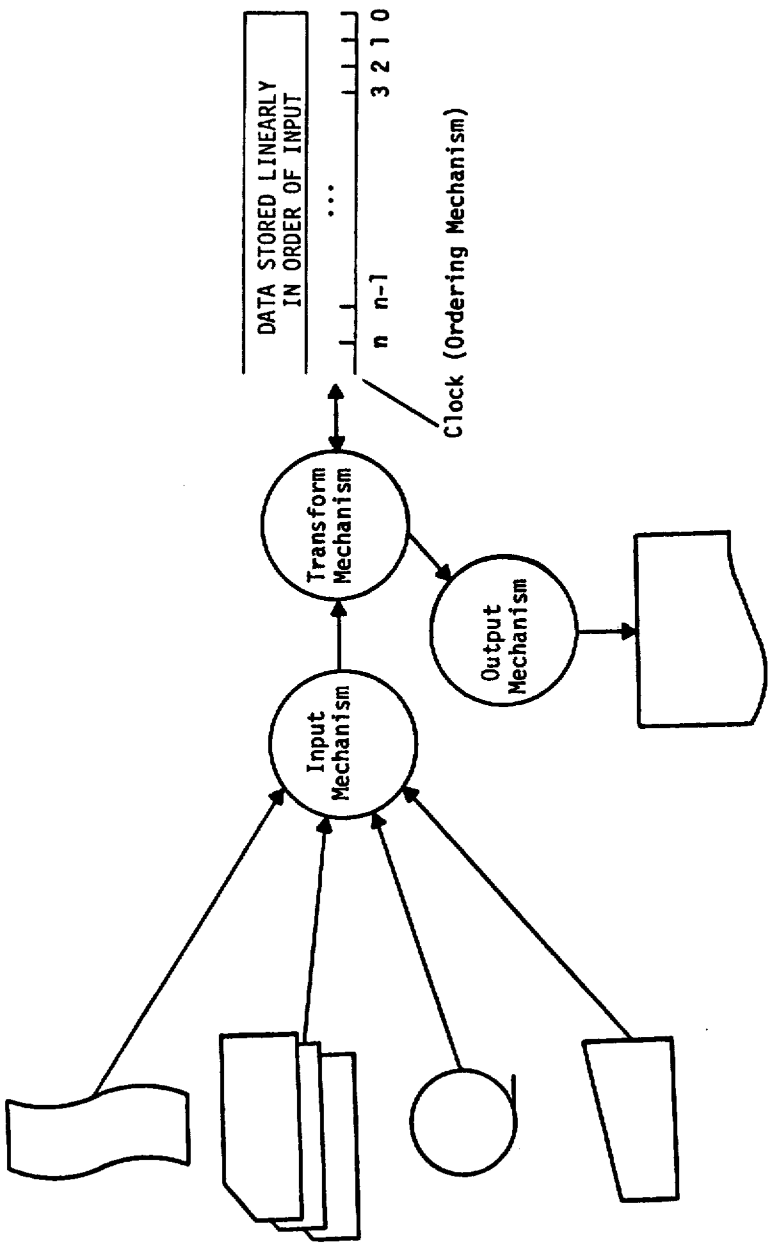
FIG. 114 is a conceptual view of the prior art data base system.

Consider now the current data base structures and the data base structure according to the present invention in light of the aforegoing definition. Regardless of their physical characteristics, presently known data bases can be thought of as systems which conceptually transform input data into a linear event-time domain. As each basic unit (e.g., character, letter, number, or other symbol), called an event, is entered into the system it is conceptually assigned a linear positional value which corresponds to the next state of some clock or sequentially ordering mechanism. This concept of the prior art data base system is depicted in FIG. 114. With a data base conceived in this fashion, the problem of retrieving information can be related to the problem of anwering the following question: Where in this linear sequence do the events of the request occur? If the ordering mechanism for the events in the data base is considered to be a clock, and the positional values are considered as clock times, the question becomes: At what clock time in the sequence do the events of the request occur? The question can be answered by linearly searching the data base until the response to the request is found. With large data bases this approach violates the preceding definition that information is to be retrieved with speed.

One way to achieve speed is to skip down through the current data base and search those areas where a response seems likely. This has been done by adding inverted index files for various key words to the data base. The key word files enable the data base to be searched much more quickly than in a linear search. The disadvantage of this approach is that the request must contain a system of key words. This means that the data base organizer has to know in advance what the requests on the data base will be and from this knowledge he must derive the words to be used as key words and from this create key word files.

There are other disadvantages. If requests to the data base change (i.e., are unanticipated), then the total system has to be recreated so that new key word files can be made. This process is costly and time consuming.

Figure 115:
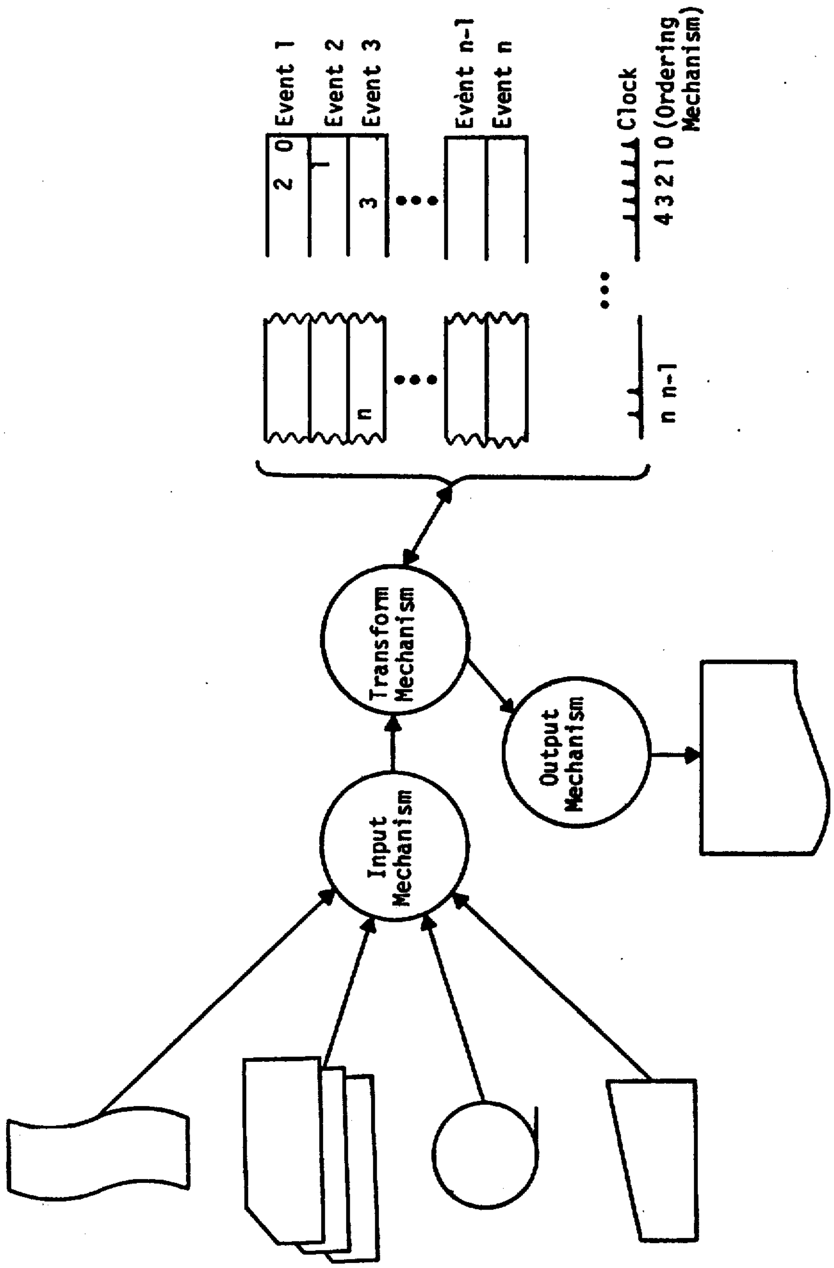
FIG. 115 is a conceptual view of a layered data base system according to the present invention.

The layered data structure according to the present invention extends the concept of an inverted index (key word) file. The right hand side of FIG. 115 illustrates an example of a data base in accordance with the present invention in which each horizontal line represents a different event, whereas the order of occurrence of the events in each line are identified by the value of the numbers in each line. The numbers correspond to the clock (or ordering mechanism) at the bottom. Thus, in contrast to the ordering of data depicted in FIG. 114, a data structure according to the present invention is organized into a collection of inverted index files as depicted in FIG. 115. Each file then need only contain positional or time information.

Advantages of this type of system are as follows: (1) only those events (e.g., letters or words) which are stated in the request need to be searched; as a result, a relatively small portion of the data base needs to be searched for any one request, resulting in reduced search time; (2) the clock positional values of the events (also called event occurrence values) can be compared with each other until a sequence which is exactly like the request is found, or if desired, until a sequence is found which is "almost" like the input request. This feature allows retrieval by context.

According to the present invention a response to a request must be regenerated before it can be output. The regeneration process involves finding those events whose clock values are sequentially ordered over some range. However, any disadvantage of this requirement is far outweighed by the increase in speed, the ability to handle unanticipated requests, and the ability to respond from context (e.g., inexact response).

Consider now the example depicted in Tables 2A and 2B. Assume that the sentence "THIS IS A TEST" is to be entered into the data base. As depicted in Table 2A, a clock is initiated so that the event time values generated thereby correspond to the input events as they are entered into the data base. Table 2B depicts each event in the example of Table 2A in an inverted index file. Each inverted index file is called an event time sequence.

Thus, Table 2B depicts a data structure in accordance with the present invention which completely inverts the input. This provides the invention with speed of retrieval, allows unanticipated requests, and allows inexact responses to a request.

As a result, the preceding question: "At what clock time in the sequence do the events of the request occur?" can now be answered by asking the question: "At what clock times did the event occur?" for each event in the request and from this, derive a response. The basic data structure depicted in Table 2B is referred to herein as a layer.

A further way in which the present invention speeds up a search is to store only new information. If information being entered into the data base is already contained in the data base there is no need to store it again. Therefore, according to the present invention, a hierarchical structuring of layers is employed which will permit redundancy to be squeezed out from the input data. In this way the information is compressed, less physical storage is used, and less search time is required to retrieve data. Such an arrangement is depicted by way of example in Tables 60B and 60C described hereinabove.

From the foregoing description of a layer, a layer can be viewed as a collection of event time sequences. The clock sequence for each event contains only the clock values, indicating when the corresponding event has occurred. (Note by way of example, Table 2 A.)

Another way of viewing the layer is as a two dimensional matrix whose rows (lines) are the primitive events associated with the layer and each column of which is associated with a clock (or, as described hereinabove, an event occurrence value). Whenever an event occurs, a binary 1 is shown in association with the proper row and column (see Table 2A).

A layer can then be considered as a "map", giving the sequence of events as they were entered into the data base. These sequences are broken into groups called "entries" so that by monitoring the input stream of data, it is possible to determine when redundant data are entered. To this end, a "group separator", called a "delimiter", is introduced into the data stream as a special character. Delimiters may be natural, e.g., spaces between words in a contextural data base. They may also be artificial, for example, separating source statements in a computer program. Delimiters break the layer into "groups" or "entries" which consist of a sequence of events between delimiters.

When a second layer is introduced it has "events" which are "entries" in the first layer and whose clock values change (or tick) only when a delimiter is recognized for the first layer. Consider the first layer as layer 0 and the second layer as layer 1. The input stream of data is monitored and a current sequence of events between delimiters on layer 0 is obtained. Layer 0 is checked to see if the current sequence of events has already been entered into the data base. If it has, it has a corresponding line containing an event number in layer 1. Therefore, the next sequential clock time for layer 1 is added to the event time sequence for the current sequence of events. If the current sequence of events does not exist in layer 0, it is added as an entry (i.e., clock value in one or more event lines) into layer 0 and the entry is then added as a new line and event number in layer 1.

As a result it will be seen that only unique entries are entered on layer 0 and these correspond to events on layer 1. Thus a redundant sequence of events on layer 0 is added as a simple clock value on layer 1. The sequence hassqueezed into a single clock value that which normally would require a sequence of clock values. This process can also be reversed. Thus each event in layer 1 is completely described by a sequence of events on layer 0.

Also, the concept of the invention can be extended to include delimiters to squeeze out redundancy on layer 1. Thus, layers 0 and 1 identify letters and sentences. A layer 2 could be added to identify paragraphs or chapters, etc. The process is recursive and need only stop when there is no more redundancy that can be squeezed out from the system. The result of this process provides a hierarchical ordering of layers bound together by delimiters which attach the entries of a lower layer to events on the next higher layer. These delimiters then can be considered as the glue which holds the layers together. Delimiters may be implicit in that the Nth entry of a layer may implicitly point to the Nth event on the next higher layer. It should also be noted that no pointer storage is needed. Additionally, delimiters may be explicit in that there may be a table which relates each entry on a layer with events on other layers. The structure of this table can vary from a simple pointer table to a layer itself.

It should further be noted that the primitive events which make up the lowest layer are not limited to a literal string but could also be a process to be performed. These basic processes can be layered in the same manner as that described above. Very complex manipulative processes can be described easily and with no change to the basic structure on the data base. Therefore, a request might trigger a contextual response or trigger a process to perform some task.

With the foregoing general description of layered data base structure in mind, consider the definition of layers in more detail. This will be done using the above mentioned event-time relationship.

Each line or event in a layer consists of an event-time sequence in that it is an ordered set of values which are homogeneous and represent a clock. A layer is a fully formed collection of all of such event-time sequences which is (1) isosynchronous, i.e., each row is a binary sequence and the occurrence of any event is a clock time for all entries, and (2) open ended, i.e., it can be expanded.

Ordering is contained in the concept of layering. Consider the example of two layers A and B.

1. Layer A is immediately superior to layer B if an event on layer A is elaborated by a uniquely defined sequence on layer B.

2. Any occurrence of an event "a" on layer A implies the same more detailed sequence $b_{j1}, b_{j2}, \ldots, b_{jk}$ on layer B. Note also that layer B is inferior to layer A.

3. Layer A is totally superior to layer B if all the events on layer A are elaborated on layer B.

4. Layer A is partially superior to layer B if only a subset of the event on layer A can be elaborated on layer B, e.g., events "$a_1, a_2, \ldots a_n \epsilon$ A" could be elaborated by layer B while "$a_{n+1}, a_{n+2}, \ldots a_{n+m} \epsilon$ A" are elaborated by layer C.

5. Layers can be nested so that layer A is totally superior to layer B, which in turn is totally superior to layer C, i.e., layer A requires that layer B be defined. Layer B requires that layer C be defined.

6. There are primitive layers which have event tokens which are primitive to the total system, e.g., in text system literals (letters, numbers, punctuation) are picked off the lowest layer. Primitive events can be (i) bit strings, which are the events, (ii) actions to be performed (processes).

7. An event can be primitive at different levels in this system: (i) it can be primitive to the interpreter that is elaborating the events on this layer, i.e., primitive within the concept of their interpretors; (ii) the event can be totally primitive, i.e., no interpreter in the total system can elaborate on it further.

8. Delimiters are connected with the various interpreters and are the "glue" that binds one layer to another. This binding can be implicit, e.g., entry "$n$" on an inferior layer relates to event "$n$" on the superior layer. The binding can also be explicit, e.g., a table which relates entry "$i$" on the inferior layer to event "$j$" on the superior layer. Delimiters also aid in defining the scope of an interpreter in which events are primitive to this layer.

Figure 116:
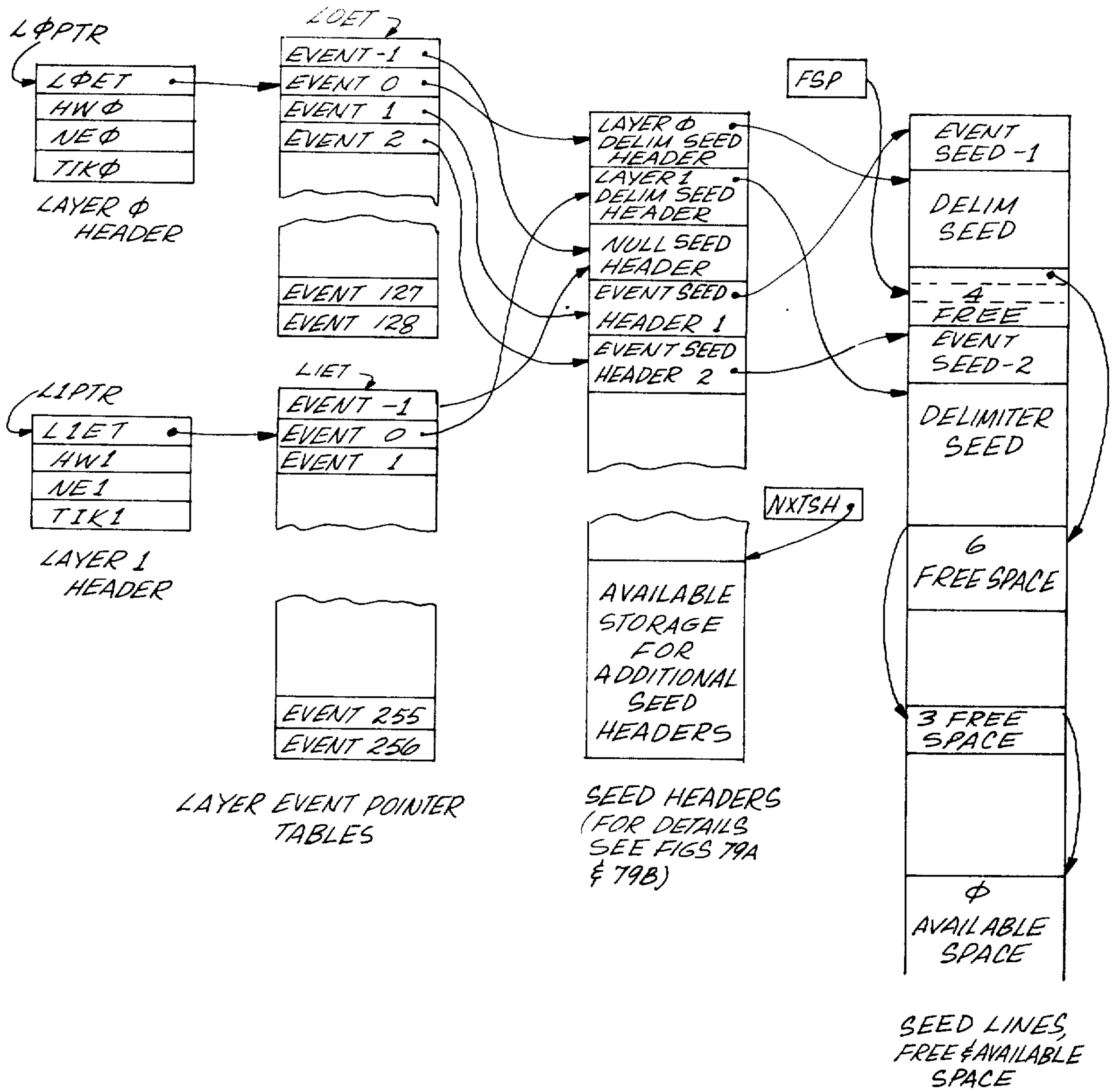
FIG. 116 is a sketch illustrating layering data base structure of the data base.
Figure 118:
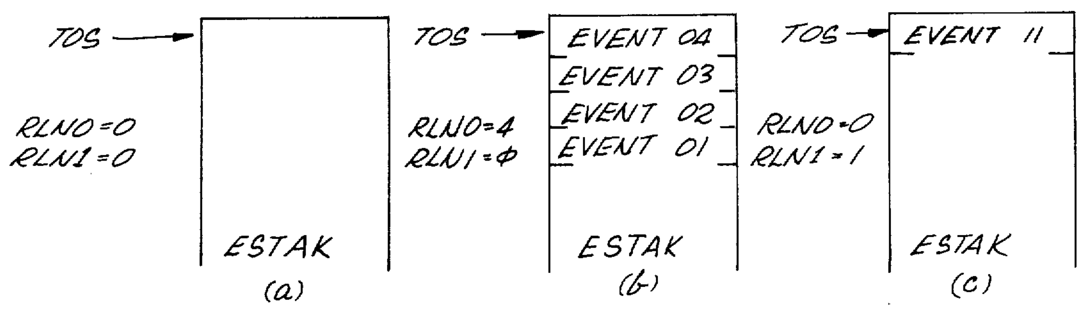
FIG. 118 is a sketch illustrating ESTAK.

Consider now a specific example of the layered data base according to the present invention. In the data base the four major data base structure which need to be considered are as follows: First the layered data base itself which is depicted in FIG. 116; Second the structure of certain conversion tables known as CVRTBL and CVTBL2 which are depicted in FIG. 117; Third, ESTAK, the event stack, which is depicted in FIG. 118; Fourth, the available space and free space and their management associated with the main memory storage area.

Consider now the details of the layered data base structure as depicted in FIG. 116. The layered data base structure of FIG. 116 is similar to that depicted in FIGS. 78 and 79 but it is more complete as noted hereinafter. In the example, the layered data base has two layers, layer 0 and layer 1. Each layer has a layer header pointed to by a pointer which, in the case of layer 0, is LOPTR, and in the case of layer 1, L1PTR. Each layer header contains four words of description as follows: the first word (L0ET—layer 0, L1ET — layer 1) points to the address of the corresponding layer event pointer table; the second word contains the iso-entropicgram width (HW0-layer 0, HW1 — layer 1) of the corresponding layer; the third word contains the number of events (NE0 —layer 0, NE1—layer 1) associated with the corresponding layer; and the fourth word contains the current tick value of the clock (TIK0—layer 0, TIK1 —layer 1) associated with the corresponding layer.

By way of example, layer 0 has 128 events corresponding to the 128 different possible ASCII coded characters. Additional events could be introduced by expanding the number of bits in the characters. Layer 1 contains 256 events, by way of example. Referring to the event pointer tables, the layer 0 event pointer table contains a pointer for events 1 through 128, plus a delimiter plus a null seed, on layer 0, and the layer 1 event pointer table contains a pointer for events 1 through 256 on layer 1, plus a delimiter plus a null seed. For layer 0, L0ET is an address pointer to the address containing the pointer for the layer 0 delimiter, whereas the immediately preceding address contains an address pointer to a null seed. For layer 1, L1ET is an address pointer to the address containing the pointer for the layer 1 delimiter whereas the immediately preceding address contains an address pointer to the null seed. To be explained in more detail, it is possible for a request to be made to the data base using a request event that the layered data base does not contain. When a request is made for an event not contained in the data base, the request is simple directed to the pointer at L0ET minus 1 for the null seed. Similarly, when requesting information from the data base there are times when no layer 0 entry passes the closeness of fit criteria. When this is the case the null seed is substituted for the requested word.

The address pointers for event 0 in the layer 0 and layer 1 event pointer tables, respectively, point to the seed headers for the layer 0 and layer 1 delimiters. For purposes of explanation, the layer 1 event pointer table contains pointers for 256 events. This is the maximum number of events possible for the 8 bit wide data structure assumed for the DPM SYSTEM shown by way of example herein.

A 1K storge area is reserved in main memory for seed headers. As a new event is assigned to either layer 0 or layer 1, formation of a new seed header is initiated for the new event. To this end a pointer word identified by the symbol NXTSH (next seed header) points to the beginning of the new four word area which is available for a seed header. After the next four words are utilized for a seed header, the pointer NXTSH is advanced forward by four words so that it points at the next available four words for a seed header. The seed headers, once they are created, are not destroyed in the program described herein. However, such a feature may be desirable and may be incorporated into the program within the scope of the invention herein.

The main memory area for storage of the seed lines generally depicted along the right hand side of FIG. 116 will now be described. The seed lines are stored in a storage area for seeds in main memory. This can easily be extended to DISK space using conventional disk management and transfer techniques. The seed lines are so stored in the order the need arises for storage of each. As a result the seed lines for layer 0 and layer 1 are intermixed in the seed line storage area. Each event seed line or delimiter seed line is pointed to by a corresponding event seed header or delimiter in the manner described hereinabove with respect to FIGS. 78 and 79. The structure of the seed headers is depicted in and described above with reference to FIGS. 78 and 79.

As new seed lines are created and old seed lines are eliminated, storage is not modified immediately by moving the old seed lines out and compressing storage. Instead, there is a linked list of free space areas available in a storage area called "free space". Each free space area has an address pointer to the next free space area. As a new speed is to be entered into the data base a check is made through the linked list of free space areas to see if the new seed line can be entered in any one of the free space areas. The last free space area has a pointer to a memory area known as "available space" (the amount of main memory core left for seeds). The free space and the free space pointer list will be described in more detail in connection with the description of the data storage structure. However, "free space" as used herein refers to the main memory area which has been vacated by seed lines which are not longer used, and "available space" refers to the area in which no seed line has yet been stored.

Consider now the structure and content of the tables CVRTBL and CVTBL2 depicted in FIG. 117. Table CVRTBL is used for converting ASCII coded characters to event numbers on layer 0. Table CVTBL2 is used for converting layer 0 event numbers back to ASCII coded characters. CVRTBL contains layer 0 event numbers and the ASCII coded characters are used as an address index into table CVRTBL. As described hereinabove with respect to the FORMATER program, when an input character is received from the operator console, the binary equivalent of the octal number 200 is subtracted from the character to form an ASCII coded character. To convert an ASCII coded character to a layer 0 event number, the ASCII coded character is added to the base address CVRTBL and the content of the resultant address is the corresponding layer 0 event number. Table CVTBL2 contains ASCII characters and the layer 0 event numbers form an index into table CVTBL2. To convert a layer 0 event number to the corresponding ASCII character, the layer 0 event number is added to the base address CVTBL2 and the content of the resultant address is the corresponding ASCII character.

Consider now the way in which tables CVRTBL and CVTBL2 are formed. With reference to FIG. 116 it will be recalled that the address L0ET minus one is the address of the pointer for event $-1$ which in turn points to a null seed header. Initially the entire content of CVRTBL is initialized by storing the event numbr $-1$ in each of its storage locations. Additionally, table CVTBL2 is initialized so that each of its locations contains an ASCII coded value representing the symbol *. The symbol * is used herein as an invalid character.

A software event counter formed by NEO in the layer 0 header is used to count the new events (in ASCII code) as they are received and entered into the data base. The event counter forms the event numbers on layer 0.

When entering information into the data base it is first determined whether the received ASCII character is a new character and therefore has not been entered into the data bae. If it is a new character, the ASCII coded value is added to the location in table CVTBL2 whose address is determined by adding NE0 to the base address CVTBL2. New characters are determined as follows: a received ASCII character is added to the base address CVRTBL of the table CVRTBL and the contnt of the resultant address in CVRTBL is checked for a negative number. If negative, it indicates that the current ASCII character has not yet been added into the data base and the event number indicated by the event counter is stored into the addressed location of CVRTBL. As the event number is added to a particular storage location of CVRTBL, the corresponding ASCII coded character is added to the storage locations of CVTBL2 whose address is CVTBL2 plus the event number (i.e., NE0) and a corresponding new seed header is made up for the particular event. If the received ASCII character was previously entered in the Table CVRTBL, the content of the address location in CVRTBL is positive (since all layer 0 event numbers are positive) and the aforegoing table storage process is skipped.

When outputting a layer 0 event number, the corresponding ASCII coded representation can be obtained simply by adding the event number to the base address, CVTBL2, of table CVTBL2 to form the address of the corresponding location from which the corresponding ASCII coded character can be read.

Consider now the structure of ESTAK as depicted in FIG. 118. The manipulation of ESTAK has been considered in connection with the FORMATER and related programs. ESTAK is a stack into which all of the event numbers of a request are pushed as they are received into the system. The number of events pushed into ESTAK are counted by the software registers RLN0 and RLN1. Thus, once a complete word (i.e., a series of tokens or letters between two delimiters, ) has been entered into the system, the total number of layer 0 event numbers pushed into ESTAK will be reflected by RLN0. With reference to FIG. 118, Example *a*, TOS is the top of stack pointer for ESTAK, whereas RLN0 represents the number of layer 0 event numbers of ESTAK, and RLN1 represents the number of layer 1 event numbers in ESTAK and both are initially set to 0. Example *b* a which time RLN0 will contain the value 4.

Once the ending delimiter () is encountered, a complete entry is contained in ESTAK. The event numbers making up the entry in ESTAK are then processed using the PIPE program (discussed above) to determine whether the entry (i.e., the sequence of tokens or event numbers) has been encountered and hence stored into the data base. If the sequence has been encountered before, an event number on layer 1 is returned which represents the sequence of event numbers in question. If the p articular sequence of event numbers has not been encountered before, then the sequence of event numbers on layer 0 are entered into layer 0 and they are assigned the next sequential entry number on layer 1 which in turn is stored at the top of ESTAK. This is depicted at Example c in FIG. 118 where event 11 is depicted, the first "1" representing layer 1 and the second "1" depicting event number 1 on layer 1. The corresponding sequence of event numbers on layer 0 are removed from ESTAK by reducing the value represented by RLN0 by the number of layer 0 event numbers and increasing the count in RLN1 by 1. In this way a series of events such as letters making up words may be entered as a sentence into the data base structure. When the ending delimiter # for a sentence is encountered, register RLN1 will represent the number of layer 1 entries in ESTAK then added to layer 1 of the data base. To be explained in more detail, the entries are added to the data base using the CHANGE subroutine.

Figure 119A:
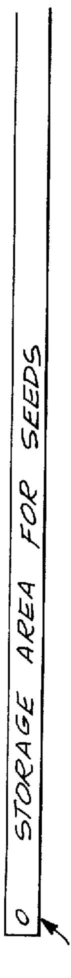

Consider now the structures and general principles of maintaining available space. FIG. 119A depicts the available space or storage area for seed lines. When a seed line is computed, it is placed in available space and the first word in the seed header (corresponding to the seed line) is adjusted so that it becomes a pointer to the beginning address of the seed line. It will be recalled with reference to FIGS. 78 and 79 that the third word in the seed header contains the length of seed (in words).

Figure 119B:
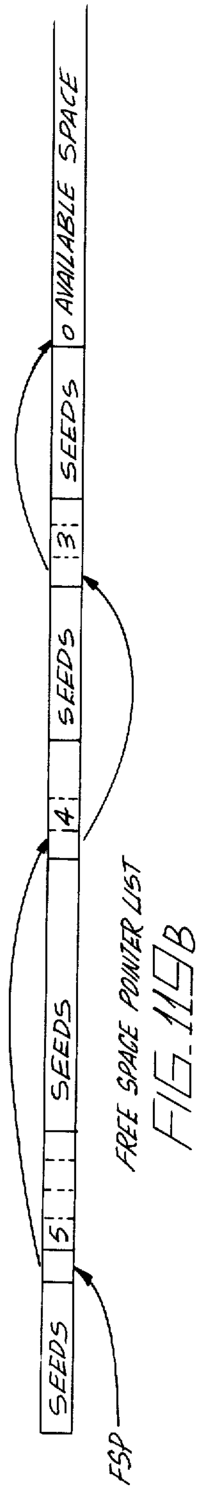

During the course of changing seed lines a new seed line may be computed which is less than or greater than the old seed line in length. Hence the storage space for the old seed line will not be exactly the same as that required for the changed seed line. To provide for this possibility a linked list called the "free-space pointer list" is provided whose beginning is identified by a software pointer FSP. This list contains an ordered set of pointers for free space. Each area of free space consists of two header words and a free section. The first of the two word headers is a pointer to the next link in the list (as depicted by arrows in FIG. 119B), and the second is the length of the corresponding free space section. As space is created from available space for a new seed line, the length of the space required for the new seed line is incremented by two words for the two header words. This is quite important as it saves processing time when trying to determine if a new seed line can be added in a particular free space section.

Figure 119C:
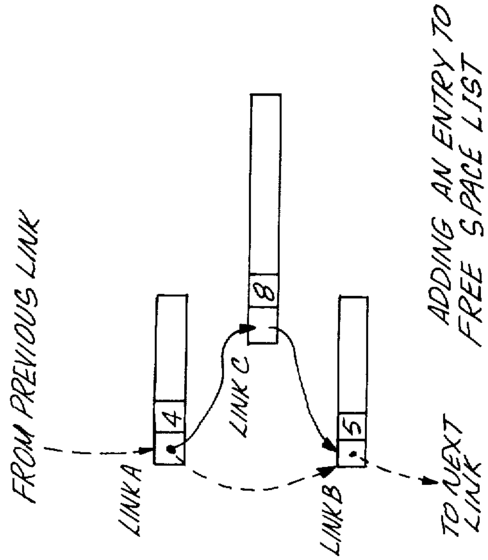

Refer now to FIG. 119C and consider the general procedure for adding a seed line entry to the free space list. Assume that originally, link A points to link B which in turn points to the next link in the list. Also asume that a new section C is to be added to the linked list. The free space section C which is to be added has a beginning address which is greater than the address of section A but less than that of section B. In order to keep this in the ordered list it is only necessary to juggle pointers so that the address of link C is placed in link A and the old link that was an A is placed in link C. The dashed lines indicate the condition prior to the addition to section C whereas the heavy lines indicate the changed condition.

Figure 119D:
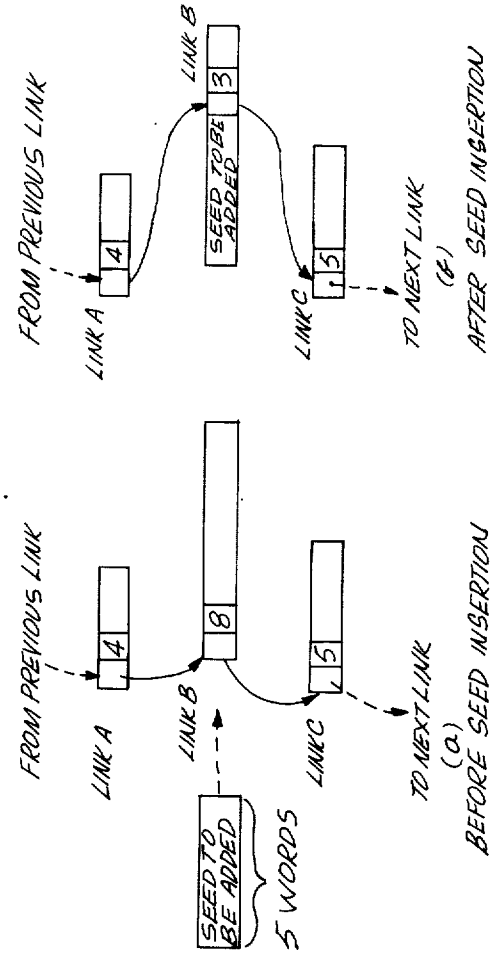
Figure 11E:
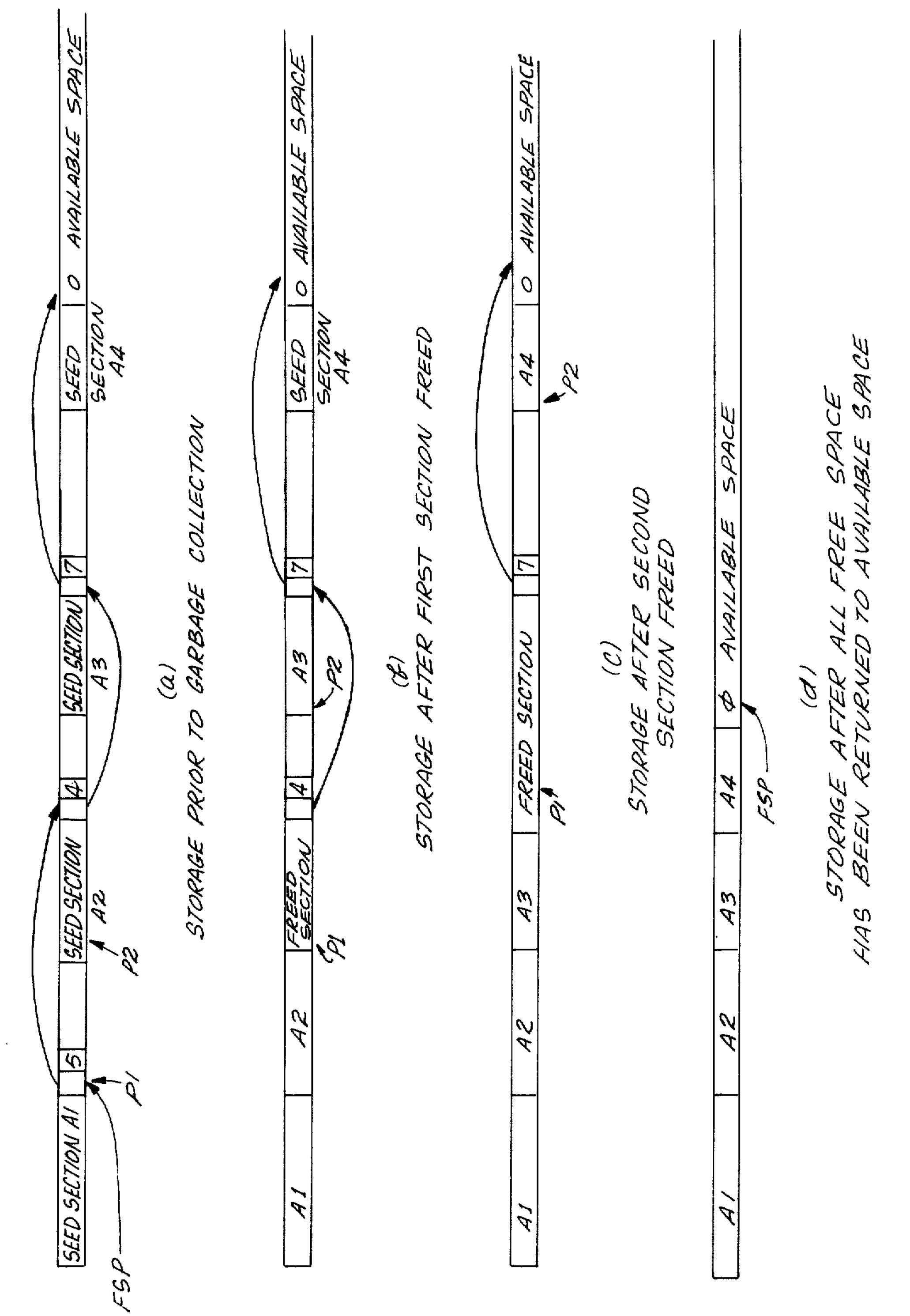

Refer now to FIG. 119D and consider the general operation when data is added to a free space area. Example *a* of FIG. 119D depicts the condition before the seed line is inserted. As depicted, link A points to link B which is turn points to link C. Assume for purposes of explanation that a portion of section b is to be taken for a new seed line. It is assumed that the sections containing links A, B and C contain length values 4, 8 and 5, respectively. Also assume that the new seed line requires a length of five words which will leave in free space three words plus the two word header. Thus when the new seed line of five words is placed into the section containing link B, link B does not disappear from free space but in effect is shifted to the right as depicted at B.

"Free space", as discussed above, is the linked list of free areas which have been vacated by seed lines. "Available space" is the area in main memory where no seed lines have yet been stored.

A function described herein as "GARBAGE COLLECTION" will now be discussed. Once the free space gets above a certain length in words it is necessary to compress the storage area so that all of the free space is returned to available space. The following discusses this operation.

FIG. 119E at a depicts an example of the main memory storage area prior to garbage collection. Note that free space includes linked free space sections of 5, 4, and 7 words in length and available space separated by seed line storage sections of A2, A3 and A4. The free space sections can be considered as a linear list from left to right starting at pointer FSP. A pointer P1 is depicted pointing to the link in the first free space section and a pointer P2 pointing to the beginning of the seed line section A2. The general operation is to shift the entire seed line storage area to the left until the free space sections are eliminated and placed into available space. The first step is to shift the free space storage between P1 and P2 to the left. In this process all seed line sections whose starting address is greater than pointer P1 will have new starting addresses which are shifted to the left by an amount equal to the length of the first free space section. In this first step, pointer P1 is moved from its current position to the right by an amount equal to the length of A2 and pointer P2 is moved from the seed section A2 to the beginning of the next seed line section A3 as depicted in *b* of FIG. 119E. While the seed headers have been adjusted, not all of them point to meaningful data since only a portion of the data base has been shifted to the left.

This process repeats for the next free space section of length 4. The result is depicted at *c* of FIG. 119E where the seed line section A3 is moved to the left adjacent seed line A2 and freed sections of lengths 5 and 4 are added together as depicted at "freed section". This process is repeated until all free space is eliminated and returned to available space and the free space pointer FSP has been set to the beginning of available space. The seed headers are adjusted for the new location of the corresponding seed line sections and therefore point to the new starting addresses for their corresponding seed lines. The result is as depicted at *d* in FIG. 119E.

B. Data Base Program, Level 1

The DATA BASE program level 1 performs the major functions of the DATA BASE program which are: initialization, layer building, which builds the data base described above, and request on the data base, which has been discussed in more detail in connection with the FORMATER program. Initialization prepares the data base to receive input by priming tables and headers. Its functions are:

1. Initialize CVRTBL with a negative number which will correspond to the NULL seed;

2. Initialize CVTBL2 to all "*" representing invalid characters;

3. Initialize layer 0 header and place first entry in delimiter seed;

4. Initialize layer 1 header and place first entry in delimiter seed;

5. Initialize NULL seed;

6. Initialize seed header pointer (NXTSH) and free space pointer (FSP);

7. Initialize the globals: LNGSW, ESCAPE, PW, BVCO, ESTAK.

The DATA BASE program sequences the entire data base operation from initialization through layer building for subsequent use in handling of requests.

The program code for carrying out the DATA BASE program operation is set forth in Appendix B-22. FIG. 121 is a DATA BASE program flow diagram and depicts the overall sequence of operation thereof. Symbols DB1.0 through DB12.0 are used. The correspondence between the program code and the flow diagram is shown in Appendix B-22 where the symbols corresponding to the blocks of the flow diagram are shown for the corresponding code.

Consider now the operation of the DATA BASE program making reference to FIG. 121. The DATA BASE program is loaded and executed by the user. He does this by instructing the system to bring the DATA BASE program into core of main memory and execute it.

During DB1.0 of the flow diagram the content of the registers in the MINI COMPUTER are stored for a return to the operating system. During DB2.0 the ENDFLAG switch is reset to 0 for subsequent use during DB9.0, DB11.0 of the DATA BASE program to indicate the end of the DATA BASE program and for proper control during DB11.0 of the DATA BASE program flow.

Join 1 and DB3.0 of the flow are entered. During DB3.0 the instruction JSR R5, PRINTER is executed causing the PRINTER subroutine (discussed above) to be called which causes an ASCII coded character to be sent to the printer, representing a+. The + signals the user that the system is ready to process a command.

Control then goes to DB4.0 of the flow where a command character is read from the keyboard. The user has the option of entering an "I" representing initialization, an "A" indicating data is to be appended to the data base, or an "R" indicating a request is to be made to the data base, or an "E" to indicate an end of session. Any other entry by the user at the typewriter of the operator console is considered an error.

The character is obtained from the typewriter utilizing the GETC subroutine discussed in connection with the FORMATER program and related subprograms.

DB5.0 of the flow is next entered where the character just read during DB4.0 is checked to determine the type of character. For this purpose a series of comparison statements are employed.

First a comparison is made for the character I (INITIALIZATION). To this end the CMPB R0, I instruction is executed causing the character just read and stored in register R0 to be compared against the stored representation of the character I. If the comparison results in equality, the instruction BEQ .+2 causes the DATA BASE program level 1 to enter DB6.0 of the flow and thereby enter the initialization block of the DATA BASE program.

If the comparison results in an inequality, the instruction JMP TLBM causes the program to jump to TLBM of the program where the instruction CMPB R0, A, BEQ .+2 tests to check if the character is an A and hence the layer building block (DB7.0) portion of the program is to be executed. If an inequality results the instruction JMP TREQ causes a jump to TREQ.

Here the character is checked for an R by the instruction CMPB R0, R and if it is, control goes to DB8.0 where a subsequent request presented by the requestor is processed. Note that the character R represents a request and calls the operation of the FORMATER program discussed above. If not an R, the instruction BNE TEND causes a jump to TEND.

Here the character is checked for an E on the instruction CMPB R0, E and if it is, control goes to DB9.0 of the flow where the instruction JSR R5, PRINTR is executed, calling the operation of the PRINTER subroutine which in turn causes the message "ND" to be output following the character "E" on the printer and the ENDFLAG is set to 1 which will cause DB12.0 to be entered following DB11.0 of the flow.

If during DB4.0 a lack of comparison is detected, (i.e., the character is one other than I, A, R or E), DB10.0 of the flow is entered where the PRINTR subroutine is called causing the message ERROR MESSAGE to be printed out by the printer.

Following DB6.0, DB7.0; DB8.0, DB9.0 or DB10.0 of the flow, JOIN 2 and DB11.0 of the flow are entered where the ENDFLAG is checked. If it has been set to 1, which occurs when the user has entered an E during DB4.0 of the flow, the instruction TST ENDFLAG detects this condition and will cause a jump to DB12.0 of the flow where the context of the MINI COMPUTER is restored and the operation of the flow is exited. If during DB11.0 the TST instruction determines that the ENDFLAG has not been set to 1, JOIN 1 and DB3.0 of the flow will be reentered where another + is output to the requestor allowing him to enter another command character which will be read during DB4.0 of the DATA BASE program, level 0 flow.

C. Layer Initialization Program, Level 2

Consider now the program which is called into operation during DB6.0 of the DATA BASE program flow diagram of FIG. 121. The LAYER INITIALIZATION program is called into operation and initializes the data base to accept input data.

Figure 122:
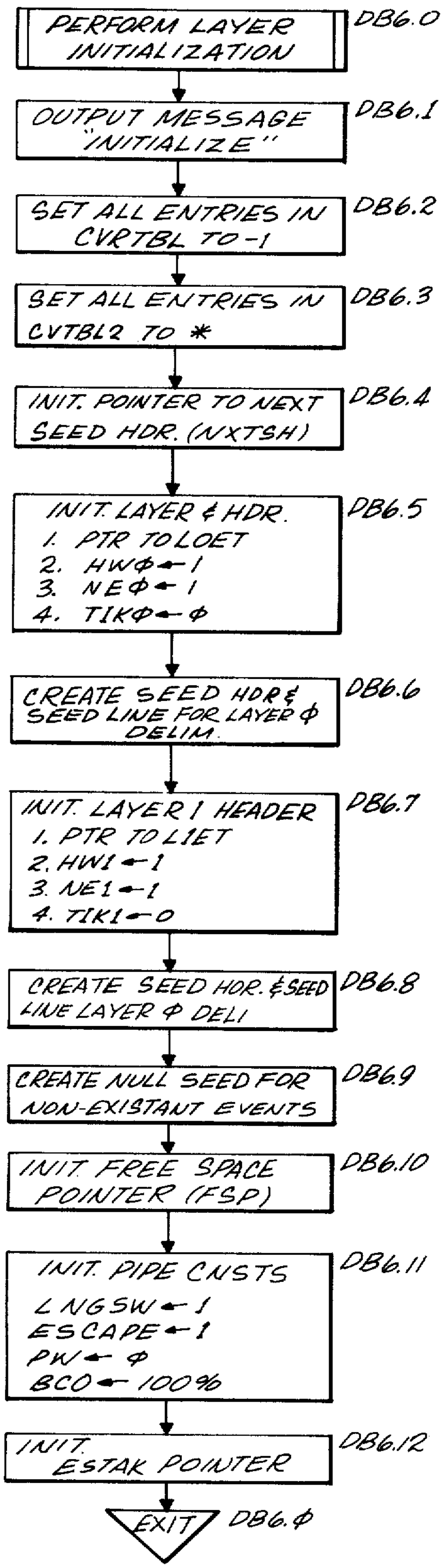
FIG. 122 is a layer INITIALIZATION program flow diagram.

The LAYER INITIALIZATION program is a level 2 program and the code is depicted under the heading LAYER INITIALIZATION BLOCK of Table B-22. The LAYER INITIALIZATION flow is shown in FIG. 122. The blocks of the flow are identified by the symbols DB6.0 through DB6.12. The correspondence between the LAYER INITIALIZATION program code and the blocks of the flow diagram is depicted in Appendix B-22 using the symbols of the flow.

As described above, if during DB5.0 of the DATA BASE program (FIG. 121) a command character of I is detected, DB6.0 is entered where the LAYER INITIALIZATION program is called into operation. During DB6.1 of the LAYER INITIALIZATION flow of FIG. 122, the instructions JSR P5, PRINTR and WORD INITMSG are executed, which cause the message INITIALIZE to be output and printed by the printer for observation by the user. Subsequently, DB6.2 of the flow is entered where each of the entry location in Table CVRTBL is set to −1 to identify empty locations (see FIG. 120). This is accomplished by the instruction MOV #2,R1 which causes a 2 to be placed in register R1 and the instruction NEG R1 which causes R1 to be negated and thus contains a value of −2.

A word of explanation as to what a −2 is stored rather than a −1. Logically it is desired to address the location which is 1 word (−1) before address CVRTBL. However, since the PDP-11 is a byte addressable machine and since one word contains two bytes, the location is addressed which is two bytes (−2) before CVRTBL. Thus the entries in CVRTBL are initialized to −2. The flow charts show −1 since that is logically what is happening.

During DB6.3, an ASCII character representing a * is stored in each of the storage locations in Table CVTBL2. The * is used to denote a presently undefined character in CVTBL2 (see FIG. 120).

NXTSH is a pointer which points to the beginning of the available storage in main memory area reserved for seed headers (see FIG. 116). During DB6.4 of the LAYER INITIALIZATION flow of FIG. 122, the software pointer NXTSH is initialized or set to an initial value represented by the beginning address SEEDHDR.

Referring to FIGS. 78 and 116 it will be recalled that the layer 0 header is four words in length and contains the indicated items of information. During DB6.5 of the flow the four words of the layer 0 header are initialized as follows: MOV LOPTR, R1 moves the base address of the layer 0 header into register R1; MOV #LOET, (R1)+ moves the address of the layer 0 event table into the first word of the layer 0 header whose address is identified by register R1 and then increments the address, the two instructions MOV #1, (R1) + cause the next two words of the layer 0 header representing the iso-entropicgram width (HW0) and layer 0 event number (NE0) to be set to 1; CLR (R1)+ sets the layer 0 event-time count TIKO to an initial value of 0.

During DB6.6 a seed header and a seed line are generated for the layer 0 delimiter. The instructions operate as follows: MOV NXTSH, L0ET moves the address pointer to the next available seed header to the first word in the layer 0 event table (L0ET) and MOV NXTSH, R1 saves the same address in register R1; ADD #10, NXTSH adds $10_8 = 8_{10}$ to the address in NXTSH to bypass 4 words (each 2 bytes long) which are required for a seed header; AS is an address pointer to the available space for seed line storage and MOV #AS, (R1)+ moves the address to the first word of the delimiter seed header. The address in R1 is then incremented to the next word (for the line number of seed) in the seed header; CLR (R1)+ sets the line number of the delimiter seed line to 0 and increments the address in R1 to the next word (length of seed) in the delimiter seed header; MOV #1,(R1)+ moves a 1 into the length of seed word of the delimiter seed header and increments the address in R1 to the address of the fourth word (no. of occurrences in line); MOV #,(R1) moves a 1 into the number of occurrences in line word of the delimiter seed header, CLR AS sets the first event-time occurrence value in the delimiter 0 seed line to 0.

During DB6.7 of the flow the four words of the layer 1 header are initialized similar to that described for the layer 0 header at DB6.5. At DB6.8 the seed header and seed line for the layer 1 delimiter are generated in a similar manner to that described hereinabove with respect to DB6.5 for the layer 0 header.

During DB6.9 a null seed header for nonexistent events is formed. To this end an address pointer to the null seed header is stored into the location for the −1 entry pointer in the layer 0 event pointer table and the −1 entry pointer in the layer 1 event pointer table and a null seed header is formed.

MOV NXTSH,R1 stores the next available seed header address in R1;

ADD #10,NXTSH updates the pointer to the next available seed header;

MOV R1,LOET-2 puts seed header address in proper L0ET word;

MOV R1,L1ET-2 puts seed header address in proper L1ET word;

| | |
|---|---|
| CLR (R1)+<br>CLR (R1)+<br>CLR (R1)+<br>CLR (R1)+ | creates the null seed header by setting all entries to 0. |

During DB6.10 the free space software pointer FSP is initialized so that it points to the beginning of the available space used for storing seed lines using the instruction MOV #AS+4,FSP. In addition, the first word of available space is set to 0 using the instruction CLR @FSP. Thus the FSP will subsequently be used as the head of a linked list which will arise when storing seed lines into the available space storage area. As new seed lines are added and old ones are removed, the free space pointer FSP is used to form a chain, keeping track of all unused space within the storage area.

During DB6.11 certain globals are initialized which are subsequently used when the PIPE program is called. To this end a literal value of 1 is stored into the software register LNGSW and the software registers ESCAPE and PW are reset to 0. In addition the instruction LDCIF causes a value representing the brightness cutoff value of 100% to be stored into floating software register AC0 and the instruction STF AC0,BVC0 causes the value to be transferred from floating register AC0 to software register BVC0.

Durng DB6.12, ESTAK is initialized by storing the address of the beginning of ESTAK into register R3. R3 is subsequently used as the top of stack pointer for ESTAK. Subsequently, the operation of the LAYER INITIALIZATION flow is exited.

D. LAYER BUILDING PROGRAM, LEVEL 2

The LAYER BUILDING program is a level 2 program which operates during DB7.0 of the DATA BASE program flow of FIG. 121. The LAYER BUILDING program creates layers as they are needed, augments old entries in a layer, and manipulates storage as old seeds are replaced by new ones.

The programming system disclosed herein is designed to create a two layer system, i.e., layer 0 and layer 1. It will be understood that the building of additional layers is contemplated within the scope of the invention herein.

Figure 123:
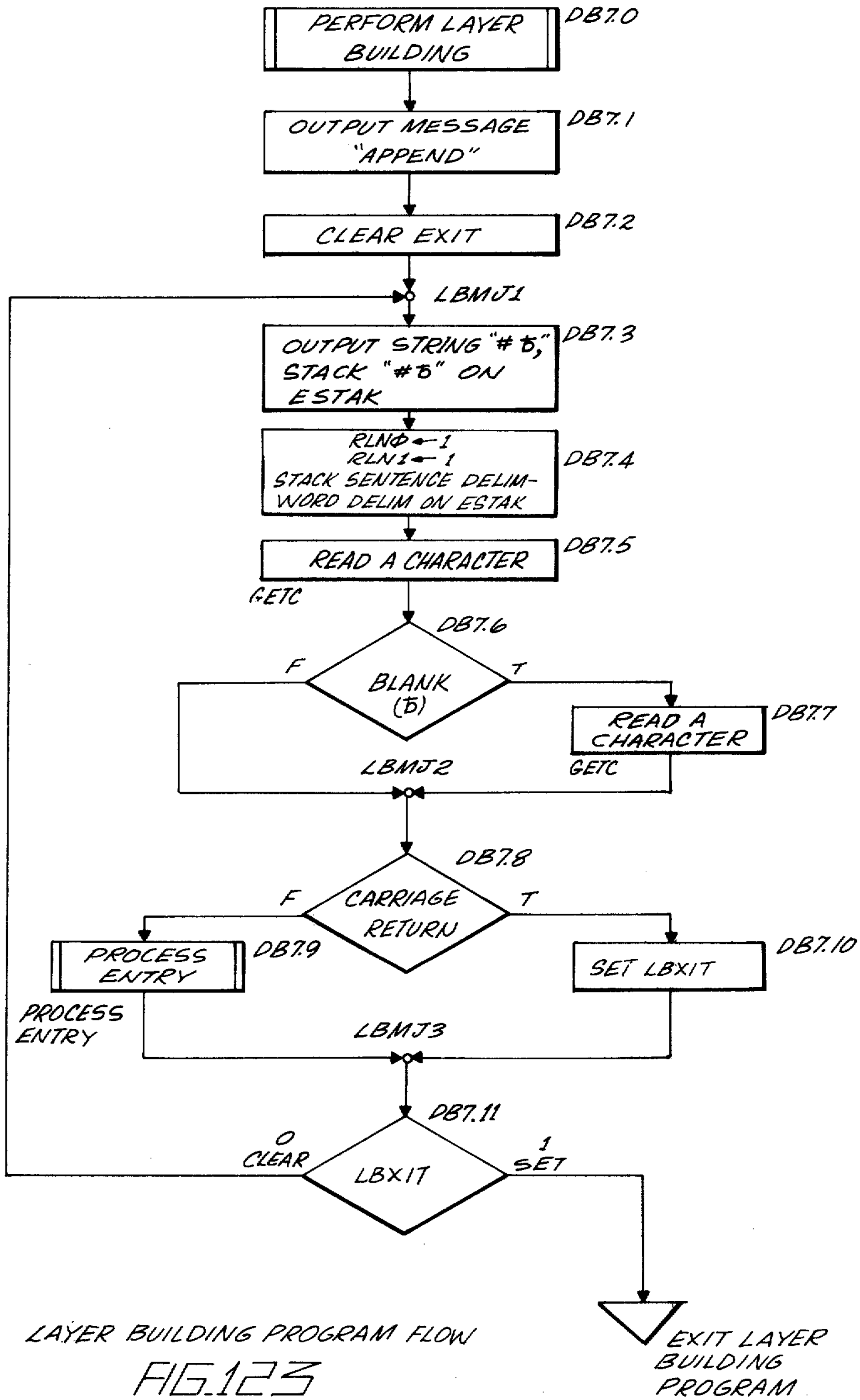
FIG. 123 is a LAYER BUILDING program flow diagram.

The program code for the LAYER BUILDING program is depicted at DB7.0 et seq. of the listing of Appendix B-22. FIG. 123 shows the LAYER BUILDING program, level 2, flow diagram. The flow diagram contains blocks identified by the symbols DB7.0 through DB7.11 to identify the various flow blocks. The correspondence between the program code and the flow diagram is shown in Appendix B-22, using the symbols for the flow diagram.

The LAYER BUILDING program operation is called when, during DB5.0 of the DATA BASE program (see FIG. 121) an "A" command letter is detected. During DB7.1 of the LAYER BUILDING program flow the instructions JSR R5, PRINTR and .WORD APPMSG cause the message APPEND to be typed out on the printer of the operator console to indicate to the user that he may now enter new data or modify old entries in a layer of the data base.

During DB7.2 of the flow the EXIT flag LBXIT for the LAYER BUILDING program is cleared or reset to 0. During DB7.3 and DB7.4 the following actions take place. The instructions JSR R5,PRINTR and .WORD BGNMSG cause the PRINTR subroutine to provide the characters #b̸ to the printer, causing the symbols #b̸ to be printed followed by a blank. The two instructions MOV L1ET, —(R3) and MOV L0ET,—(R3) cause the two consecutive locations in ESTAK beginning with the address originally in R3 to be filled with seed header addresses representing the beginning delimiters "#b̸" for layer 0 and layer 1. The instructions MOV #1, RLN1 and MOV #1, RLN0 set the software registers RLN1 and RLN0 to 1, representing one event of layers 1 and 0, respectively.

Since the program is about to append information to the data base, it is assumed that it is starting with a new sentence. A sentence always begins with the delimiter symbols # and b̸. during DB7.5 the next character is read from the typewriter of the operator console using the GETC subroutine and is stored in register R0. The operator has the option of entering a blank (b̸) or not, on the typewriter. During DB7.6 the character from the typewriter is checked to see if it is a blank (b̸) and if it is, DB7.7 is entered where the next character is read from delimiter # and the word delimiter b̸. RLN0, RLN1 are read during DB7.5 is not a blank, DB7.8 is entered where DB7.7 is skipped.

During DB7.8 the instruction CMPB R0,CR is used to determine whether the last character from the typewriter (now stored in register R0 in ASCII code) is a carriage return character. If it is a carriage return character, it signals the end of the LAYER BUILDING operation and accordingly, DB7.10 is entered where the exit flag LBXIT is set to 1 and JOIN LBMJ3 and DB7.11 are sequentially entered. If the character is found not to be a carriage return character during DB7.8, DB7.9 is entered where the entry being provided by the user is processed in its entirety.

To be explained in more detail in connection with the PROCESS ENTRY program, characters are read from the typewriter of the operator console until another sentence delimiter # is reached and processed in the manner to be described. Following either DB7.9 or DB7.10, DB7.11 is entered where the LAYER BUILDING program exit flag LBXIT is checked to see whether it is a 0, and if it is, the JOIN LBMJ1 is reentered where the loop through DB7.3 through DB7.11 is repeated for another sentence. In this manner one or more sentences may be added to the layered data base. If the exit flag is found to be 1, then the operation of the LAYER BUILDING program is exited.

E. Process Entry Program, Level 3

The PROCESS ENTRY program is entered during DB7.9 of the LAYER BUILDING program, level 2, and is therefore a level 3 program. The PROCESS ENTRY program processes the entry made by the user up to DB7.9 of the LAYER BUILDING program. At this point in the operation there are two seed header addresses stacked in ESTAK, representing the sentence delimiter # and the word delimiter b̸. RLN0, RLN1 are both 1. The PROCESS ENTRY program will then accept the events making up a sentence from the typewriter of the operator console and place them in the data base.

Figure 124:
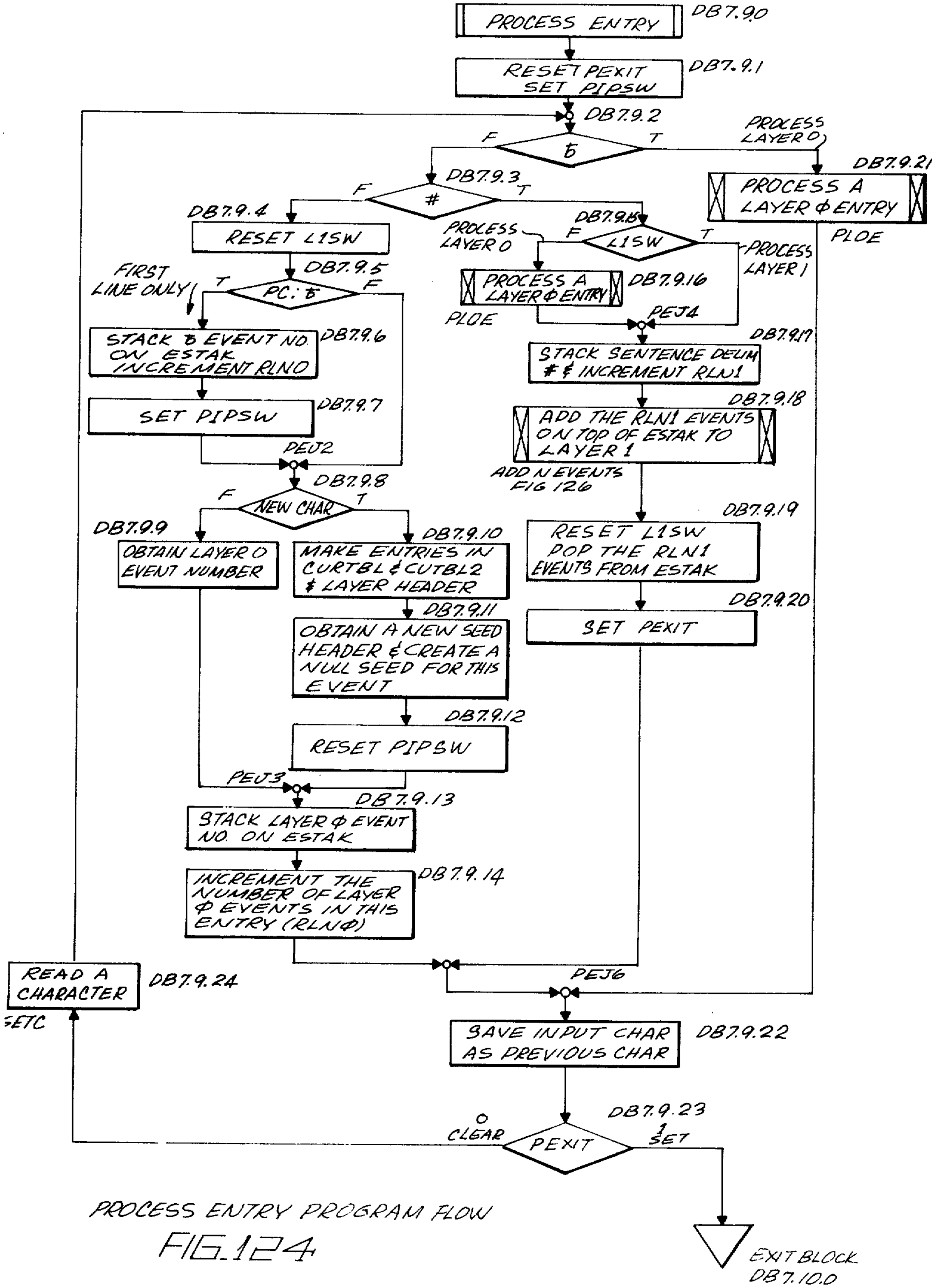
FIG. 124 is a PROCESS ENTRY program flow diagram.

The program code for the PROCESS ENTRY program is depicted at DB7.9.0 et seq. of Appendix B-22. FIG. 124 blocks of the PROCESS ENTRY program are identified by the symbols DB7.9.0 through DB7.9.24 and the corresponding symbols are used to identify the corresponding code in Appendix B-22.

During the operation of the PROCESS ENTRY program the ASCII characters are read from the typewriter using the GETC subroutine and, as long as the characters are not delimiters, the PROCESS ENTRY program checks to see whether the particular characters have been processed before. If the character has been processed before, the corresponding location in CVRTBL contains an event number (i.e., is non negative). If the character was processed before, the corresponding event number is obtained from CVRTBL and is stacked on ESTAK. If the character is a new one which has not been entered in the data base heretofore, appropriate adjustments are made in the two conversions tables CVRTBL and CVTBL2 to create an event number for the new character on layer 0 and the event number is stacked on ESTAK. This operation is continued until a layer 0 or word delimiter b̸ is encountered.

When the delimiter b̸ is encountered, RLN0 identifies the layer 0 events in the entry which was just made by the user and these layer 0 events are then processed and are thereby added to layer 0, if they are not already on layer 0. The foregoing operation is accomplished by the PROCESS LAYER 0 subroutine which will be described in more detail in connection with FIG. 125.

When a sentence delimiter # is encountered, a determination is made that the last level 0 entry has been processed and then the events are added on layer 1 of the data base. The number of events in the layer 1 entry are identified by the value in RLN1. It is not necessary to determine if the entry has already been made in layer 1 since only a two layer system is being considered herein and therefore redundancy is not being squeezed out from layer 1.

With the foregoing general description, consider in more detail the actual sequence of operation for the PROCESS ENTRY program as depicted in the flow diagram of FIG. 124 and the corresponding code. During DB7.9.1 the exit flag PEXIT for the PROCESS ENTRY program is reset and cleared to 0 and the PIPSW switch is set to 1. The PIPSW subsequently causes the PIPE program to be called to determine if the entry being processed has been stored in the layered data base unless it is reset to 0.

Note that the first entry into DB7.9.2 and DB7.9.3 follows either DB7.6 or DB7.7 of the LAYER BUILDING program flow (FIG. 123) and therefore will never be a word delimiter b̸ or a sentence delimiter #. However, during DB7.9.2 the instruction CMPB RO,-BLANK checks to see whether the current ASCII character being processed is a delimiter b̸ which indicates an end of word. If the character is not an ending word delimiter b̸, the instruction BNE CLB causes DB7.9.3 of the flow to be entered where the character is similarly checked to see whether it is a sentence delimiter #. If it is not a sentence delimiter #, DB7.9.4 of the flow is entered where the layer one switch L1SW is reset to 0, indicating the layer 0 entry and in order to cause the proper decision to be made at DB7.9.15

The software register PC is set during DB7.9.22 so that it normally contains the previous event character entered into the data base. However, initially software register PC contains a 0. During DB7.9.5 of the flow a check is made to determine whether the previous character in register PC is a word delimiter b̸ which would mean that the PROCESS ENTRY program is just starting to process a new word. If a word delimiter b̸ is detected during DB7.99.5, DB7.9.6 of the flow is entered. Note that DB7.9.6 is normally always entered for the first non delimiter input character. DB7.9.8 will normally be entered directly During DB7.9.6 a layer 0 event signal representing the seed header address for the word delimiter b̸ is stored in ESTAK at the address specified by the address in top of stack register R3, less 1. To this end the instruction MOV L0ET,−(R3) causes the address in top of stack register R3 to first be decremented by 1 and then causes the corresponding location in ESTAK to be filled with the seed header address representing the beginning word delimiter . Also the instruction INC RLN0 increments the value in RLN0 which represents the number of events in the entry on layer 0, now in ESTAK.

During DB7.9.7, the PIPSW switch is set to 1 which subsequently causes the PIPE program to be called. JOIN PEJ2 and DB7.9.8 of the flow are then sequentially entered. During DB7.9.8, a determination is made whether the present ASCII character being processed is a new one. It is not a new character if the corresponding location in CVRTBL does not contain a negative number.

Referring to DB7.9.8 of the code in Appendix B-22, register R0 now contains the ASCII character. Referring to the code at DB7.9.8, the instruction MOV CVRTBL(R0),R1 causes the base address CVRTBL of Table CVRTBL to be added to the ASCII coded value in register R0 to derive the corresponding address in Table CVRTBL. The content of the corresponding location in CVRTBL is read out and stored in register R1. If the value in R1 (from CVRTBL) is a negative number, the character contained in R0 is a new character and the instruction BMI .+3 causes the operation of the program to branch forward three instructions to DB7.9.10 of the flow. If on the other hand the value in register R1 is not negative, it now contains a previously formed layer 0 event number representing the ASCII coded character now in register R0. Thus the character in R0 is not a new character and DB7.9.0 of the flow is entered.

During DB7.9.0 of the flow the instruction MOV R1,R2 causes the layer 0 event number to be moved from register R1 to register R2. Subsequently, PEJ3 and DB7.9.13 of the flow are sequentially entered.

Return now to DB7.9.8 and assume that a new ASCII coded character is detected (i.e., a negative number was obtained from CVRTBL and detected in register R1) causing DB7.9.10 of the flow to be entered.

During DB7.9.10 since a new ASCII coded character is detected, the system computes the next layer 0 event number in order and inserts the new layer 0 event number into the location in Table CVRTBL which corresponds to the new ASCII character and the new ASCII coded character is stored at the location in CVTBL2 which corresponds to the new event number. Software counter NE0 provides a count of the new layer 0 events (ASCII characters) encountered. To this end the instruction INC NE0 counts up the number of events value contained in register NE0. The subsequent instruction MOV, NE0,R2 causes the new layer 0 event number in register NE0 to be stored into register R2 where it is saved. The subsequent instruction MOVB R2,CVRTBL(R0) causes the new layer 0 event number in register R2 to be stored into the location in CVRTBL which is specified by the base address CVRTBL plus the value of the new ASCII character contained in register R0. The subsequent instruction MOVB R0,CVTBL2(R2) causes the new ASCII coded character contained in register R0 to be stored into the location of Table CVTBL2 specified by the base address CVTBL2 plus the value of the new layer 0 event number saved in register R2.

During DB7.9.11, a seed header for the new event entered in Tables CVRTBL and CVTBL2 is created and the address of the new seed header is stored in L0ET. To this end, referring to the code, the instruction MOV NXTSH,R1 causes the base address for the next seed header to be moved from software register NXTSH into register R1. The instructin ADD #10,NXTSH causes the address in NXTSH to be incremented to the beginning of the next available seed header storage. The instruction MOV R1,L0ET(R2) causes the base address of the new seed header to be moved from register R1 into the location of the layer 0 event pointer table (L0ET) specified by the base address L0ET plus the value of the layer 0 event number saved in register R2. In this manner the layer 0 event pointer table is updated so that it contains at the location relative to its base, corresponding to the new event number, an address pointer to the base of the corresponding seed header. In addition the next four instructions CLR (R1)+ clear out the four words from the seed header storage area thereby creating a null seed header.

During DB7.9.12 of the flow the PIPSW switch is reset to 0. This is done because it is now known that the layer 0 entry being processed has not previously been stored in the data base and therefore piping to determine if it is present is unnecesary.

During DB7.9.13 and DB7.99.14 of the flow, the layer 0 seed header address corresponding to the event number saved in R2 is stacked on ESTAK and the number of events for the entry specified by software register RLN0 is incremented by 1. To this end the MOV L0ET(R2),-(R3) instruction causes the seed header address to be stored at the ESTAK location specified by the address in register R3, minus 1, and the INC RLN0 instruction increments the number of events in RLN0 by 1. Subsequently, PEJ6 and DB7.9.22 of the flow are entered.

Durng DB7.9.22, the present new character in R0 is saved in software register PC as the previous character under control of the instruction MOVB R0,PC.

During DB7.9.23, the PROCESS ENTRY exit flag PEXIT is tested to determine whether it has been set to 1, indicating that the entire layer 0 entry (now being input) has been processed. If the exit flag PEXIT is a 0, i.e., has not been set to 1, DB7.9.24 of the flow is entered where the instruction JSR R5,GETC calls the operation of the GETC subroutine which causes the next input character to be obtained from the typewriter and subsequently DB7.9.2 et seq. of the flow are reentered.

Return now to DB7.9.3 of the flow and assume that a sentence delimiter # is detected indicating the end of a sentence. DB7.9.15 of the flow is entered where the L1SW switch is checked to see whether it is a 1. L1SW will be 1 if DB7.9.21 had previously been entered (see FIG. 125, PLE11) and hence all events of the layer 0 entry (now being input) have been processed. If the L1SW flag is a 0, indicating that all entries connected with layer 0 have not been processed, the entries provided so far on layer 0 are processed by entering DB7.9.16 of the flow.

During DB7.9.16 the instruction JSR R5 PL0E causes the PROCESS LAYER 0 program (PL0E) to be called which in turn processes the layer 0 entry. The operation of the PROCESS LAYER 0 program will be discussed in more detail subsequently in connection with FIG. 125.

Following DB7.9.16 or following DB7.9.15, if the L1SW switch is a 1, DB7.9.17 of the flow is entered. During DB7.9.17 the seed header for the ending sentence delimiter # for layer 1 is stacked on ESTAK and the length of the layer 1 entry specified by the value in register RLN1 is incremented by 1. To this end, referring to the code, the instruction MOV L1ET,-(R3) causes the location in ESTAK specified by the address, minus 1, in regiseter R3 to have the value corresponding to the seed header address for the layer 1 delimiter event #, and the instruction INC RLN1 increments by 1 the number of events in the entry on layer 1 specified by register RLN1.

During DB7.9.18, the ADD N EVENTS program is called and the events associated with the current layer 0 entries whose layer 1 seed headers are now in ESTAK are added to layer 1 of the data base. The number of such events is specified by the value in register RLN1.

The instruction JSR, R5,ADDNE causes the ADD N EVENTS (ADDNE) subroutine to be called which in turn takes the events from the top of ESTAK and adds them to the stored data base on the appropriate layer.

During DB7.9.19 the L1SW switch is reset to 0 and the events that are on top of ESTAK, the total number of which is specified by the value in RLN1, are removed from ESTAK. To this end the instruction ADD RLN1,R3 causes the top of stack pointer R3 to be incremented by the value in RLN1 which in effect causes the entries to be removed from ESTAK. In addition the CLR RLN1 instruction clears RLN1, setting it to 0.

Durng DB7.9.20 the exit flag PEXIT for the PROCESS ENTRY program is reset to 0 indicating that the current entry has been processed and therefore operation of the PROCESS ENTRY program can be exited. JOIN PEJ6 and DB7.9.22 of the flow are then entered.

During DB7.9.22, as discussed above, the current ASCII character contained in register R0 is stored into the software register PC for use as the previous character for subsequent operations when DB7.9.2 of the flow is reentered.

When the exit flag PEXIT is set to 1 durng DB7.9.20, then during DB7.9.23 operation of the PROCESS ENTRY flow is exited.

Return to DB7.9.2 and assume that the word delimiter *b* character is detected. This indicates that the last event in a word entry has been reached. DB7.9.21 of the flow is then entered where the PROCESS A LAYER 0 ENTRY is called to enter the entry in the stored data base. To this end the instruction JSR R5,PL0E causes the PROCESS LAYER 0 ENTRY subroutine to be called. During the PROCESS LAYER 0 ENTRY subroutine, if the entry whose layer 0 event numbers are now contained in ESTAK is already stored in layer 0 of the data base, the layer 0 entry (layer 1 event) number will be obtained and the seed header for said event stored on ESTAK in place of the layer 0 values on ESTAK without storing the entry in layer 0. Otherwise the entry in ESTAK will be added to layer 0 and the layer 1 seed header for the layer 0 entry will be stored in ESTAK.

F. Process a Layer 0 Entry Subroutine

Briefly, the PROCESS LAYER 0 ENTRY subroutine takes the top RLN0 layer 0 seed headers off ESTAK and, using the PIPING, determines whether this entry is already represented in the stored layer 0 data base. If it does already exist, the layer 0 entry number (layer 1 event number) is returned and its seed header address stored on ESTAK without storing the entry in layer 0. If it does not already exist, signals representing the top RLN0 layer 0 events on ESTAK are added to layer 0 of the stored data base using the ADD N EVENTS subroutine and the layer 0 entry number (layer 1 event number) is returned. The top RLN0 layer 0 events are also popped from ESTAK and the seed header address of the derived layer 1 event number is stacked on ESTAK and RLN1 is incremented to indicate 1 layer 1 event has been added to ESTAK and L1SW is set to 1 in case the next layer 1 event number is an end of sentehce character (#).

The ADD N EVENTS subroutine simply takes the top RLN0 or RLN1 events in ESTAK depending upon whether L1SW is set, and adds them to the appropriate layer using the CHANGE MODULE. The storage is updated as was described earlier and as will be seen in detail in connection with the ADD N EVENTS subroutine.

Figure 125:
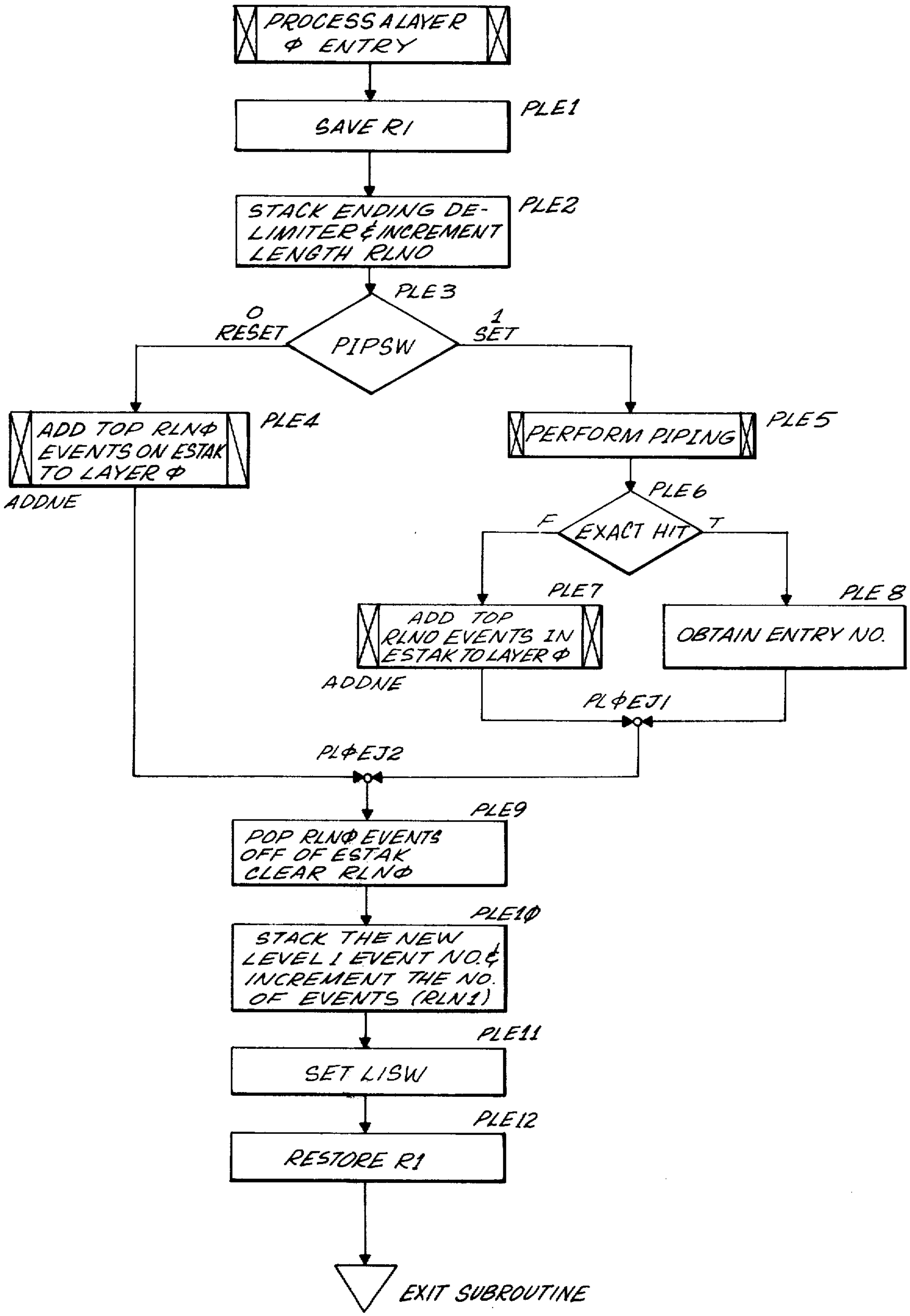
FIG. 125 is a PROCESS A LAYER 0 ENTRY subroutine flow diagram.

The program code for the PROCESS A LAYER 0 ENTRY subroutine is depicted in Appendix B-22. FIG. 125 is a flow diagram for the PROCESS A LAYER 0 ENTRY subroutine. The various boxes in the flow are designated by the symbols PLE1 through PLE12. The correspondence between the code and Appendix B-22 and the various blocks of the flow is identified in the code using the symbols of FIG. 125.

Upon entry to the PROCESS A LAYER 0 ENTRY subroutine (PL0E) the top n entries on ESTAK are the *n* seed header addresses for the events in layer 0 ($E_{oo}$. . . $E_{on}$) comprising the current entry (WORD) to be processed. PL0E tests and either discovers that the entry is already stored in layer 0 of the stored data base and stacks the layer 1 seed header address of the event number corresponding to this entry on ESTAK, or PL0E adds the *n* . . . layer 0 events to layer 0 of the stored data base as the next entry. Then PL0E stacks the layer 1 seed header address of the event number on ESTAK.

The PL0E subroutine is called during either DB7.9.16 or DB7.9.21 of the PROCESS ENTRY flow of FIG. 124. During PLE1 the context of register R1 is saved. During PLE2 a value representing the seed header address of the ending delimiter is stored on the top of ESTAK. This occurs under the control of the instruction MOV L0ET,−(R3) which causes the content of the address which is one less than specified by R3 to be filled with the first entry in table L0ET. Additionally the instruction INC RLN0 increments the number of layer 0 events in ESTAK specified by RLN0, by 1.

During PLE3 a check is made to see whether the software PIPE switch PIPSW has been set to 1 requiring a call of the PIPE program. If the PIPE switch has not been set and therefore is 0, PLE4 of the flow is entered.

It will be recalled that the PIPE switch will be 0 (not set to 1) if a new input character is contained in the current word entry (i.e., a character which has not been previously input). During PLE4, signals representing the top RLN0 events on ESTAK are added to layer 0 of the data base, utlizing the ADD N EVENTS subroutine of FIG. 126. Subsequently, PLEJ2 and PLE9 of the flow are entered.

Return to PLE3 and assume that the PIPE switch is set to 1 indicating that the PIPE program is to be called to determine whether this word or entry already exists in layer 0. If the PIPE switch is set to 1, PLE5 is entered where piping is performed to see if the word entry is in layer 0. During PLE6 a check is made to determine if an exact hit was found during the preceding piping operation. To this end the instruction TST PNBCNT checks for a 0 in PNBCNT indicating an exact hit and the instruction BNE .+3, if an exact hit is found, skips the next two instructions causing PLE8 to be entered. If an exact hit is not found, PLE7 of the flow is entered where the ADD N EVENTS subroutine is called, causing signals representing the top RLN0 layer 0 events on ESTAK to be stored in layer 0 of the data base. The events added into layer 0 of the data base form the next entry.

Return now to PLE6 and assume an exact hit was found during the piping operation. An exact hit is found during the piping operation if all of the events on layer 0 making up the entry in ESTAK were found exactly in the stored data base. An exact match has to be found both as to position and sequence of events. Under these conditions, PLE8 of the flow is entered where the layer 0 entry number is obtained and used in the event number for layer 1. To this end the instruction MOV PNBOUT,R1 causes the entry number, which is left in the top of PNBOUT by the PIPE program, to be transferred from PNBOUT to register R1. Following PLE8, PLEJ1, PLEJ2, and PLE9 of the flow are sequentially entered. During PLE9 the events making up the top layer 0 entry on ESTAK which were either added on layer 0 during PLE7 or were found to already exist in the data base, are removed from ESTAK. At this point, register RLN0 specifies the number of such events and accordingly during PLE9 the instruction ADD RLN0,R3 adds the value in RLN0 to the top of stack pointer R3 which bypasses or in effect pops off these events from ESTAK. In addition the instruction CLR RLN0 clears the number of events value in register RLN0 to 0.

PLE10 of the flow is then entered where the layer 1 event number contained in register R1 is used to store the associated seed header address on ESTAK. To this end the instruction MOV L1ET(R1),−(R3) causes the layer 1 seed header associated with the event number to be stored into ESTAK at one address below that existing in register R3. Additionally the instruction INC RLN1 causes the value in register RLN1 identifying the number of events on layer 1 to be incremented by 1.

During PLE11 the instruction INC L1SW sets the layer 1 switch L1SW to 1 to indicate a possible end of a layer 1 entry or sentence condition. If the next character received is a #, then control will go from DB7.9.15 to PEJ4. The purpose of L1SW is to provide a means of distinguishing the following end-of-sentence conditions:

| | |
|---|---|
| b̸ # <word> b̸ · · · b̸ <word> # | (no blank (b̸) before final #) |
| and | |
| b̸ # <word> · · · <word> b̸ # | (blank before final #) |

In the first case before the words in the sentence (i.e., process layer 1) can be processed, it is necessary to finish processing the final word. This is detected at DB7.9.15 if L1SW = 0. Thus DB7.9.16 is entered when the final word is processed and then the sentence is processed; DB7.9.17–DB7.9.20.

During PLE12 the context of register R1 is restored to that existing when the PLOE subroutine was entered. Subsequently the operation is exited.

G. ADD N EVENTS SUBROUTINE, LEVEL 1

Figure 126:
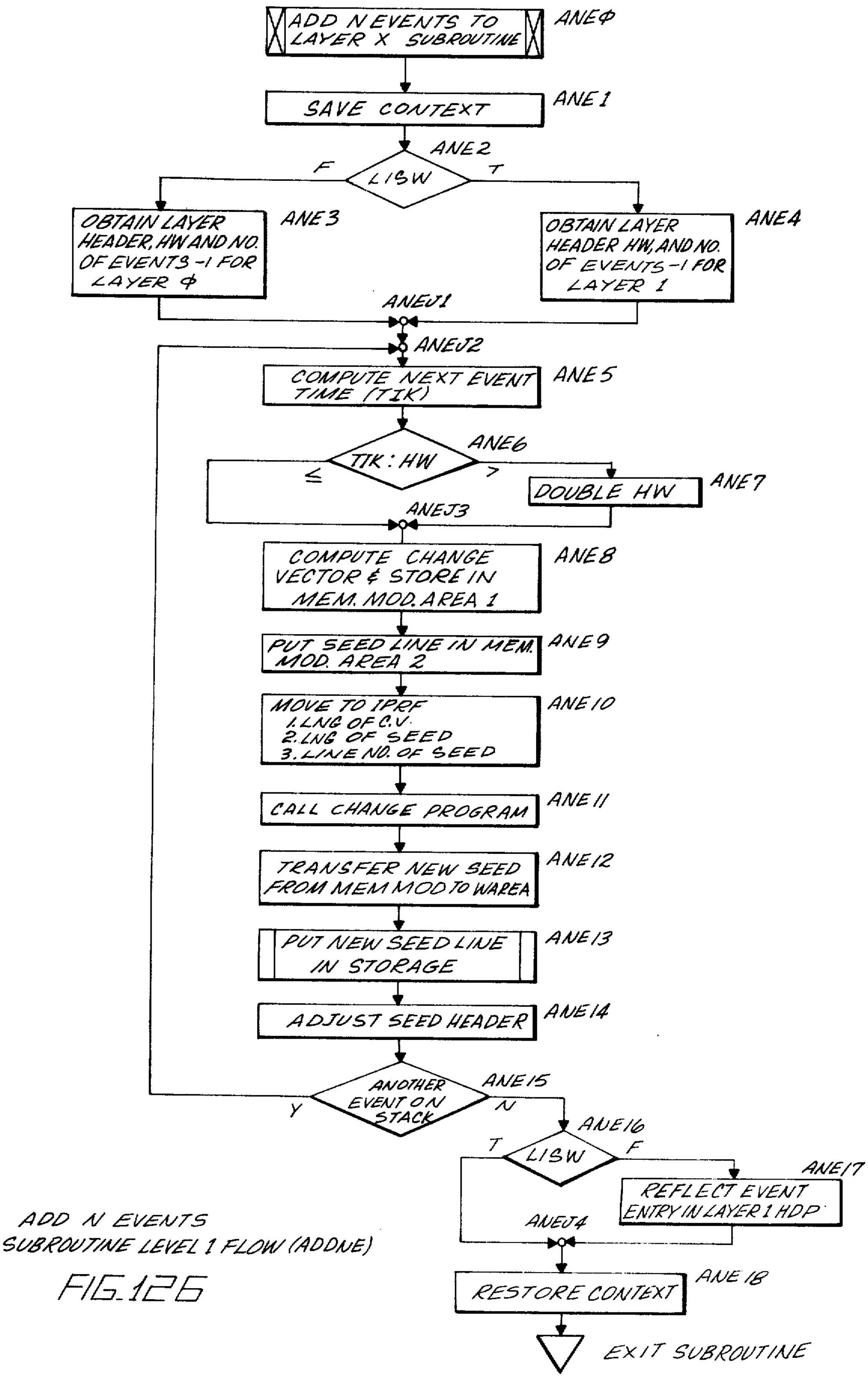
FIG. 126 is an ADD N EVENTS subroutine flow diagram.

Appendix B-22 shows the code for the ADD N EVENTS subroutine. FIG. 126 is a flow diagram illustrating the sequence of operation of the ADD N EVENTS subroutine, level 1 program. The symbols ANE0 through ANE18 are used to identify the flow blocks. These same symbols are used in the code to show the relation between code and flow.

The ADD N EVENTS (ADDNE) subroutine is the subroutine which adds into either layer 1 or layer 2 or layer 0 of the data base the signals which represent the events making up the top entry on ESTAK. The N, representing the number of events which are to be added, is specified by RLN0 for a layer 0 entry and RLN1 for a layer 1 entry. Referring to ANE0 of the flow, the symbol X is used to identify either a 1 or a 0 for layer 1 or layer 0. Thus ADDNE stores information on either layer 0 or layer 1 of the data base.

The ADDNE subroutine is called for adding events on layer 0 during PLE4 and PLE7 of the PL0E subroutine (FIG. 125) and is called for adding events onto layer 1 during DB7.9.18 of the PROCESS ENTRY program (FIG. 124).

Upon entry into the ADDNE subroutine the relevant storage structure is as follows: if L1SW = 0, ESTAK contains at the top layer 0 seed header addresses, RLN0 = N = number of such layer 0 events; if L1SW = 1, ESTAK contains at the top layer 1 seed header addresses, RLN1 = N = number of such layer 1 events.

During ANE1 of the flow the context of R0, R2 and R4 are saved for return to the originating program. During ANE2 the L1SW switch is tested to determine whether it is a 1, identifying that events are to be added on layer 1, or a 0, designating that events are to be added on layer 0.

If the L1SW switch is a 0, designating layer 0, ANE3 of the flow is entered where the program obtains the address of the layer 0 header and obtains the iso-entropicgram width value HW0, and the number of events value RLN0. The number of entries value is decreased by 1. To this end the instruction MOV L0PTR,LPTR moves the layer 0 event pointer (L0PTR) for the layer 0 to register LPTR. The instruction MOV HW0,HW moves the iso-entropicgram width value HW0 from HW0 to software register HW. The instruction DEC RLN causes the number of layer 0 events value (on ESTAK) to be transferred from register RLN0 to RLN and to be decreased by 1. The value in RLN0 is decremented by 1 in RLN to remove from the count the beginning delimiter ƀ stored in ESTAK.

Returning to ANE2, should the L1SW switch be a 1, indicating a layer 1 addition is to be made, ANE4 of the flow is entered where the layer 1 header pointer (L1PTR), the iso-entropicgram width value (HW1), and the number of layer 1 entries (in ESTAK), are transferred to LPTR,HW and RLN and the value in RLN is decremented by 1 in the same manner described for the corresponding layer 0 parameters for ANE3.

Following ANE4, ANEJ1, ANEJ2, and ANE5 of the flow are entered. During ANE5 the next event-time is computed. To this end the instructions and operation are as follows:

MOV@LPTR,LXET — moves the address of the proper layer event pointer table into LXET;

MOV LPTR,R2 — moves the address of the base of the proper layer header into R2;

INC 6(R2) — increments either the event-time TIK0 or TIK1 by one.

During ANE6, the instruction CMP 2(R2),6(R2) causes the iso-entropicgram width value (HW0 or HW1) to be compared with the new event-time (TIK0 or TIK1) stored in words 1 and 4 of the layer header for the layer being processed (see FIG. 120). If the new iso-entropicgram width value (HW0 or HW1)is the larger, ANE7 of the flow is entered where the iso-entropicgram width value is doubled in the corresponding layer header. If during ANE6 the iso-entropicgram width value (HW0 or HW1) is found to be the larger, then ANE8 is entered directly, bypassing ANE7.

During ANE8 a change vector is computed. The change vector is the event-time value TIK0 or TIK1 for the corresponding layer presently being processed and is to be stored into the MEMORY MODULE area 1. To this end the instructions depicted in Appendix B-22 for ANE8 and their operation are as follows:

MOV #1,CNGDPM — stores a 1 in CNGDPM selecting MEMORY MODULE area 1;

MOV #1,CNGLNG — stores a value of 1 in CNGLNG for the length of the change seed line;

MOV 6(R2),CNGVEC — moves TIK0 or TIK1 from the corresponding layer header into CNGVEC;

MOV #CNGVEC,R0 — stores the address of CNGVEC into R0 for the call on the MEMDPM routine;

MOV #CNGDPM,R1 — calls the MEMDPM routine which

JSR R5,MEMDPM — moves the one value in the change vector from CNGVEC to MEMORY MODULE area 1.

Thus, following ANE8 the change vector for the current event time (i.e., occurrence value) is stored into MEMORY MODULE area 1.

During ANE9 the seed line for the event now being dealt with is stored into MEMORY MODULE area 2. During ANE10 the program moves the following six values from the indicated registers to the indicated registers of the IPRF:

1. HW→TL
2. 0→BL
3. 0→IR
4. The line number of the seed line is moved from the second word of the seed header (2[R4]) into LINE # of the IPRF;
5. The length of change vector is moved from CNGDPM+2 to LN1 of the IPRF:
6. The length of the seed is moved from SEEDPM+2 into LN2 of the IPRF.

During ANE11 the CHANGE program is called causing the change vector in MEMORY MODULE area 1 to appropriately modify the seed whose seed line is contained in MEMORY MODULE area 2, thereby adding the event-time count (TIK0 or TIK1) to the seed line. During ANE12 the new seed line is transferred to the main memory area called WAREA.

During ANE13 the PUT NEW SEED IN STORAGE program (FIG. 127) is called causing the new seed to be placed into storage.

During ANE14 the seed header for the changed seed line which has just been put into storage is adjusted with the new values. Specifically, the line number of the seed, the length of seed, and the number of occurrences in line 0 of the seed line are updated. To this end, during ANE12 the new line number was stored in CNGLIN and the length of the new seed line was stored in CNGLNG. Additionally at this point the register R1 contains the base address of the seed header for the new seed line. Accordingly, the instruction MOV CNGLIN,2(R4) causes the line number for the new seed line to be stored into the second location of the corresponding seed header and the instruction MOV CNGLNG,4(R4) causes the new length of seed line value to be stored into the third word of the corresponding seed header. The instruction INC 6(R4) causes the number of 1's or occurrences in line 0 of the seed line to be stored into the fourth word of the corresponding seed header. Thus the event currently being processed has been updated so that the corresponding seed header and seed line reflect the new seed.

During ANE15 the number of events value stored in RLN is decreased by 1 using the instruction DEC RLN. The instruction BEQ .+2 causes the ANE16 of the flow to be entered if RLN has been reduced to 0, indicating that there are no more entries to be processed. If RLN has not been reduced to 0, the instruction JMP ANEJ2 causes the subroutine program to jump back to join ANEJ2 of the flow where the operation of the loop through ANE5 through ANE15 is repeated for the next event in ESTAK. The loop through ANE5 through ANE15 is repeated until RLN has been reduced to 0, indicating that all events in ESTAK have been entered into the data base.

Assume that all events have been processed and ANE16 is entered. During ANE16 the L1SW switch is checked to see whether it is a 1, indicating a layer 1 entry is being made. If the L1SW switch is a 0, indicating a layer 0 entry, ANJ4 and ANE18 of the flow are entered directly. If the L1SW switch is a 1, indicating an entry on layer 1, then ANE17 of the flow is entered where the L1PTR pointer to the layer 1 header is moved into register R4. The instruction INC 4(R4) causes the value representing the number of events in NE1, the third word of the layer 1 header, to be incremented by 1 to reflect the fact that another event has been entered into layer 1 of the data base. Also the following instructions and operations take place:

| | |
|---|---|
| MOV 4(R4),R1 | causes NE1 to be transferred from the layer 1 header to R1; |
| MOV NXTSH,L1ET(R1) | moves the address of the next seed header into the corresponding position in the layer 1 event pointer table thereby creating a seed header storage area; |
| MOV NXTSH,R2 | saves such address in R2; |
| ADD #10,NXTSH | updates the seed header pointer to the next available one; |
| CLR (R2)+<br>CLR (R2)+<br>CLR (R2)+<br>CLR (R2) | creates a null seed by zeroing out all four words from the newly created seed header storage area. |

During ANE18 the context of the machine is returned to that existing when the subroutine was called and operation of the subroutine exits.

H. PUT NEW SEED IN STORAGE PROGRAM, LEVEL 2

Figure 127:
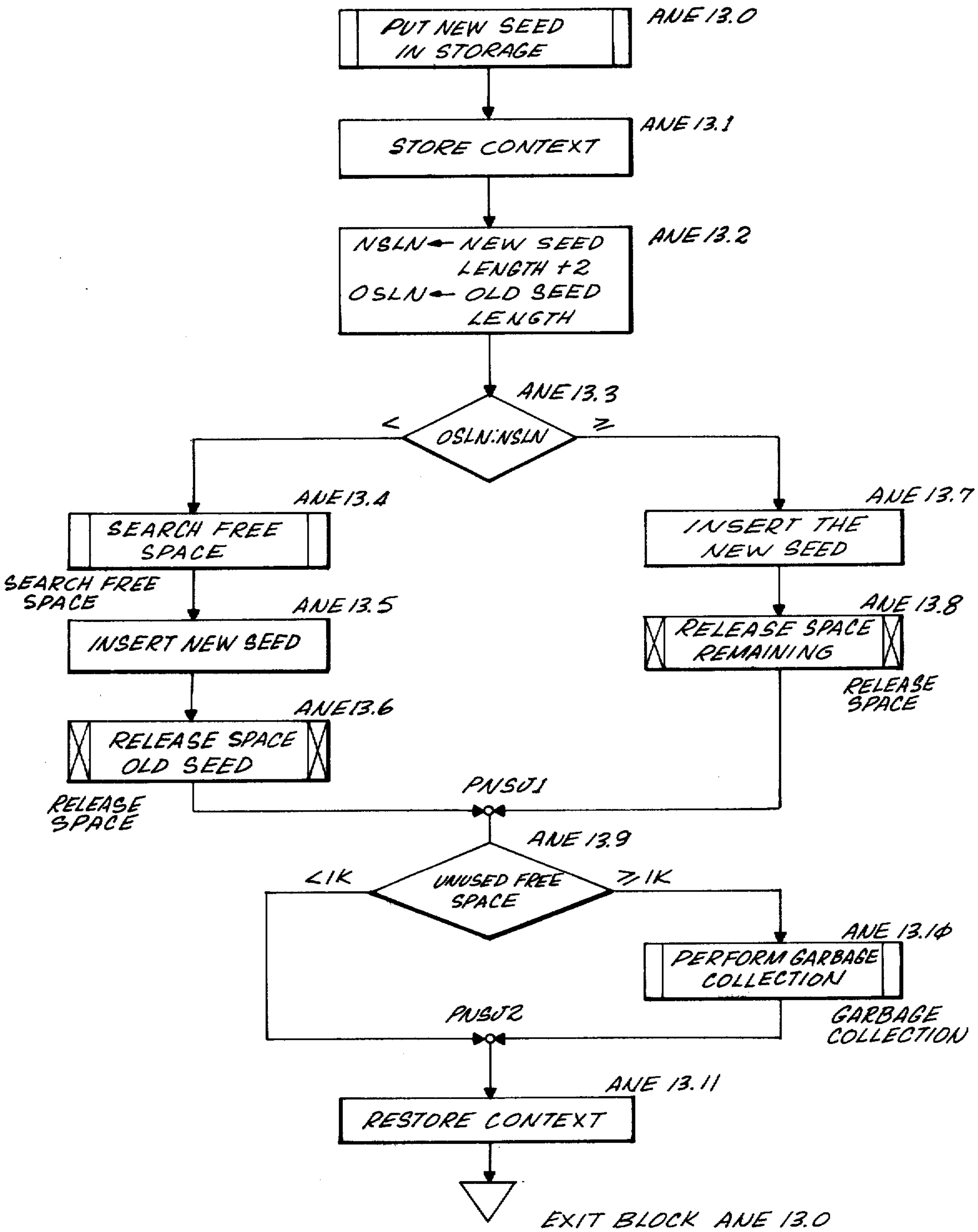
FIG. 127 is a PUT NEW SEED IN STORAGE program flow diagram.

Appendix B-22 contains the program listing for the PUT NEW SEED IN STORAGE program, a level 2 program. FIG. 127 is a flow diagram for the PUT NEW SEED IN STORAGE program. The flow diagram of FIG. 127 has its blocks identified by the symbols ANE13.0 through ANE13.11. The correspondence between the program code of Appendix B-22 and the flow diagram of FIG. 127 is shown in the program code using the symbols of the flow diagram.

The PUT NEW SEED IN STORAGE program is called during ANE13 of the ADD N EVENTS subroutine (FIG. 126). This program places the new seed line into the seed line storage area (see FIG. 116).

During ANE13.1 the context of registers R2, R3 and R4 in the MINI COMPUTER are saved. During ANE13.2, 2 is added to the length of the new seed value which value is now contained in CNGLNG in order to take into account the two words required for the length address (see FIG. 116). The modified length of new seed value is then placed into software register NSLN. To this end the instruction MOV CNGLNG,NSLN,stores the length of the new seed line into NSLN. The instruction ADD #2,NSLN adds the value 2 to the new seed line value in NSLN. In addition during ANE13.2 the value representing the length of the old seed line is obtained from its temporary storage area in SEEDPM+2 and stored into software register OSLN. To this end the instruction MOV SEEDPM+λ 2,OSLN is executed.

Prior to the entering of the PUT NEW SEED IN STORAGE block the length of the old seed had been moved from the seed header to the location SEEDPM+2. The two words at SEEDPM and SEEDPM+2 were used by the MEMDPM subroutine while transferring the old seed to the DPM MEMORY MODULE. When control reaches ANE13.2 the length of the old seed is still contained unchanged in SEEDPM+2.

Figure 128:
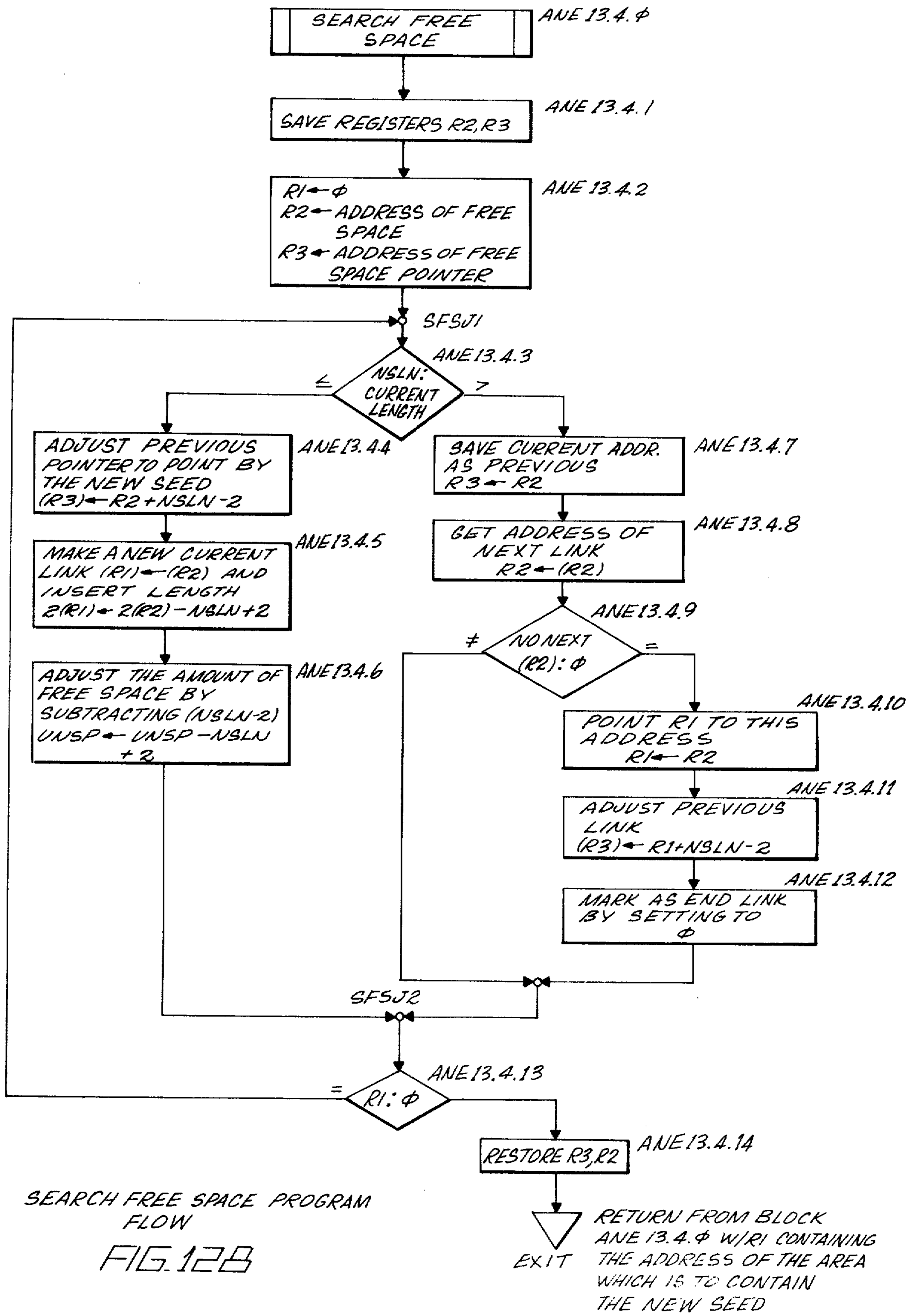
FIG. 128 is a SEARCH FREE SPACE program flow diagram.

ANE13.3 is now entered where the old length value is compared against the new length value in registers OSLN and NSLN, respectively. If the old length value in OSLN is the smaller, ANE13.4 is entered for a search through free space using the SEARCH FREE SPACE program (FIG. 128).

The SEARCH FREE SPACE program returns a pointer in R1 to the storage area where the new seed line can be added.

During ANE13.5 the new seed line is inserted into "free space". To this end the instruction MOV CNGLNG,R0 causes the length of the new seed line to be stored into register R0. The instruction MOV #WAREA,R2 causes the beginning address of WAREA which contains the new seed line to be stored into register R2. Register R1 following the SEARCH FREE SPACE operation of ANE13.4 contains the address of the beginning of the space that will contain the new seed. It can be either free space or available space. The instruction MOV (R2)+,(R1)+ causes a word to be moved from the address in WAREA specified by register R2 to the free space area specified by the address in register R1 and the addresses in the registers R2 and R1 are subsequently incremented by 1. The instruction DEC R0 causes the length of the new seed line value contained in register R0 to be decremented by 1. The instruction BNE .−2 causes the instructions MOV (R2)+,(R1)+ and DEC R0 to be repeated until the length of the new seed line value in register R0 has been decremented to 0, thereby indicating that each of the words in the seed line has been transferred to the free space area pointed at by register R1. After the value in R0 has been decremented to 0, ANEL13.6 is entered where the RELEASE SPACE subroutine (FIG. 129) is executed which returns the old seed line space to the "free space" list. PNSJ1 and ANE13.9 are then entered.

Returning to ANE13.3, should the length of the old seed line in OSLN be equal to or greater than that of the new seed line in NSLN, ANE13.7 and ANE13.8 of the flow are entered where the new seed line is inserted into the storage area that was occupied by the old seed line. To this end the address, located at the address specified by R4, is the address of the beginning of the storage area which contained the old seed line, and is stored into register R1. The instruction MOV CNGLNG,R0 causes the length of the new seed line to be stored into register R0. WAREA contains the new seed line. The instruction MOV #WAREA,R2 causes the beginning address of WAREA to be stored into register R2. The instruction MOV (R2)+,(R1)+ causes a word to be transferred from the memory location in WAREA specified by register R2 to the location in the old seed line storage area specified by register R1 and the address in these two registers is then incremented. The instruction DEC R0 decrements the length of new seed line value in register R0 by 1 to reflect that one word has been transferred from WAREA to the storage area for the old seed line. The instruction BNE .−2 causes the program to branch back to the MOV (R2)+,(R1)+ instruction. This loop is repeated until each of the words of the new seed line has been transferred from WAREA to the old seed line storage area.

When the length of new seed line value in R0 has been reduced to 0, all words have been transferred from WAREA to the storage area for the old seed line and ANE13.8 of the flow is entered.

During ANE13.8, the remainder of the storage space occupied by the old seed is released. To this end the instruction MOV OSLN,R0 moves the length of the old seed line to register R0. The instruction SUB CNGLNG,R0 causes the length of the new seed contained in CNGLNG to be subtracted from the old seed length in R0. The difference is the amount of space to release. The instruction JSR R5,RLSP causes the RELEASE SPACE subroutine program (FIG. 120) to be called. Subsequently, PNSJ1 and ANE13.9 of the flow are entered. During ANE13.9 a check is made to determine if there are more than 1000 words of unused free space and if so, ANE13.10 is entered.

Referring to the program code for ANE13.9, the software register UNSP contains a value representing the unused free space. The instruction CMP #1750,UNSP causes the number of words in free space to be compared with the octal value 1750, i.e., $1750_8 = 1000_{10}$. If a true comparison results, then the instruction BLOS .+2 causes the GARBAGE COLLECTION program to be called into operation. If equality is not detected, then the instruction JMP PNSJ2 causes ANE13.11 of the flow to be entered.

During ANE13.11 the context of the saved registers is restored.

I. SEARCH FREE SPACE PROGRAM, LEVEL 3

Appendix B-22 contains the program code for the SEARCH FREE SPACE program. FIG. 128 shows a flow diagram of the SEARCH FREE SPACE program. The flow diagram contains blocks identified by the symbols ANE13.4.1 through ANE13.4.14. The correspondence between the code and the flow is depicted in the code using the symbols in the flow.

This routine searches the free space list for a section which can contain the new seed line. If such a section is found, the free space list is adjusted and a pointer is returned which points to the section. If no such section is found, a pointer is returned which points to available space. At ANE13.4.1, the context of registers R2 and R3 are saved. At ANE13.4.2, register R1 is initialized to 0, register R3 points to the address of the free space variable pointer, and register R2 points to the first address in free space. At ANE13.4.3, NSLN (the new seed length) is compared with the length of the current section in free space. If the new seed length is less than or equal to this section, control goes to ANE13.4.4. The pointers are adjusted so that the previous link in the list of free space points around the space which will be used to store the new seed line. At ANE13.4.5 the current link is adjusted to reflect its new status. At this point a section has been found that will contain the new seed. However, there will be space left over and this space must be added to the free space list of 119D(*a* and *b*).

At ANE13.4.6 the unused space variable (UNSP) is diminished by the amount equivalent to the length of the new seed line. Control then goes to ANE13.4.13.

Returning to ANE13.4.3, if the new seed line length is greater than the current section of free space, ANE13.4.7 is entered where R3 is updated, i.e., the current pointer becomes the previous one. R2 points to the next free space available. At ANE13.4.9 a check is made to see whether there is another link in the free space list or if the end of the list has been reached. If the end of the list has not been reached, control goes down to ANE13.4.13. If the end of the list has been reached, R1 is adjusted to point at the beginning of the available space and the previous linked list is adjusted to point beyond the amount of space needed to store the new seed. This is done at ANE13.4.10 and ANE13.4.11. At ANE13.4.12 the new beginning of available space is flagged with a 0 link. Control comes down to ANE13.4.13 where register 1 is checked. If it is equal to 0, control goes back to ANE13.4.3 and another section on the linked list is checked. Otherwise, registers R2 and R3 are restored and control exits from this block with R1 pointing to the storage area which will contain the new seed line.

J. RELEASE SPACE SUBROUTINE FLOW, LEVEL 3

Figure 129:
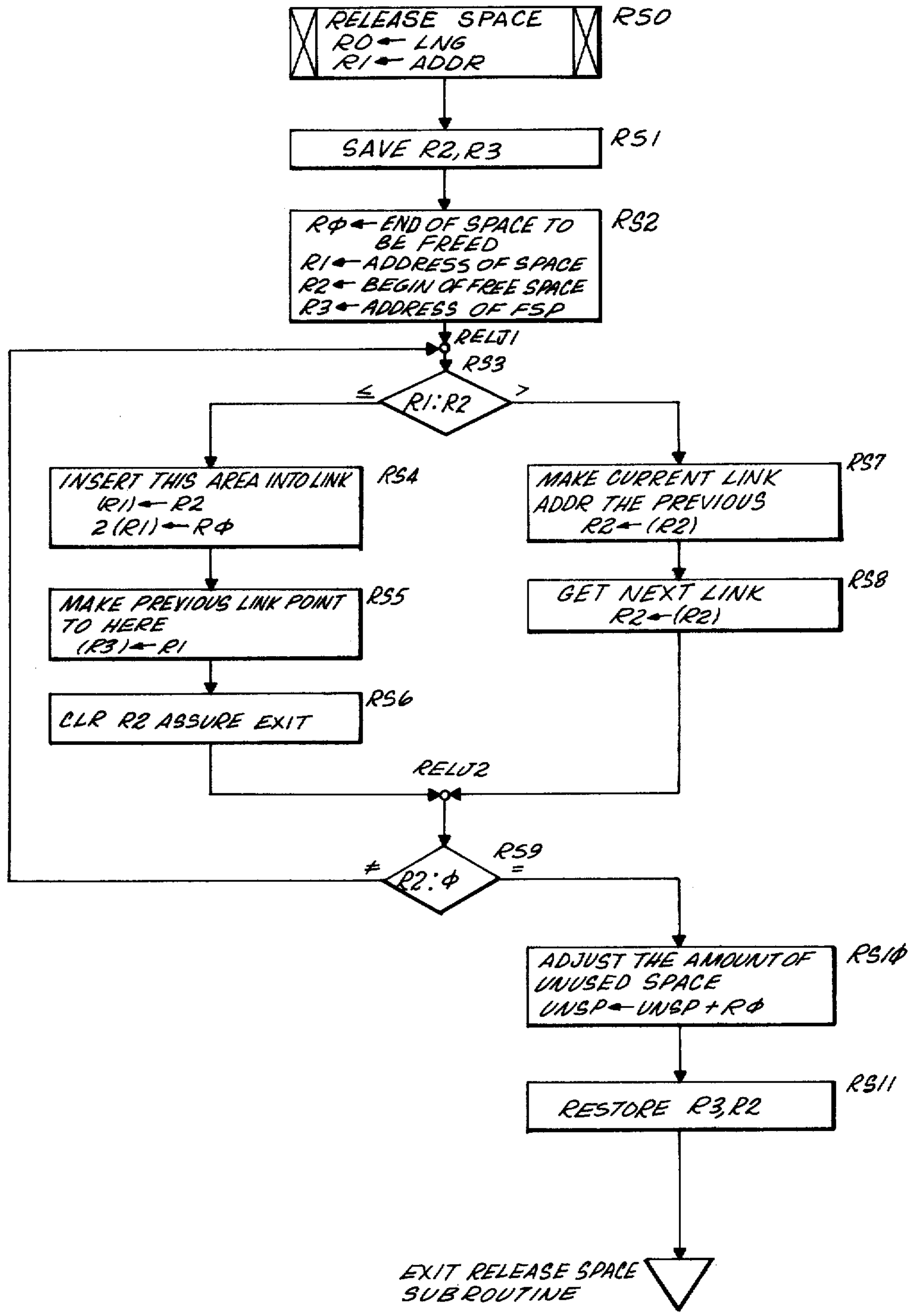
FIG. 129 is a RELEASE SPACE subroutine flow diagram.

The program code for the RELEASE SPACE subroutine is contained in Appendix B-22. FIG. 129 contains a flow diagram for the RELEASE SPACE subroutine. The various blocks of the flow are depicted by the symbols RS1 through RS11. The correspondence between the program code and the flow is depicted in the code using the symbols identifying the blocks of the flow.

The RELEASE SPACE subroutine is called during ANE13.6 and ANE13.8 of the PUT NEW SEED IN STORAGE program (FIG. 127). This subroutine has as input parameters a pointer to the storage area section to be released and the length of the section. The routine simply skips down through the linked list of free space and inserts the new link in the proper place. The additional free space is reflected in the unused space variable, UNSP. Initially during RS1 the context of registers R2 and R3 are saved. Control then goes to RS2 where R2 is pointed to the beginning of free space, R1 contains the address of the area to be freed, R0 contains the length of the area, and R3 points to the beginning address of free space. R3 is a pointer to the previous link and R2 is a pointer to the current link. At RS3, R1 is compared with R2. The address of the area to be freed is compared with the current address. If the address of the area to be freed is less than the current address, it indicates that the released space is to be inserted into the list at this position. At RS4, the new link and its length are inserted into the free space list of FIG. 119*c*.

At RS5 the old link is adjusted and at RS6, R2 is cleared to assure an exit. Control goes to RS9.

Returning to RS3, if R1, the address of the area to be freed, is greater than R2, the current address in the link, then RS7 is entered where R3 is copied from R2. In other words, the current pointer becomes the previous pointer and R2 is updated to point to the next link in the chain. Control comes down to RS9 and R2 is checked. If it is not 0, control comes back up to RS3. If R2 is 0, unused space is incremented by the length of the section just inserted, which is reflected in R0. Registers R3 and R2 are restored and exit is taken from the RELEASE SPACE subroutine.

K. GARBAGE COLLECTION PROGRAM, LEVEL 3

Figure 130:
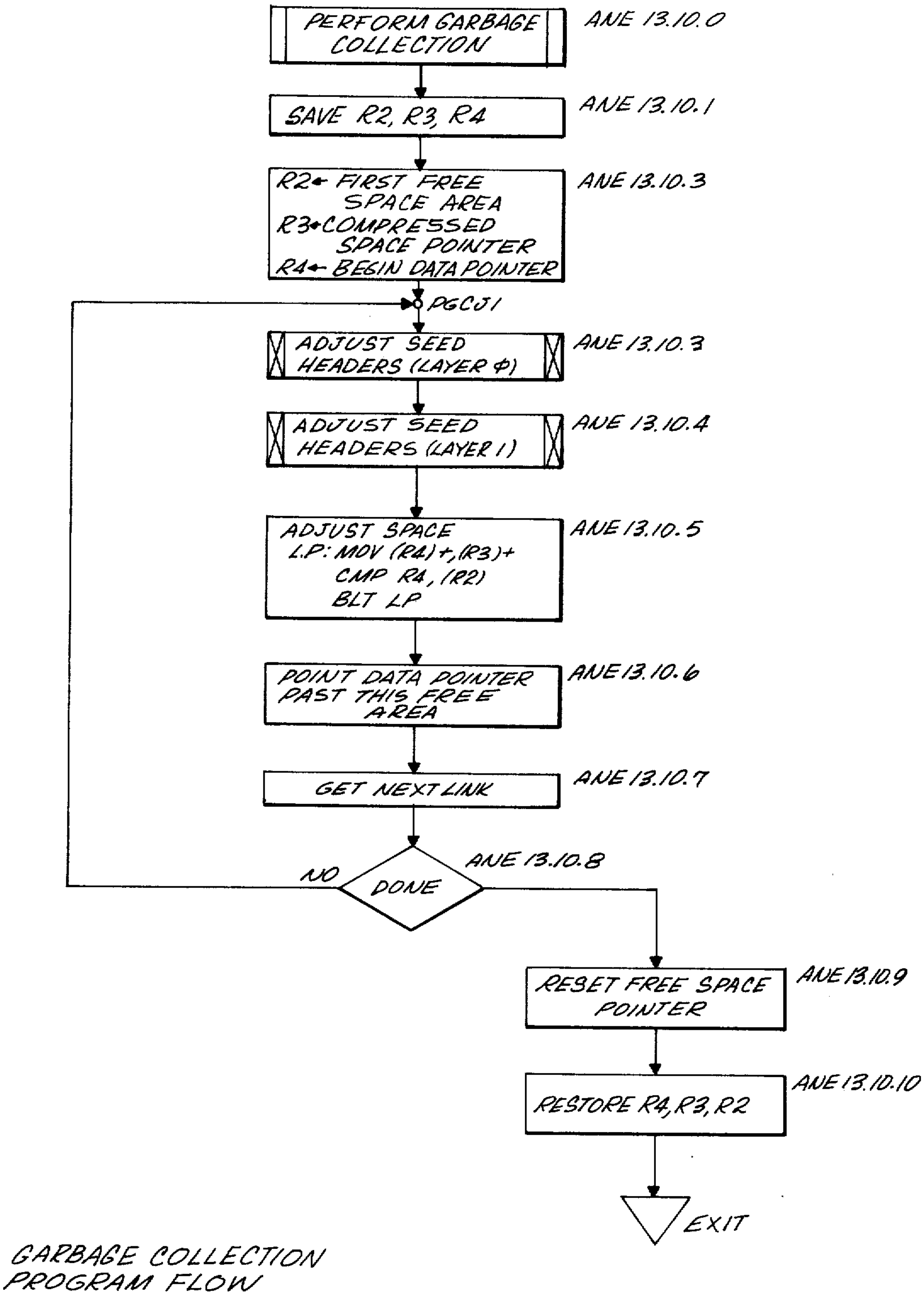
FIG. 130 is a GARBAGE COLLECTION program flow diagram.

Appendix B-22 contains the program code for the GARBAGE COLLECTION program. FIG. 130 is a flow diagram of the GARBAGE COLLECTION program. Symbols ANE13.10.1 through ANE13.10.10 are used to identify the various blocks of the flow and are used in the program code to identify the corresponding code.

The GARBAGE COLLECTION program is entered during ANE13.10 of the PUT NEW SEED IN STORAGE program (FIG. 127). The GARBAGE COLLECTION program goes through the linked list of free space and returns that space to available space which is located at the end of the seed lines.

In other words, where there is a gap in the storage area, that gap will be closed and the pointer in the seed headers will be updated accordingly. This operation was summarized in the foregoing discussion of data structures. Therefore, at ANE13.10.1 the context of registers R2, R3 and R4 is saved. At ANE13.10.2, R2 points to the first free space area, and R3 points to the first available address to be used for compression. R3 points to the beginning of the space to be compressed. R4 points to the first data address beyond this free area. At ANE13.10.3 the ADJUST SEED HEADER program is called and the seed headers for layer 0 are adjusted. At ANE13.10.4 the seed headers for layer 1 are adjusted. And at ANE13.10.5, the data are moved up to eliminate the free area. At ANE13.10.6, the data pointer (R4) is adjusted to point to the data beyond this next free area. At ANE13.10.7, the next pointer is obtained. At ANE13.10.8 a check is made to see whether the linked list of free space has been completely gone through. If not, control returns to ANE13.10.3. If so, the free space pointer is reset to point to the first available free word in storage. At ANE13.10.10 R2, R3 and R4 are restored and the block is exited.

L. ADJUST SEED HEADER SUBROUTINE

Figure 131:
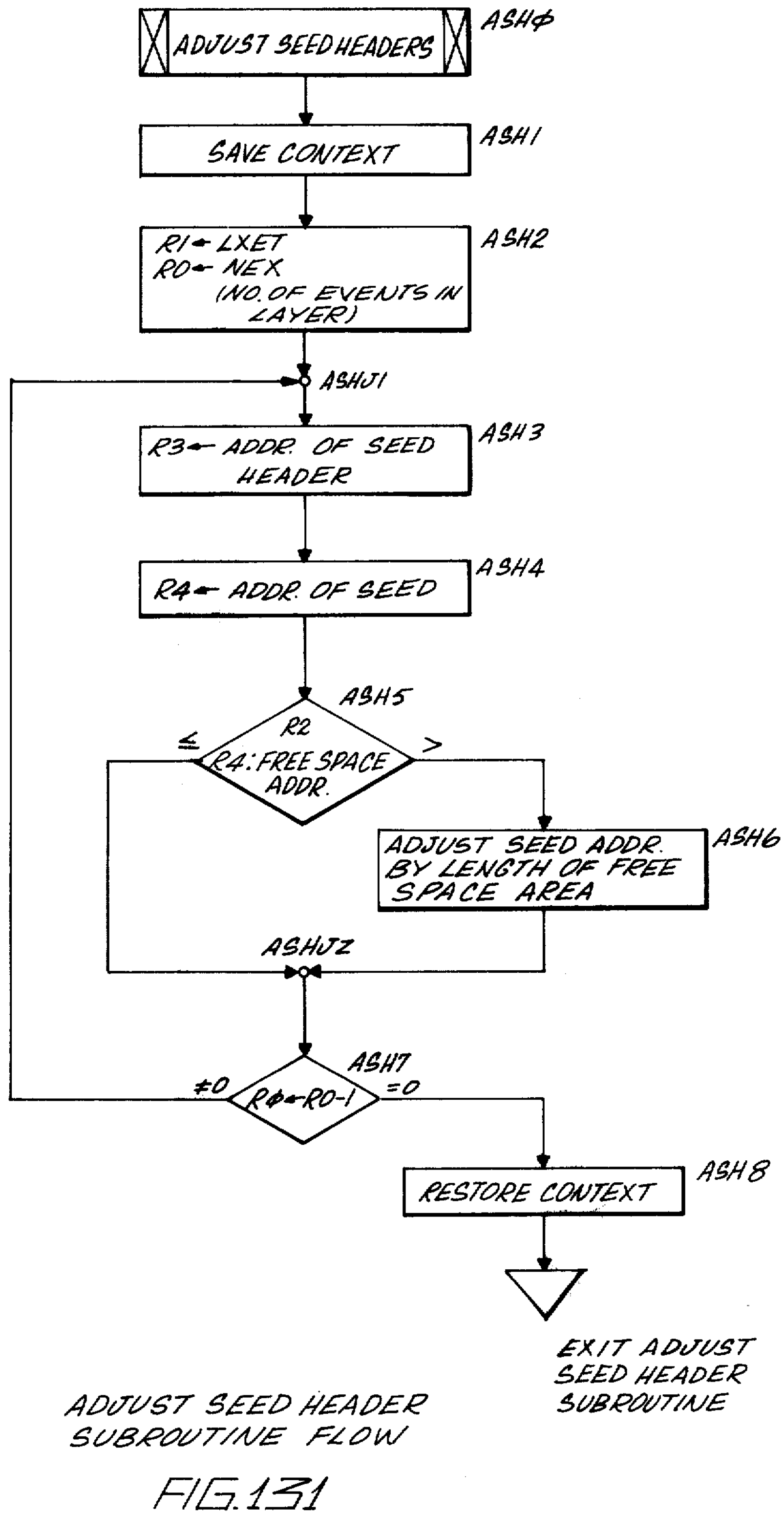
FIG. 131 is an ADJUST SEED HEADER subroutine flow diagram.

The ADJUST SEED HEADER subroutine program code is contained in Appendix B-22. The flow diagram for the ADJUST SEED HEADER subroutine is depicted in FIG. 131. The blocks of the flow are identified by the symbols ASH1 through ASH8 and these symbols are used to identify the corresponding code.

The ADJUST SEED HEADER subroutine flow is called during ANE13.10.3 and ANE13.10.4 of the GARBAGE COLLECTION program, FIG. 130.

Briefly, this program adjusts the seed headers for layers 0 and 1. The subroutine searches through the events associated with the corresponding layer. All those events whose seeds are at addresses which are greater than the address of the free space section being compressed are reduced by an amount which is equal to the length of the free space section. Visualizing available space as a linear list, this would be equivalent to a left shift.

At ASH1, context is saved. At ASH2, R1 points to the appropriate layer event table and R0 points to the number of events in this layer, whether it be layer 0 or layer 1. At ASH3, register 3 points to the address of the current seed header. At ASH4, R4 points to the address of the seed. At ASH5, the address of the seed, R4, is compared with the current free space address which was passed into the program as a parameter in R2. If R4 is greater than R2, i.e., the seed lies beyond this free space, the seed header is adjusted by subtracting the length of the current free space section from the seed header seed address. This merely reflects that somewhere the seed is going to be moved to the left by an amount equal to the length of the free space area being compressed. At ASH7, 1 is subtracted from the number of entries. In other words, the system is going to go through this loop looking at every entry in the layer event table. If it is not 0, ASH3 is entered. If it is 0, context is restored and the subroutine is exited.

Although tables and memory linkages are shown by way of example, it should be understood that these may be replaced by the layering mechanism disclosed herein.

APPENDIX A

INDEX OF TABLES

| Table No. | Description |
|---|---|
| 1 | Example of word layer 0 |
| 2A | Example of event clock |
| 2B | Example of absolute coded occurrence vectors from layer 0 of Table 1 |
| 3 | Example of sentence layer 1 |
| 4A-E | Example of iso-entropicgram |
| 5 | Example of one line revolve from line 0 to line 1 of Table 4 |
| 6 | Example of Delta |
| 7 | Example of iso-entripicgram without 0's |
| 8 | Example of occurrence vectors in "bit string" and "absolute" coded form |
| 9 | Example of hybrid encoding |
| 9A | Changing hypothetical event "X" |
| 9B | Example of Revolve |
| 9C | Inverted Delta from Table 6 |
| 9D | Example of Revolve |
| 9E | Example of Del operation |
| 9F | Example of alternate DEL operation |
| 10 | Symbols used to identify module originating signals on input/output control lines |
| 11 | Primary inputs and outputs for modules of DPM SYSTEM of FIG. 1 |
| 12 | ENCODE MODULE list of registers, counters and flip flops |
| 13 | DECODE I MODULE list of registers, counters, flip flops and multivibrators |
| 14 | DELTA MODULE example of operation |
| 15 | DELTA MODULE list of principal registers, counters, flip flops and multivibrators |
| 16 | SEED MODULE list of principal registers, counters, flip flops and multivibrators |
| 17 | OUTPUT MODULE list of principal registers, counters, flip flops and multivibrators |
| 18–32 | Examples for PIPE MODULE |
| 33 | PIPE MODULE list of principal registers, counters, flip flops and multivibrators |
| 34–40 | Examples of the operation associated with the BRIGHTNESS MODULE |
| 41 | Example of the operation of the BRIGHTNESS MODULE |
| 42 | DPM INTERFACE MODULE states of flip flops m1 and m2 corresponding areas of MEMORY MODULE selected |
| 43 | DPM INTERFACE MODULE states of flip flops ml and m2 and areas of P/B MEMORY selected |
| 44 | Example of revolve through an iso-entropicgram using the SWITCH MATRIX and MEMORY MODULE |
| 45 | Example of the operation of the SWITCH MATRIX and MEMORY MODULE |
| 46 | Example of revolve for alternate compaction and retrieval machine of FIG. 61 |
| 47 | Iso-entropicgram for example of Table 46 |
| 48 | DELTA 2 MODULE example of operation |
| 49 | DELTA 2 MODULE list of principal registers, counters and flip flops |
| 50A | DELTA 2 MODULE list of inputs/outputs |
| 50B | REVOLVE 2 MODULE list of inputs/outputs |
| 50C | REVOLVE 3 MODULE list of inputs/outputs |
| 50D | SEED 2 MODULE list of inputs/outputs |
| 50E | OUTPUT 2 MODULE list of inputs/outputs |
| 50F | CHANGE 2 MODULE list of inputs/outputs |
| 50G | AUXILIARY MEMORY II list of inputs/outputs |
| 51 | REVOLVE 2 MODULE example of iso-entropicgram |
| 52 | REVOLVE 2 MODULE example of revolve |

APPENDIX A-continued

INDEX OF TABLES

| Table No. | Description |
|---|---|
| | operation for iso-entropicgram of Table 51 |
| 53 | REVOLVE 2 MODULE principal registers, counters and flip flops |
| 54 | not used |
| 55 | REVOLVE 3 MODULE example of revolve operation for iso-entropicgram of Table 51 |
| 56 | SEED 2 MODULE list of principal registers, counters and flip flops |
| 57 | OUTPUT 2 MODULE list of registers, counters and flip flops |
| 58 | OUTPUT 2 MODULE example of operation |
| 58A | CHANGE 2 MODULE list of registers, counters and flip flops |
| 59 | Hardware and software flags, registers and memory areas used for PARSER program |
| 60A | Example of form of word layer 0 request and sentence layer 1 request |
| 60B-60O | Example of operation of PARSER, PIPE, and BRIGHT programs |
| 61 | Hardware and software flags, registers and memory areas used for PIPE program |
| 62 | Hardware and software flags, registers and memory areas used for BRIGHT program |
| 63 | Hardware and software flags, registers and memory areas used for OUTPUT subroutine |
| 64 | Hardware and software flags, registers and memory areas used for MEMDPM subroutine |
| 65 | Hardware and software flags, registers and memory areas used for DPMMEM subroutine |
| 66 | Hardware and software flags, registers and memory areas used for DECODE I subroutine |
| 67 | Hardware and software flags, registers and memory areas for INSERT subroutine |

TABLE 1

WORD LAYER 0 FOR SENTENCE "THIS IS A TEST"

POSSIBLE OCCURRENCE VALUES OR EVENT TIMES — THIS IS A TEST

| LINES | EVENTS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | | 1 | 0 | 0 | 0 | 0 | 1 | 0 | 0 | 1 | 0 | 1 | 0 | 0 | 0 | 0 | 1 |
| 1 | T | 0 | 1 | 0 | 0 | 0 | 0 | 0 | 0 | 0 | 0 | 0 | 1 | 0 | 0 | 1 | 0 |
| 2 | H | 0 | 0 | 1 | 0 | 0 | 0 | 0 | 0 | 0 | 0 | 0 | 0 | 0 | 0 | 0 | 0 |
| 3 | I | 0 | 0 | 0 | 1 | 0 | 0 | 1 | 0 | 0 | 0 | 0 | 0 | 0 | 0 | 0 | 0 |
| 4 | S | 0 | 0 | 0 | 0 | 1 | 0 | 0 | 1 | 0 | 0 | 0 | 0 | 0 | 1 | 0 | 0 |
| 5 | A | 0 | 0 | 0 | 0 | 0 | 0 | 0 | 0 | 0 | 1 | 0 | 0 | 0 | 0 | 0 | 0 |
| 6 | E | 0 | 0 | 0 | 0 | 0 | 0 | 0 | 0 | 0 | 0 | 0 | 0 | 1 | 0 | 0 | 0 |

TABLE 2A

| clock | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| input | ƀ | T | H | I | S | ƀ | I | S | ƀ | A | ƀ | T | E | S | T | ƀ | # |

TABLE 2B

| Data Events | OCCURRENCE VECTORS |
|---|---|
| ƀ<blank> | [0, 5, 8, 10, 15] |
| T | [1, 11, 14] |
| H | [2] |
| I | [3, 6] |
| S | [4, 7, 13] |
| A | [9] |
| E | [12] |

TABLE 3

LAYER 1 FOR SENTENCE "THIS IS A TEST"

| Line No. | EVENTS | POSSIBLE OCCURRENCE VALUES OR EVENT-TIMES 0 1 2 3 4 5 |
|---|---|---|
| 0 | Phase delimiter—'.' | 1 0 0 0 0 1 |
| 1 | THIS | 0 1 0 0 0 0 |
| 2 | IS | 0 0 1 0 0 0 |
| 3 | A | 0 0 0 1 0 0 |
| 4 | TEST | 0 0 0 0 1 0 |
| 5 | (next new word) | 0 0 0 0 0 0 |

' ' implied pointer allow '.', layer 1 1 2 3 4 5 ← biased (by +1) to

TABLE 4-A

EXAMPLE OF ISO-ENTROPICGRAM

| | | POSSIBLE OCCURRENCE VALUES OR EVENT-TIMES 0 | 1 | 2 | 3 | 4 | 5 | 6 | 7 |
|---|---|---|---|---|---|---|---|---|---|
| INPUT LINE→ | 0 | 1 | 1 | 1 | 0 | 1 | 0 | 1 | 0 |
| | 1 | 1 | 0 | 0 | 1 | 1 | 1 | 1 | 1 |
| SEED | 2 | 1 | 1 | 0 | 1 | 0 | 0 | 0 | 0 |
| | 3 | 1 | 0 | 1 | 1 | 1 | 0 | 0 | 0 |
| | 4 | 1 | 1 | 1 | 0 | 0 | 1 | 0 | 0 |
| | 5 | 1 | 0 | 0 | 1 | 0 | 1 | 1 | 0 |
| | 6 | 1 | 1 | 0 | 1 | 1 | 1 | 0 | 1 |
| | 7 | 1 | 0 | 1 | 1 | 0 | 0 | 1 | 1 |
| INPUT/ OUTPUT LINE→ | 8 | 1 | 1 | 1 | 0 | 1 | 0 | 1 | 0 |

and

TABLE 4-B

| | LINES ↓ | OCCURRENCE VALUES 0 1 2 3 4 5 6 7 8 9 10 11 12 13 14 15 | |
|---|---|---|---|
| Input | 0 | 1 1 1 0 1 0 1 0 0 1 1 0 1 0 1 0 | 2 apart; 2 past edge; look 2 down |
| ↑ (seed) | 1 | 1 0 0 1 1 1 1 1 0 1 0 1 1 1 1 1 | 1 apart |
| | 2 | 1 1 0 1 0 0 0 0 0 1 1 1 0 0 0 0 | 5 past edge; look 5 down |
| | 3 | 1 0 1 1 1 0 0 0 1 0 0 0 1 0 0 0 | |
| | 4 | 1 1 1 0 0 1 0 0 1 1 0 0 1 1 0 0 | |
| | 5 | 1 0 0 1 0 1 1 0 1 0 1 0 1 0 1 0 | |
| | 6 | 1 1 0 1 1 1 0 1 1 1 1 1 1 1 1 1 | 1 apart |
| | 7 | 1 0 1 1 0 0 1 1 1 0 0 0 0 0 0 0 | 9 past edge; look 9* down |
| | 8 | 1 1 1 0 1 0 1 0 1 0 0 0 0 0 0 0 | |
| | 9 | 1 0 0 1 1 1 1 1 1 1 0 0 0 0 0 0 | |
| | 10 | 1 1 0 1 0 0 0 0 0 0 1 0 0 0 0 0 | |
| | 11 | 1 0 1 1 1 0 0 0 0 0 1 1 0 0 0 0 | |
| | 12 | 1 1 1 0 0 1 0 0 0 0 1 0 1 0 0 0 | |
| | 13 | 1 0 0 1 0 1 1 0 0 0 1 1 1 1 0 0 | |
| | 14 | 1 1 0 1 1 1 0 1 0 0 1 0 0 0 1 0 | |
| ↓ | 15 | 1 0 1 1 0 0 1 1 1 0 1 1 0 0 1 1 | |
| Input/Output | 16 | 1 1 1 0 1 0 1 0 0 1 1 0 1 0 1 0 | Wrap around |

*Would wrap around. stop.
Row 7 (1 0 1 1 0 0 1 1) shortest representation of input.

TABLE 4-C

| | 16 wide: 0 1 2 3 4 5 6 7 8 9 10 11 12 13 14 15 |
|---|---|
| LINE 7 | 1 0 1 1 0 0 1 1 |

TABLE 6-continued

| | DELTA POSSIBLE OCCURRENCE VALUES OR EVENT-TIMES 0 | 1 | 2 | 3 | 4 | 5 | 6 | 7 |
|---|---|---|---|---|---|---|---|---|
| 7 | 1 | 1 | 1 | 1 | 1 | 1 | 1 | 1 |

TABLE 4-D

| | | | | | | | | | | | | | | | | | |
|---|---|---|---|---|---|---|---|---|---|---|---|---|---|---|---|---|---|
| Line 7 shifted by 0 | 1 | 0 | 1 | 1 | 0 | 0 | 1 | 1 | | | | | | | | | |
| Line 7 shifted by 8 | | | | | | | | | 1 | 0 | 1 | 1 | 0 | 0 | 1 | 1 | |
| Result of XOR Line 15 | 1 | 0 | 1 | 1 | 0 | 0 | 1 | 1 | 1 | 0 | 1 | 1 | 0 | 0 | 1 | 1 | |
| Result shifted by 1 | | 1 | 0 | 1 | 1 | 0 | 0 | 1 | 1 | 1 | 0 | 1 | 1 | 0 | 0 | 1 | 1 |
| Result of XOR Line 16 | 1 | 1 | 1 | 0 | 1 | 0 | 1 | 0 | 0 | 1 | 1 | 0 | 1 | 0 | 1 | 0 | |

TABLE 4-E

| | |
|---|---|
| Row 7 shifted by 0 | 0, 2, 3, 6, 7 |
| Row 7 shifted by 8 | 8, 10, 11, 14, 15 |
| Result of XOR - Row 15 | 0, 2, 3, 6, 7, 8, 10, 11, 14, 15 |
| Result shifted by 1 | 1, 3, 4, 7, 8, 9, 11, 12, 15, 16 |
| Result of XOR - Row 16 | 0, 1, 2, 4, 6, 9, 10, 12, 14 |

TABLE 5

Line 0

```
  1 1 1 0 1 0 1 0 ┌─Truncate here
    1 1 1 0 1 0 1|0
1 1 0 0 1 1 1 1 1
```

TABLE 6

| | DELTA POSSIBLE OCCURRENCE VALUES OR EVENT-TIMES 0 | 1 | 2 | 3 | 4 | 5 | 6 | 7 |
|---|---|---|---|---|---|---|---|---|
| 0 | 1 | 0 | 0 | 0 | 0 | 0 | 0 | 0 |
| 1 | 1 | 1 | 0 | 0 | 0 | 0 | 0 | 0 |
| 2 | 1 | 0 | 1 | 0 | 0 | 0 | 0 | 0 |
| 3 | 1 | 1 | 1 | 1 | 0 | 0 | 0 | 0 |
| 4 | 1 | 0 | 0 | 0 | 1 | 0 | 0 | 0 |
| 5 | 1 | 1 | 0 | 0 | 1 | 1 | 0 | 0 |
| 6 | 1 | 0 | 1 | 0 | 1 | 0 | 1 | 0 |

TABLE 7

| 0 | 1 | 2 | 3 | 4 | 5 | 6 | 7 | |
|---|---|---|---|---|---|---|---|---|
| 1 | | | | 1 | | | | 0 |
| 1 | 1 | | | 1 | 1 | | | 1 |
| 1 | | 1 | | 1 | | 1 | | 2 |
| 1 | 1 | 1 | 1 | 1 | 1 | 1 | 1 | 3 |
| 1 | | | | | | | | 4 |
| 1 | 1 | | | | | | | 5 |
| 1 | | 1 | | | | | | 6 |
| 1 | 1 | 1 | 1 | | | | | 7 |

TABLE 8

| | |
|---|---|
| 0 1 2 3 4 5 6 7 | POSSIBLE OCCURRENCE VALUES |
| (1) | OCCURRENCE VECTOR - BIT STRING FORM |
| (2) | OCCURRENCE VECTOR - ABSOLUTE FORM |

EXAMPLE OF HYBRID ENCODING
TYPE BIT

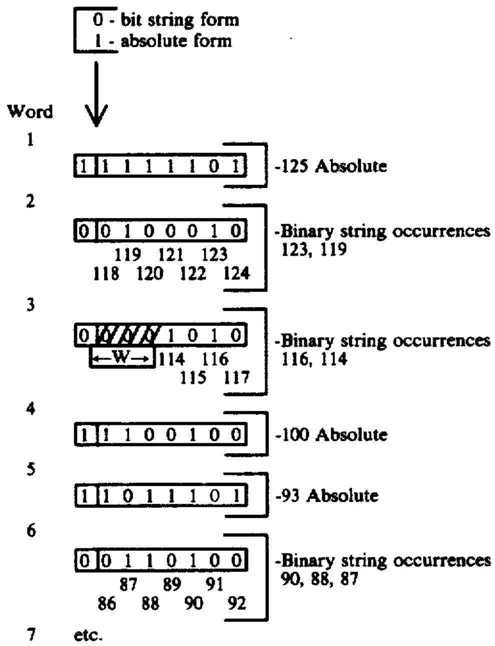

TABLE 9-A

CHANGING HYPOTHETICAL EVENT "X"

| | | | | | | | | |
|---|---|---|---|---|---|---|---|---|
| a) Occurrence of 'X': | | 0 | 2 | 6 | 10 | 12 | | |
| Changes: | | | | | | | | |
| b) Deletions: | 6 | 12 | | | | | | |
| c) Insertions: | 1 | 3 | 8 | 9 | 11 | | | |
| d) Change Vector: | 1 | 3 | 6 | 8 | 9 | 11 | 12 | |
| e) XOR of a) & d): | 0 | 1 | 2 | 3 | 8 | 9 | 10 | 11 |

| | Line | Line Value |
|---|---|---|
| f) Seed of 'X' after changes: | 5 | 0 |
| g) Seed of 'X': | 6 | 0 6 12 |
| h) Change Vector | 6 | 1 6 12 |
| i) XOR of g) & h): | 6 | 0 1 |
| j) Seed i) | 5 | 0 |

TABLE 9-B

| OCCURRENCE VALUES / LINE NO. | | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|---|
| | 0 | 1 | 1 | 1 | 1 | 0 | 0 | 0 | 0 | 1 | 1 | 1 | 1 | 0 | 0 | 0 | 0 | ↓ |
| | 1 | 1 | 0 | 0 | 0 | 1 | 0 | 0 | 0 | 1 | 0 | 0 | 0 | 1 | 0 | 0 | 0 | ↓ |
| | 2 | 1 | 1 | 0 | 0 | 1 | 1 | 0 | 0 | 1 | 1 | 0 | 0 | 1 | 1 | 0 | 0 | ↓ |
| | 3 | 1 | 0 | 1 | 0 | 1 | 0 | 1 | 0 | 1 | 0 | 1 | 0 | 1 | 0 | 1 | 0 | ↓ |
| | 4 | 1 | 1 | 1 | 1 | 1 | 1 | 1 | 1 | 1 | 1 | 1 | 1 | 1 | 1 | 1 | 1 | ↓ |
| Seed Line | →5 | 1 | 0 | 0 | 0 | 0 | 0 | 0 | 0 | 0 | 0 | 0 | 0 | 0 | 0 | 0 | 0 | ← |
| | 6 | 1 | 1 | 0 | 0 | 0 | 0 | 0 | 0 | 0 | 0 | 0 | 0 | 0 | 0 | 0 | 0 | |
| | 7 | 1 | 0 | 1 | 0 | 0 | 0 | 0 | 0 | 0 | 0 | 0 | 0 | 0 | 0 | 0 | 0 | ↓ |
| | 8 | 1 | 1 | 1 | 1 | 0 | 0 | 0 | 0 | 0 | 0 | 0 | 0 | 0 | 0 | 0 | 0 | ↓ |
| | 9 | 1 | 0 | 0 | 0 | 1 | 0 | 0 | 0 | 0 | 0 | 0 | 0 | 0 | 0 | 0 | 0 | ↓ |
| | 10 | 1 | 1 | 0 | 0 | 1 | 1 | 0 | 0 | 0 | 0 | 0 | 0 | 0 | 0 | 0 | 0 | ↓ |
| | 11 | 1 | 0 | 1 | 0 | 1 | 0 | 1 | 0 | 0 | 0 | 0 | 0 | 0 | 0 | 0 | 0 | ↓ |
| | 12 | 1 | 1 | 1 | 1 | 1 | 1 | 1 | 1 | 0 | 0 | 0 | 0 | 0 | 0 | 0 | 0 | ↓ |
| | 13 | 1 | 0 | 0 | 0 | 0 | 0 | 0 | 0 | 1 | 0 | 0 | 0 | 0 | 0 | 0 | 0 | ↓ |
| | 14 | 1 | 1 | 0 | 0 | 0 | 0 | 0 | 0 | 1 | 1 | 0 | 0 | 0 | 0 | 0 | 0 | ↓ |
| | 15 | 1 | 0 | 1 | 0 | 0 | 0 | 0 | 0 | 1 | 0 | 1 | 0 | 0 | 0 | 0 | 0 | ↓ |

New Seed Line:
$6 + 15 = 21 = \boxed{5 \bmod 16}$

| New Seed: | Line | Line Value |
|---|---|---|
| | 5 | 0 |

TABLE 9-C

INVERTED DELTA FROM TABLE 6

| | LINE ↓ | POSSIBLE OCCURRENCE VALUES 0 | 1 | 2 | 3 | 4 | 5 | 6 | 7 |
|---|---|---|---|---|---|---|---|---|---|
| | 7 | 1 | 1 | 1 | 1 | 1 | 1 | 1 | 1 |
| | 6 | 0 | 1 | 0 | 1 | 0 | 1 | 0 | 1 |
| Lines | 5 | 0 | 0 | 1 | 1 | 0 | 0 | 1 | 1 |
| | 4 | 0 | 0 | 0 | 1 | 0 | 0 | 0 | 1 |
| | 3 | 0 | 0 | 0 | 0 | 1 | 1 | 1 | 1 |
| | 2 | 0 | 0 | 0 | 0 | 0 | 1 | 0 | 1 |
| | 1 | 0 | 0 | 0 | 0 | 0 | 0 | 1 | 1 |
| | 0 | 0 | 0 | 0 | 0 | 0 | 0 | 0 | 1 |

TABLE 9-D

| | 0 | 1 | 2 | 3 | 4 | 5 | 6 | 7 |
|---|---|---|---|---|---|---|---|---|
| Seed Line 2 - Table 4-A | 1 | 1 | 0 | 1 | 0 | 0 | 0 | 0 |
| Seed Line shifted 2 | 0 | 0 | 1 | 1 | 0 | 1 | 0 | 0 |
| XOR (Line 4 - Table 4-A) | 1 | 1 | 1 | 0 | 0 | 1 | 0 | 0 |

TABLE 9-E

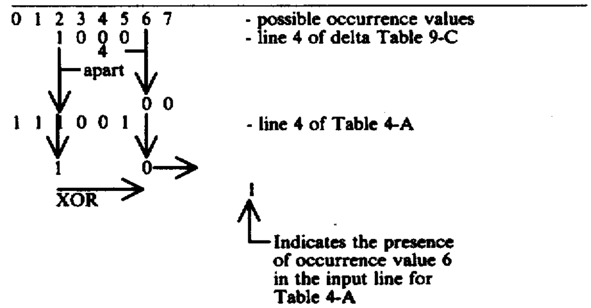

TABLE 9-F

| | | |
|---|---|---|
| | 0 1 2 3 4 5 6 7 | |
| Original input line | 1 0 0 1 1 0 0 1 | |
| | 1 1 1 0 1 0 1 0 1 | |
| | 2 1 0 1 1 1 1 1 1 | |
| | 1 1 0 0 1 1 | - shifted delta line 5 |
| Seed | 3 1 1 1 0 0 0 0 0 | |
| | 4 1 0 0 1 0 0 0 0 | |
| Difference between seed line and end of iso-entropicgram 5 | 5 1 1 0 1 1 0 0 0 | |
| | 6 1 0 1 1 0 1 0 0 | |
| | 7 1 1 1 0 1 1 1 0 | |
| | 0 1 0 0 1 1 0 0 1 | |
| To check column 5: Seed line | 1 1 1 0 0 0 | |

TABLE 9-F-continued

| | |
|---|---|
| Shifted delta line 5 | 1 1 0 0 1 1 |
| AND | 1 1 0 0 0 0 → even parity → |
| Therefore the original input line column 5 is a 0. | |
| To check column 3: | |
| Seed line | 0 0 1 1 1 0 |
| Shifted delta line 8 | 1 1 0 0 1 1 |
| AND | 0 0 0 0 1 0 → odd parity. → |
| Therefore the original input line column 3 is a 1. | |

TABLE 10

| | |
|---|---|
| BRIGHTNESS MODULE | B |
| CHANGE MODULE | CM |
| DPM INTERFACE MODULE | — no special mnemonic used |
| ENCODE MODULE | EM |
| DECODE I MODULE | DIM |
| DECODE II MODULE | D2M |
| DELTA MODULE | DM |
| OUTPUT MODULE | OM |
| PIPE MODULE | PI |
| REVOLVE MODULE | RM |
| SEED MODULE | SM |
| SWITCH MATRIX | S |

TABLE 11

| | MODULE INPUT/OUTPUTS |
|---|---|
| ENCODE MODULE | |
| INPUTS | |
| ETL (8 bits) | - top clipping limit loaded from TL of IPRF by OUTPUT MODULE |
| EBL (8 bits) | - bottom clipping limit loaded from BL of IPRF by OUTPUT MODULE |
| EIR (8 bits) | - interval value loaded from IR of IPRF by OUTPUT MODULE |
| EHW (8 bits) | - iso-entropicgram width loaded from HW of IPRF by SEED, CHANGE or OUTPUT MODULES |
| EFIRST flip flop | - set to 1 to initialize |
| ELAST flip flop | - set to 1 to force write of final hybrid coded word |
| OUTPUTS | |
| EOP (1 flag bit + 7 bits) | - hybrid coded word being written into MEMORY MODULE (flag bit = 0 identifies bit string word; flag bit = 1 identifies absolute coded word) |
| MLN3 (8 bits) | - to DECODE I and II MODULES to indicate number of hybrid coded word written into MEMORY MODULE |
| ENOC (8 bits) | - to SEED MODULE to identify number of occurrence values encoded into hybrid coded form and stored in MEMORY MODULE |
| DECODE I MODULE | |
| INPUTS | |
| MLN1 (8 bits) | - physical length of input in words stored in MEMORY MODULE area being read. Loaded by calling module from LN1 or LN2 of IPRF or MLN3 of ENCODE MODULE or ORT2 of OUTPUT MODULE |
| DIFST | - calling module (via signals applied to gate 228 sets DIFST to a 1 state on first call to DECODE I MODULE for conversion of one hybrid word to indicate the first call |
| Hybrid coded word in one of MEMORY MODULE areas | |
| OUTPUTS | |
| DO1 (8 bits) | - counter which indicates absolute coded word value of occurrence in question |
| EOF1 (1 bit) | - flip flop which indicates when the number of words specified by MLN1 has been decoded by DECODE I MODULE |
| DECODE II MODULE | |
| INPUTS/OUTPUTS are similar to DECODE I MODULE | |
| DELTA MODULE | |
| INPUTS | |
| DELI (8 bits) | - number of lines to be revolved loaded by calling module from TI of SEED MODULE or CLINE of CHANGE MODULE or DS6 of OUTPUT MODULE |
| DELFST (1 bit) | - initialization flip flop is set when new process is desired by calling module |
| OUTPUTS | |
| DELO (8 bits) | - contains component power of 2 for value in DELI and is output to calling module |
| DELEND (1 bit) | - flip flop which in 1 state indicates that value stored in DELI has been completely transformed into its component power of 2 |
| SEED MODULE | |
| INPUTS | |
| SMHW (8 bits) | - iso-entropicgram width loaded from HW of IPRF |
| SMLI (8 bits) | - line # of seed line loaded from |

TABLE 11-continued

| | MODULE INPUT/OUTPUTS |
|---|---|
| | line # of IPRF or from CLINE of CHANGE MODULE |
| MEMORY MODULE - current seed (LN1 words) | - current seed in hybrid code is (1) stored in MEMORY MODULE area 1 if MINI COMPUTER via user program calls SEED MODULE, or (2) stored in MEMORY MODULE area n (n = 1, 2, 3) if CHANGE MODULE calls SEED MODULE |
| LN1 (8 bits) | - the number of words or physical length of the current seed received from MLN1 or MLN2 of the DECODE I and II MODULES |
| OUTPUTS | |
| SLINE (8 bits) | - line number of new seed line |
| SLN (8 bits) | - physical length in words of the new seed |
| MEMORY MODULE - new seed (SLN words) | - the new seed contained in MEMORY MODULE areas designated by OAR |
| OAR (2 bits) | - contains the number of the MEMORY MODULE area which contains the new seed |
| ONOC (8 bits) | - contains the number of actual occurrence values in the new seed |
| REVOLVE MODULE | |
| INPUTS/OUTPUTS for other modules | |
| CHANGE MODULE | |
| INPUTS | |
| change line value (LN1-words long) | - line value of the change vector from MEMORY MODULE area 1 |
| seed line value (LN2-words long) | - line value of the seed which is to be changed, from MEMORY MODULE area 2 |
| CLINE (8 bits) | - line # of seed from LINE # of IPRF |
| CLN (8 bits) | - physical length of line value for seed from LN2 of IPRF |
| MLN1 of DECODE I & II (8 bits) | physical length of line value for change vector from LN1 of IPRF |
| OUTPUTS | |
| Same as that given for seed module | |
| OUTPUT MODULE | |
| INPUTS | |
| MLN2 of DECODE II MODULE, MLN1 of DECODE I MODULE (8 bits) | - length of seed line value from LN1 of IPRF |
| ORT3 (8 bits) | - length of line value of the reference line from LN2 of IPRF |
| OHW (8 bits) | - iso-entropicgram width for seed from HW of IPRF |
| OLINE (8 bits) | - line number of line value of seed from LINE # of IPRF |
| DELOP (1 bit) | - set DELOP from DPM INTERFACE MODULE |
| ETL of ENCODE MODULE | - top limit from TL of IPRF |
| EBL of ENCODE MODULE | - bottom limit from BL of IPRF |
| EIR of ENCODE MODULE | - interval value from IR of IPRF |
| line value of seed | - from MEMORY MODULE area |
| line value of reference vector | - from MEMORY MODULE area |
| OUTPUTS | |
| OAR | - number of MEMORY MODULE area containing output |
| MEMORY MODULE area - designated by OAR | - output |
| OLN | - length of output in MEMORY MODULE area designated by OAR |
| PIPE MODULE | |
| INPUTS | |
| PW (8 bits) | - pipe width loaded from PW of IPRF on first call; contains width of pipe |
| LNRQR (8 bits) | - length of request (in events) loaded from LNRQ of IPRF on first call |
| MLN1 of DECODE I MODULE (8 bits) | - length of line value of seed loaded from LN1 of IPRF |
| Line value of line 0 (LN1-words) | - line value of seed located in MEMORY MODULE area 1 |
| MLN2 of DECODE II MODULE (8 bits) | - length of delimiter event occurrence vector loaded from LN2 of IPRF and PSAU |
| Delim (LN2-words) | - delimiter event occurrence value located in MEMORY MODULE area 2 |
| PFIRST (1 bit) | - initialization flip flop set |

TABLE 11-continued

| | | MODULE INPUT/OUTPUTS |
|---|---|---|
| | | prior to first call only |
| PLAST (1 bit) | | - end flip flop, set prior to last call only |
| INTERMEDIATE OUTPUT | | |
| PMn (n=1,2) | | - contains values for each occurrence processed in each event occurrence vector |
| | vi | - the occurrence value after bias 1 subtracted |
| | vii | - the "hit count", i.e. number of times this occurrence number has been computed during piping process |
| | | - the last value in area is set to −1 |
| FINAL OUTPUT | | |
| MEMORY MODULE area 3 contains the final output. There are the following two values for each entry in the request: | | |
| | Vi | - the best candidate occurrence value to be the beginning occurrence of the request in this entry |
| | Vii | - hit count; if sign bit is set (−) this indicates an exact hit |
| | The last value in the area is set to −1. | |
| BRIGHTNESS MODULE | | |
| INPUTS | | |
| LNRQR (8 bits) | | - length of the request (in events) from LNRQ of IPRF |
| MLN1 of DECODE I MODULE | | - length of line value of current event occurrence vector from LN1 of IPRF |
| Line value of seed | | - from MEMORY MODULE area 1 |
| MLN2 of DECODE II MODULE | | - length of delimiter event occurrence vector from LN2 of IPRF |
| delim | | - delimiter event occurrence vector in MEMORY MODULE area 2 |
| PM-data | | - the beginning event occurrence values of the request in certain entries on this layer which are to be checked and stored in P/B MEMORY area 1 |
| BFIRST flip flop | | - set by DPM INTERFACE MODULE to initialize prior to first call |
| BLAST | | - set by DPM INTERFACE MODULE prior to last call for this request only. |
| FINAL OUTPUTS | | |
| MEMORY MODULE area 3 contains the following sets of four values for the best entry in layer 0: 1. beginning delimiter of entry 2. # of hits N 3. dmin 4. $d_0$ | | |

TABLE 12

| | ENCODE MODULE |
|---|---|
| | REGISTERS |
| EBL | bottom limit |
| EHW | iso-entropicgram width |
| ETL | top limit |
| EI | current Input entry |
| EIR | interval |
| EO | previous input entry |
| EOP | Output |
| ET | previous and current entry difference |
| ER | Remaining available number of bits in bit string word under formation |
| MAR3 | Memory Address Register |
| | COUNTERS |
| CTR | bit string |
| NOC | number of occurrences |
| MLN3 | physical length of output |
| | FLIP FLOPS |
| BSW | bit string switch |
| EFRST | first time through |
| ELAST | last time through |

TABLE 13

| | DECODE I MODULE |
|---|---|
| | REGISTERS |
| INR1 | Input and shift register for hybrid words |
| | COUNTERS |
| BCTR1 | indicates bits remaining in bit string word in INR1 to be converted |
| DO1 | forms absolute word output |
| MAR1 | indicates MEMORY MODULE addresses |
| MLN1 | indicates remaining words in MEMORY MODULE area to be converted |
| | FLIP FLOPS |
| D1END | end of input |
| D1FRST | first hybrid word input |
| D1SW | read control (0) |
| D1END | last absolute word to calling module |
| EOF1 | end of operation |
| MSB1 | most significate bit, or flag bit, of bit string word in INR1 |
| | ONE-SHOT MULTI-VIBRATORS |
| D1GO | decode module go |
| D1MEND | absolute word ready or output |

TABLE 14

DELTA MODULE
EXAMPLE OF OPERATION

| FIRST REGISTER | | | | | | | | SECOND REGISTER | | | | | | | | |
|---|---|---|---|---|---|---|---|---|---|---|---|---|---|---|---|---|
| 128 | 64 | 32 | 16 | 8 | 4 | 2 | 1 | 128 | 64 | 32 | 16 | 8 | 4 | 2 | 1 | NO. OF SHIFTS |
| 0 | 0 | 0 | 0 | 1 | 1 | 0 | 1 | 0 | 0 | 0 | 0 | 0 | 0 | 0 | 0 | 0 |

TABLE 14-continued

| DELTA MODULE EXAMPLE OF OPERATION | | | | | | | | | | | | | | | | | |
|---|---|---|---|---|---|---|---|---|---|---|---|---|---|---|---|---|---|
| | FIRST REGISTER | | | | | | | | SECOND REGISTER | | | | | | | | |
| | 128 | 64 | 32 | 16 | 8 | 4 | 2 | 1 | 128 | 64 | 32 | 16 | 8 | 4 | 2 | 1 | NO. OF SHIFTS |
| 0 | 0 | 0 | 0 | 1 | 1 | 0 | 1 | | 1 | 0 | 0 | 0 | 0 | 0 | 0 | 0 | 1 |
| 0 | 0 | 0 | 1 | 1 | 0 | 1 | | | 0 | 1 | 0 | 0 | 0 | 0 | 0 | 0 | 2 |
| 0 | 0 | 1 | 1 | 0 | 1 | | | | 0 | 0 | 1 | 0 | 0 | 0 | 0 | 0 | 3 |
| 0 | 1 | 1 | 0 | 1 | | | | | 0 | 0 | 0 | 1 | 0 | 0 | 0 | 0 | 4 |
| 1 | 1 | 0 | 1 | | | | | | 0 | 0 | 0 | 0 | 1 | 0 | 0 | 0 | 5× |
| 1 | 0 | 1 | | | | | | | 0 | 0 | 0 | 0 | 0 | 1 | 0 | 0 | 6× |
| 0 | 1 | | | | | | | | 0 | 0 | 0 | 0 | 0 | 0 | 1 | 0 | 7 |
| 1 | | | | | | | | | 0 | 0 | 0 | 0 | 0 | 0 | 0 | 1 | 8× |

TABLE 15

| DELTA MODULE | |
|---|---|
| REGISTERS | |
| DELI | input register (8 bits) |
| DELO | output register (8 bits) |
| FLIP FLOPS | |
| DELEND | 1 state indicates DELI is completely transformed to component powers of 2 |
| DELFST | 1 state indicates first call on DELTA MODULE |

TABLE 16

| SEED MODULE | |
|---|---|
| REGISTERS | |
| OAR | Memory output area register - contains number of MEMORY OUTPUT area with current seed line value; |
| ONOC | Number of occurrences in current possible seed line; |
| SDN | Current number of lines revolved relative to input line; |
| SLINE | Current possible seed line number; |
| SLN | Current possible seed line length; |
| SMHW | Iso-entropicgram width (and length); |
| SMLI | Current line number; |
| T0 | Largest and next largest occurrence value difference; |
| T1 | Iso-entropicgram width and largest occurrence difference value or the larger of the largest and next largest occurrence value difference or the iso-entropicgram width and largest occurrence value difference; |
| T3 | Temporary storage for largest occurrence value; |
| FLIP FLOPS | |
| SCE | Clock enable; |
| CNG | Inhibits clock to SWITCH MATRIX; |
| SMB | Inhibits DECODE I MODULE from clocking down MLN3 while computing for SEED MODULE; |
| ONE-SHOT MONOSTABLE MULTI-VIBRATORS | |

TABLE 16-continued

| SEED MODULE | |
|---|---|
| SMEND | Set at end of seed finding operation; |
| SMGO | SEED MODULE go. |

TABLE 17

| OUTPUT MODULE | |
|---|---|
| REGISTERS | |
| OHW | Iso-entropicgram width: |
| OR1 | Output Register 1 for occurrence value of revolved seed line value for DECODE I MODULE; |
| ORT1 | Output Register Temporary 1 for test occurrence value from DECODE II MODULE; |
| OLINE | Contains the seed line number; |
| OR2 | Output Register 2 - contains the output of DECODE II MODULE and the results of the subtraction in Step 8; |
| ORSN | Holds the largest component power of 2 (OHW - OLINE) i.e. the distance the seed line value must be revolved to reach the input line; |
| ORT2 | Tempory Register - holds the length of the seed line value after it has been revolved the first time; |
| ORT3 | Temporary Register 3 - contains the physical length of the reference line in MEMORY MODULE area 2; |
| OAR | Output Area Register - contains the number of the memory area which holds the final output which is the occurrence values that are found to be present; |
| OLN | Contains the physical length of the final output. |
| FLIP FLOPS | |
| DELOP | DELOP = 1 causes DEL function; |
| SS | Toggle f/f used to determine cycle information i.e., each input must be checked against; |
| SW | Used to determine output. If set to 1 at the end of cycle 2, then output ORT1; |
| OPSW | Used to indicate the ENCODE MODULE that clipping circuitry is in effect. |

TABLE 18

| | EVENT-TIMES | | | | | | | | | | | | | | | | |
|---|---|---|---|---|---|---|---|---|---|---|---|---|---|---|---|---|---|
| Events | 0 | 1 | 2 | 3 | 4 | 5 | 6 | 7 | 8 | 9 | 10 | 11 | 12 | 13 | 14 | 15 | |
| | 1 | 0 | 0 | 0 | 0 | 1 | 0 | 0 | 1 | 0 | 1 | 0 | 0 | 0 | 0 | 1 | 0,5,8,10,15 delimiter E.O. vector |
| T | 0 | 1 | 0 | 0 | 0 | 0 | 0 | 0 | 0 | 0 | 0 | 1 | 0 | 0 | 1 | 0 | 1,11,14 |
| H | 0 | 0 | 1 | 0 | 0 | 0 | 0 | 0 | 0 | 0 | 0 | 0 | 0 | 0 | 0 | 0 | 2 |
| I | 0 | 0 | 0 | 1 | 0 | 0 | 1 | 0 | 0 | 0 | 0 | 0 | 0 | 0 | 0 | 0 | 3,6 |
| S | 0 | 0 | 0 | 0 | 1 | 0 | 0 | 1 | 0 | 0 | 0 | 0 | 0 | 1 | 0 | 0 | 4,7,13 |

The event occurrence vectors for events T-H-I-S as they appear in the data base.

TABLE 19

| | EVENT TIMES | | | | | | | | | | | | | | | | | |
|---|---|---|---|---|---|---|---|---|---|---|---|---|---|---|---|---|---|---|
| Events | 0 | 1 | 2 | 3 | 4 | 5 | 6 | 7 | 8 | 9 | 10 | 11 | 12 | 13 | 14 | 15 | | |
| | 1 | 0 | 0 | 0 | 0 | 1 | 0 | 0 | 1 | 0 | 1 | 0 | 0 | 0 | 0 | 1 | | |
| T | 0 | 1 | 0 | 0 | 0 | 0 | 0 | 0 | 0 | 0 | 0 | 1 | 0 | 0 | 1 | 0 | 1,11,14 | (Bias = 0) |
| H | 0 | 1 | 0 | 0 | 0 | 0 | 0 | 0 | 0 | 0 | 0 | 0 | 0 | 0 | 0 | 0 | 1 | (Bias = 1) |
| I | 0 | 1 | 0 | 0 | 1 | 0 | 0 | 0 | 0 | 0 | 0 | 0 | 0 | 0 | 0 | 0 | 1,4 | (Bis = 2) |
| S | 0 | 1 | 0 | 0 | 1 | 0 | 0 | 0 | 0 | 0 | 1 | 0 | 0 | 0 | 0 | 0 | 1,4,10 | (Bias = 3) |

the occurrence of "IS" is shown here a "bit" in each row ∴ exact entry

E.O. - vectors for T-H-I-S biased to the left

TABLE 19-continued

| Events | EVENT TIMES 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|

⁚⁚ leading delimiter

TABLE 20

| Events | EVENT TIMES 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| | 1 | 0 | 0 | 0 | 0 | 1 | 0 | 0 | 1 | 0 | 1 | 0 | 0 | 0 | 0 | 1 | 0,5,8,10,15 |
| S | 0 | 0 | 0 | 0 | 1 | 0 | 0 | 1 | 0 | 0 | 0 | 0 | 0 | 1 | 0 | 0 | 4,7,3 |
| I | 0 | 0 | 0 | 1 | 0 | 0 | 1 | 0 | 0 | 0 | 0 | 0 | 0 | 0 | 0 | 0 | 3,6 |
| T | 0 | 1 | 0 | 0 | 0 | 0 | 0 | 0 | 0 | 0 | 0 | 1 | 0 | 0 | 1 | 0 | 1,11,14 |

The event occurrence vectors for the events S-I-T as they appear in the data base of Table 1.

TABLE 21

| Events | | EVENT TIMES 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|---|
| | | 1 | 0 | 0 | 0 | 0 | 1 | 0 | 0 | 1 | 0 | 1 | 0 | 0 | 0 | 0 | 1 | |
| S | | 0 | 0 | 0 | 0 | 1 | 0 | 0 | 1 | 0 | 0 | 0 | 0 | 0 | 1 | 0 | 0 | 4,7,13 (bias = 0) |
| I | | 0 | 0 | 1 | 0 | 0 | 1 | 0 | 0 | 0 | 0 | 0 | 0 | 0 | 0 | 0 | 0 | 2,5 (bias = 1) |
| T | ⁚1⁚ | 0 | 0 | 0 | 0 | 0 | 0 | 0 | 0 | 0 | ⁚1⁚ | 0 | 0 | 1 | 0 | 0 | 0 | −1,9,12 (bias = 2) |

E.O. vectors for S-I-T biased to the left
⁚⁚- delimiter boundary crossed

TABLE 22

| Events | EVENT TIMES 10 | 11 | 12 | 13 | 14 | 15 |
|---|---|---|---|---|---|---|
| | 1 | 0 | 0 | 0 | 0 | 1 |
| S | 0 | 0 | 0 | 1 | 0 | 0 |
| I | 0 | 0 | 0 | 0 | 0 | 0 |
| T | 0 | 0 | 1 | 0 | 0 | 0 |

total pipe width deals with word "test"

| Center of Pipe | No. of Hits in Pipe |
|---|---|
| 14 | 1 |
| 13 | 2 |
| 12 | 2 |
| 11 | 1 |

TABLE 23

| Events | EVENT TIMES 8 | 9-10 | |
|---|---|---|---|
| | 1 | 0 | 1 |
| S | 0 | 0 | |
| I | 0 | 0 | |
| T | 0 | 0 | |

Total pipe width
there are no hits

TABLE 24

| Events | EVENT TIMES 5 | 6 | 7 | 8 |
|---|---|---|---|---|
| | 1 | 0 | 0 | 1 |
| S | | | | |
| I | 0 | 0 | 1 | |
| T | 1 | 0 | 0 | |
| | 0 | 0 | 0 | |

Total pipe width

TABLE 24-continued deals with the word "is"

| Pipe Center | No. of Hits |
|---|---|
| 7 | 1 |
| 6 | 2 |

TABLE 25

| Event | EVENT TIMES 0 | | 2 | 3 | 4 | 5 |
|---|---|---|---|---|---|---|
| | 1 | 0 | 0 | 0 | 0 | 1 |
| S | | | | | | |
| I | 0 | 0 | 0 | 0 | 1 | |
| T | 0 | 0 | 1 | 0 | 0 | |
| | 0 | 0 | 0 | 0 | 0 | |

Total pipe width
deals with the word "this"

| Pipe Center | No. of Hits |
|---|---|
| 4 | 1 |
| 3 | 2 |
| 2 | 1 |
| 1 | 1 |

TABLE 26

Translation of Table 19 Into Linear Notation

| | | | | | | | |
|---|---|---|---|---|---|---|---|
| PASS 1 | T | 1 | 11 | 14 | | | represents line T |
| | HIT | 1 | 1 | 1 | | | |
| PASS 2 | TH | 1 | 11 | 14 | | | represents lines T,H, i.e., H event was biased by 1 and added to PASS 1 |
| | HIT | 2 | 1 | 1 | | | |
| PASS 3 | THI | 1 | 4 | 11 | 14 | | represents line T,H,I, i.e., I event was biased by 2 and added to PASS 2 |
| | HIT | 3 | 1 | 1 | 1 | | |
| PASS 4 | THIS | 1 | 4 | 10 | 11 | 14 | represents line T,H,I,S, i.e., S event was biased by PASS 3. |
| | HIT | 4 | 2 | 1 | 1 | 1 | |

TABLE 27

Translation of Table 20 into Linear Form

| | | | | | | | |
|---|---|---|---|---|---|---|---|
| PASS 1 | S | 4 | 7 | 13 | | | represents row S |
| | HIT | 1 | 1 | 1 | | | |
| PASS 2 | SI | 2 | 4 | 5 | 7 | 13 | represents rows S, I, i.e., I event was biased by 1 and added to PASS 1 |
| | HIT | 1 | 1 | 1 | 1 | 1 | |

TABLE 27-continued

| Translation of Table 20 into Linear Form | | | | | | | | |
|---|---|---|---|---|---|---|---|---|
| PASS 3 | SIT | 2 | 4 | 5 | 7 | 12 | 13 | represents rows S, I, T, i.e., T event was biased by 2 and added to PASS 2; |
| | HIT | 1 | 1 | 1 | 1 | 1 | 1 | |

Note: values −1 and 9 fell outside the pipe width and were dropped.

TABLE 28

← pipe motion; total pipe width (13 14 15)

| | | | | | | | | | | | | | | | | |
|---|---|---|---|---|---|---|---|---|---|---|---|---|---|---|---|---|
| Event time | 0 | 1 | 2 | 3 | 4 | 5 | 6 | 7 | 8 | 9 | 10 | 11 | 12 | 13 | 14 | 15 |
| No. of hits | | | 1 | | 1 | 1 | 1 | | | | | | 1 | 1 | | |

TABLE 29

| Translation of Table 22 to Linear Form | | | |
|---|---|---|---|
| ← pipe direction | Center of Pipe | No. of Hits | |
| 10 11 12 13 14 15 | 14 | 1 | center pipe |
| 1 1 | 13 | 2 | output 13 2 |
| | 12 | 2 | |
| | 11 | 1 | |

TABLE 30

| Translation of Table 23 to Linear Form | | | |
|---|---|---|---|
| | Center of Pipe | No. of Hits | |
| 8 9 10 | 9 | 0 | output −1 0 |

TABLE 31

| Translation of Table 23 To Linear Form | | | |
|---|---|---|---|
| | Center of Pipe | No. of Hits | |
| 5 6 7 8 | 7 | 1 | |
| | | | Output 6 2 |
| 1 1 | 6 | 2 | |

TABLE 32

| Translation of Table 24 To Linear Form | | | |
|---|---|---|---|
| | Center of Pipe | No. of Hits | |
| 0 1 2 3 4 5 | 4 | 1 | |
| | | | Output 3 2 |
| 1 1 | 3 | 2 | |
| | 2 | 1 | |
| | 1 | 1 | |

TABLE 33

PIPE MODULE REGISTERS, COUNTERS & FLIP FLOPS

Registers and Counters

TABLE 33-continued

| PIPE MODULE REGISTERS, COUNTERS & FLIP FLOPS | |
|---|---|
| M1 | P/B MEMORY "read" address counter; |
| M2 | P/B MEMORY "write" address counter; |
| M3 | MEMORY MODULE area 3 "write" address counter; |
| OUT | Register contains "center pipe" value if there is a "hit" for an entry; contains a −1 if there are no hits for the entry being considered; |
| PSAV | Temporary save register for LN2 from the IPRF; |
| MAX | Register used as temporary storage to hold the current maximum number of hits within a pipe in an entry; |
| N | Counter that always contains a "hit" count for an associated time occurrence contained in RII; |
| DI | Register containing current beginning delimiter value; |
| T | Register used in the first part to hold the minimum time occurrence to be considered for a given entry. In the second part, it is used to determine if a time occurrence lies within a pipe; |
| RII | Register used for storage of a time occurrence read from P/B MEMORY; |
| RI | Register for storage of value read from the event occurrence vector under consideration; |
| CV | Counter used in part two to keep track of the center of the pipe; |
| S | Register to keep a running tally of the hits within a pipe during part two; |
| PW | Register that contains pipe width; |
| PWC | Register that contains pipe width −1. When this value is subtracted from the beginning delimiter, it gives the minimum time occurrence which will be considered for the current entry; |
| BIAS | Counter that contains bias count which is the number to be subtracted from the time occurrences of the event under consideration; |
| LNRQ | Register that stores the length of request; |
| P1-P35 | Control counter. |
| Flip Flops | |
| PFIRST | Set when the event to be processed is the first event of a request to be processed; |
| PLAST | Set when the event to be processed is the last event of a request to be processed; |
| ET | The "equal to" set when two values being compared in the ALU are equal; |
| GT | The "greater than" set when two values being compared in the ALU are equal; |
| GT | The "greater than" set when two values being compared in the ALU are such that value 1 > value 2; |
| SGN | Used as the sign bit for the MAX register-set when an exact occurrence has been found, reset otherwise; |
| PFLG | A flag flip flop which tells when to clock M1 during pulse P32 |

TABLE 34

| BRIGHTNESS MODULE | | | | | | | | | | | | | | | |
|---|---|---|---|---|---|---|---|---|---|---|---|---|---|---|---|
| Shift | | | | | | | P | O | I | S | S | O | N | | |
| 0 | P | R | I | S | O | N | | | | | | | | | |
| 3 | | | | P | R | I | S | O | N | | | | | | |
| 6 | | | | | | | P | R | I | S | O | N | | | |
| 7 | | | | | | | | P | R | I | S | O | N | | |
| 9 | | | | | | | | | | P | R | I | S | O | N |

TABLE 35

| | P R I S O N | |
|---|---|---|
| $D_0 =$ | 6+6+6+6+7+7 | = 38 |
| $D_3 =$ | 3+6+3+3+4+4 | = 23 |
| $D_6 =$ | 0+6+0+0+1+1 | = 8 |

TABLE 35-continued

| | PRISON | |
|---|---|---|
| $D_7$ = | 1+6+1+1+0+0 | = 9 |
| $D_9$ = | 3+6+3+3+2+2 | = 22 |

TABLE 36

BRIGHTNESS MODULE

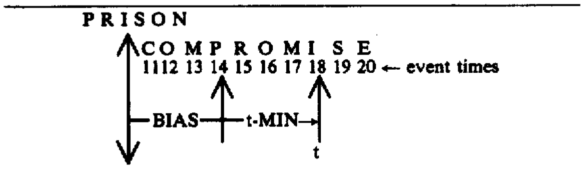

TABLE 37

| Request Events | BIAS | t | (δ) t + BIAS | Sorted δ values |
|---|---|---|---|---|
| P | 6 | 14 | 20 | 18 |
| R | 5 | 15 | 20 | 20 |
| I | 4 | 18 | 22 | 20 |
| S | 3 | 19 | 22 | 22 |
| O | 2 | 16 | 18 | 22 |
| N | 1 | | | |

TABLE 38

BRIGHTNESS MODULE
FINAL INTERMEDIATE OUTPUT IN MEMORY MODULE

| | |
|---|---|
| 18 | (CP) |
| 14 | (min) |
| 5 | (n) |
| 18 | (δ) |
| 20 | (δ) |
| 20 | (δ) ← δ mid (mid point for sorted values) |
| 22 | (δ) |
| 22 | (δ) |

TABLE 39

FINAL OUTPUT OF BRIGHTNESS MODULE
STORED IN MEMORY MODULE (AREA 3)

| | | |
|---|---|---|
| 10 | (BD) | beginning delimiter for entry |
| 5 | (n) | # of matching events which request and respond (# of hits) |
| 6 | ($d_{min}$) | sum of offsets to γ mid |
| 32 | ($d_0$) | sum of offsets to first event of response |

TABLE 40

BRIGHTNESS MODULE

Example: assume the following words dredged up by piping

1. PRISON
2. IMPRISONMENT
3. PRISONER
4. PRISM
5. POISON
6. POISSON
7. IMPERSONATE
8. OPINIONATED
9. PRINCESS
10. SIREN
11. RIPEN
12. REASON
13. NOSIRP
14. NONPROSIT

If the request is "PRISON", function of the system would order the above as follows:

| | | INCL length | W/O length |
|---|---|---|---|
| 1. | PRISON | 100% | 100% |
| 2. | PRISONER | 99.1% | 100% |
| 3. | POISON | 83.3% | 83.3% |
| 4. | POISSON | 78.86% | 78.95% |
| 5. | IMPRISONMENT | 75% | 100% |
| 6. | IMPERSONATE | 73.1% | 85.1% |
| 7. | PRINCESS | 70.1% | 70.3% |
| 8. | NONPROSIT | 69.96% | 72.22% |
| 9. | PRISM | 66.6% | 66.7% |
| 10. | REASON | 62.8% | 62.8% |
| 11. | OPINIONATED | 57.7% | 66.7% |
| 12. | RIPEN | 57% | 57.1% |
| 13. | NOSIRP | 50% | 50% |
| 14. | SIREN | 49.9% | 50% |

TABLE 41

BRIGHTNESS MODULE
EXAMPLE

Part 1

Initial conditions for first call on BRIGHTNESS MODULE for event "S"

Content of IPRF:

| | |
|---|---|
| LNRQ = 3 | length of request "SIT" |
| LN1 = 3 | length of "S" E.O. vector |
| LN2 = 4 | length of delimiter occurrence vector |

MEMORY MODULE AREA 1

| | |
|---|---|
| 1 0 0 0 1 1 0 1<br>0 0 1 0 0 0 0 0<br>0 0 0 0 0 0 1 0 | "S" E.O. vector [13, 7, 4] |

MEMORY MODULE AREA 2

| | |
|---|---|
| 1 0 0 0 1 1 1 1<br>0 1 0 1 0 0 0 0<br>0 0 0 0 0 1 0 0<br>0 0 0 0 0 0 0 1 | delimiter occurrence vector [15, 10, 8, 5, 0] |

P/B MEMORY AREA 1

| Address | Value Content | Name of Value |
|---|---|---|
| 0 | 13 | pipe center |
| 1 | 6 | pipe center |
| 2 | 3 | pipe center |
| 3 | −1 | end of field |

Set BFIRST ← 1
BLAST η 0

Part 2

Content of P/B MEMORY area 2 after FIRST EXIT after "S" E.O. vector is processed.

| | Value | | |
|---|---|---|---|
| 0 | 14 | CP | |
| 1 | 13 | MIN | entry "TEST" |
| 2 | 1 | # hits | |
| 3 | 16 | δ | |
| 4 | 7 | CP | |
| 5 | 7 | MIN | entry "IS" |
| 6 | 1 | # hits | |
| 7 | 10 | δ | |
| 8 | 4 | CP | |

TABLE 41-continued

BRIGHTNESS MODULE EXAMPLE

| | | | |
|---|---|---|---|
| 9 | 4 | MIN | entry "THIS" |
| 10 | 1 | # hits | |
| 11 | 7 | δ | |
| 12 | −1 | end of field | |

Part 3

Initial conditions for second call on BRIGHTNESS MODULE for event "I"

Content of IPRF

LN1 = 2 length of "I" E.O. vector

LN2 = 4 length of delimiter occurrence vector

MEMORY MODULE AREA 1

1 0 0 0 0 1 1 0 "ZI" E. O. vector 0 0 0 0 0 1 0 0 (6, 3)

MEMORY MODULE area 2 same as shown in Part 1 of Table 41

P/B MEMORY area 2 same as shown in Part 2 of Table 41 set BLAST ← 0

Part 4

Content of P/B MEMORY after second exit after "I" E.O. vector is processed

P/B MEMORY area 1

| Address | Value Content | Name of Value | |
|---|---|---|---|
| 0 | 14 | CP | |
| 1 | 13 | MIN | entry "TEST" |
| 2 | 1 | # hits | |
| 3 | 16 | δ | |
| 4 | 7 | CP | |
| 5 | 6 | MIN | entry "IS" |
| 6 | 2 | # hits | |
| 7 | 8 | δ | |
| 8 | 10 | δ | |
| 9 | 4 | CP | |
| 10 | 3 | MIN | entry "THIS" |
| 11 | 2 | # hits | |
| 12 | 5 | δ | |
| 13 | 7 | δ | |
| 14 | −1 | end of field | |

Part 5

Initial conditions for third call on BRIGHTNESS MODULE for last event "T"

Content of IPRF

LNRQ = 3 length of request "SIT"

LN1 = 3 length of "T" E.O. vector

LN2 = 4 length of delimiter occurrence vector

MEMORY MODULE area 1

1 0 0 0 1 1 1 0 "T" E.O. vector (14, 11, 1)

MEMORY MODULE area 1

1 0 0 0 1 1 1 0 "T" E.O. vector (14, 11, 1)

MEMORY MODULEarea 2 same as shown in Part 1 of Table 41

P/B MEMORY area 1 same as shown in Part 4 of Table 41 set BLAST ← 1

Part 6

Content of P/B MEMORY area 2 after third exit after "T" E.O. vector is processed

| Address | Value Content | Name of Value | |
|---|---|---|---|
| 0 | 14 | CP | |
| 1 | 13 | min | entry "TEST" |
| 2 | 2 | # of hits | |
| 3 | 15 | δ | |
| 4 | 16 | δ | |
| 5 | 7 | CP | |
| 6 | 6 | min | entry "IS" |
| 7 | 2 | # of hits | |
| 8 | 8 | δ | |
| 9 | 10 | δ | |
| 10 | 4 | CP | |
| 11 | 1 | min | entry "THIS" |
| 12 | 3 | # of hits | |
| 13 | 2 | δ | |
| 14 | 5 | δ | |
| 15 | 7 | δ | |
| 16 | −1 | end of field | |

Part 7

Content of MEMORY MODULE area 3 after fourth exit

| Address | Value | Name of Value | |
|---|---|---|---|
| 0 | 10 | beginning delimiter | |
| 1 | 2 | # of hits (N) | entry "TEST" |
| 2 | 1 | $d_{min}$ | |
| 3 | 5 | $d_0$ | |

TABLE 41-continued

| | BRIGHTNESS MODULE EXAMPLE | | |
|---|---|---|---|
| 4 | 5 | beginning delimiter | |
| 5 | 2 | # of hits (N) | entry "IS" |
| 6 | 2 | $d_{min}$ | |
| 7 | 6 | $d_0$ | |
| 8 | 0 | beginning delimiter | |
| 9 | 3 | # of hits (N) | entry "THIS" |
| 10 | 5 | $d_{min}$ | |
| 11 | 11 | $d_0$ | |

TABLE 42

| DPM INTERFACE MODULE | | |
|---|---|---|
| flip flops | | |
| $m_1$ | $m_2$ | |
| 0 | 1 | M1e (DS1 MEMORY MODULE area 1) |
| 0 | 0 | M2e (DS2 MEMORY MODULE area 2) |
| 1 | 1 | Me3 (DS3 MEMORY MODULE area 3) |

TABLE 43

| DPM INTERFACE MODULE | | |
|---|---|---|
| For P/B MEMORY | | |
| $m_1$ | $m_2$ | |
| 0 | 1 | M1e (DS2 P/B MEMORY area 1) |
| 1 | 0 | M2e (DS1 P/B MEMORY area 2) |

TABLE 44

```
Line
 ↓            .1         2         3
   01234567890123456789012345678901
0  11101010011010100000101110001011   →   Input   Revolve 1
                                      ↓
1  10011111010111110000111001001110   ←
                                      →
2  11010000111100001000100101101001   ↓           Revolve 2
3  10111000100010001100110111011101   ←
4  11100100110011001010101100110011   ↓           Revolve 3
5  10010110101010101011111110101010   ←
6  11011101111111111000000111111111   ↓           Revolve 4
```

TABLE 44-continued

```
Line
 ↓             .1         2         3
    01234567890123456789012345678901
7   10110011000000000100000100000000   ←
8                                      ↓   ⎫
    11101010111111111110000110000000       ⎪
9   10011111110000000101000101000000   ↓   ⎪
10  11010000001000000111100111100000   ↓   ⎪
11  10111000001100000100010100010000   ↓   ⎬  Revolve 5
12  11100100001010000110011110011000   ↓   ⎪
13  10010110001111000101010001010100   ↓   ⎪
14  11011101001000100111111001111110   ↓   ⎭
15  10110011101100110100000101000001   ←
                                       ↓
16  11101010011010101110000111110000   ←
17  10011111010111111001000100010001   ↓   ⎫
18  11010000111100000101100110011001   ↓   ⎬  Revolve 6
19  10111000100010000111010101010101   ↓   ⎪
20  11100100110011000100111111111111   ←   ⎭
                                       ↓
21  10010110101010100110100000000000   ←
22
    11011101111111110101110000000000
23  10110011000000001111001000000000
24  11101010100000000100010110000000
25  10011111110000001100111010000000
26  11010000001000001010100111000000
27  10111000001100001111101001000000
28  11100100001010001000001110110000
29  10010110001111001100001001101000
30  11011101001000101010001101011100
31  10110011101100111111001011110010
32  11101010011010100000101110001011       Output
```

TABLE 45

| Signal | Decode I Module Routing Flip Flop | Decode II Module Routing Flip Flop | Encode Module Routing Flip Flop | SP | Memory Module Area 1 | Memory Module Area 2 | Memory Module Area 3 | Comments |
|---|---|---|---|---|---|---|---|---|
| SM1 | S11 | S22 | S31 | — | line 0 | — | — | Initial |
| assert SM5 | | | | | | | | Line 0 best seed |
| RM8 | S11 | S21 | S32 | — | | | | |
| RM12 | | | | 1 | | | | |
| Revolve | | | | | line 0 | line 1 | — | |
| SM11 | | | | | | | | Inhibit enable |
| SM12 | S12 | S21 | S32 | 1 | | | | |
| assert SM5 | | | | | | | | Line 1 best seed |
| RM8 | S12 | S22 | S33 | 1 | | | | |
| RM12 | | | | 1 | | | | |
| Revolve | | | | | line 0 | line 1 | line 3 | |
| SM11 | | | | | | | | Inhibit enable |
| SM12 | S13 | S22 | S33 | | | | | |
| SM5 not asserted | | | | | | | | |
| RM8 | S13 | S23 | S31 | 1 | | | | Save line 1 |
| Rm12 | | | | 0 | | | | |
| Revolve | | | | | line 5 | line 1 | line 3 | |
| S11 | | | | | | | | Inhibit enable |
| SM12 | S11 | S23 | S31 | | | | | |
| SM5 not asserted | SM5 | | | | | | | |
| RM8 | S11 | S21 | S33 | 0 | | | | |
| RM12 | | | | 0 | | | | |
| Revolve | | | | | line 5 | line 1 | line 7 | |
| SM11 | | | | | | | | Inhibit enable |
| SM12 | S13 | S21 | S33 | | | | | |
| assert SM5 | | | | | | | | |
| RM8 | S13 | S23 | S31 | 0 | | | | |
| Rm12 | | | | 1 | | | | |
| Revolve | | | | | line 15 | line 1 | line 7 | |
| RM8 | S11 | S21 | S32 | 1 | | | | Save line 7 |
| RM12 | | | | 0 | | | | |
| Revolve | | | | | line 15 | line 16 | line 7 | |
| Sm11 | | | | | | | | Inhibit enable |
| SM12 | S12 | S21 | S32 | | | | | |
| SM5 not asserted | | | | | | | | |
| RM8 | S12 | S22 | S31 | 0 | | | | |

TABLE 45-continued

| Signal | Decode I Module Routing Flip Flop | Decode II Module Routing Flip Flop | Encode Module Routing Flip Flop | SP | Memory Module Area 1 | Memory Module Area 2 | Memory Module Area 3 | Comments |
|---|---|---|---|---|---|---|---|---|
| RM12 | | | | 0 | | | | |
| Revolve | | | | | line 20 | line 16 | line 7 | |
| RM8 | S11 | S21 | S32 | 0 | | | | |
| RM12 | | | | 0 | | | | |
| Revolve | | | | | line 20 | line 21 | line 7 | |
| SM11 | | | | | | | | Inhibit enable |
| SM12 | S12 | S21 | S32 | | | | | |

HALT with seed in MEMORY MODULE area 2 (line 21)

TABLE 46

| | | 0 | 1 | 2 | 3 | 4 | 5 | 6 | 7 | | | | | | |
|---|---|---|---|---|---|---|---|---|---|---|---|---|---|---|---|
| Possible Occurrence Values → | | 0 | 1 | 2 | 3 | 4 | 5 | 6 | 7 | | | | | | |
| Delta Line 6 → 0, 2, 4, 6 | | 1 | 0 | 1 | 0 | 1 | 0 | 1 | 0 | | | | | | |
| | 0 | 1 | 1 | 1 | 0 | 0 | 1 | 0 | 0 | | | | | | |
| No. of → Shifts | 2 | | | 1 | 1 | 1 | 0 | 0 | 1 | 0 | 0 | | | | |
| | 4 | | | | | 1 | 1 | 1 | 0 | 0 | 1 | 0 | 0 | | |
| | 6 | | | | | | | 1 | 1 | 1 | 0 | 0 | 1 | 0 | 0 |
| Line 6 → | | 1 | 1 | 0 | 1 | 0 | 0 | 0 | 0 | | | | | | |

TABLE 47

| | | | | | | | | | |
|---|---|---|---|---|---|---|---|---|---|
| ↑ | 0 | 1 | 1 | 1 | 0 | 0 | 1 | 0 | 0 |
| ↑ | 1 | 1 | 0 | 0 | 1 | 0 | 1 | 1 | 0 |
| ↑ | 2 | 1 | 1 | 0 | 1 | 1 | 1 | 0 | 1 |
| 6 | 3 | 1 | 0 | 1 | 1 | 0 | 0 | 1 | 1 |
| ↓ | 4 | 1 | 1 | 1 | 0 | 1 | 0 | 1 | 0 |
| | 5 | 1 | 0 | 0 | 1 | 1 | 1 | 1 | 1 |
| ↓ | 6 | 1 | 1 | 0 | 1 | 0 | 0 | 0 | 0 |
| — | 7 | 1 | 0 | 1 | 1 | 1 | 0 | 0 | 0 |
| | 8 | 1 | 1 | 1 | 0 | 0 | 1 | 0 | 0 |

TABLE 48

DELRO = 5 (101) DELCOL = 0 (000)

| | Possible Occurrence Value | Line | Implies ($\overline{\text{DELCOL}}$ + DELRO) | | Bit-Wise AND | Result |
|---|---|---|---|---|---|---|
| 0 | 000 | 101 | 111 + 101 | 111 (7) | 1 | 0 |
| 1 | 001 | 101 | 110 + 101 | 111 (7) | 1 | 1 |
| 2 | 010 | 101 | 101 + 101 | 101 (5) | 0 | — |
| 3 | 011 | 101 | 100 + 101 | 101 (5) | 0 | — |
| 4 | 100 | 101 | 011 + 101 | 111 (7) | 1 | 4 |
| 5 | 101 | 101 | 010 + 101 | 111 (7) | 1 | 5 |

Therefore the results 1100011 identify the possible occurrence values, 0, 1, 4, and 5. This is row five of the delta (Table 6).

TABLE 49

DELTA 2 MODULE

REGISTERS & COUNTERS

| | | |
|---|---|---|
| DELCOL (8 bits) | - | Possible occurrence (column) value counter. |

TABLE 49-continued

DELTA 2 MODULE

| | | |
|---|---|---|
| DELHW (8 bits) | - | Iso-entropicgram store. |
| DELRO (8 bits) | - | Delta line value store. |
| DELO (8 bits) | - | Occurrence value output register. |
| DELV (8 bits) | - | Possible occurrence value column or shifted possible occurrence value counter. |

FLIP FLOPS

| | | |
|---|---|---|
| DELEND | - | "1" state indicates entire DELTA line has been generated. |
| DELFST | - | "1" state indicates the first entry to flow of FIG. 63. |
| DELOVI | - | "1" state indicates shifted line exceeds width of iso-entropicgram. |
| P1 - P5 | - | Control counter 1513. |

TABLE 50 A

DELTA 2 MODULE

INPUTS

| | | |
|---|---|---|
| DELV | - | Shift value which is possible occurrence value of given line from OP of OUTPUT 2 MODULE or D01 of DECODE 1 MODULE. |
| DELRO | - | No. of lines to be revolved which is line number of DELTA from RIL of REVOLVE 3 MODULE or OP of OUTPUT 2 MODULE or RIL of REVOLVE 2 MODULE. |
| DELHW | - | Iso-entropicgram width value from HW of IPRF. |
| DELFST flip flop | - | Set to "1" by DPM INTERFACE MODULE on first call. |

OUTPUTS

| | | |
|---|---|---|
| DELO | - | Occurrence values making up line of DELTA specified by DELRO. |
| DELEND | - | "1" state indicates end of DELTA line. |
| DELOVL | - | "1" state indicates shifted occurrence values of line exceed width of iso-entropicgram. |

TABLE 50B

| REVOLVE 2 MODULE | | |
|---|---|---|
| INPUTS | | |
| MEMORY MODULE | - | line to be revolved in proper area |
| SWITCH MATRIX 2 | | |
| DECOCDE 1 MODULE | | |
| ENCODE MODULE | - | all have been properly initialized |
| RIL | - | contains number of lines to be revolved |
| OUTPUTS | | |
| MEMORY MODULE | - | one of areas contains new encoded line (new line number is in SEED 2 MODULE) |

TABLE 50C

| REVOLVE 3 MODULE |
|---|
| Same as TABLE 50B |

TABLE 50D

| SEED 2 MODULE | | |
|---|---|---|
| INPUTS | | |
| Current seed in DPM MEMORY area 1 | | |
| SMHW (8 bits) | - | iso-entropicgram width loaded from IPRF |
| SMLI (8 bits) | - | the line # of the information contained in DPM MEMORY area 1 |
| CNG (1 bit) | - | bistable used to reflect a call from the CHANGE 2 MODULE |
| OUTPUTS | | |
| NOC (8 bits) | - | number of 1's in seed line |
| SLINE (8 bits) | - | the new line number of the seed |
| SLN (8 bits) | - | the physical length of the seed in words |
| OAR (2 bits) | - | the number of the memory area containing the seed |
| New seed in DPM MEMORY area 3. | | |

TABLE 50E

| OUTPUT 2 MODULE | | |
|---|---|---|
| INPUTS | | |

TABLE 50E-continued

| OUTPUT 2 MODULE | | |
|---|---|---|
| Seed line is in MEMORY MODULE area 1; | | |
| If necessary, the reference line is MEMORY MODULE area 2 | | |
| OHW (8 bits) | - | iso-entropicgram width from IPRF |
| OLINE (8 bits) | - | line number of seed from IPRF |
| DELOP (1 bit) | - | bistable set to 1 if DEL function is desired |
| OUTPUTS | | |
| OLN (8 bits) | - | length of seed line 0 |
| OAR (2 bits) | - | memory area containing the seed (3) line 0 representation of the seed in MEMORY MODULE area 3. |

TABLE 50F

| CHANGE 2 MODULE |
|---|
| INPUTS |
| The change line is in MEMORY MODULE area 1; |
| The seed line is in MEMORY MODULE a 2; |
| CLINE contains the line number of the seed line loaded rom IPRF |
| OUTPUTS |
| Same as for SEED 2 MODULE. |

TABLE 50G

| AUXILIARY MEMORY II | | |
|---|---|---|
| INPUTS | | |
| MAR (8 bits) | - | memory address register for memory area A1. Loaded from DS5/WBP of REVOLVE 2, or DS5/WPB of REVOLVE 3, or DS4 of DPM INTERFACE, or M1/M2 of PIPE, or DS1/M2 of BRIGHTNESS MODULES. |
| MAR (8 bits) | - | memory address register for memory area A2. Loaded from the same modules as for MAR of memory A1. Additionally it receives signals from WP/WT of OUTPUT 2 MODULE. |
| MIR (8 bits) | - | the memory input register. It receives its input from DS4 of REVOLVE 2, DS4 of REVOLVE 3, RII of OUTPUT 2, DS3 of DPM INTERFACE, DS2 of PIPE, or DS4 of BRIGHTNESS MODULES. |
| OUTPUTS | | |
| MDR1 (8 bits) | - | the memory data register for memory area 1. Its output is sent to the REVOLVE 2, REVOLVE 3, OUTPUT 2, DPM INTERFACE, PIPE and BRIGHTNESS MODULES. |
| MDR2 (8 bits) | - | same as for MDR1. |

TABLE 51

| | Line No. | Possible Occurrence Values 0 | 1 | 2 | 3 | 4 | 5 | 6 | 7 | |
|---|---|---|---|---|---|---|---|---|---|---|
| Given or → Input Line | 0 | 1 | 0 | 1 | 1 | 0 | 1 | 0 | 0 | (1, 2, 3, 5) |
| | 1 | 1 | 1 | 1 | 0 | 1 | 1 | 1 | 0 | |
| | 2 | 1 | 0 | 0 | 1 | 1 | 0 | 0 | 1 | |
| | 3 | 1 | 1 | 0 | 1 | 0 | 1 | 0 | 1 | |
| | 4 | 1 | 0 | 1 | 1 | 1 | 1 | 1 | 1 | |
| | 5 | 1 | 1 | 1 | 0 | 0 | 0 | 0 | 0 | |

TABLE 51-continued

| Line No. | Possible Occurrence Values 0 | 1 | 2 | 3 | 4 | 5 | 6 | 7 |
|---|---|---|---|---|---|---|---|---|
| 6 | 1 | 0 | 0 | 1 | 0 | 0 | 0 | 0 |
| 7 | 1 | 1 | 0 | 1 | 1 | 0 | 0 | 0 |

TABLE 52

| | 0 | 1 | 2 | 3 | 4 | 5 | 6 | 7 | 8 | |
|---|---|---|---|---|---|---|---|---|---|---|
| | 0 | 1 | 2 | 3 | 4 | 5 | 6 | 7 | 8 | ←Possible occurrence values |
| | 1 | | 1 | 1 | | 1 | | | | ← E. O. vector of input line to iso-entropicgram (0, 2, 3, 5) |
| CYCLE 1 | | | | | | 1 | 1 | 1 | | ← Line 3 of delta offset 5 (values 5, 6, 7)* |
| CYCLE 2 | | | | 1 | 1 | 1 | 1 | | | ← Line 3 of delta offset 3 (values 3, 4, 5, 6) |
| | 0 | 0 | 0 | 1 | 1 | 0 | 0 | 1 | | ← After first XOR (values 3, 4, 7) |
| CYCLE 3 | | | 1 | 1 | 1 | 1 | | | | ← Line 3 of delta offset 2 (values 2, 3, 4, 5) |
| | 0 | 0 | 1 | 0 | 0 | 1 | 0 | 1 | | ←After 2nd XOR (values 2, 5, 7) |
| CYCLES 4, 5 | 1 | 1 | 1 | 1 | | | | | | ← Line 3 of delta offset 0 (values 0, 1, 2, 3) |
| | 1 | 1 | 0 | 1 | 0 | 1 | 0 | 1 | | ← Line 3 of the iso-entropicgram (values 0, 1, 3, 5, 7) |

*Ignore all beyond possible occurrence value 7.

TABLE 53

REVOLVE 2 MODULE

| REGISTERS | |
|---|---|
| RIL | - Number of lines to be revolved from SEED 2 MODULE or OUTPUT 2 MODULE; |
| WBP | - Write pointer register for AM II MEMORY; |
| WAP | - Read pointer register for AM II MEMORY; |
| WAS | - Reverse read pointer register for AM II MEMORY; |
| WAT | - Pointer register for number of reads from AM II MEMORY; |
| RI | - Intermediate occurrence value from AM II MEMORY; |
| RII | - Delta line occurrence value store from DELTA 2 MODULE; |
| FLIP FLOPS | |
| FF | - Halt; |
| P1 - P10 | - Control counter. |

TABLE 55

REVOLVE 3 MODULE - EXAMPLE

Initial Conditions:

| | | |
|---|---|---|
| Register T3 of SEED 2 MODULE | = 3 | (No. of lines to be revolved) |
| MEMORY MODULE area | = 0,2,3,5 | (EO Vector of input line) |

Conditions After Cycle 1:

AM II MEMORY

| AREA 1 | AREA 2 Address | Value |
|---|---|---|
| | 0 | 5 |
| | 1 | 6 |
| | 2 | 7 |
| | 3 | — |

WAS = WAT = 3

Conditions After Cycle 2:

AM II MEMORY

| AREA 1 Address | Value | AREA 2 |
|---|---|---|
| 0 | 3 | |
| 1 | 4 | |
| 2 | 7 | |
| 3 | — | |

TABLE 55-continued

REVOLVE 3 MODULE - EXAMPLE

WAS = WAT = 3

Conditions After Cycle 3:

AM-II MEMORY

| AREA 1 | AREA 2 Address | Value |
|---|---|---|
| | 0 | 2 |
| | 1 | 5 |
| | 2 | 7 |
| | 3 | — |

WAS = WAT = 3

Conditions After Cycle 4 & EXIT:

AM-II MEMORY

| AREA 1 Address | Value | AREA 2 |
|---|---|---|
| 0 | 0 | |
| 1 | 1 | |
| 2 | 3 | |
| 3 | — | |

N1 = 7

N2 = 5

TABLE 56

SEED 2 MODULE

| REGISTERS AND COUNTERS | |
|---|---|
| T1 | - Temporary store; |
| T0 | - Store difference between largest and next largest occurrence values; |
| T3 | - Keeps running tally of number of lines which the REVOLVE 3 MODULE has revolved; |

TABLE 56-continued

| SEED 2 MODULE | | |
|---|---|---|
| SN | - | Stores largest occurrence value of seed line; |
| SMHW | - | Stores iso-entropicgram width value; |
| SMLI | - | Stores the line number for the input line of the iso-entropicgram; |
| NOC | - | Stores number of occurrences in seed line; |
| SLN | - | Stores the length in words of the seed line; |
| SLINE | - | Stores the length of the current seed line whose number is stored into T3 |
| FLIP FLOPS | | |
| CNG | - | Indicates a call from CHANGE MODULE: |
| SMB | - | Indicates when length registers are to be counted down; |
| P1-P13 | - | control counters. |

TABLE 57

OUTPUT 2 MODULE

| COUNTERS/REGISTERS | DESCRIPTION |
|---|---|
| WB | Count up counter for AM-II MEMORY read pointer; |
| WP | Count up counter for AM-II MEMORY write pointer; |
| WT | Count down pointer for AM-II MEMORY read pointer; |
| OHW | Iso-entropicgram width; |
| OLINE | Given line value; |
| DO | Shifted delta line value; |
| N | Difference value indicating number of lines to be revolved; |
| RI | Occurrence value to be checked at input line; |
| RII | Stores occurrence value from given line, value from AM-II MEMORY and maximum value 255; |
| R2 | Difference value indicating minimum occurrence value that can be effected by shifted delta values; |
| M3 | MEMORY MODULE area 3 write address pointer; |
| SLN | Contains the physical length of the regenerated line; |
| FLIP FLOPS | |
| DELOP | Set to "1" if the DEL function is desired; |
| EEF | Used to determine when a DECODE I read is necessary during the DEL function; |
| T | Used to monitor parity of the DEL function output; |
| P1-P11 | Control counter 2022. |

TABLE 58

EXAMPLE OF OUTPUT 2 MODULE OPERATION

| Line/ Col. | 0 | 1 | 2 | 3 | 4 | 5 | 6 | 7 | |
|---|---|---|---|---|---|---|---|---|---|
| 0 | 1 | 0 | 1 | 1 | 0 | 1 | 0 | 0 | ← Input line |
| 1 | 1 | 1 | 1 | 0 | 1 | 1 | 1 | 0 | |
| 2 | 1 | 0 | 0 | 1 | 1 | 0 | 0 | 1 | |
| 3 | 1 | 1 | 0 | 1 | 0 | 1 | 0 | 1 | |
| 4 | 1 | 0 | 1 | 1 | 1 | 1 | 1 | 1 | |
| 5 | 1 | 1 | 1 | 0 | 0 | 0 | 0 | 0 | ← Seed line |
| 6 | 1 | 0 | 0 | 1 | 0 | 0 | 0 | 0 | |
| 7 | 1 | 1 | 0 | 1 | 1 | 0 | 0 | 0 | |

Iso-entropicgram of Example

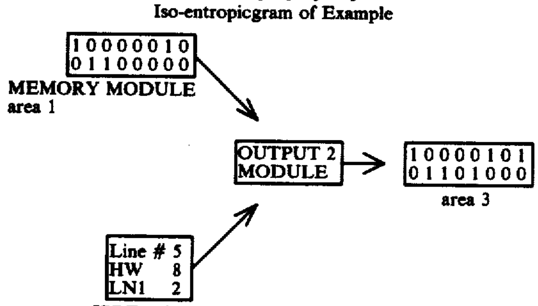

IPRF values

OUTPUT 2 MODULE not using DEL function

| | |
|---|---|
| 10000010 | 10000110 |
| 01100000 | 10000010 |
| area 1 | area 2 |

area content of MEMORY MODULE prior to call

HW − Line # = # of lines to be revolved

TABLE 58-continued

EXAMPLE OF OUTPUT 2 MODULE OPERATION

8 − 5 = 3 line of delta to be generated by DELTA 2 MODULE first cycle

| | col | 0 | 1 | 2 | 3 | 4 | 5 | 6 | 7 | |
|---|---|---|---|---|---|---|---|---|---|---|
| (1) | | 1 | 1 | 1 | 0 | 0 | 0 | 0 | 0 | seed line |
| (2) | | | | | 1 | 1 | 1 | 1 | | aligned and shifted delta line |
| (3) | | 0 | 0 | 0 | 0 | 0 | 0 | 0 | | AND of (1) and (2) |

0 = parity of (3) hence no value written to MEMORY MODULE area 3 second cycle

| | col | 0 | 1 | 2 | 3 | 4 | 5 | 6 | 7 | |
|---|---|---|---|---|---|---|---|---|---|---|
| (1) | | 1 | 1 | 1 | 0 | 0 | 0 | 0 | 0 | seed line |
| (2) | | 1 | 1 | 1 | | | | | | aligned and shifted delta line |
| (3) | | 1 | 1 | 1 | 0 | 0 | 0 | 0 | 0 | AND of (1) and (2) |

1 = parity of (3) hence value (2) is written to MEMORY MODULE area 3

| Don't care | Don't care | 10000010 |
|---|---|---|
| area 1 | area 2 | area 3 |

contents of MEMORY MODULE after call OUTPUT 2 example using DEL function

TABLE 58A

| CHANGE 2 MODULE | |
|---|---|
| COUNTERS/REGISTERS | |
| RI | - register used to store values read by DECODE I MODULE |
| RII | - register used to store values read by DECODE II MODULE |
| CLINE | - register used to store line number of the seed line from IPRF |
| FLIP FLOPS | |
| P1-P6 | - SN7474's used to create a pulse generator. |

TABLE 59

| HARDWARE AND SOFTWARE FLAGS, REGISTERS AND MEMORY AREAS USED FOR PARSER PROGRAM | |
|---|---|
| GENERAL REGISTERS | |
| R0 | Contains address of the two word area 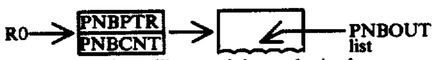 This allows the calling module to obtain the results of the request. |
| R1 | Unused by PARSE. |
| R2 | Contains the representation of the current character in the PSTRING containing the request. |
| R3 | Points to a stack ESTAK. This stack contains the pointers to the seed headers of the events to be processed. |
| R4 | Points to the request string which was built by the REQUEST subroutine. |
| R5 | Subroutine register |
| R6 (SP) | Hardware stack register. |
| FLAGS | |
| L1SW | 0 if the request is from layer 0, 1 if the request is from layer 1. |
| EXIT | A loop control flag which is used while scanning letters to make a word. |
| ESCAPE | A loop control flag which is used while scanning words to make a sentence, i.e., as long as ESCAPE is not set, control goes back to JOIN2 and another word seed header pointer is stacked on ESTAK. |
| BRSW | The brightness flag. It is set to 1 if the BRIGHT module is to be called. If BRIGHT is not to be called, the BRSW flag is set to 0. |
| STORAGE | VARIABLES |
| RLN0 | This word is used to keep a running tally of the length of the current word being parsed. The length is given by the number of letters in the word. |
| RLN1 | This word is used to keep a running tally of the length of the current sentence being parsed. The length is given in the number of words. |
| WDEL | A constant containing a binary representation of the word delimiter. |
| SDEL | A constant containing a binary representation of the sentence delimiter. |
| PNBPTR | A constant whose value is the beginning address of a list that is to contain the results of the PIPE and BRIGHT process. |
| TABLES | |
| L0ET | Table containing the pointers to the seed headers for all events on layer 0. |
| L1ET | Table containing the pointers to the seed headers for all events on layer 1. |

TABLE 60A

EXAMPLE OF FORM OF WORD LAYER 0 REQUEST AND SENTENCE LAYER 1 REQUEST

Sentence request
#ƀ - - - ƀ - - - ƀ#
Word request
ƀ - - - ƀ
Where # is a sentence delimiter;
ƀ (blank) is a word delimiter.

TABLE 60B

Example for PARSER, PIPE, BRIGHT programs
Layer Diagram for the Sample Data Base Layer 0

| Entry→ | | 1 | | | | | 2 | | 3 | | 4 | | | | | 5 | | | | | 6 | | | | 7 | | | | | | |
|---|---|---|---|---|---|---|---|---|---|---|---|---|---|---|---|---|---|---|---|---|---|---|---|---|---|---|---|---|---|---|---|
| Possible Occurrence | | THIS | | | | | IS | | A | | TEST | | | | | WHICH | | | | | THE | | | | BEST | | | | | | |
| **Value→** | **0** | **1** | **2** | **3** | **4** | **5** | **6** | **7** | **8** | **9** | **10** | **11** | **12** | **13** | **14** | **15** | **16** | **17** | **18** | **19** | **20** | **21** | **22** | **23** | **24** | **25** | **26** | **27** | **28** | **29** | **30** |

| Layer 0 Event Nos. | Event | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 0 | | \| | | | | | \| | | | \| | | \| | | | | | \| | | | | | | \| | | | | \| | | | | \| | |
| 1 | T | | \| | | | | | | | | | | \| | | | \| | | | | | | | \| | | | | | | | \| | | |
| 2 | H | | | \| | | | | | | | | | | | | | | | \| | | | \| | | \| | | | | | | | |
| 3 | I | | | | \| | | | \| | | | | | | | | | | | \| | | | | | | | | | | | | | |
| 4 | S | | | | | \| | | | \| | | | | | | \| | | | | | | | | | | | | | | \| | | | |
| 5 | A | | | | | | | | | | \| | | | | | | | | | | | | | | | | | | | | | | |
| 6 | E | | | | | | | | | | | | | \| | | | | | | | | | | | | \| | | | \| | | | | |
| 7 | W | | | | | | | | | | | | | | | | | \| | | | | | | | | | | | | | | | |
| 8 | C | | | | | | | | | | | | | | | | | | | | \| | | | | | | | | | | | | |
| 9 | B | | | | | | | | | | | | | | | | | | | | | | | | | | | \| | | | | | |

Layer 1

| Entry → | | THIS IS A TEST | | | | | WHICH THE BEST | | | | | THIS IS BEST | | | | |
|---|---|---|---|---|---|---|---|---|---|---|---|---|---|---|---|---|
| Possible Occurrence Value | 0 | 1 | 2 | 3 | 4 | 5 | 6 | 7 | 8 | 9 | 10 | 11 | 12 | 13 | 14 | 15 |

| Layer 1 Event Nos. | Event | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | # | \| | | | | | \| | | | | | \| | | | | | \| |
| 1 | THIS | | \| | | | | | | | | | | \| | | | | |
| 2 | IS | | | \| | | | | | \| | | | | | | \| | | |
| 3 | A | | | | \| | | | | | | | | | | | | |
| 4 | TEST | | | | | \| | | | | | | | | | | | |
| 5 | WHICH | | | | | | | \| | | | | | | | | | |
| 6 | THE | | | | | | | | | \| | | | | | | | |
| 7 | BEST | | | | | | | | | | \| | | | | \| | |

TABLE 60C

BETTER : = <REQUEST>

↗ <input string pointer>

| ESTAK | PNBOUT | PW = 1<br>PCO = 3 |
|---|---|---|
| → <NULL> | → <NULL> | BVCO = 0.50 |

TABLE 60D

Meaningful main memory locations after the request has been scanned.

PSTRING

ƀ BETTER ƀ : = <REQUEST>

↑ <input string pointer>R4

| ESTAK | RLN0 | PNBOUT |
|---|---|---|
| → 240←top-of-stack | 6 | → <null> |
| 224 | | |
| 204 | | |
| 204 | | |
| 224 | | |
| 236 | | |
| (L0ET's) | | |

TABLE 60E

AFTER PIPE PROGRAM

CONTENT MAIN MEMORY

| ESTAK | RLN0 | PNBOUT |
|---|---|---|
| → 240 | 6 | → <NULL> |
| 224 | | |
| 204 | | |
| 204 | | |
| 224 | | |
| 236 | | |
| (L0ET's) | | |

CONTENT P/B MEMORY area 1

26 } center pipe values for layer 0,
12 } entries to be checked by BRIGHT program
−1

TABLE 60F

MAIN MEMORY AFTER BRIGHT PROGRAM IS CALLED

| ESTAK | RLN0 | PNBTR | PNBCNT | PNBOUT |
|---|---|---|---|---|
| 240 | 6 | •→ | [•] | ↗ 7 entry No. <"BEST"> |
| 224 | | PNBCNT (no. of entries | [1] | .699 Brightness Value |
| 204 | | | | |
| 204 | | | | |
| 224 | | | | |
| → 236 | | | | |

TABLE 60G

| ESTAK | R4 | |
|---|---|---|
| → 240 | | R4 will act as a pointer processing of ESTAK from 236('B') to 240 ('R'). The top-of-stack pointer, ESTAK, remains unchanged. |
| 224 | | |
| 204 | | |
| 204 | | |
| 224 | | |
| 236 ← | ← | |

TABLE 60H

After PIPE MODULE has processed first event "B" of data base

MEMORY MODULE

| area 1 | area 2 | area 3 |
|---|---|---|
| 26 | 30 | <NULL> |
| | 25 | |
| | 21 | |
| | 15 | |
| | 10 | |
| | 8 | |
| | 5 | |
| | 0 | |

P/B MEMORY area 2

26 (biased occurrence value)
1 (No. of hits)
−1 (end of field)

TABLE 60I

After processing second event "E"

| MAIN MEMORY | | P/B MEMORY area 1 |
|---|---|---|
| ESTAK → 240 | R4 | 26 |
| 224 | | 2 |
| 204 | | 23 |
| 204 | | 1 |
| 224 ← | ← | 11 |
| 236 | | |
| | | −1 |

TABLE 60J

After PIPE program completes

MAIN MEMORY

| ESTAK | R4 | MEMORY MODULE area 3 | |
|---|---|---|---|
| → 240 | ← | | |
| 224 | | | |
| 204 | | 26 | (CP) |
| 204 | | 4 | (No. of hits) |
| 224 | | 21 | (CP) |
| 236 | | 2 | (No. of hits) |
| | | −1 | (CP) |
| | | 0 | No. of hits |
| | | 12 | (CP) |
| | | 3 | No. of hits |
| | | −1 | (CP) |
| | | 0 | No. of hits |
| | | −1 | (CP) |
| | | 0 | (No. of hits) |
| | | −1 | (CP) |
| | | 0 | (No. of hits) |

TABLE 60K

Memory prior to BRIGHT program call

| MAIN MEMORY | | P/B MEMORY area 1 |
|---|---|---|
| ESTAK | R4 | 26 |
| → 240 ← | ← | 12 |
| 224 | | −1 |
| 204 | | |
| 204 | | |
| 224 | | |
| 236 | | |

TABLE 60L

After first pass of BRIGHTNESS module

P/B MEMORY area 2

27 center pipe for "BEST"
26 current leftmost entry in response
1 No. of hits
32 adjusted entry
12
255
0

TABLE 60L-continued

| After first pass of BRIGHTNESS module |
|---|
| −1 |

TABLE 60M

| After second pass of BRIGHTNESS MODULE | |
|---|---|
| P/B MEMORY area 1 | |
| 28 | current center pipe |
| 26 | current leftmost entry |
| 2 | No. of hits |
| 32 | > adjusted entries |
| 32 | |
| 13 | |
| 12 | |
| 1 | |
| 17 | |
| −1 | |

TABLE 60N

| After BRIGHTNESS MODULE completes last pass | |
|---|---|
| P/B MEMORY area 1 | |

TABLE 60N-continued

| After BRIGHTNESS MODULE completes last pass | |
|---|---|
| 25 | beginning delimiter |
| 5 | No. of hits |
| 4 | δ (δ-min) |
| 28 | d0 |
| 10 | |
| 4 | |
| 4 | |
| 18 | |

TABLE 60O

After BRIGHT program completes

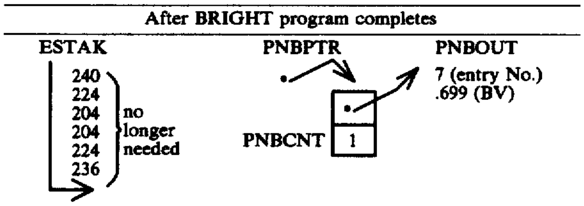

TABLE 61

| | HARDWARE AND SOFTWARE FLAGS, REGISTERS AND MEMORY AREAS USED FOR PIPE PROGRAM |
|---|---|
| GENERAL PURPOSE REGISTERS | |
| R0 | Parameter register; 1. Points to a seed header as the OUTPUT subroutine is called; 2. Points to DAREA if memory management subroutines DPMMEM/MEMDPM are called to manipulate a delimiter seed; 3. Points to WAREA if memory management subroutines DPMMEM/MEMDPM are called to mainpulate a non delimiter seed; |
| R1 | Parameter register; 1. Points to the two word data at DOAR if calling the OUTPUT, DPMMEM, or MEMDPM subroutines to manipulate a delimiter seed; 2. Points to the two word area at WOAR if calling the OUTPUT, DPMMEM, or MEMDPM subroutines to manipulate a non delimiter seed; |
| R2 | Used in PI22 as a temporary pointer to delimiter seed; |
| R3 | Points to the event stack ESTAK; |
| R4 | Points to the LXET address PTR in ESTAK which is currently being processed; after PI22 it points to the output list PNBOUT; |
| R5 | Return instruction pointer; |
| R7 | Instruction pointer; |
| FLAGS | |
| L1SW | Is 0 if the events on ESTAK are from layer 0; - is 1 if the events on ESTAK are from layer 1; |
| ESCAPE | Is 0 if the events being processed are from layer 0 and the response is to be given from layer 1; is 1 if the events on ESTAK are from layer 0 and the response is to be made from layer 0 or the events on ESTAK are from layer 1 and the response is to be made from layer 1; |
| BRWS | The BRIGHT program schedule flag; 0 if the BRIGHT program is not to be scheduled; - 1 if the BRIGHT program is to be scheduled. |
| LITERALS | |
| #0, #1, #2, #6, #10, #30 | OCTAL constants used mainly to set bits in the STATUS and AI registers of the DPM INTERFACE MODULE |
| FIRST, LAST, DPM, PIPGO, PBM, BDONE | Octal constants used to set bits in the DPM INTERFACE MODULE STATUS register |
| #DOAR | The address of the area beginning at DOAR. This value is loaded into register R1 prior to calling the OUTPUT, DPMMEM, or MEMDPM routines to manipulate a delimiter seed; |
| #DAREA | The address of the area beginning at DAREA. This value is loaded into register R0 prior to calling DPMMEM, MEMDPM routines to manipulate a delimiter seed; |

TABLE 61-continued

| | HARDWARE AND SOFTWARE FLAGS, REGISTERS AND MEMORY AREAS USED FOR PIPE PROGRAM |
|---|---|
| #WOAR | The address of the area beginning at WOAR. This value is loaded into R1 prior to calling the OUTPUT, DPMMEM, or MEMDPM routines to manipulate a non-delimiter seed; |
| #WAREA | The address of the area beginning at WAREA. This value is loaded into R0 prior to the calling of the DPMMEM or MEMDPM routines to manipulate a non-delimiter seed; |
| #PNBOUT | The address of the area beginning at PNBOUT. This value is loaded into R4 at PI22. It is a pointer to the output list whose entries are the ordered pairs<br>vi - entry #<br>vii - brightness value |
| L1PTR | The beginning address of the layer header for layer 1; |
| HW1 | The iso-entropigram width for layer 1; This is the second word of the layer 1 header; |
| RLN1 | A one word area used to maintain the length of a request (in words) which is directed at layer 1; |
| L0PTR | The beginning address of the layer 0 header; |
| HW0 | The iso-entropicgram width for layer 0; this value is the second word of the layer 0 header; |
| RLN0 | A one word area used to maintain the length of a request (in letters) which is directed at layer 0; |
| LPTR | A common word which points to<br>L0ET if L1SW is 0;<br>L1ET if L1SW is 1; |
| HW | A common word which contains<br>HW0 if L1SW is 0;<br>HW1 isf L1SW is 1; |
| RLN | A common word which contains<br>RLN0 if L1SW is 0;<br>RLN1 if L1SW is 1; |
| DNOC | A word which holds the number of 1's contained in the delimiter line 0; |
| NOC | A word used to reflect the number of the entry on the layer currently being processed; |
| WOLN | The second word of the area beginning with WOAR. It contains the length of the line 0 representation of the non-delimiter seed currently being processed; |
| DOLN | The second word of the area beginning with DOAR. It contains the length of the line 0 representation of the delimiter currently being processed; |
| PW | A constant representing the width of the pipe; |
| PC0 | A constant representing the pipe cutoff value; i.e., the minimum number of hits needed in a pipe; |
| PNPCNT | The second word of an area beginning with PNBPTR. It contains the number of entries in the output list PNBOUT; |
| A2AD | A one word value which keeps track of the address in P/B MEMORY area 1 for writing; |
| M3AD | A one word of value which monitors the address in MEMORY MODULE area 3 for reading; |
| BRCNT | A tally counter which monitors the number of writes made to P/B MEMORY area 1; |
| OV | A single word area which contains a center pipe value read from MEMORY MODULE area 3; |
| NH | A single word aea which contains the number of hits in the pipe just read from MEMORY MODULE area 3; |
| **DPM INTERFACE MODULE REGISTERS** | |
| STATUS | This register is read, written, and monitored by the software package. The bit configurations set in this register determine the sequence of events in the DPM machine; |
| AI | This is an address register. The areas that it addresss are controlled by bits in the STATUS register; |
| DATAI | This is the input register. All reads (except STATUS) on the DPM machine are gated through this register |
| DATA0 | The output register. All writes (except STATUS and AI) are gated through this register. |

TABLE 62

HARDWARE AND SOFTWARE FLAGS, REGISTERS AND MEMORY AREA USED FOR BRIGHT PROGRAM

| | |
|---|---|
| R0 Parameter register | 1. Points to a seed header if OUTPUT subroutine is called.<br>2. Points to DAREA if memory management routines DPMMEM/MEMDPM are called to manipulate a delimiter seed.<br>3. Points to WAREA if memory management routines DPMMEM/MEMDPM are called to manipulate a non-delimiter seed. |
| R1 Parameter register | 1. Points to the two word area at DOAR if a call is made to the OUTPUT, DPMMEM, or MEMDPM routines to manipulate a delimiter seed.<br>2. Points to the two word area at WOAR if a call is made to the OUTPUT, EPMMEM, or MEMDPM routines to manipulate a non-delimiter seed. |
| R2 | Not used by the BRIGHT module. |
| R3 | Points to the top of ESTAK. |
| R4 | Points to the address of the seed header of the current seed being processed. |
| FLOATING POINT REGISTERS | |
| AC0-AC4 | Registers which are internal to the floating point package on the PDP-11/45. Are used to store a number of temporary and intermediate values. These can be obtained by looking at the flow chart, description and code of the BRIGHT module. |
| FLAGS | |
| LNGSW | 0 if the lengths of the request and possible responses are NOT to be used in computing a brightness value;<br>1 if the lengths of the request and possible response are to be used in computing a brightness value. |
| LITERALS | |
| #1, #2, #6, #30 | Octal constants |
| D9 | Decimal constant 9 |
| FIRST, LAST, BMG0, DPM, PBM, D1INIT, BDONE | Octal constants usd to set the various bits in the STATUS REGISTER of the INTERFACE MODULE |
| #WOAR | The address of WOAR. This value is loaded into register R1 if the OUTPUT, DPM MEM, MEM DPM subroutines are called to manipulate a non delimiter seed. |
| WAREA | The address of WAREA. This value is loaded into register R0 if the DPM MEM, MEM DPM subroutines are called to manipulate a non delimiter seed. |
| #DOAR | The address of DOAR. This value is loaded into register R0 if the OUTPUT, DPM MEM, or MEM DPM subroutines are called to manipulate a non delimiter seed. |
| #DAREA | The address of DAREA. This value is loaded into register R0 if the DPM MEM or MEM DPM subroutines are called to manipulate a delimiter seed. |
| MEMORY STORAGE | |
| RLN | A one word area containing the length of the request currently being processed. |
| PNBCNT | A tally counter. This word contains the number of entries contained in the output list PNBOUT. |
| WOLN | The second word of the area beginning with WOAR. It contains the length of the line 0 representation of the non-delimiter seed currently being processed. |
| DOLN | The second word of the area beginning with DOAR. It contains the length of the line 0 representation of the delimiter seed for this request. |
| DNOC | A word which holds the number of 1's contained |

TABLE 62-continued

| HARDWARE AND SOFTWARE FLAGS, REGISTERS AND MEMORY AREA USED FOR BRIGHT PROGRAM | |
|---|---|
| | in the delimiter line 0 representation. |
| NOC | A word used to reflect the current layer entry numnber being processed. |
| AICNT | A word used as an address pointer to DPM MEMORY area 3 when reading the results of the brightness process. |
| DI | The first value of a four value set read from DPM memory area 3. This value contains a beginning delimiter value for the entry whose brightness status is reflected in the three values that follow. |
| N | The second value read from DPM memory area 3. This value contains the number of events in the request that also appeared in this entry. |
| S | The third value read from DPM memory area 3. This value reflects the minimum degree of closeness between the events in the request and the events in this entry. |
| D0 | The fourth value read from the DPM memory area 3. This value represents a maximum separation value between the events in the request and the events in this entry. This value will be used as a normalizing value. |
| TDI | A word used to hold the beginning delimiter of the entry about to be processed. |
| TD2 | A word used to hold the ending delimiter of the entry about to be processed. |
| LS | A word used to hold the length of the entry being processed. |
| INTERFACE REGISTERS | |
| Same as for the PIPE MODULE | |

TABLE 63

| HARDWARE AND SOFTWARE FLAGS, REGISTERS AND MEMORY AREAS USED FOR OUTPUT SUBROUTINE | |
|---|---|
| GENERAL REGISTERS | |
| R0 | - Points to the seed header of the seed to be output; |
| R1 | - Points to a two word area; |
| R2 | - Loaded with the physical length of the seed; |
| R3 | - Loaded with the address of the seed; |
| R4 | - Not used. |
| LITTERALS | |
| #0 #10 | Octal constants |

TABLE 63-continued

| HARDWARE AND SOFTWARE FLAGS, REGISTERS AND MEMORY AREAS USED FOR OUTPUT SUBROUTINE | |
|---|---|
| #6 | |
| DPM OMGO BDONE | Octal constants used to set bits in STATUS register of DPM INTERFACE MODULE |
| MEMORY STORAGE | |
| HW | The word which contains the iso-entropicgram width of the layer associated with this seed. |
| INTERFACE REGISTERS | |
| Same as with PIPE MODULE. | |

TABLE 64

| HARDWARE AND SOFTWARE FLAGS, REGISTERS AND MEMORY AREAS USED FOR MEMDPM SUBROUTINES | |
|---|---|
| GENERAL REGISTERS | |
| R0 | - Points to main memory save area (DAREA or WAREA) from which transfer is to be made; |
| R1 | - Points to a two word area (DOAR or WOAR); |
| R2 | - Loaded from R0; |
| R3 | - Loaded with the first word (MEMORY MODULE area number) pointed to by R1, i.e., the area to which transfer is to be made; |
| R4 | - Loaded with the second word (physical length of seed in words in DOLN or WOLN) pointed to by R1; |
| INTERFACE REGISTERS | |
| Same as described in the PIPE MODULE. | |

TABLE 65

| HARDWARE AND SOFTWARE FLAGS, REGISTERS AND MEMORY AREAS USED FOR DPMMEM SUBROUTINES | |
|---|---|
| GENERAL REGISTERS | |
| R0 | - Points to main memory save area (DAREA or WAREA) to which transfer is to be made; |
| R1 | - Points to two word area (DOAR or WOAR); |
| R2 | - Loaded from R0; |
| R3 | - Loaded with the first word (MEMORY MODULE |

TABLE 65-continued

| HARDWARE AND SOFTWARE FLAGS, REGISTERS AND MEMORY AREAS USED FOR DPMMEM SUBROUTINES | |
|---|---|
| | area number) pointed to by R1; |
| R4 | - Loaded with the second word (physical length of seed in words in DOLN or WOLN) from the area pointed to by R1; |
| INTERFACE REGISTERS | |
| Same as for the PIPE MODULE. | |

TABLE 66

| HARDWARE AND SOFTWARE FLAGS, REGISTERS AND MEMORY AREAS USED FOR DECODE I SUBROUTINE | |
|---|---|
| GENERAL REGISTERS | |
| R0 | - Used to hold the value just read from the hardware DECODE I MODULE; |
| R1 | - Not used; |
| R2 | - Not used; |
| R3 | - Not used; |
| R4 | - Not used. |
| LITTERALS | |
| #10 | Octal constant used to prime interface register AI. AI will, in turn, cause the results from DECODE I MODULE stored in MEMORY MODULE to be gated to DATAI. |
| DPM DIG0 BDONE | Octal values used to set m1, m2, m3 bits in the DPM INTERFACE STATUS register. |
| DPM INTERFACE REGISTER | |
| STATUS AI DATAI | Same as described in the PIPE MODULE. |

TABLE 67

| HARDWARE AND SOFTWARE FLAGS, REGISTERS AND MEMORY AREAS FOR INSERT SUBROUTINE | |
|---|---|
| GENERAL REGISTERS | |
| R0 | Not used; |
| R1 | Not used; |
| R2 | Contains the current entry # to be inserted; |
| R3 | Points to the memory area PNBOUT; |
| R4 | Contains the number of entries in PNBOUT, i.e., R4 = PNBOUT; |
| FLOATING POINT PACKAGE REGISTERS | |
| AC0 | Contains the brightness value (BV) of the current entry in PNBOUT; |
| AC1 | Contains the current brightness value (BV) to be inserted in PNBOUT; |
| MAIN MEMORY | |
| PNBPTR | Contains the beginning address of the memory area PNBOUT; |

TABLE 67-continued

| HARDWARE AND SOFTWARE FLAGS, REGISTERS AND MEMORY AREAS FOR INSERT SUBROUTINE | |
|---|---|
| PNBCNT | Contains the number of entries in PNBOUT. |

APPENDIX B

INDEX OF PROGRAM LISTINGS

| | |
|---|---|
| B-1 | PARSER Program |
| B-2 | PIPE Program |
| B-3 | BRIGHT Program |
| B-4 | OUTPUT Subroutine |
| B-5 | MEMDPM Subroutine |
| B-6 | DPMMEM Subroutine |
| B-7 | DECODE I Subroutine |
| B-8 | INSERT Subroutine |
| B-9 | FORMATER PRogram |
| B-10 | COMMAND, GET INTEGER, GET FLOATING, POINT Subroutines |
| B-11 | REQUEST Subroutine |
| B-12 | PROCOUT (Process Output) Subroutine |
| B-13 | SETUP Subroutine |
| B-14 | GENERATE Subroutine |
| B-15 | SORT Subroutine |
| B-16 | PRINTR (Printer) Subroutine |
| B-17 | PRNTC (Print a Character) Subroutine |
| B-18 | GETC (Get a Character) Subroutine |
| B-19 | FORMATER DATA STRUCTURE |
| B-20 | DATA STRUCTURES |
| B-21 | Constants Defined by FORMATER Program |
| B-22 | Code for the DATABAS Program<br>A. LAYER INITIALIZATION<br>B. LAYER BUILDING<br>C. LAYER REQUEST<br>D. PROCESS A LAYER 0 ENTRY<br>E. ADD N EVENTS<br>F. PUT NEW SEED IN STORAGE<br>G. SEARCH FREE SPACE<br>H. GARBAGE COLLECTION<br>I. RELEASE SPACE<br>J. ASH (Adjust Seed Header)<br>K. Additional Variables Demanded by the Layer Building Method |

APPENDIX B (Cont'd)

B-1
PARSER PROGRAM

```
; PARSE     - this is the parser for performing PIPING
              and BRIGHTNESS
;           - it is assumed that R4 points to a request string
;           - that has been preprocessed for form and correctness
;           -
;           - Register usage in this module
;           - R0 parameter register
;           - R1 parameter register
;           - R2 work register
;           - R3 pointer to event stack (ESTAK)
;           - R4 pointer to request string
;           - SP register to the stack register
;
PARSE:        MOV R0,-(SP)        ; save volatile registers
              MOV R1,-(SP)
              MOV R2,-(SP)
              MOV R3,-(SP)
(PA1)         MOV R4,-(SP)
              CLR L1SW            ; reset decision switches
              CLR ESCAPE
```

APPENDIX B (Cont'd)-continued

B-1
PARSER PROGRAM

```
                        CLR BRSW
                        MOV #ESTAK,R3          ; R3 points to event stack
(PA1)                   MOV (R4)+,R2           ; get a character
(PA2)                   CMP R2,WDEL            ; is the character a word delimiter
                        BEQ PF1                ; true exit - i.e. is a word
                                               delimiter
(PA3)                   CLR RLN1               ; set layer 1 requrest length to 0
                        TST (R4)+              ; skip over word delimiter
                        BR JOIN1               ; exit decision
(PA4) PF1:              INC ESCAPE             ; set escape decision switch
                        INC LNGSW
(PA5) JOIN1:JOIN2:      CLR RLN0               ; clear layer 0 request
                                               length indicator
                        CLR EXIT
(PA6) JOIN3:            MOV (R4)+,R2           ; get another character
(PA7)                   CMP R2,SDEL            ; compare with sentence
                                               delimiter
                        BNE PF2                ; false exit, i.e., not
                                               equal
(PA12)                  INC L1SW               ; true exit; set layer 1
                                               decision switch
                        INC EXIT               ; set exit and escape
                        INC ESCAPE             ; decision switches
                        JMP JOIN5              ; decision exit
(PA8) PF2:              CMP R2,WDEL            ; is the character a
                                               word delimiter
                        BNE PF3                ; false exit; not a word
                                               delimiter
(PA11)                  INC EXIT               ; set exit
                        JMP JOIN4              ; decision exit (decision 3)
(PA9) PF3:              MOV L0ET(R2),-(R3)     ; push pointer to seed
                                               ; header for this event on
                                               ; ESTAK
(PA10)                  INC RLN0               ; increment layer 0 request
                                               length
(PA13)JOINE4:JOIN5:     TST EXIT               ; is exit flag set
                        BNE .+2                ; true exit
                        JMP JOIN3              ; false exit - recycle
(PA14)                  JSR R5,PIPE            ; perform piping
(PA15)                  TST BRSW               ; is there a need for
                                               brightness
                        BEQ PA16               ; false exit
(PA17)                  JSE R5,BRIGHT          ; perform brighness
                        BR JOIN6               decision exit
(PA16) PA16:            ADD RLN,R3             ; adjust stack
(PA18) JOIN6:           TST ESCAPE             ; test escape switch
                        BNE PEXIT              ; if set then exit
                        TST PNBCNT             ; anything in list
                        BEQ PA20               ; no
(PA19)and
(PA21)                  MOV@PNBPTR,R2          ; get "best" hit event number
(PA20) PA20:            BR .+3
                        MOV #2,R2
                        NEG R2
(PA22)                  MOV L1ET(R2),-(R3)     ; stack layer 1 event's seed
                                               ; header pointer on ESTAK
                        INC RLN1               ; increment layer 1 request
                                               ; length
                        JMP JOIN3              ; repeat the cycle
(PA23) PEXIT:           MOV (SP)+,R4
                        MOV (SP)+,R3
                        MOV (SP)+,R2           ; restore context
                        MOV (SP)+,R1
                        MOV (SP)+,R0
                        MOV #PNBPTR,R0         ; set up output parameter
                        RTS R5                 ; return to caller
```

B-2
PIPE PROGRAM

```
; PIPE          - process. This process performs the PIPING
;               hardware function and performs the setup for the
;               BRIGHT process if that is necessary. The
;               BRIGHT process will not be scheduled if the
;               following two conditions are met:
;               a. an exact hit is found
;               b. escape is not set.
(PI1) PIPE:     MOV R0,-(SP)
                MOV R1,-(SP)
                MOV R2,-(SP)                ; save context
                MOV R3,-(SP)
                MOV R4,-(SP)
(PI2)           TST L1SW                    ; check layer 1 switch
                BEQ BF1                     ; false exit, i.e., on
                                            layer 0
(PI5)           MOV@L1PTR,R0                ; R0 contains pointer to
                                            sentence delimiter seed
                                            header
                MOV L1PTR,LPTR              ; initialize layer pointer
```

-continued

B-2
PIPE PROGRAM

```
(PI6)           MOV HW1,HW              ; initalize hologram width
                MOV RLN1,RLN            ; initalize request length
                BR JOIN1                ; exit decision
(PI3) BF1:      MOV @LOPTR,R0           ; R0←pointer to word
                                        delimiter seed length
                MOV L0PTR,LPTR          ; save proper layer pointer
(PI4)           MOV HW0, HW             ; hologram width is
                                        layer 0 value
                MOV RLN0,RLN            ; initialize request length
 JOIN1:         LDCIF AC0,RLN           ; float request length
(PI7.1)         MULF AC0,FPCO           ; multiply by pipe cutoff
                ADFF AC0,FRND           ; round up
                STCFI AC0,PCO           ; store integer in pipe
                                        cutoff
(PI7.2)         MOV #DOAR,R1            ; set up for OUTPUT function
                JSR R5,OUTPUT           ; generate delimiter seed row 0
                MOV 2(R0),DNOC          ; save # of 1's in row 0
(PI8)           MOV #DAREA,R0           ; prepare for transfer
                JSR R5,DPMMEM           ; transfer the seed from memory
                                        ; area in DPM to DAREA
(PI9)           MOV FIRST,STATUS
                                        ; set FIRST bit in STATUS register
                MOV #1,BRSW             ; set BRIGHT process scehdule flag
(PI10)          MOV R3,R4               ; R4 pointer to top-of-stack
                ADD RLN,R4              ; R4 points to the first entry to be
                                        processed
(PI11)JOIN2:    MOV -(R4),R0            ; R0 is seed header pointer for
                                        current event
                MOV #WOAR,R1            ; area to receive output values
                JSR R5,OUTPUT           ; generate seed's row 0
(PI12)          CMP #1,WOAR             ; is the seed in DPM memory area 1
                BEQ JOIN3               ; yes - no action needed
(PI13)          MOV #WAREA,R0           ; set up work area for the transfer
                JSR R5,DPMMEM           ; transfer from DPM to WAREA
                MOV #1, (R1)            ; assure transfer to area 1
                JSR R5,MEMDPM           ; transfer from WAREA to DPM area 1
(PI13.1)JOIN3:  CMP R4,R3
                BNE .+2
(PI13.2)        ADD LAST,STATUS
(PI14)          MOV #DAREA,R0           ; set up to move delimiter
                MOV #DOAR,R1            ; line 0 to DPM area II
                MOV #2,(R1)             ;
                JSR R5,MEMDPM           ;
(PI15)          MOV #6,AI               ; set up to write to IPRF
                MOV WOLN,DATAO          ; write LN1
                MOV DOLN,DATAO          ; write LN2
                MOV PW,DATAO            ; write the pipe width
                MOV RLN,DATAO           ; write LNRQ
(PI16)          ADD DPM+PIPGO,STATUS    ; call PIPING module
(PI17)          BIT BDONE,STATUS        ; test for completion
                BEQ .-1                 ; loop until done
(PI18)          MOV #0,STATUS           ; clear STATUS register
(PI21)          CMP R4,R3               ; check for last or
                                        completion
                BEQ .+2
                JMP JOIN2               ; loop back
(PI22)PIPADJ:   MOV #PNBOUT,R4          ; R4 points to output list
                MOV @LPTR,R2            ; pointer to seed header
                                        for proper delimiter
                MOV 6(R2),NOC           ; NOC is no. of 1's in
                                        delimiter row 0
                DEC NOC                 ; adjust NOC to use as an
                                        implied event # pointer
                CLR A2AD                ; addr.pointer AUXILIARY
                                        MEMORY II
                CLR M3AD                ; addr.pointer MEMORY
                                        area 2
                CLR BRCNT               ; counter to keep track of
                                        number of events sent to
                                        BRIGHT
(PI23)JOIN5:    MOV #30,STATUS          ; prepare for read from
                                        MEMORY area 3
                MOV M3AD,AI             ; memory address to read
                                        from
                MOV DATAI,OV            ; read two values from
                                        MEMORY area 3
                MOV DATAI,NH            ; OV - center pipe,
                                        NH - # of hits
                ADD #2,M3AD             ; address memory address
                                        pointer
(PI24)          TST OV                  ; is center pipe negative
                BMI JOIN9               ; yes, ignore entry
(PI25)          TST NH                  ; is number of hits
                                        negative
                BMI PF2                 ; negative exit, i.e.,
                                        exact hit
(PI29)          CMP NH,PCO              ; compare with cutoff value
                BLT JOIN6               ; less than - ignore
(PI30)          MOV 10+PBM, STATUS      ; prepare to write to
                                        AUXILIARY MEMORY
                MOV A2AD,AI             ; set up address register
                MOV OV,DATAO            ; write out center pipe
```

-continued

B-2
PIPE PROGRAM

```
              INC A2AD              ; increment memory address
                                    pointer
              INC BRCNT             ; increment bright count
 JOIN6:       JMP JOIN8             ; decision exit
(PI26) PF2:   TST ESCAPE            ; is escape set
              BEO PF3               ; false exit
(PI28)        MOV 10+PBM,STATUS     ;
              MOV A2AD,AI           ; write out center pipe
                                    to AUXILIARY MEMORY
              MOV OV,DATAO          ;
              INC A2AD              ;
              INC BRCNT             ; up the bright count
              JMP JOIN7             ; decision exit
(PI27) PF3:   CLR BRSW              ; reset bright switch
              MOV NOC,-(R4)         ; stack the event number
              MOVF F1,-(R4)         ; stack the BV = 100%
              MOV #1,BRCNT          ; set hit count at 1
              INC PNBCNT
              CLR NOC               ; assure loop exit
(PI31)JOIN6:
 JOIN7:
 JOIN8:
 JOIN9:       DEC NOC               ; is request finished
(PI32)        BMI .+2               ; yes -exit
              JMP JOIN5             ; no - loop back
(PI33)JOIN10: TST BRCNT
              BNE.+3
(PI34)        CLR BRSW
              CLR PNBCNT
(PI33.1)      BR .+5
              TST BRSW
              BEQ .+2
(PI33.2)      MOV A2AD,AI
              MOV-1,DATAO
(PI35)        MOV (SP)+,R4
              MOV (SP)+,R3
              MOV (SP)+,R2          ; restore context
              MOV (SP)+,R1
              MOV (SP)+,R0
              RST R5                ; return
```

B-3
BRIGHTNESS PROGRAM

```
;BRIGHT       - This process performs the BRIGHTNESS function on
;             the RLN events on the stack. It then computes a
;             brightness value (BV). If the ESCAPE is set
;             all brightness values above a specified cutoff
;             are ordered and returned to the requestor. If
;             ESCAPE is not set, the best value is saved in
;             BVMAX and this is returned to the requestor.
(BR1)BRIGHT:  MOV R0,-(SP)
              MOV R1,-(SP)          ; save registers
              MOV R2,-(SP)          ;
              MOV R3,-(SP)
              MOV R4,-(SP)
(BR2)         MOV R3,R4             ; R4←top of ESTAK
              ADD RLN,R4            ; R4 ←first entry +1
              MOV FIRST,STATUS      ; initialize the FIRST flip flop
              MOV ↑D9,AI            ; set up for IPRF transfer
              MOV RLN,DATAO         ; initalize LNRQ
              CLR PNBCNT            ; clear the output list
(BR3)JOIN1:   MOV -(R4),R0          ; R1←current entry seed header
              MOV #WOAR,R1          ; results go here
              JSR R5,OUTPUT         ; revolve back to row 0
(BR4)         CMP #1,WOAR           ; result in DPM area I
              BEQ JOIN 2            ; yes - no transfer necessary
(BR5)         MOV #WAREA,R0         ; prepare for the transfer
              JSR R5,DPMMEM         ; transfer from DPM to WAREA
              MOV #1,WOAR           ; assure a transfer to DPM area I
              JSR R5,MEMDPM         ; transfer from WAREA to DPM area I
(BR6)JOIN2:   MOV #2,DOAR           ; set up and
              MOV #DOAR,R1          ; move delimiter row 0
              MOV #DAREA,R0         ; expansion to DPM
              JSR R5,MEMDPM         ; memory area II
(BR7)         MOV #6,AI             ; set for move to IPRF
              MOV WOLN,DATAO        ; move in LN1
              MOV DOLN,DATAO        ; move in LN2
(BR7.1)       CMP R3,R4             ; is this the last event to be
                                    processed
              BNE .+2               ; no
(BR7.2)       ADD LAST,STATUS       ; yes - set LAST bit in the
                                    STATUS register
(BR8)         ADD
              DPM+BRGO,STATUS
                                    ; start the hardware BRIGHTNESS module
              BIT BDONE,STATUS
              BEQ .-1               ; loop until done
              MOV #O,STATUS         ; clear STATUS
```

-continued

B-3
BRIGHTNESS PROGRAM

```
(BR9)           CMP R4,R3             ; check for completion
                BEQ .+2               ; not the last
                JMP JOIN1             ; loop back
(BR12)BVADJ:    MOV #1,DOAR           ; move the delimiter into
                MOV #DOAR,R1          ; DPM memory area I so that
                MOV #DAREA,R0         ; it can be decoded
                JSR R5,MEMDPM
                MOV #6,AI             ; put in length value
                MOV DOLN,DATAO        ; for DECODE I MODULE
                MOV D1INIT,STATUS     ; initialize the hardware module
                CLR AICNT             ; initialize address counter
(BR13)          MOV DNOC,NOC          ; initialize NOC - this counter
                DEC NOC               ; will be used to compute current
                                      event #
(BR14)          JSR R,5DC0DE1         ; call DECODE I MODULE
                MOV R0,TDI            ; save as previous value
(BR15)JOIN4:    MOV #30,STATUS        ; prepare to read DPM memory area II
                MOV AICNT,AI          ; set up address pointer
                MOV DATAI,DI          ; beginning delimiter
                MOV DATAI,N           ; # of hits
                MOV DATAI,S           ; dmin
                MOV DATAI,D0          ; D0
                ADD #4,AICNT          ; adjust address counter
(BR16)JOIN5:    MOV TDI,TD2           ;
                JSR R5,DCODC1         ; read another delimiter value
                MOV R0,TDI            ; save the value
                SUB TDI,TD2
                MOV TD2,LS            ; LS<- | TD2 - TD1|
                DEC LS                ; save current value
(BR17)          CMP TDI,D1            ; has proper place been reached
(BR18)          DEC CMBV              ; equal - thus compute bright value
                BEC NOC               ; not equal - go back
                BR JOIN5
(BR19)CMBV:     LDCIF AC0,RLN         ; convert length to floating point
                LDCIF AC1,RLN         ; save length in AC1
                LDCIF AC2,N           ; convert # of hits to floating
(BR20)          SUBF AC0,AC2          ; AC0<-LN-N
                MULF AC0,AC1          ; AC0<-(LN-N)*LN
                LDCIF AC2,D0          ; convert Do to floating point
                ADDF AC0,AC2          ; AC0<- (LN-N)*LN+Do
(BR21)          LDCIF AC3,S           ; convert dmin to floating point
                SUBF AC2,AC3          ; AC2<- Do-dmin where dmin = S
(BR22)          DIVF AC2,AC0          ; AC2<- (Do-dmin)/(LN-N)*LN+Do)
(BR23)          TST LNGSW             ; test length switch
                BEQ BFX7              ; length not to be taken into account
(BR25)          LDCIF AC0,LS          ; convert LS to floating point
                SUBF AC0,AC1
                ABSF AC0              ; AC0 <-|LS-LN|
                MOVF AC0,AC4          ; AC4 = Δ = |LS-LN|
                DIVF AC0,AC1          ; AC0<-Δ/LN
                MOVF AC0,AC3          ; AC3 = Δ/LN
                MULF AC0,AC3          ;
                MULF AC0,AC3          ; AC0<-(Δ/LN)^3
(BR26)          CMPF AC4,AC1          ; compare Δ:LN
                CFCC                  ; copy condition codes
                BLOS BFX6
(BR28)          LDCIF AC1,#1          ; get a floating 1
                DIVF AC1,AC0          ; AC1<-1/(Δ/DN)^3
                BR JOIN6
(BR27)BFX6:     LDF AC1,ALPHA         ; get alpha value (α)
                MULF AC1,ALPHA
                MULF AC1,ALPHA        ; AC1 <-α^3
                MULF AC0,AC1          ; AC0<-(αΔ/LN)^3
                LDCIF AC1,#1          ; get floated 1
                SUBF AC1,AC0          ; AC1<-1 - (αΔ/LN)^3
                BR JOIN6              ; decision exit
(BR24)BFX7:     LDCIF AC1,#1          ; length is not to be considered
(BR29)JOIN6:    MULF AC1,AC2          ; AC1 = BV*L
JOIN7:
(BR30)          CMPF AC1,BVCO         ; compare to cutoff value
                CFCC                  ; copy condition code
                BLT JOIN8             ; do not insert
(BR31)          JSR R5,INSERT         ; insert the value
(BR32)JOIN8:    DEC BRCNT             ; request finished?
(BR33)          BLT .+2               ; no
                JMP JOIN4             ; loop back
(BR34)          MOV (SP)+,R4          ; restore R4
                MOV (SP)+,R3          ; restore stack pointer
                ADD RLN,R3            ; adjust to reflect current status
                MOV (SP)+,R2
                MOV (SP)+,R1
                MOV (SP)+,R0
                RTS R5                ; return
```

B-4
OUTPUT SUBROUTINE

```
;OUTPUT   This routine causes row 0 of the seed specified
;         in the input parameter to be generated.
```

-continued

B-4

OUTPUT SUBROUTINE

```
;               R0      points to seed header
;               R1      two word output block
(01) OUTPUT:    MOV     R0,-(SP)
                MOV     R1,-(SP)
                MOV     R2,-(SP)             ; save context
                MOV     R3,-(SP)
                MOV     R4,-(SP)
(02)            MOV     4(RO),R2             ; get physical length of seed
                MOV     #10,STATUS           ; preare to write to DPM area I
                MOV     #0,AI                ; initialize address register
                MOV     (R0)+,R3             ; pointer to seed goes to R3
                MOV     (R3)+,DATAO          ; output a word
                DEC     R2                   ;
                BNE     .-2                  ; loop until finished
(03)            MOV     #0,STATUS
                MOV     #0,AI                ; prepare IPRF
                MOV     HW,DATAO             ; TL ← HW
                MOV     #0,DATAO             ; BL ← 0
                MOV     #0,DATAO             ; IR ← 0
                MOV     HW,DATAO             ; HW ← HW
                MOV     (R0)+,DATAO          ; LINE# ← row # of seed
                MOV     (R0)+,DATAO          ; LN1 ← length of seed
                MOV     WOLN,DATAO           ; LN2 ← WOLN
(03.1)          TST     WOLN
                BEQ     #2
(03.2)          ADD     DELOP,STATUS
(04)            ADD     DPM+OMGO,STATUS      ; do hardware OUTPUT function
                BIT     BDONE,STATUS
                BEQ     .-1                  ; loop until function complete
(05)            CLR     STATUS
                MOV     #6,AI                ; prepare for output values
                MOV     DATAI,(R1)+          ; get OAR
                MOV     DATAI, (R1)+         ; OLN
(06)            MOV     (SP)+,R4
                MOV     (SP)+,R3
                MOV     (SP)+,R2             ; restore context
                MOV     (SP)+,R1
                MOV     (SP)+,R0
                RTS     R5                   ; return
```

B-5

MEMDPM (MAIN MEMORY TO MEMORY MOD) SUBROUTINE

```
; transfer from main memory to DPM (MEMORY MOD)
; parameters
;               R0      points to main memory save area
;               R1      points to two word area
;                       i) DPM memory area to which transfer is to be made
;                       ii) length of the transfer in words
;
(MD1)MEMDPM:    MOV     R0,-(SP)
                MOV     R1,-(SP)
                MOV     R2,-(SP)        ; save context
                MOV     R3,-(SP)
                MOV     R4,-(SP)
(MD2)           MOV     R0,R2           ; R2 contains from area
                MOV     (R1)+,R3        ; DPM - memory area
                MOV     (R1)+,R4        ; # of words to be transferred
                ROL     R3
                ROL     R3              ; adjust R3 for STATUS register
                ROL     R3
(MD3)           MOV     R3,STATUS       ; prepare for transfer
                MOV     #0,AI
(MD4)           MOV     (R2)+,DATAO     ; transfer a word
(MD5)           DEC     R4
(MD6)           BNE     .-2             ; loop until done
(MD7)           MOV     (SP)+,R4
                MOV     (SP)+,R3
                MOV     (SP)+,R2        ; restore context
                MOV     (SP)+,R1
                MOV     (SP+,R0
                RTS     R5              ; return
```

B-6

DPMMEM (MEM MOD TO MAIN MEMORY) SUBROUTINE

```
;Transfer from DPM MEMORY MOD to main memory.
;Parameters
;               R0      points to main memory save area
;               R1      points to two word area
;                       i) DPM memory area from which transfer is to be made
;                       ii) length of transfer in words
(DM1) DPMMEM:   MOV     R0,-(SP)
                MOV     R1,-(SP)
                MOV     R2,-(SP)        ; save context
                MOV     R3,-(SP)
```

-continued

B-6

DPMMEM (MEM MOD TO MAIN MEMORY) SUBROUTINE

```
            MOV   R4,-(SP)
(DM2)       MOV   R0,R2            ; R2 points to main memory area
            MOV   (R1)+,R3         ; R3 contains DPM memory area
            MOV   (R1)+,R4         ; R4 contains # of words to be
                                   transferred
            ROL   R3
            ROL   R3               ; adjust R3 for STATUS register
            ROL   R3
(DM3)       MOV   R3,STATUS        ; prepare for transfer
            MOV   #0,AI
(DM4)       MOV   DATAI,(R2)+      ; transfer a word
(DM5)       DEC   R4               ; decrement count of words
(DM6)       BNE   .-2              ; branch back until 0
(DM7)       MOV   (SP)+,R4
            MOV   (SP)+,R3
            MOV   (SP)+,R2         ; restore context
            MOV   (SP)+,R1
            MOV   (SP)+,R0
            RTS   R5
```

B-7

DECODE I SUBROUTINE

```
(D1)DCODE1:  MOV   R1,-(SP)
             MOV   R2,-(SP)             ; save context
             MOV   R3,-(SP)
             MOV   R4,-(SP)
(D2)         MOV   DPM+D1GO,STATUS
                                        ; call the DECODE I module
             BIT   BDONE,STATUS
             BEQ   .-1                  ; loop until finished
             CLR   STATUS
             MOV   #10,AI               ;
             MOV   DATAI,R0             ; read result into R0
(D3)JOIN1:   MOV   (SP)+, R4
  JOIN2:
             MOV   (SP)+,R3
             MOV   (SP)+,R2             ; restore context
             MOV   (SP)+,R1
             RTS   R5
```

INSERT SUBROUTINE

```
(IN1)INSERT:  MOV   R0,-(SP)
              MOV   R1,-(SP)
              MOV   R2,-(SP)       ; save context
              MOV   R3,-(SP)
              MOV   R4,-(SP)
(IN2)         MOV   PNBPTR,R3      ; R3 points to PNBOUT list
              MOV   PNBCNT,R4      ; R4 contains # of entries in list
              MOV   NOC,R2         ; R2 contains entry #
(IN3)JOIN1:   LDF   AC0,2(R3)      ; get the brightness value
(IN4)         CMPF  AC1,AC0        ; compare current value to
                                   list value
              CFCC                 ; copy condition codes
              BLOS  JOIN2          ; less - no exchange necessary
(IN5)         MOV   (R3),R1        ; save list event #
              MOV   R2,(R3)+       ; insert current
              MOV   R1,R2          ; old list becomes current
              LDF   AC2,AC0        ; save list value
              MOVF  AC1, (R3)+     ; insert current in list
              LDF   AC1,AC2        ; old list value becomes current
(IN6)JOIN2:   DEC   R4             ; are we finished
(IN7)         BLT   .+2            ; yes
              JMP   JOIN           ; loop back
(IN7.1)       MOV   R2,(R3)+       ; insert final
              MOVF  AC1,(R3)+      ; entry
              INC   PNBCNT         ; reflect another entry
(IN8)         MOV   (SP)+,R4
              MOV   (SP)+,R3
              MOV   (SP)+,R2       ; restore context
              MOV   (SP)+,R1
              MOV   (SP)+,R0
              RTS   R5             ; return
```

B-9

FORMATER PROGRAM

```
     FORMAT:  MOV   R0,-(SP)
              MOV   R1,-(SP)
(F1)          MOV   R2,-(SP)          ; save context
              MOV   R3,-(SP)
              MOV   R4,-(SP)
```

-continued

B-9
FORMATER PROGRAM

```
                 CLR     ENDFL           ; reset end flag
(F2)   JOIN10:   JSR     R5,PRINTR       ; output a carriage return
                 WORA    CRLFA           ; line feed asterisk *
(F3)             JSR     R5,GETC         ; get a character and store in R0
(F4)             CMP     R0,SDEL         ; sentence delimiter?
                 BEQ     JOIN20          ; yes
(F5)             CMP     RO,WDEL ; word
                         delimiter
                 BEQ     JOIN20          ; yes
(F6)             JSR     R5,COMMAND      ; try for a command
                 BR      JOIN30          ;
(F7)   JOIN20:   JSR     R5,REQUEST      ; process a request
(F8)   JOIN30:   TST     ENDFL           ; done?
                 BEQ     JOIN10          ; no
                 MOV     (SP)+,R4        ; yes
(F9)             MOV     (SP)+,R3        ; restore context
                 MOV     (SP)+,R2
                 MOV     (SP)+,R1
                 MOV     (SP)+,R0
                 RTS     R5
```

B-10
COMMAND, GET INTEGER
& GET FLOATING POINT
SUBROUTINE

```
       COMMAND:  MOV     R0,-(SP)
                 MOV     R1,-(SP)
(C1)             MOV     R2,-(SP)        ; save context
                 MOV     R3,-(SP)
                 MOV     R4,-(SP)
(C2)             CLR     ERRSW           ; clear the error switch
(C3)             CMPB    R0,E            ; is the character an E
                 BNE     .+2             ; no
                 JMP     C40             ; yes
(C4)             CMPB    R0,C            ; character a "C"
                 BEQ     C6              ; yes
(C5)             INC     ERRSW           ; otherwise flag as error
                 JMP     CJOIN7          ;
(C6)   C6:       JSR     R5,PRINTR       ; print out
                 .WORD   CNGMSG          ; "HANGE"
(C7)             JSR     R5,GETC         ; read another character
(C8)             CLR     FLTSW           ; clear the float switch
                 CLR     BVFLG           ; and the BVFLG
(C9)             CMPB    R0,A            ; was the character an "A"
                 BNE     C13             ; no
(C10)            JSR     R5,PRINTR       ; print out the string
                 .WORD   ALPHMSG         ; "LPHA"
(C11)            INC     FLTSW           ; set the float switch
(C12)            MOV     #ALPHA,R1       ; set pointer to ALPHA
                 JMP     CJOIN6          ;
(C13)  C13:      CMPB    R0,B            ; is character a "B"
                 BNE     C17             ; no
(C14)            JSR     R5,PRINTR       ; print out "VCO"
                 .WORD   BVCOMSG         ;
(C15)            INC     BVFLG           ; setBVFLG
(C16)            MOV     #BVCO,R1        ; set pointer to BVCO
                 JMP     CJOIN6          ;
(C17)  C17:      CMPB    R0,L            ; is character an "L"
                 BNE     C20             ; no
(C18)            JSR     R5,PRINTR       ; print out the message
                 .WORD   LNGMSG          ; "NGSW"
(C19)            MOV     #LNGSW,R1       ; set pointer to LNGSW
                 JMP     CJOIN6
(C20)  C20:      CMPB    R0,P            ; character a "P"
                 BEQ     C22             ; yes
(C21)            INC     ERRSW           ; no - set error
                 JMP     CJOIN6          ;
(C22)  C22:      JSR     R5,GETC         ; read another character
(C23)            CMPB    R0,C            ; is character a "C"
                 BNE     C26             ; no
(C24)            MOVB    O,R0            ; move letter O to R0
                 JSR     R5,PRNTC        ; go print the character
(C25)            MOV     #FPCO,R1        ; set pointer to PC0
                 INC     BVFLG           ; set for floating point
                 JMP     CJOIN6          ;
(C26)  C26:      CMPB    R0,W            ; is the character a "W"
                 BNE     C28             ; no
(C27)            MOV     #PW,R1          ; set pointer to PW
                 BR      CJOIN6          ;
(C28)  C28:      INC     ERRSW           ; set error switch
(C30)  CJOIN6:   TST     ERRSW           ; test the error switch
                 BEQ     C32             ; not set
                 JSR     R5,PRINTR       ; output a carriage return
(C31)            .WORD   CRLF            ; line feed
                 JSR     R5,PRINTR       ; output an error message
                 .WORD   ERRMSG          ;
                 JMP     CJOIN10
(C32)  C32:      JSR     R5,PRINTR       ; print out "TO"
```

-continued

B-10
COMMAND, GET INTEGER
& GET FLOATING POINT
SUBROUTINE

```
                        .WORD   TOMSG
(C33)                   TST     FLTSW           ; check for floating
                        BNE     C380            ; flag set
(C340)   C340:          JSR     R5,GETC         ; get a character
(C341)                  CMPB    R0,BLANK        ; is it blank
                        BEQ     C340            ; yes
(C342)                  CLR     R2              ; clear accumulator register
(C343)   C343:          CMPB    ZERO,R0         ; make sure we have
                        BGT     C35             ; a number i.e.
(C344)                  CMPB    NINE,R0         ; 0 ≦ RO≦ 9
                        BLT     C35
(C345)                  SUBB    ZERO,R0         ; get binary equivalent of #
(C346)                  MUL     TEN,R2          ; multiply old partial value
(C347)                  ADD     R0,R2           ; by 10 & add in new value
(C348)                  JSR     R5,GETC         ; read another character
                        BR      C343            ; branch back
(C35)    C35:           TST     BVFLG           ; are we dealing with BVCO
                        BNE     C37             ; yes
(C36)                   MOV     R2,(R1)         ; move in new value
                        JMP     CJOIN10         ;
         C37:           LDCIF   AC0,R2          ; convert R2 to floating
(C37)                   DIVF    AC0,F100        ; divide by 100
                        MOVF    AC0,(R1)        ; store the value
                        JMP     CJOIN10         ;
(C380)   C380:          JSR     R5,GETC         ; get a character
(C381)                  CMPB    R0,PERIOD       ; look for decimal point
                        BNE     C380
(C382)                  LDCIF   AC0,#0          ; AC0 = 0
                        LDCIF   AC1,TENTH       ; AC1 = 0.1
(C383)   C383:          CMPB    ZERO,R0         ; be sure value is
                        BGT     C39             ; between 0 and 9 i.e.
(C834)                  CMPB    NINE,R0         ; 0 ≦ RO ≦ 9
                        BLT     C39
(C385)                  SUBB    ZERO,R0         ; compute binary equivalent
(C386)                  LDCIF   AC2,R0          ; convert to floating
                        MULF    AC2,AC1         ; multiply by minus power
(C387)                  ADDF    AC0,AC2         ; of 10 and add to ACO
                        MULF    AC1,TENTH       ; multiply power of 10
(C388)                  JSR     R5,GETC         ; by .1 and read character
                        BR      C383
(C39)    C39:           MOVF    AC0,(R1)        ; store result
         CJOIN10:       BR      CJOIN11
         C40:           JSR     R5,PRINTR       ; print out "ND"
(C40)                   .WORD   ENDMSG
(C41)                   INC     ENDFL           ; set the end flag
         CJOIN11:       MOV     (SP)+,R4
                        MOV     (SP)+,R3
(C42)                   MOV     (SP)+,R2
                        MOV     (SP)+,R1
                        MOV     (SP)+,R0
                        RTS     R5
```

B-11
REQUEST SUBROUTINE

```
         REQUEST:       MOV     R0,-(SP)
(R1)                    MOV     R1,-(SP)
                        MOV     R2,-(SP)
                        MOV     R3,-(SP)
                        MOV     R4,-(SP)
(R2)                    MOV     #PSTRING,R4     ; request inserted here
                        CLR     EXIT            ; clear exit flag
(R3)                    CMPB    R0,SDEL         ;
                        BNE     RQ4
                        MOV     R0,(R4)+        ; move in the sentence delimiter
(R11)
                        MOV     WDEL,(R4)+      ; move in word delimiter
(R12)                   JSR     R5,GETC         ; get a character
                        CMPB    R0,WDEL         ;
(R13)
                        BNE     .+2
(R14)                   JSR     R5,GETC         ; get next character
         RJOIN4:        CMPB    R0,WDEL         ; is it a word delimiter
(R15)
                        BEQ     RQ20            ; yes
(R16)                   CMPB    ; is it a sentence
                        R0,SDEL delimiter
                        BEQ     RQ18
(R17)                   MOVB    CVRTBL(R0),R2   ; GET value from table
                        MOV     R2, (R4)+       ; put it in string
                        JSR     R5,GETC         ; read a character
                        JMP     RJOIN5          ;
(R18)    RQ18:          MOV     WDEL,(R4)+      ; move in word delimiter
                        MOV     SDEL,(R4)+      ; and sentence delimiter
(R19)                   INC     EXIT            ; set exit
                        JMP     RJOIN5
(R20)    RQ20:          MOV     WDEL, (R4)+     ; move in word delimiter
```

-continued

B-11
REQUEST SUBROUTINE

```
(R21)              JSR    R5,GETC          ; read a character
(R22)              CMPB   R0,SDEL          ; sentence delimiter
                   BNE    RJOIN6           ; no
(R23)              MOV.   ; yes, move it in
                   SDEL(R-
                   4)+
(R24)              INC    EXIT             ; set exit
        RJOIN5:
        RJOIN6:    TST    EXIT             ; done
(R25)              BEQ    RJOIN4           ; no
                   JMP    RJOIN8
        ; come here to process word request i.e.
        ; a layer 0 request
        ;
(R4)    RQ4:       MOV    WDEL,(R4)+
(R5)    RJOIN1:    JSR    R5,GETC          ; read a character
                   CMPB   R0,WDEL          ; is it a word delimiter
(R6)
                   BEQ    RQ8
                   MOVB   CVRTBL(R0),R2    ; get the value
(R7)               MOV    R2 ,(R4)+        ; move it to R4 list
                   JMP    RJOIN2
(R8)    RQ8:       MOV    WDEL,(R4)+       ; move in a word delimiter
(R9)               INC    EXIT             ; set EXIT
        RJOIN2:    TEST   EXIT             ;
(R10)
                   BEQ    RJOIN1           ;
        ; request is obtained
        ; now process the request
(R26)   RJOIN8:    MOV    #PSTRING,R4      ; reset R4
(R27)              JSR    R5,PARSER        ; call the parser
(R28)              JSR    R5,PROCOUT       ; process the results
        ;
        ;
                   MOV    (SP)+,R4
(R29)              MOV    (SP)+,R3
                   MOV    (SP)+,R2
                   MOV    (SP)+,R1
                   MOV    (SP)+,R0
                   RTS    R5
```

B-12
PROCOUT SUBROUTINE

```
;
; PARSER returns with R0 pointing to a two word area
; i) points to list PNBOUT
; ii) # of entries on list
;
        PROCOUT:   MOV    R0,-(SP)
                   MOV    R1,-(SP)
(PO1)              MOV    R2,-(SP)          ; save context
                   MOV    R3,-(SP)
                   MOV    R4,-(SP)
(PO2)              TST    2 (R0)            ; anything in list
                   BNE    PO4               ; yes
                   JSR    R5,PRINTR         ; tell requestor nothing
(PO3)              .WORD  NULLMSG           ; was found
                   JMP    POJOIN5           ;
        PO4:       MOV    2(R0),R4          ; R4 ← # of entries in list
                   MOV    #G1TBL,R2         ; R2 ← address of G1 table
                   MOV    (R0),R3           ; R3 ← pointer to PNBOUT
                   CLR    EXIT              ; clear the exit flag
(PO4)
        PO45:      MOV    (R3)+,(R2)+       ; move entry # into G1
                   CMPF   AC0,(R3)+         ; skip bright value in effect
                   CLR    (R2)+             ; clear two entries
                   CLR    (R2)+             ; in table G1
                   DEC    R4                ; decrease R4
                   BNE    PO45              ; branch back while not 0
                   MOV    #G1TBL,R2         ; reset R2 to beginning table
(PO5)              MOV    2(R0),R3          ; R3 = length of table
                   MOV    LPTR,R4           ; R4 points to LXET
                   JSR    R5,SETUP          ; fill out table G1
                   MOV    #G1TBL,G1ADR      ; R1 points to beginning of G1
        PO6:       MOV    #G2TBL,R2         ; R2 points to beginning of G2
                                            table
                   MOV    G1ADR,R1
(PO6)              MOV    #1,R3             ; R3 contains length of G2TBL
                   MOV    (R1)+,R2          ; move entry #
                   MOV    (R1)+,2(R2)       ; move ending delimiter
                   MOV    (R1)+,4(R2)       ; move in length
(PO6)              MOV    R1,G1ADR          ; save index into G1
                   MOVB   4(R2),5(R2)       ; make lengths the same
)PO7)              JSR    R5,GENERATE       ; process the entry
                   TST    L1SW              ; are we on layer 1
(PO8)
                   BEQ    POJOIN2           ; no
                   MOV    WOLN,R3           ; R3 = length of OLIST
```

-continued

B-12
PROCOUT SUBROUTINE

```
                  MOV    #OLIST,R4        ; R4 points to begining of list
         PO95:    MOVB   1 (R4),R5        ; get entry #
(PO9)             MOV    R5,(R2)+         ; move to G2 table
                  CLR    (R2)+            ; clear
                  CLR    (R2)+            ;
                  TST    (R4)+            ; point to next entry
                  DEC    R3               ;
                  BNE    PO95             ;
                  MOV    #G2TBL,R2        ; initialize for setup
(PO10)            MOV    WOLN,R3          ;
                  MOV    LPTR,R4          ;
                  JSR    R5,SETUP         ;
(PO11)            JSR    R5,GENERATE      ;
         POJOIN2:
                  MOVB   4(R2),R1         ; get length of this entry
                  MOV    #OLIST,R4        ; beginning of OLIST
                  ADDB   5 (R2),R4        ; index into list
         PO124:   TST    -(R4)            ; point to entry to be processed
(PO12)            MOVB   1(R4),R5         ; get entry #
                  MOVB   CVTBL2(R5),R0    ; convert to ASCII
                  JSR    R6,PRNTC         ; print the character
                  DEC    R1               ; loop back if more
                  BNE    PO124            ;
                  DEC    R3               ; any more entries
                  BEQ    PO13             ; no
                  MOVB   BLANK,R0         ; print out a blank
                  JSR    R5,PRNTC         ;
                  ADD    #6,R2            ; point to next entry
                  BR     POJOIN2          ;
                  DEC    PNBCNT           ; any more
(PO13)
                  BNE    PO15             ; yes
                  INC    EXIT             ; no, set exit
)PO14)
                  JMP    POJOIN4          ;
         PO15:    JSR    R5,PRINTR        ; see if another is
                  .WORD  MORMSG           ; to be printed
(PO15)            JSR    R5,GETC          ; check for a
                  CMPB   R0,Y             ; Y
                  BEQ    POJOIN4
(PO16)            INC    EXIT             ; no more wanted - set exit
         POJOIN4: TST    EXIT
)PO17)
                  BNE    .+2
                  JMP    PO6              ;
         POJOIN5: MOV    (SP)+,R4
                  MOV    (SP)+,R3
(PO18)            MOV    (SP)+,R2
                  MOV    (SP)+,R1
                  MOV    (SP)+,R0
                  RTS    R5
```

B-13
SETUP SUBROUTINE

```
         SETUP:   MOV    R0,-(SP)
                  MOV    R1,-(SP)
                  MOV    R2,-(SP)         ; save context
(S1)              MOV    R3,-(SP)
                  MOV    R4,-(SP)
                  MOV    (R4)+,R0         ; pointer to delimiter
                                          seed header
                  MOV    6(R0),DNOC       ; # of ones in line 0
(S2)
                  MOV    #DOAR,R1         ;
                  JSR    R5,OUTPUT        ; OUTPUT line 0
                  CMP    #1,DOAR          ; in memory area I
(S3)
                  BEQ    SJOIN1
                  MOV    #DAREA,R0        ; transfer from
                  JSR    R5,DPMMEM        ; DPM to memory
(S4)
                  MOV    #1,DOAR          ; prepare to move to area I
                  JSR    R5,MEMDPM        ;
         SJOIN1:  MOV    DINIT,STATUS     ; initialize DECODE I MODULE
(S5)              MOV    #6,AI            ; address LN1 of IPRF
                  MOV    DOLN,DATAO       ; move in LN1
                  JSR    R5,DCODE1        ; read a value
                  MOV    R0,TDI           ; save it
                  MOV    R3,WOLN          ; save length of G1
(S6)
                  CLR    SUM              ; use to accumulate length
         SJOIN2:  MOV    4(SP),R2         ; R2 <- beginning of G1TBL
(S7)              MOV    2(SP),R3         ; R <- # of elements
                  CLR    R1               ;
         SJOIN3:  TST    2(R2)            ; have we already processed
(S8)
                  BNE    SJOIN4           ; this - yes
(S9)              CMP    (R2),R1          ; look for maximum
```

-continued

B-13
SETUP SUBROUTINE

```
                        BLOS   SJOIN4         ; not max
                        MOV    R2,R4          ; save address of max
(S10)
                        MOV
(R2),R1   ; save value
          of max
(S11)     SJOIN4:       ADD    #6,R2          ; point to next entry
                        DEC    R3             ; more to process
(S12)
                        BNE    SJOIN3
                        MOV    DNOC,R3        ; compute the number of
                        SUB    R1,R3          ; reads necessary to get
(S13)
                        MOV    R1,DNOC        ; begin-end delimiters
          S135:         MOV    TD1,TD2        ; save old delimiter value
                        JSR    R5,DCODE1      ; read
(S14)                   MOV    R0,TD1         ; save
                        DEC    R3             ; loop for R3 reads
                        BNE    S135           ;
                        MOV    TD2,2(R4)      ; move in ending delimiter
                        SUB    TD1,TD2        ; compute length
                        DEC    TD2
                        MOVB   TD2,4(R4)      ; save length
(S15)
                        ADD    TD2,SUM        ; accumulate length
                        MOVB   SUM,5(R4)      ; save it
                        DEC    WOLN           ; decrement # of entries in
                                              table
(S16)                   BEQ    .+2            ; done
                        JMP    SJOIN2
                        MOV    (SP)+,R4
                        MOV    (SP)+,R3
(S17)                   MOV    (SP)+,R2       ; restore context
                        MOV    (SP)+,R1
                        MOV    (SP)+,R0
                        RTS    R5
```

B-14
GENERATE SUBROUTINE

```
          GENERATE:     MOV    R0,-(SP)
                        MOV    R1,-(SP)
(G1)                    MOV    R2,-(SP)       ; save context
                        MOV    R3,-(SP)
                        MOV    R4,-(SP)
                        CLR    R4             ;
(G2)
                        MOV    #WAREA,R1      ; WAREA will hold reference
          G202:         MOVB   4(R2),R0       ; line, get length
                        MOV    2(R2),R5       ; get ending delimiter
                        ADD    #6,R2          ; point to next entry
                        BIS    #200,R5        ; for absolute encoding
          G204:         DEC    R5             ; compute occurrence value
                                              (O.C.)
(G3)
                        MOV    R5,(R1)+       ; move into WAREA
                        INC    R4             ; i.e. generate the reference
                                              line
                        DEC    R0             ; is this entry complete
                        BNE    G204           ;
                        DEC    R3             ; decrement # of entries in
                                              G1TBL/G2TBL
                        BNE    G202           ; not done
                        MOV    R4,WOLN        ; length of reference line
(G4)                    MOV    R4,R0          ; prepare for SORT
                        MOV    #WAREA,R1      ;
                        JSR    R5,SORT        ; sort reference line
                        MOV    #2,WOAR        ;
(G5)
                        JSR    R5,MEMDPM      ; move into DPM memory area I
                        CLR    ENUMB          ; clear the event #
                        CLR    ESCAPE
                        MOV    #OLIST,R2      ;
(G6)
                        MOV    SOLN,R3        ; move length of seed
                                              (reference line) into R3
                        MOV    (SP),R4        ; R4 points to LXET
                        TST    (R4)+          ; points past delimiter
(G7)      GJOIN1:       MOV    (R4)+,R0       ; R0 ← seed header address
                        MOV    #WOAR,R1
(G8)                    ADD    #400,ENUMB     ; get current event #
(G9)                    JSR    R5,OUTPUT      ;
                        TST    2(R1)          ; get anything
(G10)
                        BEQ    GJOIN5         ; no
                        CMP    #1,(R1)        ; are results in memory area I
(G11)
                        BEQ    GJOIN2         ; yes
                        MOV    #WAREA,R0
```

-continued

B-14
GENERATE SUBROUTINE

```
                 JSR   R5,DPMMEM        ;
(G12)
                 MOV   #1,(R1)          ;
                 JSR   R5,MEMDPM        ;
        GJOIN2:  MOV   D1INIT,STATUS    ; initialize for DECODE I MOD.
                 MOV   #6,AI            ; move in length
(G13)
                 MOV   2(R1),DATAO      ; to IPRF LN1
(G14)   GJOIN3:  JSR   R5,DCODE1        ;
                 TST   R0               ; have we reached EOD
                 BMI   GJOIN5           ; yes
(G16)            ADD   ENUMB,R0         ; put entry #in left byte
(G17)            MOV   R0,(R2)+         ; put in OLIST
(G18)            DEC   R3               ; decrement #of hits needed
                 BNE   .+2              ; no
                 INC   ESCAPE           ; yes - set escape
(G19)
                 JMP   GJOIN3
        GJOIN5:  TST   ESCAPE           ; check the escape flag
(G20)            BNE   .+2              ; done
                 JMP   GJOIN1           ; not done, loop back
                 MOV   OLIST,R1         ; sort OLIST in
(G21)            MOV   WOLN,R0          ; descending order
                 JSR   R5,SORT
                 MOV   (SP)+,R4
                 MOV   (SP)+,R3
(G22)            MOV   (SP)+,R2         ; restore context
                 MOV   (SO)+,R1
                 MOV   (SP)+,R0
                 RTS   R5
```

B-15
SORT SUBROUTINE

```
         SORT:   MOV   R0,-(SP)
                 MOV   R1,-(SP)
                 MOV   R2,-(SP)
(SRT1)
                 MOV   R3,-(SP)
                 MOV   R4,-(SP)
(SRT2)
                 DEC   R0              ; drop the count by one
(SRT3)           MOV   R1,R2           ; save list begin
(SRT4)   SRTJ1:  CMPB  (R1),2(R1)      ; A1:A1+1
                 BHOS  SRTJ4           ; 7/
(SRT5)           MOV   R1,R3           ; R3 has current list pointer
         SRTJ2:  CMPB  (R3),2(R3)      ; Aj:Aj+1
(SRT6)
                 BHOS  SRTJ3           ; 7/
                 MOV   (R3),R4         ;
(SRT7)
                 MOV   2(R3),(R3)      ; exchange entry
                 MOV   R4,2(R3)        ;
(SRT8)   SRTJ3:  DEC   R3              ; back up list
                 CMP   R3,R2           ; are we at beginning
(SRT9)
                 BHOS  SRTJ2           ; no
(SRT10)  SRTJ4:  INC   R1              ; point to next entry
                 DEC   R0              ; are we done
(SRT11)          BEQ   .+2             ; yes
                 JMP   SRTJ1           ; no - loop back
                 MOV   (SP)+,R4
                 MOV   (SP)+,R3
(SRT12)          MOV   (SP)+,R2        ; restore context
                 MOV   (SP)+,R1
                 MOV   (SP)+,R0
                 RTS   R5
```

B-16
PRINTR (PRINTER) SUBROUTINE

```
          PRINTR:  MOV   R0,-(SP)
(PRNTR1)           MOV   R1,-(SP)
                   MOV   R2,-(SP)
(PRNTR2)           MOV   (R5)+,R1     ; address of output/adjust
                                      return
(PRNTR3)           MOV   (R1)+,R2     ; length of output
(PRNTR4)  PRNTJ1:  MOVB  (R1)+,R0     ;
                   JSR   R5,PRNTC     ; output a character
(PRNTR5)           DEC   R2           ;
                   BNE   PRNTJ1       ;
                   MOV   (SP)+,R2
(PRNTR6)           MOV   (SP)+,R1
                   MOV   (SP)+,R0
```

-continued

B-16
PRINTR (PRINTER) SUBROUTINE

```
        RTS     R5
```

B-17
PRNTC (PRINT A CHARACTER) SUBROUTINE

```
; routine to print a character
;
PRNTC:  TSTB    TPS         ; check status
        BPL     .-4         ; not ready
        MOVB    R0,TPB      ; output the character
        RTS     R5
```

B-18
GETC (GET A CHARACTER) SUBROUTINE

```
; routine to get a character
;
GETC:   INC     TKS         ; ready the keyboard
        TSTB    TKS         ; wait for the character
        BPL     .-4         ;
        TSTB    TPS         ; get ready to ECHO
        BPL     .-4
        MOVB    TKB,TPB     ; echo the character
        MOVB    TKP,R0      ; put it in R0
        BICB    #200,R0     ; clear the eighth bit
        RTS     R5          ; return
```

B-19
FORMATER - DATA STRUCTURES

```
ENDFL:    .WORD   0
ERRSW:    .WORD   0
FLTSW:    .WORD   0
BVFLG:    .WORD   0
EXIT:     .WORD   0
G1ADR:    .WORD   0
SUM:      .WORD   0
ENUMB:    .WORD   0
PSTRING:  .BLK    100
OLIST:    .BLK    100
G1TBL:    .BLK    22
G2TBL:    .BLK    22
CVRTBL:   .BLK    77
CVTBL2:   .BLK    77
A:        .ASCII  /A/
B:        .ASCII  /B/
C:        .ASCII  /C/
E:        .ASCII  /E/
```

-continued

B-19
FORMATER - DATA STRUCTURES

```
L:        .ASCII  /L/
P:        .ASCII  /P/
W:        .ASCII  /W/
Y:        .ASCII  /Y/
BLANK:/   / /
.ASCII
PERIOD:   .ASCII  /./
ZERO:     .ASCII  /0/
NINE:     .ASCII  /9/
          .EVEN
CRLFA:    .WORD   4
          .ASCII  / (CR) (LF)*/
          .EVEN
CNGMSG:   .WORD   5
          .ASCII  / HANGE /
          .EVEN
ENDMSG:   .WORD   2
          .ASCII  / ND /
          .EVEN
ALPHMSG:  .WORD   4
          .ASCII  / LPHA /
          .EVEN
BVCOMSG:  .WORD   3
          .ASCII  / VCO /
          .EVEN
LNGMSG:   .WORD   4
          .ASCII  / NGSW /
          .EVEN
CRLF:     .WORD   2
          .ASCII  / (CR) (LF)/
          .EVEN
ERRMSG:   .WORD   17
          .ASCII  / ERROR IN FORMAT /
          .EVEN
TOMSG:    .WORD   4
          .ASCII  / TO /
          .EVEN
NULLMSG:  .WORD   15
          .ASCII  / NO HITS FOUND /
          .EVEN
MORMSG:   .WORD   25
          .ASCII  / PRINT ANOTHER ENTRY?
          .EVEN
TEN:      .WORD   12
F100:     .FLOAT  100
TENTH:    .FLOAT  0.1
FPCO:     .FLOAT  0
FRNO:     .FLOAT  0.5
```

B-20
DATA STRUCTURES

```
;   Data Structures
;
;
    L1SW:     0             ; layer 1 decision switch
    EXIT:     0             ; loop exit decision switch
    ESCAPE:   0             ; module escape decision switch
    BRSW:     0             ; BRIGHTNESS module decision switch
    WDEL:     ASCII / b /   ; word delimiter -blank
    SDEL:     ASCII / # /   ; sentence delimiter - '#'
    RLNO:     0             ; request length layer 0
    RLN1:     0             ; request length layer 1
    ESTAK;    .BLK 256      ; 256 word block for event stack
;
;   layer 0 header
;
    LOPTR:    LOET          ; pointer to layer 0 event table
    HWO:      0             ; hologram width layer 0
    NEO:      0             ; number of events layer 0
    TIKO:     0             ; highest tick number in layer
;   layer 1 header
;
    L1PTR:    L1ET          ; pointer to layer 1 event table
    HW1:      0             ; hologram width layer 1
    NE1:      0             ; number of events layer 1
    TIK1:     0
    PNBPTR:   PNBOUT        ; pointer to find output result from
                            ; PIPING and BRIGHTNESS
    PNBCNT:   0             ; number of entries in the table
    PNBOUT:   BLK 256       ; beginning pointers to output list
```

-continued

B-20
DATA STRUCTURES

```
F1:       ↑F1          ; generate a floating point constant
                       ; whose value is 1
HW:       0
RLN:      0
LPTR:     0
          .WORD 0      ; space for null header
L0ET:     .BLK 256     ; layer 0 event table
          .WORD 0      ; space for null header
L1ET:     .BLK 256     ; layer 1 event table
DNOC:     0            ; # of 1's in current delimiter row 0
NOC:      0            ; save area for DNOC
DOAR:     0            ; delimiter transfer area
DOLN:     0            ;
DAREA:    .BLK 256     ;
WOAR:     0            ; current seed transfer area
WOLN:     0            ;
WAREA:    .BLK 256     ;
A2AD:     0            ; temporary address pointer AM-II
M3AD:     0            ; temporary address pointer DPM memory
                       area III
BRCNT:    0            ;
OV:       0            ; center pipe value
NH:       0            ; number of hits
DDFLG:    0            ; delimiter flag set for DECODE
TD2:      0            ; delimiter
TDI:      0            ; save areas
DI:       0            ; save areas for values read
N:        0            ; from the BRIGHTNESS module
S:        0            ;
D0:       0            ;
AICNT:    0            ; address monitor
```

Global Structures

It is assumed that the following global definitions have been made:

1. Registers have been defined;
2. Status bits for DPM STATUS registers defined;
3. DPM registers defined.

In addition some values are assumed globally defined:

| | |
|---|---|
| PW | - the pipe width - defined before PARSER is called |
| PCO | - the pipe cutoff value |
| BVCO | - the brightness cutoff value |
| ALPHA | - used in length calculation |
| LNGSW | - set if length is to be taken into consideration |

The seed header has 4 values:

1. Pointer to the seed;
2. Row number of seed;
3. Length of seed;
4. # of 1's in row 0 of this event.

B-21
CONSTANTS DEFINED BY FORMATER PROGRAM

| | | |
|---|---|---|
| FIRST | = | $400_8$ |
| LAST | = | $200_8$ |
| DPM | = | $40_8$ |
| PBM | = | $100_8$ |
| DELOP | = | $1000_8$ |
| D1INIT | = | $2000_8$ |

-continued

B-21
CONSTANTS DEFINED BY FORMATER PROGRAM

| | | |
|---|---|---|
| SMGO | = | $01_8$ |
| CMGO | = | $02_8$ |
| OMGO | = | $03_8$ |
| PIPGO | = | $04_8$ |
| BRGO | = | $05_8$ |
| DIGO | = | $06_8$ |

B-22

CODE FOR THE DATA BASE PROGRAM

```
; DATABAS              - is the initial program called when working
;                      with the system in any capacity.
;
; (DB1.0)              STORE CONTEXT - Some type of operating system
;                      is assumed, although one is not necessary.
;                      For this reason the registers R0-R5 are
;                      saved.
   DATABAS:            MOV R0,-(SP)           ;
                       MOV R1,-(SP)           ; store context by saving
                                              ; R0-R5 registers
                       MOV R3,-(SP)           ;
                       MOV R4,-(SP)           ;
                       MOV R5,-(SP)
(DB2.0)                CLR ENDFLAG            ; This command initializes
                                              ; the switch ENDFLAG. This
                                              ; switch will be set at DB9.0
                                              ; in response to an "END"
                                              ; command and will be
                                              ; tested at DB11.0 to
                                              ; determine whether to exit
                                              ; the DATABAS MODULE.
   JOIN1:              JSR R5,PRINTR          ;
(DB3.0)                .WORD PLUSMSG          ; the    stands for a blank
                                              ; symbol, i.e., a space.
```

B-22-continued

CODE FOR THE DATA BASE PROGRAM

```
                                          ; The system has to have
                                          ; some way of telling the
                                          ; user it is ready to accept
                                          ; a command. It does this by
                                          ; printing the "+" symbol
                                          ; at the beginning of a
                                          ; line and then spacing
                                          ; the head one place to
                                          ; the right e.g.,

                                          ; + |__|<- print head is now here,
                                          ;    ^
                                          ;    |_This space was skipped,
(DB4.0)         JSR R5,GETC               ; i.e., a blank was printed.
                                          ; This box and associated
                                          ; code cause transfer to a
                                          ; subroutine which reads a
                                          ; character from the key-
                                          ; board and returns the
                                          ; character in register R0.
;
;(DB5.0)                                  ; This box is spread out
                                          ; over the code. It checks
                                          ; the code in R0 for an
                                          ; I,A,R,E. If R0 is equal
                                          ; to any of these characters
                                          ; control goes to the appro-
                                          ; priate box; otherwise
                                          ; control goes to DB10.0 and
                                          ; an error message is printed.
                                          ; Each of the boxes DB7.0,
                                          ; DB8.0, and DB9.0 checks
                                          ; for the character associ-
                                          ; ated with their box, i.e.,
                                          ; A, R, and E. If the
                                          ; associated character is
                                          ; found, control is trans-
                                          ; ferred to the code for
                                          ; the box; otherwise,
                                          ; control goes to the next
                                          ; box.
                CMPB R0,I                 ; checks if the character
                                          ; is an "I"
                BEQ .+2                   ; if yes then execute
                                          ; box 6.0
                JMP TLBM                  ; otherwise check box DB7.0
                                          ; for an "A"
                                          ;
; LAYER INITIALIZATION BLOCK - the code in this block is
; executed in response to the user's typing an "I". The
; system is initiated to accept data. This block must be
; the first to be performed upon start-up.
;
(DB6.1)         JSR R5,PRINTR             ; The user has typed an "I".
                .WORD INITMSG             ; The system responds by
                MOV #2,R1                 ; printing the rest of the
                NEG R1                    ; word "INITIALIZE". This
                                          ; is done simply for its
                                          ; "human engineering" benefit.
(DB6.2)                                   ; This is a byte machine but
                                          ; the entries in LOET, the
                                          ; layer 0 event tables, are
                                          ; in words. Therefore each
                                          ; entry in CVRTBL is -2 so
                                          ; that when added to the base
                                          ; address LOET the address
                                          ; will be LOET - (one word).
                MOV #2,R1                 ; These two instructions put
                NEG R1                    ; a -2 into register R1;
                MOV #177,R2               ; R2 contains the length of
                                          ; the table 177_8=128_10.
                                          ; There are 128 possible 7
                                          ; bit ASCII characters.
                MOV #CVRTBL,R3            ; This instruction puts the
                                          ; base address of CVRTBL
                                          ; into register R3.
                MOVB R1, (R3)+            ; CVRTBL is a byte table,
                                          ; i.e. all entries are one
                                          ; byte long. The instruction
                                          ; moves a -2 into the address
                                          ; pointed to by R3. Then R3
                                          ; is incremented by one.
                DEC R2                    ; Decrements the length by
                                          ; one - when R2 reached 0
                                          ; each slot in the table
                                          ; will have a value of -2;
                BNE .-2                   ; as long as R2 is not 0,
                                          ; loop back to the MOVB
                                          ; instruction.
                                          ;
; (DB6.3)                                 ; The code here is very
                                          ; similar to the above, only
```

B-22-continued

CODE FOR THE DATA BASE PROGRAM

```
                                    ; the base address and R1
                                    ; contents change.
          MOVB ASTERISK,R1          ; Places the ASCII code for
                                    ; "*" into R1;
          MOV #177,R2               ; Length of table
                                    ; (1778=12810) to R2;
          MOV #CVTBL2,R3            ; Base address of the table;
          MOVB R1, (R3)+            ; Move an asterisk into the
                                    ; slot;
          DEC R2                    ; is the table full
          BNE .-2                   ; no - loop back until
                                    ; table is full.
(DB6.4)                             ; A portion of core has been
                                    ; set aside for seed header.
                                    ; The base address of that
                                    ; portion is SEEDHD.
          MOV #SEEDHD,NXTSH         ; Initialize NXTSH - the
                                    ; pointer to the next avail-
                                    ; able address for a seed
                                    ; header to the base address.
(DB6.5)                             ; The layer header for layer
                                    ; 0 must be initialized. The
                                    ; header is four words long.
                                    ; It will be initialized
                                    ; assuming that the delimiter
                                    ; event exists and has clock
                                    ; tick 0. (This will be done
                                    ; in DB6.6).
          MOV LOPTR,R1              ; This moves the base
                                    ; address of the layer 0
                                    ; header into register R1.
          MOV #LOET,(R1)+           ; The address of the layer 0
                                    ; event table is moved into
                                    ; the header.
          MOV #1, (R1)+             ; the iso-entropicgram
                                    ; width is set to one.
          MOV #1, (R1)+             ; The number of events in
                                    ; this layer is set to one,
                                    ; i.e. the delimiter event
                                    ; which will be created in
                                    ; DB6.6.
          CLR (R1)+                 ; TIKO is set to 0, i.e.,
                                    ; the highest clock tick in
                                    ; this layer.
(DB6.6)                             ; This creates a delimiter
                                    ; seed header and a seed
                                    ; with the one clock value
                                    ; (0). The seed is stored
                                    ; in the first word of
                                    ; available space (AS).
          MOV NXTSH,LOET            ; This moves the pointer to
                                    ; the next seed header
                                    ; address to the first slot
                                    ; in the layer 0 event table.
          MOV NXTSH,R1              ; The same address is saved
                                    ; in R1.
          ADD #10,NXTSH             ; 108=810 is added to the
                                    ; address contained in
                                    ; NXTSH. The result is
                                    ; stored back in NXTSH.
                                    ; This is so, since each
                                    ; sead header is 4 words,
                                    ; i.e. 8 bytes long.
          MOV #AS,(R1)+             ; The first word contains a
                                    ; pointer to the seed. Hence,
                                    ; the address of available
                                    ; space (#AS) is placed in
                                    ; the first word.
          CLR (R1)+                 ; This says that line 0 of
                                    ; the iso-entropicgram is
                                    ; the seed.
          MOV #1, (R1)+             ; The seed length is one.
          MOV #1, (R1)              ; The number of 1's in line
                                    ; 0 is one,
          CLR AS                    ; The one value in the seed
                                    ; is set to 0.
(DB6.7)                             ; The same code is used
                                    ; here to initialize the
                                    ; layer 1 header as was
                                    ; used to initialize the
                                    ; layer 0 header. Only the
                                    ; pointers have been changed.
          MOV L1PTR,R1              ; R1 points to layer 1 header.
          MOV #L1ET, (R1)+          ; Word 1 contains pointer to
                                    ; L1Et.
          MOV #1, (R1)+             ; iso-entropicgram width=1.
          MOV #1, (R1)+             ; Number of elements is 1.
          CLR (R1)                  ; High clock value on layer
                                    ; 1 is 0.
(DB6.8)                             ; A similar situation to
                                    ; block DB6.6.
          MOV NXTSH, L1ET           ; Address of seed header
                                    ; gets entered into layer
```

B-22-continued

CODE FOR THE DATA BASE PROGRAM

```
                MOV NXTSH,R1         ; event table.
                ADD #10,NXTSH        ; Save the address in R1.
                                     ; Update NXTSH to next
                                     ; header address.
                MOV #AS+2,(R1)+      ; Put the address of the
                                     ; second word in available
                                     ; space in pointer to seed.
                CLR (R1)+            ; Seed is line 0.
                MOV #1, (R1)+        ; Length of seed.
                MOV #1, (R1)+        ; # of 1's in line 0.
                CLR AS+2             ; Clear out the clock value.
(DB6.9)                              ; Again the current "next-
                                     ; seed-header" address must be
                                     ; obtained and NXTSH must
                                     ; be updated.
                MOV NXTSH,R1         ; The seed header consists of
                                     ; all 0's.
                ADD #10,NXTSH        ;
                MOV R1,L0ET-2        ; Move the address of the
                                     ; null seed seed header into
                                     ; the base address minus one
                                     ; word (2 bytes) of the layer
                                     ; 0 event table.
                CLR (R1)+            ;
                CLR (R1)+            ; Clear out the four words.
                CLR (R1)+            ;
                CLR (R1)+            ;
(DB6.10)                             ; At the beginning, free
                                     ; space and available space
                                     ; coincide. Free space will
                                     ; start at the third word
                MOV #AS+4,FSP        ; of available space. The
                                     ; first two words were used
                                     ; to store delimiter clock
                                     ; values.
                CLR @FSP             ; The first word of the
                                     ; list is set to 0 indi-
                                     ; cating the start of
                                     ; available space.
(DB6.11)                             ; There are certain global
                                     ; constants that need to be
                                     ; set for the PIPE program.
                                     ; These are set here.
                MOV #1,LNGSW         ; Initialize the length
                                     ; switch.
                MOV #1,ESCAPE        ; Set the escape flag. This
                                     ; is done since piping is only
                                     ; done at layer 0 during
                                     ; the building of the
                                     ; data base.
                CLR PW               ; Set the pipe width to 0.
                LDCIF AC0,#144       ; Set the brightness
                                     ; cutoff to 100%.
                STF AC0,BVCO         ;
(DB6.12)        MOV #ESTAK,R3        ; Initialize R3 to point to
                JMP JOIN 2           ; the top of ESTAK and
                                     ; then transfer control to
                                     ; DB11.0.
;
; END LAYER INITIALIZATION BLOCK
; (DB7.0)
; The next block of code to be performed is the code to
; perform the layer building in the data base.
;
(DB5.0) TLBM:   CMPB R0,A            ; This is a part of the
                BEQ .+2              ; DB5.0 block. A check is
                JMP TREQ             ; made for an "A" and if
                                     ; one is found, control goes
                                     ; to the layer building
                                     ; block; otherwise a test
                                     ; is made for a request.
;
; LAYER BUILDING BLOCK (DB7.0) begins here
;
(DB7.1) LBM:    JSR R5,PRINTR        ; The user has typed an
                .WORD APPMSG         ; "A" and the system responds
                                     ; with the letters "PPEND".
                                     ; Again this is done for
                                     ; demographic purposes.
(DB7.2)         CLR LBXIT            ; This statement assures
                                     ; that the exit flag,
                                     ; LBXIT, is reset before
                                     ; entering the loop.
(DB7.3) LBMJ1:  JSR R5,PRINTR        ; The system is ready to
                .WORD BGNMSG         ; accept database input.
                MOV L1ET,-(R3)       ; It notifies the user of
                MOV L0ET,-(R3)       ; this by typing out a
                                     ; sentence delimiter (#)
                                     ; followed by a word
                                     ; delimiter Since
                                     ; both delimiter seeds were
                                     ; initialized during DB6.0,
                                     ; their event numbers (0)
```

B-22-continued

CODE FOR THE DATA BASE PROGRAM

```
                                       ; are stacked on ESTAK.
                                       ; It will be recalled R3 points
                                       ; to the top of ESTAK.
(DB7.4)            MOV #1,RLN1         ; The number of events in
                   MOV #1,RLN0         ; each entry is initialized
                                       ; to one.
(DB7.5)            JSR R5,GETC         ; The system now accepts a
                                       ; character from the input
                                       ; device.
(DB7.6-
DB7.7)             CMPB R0,BLANK       ; Since the system has
                   BNE .+2             ; inserted the beginning
                   JSR R5,GETC         ; word delimiter on
                                       ; ESTAK, if another is
                                       ; entered by the user the
                                       ; system ignores it and reads
                                       ; the next character.
(DB7.8)            CMPB R0,CR          ; If the user immediately
                   BNE .+3             ; types a carriage return,
                                       ; this indicates that he is
                                       ; through with the system.
(DB7.10)           INC LBXIT           ; In this case the exit
                   JMP LBMJ3           ; switch is set and control
                                       ; goes to DB7.11.
(DB7.9.0)                              ; If the user did not type
                                       ; a carriage return, then
                                       ; this means that he is
                                       ; about to add another entry
                                       ; to the data base. Block
                                       ; DB7.9.0 processes that
                                       ; entry.
(DB7.9.1)          CLR PEXIT           ; PEXIT is reset before
                   MOV #1,PIPSW        ; entry into the loop. PIPSW
                                       ; is set to indicate that
                                       ; piping is to take place on
                                       ; layer 0. If at some time
                                       ; during the entry of the
                                       ; request, an event is entered
                                       ; on layer 0 which did not
                                       ; exist before, then PIPSW
                                       ; is reset. This is so
                                       ; since the layer 0 entry
                                       ; could not have existed
                                       ; previously and, thus,
                                       ; piping would be superfluous.
(DB7.9.2) PEJ1:    CMPB R0,BLANK       ; A check is made for a
                   BNE CLB             ; blank character. If one
(DB7.9.21)         JSR R5,PL0E         ; is found it signals the end
                   JMP PEJ6            ; of a word. Then the sequence
                                       ; of RLN0 layer 0 events
                                       ; on ESTAK are processed.
                                       ; This is done in subroutine
                                       ; PL0E and will be described
                                       ; in detail later.
(DB7.9.3.) CLB:    CMPB R0,LBSGN       ; If the input character is
                   BNE CCHR            ; not a blank, a check is
                                       ; made to see if it is a
                                       ; sentence delimiter.
(DB7.9.15)         TST L1SW            ; In this block L1SW is
                   BNE .+2             ; used to indicate whether
                                       ; we have just completed
(DB7.9.16)         JSR R5, PL0E        ; processing an entry on
                                       ; layer 0. If it is not set,
                                       ; this indicates that the
                                       ; user entered a sentence
                                       ; delimiter without preceding
                                       ; it with a word delimiter,
                                       ; in which case the subroutine
                                       ; PL0E has to be called to
                                       ; process the last layer 0
                                       ; entry on the stack (ESTAK).
(DB7.9.17)                             ; At this point ESTAK
                                       ; contains a series of
                                       ; layer 1 events starting
                                       ; with a delimiter. We now
                                       ; put the ending delimiter
                                       ; on the stack and increment
                                       ; the length of the entry
                                       ; (RLN1) by one.
                   MOV L1ET,-(R3)      ; stack the delimiter event
                   INC RLN1            ; number (0).
(DB7.9.18)         JSR R5,ADDNE        ; This subroutine will be
                                       ; described in detail later.
                                       ; It simply takes the top
                                       ; RLN1 events from ESTAK
                                       ; and adds them as an entry
                                       ; to layer 1.
(DB7.9.19)         CLR L1SW            ; The switch L1SW is reset
                                       ; to indicate we are no
                                       ; longer dealing with
                                       ; layer 1 events.
                   ADD RLN1,R3         ; This has the effect of
                                       ; popping RLN1 entries.
```

B-22-continued

CODE FOR THE DATA BASE PROGRAM

```
                        CLR RLN1                ; Reinitialize RLN1 to 0.
(DB7.9.20)              INC PEXIT               ; The loop exit switch,
                        JMP PEJ6                ; PEXIT, is set to assure
                                                ; loop termination at
                                                ; DB7.9.23.
(DB7.9.4) CCHR:         CLR L1SW                ; At this point we know
                                                ; we are dealing with a
                                                ; layer 0 entry. Thus, we
                                                ; reset L1SW. This is needed
                                                ; since PLOE sets L1SW.
(DB7.9.5)               CMPB PC,BLANK           ; If the previous character
                        BNE PEJ2                ; was a that means a
                                                ; word was just processed.
                                                ; Therefore the stack has
                                                ; to be reinitialized.
(DB7.9.6)               MOV L0ET,-(R3)          ; PLOE pops the current
                        INC RLN0                ; RLNO events from ESTAK.
                                                ; If another word follows,
                                                ; the beginning delimiter
                                                ; event number must be placed
                                                ; on the stack and RLNO must
                                                ; be initialized to 1.
(DB7.9.7)               MOV 190 1,PIPSW         ; Since this is the beginning
                                                ; of a new word, the pipe
                                                ; switch is set to indicate
                                                ; that piping is necessary.
(DB7.9.8) PEJ2:         MOV CVRTBL(RO),R1       ; Recall that in block DB6.0,
                                                ; CVRTBL was initialized to
                                                ; -2. This instruction adds
                                                ; the ASCII character in RO
                                                ; to the base address of
                                                ; CVRTBL. The contents of
                                                ; this new address are then
                                                ; transferred to R1.
                        BMI .+3                 ; If R1 contains a negative
                                                ; number, that indicates
                                                ; that this ASCII character
                                                ; has not been processed
                                                ; before and is thus a new
                                                ; event for the system,
(DB7.9.9)               MOV R1,R2               ; If R1 is not negative, it
                        JMP PEJ3                ;represents the event number
                                                ; on layer 0 associated with
                                                ; this ASCII character. The
                                                ; event number for this ASCII
                                                ; character is moved from
                                                ; register R1 to register R2.
(DB7.9.10)                                      ; If this is a new event, it
                                                ; must be given an event
                                                ; number and a seed header.
                                                ; Tables CVRTBL, CVTBL2
                                                ; must be updated as well as
                                                ; the layer header.
                        INC NEO                 ; The layer 0 header number
                        MOV NE0,R2              ; of events is incremented.
                        MOVB R2,CVRTBL(RO)      ; This new value is the event
                        MOVB R0,CVTBL2(R2)      ; number associated with the
                                                ; new event. The associated
                                                ; event number is moved
                                                ; into the appropriate slot
                                                ; in CVRTBL. The ASCII
                                                ; representation of this
                                                ; event is put into CVTBL2.
(DB7.9.11)                                      ; A new event has been
                                                ; encountered. A seed header
                                                ; must be obtained and
                                                ; created for it.
                        MOV NXTSH,R1            ; Pointer to next seed header
                                                ; to R1.
                        ADD #10, NXTSH          ; Update to point to next
                                                ; seed header.
                        MOV R1,L0ET(R2)         ; Move the address of the seed
                                                ; header into the layer 0
                                                ; event pointer table at
                                                ; address in LOET specified
                                                ; by event number.
                        CLR (R1)+
                        CLR (R1)+               ; zero but the four words
                        CLR (R1)+               ; in the seed header to make
                        CLR (R1)+               ; a null seed.
(DB7.9.12)              CLR PIPSW               ; Since this event has not
                                                ; been used before, it is
                                                ; known that the word being
                                                ; processed does not exist
                                                ; in the data base. Therefore
                                                ; the pipe switch (PIPSW)
                                                ; is cleared.
(DB7.9.13) PEJ3:        MOV LOET(R2),-(R3)      ; R2 contains the event number
                                                ; in layer 0 associated with
                                                ; the ASCII code entered.
                                                ; It is stacked in ESTAK.
(DB7.9.14)              INC RLNO                ; The length of the current
                                                ; layer 0 entry is incremented
```

B-22-continued

CODE FOR THE DATA BASE PROGRAM

```
                                                        ; by 1.
(DB7.9.22) PEJ6:        MOVB R0,PC                      ; The last character entered
                                                        ; is always saved to indicate
                                                        ; when a word has been
                                                        ; completed, i.e., when
                                                        ; PC =
(DB7.9.23)              TST PEXIT                       ; Test the exit switch to
                        BNE .+3                         ; determine whether the
                                                        ; entry is complete
(DB7.9.24)              JSR R5,GETC                     ; If it is not, read a
                        JMP PEJ1                        ; character and loop back.
;
; end PROCESS ENTRY BLOCK DB7.9.0
(DB7.11) LBMJ3:         TST LBXIT                       ; A test is made to see if
                        BNE .+2                         ; the user has completed
                                                        ; entering information into
                                                        ; the data base.
                        JMP LBJ1                        ; Not set - loop back.
                        JMP JOIN2                       ; Set - get out (DB11.0).
; end LAYER BUILDING block (DB7.0)
(DB5.0) TREQ:           CMPB RO,R                       ; This part of the code is
                        BNE TEND                        ; associated with DB5.0. A
                                                        ; check is made for the "R".
                                                        ; If the input is an "R"
                                                        ; control goes to the perform
                                                        ; request block DB8.0
;
; PERFORM LAYER REQUEST
(DB8.0)                 JSR R5,PRINTER                  ; Output the message.
                        .WORD REQMSG                    ; REQUEST.
                        JSR R5,FORMATER                 ; Process requests.
                        JMP JO1N2
;
; end LAYER REQUEST block
(DB5.0) TEND:           CMPB R0,E                       ; Is character an "E".
                        BNE DBERR                       ; Ignore it.
(DB9.0)                 JSR R5,PRINTR                   ; Output the message.
                        .WORD ENDMSG                    ; End DATABAS.
                        INC ENDFLAG                     ; Set the ending flag.
                        JMP JOIN2                       ; Control to DB11.0.
(DB10.0) DBERR:         JSR R5,PRINTR                   ; Contrl comes to her if
                        .WORD ERRMSG                    ; the input character is
                                                        ; unintelligible. An error
                                                        ; message is output.
(DB11.0) JO1N2:                                         ; Control from all the
                                                        ; modules comes here.
                        TST ENDLFAG                     ; Are we done.
                        BNE .+2                         ; Yes.
                        JMP JOIN1                       ; No - loop back.
(DB12.0)                MOV (SP)+,R5
                        MOV (SP)+,R4
                        MOV (SP)+,R3                    ; Restore context.
                        MOV (SP)+,R2                    ;
                        MOV (SP)+,R1
                        MOV (SP)+,R0
                        HALT                            ; Stop the DATABAS program.
                        JMP DATABAS                     ; Loop back - after the program
                        END                             ; halts, the user may restart
;                                                       ; the program by pressing
; end DATABAS program                                   ; the CONTINUE button on
;                                                       ; the console.
; PL0E Subroutine - PROCESS A LAYER 0 ENTRY
(PLE1) PL0E:            MOV R1,-(SP)                    ; Save R1.
(PLE2)                  MOV L0ET,-(R3)                  ; When PL0E is called the
                        INC RLN0                        ; ending delimiter is not
                                                        ; on the ESTAK. This code
                                                        ; puts it on ESTAK and
                                                        ; increments the layer 0
                                                        ; request length by one.
(PLE3)                  TST PIPSW                       : Check the pipe switch.
                        BNE .+3                         ; On - perform piping.
(PLE4)                  JSR R5,ADDNE                    ; The PIPSW is not set.
                        JMP PL0EJ2                      ; Thus the RLN0 events on
                                                        ; ESTAK are added to layer 0
                                                        ; as an entry.
(PLE5)                                                  ; The piping module is called.
                                                        ; Everything is set up to
                                                        ; request an exact hit.
                        MOV RLN0,PCO                    ; There must be as many hits
                        CLR PNBCNT                      ; in the pipe as there are
                        JSR R5,PIPE                     ; events in the entry. This
                                                        ; in effect clears the output
                                                        ; list PNBOUT by stating that
                                                        ; the number of entries in the
                                                        ; liste (PNBCNT) is zero. Go
                                                        ; do the piping.
(PLE6)                  TST PNBCNT                      ; A check is made for an exact
                        BNE .+3                         ; hit by testing PNBCNT.
(PLE7)                  JSR R5,ADDNE                    ;An exact hit has not been
                        JMP PL0EJ2                      ; found. Therefore this entry
                                                        ; must be added to layer 0.
                                                        ; Control to PLE9.
(PLE8)                  MOV PNBOUT,R1                   ; An exact hit has been found.
```

B-22-continued

CODE FOR THE DATA BASE PROGRAM

```
                                                ; The first word in PNBOUT is
                                                ; the level 0 entry number
                                                ; (level 1 event).
(PLE9) PLOEJ2:        ADD RLN0,R3               ; Processing is complete for
                      CLR RLN0                  ; the top RLN0 events on ESTAK.
                                                ; These are popped from the
                                                ; stack by adding RLN0 to R3,
                                                ; the ESTAK pointer. The layer
                                                ; 0 entry length, RLN0, is
                                                ; cleared back to zero.
(PLE10)                                         ; The layer 0 events in the
                                                ; last entry have been
                                                ; "popped" from the stack. The
                                                ; layer one event number
                                                ; corresponding to the layer 0
                                                ; entry is then pushed onto
                      MOV L1ET(R1),-(R3)        ; ESTAK.
                      INC RLN1                  ; Increment the number of
                                                ; entries.
(PLE11)               INC L1SW                  ; Set layer 1 switch to
                                                ; indicate that the top of
                                                ; ESTAK contains layer 1
                                                ; events
(PLE12)               MOV (SP)+,R1              ; Restore R1.
                      RTS R5                    ; Exit the PL0E subroutine.
;
; ADDNE subroutine
; ADD N EVENTS (adds the top RLN0/RLN1 events in ESTAK
; to layer 0/1). An important module since it actually
; manipulates the data base.
; R1 is destroyed; output value is event number.
(ANE1) ADDNE:         MOV R0-(SP)
                      MOV R2,-(SP)              ; Save context.
                      MOV R4,-(SP)
(ANE2)                TST L1SW                  ; Test layer 1 switch.
                      BEQ ADNF1                 ; Not set - deal with layer 0.
(ANE4)                MOV L1PTR,LPTR            ; Control comes here when
                      MOV HW1, HW               ; layer 1 entry is being
                      MOV RLN1,RLN              ; processed. Hence the
                      DEC RLN                   ; address of the layer 1
                      BR ANEJ1                  ; header, HW1, and RLN1,
                                                ; are moved to common
                                                ; software registers LPTR,
                                                ; HW, RLN. RLN is decremented
                                                ; to avoid adding the leading
                                                ; delimiter. It was added
                                                ; when the previous layer 1
                                                ; entry was processed.
(ANE3) ANDF1:                                   ; This block is the same as
                                                ; ANE4 except that a layer 0
                                                ; entry is being processed.
                      MOV L0PTR,LPTR            ; Get common layer pointer.
                      MOV HW0,HW                ; Iso-entropicgram width.
                      MOV RLN0,RLN              ; Number of events in entry.
                      DEC RLN                   ; Avoid beginning delimiter.
(ANE5) ANEJ1:         MOV   LPTR,LXET           ; Move the address of the
     ANEJ2:           MOV LPTR,R2               ; current layer's event
                      INC 6(R2)                 ; pointer table to LXET.
                                                ; R2← layer × header address.
                                                ; Get next higher tick
                                                ; value for this layer.
(ANE6)                                          ; A check is made to see
                                                ; whether the new tick
                                                ; number has exceeded
                                                ; the iso-entropicgram
                                                ; width. If so the width of
                      CMP 2(R2),6(R2)           ; the iso-entropicgram is
                      BHOS .+2                  ; doubled. Note that HWX is
                                                ; word 2 in the layer header
(ANE7)                ROL 2(R2)                 ; while TIKX is word 4,
(ANE8)                                          ; The change vector will be
                                                ; one tick long for each
                                                ; event. Each event is pulled
                                                ; off ESTAK and assigned
                                                ; the next sequential tick
                                                ; value. This value is then
                                                ; added to the event's
                                                ; event occurence vector.
                      MOV #1,CNGDPM             ; This is a two word area
                      MOV #1,CNGLNG             ; which is used by the
                                                ; DPMMEM/MEMDPM routine.
                                                ; The first word is the
                                                ; number of the DPM memory
                                                ; module area to be used, the
                                                ; second is the physical
                                                ; length in words. Memory
                                                ; area 1 is being used and its
                                                ; length is one word long.
                      MOV 6(R2),CNGVEC          ; The value in layer X
                                                ; header word 4 (i.e. TIKX)
                                                ; is moved to the area
                                                ; designated by CNGVEC. It
                                                ; is this value that will
```

B-22-continued

CODE FOR THE DATA BASE PROGRAM

```
                                           ; be added to the event's
                                           ; event occurrence vector.
            MOV #CNGVEC,R0                 ; Set up appropriate R0/R1
            MOV #CNGHPM,R1                 ; addresses for subroutine
            JSR R5,MEMDPM                  ; call. Transfer the value
                                           ; in CNGVEC to DPM memory
                                           ; module area 1, transfer
                                           ; current seed to DPM.
(ANE9)      MOV R3,R2                      ; Save top of stack.
            ADD RLN,R2                     ; RLN contains the number of
            ADD RLN,R2                     ; events in the request.
                                           ; 2 × RLN is added since
                                           ; words are being addressed.
                                           ; R2 now points at the first
                                           ; event in the entry.
                                           ; Remember the events are
                                           ; in the stack in reverse
                                           ; order.
            MOV -(R2),R4                   ; Move the pointer to event's
                                           ; seed header from the stack
                                           ; to R4.
            MOV 4(R4),SEEDPM+2             ; Move the third word of the
                                           ; seed header (i.e. the seed
                                           ; length) to the second word
                                           ; of the area whose base
                                           ; address is SEEDPM.
            MOV (R4),R0                    ; Move first word of
                                           ; seed header (the seed
                                           ; address) to R0.
            MOV #SEEDPM,R1                 ; Get ready for the transfer.
            JSR R5,MEMDPM                  ; Do the transfer.
(ANE10)                                    ; The Input Parameter Register
                                           ; File (IPRF) has to be
                                           ; initialized with the
                                           ; appropriate values.
            CLR STATUS                     ; Make sure the STATUS
                                           ; word is clear.
            MOV #1,AI                      ; AI contains the beginning
                                           ; address of the IPRF.
            MOV HW,DATAO                   ; Move iso-entropicgram
                                           ; width to the TOP LIMIT
                                           ; register of IPRF (TL).
            CLR DATAO                      ; Clear Bottom Limit (BL)
            CLR DATAO                      ; and increment register
                                           ; (IR). These three registers
                                           ; are set since they are
                                           ; used by the ENCODE MODULE.
            MOV 2(R4),DATAO                ; Move the second word of
                                           ; the seed header (i.e. the
                                           ; line # of the seed) into
                                           ; the IPRF.
            MOV CNGDPM+2,DATAO             ; Move length of the change
                                           ; vector to IPRF.
            MOV SEEDPM+2,DATAO             ; Move length of the seed
                                           ; to IPRF.
(ANE11)     ADD DPM+CMGO,STATUS            : Call CHANGE MODULE.
            BIT BDONE,STATUS               ; Test for completion.
            BEQ .-1                        ; Wait until BDONE is set.
(ANE12)                                    ; The new updated seed is
                                           ; transferred from the DPM
                                           ; to main memory area (WAREA).
            CLR STATUS                     ; Get ready to read the
            MOV #1,AI                      ; results
            MOV DATA1,CNGLIN               ; Get line number of
                                           ; new seed.
            MOV DATA1,CNGLNG               ; Get length of new seed.
            TST DATA1                      ; Slip over ONOC.
            MOV DATA1,CNGDPM               ; Get DPM MEMORY area of seed.
            MOV #WAREA,R0                  ; Prepare for transfer.
            MOV #CNGDPM,R1 ;
            JSR R5,DPMMEM                  ; Do the transfer.
(ANE13.0)
; PUT NEW SEED IN STORAGE (ANE13.0)
; Now that a new seed has been obtained it must be placed in
; storage. The following block of code transfers the seed from
; WAREA to its proper place in storage.
(ANE13.1)   MOV R2,-(SP)
            MOV R3,-(SP)                   ; Save context.
            MOV R4,-(SP)
(ANE13.2)   MOV CNGLNG,NSLN                ; A value of two is added to
            ADD #2,NSLN                    ; the new seed length so
            MOV SEEDPM+2,OSLN              ; that the new seed can be
                                           ; inserted along with the
                                           ; link information.
(ANE13.3)   CMP OSLN,NSLN                  ; If the old seed length is
            BLT .+2                        ; greater than the new seed
            JMP PNSHI                      ; length, then the new seed
                                           ; can be stored over the old
                                           ; seed and the remaining space
                                           ; returned to free space;
                                           ; otherwise space must be
                                           ; found to place the new seed.
(ANE13.4.0)
```

B-22-continued

CODE FOR THE DATA BASE PROGRAM

```
; SEARCH FREE SPACE block (ANE13.4.0)
; The new seed length is greater than the old seed length.
; Thus free space must be searched to find a place to store
; the new seed. R1 destroyed.
(ANE13.4.1)          MOV R2,-(SP)       ; Save R2,R3.
                     MOV R3,-(SP)       ;
(ANE13.4.2)          CLR R1             ; R1 is destroyed, It will
                                        ; hold the result of this
                                        ; search.
                     MOV FSP,R2         ; R2 contains the address of
                                        ; the beginning of free space.
                     MOV #FSP,R3        ; R3 will point to the previous
                                        ; link. Here it is initial-
                                        ; ized to contain the address
                                        ; of FSP.
(ANE13.4.3) SFSJ1:   CMP NSLN,2(R1)     ; Will the new seed fit in
                     BLOS .+2           ; this area. No, get another
                     JMP SFSHI          ; link.
(ANE.13.4.4)                            ; The new seed will fit into
                                        ; this space. The previous
                                        ; link is adjusted by the
                                        ; space for the new seed.
                     MOV R2,R1          ; R1 is the starting address
                                        ; where the new seed will
                                        ; be put.
                     ADD NSLN,R2        ; Add NSLN to R2 and back
                     SUB #2,R2          ; up by 2. R2 now points to
                                        ; the end of the space
                                        ; reserved for the new seed.
(ANE13.4.5)                             ; The free space list links
                                        ; are now adjusted.
                     MOV R2,(R3)        ; The previous link is
                                        ; updated to point by the
                                        ; new seed.
                     MOV (R1),(R2)      ; The old "next link" is
                                        ; moved into address at R2.
                     MOV 2(R1),2(R2)    ; The length is moved down.
                     SUB NSLN,2(R2)     ; The new seed length is
                     ADD #2,2(R2)       ; subtracted out.
(ANE13.4.6)          SUB NSLN,UNSP      ; An amount equal to the
                     ADD #2,UNSP        ; length of the new seed
                     JMP SFSJ2          ; is subtracted from unused
                                        ; space (UNSP).
(ANE13.4.7)                             ; If control comes here, it
                                        ; means that the new seed
                                        ; will not fit in this area
                                        ; of free space. Hence, the
                                        ; pointer must be updated.
SFSHI:               MOV R2,R3          ; Current link becomes
                                        ; previous.
(ANE13.4.8)          MOV (R2),R2        ; Get new current link.
(ANE13.4.9)                             ; If the end of free space
                                        ; is reached (i.e. at the
                                        ; beginning of available
                                        ; space, the link to the
                                        ; next available is zero.
                     TST (R2)           ; A test is made for that
                     BNE SFSJ2          ; condition at ANE 13.4.9.
(ANE13.4.10)                            ; At this block all of free
                                        ; space has been searched
                                        ; and a hit has not been
                                        ; found. Thus the new seed
                                        ; will be put into available
                                        ; space.
                     MOV R2,R1          ; Set R1 to beginning
                                        ; address of available space.
(ANE13.4.11)         ADD NSLN,(R3)      ; Adjust previous link to
                     SUB #2,(R3)        ; new beginning of
                                        ; available space.
(ANE13.4.12)         CLR    (R3)        ; The location pointed to
                                        ; by the previous link is
                                        ; set to zero indicating the
                                        ; end of free space and the
                                        ; beginning of available space.
(ANE13.4.13) SFSJ2:  TST R1             ; Have we found a slot.
                     BNE .+2            ; Yes.
                     JMP SFSJ1          ; No.
(ANE13.4.14)         MOV (SP)+,R3
                     MOV (SP)+,R2
; end SEARCH FREE SPACE (ANE13.4.0)
(ANE13.5)                               ; The new seed is transferred
                                        ; from WAREA to the area
                                        ; pointed to by R1.
                     MOV CNGLNG,R0      ; Length of new seed.
                     MOV #WAREA,R2      ; Address of new seed.
                     MOV (R2)+,(R1)+    ;
                     DEC R0             ; Insert the new seed.
                     BNE .-2            ;
(ANE13.6)                               ; The space used by the old
                                        ; un-updated seed is released
                                        ; to free space. The release
                                        ; space subroutine will be
                                        ; described in detail later.
```

B-22-continued

CODE FOR THE DATA BASE PROGRAM

```
                MOV OSLN,R0          ; Set up to release old
                                     ; seed space.
                MOV (R4),R1          ; Release the space.
                JSR R5,RELSP
                JMP PNSJ1
(ANE13.7)                            ; Come here if the new seed
                                     ; fits over the old seed.
    PNSHI:      MOV (R4),R1          ; R1 contains the first word
                                     ; of the seed header (i.e.
                                     ; the address of the old
                                     ; seed).
                MOV CNGLNG,R0        ; R0 contains the length of
                                     ; the new seed.
                MOV #WAREA,R2        ; The address of the new seed.
                MOV (R2)+,(R1)+      ; Do the transfer.
                DEC R0               ; Decrement length of new
                                     ; seed.
                BNE .-2              ; Branch back 2 instructions.
(ANE13.8)                            ; The space unused by the
                                     ; new seed must be returned
                                     ; to free space.
                MOV OSLN,R0          ; Length of old seed.
                SUB CNGLNG,R0        ; Substitute new seed length.
                JSR R5,RELSP         ; Release remaining space.
(ANE13.9)                            ; If the amount of unused
                                     ; space is greater than IK,
                                     ; garbage collection must be
                                     ; performed.
    PNSJ1:      CMP #1750,UNSP       ; Time for garbage collection?
                BLOS .+2             ; Yes.
                JMP PNSJ2            ; No.
; GARBAGE COLLECTION block (ANE13.10.0)
; The unused space on the free space list is returned
; to available space.
(ANE13.10.1)    MOV R2,-(SP)
                MOV R3,-(SP)         ; Save registers R2,R3,R4.
                MOV R4,-(SP)
(ANE13.10.2)    MOV FSP,R2           ; R2 points to beginning
                                     ; of free space.
                MOV R2,R3            ; R3 points to beginning of
                                     ; compressed space.
                MOV R3,R4            ; R4 points to beginning of
                ADD 2(R2),R4         ; uncompressed area.
(ANE13.10.3)
    PGCJ1:      JSR R5,ASH           ; Adjust appropriate seed
                .WORD L0PTR          ; headers in layer 0 to
                                     ; reflect this "left shift"
                                     ; which is about to occur.
(ANE13.10.4)    JSR R5,ASH           ; Adjust appropriate seed
                .WORD L1PTR          ; headers in layer 1.
(ANE13.10.5)    MOV (R4)+,(R3)+      ; Compress the data.
                CMP R4,(R2)          : Is section complete.
                BLT .-2              ; No - loop back.
(ANE13.10.6)    ADD 2(R4),R4         ; Skip the useful data pointer
                                     ; R4, over this free area by
                                     ; adding the length of the
                                     ; area to the address in R4.
(ANE13.10.7)    MOV (R2),R2          ; Get next link.
(ANE13.10.8)    TST (R2)             ; When the next link is 0,
                                     ; this indicates that garbage
                                     ; collection is complete.
                BNE PGCJ1            ; No - loop back.
(ANE13.10.9)    MOV R4,FSP           ; Set free space pointer
                CLR (R4)             ; to point to available space.
(ANE13.10.10)   MOV (SP)+,R4         ; Restore registers.
                MOV (SP)+,R3         ;
                MOV (SP)+,R2
; end GARBAGE COLLECTION BLOCK (ANE13.10.0)
(ANE13.11) PNSJ2: MOV (SP)+,R4       ; Restore registers (put
                MOV (SP)+,R4         ; seed in storage).
                MOV (SP)+,R2
; end PUT NEW SEED IN STORAGE BLOCK (ANE13.0)
(ANE14)                              ; The seed header must be
                                     ; modified to reflect the
                                     ; new seed.
                MOV CNGLIN,2(R4)     ; Adjust seed header with
                                     ; new line number.
                MOV CNGLNG,4(R4)     ; New length.
                INC 6(R4)            ; Number of 1's in line 0.
(ANE15)                              ; A check is made to
                                     ; determine if there is
                                     ; another entry to be
                                     ; processed.
                DEC RLN              ; Decrease the number of
                                     ; entries.
                BEQ .+2              ; Done.
                JMP ANEJ2            ; Not done, loop back.
(ANE16)                              ; If the layer 1 switch is
                                     ; 0, this means that an
                                     ; entry has been made on
                                     ; layer 0. This entry has
                                     ; to be reflected as an
                                     ; event on layer 1.
```

CODE FOR THE DATA BASE PROGRAM

```
                    TST L1SW                 ; Check layer 1 switch.
                    BNE ANEJ4                ; Set - forget rest.
(ANE17)             MOV L1PTR,R4             ; R4 contains the address of
                                             ; the layer 1 header.
                    INC 4(R4)                ; Increment the third word
                                             ; of the header, i.e.
                                             ; NE1<-NE1+1. This indicates
                                             ; that a new event is being
                                             ; added.
                    MOV 4(R4),R1             ; Save this event number in R1.
                    MOV NXTSH,L1ET(R1)       ; Move an address to the
                                             ; seed header into the layer
                                             ; one event table.
                    MOV NXTSH,R2             ; Save this address in R2.
                    ADD #10,NXTSH            ; Update the NXTSH to point
                                             ; to the next seed header.
                    CLR (R2)+                ;
                    CLR (R2)+                ; Make a null seed header.
                    CLR (R2)+
                    CLR (R2)
(ANE18) ANEJ4:      MOV (SP)+,R4
                    MOV (SP)+,R2             ; Restore registers.
                    MOV (SP)+,R0
                    RTS R5
; end ADD N EVENTS SUBROUTINE
; ADDNE
;
RELSP - RELEASE SPACE SUBROUTINE
; R0 length of area to be released (INPUT)
; R1 address of area to be released (INPUT)
;
(RS1)               MOV R2,-(SP)             ; Save registers
                    MOV R3,-(SP)
(RS2)               MOV FSP,R2               ; R2 now contains the address
                                             ; of the beginning of free
                                             ; space list.
                    MOV #FSP,R3              ; R3 will point to previous
                                             ; link - originally it is
                                             ; set to the address of FSP.
(RS3) RELJ1:        CMP R1,R2                ; The address of the area to
                    BLOS .+4                 ; be released is compared to
                                             ; the current address. If it
                                             ; is greater, control goes
                                             ; to next link; otherwise
                                             ; the input section is
                                             ; inserted into the list.
(RS7)               MOV R2,R3                ; Current link becomes
                                             ; the previous.
(RS8)               MOV (R2),R2              ; Get new link.
                    JMP RELJ2                ; Control to RS9.
(RS4)                                        ; This area being returned
                                             ; to free space is inserted
                                             ; into the list.
                    MOV R2, (R1)             ; Insert free space into
                                             ; chain.
                    MOV R0, 2(R1)            ; Insert its length.
(RS5)               MOV R1, (R3)             ; Adjust previous to
                                             ; split links.
(RS6)               CLR R2                   ; Assure exit.
(RS9)               TST R2                   ; Are we done.
                    BNE RELJ1                : No - loop back.
(RS10)                                       ; The length of this newly
                                             ; added section is added to
                                             ; unused space (UNSP). Once
                                             ; this linked list of free
                                             ; space exceeds IK, then
                                             ; garbage collection will
                                             ; be performed.
                    ADD R0, UNSP
(RS11)              MOV (SP)+,R3             ; Restore registers.
                    MOV (SP)+,R2
                    RTS R5
;
; end SUBROUTINE RELEASE SPACE (RELSP)
;
; ASH ADJUST SEED HEADERS (during garbage collection) SUBROUTINE
; R2 points at current link.
; Adjust Seed Header Subroutine.
; This subroutine runs through the list of seed headers for a
; layer. Any seed whose address is greater than the current
; section being compressed has its address decremented by the
; amount of the section being released.
(ASH1) ASH:         MOV R0,-(SP)
                    MOV R1,-(SP)             ; Save registers.
                    MOV R3,-(SP)
                    MOV R4,-(SP)
(ASH2)              MOV (R5)+,R3             ; The parameter is picked up
                                             ; and placed in register R3.
                                             ; The parameter is the address
                                             ; of the appropriate layer
                                             ; header.
                    MOV (R3),R1              ; The first word of the
                                             ; layer header, i.e., the
```

B-22-continued

CODE FOR THE DATA BASE PROGRAM

```
                                           ; address of the layer event
                                           ; table, is placed in R1.
                MOV 4 (R3),R0              ; The third word of the
                                           ; layer header, i.e., the
                                           ; number of events in the
                                           ; layer, is moved to R0.
(ASH3) ASHJ1:   MOV (R1)+,R3               ; R3←address of seed header.
(ASH4)          MOV (R3),R4                ; R4←address of seed, i.e.
                                           ; the first word of the
                                           ; seed header.
(ASH5)          CMP R4,R2                  ; The address of the seed is
                BLOS ASHJ2                 ; compared to the current
                                           ; link address. If it is
                                           ; less than or equal to,
                                           ; the seed address need not
                                           ; be changed. So control
                                           ; goes to ASH 7.
(ASH6)          SUB 2(R2), (R3)            ; If the seed address is
                                           ; greater than the current
                                           ; link, this means that the
                                           ; seed is going to be moved
                                           ; to the left by the amount
                                           ; of the section being
                                           ; compressed. Hence this
                                           ; amount is subtracted from
                                           ; the seed address in the
                                           ; first word of the seed
                                           ; header.
(ASH7) ASHJ2:   DEC R0                     ; The number of events in
                BNE ASHJ1                  ; the layer is decremented
                                           ; by one. If it is non-zero,
                                           ; control goes back to ASH3.
                                           ; Else exit.
(ASH8)          MOV (SP)+,R4
                MOV (SP)+,R3               ; Restore register and exit
                MOV (SP)+,R1               ; ASH subroutine.
                MOV (SP)+,R0
                RTS R5
; Additional variables demanded by the layer building method
;
;
   ENDFLAG:     .WORD 0                    ; Flags used by the DATABASE
   LBXIT:       .WORD 0                    ; modules.
   PEXIT:       .WORD 0                    ;
   PIPSW:       .WORD 0                    ;
   OSLN:        .WORD 0                    ; Used in PLACE NEW SEED
   NSLN:        .WORD 0                    ; storage block for
   UNSP:        .WORD 0                    ; keeping track of unused
                                           ; space
   NXTSH:       .WORD 0                    ; Pointer to next free
                                           ; seed header.
   FSP:         .WORD 0                    ; Free space pointer.
   CNGDPM:      .WORD 0                    ; Variables used in
   CNGLDG:      .WORD 0                    ; performing the CHANGE
   CNGLIN:      .WORD 0                    ; function
   CNGVEC:      .WORD 0
   SEEDPM:      .WORD 0
                .WORD 0
I: .ASCII       / I /                      ; Litteral constants.
R: .ASCII       / I /                      ;
ASTERISK: ASCII / * /                      ;
LBGN: .ASCII    / # /                      ;
   .EVEN
PLUMSMSG:       .WORD 4
                .ASCII / (CR) (LF)+/
                .EVEN
INITMSG:        .WORD 11
                .ASCII / NITIALIZE /
                .EVEN
APPMSG:         .WORD 5
                .ASCII / PPEND /
                .EVEN
BGNMSG:         .WORD 4
                .ASCII / (CR) (LF)#/
                .EVEN
REQMSG:         .WORD 10
                .ASCII /EQUEST (CR) (LF)/
                .EVEN
;
;
SEEDHD:         BLOCK 1750                 ; 1K reserved for seed
                                           ; header.
; The next variable is placed immediately before the END
; statement. It is the beginning of available space.
AS              .WORD 0                    ; Beginning of available
                                           ; space.
```

What is claimed is:

1. A method, utilizing a digital data processing system having a memory system, for creating a digital coded multiple layer data base in such memory system comprising the steps of:

a. forming, in a desired order of occurrence, and as input, a plurality of coded event signals, at least some event signals representing the same event and at least one event signal representing an event which is different from another one, said event signals, together, representing a sequence of entries, some of said entries being the same and at least one being different;

b. forming a first and second event-time indication, respectively, for each said event signal and for each said entry, representing the order of occurrence thereof; and c. entering in the memory system a stored multi layered data base representing said input comprising the steps of 1. forming a first data base layer comprising the step of storing in said memory system retrievable first layer event-time signals representing the first event-time indications and which represent the order of occurrence of the event signals; and 2. forming a second data base layer comprising the step of storing in said memory system retrievable second layer event-time signals which represent the second event-time indications and which represent the order of occurrence of the corresponding entries.

2. A method according to claim 1 wherein said step of forming in said first layer event-time signal is operative for adding an additional one of such events to existing retrievable event-time signals in the stored data base and comprises the step of:

adding a representation of the first event-time indication for the additional event to the retrievable first layer event-time signals existing in said stored data base.

3. A method according to claim 2 wherein said step of forming in said second layer event-time signal is operative for adding an additional one of such entries to the existing data base event-time signals and comprises the step of:

adding a representation of the second event-time indication for the additional entry to the retrievable second layer event-time signals existing in said stored data base.

4. A method according to claim 1 wherein said step of storing a retrievable first layer vector signal comprises the steps of:

a. testing to determine if a newly formed input entry is not already represented in the first data base layer; and b. operative in response to a determination that an entry is not represented for selectively adding representations for the newly formed entry to the first data base layer utilizing said step of storing in said memory system a retrievable first layer event-time signal.

5. A method according to claim 4 wherein said step of selective adding comprises the step of adding, to the first layer, retrievable event-time signals a representation of the event-time indications representing the order of occurrence of event signals in the entry which is not present.

6. A method according to claim 4 comprising the additional steps of:

a. storing in a first area of the memory system a signal indicating each different event signal that has previously been formed;

b. said step of testing comprising the steps of 1. testing, for each newly formed event signal, the first memory system area to thereby determine if each of the newly formed event signals is different from any of those previously formed and therefore is new;

2. storing a new entry indicating signal responsive to an indication by the preceding test that any event signal within the newly formed entry is new; and 3. responding to the lack of the new entry indicating signal after forming all event signals of the newly formed entry for testing to determine if such newly formed entry is represented by said stored first layer event-time signals; and c. responding to the lack of presence in the last mentioned test or to the presence of the new entry indicating signal for performing said step of adding the newly formed entry.

7. A method according to claim 4 wherein said step of testing comprises the step of interrogating said retrievably stored first layer event-time signals.

8. A method according to claim 1 wherein the event signals of the input comprise at least one representing a delimiter, at least one such delimiter event signal being formed in each said entry and in said order of occurrence so as to define the boundary thereof, the step of forming a first layer event-time signal comprising the step of forming event-time signals representing the first event-time indications which represent the order of ocurrence of such delimiter event signals.

9. A method, utilizing a digital data processing system having a memory system, for creating a digital coded multiple layer data base in such memory system comprising the steps of:

a. forming, in a desired order of occurrence, and as input, a plurality of coded event signals, at least some event signals representing the same event and at least one event signal representing an event which is different from another, said event signals representing, in order of occurrence, a plurality of first level entries, said first level entries representing, in order of occurrence, at least one second level entry, some of said first level entries being the same and at least one being different;

b. forming a first entry delimiter signal indicating a boundary among said event signals of each said first level entry;

c. forming a second entry delimiter signal indicating a boundary among said first level entries of each said second level entry;

d. forming a first event-time indication representing the order of occurrence of each said event signal and each said first entry delimiter signal;

e. forming a second event-time indication representing the order of occurrence of each first entry signal and each said second delimiter signal; and f. entering the memory system a stored multi layered data base representing said input comprising the steps of 1. forming a first data base layer comprising the step of storing said memory system a retrievable first layer vector signal corresponding to each said different valued event signal and said first delimiter signal and including the step of forming in each said first layer vector signal a representation of those first event-time indications which represent the order of occurrence of the corresponding valued event signals or said first delimiter signals; and 2. forming a second data base layer comprising the step of storing in said memory system a plurality of retrievable second layer vector signals, those first level entries which are the same having a corresponding second layer vector signal and entries which are different each having a different corresponding second layer vector signal, at least one second level vector signal being included for said second delimiter, and including the step of forming in each said second layer vector signal a representation of those second event-time indications which represent the order of occurrence of the corrsponding first level entries.

10. A method, utilizing a digital data processing system having a memory system, for creating a digital coded multiple layer data base in such memory system comprising the steps of:

a. forming, in a desired order of occurrence, and as input, a plurality of coded event signals, at least some event signals representing the same event and at least one event signal representing an event which is different from another, said event signals representing, in order of occurrence, a plurality of first level entries, said first level entires representing, in order of occurrence, at least one second level entry, some of said first level entries being the same and at least one being different, said event signals including at least one representing, for each first level entry, a first delimiter and including at least one representing, for each second level entry, a second delimiter;

b. forming a first event-time indication representing the order of occurrence of each said event signal including those representing said first entry delimiter;

c. forming a second event-time indication representing the order of occurrence of each first entry signal including those representing said second delimiter; and d. entering in the memory system a stored multi layered data base representing said input comprising the steps of 1. forming a first data base layer comprising the step of storing in said memory system a retrievable first layer vector signal corresponding to each said different valued event signal and for said first delimiter event signal and including the step of forming in each said first layer vector signal a representation of those first event-time indications which represent the order of occurrence of the corresponding valued event signals or said first delimiter event signals; and 2. forming a second data base layer comprising the step of storing in said memory system a plurality of retrievable second layer vector signals, those first level entries which are the same having a corresponding second layer vector signal and entries which are different each having a different corresponding second layer vector signal, at least one second level vector signal being included for said second delimiter event signals, and including the step of forming in each said second layer vector signal a representation of those second event-time indications which represent the order of occurrence of the corresponding first level entries or second entry delimiter signals.

11. A method according to claim 10 wherein said first delimiter event signal and said second delimiter event signal each form a unique event signal among said event signals.

12. A method according to claim 10 wherein said steps of forming in each said first layer vector signal a representation is operative for adding additional ones of such input events to existing first layer vector signal in the stored data base and comprises the step of:

a. adding a representation of the first event-time indication for the additional event to a retrievable first layer vector signal existing in said stored data base, the first layer vector signal being the one which corresponds to such additional event.

13. A method according to claim 10 wherein said steps of forming in each said second layer vector signal a representation is operative for adding an additional one of such input first level entries to an existing second layer vector signal in the stored data base and comprises the step of:

a. adding a representation of the second event-time indication for the additional second level entry to a retrievable second layer vector signal existing in said stored data base, the second layer vector signal being the one which corresponds to such additional second level entry.

14. A method according to claim 10 comprising the steps of:

a. inspecting the event signals and for detecting those which represent said first delimiter; and b. forming the next one of said second event-time indications responsive to the detection of one of said detected event signals which represent said first delimiter.

15. A method according to claim 14 wherein said step of forming the next one of said event-time indications comprises the step of counting said detected event signals.

16. A method according to claim 13 wherein said step of forming said first event-time indications comprises the step of counting each said detected event signal.

17. A method according to claim 10 comprising the additional steps of:

a. temporarily storing each said event signal, as it is formed, the temporarily storing step including the step of storing a plurality of said event signals representing at least one first level entry, b. retrieving the temporarily stored event signals from the temporary store, one by one, and c. forming the next one of said first event-time counts upon retrieval of each said first event signals, said step of forming in said first layer vector signal a representation comprising the step of storing a value representing that first event-time count, which is being formed, into the particular first layer vector signal which corresponds to a retrieved one of said first layer event signals.

18. A method according to claim 17 comprising the additional step of testing the retrieved event signals for detecting ones representing said first delimiter, and said step of forming said second event-time indication comprising the step of forming the next second event-time indication responsive to such detection.

19. A method according to claim 17 comprising the additional step of testing the event signals for detecting one representing said second delimiter;

said step of forming in each second layer vector signal being responsive to such detection of an event signal representing a second delimiter for performing the step thereof and to thereby store a representation of all second event-time indications for the corresponding second level entry.

20. A method, utilizing a digital data processing system having a memory system, for structuring a digital coded data base in such memory system comprising the steps of:

a. forming ordered and coded input event signals representing first and second level entries, one or more input event signals representing a first level entry and one or more first level entries representing events in the second level entry, said input event signals and first level entries each including some which are the same and some which are different;
b. forming a first event-time count representing the order of occurrence of individual ones of said input event signals;
c. forming a second event-time count representing the order of occurrence of individual ones of said first level entries; and
d. entering in the memory system a stored data base representing said input event signals comprising the steps of
   1. forming a first layer comprising the step of
      a. forming a first layer event signal representative of those of said input event signals which represent the same value, a different first layer event signal being formed for input event signals representing different values;
      b. selecting a first storage area in the memory system corresponding to each said different input event signal; and
      c. selectively storing in each said first storage area a first layer vector signal which represents said first event-time counts for those of said input event signals which correspond to such first storage area, the selectively storing step being arranged to store only those first level entries not previously stored in the first layer and comprising the step of testing a first level entry to determine if the first event-time count for each one of the input event signals making up a first level entry is already represented in said stored first layer vector signals, and said step of selective storing, storing one or more vector signals representing only those first event-time counts which correspond to a first level entry which does not pass the last mentioned test; and
   2. forming a second layer comprising the steps of
      a. forming a second layer event signal representative of those first level entries which represent the same value, a different second layer event signal being formed for each different valued first level entry;
      b. selecting a second storage area in said memory system corresponding to each one of said first level entries which differs from the others; and
      c. storing in each said second storage area a second level vector signal which represents said second event-time counts for those of said first level entries which correspond to such second storage area.

21. A method, utilizing a digital data processing system having a memory system, for structuring a digital coded data base in such memory system and for retrieving comprising the steps of:

a. forming different input events for the data base;
b. converting each input event to a unique input event signal in an input code, the input event signals representing first and second level entries, one or more input event signals representing a first level entry and one or more first level entries representing events in the second level entry;
c. creating a data base in the memory system including the steps of
   1. forming a first and a second event-time count representing the order of occurrence of, respectively, said input event signals and said first level entries; and
   2. entering in the memory system a stored data base representing said input event signals comprising the steps of
      a. forming a first layer comprising the steps of
   1. forming a first layer event signal representative of those of said input event signals which represent the same value, a different first layer event signal being formed for input event signals representing different values, and
      2. selectively storing in said memory system a first layer vector signal corresponding to each said different valued input event signal, each said first layer vector signal representing the first event-time counts for the corresponding valued input event signal, the selectively storing comprising the steps of
         a. testing to determine if the first event-time count for each one of the input event signals making up a first level entry is already represented in said stored first layer vector signals, and
         b. enabling the selectively storing step for a first layer entry which does not pass the last mentioned test, and
      b. forming a second layer comprising the steps of
         1. forming a second layer event signal representative of those first level entries which represent the same value, a different second layer event signal being formed for each different valued first level entry, and
         2. storing in said memory system a second layer vector signal corresponding to each said different valued first level entry, each said second layer vector signal representing the second event-time counts for the corresponding valued first level entry;
d. retrieving selected data from the data base including the steps of
   1. forming a request represented by a plurality of request event signals which request may be stored in the data base,
   2. forming a request event time signal for each said request event signal which together represent the relative order of occurrence of said request event signals,
   3. utilizing said request event signals and request event time signals to interrogate the memory system and locate stored data including the request, and 4. forming an ordered set of layer event signals representing the located data;

e. converting each said last formed layer event signal to an output event signal coded in the input code; and f. outputting the output event signals.

22. A method, utilizing a digital data processing system having a memory system, for structuring a digital coded data base in such memory system and for retrieving therefrom comprising the steps of:

a. forming different input data events for the data base;

b. converting each input data event to a unique input event signal in an input code;

c. creating a data base in the memory system including the steps of 1. forming for each input event signal an event time indication which represents its relative order of occurrence;

2 interrogating the input event signal and forming a uniquely coded layer event signal for each different input event signal;

3. responding to the event time indication and the layer event signals for forming in the memory system a data base file which comprises a separately locatable event vector signal for each different layer event signal and including the step of forming in each such event vector signal a representation of those event-time indications which represent the order of occurrence of its layer event signal;

d. retrieving selected data from the data base including the steps of 1. utilizing said request event signals and request event-time signals for locating the event vector signal in the data base in the memory system which represents the same event-time value as each event-time signal to be output; and 2. for each one of the plurality of event-time signals to be output forming the layer event signal which corresponds to the event vector signal that has been located;

e. converting each said layer event signal to an output event signal coded in the input code; and f. outputting the output event signals.

23. A method, utilizing a digital data processing system having a memory system, for structuring a digital coded data base in such memory system and for retrieving portions of the data base, the structuring comprising the steps of:

a. forming, in order of occurrence, a plurality of coded input event signals representing first and second level entries, one or more input event signals representing a first level entry and one or more first level entries representing events in the second level entry, said input event signals and first level entries each including some representing the same and some representing different values;

b. forming a first event-time count representing the order of occurrence of individual ones of said input event signals;

c. forming a second event-time count representing the order of occurrence of individual ones of said first level entries; and d. entering in the memory system a stored data base representing said input event signals comprising the steps of 1. forming a first layer comprising the steps of a. forming a first layer event signal representative of those of said input event signals which represent the same value, a different first layer event signal being formed for input event signals representing different values, and b. selectively storing in said memory system a first layer vector signal corresponding to each said different valued input event signal, each said first layer vector signal representing the first event-time counts for the corresponding input event signal, the selectively storing step being arranged to store only those first level entries not previously stored in the first layer and comprising the steps of 1. testing a first level entry to determine if the first event-time count for each one of the input event signals making up a first level entry is already represented in said stored first layer vector signals, and said step of selective storing, storing one or more vector signals representing only those first event-time counts which correspond to a first level entry which does not pass the last mentioned test, and 2. forming a second layer comprising the steps of a. forming a second layer event signal representative of each of a plurality of first level entries, a different second layer event signal being formed for each different first level entry, and b. storing in said memory system a second layer vector signal corresponding to each said different first level entry, each said second layer vector signal representing the second event-time count for the corresponding first level entry.

24. A digital data processing system having a memory, means for creating a digital coded multiple layer data base in such memory comprising:

a. means for receiving, in a desired order of occurrence, and as input, a plurality of coded event signals, at least some event signals representing the same event and at least one event signal representing an event which is different from another one, said event signals, together, representing a sequence of entries, some of said entries being the same and at least one being different;

b. means for forming a first and a second event-time indication, respectively, for each said event signal and for each said entry, representing the order of occurrence thereof; and c. means for entering in the memory system a stored multi layered data base representing said input comprising 1. means for forming a first data base layer comprising means for storing in said memory retrievable first layer event-time signals representing the first event-time indications and which represent the order of occurrence of the event signals; and 2. means for forming a second data base layer comprising means for storing in said memory retrievable second layer event-time signals which represent the second event-time indications and which represent the order of occurrence of the corresponding entries.

25. A system according to claim 24 wherein said means for forming a first layer event-time signal is operative for adding an additional one of such events to existing retrievable event-time signals in the stored data base and comprises:

means for adding a representation of the first event-time indication for the additional event to a retrievable first layer event-time signal existing in said stored data base.

26. A system according to claim 25 wherein said means for forming a second layer event-time signal is operative for adding an additional one of such entries to existing event-time signals in the stored data base and comprises:

means for adding a representation of the second event-time indication for the additional entry to the retrievable second layer event-time signals existing in said stored data base.

27. A system according to claim 24 wherein said means for storing first layer event-time signals comprises:

a. means for testing to determine if a newly formed input entry is not already represented in the first data base layer; and b. said means for storing in said memory retrievable first layer event-time signals comprising means operative in response to a determination that an entry is not represented for selectively adding representations for the newly formed entry to the first data base layer.

28. A system according to claim 27 wherein said means for selective adding comprises means for adding, to the first layer retrievable event-time signals a representation of the event-time indications representing the order of occurrence of event signals in the entry which is not present.

29. A system according to claim 27 comprising:

a. means for storing in a first area of the memory system a signal indicating each different event signal that has previously been formed;

b. said means for testing comprising 1. means for testing, for each newly formed event signal, the first memory system area to thereby determine if each of the newly formed event signals is different from any of those previously formed and therefore is new;
2. means for storing a new entry indicating signal responsive to an indication by the preceding test that any event signal within the newly formed entry is new; and
3. means responding to the lack of the new entry indicating signal after forming all event signals of the newly formed entry for testing to determine if such newly formed entry is represented by said stored first layer event-time signals; and c. the means for adding the newly formed entry being responsive to the lack of presence in the last mentioned test or to the presence of the new entry indicating signal for adding the newly formed entry.

30. A system according to claim 27 wherein said means for testing comprises means for interrogating said retrievably stored first layer event-time signals.

31. A system according to claim 24 wherein the event signals of the input comprise at least one representing a delimiter, at least one such delimiter event signal being formed in each said entry and in said order of occurrence so as to define the entry boundary, the means for forming a first layer event-time signal comprising means for forming event-time signals respresenting the first event-time indications which represent the order of occurrence of such delimiter event signals.

32. A digital data processing system having a memory system, for creating a digital coded multiple layer data base in such memory system comprising:

a. means for forming, in a desired order of occurrence, and as input, a plurality of coded event signals, at least some event signals representing the same event and at least one event signal representing an event which is different from another, said event signals representing, in order of occurrence, a plurality of first level entries, said first level entries representing, in order of occurrence, at least one second level entry, some of said first level entries being the same and at least one being different;

b. means for forming a first entry delimiter signal indicating a boundary among said event signals of each said first level entry;

c. means for forming a second entry delimiter signal indicating a boundary among said first level entries of each said second level entry;

d. means for forming a first event-time indication representing the order of occurrence of each said event signal and each said first entry delimiter signal;

e. means for forming a second event-time indication representing the order of occurrence of each first entry signal and each said second delimiter signal; and f. means for entering in the memory system a stored multi layered data base representing said input and comprising 1. means for forming a first data base layer comprising means for storing in said memory system a retrievable first layer vector signal corresponding to each said different valued event signal and said first delimiter signal and including means for forming in each said first layer vector signal a representation of those first event-time indications which represent the order of occurrence of the corresponding valued event signals or said first delimiter signals; and
2. means for forming a second data base layer comprising means for storing in said memory system a plurality of retrievable second layer vector signals, those first level entries which are the same having a corresponding second layer vector signal and entries which are different each having a different corresponding second layer vector signal, at least one second level vector signal being included for said second delimiter, and means for forming in each said second layer vector signal a representation of those second event-time indications which represent the order of occurrence of the corresponding first level entries or second entry delimiter.

33. A digital data processing system having a memory system, for creating a digital coded multiple layer data base in such memory system comprising:

a. means for forming, in a desired order of occurrence, and as input, a plurality of coded event signals, at least some event signals representing the same event and at least one event signal representing an event which is different from another, said event signals representing, in order of occurrence, a plurality of first level entries, said first level entries representing, in order of occurrence, at least one second level entry, some of said first level entries being the same and at least one being different, said event signals including at least one representing, for each first level entry, a first delimiter and including at least one representing, for each second level entry, a second delimiter;

b. means for forming a first event-time indication representing the order of occurrence of each said event signal including those representing said first entry delimiter;

c. means for forming a second event-time indication representing the order of occurrence of each first entry signal including those representing said second delimiter; and d. means for entering in the memory system a stored multi layered data base representing said input comprising 1. means for forming a first data base layer comprising means for storing in said memory system a retrievable first layer vector signal corresponding to each said different valued event signal and for said first delimiter event signal and including the step of forming in each said first layer vector signal a representation of those first event-time indications which represent the order of occurrence of the corresponding valued event signals or said first delimiter event signals; and 2. means for forming a second data base layer comprising means for storing in said memory system a plurality of retrievable second layer vector signals, those first level entries which are the same having a corresponding second layer vector signal and entries which are different each having a different corresponding second layer vector signal, at least one second level vector signal being included for said second delimiter event signals, and including means for forming in each said second layer vector signal a representation of those second event-time indications which represent the order of occurrence of the corresponding first level entries or second entry delimiter signals.

34. A system according to claim 33 including means for forming said first delimiter event signal and said second delimiter event signal as a unique event signal among said event signals.

35. A system according to claim 33 wherein said means for forming in each said first layer vector signal a representation is operative for adding additional ones of such input events to existing first layer vector signals in the stored data base and comprises:

means for adding a representation of the first event-time indication for the additional event to a retrievable first layer vector signal existing in said stored data base, the first layer vector signal being the one which corresponds to such additional event.

36. A system according to claim 33 wherein said means for forming in each said second layer vector signal a representation is operative for adding an additional one of such input first level entries to existing second layer vector signals in the stored data base and comprises:

means for adding a representation of the second event-time indication for the additional second level entry to a retrievable second layer vector signal existing in said stored data base, the second layer vector signal being the one which corresponds to such additional second level entry.

37. A system according to claim 33 comprising:

a. means for inspecting the event signals and for detecting those which represent said first delimiter; and b. means for forming the next one of said event-time indications responsive to the detection of one of said detected event signals which represent said first delimiter.

38. A system according to claim 37 wherein said means for forming the next one of said event-time indications comprises means for counting said detected event signals.

39. A system according to claim 36 wherein said means for forming said first event-time indications comprises the step of counting each said detected event signal.

40. A system according to claim 33 comprising:

a. means for temporarily storing each said event signal, as it is formed, the temporarily storing means including means for storing a plurality of said event signals representing at least one first level entry;

b. means for retrieving the temporarily stored event signals from the temporary store, one by one; and c. means for forming the next one of said first event-time counts upon retrieval of each said first event signals;

said means for forming in said first layer vector signal a representation comprising means for storing a value representing that first event-time count, which is being formed, into the particular first layer vector signal which corresponds to a retrieved one of said first layer event signals.

41. A system according to claim 40 comprising:

a. means for testing the retrieved event signals for detecting ones representing said first delimiter;

said means for forming said second event-time indication comprising means for forming the next second event-time indication responsive to such detection.

42. A system according to claim 40 comprising:

means for testing the event signals for detecting one representing said second delimiter;

said means for forming in each said second layer vector signal being responsive to such detection of an event signal representing a second delimiter and to thereby store a representation of all second event-time indications for the corresponding second level entry.

43. A digital data processing system having a memory system, for structuring a digital coded data base in such memory system comprising:

a. means for forming ordered and coded input event signals representing first and second level entries, one or more input event signals representing a first level entry and one or more first level entries representing events in the second level entry, said input event signals and first level entries each including some which are the same and some which are different;

b. means for forming a first event-time count representing the order of occurrence of individual ones of said input event signals;

c. means for forming a second event-time count representing the order of occurrence of individual ones of said first level entries; and d. means for entering in the memory system a stored data base representing said input event signals comprising 2. means for forming a first layer comprising a. means for forming a first layer event signal representative of those of said input event signals which represent the same value, a different first layer event signal being formed for input event signals representing different values;

b. means for selecting a first storage area in the memory system corresponding to each said different input event signal; and c. means for selectively storing in each said first storage area a first layer vector signal which represents said first event-time counts for those of said input event signals which correspond to such first storage area, the means for selectively storing comprising means for storing only those first level entries not previously stored in the first layer and means for testing a first level entry to determine if the first event-time count for each one of the input event signals making up a first level entry is already represented in said stored first layer vector signals, and said means for selective storing comprising storing means for one or more vector signals representing only those first event-time counts which correspond to a first level entry which does not pass the last mentioned test; and 2. means for forming a second layer comprising a. means for forming a second layer event signal representative of those first level entries which represent the same value, a different second layer event signal being formed for each different valued first level entry;

b. means for selecting a second storage area in said memory system corresponding to each one of said first level entries which differs from the others; and c. means for storing in each said second storage area a second level vector signal which represents said second event-time counts for those of said first level entries which correspond to such second storage area.

44. A digital data processing system having a memory system, for structuring a digital coded data base in such memory system and for retrieving therefrom comprising:

a. means for forming different input events for the data base;

b. means for converting each input event to a unique input event signal in an input code, the coded input event signals representing first and second level entries, one or more input event signals representing a first level entry and one or more first level entries representing events in the second level entry;

c. means for creating a data base in the memory system comprising 1. means for forming a first and a second event-time count representing the order of occurrence of, respectively, said input event signals and said first level entries; and 2. means for entering in the memory system a stored data base representing said input event signals comprising a. means for forming a first layer comprising 1. means for forming a first layer event signal representative of those of said input event signals which represent the same value, a different first layer event signal being formed for input event signals representing different values, and 2. means for selectively storing in said memory system a first layer vector signal corresponding to each said different valued input event signal, each said first layer vector signal representing the first event-time counts for the corresponding valued input event signal, the means for selectively storing comprising a. means for testing to determine if the first event-time count for each one of the input event signals making up a first level entry is already represented in said stored first layer vector signals, and b. means for enabling the means for selectively storing for a first layer entry which does not pass the last mentioned test, and b. means for forming a second layer comprising 1. means for forming a second layer event signal representative of those first level entries which represent the same value, a different second layer event signal being formed for each different valued first level entry, and 2. means for storing in said memory system a second layer vector signal corresponding to each said different valued first level entry, each said second layer vector signal representing the second event-time counts for the corresponding valued first level entry;

d. means for retrieving selected data from the data base comprising 1. means for forming a request represented by a plurality of request event signals which request maybe stored in the data base, 2. means for forming a request event-time signal for each said request event signal which together represent the relative order of occurrence of said request event signals, 3. means for utilizing said request event signals and request event time signals to interrogate the memory system and locate stored data including the request, and 4. means for forming an ordered set of layer event signals representing the located data;

e. means for converting each said last formed layer event signal to an output event signal coded in the input code; and f. means for outputting the output event signals.

45. A digital data processing system having a memory system for structuring a digital coded data base in such memory system and for retrieving therefrom comprising:

a. means for forming different input data events for the data base;

b. means for converting each input data event to a unique input event signal in an input code;

c. means for creating a data base in the memory system comprising 1. means for forming for each input event signal an event-time indication which represents its relative order of occurrence;

2. means for interrogating the input event signal and forming a uniquely coded layer event signal for each different input event signal;

3. means for responding to the event-time indication and the layer event signals for forming in the memory system a data base file which comprises a separately locatable event vector signal for each different layer event signal and comprising means for forming in each such event vector signal a representation of those event-time indications which represent the order of occurrence of its layer event signal;

d. means for retrieving selected data from the data base comprising 1. means for utilizing said request event signals and request event-time signals for locating the event vector signal in the data base in the memory system which represents the same event-time value as each event-time signal to be output; and 2. means, operative for each one of the plurality of event-time signals to be output, for forming the layer event signal which corresponds to the event vector signal that has been located;

e. means for converting each said layer event signal to an output event signal coded in the input code; and f. means for outputting the output event signals.

46. A digital data processing system, having a memory system, for structuring a digital coded data base in such memory system and for retrieving therefrom comprising:

a. means for forming, in order of occurrence, a plurality of coded input event signals representing first and second level entries, one or more input event signals representing a first level entry and one or more first level entries representing events in the second level entry, said input event signals and first level entries each including some representing the same and some representing different values;

b. means for forming a first event-time count representing the order of occurrence of individual ones of said input event signals;

c. means for forming a second event-time count representing the order of occurrence of individual ones of said first level entries; and d. means for entering in the memory system a stored data base representing said input event signals comprising 1. means for forming a first layer comprising a. means for forming a first layer event signal representative of those of said input event signals which represent the same value, a different first layer event signal being formed for input event signals representing different values, and b. means for selectively storing in said memory system a first layer vector signal corresponding to each said different valued input event signal, each said first layer vector signal representing the first event-time counts for the corresponding input event signal, means for selectively storing comprising means for storing only those first level entries not previously stored in the first layer and comprising 1. means for testing a first level entry to determine if the first event-time count for each one of the input event signals making up a first level entry is already represented in said stored first layer vector signals, and said means for selective storing comprising means for storing one or more vector signals representing only those first event-time counts which correspond to a first level entry which does not pass the last mentioned test, and 2. means for forming a second layer comprising a. means for forming a second layer event signal representative of each of a plurality of first level entries, a different second layer event signal being formed for each different first level entry, and b. means for storing in said memory system a second layer vector signal corresponding to each said different first level entry, each said second layer vector signal representing the second event-time count for the corresponding first level entry.

47. A method, utilizing a digital data processing system having a memory system, for creating and retrieving a digital coded multiple layer data base in such memory system comprising the steps of:

a. forming, in a desired order of occurrence, and as input, a plurality of coded event signals, at least some event signals representing the same event and at least one event signal representing an event which is different from another one, said event signals, together, representing a sequence of entries, some of said entries being the same and at least one being different;

b. forming a first and a second event-time indication, respectively, for each said event signal and each said entry, representing the order of occurrence thereof;

c. entering in the memory system a stored multi layered data base representing said input comprising the steps of 1. forming a first data base layer representing the first event-time indications; and 2. forming a second data base layer representing the second event-time indications which in turn represent the order of occurrence of the corresponding first layer entries;

d. retrieving from the first data base layer comprising the step of forming event signals corresponding to selected first event-time indications represented by the first data base layer; and e. selectively retrieving from the second data base layer comprising the steps of 1. forming a second level event identification signal, and thereby identify a corresponding first level entry, corresponding to selected second event-time indications represented in the second data base layer; and 2. selecting the first event-time indications for use in the step of retrieving from the first data base layer including the step of selecting first event-time indications, represented in the first layer, which are within the first level entries that are identified by such formed second level event identification signal.

48. A digital data processor having a memory system, for creating and retrieving a digital coded multiple layer data base in such memory system comprising:

a. means for forming, in a desired order of occurrence, and as input, a plurality of coded event signals, at least some event signals representing the same event and at least one event signal representing an event which is different from another one, said event signals, together, representing a sequence of entries, some of said entries being the same and at least one being different;

b. means for forming a first and a second event-time indication, respectively, for each said event signal and each said entry, representing the order of occurrences thereof;

c. means for entering in the memory system a stored multi layered data base representing said input comprising 1. means for forming a first data base layer representing the first event-time indications; and
2. means for forming a second data base layer representing second event-time indications which in turn represent the order of occurrence of the corresponding first layer entries;

d. means for retrieving from the first data base layer comprising means for forming event signals corresponding to those selected first event-time indications represented by the first data base layer; and e. means for selectively retrieving from the second data base layer comprising:

1. means for forming a second level event identification signal, and thereby identify a corresponding first level entry, corresponding to selected second event-time indications represented in the second data base layer; and
2. means for selecting those first event-time indications for use by the means for retrieving from the first data base layer including means for selecting first event-time indications, represented in the first layer, which are within the first level entries that are identified by such formed second level event identification signal.

49. A data processing method of retrieving, from a memory system, data which is contained in a multiple layered data base, each layer representing an ordered sequence of events and entries in which one or more events represent each entry, in each layer some events being the same and at least one being different, each layer comprising a plurality of separately retrievable event-time signals representing an event-time value for each occurrence of the events which identify the order of occurrence of the events, said data base comprising at least first and second layers, each of a plurality of events in said second layer having a different corresponding entry in said first layer, the method comprising the steps of:

a. forming at least one second layer entry identification signal designating a selected second layer entry;

b. generating a first layer entry identification signal designating each first layer entry which corresponds to event-time values represented in the designated second layer entry; and c. generating first layer event signals corresponding to the event-time values which are represented in the designated first layer entries.

50. A method according to claim 49 wherein said step of generating first layer event signals comprises the step of ordering the first layer event signals according to the order identified by the event-time values represented in the designated first layer entries.

51. A method according to claim 49 wherein said selected second layer entry contains a plurality of said event-time values and wherein said step of generating a first layer entry identification signal comprises the step of generating one of said first layer entry identification signals for each one of said plurality of event-time values in the selected second layer entry, at least one of said entries designated by such first layer entry identification signals containing a plurality of said first layer event-time values, and wherein said step of generating first layer event signals comprises the step of generating a first layer event signal for each one of a plurality of said first layer event-time values located in each one of the entries designated by each one of the first layer entry identification signals.

52. A method according to claim 51 including the steps of:

a. ordering the first layer event signals within each entry of the first layer according to the order identified by the corresponding event-time values of the first layer; and b. ordering the event signals into entry groups according to the designated entries in the first layer and ordering such entry groups according to the order identified by the event-time values represented in the selected second layer entry.

53. A data processing method of retrieving, from a memory system, data which is contained in a multiple layered data base, each layer representing a sequence of entries, each entry having a sequence of events, some events being the same and at least one being different, said data base comprising at least first and second layers each being represented by a plurality of separately retrievable event-time signals, each said retrievable event-time signal representing at least one event-time value which in turn represents the order of occurrence of the corresponding events in the entries, each of a plurality of events n said second layer having a corresponding entry in said first layer, the method comprising the steps of:

a. interrogating selected first layer event-time signals to form at least one first layer entry identification signal which designates event-time values in the second layer;

b. interrogating the designated event-time values in the second layer to form at least one second layer entry identification signal;

c. generating first layer entry identification signals designating the first layer entries which correspond to the second layer event-time values which are represented by event-time values in the designated second layer entry; and d. generating the first layer event signals corresponding to the first layer event-time values in the identified first layer entries.

54. A data processing method of retrieving, from a memory system, data which is contained in a multiple layered data base, each layer representing a sequence of entries, each entry having a sequence of events, some events being the same and at least one being different, said data base comprising at least first and second layers each being represented by a plurality of separately retrievable event-time signals, each said retrievable event-time signal representing at least one event-time value which in turn represents the order of occurrence of the corresponding event in the entries, each of a plurality of events in said second layer having a corresponding entry in said first layer, the method comprising the steps of:

a. forming a request comprising at least one first layer event signal which designates at least one event-time value represented by the first layer event-time signal;

b. interrogating the designated event-time values in the first layer to form at least one first layer entry identification signal which designates at least one second layer event;

c. interrogating the designated event in the second layer to form at least one second layer entry identification signal;

d. generating a first layer entry identification signal designating the first layer entries which correspond to second layer event-time values in the designated second layer entry; and e. generating a first layer event signal for output corresponding to each of the first event-time values represented in the designated first layer entry.

55. A method according to claim 54 wherein a series of ordered first layer event signals are formed and including the steps of:

a. forming a delimiter signal identifying the boundary of a first level entry in the event signals; and b. responding to said delimiter signal for enabling said step of interrogating the designated event-time values.

56. A method according to claim 55 including the steps of:

a. forming a further delimiter signal identifying the boundary of a second level entry in the event signals; and b. responding to said further delimiter signal for enabling said step of interrogating the second layer.

57. A method according to calim 54 wherein a series of ordered first layer event signals are formed and including the steps of:

a. forming a delimiter signal identifying the boundary of a second level entry in the event signals; and b. responding to said delimiter signal for enabling said step of interrogating the second layer.

58. A method according to claim 54 wherein a series of ordered first layer event signals are formed and including the steps of:

a. forming in said ordered first layer event signals, a delimiter event signal which represents by position the boundary of a first level entry; and b. responding to said delimiter event signal for enabling said step of interrogating the event-time values in the first layer.

59. A method according to claim 58 including the steps of:

a. temporarily storing said first layer event signals in order;

b. reading out the temporarily stored first layer event signals in order;

c. monitoring said read out first layer event signals to detect one representing the delimiter;

the step of responding being operative in response to the detection of a first layer event signal representing a delimiter.

60. A method according to claim 54 wherein a series of ordered first layer event signals are formed and including the steps of:

a. forming in said ordered first layer event signals, a delimiter event signal which represents by position the boundary of a second level entry; and b. responding to said first layer event signal representing said delimiter for enabling said step of interrogating the second layer.

61. A method according to claim 60 including the steps of:

a. temporarily storing said first layer event signals in order;

b. reading out the temporarily stored first layer event signals in order;

c. monitoring said read out first layer event signals to detect one representing such delimiter;

the step of responding being operative in response to the detection of a first layer event signal representing a delimiter.

62. A data processing method of retrieving, from a memory system, data which is contained in a multiple layered data base, the data base representing a sequence of second level entries, each second level entry representing at least one first level entry, each first level entry representing at least one event, some first level entries being the same and at least one being different, some events being the same and at least one being different, the events including a first delimiter identifying a boundary of each first level entry and a second delimiter identifying a boundary of each second level entry, said data base comprising at least a first layer corresponding to said first level entries and a second layer corresponding to said second level entries, each layer being represented by a plurality of separately retrievable vector signals one for each different event of the corresponding layer, each said retrievable vector signal representing at least one event-time value which in turn represents the order of occurrence of the corresponding event, a vector signal being provided in said first layer for said first delimiter event and a vector signal being provided in said second layer for said second delimiter event, the data base events and first level entries forming the events and entries, respectively, in said first layer and the first level entries and second level entries forming the events and entries, respectively, in said second layer, the method comprising the steps of:

a. forming a signal designating a desired second layer entry;

b. utilizing event-time values in the second delimiter vector signal to locate the event-time values in the designated second layer entry of the second layer;

c. generating a first layer entry identification signal designating each first layer entry which corresponds to a second layer vector signal which represents at least one of the located event-time values;

d. utilizing the event-time values in the first delimiter vector signal to locate the event-time values in the designated first layer entry of the first layer; and e. generating a first layer event signal corresponding to each first layer vector signal which represents one of the located event-time values.

63. A data processing method of retrieving, from a memory system, data which is contained in a stored layered data base, said data base comprising at least first and second layers, each said first and second layer being represented by retrievable event-time signals representing one or more event-time values which in turn represent the order of occurrence of the corresponding events in the data base, the method comprising the steps of:

a. forming events representing a request, the request being composed of a series of entries, a plurality of events representing a first level entry, a plurality of first level entries representing a second level entry;

b. forming a first layer event coded signal representing each said request event in order of occurrence;

c. selecting and retrieving event-time signals from the first layer;

d. interrogating the retrieved event-time signals to form at least one first layer entry identification signal representing at least one entry in said first layer and identifying event-time values represented in the second layer event-time signals;

e. selecting and retrieving the second layer event-time signals which represents the identified first layer event-time values;

f. interrogating the event-time values represented by the retrieved second layer event-time signals to form at least one second layer entry identification signal;

g. generating first layer entry identification signals for output representing the first layer entries which, according to event-time values of the second layer, are present in a second layer entry which is identified by said at least one second layer entry identification signal, the first layer entry identification signals for output being arranged in order of occurrence in the second layer of the data base as represented by event-time values of the second layer;

h. generating first layer event coded signals for output representing the first layer events which, according to the event-time values of the first layer, are present in first layer entries of the data base which are identified by said first layer entry identification signals;

i. ordering the first layer event coded signals for output in order of occurrence, within each first layer entry, as represented by the event-time values of the first layer, ordering the entries thereof in order of occurrence as represented by event-time values of the second layer; and j. outputting said first layer event coded signals for output.

64. A data processing means for retrieving, from a memory system, data which is contained in the multiple layered data base, each layer representing an ordered sequence of events and entries in which one or more events represent each entry, in each layer some events being the same and at least one being different, each layer comprising a plurality of separately retrievable event-time signals representing an event-time value for each occurrence of events which identify the order of occurrence of the events, said data base comprising at least first and second layers, each of a plurality of events in said second layer having a different corresponding entry in said first layer, the processing means comprising:

a. means for forming at least one second layer entry identification signal designating a selected second layer entry;

b. means for generating a first layer entry identification signal designating each first layer entry which corresponds to event-time values represented in the designated second layer entry; and c. means for generating first layer event signals corresponding to the event-time values which are represented in the designated first layer entries.

65. A means according to claim 64 wherein said means for generaing first layer event signals comprises means for ordering the first layer event signals according to the order identified by the event-time values represented in the designated first layer entries.

66. A means according to claim 64 wherein said selected second layer entry contains a plurality of said event-time values and wherein said means for generating a first layer entry identification signal comprises means for generating one of said first layer entry identification signals for each one of said plurality of event-time values in the selected second layer, at least one of said entries designated by such first layer entry identification signals containing a plurality of said first layer event-time values, and wherein said means for generating first layer event signals comprises means for generating a first layer event signal for each one of a plurality of said first layer event-time values located in each one of the entries designated by each one of the first layer entry identification signals.

67. A means according to claim 66 including:

a. means for ordering the first layer event signals within each entry of the first layer according to the other identified by the corresponding event-time values of the first layer; and b. means for ordering the event signals into entry groups according to the designated entries in the first layer and ordering such entry groups according to the order identified by the event-time values represented in the selected second layer entry.

68. Data processing means for retrieving, from a memory system, data which is contained in a multiple layered data base, each layer representing a sequence of entries, each entry having a sequence of events, some events being the same and at least one being different, said data base comprising at least first and second layers each being represented by a plurality of separately retrievable event-time signals, each said retrievable evnt-time signal representing at least one event-time value which in turn represents the order of occurrence of the corresponding events in the entries, each of a plurality of events in said second layer having a corresponding entry in said first layer, the data processing means comprising:

a. means for interrogating selected first layer event-time signals to form at least one first layer entry identification signal which designates event-time values in the second layer;

b. means for interrogating the designated event-time values in the second layer to form at least one second layer entry identification signal;

c. means for generating first layer entry identification signal designating the first layer entries which correspond to the second layer event-time values which are represented by event-time values in the designated second layer entry; and d. means for generating the first layer event signals corresponding to the first layer event-time values in the identified first layer entries.

69. Data processing means for retrieving, from a memory system, data which is contained in a multiple layered data base, each layer representing a sequence of entries, each entry having a sequence of events, some events being the same and at least one being different, said data base comprising at least first and second layers each being represented by a plurality of separately retrievable event-time signals each said retrievable event-time signal representing at least one event-time value which in turn represents the order of occurrence of the corresponding event in the entries, each of a plurality of events in said second layer having a corresponding entry in said first layer, the data processing means comprising:

a. means for forming a request comprising at least one first layer event signal which designates at least one event-time value represented by the first layer event-time signal;

b. means for interrogating the designated event-time value in the first layer to form at least one first layer entry identification signal which designates at least one second layer event-time signal;

c. means for interrogating the designated event in the second layer to form at least one second layer entry identification signal;

d. means for generating a first layer entry identification signal designating the first layer entries which correspond tosecond layer event-time value in the designated second layer entry; and e. means for generating a first layer event signal for output corresponding to each of the first event-time values represented in the designated first layer entry.

70. A means according to claim 69 wherein a series of ordered first layer event signals are formed and including:

a. means for forming a delimiter signal identifying the boundary of a first level entry in the event signals; and b. means for responding to said delimiter signal for enabling said means for interrogating the designated event-time values.

71. A means according to claim 70 including:

a. means for forming a further delimiter signal identifying the boundary of a second level entry in the event signals; and b. means for responding to said further delimiter signal for enabling said means for interrogating the second layer.

72. A means according to claim 69 wherein a series of ordered first layer event signals are formed and including:

a. means for forming a delimiter signal identifying the boundary of a second level entry in the event signals; and b. means for responding to said delimiter signal for enabling said means for interrogating the second layer.

73. A means according to claim 69 wherein a series of ordered first layer event signals are formed and including:

a. means for forming in said ordered first layer event signals a delimiter event signal which represents by position the boundary of a first level entry; and b. means for responding to said delimiter event signal for enabling said means for interrogating event-time value in the first layer.

74. A means according to claim 73 including:

a. means for temporarily storing said first layer event signals in order;

b. means for reading out the temporarily stored first layer event signals in order;

c. means for monitoring said read out first layer event signals to detect one representing the delimiter;

the means for responding being operative in response to the detection of a first layer event signal representing a delimiter.

75. A means according to claim 69 wherein a series of ordered first layer event signals are formed and including:

a. means for forming in said ordered first layer event signals, a delimiter event signal which represents by position the boundary of a second level entry; and b. means responding to said first layer event signal representing said delimiter for enabling said means for interrogating the second layer.

76. A means according to claim 75 including:

a. means for temporarily storing said first layer event signals in order;

b. means for reading out the temporarily stored first layer event signals in order;

c. means for monitoring said read out first layer event signals to detect one representing such delimiter;

the means for responding being operative in response to the detection of a first layer event signal representing a delimiter.

77. A data processing method of retrieving, from a memory system, a portion of a stored data base, the data base being represented by retrievable event-time signals which represent event-time values which in turn represent the order of occurrence for corresponding events in the stored data base, the event-time values representing the order of occurrence of events which make up a series of entries each containing at least one event, the method comprising the steps of:

a. forming a request comprising a series of coded event signals representing the events of an entry;

b. interrogating selected event-time values represented in the data base to locate a data base entry containing event-time values which represent events having a selectable predetermined degree of match with the events represented by the event signals of the request and forming an entry identification signal identifying such data base entry; and c. generating coded event signals for output representing the events which, according to data base event-time values, are present in the entry of the data base which is identified by said entry identification signal, said event signals for output being arranged in order of occurrence as represented by event-time values in such entry.

78. A method according to claim 77 wherein said step of interrogating comprises the step of locating a data base entry containing event-time values which represent events which either exactly or inexactly match the events of the request.

79. A method according to claim 78, comprising the steps of:

a. forming at least one of different valued signals identifying different allowable degress of match between the events of the request and the events of an entry in the data base; and b. said step of locating comprising the step of locating a data base entry having said allowable degree of match.

80. A method according to claim 77 wherein said step of interrogating to locate an entry with a predetermined degree of match comprises the step of:

locating a data base entry which has at least a predetermined number of event-time values representing events positioned within a preselected number of event positions relative to the same events in the request.

81. A data processing method accordng to claim 80 wherein said predetermined number of events is specified by a pipe cutoff value and including the step of providing an input to the data processing system for selecting said pipe cutoff value.

82. A method according to claim 80 wherein said predetermined number of events is computed and comprising the steps of:

a. forming a pipe cutoff signal representing the predetermined number of events as a fraction of the number of events in an entry of the request;

b. forming a number of events signal for individual entries of the request, representing the number of events therein; and c. utilizing the values represented by said pipe cutoff signal and said number of events signal to form a signal representing the predetermined number of events to be used.

83. A method according to claim 80 wherein said preselected number of event-time values is specified by a pipe width value and including the step of providing an input to the data processing system for altering said pipe width value.

84. A method according to claim 80 wherein said predetermined number of events is computed, comprising the steps of:

a. forming a signal representing a pipe cutoff value which represents the predetermined number of events as a fraction of the number of events in an entry;

b. counting the number of events, which are represented by event signals, within an entry of the request;

c. computing a number value representing the product of said pipe cutoff value and the value represented by the count from the preceding step;

d. counting the number of events which are represented by event-time values in the data base and which fall within such preselected number of event positions of the same event in the request; and e. comparing the count, from the last named step of counting, with said number value and, upon a predetermined relation, forming a pass signal indicating that the corresponding entry is located;

said step of forming an entry identification signal comprising the step of forming one such signal representing an entry for which a pass signal is formed.

85. A method according to claim 84 wherein said step of forming an entry identification signal comprises the steps of:

a. forming an intermediate entry identification signal representing at least one of such located entries;

b. interrogating, within the entry identified by said at least one intermediate entry identification signal, the event-time values thereof to locate a data base entry which has at least a preselected degree of match, as to order and presence of events, with the entry of the request; and c. forming said entry identification signal representing such data base entry.

86. A method according to claim 85 additionally comprising the step of only locating those data base entries which have at last a preselected degree of match, as to number of events, as well as order and presence of events.

87. A method according to claim 85 additionally comprising the steps of:

a. storing a signal indicating if relative number of events between a request and the data base is to be accounted for; and b. responding to such stored signal for enabling the step of interrogating and locating to comprise the step of only locating a data base entry which has at last a preselected degree of match, as to number of events, as well as order and presence of events.

88. A method according to claim 87 wherein said preselected degree of match is specified by a brightness value cutoff signal and including the step of providing an input to the data processing system for selecting said brightness value cutoff signal.

89. A method according to claim 85 wherein said preselected degree of match is specified by a brightness value cutoff signal and including the step of providing an input to the data processing system for selecting said brightness value cutoff signal.

90. A method according to claim 77 wherein said step of forming an entry identification signal comprises the steps of:

a. forming an intermediate entry identification signal representing at least one of such ascertained entries;

b. further interrogating, within the entry identified by said at last one intermediate entry identification signal, the event-time values of the event-time signals to locate a data base entry which has at least a preselected degree of match, as to order and presence of events, with the entry of the request; and c. forming said entry identification signal representing such data base entry.

91. A method according to claim 90 additionally comprising the step of only locating those data base entries which have a selectable preselected degree of match, as to number of events, as well as order and presence of events.

92. A method according to claim 90 additionally comprising the steps of:

a. storing a signal indicating if relative number of events between a request and the data base is to be accounted for; and b. responding to such a stored signal for enabling the step of locating to comprise the step of only locating a data base entry which has at least a preselected degree of match, as to number of events, as well as order and presence of events.

93. A method according to claim 92 wherein said preselected degree of match is specified by a brightness value cutoff signal and including the step of providing an input to the data processing system for selecting said brightness value cutoff signal.

94. A method according to claim 90 wherein said preselected degree of match is specified by a brightnes value cutoff signal and including the step of providing an input to the data processing system for selecting said brightness value cutoff signal.

95. A method according to claim 77 wherein said step of forming an entry identification signal comprises the step of locating a data base entry which has a selectable preselected degree of match, as to order and presence of events, with the entry of the request.

96. A method according to claim 95 additionally comprising the step of only loating those data base entries which have a selectable preselected degree of match, as to number of events, as well as order and presence of events.

97. A method according to claim 77 comprising the step of selecting those event-time signals from the data base which correspond to the events represented by the event signals of the request.

98. A method according to claim 78 comprising the steps of:

a. reading out the selected retrievable event-time signals from the memory system;

b. forming an event-time value signal representing event-time values of such read out event-time signals; and the step of interrogating utilizing such formed event-time value signal for the step of interrogation of the selected event-time values.

99. A method according to claim 77 wherein the stored data base comprises at least one event-time signal whose event-time values represented thereby identify the order of occurrence of a delimiter event, an identified delimiter event defining a boundary of each of said entries, and wherein the step of interrogating comprises the step of interrogating event-time values having values between the values of two successive ones of said delimiter events to thereby determine if the corresponding entry has the predetermined degree of match.

100. A method according to claim 77 wherein the stored data base comprises at least one event-time signal whose event-time values represented thereby identify the order of occurrence of a delimiter event, an identified delimiter event defining a boundary of each of said entries, wherein the step of forming an entry identification signal comprises the steps of:

a. counting the delimiter event-time values to thereby indicate successive entries; and
b. forming a signal corresponding to the count for the entry which has such predetermined degree of match.

101. A method according to claim 77 wherein the stored data base comprises at least one event-time signal whose event-time values represented thereby identify the order of occurrence of a delimiter event, an identified delimiter event defining a boundary of each of said entries, and wherein the step of generating comprises the steps of:

a. locating a pair of successive delimiter event-time values identifying the bounds of the entry which corresponds to the entry identification signal; and
b. generating coded event signals only for event-time values which lie between such pair of successive event-time values.

102. A method according to claim 101 wherein said step of locating a pair of successive event-time values comprises the steps of:

a. counting successive delimiter event-time values until a count is reached having a predetermined relation to the value represented by the entry identification signal;
b. utilizing the delimiter event-time value corresponding to such count as one of the pair of successive event-time values.

103. A data processing method of retrieving, from a memory system, a portion of a stored data base, the data base being represented by retrievable event-time signals which represent event-time values which in turn represent the order of occurrence for correspondng events in the stored data base, the evetnt-time values representing the order of occurrence of events which make up a series of entries each containing at least one event, the method comprising the steps of:

a. forming a request comprising a series of coded event signals representing the events of an entry;
b. forming at least one further coded signal representing the relative order of occurrence of individual event signals in the entry of the request;
c. interrogating selected event-time values represented in the data base and utilizing said further coded signals in locating a data base entry containing event-time values which represent events having a predeterimed degree of match with the events represented by the event signals of the request and forming an entry identification signal identifying such data base entry; and
d. generating coded event signals for output representing the events which, according to data base event-time values, are present in the entry of the data base which is identified by said entry identification signal, said event signals for output being arranged in order of occurrence as represented by event-time values in such entry.

104. A method according to claim 103 wherein said step of interrogating to locate an entry with a predetermined degree of match comprises the step of:

a. locating a data base entry which has at leaast a predetermined number of event-time values representing event positioned within a preselected number of event positions of the same events in the request.

105. A method according to claim 104, wherein said step of forming at least one further coded signal comprises the step of forming a coded bias signal corresponding to each of at least some of said event signals of the request; the step of interrogating and locating comprising the steps of:

a. combining the value represented by each said bias signal with an event-time value, for the same event signal as for the bias signal, to thereby form biased event-time values;
b. storing a pipe width signal representing bounds of a permissible mismatch and hence the preselected number of event positions;
c. counting the number of biased signals represented values which fall within preselected bounds of each of selected possible event-time values of the data base, said preselected bounds being identified by said stored pipe width signal; and
d. the step of locating an entry including the step of utilizing the count for locating such entry which has such predetermined number of events.

106. A method according to claim 105 comprising the steps of:

a. forming a signal representing at least one possible event-time value in at least one entry of the data base; and
b. the step of counting comprising the step of utilizing the at least one possible event-time value signal to identify each such selected possible event-time value.

107. A method according to claim 106 wherein said step of interrogating and locating comprises the step of locating a data base entry containing event-time values which represent events which either exactly or inexactly match the events of the request.

108. A method according to claim 107 comprising the steps of:

a. forming at least one of different valued signals identifying different allowable degrees of match between the events of the request entry and the events of a data base entry; and
b. said step of utilizing the count for locating comprising the step of locating a data base entry having said allowable degree of match.

109. A method according to claim 104 wherein said predetermined number of event-time values is specified by a pipe cutoff value and including the step of providing an input to the data processing system for selecting said pipe cutoff value.

110. A method according to claim 104 wherein said predetermined number of event-time values is computed and comprising the steps of:

a. forming a pipe cutoff signal representing the predetermind number of event-time values as a fraction of the number of events in an entry of the request;
b. forming a number of events signal for individual entries of the request, representing the number of events therein; and
c. utilizing the values represented by said pipe cutoff signal and said number of events signal to form a signal representing the predetermined number of event-time values to be used in locating a data base entry.

111. A method according to claim 105 including the step of providing an input to the data processing system for selecting the value of said pipe width signal.

112. A method according to claim 104 wherein the step of locating a data base entry comprises the steps of:

a. forming a signal representing a pipe cutoff value which represents the predetermined number of event-time values as a fraction of the number of events in an entry;
b. counting the number of events, which are represented by event signals, within an entry of the request;
c. computing a number value representing the product of said pipe cutoff value and the value representing by the count from the preceding step;
d. counting the number of events which are represented by event-time values within a selected entry of the dafta base and which fall within such preselected number of event positions of the same event in the request; and
e. comparing the count, from the last named step of counting, with said number value and, upon a predetermined relation, forming a pass signal indicating that the corresponding entry is ascertained;

said step of forming an entry identification signal comprising the step of forming one such signal representing such selected entry responsive to such pass signal.

113. A method according to claim 103 wherein said step of forming an entry identification signal comprises the steps of:

a. forming an intermediate entry identification signal representing at least one of such ascertained entries;
b. interrogating, within the data base entry identified by said at least one intermediate entry identification signal to locate a data base entry which has at least a preselected degree of match, as to order and presence of events, with the entry of the request; and
c. forming said entry identification signal representing such data base entry.

114. A method according to claim 113 wherein the step of locating additionally comprises the step of only locating those data base entries which have at least a preselected degree of match, as to number of events, as well as order and presence of events.

115. A method according to claim 113 wherein the step of locating additionally comprises the steps of:

a. storing a signal indicating if relative number of events between a request and the data base is to be accounted for; and
b. responding to such a stored signal for enabling the step of locating to comprise the step of only ascertaining a data base entry which has at least a preselected degree of match, as to number of events, as well as order and presence of events.

116. A method according to claim 115 wherein said preselected degree of match is specified by a brightness value cutoff signal and including the step of providing an input to the data processing system for selecting said brightness value cutoff signal.

117. A method according to claim 113 wherein said preselected degree of match is specified by a brightness value cutoff signal and including the step of providing an input to the data processing system for selecting said brightness value cutoff signal.

118. A method according to claim 112 wherein said step of forming an entry identification signal comprises the steps of:

a. forming an intermediate entry identification signal representing at least one of such ascertained entries;
b. interrogating, within the entry identified by said at least one intermediate entry identification signal, the event-time values of the selected event-time signals to locate a data base entry which has at least a preselected degree of match, as to order and presence of events, with the entry of the request; and
c. forming said entry identification signal representing such data base entry.

119. A method according to claim 118 wherein the step of locating additionally comprises the step of only locating those data base entries which have at least a preselected degree of match, as to number of events, as well as order and presence of events.

120. A method according to claim 118 wherein the step of locating additionally comprises the steps of:

a. storing a signal indicating if relative number of events between a request and the data base is to be accounted for; and
b. responding to such a stored signal for enabling the step of locating to comprise the step of only ascertaining a data base entry which has at least a preselected degree of match, as to number of events, as well as order and presence of events.

121. A method according to claim 120 wherein said preselected degree of match is specified by a brightness value cutoff signal and including the step of providing an input to the data processing system for specifying said brightness value cutoff signal.

122. A method according to claim 118 wherein said preselected degree of match is specified by a brightness value cutoff signal and including the step of providing an input to the data processing system for specifying said brightness value cutoff signal.

123. A data processing method of retrieving, from a memory system, a portion of a stored data base, the data base being represented by a separately retrievable vector signal for each one of a plurality of different valued events, events of the same value being represented by the same retrievable vector signal, each said vector signal representing at least one event-time value each of which in turn represents the order of occurrence of the corresponding event in the stored data base, the vector signals representing a series of entries each containing at least one event, at least one vector signal having event-time values which identify the order of occurrence of a delimiter event, an identified delimiter event defining a boundary of each of said entries, the method comprising the steps of:

a. forming a request comprising a series of coded event signals representing the events of an entry;
b. forming at least one further coded signal representing the relative order of occurrence of individual event signals in the entry of the request;
c. interrogating selected vector signals, which correspond to the events of the request, and comprising the step of utilizing said further coded signals and event-time values from the delimiter event vector signal in locating an entry containing event-time values which represent events having a predetermined degree of match with the events represented by the event signal of the request and forming an entry identification signal identifying such entry; and
d. generating coded event signals for output representing the event which, according to data base event-time values, are present in the entry of the data base which is identified by said entry identification signal, said event signals for output arranged in order of occurrence as represented by event-time values in such entry.

124. A method according to claim 123 wherein said step of locating an entry with a predetermined degree of match comprises the steps of:
a. utilizing at least one event-time value from the delimiter event vector signal to locate the event-time values of a data base entry; and
b. interrogating the located event-time values to ascertain whether there is at least a predetermined number of event-time values representing events positioned within a preselected number of event positions of the same events in the request.

125. A method according to claim 124 wherein said step of forming at least one further coded signal comprises the step of forming a coded bias signal corresponding to each of at least some of said event signals of the request; the step of locating comprising the steps of:
a. combining the value represented by each said bias signal with an event-time value in the selected vector signal, for the same event signal as for the bias signal, to thereby form biased event-time values;
b. storing a pipe width signal representing bounds of a permissible mismatch and hence the preselected number of event positions;
c. counting the number of biased signals representing values which fall within preselected bounds of each of selected possible event-time values of the data base, said preselected bounds being identified by said stored pipe width signal; and
d. utilizing the count for locating such entry which has such predetermined number of events.

126. A method according to claim 125 comprising the steps of:
a. utilizing at least one pair of successive event-time values from the delimiter vector signal for forming a signal representing at least one possible event-time value located within limits represented by said pair and hence within at least one entry of the data base; and
b. the step of counting comprising the step of utilizing the at least one possible event-time value signal to identify each such selected possible event-time value.

127. A method according to claim 126 wherein said step of interrogating and locating comprises the step of:

a. locating a data base entry containing event-time values which represent events which may not exactly match the events of the request.

128. A method according to claim 127 comprising the steps of:
a. forming a signal identifying an allowable degree of match between the events of the request entry and the events of a data base entry; and
b. said step of utilizing the count for locating comprising the step of locating a data base entry having said allowable degree of match.

129. A method according to claim 124 wherein said predetermined number of event-time values is specified by a pipe cutoff value and including the step of providing an input of the data processing system for altering said pipe cutoff value.

130. A method according to claim 124 wherein said predetermined number of event-time values is computed and comprising the steps of:
a. forming a pipe cutoff signal representing the predetermined number of event-time values as a fraction of the number of events in an entry of the request;
b. forming a number of events signal for individual entries of the request, representing the number of events therein; and
c. utilizing the values represented by said pipe cutoff signal and said number of events signal to form a signal representing the predetermined number of event-time values to be used in locating a data base entry.

131. A method according to claim 125 including the step of providing an input to the data processing system for altering the value of said pipe width signal.

132. A method according to claim 124 wherein the step of locating a data base entry comprises the steps of:
a. forming a signal representing a pipe cutoff value which represents the predetermined number of event-time values as a fraction of the number of events in an entry;
b. counting the number of events, which are respesented by event signals, within an entry of the request;
c. computing a number value representing the product of said pipe cutoff value and the value represented by the count from the preceding step;
d. utilizing at least one pair of successive event-time values from the delimiter vector signal for forming a signal representing at least one possible event-time value located within limits represented by said pair and hence within at least one entry of the data base;
e. counting the number of events which are represented by event-time values within a selected entry of the data as defined by said pair of successive event-time values and which fall within such preselected number of event positions of the same event in the request; and
f. comparing the count, from the last named step of counting, with said number value and, upon a predetermined relation, forming a pass signal indicating that the corresponding entry is ascertained;

said step of forming an entry identification signal comprising the steps of:
a. counting the event-time values represented by the delimiter vector signal to form a count corresponding to each said data base entry; and b. utilizing said count for forming an entry signal representing the at least one entry responsive to such pass signal.

133. A data processing method of retrieving, from a memory system, a portion of a stored data base, the data base being represented by retrievable event-time signals which represent event-time values which in turn represent the order of occurrence of the corresponding events in the stored data base, the event-time signals representing the order of occurrence of events which make up a series of entries each containing at least one event, the method comprising the steps of:

a. forming a request comprising a series of coded event signals representing the events of an entry;

b. forming at least one signal identifying an allowable degree of match between the events of the request and the events of an entry in the data base;

c. locating a data base entry containing event-time values which represent events which either exactly or inexactly match the events of the request, comprising the steps of:

1. interrogating selected data base event-time values for locating at least one data base entry which has at least a predetermined number of event-time values representing events positioned within a preselected number of event positions relative to the same events in the request, 2. forming an intermediate entry identification signal identifying said at least one data base entry, 3. further interrogating, within the data base entry identified by said at least one intermediate entry identification signal to locate a data base entry which has at least a preselected degree of match, as to order and presence of events, with the entry of the request, and 4. forming an entry identification signal representing the last located data base entry; and d. generating coded event signals for output representing the events which, according to data base event-time values, are present in the entry of the data base which is identified by said entry identification signal, said event signals for output being arranged in order of occurrence as represented by event-time values in such entry.

134. A method according to claim 133 wherein said step of further interrogating may locate plural entries and wherein said step of forming an entry identification signal comprises the step of:

a. forming an entry identification signal representing each of said plural entries.

135. A method according to claim 134 comprising the step of:

a. computing a value for each said entry identification signal representing the actual degree of match as to order and presence of events between the corresponding data base entry and the entry of the request.

136. A method according to claim 135 comprising the step of:

a. ordering the entry identification signals in order by the corresponding degree of match value.

137. A method according to claim 136 comprising the step of storing the ordered entry identification signals in such order together each with a signal representing the degree of match value.

138. A method according to claim 136 wherein said step of generating comprises the step of performing said step of generating coded signals for output representing each data base entry identification by each said entry identification signal and in sequence according to said ordering.

139. A method according to claim 133 wherein said step of generating comprises the step of generating an event signal for each of a plurality of event-time values in an entry which contains a greater number of event-time values than there are events in the original request.

140. A data processing method of retrieving, from a memory system, data which is contained in a multiple layered data base, each layer representing an ordered sequence of entries and events in which one or more events represent each entry, in each layer some such events being the same and at least one being different, each layer comprising retrievable event-time signals which represent event-time values which in turn identify the order of occurrence of the corresponding events, said data base comprising at least first and second layers, each of a plurality of events in said second layer having a corresponding entry in said first layer, the method comprising the steps of:

a. forming a request comprising plural entries, each entry being represented by a least one coded event signal, the entries and events being ordered in order of occurrence;

b. interrogating the first data base layer and locating, for each of a plurality of the request entries, at least one first layer entry having event-time values which represent events bearing at least a predetermined degree of match to events represented by the corresponding request event;

c. interrogating those second layer even-time values for events which correspond to the located first layer entries to locate at least one second layer entry containing event-time values which represent first layer entries having a predetermined degree of match with the request entries;

d. generating a first layer entry identification signal representing each first layer entry (second layer event) which, according to second layer event-time values, are present in the located second layer entry; and e. generating a first layer event signal corresponding to each event-time value contained in each first layer entry which is identified by each said first layer entry identification signal.

141. A method according to claim 140 comprising the steps of:

a. ordering the generated first layer event signals, within each entry, according to the corresponding first layer event-time values; and b. ordering entries which comprise said event signals according to the corresponding second layer event-time values.

142. A method according to claim 140 wherein said step of interrogating and locating a second layer entry comprises the step of:

a. locating a second layer entry containing second layer event-time values which represent first layer entries which either exactly or inexactly match the entries of the request.

143. A method according to claim 142 comprising the steps of:

a. forming at least one of different valued signals representing different allowable degrees of match between the entries of the request and the first layer entries represented by second layer data base entries; and b. said step of interrogating and locating a second layer entry comprising the step of locating a second layer entry having at least said allowable degree of match.

144. A method according to claim 140 wherein said step of interrogating and locating second layer entries comprises the step of:

a. locating a second layer entry which has at least a predetermined number of event-time values representing first layer entries (second layer events) positioned within a preselected number of entry positions relative to the corresponding entries in the request.

145. A data processing method according to claim 144 wherein said predetermined number of entries is specified by a pipe cutoff value and including the step of providing an input to the data processing system for selecting said pipe cutoff value.

146. A method according to claim 144 wherein said predetermined number of entries is computed and comprising the steps of:

a. forming a pipe cutoff signal representing the predetermined number of entries as a fraction of the number of entries in the request;
b. forming a number of entries signal for individual entries of the request, representing the number of entries therein; and
c. utilizing the values represented by said pipe cutoff signal and said number of entries signal to form a signal representing the predetermined number of entries to be used.

147. A method according to claim 144 wherein said preselected number of entry positions is specified by a pipe width value and including the step of providing an input to the data processing system for selecting said pipe width value.

148. A method according to claim 144 wherein said predetermined number of entries is computed, comprising the steps of:

a. forming a signal representing a pipe cutoff value which represents the predetermined number of entries as a fraction of the number of entries in the request;
b. counting the number of entries in the request;
c. computing a number value representing the product of said pipe cutoff value and the value represented by the count from the preceding step;
d. counting the number of first layer entries which are represented by second layer event-time values and which fall within such preselected number of entry positions of the same entry in the request; the second layer event-time values being those represented by the located first layer entries; and
e. comparing the counts, from the last named step of counting, with said number value for a predetermined relation indicating that the corresponding second layer entry is a located one.

149. A method according to claim 148 wherein the second layer entry that is recited as being located is an intermediate second layer entry, and comprising the step of:

a. further interrogating, within the located at least one intermediate second layer entry among the event-time values of the second layer event-time signals which correspond to the located first layer entry, to thereby locate a second layer entry which has at least a preselected degree of match, as to order and presence of first layer entries represented thereby, with the entries of the request, such located second layer entry being the one used in the step of generating a first layer entry identification signal.

150. A method according to claim 149 additionally comprising the step of only locating those second layer entries which have at least a preselected degree of match, as to number of represented first layer entries, as well as order and presence of entries.

151. A method according to claim 149 additionally comprising the steps of:

a. storing a signal indicating if relative number of entries between a request and the data base is to be accounted for; and
b. responding to such a stored signal for enabling the step of interrogating and locating to comprise the step of only locating a data base entry which has at least a preselected degree of match, as to number of represented first layer entries, as well as order and presence of entries.

152. A method according to claim 151 wherein said preselected degree of match is specified by a brightness value cutoff signal and including the step of providing an input to the data processing system for selecting said brightness value cutoff signal.

153. A method according to claim 149 wherein said preselected degree of match is specified by a brightness value cutoff signal and including the step of providing an inut to the data processing system for selecting said brightness value cutoff signal.

154. A method according to claim 140 wherein said step of interrogating and locating comprises the step of:

a. locating a second layer data base entry which has at least a preselected degree of match, as to order and presence of entries, with the request.

155. A method according to claim 154 wherein the step of locating additionally comprises the step of only locating those data base entries which have at least a preselected degree of match, as to number of events, as well as order and presence of events.

156. A method according to claim 140 additionally comprising the steps of:

a. storing a signal indicating if relative number of entries between a request and the data base is to be accounted for; and
b. responding to such a stored signal for enabling the step of interrogating and locating to comprise the step of only locating a data base entry which has at least a preselected degree of match, as to number of entries, as well as order and presence of entries.

157. A method according to claim 154 wherein said preselected degree of match is specified by a brightness value cutoff signal and including the step of providing an input to the data processing system for selecting said brightness value cutoff signal.

158. A method according to claim 152 wherein said preselected degree of match is specified by a brightness value cutoff signal and including the step of providing an input to the data processing system for selecting said brightness value cutoff signal.

159. A method according to claim 140 comprising the steps of forming signals representing the boundaries of said second layer entries, and wherein the step of interrogating the second layer event -time values signals comprises the step of interrogating second layer event-time values representing occurrences of events which lie between the values represented by two successive ones of said boundary signals to thereby determine if the corresponding second layer entry has the predetermined degree of match.

160. A method according to claim 140 wherein the stored data base comprises at least one event-time signal whose event-time values represent the order of occurrence of delimiter events, at least one delimiter event defining a boundary of each of said second layer entries, and wherein the step of forming an entry identification signal comprises the steps of:

a. counting the event-time values of the delimiter event-time values to thereby indicate successive entries; and
b. forming a signal corresponding to the count for the second layer entry which has such predetermined degree of match.

161. A method according to claim 144 wherein the stored data base comprises at least one event-time signal whose event-time values represent the order of occurrence of delimiter events, at least one delimiter event defining a boundary of each of said entries, and wherein the step of generating comprises the steps of:

a. locating a pair of successive event-time values in such at least one delimiter event-time signal identifying the bounds of the located second layer entry; and
b. generating first layer entry identification signals only for second layer event-time values which lie between such pair of successive event-time values.

162. A method according to claim 161 wherein said step of locating a pair of successive event-time values comprises the steps of:

a. counting successive event-time values of the at least one delimiter event-time signal until a count is reached having a predetermined relation to the located second layer entry; and
b. utilizing the delimiter event-time value corresponding to such count as one of the pair of successive event-time values.

163. A method according to claim 140 comprising the step of forming at least one further coded signal representing the order of occurrence of individual entries in the request, the step of interrogating including the step of utilizing said further coded signal to locate the at least one second layer entry.

164. A method according to claim 163 wherein said step of forming at least one further coded signal comprises the step of forming a coded bias signal corresponding to each of at least some of said entries of the request, the step of interrogating and locating at least one second layer entry comprising the steps of:

a. combining the value represented by each said bias signal with a second layer event-time value to thereby form biased event-time values;
b. storing a pipe width signal representing bounds of a permissible mismatch and hence the preselected number of entry positions;
c. counting the numbr of biased signals representing values which fall within preselected bounds of each of selected possible second layer event-time values, said preselected bounds being identified by said stored pipe width signal; and
d. the step of locating an entry including the step of utilizing the count for locating such second layer entry which represents such predetermined number of first layer entries.

165. A method according to claim 164 comprising the steps of:

a. forming a signal representing at least one possible second layer event-time value in at least one second layer entry of the data base; and
b. the step of counting comprising the step of utilizing the at least one possible event-time value signal to identify each such selected possible event-time value.

166. A data processing means for retrieving, from a memory system, a portion of a stored data base, the data base being represented by retrievable event-time signals which represent event-time values which in turn represent the order of occurrence of the corresponding event in the stored data base, the event-time values representing the order of occurrence of a series of entries each containing at least one event, the processing means comprising:

a. means for forming a request comprising a series of coded event signals representing the events of an entry;
b. means for interrogating selected event-time values represented in the data base to locate a data base entry containing event-time values which represent events having a selectable predetermined degree of match with the events represented by the event signals of the request and forming an entry identification signal identifying such data base entry; and
c. means for generating coded event signals for output representing the events which, according to data base event-time values, are present in the entry of the data base which is identified by said entry identification signal, said event signals for output being arranged in order of occurrence as represented by event-time values in such entry.

167. A means according to claim 166 wherein said means for interrogating comprises means for locating a data base entry containing event-time values which represent events which either exactly or inexactly match the events of the request.

168. A means according to claim 167 comprising:

a. means for forming at least one of different valued signals identifying different allowable degrees of match between the events of the request and the events of an entry in the data base; and
b. said means for locating comprising means for locating a data base entry having said allowable degree of match.

169. A means according to claim 166 wherein said means for interrogating to locate an entry with a predetermined degree of match comprises means for locating a data base entry which has at least a predetermined number of event-time values representing events positioned within a preselected number of event positions relative to the same events in the request.

170. A means according to claim 169 wherein said predetermined number of events is specified by a pipe cutoff value and including means for providing an input to the data processing system for selecting said pipe cutoff value.

171. A means according to claim 169 wherein said predetermined number of events is computed and comprising:

a. means for forming a pipe cutoff signal representing the predetermined number of events as a fraction of the number of events in an entry of the request;
b. means for forming a number of events signal for individual entries of the request, representing the number of events therein; and c. means for utilizing the values represented by said pipe cutoff signal and said number of events signal to form a signal representing the predetermined number of events to be used.

172. A means according to claim 169 wherein said preselected number of event-time values is specified by a pipe width value and including means for providing an input to the data processing system for altering said pipe width value.

173. A means according to claim 169 wherein said predetermined number of events is computed, comprising:

a. means for forming a signal representing a pipe cutoff value which represents the predetermined number of events as a fraction of the number of events in an entry;

b. means for counting the number of events, which are represented by event signals, within an entry of the request;

c. means for computing a number value representing the product of said pipe cutoff value and the value represented by the count from the preceding step;

d. means for counting the number of events which are represented by event-time values in the data base and which fall within such preselected number of event positions of the same event in the request; and e. means for comparing the count, from the last named step of counting, with said number value and, upon a predetermined relation, forming a pass signal indicating that the corresponding entry is located;

said means for forming an entry identification signal comprising the means for forming one such signal representing an entry for which a pass signal is formed.

174. A means according to claim 173 wherein said means for forming an entry identification signal comprises the steps of:

a. means for forming an intermediate entry identification signal representing at least one of such located entries;

b. means for interrogating, within the entry identified by said at least one intermediate entry identification signal, the event-time values thereof to locate a data base entry which has at least a preselected degree of match, as to order and presence of events, with the entry of the request; and c. means for forming said entry identification signal representing such data base entry.

175. A means according to claim 174 additionally comprising means for only locating those data base entries which have at least a preselected degree of match, as to number of events, as well as order and presence of events.

176. A means according to claim 174 additionally comprising:

a. means for storing a signal indicating if relative number of events between a request and the data base is to be accounted for; and b. means for responding to such a stored signal for enabling the step of interrogating and locating to comprise the means for only locating a data base entry which has at least a preselected degree of match, as to number of events, as well as order and presence of events.

177. A means according to claim 176 wherein said preselected degree of match is specified by a brightness value cutoff signal and including means for providing an input to the data processing system for selecting said brightness value cutoff signal.

178. A means according to claim 174 wherein said preselected degree of match is specified by a brightness value cutoff signal and including means for providing an input to the data processing system for selecting said brightness value cutoff signal.

179. A means according to claim 166 wherein said means for forming an entry identification signal comprises:

a. means for forming an intermediate entry identification signal representing at least one of such located entries;

b. means for further interrogating, within the entry identified by said at least one intermediate entry identification signal, the event-time values of the event-time signals to locate a data base entry which has at least a preseleted degree of match, as to order and presence of events, with the entry of the request; and c. means for forming said entry identification signal representing such data base entry.

180. A means according to claim 179 additionally comprising means for only locating those data base entries which have a selectable preselected degree of match, as to number of events, as well as order and presence of events.

181. A means according to claim 179 additionally comprising:

a. means for storing a signal indicating if relative number of events between a request and the data base is to be accounted for; and b. means for responding to such a stored signal for enabling the step of locating to comprise the step of only locating a data base entry which has at least a preselected degree of match, as to number of events, as well as order and presence of events.

182. A means according to claim 181 wherein said preselected degree of match is specified by a brightness value cutoff signal and including means for providing an input to the data processing system for selecting said brightness value cutoff signal.

183. A means according to claim 179 wherein said preselected degree of match is specified by a brightness value cutoff signal and including means for providing an input to the data processing system for selecting said brightness value cutoff signal.

184. A means according to claim 166 wherein said means for forming an entry identification signal comprises means for locating a data base entry which has at least a selectable preselected degree of match, as to order and presence of events, with the entry of the request.

185. A means according to claim 184 additionally comprising means for only locating those data base entries which have a selectable preselected degree of match, as to number of events, as well as order and presence of events.

186. A means according to claim 166 comprising means for selecting those retrievable event-time signals from the data base which correspond to the events represented by the event signals of the request.

187. A means according to claim 167 comprising:

a. means for reading out the selected retrievable event-time signals from the memory system;

b. means for forming an event-time value signal representing event-time values of such read out event-time signals; and the means for interrogating utilizing such formed event-time value signal for the step of interrogation of the selected event-time values.

188. A means according to claim 166 wherein the stored data base comprises at least one event-time signal whose event-time values represented thereby identify the order of occurrence of a delimiter event, an identified delimiter event defining a boundary of each of said entries, and wherein the means for interrogating comprises means for interrogating event-time values having values between the values of two successive ones of said delimiter events to thereby determine if the corresponding entry has the predetermined degree of match.

189. A means according to claim 166 wherein the stored data base comprises at least one event-time signal whose event-time values represented thereby identify the order of occurrence of a delimiter event, an identified delimiter event defining a boundary of each of said entries, wherein the means for forming an entry identification signal comprises:

a. means for delimiter event-time values to thereby indicate successive entries; and
b. means for forming a signal corresponding to the count for the entry which has such predetermined degree of match.

190. A means according to claim 166 wherein the stored data base comprises at least one event-time signal whose event-time values represented thereby identify the order of occurrence of a delimiter event, an identified delimiter event defining a boundary of each of said entries, and wherein the means for generating comprises:

a. means for locating a pair of successive delimiter event-time values identifying the bounds ot the entry which corresponds to the entry identification signal; and
b. means for generating coded event signals only for event-time values which lie between such pair of successive event-time values.

191. A means according to claim 190 wherein said step of locating a pair of successive event-time values comprises:

a. means for counting successive delimiter event-time values until a count is reached having a predetermined relation to the value represented by the entry identification signal; and
b. means for utilizing the delimiter event-time value corresponding to such count as one of the pair of successive event-time values.

192. A data processing means for retrieving, from a memory system, a portion of a stored data base, the data base being represented by retrievable event-time signals which represent event-time values which in turn represent the order of occurrence for corresponding events in the stored data base, the event-time values representing the order of occurrence of events which make up a series of entries each containing at least one event, the processing means comprising:

a. means for forming a request comprising a series of coded event signals representing the events of an entry;
b. means for forming at least one further coded signal representing the relative order of occurrence of individual event signals in the entry of the request;
c. means for interrogating event-time values represented in the data base and utilizing said further coded signals in locating a data base entry containing event-time values which represent events having a predetermined degree of match with the events represented by the event signals of the request and forming an entry identification signal identifying such data base entry; and
d. means for generating coded event signals for output representing the events which, according to data base event-time values, are present in the entry of the data base which is identified by said entry identification signal, said event signals for output being arranged in order of occurrence as represented by event-time values in such entry.

193. A means according to claim 192 wherein said means for interrogating to locate an entry with a predetermined degree of match comprises means for locating a data base entry which has at least a predetermined number of event-time values representing events positioned within a preselected number of event positions of the same events in the request.

194. A means according to claim 193 wherein said means for forming at least one further coded signal comprises the step of forming a coded bias signal corresponding to each of at least some of said event signals of the request, the means for interrogating and locating comprising:

a. means for combining the value represented by each said bias signal with an event-time value, for the same event signal as for the bias signal, to thereby form biased event-time values;
b. means for storing a pipe width signal representing bounds of a permissible mismatch and hence the preselected number of event positions;
c. means for counting the number of biased signals representing values which fall within preselected bounds of each of selected possible event-time values of the data base, said preselected bounds being identified by said stored pipe width signal; and
d. the means for locating an entry including means for utilizing the count for locating such entry which has such predetermined number of events.

195. A means according to claim 194 comprising:

a. means for forming a signal representing at least one possible event-time value in at least one entry of the data base; and
b. the means for counting comprising means for utilizing the at least one possible event-time value signal to identify each such selected possible event-time value.

196. A means according to claim 195 wherein said means for interrogating and locating comprises means for locating a data base entry containing event-time values which represent events which either exactly or inexactly match the events of the request.

197. A means according to claim 196 comprising:

a. means for forming at least one of different valued signals identifying different allowable degrees of match between the events of the request entry and the events of a data base entry; and
b. said means for utilizing the count for locating comprising means for locating a data base entry having said allowable degree of match.

198. A means according to claim 193 wherein said predetermined number of event-time values is specified by a pipe cutoff value and including means for providing an input to the data processing system for selecting said pipe cutoff value.

199. A means according to claim 193 wherein said predetermined number of event-time values is computed and comprising:

a. means for forming a pipe cutoff signal representing the predetermined number of event-time values as a fraction of the number of events in an entry of the request;
b. means for forming a number of events signal for individual entries of the request, representing the number of events therein; and
c. means for utilizing the values represented by said pipe cutoff signal and said number of events signal to form a signal representing the predetermined number of event-time values to be used in locating a data base entry.

200. A means according to claim 194 including means for providing an input to the data processing system for selecting the value of said pipe width signal.

201. A means according to claim 193 wherein means for locating a data base entry comprises:
a. means for forming a signal representing a pipe cutoff value which represents the predetermined number of event-time values as a fraction of the number of events in an entry;
b. means for counting the number of events, which are represented by event signals, within an entry of the request;
c. means for computing a number value representing the product of said pipe cutoff value and the value represented by the count from the preceding step;
d. means for counting the number of events which are represented by event-time values within a selected entry of the data base and which fall within such preselected number of event positions of the same event in the request; and
e. means for comparing the count, from the last named step of counting, with said number value and, upon a predetermined relation, forming a pass signal indicating that the corresponding entry is ascertained;

said means for forming an entry identification signal comprising means for forming one such signal representing such selected entry responsive to such pass signal.

202. A means according to claim 193 wherein said means for forming an entry identification signal comprises:
a. means for forming an intermediate entry identification signal representing at least one of such ascertained entries;
b. means for interrogating, within the data base entry identified by said at least one intermediate entry identification signal to locate a data base entry which has at least a preselected degree of match, as to order and presence of events, with the entry of the request; and
c. means for forming said entry identification signal representing such data base entry.

203. A means according to claim 202 wherein the means for locating additionally comprises means for only locating those data base entries which have at least a preselected degree of match, as to number of events, as well as order and presence of events.

204. A means according to claim 202 wherein the means for locating additionally comprises:
a. means for storing a signal indicating if relative number of events between a request and the data base is to be accounted for; and
b. means for responding to such a stored signal for enabling the means for locating to comprise means for only ascertaining a data base entry which has at least a preselected degree of match, as to number of events, as well as order and presence of events.

205. A means according to claim 204 wherein said preselected degree of match is specified by a brightness value cutoff signal and including means for providing an input to the data processing system for selecting said brightness value cutoff signal.

206. A means according to claim 202 wherein said preselected degree of match is specified by a brightness value cutoff signal and including means for providing an input to the data processing system for selecting said brightness value cutoff signal.

207. A means according to claim 202 wherein said means for forming an entry identification signal comprises:
a. means for forming an intermediate entry identification signal representing at least one of such ascertained entries;
b. means for interrogating, within the entry identified by said at least one intermediate entry identification signal, the event-time values of the selected event-time signals to locate a data base entry which has at least a preselected degree of match, as to order and presence of events, with the entry of the request; and
c. means for forming said entry identification signal representing such data base entry.

208. A means according to claim 207 wherein the means for locating additionally comprises means for only locating those data base entries which have at least a preselected degree of match, as to number of events, as well as order and presence of events.

209. A means according to claim 207 wherein the means for locating additionally comprises:
a. means for storing a signal indicating if relative number of events between a request and the data base is to be accounted for; and
b. means for responding to such a stored signal for enabling the means for locating to only ascertain a data base entry which has at least a preselected degree of match, as to number of events, as well as order and presence of events.

210. A means according to claim 209 wherein said preselected degree of match is specified by a brightness value cutoff signal and including means for providing an input to the data processing system for specifying said brightness value cutoff signal.

211. A means according to claim 207 wherein said preselected degree of match is specified by a brightness value cutoff signal and including means for providing an input to the data processing system for specifying said brightness value cutoff signal.

212. A data processing means for retrieving, from a memory system, a portion of a stored data base, the data base being represented by a separately retrievable vector signal for each one of a plurality of different valued events, events of the same value being represented by the same retrievable vector signal, each said vector signal representing at least one event-time value each of which in turn represents the order of occurrence of the corresponding event in the stored data base, the vector signals representing a series of entries each containing at least one event, at least one vector signal having event-time values which identify the order of occurrence of a delimiter event, an identified delimiter event defining a boundary of each of said entries, the means comprising:

a. means for forming a request comprising a series of coded event signals representing the events of an entry;
b. means for forming at least one further coded signal representing the relative order of occurrence of individual event signals in the entry of the request;
c. means for interrogating selected vector signals, which correspond to the events of the request, and comprising means for utilizing said further coded signals and event-time values from the delimiter event vector signal in locating an entry containing event-time values which represent events having a predetermined degree of match with the events represented by the event signals of the request and forming an entry identification signal identifying such entry; and
d. means for generating coded event signals for output representing the event which, according to data base event-time values, are present in the entry of the data base which is identified by said entry identification signal, said event signals for output being arranged in order of occurrence as represented by event-time values in such entry.

213. A means according to claim 212 wherein said means for locating an entry with a predetermined degree of match comprises:
a. means for utilizing at least one event-time value from the delimiter event vector signal to locate the event-time values of a data base entry; and
b. means for interrogating the located event-time values to ascertain whether there is at least a predetermined number of event-time values representing events positioned within a preselected number of event positions of the same events in the request.

214. A means according to claim 213 wherein said means for forming at least one further coded signal comprises means for forming a coded bias signal corresponding to each of at least some of said event signals of the request, the means for locating comprising:
a. means for combining the value represented by each said bias signal with an event-time value in the selected vector signal, for the same event signal as for the bias signal, to thereby form biased event-time values;
b. means for storing a pipe width signal representing bounds of a permissible mismatch and hence the preselected number of event positions;
c. means for counting the number of biased signals representing values which fall within preselected bounds of each of selected possible event-time values of the data base, said preselected bounds being identified by said stored pipe width signal; and
d. means for utilizing the count for locating such entry which has such predetermined number of events.

215. A means according to claim 214 comprising:
a. means for utilizing at least one pair of successive event-time values from the delimiter vector signal for forming a signal representing at least one possible event-time value located within limits represented by said pair and hence within at least one entry of the data base; and
b. the means for counting comprising means for utilizing the at least one possible event-time value signal to identify each such selected possible event-time value.

216. A means according to claim 215 wherein said means for interrogating and locating comprises means for locating a data base entry containing event-time values which represent events which may not exactly match the events of the request.

217. A means according to claim 216 comprising:
a. means for forming a signal identifying an allowable degree of match between the events of the request entry and the events of a data base entry; and
b. said means for utilizing the count for locating comprising means for locating a data base entry having said allowable degree of match.

218. A means according to claim 213 wherein said predetermined number of event-time values is specified by a pipe cutoff value and including means for providing an input to the data processing system for altering said pipe cutoff value.

219. A means according to claim 213 wherein said predetermined number of event-time values is computed and comprises:
a. means for forming a pipe cutoff signal representing the predetermined number of event-time values as a fraction of the number of events in an entry of the request;
b. means for forming a number of events signal for individual entries of the request, representing the number of events therein; and
c. means for utilizing the values represented by said pipe cutoff signal and said number of events signal to form a signal representing the predetermined number of event-time values to be used in locating a data base entry.

220. A means according to claim 214 including means for providing an input to the data processing means for altering the value of said pipe width signal.

221. A means according to claim 213 wherein the means for locating a data base entry comprises:
a. means for forming a signal representing a pipe cutoff value which represents the predetermined number of event-time values as a fraction of the number of events in an entry;
b. means for counting the number of events, which are represented by event signals, within an entry of the request;
c. means for computing a number value representing the product of said pipe cutoff value and the value represented by the count from the preceding step;
d. means for utilizing at least one pair of successive event-time values from the delimiter vector signal for forming a signal representing at least one possible event-time value located within limits represented by said pair and hence within at least one entry of the data base;
e. means for counting the number of events which are represented by event-time values within a selected entry of the data base as defined by said pair of successive event-time values and which fall within such preselected number of event positions of the same event in the request; and
f. means for comparing the count, from the last named means for counting, with said number value and, upon a predetermined relation, forming a pass signal indicating that the corresponding entry is ascertained;

said means for forming an entry identification signal comprising:
a. means for counting the event-time values represented by the delimiter vector signal to form a count corresponding to each said data base entry; and b. means for utilizing said count for forming an entry signal representing the at least one entry responsive to such pass signal.

222. A data processing means for retrieving, from a memory system, a portion of a stored data base, the data base being represented by retrievable event-time signals which represent event-time values which in turn represent the order of occurrence of the corresponding events in the stored data base, the event-time signals representing the order of occurrence of events each of which make up a series of entries each containing at least one event, the processing means comprising:

a. means for forming a request comprising a series of coded event signals representing the events of an entry;
b. means for forming at least one signal identifying an allowable degree of match between the events of the request and the events of an entry in the data base;
c. means for locating a data base entry containing event-time values which represent events which either exactly or inexactly match the events of the request and comprising
   1. means for interrogating selected data base event-time values for locating at least one data base entry which has at least a predetermined number of event-time values representing events positioned within a preselected number of event positions relative to the same events in the request,
   2. means for forming an intermediate entry identification signal identifying said at least one data base entry,
   3. means for further interrogating, within the data base entry identified by said at least one intermediate entry identification signal to locate a data base entry which has at least a preselected degree of match, as to order and presence of events, with the entry of the request, and
   4. means for forming an entry identification signal representing the last located data base entry; and
d. means for generating coded event signals for output representing the events which, according to data base event-time values, are present in the entry of the data base which is identified by said entry identification signal, said event signals for output being arranged in order of occurrence as represented by event-time values in such entry.

223. A means according to claim 222 wherein said means for further interrogating may locate plural entries and wherein said means for forming an entry identification signal comprises means for forming an entry identification signal representing each of said plural entries.

224. A means according to claim 223 comprising means for computing a value for each said entry identification signal representing the actual degree of match as to order and presence of events between the corresponding data base entry and the entry of the request.

225. A means according to claim 224 comprising means for ordering the entry identification signals in order by the corresponding degree of match value.

226. A means according to claim 225 comprising means for storing the ordered entry identification signals in such order together each with a signal representing the degree of match value.

227. A means according to claim 225 wherein said means for generating comprises means for so generating coded signals for output representing each data base entry identified by each said entry identification signal and in sequence according to said ordering.

228. A means according to claim 222 wherein said means for generating comprises means for generating an event signal for each of a plurality of event-time values in an entry which contains a greater number of event-time values than there are events in the original request.

229. A data processing means for retrieving, from a memory system, data which is contained in a multiple layered data base, each layer representing an ordered sequence of entries and events in which one or more events represent each entry, in each layer some such events being the same and at least one being different, each layer comprising retrievable event-time signals which represent event-time values which in turn identify the order of occurrence of the corresponding events, said data base comprising at least first and second layers, each of a plurality of events in said second layer having a corresponding entry in said first layer, the processing means comprising:

a. means for forming a request comprising plural entries, each entry being represented by at least one coded event signal, the entries and events being ordered in order of occurrence;
b. means for interrogating the first data base layer and locating, for each of a plurality of the request entries, at least one first layer entry having event-time values which represent events bearing at least a predetermined degree of match to events represented by the corresponding request event;
c. means for interrogating those second layer event-time values for events which correspond to the located first layer entries to locate at least one second layer entry containing event-time values which represent first layer entries having a predetermined degree of match with the request entries;
d. means for generating a first layer entry identification signal representing each first layer entry which, according to second layer event-time values, are present in the located second layer entry; and
e. means for generating a first layer event signal corresponding to each event-time value contained in each first layer entry which is identified by each said first layer entry identification signal.

230. A means according to claim 229 comprising:

a. means for ordering the generated first layer event signals, within each entry, according to the corresponding first layer event-time values; and
b. means for ordering entries which comprise said event signals according to the corresponding second layer event-time values.

231. A means according to claim 229 wherein said means for interrogating and locating a second layer event comprises means for locating a second layer entry containing second layer event-time values which represent first layer entries which either exactly or inexactly match the entries of the request.

232. A means according to claim 231 comprising:

a. means for forming at least one of different valued signals representing different allowable degrees of match between the entries of the request and the first layer entries represented by second layer entries; and
b. said means for interrogating and locating a second layer entry comprising means for locating a second layer entry having at least said allowable degree of match.

233. A means according to claim 229 wherein said means for interrogating and locating second layer event vector signals comprises means for locating a second layer entry which has at least a predetermined number of event-time values representing first layer entries (second layer events) positioned within a preselected number of entry positions relative to the corresponding entries in the request.

234. A means according to claim 233 wherein said predetermined number of entries is specified by a pipe cutoff value and including means for providing an input to the data processing system for selecting said pipe cutoff value.

235. A means according to claim 233 wherein said predetermined number of entries is computed and comprising:

a. means for forming a pipe cutoff signal representing the predetermined number of entries as a fraction of the number of entries in the request;
b. means for forming a number of entries signal for individual entries of the request, representing the number of entries therein; and
c. means for utilizing the values represented by said pipe cutoff signal and said number of entries signal to form a signal representing the predetermined number of entries to be used.

236. A means according to claim 233 wherein said preselected number of entry positions is specified by a pipe width value and including means for providing an input to the data processing system for selecting said pipe width value.

237. A means according to claim 233 wherein said predetermined number of entries is computed, comprising:

a. means for forming a signal representing a pipe cutoff value which represents the predetermined number of entries as a fraction of the number of entries in the request;
b. means for counting the number of entries in the request;
c. means for computing a number value representing the product of said pipe cutoff value and the value represented by the count from the preceding step;
d. means for counting the number of first layer entries which are represented by second layer event-time values and which fall within such preselected number of entry positions of the same entry in the request, the second layer event-time values being those represented by the located first layer entries; and
e. means for comparing the counts, from the last named means for counting, with said number value for a predetermined relation including that the corresponding second layer entry is a located one.

238. A means according to claim 237 wherein the second layer entry that is recited as being located is an intermediate second layer entry, and comprising means for further interrogating, within the located at least one intermediate second layer entry among the event-time values of the second layer event-time signals which correspond to the located first layer entry, to thereby locate a second layer entry which has at least a preselected degree of match, as to order and presence of first layer entries represented thereby, with the entries of the request, such located second layer entry being the one used in the step of generating a first layer entry identification signal.

239. A means according to claim 238 additionally comprising means for only locating those second layer entries which have at least a preselected degree of match, as to number of represented first layer entries, as well as order and presence of entries.

240. A means according to claim 238 additionally comprising:

a. means for storing a signal indicating if relative number of entries between a request and the data base is to be accounted for; and
b. means for responding to such a stored signal for enabling the step of interrogating and locating to comprise means for only locating a data base entry which has a least a preselected degree of match, as to number of represented first layer entries, as well as order and presence of entries.

241. A means according to claim 246 wherein said preselected degree of match is specified by a brightness value cutoff signal and including means for providing an input to the data processing system for selecting said brightness value cutoff signal.

242. A means according to claim 238 wherein said preselected degree of match is specified by a brightness value cutoff signal and including means for providing an input to the data processing system for selecting said brightness value cutoff signal.

243. A means according to claim 229 wherein said means for interrogating and locating comprises means for locating a second layer data base entry which has at least a preselected degree of match, as to order and presence of entries with the request.

244. A means according to claim 243 wherein the means for locating additionally comprises means for only locating those data base entries which have at least a preselected degree of match, as to number of events, as well as order and presence of events.

245. A means according to claim 243 additionally comprising:

a. means for storing a signal indicating if relative number of entries between a request and the data base is to be accounted for; and
b. means for responding to such a stored signal for enabling the means for interrogating and locating to comprise the means for only locating a data base entry which has at least a preselected degree of match, as to number of entries, as well as order and presence of entries.

246. A means according to claim 243 wherein said preselected degree of match is specified by a brightness value cutoff signal and including means for providing an input to the data processing system for selecting said brightness value cutoff signal.

247. A means according to claim 241 wherein said preselected degree of match is specified by a brightness value cutoff signal and including means for providing an input to the data processing system for selecting said brightness value cutoff signal.

248. A means according to claim 229 comprising means for forming signals representing the boundaries of said second layer entries, and wherein the means for interrogating the second layer event-time signals comprises means for interrogating second layer event-time values representing occurrences of events which lie between the values represented by two successive ones of said boundary signals to thereby determine if the corresponding second layer entry has the predetermined degree of match.

249. A means according to claim 229 wherein the stored data base comprises at least event-time signal whose event-time values represent the order of occurrence of delimiter events, at least one delimiter event defining a boundary of each of said second layer entries, and wherein the means for forming an entry identification signal comprises:

a. means for counting the event-time values of the delimiter event-time values to thereby indicate successive entries; and
b. means for forming a signal corresponding to the count for the second layer entry which has such predetermined degree of match.

250. A means according to claim 233 wherein the stored data base comprises at least one event-time signal whose event-time values represent the order of occurrence of a delimiter event, at least one delimiter event defining a boundary of each of said entries, and wherein the means for generating comprises:

a. means for locating a pair of successive event-time values in such at least one delimiter event-time signal identifying the bounds of the located second layer entry; and
b. means for generating first layer entry identification signals only for second layer event-time values which lie between such pair of successive event-time values.

251. A means according to claim 250 wherein said means for locating a pair of successive event-time values comprises:

a. means for counting successive event-time values of the at least one delimiter event-time signal until a count is reached having a predetermined relation to the located second layer entry; and
b. means for utilizing the delimiter event-time value corresponding to such count as one of the pair of successive event-time values.

252. A means according to claim 229 comprising means for forming at least one further coded signal representing the order of occurrence of individual entries in the request, the means for interrogating including means for utilizing said further coded signal to locate the at least one second layer entry.

253. A means according to claim 252 wherein said means for forming at least one further coded signal comprises means for forming a coded bias signal corresponding to each of at least some of said entries of the request, the means for interrogating and locating at least one second layer entry comprising:

a. means for combining the value represented by each said bias signal with a second layer event-time value to thereby form biased event-time values;
b. means for storing a pipe width signal representing bounds of a permissible mismatch and hence the preselected number of entry positions;
c. means for counting the number of biased signals representing values which fall within preselected bounds of each of selected possible second layerevent-time values said preselected bounds being identified by said stored pipe width signal; and
d. the means for locating an entry including means for utilizing the count for locating such second layer entry which represents such predetermined number of first layer entries.

254. A means according to claim 253 comprising:

a. means for forming a signal representing at least one possible second layer event-time value in at least one second layer entry of the data base; and
b. the means for counting comprising the means for utilizing the at least one possible event-time value signal to identify each such selected possible event-time value.

255. A data processing method for allowing inexact data retrieval, from a memory system, the data being contained in a multiple layered data base, each layer representing an ordered sequence of entries and events in which one or more events represent each entry, in each layer some events being the same and at least one being different, each layer comprising a plurality of retrievable event-time signals which represent event-time values which in turn represent the order of occurrence of the corresponding events, said layers being ordered from at least one higher layer to at least one lower layer, each of a plurality of events in the higher layer having a corresponding entry in the lower layer, the method comprising the steps of:

a. forming a request represented by parts, the parts including lower level entry parts which represent at least one higher level entry part, each lower level entry part having at least one event part which is represented by at least one coded event signal, in the request the lower level entry parts and event parts being ordered in order of occurrence, the at least one higher level entry part corresponding to entries in the higher layer, lower level entry parts corresponding to entries in the lower layer (and events in the higher layer) and event parts corresponding to events in the lower layer;
b. forming at least one signal indicating at least one allowable degree of match between the request and the data base;
c. interrogating the lower layer and locating, for each of a plurality of the lower level request entries, at least one entry in the lower layer having event-time values which represent events bearing at least said indicated degree of match to events represented by the corresponding lower request event;
d. interrogating those event-time values in the higher level which correspond to the located lower layer entries to locate at least one entry in such higher layer containing event-time values which represent a combination of entries in the higher layer having at least said indicated degree of match with the combination of lower entries in the request;
e. generating a lower layer entry identification signal representing each lower layer entry (higher layer event) which, according to higher layer event-time values, are present in the located higher layer entry; and
f. generating a lower layer event signal corresponding to the event-time values contained in each lower layer entry which is identified by each said lower layer entry identification signal.

256. A method according to claim 255 comprising the steps of:

a. ordering the generated lower layer event signals, within each entry of the lower layer, according to the lower layer event-time values; and
b. ordering groupings of the generated lower layer event signals, according to the event-time values of the located higher level entry, to make up entries.

257. A method according to claim 256 wherein at least one of said steps of interrogating and locating on at least one of the layers comprises the step of locating an entry in such layer which has at least a predetermined number of event-time values representing events in that layer positioned within a preselected number of positions relative to the corresponding parts of the request.

258. A data processing method according to claim 257 wherein said predetermined number is specified by a pipe cutoff value and including the step of providing an input to the data processing system for selecting said pipe cutoff value.

259. A method according to claim 257 wherein said predetermined number is computed and comprising the steps of:

a. forming a pipe cutoff signal representing the predetermined number as a function of the length of a portion of the request;
b. forming a number signal for a portion of the request, representing the length thereof; and
c. utilizing the values represented by said pipe cutoff signal and said number signal to form a signal representing the predetermined number.

260. A method according to claim 257 wherein at least one of said steps of interrogating locates an intermediate entry, and further comprises the step of:

further interrogating, within the located intermediate entry among the event-time values thereof, to thereby locate a final entry on such layer which has at least a preselected degree of match, as to order and pesence of entries represented thereby, with the corresponding parts of the request.

261. A method according to claim 260 additionally comprising the steps of only locating a final entry which has at least a preselected degree of match, as to number of events in the corresponding layer, as well as order and presence thereof.

262. A method according to claim 260 wherein said preselected degree of match is specified by a brightness value cutoff signal and including the step of providing an input to the data processing system for selecting said brightness value cutoff signal.

263. A method according to claim 255 wherein the stored data base comprises at least one event-time signal for each layer, the event-time values of which represent the order of occurrence of a delimiter event, at least one delimiter event defining a boundary of each of the entries for such layer, and wherein the steps of interrogating on each layer comprise the step of interrogating layer event-time values having values between the values represented by two successive ones of the respective delimiter event-time values to thereby determine if the corresponding layer entry has the predetermined degree of match.

264. A method according to claim 255 wherein the stored data base comprises at least one event-time signal for each layer, the event-time values of which represent the order of occurrence of a delimiter event, at least one delimiter event defining a boundary of each entry in the corresponding layer, and wherein the step of generating on at least one layer comprises the steps of:

a. locating at least one pair of successive event-time values in such at least one delimiter event-time signal for the corresponding layer identifying the bounds of the entry which has been located for the corresponding step of generating; and
b. generating the identification signal only for layer event-time values in the corresponding layer which lie between the located pair of successive event-time values.

265. A data processor for performing inexact data retrieval, from a memory system, the data being contained in a multiple layered data base, each layer representing an ordered sequence of entries and events in which one or more events represent each entry, in each layer some events being the same at least one being different, each layer comprising a plurality of retrievable event-time signals which represent event-time values which in turn represent the order of occurrence of the corresponding events, said layers being ordered from at least one higher layer to at least one lower layer, each of a plurality of events in the higher layer having a corresponding entry in the lower layer, the processor comprising:

a. means for forming a request represented by parts, the parts including lower level entry parts which represent at least one higher level entry part, each lower level entry part having at least one event part which is represented by at least one coded event signal, in the request the lower level entry parts and event parts being ordered in order of occurrence, the at least one higher level entry part corresponding to entries in the higher layer, lower level entry parts corresponding to entries in the lower layer (and events in the higher layer), and event parts corresponding to events in the lower layer;
b. means for forming at least one signal indicating at least one allowable degree of match between the request and the data base;
c. means for interrogating the lower layer and locating, for each of a plurality of the lower level request entries, at least one entry in the lower layer having event-time values which represent events bearing at least said indicated degree of match to events represented by the corresponding lower request event;
d. means for interrogating those event-time values in the higher level which correspond to the located lower layer entries to locate at least one entry in such higher layer contaning event-time values which represent a combination of entries in the higher layer having at least said indicated degree of match with the combination of lower entries in the request;
e. means for generating a lower layer entry identification signal representing each lower layer entry (higher layer event) which, according to higher layer event-time values, are present in the located higher layer entry; and
f. means for generating a lower layer event signal corresponding to the event-time values contained in each lower layer entry which is identified by each said lower layer entry identification signal.

266. A processor according to claim 265 comprising:

a. means for ordering the generated lower layer event signals, within each entry of the lower layer, according to the lower layer event-time values; and
b. means for ordering groupings of the generated lower layer event signals, according to the event-time values of the located higher level entry, to make up entries.

267. A processor according to claim 266 wherein at least one of said means for interrogating and locating on at least one of the layers comprises:

means for locating an entry in such layer which has at least a predetermined number of event-time values representing events in that layer positioned within a preselected number of positions relative to the corresponding parts of the request.

268. A processor according to claim 267 wherein said predetermined number is specified by a pipe cutoff value and including means for providing an input to the data processor for selecting said pipe cutoff value.

269. A processor according to claim 267 wherein said predetermined number is computed and comprising:

a. means for forming a pipe cutoff signal representing the predetermined number as a function of the length of a portion of the request;

b. means for forming a number signal for a portion of the request, representing the length thereof; and c. means for utilizing the values represented by said pipe cutoff signal and said number signal to form a signal representing the predetermined number.

270. A processor according to claim 267 wherein at least one of said means for interrogating locates an intermediate entry, and further comprises:

means for further interrogating, within the located intermediate entry among the event-time values thereof, to thereby locate a final entry on such layer which has at least a preselected degree of match, as to order and presence of entries represented thereby, with the corresponding parts of the request.

271. A processor according to claim 270 additionally comprising means for only locating a final entry which has at least a preselected degree of match, as to number of events in the corresponding layer, as well as order and presence thereof.

272. A processor according to claim 270 wherein said preselected degree of match is specified by a brightness value cutoff signal and including means for providing an input to the data processor for selecting said brightness value cutoff signal.

273. A processor according to claim 265 wherein the stored data base comprises at least one event-time signal for each layer, the event values of which represent the order of occurrence of a delimiter event, at least one delimiter event defining a boundary of each of the entries for such layer, and wherein both of the means for interrogating the layers comprise the means for interrogating layer event-time values having values between the values represented by two successive ones of the respective delimiter event-time values to thereby determine if the corresponding layer entry has the predetermined degree of match.

274. A processor according to claim 265 wherein the stored data base comprises at least one event-time signal for each layer, the event-time values of which represent the order of occurrence of a delimiter event, at least one delimiter event defining a boundary of each entry in the corresponding layer, and wherein the means for generating on at least one layer comprises:

a. means for locating at least one pair of successive event-time values in such at least one delimiter event-time signal for the corresponding layer identifying the bounds of the entry which has been located by one of the means for generating; and b. means for generating the identification signal only for layer event-time values in the corresponding layer which lie between the located pair of successive event-time values.

275. Electronic data processing coded signal converting means comprising:

a. means for storing at least the combination of given line value signal and given line number signal which represent a given value;

b. means for forming a total number of lines value signal;

c. means for converting such combination of given line value signal and given line number signal representing each different given value to any combination of equivalent line value signal and line number signal in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted, comprising:

1. means for responding to each different value represented by a provided number of lines signal for causing the converting means to form a different predetermined one of the equivalent line signals within the set which corresponds to the combination of given line signal and given line number signal; and 2. means for forming the equivalent number value signal corresponding to the formed equivalent line signal; and d. means for converting the total number of lines value signal to one or more values representing incremental movements which may be made by said converting means and for providing a corresponding number of line value signal to the converting means.

276. Electronic data processing coded signal converting means comprising:

a. means for storing at least the combination of given line value signal and given line number signal which represent a given value;

b. means for forming a number of lines value signal; and c. means for converting such combination of given line value signal and given line number signal representing each different given value to any combination of equivalent line value signal and line number signa in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted, comprising means for responding to each different value represented by the number of lines signal for causing the converting means to form a different predetermined one of the equivalent combination of line signal and line number signal within the set which corresponds to the combination of given line signal and given line number signal.

277. Means according to claim 276 wherein said means for converting comprises means for causing those relatively shifted occurrence values which are not within the group of possible occurrence values to be eliminated from the equivalent line value signal which is formed.

278. Means according to claim 276 wherein said means for forming numbers of lines value signal comprises means for only forming signals representing a component power of two.

279. Means according to claim 276 wherein said means for forming a number of lines value signal comprises means for forming one or a series of numbers of lines signals identifying increments by which a combination of given line value signal and given line number signal is to be advanced through one or more equivalent combinations in the corresponding equivalent set thereof.

280. Means according to claim 279 comprising means for enabling the converting means to use an equivalent line value signal formed by said converting means for a number of lines signal in series as the given line value signal for the next number of lines signal in such series.

281. Means according to claim 279 comprising:

a. means for receiving a signal identifying a total number of lines signal; and b. said means for forming one or a series of number of lines signals comprising means for converting said total number of lines signal into signals representing its component powers of two.

282. Means according to claim 281 wherein said means for converting said total number of lines signals comprises means for converting said total number of lines signal into signals representing its component powers of two in order from the largest value to the smallest value.

283. Means according to claim 276 wherein the converting means comprises:

a. means for forming a shifted line value signal containing actual occurrence values which represent the given line value signal shifted by the number of actual occurrence values represented by the number of lines value signal; and b. means for exclusive ORing the actual occurrence values represnted by the given line value signal and the shifted line value signal to thereby form the equivalent line value signal.

284. Means according to claim 283 wherein said exclusive ORing means comprises means for ordering the actual occurrence values of the shifted and unshifted line value signals into monotonically ordered values and means for forming in said equivalent line value signal only those shifted and unshifted values which are not equal.

285. Means according to claim 284 wherein said means for ordering comprises:

a. means for comparing the shifted and unshifted values; and b. means for forming signals in the equivalent line value signal representing only those actual occurrence values which are not equal.

286. Means according to claim 283 comprising means for causing shifted actual occurrence values which are not among said possible occurrence values to be excluded from the resultant equivalent line value signal.

287. Means according to claim 283 wherein said means for forming a shifted line value signal comprises:

a. means for forming for individual actual occurrence values of the given line value signal an actual occurrence value signal; and b. means for combining the values represented by the number of line value signal and individual actual occurrence value signals to form shifted occurrence value signals making up such shifted line value signal.

288. Means according to claim 276 comprising means for utilizing the values represented by said number of linesvalue signal and said given line number signal to form the equivalent line number signal.

289. Means according to claim 288 wherein the utilizing means comprises means for combining the values represented by the number of lines value signal and the given line number signal.

290. Electronic data processing coded signal converting means comprising:

a. storage means for storing at least the combination of given line value signal and given line number signal which represent a given value;

b. means for forming a number of lines value signal;

c. means for converting such combination of given line signal and given line number signal representing each different given value to any combination of equivalent line signal and line number signal in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted, comprising:

1. means for responding to each different value represented by the number of lines signal for causing the converting means to form a different predetermined one of the equivalent combination of line signal and line number signal within the set which corresponds to the combination of given line signal and given line number signal;

d. at least one decoder means for converting the line number signal in the storage means from a first compact code to a second expanded code for use by the converting means;

e. encoder means for converting the equivalent line value signal formed by the converting means from an expanded code as provided by the converting means back to the first compact code; and f. means for storing the equivalent line value signal in such first code.

291. Means according to claim 290 wherein said means for converting comprises:

means for causing those relatively shifted occurrence values which are not within the group of possible occurrence values to be eliminated from the equivalent line value signal which is formed.

292. Means according to claim 290 wherein said means for forming numbers of lines value signal comprises:

means for only forming signals representing a component power of two.

293. Means according to claim 290 wherein said means for forming a number of lines value signal comprises:

means for forming one or a series of numbers of lines signals identifying increments by which a combination of given line value signals and given line number signal is to be advanced through one or more equivalent combinations in the corresponding equivalent set thereof.

294. Means according to claim 279 comprising means for enabling the converting means to use an equivalent line value signal formed by said converting means for a number of lines signal in such series as the given line value signal for the next number of lines signal in such series.

295. Means according to claim 193 comprising:

a. means for receiving a signal identifying a total number of lines signal; and
b. said means for forming one or a series of number of lines signals comprising means for converting said total number of lines signal into signals representing its component powers of two.

296. Means according to claim 295 wherein said means for converting said total number of lines signals comprises means for converting said total number of lines signal into signals representing its component powers of two in order from the largest value to the smallest value.

297. Electronic data processing coded signal converting means comprising:

a. means for storing at least the combination of given line value signal and given line number signal which represent a given value;
b. means for storing a total number of lines value signal;
c. first decoder means for decoding the line value signal in the storage means from a first compact code to a second expanded code having an individual coded signal for any individual actual occurence value represented in the given line value signal;
d. second decoder means for decoding the line value signal in the storage means form a first compact code to a second expanded code having an individual coded signal for any individual actual occurrence value represented in the given line value signal;
e. means for converting the combination of given line value signal and given line number signal representing each different given value to any combination of equivalent line value signal and line number signal in a unique set thereof which includes the given signals, each line value signal representing at least one digitally coded actual occurrence value out of a set of monotonically ordered possible occurrence values, and comprising,
    1. means for combining values represented by the actual occurrence values in the decoded line value signal and provided number of lines value signal for forming a shifted line value signal,
    2. means for exclusive ORing the values represented by the actual occurrence values from the combining means and the first decoder means, and
    3. means for forming an equivalent line value signal representing the results of the exclusive ORing which only representss actual occurrence values included in said possible set thereof; and
f. means for converting the total number of lines value signal into a value representing the component power of two thereof and providing corresponding number of lines value signals to the combining means;
g. encoder means for converting the equivalentline value signal from an expanded code back to the first compact code; and
h. means for storing the converted equivalent line value signal in such first code.

298. Means according to claim 297 comprising means for utilizing the values represented by said number of lines value signal and said given line number signal to form the equivalent line number signal.

299. Means according to claim 298 wherein the utilizing means comprises means for combining the values represented by the number of lines value signal and the given line number signal.

300. An electronic data processing coded signal converting means comprising:

a. means for storing a given line value signal to be compacted;
b. means for storing a given line number signal, the given line value and line number signals representing a given value;
c. means for forming a plurality of incremental number of lines value signals;
d. means for converting such combination of given line value signal and given line number signal representing each different given value to any combination of equivalent line value signal and line number signal in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted;
e. means for responding to each different value represented by the incremental number of lines value signals for causing the converting means to form a different predetermined one of the equivalent line signal within the set which corresponds to the combination of given signals;
f. means for forming such equivalent line number signal which corresponds to the formed equivalent line value signal; and
g. means for enabling the converting means to utilize an equivalent line signal formed for one incremental number of lines value signal as the given line value signal for the next incremental number of lines value signal.

301. Means according to claim 300 for fast converting operations wherein the means for forming incremental number of lines value signals comprises:

a. means for determining the larger of the difference between the values of the largest two actual occurrence value signals in the given line and of the difference between the values of the largest possible occurrence value and the largest actual occurrence value in the given line value; and
b. means for forming at least one of such incremental number of lines value signals representative of such largest difference.

302. Means according to claim 301 wherein said means for forming at least one such incremental number of lines value signal comprises means for forming a signal representing each of the component powers of two of the largest difference.

303. An electronic data processing compactor for coded signals comprising:

a. means for storing a given line value signal to be compacted;
b. means for storing a given line number signal, the given line value and line number signals representing a given value;
c. means for forming a plurality of incremental number of lines value signals;

d. means for converting such combination of given line value signal and given line number signal representing each different given value to any combination of equivalent line value signal and line number signal in a unique set thereof which includes the given signals, each line value signal representing at lest one digitally coded actual occurrence value out of a set of monotonically ordered possible occurrence values, each line value signal being related to another in the same set by an exclusive OR of the actual occurrence values thereof and the actual occurrence values thereof relatively shifted;

e. means for responding to each different value represented by the incremental number of lines value signals for causing the converting means to form a different predetermined one of the equivalent line signal within the set which corresponds to the combination of given signals;

f. means for forming such equivalent line number signal which corresponds to the formed equivalent line value signal;

g. means for enabling the converting means to utilize an equivalent line signal formed for one incremental number of lines value signal as the given line value signal for the next incremental number of lines value signal;

h. means for interrogating the formed equivalent line value signals for one of selected length; and i. means responsive to the interrogating means for selectively storing a signal indicative of a formed equivalent line value signal having such selected length and of the corresponding equivalent line number signal.

304. A compactor according to claim 303 wherein said means for interrogating comprises:

a. means for determining the length of each of plural formed equivalent line value signals and for forming a corresponding length signal for each; and b,. means for comparing the values represented by the length signals for the one which represents the shortest length.

305. A compactor according to claim 304 wherein said interrogating means comprises:

a. first means for storing a signal identifying the line value signal which is the current shortest one formed from the various incremental number of lines value signals;

b. second means for storing a current shortest length value signal;

c. the means for comparing comprising means for comparing the values represented by the stored current shortest length value and each newly formed length signal;

d. means for storing a signal in the first storing means identifying a line value signal which is compared and found to be shorter than the current one; and e. means for storing a signal in the second storing means representing the shortest length signal which is compared and found to represent the shortest length.

306. A compactor according to claim 305 wherein said means for storing a signal identifying a shortest line value signal comprises means for storing a signal representing at least the line number.

307. A compactor according to claim 306 wherein said means for storing a signal identifying a shortest line value signal additionally comprises means for storing a signal representing the line value.

308. A compactor according to claim 303 wherein a fast compacting operation is provided wherein the means for forming incremental number of lines value signals comprises:

a. means for determining the larger of the difference between the values of the largest two actual occurrence value signals in the given line and of the difference between the values of the largest possible occurrence value and the largest actual occurrence value in the given line value; and b. means for forming at least one of such incremental number of lines value signals representative of such largest difference.

309. Means according to claim 308 wherein said means for forming at least one such incremental number of lines value signal comprises means for forming a signal representing each of the component powers of two of the largest difference.

310. An electronic data processing compactor for coded signals comprising:

a. means for storing a given line value signal to be compacted;

b. means for storing a given line number signal, the given line value and line number signals representing a given value;

c. means for forming a plurality of incremental number of lines value signals;

d. means for converting such combination of given line value signal and given line number signal representing each different given value to any combination of equivalent line value signal and line number signal in a unique set thereof which includes the given signals, each line value signal representing at least one digitallly coded actual occurrence value out of a set of monotonically ordered possible occurrence values, each line value signal being related to another in the same set by an exclusive OR of the actual occurrence values thereof and the actual occurrence values thereof relatively shifted;

e. means for responding to each different value represented by the incremental number of lines value signals for causing the converting means to form a different predetermined one of the equivalent line signal within the set which corresponds to the combination of given signals;

f. means for forming such equivalent line number signal which corresponds to the formed equivalent line value signal;

g. means for enabling the converting means to utilize an equivalent line signal formed for one incremental number of lines value signal in place of the given line value signal for the next incremental number of lines value signal;

h. means for providing the signals for use by the converting means corresponding to the stored given line value signal and comprising means for decoding the stored signals from a first compact code to a second expanded code for use by the converting means;

i. means for encoding the equivalent line value signal, resulting from an individual incremental number of lines value signal, from such expanded code back to the compacted code;

j. means for interrogating the length of the encoded equivalent line value signals for one of selected length; and k. means responsive to the interrogating means for selectively storing a signal indicative of an encoded equivalent line value signal having such selected length and of the corresponding equivalent line number signal.

311. A compactor according to claim 310 wherein said compacted code is in a hybrid coded signal form, the hybrid signal form comprising a series of binary coded words including at least one absolute coded word and at least one bit word, the bit word representing an occurrence value by the number of binary bits of displacement of a binary bit of predetermined value from an absolute word in the series of words, such words comprising a flag signal for indicating if the corresponding word is an absolute or bit word type, said decoding means comprising:

a. means for detecting the absolute and bit word flag signal of the words in the givenline value signal;
b. absolute word outputting means comprising means responsive to the detection of an absolute word flag signal in a word for outputting an actual occurrence value signal represented by such word; and
c. absolute word forming an outputting means comprising
   1. means responsive to the detection of a bit word flag signal in a word for responding to each said binary bit of predetermined value in such bit word and to a previous absolute word for forming an actual occurrence value signal representative of the actual value of said bits of predetermined value, and
   2. means for outputting each said formed actual occurrence value signal.

312. A compactor according to claim 311 wherein said encoding means receives the actual occurrence values of the equivalent line value signal in series and comprising:

a. means responsive to a previously and a currently received intermediate actual occurrence value signal for forming a first difference signal indicative of the difference in value therebetween;
b. means for indicating absolute or bit string form of hybrid output comprising
   1. means for forming a signal representing a preselected minimum difference between a previously and a currently received intermediate absolute coded signal, and
   2. means for comparing the values of the minimum difference signal and the first difference signal and for forming a signal indicating if the first value is greater than or is less than or equal to the latter value;
c. means for providing absolute form outputs comprising
   1. means operative in response to said less than or equal to signal indication for outputting a word signal representing the currently received actual occurrence value signal and an absolute flag signal; and
d. means for providing bit string form outputs comprising
   1. means responsive to said greater than signal indication for forming a bit string word signal comprising a binary bit of one value associated with the number of binary bits of a second value corresponding to the value of said first difference signal, and
   2. means for selectively outputting said bit string word signal in association with a bit string flag signal and in a predetermined relation to an outputted absolute form word signal.

313. A compactor according to claim 312 wherein said means for interrogating length comprises a means for counting the outputted words.

314. Electronic data processing coded signal outputting means comprising:

a. means for storing at least the combination of given line value signal and given line number signal which represent a given value;
b. means for converting such combination of given line value signal and given line number signal representing each different given value to any combination of equivalent line value signal and line number signal in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted and comprising means for responding to each different value represented by a provided number of lines signal for causing the converting means to form a different predetermined one of the equivalent combination of line signal and line number signal within the set which corresponds to the combination of given line signal and given line number signal;
c. means for forming a signal having a value representing the number of such possible occurrence values;
d. means for determining a value related to the values of said number of possible occurrence value signals and the given line number signal; and
e. means for forming and providing such number of lines value signal representing said determined value.

315. Means according to claim 314 wherein the means for determining comprises:

means for determining a value representing the difference in value represented by said number of possible occurrence values signal and said given line number signal.

316. Means according to claim 315 wherein said means for converting comprises means for causing those relatively shifted occurrence values which are not within the group of possible occurrence values to be eliminated from the equivalent line value signal which is formed.

317. Means according to claim 316 wherein said means for forming number of lines value signal comprises means for forming signals representing the component powers of two of said difference and the outputting means comprising means for enabling the equivalent line value signal formed for one component power of two signal to be used by the converting means with another component power of two signal.

318. Means according to claim 316 wherein said means for forming a number of lines value signal comprises means for forming one or a series of number of lines signals identifying increments by which a combination of given line value signal and given line number signal is to be advanced through one or more equivalent combinations in the corresponding equivalent set thereof.

319. Electronic data processing coded signal changing means comprising:
a. means for storing at least the combination of given line value signal and given line number signal which represent a given value;
b. means for forming a signal representing at least one change occurrence value;
c. means for forming a number of lines value signal;
d. means for converting such combination of given line value signal and given line number signal representing each different given value to any combination of equivalent line value signal and line number signal in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted, comprising means for responding to each different value represented by the number of lines signal for causing the converting means to form a different predetermined one of the equivalent combination of line signal and line number signal within the set which corresponds to the combination of given line signal and given line number signal; and
e. means for exclusive ORing the values represented by the equivalent line value signal and the change signal for forming a changed line value signal.

320. Changing means according to claim 319 wherein said means for forming a number of lines signal comprises:
means for utilizing the given line number signal for forming the number of lines value signal.

321. Changing means according to claim 320 wherein said means for forming a number of lines value signal comprises means for forming at least one signal representative of the difference between the values represented by the given line number signal and the change line number signal.

322. Means according to claim 321 wherein said means for forming at least one signal representative of the difference comprises means for forming one or a series of number of lines value signals identifying increments by which a combination of change line value signal and change line number signal is to be advanced through one or more equivalent combinations in the corresponding equivalent set thereof.

323. Means according to claim 322 wherein said means for forming number of lines signals representing increments comprises means for only forming signals representing a component power of two representative of such difference.

324. Electronic data processing method for checking for the presence of an actual occurrence value represented by a given line value which forms one of a set of unique line values, each line value in the set being represented by at least one digitally coded actual occurrence value out of a set of monotonically ordered possible occurrence values, each line value being related to another by an exclusive OR of the actual occurrence values thereof and the actual occurrence values thereof relatively shifted, each line value being assigned a unique line number, the actual occurrence value to be checked being in a line value of the set thereof other than the given line value, comprising the steps of:
a. forming a signal representing a given line;
b. forming a signal representing the line number of the given line signal;
c. utilizing the value represented by the given line number signal for forming a signal representing the number of lines of displacement between the given line and a desired line value of the set of line values;
d. forming a test signal representing a desired possible occurrence value to be checked for presence in desired line value;
e. combining the values represented by the test signal and number of lines signal to form a further test signal identifying a further possible occurrence value for test;
f. comparing values represented by the test signal and the given line signal for a predetermined relation;
g. comparing values represented by the further test signal and the given line signal for a predetermined relation; and
h. responding to the results of both comparing steps for forming a predetermined signal indicating presence of an actual occurrence value, in the desired line value, equal in value to that represented by the test signal.

325. A method according to claim 324 wherein the step of forming the predetermined signal comprises the step of forming such a signal responsive to the detection of equality by one and inequality by the other of said comparing steps.

326. Electronic data processing method for checking for the presence of an actual occurrence value represented by a given line value which forms one of a set of unique line values, each line value in the set being represented by at least one digitally coded actual occurrence value out of a set of monotonically ordered possible occurrence values, each line value being related to another by an exclusive OR of the actual occurrence values thereof and the actual occurrence values thereof relatively shifted, each line value being assigned a unique line number, the actual occurrence value to be checked being in a line value of the set thereof other than the given line value, comprising the steps of:
a. forming a signal representing a given line;
b. forming a signal representing the line number of the given line signal;
c. utilizing the value represented by the given line number signal for forming a signal representing the number of lines of displacement between the given line and a desired line value of the set of line values;
d. forming a test signal representing at least one possible occurrence value, a different test signal being formed for each different displacement;
e. effecting an alignment between the occurrence values represented by the test signal and the given line value signal;
f. comparing the aligned occurrence values represented by the test signal and the given line signal for values which are the same; and
g. forming a first signal for an even number of signals which are the same and for forming a second signal for an odd number.

327. Electronic data processing method for checking for the presence of an actual occurrence value contained in a desired different form of a given value comprising:
a. forming a given line value signal;
b. forming a line number signal corresponding to the given line value signal;

c. converting the combination of given line value and line number signals representing each different value to any combination of equivalent line value signal and line number signal in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted, and comprising the step of responding to each different value represented by a provided number of lines signal for causing the step of converting to form a different predetermined one of the combination of equivalent signals within the set which corresponds to the given signals;

d. forming a length signal;

e. forming a difference signal related to the difference in values represented by the given line value and line number signals;

f. forming a first signal representing a largest component power of two and a second signal representing at least a second signal representing at least one remaining component power of two, the component powers of two representing the difference signal;

g. providing a number of lines signal for the step of converting representing said remaining component powers of two to thereby cause a corresponding combination of equivalent signals to be formed;

h. forming a test signal representing the value of an actual occurrence value which is to be checked in a desired one of the equivalent line signals of the equivalent set thereof;

i. combining the values represented by the test signal and length signal to form a further test signal identifying a further occurrence value for test;

j. comparing the values represented by the test signal and formed equivalent line value signal for a predetermined relation;

k. comparing the values represented by the further test signal and the formed equivalent line value signal for a predetermined relation; and l. forming a signal indicating the presence of the actual occurrence value, in the desired equivalent line signal, equal in value to that represented by the test signal and in response to the results of both steps of comparing.

328. A method according to claim 327 wherein the step of providing a length signal comprising the step of providing a signal having a value at least equal in value to the largest possible occurrence value in the set thereof.

329. Electronic data processing signal changing method comprising the steps of:

a. storing at least the combination of given line value signal and given line number signal which represent a given value;

b. forming a change line value signal and a change line number signal representing at least one change occurrence value;

c. forming a number of lines value signal;

d. converting such combination of change line value signal and change line number signal to any combination of equivalent line value signal and line number signal in a unique set thereof which includes the change signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted, comprising the step of responding to each different value represented by the number of lines value signal for causing the step of converting to form a different predetermined one of the equivalent combination of line value signal and line number signal within the set which corresponds to the combination of change line signal and change line number signal; and e. exclusive ORing the values represented by the equivalent line value signal and the given line value signal for forming a changed line value.

330. A method according to claim 329 wherein said step of forming a number of lines comprises the step of utilizing the given line number signal for forming the number of lines value signal.

331. A method according to claim 330 wherein the step of forming a number of lines value signal comprises the step of forming at least one signal representative of the difference between the value represented by the given line number signal and the change line number signal.

332. A method according to claim 331 wherein the step of forming at least one signal representative of the difference comprises the step of forming one or a series of number of lines value signals identifying increments by which a combination of change line value signal and change line number signal is to be advanced through one or more equivalent combinations in the corresponding equivalent set thereof.

333. A method according to claim 332 wherein the step of forming number of lines signals representing increments comprises the step of only forming signals representing a component power of two representative of such difference.

334. Electronic data processing means for checking for the presence of an actual occurrence value represented by a given line value which forms one of a set of unique line values, each line value in the set being represented by at least one digitally coded actual occurrence value out of a set of monotonically ordered possible occurrence values, each line value being related to another by an exclusive OR of the actual occurrence values thereof and the actual occurrence values thereof relatively shifted, each line value being assigned a unique line number, the actual occurrence value to be checked being in a line value of the set thereof other than the given line value, the processing means comprising:

a. means for forming a signal representing a given line;

b. means for forming a signal representing the line number of the given line signal;

c. means for utilizing the value represented by the given line number signal for forming a signal representing the number of lines of displacement between the given line and a desired line value of the set of line values;

d. means for forming a test signal representing a desired possible occurrence value to be checked for presence in desired line value;

e. means for combining the values represented by the test signal and number of lines signal to form a further test signal identifying a further possible occurrence value for test;

f. means for comparing values represented by the test signal and the given line signal for a predetermined relation;

g. means for comparing values represented by the further test signal and the given line signal for a predetermined relation; and h. means for responding to the results of both comparing steps for forming a predetermined signal indicating presence of an actual occurrence value, in the desired line value, equal in value to that represented by the test signal.

335. Processing means according to claim 334 wherein the means for forming the predetermined signal comprises means for forming such a signal responsive to the detection of equality by one and inequality by the other of said means for comparing.

336. Electronic data processing means for checking for the presence of an actual occurrence value represented by a given line value which forms one of a set of unique line values, each line value in the set being represented by at least one digitally coded actual occurrence value out of a set of monotonically ordered possible occurrence values, each line value being related to another by an exclusive OR of the actual occurrence values thereof and the actual occurrence values thereof relatively shifted, each line value being assigned a unique line number, the actual occurrence value to be checked being in a line value of the set thereof. other than the given line value, the processing means comprising:

a. means for forming a signal representing a given line;

b. means for forming a signal representing the line number of the given line signal;

c. means for utilizing the value represented by the given line number signal for forming a signal representing the number of lines of displacement between the given line and a desired line value of the set of line values;

d. means for forming a test signal representing at least one possible occurrence value, a different test signal being formed for each different displacement;

e. means for effecting an alignment between the occurrence values represented by the test signal and the given line value signal;

f. means for comparing the aligned occurrence values represented by the test signal and the given line signal for values which are the same; and g. means for forming a first signal for an even number of signals which are the same and for forming a second signal for an odd number.

337. Electronic data processing means for checking for the presence of an actual occurrence value contained in a desired different form of a given value comprising:

a. means for forming a given line value signal;

b. means for forming a line number signal corresponding to the given line value signal;

c. means for converting the combination of given line value and line number signals representing each different value to any combination of equivalent line value signal and line number signal in a unique set thereof which includes the given signals, each line value signal representing at least one digitally coded actual occurrence value out of a set of monotonically ordered possible occurrence values, each line value signal being related to another in the same set by an exclusive OR of the actual occurrence values thereof and the actual occurrence values thereof relatively shifted, and comprising means for responding to each different value represented by a provided number of lines signal for causing the step of converting to form a different predetermined one of the combination of equivalent signals within the set which corresponds to the given signals;

d. means for forming a length signal;

e. means for forming a difference signal related to the differences in values represented by the given line value and line number signals;

f. means for forming a first signal representing a largest component power of two and a second signal representing at least a second signal representing at least one remaining component power of two, the component powers of two representing the difference signal;

g. means for providing a number of lines signal for the step of converting representing said remaining component powers of two to thereby cause a corresponding combination of equivalent signals to be formed;

h. means for forming a test signal representing the value of an actual occurrence value which is to be checked in a desired one of the equivalent line signals of the equivalent set thereof;

i. means for combining the values represented by the test signal and length signal to form a further test signal identifying a further occurrence value for test;

j. means for comparing the values represented by the test signal and formed equivalent line value signal for a predetermined relation;

k. means for comparing the values represented by the further test signal and the formed equivalent line value signal for a predetermined relation; and l. means for forming a signal indicating the presence of the actual occurrence value, in the desired equivalent line signal, equal in value to that represented by the test signal and in response to the results of both comparing means.

338. An electronic data processing revolver for revolving a binary coded input line signal to a new line signal in the same iso-entropicgram, comprising:

a. means for storing an input line signal, the input line signal comprising a binary coded signal representing one or more actual occurrence values from a group of decreasing ordered possible occurrence values;

b. means for serially providing individual actual occurrence value signals, comprising 1. first means responsive to the stored input line signal and to a first request signal for providing an actual occurrence value signal representing one of the actual occurrence values in the stored input line signal, said first means providing an actual occurrence value signal representing each said value of the input line signal in decreasing value order responsive to one of said first request signals for each such value;

2. second means responsive to the same stored input line signal and a second request signal for providing an actual occurrence value signal representing one of the actual occurence values in the stored input line signal, said second means providing an actual occurrence value signal representing each said value of the input line signal in decreasing value order responsive to one of said second request signals for each such value;
c. means for providing a signal indicating a number of lines to be revolved;
d. means for storing a new line;
e. new line forming means comprising
1. shift means comprising means for combining values corresponding to the indicated number of line signal and the actual occurrence value signal provided by the first means and for each of the latter forming a corresponding shifted occurrence value signal,
2. first and second register means for storing, respectively, a shifted occurrence signal and an occurrence value signal provided by the second means,
3. means for selecting and storing in said new line storing means either the content of said first or second register means,
4. means for comparing the content of said first and second register means for indicating the relative values thereof,
5. enabling means comprising
a. means responsive to an indication that the shifted signal in the first register means is the larger and comprising
1. means for providing said first request signal, and
2. means for enabling said selecting and storing means to select said shifted occurrence signal in the first register means for storage,
b. means responsive to an indication that the unshifted occurrence signal in the second register means is the larger and comprising
1. means for providing said second request signal, and
2. means for enabling said selecting and storing means to select said unshifted occurrence signal in the second register means for the storage, and
c. means responsive to an indication of equality in comparing for providing both said first and second request signals.

339. The revolver of claim 338 wherein said means for indicating the number of lines to be revolved comprises means for receiving a signal representing the total number of lines to be revolved and means for converting the value represented thereby into its component powers of two.

340. A revolver according to claim 339 comprising means for providing a first one of said component power of two signals and the stored input line signal to the first and second means to enable a response thereto and means for subsequently providing a second one of said component power of two signals and the stored new line signal, caused by the first component power of two signal, to the first and second means to enable a response thereto.

341. A revolver according to claim 338 wherein said input line is in a first code and the individual occurrence value signals are in a second code, and said first and second means comprise at least one code converter for converting the occurrence values in the input line signal represented by the first code to the individual actual occurrence value signals in the second code.

342. A revolver according to claim 341 wherein each of the first and second means comprises a code converter.

343. A revolver according to claim 342 wherein the means for providing a signal representing the number of lines to be revolved comprises means for providing such signals in the same code as said individual actual occurrence signals.

344. A revolver according to claim 338 comprising means for eliminating those shifted occurrence value signals which are outside of said group of possible occurrence values.

345. An encoder for converting to hybrid form a received series of absolute words in a decreasing value order comprising:
a. means responsive to received previous and current absolute words for forming an output signal indicative of the difference therebetween;
b. means for indicating absolute or bit string form of hybrid output comprising
1. means for indicating a preselected minimum difference between successively received absolute words for absolute form of output,
2. means for comparing the minimum difference indication and the previous and current difference signal and for indicating the value of the first being greater than, or less than equal to the latter;
c. means for providing absolute form outputs comprising
1. means operative in response to said less than or equal to indication for outputting the stored current absolute word and an absolute flag; and
d. means for providing bit string form outputs comprising
1. means responsive to said greater than indication for forming a set of ordered signals comprising a binary bit of one value separated by the number of binary bits of a second value corresponding to the value of said previous and current difference signal, and
2. means for selectively outputting said set of signals in association with a bit string flag and in a predetermined relation to an outputted absolute word.

346. An encoder for converting to hybrid form a received series of absolute coded words in decreasing value order, comprising:
a. a current register for storing a currently received absolute word;
b. means for storing a received absolute word in said current register;
c. a previous register for storing a word received prior to the word in said current register;
d. means for transferring a word from said current register to said previous register;
e. means responsive to the stored previous and current absolute word for forming an output signal indicative of the difference therebetween;
f. means for retaining the previous and current difference signal;
g. means for indicating absolute or bit string form of hybrid output comprising
1. means for indicating a preselected minimum difference between received absolute words for absolute form of output,
2. means for comparing the minimum difference indication and the retained previous and current difference signal and for indicating the first being greater than, or less than or equal to, the latter;

h. means for providing absolute form outputs comprising
   1. means responsive to said greater than indication for outputting a signal representing the stored current absolute word and an absolute flag; and
i. means for providing bit string form outputs comprising
   1. means responsive to said less than or equal to indication for forming a set of ordered signals comprising a binary bit of one value separated by the number of binary bits of a second value corresponding to the value of said retained previous and current difference signal, and
   2. means for selectively outputting a signal representing said set of ordered signals in association with a bit string flat and in a predetermined relation to an outputted absolute word.

347. The encoder of claim 335 wherein the hybrid form comprises a series of words and said means for forming a set of ordered signals comprises:

a. counter means;
b. a bit string word forming register;
c. means operative in response to said indication for enabling said counter means to count through a sequence of states corresponding in number to the retained current and previous difference signal;
d. means for indicating completion of the last mentioned counting;
e. means for shifting the content of said bit string forming register one bit position in the direction of the least significant bit thereof for each said last mentioned counter means states; and
f. means responsive to the last mentioned completion signal for inserting a bit signal of predetermined value at the most significant end of the bit storing register content and wherein said means for outputting comprises means for selectively outputting the content of said bit string word forming register.

348. The encoder of claim 347 comprising means for entering a first occurrence in a new bit string word under formation comprising:

a. means for storing a signal representing the number of binary bits remaining to be filled in a bit string word being formed;
b. combining means for forming a signal representing the difference between the value of the remaining number of binary bits to be filled signal and the previous and current difference signal;
c. means for comparing the value of the previous and current difference signal and the remaining binary bits to be filled signal for indicating the first is greater than or equal to, or less than the latter;
d. means responsive to said less than indication for retaining the difference signal from the combining means as the number of bits needed in the next bit string word to enter the current absolute word;
e. means operative in response to said greater than or equal to indication for enabling said counter means to count through a sequence of states corresponding in number to the retained number of bits needed in the next bit string word signal;
f. means for indicating completion of the last mentioned counting;
g. means for shifting the content of said bit string forming register one bit position in the direction of the least significant bit thereof for each said last mentioned counter means states; and
h. means responsive to the last mentioned completion signal for inserting a bit signal of predetermined value at the most significant end of the bit storing register content.

349. The encoder of claim 347 comprising means for filling out the bits of a bit string word being formed when no further occurrences can be entered therein, comprising:

a. means for storing a signal representing the number of binary bits remaining to be filled in the bit string word being formed;
b. combining means for forming a signal representing the difference between the value of the remaining number of binary bits to be filled signal and the previous and current difference signal;
c. means for comparing the value of the previous and current difference signal and the remaining binary bits to be filled signal for indicating the first is greater than or equal to, or less than the latter;
d. means operative in response to said less than indication for enabling said counter means to count through a sequence of states corresponding in number to the value of the stored remaining binary bits to be filled signal;
e. means for indicating completion of the last mentioned counting; and
f. means for shifting the content of said bit string forming register one bit position in the direction of the least significant bit thereof for each said last mentioned counter means states.

350. An encoder according to claim 346 having a clipping means, the clipping means comprising:

a. means for storing an upper limit value and a lower limit value; and
b. means for comparing a current absolute word with said upper and lower limit values and indicating if the current absolute word is out of the bounds defined by the limit values.

351. An encoder according to claim 350 comprising an interval adjusting means comprising:

a. means for storing an interval value;
b. means responsive to an indication that the current entry is out of bounds for incrementally changing the stored upper and lower limit value by the value of said stored interval value; and
c. means for enabling said comparing means to repeat the comparing, using the incrementally changed upper and lower limit values and current entry.

352. A decoder for converting hybrid coded signals to absolute coded word signals, the hybrid signals representing a series of occurrence values of decreasing value, the hybrid signals comprising a series of received binary coded word signals including at least one absolute coded word and a bit string word, the bit string word representing an occurrence by the number of bits of displacement of a bit of predetermined value from an absolute word in the series of hybrid words, a hybrid word comprising a flag signal indicating the type of word, comprising:

a. absolute word outputting means comprising means responsive to an absolute word flag signal of a received hybrid word signal for outputting the received word signal; and
b. absolute word signal forming and outputting means comprising 1. means responsive to an absolute word signal and each said bit of predetermined value in a subsequent bit string word signal of a received hybrid signal for forming an absolute word signal indicative of actual value of each said bit of predetermined value, and
2. means for outputting each said formed absolute word signal.

353. A decoder for converting hybrid coded signals to absolute coded word signals, the hybrid signals representing a series of occurrence values of decreasing value, the hybrid signals comprising a series of received binary coded word signals including at least one absolute coded word and at least one bit string word, the bit string word representing an occurrence by the number of bits of displacement of a bit of predetermined value from an absolute word in the series of hybrid words, a received word comprising a flag signal indicating the type of word, comprising:

a. absolute word outputting means comprising means responsive to an absolute word flag signal of a received word signal for outputting the received word signal; and
b. absolute word signal forming and outputting means comprising
   1. shift register means for storing a received bit string word signal,
   2. means for repeatedly enabling the shifting of the content of the shift register means one bit position in the direction of the least significant bit of the bit string word signal,
   3. means for providing an indication when a bit signal indicative of said predetermined value arrives at a preselected position with respect to the shift register means,
   4. counter means,
   5. means responsive to a flag signal indicating a received absolute word signal for setting said counter means to a state relative to a reference state corresponding to the value of such absolute word signal,
   6. means for enabling said counter means to count one state towards said reference state for each such shift of said shift register means, and
   7. means responsive to said indication of a bit for outputting a signal corresponding to the state of said counter means.

354. The decoder of claim 353 wherein the absolute word forming means additionally comprises means for adjusting said counter means for bits, not of said predetermined value, which remain in said shift register means after the last bit of predetermined value in a received word comprising:

a. additional counter means;
b. means for indicating the maximum number of bits in an absolute word for output;
c. means for selectively setting said additional counter means to a state relative to a state corresponding to said indication of the maximum number of bits in an absolute word;
d. means for enabling said additional counter means to count one state relative to the set state thereof towards said reference state for each said shift of said shift register means;
e. means for providing an indication of the occurrence of said reference value of said additional counter means;
f. means responsive to the flag signal of a received bit string word signal and the lack of the last mentioned indication for further enabling both said counter means and additional counter means to count toward the reference states thereof; and
g. means responsive to the last mentioned indication for terminating further enabling of count of said counter means and additional counter means.

355. A method, utilizing a digital data processing system having a memory system for creating a digitally coded data base in such memory system from received events occurring in a desired sequence and for retrieving from the data base, a plurality of said events forming a first type entry and a plurality of first type entries forming events of a second type entry, a first delimiter event and a second delimiter event identifying the boundary of, respectively, a first type entry and a second type entry, said delimiter events being represented by at least one of said received events comprising the steps of:

a. monitoring the occurrence of received events and forming a first event-time indication indicating the relative order of occurrence thereof in a first type entry;
b. detecting the occurrence of received delimiter events;
c. storing in said memory system, as data base, digitally coded event signal representations of the different types of received events of first type entries;
d. utilizing the detection of first delimiter events and the first event-time indications for creating, in said memory system in a first data base layer, first digitally coded event time signals indicative of the relative order of occurrence in which received events of the first type entries occur;
e. utilizing the detection of first delimiter events for forming second event time indications indicating the relative order of occurrence of the events in the second type entries;
f. utilizing the detection of second delimiter events and utilizing the second event-time indications for creating in said memory system, in a second data base layer, second digitally coded event-time signals which indicate the relative order of occurrence in which the events of the second type entries occur in each of a plurality of the received second type entries; and
g. selectively reconstructing a series of events and at least first type entries in the order of occurrence as represented in the data base comprising the steps of:
   1. designating a desired entry of the second data base layer;
   2. designating a plurality of desired entries in the first data base layer;
   3. selecting event signal representations from the data base; and
   4. utilizing indications in the designated second entry of the data base and indications in the designated first layer of the data base for outputting event signals representing the selected event signal representations in the order in which they originally occurred.

356. A method, utilizing a digital data processing system having a memory system for creating a digitally coded data base in such memory system for received events occurring in a desired sequence and for retrieving from the data base, a plurality of said received events forming a first type entry and a plurality of first type entries forming events of a second type entry, a first delimiter event and a second delimiter event identifying the boundary of, respectively, a first type entry and a second type entry, said delimiter events being represented by at least one of said received events, comprising the steps of:

a. monitoring the occurrence of said received events of the first type and forming a first event-time indication indicating the relative order of occurrence thereof in a first type entry;

b. detecting the occurrence of received delimiter events;

c. storing in said memory system, as data base, digitally coded signal representations of the different types of received events of first type entries;

d. utilizing the detection of first delimiter events and utilizing the first event-time indications for creating in said memory system in a first data base layer, first digitally coded event-time signals indicative of the relative order of occurrence in which received events of the first type entries occur;

e. utilizing the detection of first delimiter events for forming second event time indications indicating the relative order of occurrence of the events in the second type entries;

f. utilizing the detection of second delimiter events and utilizing the second event-time indications for creating in said memory system, in a second data base layer, second digitally coded event-time signals which indicate the relative order of occurrence in which the events of the second type entries occur in each of a plurality of the received second type entries;

g. selecting event signal representations from the data base; and h. utilizing the stored digitally coded signals of the first and second data base layers for outputting selected event signals representing the selected event signal representations in the order in which they originally occurred.

357. A method, utilizing a digital data processing system having a memory system for creating and retrieving a digitally coded data base in such memory system comprising the steps of:

a. monitoring the occurrence of received first type events making up a first type entry, and forming first event-time indications indicating the relative order of occurrence thereof in the first type entry;

b. detecting the occurrence of received first and second delimiter events;

c. utilizing the detection of first delimiter events for forming second event-time indications indicating the relative order of occurrence of a series of second type events which make up a second type entry, first type entries forming second type events;

d. storing in said memory system, as data base, digitally coded signal representations of at least the different types of received first type events;

e. utilizing the detection of first delimiter events and the first event-time indications for creating in said memory system in a first data base layer, first digitally coded event time signals indicative of the relative order of occurrence in which received first type events occur in each of a plurality of first type entries;

f. utilizing the detection of second delimiter events and the second event-time indications for creating in said memory system, in a second data base layer, second digitally coded event-time signals which indicate the relative order of occurrence of said second type events in each of a plurality of second type entries; and g. utilizing the data base event signal representations and the data base digitally coded event time signals for retrieving from the data base selected first and second type events in the order in which they originally occurred.

358. A method utilizing a digital data processing system having a memory for creating in such memory a digitally coded data base and for retrieving therefrom, comprising the steps of:

a. monitoring the occurrence of received events and forming first event-time indications indicating the relative order of occurrence of such received events in each of a plurality of first type entries;

b. detecting the occurrence of delimiter events in the received first type events defining the bounds of second type events which form second type entries;

c. utilizing the detection of delimiter events for forming second event-time indications indicating the relative order of occurrence of the second type events within second type entries;

d. storing in said memory, as data base, digitally coded event signal representations of at least the different types of received first type events;

e. storing in said memory in a first data base layer, first digitally coded event-time signals representative of the first event-time indications;

f. storing in the memory in a second data base layer, second digitally coded event-time signals representative of the second event-time indications; and g. utilizing the data base for outputting event signals representing the data base event signal representations in the order of occurrence within second type events as represented in the data base.

359. A method according to claim 358 comprising the additional steps of:

a. interrogating the first data base layer prior to storing therein event-time signals representing a particular first type entry to determine if the events thereof are represented by event-time signals in the same order of occurrence as they occur in the particular first type entry; and b. conditioned upon finding the lack of the same order of occurrence, storing event-time signals representing the order of occurrence of the particular first type entry in the first data base layer.

360. A method according to claim 358 comprising the additional steps of:

a. interrogating the first data base layer prior to storing therein event-time signals representing a particular first type entry to determine if the events thereof are represented by event-time signals in the same order of occurrence as they occur in the particular first type entry; and b. conditioned upon finding the same order of occurrence, not creating event-time signals representing the order of occurrence of the particular first type entry in the first data base layer.

361. A method according to claim 358 comprising the additional steps of:

a. creating signals relating the order of occurrence, represented by event-time signals in the second data base layer to a particular entry in the first data base layer; and b. utilizing such relating signals for selecting indications in the first data base layer for use in the step of outputting.

362. A method utilizing a digital data processing system having a memory for creating in such memory a digitally coded data base and for retrieving therefrom, comprising the steps of:

a. monitoring the occurrence of received events and forming first event-time indications indicating the relative order of occurrence of such received events in each of a plurality of first type entries;

b. determining the bounds of at least second type events which form second type entries;

c. utilizing the determination of bounds for forming second event time indications indicating the relative order of occurrence of the second type events within second type entries;

d. storing in such memory, as data base, digitally coded event signal representations of at least the different types of received first type events;

e. storing in said memory in a first data base layer, first digitally coded event-time signals representative of the first event-time indications;

f. storing in the memory in a second data base layer, second digitally coded event-time signals representative of the second event-time indications; and g. utilizing the data base for outputting event signals representing the data base event signal representations in the order of occurrence within second type events as represented in the data base.

363. A method according to claim 362 comprising the steps of:

forming signals representing a relation between the different types of events, represented by event signal representations and the order of occurrence for corresponding events represented in one of the layers, and utilizing such formed signals in the step of outputting.

364. Digital data processing means having a memory system and adapted for creating in the memory system a digitally coded data base from received events occurring in a desired sequence and for retrieving from the data base, a plurality of said events forming a first type entry and a plurality of first type entries forming events of a second type entry, a first delimiter event and a second delimiter event identifying the boundary of, respectively, a first type entry and a second type entry, said delimiter events being represented by at least one of said received events, the data processing means comprising:

a, means for monitoring the occurrence of received events and forming a first event-time indication indicating the relative order of occurrence thereof in a first type entry;

b. means for detecting the occurrence of received delimiter events;

c. means for storing in said memory system, as data base, digitally coded event signal representations of the different types of received events of first type entries;

d. means for utilizing the detection of first delimiter events and the first event-time indications for creating, in said memory system in a first data base layer, first digitally coded event time signals indicative of the relative order of occurrence in which received events of the first type entries occurs;

e. means for utilizing the detection of first delimiter events for forming second event tiime indications indicating the relative order of occurrence of the events in the second type entries;

f. means for utilizing the detection of second delimiter events and utilizing the second event-time indications for creating in said memory system, in a second data base layer, second digitaly coded event-time signals which indicate the relative order of occurrence in which the events of the second type entries occur in each of a plurality of the received second type entries; and g.means for selectively reconstructing a series of events and at least first type entries in the order of occurrence as represented in the data base comprising 1. means for designating a desired entry of the second data base layer;
2. means for designating a plurality of desired entries in the first data base layer;
3. means for selecting event signal representations from the data base; and
4. means for utilizing indications in the designated second entry of the data base and utilizing indications in the designated first layer of the data base for outputting event signals representing the selected event signal representations in the order in which they originally occurred.

365. Digital data processing means having a memory system and adapted for creating a digitally coded data base in such memory system from received events occurring in a desired sequence and for retrieving from the data base, a plurality of said received events forming a first type entry and a plurality of first type entries forming events of a second type entry, a first delimiter event and a second delimiter event identifying the boundary of, respectively, a first type entry and a second type entry, said delimiter events being represented by at least one of said received events, the data processing means comprising:

a. means for monitoring the occurrence of said received events of the first type and forming a first event-time indication indicating the relative order of occurrence thereof in a first type entry;

b. means for detecting the occurrence of received delimiter events;

c. means for storing in said memory system, as data base, digitally coded signal representations of the different types of received events of first type entries;

d. means for utilizing the detection of first delimiter events and utilizing the first event-time indications for creating in said memory system in a first data base layer, first digitally coded event-time signals indicative of the relative order of occurrence in which received events of the first type entries occur;

e. means for utilizing the detection of first delimiter events for forming second event time indications indicating the relative order of occurrence of the events in the second type entries;

f. means for utilizing the detection of second delimiter events and utilizing the secod event-time indications for creating in said memory system, in a second data base layer, second digitally coded event-time signals which indicate the relative order of occurrence in which the events of the second type entries occur in each of a plurality of the received second type entries;

g. means for selecting event signal representations from the data base; and h. means for utilizing the second stored digitally coded signals of the first and second data base layers for outputting selected event signals representing the selected event signal representations in the order in which they originally occurred.

366. Digital data processing means having a memory system and adapted for creating and retrieving a digitally coded data base in such memory system the data processing means comprising:

a. means for monitoring the occurrence of received first type events making up a first type entry, and forming first event-time indications indicating the relative order of occurrence thereof in the first type entry;

b. means for detecting the occurrence of received first and second delimiter events;

c. means for utilizing the detection of first delimiter events for forming second event-time indications indicating the relative order of occurrence of a series of second type events which make up a second type entry, first type entries forming second type events;

d. means for storing in said memory system, as data base, digitally coded signal representations of at least the different types of received first type events;

e. means for utilizing the detection of first delimiter events and the first event-time indications for creating in said memory system in a first data base layer, first digitally coded event-time signals indicative of the relative order of occurrence in which received first type events occur in each of a plurality of first type entries;

f. means for utilizing the detection of second delimiter events and the second event-time indications for creating in said memory system, in a second data base layer, second digitally coded event-time signals which indicate the relative order of occurrence of said second type events in each of a plurality of second type entries; and g. means for utilizing the data base event signal representations and the data base digitally coded event time signals for retrieving from the data base selected first and second type events in the order in which they originally occurred.

367. Digital data processing means having a memory for creating in such memory a digitally coded data base and for retrieving therefrom, comprising:

a. means for monitoring the occurrence of received events and forming first event-time indications indicating the relative order of occurrence of such received events in each of a plurality of first type entries;

b. means for detecting the occurrence of delimiter events in the received first type events defining the bounds of second type events which form second type entries;

c. means for utilizing the detection of delimiter events for forming second event-time indications indicating the relative order of occurrence of the second type events within second type entries;

d. means for storing in said memory, as data base, digitally coded event signal representations of at least the different types of received first type events;

e. means for storing in said memory in a first data base layer, first digitally coded event-time signals representative of the first event-time indications;

f. means for storing in the memory in a second data base layer, second digitally coded event-time signals representative of the second event-time indications; and g. means for utilizing the data base for outputting event signals representing the data base event signal representations in the order of occurrence within second type events as represented in the data base.

368. Data processing means according to claim 367 comprising:

a. means for interrogating the first data base layer prior to storing therein event-time signals representing a particular first type entry to determine if the events thereof are represented by event-time signals in the same order of occurrence as they occur in the particular first type entry; and b. means conditioned upon finding the lack of the same order of occurrence, storing event-time signals representing the order of occurrence of the particular first type entry in the first data base layer.

369. Data processing means according to claim 367 comprising:

a. means for interrogating the first data base layer prior to storing therein event-time signals representing a particular first type entry to determine if the events thereof are represented by event-time signals in the same order of occurrence as they occur in the particular first type entry; and b. means conditioned upon finding the same order of occurrence, for not creating event-time signals representing the order of occurrence of the particular first type entry in the first data base layer.

370. Data processing means according to claim 367 comprising:

a. means for creating signals relating the order of occurrence, represented by event-time signals in the second data base layer to a particular entry in the first data base layer; and b. means for utilizing such relating signals for selecting indications in the first data base layer for use by the means for outputting.

371. Digital data processing means having a memory and adapted for creating in such memory a digitally coded data base and for retrieving therefrom, comprising:

a. means for monitoring the occurrence of received events and forming first event-time indications indicating the relative order of occurrence of such received events in each of a plurality of first type entries;

b. means for determining bounds of at least second type events which form second type entries;

c. means for utilizing the determination of bounds for forming second event-time indications indicating the relative order of occurrence of the second type events within second type entries;

d. means for storing in said memory, as data base, digitally coded event signal representations of at least the different types of received first type events;

e. means for storing in said memory in a first data base layer, first digitally coded event-time signals representative of the first event-time indications;

f. means for storing in the memory in a second data base layer, second digitally coded event-time signals representative of the second event-time indications; and g. means for utilizing the data base for outputting event signals representing the data base event signal representations in the order of occurrence within second type events as represented in the data base.

372. Digital data processing means for creating in a memory thereof a digitally coded data base from received data, the received data being represented by plural types of entries, each of said types of entries comprising a plurality of definable entries which in turn are represented by a plurality of events, events of at least one type of entry comprising an entry of another type, comprising:

a. means for forming for each such type of entry, an event-time indication of the order of occurrence for the events within the entries thereof;

b. means for forming from said event-time indications and in the memory a layer of digitally coded signals, for each such type of entry, such that each layer represents the order of occurrence of the events within the entries of the corresponding type of entry;

c. means for forming in the memory digitally coded event signal representations for different types of events received in the data for at least one such type of entry corresponding to one of the layers;

d. means for forming signals representing the relation between the event occurrences, in one layer, and the corresponding entries, represented by event occurrences, of another layer; and e. means utilizing the stored event representations, the stored event-time signals and the signals representing the relation between events in one layer and corresponding entries in another layer for recreating events corresponding to the event representations in the order of occurrence in the received data.

373. Data processing means according to claim 372 comprising:

a. means for forming signals representing a relation between the different types of events, represented by event signal representations and the order of occurrence for corresponding events represented in one of the layers, and b. means for utilizing such formed signals in the means for recreating events for output.

374. A method using a data processor for retrieving, from a memory, a portion of a stored data base, the data base being represented by digital coded signals which represent the order of occurrence of plural events within each of plural entries, the method comprising the steps of:

a. forming, as a request, a series of digital coded event signals representing events of an entry;

b. forming, corresponding to individual events in the entry request, individual bias values which, from one end thereof to the other when in the order of occurrence of the corresponding events, have increasing values;

c. utilizing the stored data base to form digital coded signals representing the data base order of occurrence for those events which are present in the request;

d. utilizing the digital coded signals which are formed representing the data base order of occurrence and the bias values for identifying those data base entries which have a predetermined degree of match in order of occurrence of events with events of the request; and e. generating coded event signals for output representing the events present in the identified data base entry in the order of occurrence specified by such data base entry.

375. A method using a data processor for retrieving, from a memory, a portion of a stored data base, the data base being represented by digital coded signals which represent the order of occurrence of plural events within each of plural entries, the method comprising the steps of:

a. forming, as a request, a series of digital coded event signals representing events of an entry;

b. utilizing the request to form digital coded signals representing the order of occurrence of the events within the entry of the request;

c. utilizing the stored data base to form digital coded signals representing the data base order of occurrence for those events which are present in the request;

d. utilizing the digital coded signals formed in the last two steps for identifying those data base entries which have a predetermined degree of match in order of occurrence of events with events of the request; and e. generating coded event signals for output representing the events in the order of occurrence in which they are represented in the identified data base entries.

376. A method according to claim 375 comprising the additional steps of:

forming as input to the data processor a pipe width signal identifying a permissible mismatch between the order of occurrence of events of the request and the corresponding events in the entry of the data base; and utilizing a value corresponding to the pipe width signal in the step of identifying entries having a predetermined degree of match.

377. A method according to claim 376 comprising the additional steps of:

forming as input to the data processor a further value identifying a predetermined degree of mismatch between the events of the request and the events of the data base; and utilizing a value corresponding to the further value in the step of identifying entries having a predetermined degree of match.

378. A method according to claim 377 comprising the additional steps of:

forming as input to the data processor a length correction signal;

responding to the length correction signal for forming a still further signal representing a value related to the number of events in individual entries of the request and in individual data base entries; and utilizing the value represented by the still further signal in the step of identifying entries having a predetermined degree of match.

379. Data processing means for retrieving, from a memory, a portion of a stored data base, the data base being represented by digital coded signals which represent the order of occurrence of plural events within each of plural entries, the processing means comprising:

a. means for forming, as a request, a series of digital coded event signals representing events of an entry;

b. means for forming, corresponding to individual events in the entry request, individual bias values which, from one end thereof to the other when in the order of occurrence of the corresponding events, have increasing values;

c. means for utilizing the stored data base to form digital coded signals representing the data base order of occurrence for those events which are present in the request;

d. means for utilizing the digital coded signals which are formed representing the data base order of occurrence and the bias values for identifying those data base entries which have a predetermined degree of match in order of occurrence of events with events of the request; and e. means for generating coded event signals for output representing the events in the order of occurrence in which they are represented in the identified data base entries.

380. A data processing means for retrieving, from a memory, a portion of a stored data base, the data base being represented by digital coded signals which represent the order of occurrence of plural events within each of plural entries, the processing means comprising:

a. means for forming, as a request, a series of digital coded event signals representing events of an entry;

b. means for utilizing the request to form digital coded signals representing the order of occurrence of the events within the entry of the request;

c. means for utilizing the stored data base to form digital coded signals representing the data base order of occurrence for those events which are present in the request;

d. means for utilizing the digital coded signals formed by the last two named means for identifying those data base entries which have a predetermined degree of match in order to occurrence of events with events of the request; and e. means for generating coded event signals for output representing the events in the order of occurrence in which they are represented in the identified data base entries.

381. Processing means according to claim 380 comprising:

means for forming as input to the processing means a pipe width signal identifying a permissible mismatch between the order of occurrence of events of the request and the corresponding events in the entry of the data base; and said means for identifying entries having a predetermined degree of match comprising means for utilizing a value corresponding to the pipe width signal.

382. Processing means according to claim 381 comprising:

means for forming as input to the processing means a further value identifying a predetermined degree of mismatch between the events of the request and the events of the data base; and said means for identifying entries having a predetermined degree of match comprising means for utilizing a value corresponding to the further value.

383. Processing means according to claim 382 comprising:

means for forming as input to the data processor a length correction signal;

means responding to the length correction signal for forming a still further signal representing a value related to the number of events in individual entries of the request and in individual data base entries; and said means for identifying entries having a predetermined degree of match comprising means for utilizing the value represented by the still further signal.

384. A method using a data processor for retrieving from a memory a portion of a stored data base, the data base comprising a plurality of layers, each layer comprising event-time values represeting the order of occurrence of events in each of a plurality of entries for the layer, the entries on at least one first layer corresponding to the events in a second layer, the method comprising the steps of:

a. forming, as a request, a series of digital coded event signals representing events of first and second type entries, the events of second type entries being entries in the first type entry;

b. utilizing the request to form digital coded signals representing the order of occurrence of the events within the respective entries of the request;

c. utilizing the first and second layers of the stored data base to form digital coded signals representing the data base order of occurrence for those events in the data base which are present in the request;

d. utilizing the digital coded signals formed in the last two steps for identifying data base entries in each said first and second layers which have a predetermined degree of match in order of occurrence of events with events of the request; and e. generating coded event signals for output representing the events, for at least one layer, in the order of occurrence in which they are represented in the identified data base entries.

385. A method according to claim 384 comprising the additional step of:

forming as input to the data processor a pipe width signal identifying a permissible mismatch between the order of occurrence of events of each type of entry of the request and the corresponding events in the entries of the data base; and utilizing a value corresponding to the pipe width signal in the step of identifying entries having a predetermined degree of match.

386. A method according to claim 385 comprising the additional step of:

forming as input to the data processor a further value identifying a predetermined degree of mismatch between the events of the request and the events of the data base; and utilizing a value corresponding to the further value in the step of identifying entries having a predetermined degree of match.

387. A method according to claim 386 comprising the additional step of:

forming as input to the data processor a length correction signal;

responding to the length correction signal for forming a still further signal representing a value related to the number of events in individual entries of the request and in individual data base entries; and utilizing the value represented by the still further signal in the step of identifying entries having a predetermined degree of match.

388. Data processing means for retrieving from a memory a portion of a stored data base, the data base comprising a plurality of layers, each layer comprising event-time values representing the order of occurrence of events in each of a plurality of entries for the layer, the entries on at least one first layer corresponding to the events in a second layer, comprising:

a. means for forming, as a request, a series of digital coded event signals representing events of first and second type entries, the events of second type entries being entries in the first type entry;

b. means for utilizing the request to form digital coded signals representing the order of occurrence of the events within the respective entries of the request;

c. means for utilizing the first and second layers of the stored data base to form digital coded signals representing the data base order of occurrence for those events in the data base which are present in the request;

d. means for utilizing the digital coded signals formed by the last two named means for identifying data base entries in each said first and second layers which have a predetermined degree of match in order of occurrence of events with events of the request; and e. means for generating coded event signals for output representing the events, for at least one layer, in the order of occurrence in which they are represented in the identified data base entries.

389. Data processing means according to claim 388 comprising:

means for forming, as input to the data processing means, a pipe width signal identifying a permissible mismatch between the order of occurrence of events of each type of entry of the request and the corresponding events in the entries of the data base; and said means for identifying entries having a predetermined degree of match comprising means for utilizing a value corresponding to the pipe width signal.

390. Data processing means according to claim 389 comprising:

means for forming, as input to the data processing means, a further value identifying a predetermined degree of mismatch between the events of the request and the events of the data base; and said means for identifying entries having a predetermined degree of match comprising means for utilizing a value corresponding to the further value.

391. Data processing means according to claim 390 comprising:

means for forming as input to the data processing means a length correction signal;

means for responding to the length correction signal for forming a still further signal representing a value related to the number of events in individual entries of the request and in individual data base entries; and said means for identifying entries having a predetermined degree of match comprising means for utilizing the value represented by the still further signal.

392. A method, utilizing a digital data processing system, for creating in a memory thereof a digitally coded data base from received data and for retrieving from the data base, the received data being represented by plural types of entries, each of said types of entries comprising a plurality of definable entries which in turn are represented by a plurality of events, events of at least one type of entry comprising an entry of another type, comprising the steps of:

a. forming for each such type of entry, an event time indication of the order of occurrence for the events within the entries thereof;

b. forming from said event time indications and in the memory a layer of digitally coded signals, for each such type of entry, such that each layer represents the order of occurrence of the events within the entries of the corresponding type of entry;

c. forming in the memory digitally coded signal representations of different types of events received in the data for at least one such type of entry corresponding to one of the layers;

d. forming signals representing the relation between the event occurrences in one layer, and the corresponding entries, represented by event occurrences, of another layer; and e. utilizing the stored event representations, the stored event time signals and the signals representing the relation between events in one layer and corresponding entries in another layer for recreating events for output corresponding to the event representations and in the order of occurrence in the received data.

393. Digital data processing means, for creating in a memory thereof a digitally coded data base from received data and for retrieving from the data base, the received data being represented by plural types of entries, each of said types of entries comprising a plurality of definable entries which in turn are represented by a plurality of events, events of at least one type of entry comprising an entry of another type, comprising:

a. means for forming for each such type of entry, an event time indication of the order of occurrence for the events within the entries thereof;

b. means for forming from said event time indications and in the memory a layer of digitally coded signals, for each such type of entry, such that each layer represents the order of occurrence of the events within the entries of the corresponding type of entry;

c. means for forming in the memory digitally coded event signal representations for different types of events received in the data for at least one such type of entry and hence corresponding to one of the layers;

d. means for forming signals representing the relation between the event occurrences, in one layer, and the corresponding entries, represented by event occurrences, of another layer; and e. means for utilizing the stored event representations, the stored event time signals and the signals representing the relation between events in one layer and corresponding entries in another layer for recreating events for output corresponding to the event representations in the order of occurrence in the received data.

* * * * *

UNITED STATES PATENT AND TRADEMARK OFFICE
CERTIFICATE OF CORRECTION

PATENT NO. : 4,068,298

DATED : Jan. 10, 1978

INVENTOR(S) : Dechant et al.

It is certified that error appears in the above-identified patent and that said Letters Patent are hereby corrected as shown below:

Column 6, line 8, "process" should be -- processor --;
Col. 6, line 41 "or" should be -- of --;
Col. 7, line 29 "function" should be -- fraction --;
Col. 9, line 15 "That" should be -- This --;
Col. 11, line 59 "finger" should be -- finder --;
Col. 12, line 30 "Fig. 28" should be -- Fig. 58 --;
Col. 17, line 44 "Layer" should be -- Line --;

Col. 18, line 24 after "TEST" insert -- b̸ --;
Col. 18, line 40 after "binary" insert -- 1 --;
Col. 18, line 66 after "input" insert -- events --;
Col. 20, line 48 "halogram" should be -- hologram --;
Col. 21, line 6 "to" should be -- in --;
Col. 21, line 23 after "binary" insert -- bit --;
Col. 22, line 67 "as" should be -- are --;
Col. 23, line 43 "of" should be -- on --;
Col. 23, line 51 "clusing" should be -- cluding --;
Col. 24, line 25 end of line "to" should be -- of--;
Col. 26, line 3 "delt" should be -- delta --;
Col. 28, line 49 "of" should be -- or --;
Col. 28, line 64 "They" should be -- The --;
Col. 29, line 17 "Co" should be -- $\overline{Co}$ --;
Col. 29, line 60 "Pl GE" should be -- Pl.GE --;

UNITED STATES PATENT AND TRADEMARK OFFICE

CERTIFICATE OF CORRECTION

PATENT NO. : 4,068,298

DATED : Jan. 10, 1978

INVENTOR(S) : DECHANT et al.

It is certified that error appears in the above-identified patent and that said Letters Patent are hereby corrected as shown below:

Col. 40, line 51 "Er" should be -- ER --;
Col. 40, line 61 "= ET" should be -- =-ET --;
Col. 44, line 38 "AND 112" should be -- AND gate 112 --;
Col. 47, under "Second call" opposite EB1, "control of EB6" should be -- control to EB6 --;
Col. 49, under "Fourth Call", second column, "next memory address" and "physical length of memory area" should be in the third column;
Col. 49, under "Fourth Call", opposite "EB22", "ET(5)" should be -- ER(5) --;
Col. 51, opposite "EB11", "ET(3)" should be -- ER(3) --;
Col. 51, under "Seventh call" "EOP = MLN3" should be --- EOP = 0 MLN3 --; delete the "0" under "EOP";
Col. 54, line 11 "FT" should be -- ET --; line 15 "off bits needs" should be -- of bits needed --; line 54 "later" should be -- latter --;
Col. 57, line 10 "IPREF" should be -- IPRF --;
line 44 "each o" should be -- each of --;
Col. 58, line 19 "LN1 or IPRF" should be -- LN1 of IPRF --;
Col. 59, line 11 "D1B6" should be -- D1B5 --;
Col. 60, line 10 "P.$\overline{D1}$" should be -- P2.$\overline{D1}$ --;
Col. 61 line 5 "P2" should be -- P3 --;
Col. 67, line 16 "flat" should be -- flag --;
Col. 69, line 53 before "arrives" insert -- bit --;
Col. 70, line 44 "a a" should be -- in a --;
line 57 "cell" should be -- call --;
Col. 71, line 31 "and OM3" should be -- or OM3 --;
Col. 71, line 40-41, "P1 and P2" should be -- $\overline{P1}$ and $\overline{P2}$ --;
line 41 "$\overline{P1}$ and $\overline{P2}$" should be -- P1 and P2 --;
line 49 "of OM2" should be -- at OM2 --;
Col. 72 line 17 "DIo" should be -- $\overline{DIo}$ --;
line 18"MSBDELI" should be -- $\overline{MSBDELI}$ --

UNITED STATES PATENT AND TRADEMARK OFFICE
CERTIFICATE OF CORRECTION

PATENT NO. : 4,068,298 — Page 3 of 16

DATED : Jan. 10, 1978

INVENTOR(S) : Dechant et al.

It is certified that error appears in the above-identified patent and that said Letters Patent are hereby corrected as shown below:

Col. 72, line 40 "DDB6" should be -- DB6 --;
Col. 73 line 1 "DN3" should be -- DB3 --;
Col. 73 line 2 "DN4-6" should be -- DB4-6 --;
Col. 74 line 18 "RM3 and" should be -- RM3 or --;
Col. 78 line 23 "be" should be -- been --;
Col. 79 line 23 "EOP1" should be -- $\overline{\text{EOF1}}$ --;
Col. 80 line 44 "CLK" should be -- $\overline{\text{CLK}}$ --; line 66 "DELIMEND" should be -- DELMEND --;
Col. 84 line 5, "$\overline{\text{EOP2}}$" should be -- $\overline{\text{EOF2}}$ --;
Col. 93 at RB23-RB24 (first occurrence), "EI=CR1=06" should be -- EI=CR1=6 --;
Col. 93, at RB5, RB7-RB19, this should read -- RB5,RB7-RB9 --;
Col. 93, at RB25-RB29 (2nd occurrence) "CR1(1)32 CR1(Ø)+DN(1)" should be -- CR(1)=CR1(Ø)+DN(1) --;
Col. 95 "RB2-RB5" should be -- RB2-RB4 --; and "DN=DELEND=1" should be -- DN=0 DELEND = 1 --;
Col. 96 line 21 "OVL"(2nd occurrence) should be -- $\overline{\text{OVL}}$ --;
Col. 96, line 33 "equals" should be -- signals --;
Col. 98 line 37 "lead" should be -- load --;
Col. 99 line 16 "CLK" (first occurrence) should be -- $\overline{\text{CLK}}$ --;
Col. 99 line 20 "or" should be -- of --;
Col. 101 line 53 "since" should be -- since this --;
Col. 102 line 4 delete "at the outputs";
Col. 103 line 51 "CLK" should be -- $\overline{\text{CLK}}$ --;
Col. 103 line 66 "sio" should be -- iso --;
Col. 104 line 13 "OVL" should be -- $\overline{\text{OVL}}$ --;
Col. 104 line 14 "CLK.OVL" should be -- $\overline{\text{CLK}}.\overline{\text{OVL}}$ --;
Col. 104 line 16 "OVL" should be -- $\overline{\text{OVL}}$ --;
Col. 104 line 33 "CLK" should be -- $\overline{\text{CLK}}$ --;
Col. 107 lines 11,13, "(=1,2,3,)"should be -- (i=1,2,3,) --;
Col. 107 line 62 after "register" insert -- SLINE is compared with the width value contained in register --;
Col. 114 "SMUL1" should be -- SML1 --; (at line 33)
Col. 115 line 32 "SN7400" should be -- SN74100 --;

UNITED STATES PATENT AND TRADEMARK OFFICE
CERTIFICATE OF CORRECTION

PATENT NO. : 4,068,298

DATED : Jan 10, 1978

INVENTOR(S) : Dechant et al

It is certified that error appears in the above-identified patent and that said Letters Patent are hereby corrected as shown below:

Col. 120 opposite "Change line value", "re deletions" should be -- are/ deletions
Col. 118, line 19, "1, , 5,7," should be -- 1,2,5,7, --;
Col. 123, line 63 "(or power)" should be -- (or powers) --;
Col. 126, line 31 "valve" should be -- value --;
Col. 153, line 35 "PB20, PB22" should be -- PB20, PB21 and PB22 --;
Col. 155, line 28 "MATRI" should be -- MATRIX --;
Col. 155, line 30 "PI1" should be -- PI2 --;
Col. 157, lines 9,12 "Rl" should be -- RI --;
Col. 158, line 53 "RI"(first occurrence) should be -- RII --;
Col. 161, line 17 "and" should be -- or --;
Col. 161, line 19 "(1-1" should be -- (a-1 --;
Col. 161, line 40 "EOE1" should be -- EOF1 --;
Col. 163, line 52 delete "to" (first occurrence);
Col. 166, lines7,8, "PI7.PLAST" should be -- PI6.PLAST--, and "PI6" should be -- PI7 --;
Col. 168, line 20 "p27" should be -- P27 --;
Col. 169, line 54 "the input" should be -- the L input --;
Col. 173, line 48 "OUt" should be -- OUT --;
Col. 175, line 66,67, "POISON" should be -- PRISON --;
Col. 176, line 9 "were" should be -- where --;
Col. 179, line 26 "LNRO" should be -- LNRQ --;
Col. 179, line 32 "has a value" should be -- L has a value --;
Col. 179, line 41 "if" should be -- is --;
Col. 179, line 58 "then" should be -- the --;
Col. 182, line 23 "B9-14 B13" should be -- B9-B13 --;
Col. 188, line 61 "work" should be -- word --;
Col. 194, line 28 "B26" should be -- B6 --;
Col. 194 line 65 "B10" should be -- B13 --;
Col. 195 line 23 "flip" should be -- flop --;
Col. 195, line 29 "MIn" should be -- MIN --;
Col. 196, line 49 "1" should be -- 1 ∴ --;
line 50 delete " ∴ ";
Col. 123, line 6 "XXIII" should be -- XIII --;

UNITED STATES PATENT AND TRADEMARK OFFICE
CERTIFICATE OF CORRECTION

PATENT NO. : 4,068,298

DATED : Jan. 10, 1978

INVENTOR(S) : DECHANT et al

It is certified that error appears in the above-identified patent and that said Letters Patent are hereby corrected as shown below:

Col. 196, line 53 "B 23 T(4)≠0" should be -- B23 T(4)≠0∴ --;
Col. 196, line 58 "FLG←0" should be -- FLG←1 --;
Col. 196, line 60 "NP = 0" should be -- NP = 0 ∴ --;
Col. 197, line 19 "31 1" should be -- -1 --;
Col. 199, line 16 "mins" should be -- minus --;
Col. 200, line 22 "Δ" should be -- δ --;
line 26 "3" should be -- 2 --;
Col. 200, at B23, "T≠ ∴" should be -- T≠ 0 ∴ --;
Col. 201 at B13, "EOF1=1" should be -- EOF1-1 ∴ --;
"RI< DI" should be -- RI< DI ∴ --;

Col. 203 at B13 (first occurrence) "sve" should be -- save --;
Col. 203 at B39(first occurrence) "RII(7)> ∴B16" should be -- RII(7)> 0 ∴B16 --;

Col. 212 at "second cycle" delete from "second cycle" through Col. 213 ending with"OB6 call Decode 2 returns EOF2=1 EXIT";
Col. 216, line 44,45, delete "and depending on the status of various flip flops in FIG. 53";
Col. 218, line 54 "PS" should be -- P2 --;
Col. 220, line 8 "M1502" should be -- M1501 --;
Col. 220,line 23"M1502" should be -- M1501 --;
Col. 222, line 19 "is"(second occurrence) should be -- if --;
Col. 222, line 33 "synchronous" should be -- asynchronous --;
Col. 223, line 24 "P2.CLK" should be -- P2.$\overline{CLK}$ --;
Col. 224, line 51 "$\overline{P1+P2}$)" should be -- ($\overline{P1+P2}$) --;
Col. 226, line 8 "ture" should be -- true --;
Col. 227, line 44 "DATA" should be -- DATAO --;
Col. 227, line 66 "complete" should be -- couple --;
Col. 228, line 46 "1215" should be -- 1216 --;
Col. 233, line 17 "locked" should be -- clocked --;
line 19 "are a" should be -- area --;
line 61 "fops" should be -- flops --;
Col. 236, line 26 "1541" should be -- 1514 --;
Col. 238, line 59 "exit" should be -- exist --;

UNITED STATES PATENT AND TRADEMARK OFFICE
CERTIFICATE OF CORRECTION

PATENT NO. : 4,068,298

DATED : Jan. 10, 1978

INVENTOR(S) : DECHANT et al

It is certified that error appears in the above-identified patent and that said Letters Patent are hereby corrected as shown below:

Col. 239, line 21 "lins" should be -- lines --;
Col. 239, line 48 "SPEED" should be -- SEED --;
Col. 241, line 14 "like" should be -- line --;
Col. 244, line 53 "DELRO" should be -- DELO --;
line 61 "DME" should be -- DM3 --;
Col. 245, line 25 "o" should be -- of --;
line 30 "is" should be -- in --;
Col. 249, line 24 "32 1" should be -- = 1 --;
Col. 250, line 4 "reset" should be -- rest --;
Col. 250, line 36 "Tab*e" should be -- Table --;
Col. 253, line 22 "ponter" should be -- pointer --;
line 38 "is" should be -- in --;
line 52 "$(W_o)$" should be -- $(\overline{W_o})$ --;
line 68, "sℓates" should be -- starts --;
Col. 256, line 19 "the occurrence" should be -- the last occurrence --;
Line 46, "$\overline{P1+P2+ -P10}$" should be -- $\overline{P1+P2+ --- P10}$ --;
line 63 "EFST" should be -- EFRST --;
Col. 261, line 23 "the connection" should be -- this connection --;
Col. 263, line 48, "II MEM - area 2" should be -- AM II MEM - area 2 --;
Col. 266, line 60 "RM2-18" should be -- RM2-19 --;
Col. 269, line 27 "seen" should be -- seed --;
Col. 270, line 9 "aea" should be -- area --;
Col. 272, line 60 "RM3°" should be -- RM3-20 --;
Col. 276, line 27 "PG.LT" should be -- P6.LT --;
Col. 277, line 31 "two equal values" should be -- two values --;
Col. 278, line 5 "P8.$\overline{CLK}$" should be -- P8.L.$\overline{CLK}$ --;
line 31 "pointed" should be -- pointer --;
Col. 278, line 67 "pulse to" should be -- pulse the --;
Col. 279, line 35 "EQ" should be -- EO --;
Col. 280, line 34 "P2.CLK" should be -- P2.$\overline{CLK}$ --;

UNITED STATES PATENT AND TRADEMARK OFFICE
CERTIFICATE OF CORRECTION

PATENT NO. : 4,068,298

DATED : Jan. 10, 1978

INVENTOR(S) : DECHANT et al

It is certified that error appears in the above-identified patent and that said Letters Patent are hereby corrected as shown below:

Col. 280, line 36 after "true signal" insert -- at the A3R4 output enables the absolute coded value 5 --;
Col. 281, line 47 "DELOV1" should be -- DELOVL --;
Col. 283, line 38 "$Ww_o$" should be -- $w_o$ --;

Col. 284, line 50 "AM-11" should be -- AM-II --;
Col. 284, line 61 "RM-8" should be -- RM3-8 --;
Col. 286, line 26 "AM-11" should be -- AM-II --;
Col. 288, line 2 "TO" should be -- T0 --;
line 13 "TO" should be -- T0 --;
line 14 "TO" should be -- T0 --;
line 18 "TO" should be -- T0 --;
Col. 289, line 5 "TO" should be -- T0 --;
Col. 290, line 12 "SEED 1" should be -- SEED 2 --;
line 44 "IR, TL, BL, EIR, ETL, EHW" should be -- $\overline{\text{IR}}$, TL, BL, HW, EIR, EBL, ETL, EHW --;
Col. 291, line 27 "$\overline{\text{P2}}$" should be -- P2 --;
line 53 "P3" should be -- P4 --;
Col. 292, line 16 "nest" should be -- next --;
Col. 295, line 46 "next to be" should be -- next to the --;
Col. 296, line 17 "BS2-11" should be -- SB2-11 --;
Col. 303, line 64 "are" should be -- area --;
Col. 311, after "OB25, OB27..has a 0 value" insert the deleted material beginning "second cycle" at col. 212 and ending with "OB6 call Decode 2 returns EOF2 = 1 EXIT" at col. 213;
Col. 312, line 17 "in" should be -- is --;
line 29 "sed" should be -- seed --;
Col. 313, line 9 "seen" should be -- seed --;
line 31 "hardward" should be -- hardware --;
Col. 314, lines 44,45, after "P4 the" insert -- comparator circuit is enabled causing the values in --;
line 54 after "On the" insert -- $\overline{\text{CLK}}$ --;
Col. 319, line 27 "RIi" should be -- RII --;

UNITED STATES PATENT AND TRADEMARK OFFICE
CERTIFICATE OF CORRECTION

PATENT NO. : 4,068,298

DATED : Jan. 10, 1978

INVENTOR(S) : DECHANT et al

It is certified that error appears in the above-identified patent and that said Letters Patent are hereby corrected as shown below:

Col. 321, line 4 "Softward" should be -- Software --;
Col. 322, line 18 "highest" should be -- higher --;
Col. 330, line 9 "point" should be -- pointer --;
Col. 332, line 63 "delimited" should be -- delimiter --;
line 70 "addition to" should be -- addition the --;
Col. 334, line 33 "entires" should be -- entries --;
Col. 336, line 16 after "delimiter" insert -- ȼ --;
Col. 340, line 18 "DO" should be -- D0 --;
line 41 "DO" should be -- D0 --;
line 44 "DO" should be -- D0 --;
line 52 after "LNGSW" insert -- switch --;
line 53 after "is to" insert -- be --;
Col. 341, line 37 "600" should be -- 600 --;
Col. 341, line 53 "flat" should be -- flag --;
Col. 342, line 13 "F5" should be -- F6 --;
line 34 "0" should be -- ȼ --;
line 35 "20" should be -- 30 --;
line 38 "has not been" should be -- has not --;
line 55 after "delimiters" insert -- ȼ --;
Col. 343, line 34 after "REQUEST" insert -- subroutine --;
line 50 after "delimiter"(first occurrence) insert -- ȼ --;
Col. 344, line 7 "b" should be -- ȼ --;
line 14 after "LNGSW" insert -- switch --;
line 37 "PA6" should be -- PA7 --;
line 44 after "if" insert -- a --;
line 49 after "delimiter" (first occurrence) insert -- ȼ --;
line 60 after "delimiter" insert -- ȼ --;
lines 64,66,67, "LOET" should be -- L0ET --;
Col. 345, lines 5,9,10 "LOET" should be -- L0ET --;
Col. 346, line 10 after "program" delete "is";

UNITED STATES PATENT AND TRADEMARK OFFICE

CERTIFICATE OF CORRECTION

PATENT NO. : 4,068,298

DATED : Jan 10, 1978

INVENTOR(S) : DECHANT et al

It is certified that error appears in the above-identified patent and that said Letters Patent are hereby corrected as shown below:

Col. 348, line 15 "LOPTR" should be -- L0PTR --;
line 19 "LOPTR" should be -- L0PTR --;(both instances)
line 19 "LOET" should be -- L0ET --;
line 24 "LOET" should be -- L0ET --;
line 28 "RO" should be -- R0 --;
line 34 after "it to" insert -- output the --;
line 35 "RO" should be -- R0 --;
line 46 "RO" should be -- R0 --;
line 48 "if" should be -- of --;
line 63 "6(RO), DNO" should be -- 6(R0),DNOC --;
Col. 349, line 4 "RO" should be -- R0 --;
line 20 "P19" should be -- PI9 --;
line 26 "P19" should be -- PI9 --;
Col. 350, line 23 "MODULE" should be -- MEMORY MODULE --;
Col. 352, line 3 "rest" should be -- test --;
line 44 "PBBOUT" should be -- PNBOUT --;
Col. 353, line 20 "P123" should be -- PI23 --;
line 45 "bits" should be -- hits --;
line 49 "PI125" should be -- PI25 --;
Col. 354, line 5 "PMB" should be -- PBM --;
line 38 "PBBOUT" should be -- PNBOUT --;
Col. 357, line 12 "further" should be -- future --;
Col. 361, line 46 "BRX" should be -- BFX --;
Col. 363, line 45 "P17" should be -- PI7 --;
Col. 364, line 62 "OMGO," should be -- OMGO,STATUS --;
Col. 376, lines 17,20 "R1" should be -- R2 --;
Col. 376, line 41 after "layer 1" insert -- request --;
line 48 after "delimiter" insert -- Ø --;
Col. 382, line 5 "resistor" should be -- requestor --;
line 65 "DCOPDE" should be -- DCODE --;
Col. 384, line 66 "PRODOUT" should be -- PROCOUT --;
Col. 386, line 30 delete "of";
Col. 388, line 60 "P012" should be -- PO12 --;

UNITED STATES PATENT AND TRADEMARK OFFICE
CERTIFICATE OF CORRECTION

PATENT NO. : 4,068,298
DATED : Jan. 10, 1978
INVENTOR(S) : DECHANT et al

It is certified that error appears in the above-identified patent and that said Letters Patent are hereby corrected as shown below:

Col. 390, line 24 "PBL" should be -- BPL --;
Col. 394, line 57 "LOPTR" should be -- L0PTR --;
Col. 397, line 32 after "ample b" insert -- assumes that four layer 0 event numbers have been stored into ESTAK --;
line 32 change "a" to -- at --;
line 33 "0" should be -- (ɓ) --;
Col. 400, line 3 "content" should be -- context --;
line 15 "+." should be -- +ɓ. --;
Col. 401, line 12 "+" should be -- +ɓ --;
Col. 402, line 31 "MOV #,(R1)" should be -- MOV #1,(R1) --;
Col. 403, line 63 "of" should be -- on --;
Col. 404, line 6,7, after "read from"delete "delimiter # and the word delimiter ɓ, RLN0,RLN1 are" and insert therefor -- the typewriter and stored in register R0. If the character --;
line 48, after "124" insert -- shows a flow diagram for the PROCESS ENTRY program. The --;
Col. 405, line 50 "DB7.99.5" should be -- DB7.9.5 --;
line 53 after "directly" insert -- after DB7.9.5 for subsequent input characters. --;
line 62 after "delimiter" insert -- ɓ --;
Col. 406, line 21 "DB7.9.0" should be -- DB7.9.9 --;
line 23 "DB7.9.0" should be -- DB7.9.9 --;
Col. 407, line 14 "DB7.99.14" should be -- DB7.9.14 --;
Col. 410, line 40,41 "ɓ#"(both instances) should be -- #ɓ --;
line 63, "layer 1 or layer 2" should be -- layer 1 --;
Col. 414, line 8 "SEEDPM+λ" should be -- SEEDPM+2 --;
line 51 "ANEL13.6" should be -- ANE13.6 --;

UNITED STATES PATENT AND TRADEMARK OFFICE
CERTIFICATE OF CORRECTION

PATENT NO. : 4,068,298

DATED : January 10, 1978

INVENTOR(S) : DECHANT et al

It is certified that error appears in the above-identified patent and that said Letters Patent are hereby corrected as shown below:

Col. 420, Table 3, " ''implied pointer" should be -- 'ᵬ' implied pointer --;

Col. 422, Table 8, "0 1 2 3 4 5 6 7
(1)
(2) " should be replaced by

| -- | 0 | 1 | 2 | 3 | 4 | 5 | 6 | 7 |
|---|---|---|---|---|---|---|---|---|
| (1) | 1 | 1 | 1 | 0 | 1 | 0 | 1 | 0 |
| (2) | 0 | 1 | 2 | 4 | 6 | | | |

--;

Col. 423, over "EXAMPLE OF HYBRID ENCODING" should be -- TABLE 9 --;

Col. 424, Table 9-F, the upper end of the parenthesis should extend to include the line beginning "4";

Col. 429, at "Vii", "(-)" should be -- (-1) --;

Col. 432, Table 17, at "OR1", "seed line value for" should be -- seed line value from --;

Col. 431, Table 18, under "Events" and above "T H I S" should be -- ᵬ --;

Col. 431, Table 19, under "Events" and above "T H I S" should be -- ᵬ --; Table 19, insert an arrow from [1 / 1] to "the occurrence of "IS" is shown here";

Col. 433, Table 20, insert -- ᵬ -- over "S I T "; Table 21 insert -- ᵬ -- over "S I T"; Table 22, insert -- ᵬ -- over "S I T"; Table 23 insert -- ᵬ -- over "S I T"; Table 24, insert -- ᵬ -- over "S I T"; "S" should be aligned with the line "0 0 1"; "I" should be aligned with the line "1 0 0"; and "T" should be aligned with the line "0 0 0";

Col. 434, Table 25,opposite "Event" should be -- 0 1 2 3 4 5 --; "S" should be aligned with the line "0 0 0 0 1"; "I" should be aligned with the line "0 0 1 0 0"; "T" should be aligned with the line "0 0 0 0 0"; Table 26, "event was biased by PASS 3" should be -- event was biased by 3 and added to PASS 3 --;

Col. 435, Table 28, insert below the horizontal line -- Pipe starts centered on the rightmost event time and moves left one column (time occurrence) at a time. Each time the number of hits are added and a maximum hit count is kept for each entry. Upon processing an entry, if the maximum hits is greater than 0, then the center pipe for the entry and its maximum hit count is output. --;

UNITED STATES PATENT AND TRADEMARK OFFICE

CERTIFICATE OF CORRECTION

PATENT NO. : 4,068,298

DATED : Jan. 10, 1978

INVENTOR(S) : DECHANT et al

It is certified that error appears in the above-identified patent and that said Letters Patent are hereby corrected as shown below:

Col. 435, Table 31 should read -- 5 6 7 8 --;
1 1

Col. 436, Table 33, line 46 et seq., delete "GT The "greater than" set when two values being compared in the ALU are equal;";
Col. 436, Table 35, first line should read -- 6+6+6+6+7+7 --;
Col. 438, Table 41, insert titled under "Part 2" over the three columns moving from left to right, the following -- Address --; -- Value Content --; -- Name of Value --;
Col. 439, under "Part 3", at "MEMORY MODULE AREA 1", "ZI" should be -- I --;
under "Part 5", "MEMORY MODULE area 1
1 0 0 0 1 1 1 0 "T"E.O.vector (14,11,1) "
has been repeated and should be deleted;
Col. 441, Table 42, "Me3" should be -- M3e --;
Col. 441, Table 45 under "Signal", "S11" should be -- SM11 --;
Col. 444, Table 49, "DELOVI" should be -- DELOVL --;
Col. 453, Table 60B, under "Event" (first occurrence) and opposite the "0" insert -- ḇ --; in the second part of the example, opposite "#" the mark should be under 14 and not 15; opposite "THIS" the mark should be under 11 and not between 11 and 12; opposite "IS" the mark should be under 12 and not 13; opposite "BEST" the mark should be under 13 and not 14;
Col. 455, Table 60C, "BETTER" should be -- ḇ BETTER ḇ --;
Col. 456, Table 60I, opposite "236" insert -- 1 --;

UNITED STATES PATENT AND TRADEMARK OFFICE

CERTIFICATE OF CORRECTION

PATENT NO. : 4,068,298

DATED : Jan. 10, 1978

INVENTOR(S) : DECHANT et al.

It is certified that error appears in the above-identified patent and that said Letters Patent are hereby corrected as shown below:

Col. 467 at "PA13", "JOINE4" should be -- JOIN4 --;
at "PA17", "JSE" should be -- JSR --;
Col. 469 at "PI7.1", "ADFF" should be -- ADDF --;
Col. 471 at "PI26", "BEO" should be -- BEQ --; at the last line of the material under PIPE PROGRAM, "RST" should be -- RTS --;
Col. 473 at "(BR16)JOIN5", "DCODC1" should be -- DCODE1 --;
Col. 481 at "(C834)", should be -- (C384) --;
Col. 485 at "PO12", "R6,PRNTC" should be -- R5,PRNTC --;
Col. 494, under "B-22", last line should read -- The ƀ stands for a blank symbol, i.e., a space --;
Col. 504 at "DB7.9.5", should read -- "If the previous character was a ƀ, that means a word was just processed. --;
Col. 506, at "(DB7.9.22)PEJ6:", "PC=" should read -- PC = ƀ --;
at "(DB10.0)DBERR:" should read -- Control comes to here if --;
Col. 505 at "(DB11.0)JOIN2:", second column "TSTENDLFAG" should be -- TST ENDFLAG --;
Col. 506 at "(PLE6)" after "hit by testing PNBCNT", insert -- If it is still zero, it means an exact hit has not been found. If it is not zero, an exact hit has not been found. --;
Col. 507, "(ANE3)ANDF1:" should be -- (ANE3) ADNF1: --;
at "(ANE5)ANEJ1:" insert -- @ -- after "MOV";
Col. 509, second line of middle column, "MOV #CNGHPM,R1" should be -- MOV #CNGDPM,R1 --;
Col. 511, at "(ANE13.4.12)", "CLR (R3)" should be -- CLR@(R3) --;
Col. 513, at "(ANE13.11)PNSJ2:", the lower "MOV (SP)+,R4" should be -- MOV (SP)+,R3 --;
Col. 517, "PLUMSMSG" should be -- PLUSMSG -- ;

UNITED STATES PATENT AND TRADEMARK OFFICE

CERTIFICATE OF CORRECTION

PATENT NO. : 4,068,298

DATED : Jan 10, 1978

INVENTOR(S) : DECHANT et al

It is certified that error appears in the above-identified patent and that said Letters Patent are hereby corrected as shown below:

Col. 520, line 58 after "entering" insert -- in --;
line 62 after "storing" insert -- in --;
Col. 523, line 3, after "each" insert -- said --;
Col. 524, line 6, before "comprising" insert -- therefrom --;
Col. 530, line 68 "2." should be -- 1. --;
Col. 534, line 47, "represented in" should be -- represented by-
Col. 539, line 11 after "entries" insert -- (second layer events) --;
Col. 540, line 12 "other" should be -- order --;
Col. 540, line 59 "event" should be -- events --;
line 68 "value" should be -- values --;
Col. 541, line 8, "tosecond layer event-time value" should be -- to second layer event-time values --;
Col. 541, line 47 "value" should be -- values --;
Col. 542, line 44 "degress" should be -- degrees --;
Col. 543, line 64 "last" should be -- least --;
Col. 544, line 15 "last" should be -- least --;
line 54 "loating" should be -- locating --;
Col. 546, line 15 "event" should be -- events --;
line 32 "represented" should be -- representing --;
Col. 547, line 29 "senting" should be -- sented --;
line 32 "dafta" should be -- data --;
Col. 549, line 13 "signal" should be -- signals --;
line 20 "output arranged" should be -- output being arranged --;
Col. 550, line 15 "of" should be -- to --;
line 41 "respe-" should be -- repre- --;
line 55 after "data" insert -- base --;
Col. 552, line 1 "identification" should be -- identified --;
line 32 "even-time" should be -- event-time --;
Col. 554, line 29 "inut" should be -- input --;
Col. 558, line 18 "preseleted" should be -- preselected --;

UNITED STATES PATENT AND TRADEMARK OFFICE

CERTIFICATE OF CORRECTION

PATENT NO. : 4,068,298
DATED : Jan. 10, 1978
INVENTOR(S) : DECHANT et al

It is certified that error appears in the above-identified patent and that said Letters Patent are hereby corrected as shown below:

Col. 559, line 21 after "means for" insert -- counting the --;
line 34 "ot" should be -- of --;
Col. 566, line 40 after "entry" insert -- (second layer event) --;
Col. 566, line 65 after "second layer" insert -- data base --;
Col. 568, line 16 "has a" should be -- has at --;
Col. 567, line 55 "including" should be -- indicating --;
Col. 569, line 4 after "least" insert -- one --;
lines 61,62, "layere-vent-time" should be -- layer-event-time --;
Col. 571, line 29 "pesence" should be -- presence --;
Col. 572, line 6 after "same" insert -- and --;
Col. 573, line 40 after "event" insert -- -time --;
Col. 574, line 46 "signa" should be -- signal --;
Col. 575, line 14 after "in" insert -- such --;
line 37 "represnted" should be -- represented --;
Col. 577, line 30 "form" should be -- from --;
Col. 577, line 3, "193" should be -- 293 --;
Col. 579, line 7 "lest" should be -- least --;
Col. 583, line 32, after "lines" insert -- value --;
Col. 586, line 17 after "value" insert -- signal --;
line 19 after "lines" insert -- value signal --;
Col. 590, line 27 after "than" (second occurrence) insert -- or --;
Col. 591, line 18 "flat" should be -- flag --;
Col. 594, line 68 "for" should be -- from -- ;
Col. 599, line 13 after "the" delete "second";
Col. 603, line 53 "to" should be -- of --.

UNITED STATES PATENT AND TRADEMARK OFFICE
CERTIFICATE OF CORRECTION

PATENT NO. : 4,068,298

DATED : Jan. 10, 1978

INVENTOR(S) : Dechant et al

It is certified that error appears in the above-identified patent and that said Letters Patent are hereby corrected as shown below:

Column 591, claim 347, change the dependency from "335" to -- 346 --.

Signed and Sealed this

*Third* Day of *November 1981*

[SEAL]

*Attest:*

GERALD J. MOSSINGHOFF

*Attesting Officer* *Commissioner of Patents and Trademarks*